US012625608B2

(12) United States Patent
Pastrana Vicente et al.

(10) Patent No.: US 12,625,608 B2
(45) Date of Patent: May 12, 2026

(54) METHODS FOR INTERACTING WITH USER INTERFACES BASED ON ATTENTION

(71) Applicant: Apple Inc., Cupertino, CA (US)

(72) Inventors: Israel Pastrana Vicente, Spring, TX (US); Evgenii Krivoruchko, San Francisco, CA (US); Kristi E. Bauerly, Los Altos, CA (US); Lorena S. Pazmino, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 18/473,197

(22) Filed: Sep. 22, 2023

(65) Prior Publication Data

US 2024/0103701 A1     Mar. 28, 2024

Related U.S. Application Data

(60) Provisional application No. 63/506,124, filed on Jun. 4, 2023, provisional application No. 63/506,080, filed
(Continued)

(51) Int. Cl.
*G06F 3/0488* (2022.01)
*G06F 3/01* (2006.01)
(Continued)

(52) U.S. Cl.
CPC .......... *G06F 3/04886* (2013.01); *G06F 3/011* (2013.01); *G06F 3/017* (2013.01);
(Continued)

(58) Field of Classification Search
CPC ...... G06F 3/04886; G06F 3/011; G06F 3/017; G06F 3/0481; G06F 3/04812;
(Continued)

(56) References Cited

U.S. PATENT DOCUMENTS 1,173,824 A     2/1916  Mckee
5,015,188 A     5/1991  Pellosie et al.
(Continued)

FOREIGN PATENT DOCUMENTS

CA     3033344 A1     2/2018
CN     102298493 A     12/2011
(Continued)

OTHER PUBLICATIONS

Zhenxing Li et al., Gaze Augmented Hand-Based Kinesthetic Interaction: What You See is What You Feel, Mar. 1, 2019, IEEE Transactions on Haptics, vol. 12, No. 2, pp. 114-127 (Year: 2019).*
(Continued)

*Primary Examiner* — Tam T Tran
(74) *Attorney, Agent, or Firm* — Kubota & Basol LLP

(57)     ABSTRACT

A gaze virtual object is displayed that is selectable based on attention directed to the gaze virtual object to perform an operation associated with a selectable virtual object. An indication of attention of a user is displayed. An enlarged view of a region of a user interface is displayed. A value of a slider element is adjusted based on attention of a user. A user interface element is moved at a respective rate based on attention of a user. Text is entered into a text entry field in response to speech inputs. A value for a value selection user interface object is updated based on attention of a user. Movement of a virtual object is facilitated based on direct touch interactions. A user input is facilitated for displaying a selection refinement user interface object. A visual indicator is displayed indicating progress toward selecting a virtual object when criteria are met.

37 Claims, 251 Drawing Sheets

Related U.S. Application Data on Jun. 3, 2023, provisional application No. 63/503,138, filed on May 18, 2023, provisional application No. 63/377,024, filed on Sep. 24, 2022.

(51) Int. Cl.

| | |
|---|---|
| *G06F 3/0481* | (2022.01) |
| *G06F 3/04812* | (2022.01) |
| *G06F 3/04815* | (2022.01) |
| *G06F 3/04817* | (2022.01) |
| *G06F 3/0484* | (2022.01) |
| *G06F 3/04842* | (2022.01) |
| *G06F 3/04845* | (2022.01) |
| *G06F 3/0487* | (2013.01) |
| *G06F 3/04886* | (2022.01) |

(52) U.S. Cl.
CPC ........ *G06F 3/0481* (2013.01); *G06F 3/04812* (2013.01); *G06F 3/04815* (2013.01); *G06F 3/04817* (2013.01); *G06F 3/0484* (2013.01); *G06F 3/04842* (2013.01); *G06F 3/04845* (2013.01); *G06F 3/0487* (2013.01); *G06F 3/0488* (2013.01); *G06F 3/013* (2013.01)

(58) Field of Classification Search
CPC ............. G06F 3/04815; G06F 3/04817; G06F 3/0484; G06F 3/04842; G06F 3/04845; G06F 3/0487; G06F 3/0488; G06F 3/167; G06F 3/013; G06F 2203/04804; G06F 2203/04808; G06T 13/00; G06T 15/50; G06T 2200/24
See application file for complete search history.

(56) References Cited

U.S. PATENT DOCUMENTS

| | | | |
|---|---|---|---|
| 5,422,812 | A | 6/1995 | Knoll et al. |
| 5,483,261 | A | 1/1996 | Yasutake |
| 5,488,204 | A | 1/1996 | Mead et al. |
| 5,515,488 | A | 5/1996 | Hoppe et al. |
| 5,524,195 | A | 6/1996 | Clanton et al. |
| 5,610,828 | A | 3/1997 | Kodosky et al. |
| 5,731,805 | A | 3/1998 | Tognazzini et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,809,267 | A | 9/1998 | Moran et al. |
| 5,825,352 | A | 10/1998 | Bisset et al. |
| 5,835,079 | A | 11/1998 | Shieh |
| 5,877,766 | A | 3/1999 | Bates et al. |
| 5,880,411 | A | 3/1999 | Gillespie et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,078,310 | A | 6/2000 | Tognazzini |
| 6,108,004 | A | 8/2000 | Medl |
| 6,112,015 | A | 8/2000 | Planas et al. |
| 6,154,559 | A | 11/2000 | Beardsley |
| 6,167,433 | A | 12/2000 | Maples et al. |
| 6,188,391 | B1 | 2/2001 | Seely et al. |
| 6,295,069 | B1 | 9/2001 | Shirur |
| 6,310,610 | B1 | 10/2001 | Beaton et al. |
| 6,323,846 | B1 | 11/2001 | Westerman et al. |
| 6,426,745 | B1 | 7/2002 | Isaacs et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,690,387 | B2 | 2/2004 | Zimmerman et al. |
| 6,714,201 | B1 | 3/2004 | Grinstein et al. |
| 6,750,873 | B1 | 6/2004 | Bernardini et al. |
| 6,756,997 | B1 | 6/2004 | Ward et al. |
| 7,015,894 | B2 | 3/2006 | Morohoshi |
| 7,035,903 | B1 | 4/2006 | Baldonado |
| 7,096,120 | B2 | 8/2006 | Hull |
| 7,134,130 | B1 | 11/2006 | Thomas |
| 7,137,074 | B1 | 11/2006 | Newton et al. |
| 7,184,064 | B2 | 2/2007 | Zimmerman et al. |
| 7,230,629 | B2 | 6/2007 | Reynolds et al. |
| 7,298,370 | B1 | 11/2007 | Middler et al. |
| 7,580,576 | B2 | 8/2009 | Wang et al. |
| 7,614,008 | B2 | 11/2009 | Ording |
| 7,633,076 | B2 | 12/2009 | Huppi et al. |
| 7,634,718 | B2 | 12/2009 | Nakajima |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,706,579 | B2 | 4/2010 | Oijer |
| 7,721,226 | B2 | 5/2010 | Barabe et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,341,541 | B2 | 12/2012 | Holecek et al. |
| 8,381,135 | B2 | 2/2013 | Hotelling et al. |
| 8,436,872 | B2 | 5/2013 | Wright et al. |
| 8,479,122 | B2 | 7/2013 | Hotelling et al. |
| 8,593,558 | B2 | 11/2013 | Gardiner et al. |
| 8,724,856 | B1 | 5/2014 | King |
| 8,730,156 | B2 | 5/2014 | Weising et al. |
| 8,767,045 | B2 | 7/2014 | Kitazato et al. |
| 8,793,620 | B2 | 7/2014 | Stafford |
| 8,793,729 | B2 | 7/2014 | Adimatyam et al. |
| 8,803,873 | B2 | 8/2014 | Yoo et al. |
| 8,805,690 | B1 | 8/2014 | Lebeau et al. |
| 8,866,880 | B2 | 10/2014 | Tan et al. |
| 8,896,632 | B2 | 11/2014 | Macdougall et al. |
| 8,947,323 | B1 | 2/2015 | Raffle et al. |
| 8,970,478 | B2 | 3/2015 | Johansson |
| 8,970,629 | B2 | 3/2015 | Kim et al. |
| 8,994,718 | B2 | 3/2015 | Latta et al. |
| 9,007,301 | B1 | 4/2015 | Raffle et al. |
| 9,108,109 | B2 | 8/2015 | Pare et al. |
| 9,158,115 | B1 | 10/2015 | Worley et al. |
| 9,164,975 | B2 | 10/2015 | Milewski et al. |
| 9,183,672 | B1 | 11/2015 | Hickman et al. |
| 9,185,062 | B1 | 11/2015 | Yang et al. |
| 9,189,611 | B2 | 11/2015 | Wssingbo |
| 9,196,072 | B2 | 11/2015 | Oh et al. |
| 9,201,500 | B2 | 12/2015 | Srinivasan et al. |
| 9,214,137 | B2 | 12/2015 | Bala et al. |
| 9,222,787 | B2 | 12/2015 | Blumenberg et al. |
| 9,230,368 | B2 | 1/2016 | Keane et al. |
| 9,237,334 | B2 | 1/2016 | Cheng et al. |
| 9,241,149 | B2 | 1/2016 | Redmann |
| 9,245,388 | B2 | 1/2016 | Poulos et al. |
| 9,256,785 | B2 | 2/2016 | Qvarfordt |
| 9,293,118 | B2 | 3/2016 | Matsui |
| 9,294,757 | B1 | 3/2016 | Lewis et al. |
| 9,298,334 | B1 | 3/2016 | Zimmerman et al. |
| 9,316,827 | B2 | 4/2016 | Lindley et al. |
| 9,348,458 | B2 | 5/2016 | Hotelling et al. |
| 9,383,189 | B2 | 7/2016 | Bridges et al. |
| 9,384,594 | B2 | 7/2016 | Maciocci et al. |
| 9,396,580 | B1 | 7/2016 | Nowrouzezahrai et al. |
| 9,400,559 | B2 | 7/2016 | Latta et al. |
| 9,426,193 | B2 | 8/2016 | Goodman |
| 9,436,357 | B2 | 9/2016 | Pallakoff et al. |
| 9,437,047 | B2 | 9/2016 | Chang et al. |
| 9,448,635 | B2 | 9/2016 | Macdougall et al. |
| 9,448,687 | B1 | 9/2016 | Mckenzie et al. |
| 9,465,479 | B2 | 10/2016 | Cho et al. |
| 9,519,371 | B2 | 12/2016 | Nishida |
| 9,526,127 | B1 | 12/2016 | Taubman et al. |
| 9,544,257 | B2 | 1/2017 | Ogundokun et al. |
| 9,563,331 | B2 | 2/2017 | Poulos et al. |
| 9,575,559 | B2 | 2/2017 | Andrysco |
| 9,588,651 | B1 | 3/2017 | Buchanan et al. |

(56) References Cited

U.S. PATENT DOCUMENTS

| | | | |
|---|---|---|---|
| 9,612,722 | B2 | 4/2017 | Miller et al. |
| 9,619,105 | B1 | 4/2017 | Dal Mutto |
| 9,619,519 | B1 | 4/2017 | Dorner |
| 9,672,588 | B1 | 6/2017 | Doucette et al. |
| 9,681,112 | B2 | 6/2017 | Son |
| 9,684,372 | B2 | 6/2017 | Xun et al. |
| 9,704,230 | B2 | 7/2017 | Hofmann et al. |
| 9,734,402 | B2 | 8/2017 | Jang et al. |
| 9,778,814 | B2 | 10/2017 | Ambrus et al. |
| 9,779,512 | B2 | 10/2017 | Tomlin et al. |
| 9,829,708 | B1 | 11/2017 | Asada |
| 9,851,866 | B2 | 12/2017 | Goossens et al. |
| 9,864,498 | B2 | 1/2018 | Olsson et al. |
| 9,870,130 | B2 | 1/2018 | Schubert et al. |
| 9,886,087 | B1 | 2/2018 | Wald et al. |
| 9,911,232 | B2 | 3/2018 | Shapira et al. |
| 9,933,833 | B2 | 4/2018 | Tu et al. |
| 9,933,937 | B2 | 4/2018 | Lemay et al. |
| 9,934,614 | B2 | 4/2018 | Ramsby et al. |
| 9,952,042 | B2 | 4/2018 | Abovitz et al. |
| 10,026,209 | B1 | 7/2018 | Dagley et al. |
| 10,049,460 | B2 | 8/2018 | Romano et al. |
| 10,101,803 | B2 | 10/2018 | Faaborg et al. |
| 10,139,985 | B2 | 11/2018 | Mildrew et al. |
| 10,163,198 | B2 | 12/2018 | Rochford et al. |
| 10,175,483 | B2 | 1/2019 | Salter et al. |
| 10,186,086 | B2 | 1/2019 | Giraldi et al. |
| 10,192,347 | B2 | 1/2019 | Bui et al. |
| 10,203,764 | B2 | 2/2019 | Katz et al. |
| 10,210,664 | B1 | 2/2019 | Chaturvedi |
| 10,303,427 | B2 | 5/2019 | Shintani et al. |
| 10,307,671 | B2 | 6/2019 | Barney et al. |
| 10,318,034 | B1 | 6/2019 | Hauenstein et al. |
| 10,331,205 | B2 | 6/2019 | Kim et al. |
| 10,339,721 | B1 | 7/2019 | Dascola et al. |
| 10,353,532 | B1 | 7/2019 | Holz et al. |
| 10,373,381 | B2 | 8/2019 | Nuernberger et al. |
| 10,394,320 | B2 | 8/2019 | George-svahn et al. |
| 10,401,958 | B2 | 9/2019 | Peana et al. |
| 10,424,124 | B2 | 9/2019 | Takahashi |
| 10,431,216 | B1 | 10/2019 | Lemon et al. |
| 10,448,189 | B2 | 10/2019 | Link |
| 10,484,641 | B2 | 11/2019 | Zhou et al. |
| 10,488,941 | B2 | 11/2019 | Lam et al. |
| 10,499,044 | B1 | 12/2019 | Giokaris et al. |
| 10,530,731 | B1 | 1/2020 | Wu et al. |
| 10,534,439 | B2 | 1/2020 | Raffa et al. |
| 10,540,005 | B2 | 1/2020 | Yoon et al. |
| 10,545,584 | B2 | 1/2020 | Tome et al. |
| 10,564,714 | B2 | 2/2020 | Marggraff et al. |
| 10,565,448 | B2 | 2/2020 | Bell et al. |
| 10,565,761 | B2 | 2/2020 | Deluca et al. |
| 10,573,067 | B1 | 2/2020 | Naik et al. |
| 10,630,803 | B2 | 4/2020 | Hwang et al. |
| 10,642,368 | B2 | 5/2020 | Chen |
| 10,645,332 | B2 | 5/2020 | Zhang |
| 10,664,043 | B2 | 5/2020 | Ikuta et al. |
| 10,664,048 | B2 | 5/2020 | Cieplinski et al. |
| 10,664,050 | B2 | 5/2020 | Alcaide et al. |
| 10,671,241 | B1 | 6/2020 | Jia et al. |
| 10,671,243 | B2 | 6/2020 | Ryu et al. |
| 10,678,403 | B2 | 6/2020 | Duarte et al. |
| 10,691,216 | B2 | 6/2020 | Geisner et al. |
| 10,698,562 | B1 | 6/2020 | Zhou et al. |
| 10,699,488 | B1 | 6/2020 | Terrano |
| 10,708,965 | B1 | 7/2020 | Subramanian et al. |
| 10,712,900 | B2 | 7/2020 | Osman et al. |
| 10,732,721 | B1 | 8/2020 | Clements |
| 10,754,434 | B2 | 8/2020 | Hall et al. |
| 10,762,716 | B1 | 9/2020 | Paul et al. |
| 10,768,421 | B1 | 9/2020 | Rosenberg et al. |
| 10,768,693 | B2 | 9/2020 | Powderly et al. |
| 10,776,933 | B2 | 9/2020 | Faulkner |
| 10,846,864 | B2 | 11/2020 | Kim et al. |
| 10,852,814 | B1 | 12/2020 | Caron et al. |
| 10,861,242 | B2 | 12/2020 | Lacey et al. |
| 10,877,645 | B2 | 12/2020 | Lee et al. |
| 10,885,701 | B1 | 1/2021 | Patel |
| 10,890,967 | B2 | 1/2021 | Stellmach et al. |
| 10,922,744 | B1 | 2/2021 | Mahajan |
| 10,929,099 | B2 | 2/2021 | Querze et al. |
| 10,936,148 | B1 | 3/2021 | Merkl et al. |
| 10,956,724 | B1 | 3/2021 | Terrano |
| 10,983,663 | B2 | 4/2021 | Iglesias |
| 11,003,308 | B1 | 5/2021 | Dryer et al. |
| 11,017,611 | B1 | 5/2021 | Mount et al. |
| 11,023,035 | B1 | 6/2021 | Atlas et al. |
| 11,055,920 | B1 | 7/2021 | Bramwell et al. |
| 11,079,995 | B1 | 8/2021 | Hulbert et al. |
| 11,082,463 | B2 | 8/2021 | Felman |
| 11,095,857 | B1 | 8/2021 | Krol et al. |
| 11,112,875 | B1 | 9/2021 | Zhou et al. |
| 11,126,850 | B1 | 9/2021 | Ichim et al. |
| 11,132,840 | B2 | 9/2021 | Sarangdhar et al. |
| 11,138,798 | B2 | 10/2021 | Paul et al. |
| 11,146,909 | B1 | 10/2021 | Pinto et al. |
| 11,175,791 | B1 | 11/2021 | Patnaikuni et al. |
| 11,176,755 | B1 | 11/2021 | Tichenor et al. |
| 11,199,898 | B2 | 12/2021 | Blume et al. |
| 11,200,742 | B1 | 12/2021 | Post et al. |
| 11,204,678 | B1 | 12/2021 | Baker et al. |
| 11,232,643 | B1 | 1/2022 | Stevens et al. |
| 11,243,734 | B2 | 2/2022 | Boissière et al. |
| 11,249,556 | B1 | 2/2022 | Schwarz et al. |
| 11,262,885 | B1 | 3/2022 | Burckel |
| 11,266,919 | B2 | 3/2022 | Bear et al. |
| 11,294,472 | B2 | 4/2022 | Tang et al. |
| 11,294,475 | B1 | 4/2022 | Pinchon et al. |
| 11,307,653 | B1 | 4/2022 | Qian et al. |
| 11,340,756 | B2 | 5/2022 | Faulkner et al. |
| 11,343,420 | B1 | 5/2022 | Herz et al. |
| 11,347,319 | B2 | 5/2022 | Goel et al. |
| 11,348,300 | B2 | 5/2022 | Zimmermann et al. |
| 11,379,033 | B2 | 7/2022 | O'hern et al. |
| 11,380,323 | B2 | 7/2022 | Shin et al. |
| 11,382,611 | B1 | 7/2022 | Westling et al. |
| 11,406,896 | B1 | 8/2022 | Cheung et al. |
| 11,409,363 | B2 | 8/2022 | Chen et al. |
| 11,416,080 | B2 | 8/2022 | Heo et al. |
| 11,432,095 | B1 | 8/2022 | Satongar et al. |
| 11,461,973 | B2 | 10/2022 | Pinchon |
| 11,496,571 | B2 | 11/2022 | Berliner et al. |
| 11,500,510 | B2 | 11/2022 | Tokuchi et al. |
| 11,531,402 | B1 | 12/2022 | Stolzenberg |
| 11,531,459 | B2 | 12/2022 | Poupyrev et al. |
| 11,557,102 | B2 | 1/2023 | Palangie et al. |
| 11,567,625 | B2 | 1/2023 | Faulkner et al. |
| 11,573,363 | B2 | 2/2023 | Zou et al. |
| 11,574,452 | B2 | 2/2023 | Berliner et al. |
| 11,599,239 | B2 | 3/2023 | Rockel et al. |
| 11,604,080 | B2 | 3/2023 | Paoletti et al. |
| 11,615,596 | B2 | 3/2023 | Faulkner et al. |
| 11,641,460 | B1 | 5/2023 | Geusz et al. |
| 11,669,155 | B2 | 6/2023 | Bowman et al. |
| 11,689,632 | B2 | 6/2023 | Raisher et al. |
| 11,720,171 | B2 | 8/2023 | Pastrana Vicente et al. |
| 11,726,577 | B2 | 8/2023 | Katz |
| 11,730,226 | B2 | 8/2023 | Stolarz et al. |
| 11,733,824 | B2 | 8/2023 | Iskandar et al. |
| 11,743,215 | B1 | 8/2023 | Murillo et al. |
| 11,762,457 | B1 | 9/2023 | Ikkai et al. |
| 11,762,473 | B2 | 9/2023 | Cipoletta et al. |
| 11,768,544 | B2 | 9/2023 | Schwarz et al. |
| 11,842,454 | B1 | 12/2023 | Lin et al. |
| 11,847,748 | B2 | 12/2023 | Liu et al. |
| 11,861,056 | B2 | 1/2024 | Burns et al. |
| 11,861,136 | B1 | 1/2024 | Faulkner et al. |
| 11,868,582 | B2 | 1/2024 | Kim et al. |
| 11,875,013 | B2 | 1/2024 | Lemay et al. |
| 11,875,162 | B2 | 1/2024 | Garstenauer et al. |
| 11,886,643 | B2 | 1/2024 | Irie et al. |
| 11,899,845 | B2 | 2/2024 | Chung et al. |
| 11,909,453 | B2 | 2/2024 | Javaudin et al. |
| 11,914,759 | B2 | 2/2024 | Klein et al. |

(56) References Cited

U.S. PATENT DOCUMENTS

| | | |
|---|---|---|
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0164219 A1 | 6/2009 | Yeung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0150526 A1 | 6/2010 | Rose et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0151416 A1 | 6/2012 | Bell et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0218395 A1 | 8/2012 | Andersen et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |

(56) References Cited

U.S. PATENT DOCUMENTS

| | | |
|---|---|---|
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0024324 A1 | 1/2014 | Mumick |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0035832 A1 | 2/2015 | Sugden et al. |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0177937 A1 | 6/2015 | Poletto et al. |
| 2015/0187093 A1 | 7/2015 | Chu et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1* | 7/2015 | Ambrus ............... G06F 3/0482 |
| | | 345/156 |
| 2015/0220152 A1 | 8/2015 | Tait et al. |
| 2015/0221132 A1 | 8/2015 | Kruglick |
| 2015/0227285 A1 | 8/2015 | Lee et al. |
| 2015/0242095 A1 | 8/2015 | Sonnenberg |
| 2015/0253957 A1 | 9/2015 | Crocker et al. |
| 2015/0254905 A1 | 9/2015 | Ramsby et al. |
| 2015/0255067 A1 | 9/2015 | White et al. |
| 2015/0262428 A1 | 9/2015 | Tatzgern et al. |
| 2015/0287403 A1 | 10/2015 | Holzer Zaslansky et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1* | 8/2016 | Ha .................... G06Q 30/0277 |
| 2016/0225164 A1 | 8/2016 | Tomlin et al. |
| 2016/0227267 A1 | 8/2016 | Tsurutani et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |

(56)        References Cited

U.S. PATENT DOCUMENTS

| | | |
|---|---|---|
| 2017/0046872 A1 | 2/2017 | Geselowitz et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0147180 A1 | 5/2017 | Yoon et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0357390 A1 | 12/2017 | Alonso Ruiz et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095635 A1 | 4/2018 | Valdivia et al. |
| 2018/0095636 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0288206 A1 | 10/2018 | Stimpson et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0005055 A1 | 1/2019 | Andrew et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0130733 A1 | 5/2019 | Hodge |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0339770 A1 | 11/2019 | Kurlethimar et al. |

(56) References Cited

U.S. PATENT DOCUMENTS

| | | |
|---|---|---|
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312713 A1 | 10/2021 | Peri et al. |
| 2021/0312717 A1 | 10/2021 | Mao |
| 2021/0319617 A1 | 10/2021 | Ahn et al. |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0352172 A1 | 11/2021 | Kim et al. |
| 2021/0358294 A1 | 11/2021 | Parashar et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1* | 12/2021 | Schoen ................ G06F 3/0304 |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |

(56) References Cited

U.S. PATENT DOCUMENTS

| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0319134 A1 | 10/2022 | Rodrigues et al. |
| 2022/0326837 A1 | 10/2022 | Dessero et al. |
| 2022/0335697 A1 | 10/2022 | Harding et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0092282 A1 | 3/2023 | Boesel et al. |
| 2023/0092874 A1 | 3/2023 | Krivoruchko et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0206921 A1 | 6/2023 | Edelsburg et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0350539 A1 | 11/2023 | Owen et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |

(56)　　　　　References Cited

U.S. PATENT DOCUMENTS

| | | |
|---|---|---|
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0126362 A1 | 4/2024 | Burns et al. |
| 2024/0135612 A1 | 4/2024 | Hold-geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0310971 A1 | 9/2024 | Kawashima et al. |
| 2024/0329797 A1 | 10/2024 | Hylak et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106575149 A | 4/2017 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |

(56) References Cited

FOREIGN PATENT DOCUMENTS

| | | | |
|---|---|---|---|
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H06-4596 | A | 1/1994 |
| JP | H10-51711 | A | 2/1998 |
| JP | H10-78845 | A | 3/1998 |
| JP | H11289555 | A | 10/1999 |
| JP | 2000-163031 | A | 6/2000 |
| JP | 2002-342033 | A | 11/2002 |
| JP | 2004510239 | A | 4/2004 |
| JP | 2005-215144 | A | 8/2005 |
| JP | 2005-333524 | A | 12/2005 |
| JP | 2006004093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-196158 | A | 9/2013 |
| JP | 2013178639 | A | 9/2013 |
| JP | 2013-254358 | A | 12/2013 |
| JP | 2013-257716 | A | 12/2013 |
| JP | 2014-21565 | A | 2/2014 |
| JP | 2014-59840 | A | 4/2014 |
| JP | 2014-71663 | A | 4/2014 |
| JP | 2014-99184 | A | 5/2014 |
| JP | 2014-514652 | A | 6/2014 |
| JP | 2014514653 | A | 6/2014 |
| JP | 2015-56173 | A | 3/2015 |
| JP | 2015-515040 | A | 5/2015 |
| JP | 2015-118332 | A | 6/2015 |
| JP | 2015222565 | A | 12/2015 |
| JP | 2016-96513 | A | 5/2016 |
| JP | 2016-194744 | A | 11/2016 |
| JP | 2017-27206 | A | 2/2017 |
| JP | 2017-58528 | A | 3/2017 |
| JP | 2017126009 | A | 7/2017 |
| JP | 2017525002 | A | 8/2017 |
| JP | 2017531221 | A | 10/2017 |
| JP | 2018-5516 | A | 1/2018 |
| JP | 2018-5517 | A | 1/2018 |
| JP | 2018-41477 | A | 3/2018 |
| JP | 2018514005 | A | 5/2018 |
| JP | 2018088118 | A | 6/2018 |
| JP | 2018101019 | A | 6/2018 |
| JP | 2018-106499 | A | 7/2018 |
| JP | 2019-40333 | A | 3/2019 |
| JP | 2019515361 | A | 6/2019 |
| JP | 2019-169154 | A | 10/2019 |
| JP | 2019-175449 | A | 10/2019 |
| JP | 2019527881 | A | 10/2019 |
| JP | 2019532382 | A | 11/2019 |
| JP | 2019-536131 | A | 12/2019 |
| JP | 2020503595 | A | 1/2020 |
| JP | 2020086913 | A | 6/2020 |
| JP | 2022-53334 | A | 4/2022 |
| JP | 2022175629 | A | 11/2022 |
| JP | 2023052278 | A | 4/2023 |
| KR | 20110017236 | A | 2/2011 |
| KR | 20110128487 | A | 11/2011 |
| KR | 20140097654 | A | 8/2014 |
| KR | 10-2016-0012139 | A | 2/2016 |
| KR | 20170027240 | A | 3/2017 |
| KR | 20180102171 | A | 9/2018 |
| KR | 10-2019-0100957 | A | 8/2019 |
| KR | 20200010296 | A | 1/2020 |
| KR | 20200035103 | A | 4/2020 |
| KR | 20200110788 | A | 9/2020 |
| KR | 20200135496 | A | 12/2020 |
| KR | 20210083016 | A | 7/2021 |
| KR | 20210123530 | A | 10/2021 |
| WO | 2010/026519 | A1 | 3/2010 |
| WO | 2011/008638 | A1 | 1/2011 |
| WO | 2012/145180 | A1 | 10/2012 |
| WO | 2013/169849 | A2 | 11/2013 |
| WO | 2013184447 | A2 | 12/2013 |
| WO | 2014/105276 | A1 | 7/2014 |
| WO | 2014190106 | A1 | 11/2014 |
| WO | 2014/203301 | A1 | 12/2014 |
| WO | 2015/195216 | A1 | 12/2015 |
| WO | 2016014877 | A1 | 1/2016 |
| WO | 2016118344 | A1 | 7/2016 |
| WO | 2016126522 | A1 | 8/2016 |
| WO | 2017024142 | A1 | 2/2017 |
| WO | 2017/088487 | A1 | 6/2017 |
| WO | 2018005557 | A1 | 1/2018 |
| WO | 2018/046957 | A2 | 3/2018 |
| WO | 2018090060 | A1 | 5/2018 |
| WO | 2018106299 | A1 | 6/2018 |
| WO | 2018116556 | A1 | 6/2018 |
| WO | 2018125428 | A1 | 7/2018 |
| WO | 2018/175735 | A1 | 9/2018 |
| WO | 2018213801 | A1 | 11/2018 |
| WO | 2019074771 | A1 | 4/2019 |
| WO | 2019/142560 | A1 | 7/2019 |
| WO | 2019152286 | A2 | 8/2019 |
| WO | 2019172678 | A1 | 9/2019 |
| WO | 2019/217163 | A1 | 11/2019 |
| WO | 2019213111 | A1 | 11/2019 |
| WO | 2020/066682 | A1 | 4/2020 |
| WO | 2020105349 | A1 | 5/2020 |
| WO | 2020121483 | A1 | 6/2020 |
| WO | 2020179027 | A1 | 9/2020 |
| WO | 2021061349 | A1 | 4/2021 |
| WO | 2021061351 | A1 | 4/2021 |
| WO | 2021133053 | A1 | 7/2021 |
| WO | 2021173839 | A1 | 9/2021 |
| WO | 2021/202783 | A1 | 10/2021 |
| WO | 2021203856 | A1 | 10/2021 |
| WO | 2022/046340 | A1 | 3/2022 |
| WO | 2022/055822 | A1 | 3/2022 |
| WO | 2022/066399 | A1 | 3/2022 |
| WO | 2022/066535 | A2 | 3/2022 |
| WO | 2022055821 | A1 | 3/2022 |
| WO | 2022067075 | A1 | 3/2022 |
| WO | 2022067343 | A2 | 3/2022 |
| WO | 2022072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022/164881 | A1 | 8/2022 |
| WO | 2022192040 | A1 | 9/2022 |
| WO | 2022204664 | A1 | 9/2022 |
| WO | 2022208797 | A1 | 10/2022 |
| WO | 2023043646 | A1 | 3/2023 |
| WO | 2023096940 | A2 | 6/2023 |
| WO | 2023/141535 | A1 | 7/2023 |
| WO | 2024064373 | A1 | 3/2024 |

OTHER PUBLICATIONS

Frank Beruscha et al., An Evaluation of the Influence of Haptic Feedback on Gaze Behavior during In-Car Interaction with Touch Screen, Jun. 1, 2017, IEEE World Haptics Conference, pp. 201-206 (Year: 2017).*

Extended European Search Report received for European Patent Application No. 24178730.8, mailed on Oct. 14, 2024, 8 pages.

Extended European Search Report received for European Patent Application No. 24178752.2, mailed on Oct. 4, 2024, 8 pages.

Extended European Search Report received for European Patent Application No. 24179233.2, mailed on Oct. 2, 2024, 10 pages.

Final Office Action received for U.S. Appl. No. 18/157,040, mailed on Dec. 2, 2024, 25 pages.

Final Office Action received for U.S. Appl. No. 18/473,196, mailed on Dec. 6, 2024, 22 pages.

(56)                References Cited

OTHER PUBLICATIONS

International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
Non-Final Office Action received for U.S. Appl. No. 18/322,469, mailed on Nov. 15, 2024, 34 pages.
Non-Final Office Action received for U.S. Appl. No. 18/473,196, mailed on Aug. 16, 2024, 21 pages.
Notice of Allowance received for U.S. Appl. No. 18/154,697, mailed on Dec. 3, 2024, 7 pages.
Notice of Allowance received for U.S. Appl. No. 18/336,770, mailed on Nov. 29, 2024, 9 pages.
Notice of Allowance received for U.S. Appl. No. 18/515,188, mailed on Nov. 27, 2024, 9 pages.
Corrected Notice of Allowability received for U.S. Appl. No. 17/932,999, mailed on Jan. 23, 2025, 9 pages.
Corrected Notice of Allowability received for U.S. Appl. No. 18/174,337, mailed on Jan. 15, 2025, 2 pages.
Extended European Search Report received for European Patent Application No. 24190323.6, mailed on Dec. 12, 2024, 9 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2024/039190, mailed on Nov. 22, 2024, 5 pages.
Non-Final Office Action received for U.S. Appl. No. 18/149,640, mailed on Jan. 15, 2025, 17 pages.
Non-Final Office Action received for U.S. Appl. No. 18/375,280, mailed on Nov. 27, 2024, 17 pages.
Non-Final Office Action received for U.S. Appl. No. 18/427,434, mailed on Nov. 21, 2024, 17 pages.
Notice of Allowance received for U.S. Appl. No. 18/154,757, mailed on Jan. 23, 2025, 12 pages.
Notice of Allowance received for U.S. Appl. No. 18/174,337, mailed on Jan. 2, 2025, 8 pages.
Notice of Allowance received for U.S. Appl. No. 18/671,936, mailed on Jan. 15, 2025, 9 pages.
Restriction Requirement received for U.S. Appl. No. 18/473,187, mailed on Dec. 30, 2024, 5 pages.
Supplemental Notice of Allowance received for U.S. Appl. No. 18/515,188, mailed on Dec. 12, 2024, 2 pages.
Corrected Notice of Allowability received for U.S. Appl. No. 17/932,999, mailed on Feb. 20, 2025, 2 pages.
European Search Report received for European Patent Application No. 22703771.0, mailed on Feb. 26, 2025, 4 pages.
Extended European Search Report received for European Patent Application No. 24217335.9, mailed on Feb. 24, 2025, 8 pages.
Final Office Action received for U.S. Appl. No. 17/580,495, mailed on Feb. 12, 2025, 29 pages.
Non-Final Office Action received for U.S. Appl. No. 18/298,994, mailed on Mar. 7, 2025, 26 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowance received for U.S. Appl. No. 18/671,936, mailed on Mar. 5, 2025, 7 pages.
Macmostvideo,"A Beginner's Guide to Selecting Items On Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.

Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowability received for U.S. Appl. No. 17/935,095, mailed on Oct. 18, 2024, 3 Pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.

(56) References Cited

OTHER PUBLICATIONS

International Search Report received for PCT Application No. PCT/US2023/074962, mailed on Jan. 19, 2024, 9 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.

Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/327,318, mailed on Sep. 16, 2024, 13 pages.
Non-Final Office Action received for U.S. Appl. No. 18/336,770, mailed on Jun. 5, 2024, 12 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.

(56) References Cited

OTHER PUBLICATIONS

Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Lin et al., "Towards Naturally Grabbing and Moving Objects in VR", IS&T International Symposium on Electronic Imaging and The Engineering Reality of Virtual Reality, 2016, 6 pages.
Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html> [Search Date Aug. 22, 2023], Sep. 20, 2021, 8 pages (1 page of English Abstract and 7 pages of Official Copy).
Search Report received for Chinese Patent Application No. 202210728190.3, mailed on Aug. 29, 2025, 5 pages (2 pages of English Translation and 3 pages of Official Copy Only).
Ghosh, et al., "NotifiVIR: Exploring Interruptions and Notifications in Virtual Reality", IEEE transactions on visualization and computer graphics, vol. 24, No. 4, Apr. 2018, pp. 1447-1456.
Medeiros, et al., "Promoting Reality Awareness in Virtual Reality through Proxemics", IEEE Virtual Reality and 3D User Interfaces (VR), Mar. 27-Apr. 1, 2021, 11 pages.
Pfeuffer, et al., "Gaze+touch vs. Touch: What's the Trade-off When Using Gaze to Extend Touch to Remote Displays?", Advances In Databases And Information Systems, Aug. 30, 2015, pp. 349-367.
Non-Final Office Action received for U.S. Appl. No. 18/473,198, mailed on Jul. 15, 2025, 13 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Final Office Action received for U.S. Appl. No. 18/473,196, mailed on Jul. 16, 2025, 20 pages.
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
Kitasenju Design, X [online], X Corp., Available Online at: <URL: https://twitter.com/kitasenjudesign/status/1282665402812608513>, [retrieved on Apr. 25, 2024], 2024, 1 page.

(56) References Cited

OTHER PUBLICATIONS

Light Manager, Available online at: https://manual.keyshot.com/manual/lighting/lighting-manager/, [retrieved on Jun. 9, 2023-], 3 pages.

MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.

Open Source Voxel Editor for Windows, Mac, Linux, iOS, and Android, Goxel [online]. Goxel by Guillaume Chereau, Available Online at: <URL: https://goxel.xyz/>, [retrieved on Apr. 25, 2024], 2024, 3 pages.

POP 2 3D Scanner (Infrared Light | Precision 0.05mm), Revpoint [online]. Revpoint 3D, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

Reality Scan, Unreal Engine [online], [retrieved on Jun. 14, 2024]. Retrieved from the Internet: <URL: https://www.unrealengine.com/en-US/realityscan>, 11 pages.

RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.

Sharevox, Phoria [online]. Phoria Pty Ltd, Available Online at: <URL: https://www.phoria.com.au/projects/sharevox/>, [retrieved on Apr. 25, 2024], 2024, 2 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.

VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.

Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.

Voxelize, Rossiev [online]. Denis Rossiev 2018-2024, Available Online at: <URL: https://www.rossiev.pro/voxelize/>, [retrieved on Apr. 25, 2024], 2024, 16 pages.

VR Design Best Practices, LeapMotion, Aug. 29, 2015, 31 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Apple,"Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Apple,"Use Message Effects with iMessage on Your iPhone, iPad, and iPod Touch", Apple Support, Available online at: https://support.apple.com/en-US/HT206894>, [retrieved on Feb. 22, 2024], 5 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Capturing Reality,"Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality,"RealityCapture tutorial: Complete model in PPI", Youtube, https://www.youtube.com/watch?v=tw6wNNEbH_M, Oct. 14, 2021, 2 pages.

Cas and Chary XR,"Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.

Choe et al., "Augmented-Reality-Based 3D Emotional Messenger for Dynamic User Communication with Smart Devices", Electronics, vol. 9, No. 1127, Jul. 10, 2020, 15 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.

Didehkhorshid et al., "Text Input in Virtual Reality Using a Tracked Drawing Tablet", HCII 2020, LNCS 12428, 2020, pp. 314-329.

Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Gamedbharat,"I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Headmaster Introduction,"If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.

Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.

Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Ubii: Physical World Interaction Through Augmented Reality", Publisher: IEEE, vol. 16, No. 3, DOI:10.1109/TMC.2016.2567378, May 13, 2016, pp. 872-885.

Locher et al., "Mobile Phone and Cloud—a Dream Team for 3D Reconstruction", 2016 IEEE Winter Conference on Applications of Computer Vision (WACV), 2016, pp. 1-8.

Lor Cas,"Reality Capture: Exporting Mesh", Youtube, https://www.youtube.com/watch?v=PdvTRa2B_s0, Dec. 10, 2020, 2 pages.

(56)　　　　　References Cited

OTHER PUBLICATIONS

Mendes et al., "Mid-Air Interactions Above Stereoscopic Interactive Tables", IEEE Symposium on 3D User Interfaces (3DUI), Mar. 29-30, 2014, pp. 3-10.
Metalnwood,"Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Nunez Angulo et al., "Manual for the Design of Didactic Units in Augmented Reality Using the Cospaces EDU Application", 2020, 75 pages.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

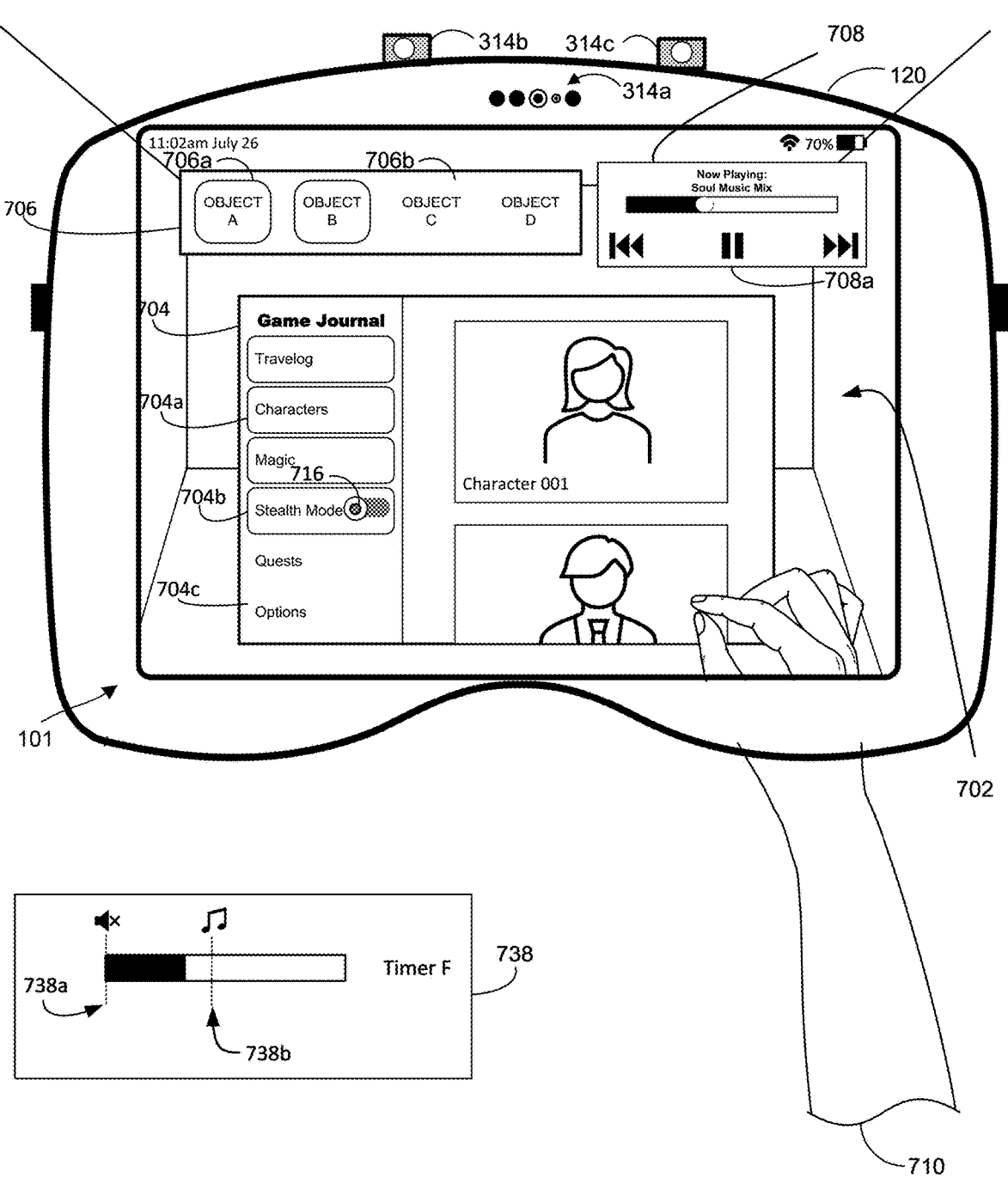
FIG. 7G1

<u>800</u>

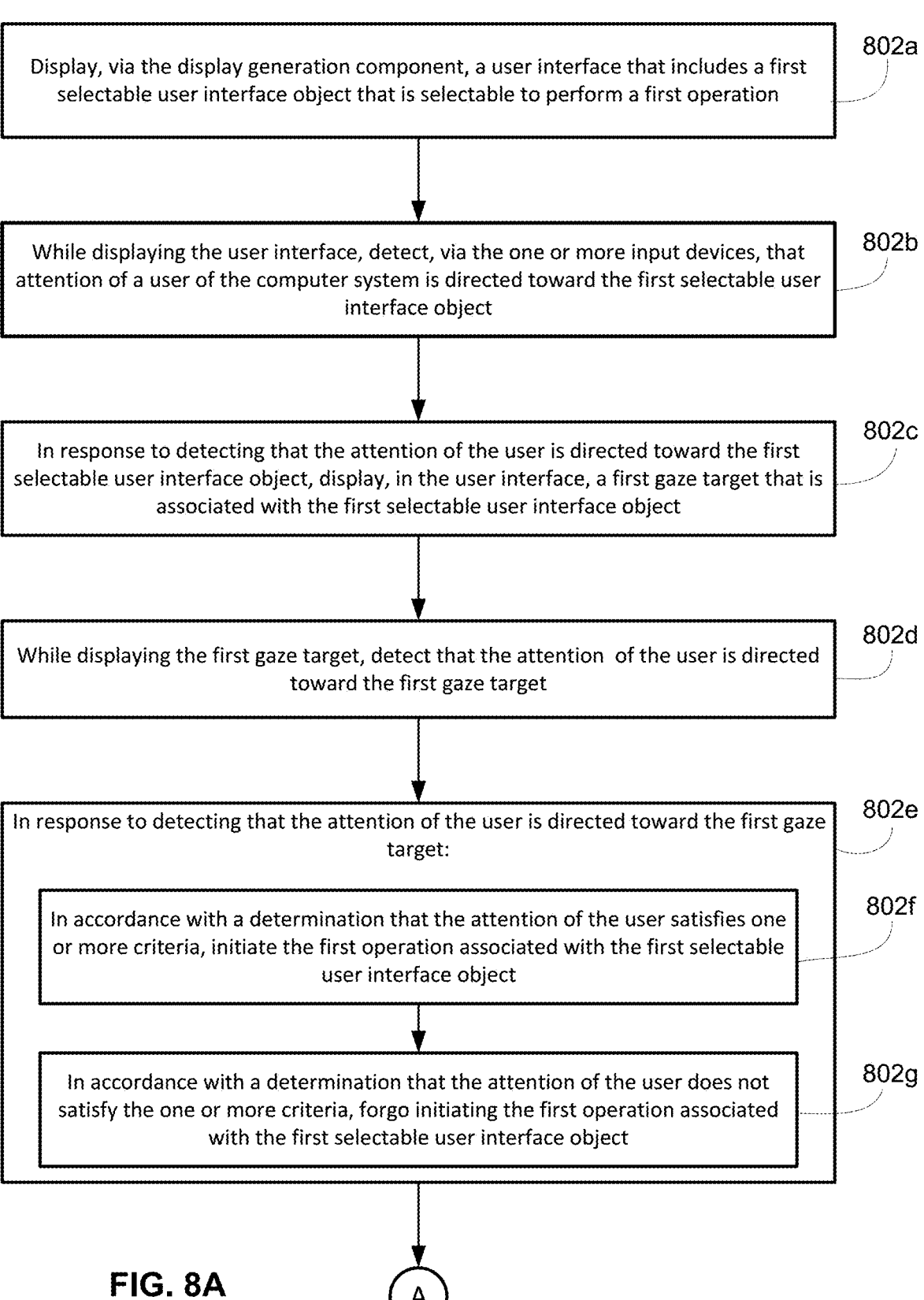

802a
Display, via the display generation component, a user interface that includes a first selectable user interface object that is selectable to perform a first operation 802b
While displaying the user interface, detect, via the one or more input devices, that attention of a user of the computer system is directed toward the first selectable user interface object 802c
In response to detecting that the attention of the user is directed toward the first selectable user interface object, display, in the user interface, a first gaze target that is associated with the first selectable user interface object 802d
While displaying the first gaze target, detect that the attention of the user is directed toward the first gaze target 802e
In response to detecting that the attention of the user is directed toward the first gaze target:

802f
In accordance with a determination that the attention of the user satisfies one or more criteria, initiate the first operation associated with the first selectable user interface object 802g
In accordance with a determination that the attention of the user does not satisfy the one or more criteria, forgo initiating the first operation associated with the first selectable user interface object

FIG. 8A    (A)

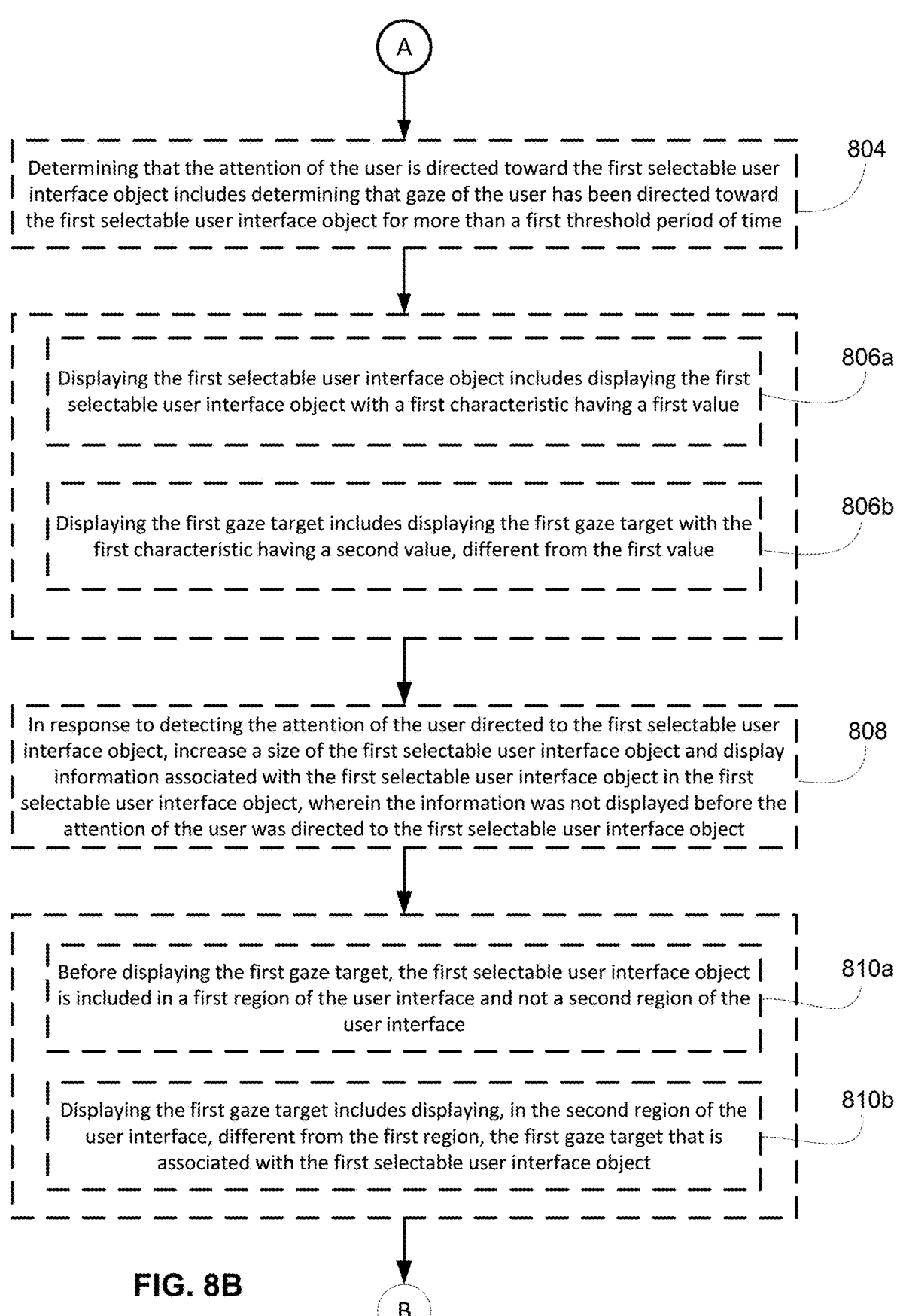

(A)

Determining that the attention of the user is directed toward the first selectable user interface object includes determining that gaze of the user has been directed toward the first selectable user interface object for more than a first threshold period of time ⟶ 804

Displaying the first selectable user interface object includes displaying the first selectable user interface object with a first characteristic having a first value ⟶ 806a Displaying the first gaze target includes displaying the first gaze target with the first characteristic having a second value, different from the first value ⟶ 806b In response to detecting the attention of the user directed to the first selectable user interface object, increase a size of the first selectable user interface object and display information associated with the first selectable user interface object in the first selectable user interface object, wherein the information was not displayed before the attention of the user was directed to the first selectable user interface object ⟶ 808

Before displaying the first gaze target, the first selectable user interface object is included in a first region of the user interface and not a second region of the user interface ⟶ 810a Displaying the first gaze target includes displaying, in the second region of the user interface, different from the first region, the first gaze target that is associated with the first selectable user interface object ⟶ 810b

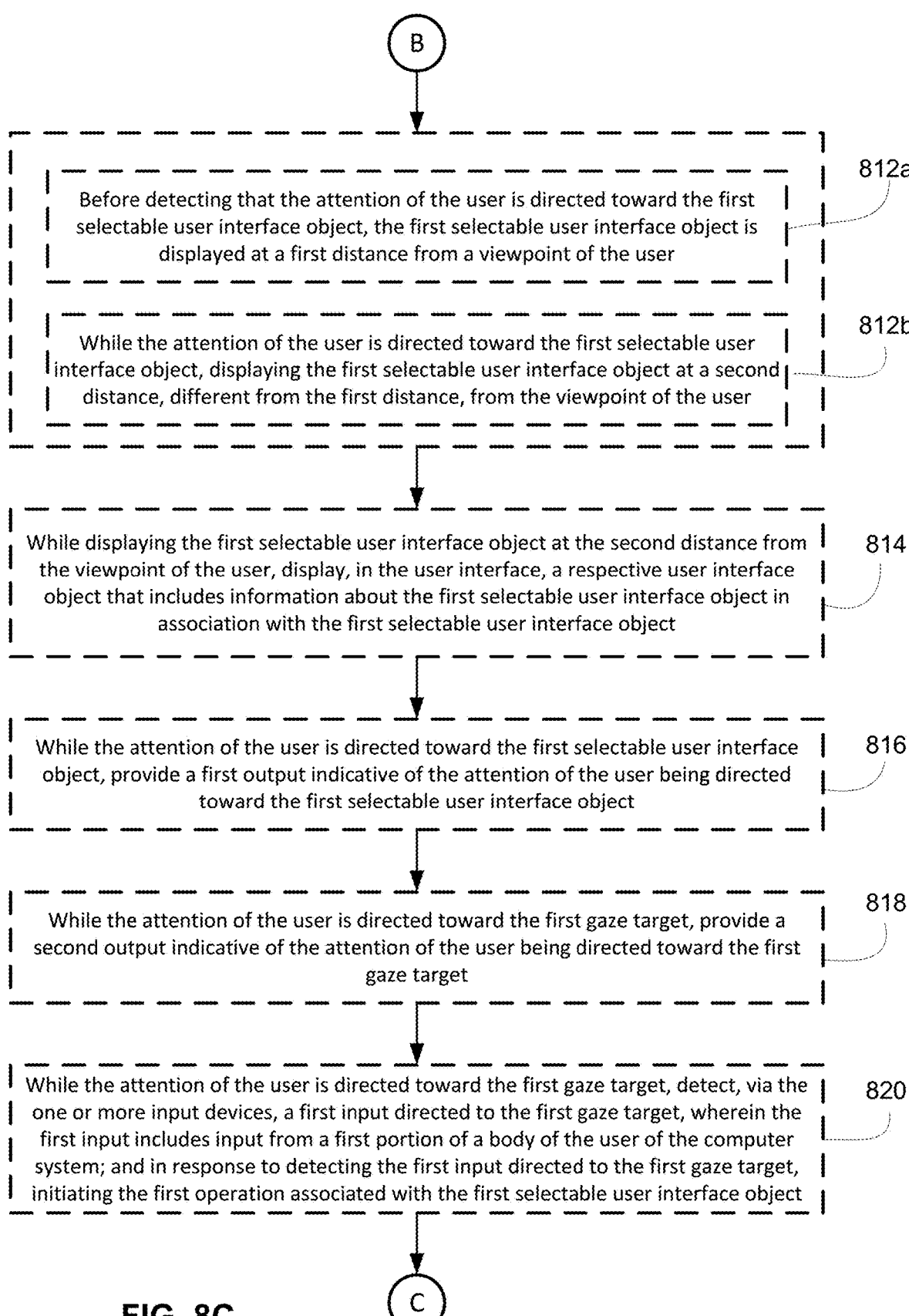

B

Before detecting that the attention of the user is directed toward the first selectable user interface object, the first selectable user interface object is displayed at a first distance from a viewpoint of the user          812a While the attention of the user is directed toward the first selectable user interface object, displaying the first selectable user interface object at a second distance, different from the first distance, from the viewpoint of the user          812b While displaying the first selectable user interface object at the second distance from the viewpoint of the user, display, in the user interface, a respective user interface object that includes information about the first selectable user interface object in association with the first selectable user interface object          814

While the attention of the user is directed toward the first selectable user interface object, provide a first output indicative of the attention of the user being directed toward the first selectable user interface object          816

While the attention of the user is directed toward the first gaze target, provide a second output indicative of the attention of the user being directed toward the first gaze target          818

While the attention of the user is directed toward the first gaze target, detect, via the one or more input devices, a first input directed to the first gaze target, wherein the first input includes input from a first portion of a body of the user of the computer system; and in response to detecting the first input directed to the first gaze target, initiating the first operation associated with the first selectable user interface object          820

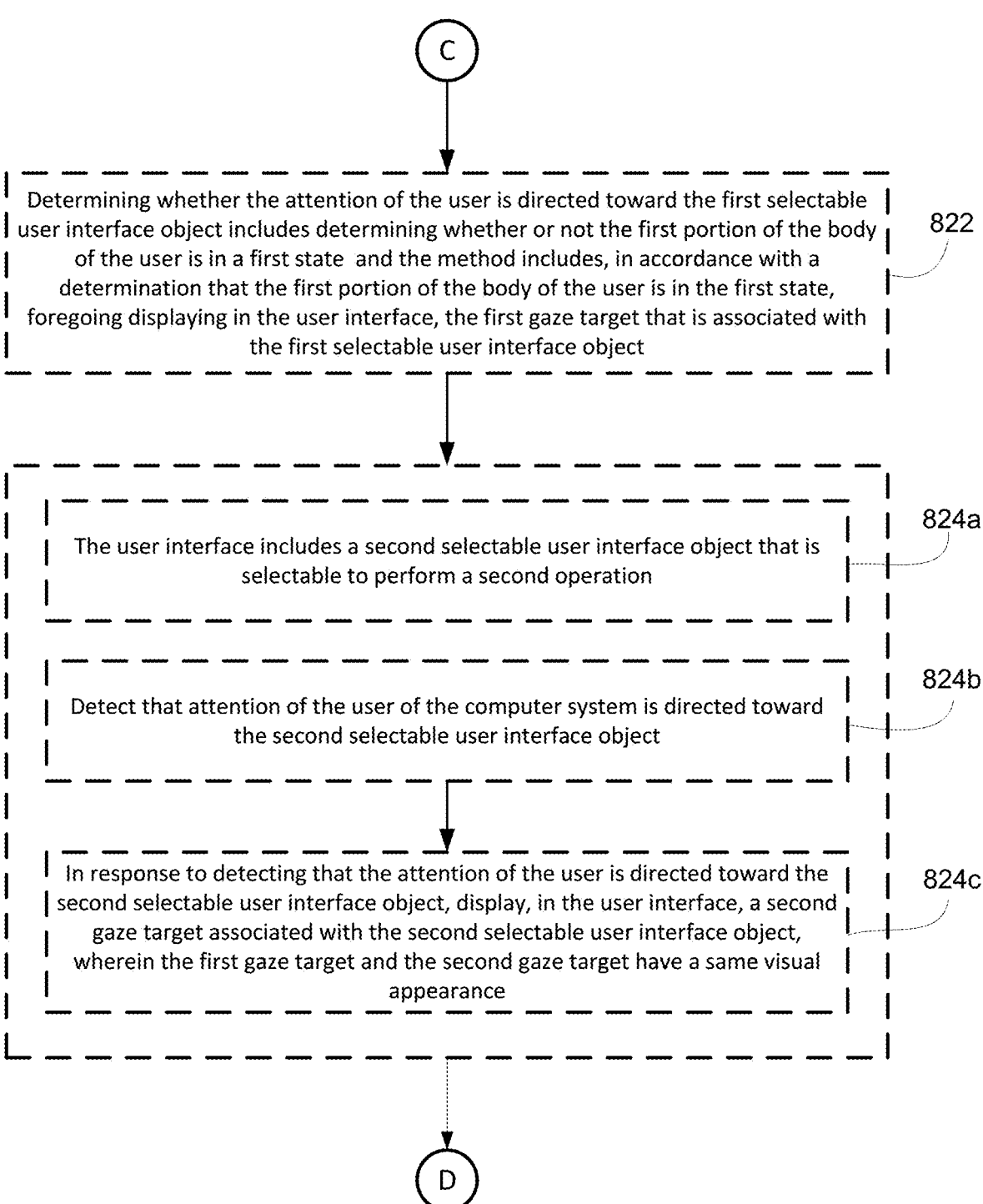

C

Determining whether the attention of the user is directed toward the first selectable user interface object includes determining whether or not the first portion of the body of the user is in a first state  and the method includes, in accordance with a determination that the first portion of the body of the user is in the first state, foregoing displaying in the user interface, the first gaze target that is associated with the first selectable user interface object          822

The user interface includes a second selectable user interface object that is selectable to perform a second operation          824a Detect that attention of the user of the computer system is directed toward the second selectable user interface object          824b In response to detecting that the attention of the user is directed toward the second selectable user interface object, display, in the user interface, a second gaze target associated with the second selectable user interface object, wherein the first gaze target and the second gaze target have a same visual appearance          824c

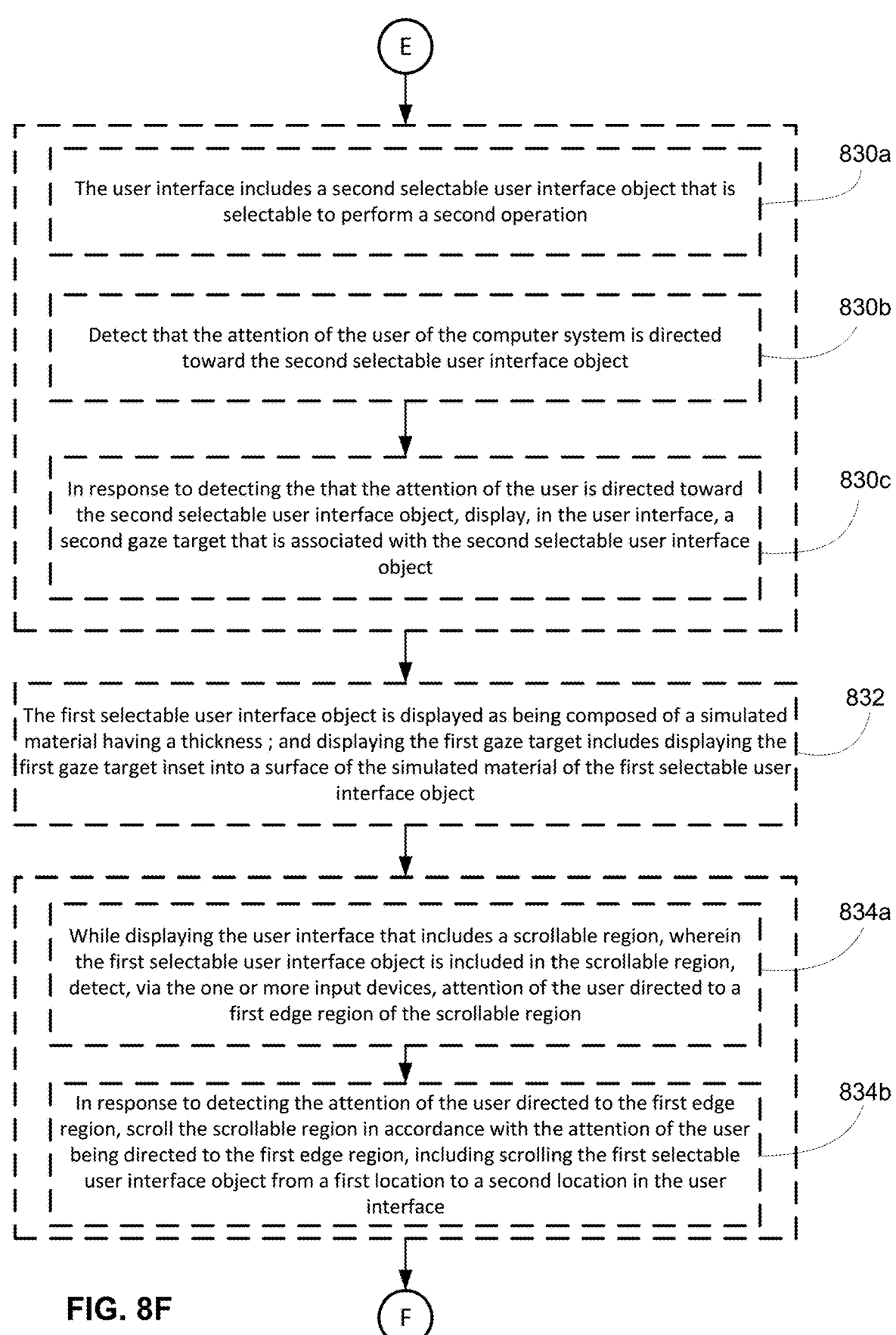

The user interface includes a second selectable user interface object that is selectable to perform a second operation — 830a Detect that the attention of the user of the computer system is directed toward the second selectable user interface object — 830b In response to detecting the that the attention of the user is directed toward the second selectable user interface object, display, in the user interface, a second gaze target that is associated with the second selectable user interface object — 830c The first selectable user interface object is displayed as being composed of a simulated material having a thickness ; and displaying the first gaze target includes displaying the first gaze target inset into a surface of the simulated material of the first selectable user interface object — 832

While displaying the user interface that includes a scrollable region, wherein the first selectable user interface object is included in the scrollable region, detect, via the one or more input devices, attention of the user directed to a first edge region of the scrollable region — 834a In response to detecting the attention of the user directed to the first edge region, scroll the scrollable region in accordance with the attention of the user being directed to the first edge region, including scrolling the first selectable user interface object from a first location to a second location in the user interface — 834b

FIG. 8F

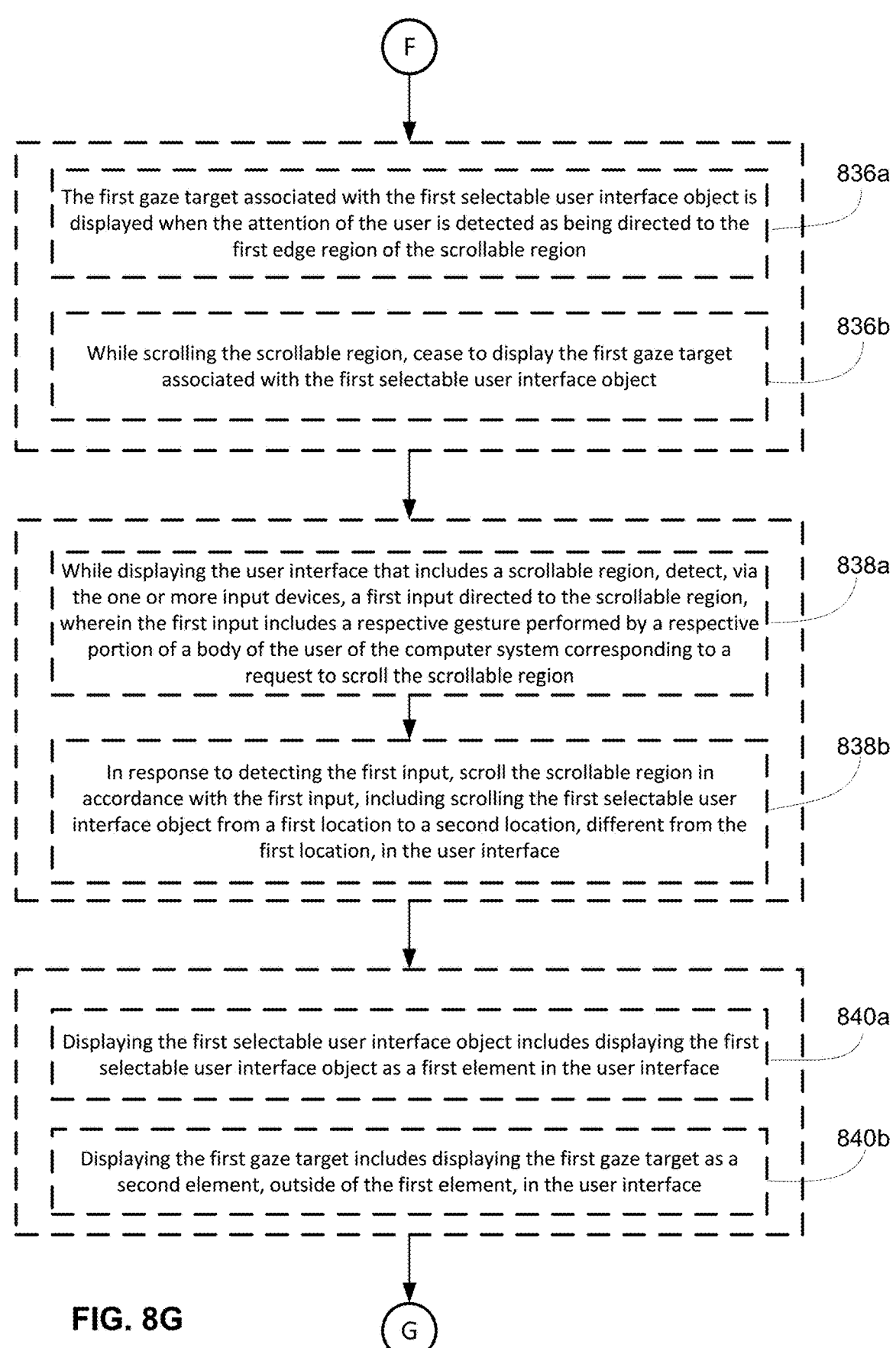

( F )

The first gaze target associated with the first selectable user interface object is displayed when the attention of the user is detected as being directed to the first edge region of the scrollable region    836a While scrolling the scrollable region, cease to display the first gaze target associated with the first selectable user interface object    836b While displaying the user interface that includes a scrollable region, detect, via the one or more input devices, a first input directed to the scrollable region, wherein the first input includes a respective gesture performed by a respective portion of a body of the user of the computer system corresponding to a request to scroll the scrollable region    838a In response to detecting the first input, scroll the scrollable region in accordance with the first input, including scrolling the first selectable user interface object from a first location to a second location, different from the first location, in the user interface    838b Displaying the first selectable user interface object includes displaying the first selectable user interface object as a first element in the user interface    840a Displaying the first gaze target includes displaying the first gaze target as a second element, outside of the first element, in the user interface    840b

FIG. 8G          ( G )

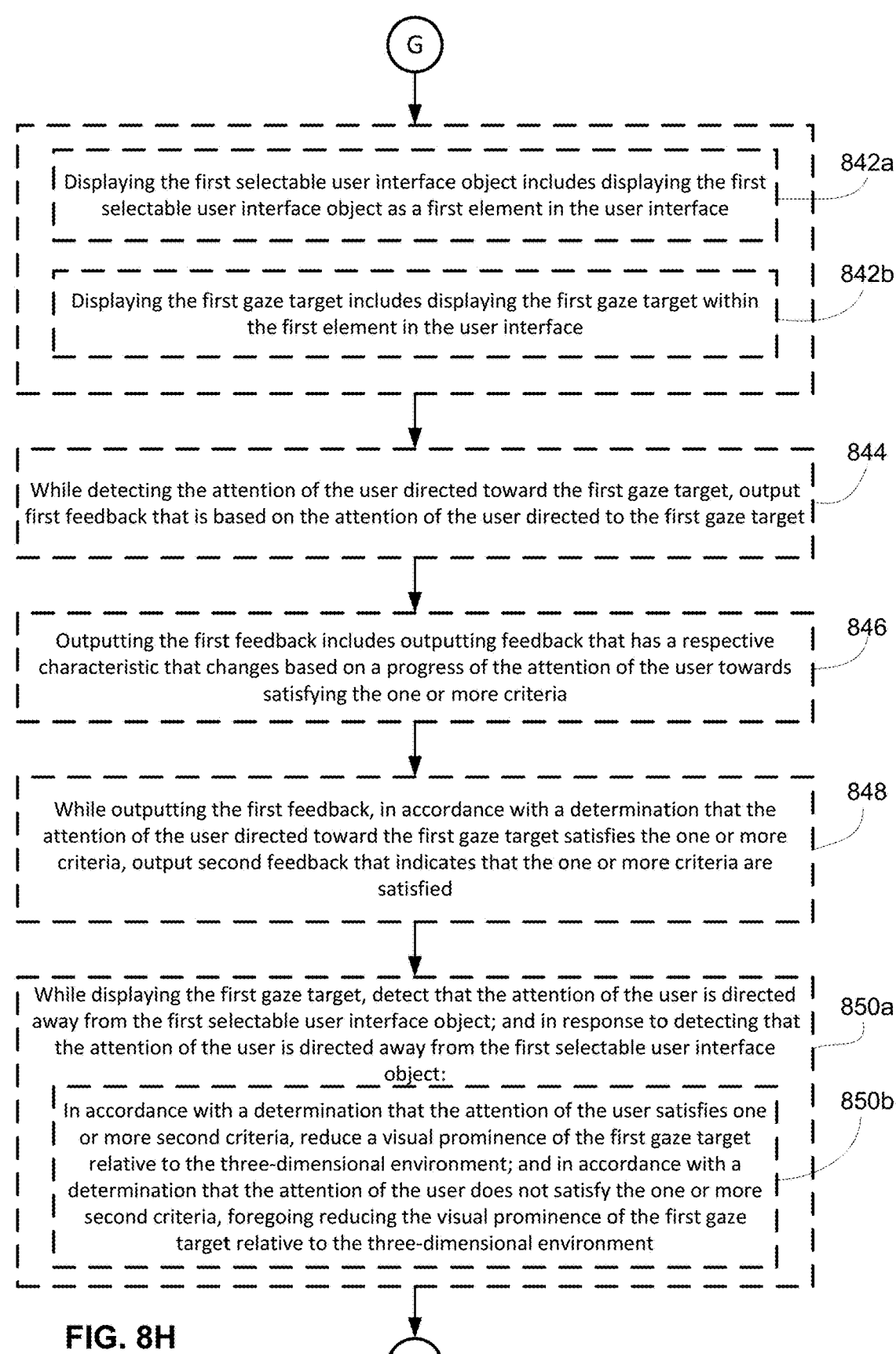

G

Displaying the first selectable user interface object includes displaying the first selectable user interface object as a first element in the user interface — 842a Displaying the first gaze target includes displaying the first gaze target within the first element in the user interface — 842b While detecting the attention of the user directed toward the first gaze target, output first feedback that is based on the attention of the user directed to the first gaze target — 844

Outputting the first feedback includes outputting feedback that has a respective characteristic that changes based on a progress of the attention of the user towards satisfying the one or more criteria — 846

While outputting the first feedback, in accordance with a determination that the attention of the user directed toward the first gaze target satisfies the one or more criteria, output second feedback that indicates that the one or more criteria are satisfied — 848

While displaying the first gaze target, detect that the attention of the user is directed away from the first selectable user interface object; and in response to detecting that the attention of the user is directed away from the first selectable user interface object: — 850a In accordance with a determination that the attention of the user satisfies one or more second criteria, reduce a visual prominence of the first gaze target relative to the three-dimensional environment; and in accordance with a determination that the attention of the user does not satisfy the one or more second criteria, foregoing reducing the visual prominence of the first gaze target relative to the three-dimensional environment — 850b

| 902a |
| Display, via the display generation component, a user interface that includes a first selectable user interface object that is selectable to perform a first operation |

| 902b |
| While displaying the user interface, detect, via the one or more input devices, that attention of a user of the computer system is directed toward the first selectable user interface object |

| 902c |
| While detecting that the attention of the user is directed toward the first selectable user interface object, display, in the user interface, a visual indication of progress towards the attention of the user satisfying one or more criteria for activating the first selectable user interface object to perform the first operation based on attention of the user |

| 904 |
| While detecting the attention of the user directed to the first selectable user interface object, display a visual indication of the attention of the user in an area corresponding to the first selectable user interface object, wherein the visual indication of the attention of the user was not displayed in the area corresponding to the first selectable user interface object before the attention of the user was directed toward the first selectable user interface object |

| 906 |
| The visual indication of the attention of the user includes a virtual lighting effect applied to at least one portion of the first selectable user interface object |

| 908 |
| Displaying the visual indication of the attention of the user in the area corresponding to the first selectable user interface object includes displaying the visual indication of the attention of the user with a first visual intensity at a first position in the visual indication of the attention of the user, and displaying the visual indication of the attention of the user with a second visual intensity, different from the first visual intensity, at a second position in the visual indication of the attention of the user, wherein the first position and the second position are different distances from a center of the visual indication of the attention of the user |

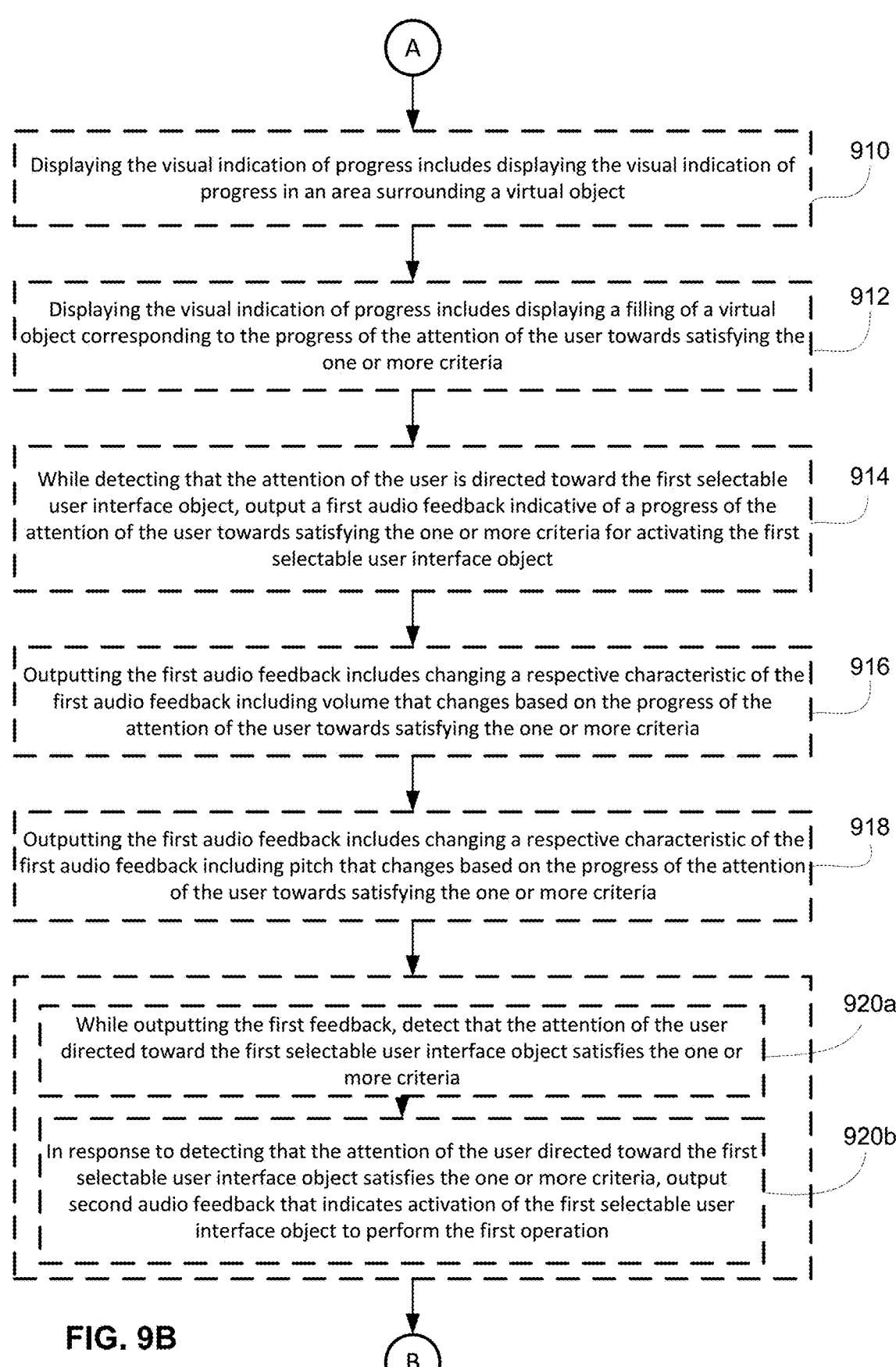

A

Displaying the visual indication of progress includes displaying the visual indication of progress in an area surrounding a virtual object — 910

Displaying the visual indication of progress includes displaying a filling of a virtual object corresponding to the progress of the attention of the user towards satisfying the one or more criteria — 912

While detecting that the attention of the user is directed toward the first selectable user interface object, output a first audio feedback indicative of a progress of the attention of the user towards satisfying the one or more criteria for activating the first selectable user interface object — 914

Outputting the first audio feedback includes changing a respective characteristic of the first audio feedback including volume that changes based on the progress of the attention of the user towards satisfying the one or more criteria — 916

Outputting the first audio feedback includes changing a respective characteristic of the first audio feedback including pitch that changes based on the progress of the attention of the user towards satisfying the one or more criteria — 918

While outputting the first feedback, detect that the attention of the user directed toward the first selectable user interface object satisfies the one or more criteria — 920a In response to detecting that the attention of the user directed toward the first selectable user interface object satisfies the one or more criteria, output second audio feedback that indicates activation of the first selectable user interface object to perform the first operation — 920b

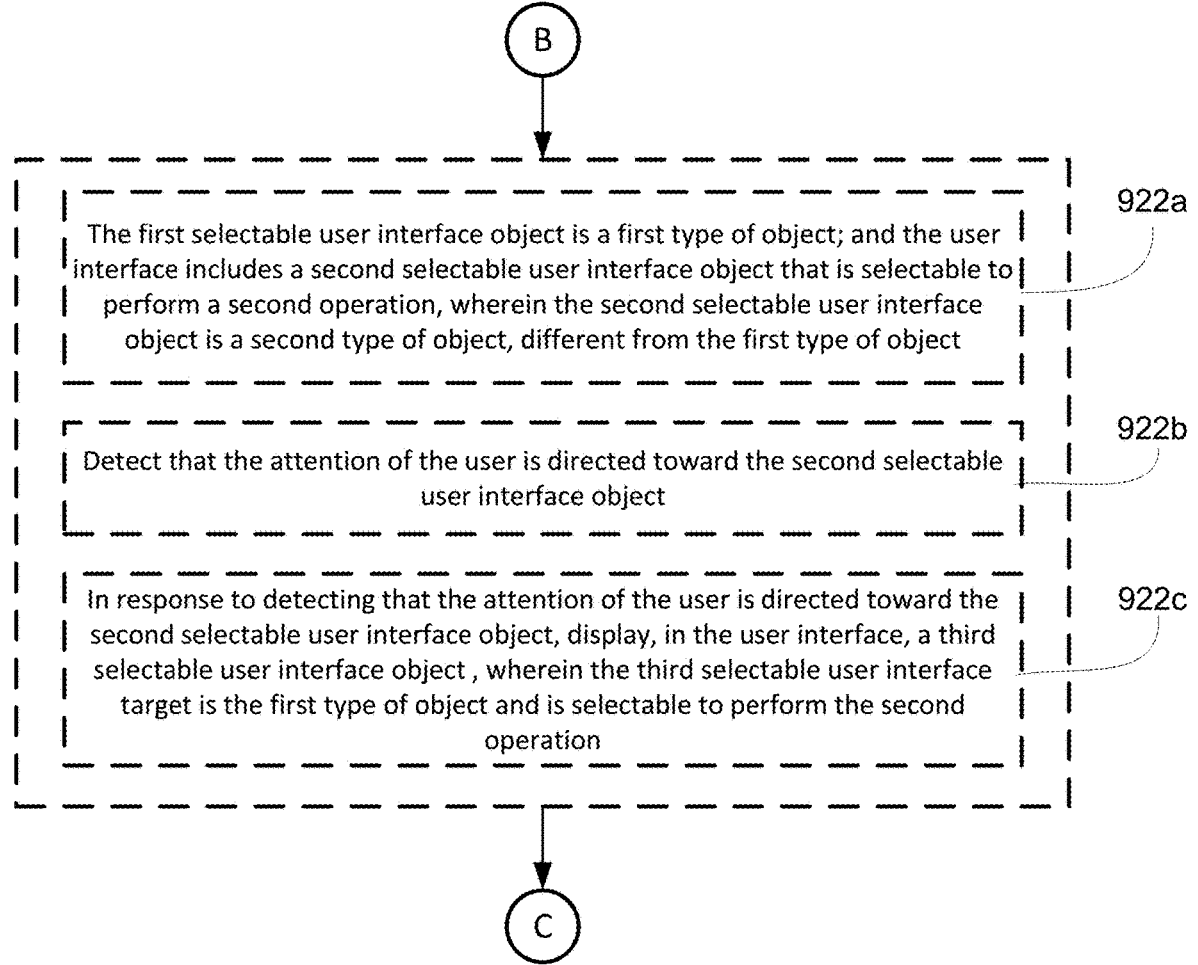

B

The first selectable user interface object is a first type of object; and the user interface includes a second selectable user interface object that is selectable to perform a second operation, wherein the second selectable user interface object is a second type of object, different from the first type of object 922a Detect that the attention of the user is directed toward the second selectable user interface object 922b In response to detecting that the attention of the user is directed toward the second selectable user interface object, display, in the user interface, a third selectable user interface object , wherein the third selectable user interface target is the first type of object and is selectable to perform the second operation 922c

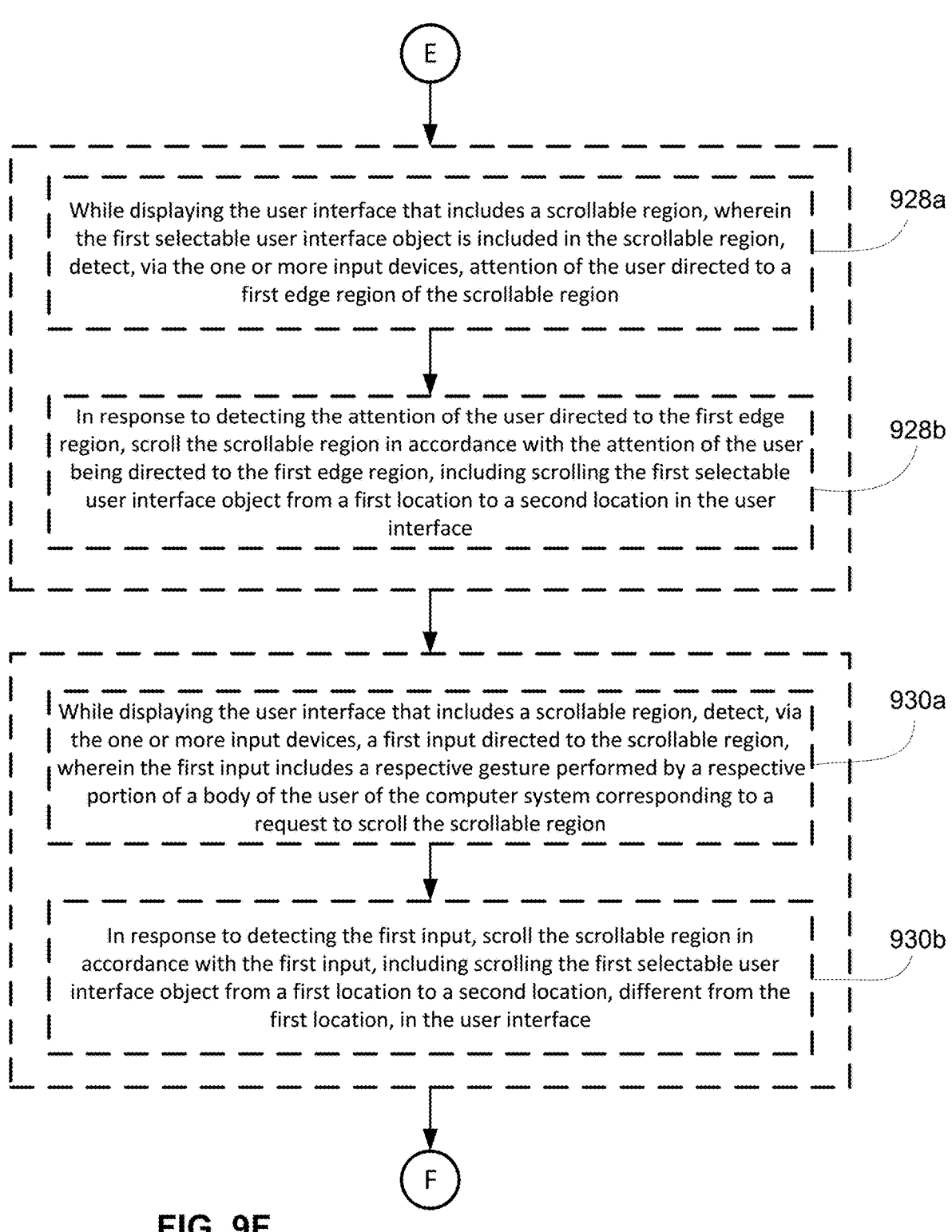

E

While displaying the user interface that includes a scrollable region, wherein the first selectable user interface object is included in the scrollable region, detect, via the one or more input devices, attention of the user directed to a first edge region of the scrollable region 928a In response to detecting the attention of the user directed to the first edge region, scroll the scrollable region in accordance with the attention of the user being directed to the first edge region, including scrolling the first selectable user interface object from a first location to a second location in the user interface 928b While displaying the user interface that includes a scrollable region, detect, via the one or more input devices, a first input directed to the scrollable region, wherein the first input includes a respective gesture performed by a respective portion of a body of the user of the computer system corresponding to a request to scroll the scrollable region 930a In response to detecting the first input, scroll the scrollable region in accordance with the first input, including scrolling the first selectable user interface object from a first location to a second location, different from the first location, in the user interface 930b

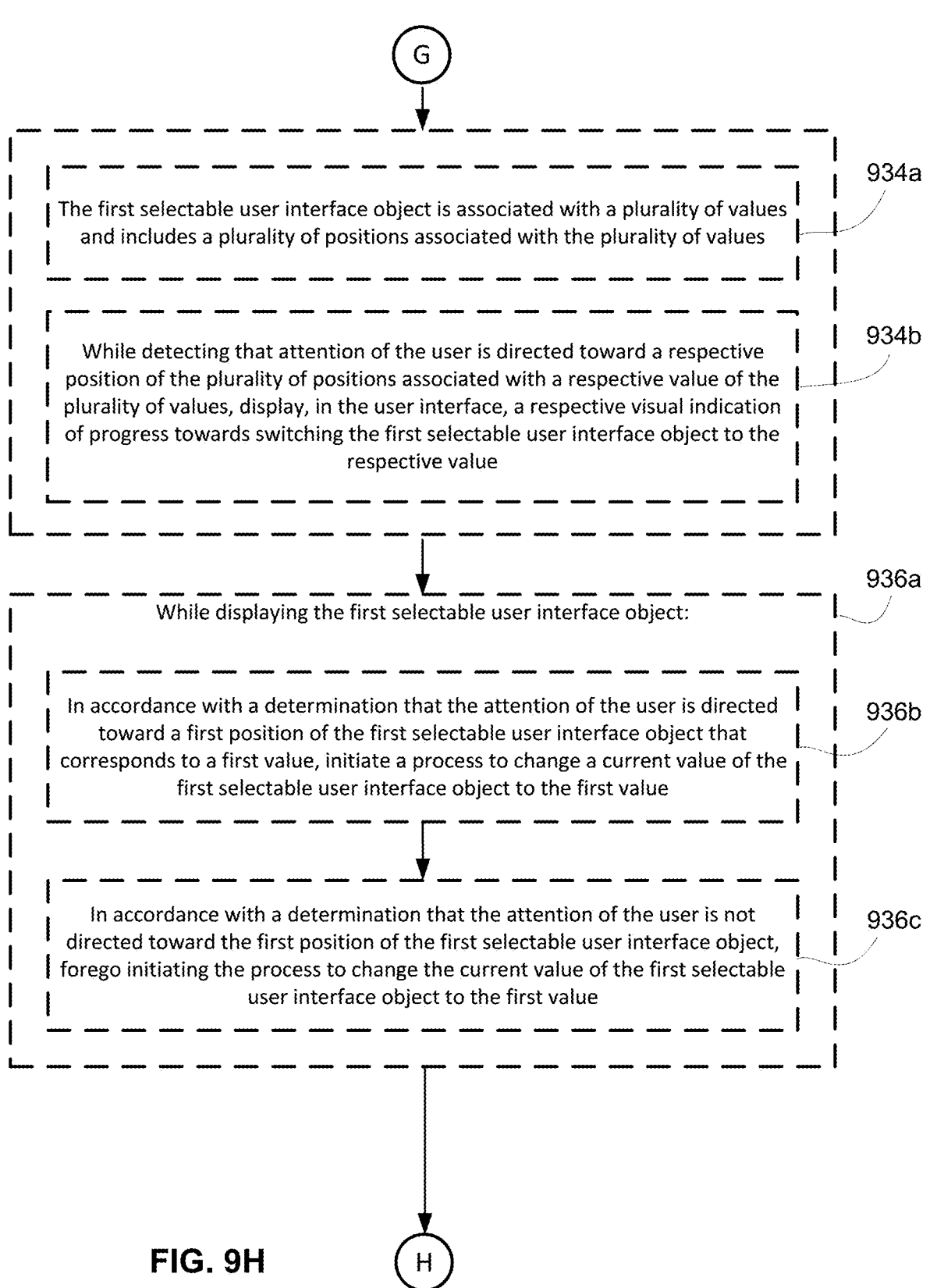

G

The first selectable user interface object is associated with a plurality of values and includes a plurality of positions associated with the plurality of values    934a While detecting that attention of the user is directed toward a respective position of the plurality of positions associated with a respective value of the plurality of values, display, in the user interface, a respective visual indication of progress towards switching the first selectable user interface object to the respective value    934b While displaying the first selectable user interface object:    936a In accordance with a determination that the attention of the user is directed toward a first position of the first selectable user interface object that corresponds to a first value, initiate a process to change a current value of the first selectable user interface object to the first value    936b In accordance with a determination that the attention of the user is not directed toward the first position of the first selectable user interface object, forego initiating the process to change the current value of the first selectable user interface object to the first value    936c

FIG. 9H    H

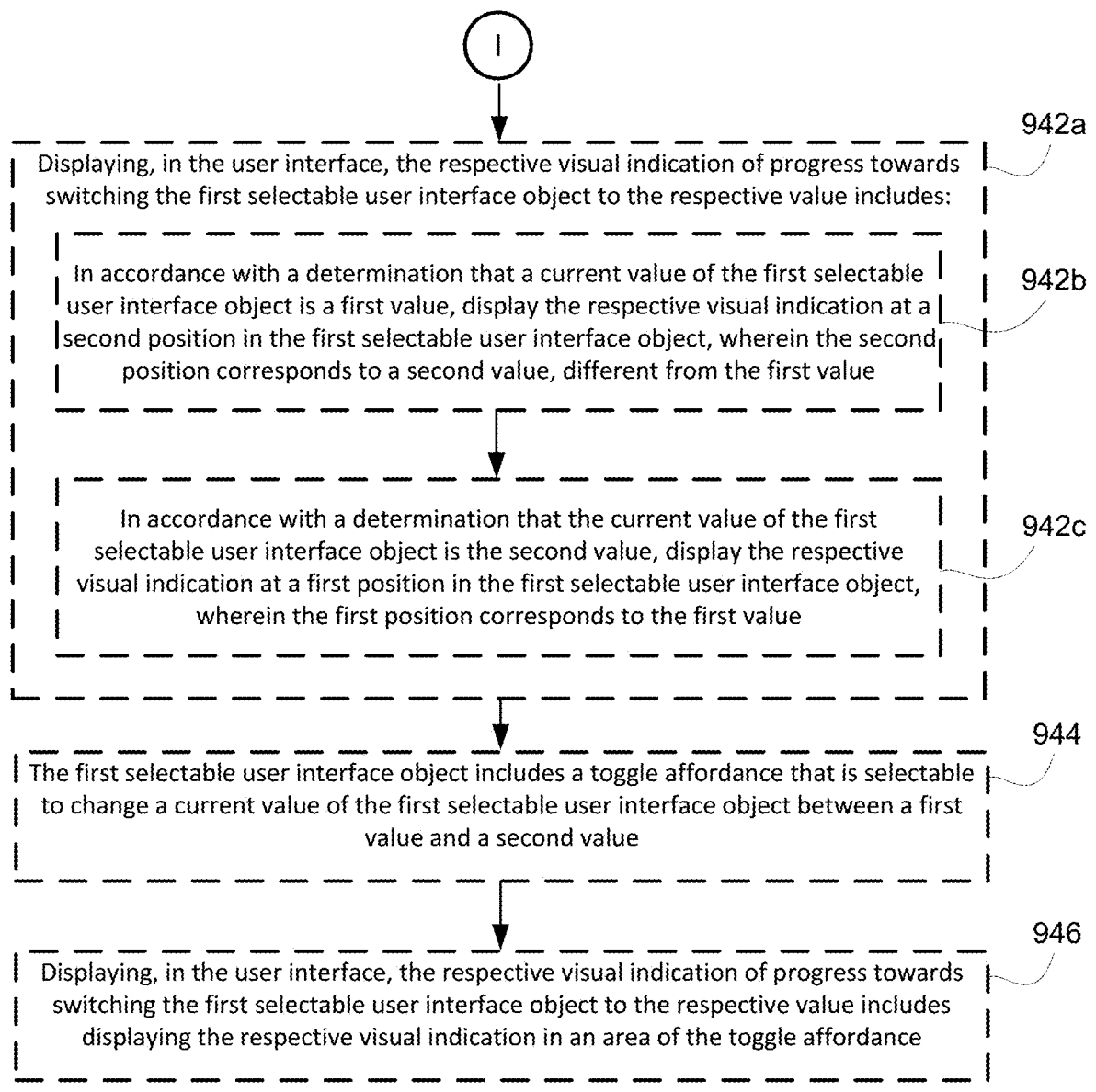

Displaying, in the user interface, the respective visual indication of progress towards switching the first selectable user interface object to the respective value includes:    942a In accordance with a determination that a current value of the first selectable user interface object is a first value, display the respective visual indication at a second position in the first selectable user interface object, wherein the second position corresponds to a second value, different from the first value    942b In accordance with a determination that the current value of the first selectable user interface object is the second value, display the respective visual indication at a first position in the first selectable user interface object, wherein the first position corresponds to the first value    942c The first selectable user interface object includes a toggle affordance that is selectable to change a current value of the first selectable user interface object between a first value and a second value    944

Displaying, in the user interface, the respective visual indication of progress towards switching the first selectable user interface object to the respective value includes displaying the respective visual indication in an area of the toggle affordance    946

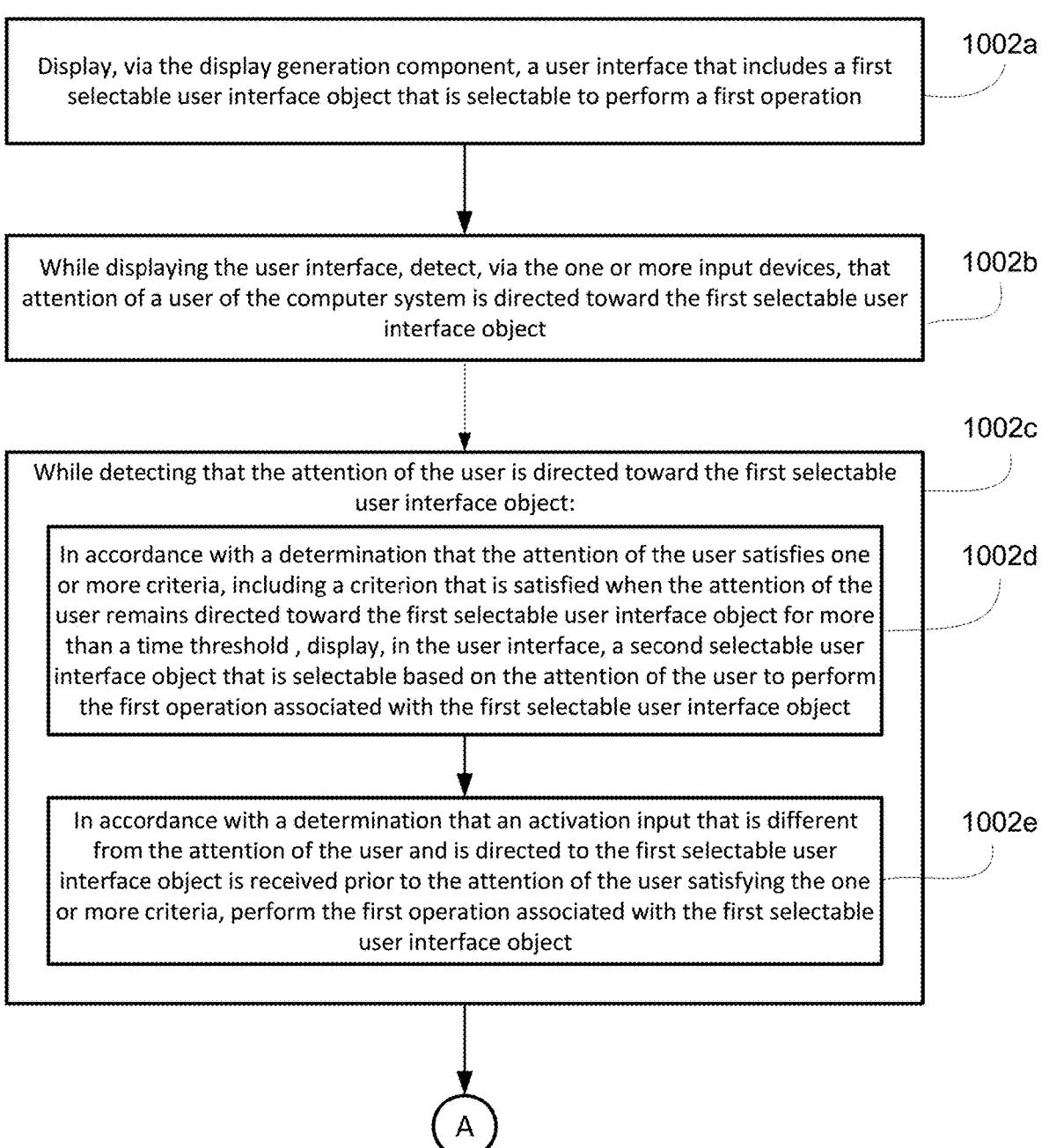

Display, via the display generation component, a user interface that includes a first selectable user interface object that is selectable to perform a first operation 1002a While displaying the user interface, detect, via the one or more input devices, that attention of a user of the computer system is directed toward the first selectable user interface object 1002b While detecting that the attention of the user is directed toward the first selectable user interface object:

1002c

In accordance with a determination that the attention of the user satisfies one or more criteria, including a criterion that is satisfied when the attention of the user remains directed toward the first selectable user interface object for more than a time threshold , display, in the user interface, a second selectable user interface object that is selectable based on the attention of the user to perform the first operation associated with the first selectable user interface object 1002d In accordance with a determination that an activation input that is different from the attention of the user and is directed to the first selectable user interface object is received prior to the attention of the user satisfying the one or more criteria, perform the first operation associated with the first selectable user interface object 1002e (A)

FIG. 10A

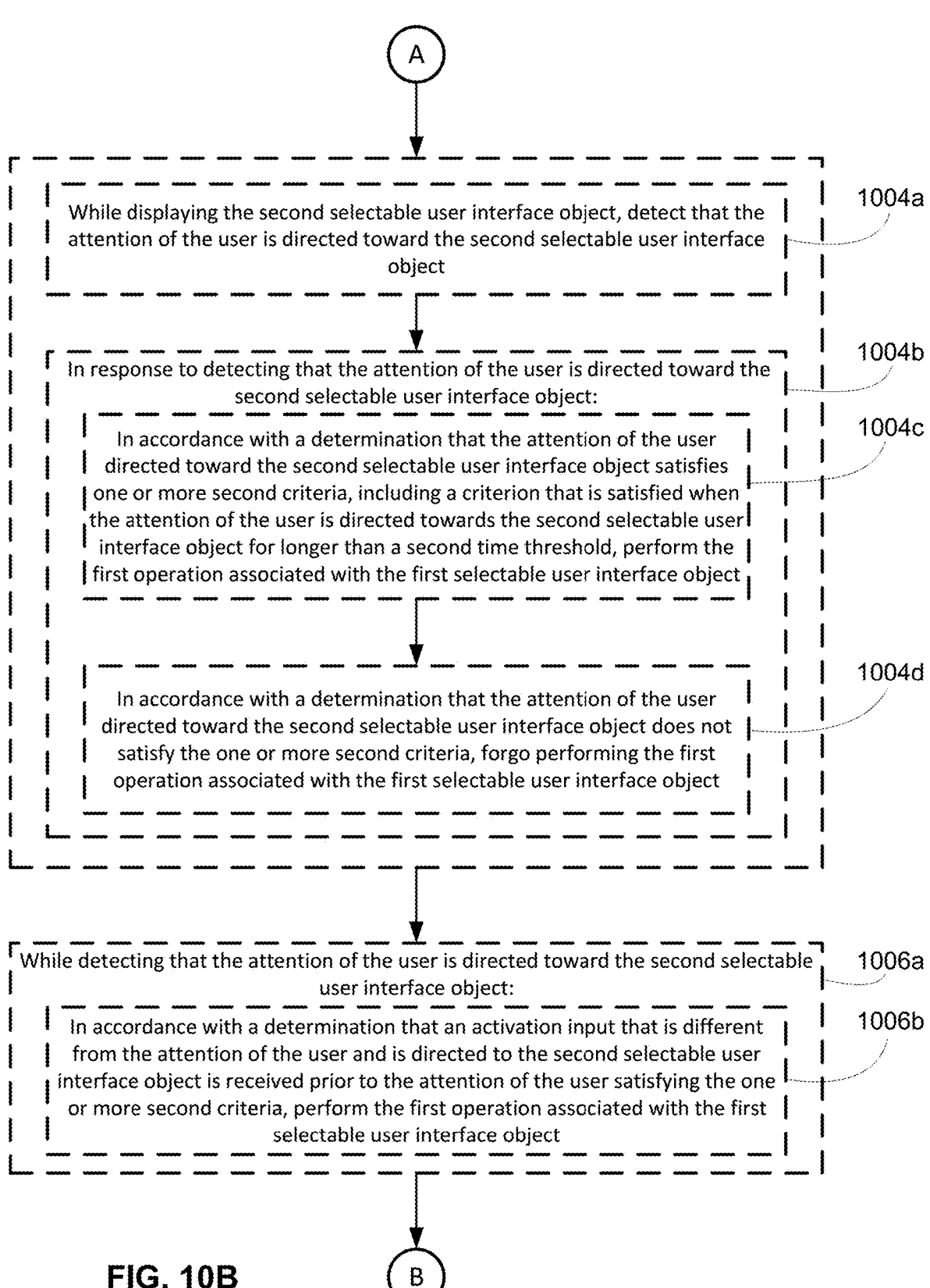

A

While displaying the second selectable user interface object, detect that the attention of the user is directed toward the second selectable user interface object                                                          1004a In response to detecting that the attention of the user is directed toward the second selectable user interface object:                                                          1004b In accordance with a determination that the attention of the user directed toward the second selectable user interface object satisfies one or more second criteria, including a criterion that is satisfied when the attention of the user is directed towards the second selectable user interface object for longer than a second time threshold, perform the first operation associated with the first selectable user interface object                                                          1004c In accordance with a determination that the attention of the user directed toward the second selectable user interface object does not satisfy the one or more second criteria, forgo performing the first operation associated with the first selectable user interface object                                                          1004d While detecting that the attention of the user is directed toward the second selectable user interface object:                                                          1006a In accordance with a determination that an activation input that is different from the attention of the user and is directed to the second selectable user interface object is received prior to the attention of the user satisfying the one or more second criteria, perform the first operation associated with the first selectable user interface object                                                          1006b

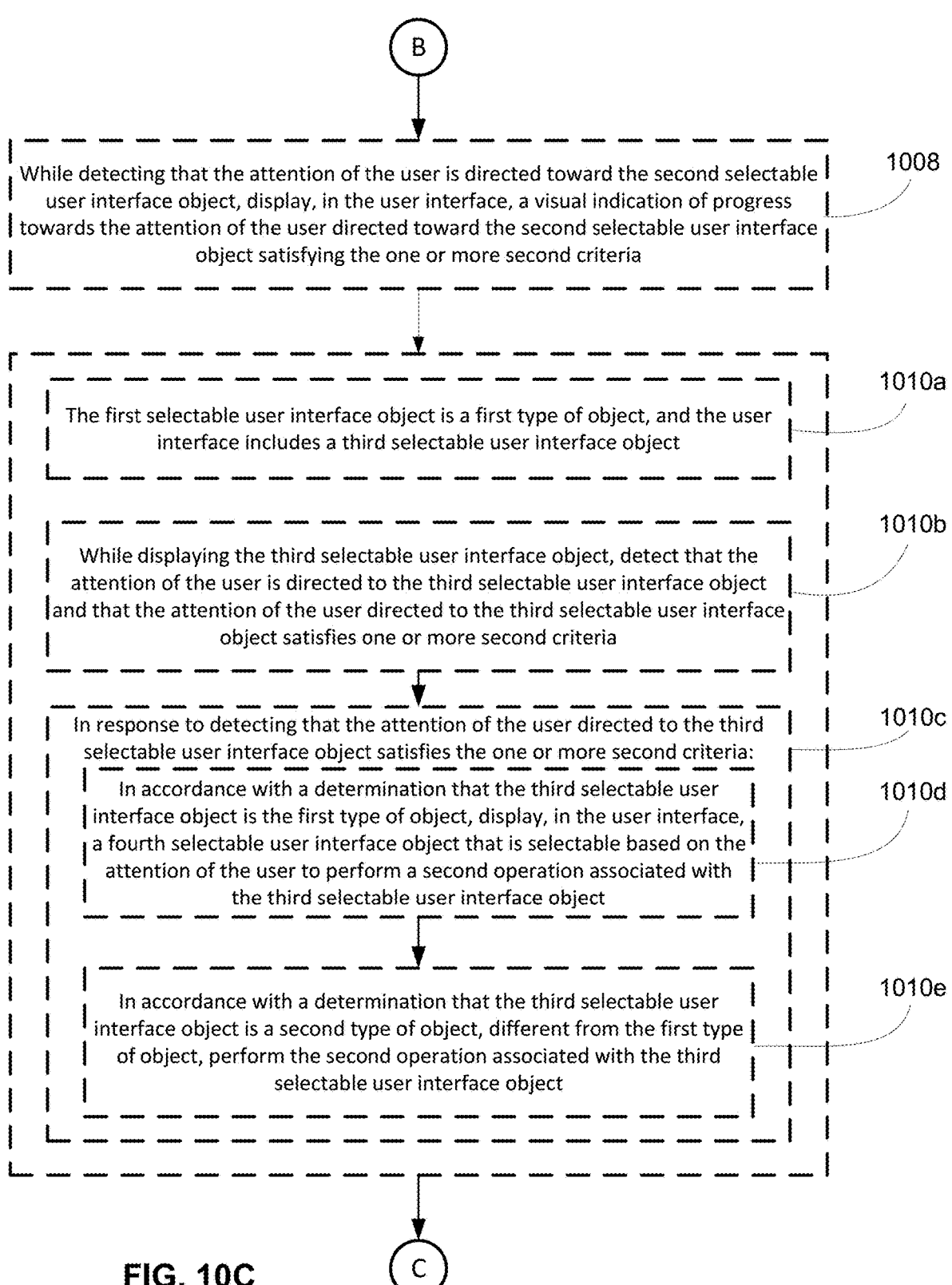

B

While detecting that the attention of the user is directed toward the second selectable user interface object, display, in the user interface, a visual indication of progress towards the attention of the user directed toward the second selectable user interface object satisfying the one or more second criteria    1008

The first selectable user interface object is a first type of object, and the user interface includes a third selectable user interface object    1010a While displaying the third selectable user interface object, detect that the attention of the user is directed to the third selectable user interface object and that the attention of the user directed to the third selectable user interface object satisfies one or more second criteria    1010b In response to detecting that the attention of the user directed to the third selectable user interface object satisfies the one or more second criteria:    1010c In accordance with a determination that the third selectable user interface object is the first type of object, display, in the user interface, a fourth selectable user interface object that is selectable based on the attention of the user to perform a second operation associated with the third selectable user interface object    1010d In accordance with a determination that the third selectable user interface object is a second type of object, different from the first type of object, perform the second operation associated with the third selectable user interface object    1010e

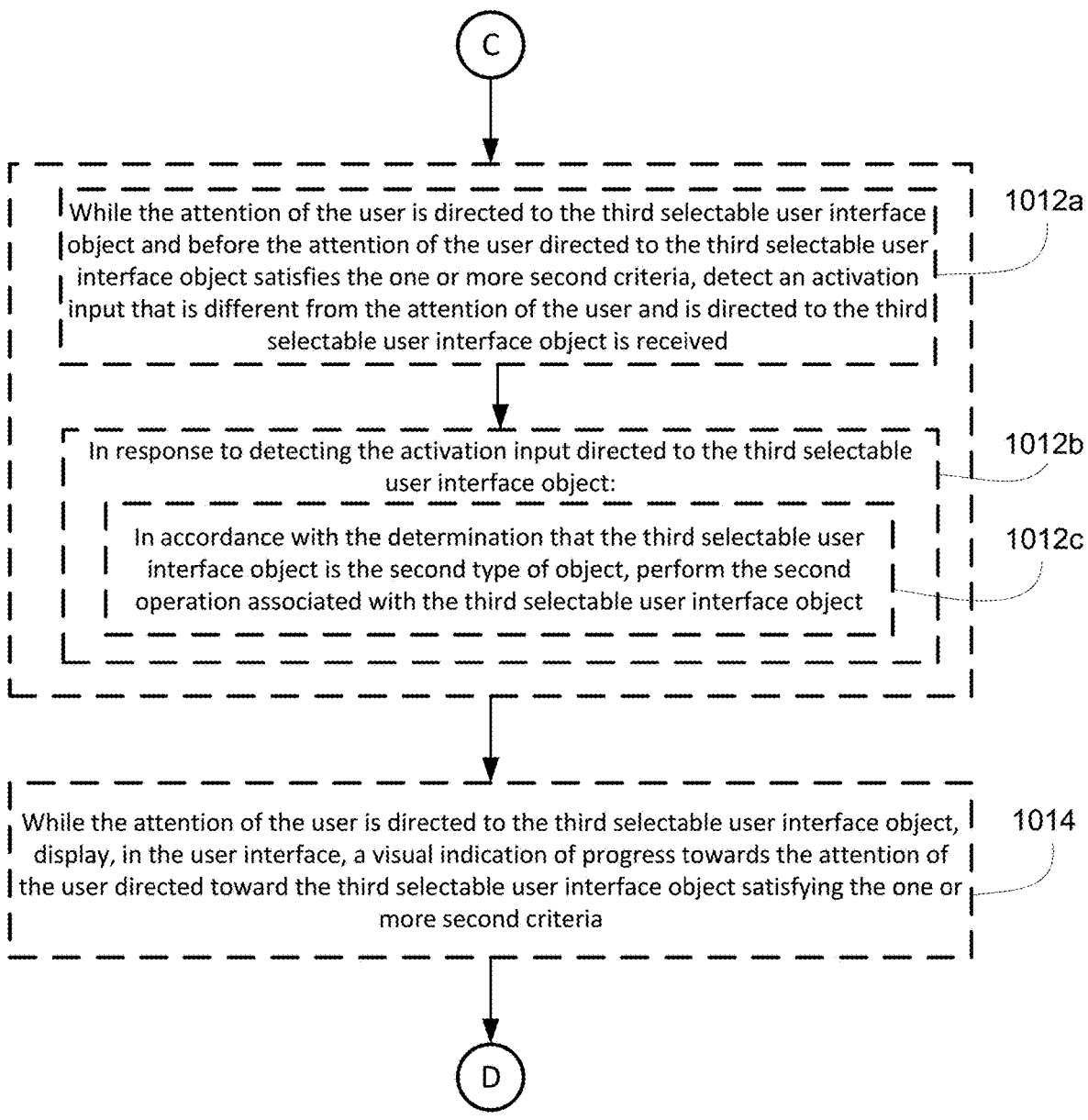

While the attention of the user is directed to the third selectable user interface object and before the attention of the user directed to the third selectable user interface object satisfies the one or more second criteria, detect an activation input that is different from the attention of the user and is directed to the third selectable user interface object is received — 1012a In response to detecting the activation input directed to the third selectable user interface object: — 1012b In accordance with the determination that the third selectable user interface object is the second type of object, perform the second operation associated with the third selectable user interface object — 1012c While the attention of the user is directed to the third selectable user interface object, display, in the user interface, a visual indication of progress towards the attention of the user directed toward the third selectable user interface object satisfying the one or more second criteria — 1014

FIG. 10D

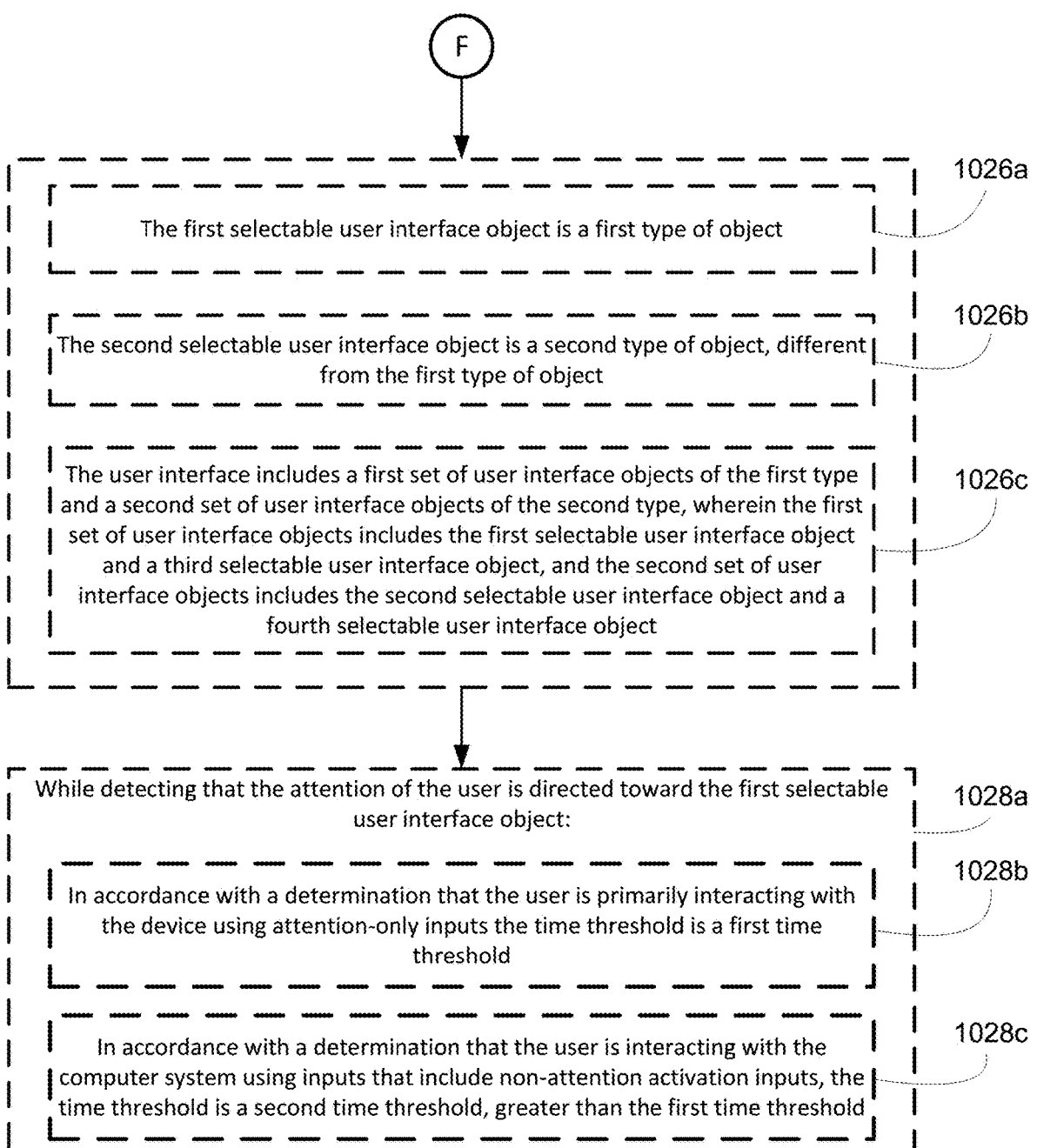

F

The first selectable user interface object is a first type of object    1026a

The second selectable user interface object is a second type of object, different from the first type of object    1026b The user interface includes a first set of user interface objects of the first type and a second set of user interface objects of the second type, wherein the first set of user interface objects includes the first selectable user interface object and a third selectable user interface object, and the second set of user interface objects includes the second selectable user interface object and a fourth selectable user interface object    1026c While detecting that the attention of the user is directed toward the first selectable user interface object:    1028a In accordance with a determination that the user is primarily interacting with the device using attention-only inputs the time threshold is a first time threshold    1028b In accordance with a determination that the user is interacting with the computer system using inputs that include non-attention activation inputs, the time threshold is a second time threshold, greater than the first time threshold    1028c

FIG. 10G

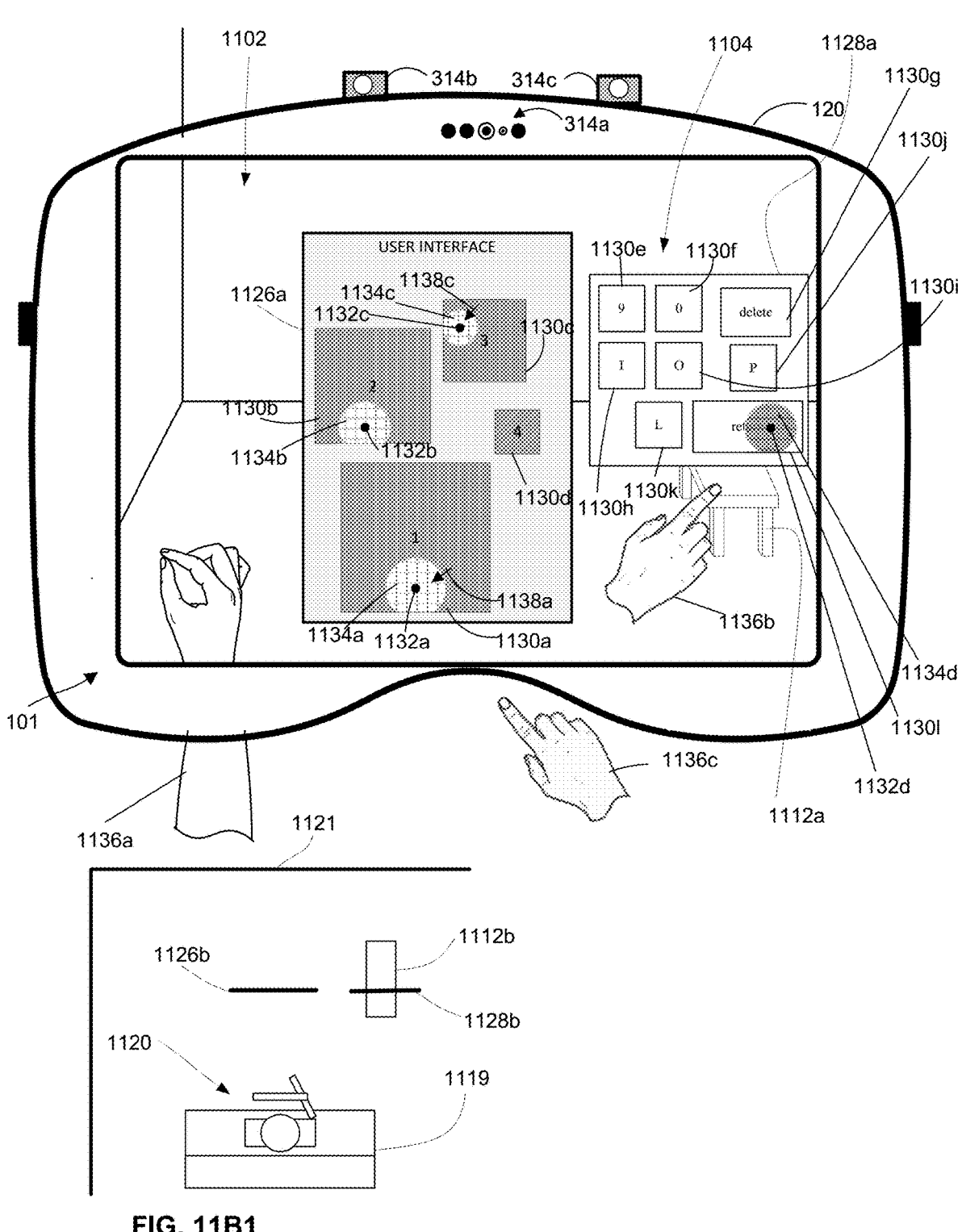
FIG. 11B1

1200

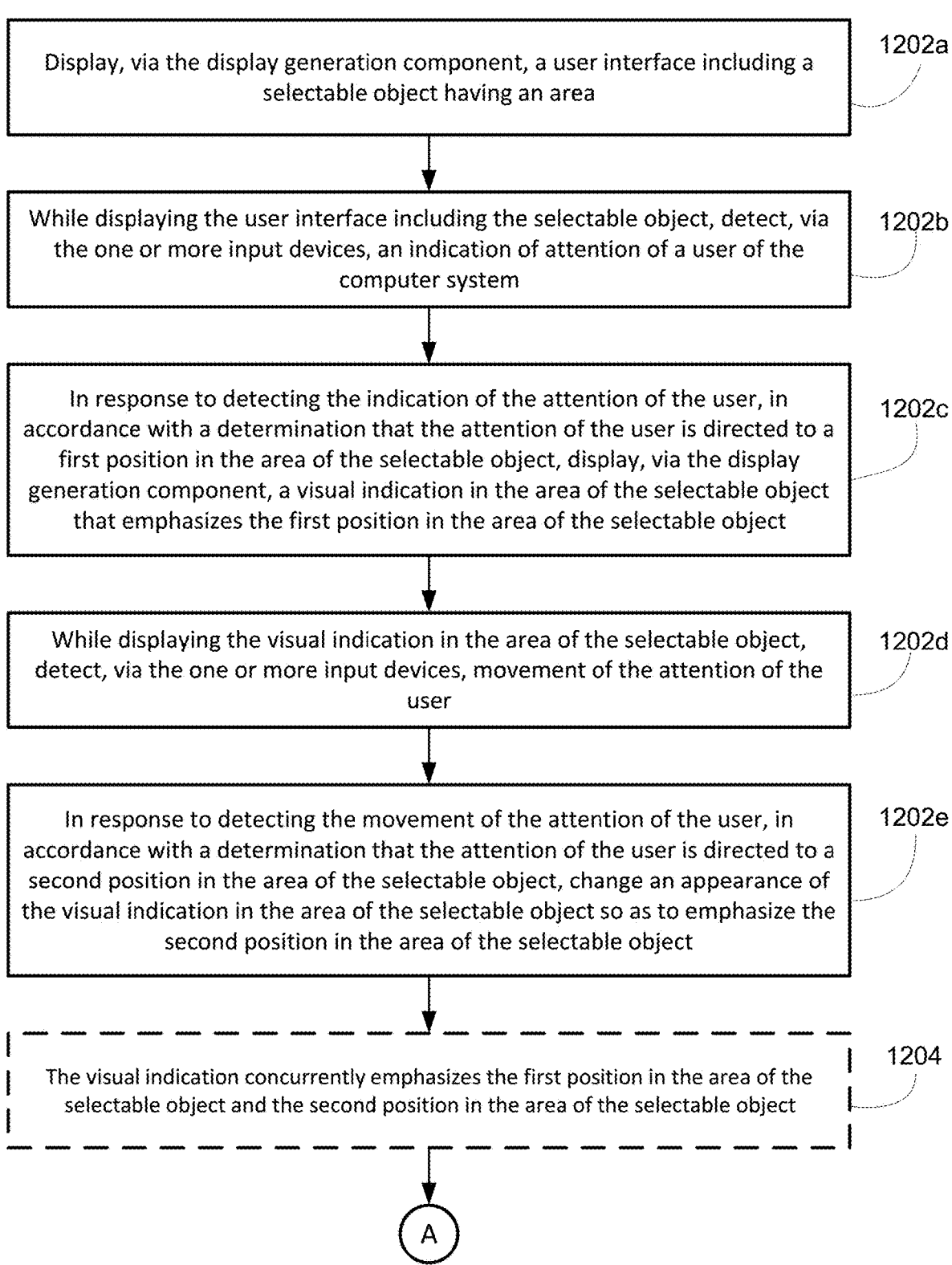

Display, via the display generation component, a user interface including a selectable object having an area — 1202a While displaying the user interface including the selectable object, detect, via the one or more input devices, an indication of attention of a user of the computer system — 1202b In response to detecting the indication of the attention of the user, in accordance with a determination that the attention of the user is directed to a first position in the area of the selectable object, display, via the display generation component, a visual indication in the area of the selectable object that emphasizes the first position in the area of the selectable object — 1202c While displaying the visual indication in the area of the selectable object, detect, via the one or more input devices, movement of the attention of the user — 1202d In response to detecting the movement of the attention of the user, in accordance with a determination that the attention of the user is directed to a second position in the area of the selectable object, change an appearance of the visual indication in the area of the selectable object so as to emphasize the second position in the area of the selectable object — 1202e The visual indication concurrently emphasizes the first position in the area of the selectable object and the second position in the area of the selectable object — 1204

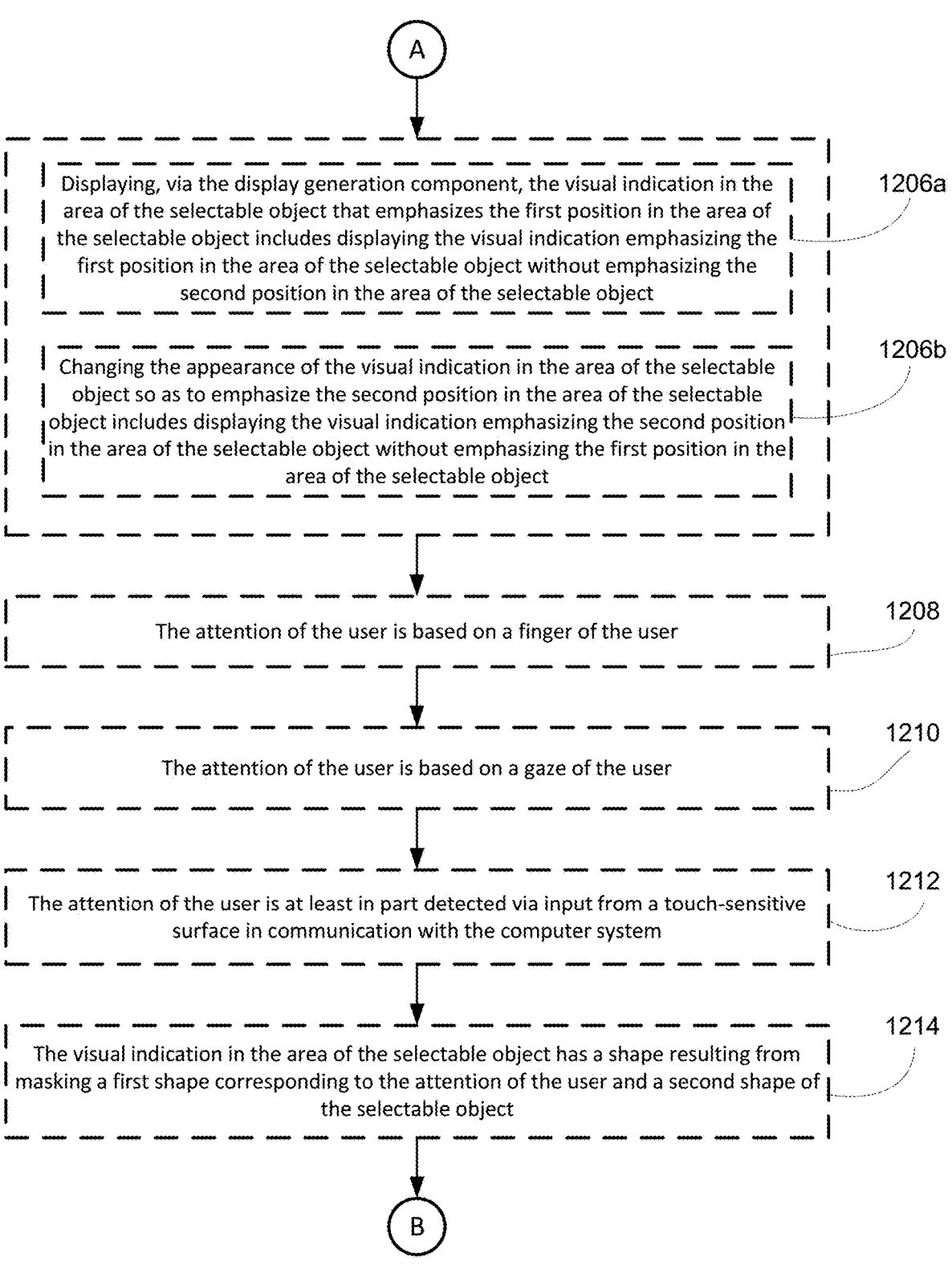

A

Displaying, via the display generation component, the visual indication in the area of the selectable object that emphasizes the first position in the area of the selectable object includes displaying the visual indication emphasizing the first position in the area of the selectable object without emphasizing the second position in the area of the selectable object                                    1206a Changing the appearance of the visual indication in the area of the selectable object so as to emphasize the second position in the area of the selectable object includes displaying the visual indication emphasizing the second position in the area of the selectable object without emphasizing the first position in the area of the selectable object                                    1206b The attention of the user is based on a finger of the user                                    1208

The attention of the user is based on a gaze of the user                                    1210

The attention of the user is at least in part detected via input from a touch-sensitive surface in communication with the computer system                                    1212

The visual indication in the area of the selectable object has a shape resulting from masking a first shape corresponding to the attention of the user and a second shape of the selectable object                                    1214

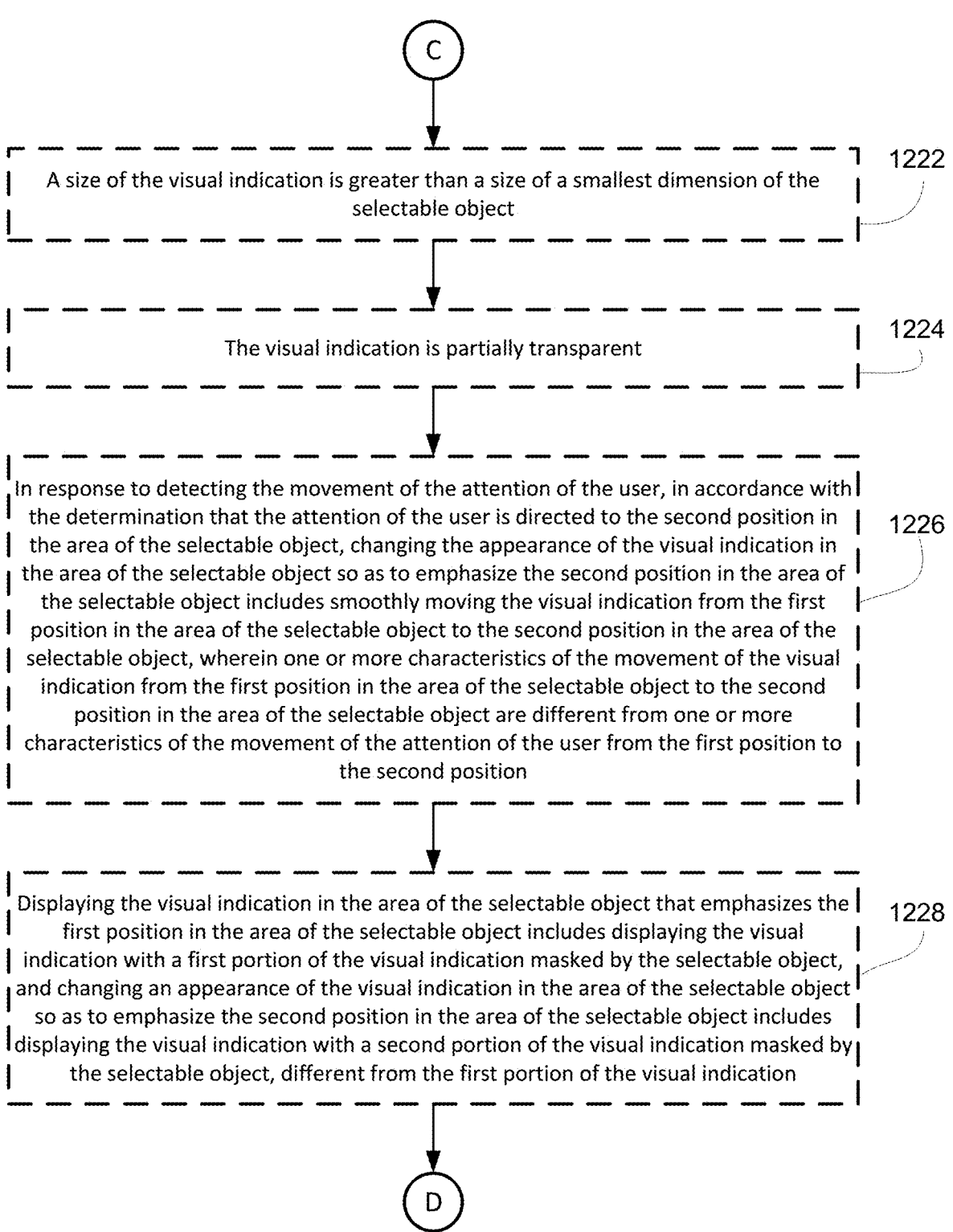

C

A size of the visual indication is greater than a size of a smallest dimension of the selectable object — 1222

The visual indication is partially transparent — 1224

In response to detecting the movement of the attention of the user, in accordance with the determination that the attention of the user is directed to the second position in the area of the selectable object, changing the appearance of the visual indication in the area of the selectable object so as to emphasize the second position in the area of the selectable object includes smoothly moving the visual indication from the first position in the area of the selectable object to the second position in the area of the selectable object, wherein one or more characteristics of the movement of the visual indication from the first position in the area of the selectable object to the second position in the area of the selectable object are different from one or more characteristics of the movement of the attention of the user from the first position to the second position — 1226

Displaying the visual indication in the area of the selectable object that emphasizes the first position in the area of the selectable object includes displaying the visual indication with a first portion of the visual indication masked by the selectable object, and changing an appearance of the visual indication in the area of the selectable object so as to emphasize the second position in the area of the selectable object includes displaying the visual indication with a second portion of the visual indication masked by the selectable object, different from the first portion of the visual indication — 1228

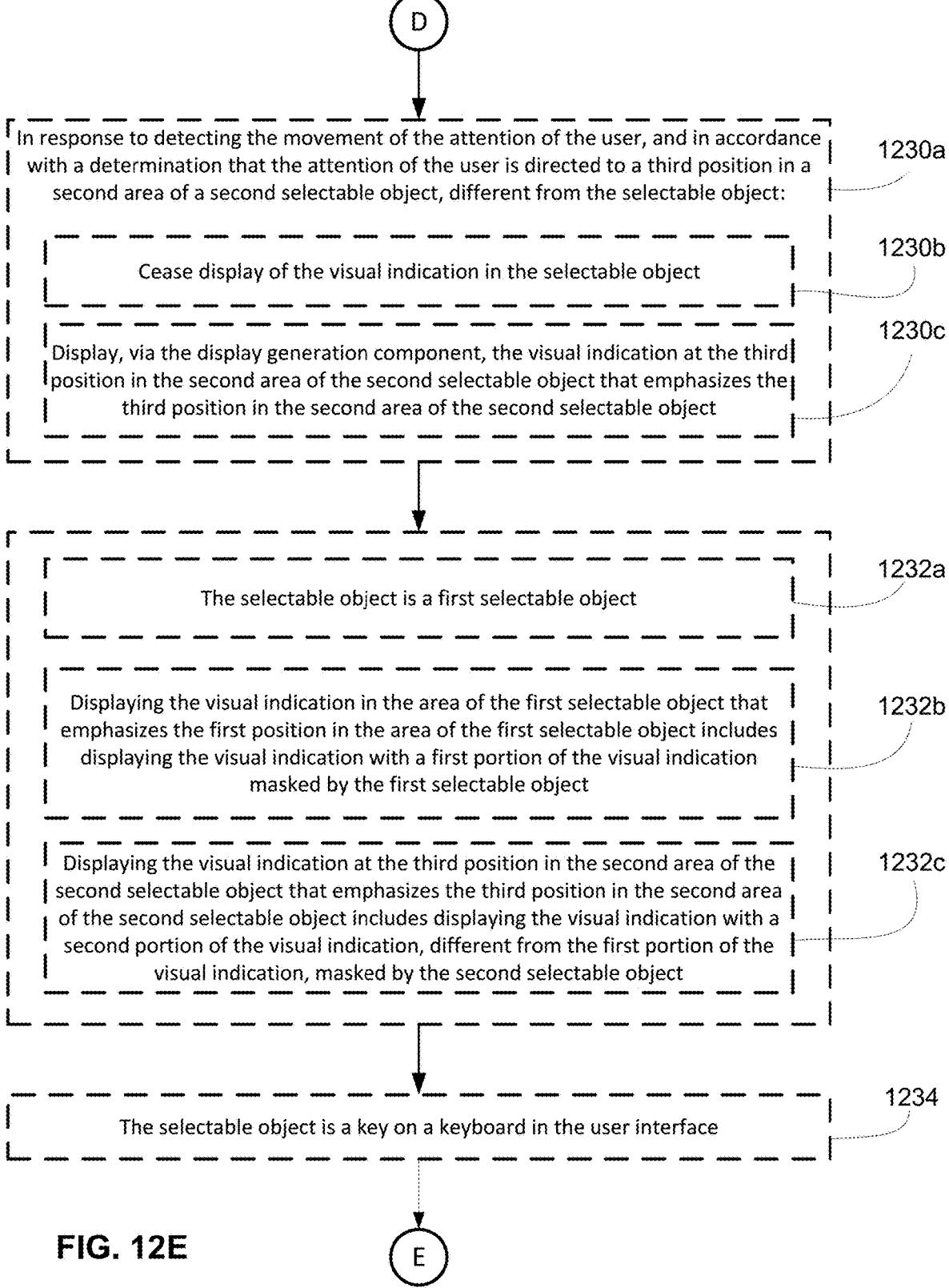

In response to detecting the movement of the attention of the user, and in accordance with a determination that the attention of the user is directed to a third position in a second area of a second selectable object, different from the selectable object:                    1230a Cease display of the visual indication in the selectable object                    1230b Display, via the display generation component, the visual indication at the third position in the second area of the second selectable object that emphasizes the third position in the second area of the second selectable object                    1230c The selectable object is a first selectable object                    1232a Displaying the visual indication in the area of the first selectable object that emphasizes the first position in the area of the first selectable object includes displaying the visual indication with a first portion of the visual indication masked by the first selectable object                    1232b Displaying the visual indication at the third position in the second area of the second selectable object that emphasizes the third position in the second area of the second selectable object includes displaying the visual indication with a second portion of the visual indication, different from the first portion of the visual indication, masked by the second selectable object                    1232c The selectable object is a key on a keyboard in the user interface                    1234

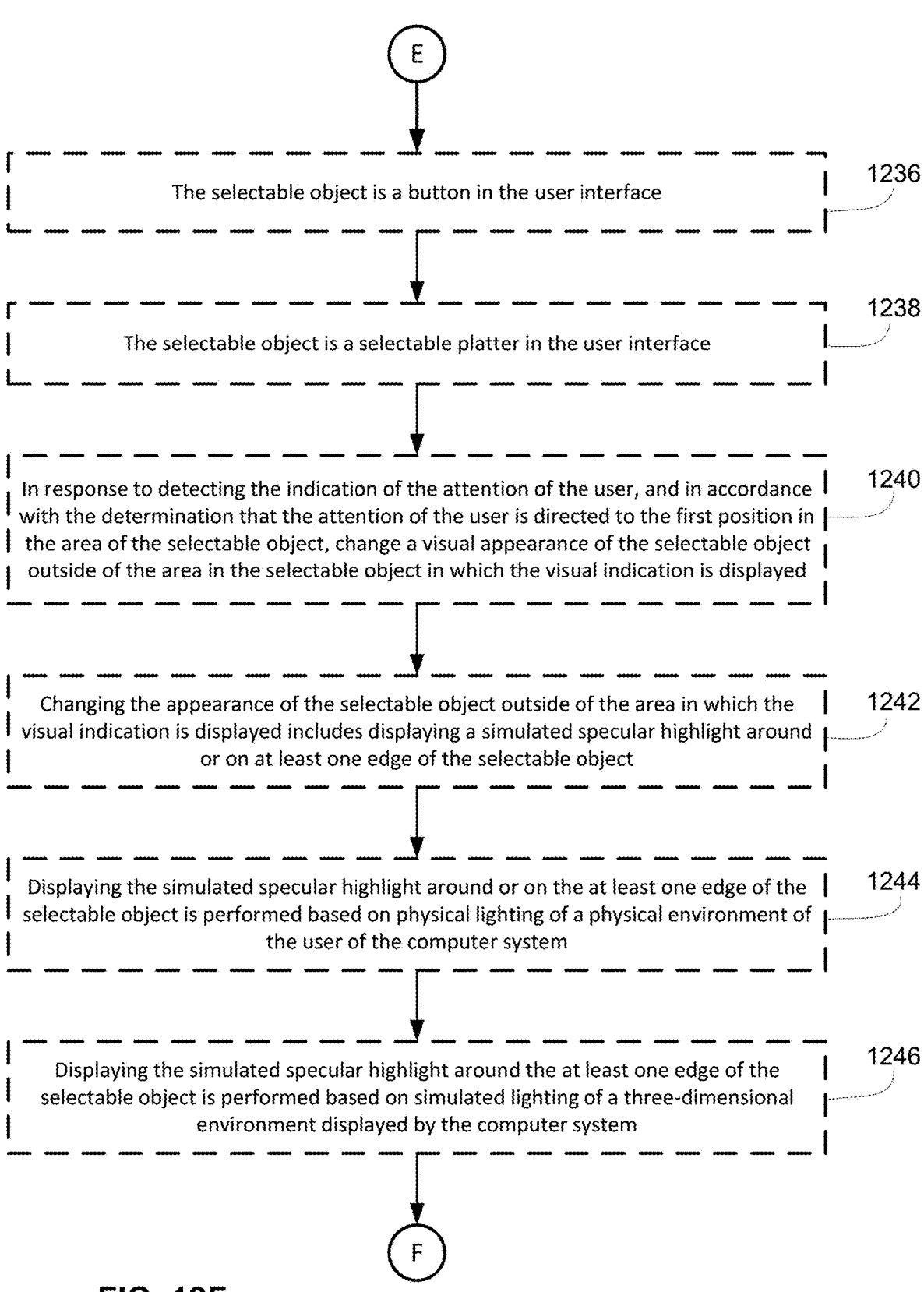

E

The selectable object is a button in the user interface                              1236

The selectable object is a selectable platter in the user interface              1238

In response to detecting the indication of the attention of the user, and in accordance    1240
with the determination that the attention of the user is directed to the first position in
the area of the selectable object, change a visual appearance of the selectable object
outside of the area in the selectable object in which the visual indication is displayed Changing the appearance of the selectable object outside of the area in which the    1242
visual indication is displayed includes displaying a simulated specular highlight around
or on at least one edge of the selectable object Displaying the simulated specular highlight around or on the at least one edge of the    1244
selectable object is performed based on physical lighting of a physical environment of
the user of the computer system Displaying the simulated specular highlight around the at least one edge of the    1246
selectable object is performed based on simulated lighting of a three-dimensional
environment displayed by the computer system

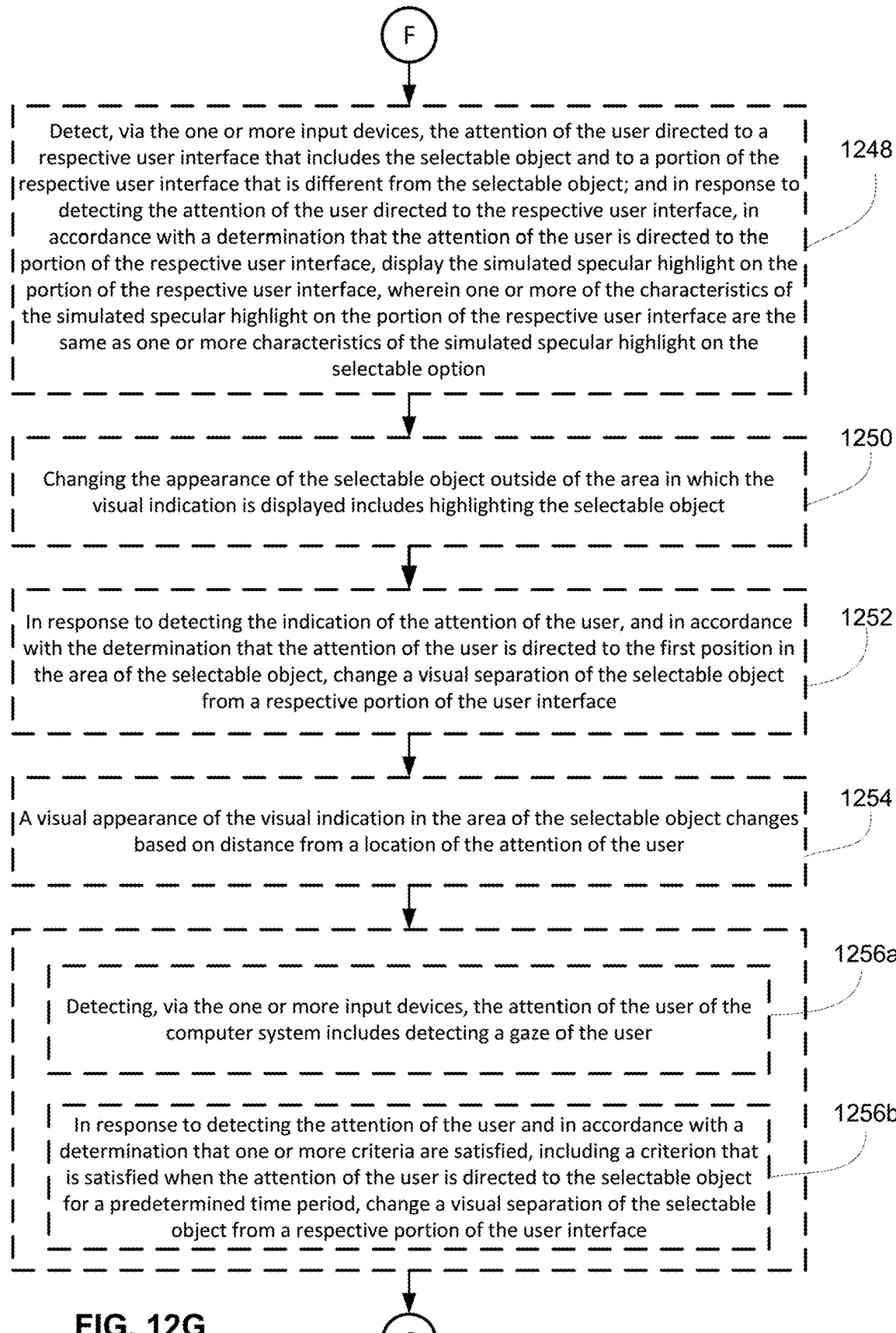

F

Detect, via the one or more input devices, the attention of the user directed to a respective user interface that includes the selectable object and to a portion of the respective user interface that is different from the selectable object; and in response to detecting the attention of the user directed to the respective user interface, in accordance with a determination that the attention of the user is directed to the portion of the respective user interface, display the simulated specular highlight on the portion of the respective user interface, wherein one or more of the characteristics of the simulated specular highlight on the portion of the respective user interface are the same as one or more characteristics of the simulated specular highlight on the selectable option — 1248

Changing the appearance of the selectable object outside of the area in which the visual indication is displayed includes highlighting the selectable object — 1250

In response to detecting the indication of the attention of the user, and in accordance with the determination that the attention of the user is directed to the first position in the area of the selectable object, change a visual separation of the selectable object from a respective portion of the user interface — 1252

A visual appearance of the visual indication in the area of the selectable object changes based on distance from a location of the attention of the user — 1254

Detecting, via the one or more input devices, the attention of the user of the computer system includes detecting a gaze of the user — 1256a In response to detecting the attention of the user and in accordance with a determination that one or more criteria are satisfied, including a criterion that is satisfied when the attention of the user is directed to the selectable object for a predetermined time period, change a visual separation of the selectable object from a respective portion of the user interface — 1256b

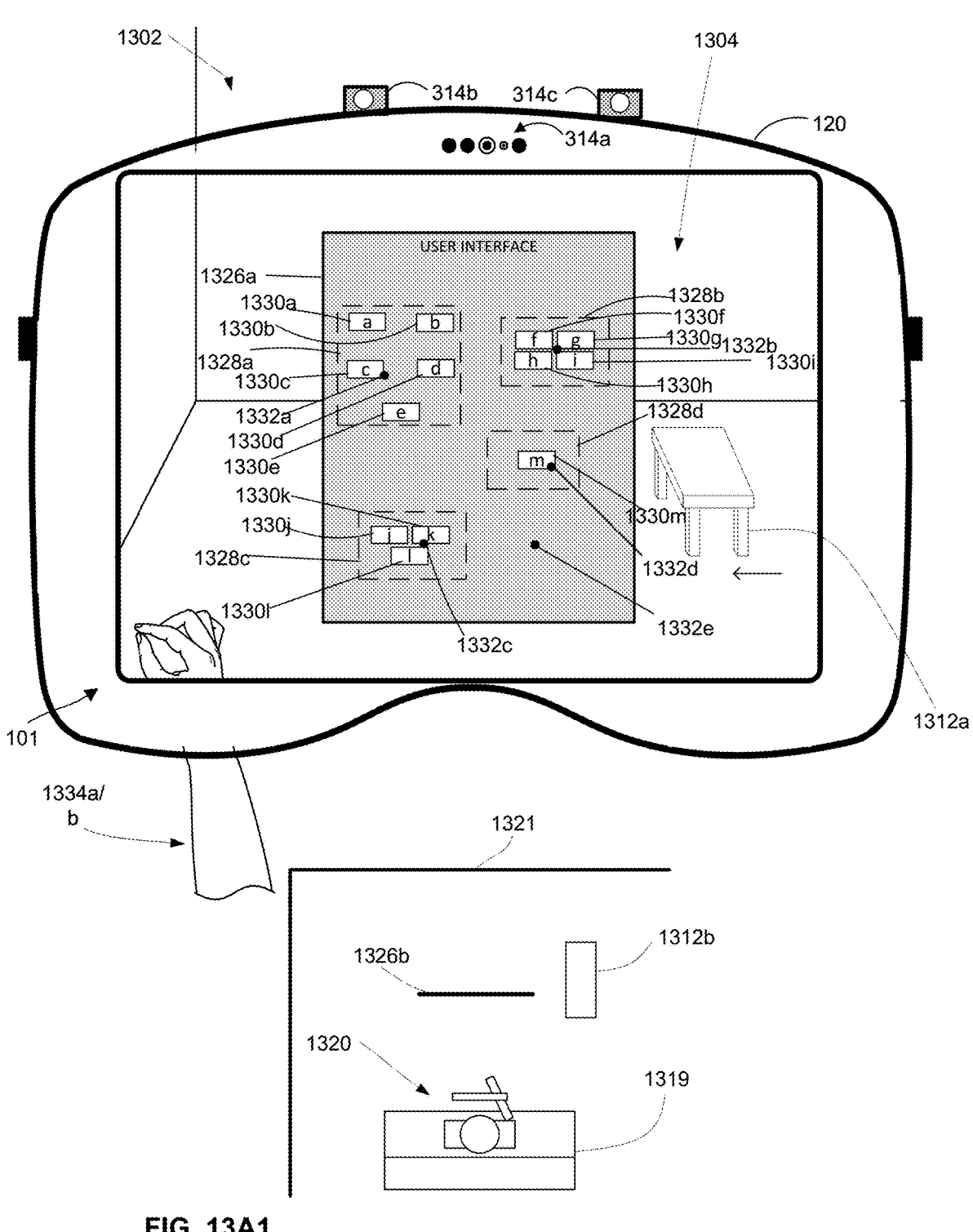
FIG. 13A1

1400

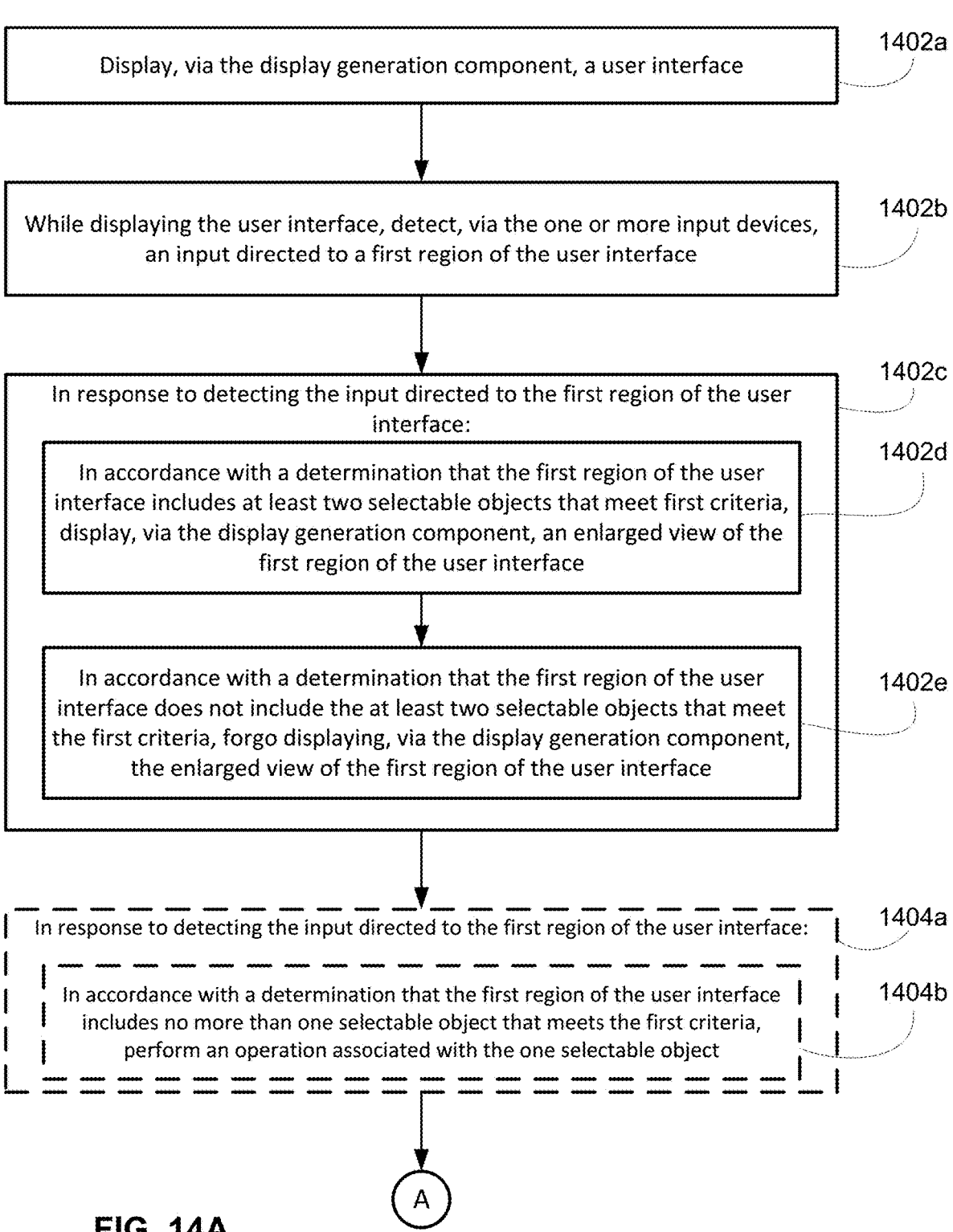

Display, via the display generation component, a user interface    1402a

While displaying the user interface, detect, via the one or more input devices, an input directed to a first region of the user interface    1402b In response to detecting the input directed to the first region of the user interface:    1402c In accordance with a determination that the first region of the user interface includes at least two selectable objects that meet first criteria, display, via the display generation component, an enlarged view of the first region of the user interface    1402d In accordance with a determination that the first region of the user interface does not include the at least two selectable objects that meet the first criteria, forgo displaying, via the display generation component, the enlarged view of the first region of the user interface    1402e In response to detecting the input directed to the first region of the user interface:    1404a In accordance with a determination that the first region of the user interface includes no more than one selectable object that meets the first criteria, perform an operation associated with the one selectable object    1404b

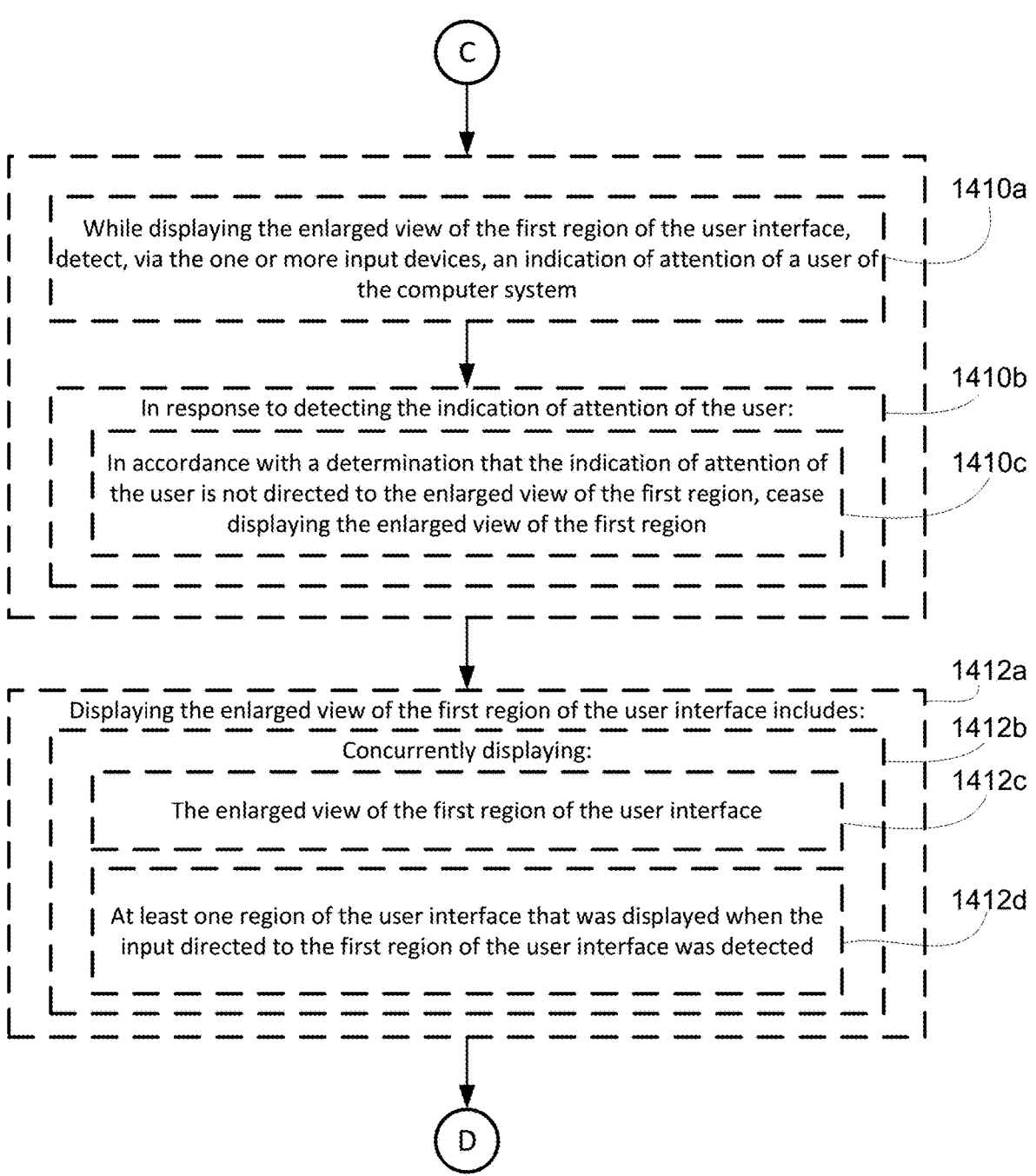

C

While displaying the enlarged view of the first region of the user interface, detect, via the one or more input devices, an indication of attention of a user of the computer system                                                                    1410a In response to detecting the indication of attention of the user:                1410b In accordance with a determination that the indication of attention of the user is not directed to the enlarged view of the first region, cease displaying the enlarged view of the first region                                        1410c Displaying the enlarged view of the first region of the user interface includes:    1412a Concurrently displaying:                                                         1412b The enlarged view of the first region of the user interface                     1412c At least one region of the user interface that was displayed when the input directed to the first region of the user interface was detected    1412d

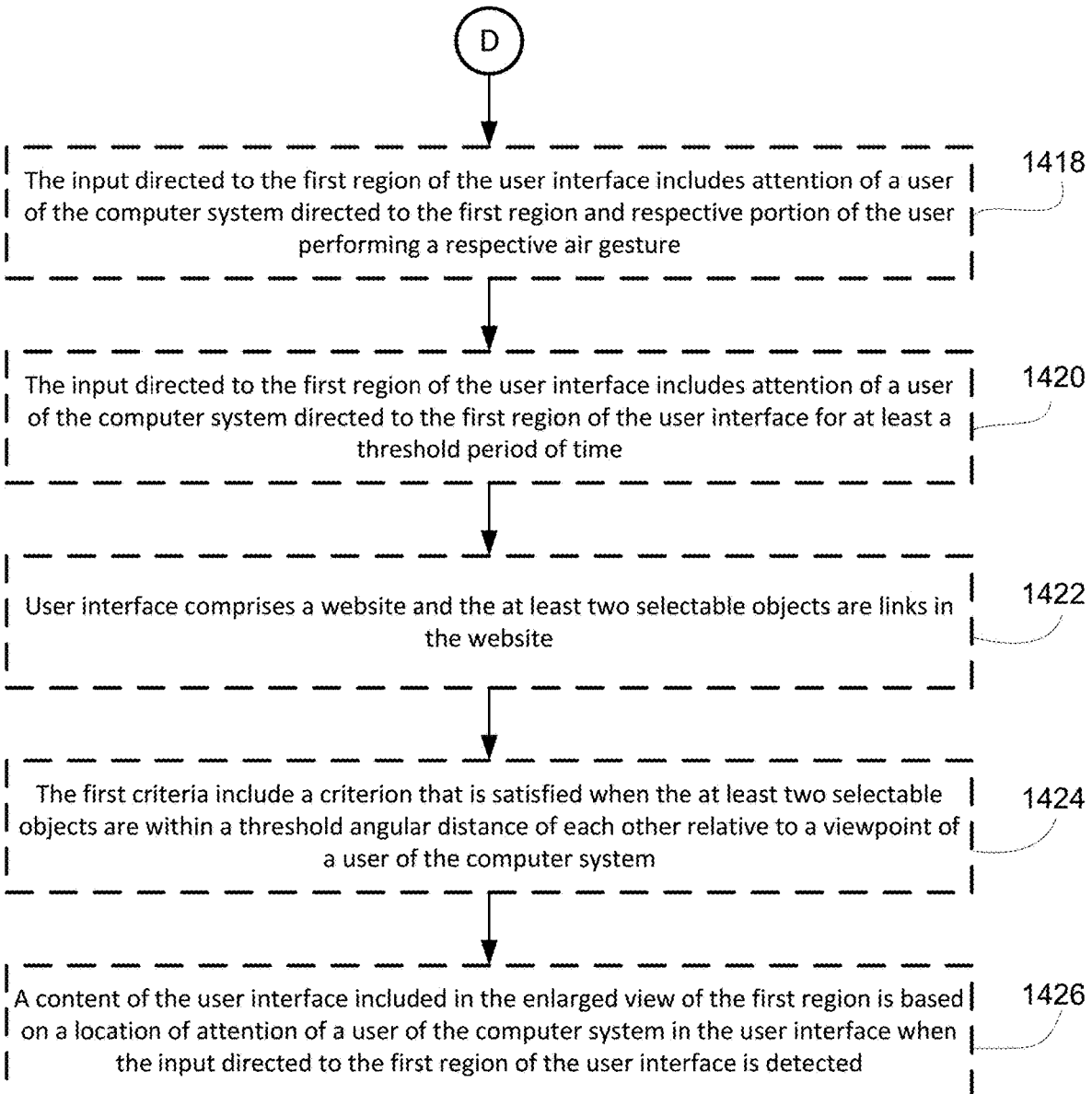

The input directed to the first region of the user interface includes attention of a user of the computer system directed to the first region and respective portion of the user performing a respective air gesture        1418

The input directed to the first region of the user interface includes attention of a user of the computer system directed to the first region of the user interface for at least a threshold period of time        1420

User interface comprises a website and the at least two selectable objects are links in the website        1422

The first criteria include a criterion that is satisfied when the at least two selectable objects are within a threshold angular distance of each other relative to a viewpoint of a user of the computer system        1424

A content of the user interface included in the enlarged view of the first region is based on a location of attention of a user of the computer system in the user interface when the input directed to the first region of the user interface is detected        1426

FIG. 14E

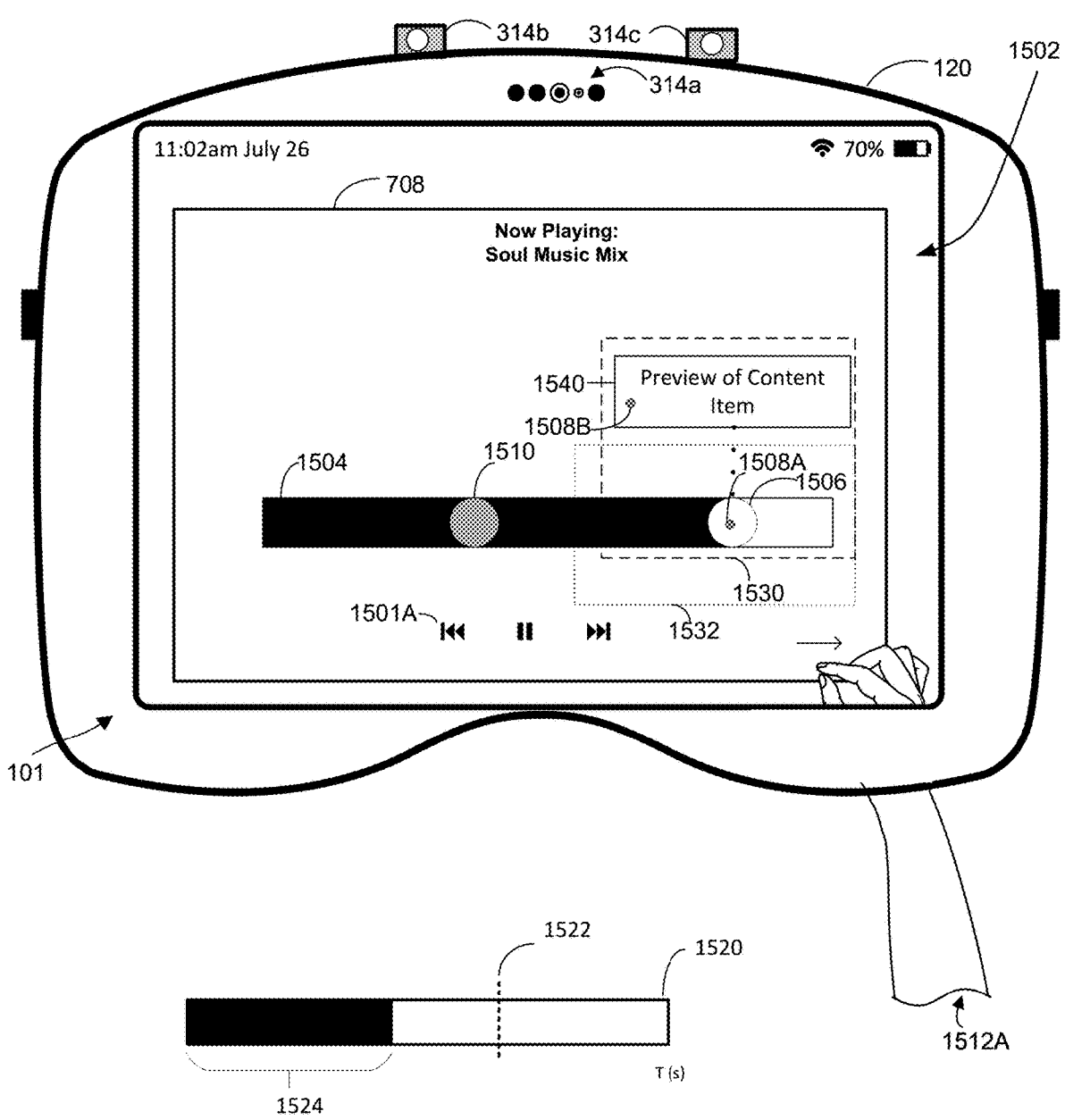
FIG. 15C1

1600

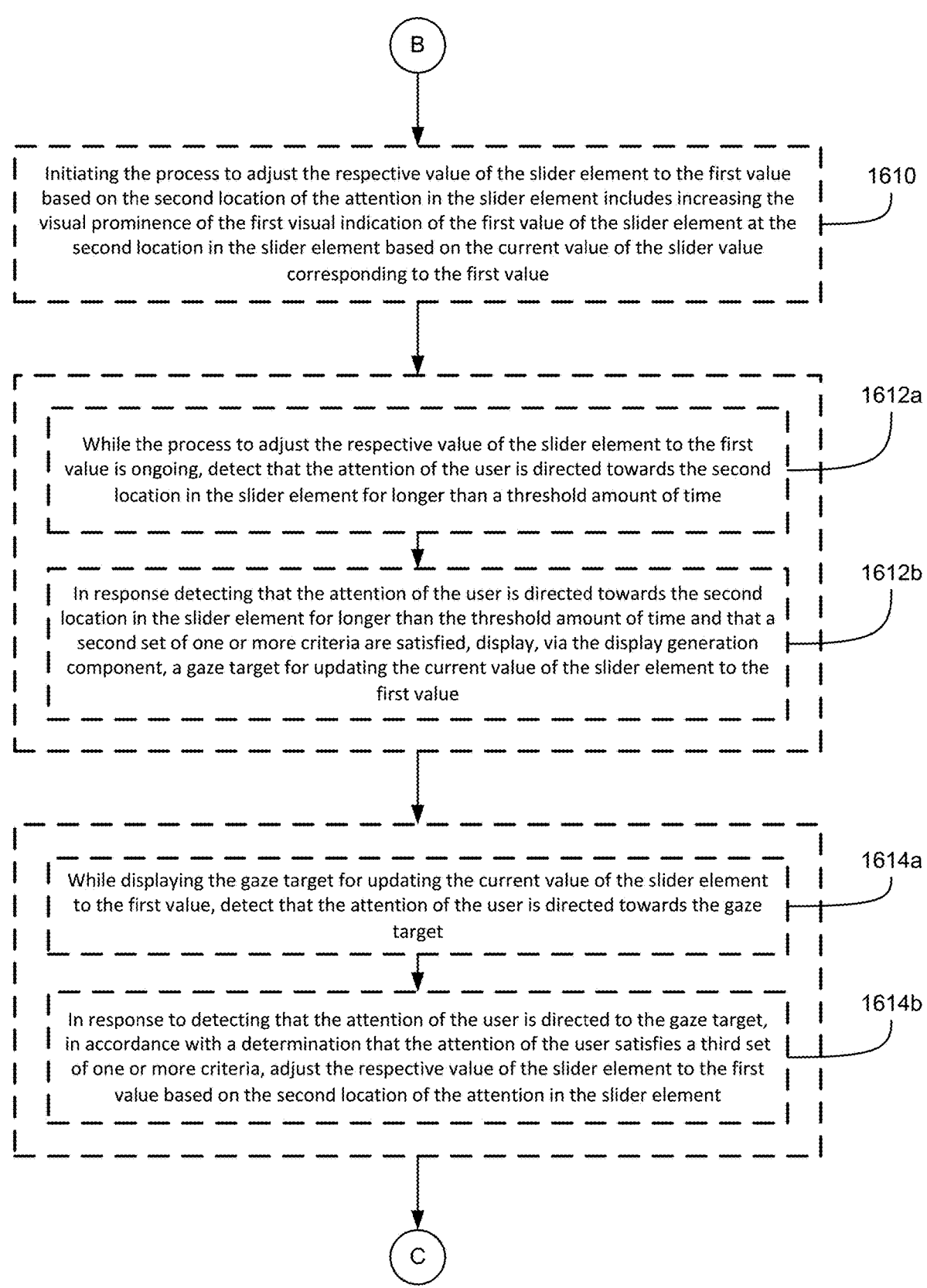

B

Initiating the process to adjust the respective value of the slider element to the first value based on the second location of the attention in the slider element includes increasing the visual prominence of the first visual indication of the first value of the slider element at the second location in the slider element based on the current value of the slider value corresponding to the first value — 1610

While the process to adjust the respective value of the slider element to the first value is ongoing, detect that the attention of the user is directed towards the second location in the slider element for longer than a threshold amount of time — 1612a In response detecting that the attention of the user is directed towards the second location in the slider element for longer than the threshold amount of time and that a second set of one or more criteria are satisfied, display, via the display generation component, a gaze target for updating the current value of the slider element to the first value — 1612b While displaying the gaze target for updating the current value of the slider element to the first value, detect that the attention of the user is directed towards the gaze target — 1614a In response to detecting that the attention of the user is directed to the gaze target, in accordance with a determination that the attention of the user satisfies a third set of one or more criteria, adjust the respective value of the slider element to the first value based on the second location of the attention in the slider element — 1614b

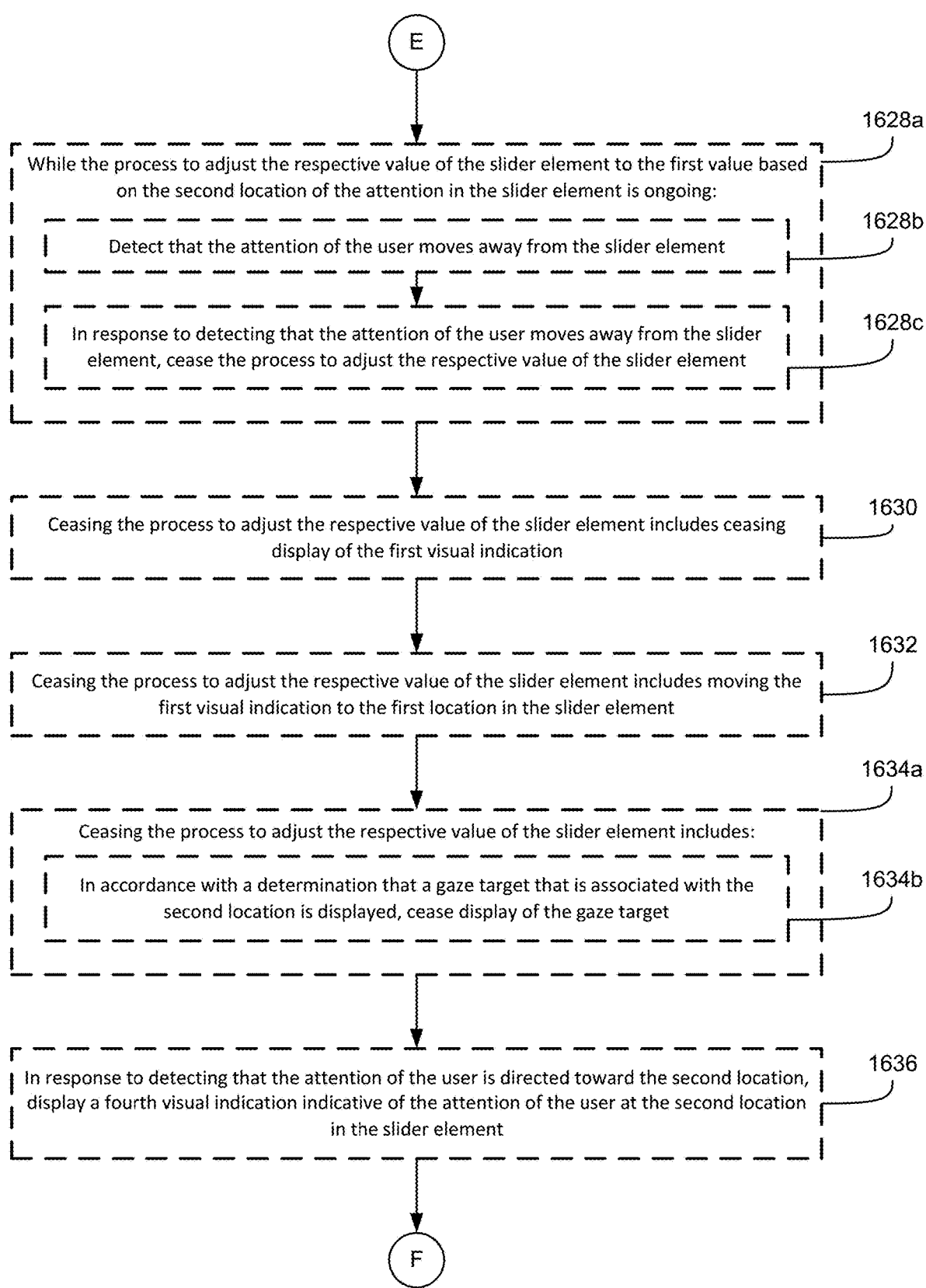

E

1628a
While the process to adjust the respective value of the slider element to the first value based on the second location of the attention in the slider element is ongoing:

1628b
Detect that the attention of the user moves away from the slider element

1628c
In response to detecting that the attention of the user moves away from the slider element, cease the process to adjust the respective value of the slider element 1630
Ceasing the process to adjust the respective value of the slider element includes ceasing display of the first visual indication 1632
Ceasing the process to adjust the respective value of the slider element includes moving the first visual indication to the first location in the slider element 1634a
Ceasing the process to adjust the respective value of the slider element includes:

1634b
In accordance with a determination that a gaze target that is associated with the second location is displayed, cease display of the gaze target 1636
In response to detecting that the attention of the user is directed toward the second location, display a fourth visual indication indicative of the attention of the user at the second location in the slider element

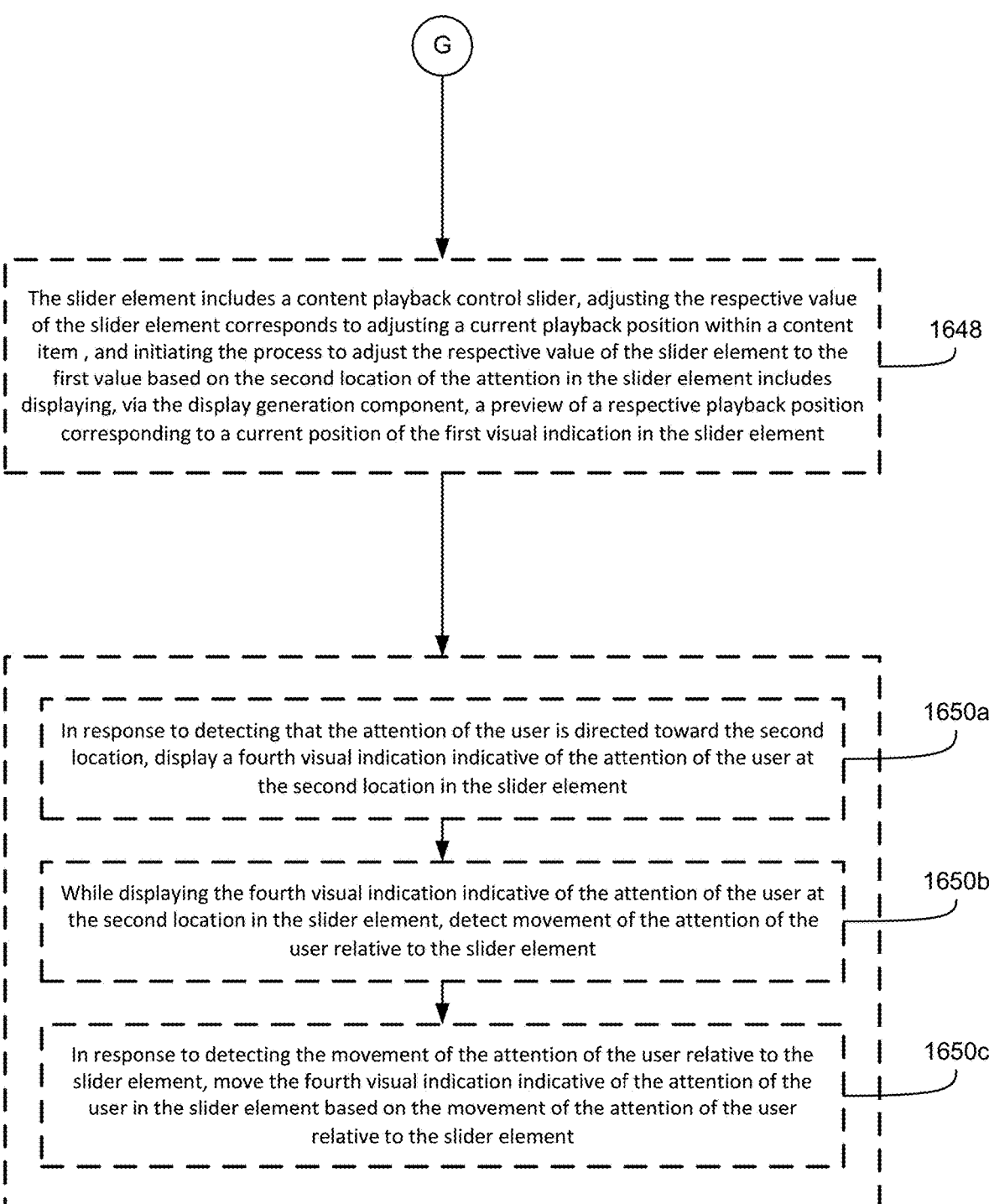

G

The slider element includes a content playback control slider, adjusting the respective value of the slider element corresponds to adjusting a current playback position within a content item , and initiating the process to adjust the respective value of the slider element to the first value based on the second location of the attention in the slider element includes displaying, via the display generation component, a preview of a respective playback position corresponding to a current position of the first visual indication in the slider element          1648

In response to detecting that the attention of the user is directed toward the second location, display a fourth visual indication indicative of the attention of the user at the second location in the slider element          1650a While displaying the fourth visual indication indicative of the attention of the user at the second location in the slider element, detect movement of the attention of the user relative to the slider element          1650b In response to detecting the movement of the attention of the user relative to the slider element, move the fourth visual indication indicative of the attention of the user in the slider element based on the movement of the attention of the user relative to the slider element          1650c

FIG. 16H

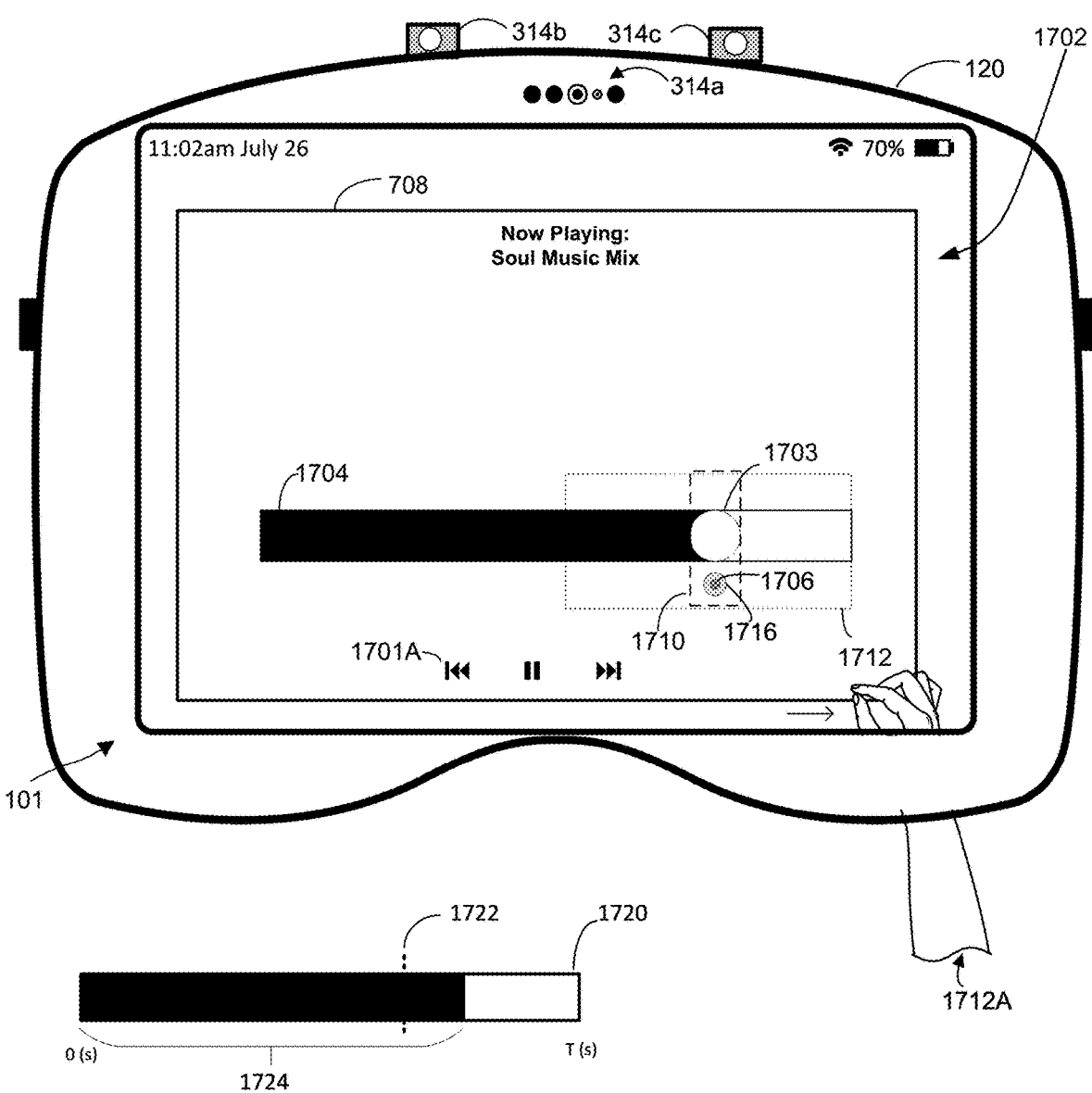
FIG. 17C1

1800

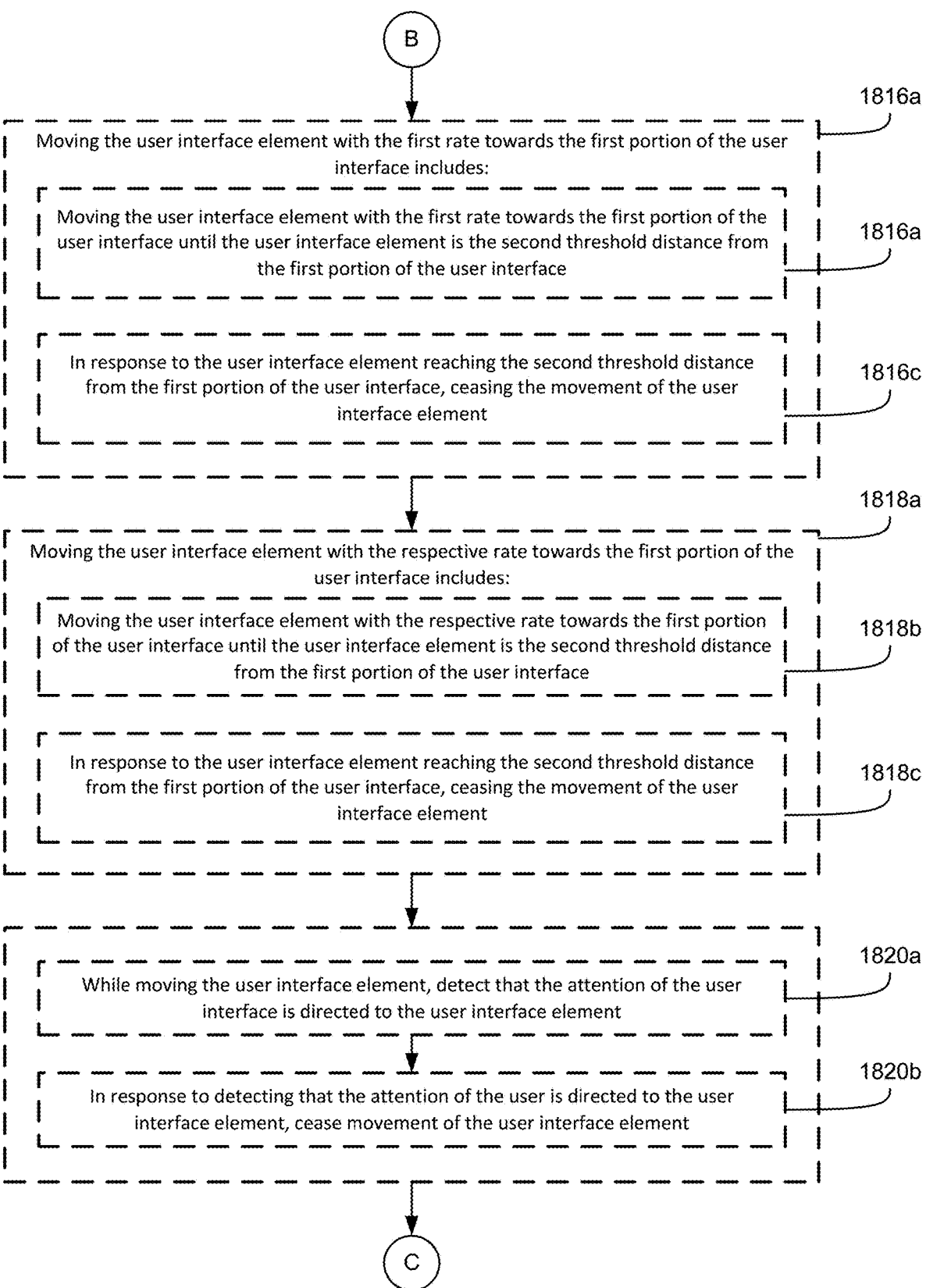

B

Moving the user interface element with the first rate towards the first portion of the user interface includes:                                                                                      1816a Moving the user interface element with the first rate towards the first portion of the user interface until the user interface element is the second threshold distance from the first portion of the user interface                                                    1816a In response to the user interface element reaching the second threshold distance from the first portion of the user interface, ceasing the movement of the user interface element                                                    1816c Moving the user interface element with the respective rate towards the first portion of the user interface includes:                                                                             1818a Moving the user interface element with the respective rate towards the first portion of the user interface until the user interface element is the second threshold distance from the first portion of the user interface                                        1818b In response to the user interface element reaching the second threshold distance from the first portion of the user interface, ceasing the movement of the user interface element                                                    1818c While moving the user interface element, detect that the attention of the user interface is directed to the user interface element                                                    1820a In response to detecting that the attention of the user is directed to the user interface element, cease movement of the user interface element                                                    1820b

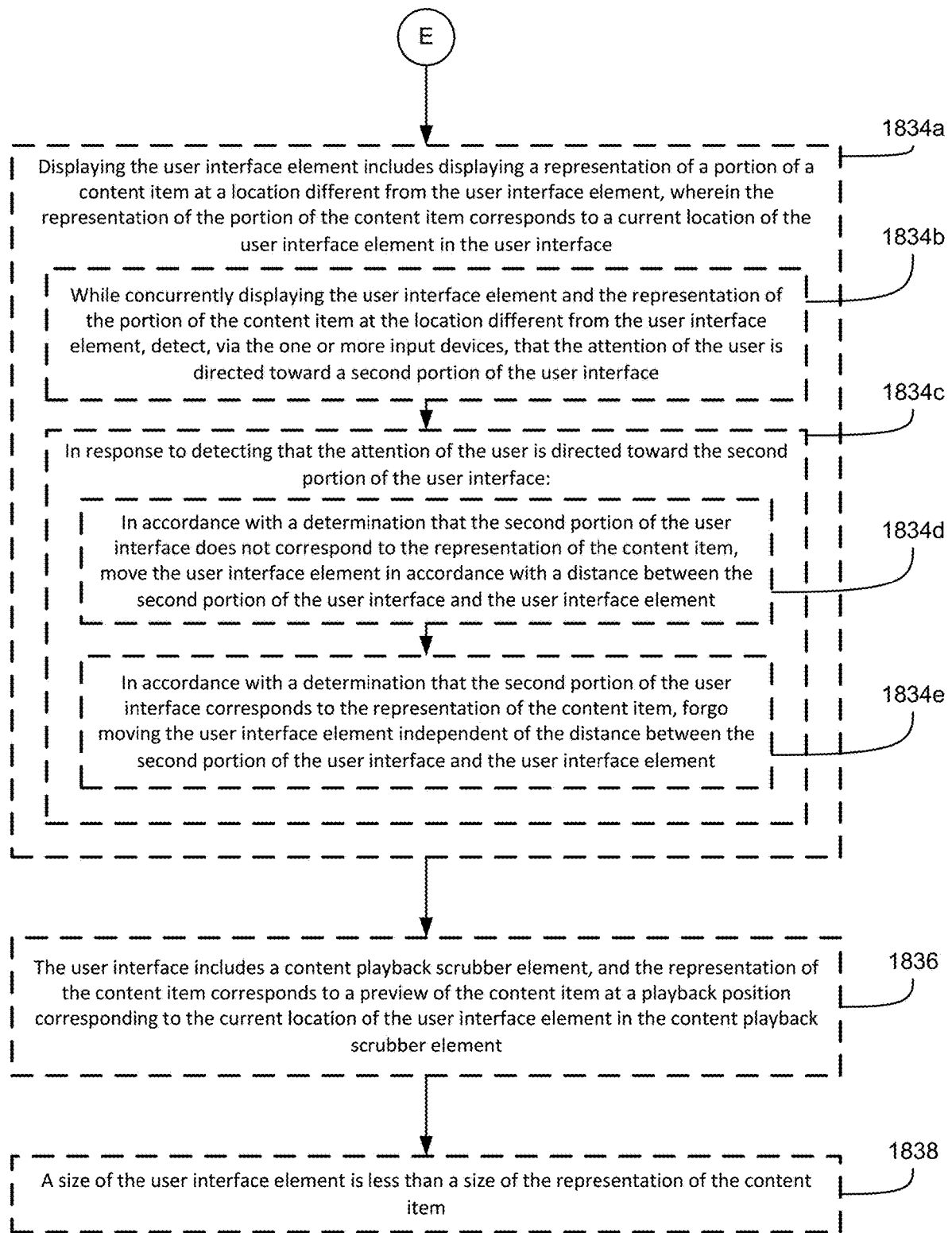

E

1834a

Displaying the user interface element includes displaying a representation of a portion of a content item at a location different from the user interface element, wherein the representation of the portion of the content item corresponds to a current location of the user interface element in the user interface 1834b While concurrently displaying the user interface element and the representation of the portion of the content item at the location different from the user interface element, detect, via the one or more input devices, that the attention of the user is directed toward a second portion of the user interface 1834c In response to detecting that the attention of the user is directed toward the second portion of the user interface:

In accordance with a determination that the second portion of the user interface does not correspond to the representation of the content item, move the user interface element in accordance with a distance between the second portion of the user interface and the user interface element 1834d In accordance with a determination that the second portion of the user interface corresponds to the representation of the content item, forgo moving the user interface element independent of the distance between the second portion of the user interface and the user interface element 1834e The user interface includes a content playback scrubber element, and the representation of the content item corresponds to a preview of the content item at a playback position corresponding to the current location of the user interface element in the content playback scrubber element

1836

A size of the user interface element is less than a size of the representation of the content item

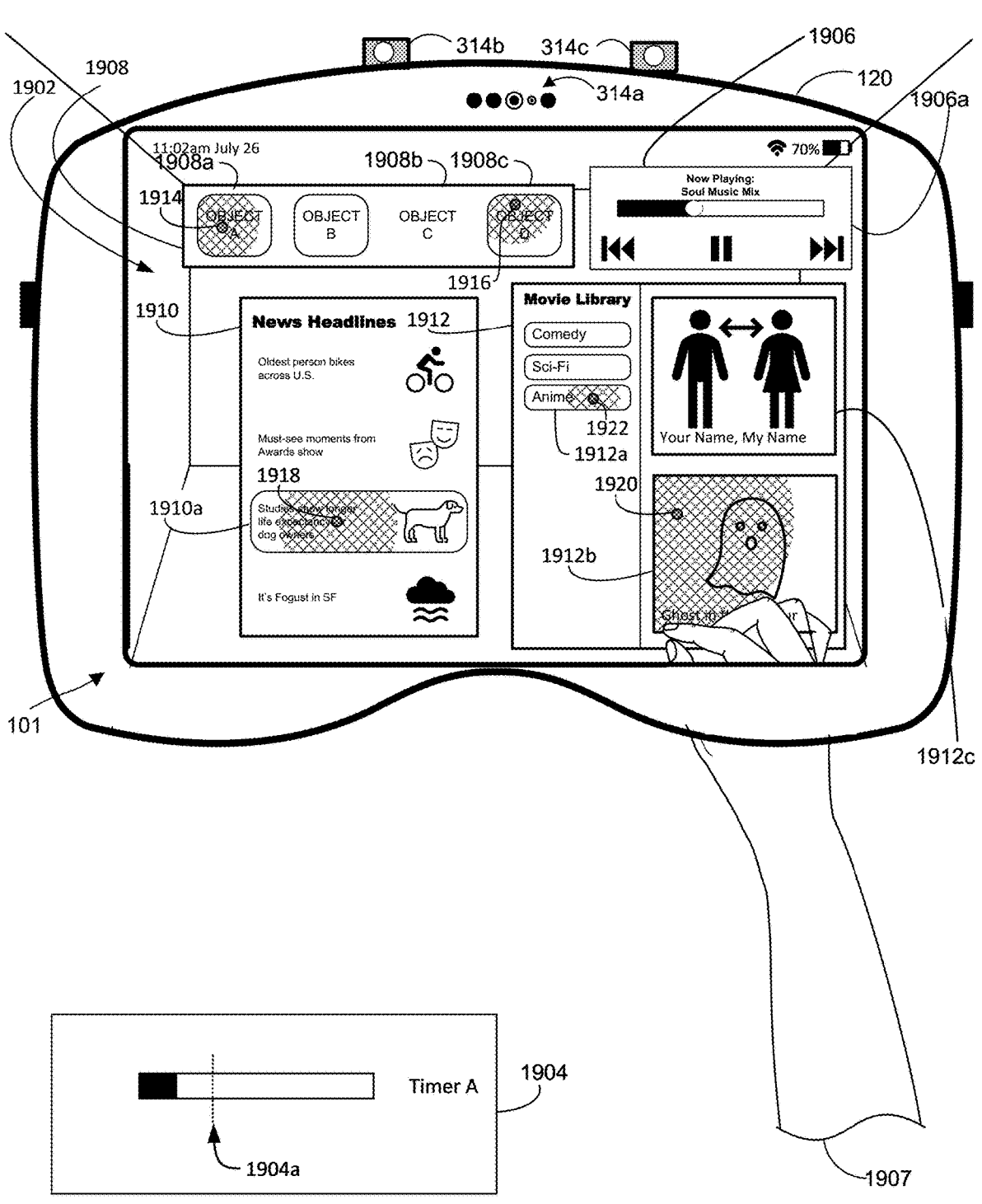
FIG. 19C1

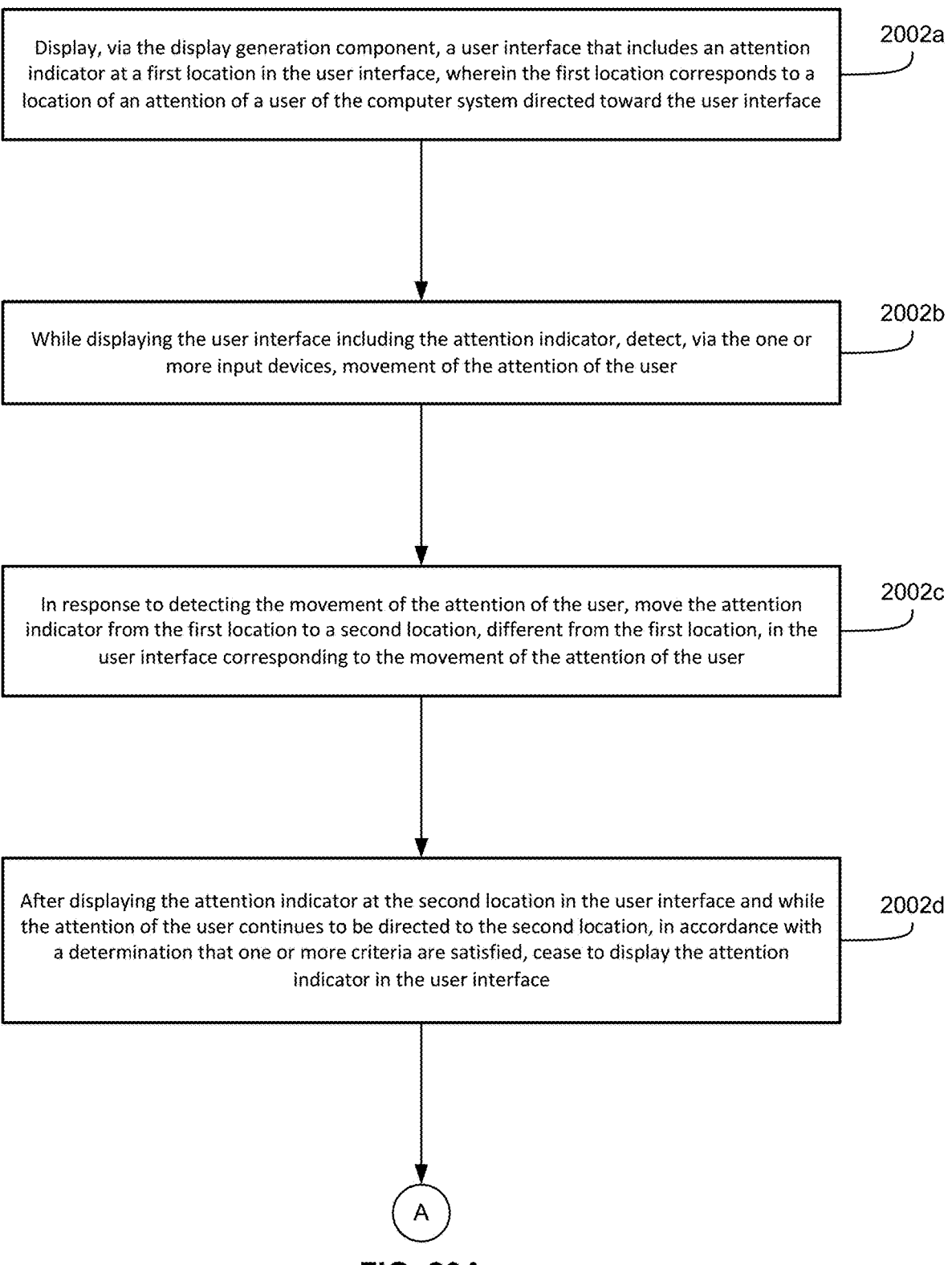

2000

Display, via the display generation component, a user interface that includes an attention indicator at a first location in the user interface, wherein the first location corresponds to a location of an attention of a user of the computer system directed toward the user interface — 2002a While displaying the user interface including the attention indicator, detect, via the one or more input devices, movement of the attention of the user — 2002b In response to detecting the movement of the attention of the user, move the attention indicator from the first location to a second location, different from the first location, in the user interface corresponding to the movement of the attention of the user — 2002c After displaying the attention indicator at the second location in the user interface and while the attention of the user continues to be directed to the second location, in accordance with a determination that one or more criteria are satisfied, cease to display the attention indicator in the user interface — 2002d

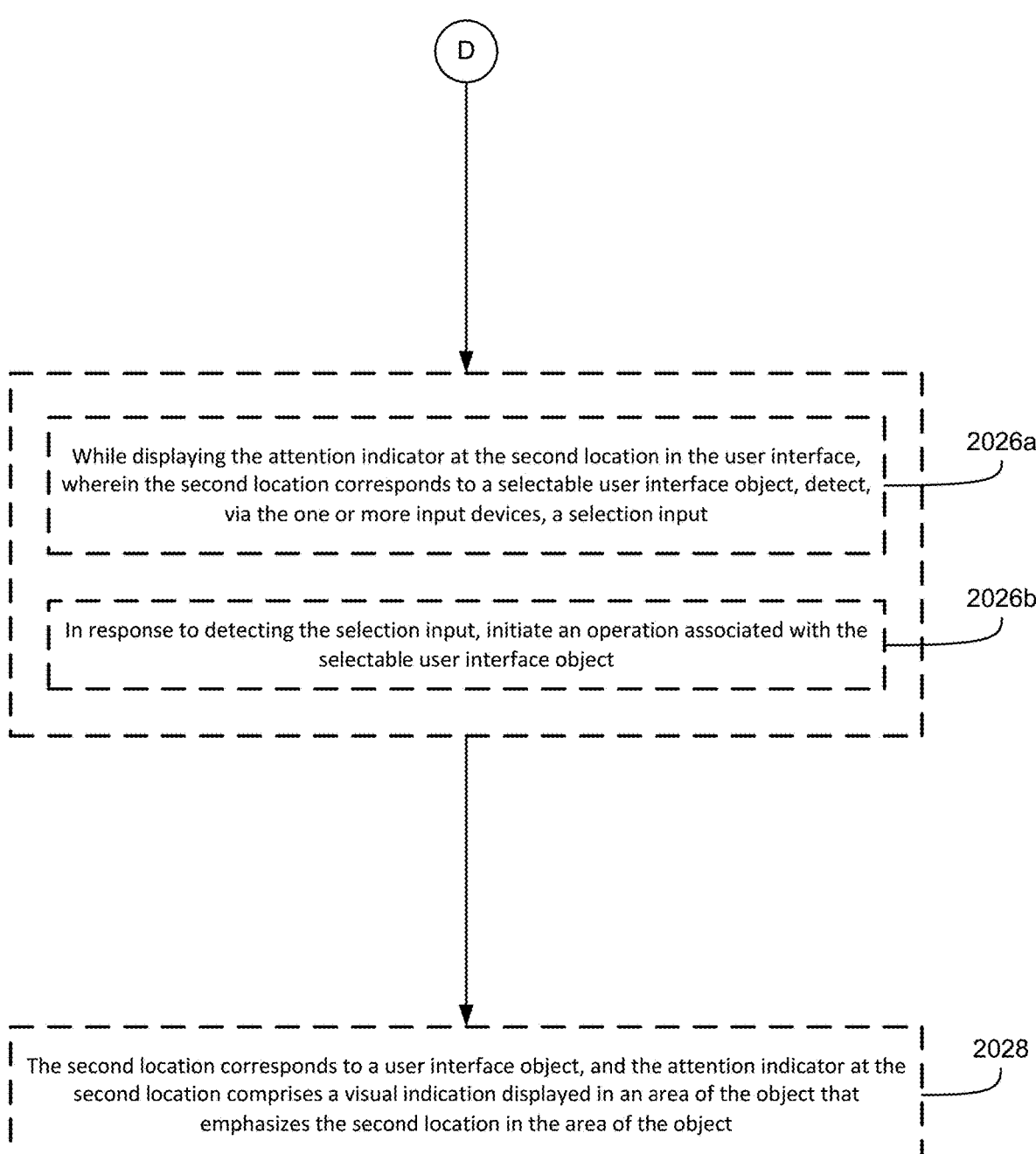

While displaying the attention indicator at the second location in the user interface, wherein the second location corresponds to a selectable user interface object, detect, via the one or more input devices, a selection input                    2026a In response to detecting the selection input, initiate an operation associated with the selectable user interface object                    2026b The second location corresponds to a user interface object, and the attention indicator at the second location comprises a visual indication displayed in an area of the object that emphasizes the second location in the area of the object                    2028

FIG. 20E

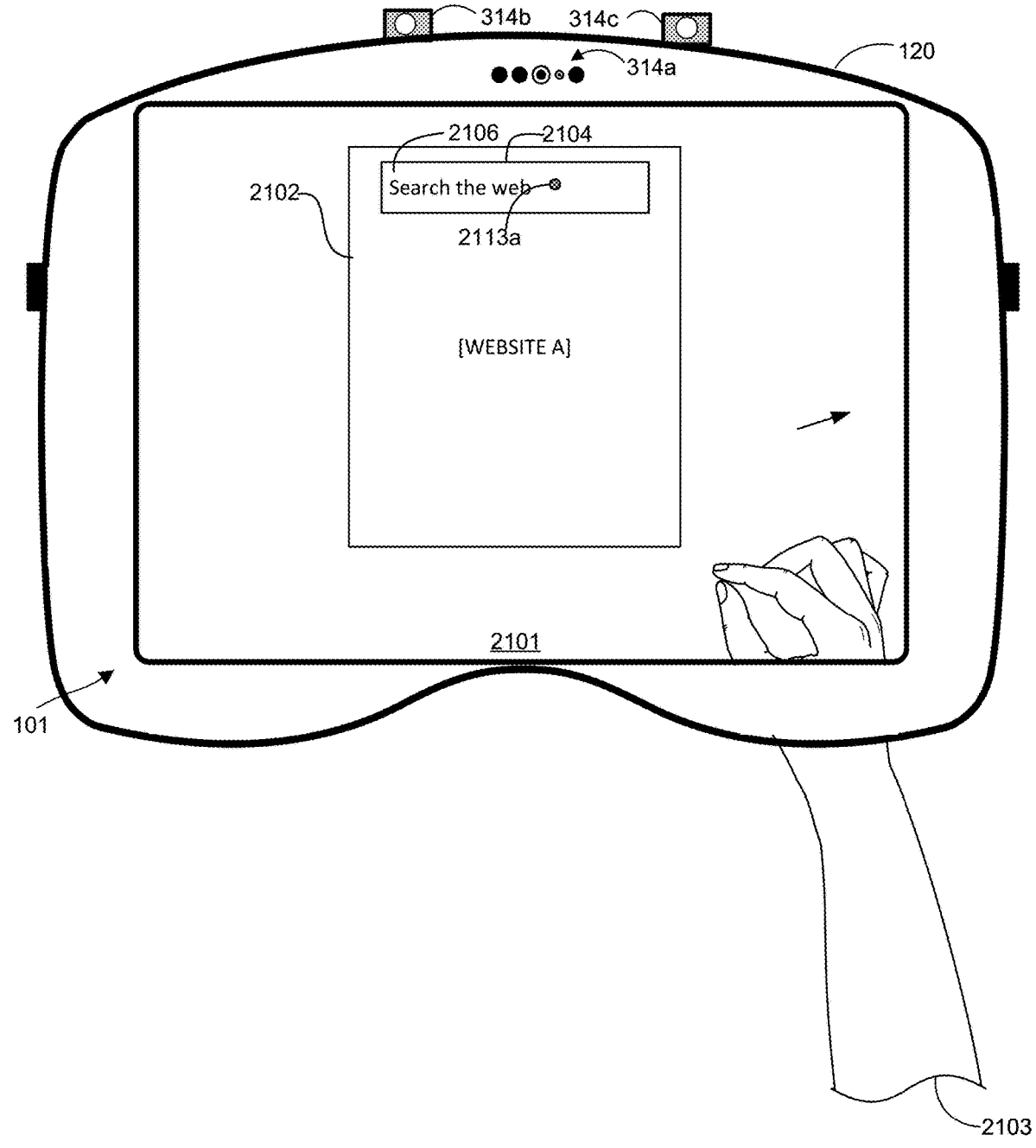
FIG. 21A1

2200

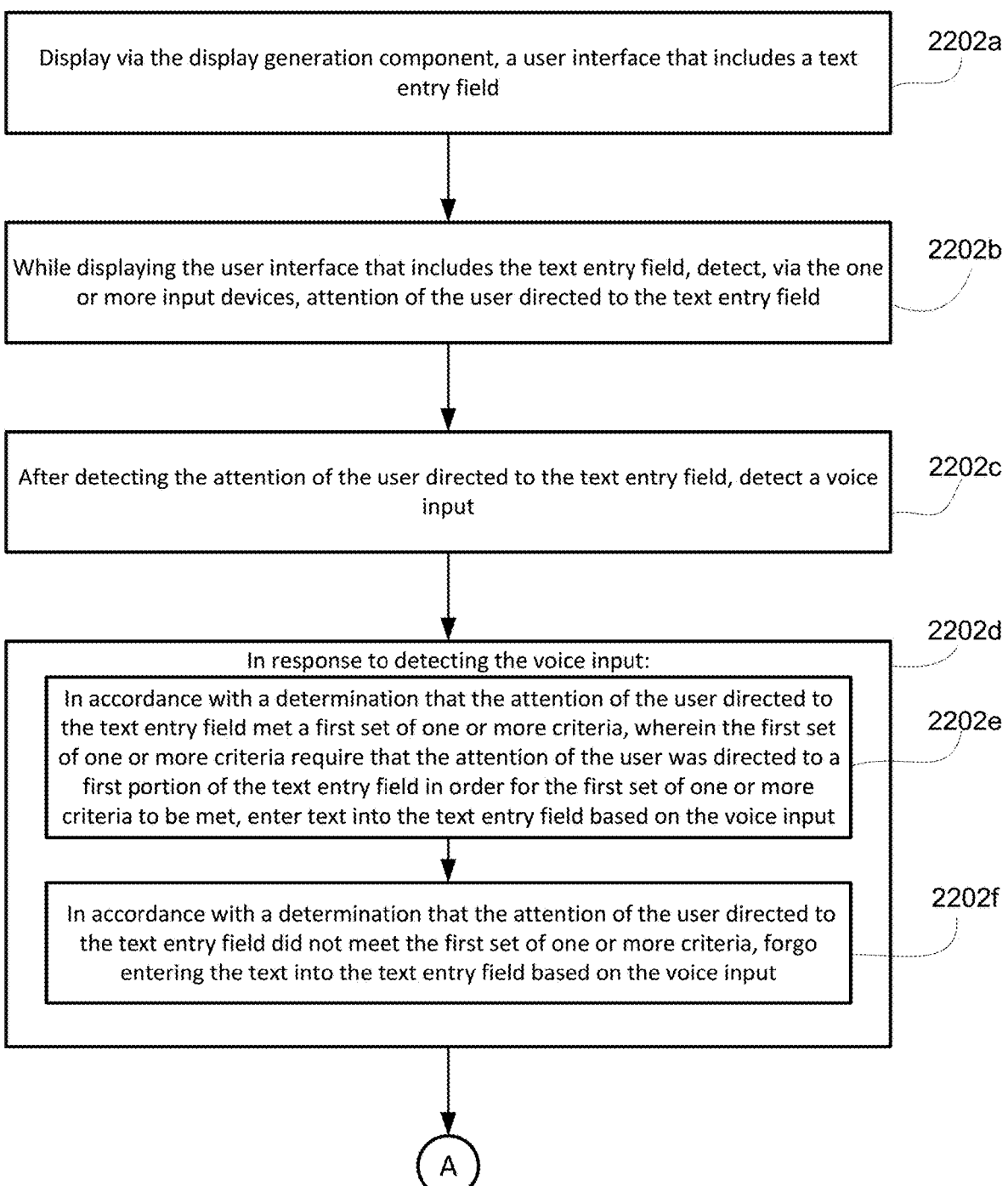

Display via the display generation component, a user interface that includes a text entry field 2202a While displaying the user interface that includes the text entry field, detect, via the one or more input devices, attention of the user directed to the text entry field 2202b After detecting the attention of the user directed to the text entry field, detect a voice input 2202c In response to detecting the voice input:

2202d

In accordance with a determination that the attention of the user directed to the text entry field met a first set of one or more criteria, wherein the first set of one or more criteria require that the attention of the user was directed to a first portion of the text entry field in order for the first set of one or more criteria to be met, enter text into the text entry field based on the voice input 2202e In accordance with a determination that the attention of the user directed to the text entry field did not meet the first set of one or more criteria, forgo entering the text into the text entry field based on the voice input 2202f

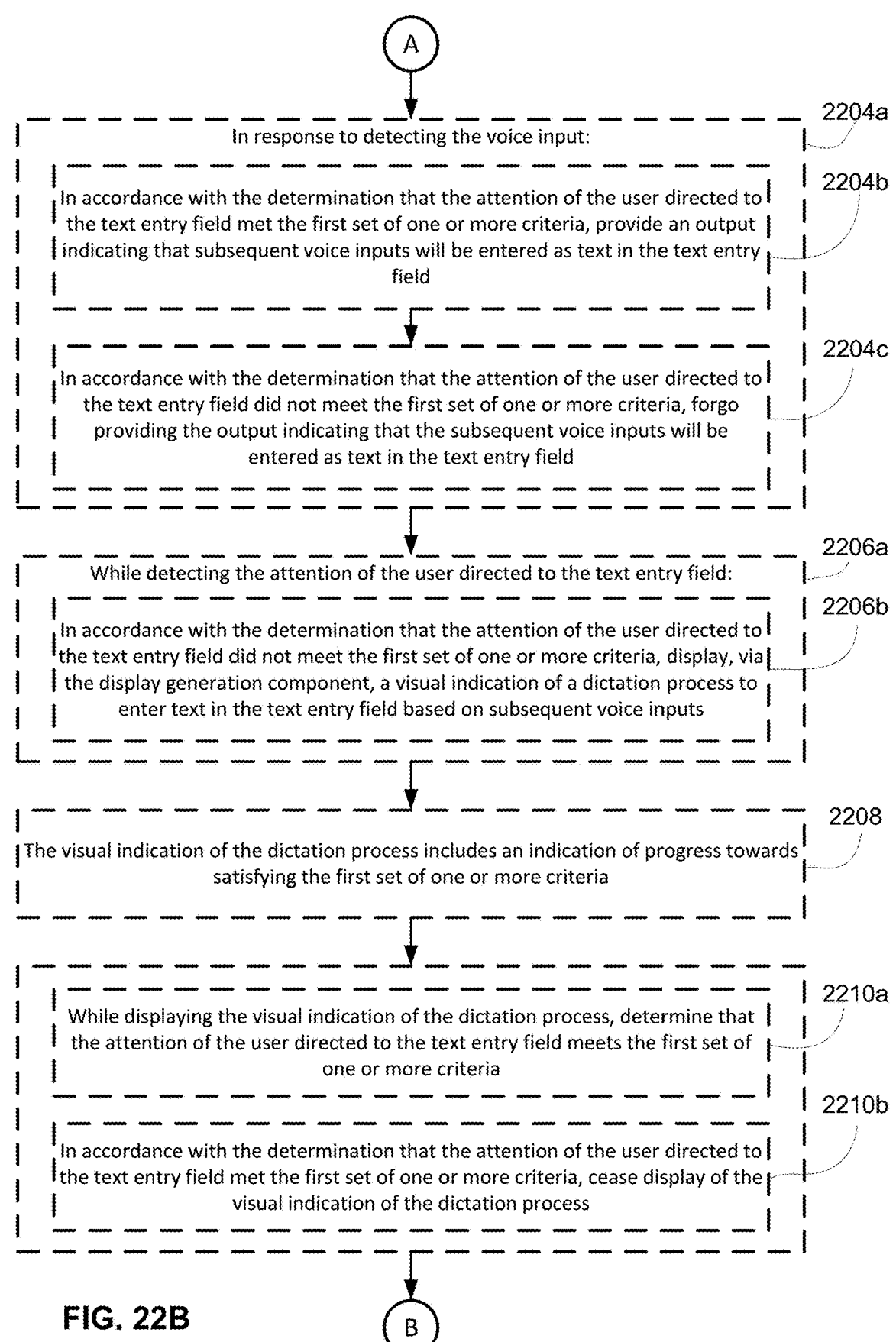

(A)

2204a
In response to detecting the voice input:

2204b
In accordance with the determination that the attention of the user directed to the text entry field met the first set of one or more criteria, provide an output indicating that subsequent voice inputs will be entered as text in the text entry field 2204c
In accordance with the determination that the attention of the user directed to the text entry field did not meet the first set of one or more criteria, forgo providing the output indicating that the subsequent voice inputs will be entered as text in the text entry field 2206a
While detecting the attention of the user directed to the text entry field:

2206b
In accordance with the determination that the attention of the user directed to the text entry field did not meet the first set of one or more criteria, display, via the display generation component, a visual indication of a dictation process to enter text in the text entry field based on subsequent voice inputs 2208
The visual indication of the dictation process includes an indication of progress towards satisfying the first set of one or more criteria 2210a
While displaying the visual indication of the dictation process, determine that the attention of the user directed to the text entry field meets the first set of one or more criteria 2210b
In accordance with the determination that the attention of the user directed to the text entry field met the first set of one or more criteria, cease display of the visual indication of the dictation process

FIG. 22B (B)

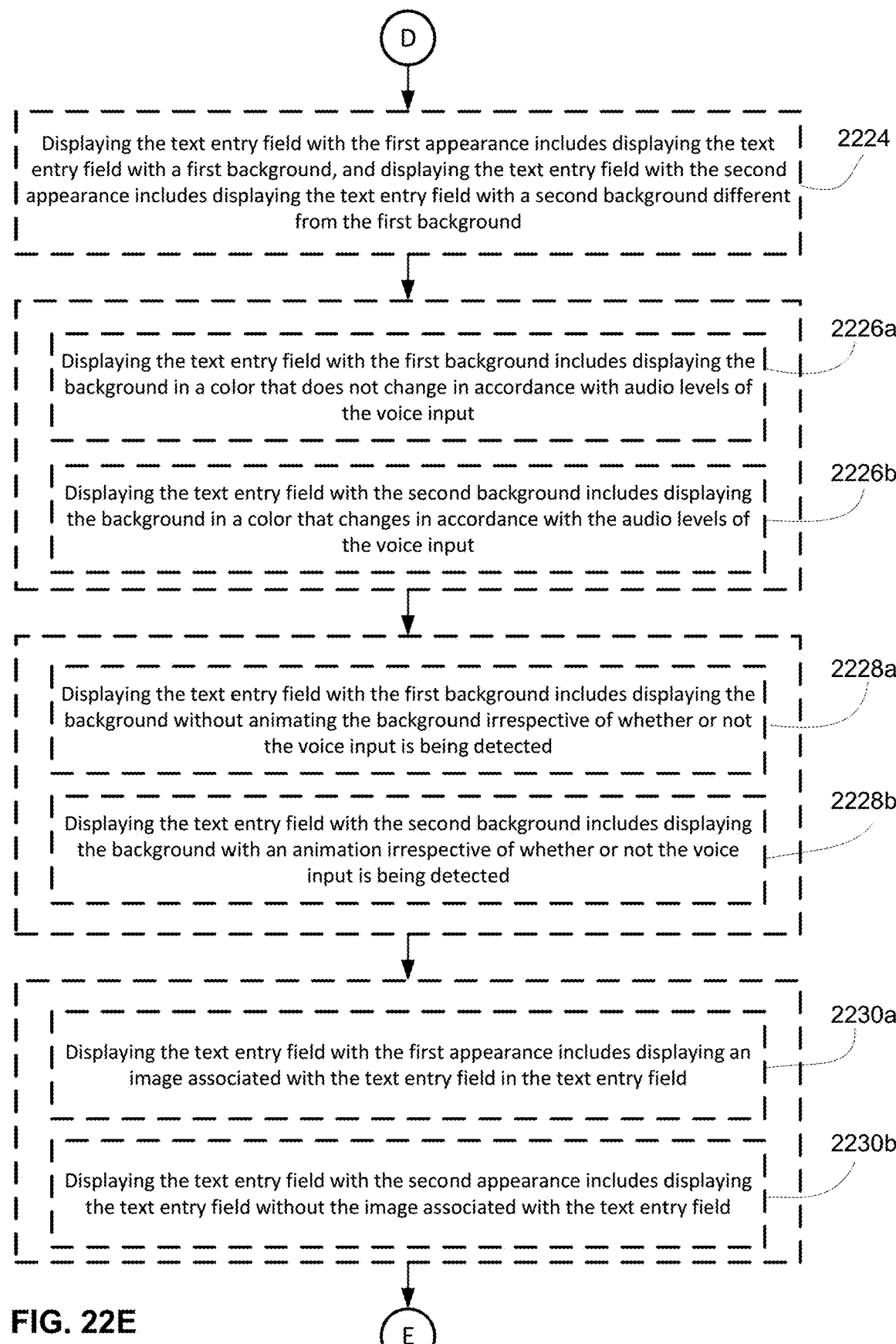

D

Displaying the text entry field with the first appearance includes displaying the text entry field with a first background, and displaying the text entry field with the second appearance includes displaying the text entry field with a second background different from the first background — 2224

Displaying the text entry field with the first background includes displaying the background in a color that does not change in accordance with audio levels of the voice input — 2226a Displaying the text entry field with the second background includes displaying the background in a color that changes in accordance with the audio levels of the voice input — 2226b Displaying the text entry field with the first background includes displaying the background without animating the background irrespective of whether or not the voice input is being detected — 2228a Displaying the text entry field with the second background includes displaying the background with an animation irrespective of whether or not the voice input is being detected — 2228b Displaying the text entry field with the first appearance includes displaying an image associated with the text entry field in the text entry field — 2230a Displaying the text entry field with the second appearance includes displaying the text entry field without the image associated with the text entry field — 2230b

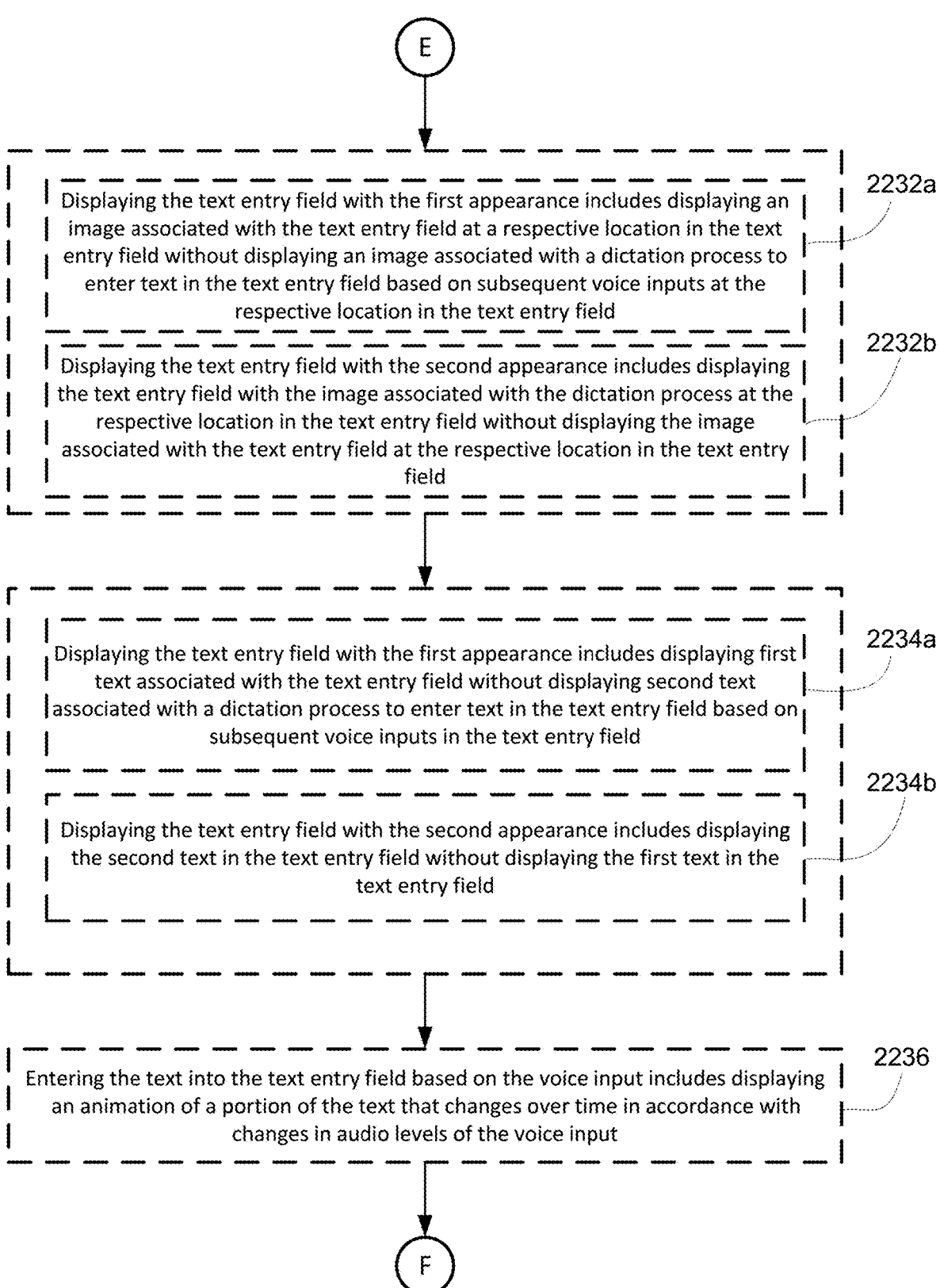

E

Displaying the text entry field with the first appearance includes displaying an image associated with the text entry field at a respective location in the text entry field without displaying an image associated with a dictation process to enter text in the text entry field based on subsequent voice inputs at the respective location in the text entry field                                                                     2232a Displaying the text entry field with the second appearance includes displaying the text entry field with the image associated with the dictation process at the respective location in the text entry field without displaying the image associated with the text entry field at the respective location in the text entry field                                                                     2232b Displaying the text entry field with the first appearance includes displaying first text associated with the text entry field without displaying second text associated with a dictation process to enter text in the text entry field based on subsequent voice inputs in the text entry field                                                                     2234a Displaying the text entry field with the second appearance includes displaying the second text in the text entry field without displaying the first text in the text entry field                                                                     2234b Entering the text into the text entry field based on the voice input includes displaying an animation of a portion of the text that changes over time in accordance with changes in audio levels of the voice input                                                                     2236

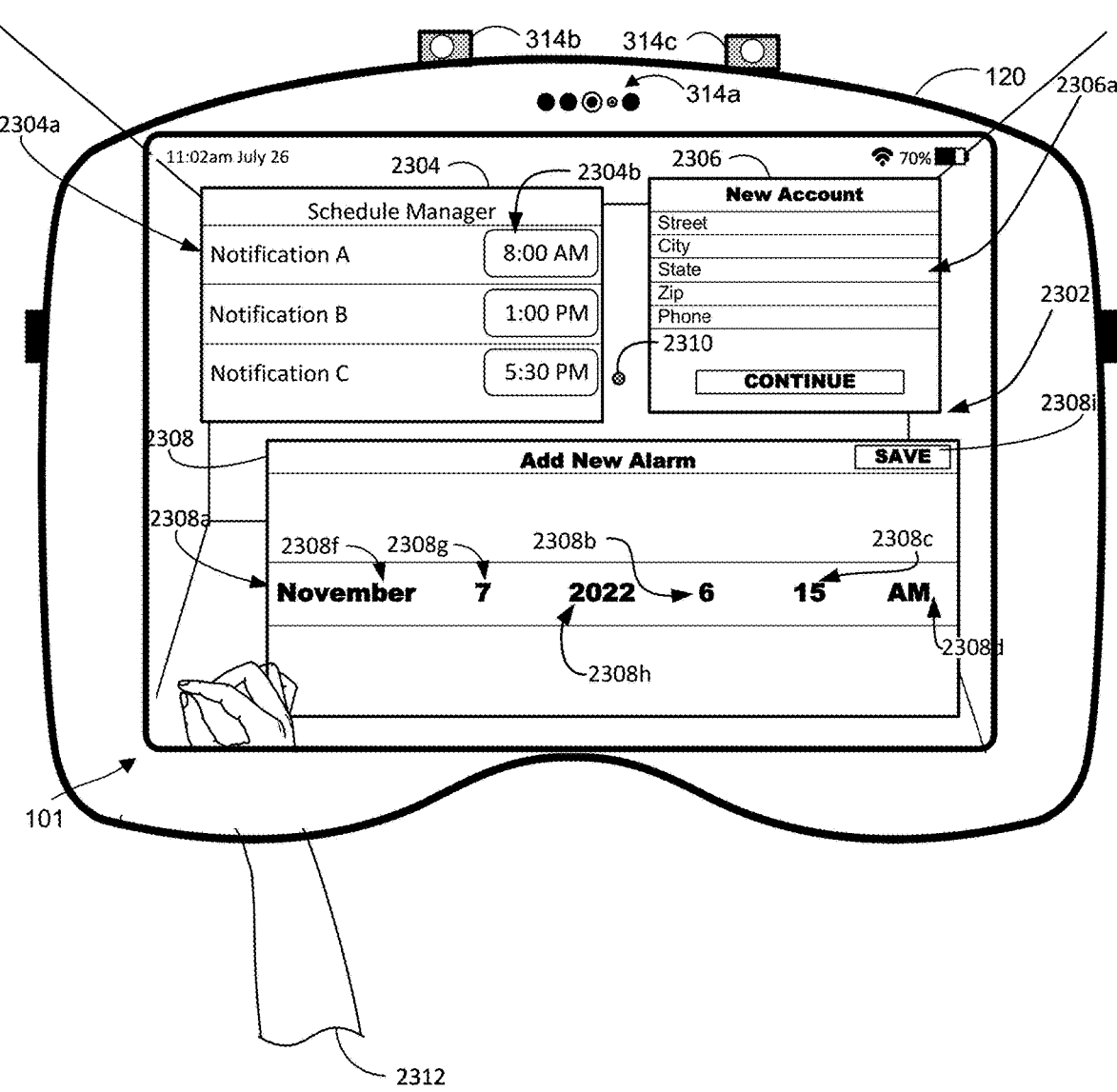
FIG. 23A1

2400

Display, via the display generation component, a user interface that includes a value selection user interface object for selecting a respective value having a plurality of components associated with the value selection user interface object, wherein the value selection user interface object includes:  — 2402a A first component element corresponding to a first set of value options for a first component of the respective value associated with the value selection user interface object  — 2402b A second component element corresponding to a second set of value options for a second component of the respective value associated with the value selection user interface object, wherein the second component element is different from the first component element and the second component element is displayed concurrently with the first component element  — 2402c While displaying the value selection user interface object including the first component element and the second component element, detect, via the one or more input devices, attention of a user of the computer system directed toward the first component element  — 2402d In response to detecting the attention of the user directed toward the first component element while the first component element corresponds to a first value for the first component element, visually emphasize the first component element relative to the second component element  — 2402e While the attention of the user is directed toward the first component element and while the first component element is visually emphasized relative to the second component element  — 2402f Navigate through the first set of value options for the first component of the respective value based on the attention of the user directed toward the first component element from the first value for the first component element to a second value for the first component element  — 2402g After navigating through the first set of value options for the first component of the respective value based on the attention of the user directed toward the first component element, initiate a process to update the respective value based on selection of the second value for the first component element  — 2402h FIG. 24A

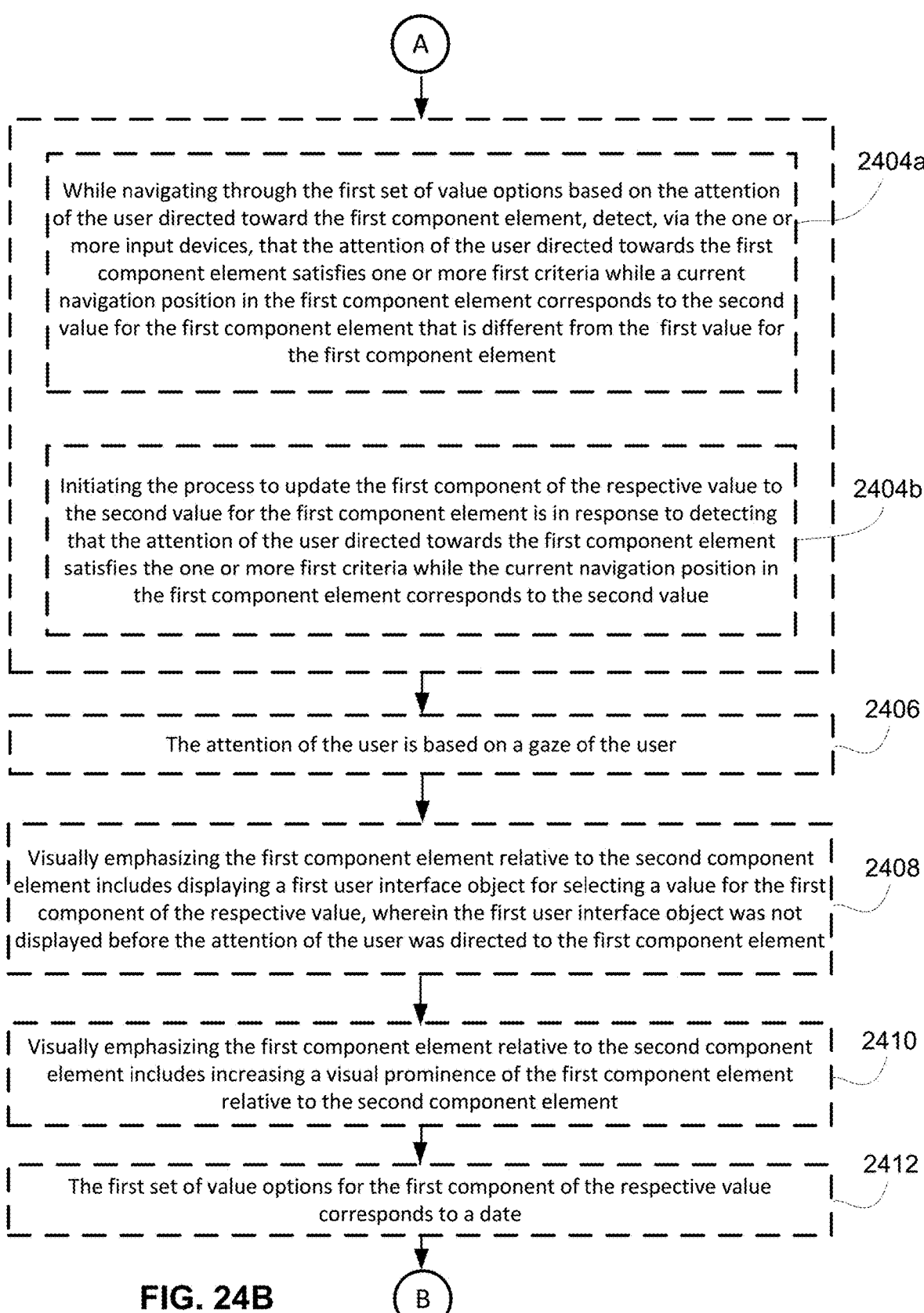

A

While navigating through the first set of value options based on the attention of the user directed toward the first component element, detect, via the one or more input devices, that the attention of the user directed towards the first component element satisfies one or more first criteria while a current navigation position in the first component element corresponds to the second value for the first component element that is different from the first value for the first component element 2404a Initiating the process to update the first component of the respective value to the second value for the first component element is in response to detecting that the attention of the user directed towards the first component element satisfies the one or more first criteria while the current navigation position in the first component element corresponds to the second value 2404b The attention of the user is based on a gaze of the user

2406

Visually emphasizing the first component element relative to the second component element includes displaying a first user interface object for selecting a value for the first component of the respective value, wherein the first user interface object was not displayed before the attention of the user was directed to the first component element

2408

Visually emphasizing the first component element relative to the second component element includes increasing a visual prominence of the first component element relative to the second component element

2410

The first set of value options for the first component of the respective value corresponds to a date

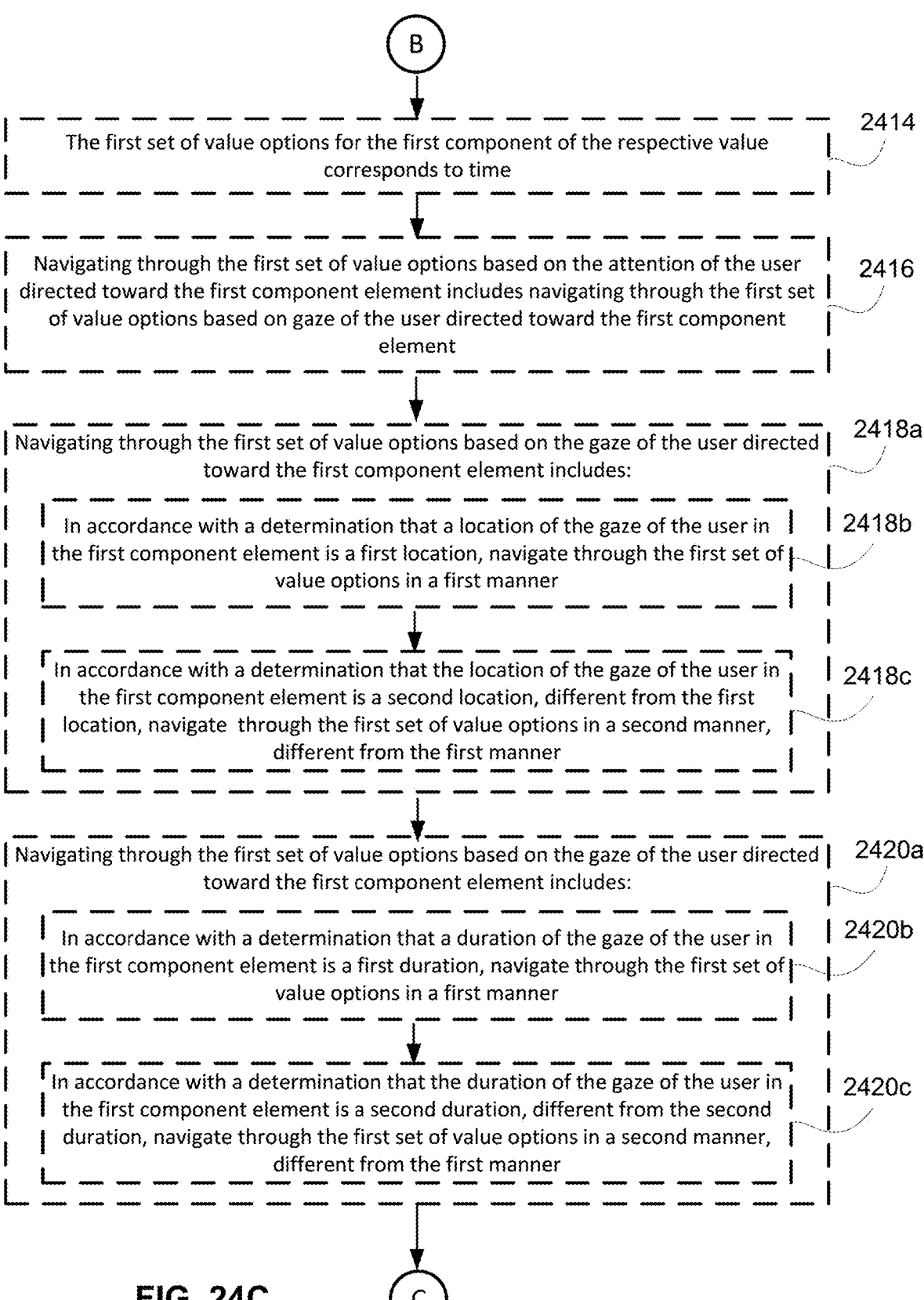

B

2414
The first set of value options for the first component of the respective value corresponds to time 2416
Navigating through the first set of value options based on the attention of the user directed toward the first component element includes navigating through the first set of value options based on gaze of the user directed toward the first component element 2418a
Navigating through the first set of value options based on the gaze of the user directed toward the first component element includes:

2418b
In accordance with a determination that a location of the gaze of the user in the first component element is a first location, navigate through the first set of value options in a first manner 2418c
In accordance with a determination that the location of the gaze of the user in the first component element is a second location, different from the first location, navigate through the first set of value options in a second manner, different from the first manner 2420a
Navigating through the first set of value options based on the gaze of the user directed toward the first component element includes:

2420b
In accordance with a determination that a duration of the gaze of the user in the first component element is a first duration, navigate through the first set of value options in a first manner 2420c
In accordance with a determination that the duration of the gaze of the user in the first component element is a second duration, different from the second duration, navigate through the first set of value options in a second manner, different from the first manner

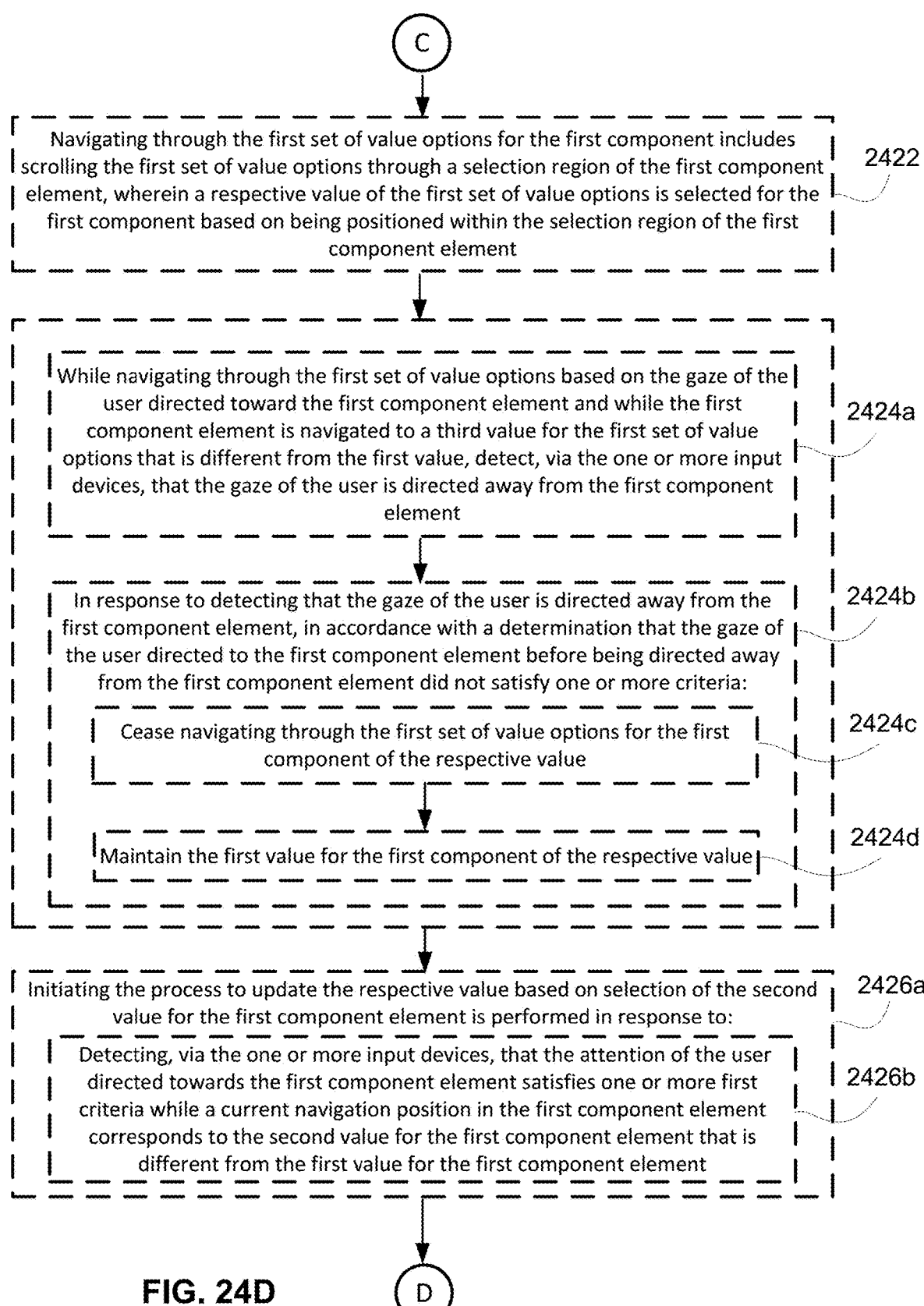

C

Navigating through the first set of value options for the first component includes scrolling the first set of value options through a selection region of the first component element, wherein a respective value of the first set of value options is selected for the first component based on being positioned within the selection region of the first component element — 2422

While navigating through the first set of value options based on the gaze of the user directed toward the first component element and while the first component element is navigated to a third value for the first set of value options that is different from the first value, detect, via the one or more input devices, that the gaze of the user is directed away from the first component element — 2424a In response to detecting that the gaze of the user is directed away from the first component element, in accordance with a determination that the gaze of the user directed to the first component element before being directed away from the first component element did not satisfy one or more criteria: — 2424b Cease navigating through the first set of value options for the first component of the respective value — 2424c Maintain the first value for the first component of the respective value — 2424d Initiating the process to update the respective value based on selection of the second value for the first component element is performed in response to: — 2426a Detecting, via the one or more input devices, that the attention of the user directed towards the first component element satisfies one or more first criteria while a current navigation position in the first component element corresponds to the second value for the first component element that is different from the first value for the first component element — 2426b

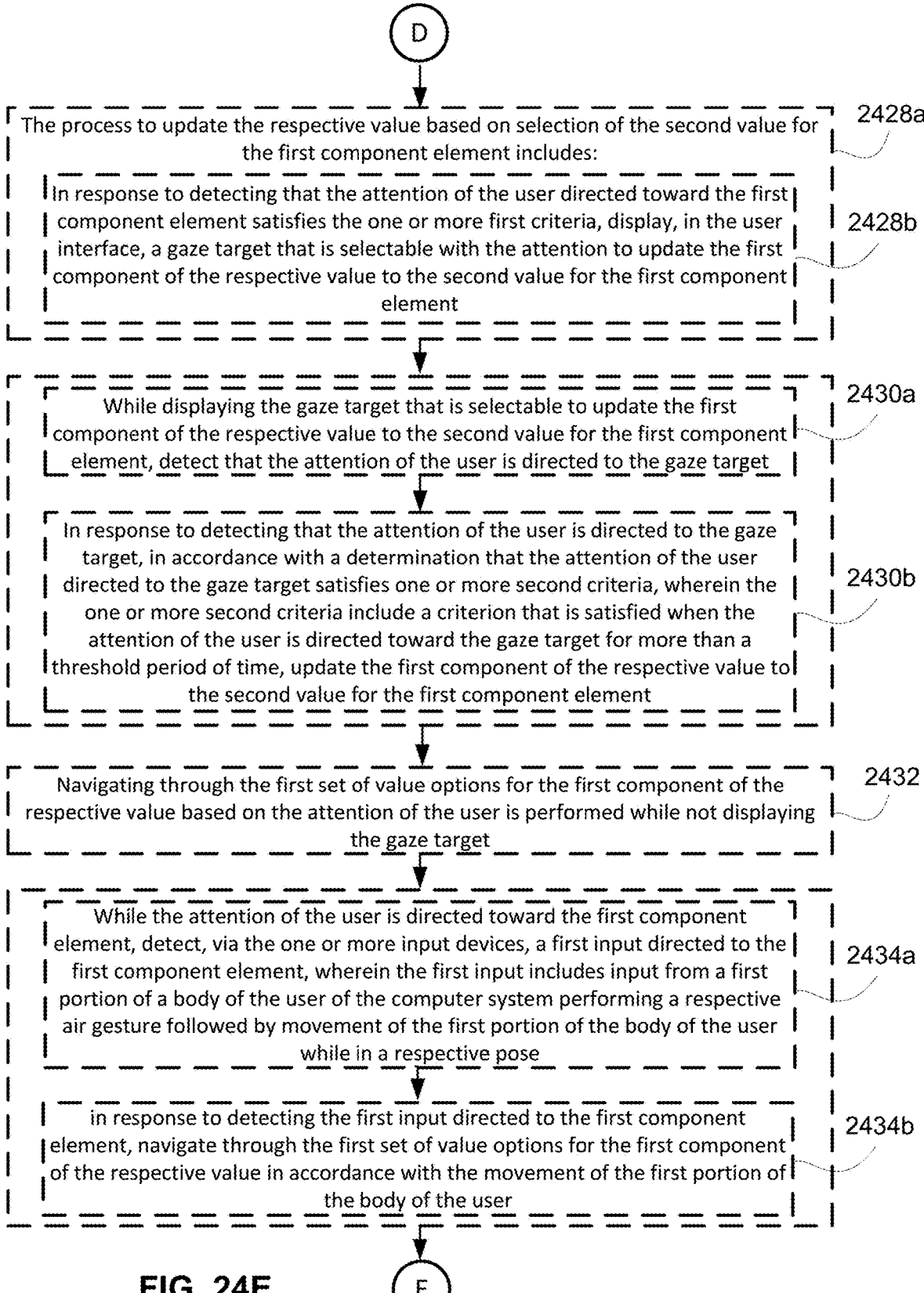

(D)

The process to update the respective value based on selection of the second value for the first component element includes: — 2428a In response to detecting that the attention of the user directed toward the first component element satisfies the one or more first criteria, display, in the user interface, a gaze target that is selectable with the attention to update the first component of the respective value to the second value for the first component element — 2428b While displaying the gaze target that is selectable to update the first component of the respective value to the second value for the first component element, detect that the attention of the user is directed to the gaze target — 2430a In response to detecting that the attention of the user is directed to the gaze target, in accordance with a determination that the attention of the user directed to the gaze target satisfies one or more second criteria, wherein the one or more second criteria include a criterion that is satisfied when the attention of the user is directed toward the gaze target for more than a threshold period of time, update the first component of the respective value to the second value for the first component element — 2430b Navigating through the first set of value options for the first component of the respective value based on the attention of the user is performed while not displaying the gaze target — 2432

While the attention of the user is directed toward the first component element, detect, via the one or more input devices, a first input directed to the first component element, wherein the first input includes input from a first portion of a body of the user of the computer system performing a respective air gesture followed by movement of the first portion of the body of the user while in a respective pose — 2434a in response to detecting the first input directed to the first component element, navigate through the first set of value options for the first component of the respective value in accordance with the movement of the first portion of the body of the user — 2434b

FIG. 24E    (E)

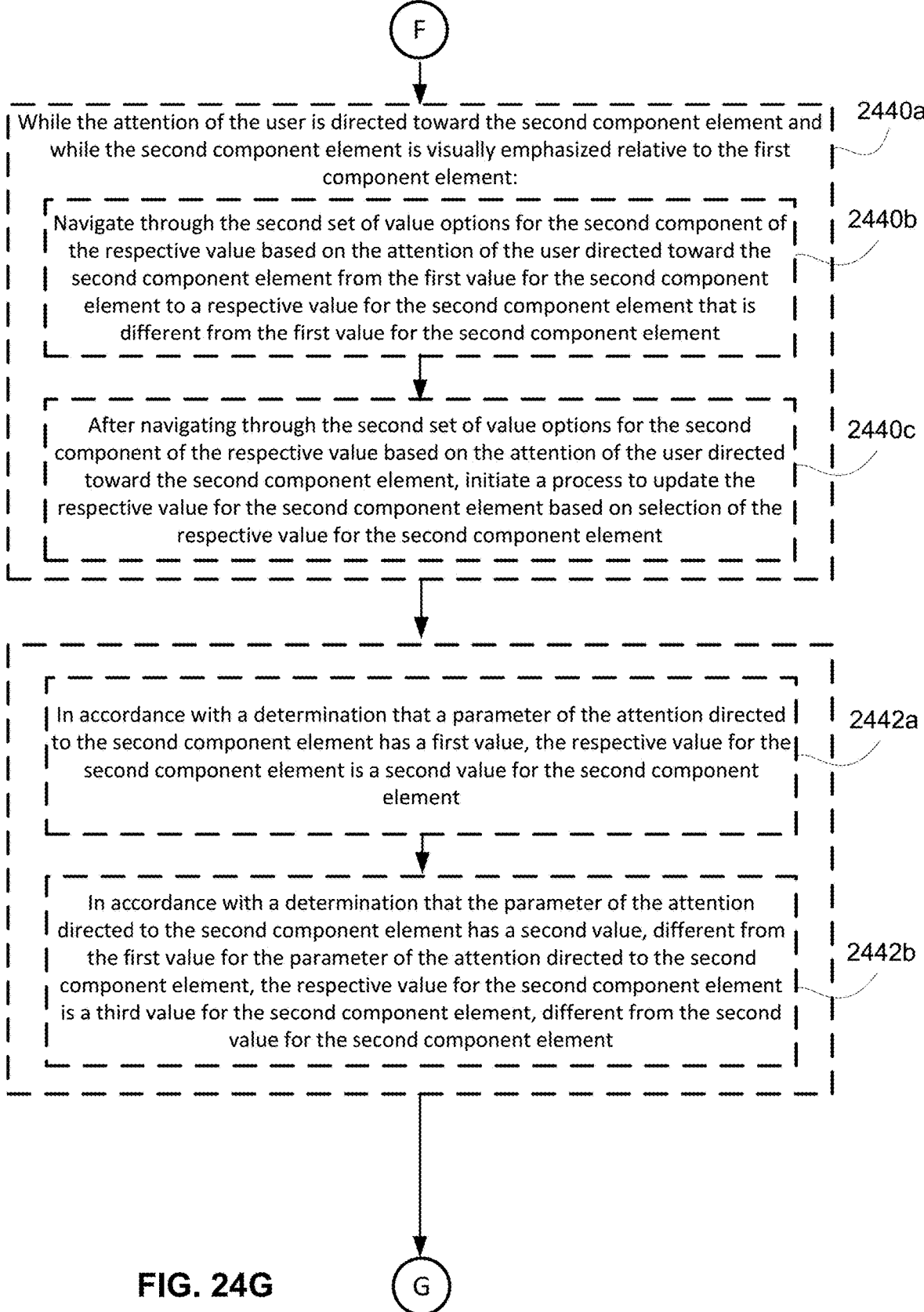

F

While the attention of the user is directed toward the second component element and while the second component element is visually emphasized relative to the first component element:
— 2440a Navigate through the second set of value options for the second component of the respective value based on the attention of the user directed toward the second component element from the first value for the second component element to a respective value for the second component element that is different from the first value for the second component element
— 2440b After navigating through the second set of value options for the second component of the respective value based on the attention of the user directed toward the second component element, initiate a process to update the respective value for the second component element based on selection of the respective value for the second component element
— 2440c In accordance with a determination that a parameter of the attention directed to the second component element has a first value, the respective value for the second component element is a second value for the second component element
— 2442a In accordance with a determination that the parameter of the attention directed to the second component element has a second value, different from the first value for the parameter of the attention directed to the second component element, the respective value for the second component element is a third value for the second component element, different from the second value for the second component element
— 2442b

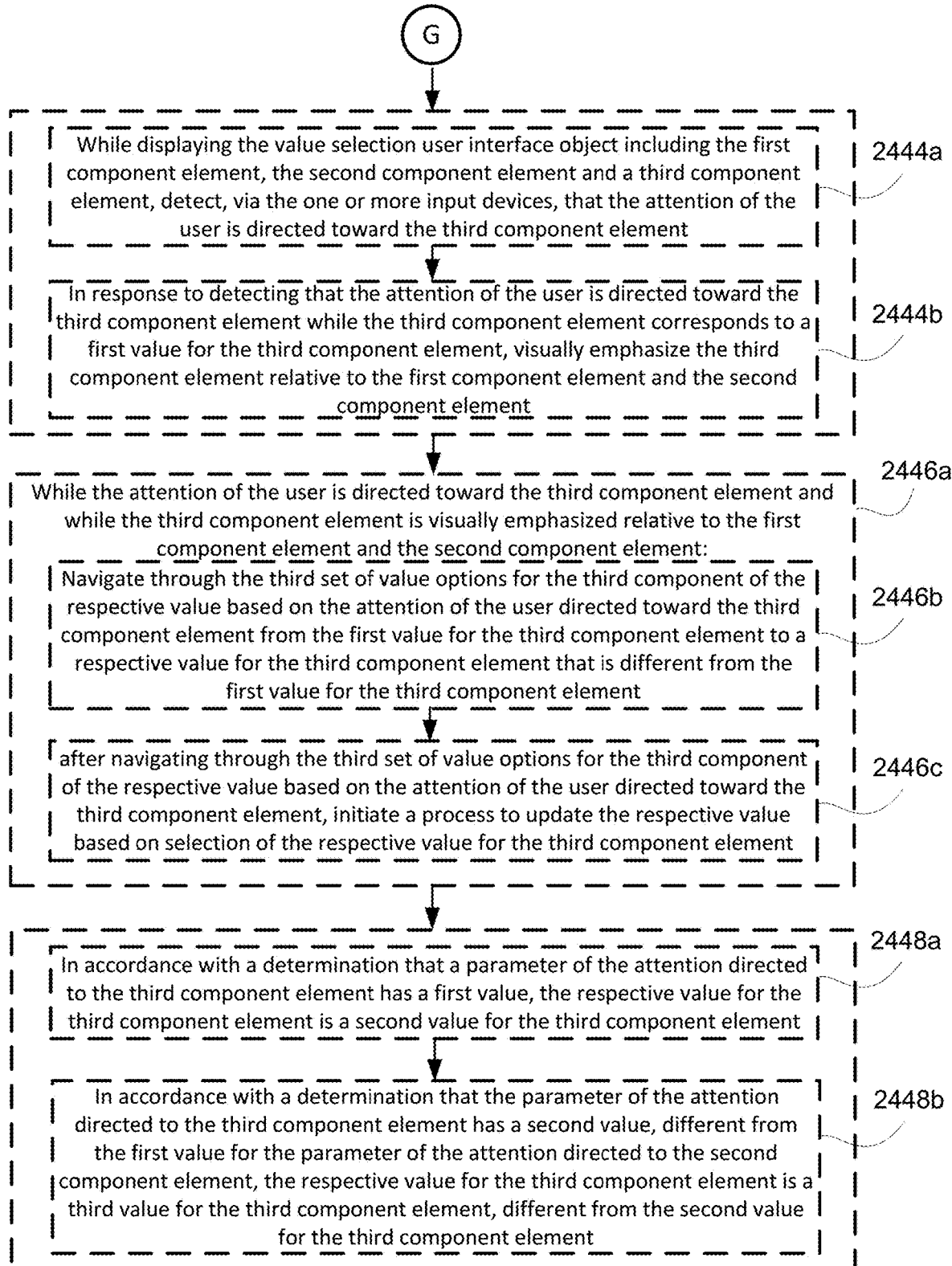

While displaying the value selection user interface object including the first component element, the second component element and a third component element, detect, via the one or more input devices, that the attention of the user is directed toward the third component element — 2444a In response to detecting that the attention of the user is directed toward the third component element while the third component element corresponds to a first value for the third component element, visually emphasize the third component element relative to the first component element and the second component element — 2444b While the attention of the user is directed toward the third component element and while the third component element is visually emphasized relative to the first component element and the second component element: — 2446a Navigate through the third set of value options for the third component of the respective value based on the attention of the user directed toward the third component element from the first value for the third component element to a respective value for the third component element that is different from the first value for the third component element — 2446b after navigating through the third set of value options for the third component of the respective value based on the attention of the user directed toward the third component element, initiate a process to update the respective value based on selection of the respective value for the third component element — 2446c In accordance with a determination that a parameter of the attention directed to the third component element has a first value, the respective value for the third component element is a second value for the third component element — 2448a In accordance with a determination that the parameter of the attention directed to the third component element has a second value, different from the first value for the parameter of the attention directed to the second component element, the respective value for the third component element is a third value for the third component element, different from the second value for the third component element — 2448b

FIG. 24H

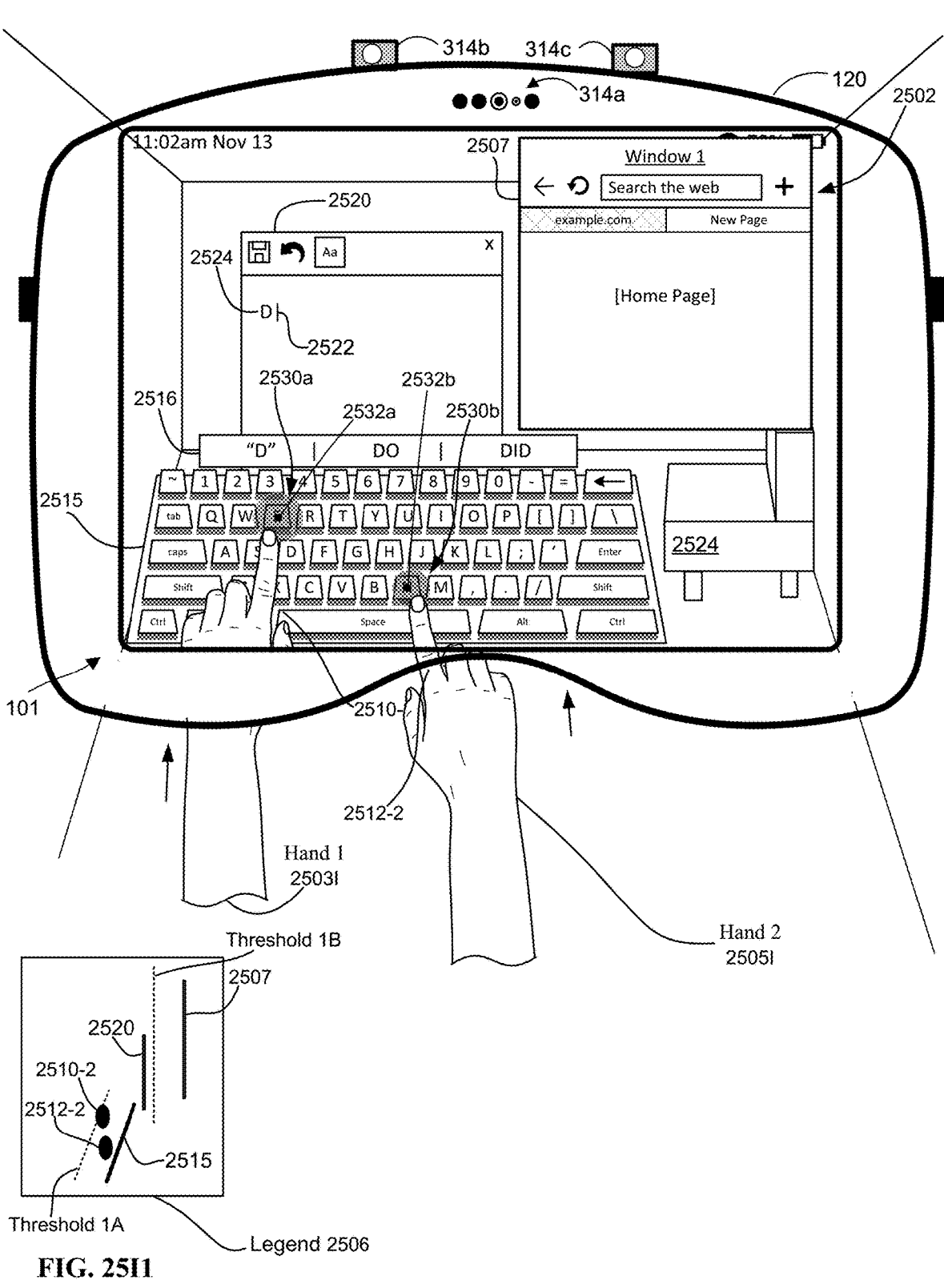
FIG. 25I1

2600
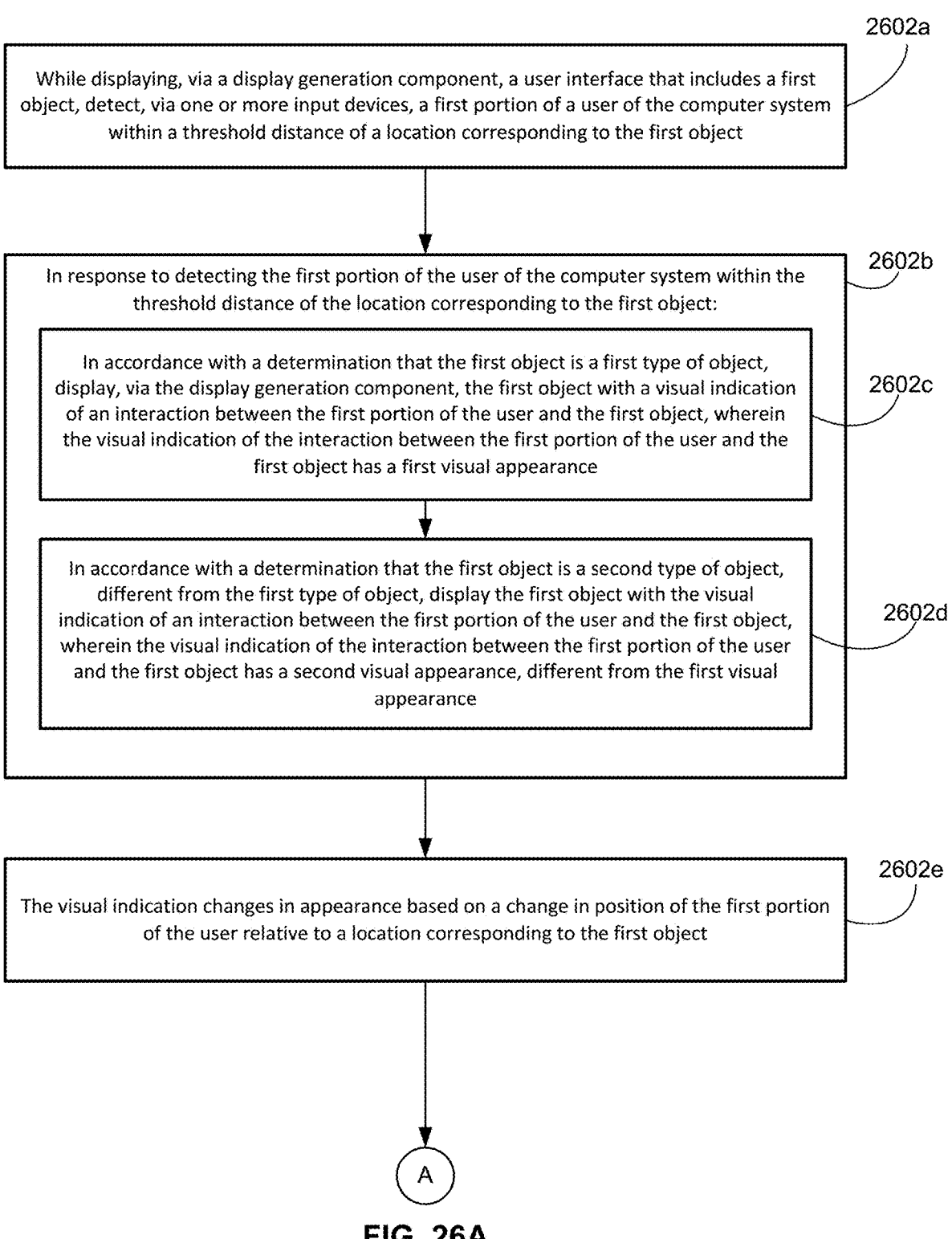

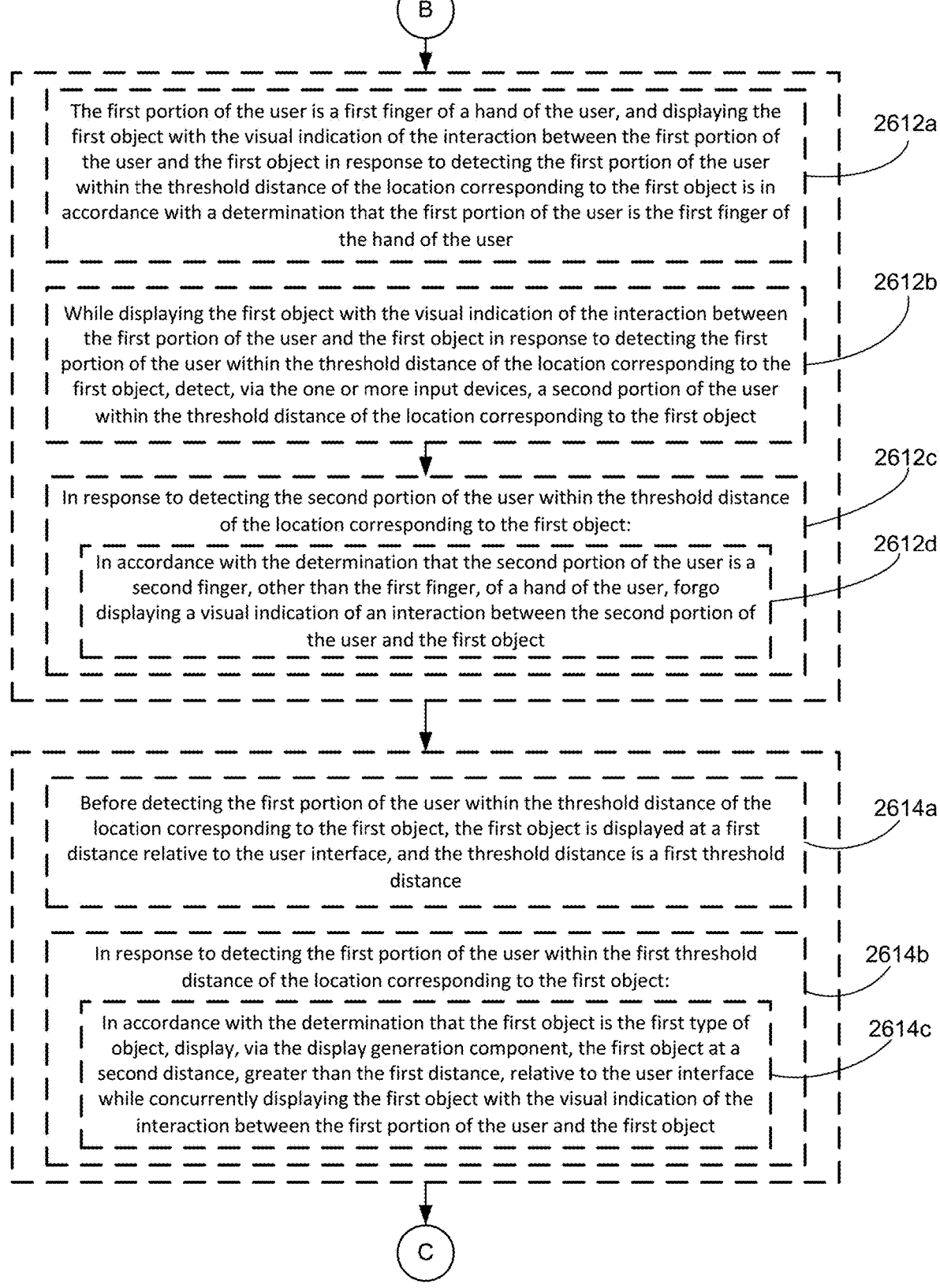

B

The first portion of the user is a first finger of a hand of the user, and displaying the first object with the visual indication of the interaction between the first portion of the user and the first object in response to detecting the first portion of the user within the threshold distance of the location corresponding to the first object is in accordance with a determination that the first portion of the user is the first finger of the hand of the user 2612a While displaying the first object with the visual indication of the interaction between the first portion of the user and the first object in response to detecting the first portion of the user within the threshold distance of the location corresponding to the first object, detect, via the one or more input devices, a second portion of the user within the threshold distance of the location corresponding to the first object 2612b In response to detecting the second portion of the user within the threshold distance of the location corresponding to the first object:

2612c

In accordance with the determination that the second portion of the user is a second finger, other than the first finger, of a hand of the user, forgo displaying a visual indication of an interaction between the second portion of the user and the first object 2612d Before detecting the first portion of the user within the threshold distance of the location corresponding to the first object, the first object is displayed at a first distance relative to the user interface, and the threshold distance is a first threshold distance 2614a In response to detecting the first portion of the user within the first threshold distance of the location corresponding to the first object:

2614b

In accordance with the determination that the first object is the first type of object, display, via the display generation component, the first object at a second distance, greater than the first distance, relative to the user interface while concurrently displaying the first object with the visual indication of the interaction between the first portion of the user and the first object 2614c

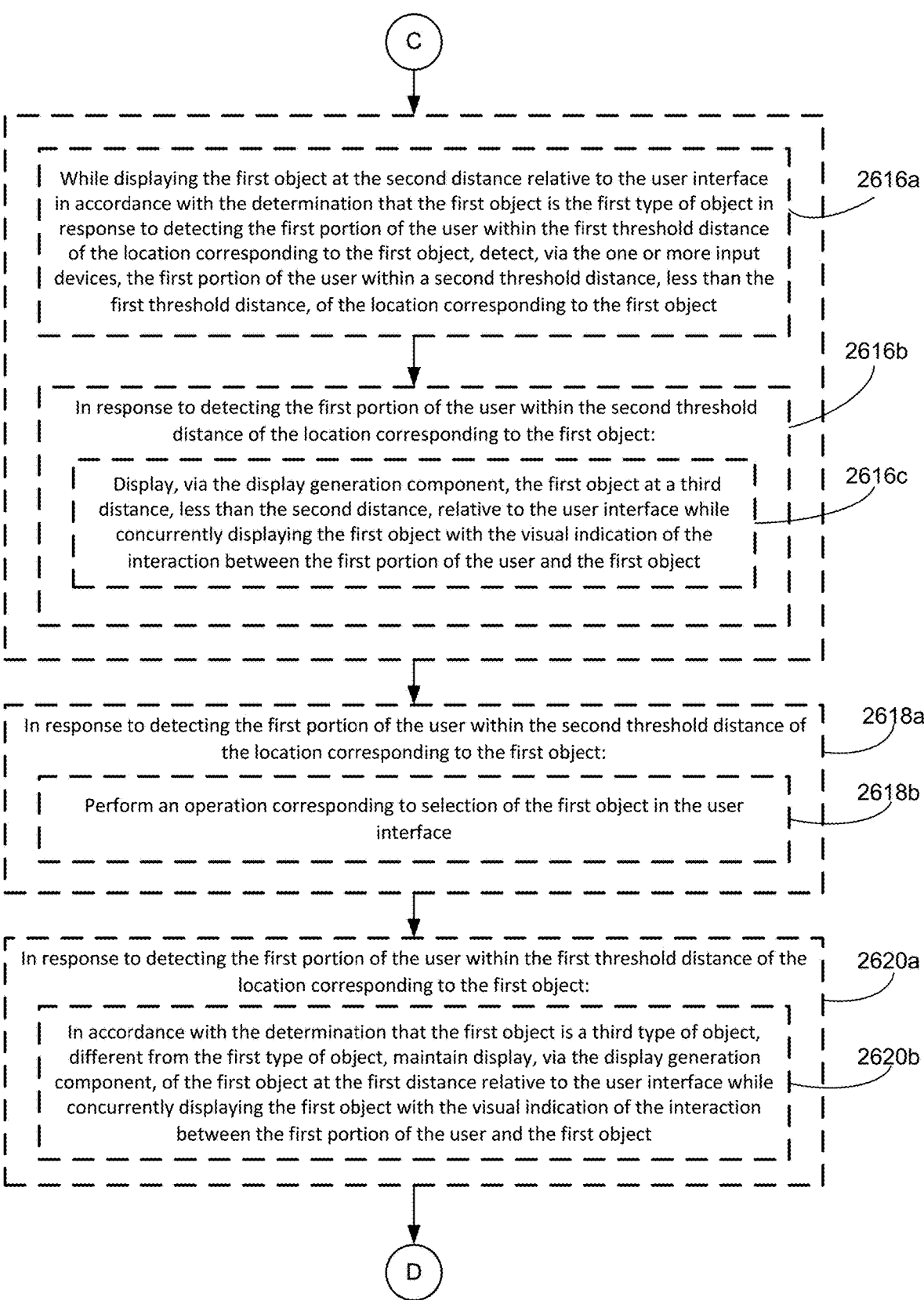

C

While displaying the first object at the second distance relative to the user interface in accordance with the determination that the first object is the first type of object in response to detecting the first portion of the user within the first threshold distance of the location corresponding to the first object, detect, via the one or more input devices, the first portion of the user within a second threshold distance, less than the first threshold distance, of the location corresponding to the first object          2616a In response to detecting the first portion of the user within the second threshold distance of the location corresponding to the first object:          2616b Display, via the display generation component, the first object at a third distance, less than the second distance, relative to the user interface while concurrently displaying the first object with the visual indication of the interaction between the first portion of the user and the first object          2616c In response to detecting the first portion of the user within the second threshold distance of the location corresponding to the first object:          2618a Perform an operation corresponding to selection of the first object in the user interface          2618b In response to detecting the first portion of the user within the first threshold distance of the location corresponding to the first object:          2620a In accordance with the determination that the first object is a third type of object, different from the first type of object, maintain display, via the display generation component, of the first object at the first distance relative to the user interface while concurrently displaying the first object with the visual indication of the interaction between the first portion of the user and the first object          2620b

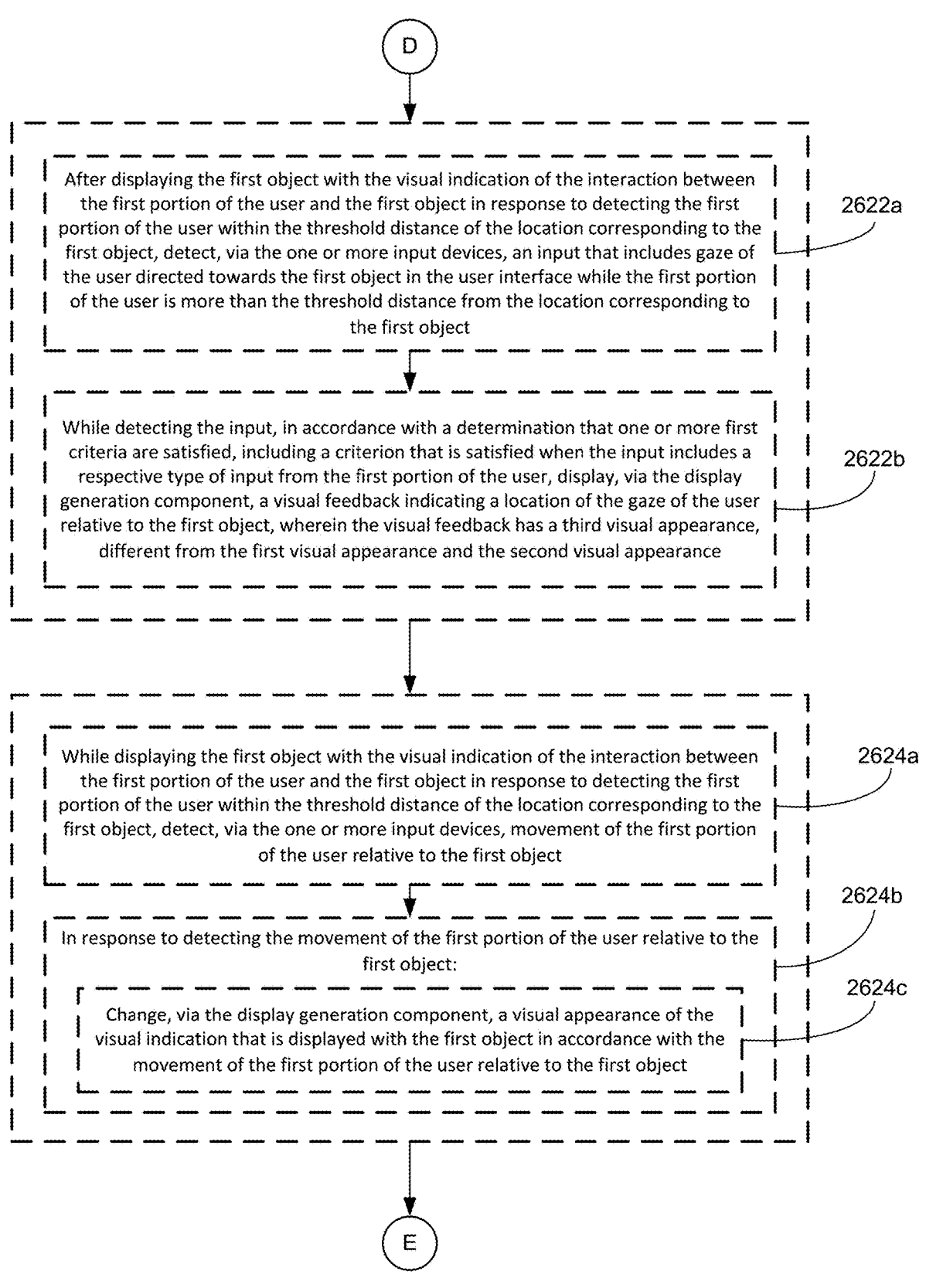

D

After displaying the first object with the visual indication of the interaction between the first portion of the user and the first object in response to detecting the first portion of the user within the threshold distance of the location corresponding to the first object, detect, via the one or more input devices, an input that includes gaze of the user directed towards the first object in the user interface while the first portion of the user is more than the threshold distance from the location corresponding to the first object 2622a While detecting the input, in accordance with a determination that one or more first criteria are satisfied, including a criterion that is satisfied when the input includes a respective type of input from the first portion of the user, display, via the display generation component, a visual feedback indicating a location of the gaze of the user relative to the first object, wherein the visual feedback has a third visual appearance, different from the first visual appearance and the second visual appearance 2622b While displaying the first object with the visual indication of the interaction between the first portion of the user and the first object in response to detecting the first portion of the user within the threshold distance of the location corresponding to the first object, detect, via the one or more input devices, movement of the first portion of the user relative to the first object 2624a In response to detecting the movement of the first portion of the user relative to the first object:

2624b

Change, via the display generation component, a visual appearance of the visual indication that is displayed with the first object in accordance with the movement of the first portion of the user relative to the first object 2624c

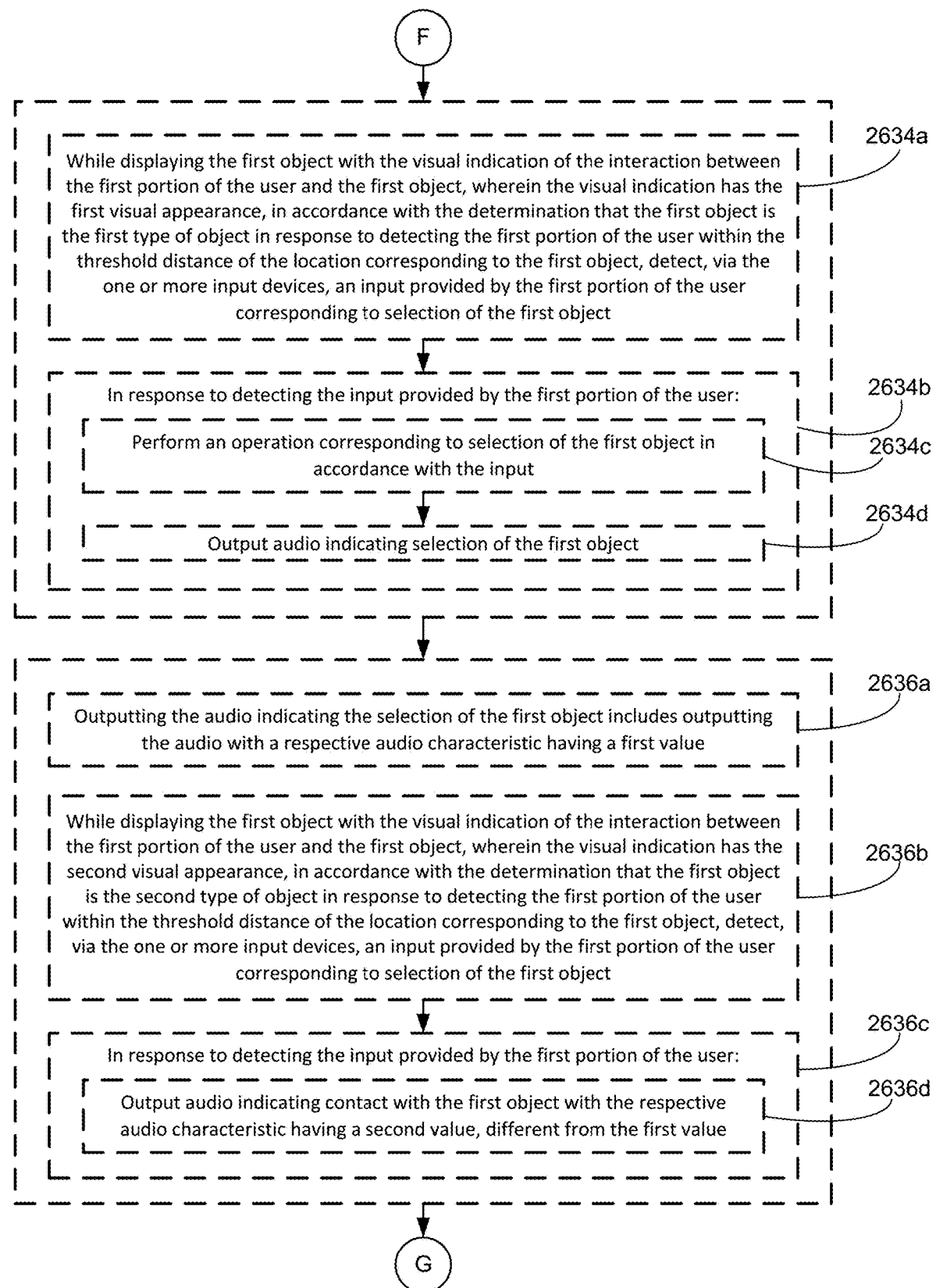

F

While displaying the first object with the visual indication of the interaction between the first portion of the user and the first object, wherein the visual indication has the first visual appearance, in accordance with the determination that the first object is the first type of object in response to detecting the first portion of the user within the threshold distance of the location corresponding to the first object, detect, via the one or more input devices, an input provided by the first portion of the user corresponding to selection of the first object 2634a In response to detecting the input provided by the first portion of the user:

2634b

Perform an operation corresponding to selection of the first object in accordance with the input 2634c Output audio indicating selection of the first object 2634d Outputting the audio indicating the selection of the first object includes outputting the audio with a respective audio characteristic having a first value 2636a While displaying the first object with the visual indication of the interaction between the first portion of the user and the first object, wherein the visual indication has the second visual appearance, in accordance with the determination that the first object is the second type of object in response to detecting the first portion of the user within the threshold distance of the location corresponding to the first object, detect, via the one or more input devices, an input provided by the first portion of the user corresponding to selection of the first object 2636b In response to detecting the input provided by the first portion of the user:

2636c

Output audio indicating contact with the first object with the respective audio characteristic having a second value, different from the first value 2636d

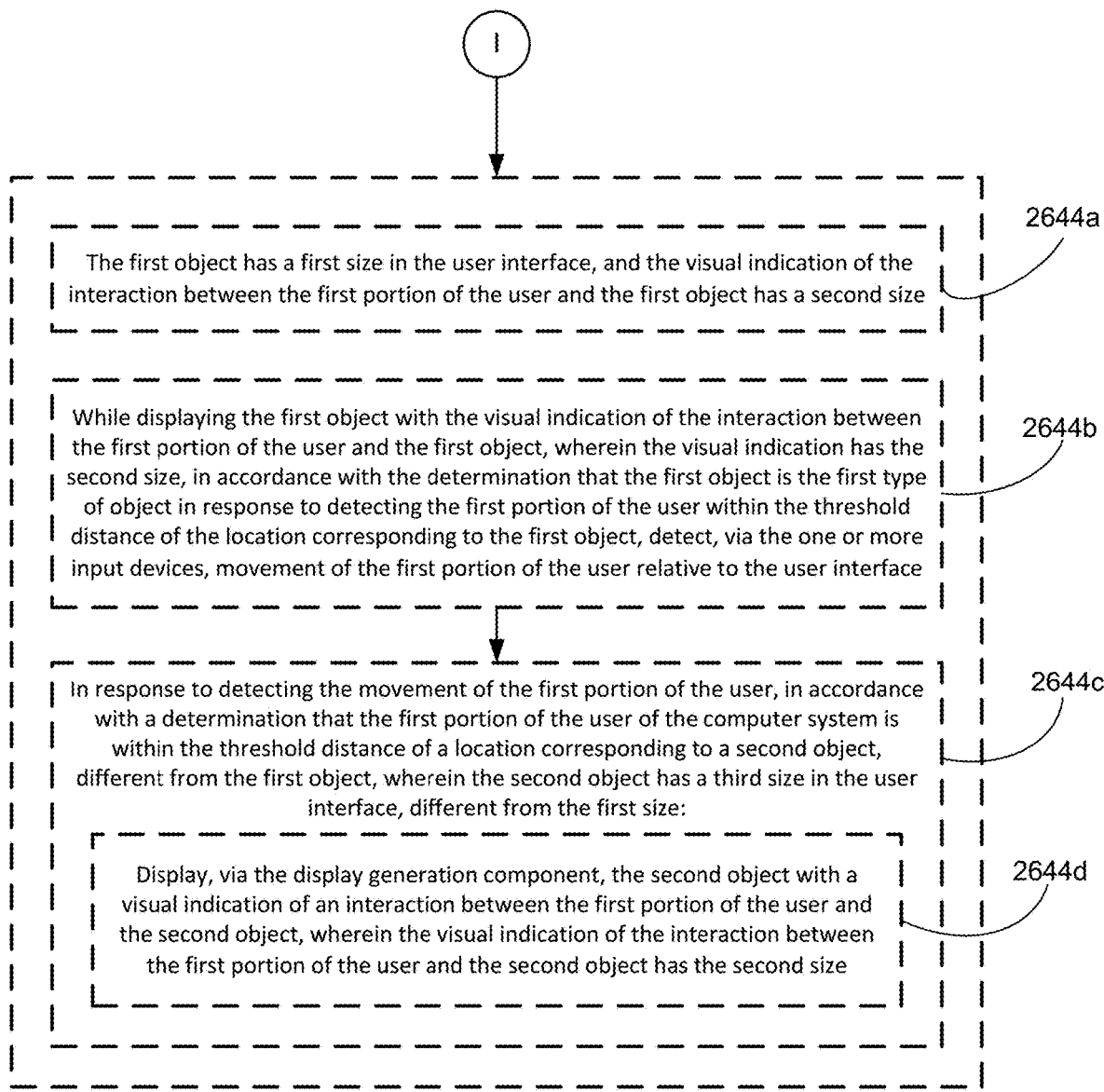

The first object has a first size in the user interface, and the visual indication of the interaction between the first portion of the user and the first object has a second size          2644a While displaying the first object with the visual indication of the interaction between the first portion of the user and the first object, wherein the visual indication has the second size, in accordance with the determination that the first object is the first type of object in response to detecting the first portion of the user within the threshold distance of the location corresponding to the first object, detect, via the one or more input devices, movement of the first portion of the user relative to the user interface          2644b In response to detecting the movement of the first portion of the user, in accordance with a determination that the first portion of the user of the computer system is within the threshold distance of a location corresponding to a second object, different from the first object, wherein the second object has a third size in the user interface, different from the first size:          2644c Display, via the display generation component, the second object with a visual indication of an interaction between the first portion of the user and the second object, wherein the visual indication of the interaction between the first portion of the user and the second object has the second size          2644d

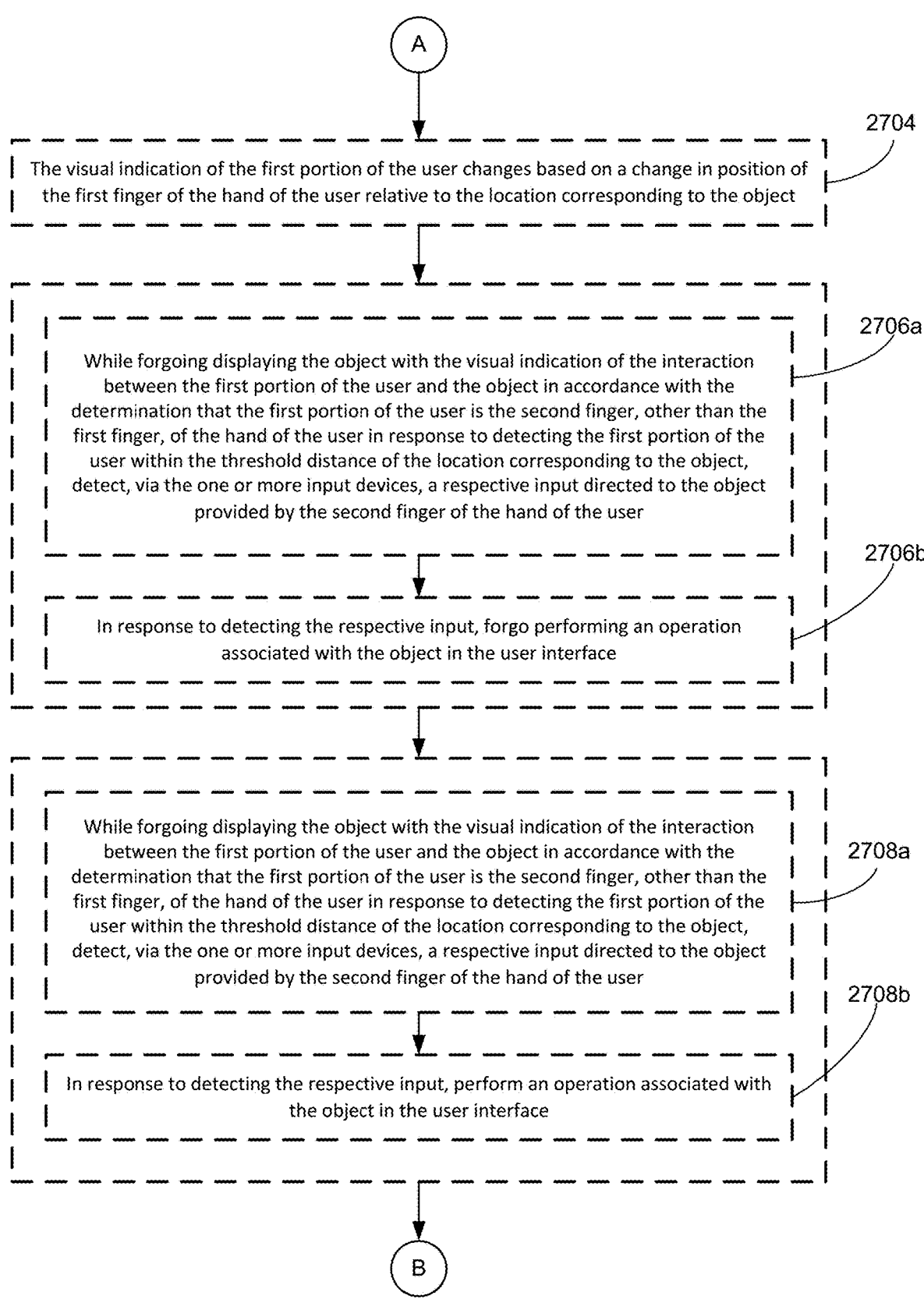

(A)

2704
The visual indication of the first portion of the user changes based on a change in position of the first finger of the hand of the user relative to the location corresponding to the object 2706a
While forgoing displaying the object with the visual indication of the interaction between the first portion of the user and the object in accordance with the determination that the first portion of the user is the second finger, other than the first finger, of the hand of the user in response to detecting the first portion of the user within the threshold distance of the location corresponding to the object, detect, via the one or more input devices, a respective input directed to the object provided by the second finger of the hand of the user 2706b
In response to detecting the respective input, forgo performing an operation associated with the object in the user interface 2708a
While forgoing displaying the object with the visual indication of the interaction between the first portion of the user and the object in accordance with the determination that the first portion of the user is the second finger, other than the first finger, of the hand of the user in response to detecting the first portion of the user within the threshold distance of the location corresponding to the object, detect, via the one or more input devices, a respective input directed to the object provided by the second finger of the hand of the user 2708b
In response to detecting the respective input, perform an operation associated with the object in the user interface (B)

FIG. 27B

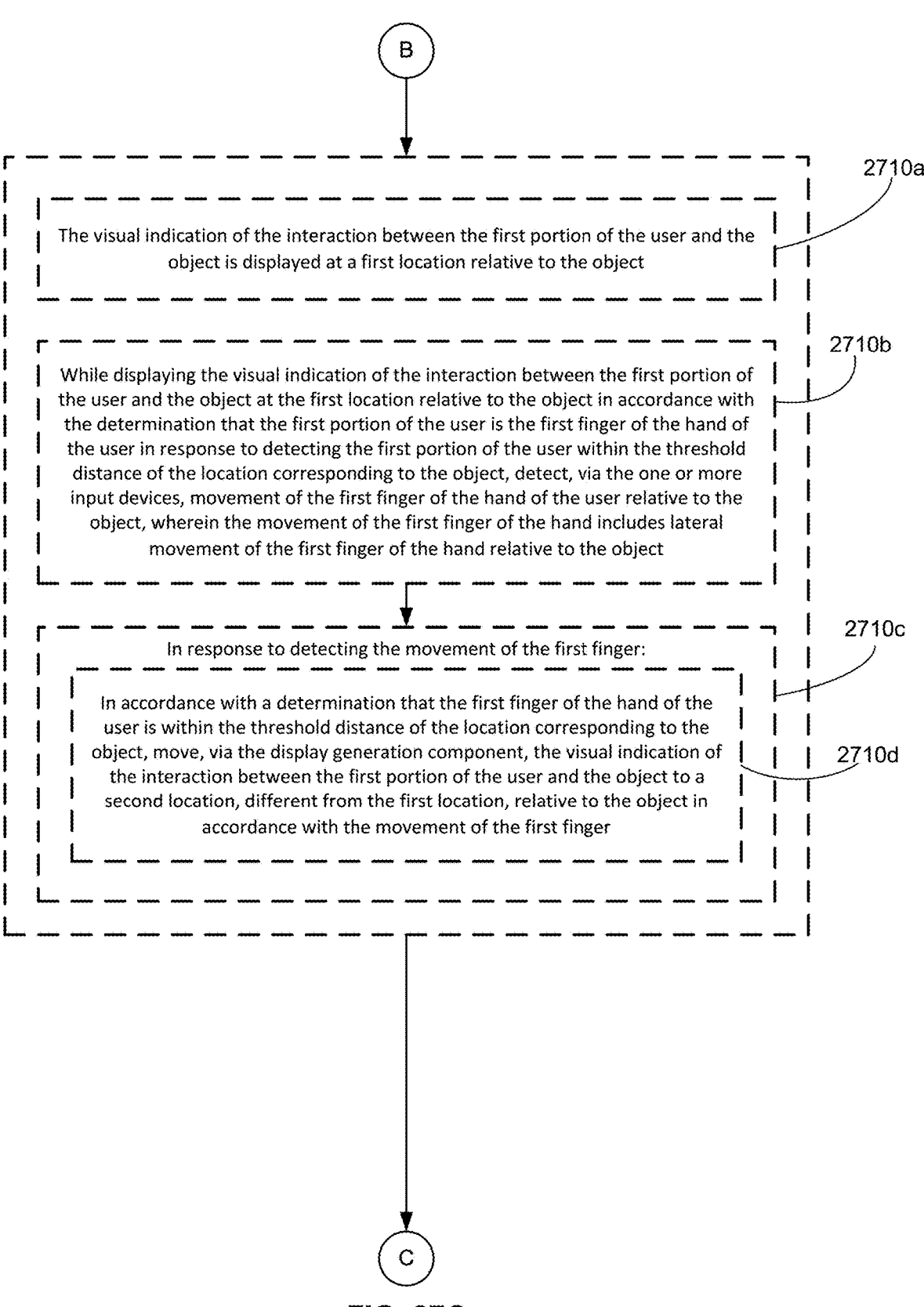

B

The visual indication of the interaction between the first portion of the user and the object is displayed at a first location relative to the object 2710a While displaying the visual indication of the interaction between the first portion of the user and the object at the first location relative to the object in accordance with the determination that the first portion of the user is the first finger of the hand of the user in response to detecting the first portion of the user within the threshold distance of the location corresponding to the object, detect, via the one or more input devices, movement of the first finger of the hand of the user relative to the object, wherein the movement of the first finger of the hand includes lateral movement of the first finger of the hand relative to the object 2710b In response to detecting the movement of the first finger:

In accordance with a determination that the first finger of the hand of the user is within the threshold distance of the location corresponding to the object, move, via the display generation component, the visual indication of the interaction between the first portion of the user and the object to a second location, different from the first location, relative to the object in accordance with the movement of the first finger 2710c 2710d

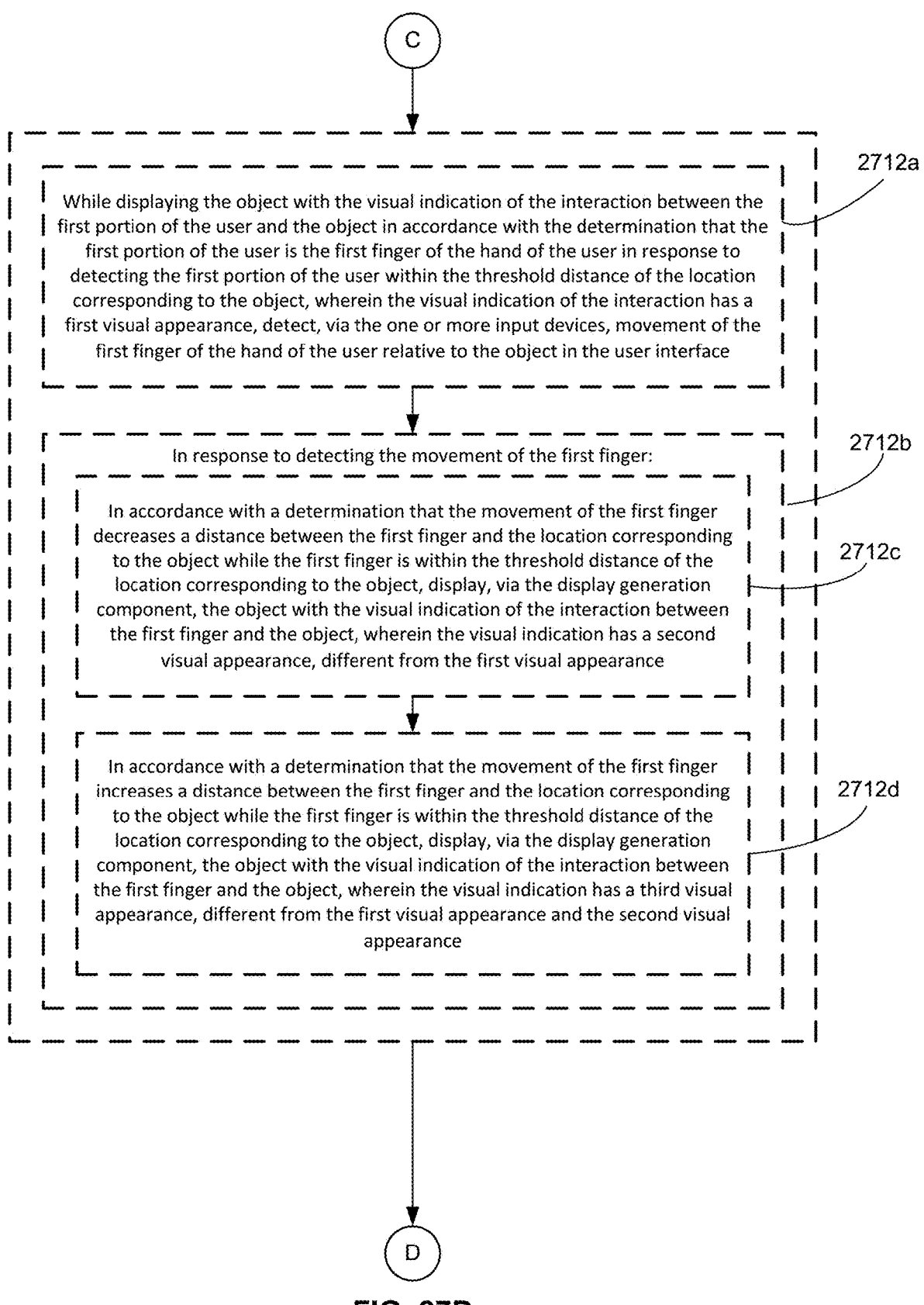

C

While displaying the object with the visual indication of the interaction between the first portion of the user and the object in accordance with the determination that the first portion of the user is the first finger of the hand of the user in response to detecting the first portion of the user within the threshold distance of the location corresponding to the object, wherein the visual indication of the interaction has a first visual appearance, detect, via the one or more input devices, movement of the first finger of the hand of the user relative to the object in the user interface 2712a In response to detecting the movement of the first finger:

2712b

In accordance with a determination that the movement of the first finger decreases a distance between the first finger and the location corresponding to the object while the first finger is within the threshold distance of the location corresponding to the object, display, via the display generation component, the object with the visual indication of the interaction between the first finger and the object, wherein the visual indication has a second visual appearance, different from the first visual appearance 2712c In accordance with a determination that the movement of the first finger increases a distance between the first finger and the location corresponding to the object while the first finger is within the threshold distance of the location corresponding to the object, display, via the display generation component, the object with the visual indication of the interaction between the first finger and the object, wherein the visual indication has a third visual appearance, different from the first visual appearance and the second visual appearance 2712d

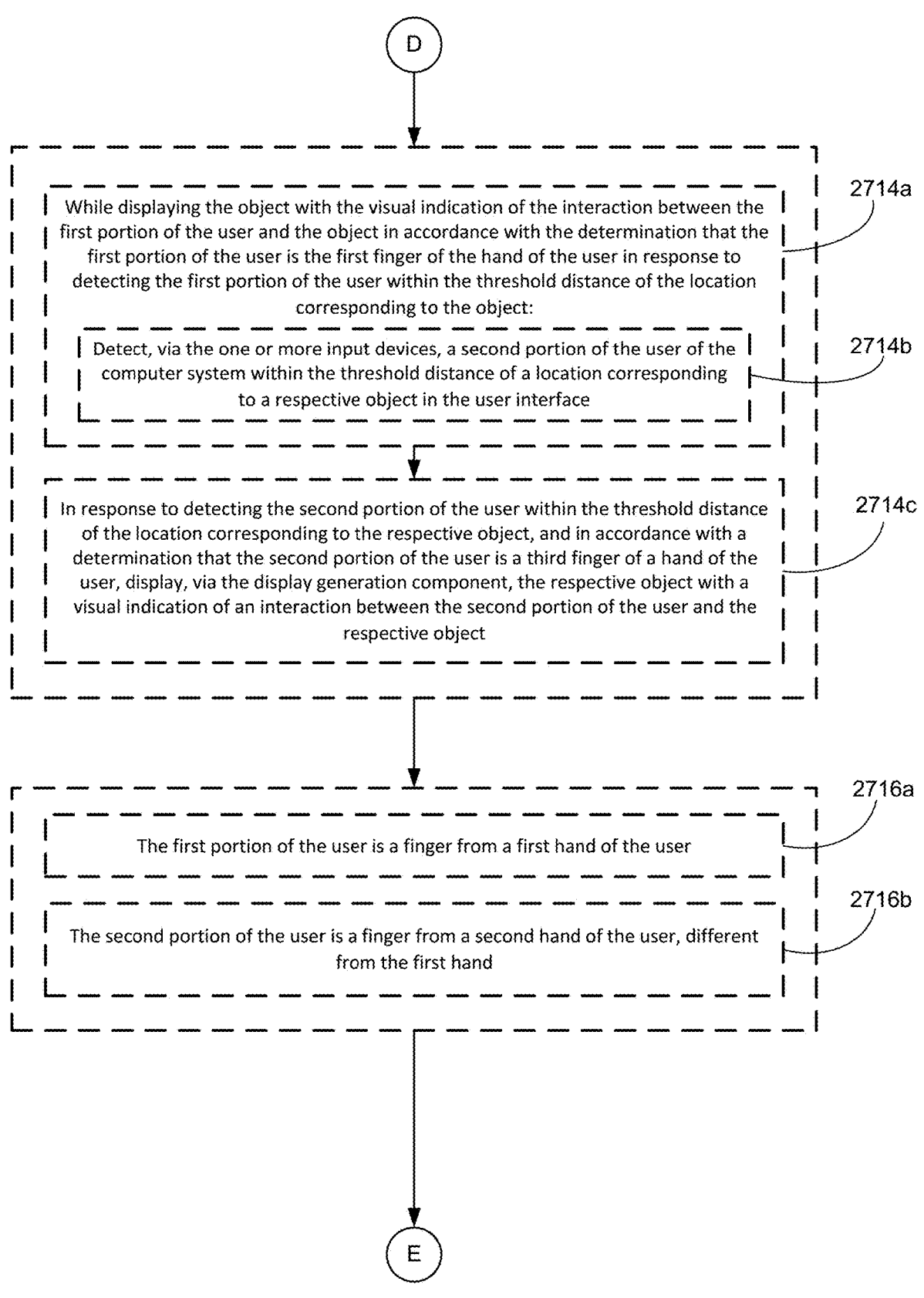

D

While displaying the object with the visual indication of the interaction between the first portion of the user and the object in accordance with the determination that the first portion of the user is the first finger of the hand of the user in response to detecting the first portion of the user within the threshold distance of the location corresponding to the object:

2714a

Detect, via the one or more input devices, a second portion of the user of the computer system within the threshold distance of a location corresponding to a respective object in the user interface 2714b In response to detecting the second portion of the user within the threshold distance of the location corresponding to the respective object, and in accordance with a determination that the second portion of the user is a third finger of a hand of the user, display, via the display generation component, the respective object with a visual indication of an interaction between the second portion of the user and the respective object 2714c The first portion of the user is a finger from a first hand of the user 2716a The second portion of the user is a finger from a second hand of the user, different from the first hand 2716b

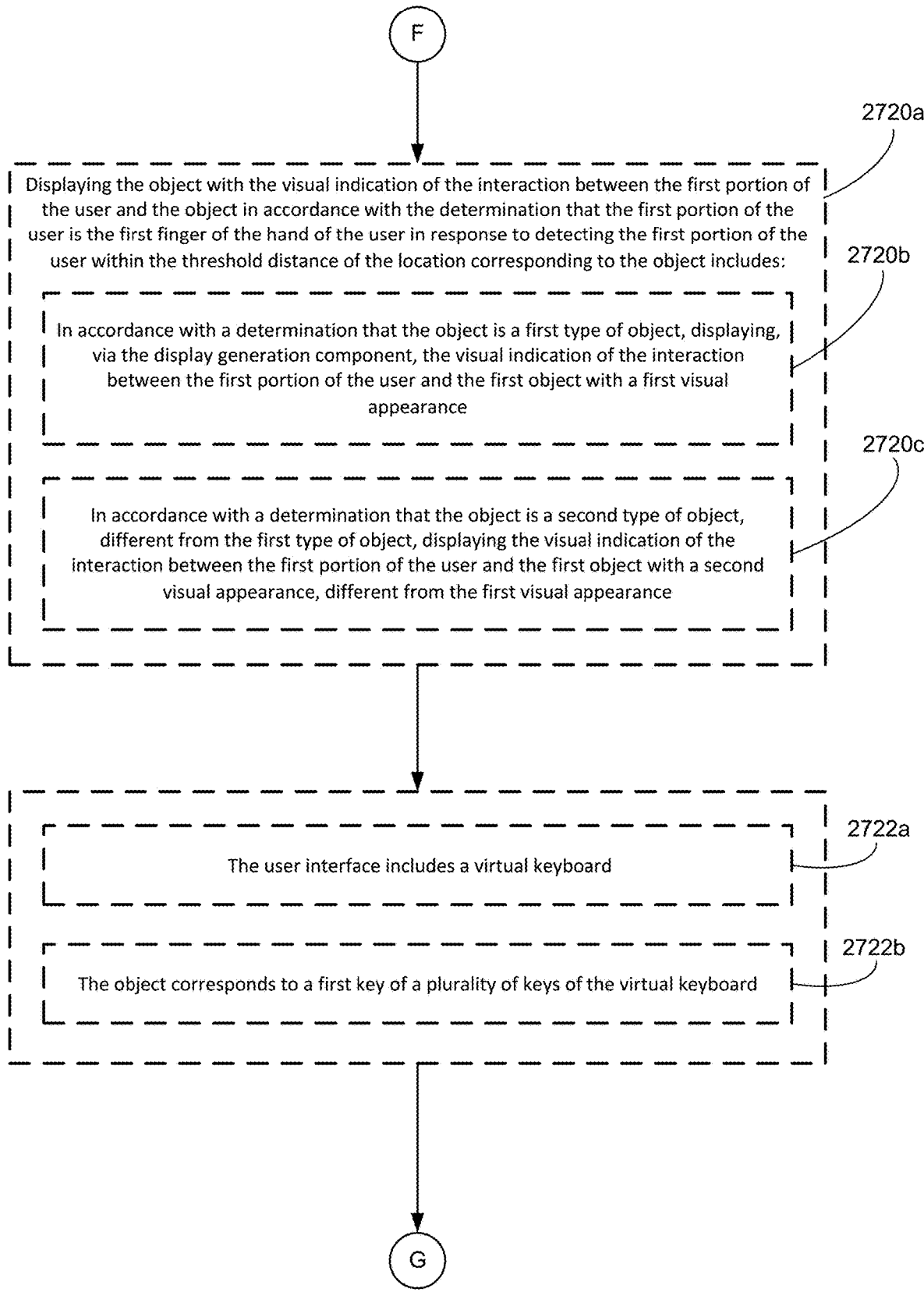

F

2720a

Displaying the object with the visual indication of the interaction between the first portion of the user and the object in accordance with the determination that the first portion of the user is the first finger of the hand of the user in response to detecting the first portion of the user within the threshold distance of the location corresponding to the object includes:

2720b

In accordance with a determination that the object is a first type of object, displaying, via the display generation component, the visual indication of the interaction between the first portion of the user and the first object with a first visual appearance 2720c In accordance with a determination that the object is a second type of object, different from the first type of object, displaying the visual indication of the interaction between the first portion of the user and the first object with a second visual appearance, different from the first visual appearance 2722a The user interface includes a virtual keyboard 2722b The object corresponds to a first key of a plurality of keys of the virtual keyboard

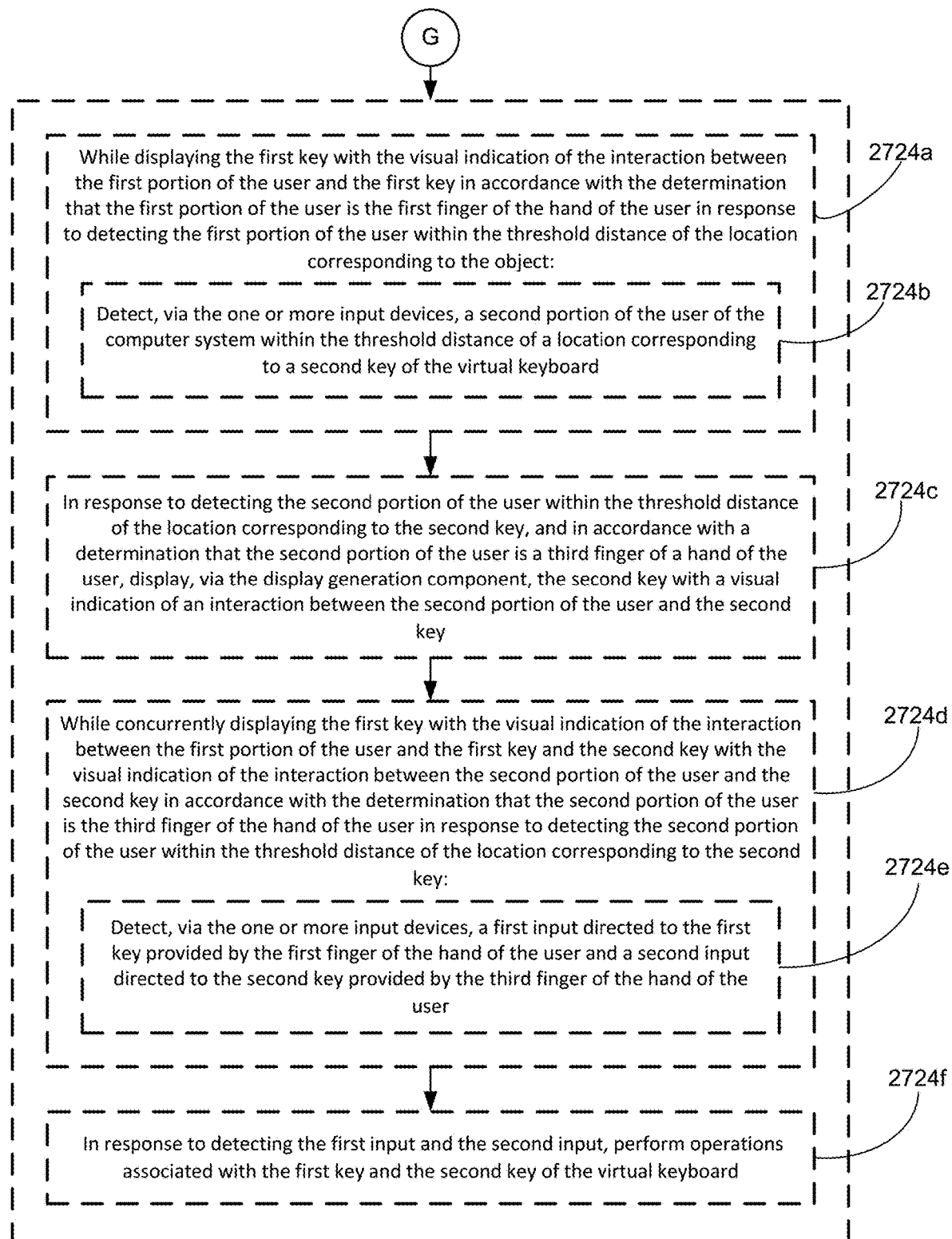

G

While displaying the first key with the visual indication of the interaction between the first portion of the user and the first key in accordance with the determination that the first portion of the user is the first finger of the hand of the user in response to detecting the first portion of the user within the threshold distance of the location corresponding to the object:     2724a Detect, via the one or more input devices, a second portion of the user of the computer system within the threshold distance of a location corresponding to a second key of the virtual keyboard     2724b In response to detecting the second portion of the user within the threshold distance of the location corresponding to the second key, and in accordance with a determination that the second portion of the user is a third finger of a hand of the user, display, via the display generation component, the second key with a visual indication of an interaction between the second portion of the user and the second key     2724c While concurrently displaying the first key with the visual indication of the interaction between the first portion of the user and the first key and the second key with the visual indication of the interaction between the second portion of the user and the second key in accordance with the determination that the second portion of the user is the third finger of the hand of the user in response to detecting the second portion of the user within the threshold distance of the location corresponding to the second key:     2724d Detect, via the one or more input devices, a first input directed to the first key provided by the first finger of the hand of the user and a second input directed to the second key provided by the third finger of the hand of the user     2724e In response to detecting the first input and the second input, perform operations associated with the first key and the second key of the virtual keyboard     2724f

Figure 28A:
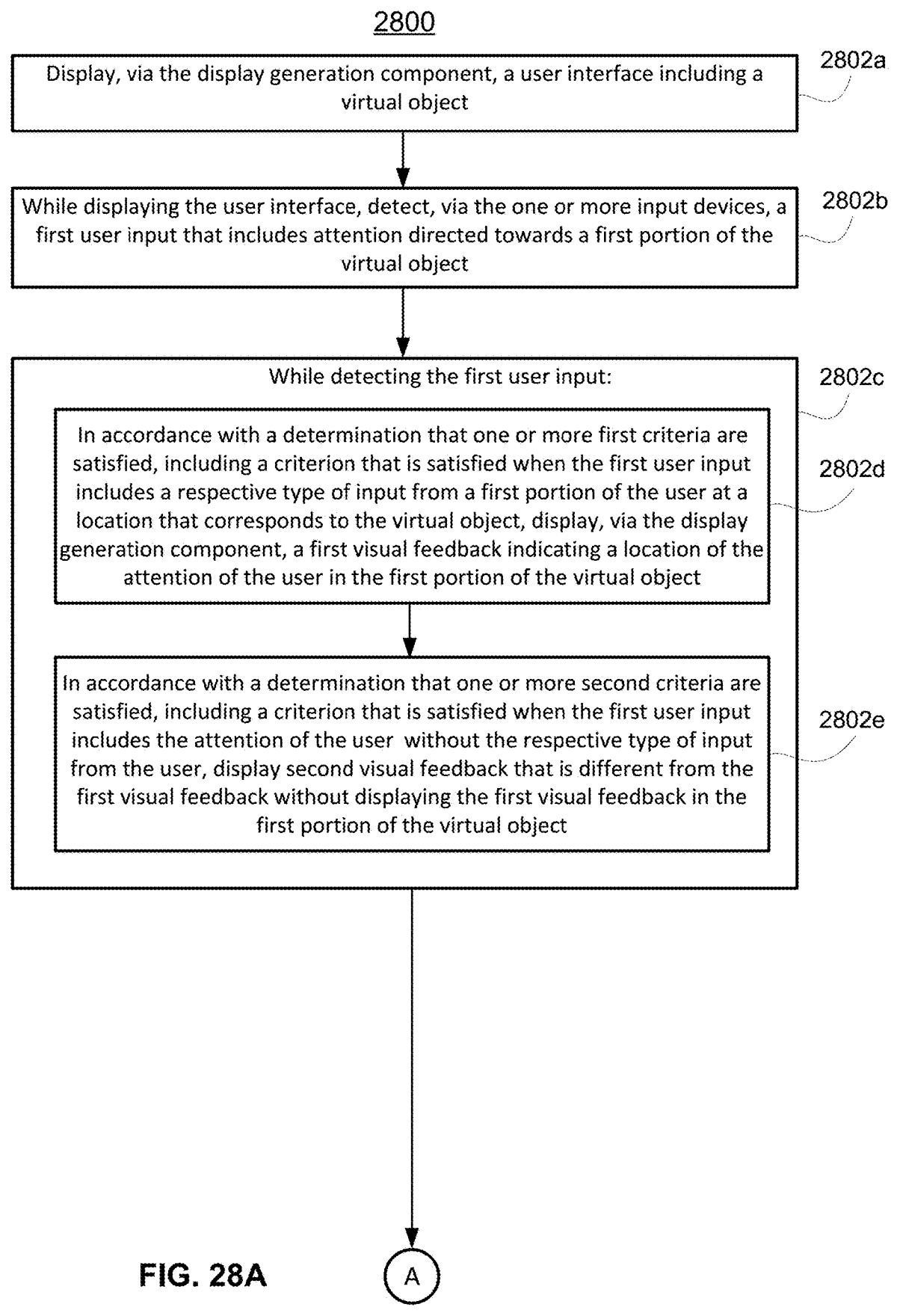

Display, via the display generation component, a user interface including a virtual object ⟶ 2802a While displaying the user interface, detect, via the one or more input devices, a first user input that includes attention directed towards a first portion of the virtual object ⟶ 2802b While detecting the first user input: ⟶ 2802c In accordance with a determination that one or more first criteria are satisfied, including a criterion that is satisfied when the first user input includes a respective type of input from a first portion of the user at a location that corresponds to the virtual object, display, via the display generation component, a first visual feedback indicating a location of the attention of the user in the first portion of the virtual object ⟶ 2802d In accordance with a determination that one or more second criteria are satisfied, including a criterion that is satisfied when the first user input includes the attention of the user without the respective type of input from the user, display second visual feedback that is different from the first visual feedback without displaying the first visual feedback in the first portion of the virtual object ⟶ 2802e

FIG. 28A          (A)

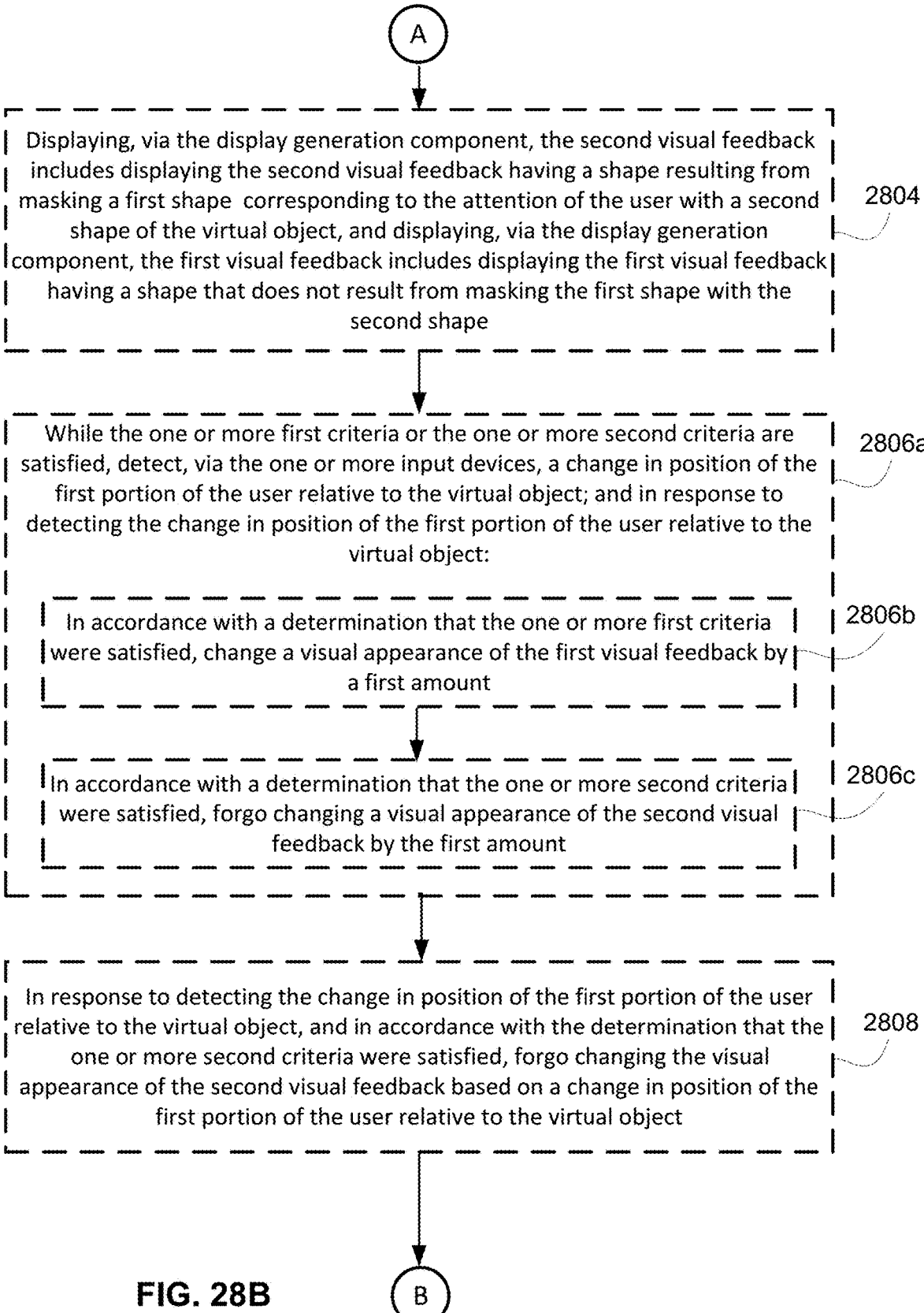

A

Displaying, via the display generation component, the second visual feedback includes displaying the second visual feedback having a shape resulting from masking a first shape corresponding to the attention of the user with a second shape of the virtual object, and displaying, via the display generation component, the first visual feedback includes displaying the first visual feedback having a shape that does not result from masking the first shape with the second shape

2804

While the one or more first criteria or the one or more second criteria are satisfied, detect, via the one or more input devices, a change in position of the first portion of the user relative to the virtual object; and in response to detecting the change in position of the first portion of the user relative to the virtual object:

2806a

In accordance with a determination that the one or more first criteria were satisfied, change a visual appearance of the first visual feedback by a first amount 2806b In accordance with a determination that the one or more second criteria were satisfied, forgo changing a visual appearance of the second visual feedback by the first amount 2806c In response to detecting the change in position of the first portion of the user relative to the virtual object, and in accordance with the determination that the one or more second criteria were satisfied, forgo changing the visual appearance of the second visual feedback based on a change in position of the first portion of the user relative to the virtual object

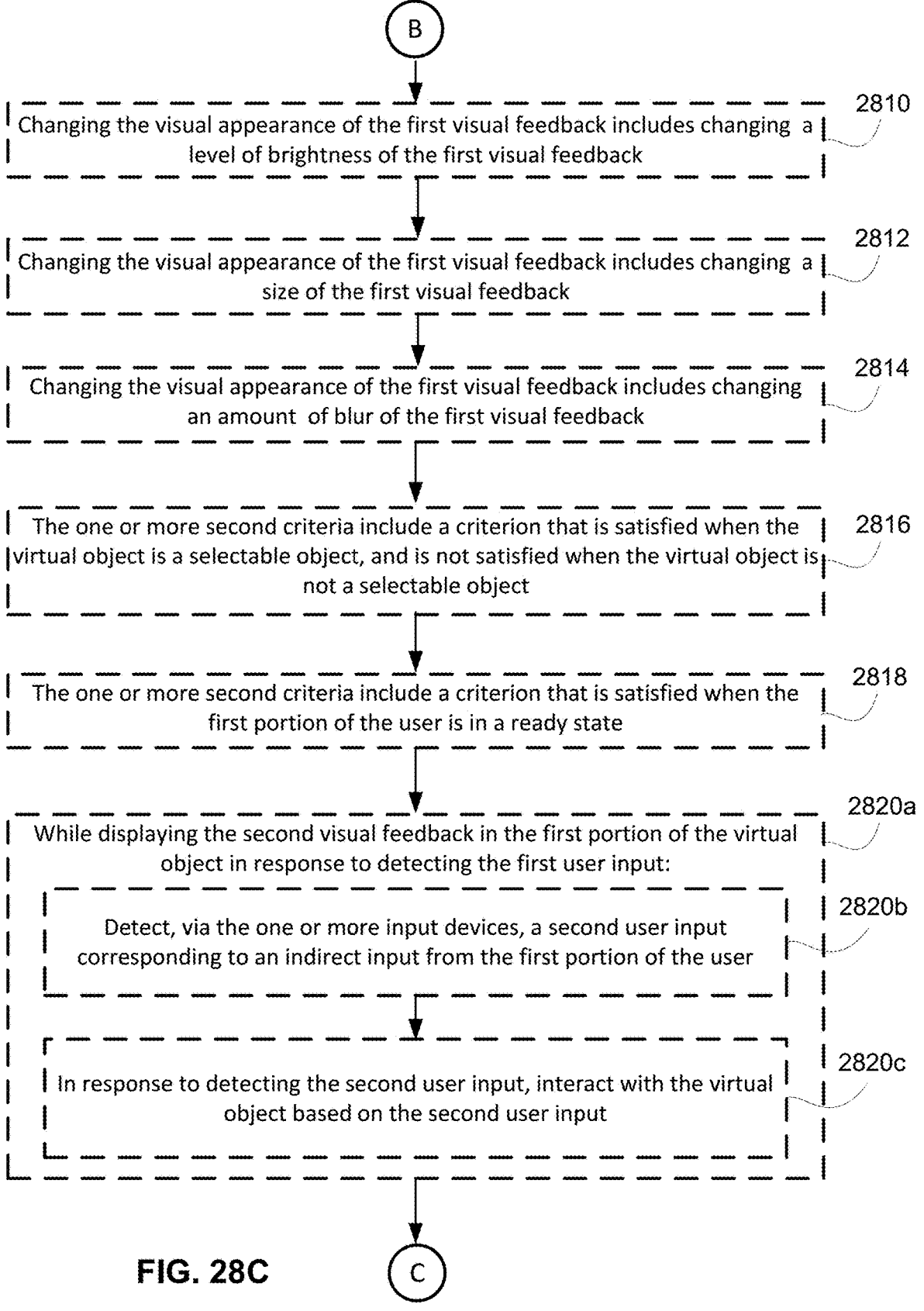

B

Changing the visual appearance of the first visual feedback includes changing a level of brightness of the first visual feedback — 2810

Changing the visual appearance of the first visual feedback includes changing a size of the first visual feedback — 2812

Changing the visual appearance of the first visual feedback includes changing an amount of blur of the first visual feedback — 2814

The one or more second criteria include a criterion that is satisfied when the virtual object is a selectable object, and is not satisfied when the virtual object is not a selectable object — 2816

The one or more second criteria include a criterion that is satisfied when the first portion of the user is in a ready state — 2818

While displaying the second visual feedback in the first portion of the virtual object in response to detecting the first user input: — 2820a Detect, via the one or more input devices, a second user input corresponding to an indirect input from the first portion of the user — 2820b In response to detecting the second user input, interact with the virtual object based on the second user input — 2820c

FIG. 28C    C

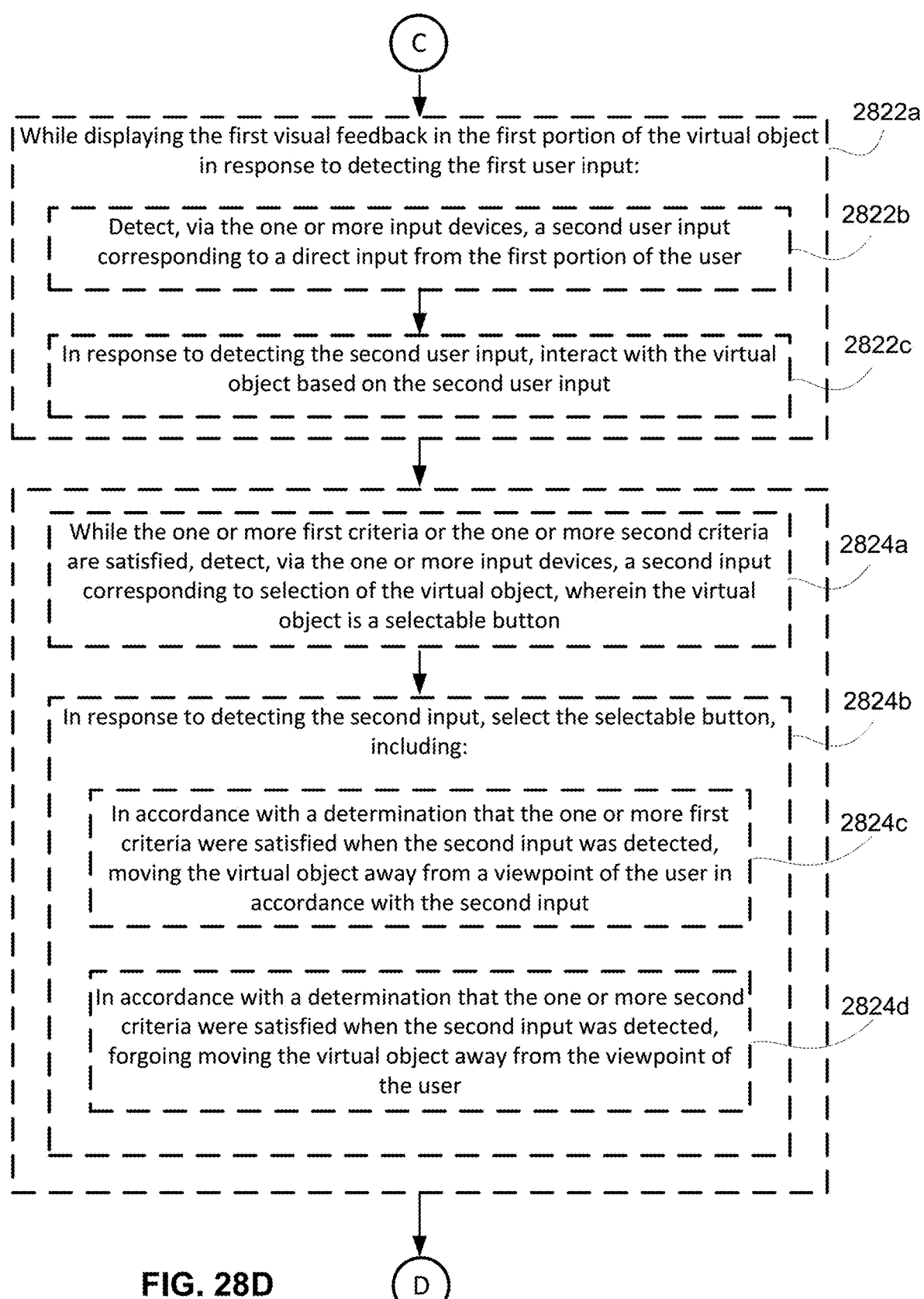

C

While displaying the first visual feedback in the first portion of the virtual object in response to detecting the first user input:      2822a Detect, via the one or more input devices, a second user input corresponding to a direct input from the first portion of the user      2822b In response to detecting the second user input, interact with the virtual object based on the second user input      2822c While the one or more first criteria or the one or more second criteria are satisfied, detect, via the one or more input devices, a second input corresponding to selection of the virtual object, wherein the virtual object is a selectable button      2824a In response to detecting the second input, select the selectable button, including:      2824b In accordance with a determination that the one or more first criteria were satisfied when the second input was detected, moving the virtual object away from a viewpoint of the user in accordance with the second input      2824c In accordance with a determination that the one or more second criteria were satisfied when the second input was detected, forgoing moving the virtual object away from the viewpoint of the user      2824d

FIG. 28D      D

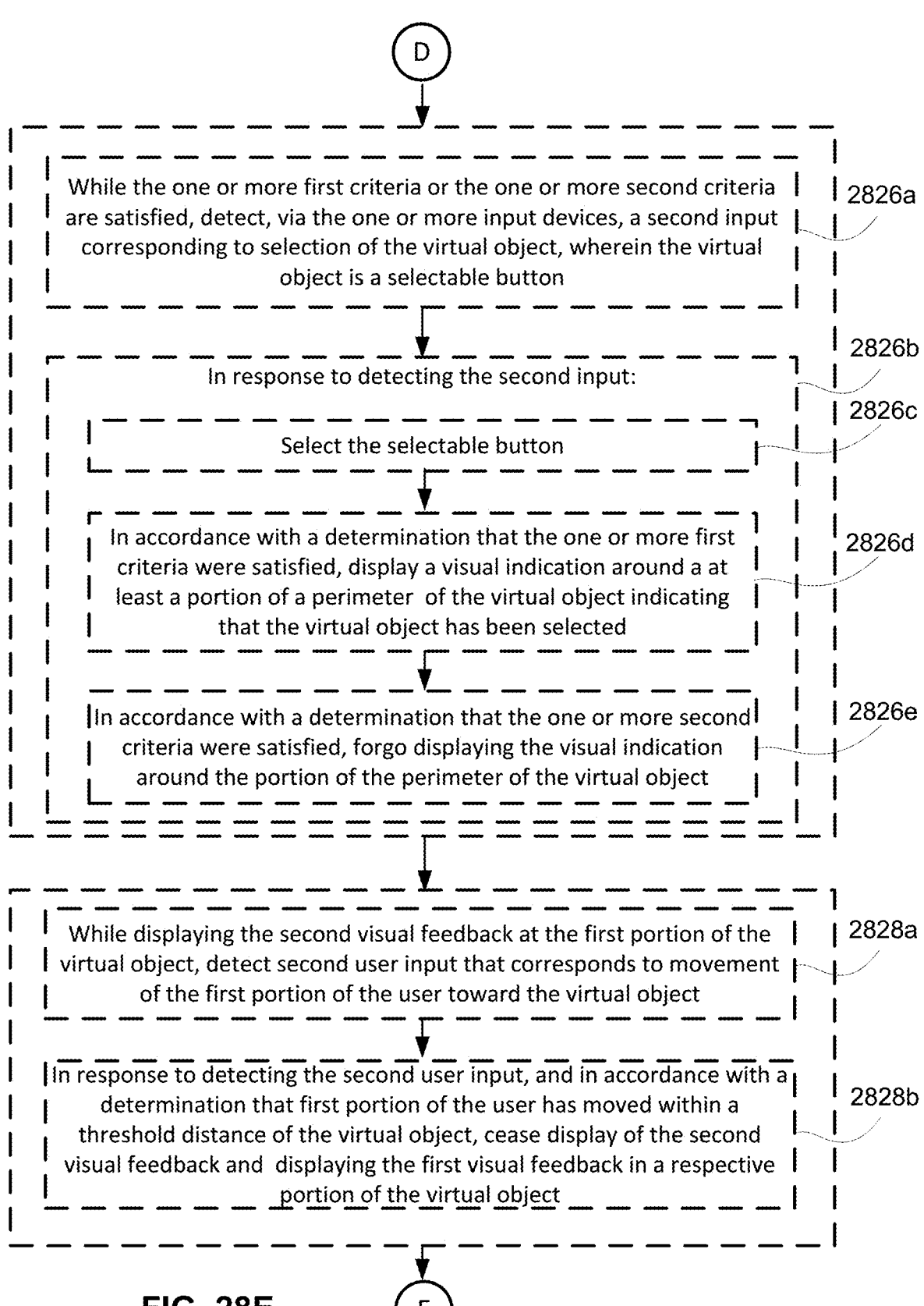

D

While the one or more first criteria or the one or more second criteria are satisfied, detect, via the one or more input devices, a second input corresponding to selection of the virtual object, wherein the virtual object is a selectable button 2826a In response to detecting the second input:

2826b

Select the selectable button

2826c

In accordance with a determination that the one or more first criteria were satisfied, display a visual indication around a at least a portion of a perimeter of the virtual object indicating that the virtual object has been selected 2826d In accordance with a determination that the one or more second criteria were satisfied, forgo displaying the visual indication around the portion of the perimeter of the virtual object 2826e While displaying the second visual feedback at the first portion of the virtual object, detect second user input that corresponds to movement of the first portion of the user toward the virtual object 2828a In response to detecting the second user input, and in accordance with a determination that first portion of the user has moved within a threshold distance of the virtual object, cease display of the second visual feedback and displaying the first visual feedback in a respective portion of the virtual object 2828b

FIG. 28E     E

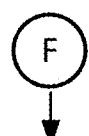

The second user input includes gaze of the user directed to the respective virtual object without input from the user other than the gaze of the user, and the one or more third criteria include a criterion that is satisfied when the second user input includes gaze of the user directed toward the respective virtual object without input other than the gaze from the user ⎯ 2834

The one or more third criteria include a criterion that is satisfied when gaze of the user is directed toward the respective virtual object, and a criterion that is satisfied when the second user input includes the respective type of input from the first portion of the user at a location that corresponds to the respective virtual object ⎯ 2836a While displaying the respective virtual object having the second size relative to the three-dimensional environment, detect, via the one or more input devices, that the gaze of the user is no longer directed toward the respective virtual object and that the first portion of the user is no longer providing the respective type of input at the location corresponding to the respective virtual object ⎯ 2836b In response to detecting that the gaze of the user is no longer directed toward the respective virtual object and that the first portion of the user is no longer providing the respective type of input at the location corresponding to the respective virtual object, display, in the three-dimensional environment, the respective virtual object having the first size relative to the three-dimensional environment ⎯ 2836c

FIG. 28G     G

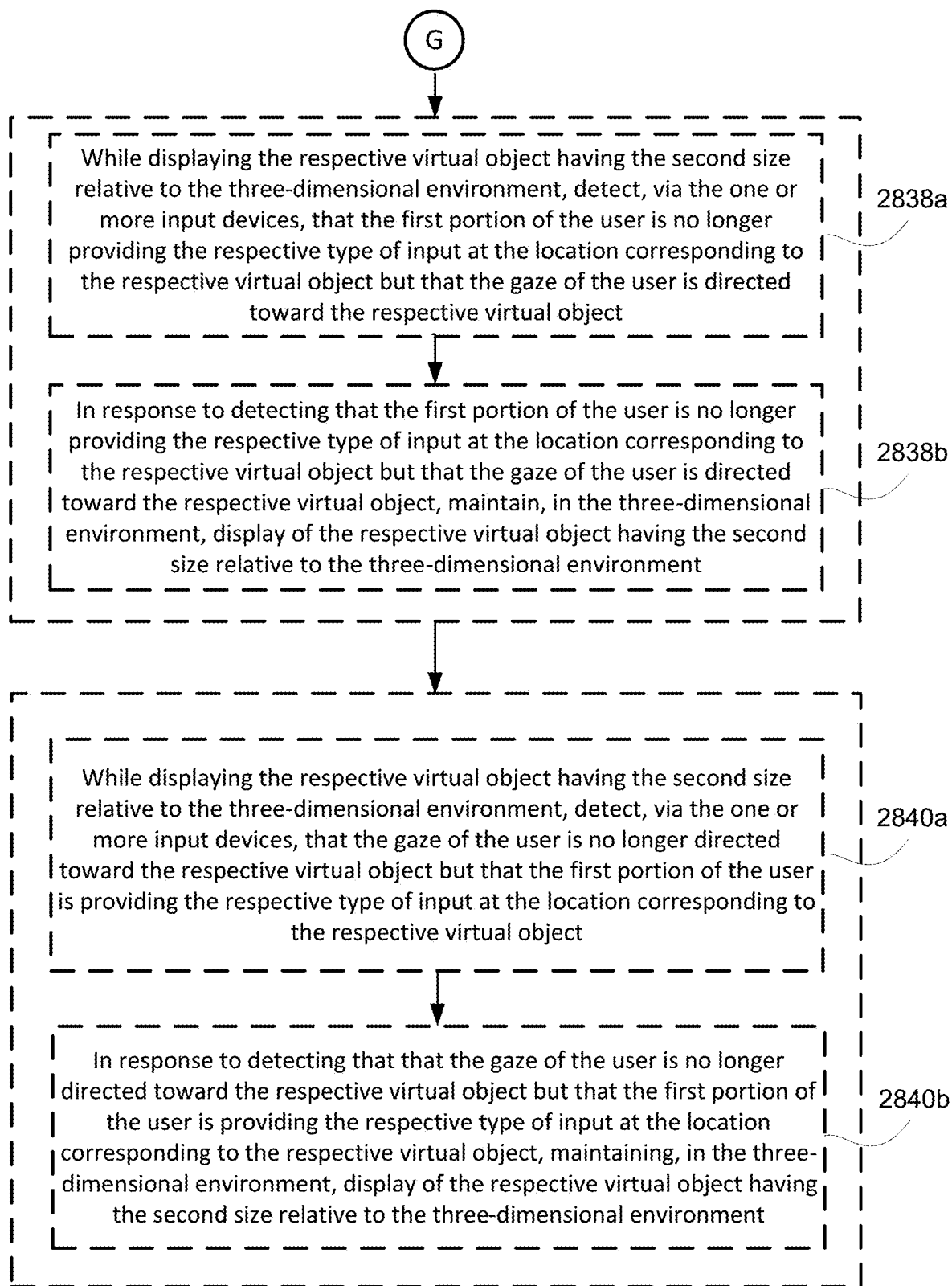

While displaying the respective virtual object having the second size relative to the three-dimensional environment, detect, via the one or more input devices, that the first portion of the user is no longer providing the respective type of input at the location corresponding to the respective virtual object but that the gaze of the user is directed toward the respective virtual object 2838a In response to detecting that the first portion of the user is no longer providing the respective type of input at the location corresponding to the respective virtual object but that the gaze of the user is directed toward the respective virtual object, maintain, in the three-dimensional environment, display of the respective virtual object having the second size relative to the three-dimensional environment 2838b While displaying the respective virtual object having the second size relative to the three-dimensional environment, detect, via the one or more input devices, that the gaze of the user is no longer directed toward the respective virtual object but that the first portion of the user is providing the respective type of input at the location corresponding to the respective virtual object 2840a In response to detecting that that the gaze of the user is no longer directed toward the respective virtual object but that the first portion of the user is providing the respective type of input at the location corresponding to the respective virtual object, maintaining, in the three-dimensional environment, display of the respective virtual object having the second size relative to the three-dimensional environment 2840b

FIG. 28H

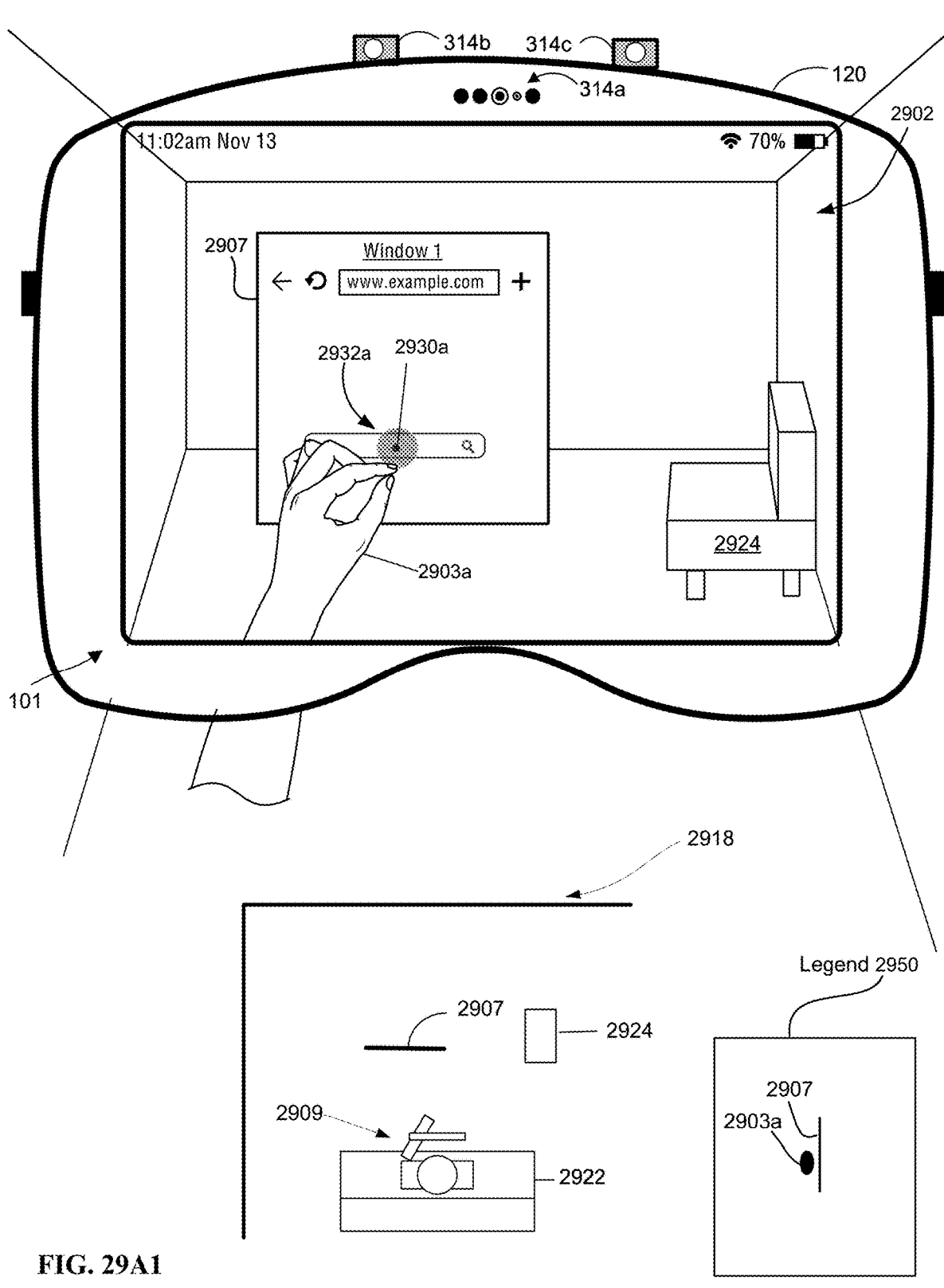
FIG. 29A1

Figure 30A:
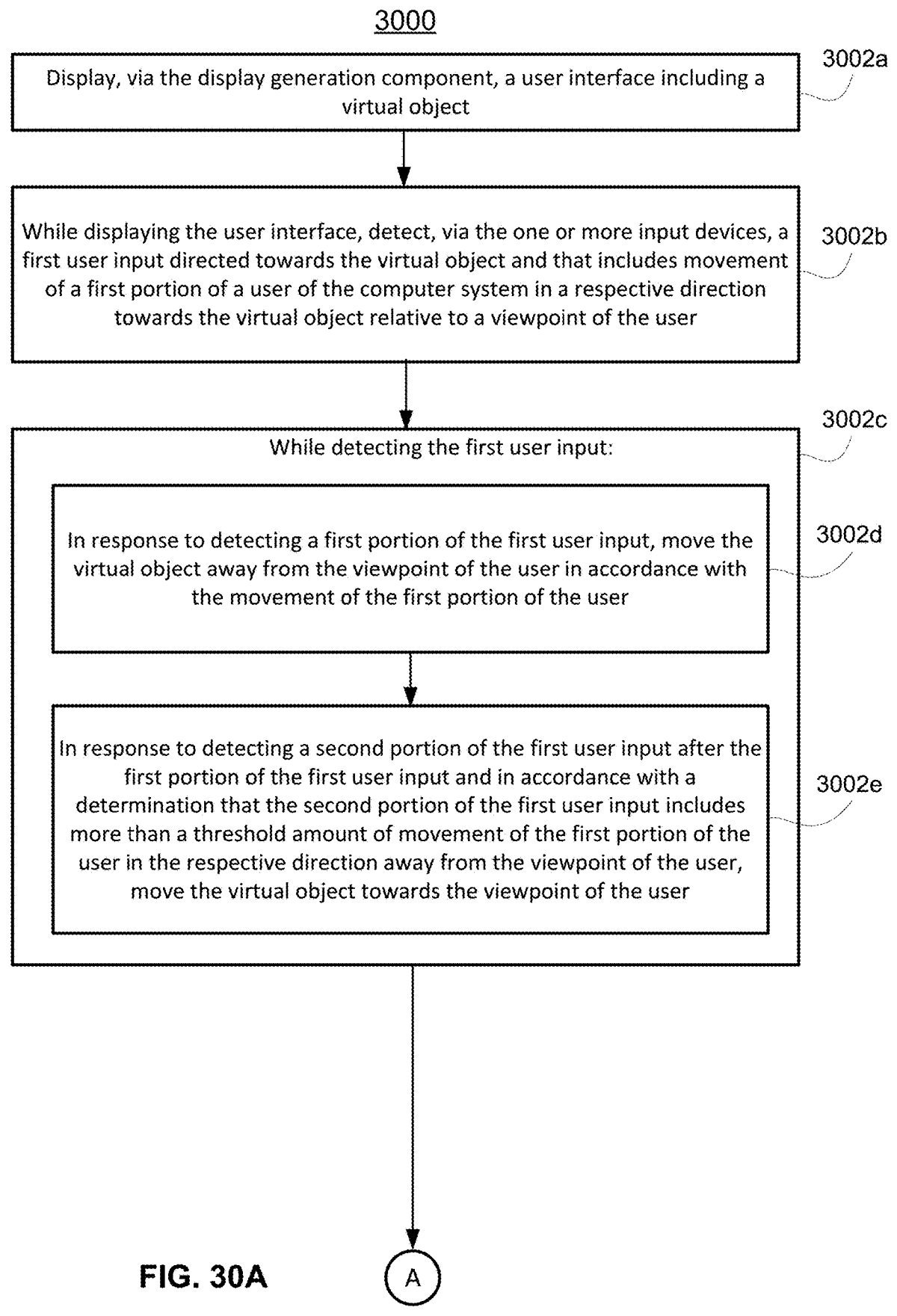

3000

| Display, via the display generation component, a user interface including a virtual object | 3002a |

↓

While displaying the user interface, detect, via the one or more input devices, a first user input directed towards the virtual object and that includes movement of a first portion of a user of the computer system in a respective direction towards the virtual object relative to a viewpoint of the user — 3002b

↓

While detecting the first user input: — 3002c

In response to detecting a first portion of the first user input, move the virtual object away from the viewpoint of the user in accordance with the movement of the first portion of the user — 3002d

↓

In response to detecting a second portion of the first user input after the first portion of the first user input and in accordance with a determination that the second portion of the first user input includes more than a threshold amount of movement of the first portion of the user in the respective direction away from the viewpoint of the user, move the virtual object towards the viewpoint of the user — 3002e

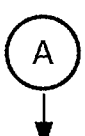

In response to detecting the second portion of the first user input after the first portion of the first user input and in accordance with a determination that the second portion of the first user input includes less than the threshold amount of movement of the first portion of the user in the respective direction away from the viewpoint of the user, move the virtual object away from the viewpoint of the user in accordance with the second portion of the first user input

3004

In response to detecting the second portion of the first user input after the first portion of the first user input and in accordance with a determination that the second portion of the first user input includes movement of the first portion of the user in a second respective direction towards the viewpoint of the user relative to the virtual object, move the virtual object towards the viewpoint of the user in accordance with the second portion of the first user input

3006

In response to detecting the second portion of the first user input after the first portion of the first user input and in accordance with the determination that the second portion of the first user input includes more than the threshold amount of movement of the first portion of the user in the respective direction away from the viewpoint of the user, move the virtual object towards the viewpoint of the user independent of the movement of the first portion of the user

3008

In response to detecting the first portion of the first user input, reduce a visual prominence of the virtual object relative to the user interface

3010

Reducing the visual prominence of the virtual object includes gradually reducing the visual prominence of the virtual object based on the movement of the first portion of the user in the first portion of the first user input

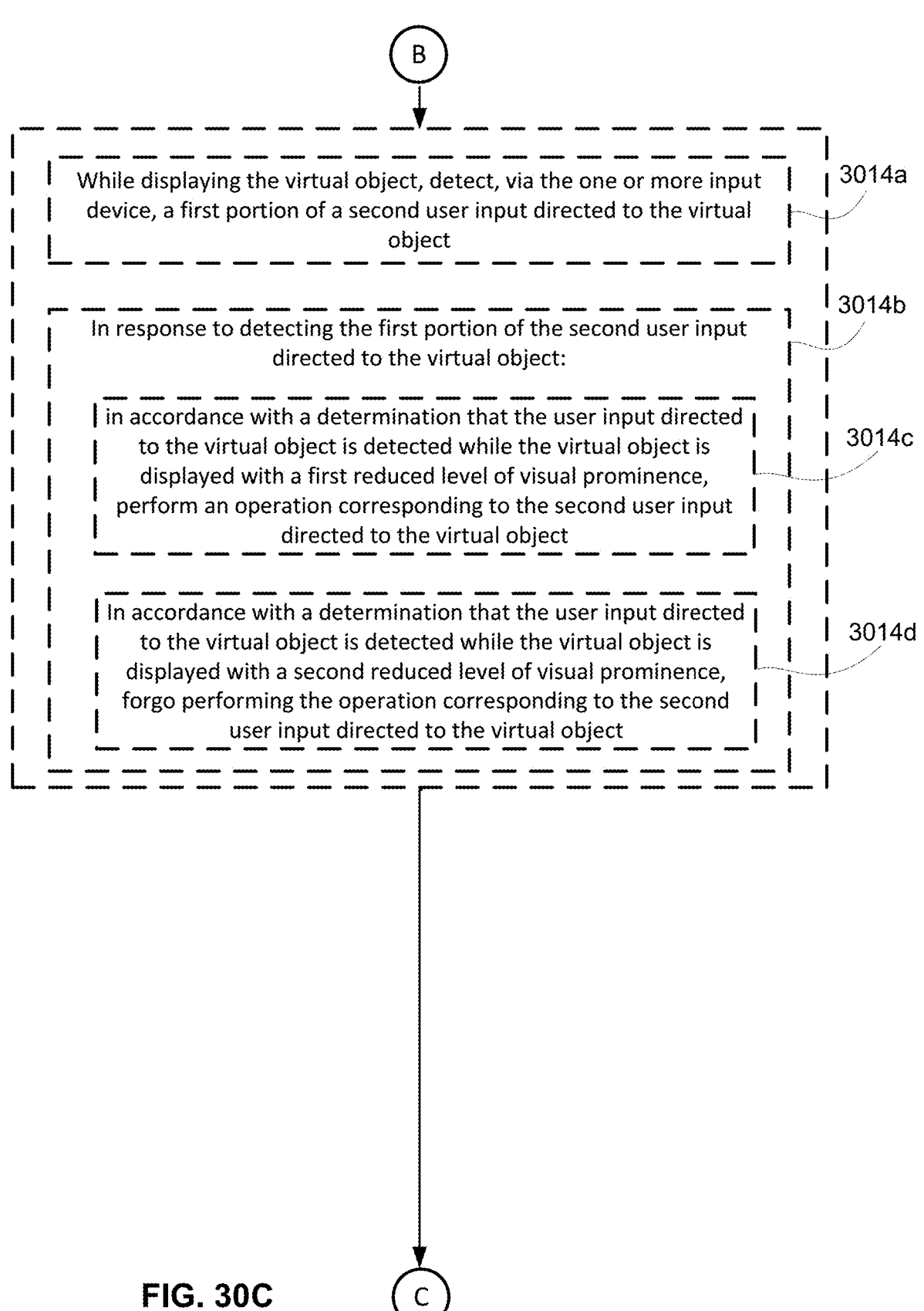

B

While displaying the virtual object, detect, via the one or more input device, a first portion of a second user input directed to the virtual object
3014a In response to detecting the first portion of the second user input directed to the virtual object:
3014b in accordance with a determination that the user input directed to the virtual object is detected while the virtual object is displayed with a first reduced level of visual prominence, perform an operation corresponding to the second user input directed to the virtual object
3014c In accordance with a determination that the user input directed to the virtual object is detected while the virtual object is displayed with a second reduced level of visual prominence, forgo performing the operation corresponding to the second user input directed to the virtual object
3014d

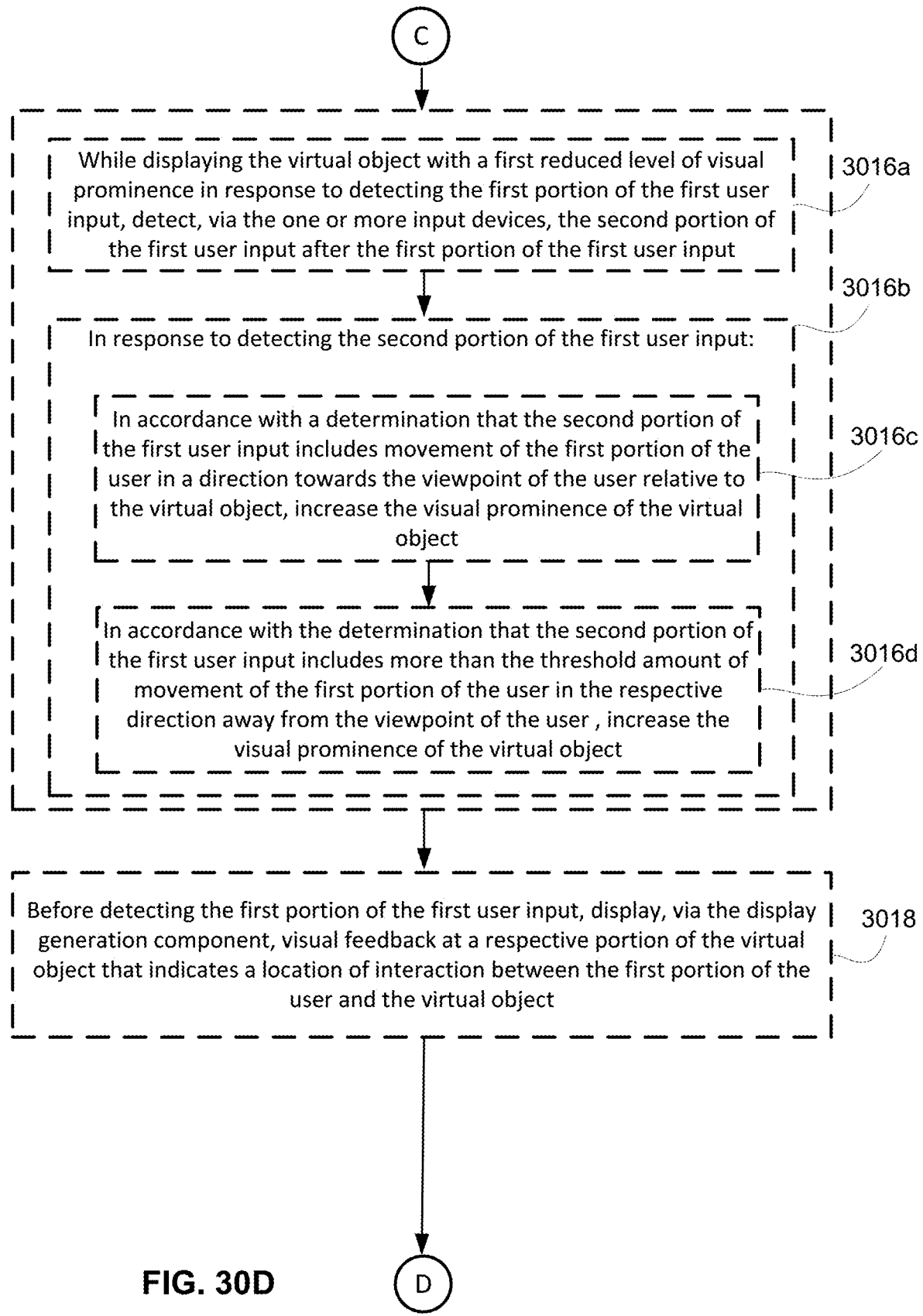

C

While displaying the virtual object with a first reduced level of visual prominence in response to detecting the first portion of the first user input, detect, via the one or more input devices, the second portion of the first user input after the first portion of the first user input     3016a In response to detecting the second portion of the first user input:     3016b In accordance with a determination that the second portion of the first user input includes movement of the first portion of the user in a direction towards the viewpoint of the user relative to the virtual object, increase the visual prominence of the virtual object     3016c In accordance with the determination that the second portion of the first user input includes more than the threshold amount of movement of the first portion of the user in the respective direction away from the viewpoint of the user , increase the visual prominence of the virtual object     3016d Before detecting the first portion of the first user input, display, via the display generation component, visual feedback at a respective portion of the virtual object that indicates a location of interaction between the first portion of the user and the virtual object     3018

FIG. 30D     D

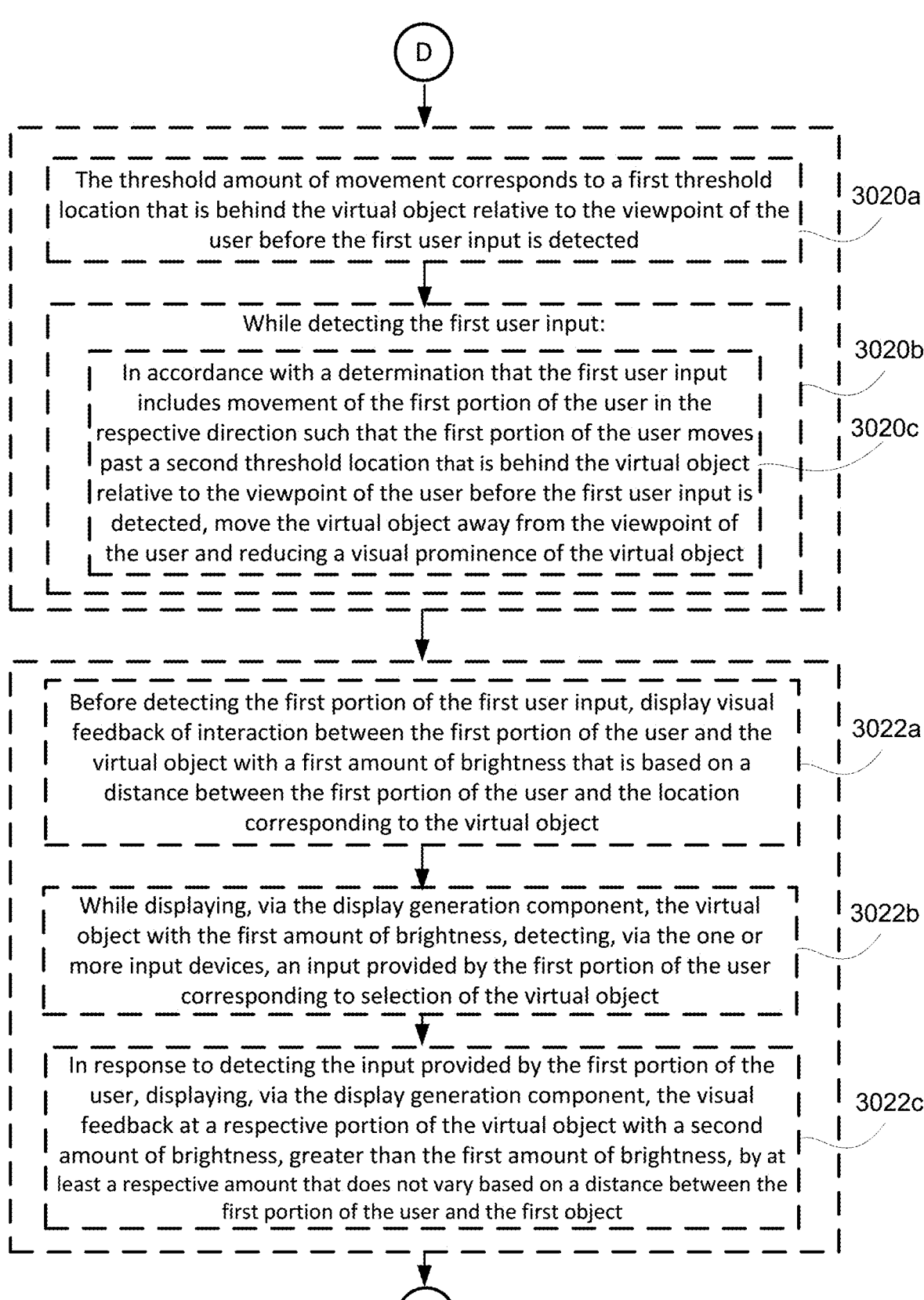

D

The threshold amount of movement corresponds to a first threshold location that is behind the virtual object relative to the viewpoint of the user before the first user input is detected 3020a While detecting the first user input:

3020b

In accordance with a determination that the first user input includes movement of the first portion of the user in the respective direction such that the first portion of the user moves past a second threshold location that is behind the virtual object relative to the viewpoint of the user before the first user input is detected, move the virtual object away from the viewpoint of the user and reducing a visual prominence of the virtual object 3020c Before detecting the first portion of the first user input, display visual feedback of interaction between the first portion of the user and the virtual object with a first amount of brightness that is based on a distance between the first portion of the user and the location corresponding to the virtual object 3022a While displaying, via the display generation component, the virtual object with the first amount of brightness, detecting, via the one or more input devices, an input provided by the first portion of the user corresponding to selection of the virtual object 3022b In response to detecting the input provided by the first portion of the user, displaying, via the display generation component, the visual feedback at a respective portion of the virtual object with a second amount of brightness, greater than the first amount of brightness, by at least a respective amount that does not vary based on a distance between the first portion of the user and the first object 3022c

FIG. 30E     E

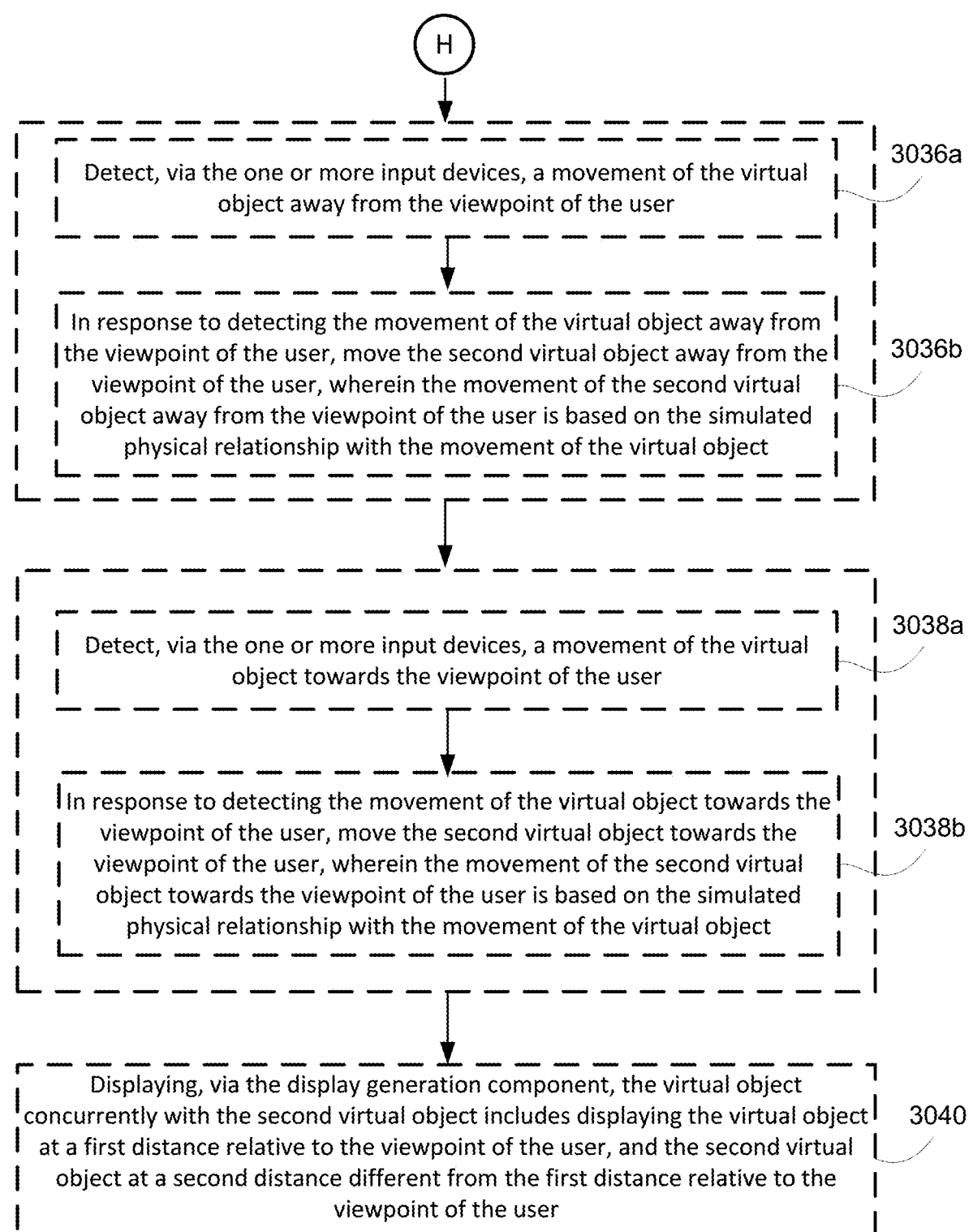

H

Detect, via the one or more input devices, a movement of the virtual object away from the viewpoint of the user                    3036a In response to detecting the movement of the virtual object away from the viewpoint of the user, move the second virtual object away from the viewpoint of the user, wherein the movement of the second virtual object away from the viewpoint of the user is based on the simulated physical relationship with the movement of the virtual object                    3036b Detect, via the one or more input devices, a movement of the virtual object towards the viewpoint of the user                    3038a In response to detecting the movement of the virtual object towards the viewpoint of the user, move the second virtual object towards the viewpoint of the user, wherein the movement of the second virtual object towards the viewpoint of the user is based on the simulated physical relationship with the movement of the virtual object                    3038b Displaying, via the display generation component, the virtual object concurrently with the second virtual object includes displaying the virtual object at a first distance relative to the viewpoint of the user, and the second virtual object at a second distance different from the first distance relative to the viewpoint of the user                    3040

FIG. 30I

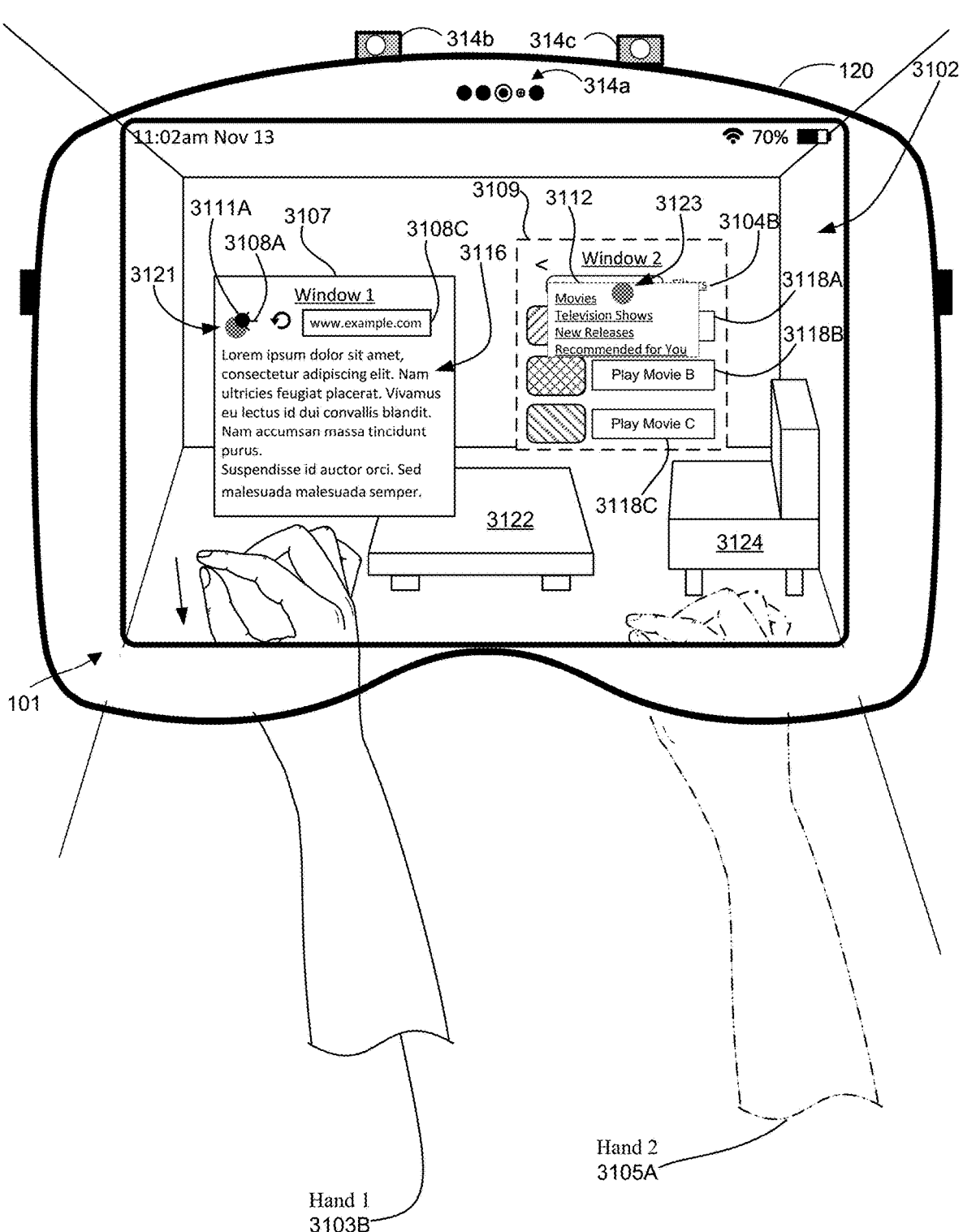
FIG. 31B1

3200

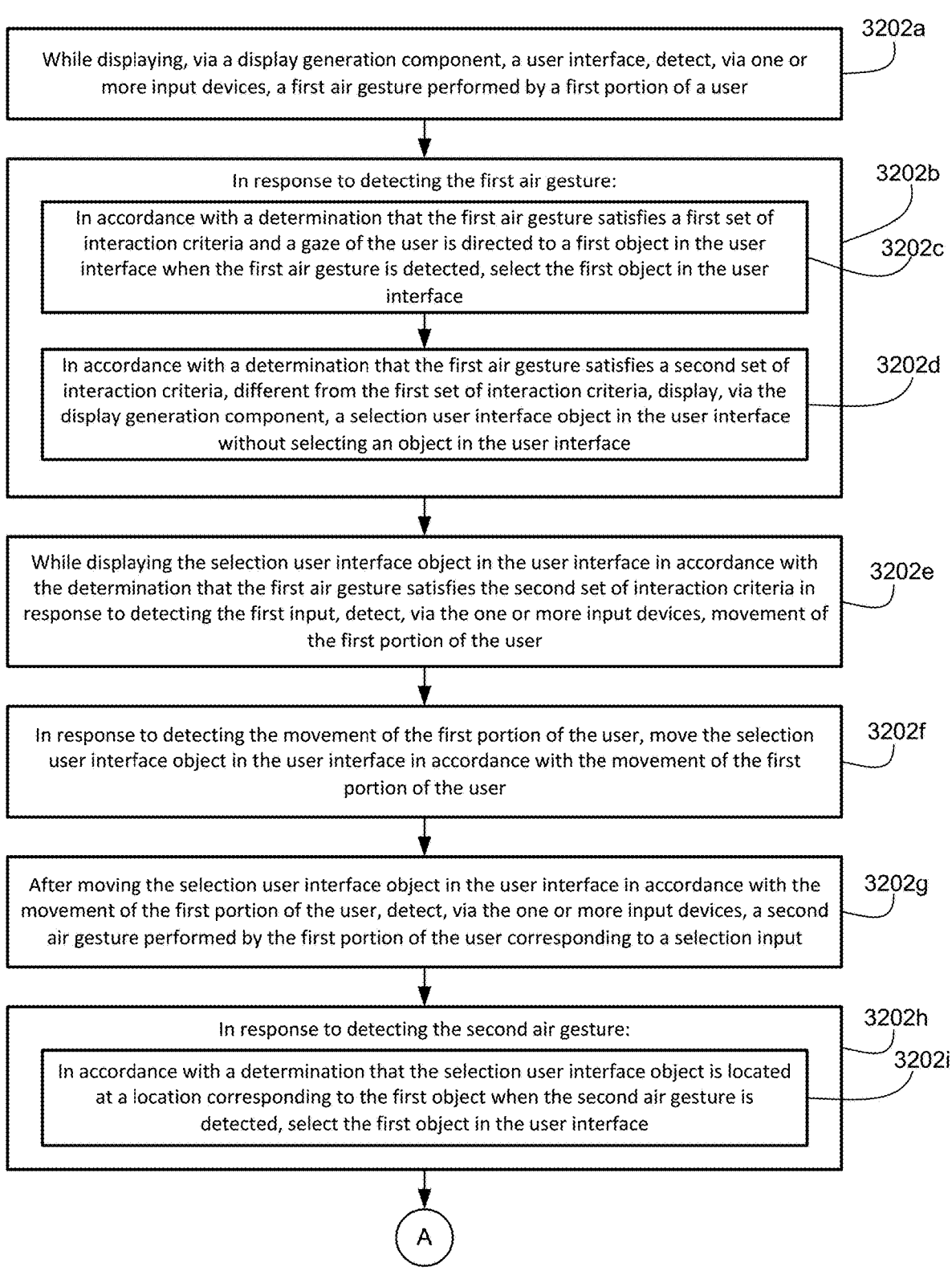

While displaying, via a display generation component, a user interface, detect, via one or more input devices, a first air gesture performed by a first portion of a user — 3202a In response to detecting the first air gesture: — 3202b In accordance with a determination that the first air gesture satisfies a first set of interaction criteria and a gaze of the user is directed to a first object in the user interface when the first air gesture is detected, select the first object in the user interface — 3202c In accordance with a determination that the first air gesture satisfies a second set of interaction criteria, different from the first set of interaction criteria, display, via the display generation component, a selection user interface object in the user interface without selecting an object in the user interface — 3202d While displaying the selection user interface object in the user interface in accordance with the determination that the first air gesture satisfies the second set of interaction criteria in response to detecting the first input, detect, via the one or more input devices, movement of the first portion of the user — 3202e In response to detecting the movement of the first portion of the user, move the selection user interface object in the user interface in accordance with the movement of the first portion of the user — 3202f After moving the selection user interface object in the user interface in accordance with the movement of the first portion of the user, detect, via the one or more input devices, a second air gesture performed by the first portion of the user corresponding to a selection input — 3202g In response to detecting the second air gesture: — 3202h In accordance with a determination that the selection user interface object is located at a location corresponding to the first object when the second air gesture is detected, select the first object in the user interface — 3202i

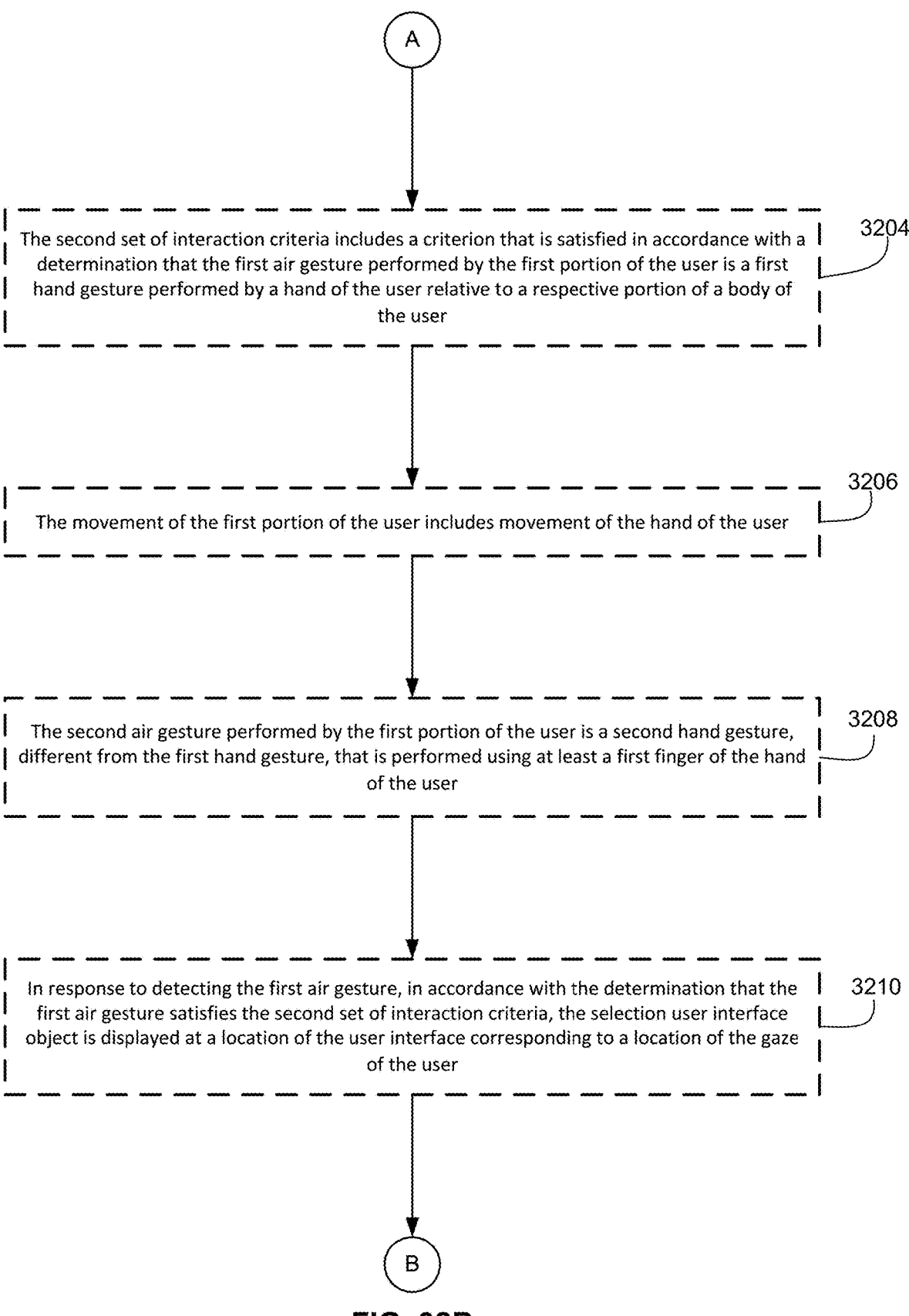

(A)

The second set of interaction criteria includes a criterion that is satisfied in accordance with a determination that the first air gesture performed by the first portion of the user is a first hand gesture performed by a hand of the user relative to a respective portion of a body of the user — 3204

The movement of the first portion of the user includes movement of the hand of the user — 3206

The second air gesture performed by the first portion of the user is a second hand gesture, different from the first hand gesture, that is performed using at least a first finger of the hand of the user — 3208

In response to detecting the first air gesture, in accordance with the determination that the first air gesture satisfies the second set of interaction criteria, the selection user interface object is displayed at a location of the user interface corresponding to a location of the gaze of the user — 3210

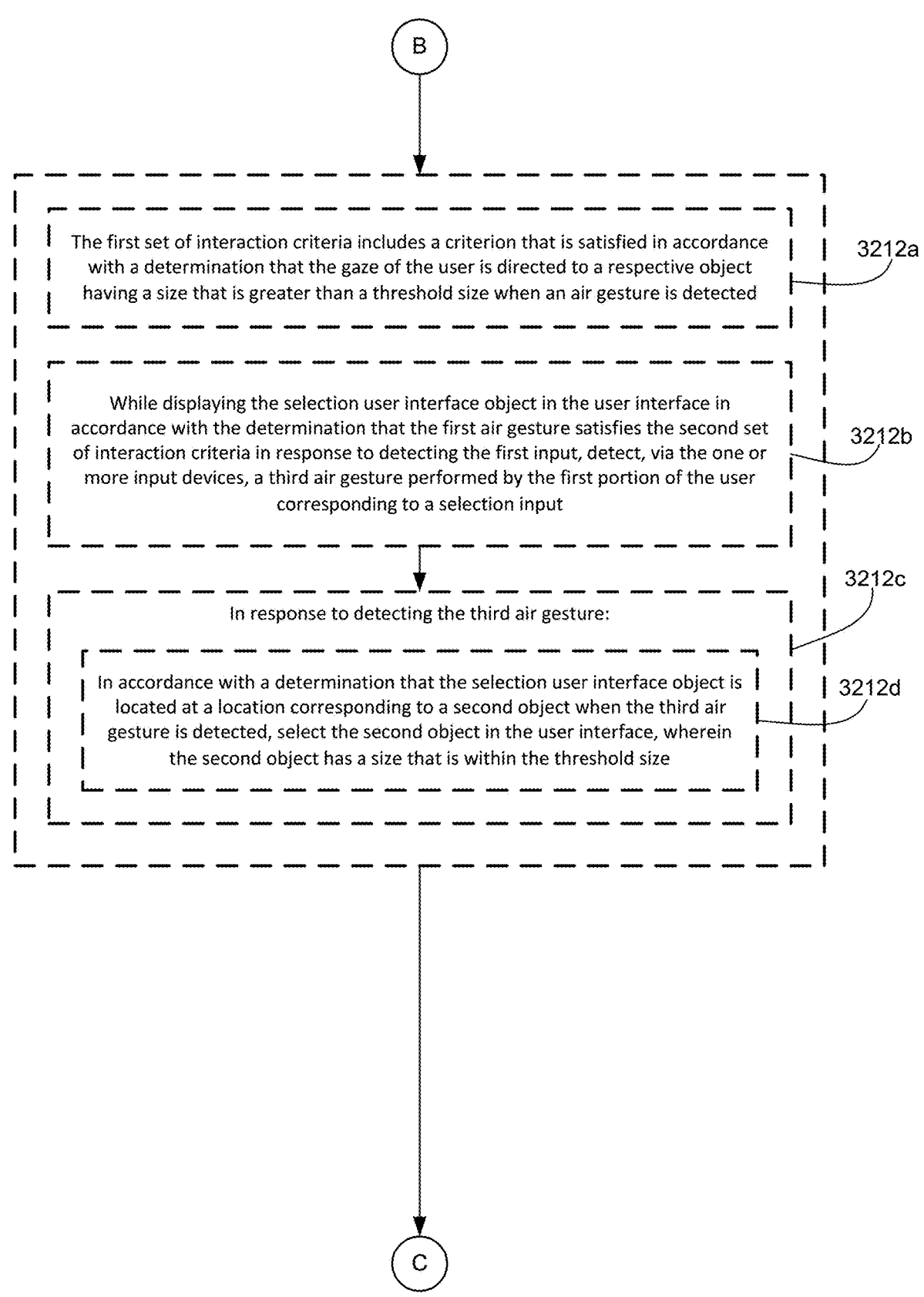

B

The first set of interaction criteria includes a criterion that is satisfied in accordance with a determination that the gaze of the user is directed to a respective object having a size that is greater than a threshold size when an air gesture is detected 3212a While displaying the selection user interface object in the user interface in accordance with the determination that the first air gesture satisfies the second set of interaction criteria in response to detecting the first input, detect, via the one or more input devices, a third air gesture performed by the first portion of the user corresponding to a selection input 3212b In response to detecting the third air gesture:

3212c

In accordance with a determination that the selection user interface object is located at a location corresponding to a second object when the third air gesture is detected, select the second object in the user interface, wherein the second object has a size that is within the threshold size 3212d

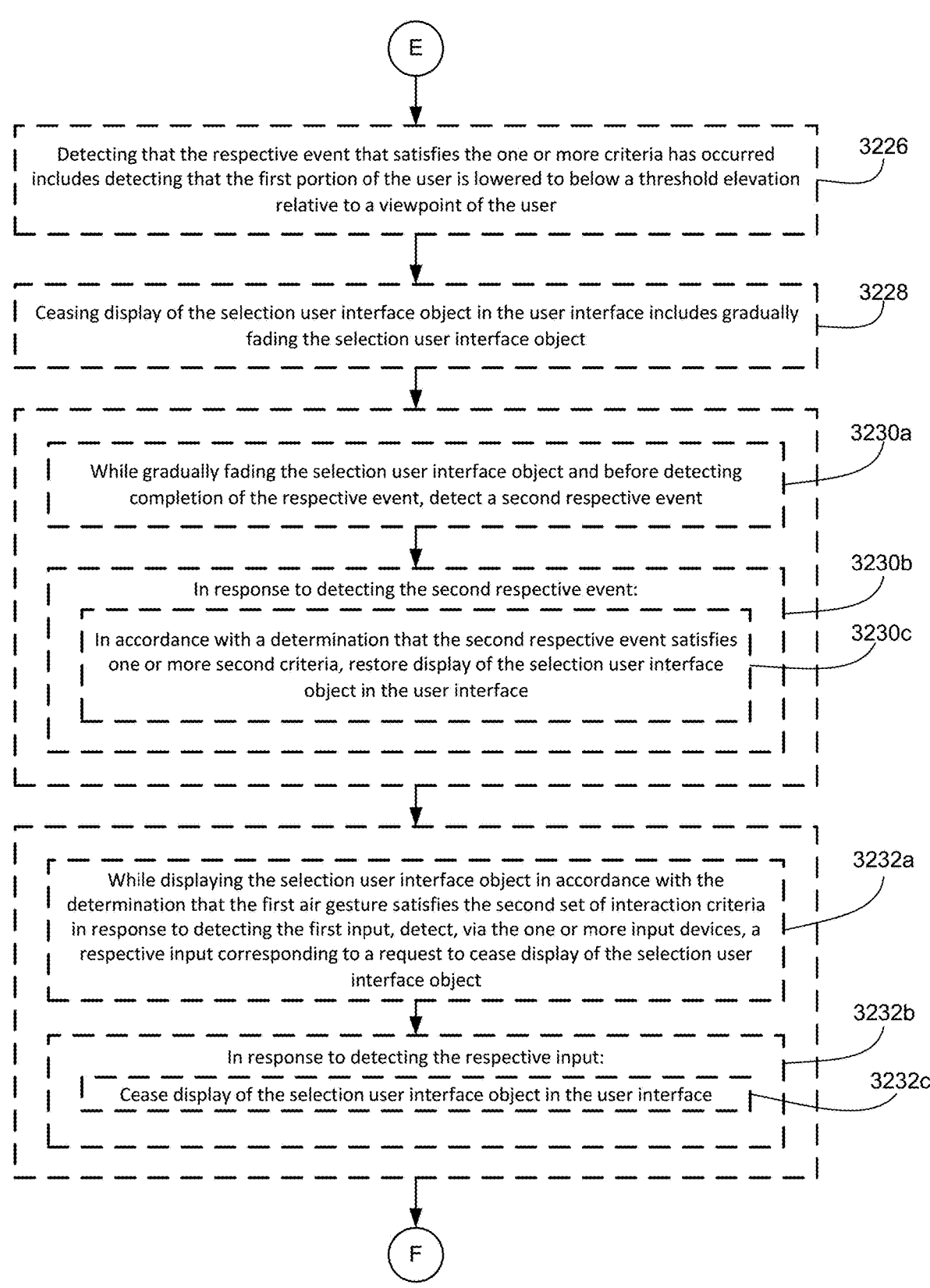

E

Detecting that the respective event that satisfies the one or more criteria has occurred includes detecting that the first portion of the user is lowered to below a threshold elevation relative to a viewpoint of the user — 3226

Ceasing display of the selection user interface object in the user interface includes gradually fading the selection user interface object — 3228

While gradually fading the selection user interface object and before detecting completion of the respective event, detect a second respective event — 3230a In response to detecting the second respective event: — 3230b In accordance with a determination that the second respective event satisfies one or more second criteria, restore display of the selection user interface object in the user interface — 3230c While displaying the selection user interface object in accordance with the determination that the first air gesture satisfies the second set of interaction criteria in response to detecting the first input, detect, via the one or more input devices, a respective input corresponding to a request to cease display of the selection user interface object — 3232a In response to detecting the respective input: — 3232b Cease display of the selection user interface object in the user interface — 3232c

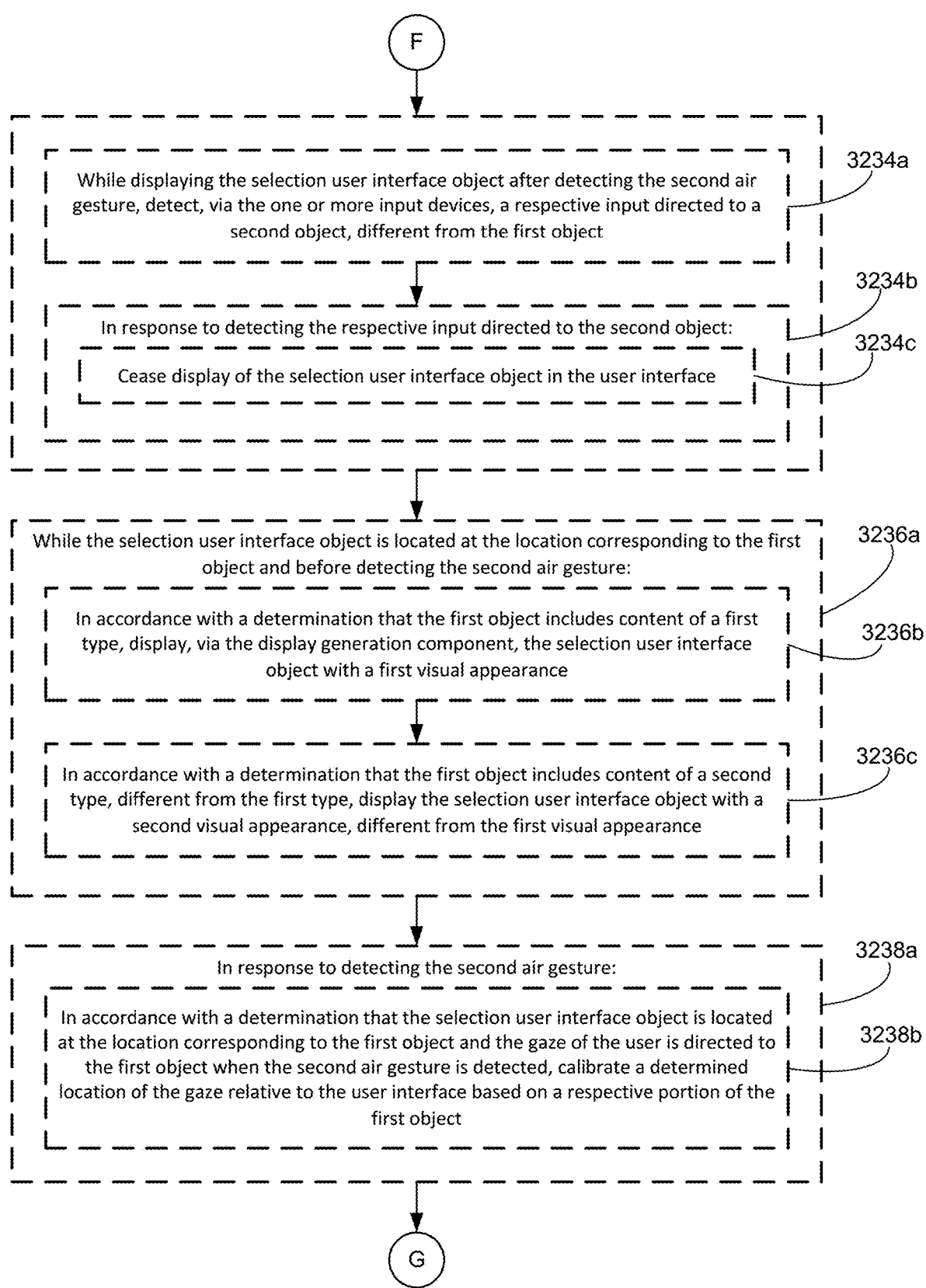

F

While displaying the selection user interface object after detecting the second air gesture, detect, via the one or more input devices, a respective input directed to a second object, different from the first object — 3234a In response to detecting the respective input directed to the second object: — 3234b Cease display of the selection user interface object in the user interface — 3234c While the selection user interface object is located at the location corresponding to the first object and before detecting the second air gesture: — 3236a In accordance with a determination that the first object includes content of a first type, display, via the display generation component, the selection user interface object with a first visual appearance — 3236b In accordance with a determination that the first object includes content of a second type, different from the first type, display the selection user interface object with a second visual appearance, different from the first visual appearance — 3236c In response to detecting the second air gesture: — 3238a In accordance with a determination that the selection user interface object is located at the location corresponding to the first object and the gaze of the user is directed to the first object when the second air gesture is detected, calibrate a determined location of the gaze relative to the user interface based on a respective portion of the first object — 3238b

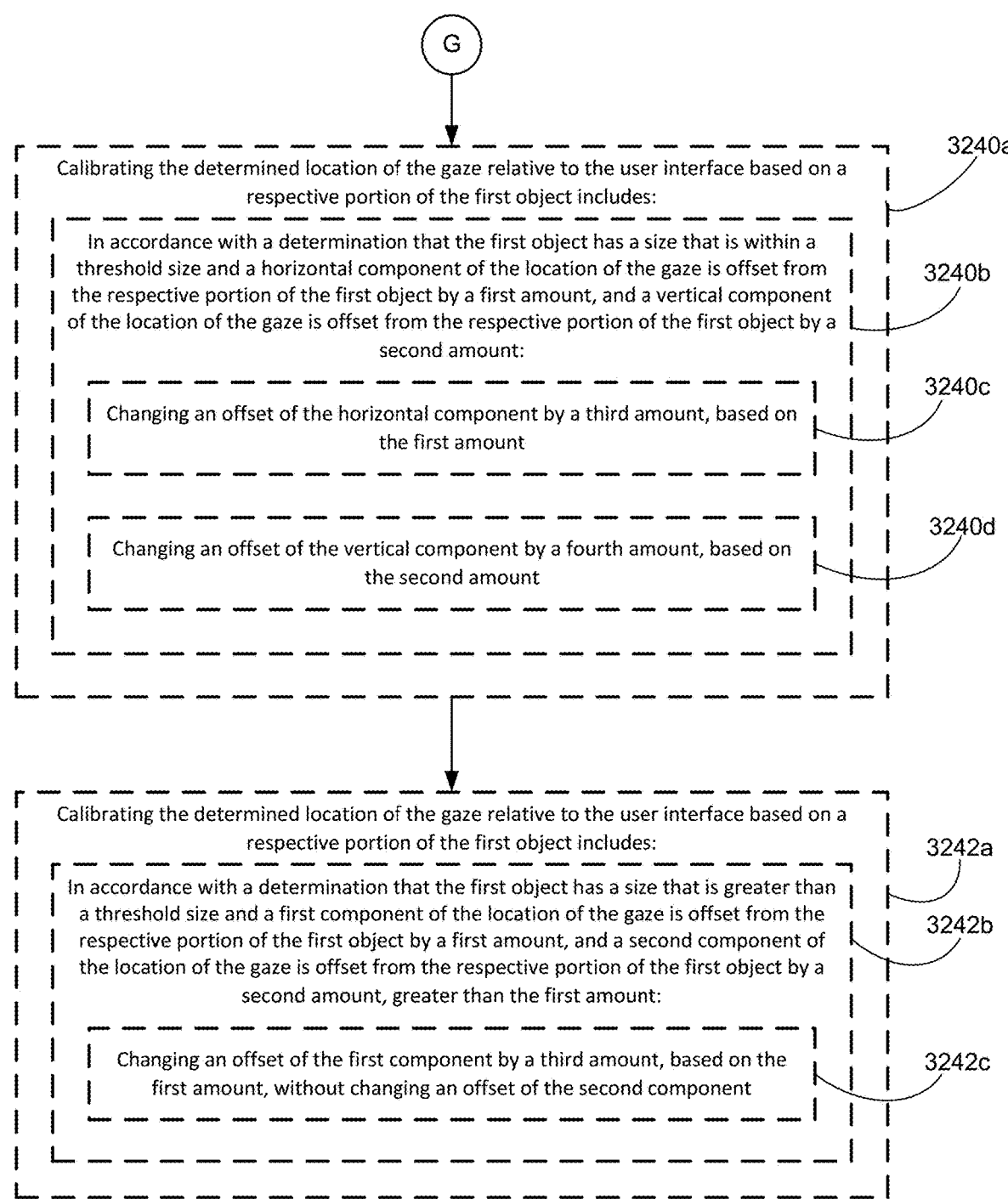

G

Calibrating the determined location of the gaze relative to the user interface based on a respective portion of the first object includes: — 3240a In accordance with a determination that the first object has a size that is within a threshold size and a horizontal component of the location of the gaze is offset from the respective portion of the first object by a first amount, and a vertical component of the location of the gaze is offset from the respective portion of the first object by a second amount: — 3240b Changing an offset of the horizontal component by a third amount, based on the first amount — 3240c Changing an offset of the vertical component by a fourth amount, based on the second amount — 3240d Calibrating the determined location of the gaze relative to the user interface based on a respective portion of the first object includes: — 3242a In accordance with a determination that the first object has a size that is greater than a threshold size and a first component of the location of the gaze is offset from the respective portion of the first object by a first amount, and a second component of the location of the gaze is offset from the respective portion of the first object by a second amount, greater than the first amount: — 3242b Changing an offset of the first component by a third amount, based on the first amount, without changing an offset of the second component — 3242c

FIG. 32H

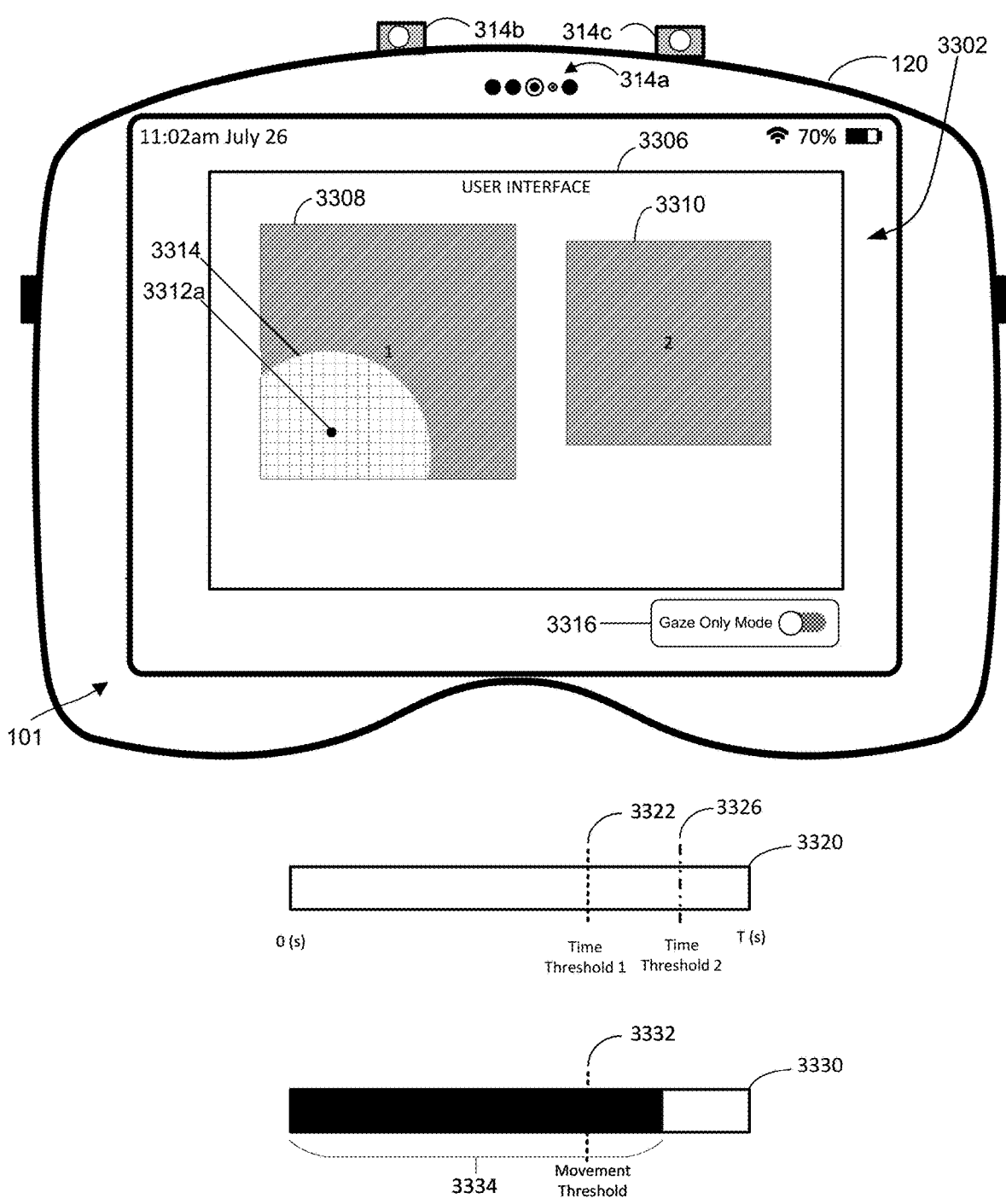
FIG. 33A1

<u>3400</u>

Display, via the display generation component, a user interface including a selectable virtual object — 3402a

↓

While displaying the user interface including the selectable virtual object: — 3402b In accordance with a determination that attention of the user of the computer system directed towards the selectable virtual object satisfies a first set of one or more criteria, wherein the first set of one or more criteria include a requirement that movement of the attention of the user is below a movement threshold in order for the first set of one or more criteria to be met, display, via the display generation component, a visual indicator indicating a progress towards selecting the selectable virtual object based on the attention of the user; — 3402c

↓

After displaying the visual indicator: — 3402d

In accordance with a determination that the attention of the user has met a second set of one or more criteria relative to the visual indicator while the visual indicator is displayed, wherein the second set of one or more criteria include a requirement that the attention of the user has been within a threshold distance of the visual indicator for at least a first time threshold in order for the second set of one or more criteria to be met, perform a selection operation associated with the selectable virtual object — 3402e

↓

In accordance with a determination that the attention of the user has not met the second set of one or more criteria while the visual indicator is displayed, forgo performing the selection operation associated with the selectable virtual object — 3402f

FIG. 34A

METHODS FOR INTERACTING WITH USER INTERFACES BASED ON ATTENTION

CROSS REFERENCE TO RELATED APPLICATIONS

This application claims the benefit of U.S. Provisional Application No. 63/377,024, filed Sep. 24, 2022, U.S. Provisional Application No. 63/503,138, filed May 18, 2023, U.S. Provisional Application No. 63/506,080, filed Jun. 3, 2023, and U.S. Provisional Application No. 63/506,124, filed Jun. 4, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a gaze virtual object that is selectable, based on attention directed to the gaze virtual object, to perform an operation associated with a selectable virtual object. In some embodiments, a computer system displays indication of attention of a user. In some embodiments, a computer system displays an enlarged view of a region of a user interface. In some embodiments, a computer system adjusts a value of a slider element based on attention of a user. In some embodiments, a computer system moves a user interface element (e.g., thumb) in a user interface (e.g., slider element) at a respective rate based on attention of a user. In some embodiments, a computer system enters text into a text entry field in response to speech inputs. In some embodiments, a computer system updates a value for a value selection user interface object based on attention of a user. In some embodiments, a computer system facilitates direct touch interaction in a three-dimensional environment. In some embodiments, a computer system facilitates direct touch interactions with content in a three-dimensional environment. In some embodiments, a computer system facilitates movement of a virtual object relative to a viewpoint of user in accordance with direct touch interactions in a three-dimensional environment. In some embodiments, a computer system facilitates user input for displaying a selection refinement user interface object in a three-dimensional environment. In some embodiments, a computer system displays a visual indicator indicating a progress towards selecting a selectable virtual object when certain criteria are met.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8I is a flowchart illustrating an exemplary method of displaying a gaze virtual object that is selectable, based on attention directed to the gaze virtual object, to perform an operation associated with a selectable virtual object in accordance with some embodiments.

FIGS. 9A-9J is a flowchart illustrating an exemplary method of displaying a gaze virtual object that is selectable, based on attention directed to the gaze virtual object, to perform an operation associated with a selectable virtual object in accordance with some embodiments.

FIGS. 10A-10G is a flowchart illustrating a method of displaying a gaze virtual object that is selectable, based on attention directed to the gaze virtual object, to perform an operation associated with a selectable virtual object in accordance with some embodiments.

FIGS. 12A-12L is a flowchart illustrating a method of displaying indication of attention of a user in accordance with some embodiments.

FIGS. 14A-14E is a flowchart illustrating a method of displaying an enlarged view of a region of a user interface in accordance with some embodiments.

FIGS. 16A-16H is a flowchart illustrating a method of adjusting a value of a slider element based on attention of a user in accordance with some embodiments.

FIGS. 18A-18F is a flowchart illustrating a method of moving a user interface element (e.g., thumb) in a user interface (e.g., slider element) at a respective rate based on attention of a user in accordance with some embodiments.

FIGS. 20A-20E is a flowchart illustrating a method of displaying indication of attention of a user in accordance with some embodiments.

FIGS. 22A-22H is a flowchart illustrating a method of entering text into a text entry field in response to speech inputs in accordance with some embodiments.

FIGS. 24A-24H is a flowchart illustrating a method of displaying a value selection user interface object that is selectable, based on attention directed to the value selection user interface object, to navigate through options for the value selection user interface object and select a value from the options in accordance with some embodiments.

FIGS. 26A-26J is a flowchart illustrating a method of facilitating direct touch interactions with content in a three-dimensional environment in accordance with some embodiments.

FIGS. 27A-27H is a flowchart illustrating a method of facilitating direct touch interactions with content in a three-dimensional environment in accordance with some embodiments.

FIGS. 28A-28H is a flowchart illustrating a method of displaying indication of attention of a user in accordance with some embodiments.

FIGS. 30A-30I is a flowchart illustrating a method of facilitating movement of a virtual object relative to a viewpoint of user in accordance with direct touch interactions in a three-dimensional environment in accordance with some embodiments.

FIGS. 32A-32H is a flowchart illustrating a method of facilitating user input for displaying a selection refinement user interface object in a three-dimensional environment in accordance with some embodiments.

FIG. 34A is a flowchart illustrating a method of displaying a visual indicator indicating a progress towards selecting a selectable virtual object when certain criteria are met in accordance with some embodiments.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays a gaze virtual object that is selectable, based on attention directed to the gaze virtual object, to perform an operation associated with a selectable virtual object. In some embodiments, a computer system displays indication of attention of a user. In some embodiments, a computer system displays an enlarged view of a region of a user interface. In some embodiments, a computer system adjusts a value of a slider element based on attention of a user. In some embodiments, a computer system moves a user interface element (e.g., thumb) in a user interface (e.g., slider element) at a respective rate based on attention of a user. In some embodiments, a computer system enters text into a text entry field in response to speech inputs. In some embodiments, a computer system updates a value for a value selection user interface object based on attention of a user. In some embodiments, a computer system facilitates movement of a virtual object relative to a viewpoint of user in accordance with direct touch interactions in a three-dimensional environment. In some embodiments, a computer system facilitating movement of a virtual object relative to a viewpoint of user in accordance with direct touch interactions in a three-dimensional environment. In some embodiments, a computer system facilitates user input for displaying a selection refinement user interface object in a three-dimensional environment. In some embodiments, a computer system displays a visual indicator indicating a progress towards selecting a selectable virtual object when certain criteria are met.

Figure 11A:
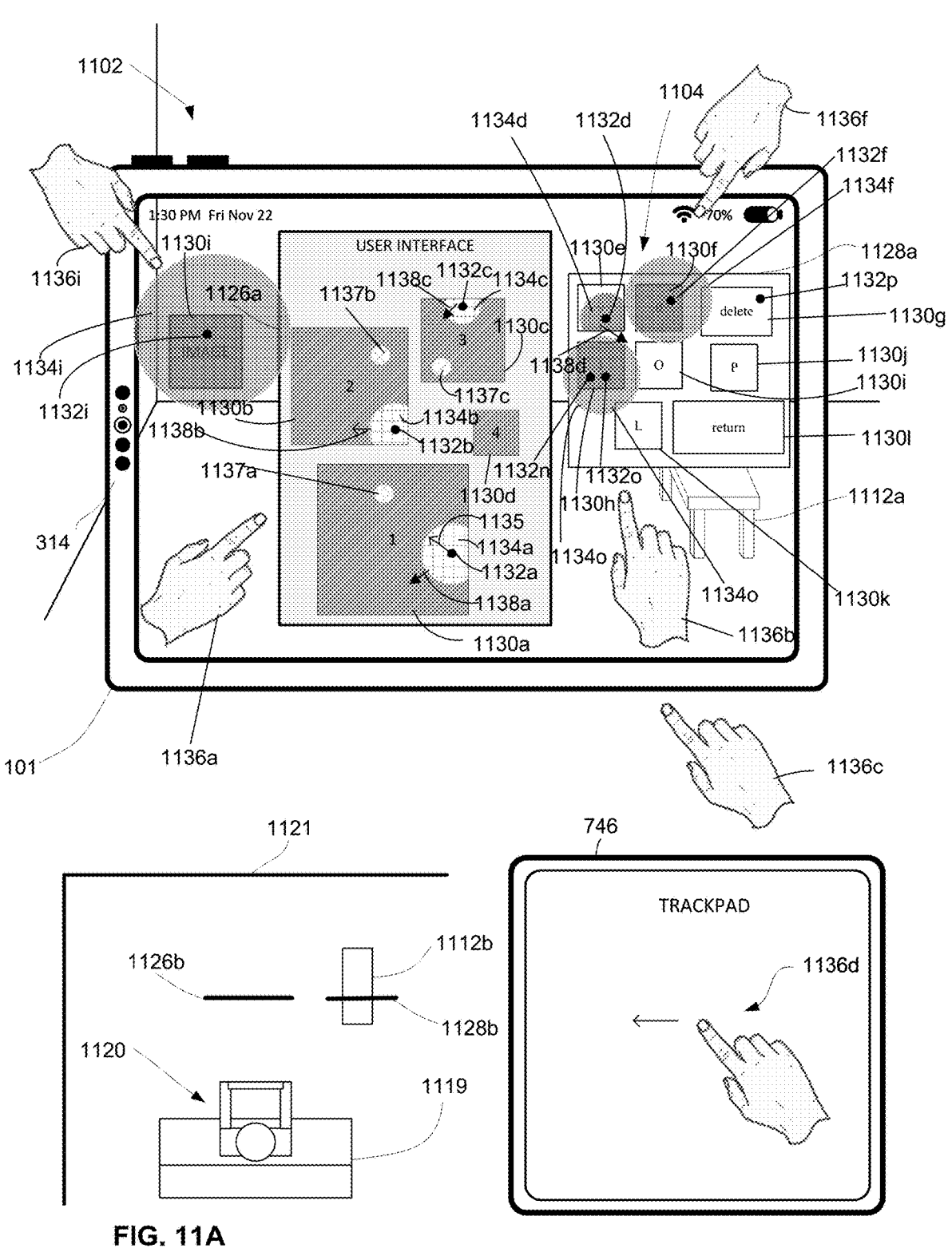
FIGS. 11A-11C illustrate examples of a computer system displaying indication of attention of a user in accordance with some embodiments.
Figure 11B:
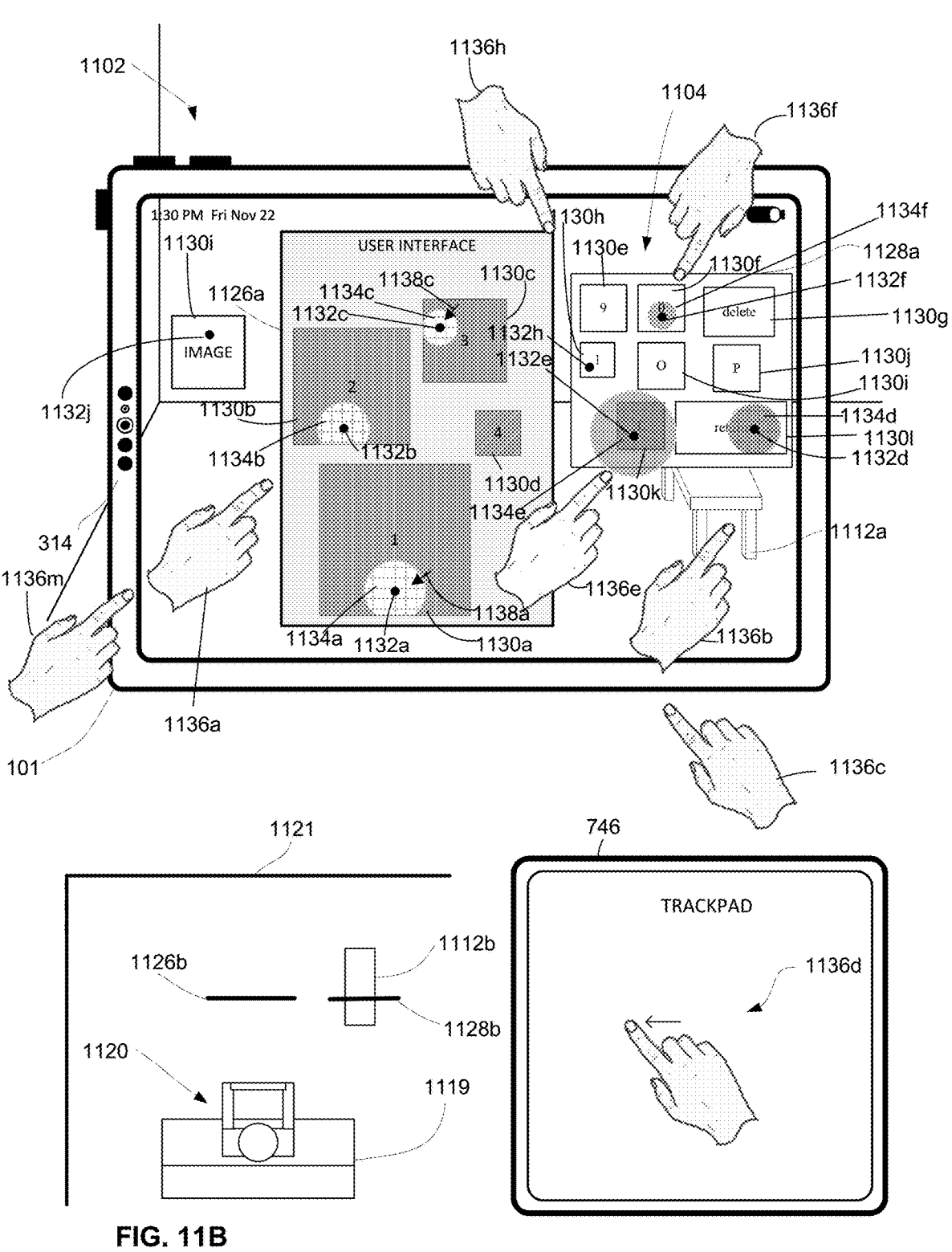
Figure 11C:
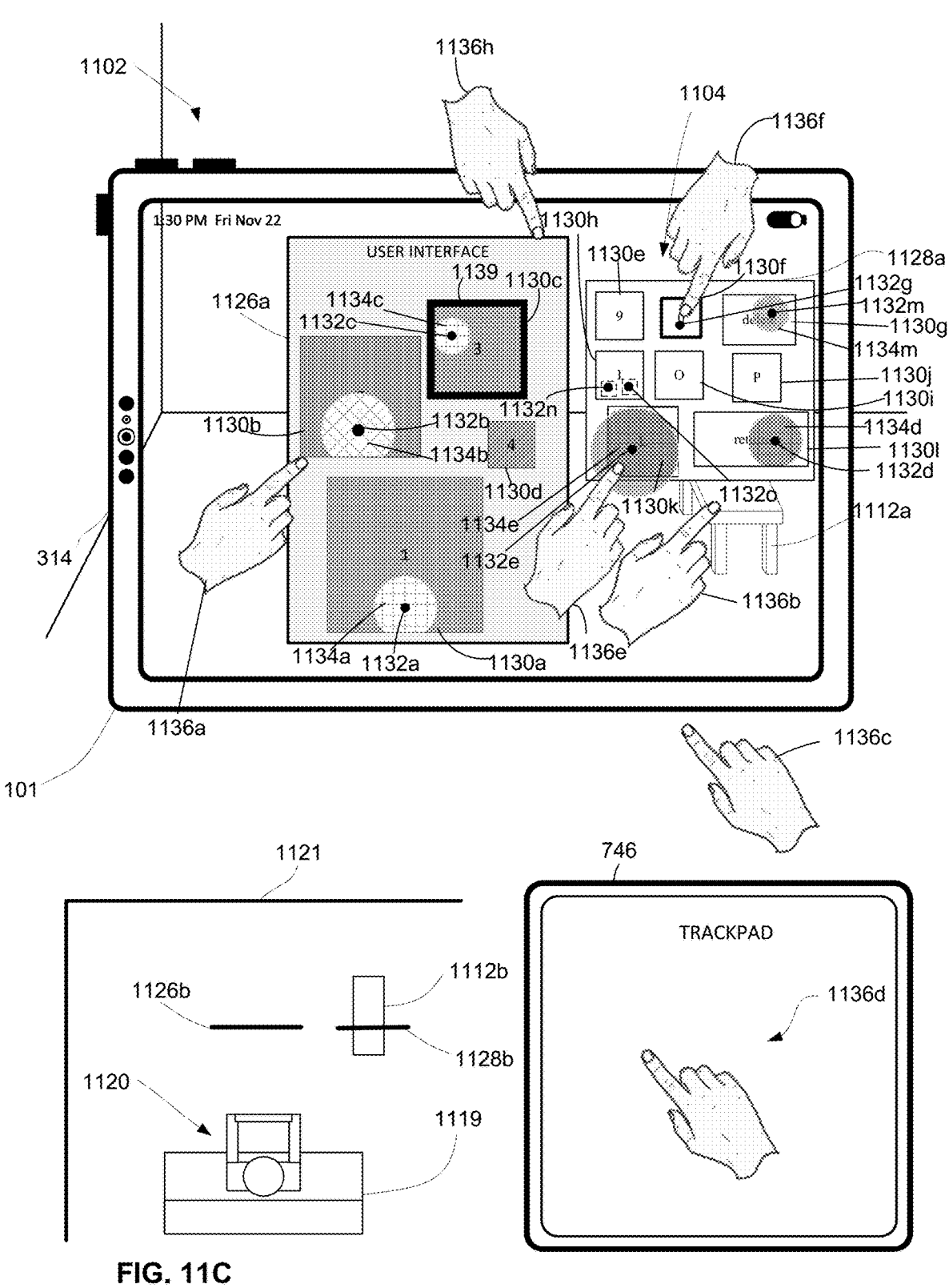
Figure 12C:
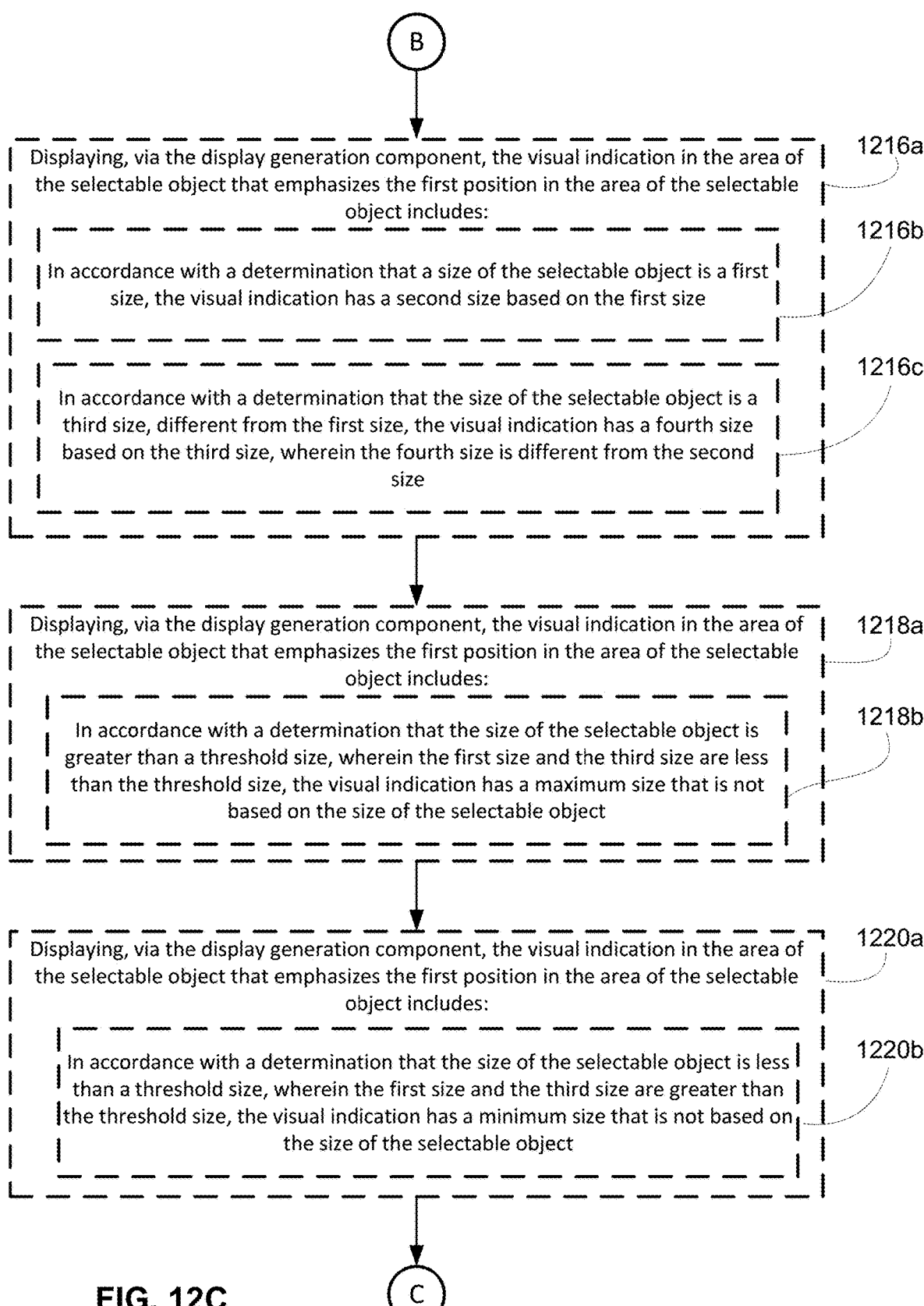
Figure 12H:
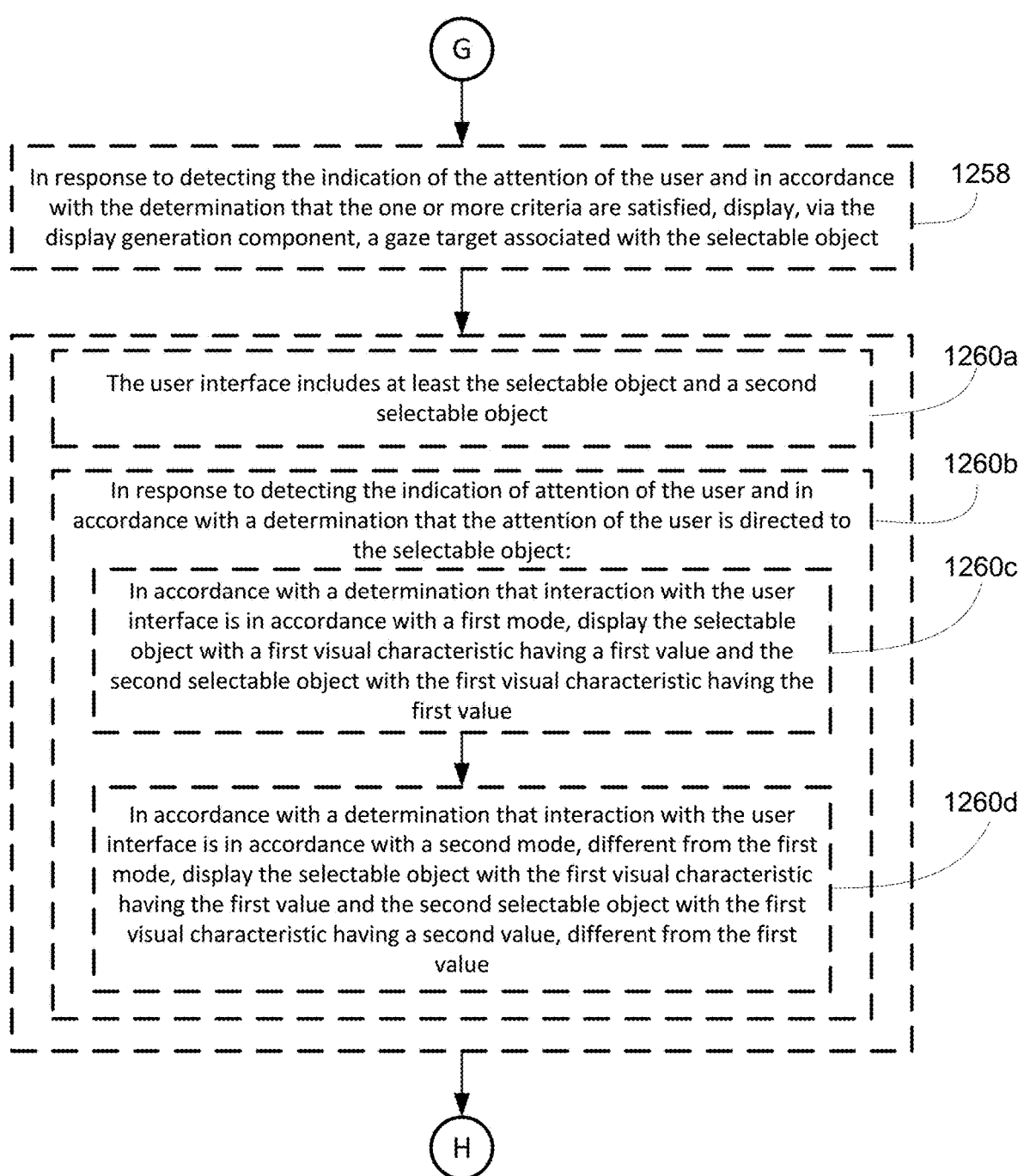
Figure 12I:
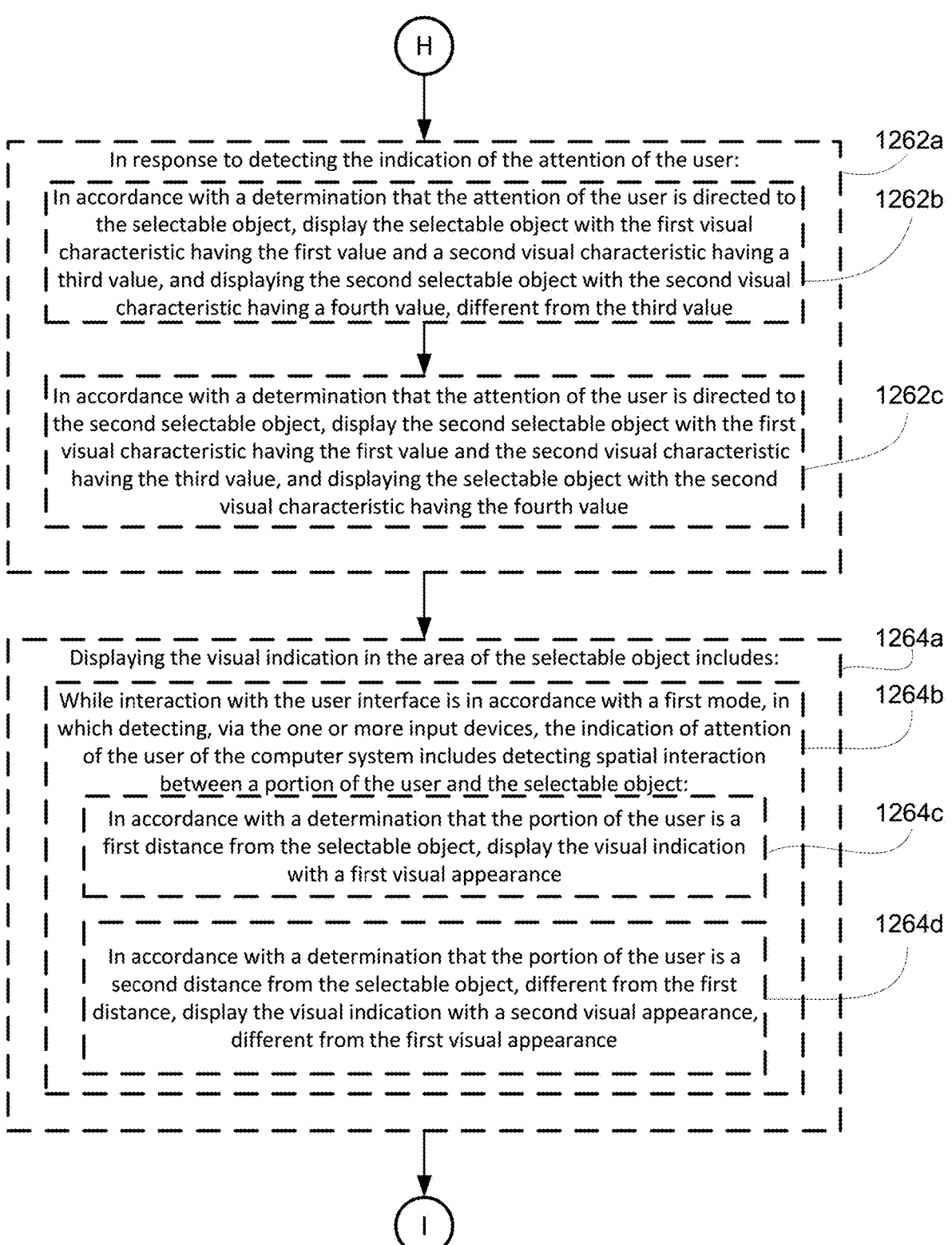
Figure 12J:
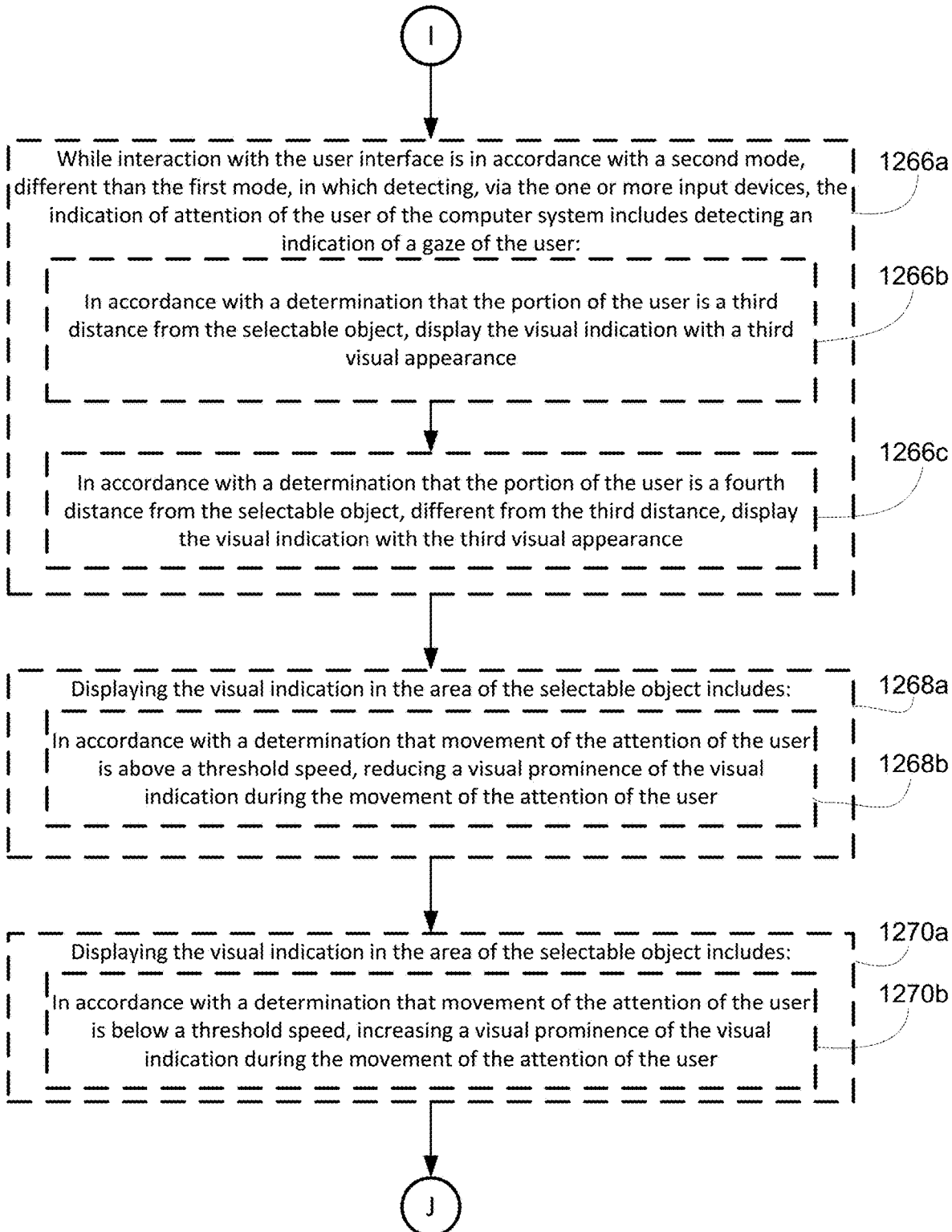
Figure 12K:
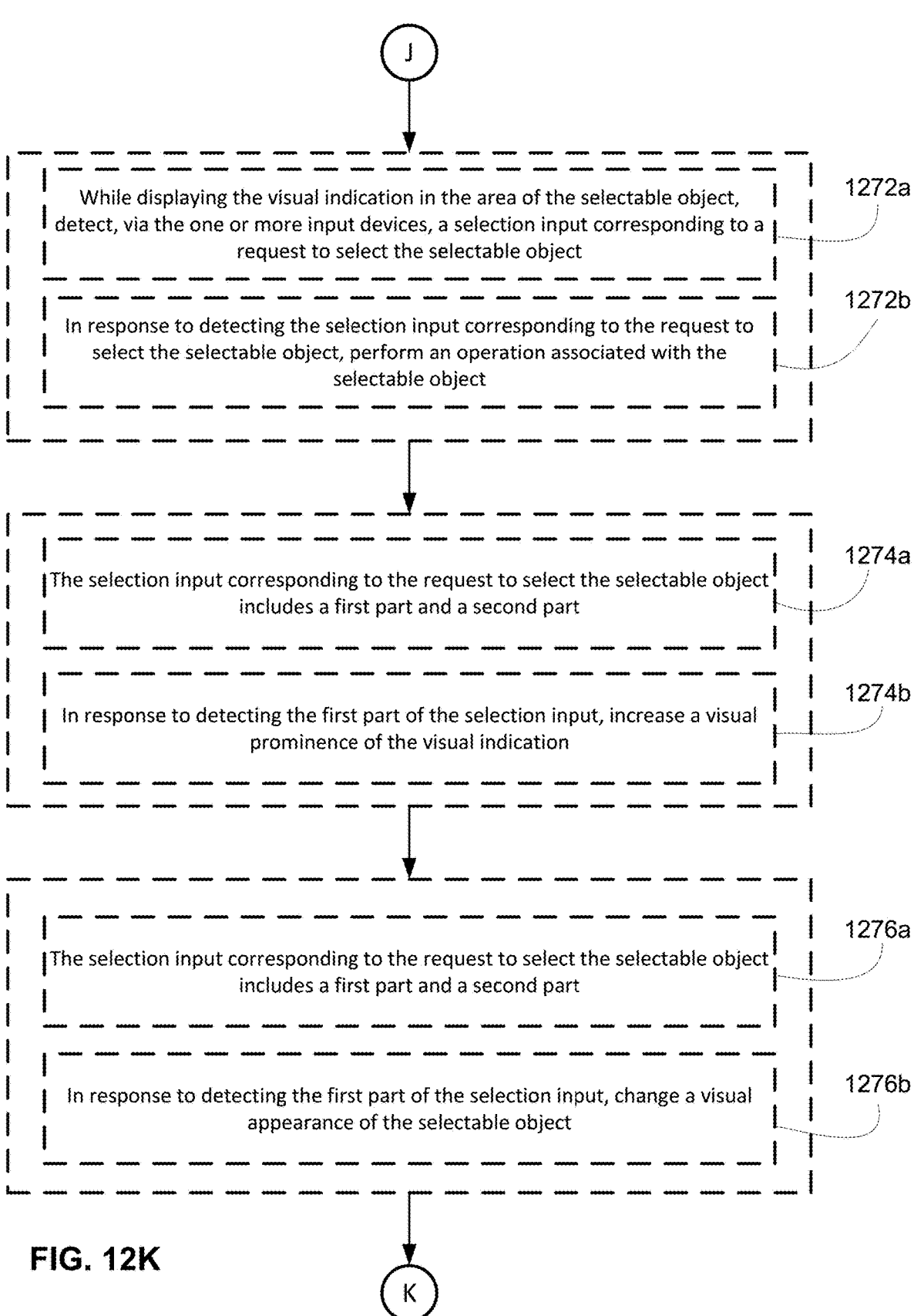
Figure 12L:
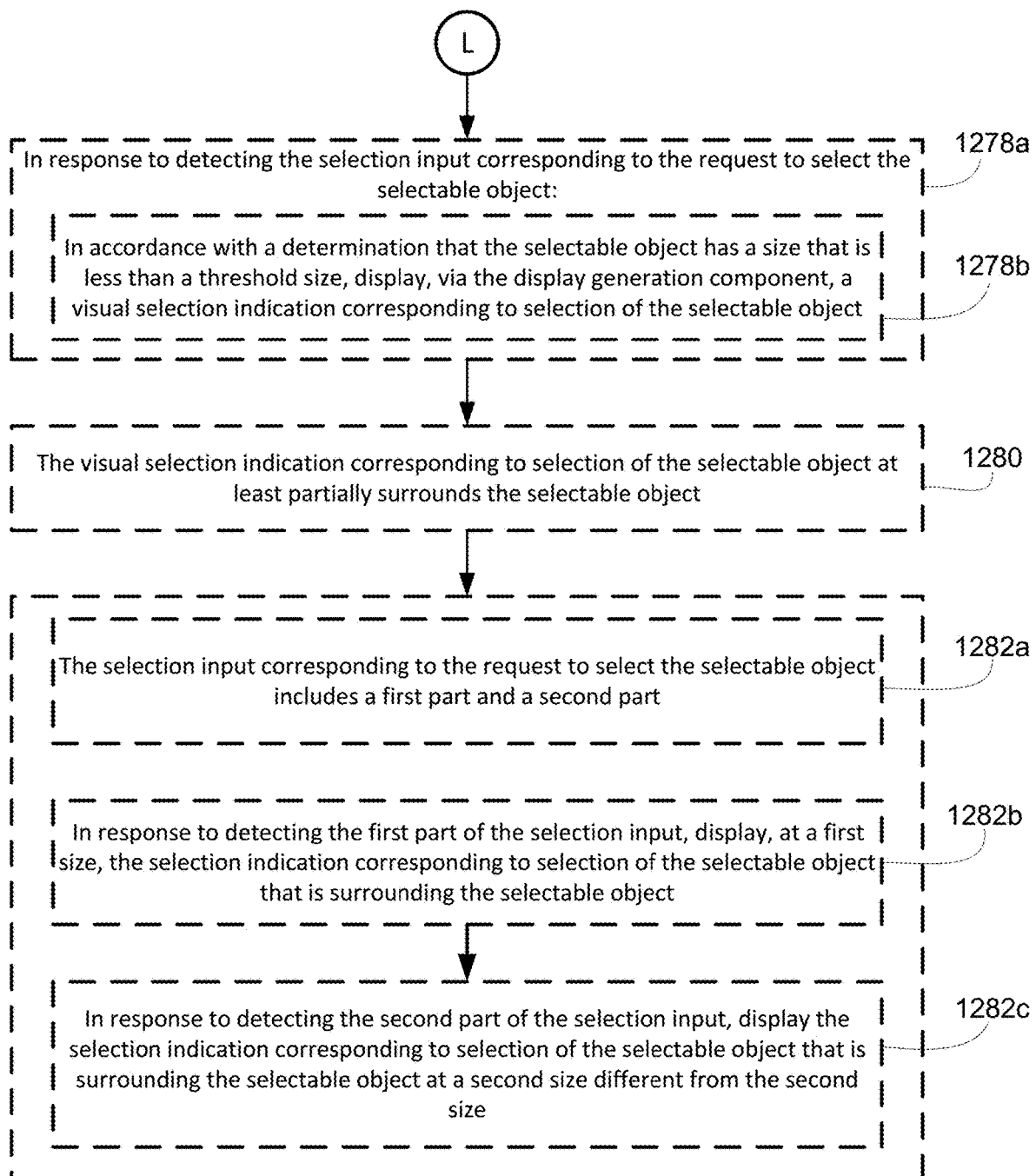
Figure 13A:
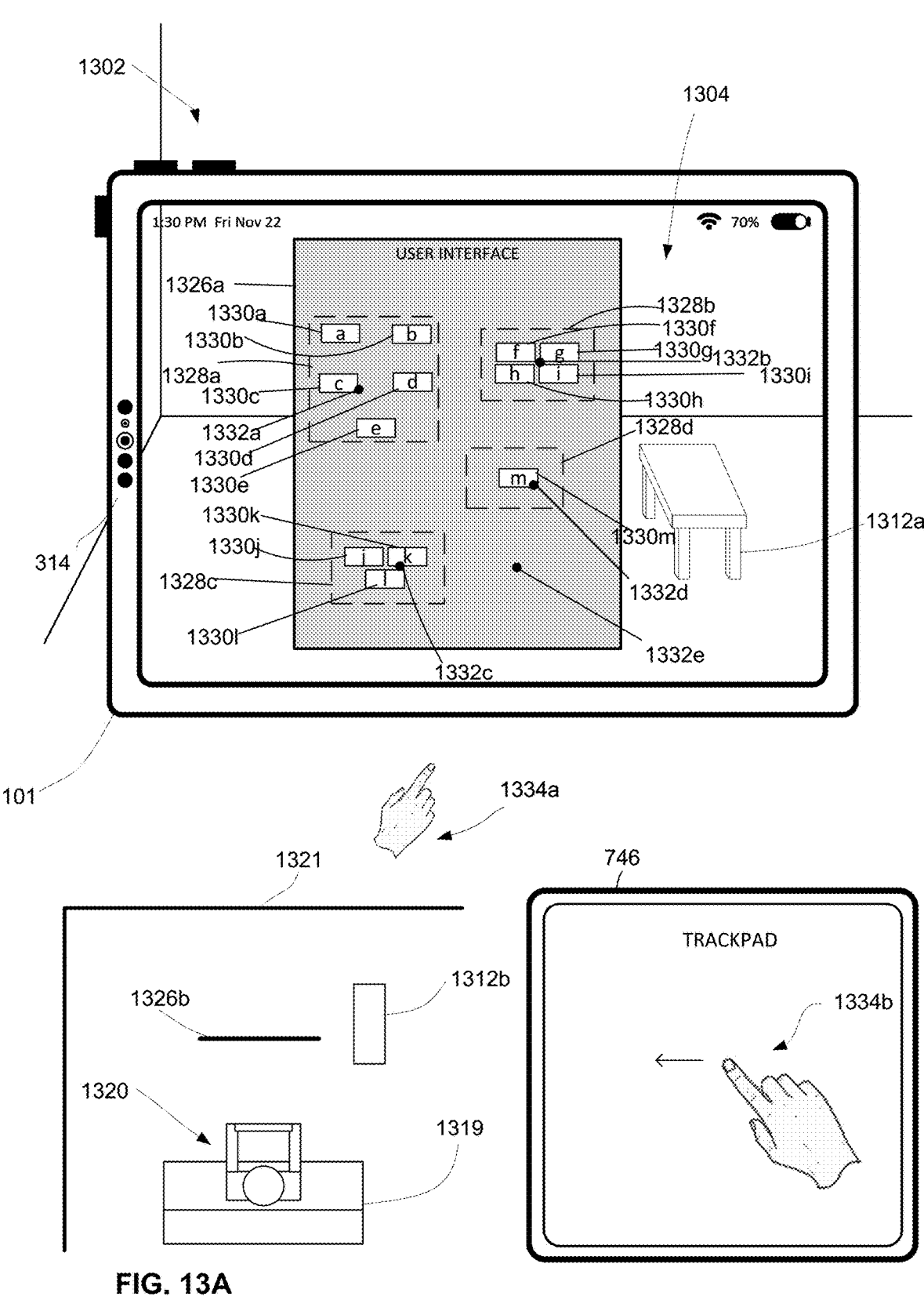
FIGS. 13A-13C illustrate examples of a first computer system displaying an enlarged view of a region of a user interface in accordance with some embodiments.
Figure 13B:
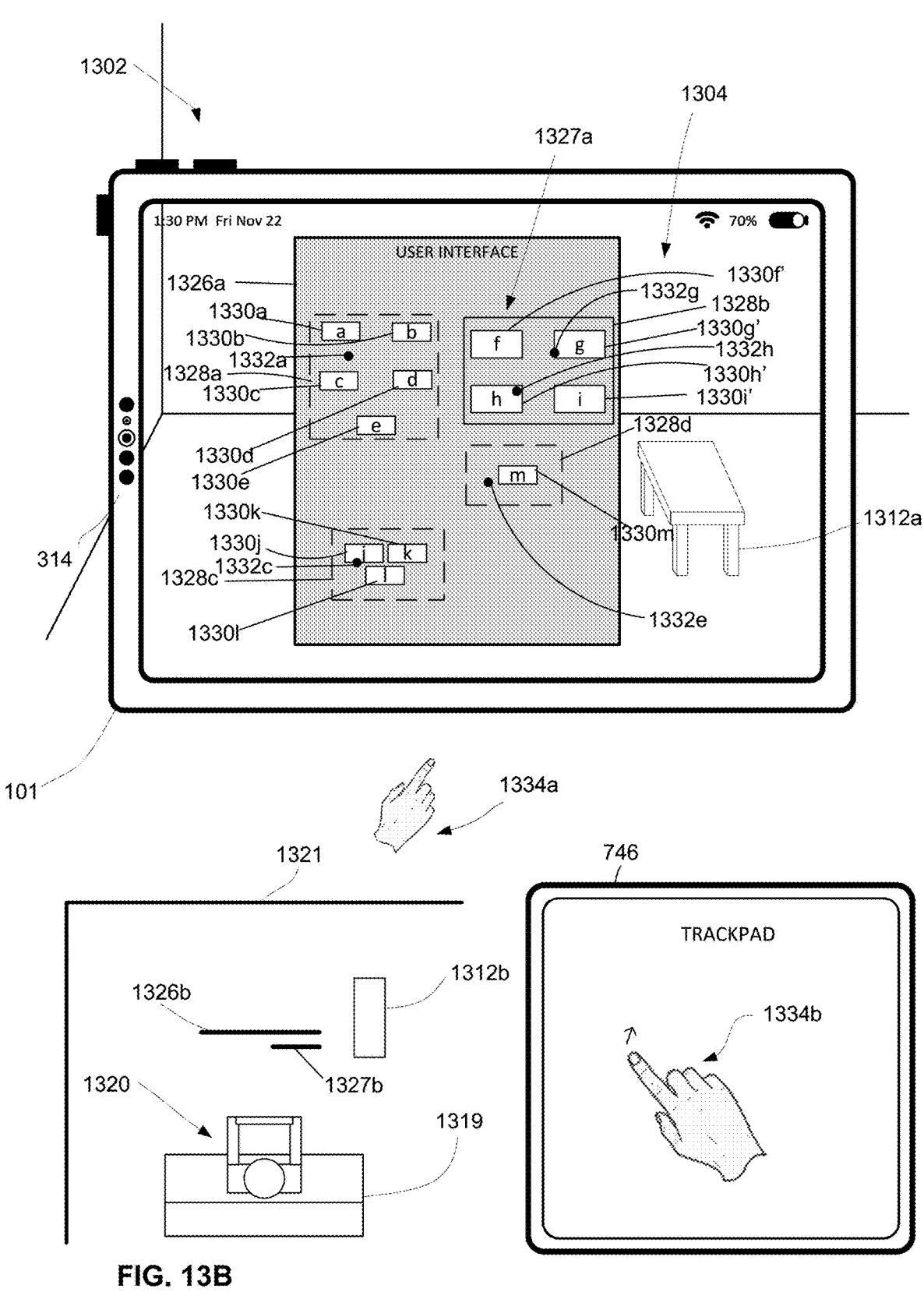
Figure 13C:
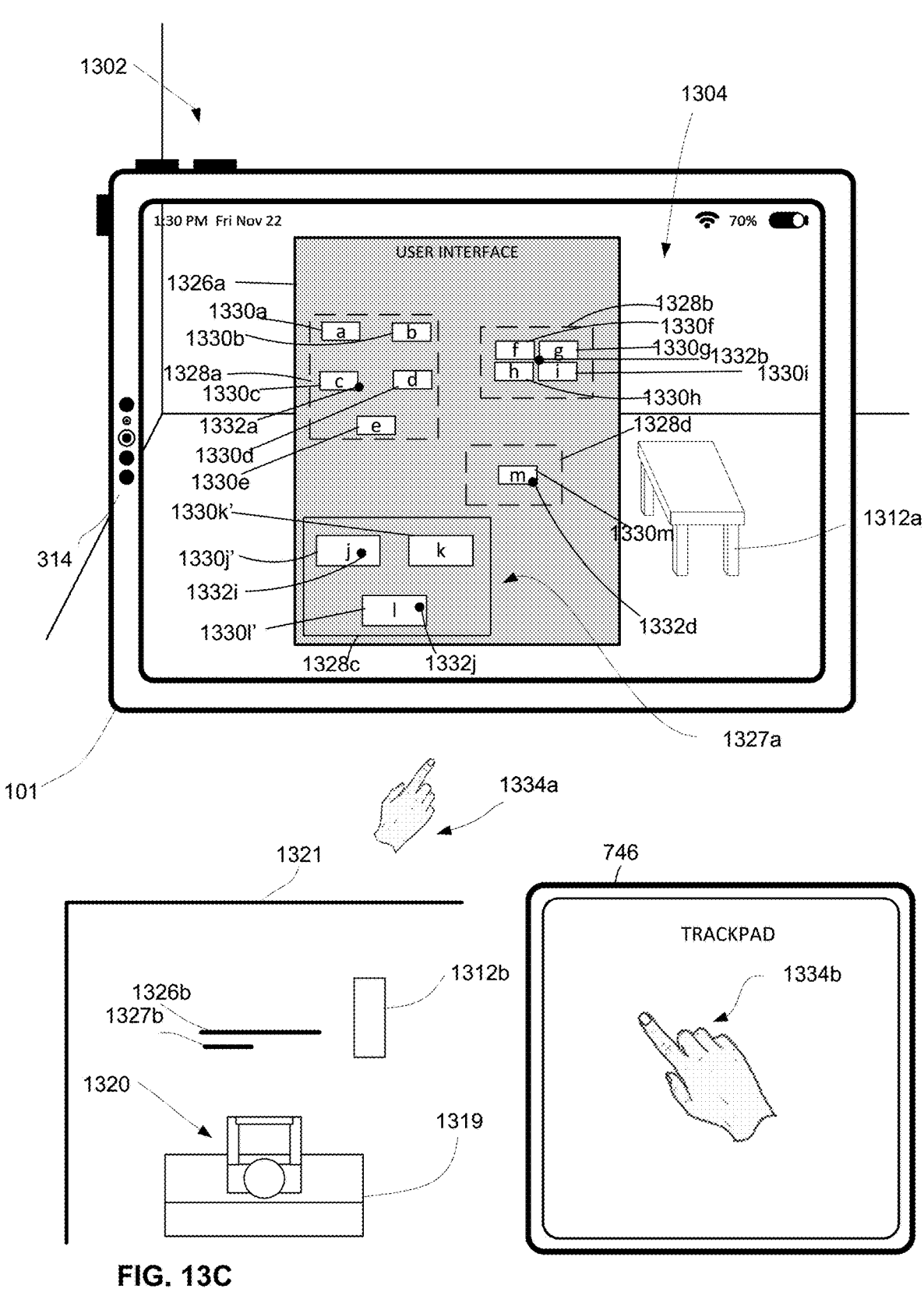
Figure 14B:
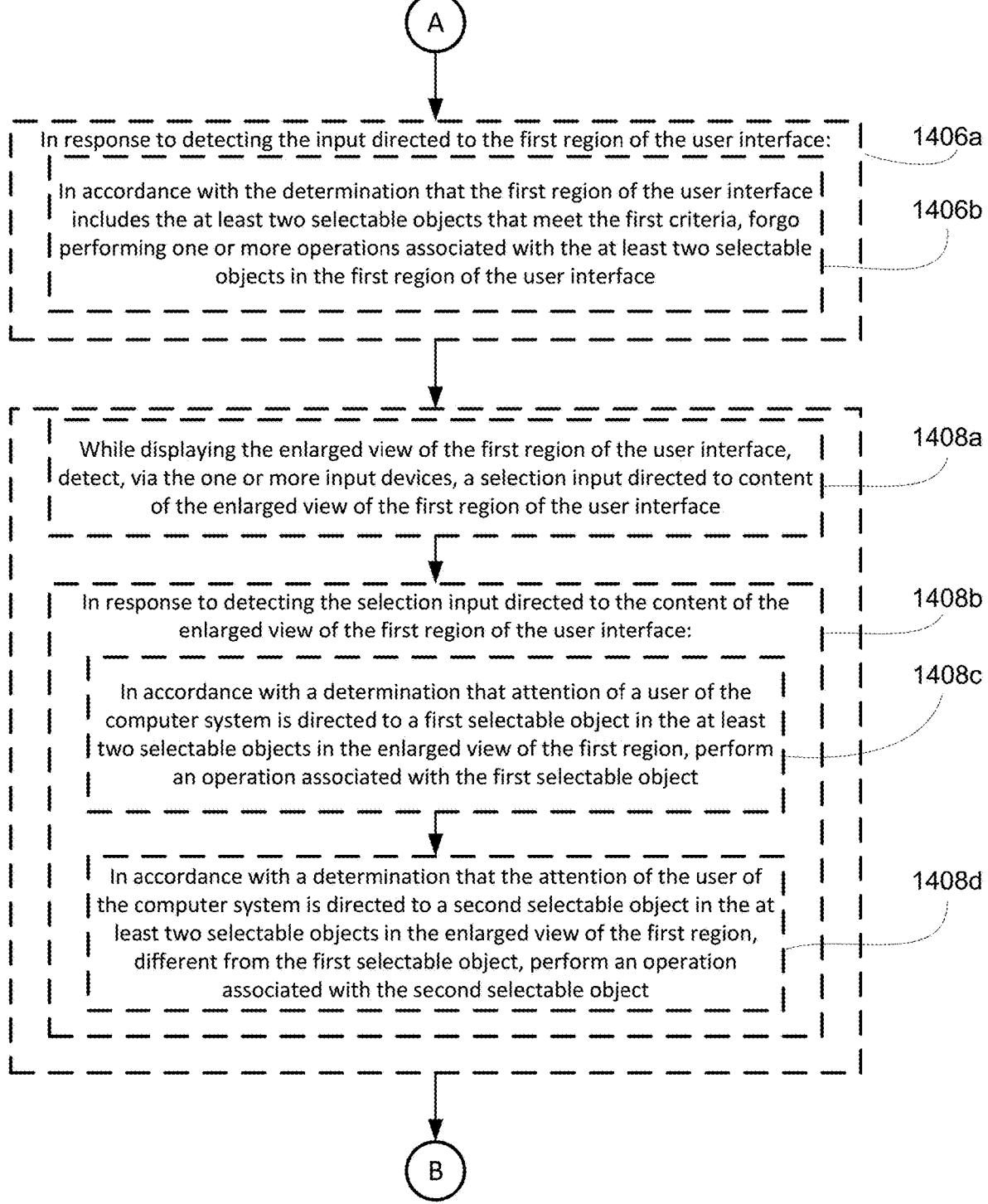
Figure 14D:
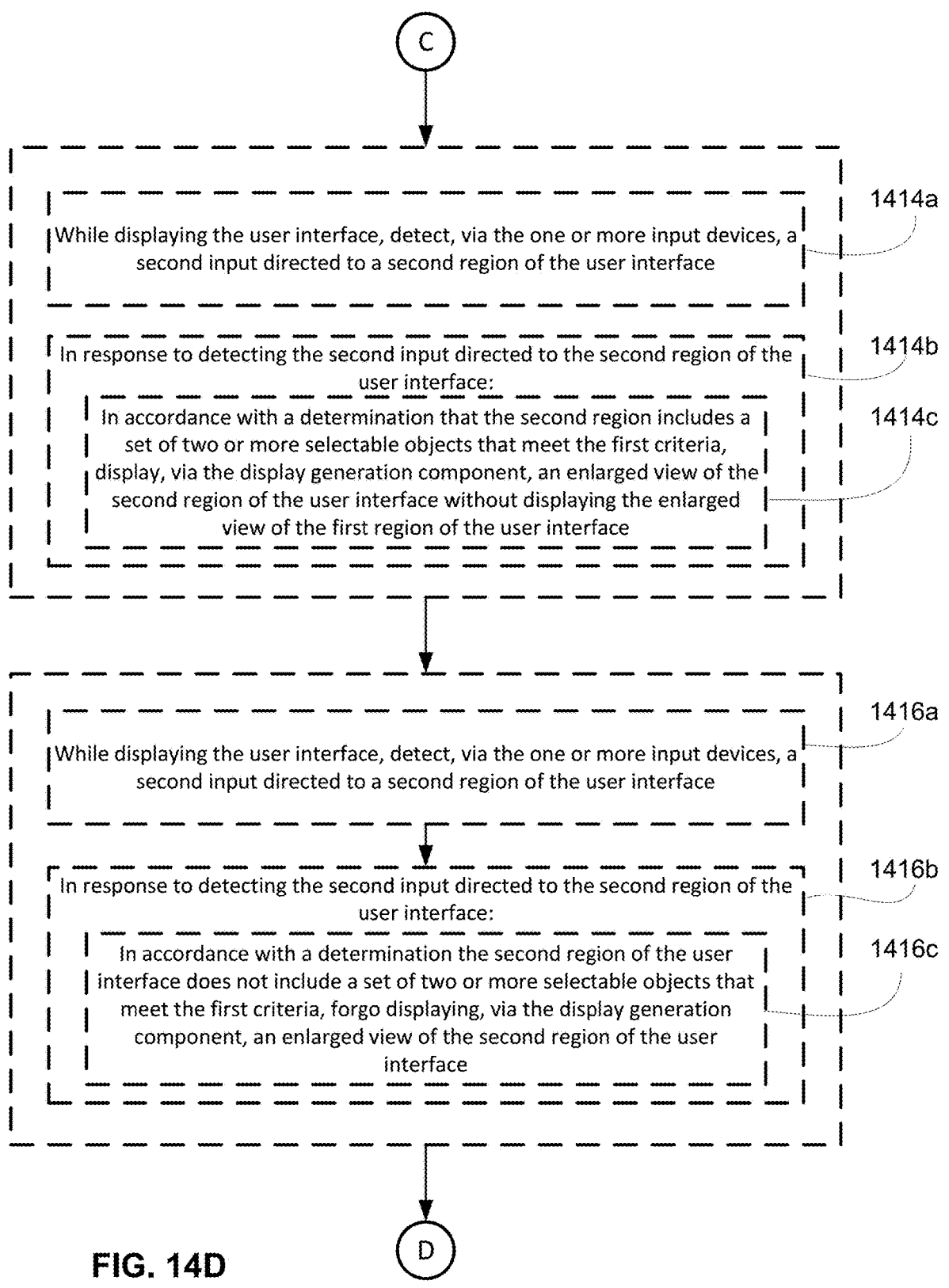

FIGS. 1A-6 provide a description of example computer systems for providing XR experiences to users (such as described below with respect to methods 800, 900, 1000, 1200, 1400, 1600, 1800, 2000, 2200, 2400, 2600, 2700, 2800, 3000, 3200 and/or 3400). FIGS. 7A-7O illustrate examples of a computer system displaying a gaze virtual object that is selectable, based on attention directed to the gaze virtual object, to perform an operation associated with a selectable virtual object in accordance with some embodiments. FIGS. 8A-8I, 9A-9J, and 10A-10G are flowcharts illustrating exemplary methods of displaying a gaze virtual object that is selectable, based on attention directed to the gaze virtual object, to perform an operation associated with a selectable virtual object in accordance with some embodiments. The user interfaces in FIGS. 7A-7O are used to illustrate the processes in FIGS. 8A-8I, 9A-9J, and 10A-10G. FIGS. 11A-11C illustrate example techniques for displaying indication of attention of a user in accordance with some embodiments. FIGS. 12A-12L is a flow diagram of methods of displaying indication of attention of a user in accordance with various embodiments. FIGS. 28A-28H is a flow diagram of methods of displaying indication of attention of a user in accordance with various embodiments. The user interfaces in FIGS. 11A-11C are used to illustrate the processes in FIGS. 12A-12L and the processes in FIGS. 28A-28H. FIGS. 13A-13C illustrate example techniques for displaying an enlarged view of a region of a user interface in accordance with some embodiments. FIGS. 14A-14E is a flow diagram of methods of displaying an enlarged view of a region of a user interface in accordance with various embodiments. The user interfaces in FIGS. 13A-13C are used to illustrate the processes in FIGS. 14A-14E. FIGS. 15A-15F illustrate example techniques for adjusting a value of a slider element based on attention of a user in accordance with some embodiments. FIGS. 16A-16H is a flow diagram of methods of adjusting a value of a slider element based on attention of a user in accordance with various embodiments. The user interfaces in FIGS. 15A-15F are used to illustrate the processes in FIGS. 16A-16H. FIGS. 17A-17G illustrate example techniques for moving a user interface element (e.g., thumb) in a user interface (e.g., slider element) at a respective rate based on attention of a user in accordance with some embodiments. FIGS. 18A-18F is a flow diagram of methods of moving a user interface element (e.g., thumb) in a user interface (e.g., slider element) at a respective rate based on attention of a user in accordance with various embodiments. The user interfaces in FIGS. 17A-17G are used to illustrate the processes in FIGS. 18A-18F. FIGS. 19A-19J illustrate example techniques for displaying indication of attention of a user in accordance with some embodiments. FIGS. 20A-20E is a flow diagram of methods of displaying indication of attention of a user in accordance with various embodiments. The user interfaces in FIGS. 19A-19J are used to illustrate the processes in FIGS. 20A-20E. FIGS. 21A-21I illustrate example techniques for entering text into a text entry field in response to speech inputs in accordance with some embodiments. FIGS. 22A-22H is a flow diagram of methods of entering text into a text entry field in response to speech inputs in accordance with various embodiments. The user interfaces in FIGS. 21A-21I are used to illustrate the processes in FIGS. 22A-22H. FIGS. 23A-23M illustrate examples techniques for updating a value for a value selection user interface object based on attention of a user in accordance with some embodiments. The user interfaces in FIGS. 23A-23M are used to illustrate the processes in FIGS. 24A-24H. FIGS. 25A-25J illustrate example techniques for facilitating direct touch interactions with one or more virtual objects in a three-dimensional environment in accordance with some embodiments. FIGS. 26A-26J is a flow diagram of a method of facilitating direct touch interactions with content in a three-dimensional environment in accordance with some embodiments. The user interfaces in FIGS. 25A-25J are used to illustrate the processes in FIGS. 26A-26J. FIGS. 27A-27H is a flow diagram of a method of facilitating direct touch interactions with content in a three-dimensional environment in accordance with some embodiments. The user interfaces in FIGS. 25A-25J are used to illustrate the processes in FIGS. 27A-27H. FIGS. 29A-29G illustrate example techniques for facilitating movement of a virtual object relative to a viewpoint of user in accordance with direct touch interactions in a three-dimensional environment in accordance with some embodiments. FIGS. 30A-30I is a flow diagram of methods of facilitating movement of a virtual object relative to a viewpoint of user in accordance with direct touch interactions in a three-dimensional environment in accordance with various embodiments. The user interfaces in FIGS. 29A-29G are used to illustrate the processes in FIGS. 30A-30I. FIGS. 31A-31J illustrate example techniques for facilitating user input for displaying a selection refinement user interface object in a three-dimensional environment in accordance with some embodiments. FIGS. 32A-32H is a flow diagram of methods of facilitating user input for displaying a selection refinement user interface object in a three-dimensional environment in accordance with some embodiments. The user interfaces in FIGS. 31A-31J are used to illustrate the processes in FIGS. 32A-32H. FIGS. 33A-33H illustrate example techniques for displaying a visual indicator indicating a progress towards selecting a selectable virtual object when certain criteria are met in accordance with some embodiments. FIG. 34A is a flow diagram of methods of displaying a visual indicator indicating a progress towards selecting a selectable virtual object when certain criteria are met in accordance with various embodiments. The user interfaces in FIGS. 33A-33H are used to illustrate the processes in FIG. 34A.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
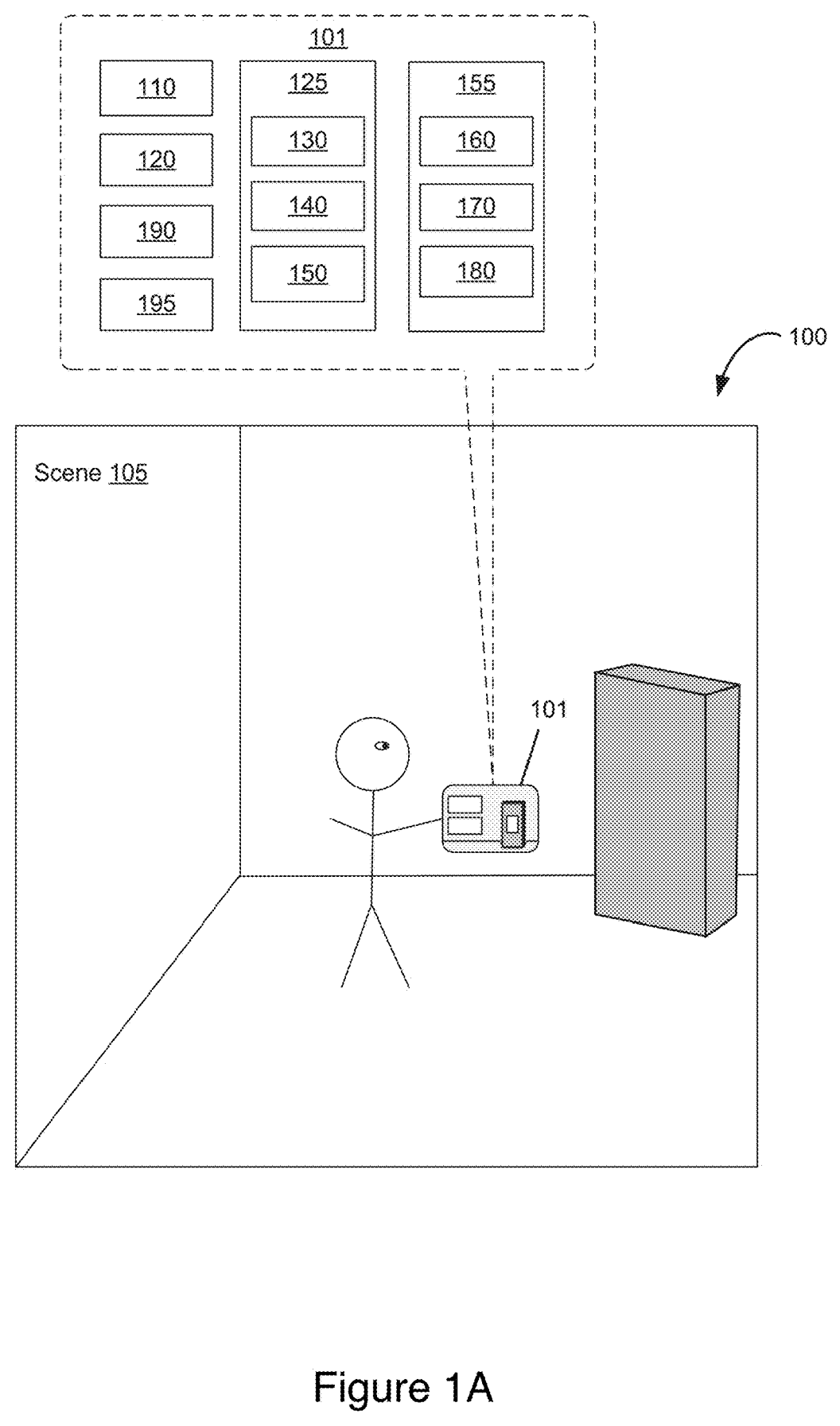

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow"

threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
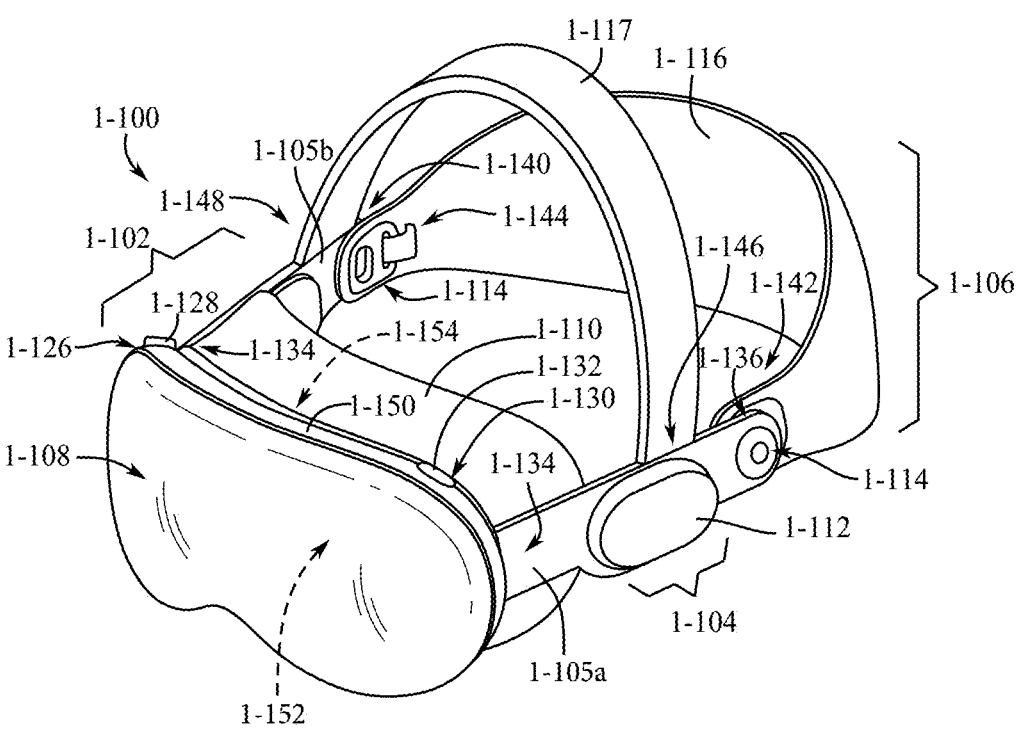
FIGS. 1B-1P are examples of a computer system for providing XR experiences in the operating environment of FIG. 1A.
Figure 1C:
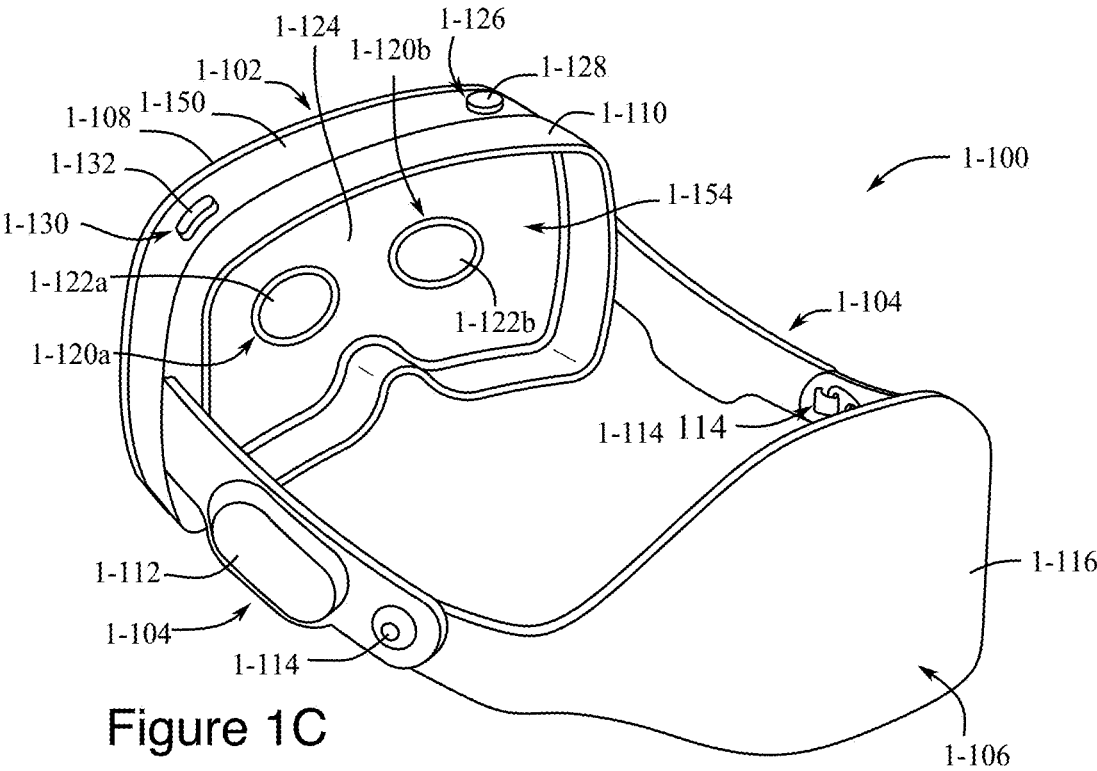
FIG. 1A is a block diagram illustrating an operating environment of a computer system for providing XR experiences in accordance with some embodiments.
Figure 1D:
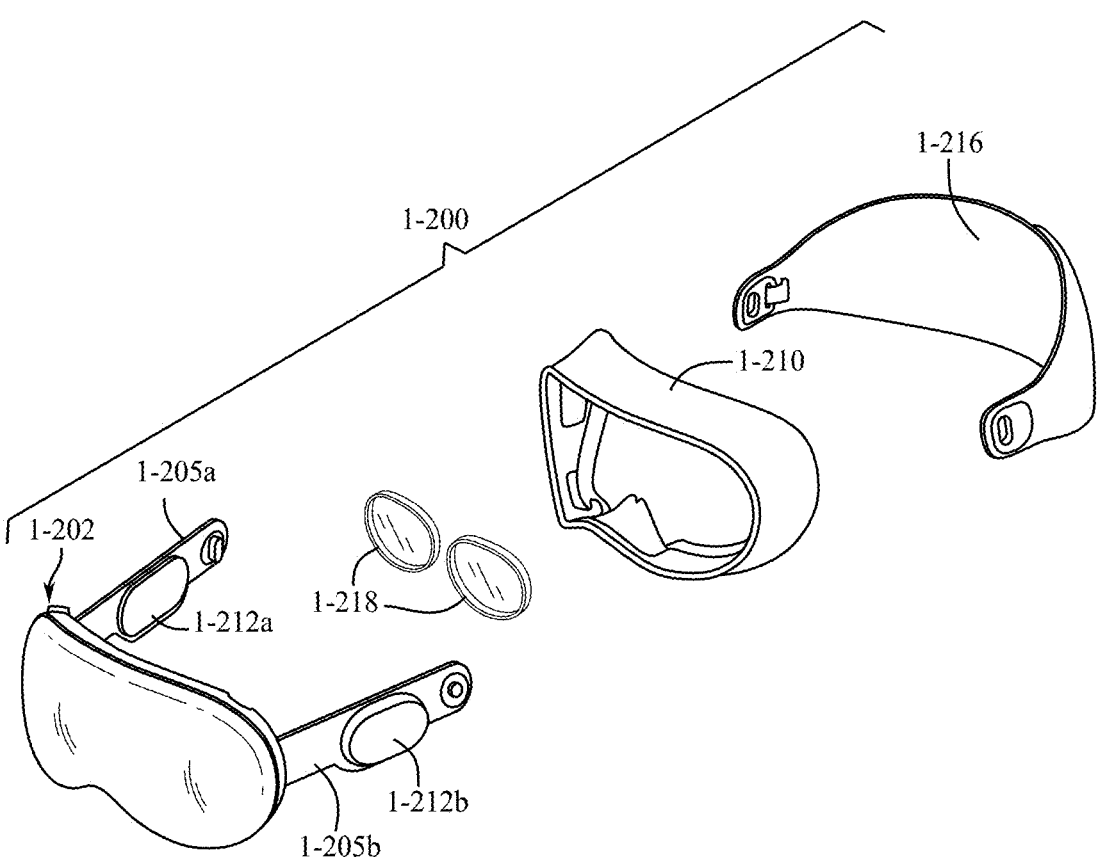
Figure 1E:
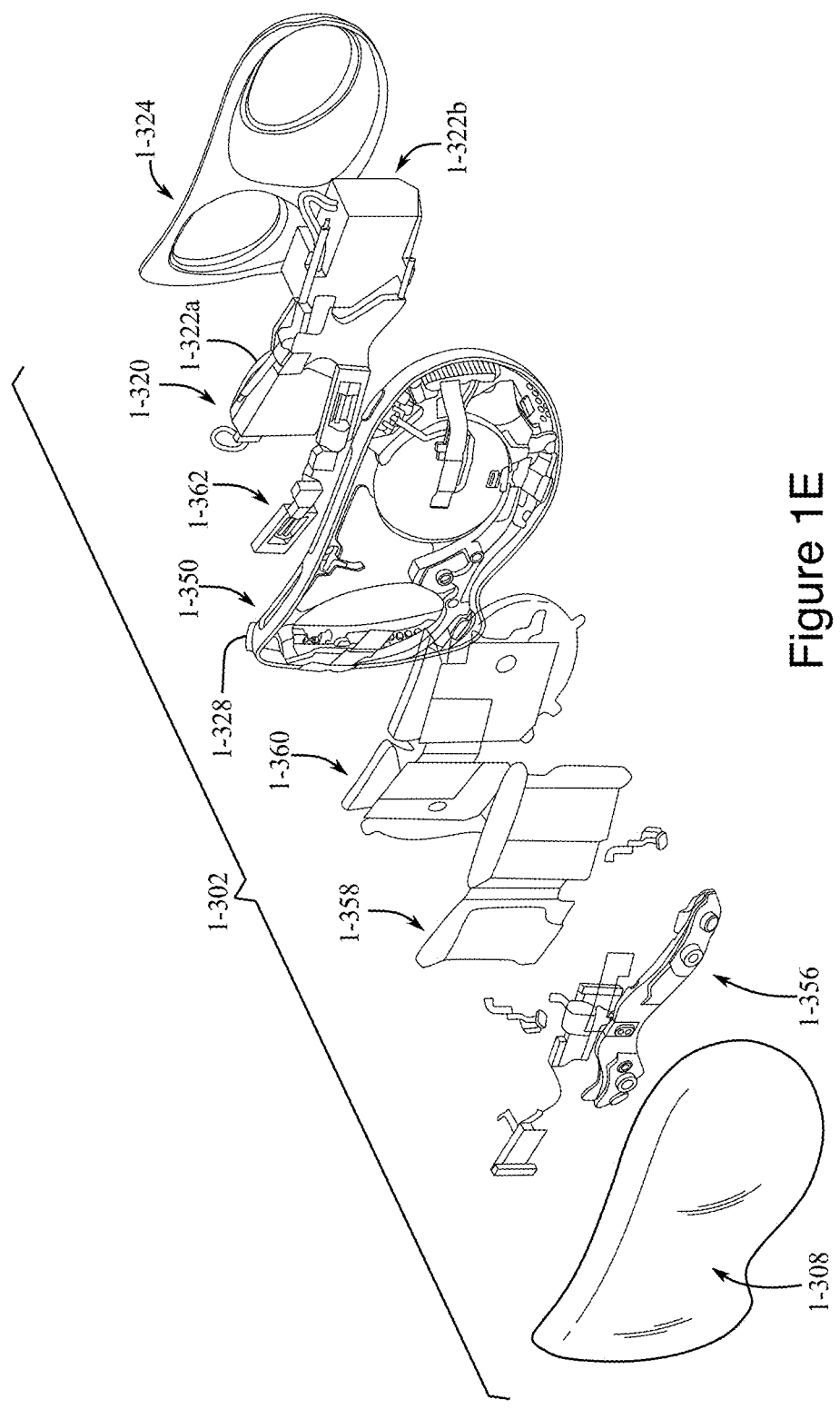
Figure 1F:
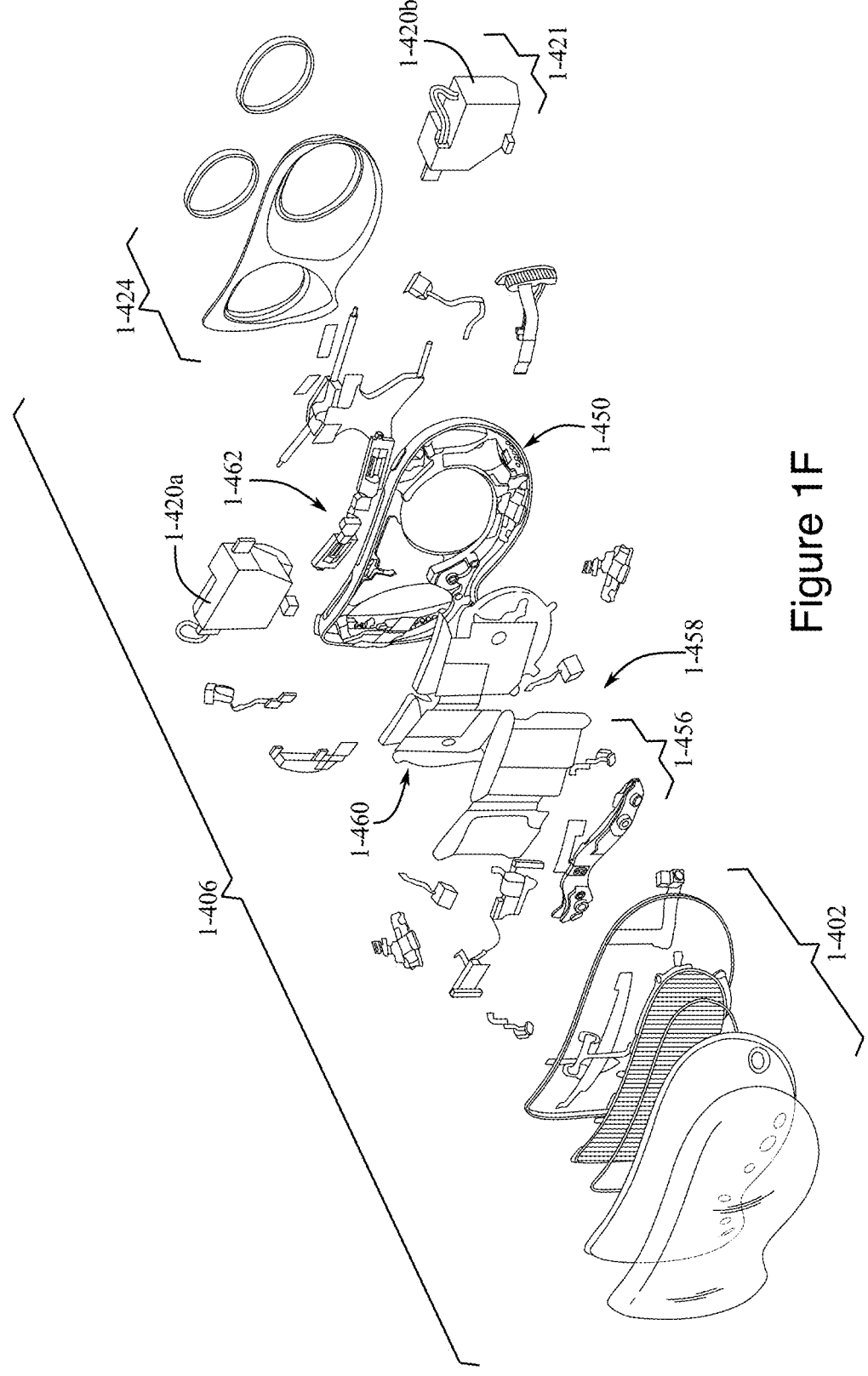
Figure 1G:
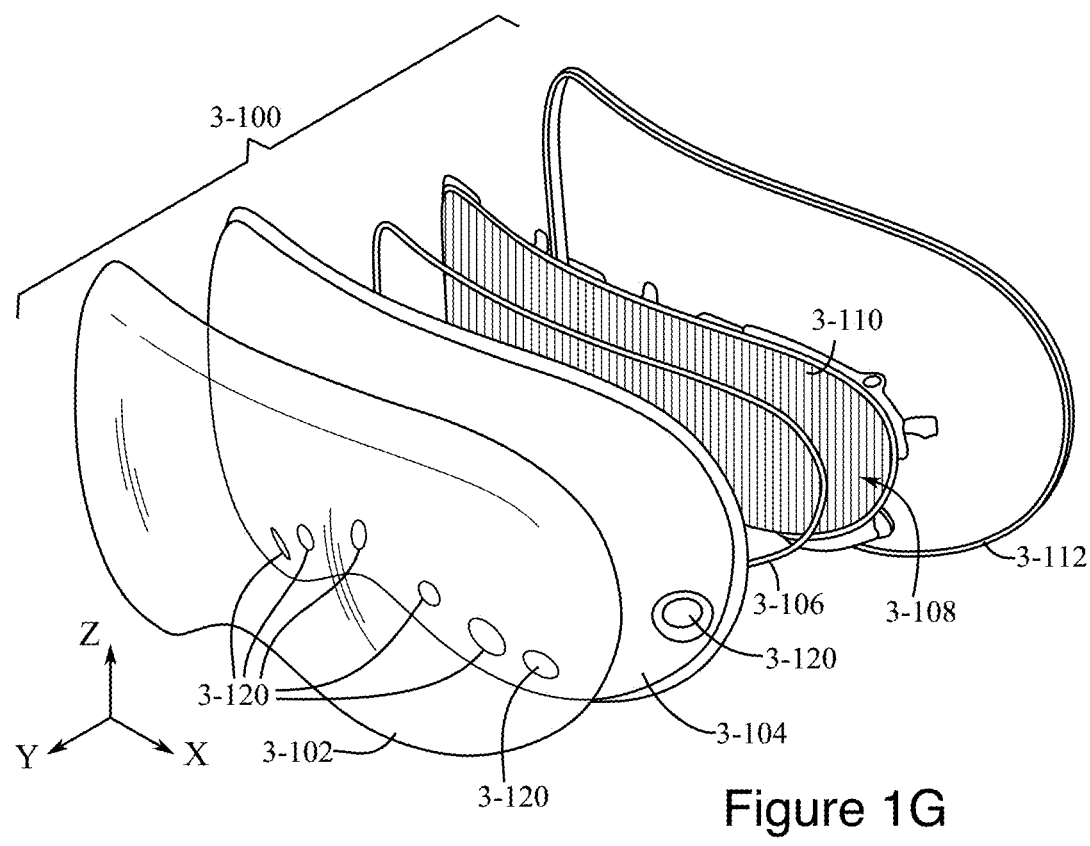
Figure 1H:
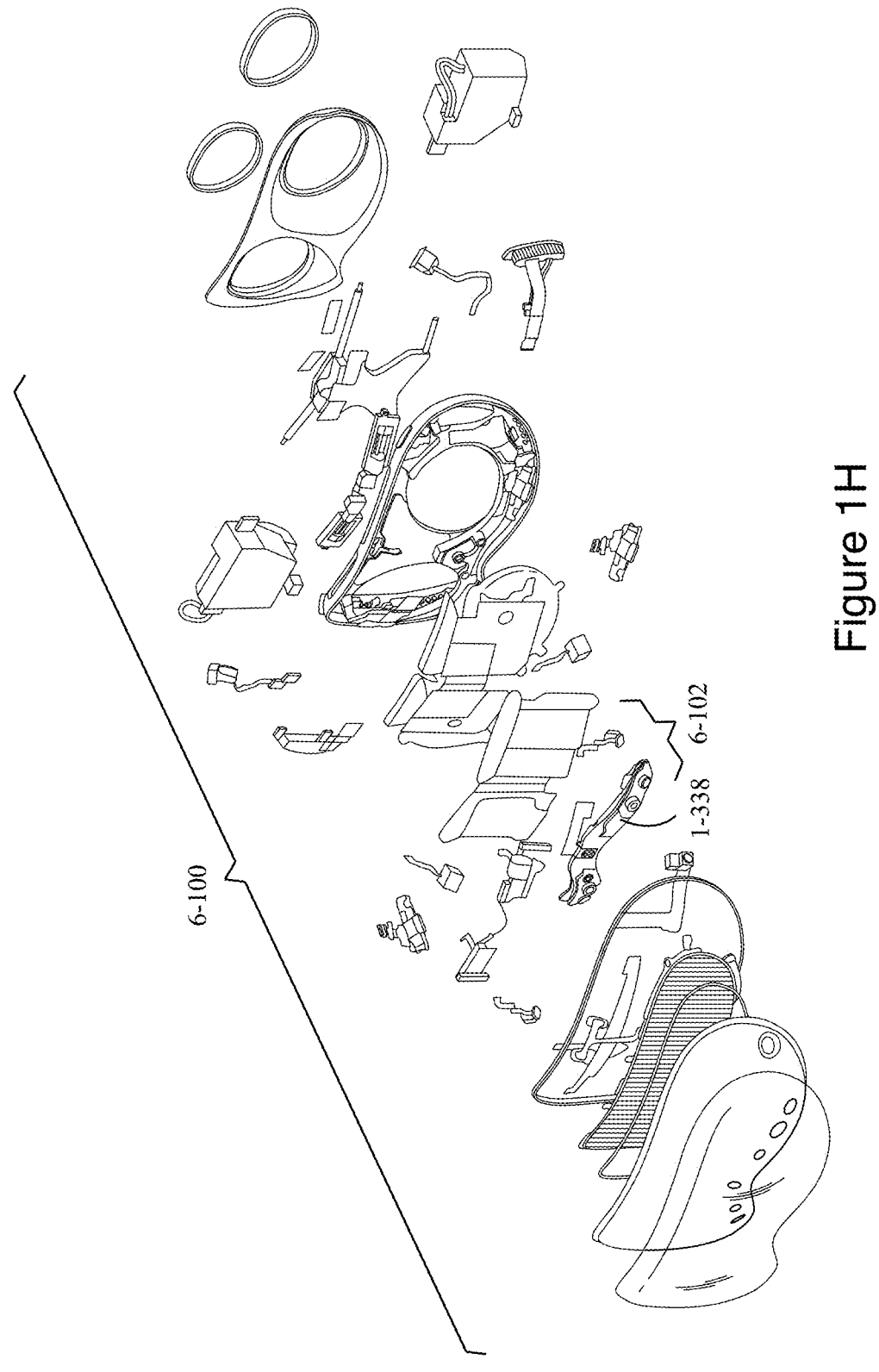
Figure 1I:
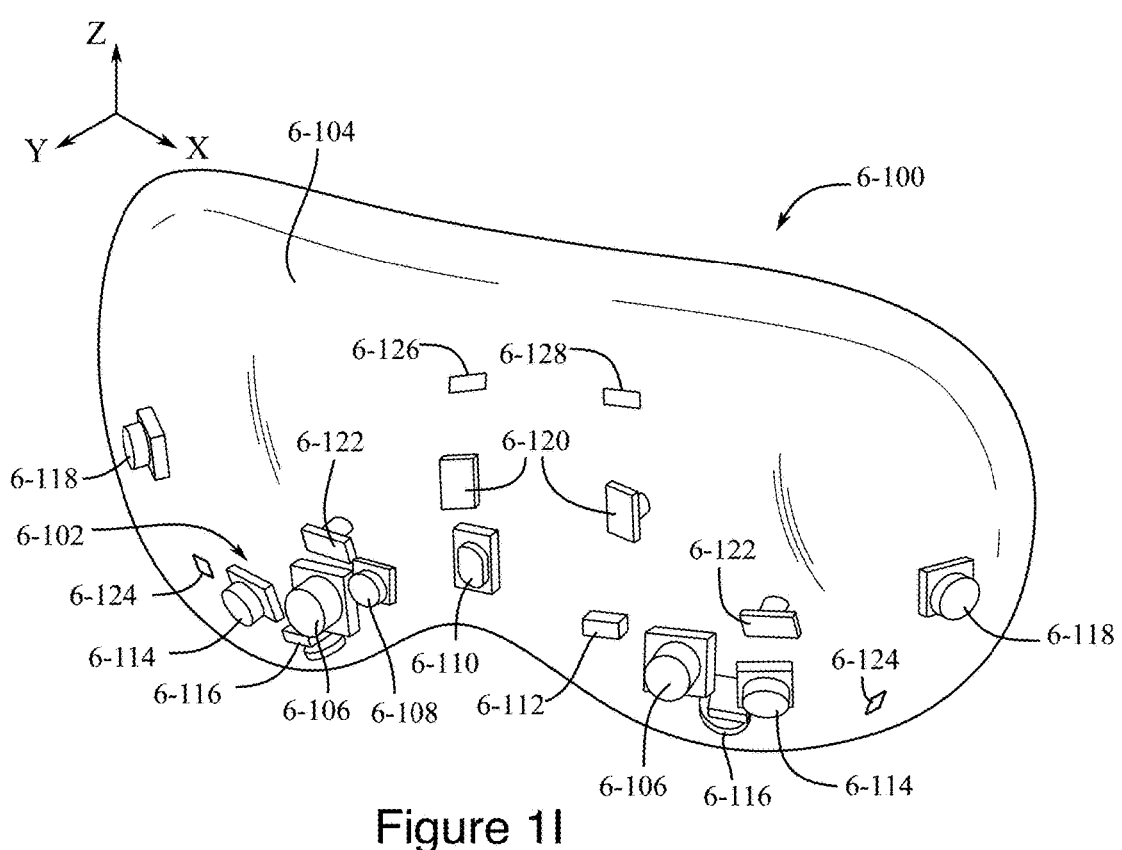
Figure 1J:
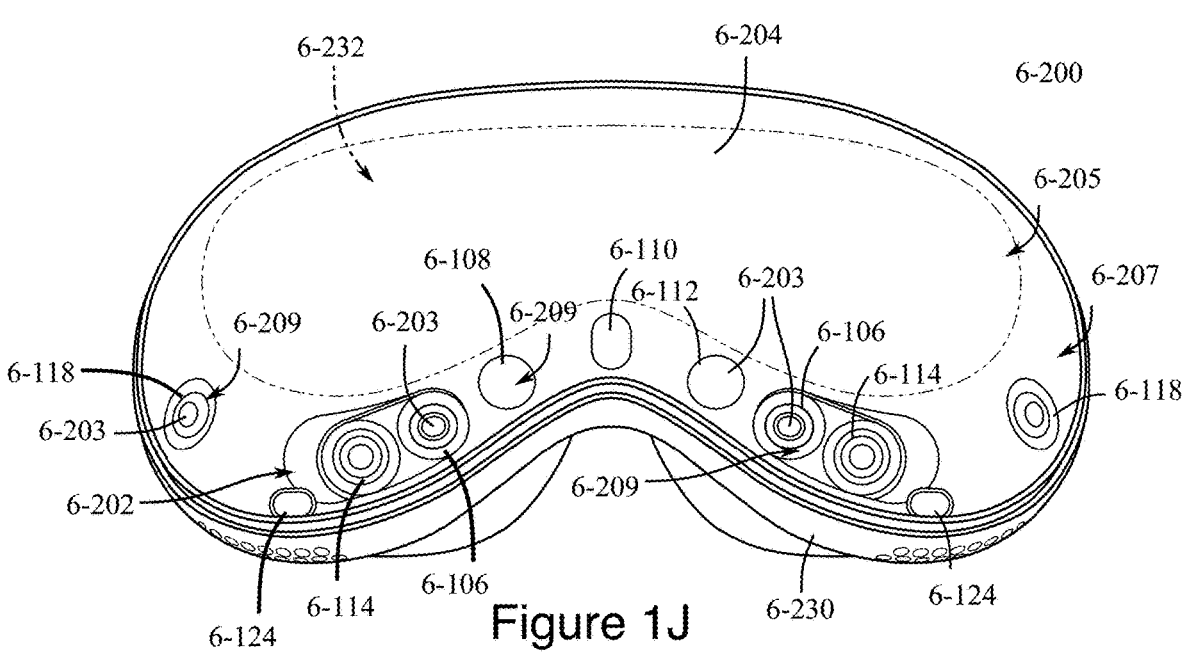
Figure 1K:
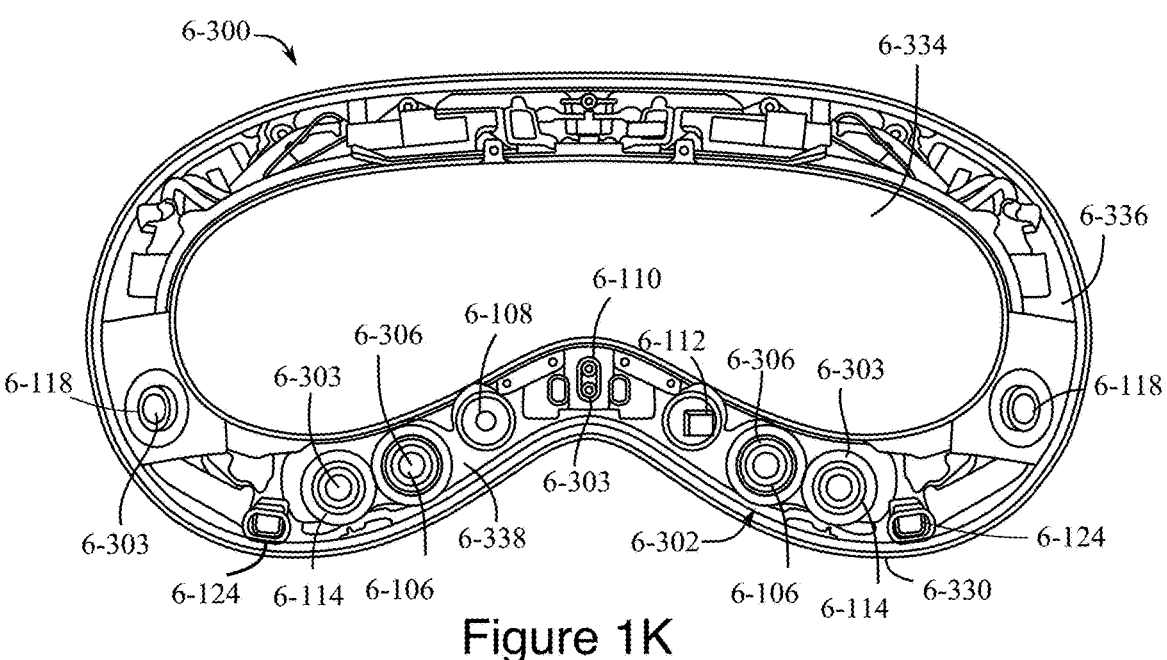
Figure 1L:
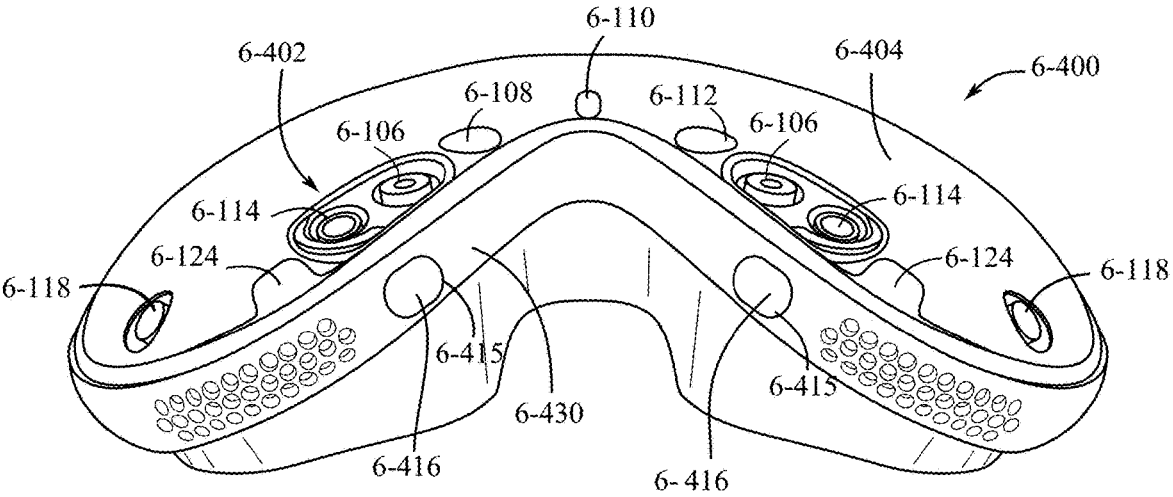
Figure 1M:
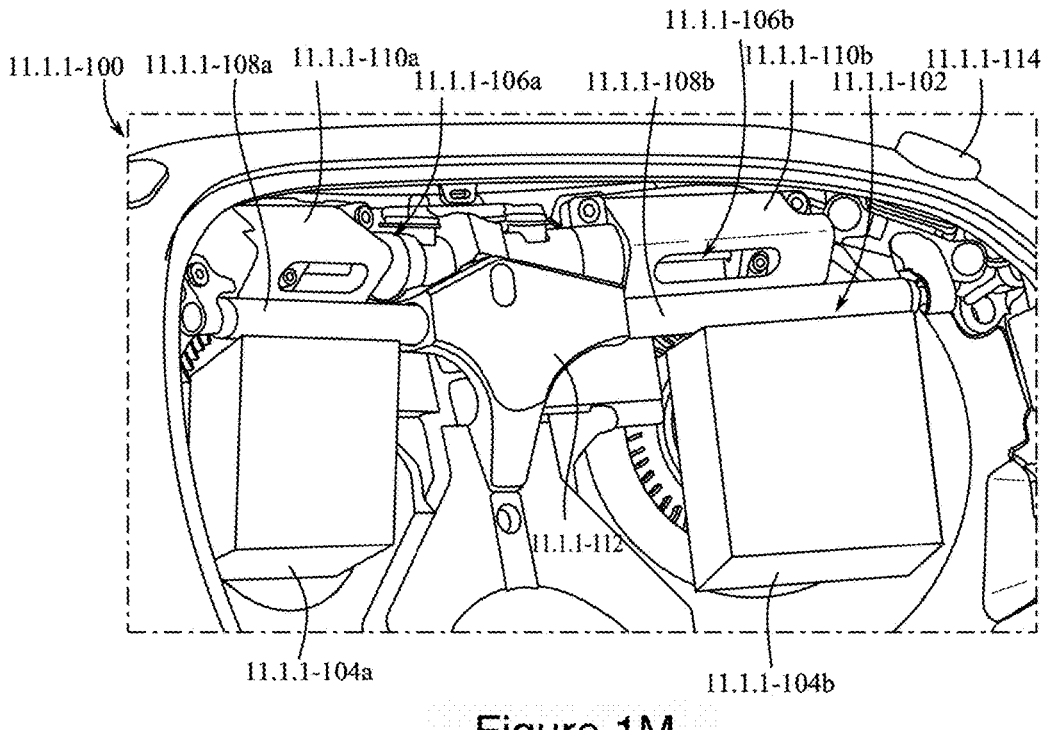
Figure 1N:
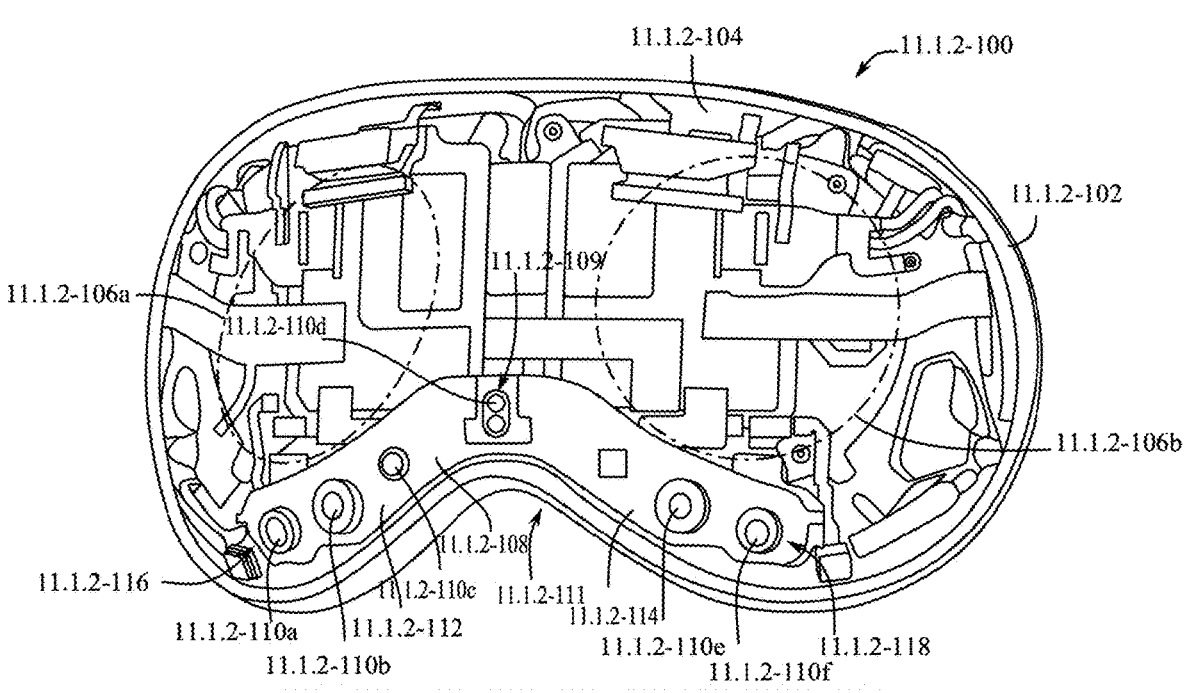
Figure 1O:
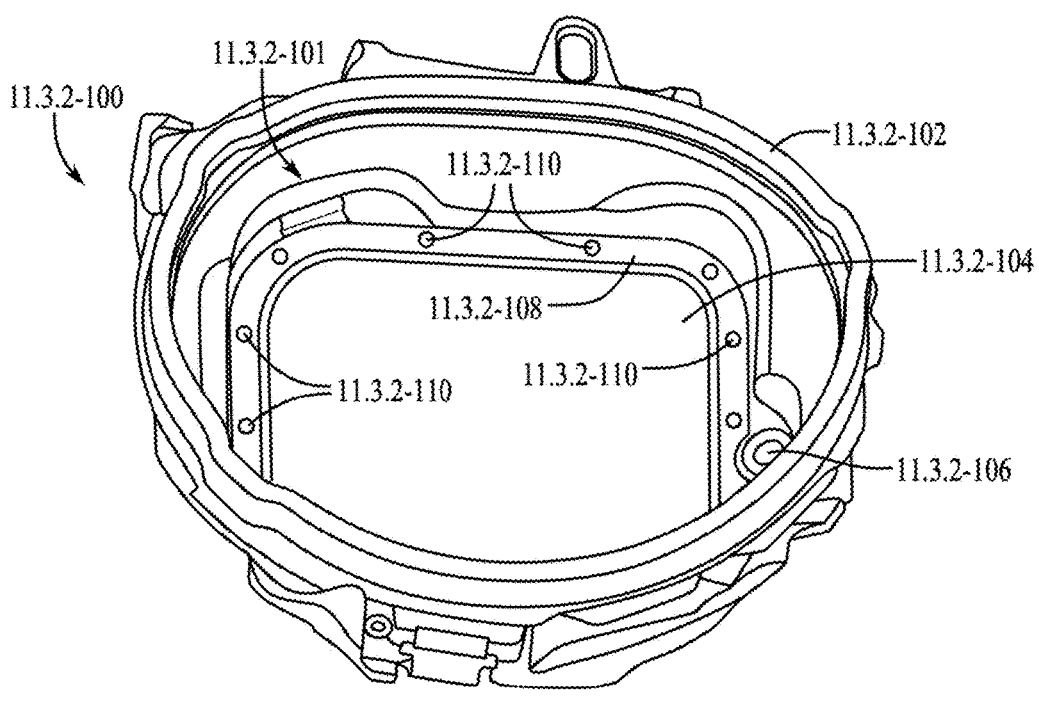
Figure 1P:
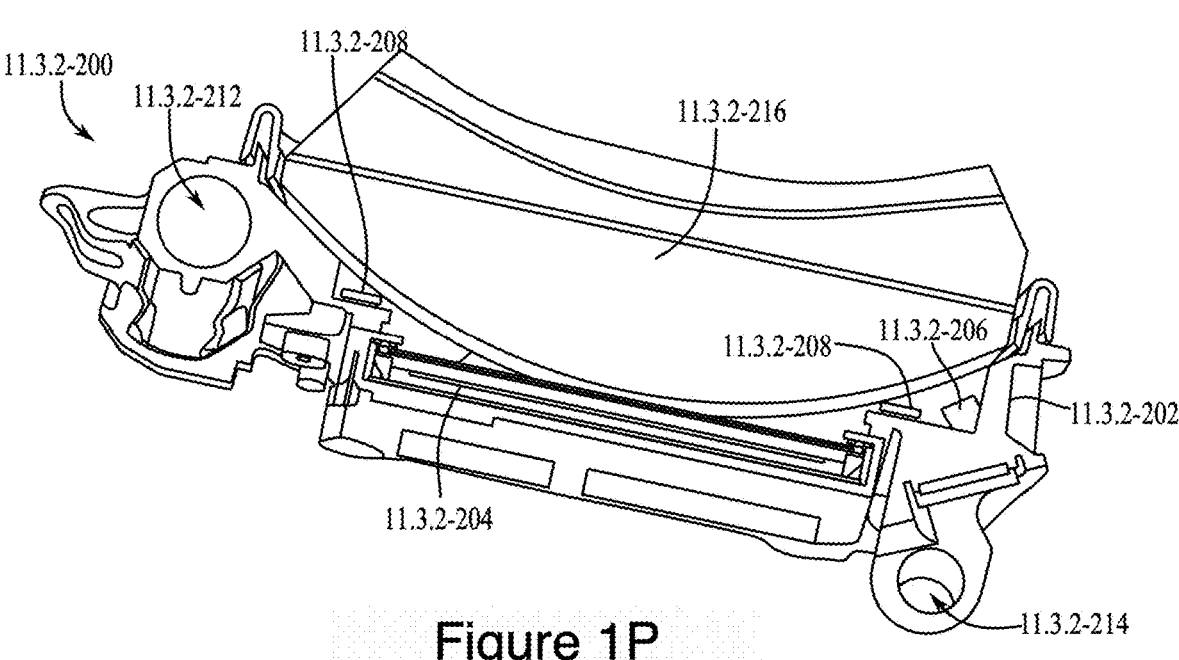

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extend-ing between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials includ-ing woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the hous-ing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen con-figured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combi-nation, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first secure-ment strap 1-205*a* can include a first electronic component 1-212*a* and the second securement strap 1-205*b* can include a second electronic component 1-212*b*. In at least one example, the first and second straps 1-205*a-b* can be remov-ably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG.

1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein.

Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
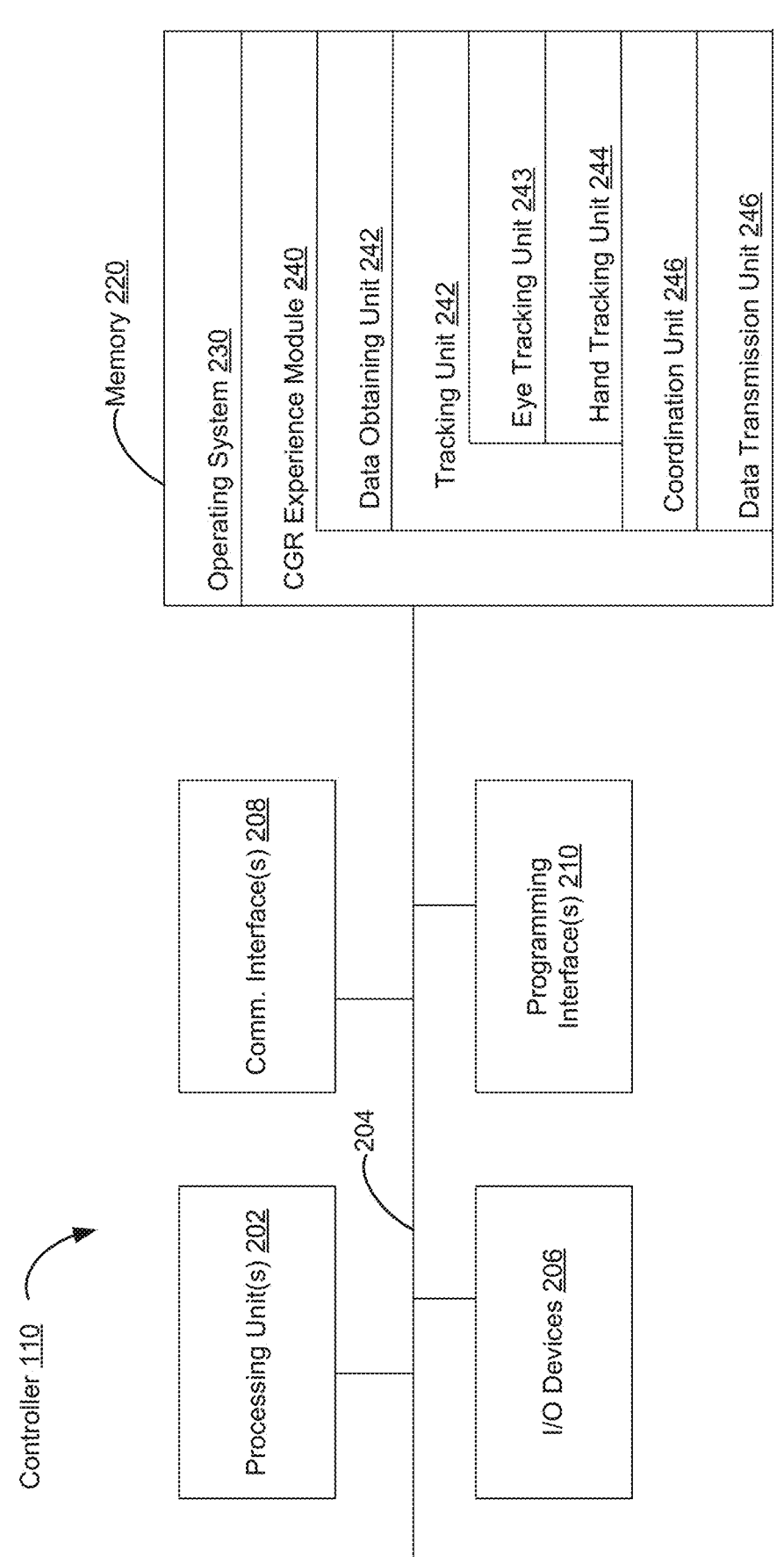
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU-ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
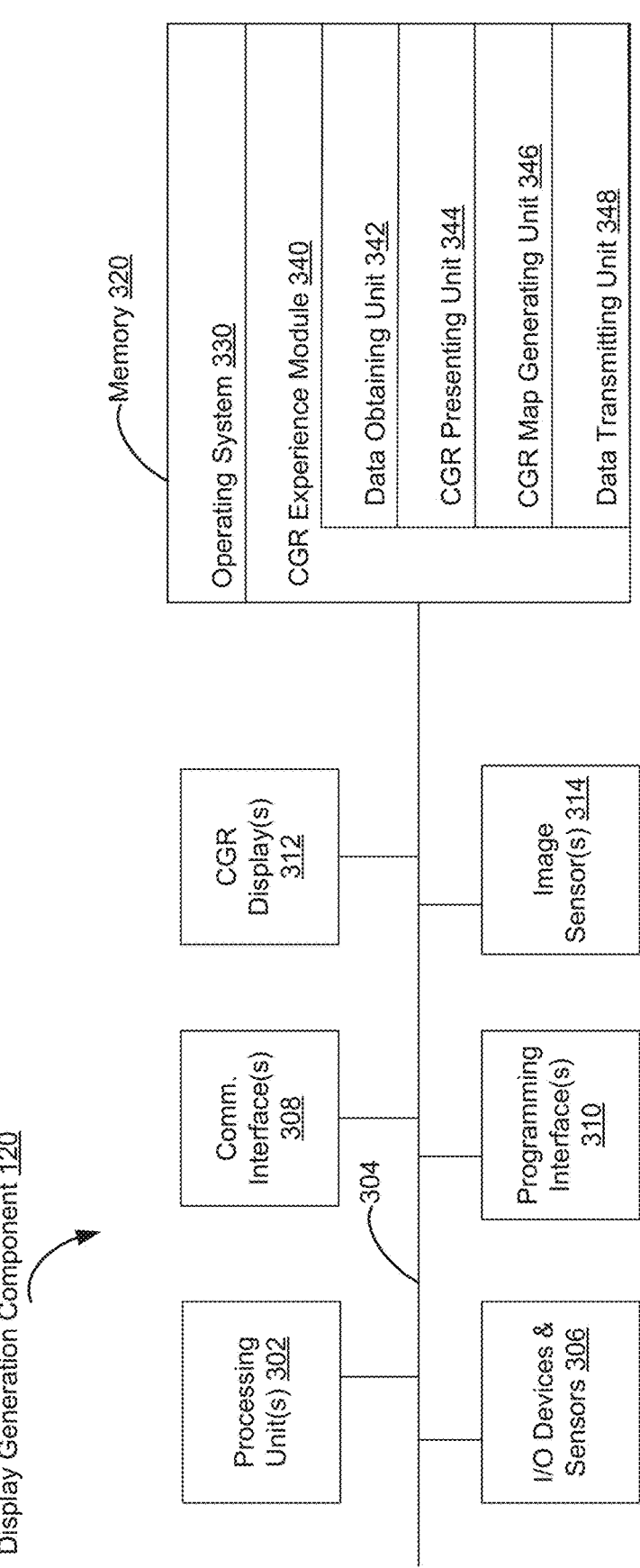
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
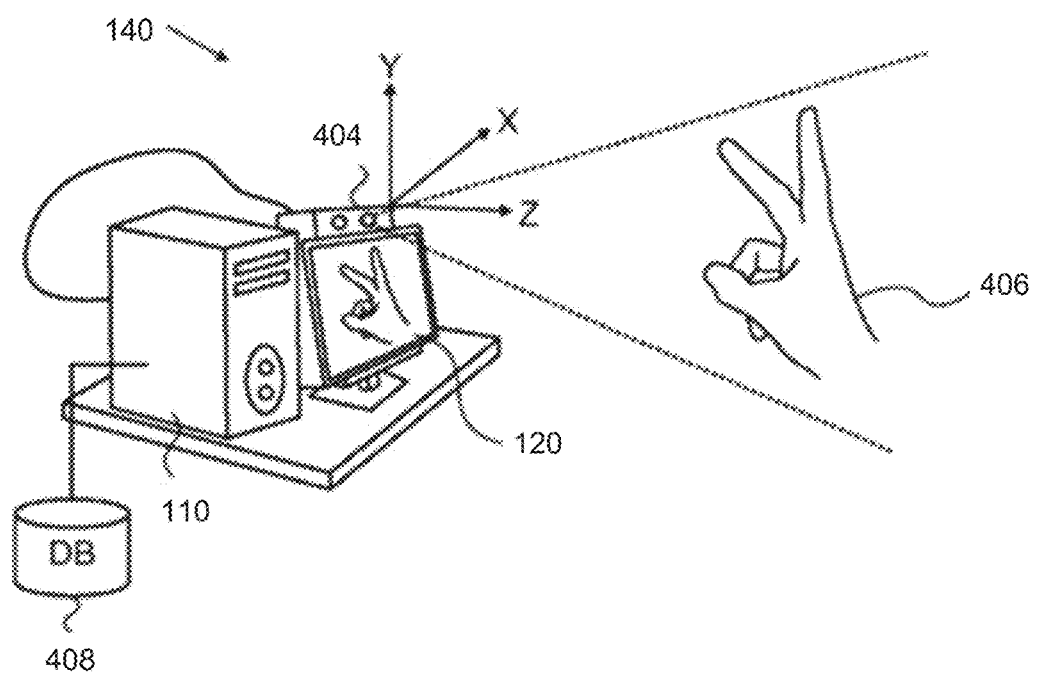
FIG. 4 is a block diagram illustrating a hand tracking unit of a computer system that is configured to capture gesture inputs of the user in accordance with some embodiments.
Figure 4:
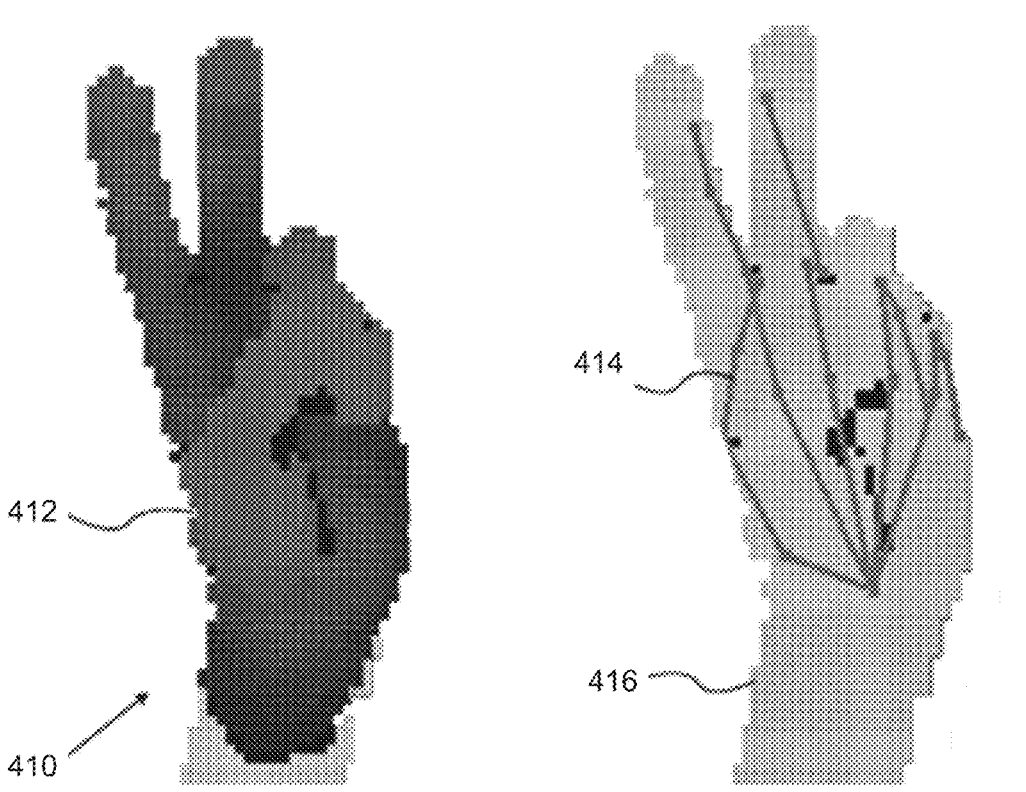

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semicustom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller

110 to determine the hand gestures performed by the hand or the current state of the hand, in accordance with some embodiments.

Figure 5:
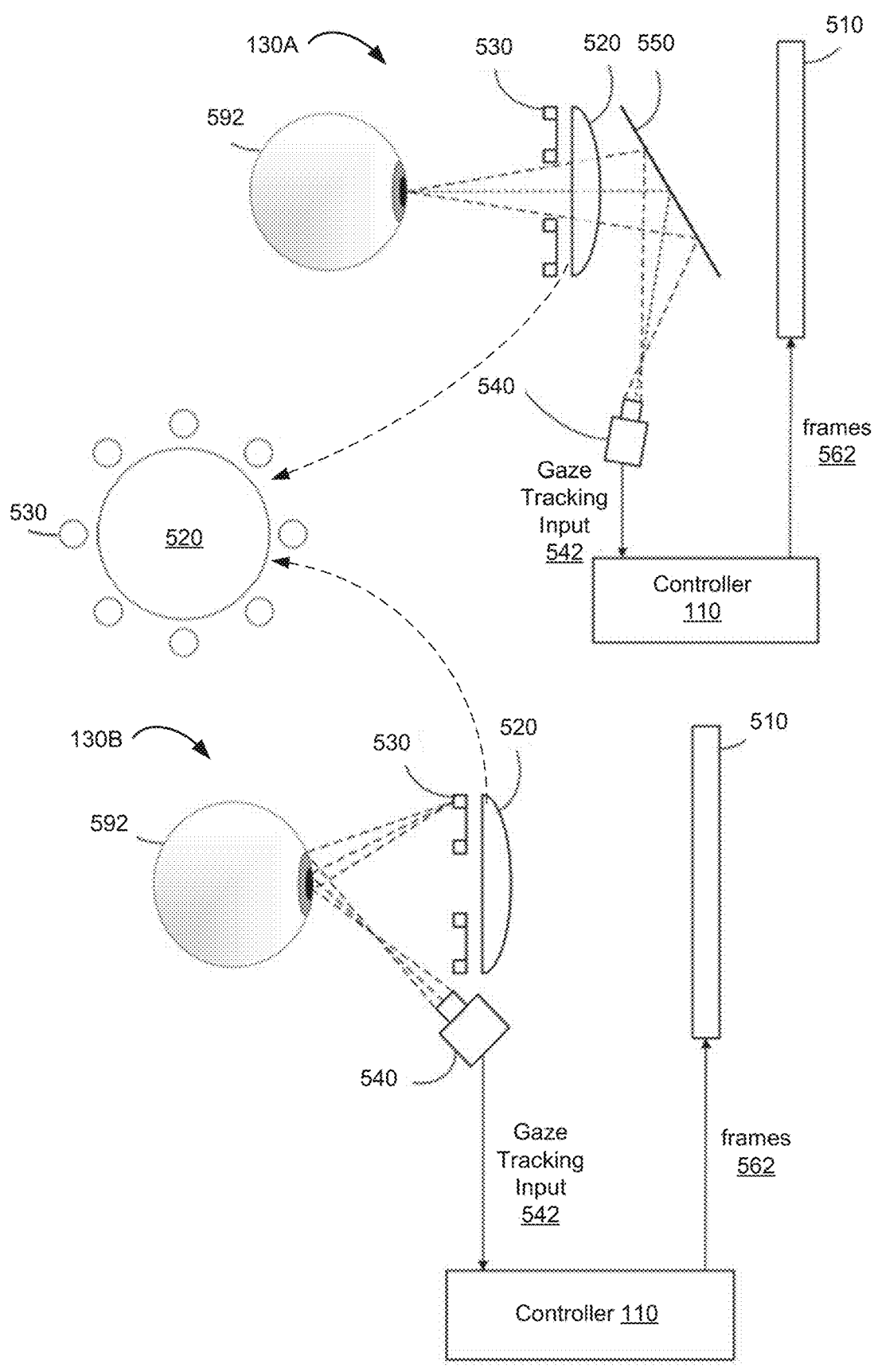
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
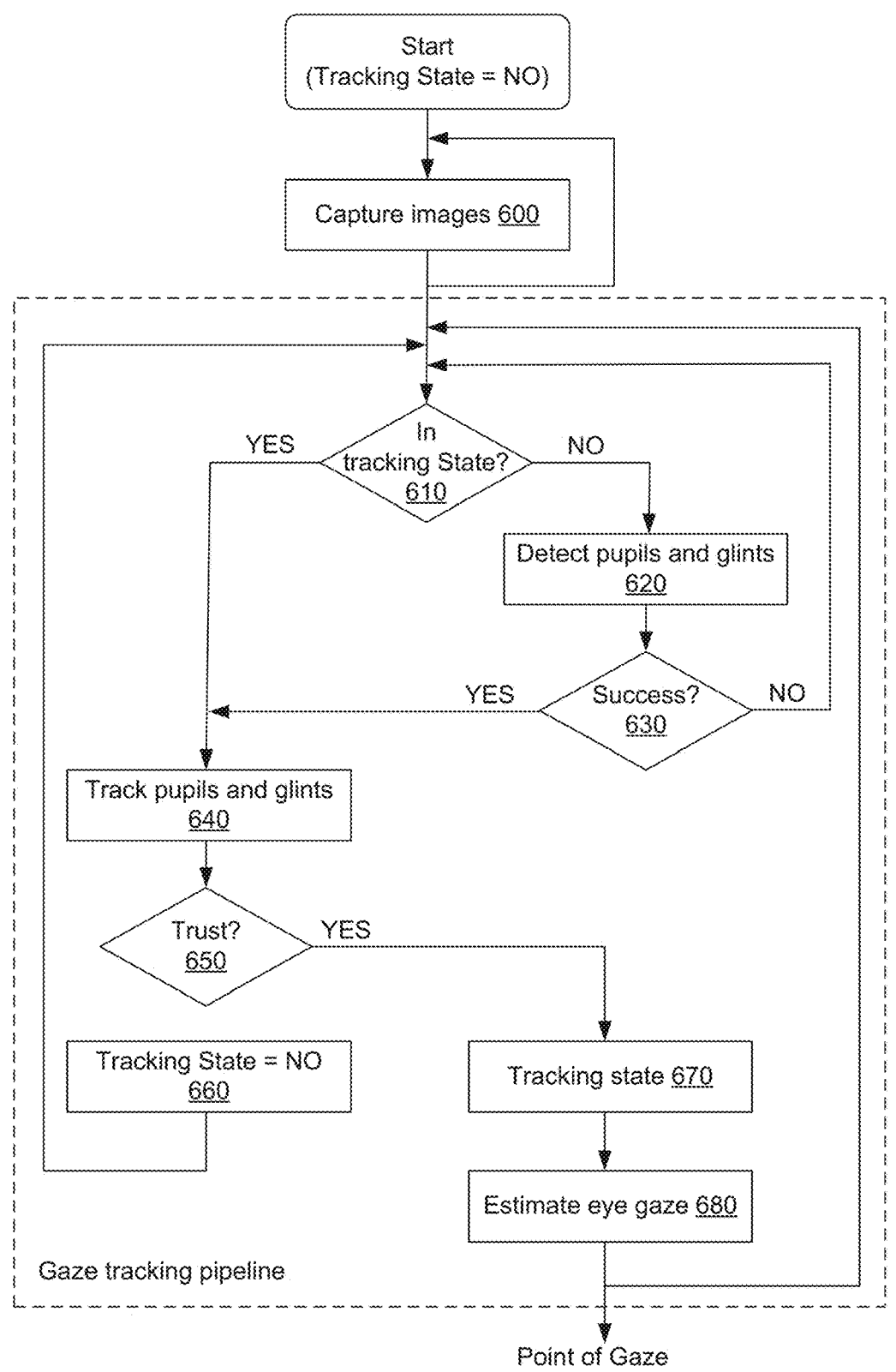
FIG. 6 is a flowchart illustrating a glint-assisted gaze tracking pipeline in accordance with some embodiments.
Figure 7A:
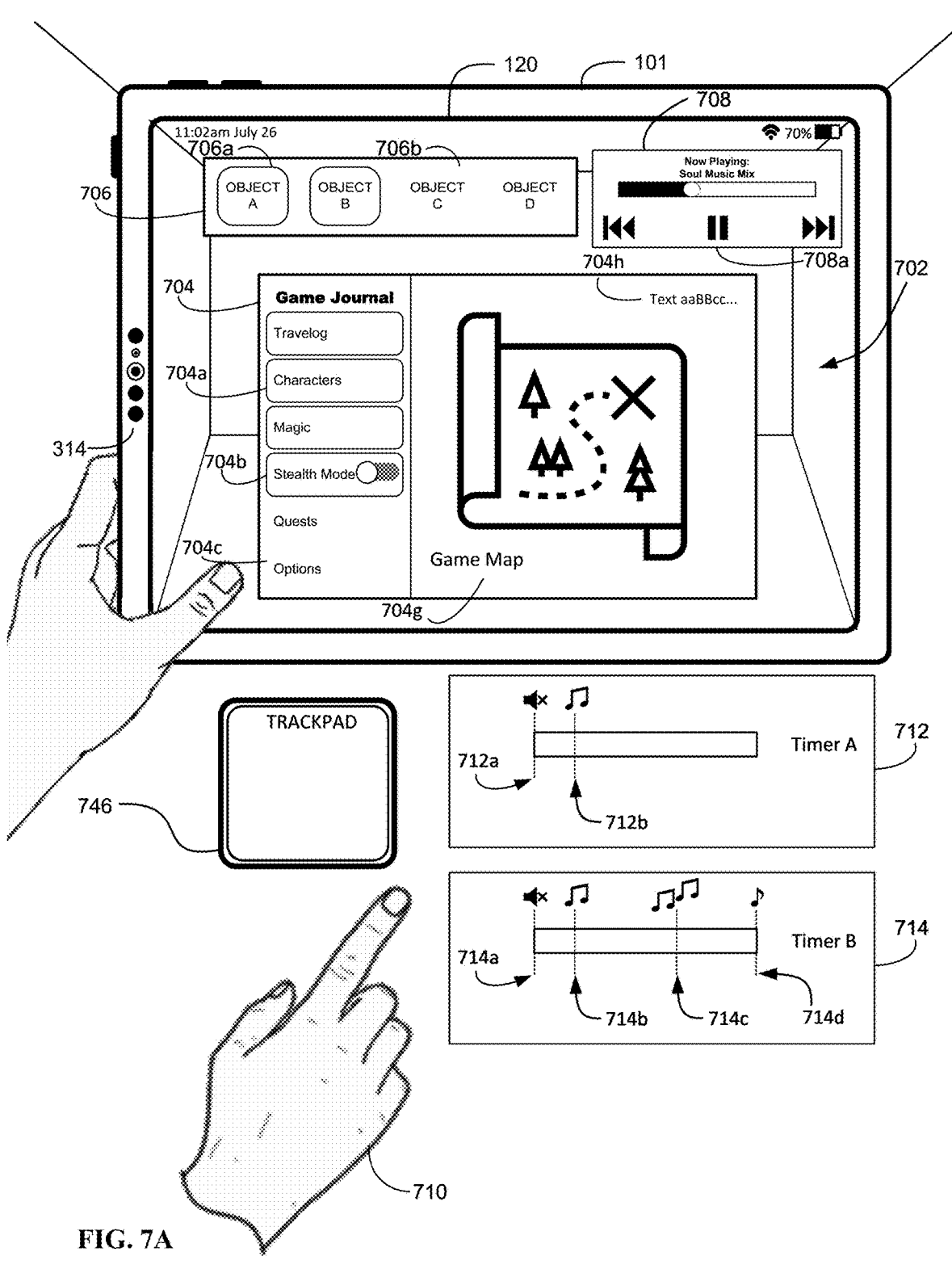
FIGS. 7A-7O illustrate examples of a computer system displaying a gaze virtual object that is selectable, based on attention directed to the gaze virtual object, to perform an operation associated with a selectable virtual object in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the view- point of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimen- sional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimen- sion (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional envi- ronment described above), or in some embodiments, the hands of the user are visible via the display generation component via the ability to see the physical environment through the user interface due to the transparency/translu- cency of a portion of the display generation component that is displaying the user interface or due to projection of the user interface onto a transparent/translucent surface or pro- jection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimen- sional environment as if they were physical objects in the physical environment. In some embodiments, the computer system is able to update display of the representations of the user's hands in the three-dimensional environment in con- junction with the movement of the user's hands in the physical environment.

In some of the embodiments described below, the com- puter system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system deter- mines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three- dimensional environment is optionally compared with the position of the virtual object of interest in the three-dimen- sional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environ- ment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

FIGS. 7A-7O illustrate examples of a computer system displaying a gaze virtual object that is selectable, based on attention directed to the gaze virtual object, to perform an operation associated with a selectable virtual object in accordance with some embodiments.

FIG. 7A illustrates a computer system 101 displaying, via a display generation component 120 (e.g., display generation component 120 of FIG. 1), a three-dimensional environment 702 from a viewpoint of the user optionally facing the back wall of the physical environment in which computer system 101 is located. As described above with reference to FIGS. 1-6, the computer system 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 or portions of the physical environment are visible via the display generation component 120 of computer system 101. For example, three-dimensional environment 702 includes portions of the left and right walls, the ceiling, and the floor in the physical environment of the user. The three-dimensional environment 702 also optionally includes representations of physical objects such as tables and/or chairs that are in the physical environment.

In FIG. 7A, three-dimensional environment 702 also includes virtual objects such as virtual object 704, virtual 706, and virtual object 708. Virtual objects are optionally one or more of user interfaces of applications (e.g., messaging user interface, or content browsing user interface), three-dimensional objects (e.g., virtual clock, virtual ball, or virtual car), or any other element displayed by computer system 101 that is not included in the physical environment of computer system 101. For example, as shown in FIG. 7A, virtual object 704 is optionally a user interface of a gaming application. In some embodiments, as shown in FIG. 7A, virtual object 704 includes a plurality of selectable virtual objects (e.g., affordances, buttons, toggles, icons, or photos). Virtual object 706 is optionally a menu user interface that includes plurality of selectable virtual objects. Virtual object 708 is optionally a music player user interface that includes one or more selectable virtual objects to initiate playback of a first media item ("Soul Music Mix").

In some embodiments, the computer system 101 changes the visual appearance of virtual objects in response to detecting the attention of the user directed toward the virtual object. Further, in some embodiments, computer system 101 displays attention indicators in three-dimensional environment 702 in response to attention of the user being directed to selectable objects in three-dimensional environment 702, as described in more detail with reference to methods 1200 and/or 2000. For example, from FIG. 7A to FIG. 7B, the computer system 101 detects that the attention of the user (e.g., attention input 728) is directed toward virtual object 706b. In response, the computer system 101 has displayed the boundaries of a container object (e.g., box) that contains and/or is virtual object 706b. As shown in FIG. 7A, prior to attention input 726 being directed toward virtual object 706b, the virtual object 706b was not displayed within or with the boundaries of the container object. In some embodiments, the computer system 101 displays the container object with a suitable size based on the size of the virtual object. For example, in FIG. 7B, the computer system 101 detects that the attention of the user (e.g., attention input 722) is directed toward virtual object 704g. In response, the computer system 101 has displayed the boundaries of an appropriate size container object to contain virtual object 704g. In some embodiments, the computer system 101 displays the container object with a suitable size based on the visual appearance of a group of virtual objects. For example, in FIG. 7B, the computer system 101 detects that the attention of the user (e.g., attention input 720) is directed toward virtual object 704c. In response, the computer system 101 has displayed the boundaries of a container object to contain virtual object 704c with a size similar to or the same as other virtual objects in its group (e.g., objects 704a and 704b). In some embodiments, the computer system 101 displays the container object with a suitable size based on the size of an associated container object. For example, in FIG. 7B, the computer system 101 detects that the attention of the user (e.g., attention input 730) is directed toward virtual object 708a. In response, the computer system 101 has displayed the boundaries of a container object to contain virtual object 708a with a size smaller than virtual object 708.

In some embodiments, the computer system 101 does not display or display the boundaries of a container object to contain a virtual object that already includes, is displayed in, or is a container object. For example, from FIG. 7A to FIG. 7B, the computer system 101 detects that the attention of the user (e.g., attention input 726) is directed toward virtual object 706a. In response, the computer system 101 does not display a new a container object that contains virtual object 706a because virtual object 706a already is contained by a container object prior to attention input 726 being directed to virtual object 706a. Similarly, and in another example, the computer system 101 detects that the attention of the user (e.g., attention input 716) is directed toward virtual object 704a. In response, the computer system 101 does not display a new container object that contains virtual object 704a because virtual object 704a already is contained by a container object prior to attention input 716 being directed to virtual object 704a. Additional details related to changing the visual appearance of virtual objects in response to detecting the attention of the user directed toward the virtual object are provided with reference to methods 800, 900, 1000, 1200, and/or 2000. Further, while FIG. 7B (and other figures) illustrate multiple concurrent attention inputs directed to objects in three-dimensional environment 702, it is understood that such inputs are optionally alternative inputs, and not concurrent inputs. Additionally, in some embodiments, input to computer system 101 is provided via air gestures from hand 710 and/or attention of the user (e.g., as described in more detail with reference to method 800), or via trackpad 746 from hand 710, and inputs described herein are optionally received via trackpad 746 or via air gestures/attention.

Figure 7B:
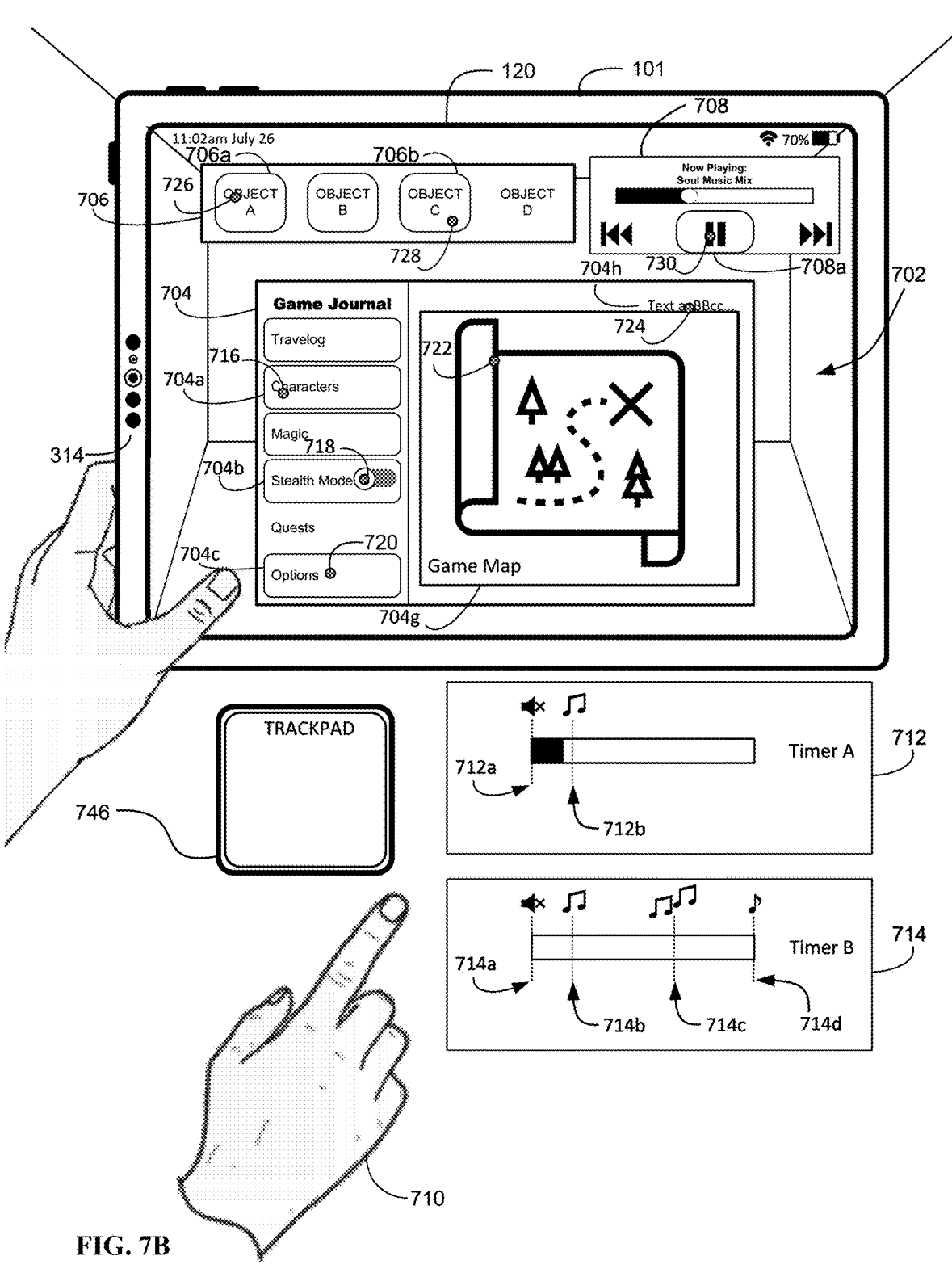
Figure 7C:
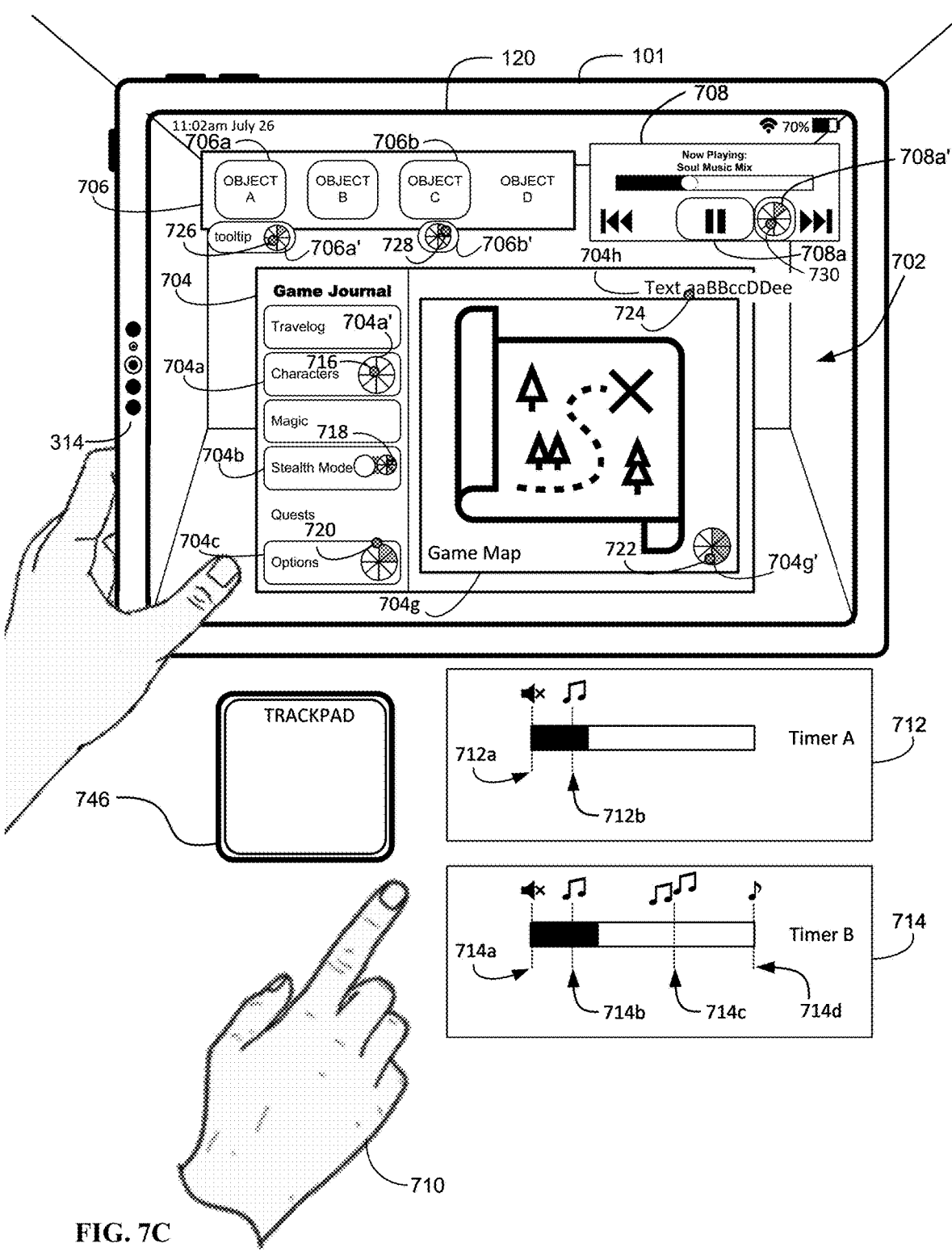

In some embodiments, the computer system 101 displays virtual objects with a larger, expanded size in response to detecting the attention of the user directed toward the virtual object. For example, from FIG. 7B to FIG. 7C, the computer system 101 detects that the attention of the user (e.g., attention input 724) is directed toward virtual object 704h. For example, virtual object 704h is a messaging communication module that includes text content corresponding to game updates or text messages from another gamer within the gaming application, or a link to a website. In response, the computer system 101 displays virtual object 704h with a larger size as shown in FIG. 7C. In FIG. 7C, because of its larger, expanded size, virtual object 704h includes more text content than when the attention of the user was directed away from virtual object 704h as shown in FIG. 7B (e.g., more portions of the text content corresponding to game updates or text messages, or more portions of the URL of the link to the website). In some embodiments, attention of the user is determined to be directed toward virtual objects based on detection of gaze directed to virtual objects with one or more conditions described with reference to methods 800, 900, 1000, 1200, and/or 2000.

In some embodiments, the computer system 101 provides audio feedback in response to detecting the attention of the user directed toward the virtual object. For example, timer 712 corresponds to virtual object 704c and is used to indicate the amount of time that the attention of the user is directed toward virtual object 704c. For example, from FIG. 7B to FIG. 7C, the computer system 101 detects that the attention of the user (e.g., attention input 720) is directed toward virtual object 704c for a period of time greater than a time threshold 712b as described in more detail with reference to methods 800, 900, 1000, 1200, and/or 2000. In response, the computer system outputs audio feedback to indicate that the attention of the user is directed to virtual object 704c. Additional details related to providing audio feedback in response to detecting the attention of the user directed toward the virtual object are provided with reference to methods 800, 900, 1000, 1200, and/or 2000.

In some embodiments, the computer system 101 displays a gaze virtual object that is selectable, based on attention directed to the gaze virtual object, to perform an operation associated with a selectable virtual object. For example, in FIG. 7C, the computer system 101 detects that the attention of the user (e.g., attention input 716) is directed toward virtual object 704a for a period of time greater than a time threshold (e.g., time threshold 712b) as described in more detail with reference to methods 800, 900, 1000, 1200, and/or 2000. In response, the computer system 101 displays a gaze virtual object 704a' associated with virtual object 704a within the container object of virtual object 704a, as shown in FIG. 7C. Computer system 101 additionally displays gaze virtual objects for other selectable objects in three-dimensional environment 702 in response to detecting attention of the user directed to those selectable objects for longer than the time threshold. In some embodiments, the computer system 101 displays the gaze virtual object in a different location than, but co-located with, its associated virtual object. For example, in FIG. 7C, the computer system 101 displays the gaze virtual object 706b' associated with virtual object 706b below virtual object 706b and within its own container. In some embodiments, as shown in FIG. 7C, the gaze virtual object 706a' is displayed within a container object of content (e.g., tooltip) associated with the virtual object (e.g., virtual object 706a). As shown in FIG. 7C, the gaze virtual object 706a' is within but in the right region of the tooltip (e.g., description of virtual object 706a and/or the function performed by selecting object 706a) for virtual object 706a, which was also displayed in response to attention being directed to object 706a for longer than the time threshold. In another example, the computer system 101 displays the gaze virtual object associated with virtual object 704g in a bottom right region of the container of virtual object 704g that was displayed in response to attention being directed to virtual object 704g. In another example, the computer system 101 displays the gaze virtual object 704g' associated with virtual object 708a beside virtual object 708a and within its own container. In contrast to the gaze virtual object 706b' associated with virtual object 706b appearing overlaid on the border of virtual object 706, the gaze virtual object 708a' associated with virtual object 708a is contained within virtual object 708. In FIG. 7C, virtual object 704 includes a toggle virtual object 704b that will be described below.

Figure 7D:
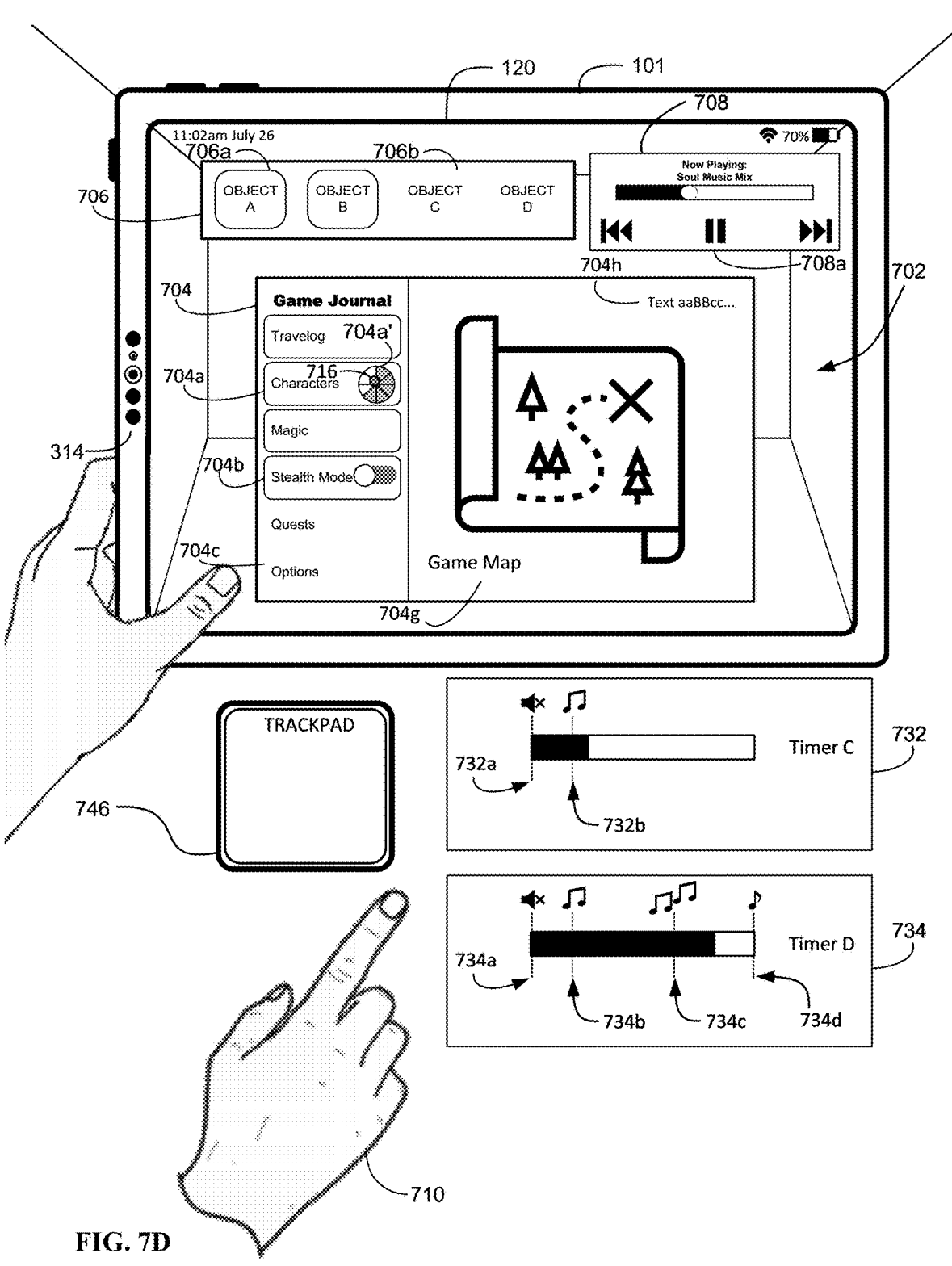

In some embodiments, the computer system 101 displays the gaze virtual object as including a visual indication of progress towards the attention of the user towards satisfying one or more criteria (described with reference to methods 800, 900, 1000, and 1200) for selecting the gaze virtual objects using attention, and thereby for performing an operation associated with the virtual object corresponding to the gaze virtual object. For example, the computer system 101 optionally indicates the visual indication of progress by filling an unfilled portion of the gaze virtual object. As shown in FIG. 7C, the gaze virtual object 704a' associated with virtual object 704a is unfilled indicative of the attention of the user (e.g., attention input 716) directed away from the gaze virtual object 704a'. From FIG. 7C to FIG. 7D, the attention of the user (attention input 716) is changed from being directed to virtual object 704a to being directed to the gaze virtual object 704a' associated with virtual object 704a. In response, as shown in FIG. 7D, the computer system 101 displays the gaze virtual object 704a' filled corresponding to the amount of time, as indicated by timer 734, the attention of the user is directed towards the gaze virtual object 704a' associated with virtual object 704a. In some embodiments, the computer system 101 optionally analogously displays visual indications of such progress in other gaze virtual objects of FIG. 7C (e.g., gaze virtual objects 706a', 706b', 706a', 708a', and/or 704g').

In some embodiments, the computer system 101 provides audio feedback indicative of the progress of the attention of the user (directed toward the gaze object) towards satisfying the one or more criteria (described with reference to methods 800, 900, 1000, and 1200) for performing an operation associated with a corresponding virtual object. For example, in FIG. 7D, the computer system 101 detects that the attention of the user (e.g., attention input 716) has been directed towards the gaze virtual object 704a' associated with virtual object 704a for a period of time greater than a first threshold 734b and a second threshold 734b. In response, the computer system 101 has output audio feedback with sound characteristics that change (e.g., volume and/or pitch) with the duration of the attention input 716 directed towards the gaze virtual object 704a' associated with virtual object 704a as shown in FIG. 7D. Thus, in some embodiments, computer system 101 continually outputs audio feedback that changes in some characteristic (e.g., pitch, volume, and/or tone, as described in more detail with reference to methods 800, 900 and/or 1000) as the duration that attention 716 is directed to the gaze virtual object 704a' changes (e.g., as indicated by timer 734).

Figure 7E:
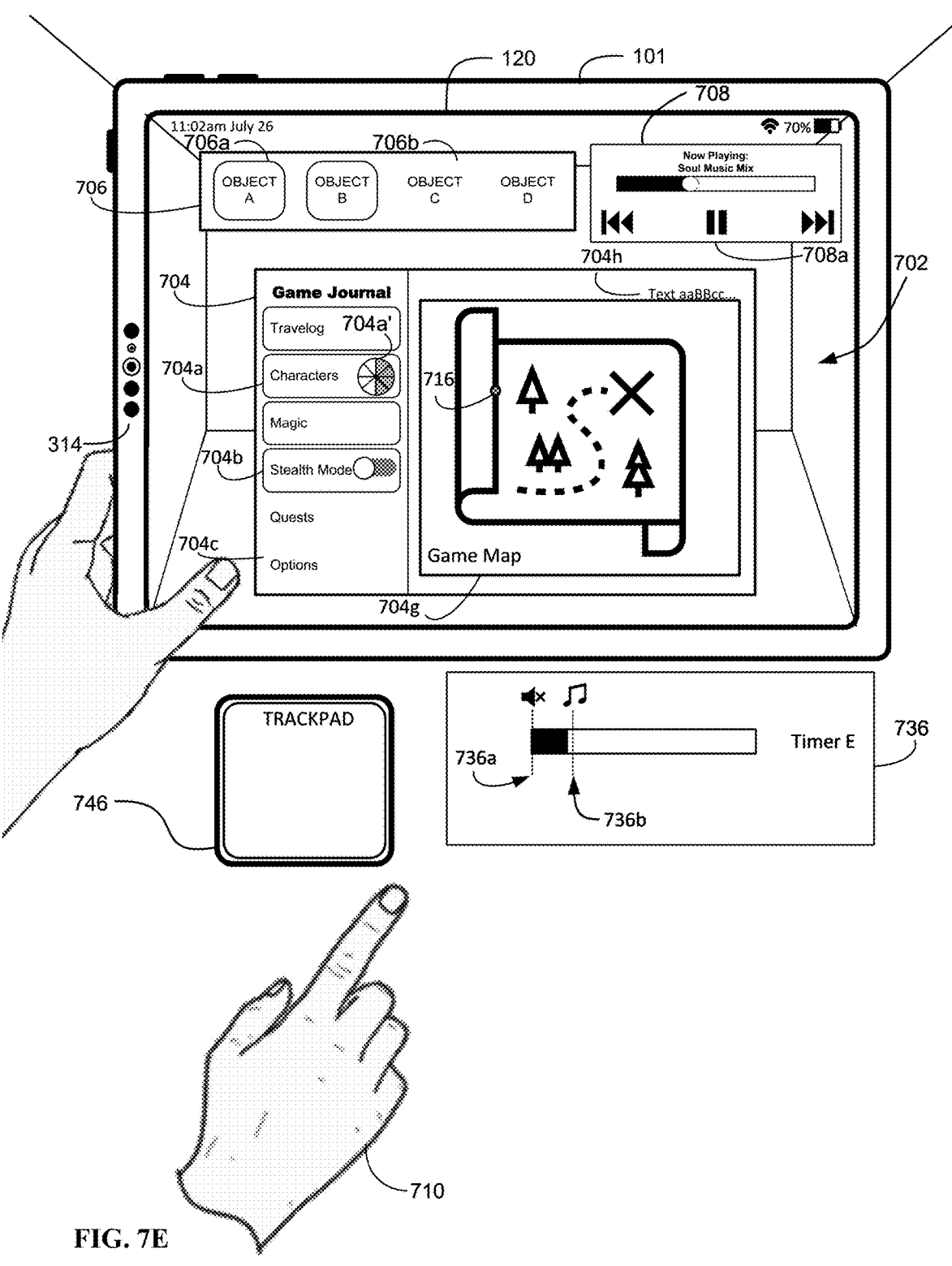
Figure 7F:
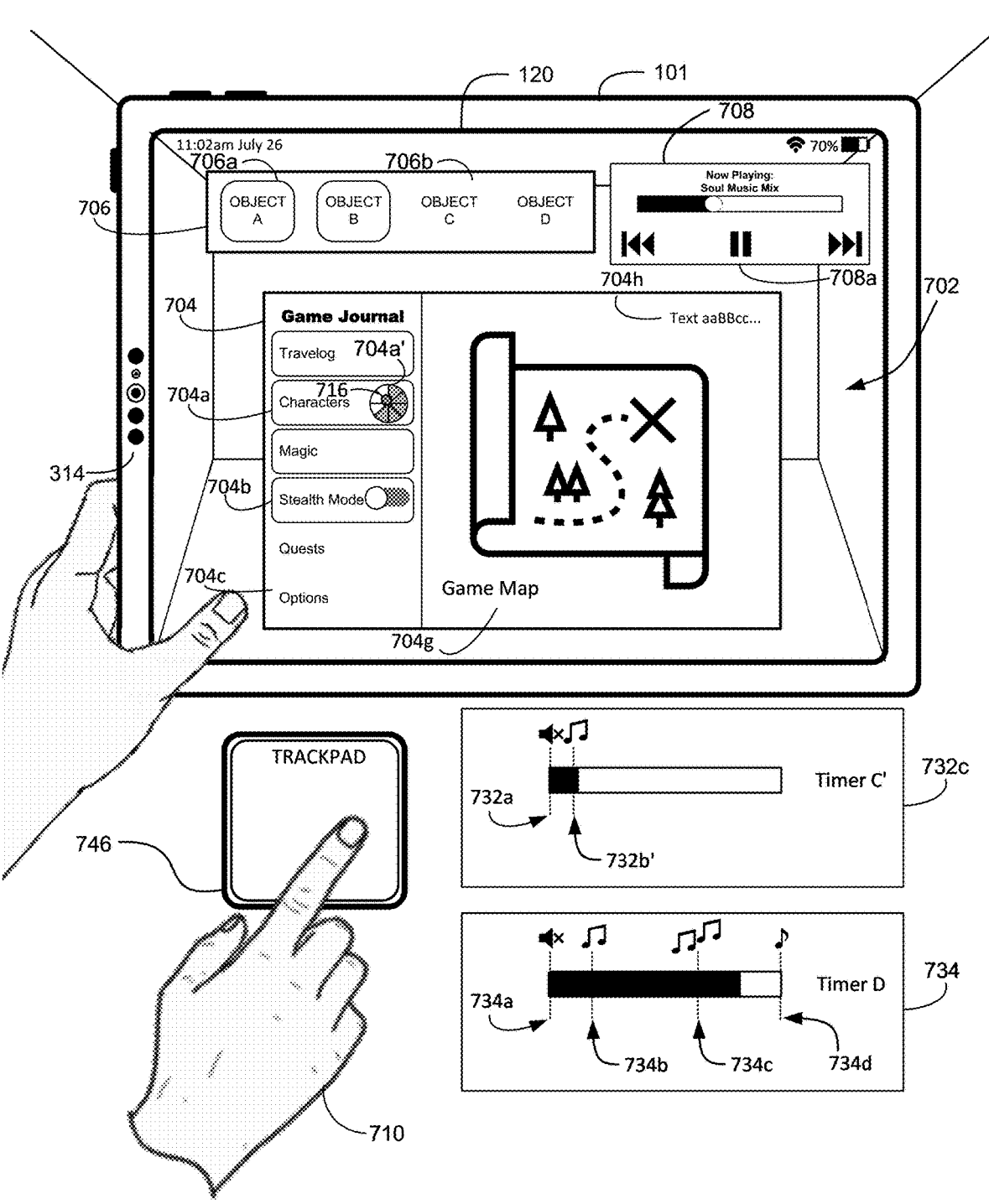

In some embodiments, in response to detecting that the attention of the user changed away from virtual object 704g as shown in FIG. 7C to 7D, the computer system 101 ceases to display the container object that contains virtual object 704g. If the computer system 101 detects that the attention of the user (e.g., attention input 716) is changed back to being directed towards virtual object 704g, the computer system 101 optionally redisplays the container object to contain virtual object 704g, as shown in FIG. 7E. FIG. 7E also shows the timer 736 below timer threshold 736b indicative of the period of time the attention of the user (e.g., attention input 716) being directed towards virtual object 704g being less than the amount of time required to display the gaze virtual object 704g' for object 704g. FIG. 7E further shows the visual indication of progress of gaze virtual object 704a' changed (e.g., decrease in the amount of fill) towards the attention of the user towards satisfying one or more criteria (described with reference to methods 800, 900, 1000, and 1200) for selecting the gaze virtual object 704a'. While the period of time the attention of the user (e.g., attention input 716) is below timer threshold 736b, the computer system 101 optionally does not display the gaze virtual object 704g' associated with virtual object 704g.

In some embodiments, if the attention input indicates that the attention of the user has changed away from the gaze virtual object (or corresponding virtual object) and subsequently moved back to the gaze virtual object (or corresponding virtual object), the computer system 101 updates the visual indication of progress of the attention of the user directed towards satisfying the one or more criteria for performing an operation associated with a corresponding virtual object based on whether the attention input moved back to the object within a threshold time (e.g., 0.03, 0.05, 0.07, 0.09, 0.1, 0.15, 0.2, 0.25, 0.3, 0.5, 1, 3, 5, 10, 15, 20, or 30 seconds). For example, in FIG. 7F, the visual indication of progress in the gaze target for object 704a is maintained (e.g., continued from the amount of fill prior to the attention of the user changed away) because the attention of the user (e.g., attention input 716) changed from being directed away from the gaze virtual object 704a' of virtual object 704a to being directed to the gaze virtual object 704a' of virtual object 704a within the time threshold. In some embodiments, the computer system 101 updates the visual indication of progress, different from maintaining the indication of progress as will be described in the following figures.

In some embodiments, if the attention input includes an activation input (e.g., as described in more detail with reference to methods 800, 900, and 1000), the computer system 101 performs the operation associated with the virtual object. For example, in FIG. 7F, the computer system 101 detects an activation input (e.g., finger of hand 710 touching trackpad 746 and/or an air pinch gesture from hand 710) before attention 716 satisfies the one or more criteria with respect to the gaze virtual object 704a' for object 704a for performing the operation associated with the virtual object described with reference to methods 800, 900, and 1000; for example, before the duration of the attention input 716 directed towards the gaze virtual object 704a' associated with virtual object 704a reaches threshold 734d as shown by timer 734 in FIG. 7F. In response to detecting the activation input before satisfying the one or more criteria (e.g., reaching threshold 734d), the computer system 101 optionally performs the operation associated with the virtual object 704a such as updating the right side of virtual object 704 to include content associated with virtual object 704a as shown in FIG. 7G.

Figure 7G:
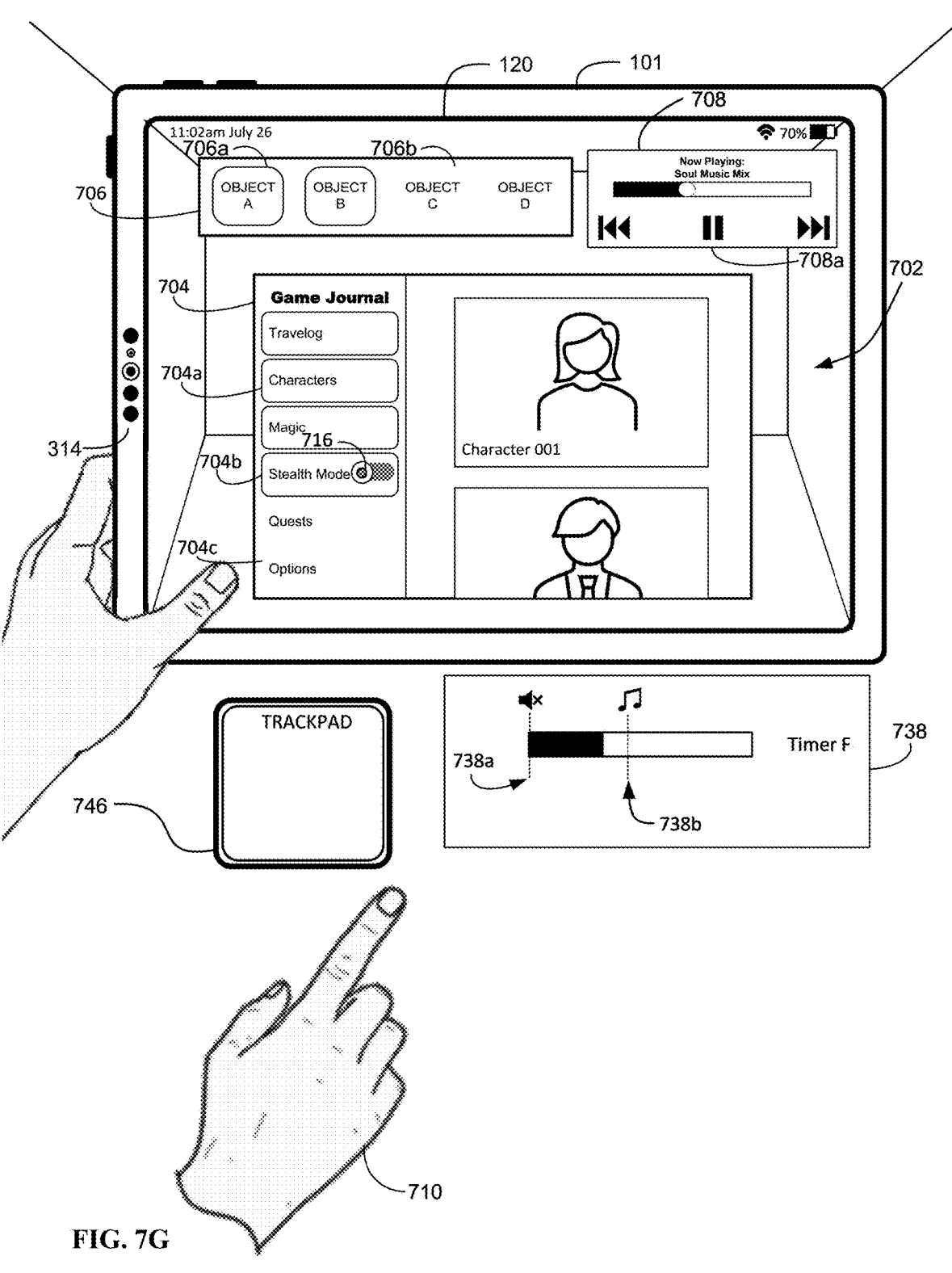

FIG. 7G1 illustrates similar and/or the same concepts as those shown in FIG. 7G (with many of the same reference numbers). It is understood that unless indicated below, elements shown in FIG. 7G1 that have the same reference numbers as elements shown in FIGS. 7A-7O have one or more or all of the same characteristics. FIG. 7G1 includes computer system 101, which includes (or is the same as) display generation component 120. In some embodiments, computer system 101 and display generation component 120 have one or more of the characteristics of computer system 101 shown in FIGS. 7A-7O and display generation component 120 shown in FIGS. 1 and 3, respectively, and in some embodiments, computer system 101 and display generation component 120 shown in FIGS. 7A-7O have one or more of the characteristics of computer system 101 and display generation component 120 shown in FIG. 7G1.

In FIG. 7G1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 7A-7O.

In FIG. 7G1, display generation component 120 is illustrated as displaying content that optionally corresponds to the content that is described as being displayed and/or visible via display generation component 120 with reference to FIGS. 7A-7O. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7G1.

Display generation component 120 has a field of view (e.g., a field of view captured by external image sensors 314b and 314c and/or visible to the user via display generation component 120, indicated by dashed lines in the overhead view) that corresponds to the content shown in FIG. 7G1. Because display generation component 120 is optionally a head-mounted device, the field of view of display generation component 120 is optionally the same as or similar to the field of view of the user.

In FIG. 7G1, the user is depicted as performing an air pinch gesture (e.g., with hand 710) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7O.

In some embodiments, computer system 101 responds to user inputs as described with reference to FIGS. 7A-7O.

In the example of FIG. 7G1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7O and/or described with reference to the corresponding method(s) are optionally implemented on computer system 101 and display generation unit 120 in a manner similar or analogous to that shown in FIG. 7G1.

In some embodiments, in response to detecting that recent interactions with computer system include attention-only inputs or non-attention inputs as described in more detail with reference to method 1000, the computer system 101 optionally changes (e.g., shortens or lengthens) the threshold requirement to display gaze virtual objects. For example, after detecting that the attention input includes attention-only inputs (e.g., does not include non-attention inputs, such as inputs from hand 710), the computer system 101 shortens the time threshold for displaying a gaze virtual object for a virtual object to 732b' (less than threshold 736b in FIG. 7E), as shown in FIG. 7F. In another example, after detecting that recent interaction with computer system 101 includes non-attention inputs, the computer system 101 optionally lengthens the time threshold for displaying a gaze virtual object for a virtual object to 738b (more than threshold 736b in FIG. 7E), as shown in FIG. 7G.

Figure 7H:
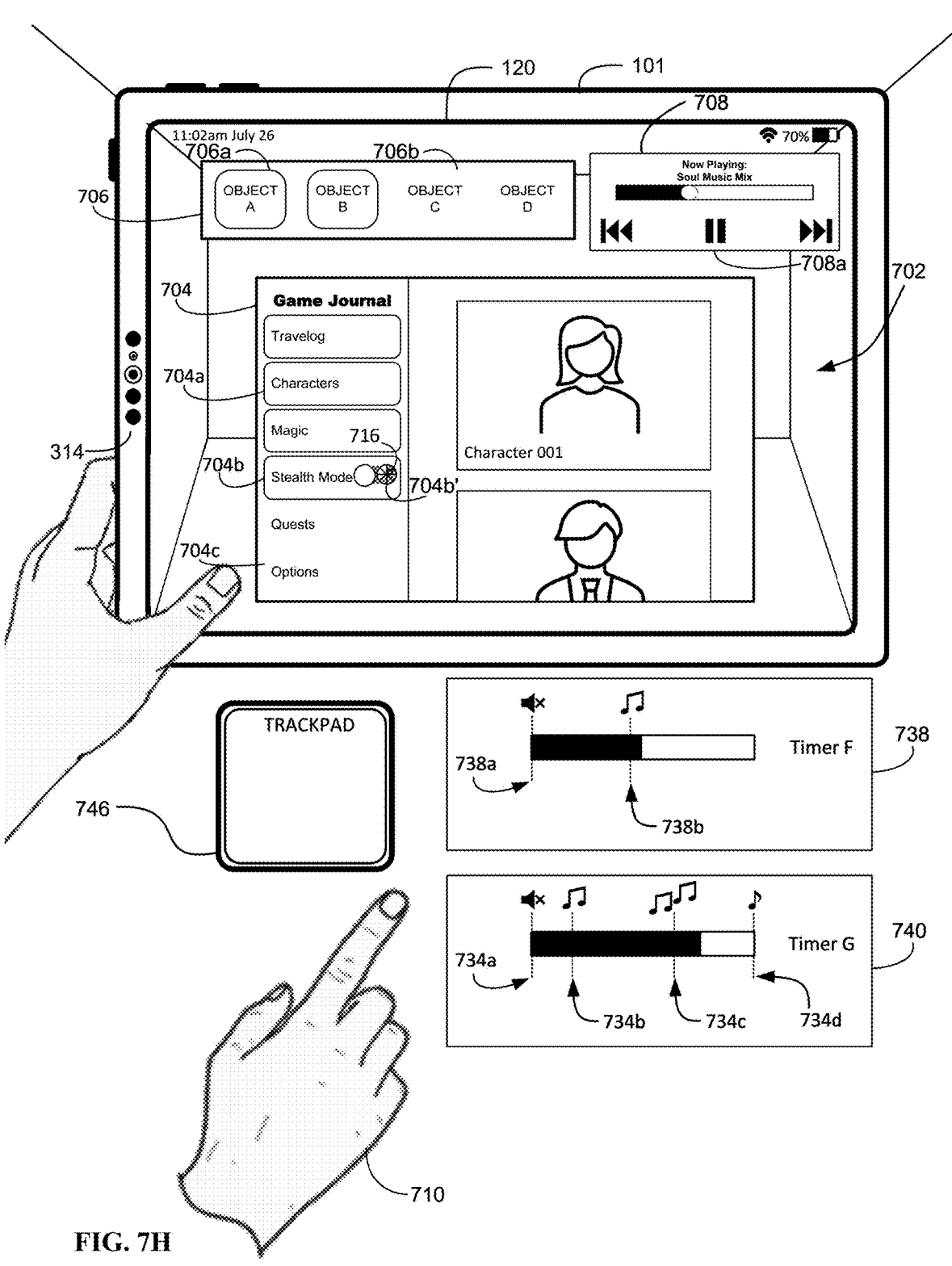

In some embodiments, if the attention input (e.g., without a separate activation input) satisfies the one or more criteria for performing the operation associated with the virtual object, the computer system 101 performs the operation associated with the virtual object. For example, in FIG. 7H, the computer system detects an attention input (e.g., attention input 716 without a separate activation input) directed towards the gaze virtual object 704b' associated with virtual object 704b. As shown in FIG. 7H, virtual object 704b is a toggle virtual object that switches between stealth mode and non-stealth mode in the gaming application user interface 704 presented in the three-dimensional environment 702. In some embodiments, the computer system 101 displays the gaze virtual object 704b' associated with the toggle virtual object 704b overlaid on the toggle virtual object 704b as shown in FIG. 7H. In some embodiments, the computer system 101 displays gaze virtual object 704b' to the right of the toggle virtual object 704b as shown in FIG. 7H (e.g., because toggle object 704b will move to the right if toggled). If the computer system 101 detects that the attention of the user (e.g., attention input 716 directed towards gaze virtual object 704b') has satisfied the criteria for performing the operation associated with the toggle virtual object 704b, the computer system 101 displays and/or moves the toggle button of the toggle virtual object 704b to the right. In some embodiments, the computer system 101 then displays gaze virtual object 704b' to the left of the toggle virtual object 704b (e.g., because toggle object 704b will move to the left if toggled).

Figure 7I:
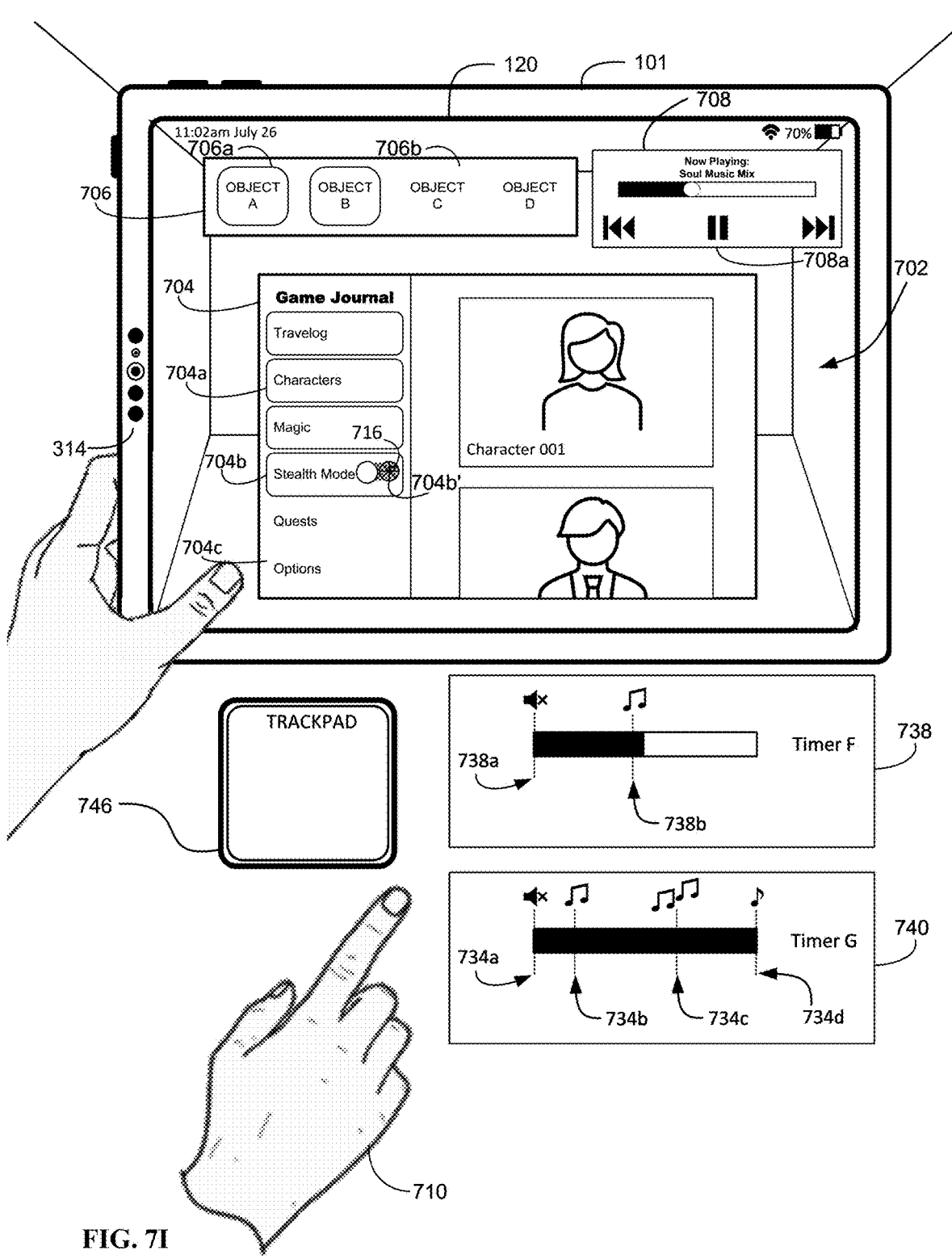
Figure 7J:
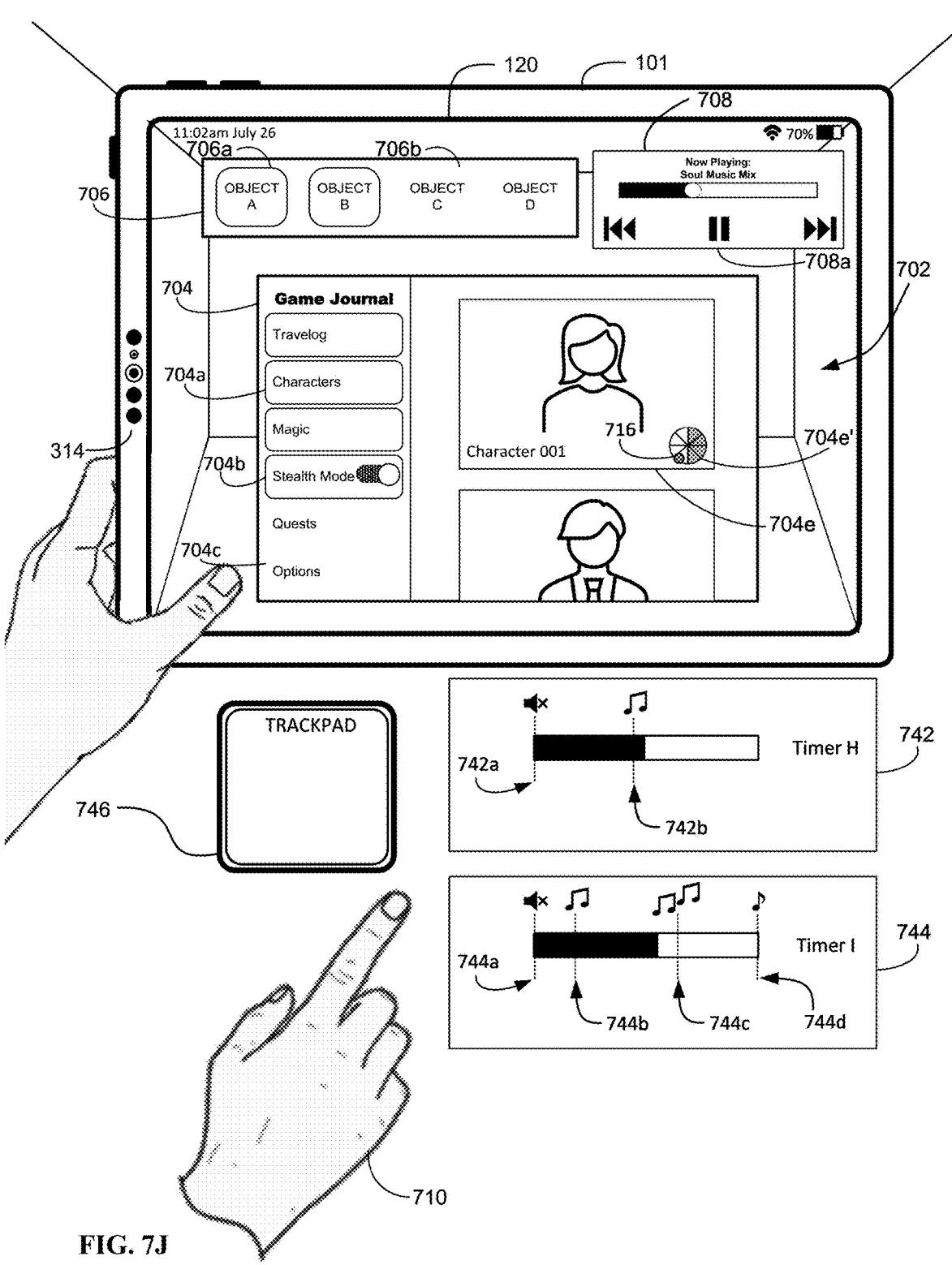
Figure 7K:
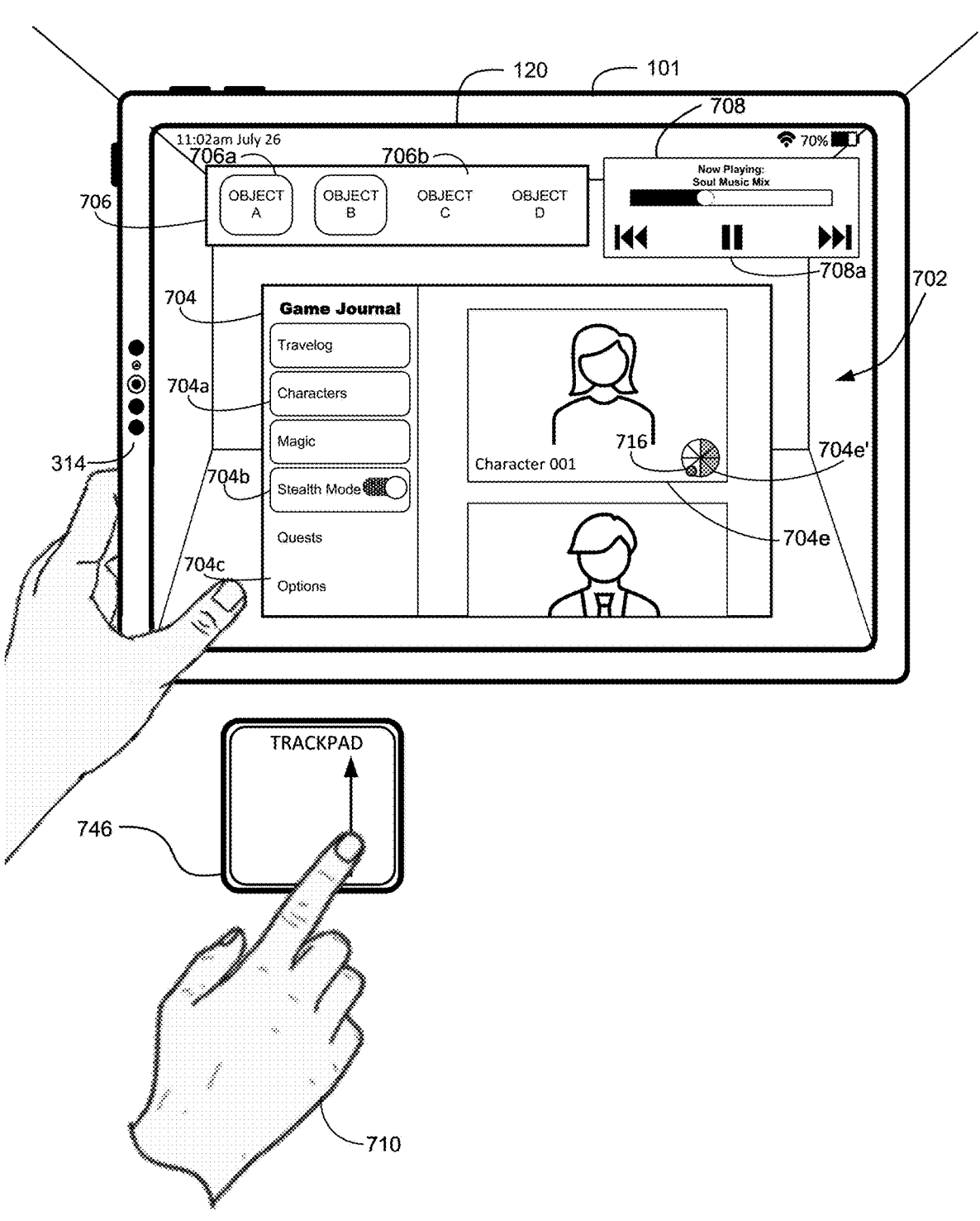
Figure 7L:
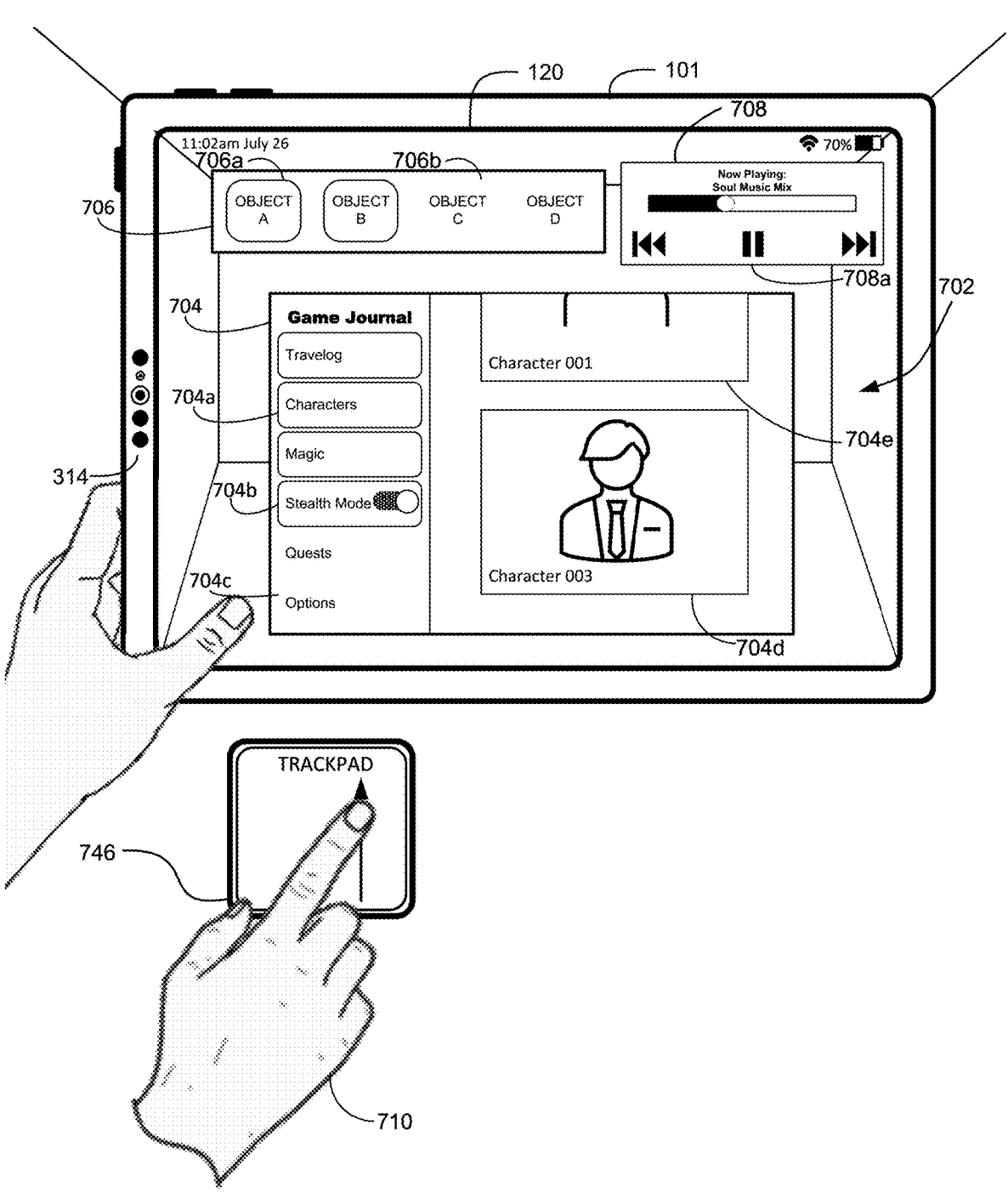

In FIG. 7H, the computer system 101 displays the gaze virtual object 704b' associated with the toggle virtual object 704b about 75% filled corresponding to the duration of time indicated by timer 740. As shown in FIG. 7I, the attention of the user (e.g., attention input 716) has met threshold 734d as indicated by timer 740 corresponding to satisfying the one or more criteria for performing the operation associated with the toggle virtual object 704b. FIG. 7I also shows the gaze virtual object 704b' associated with the toggle virtual object 704b 100% filled to visually represent satisfying the one or more criteria for performing the operation associated with the toggle virtual object 704b. In response to satisfying the one or more criteria for performing the operation associated with the toggle virtual object 704b, the computer system optionally performs the operation associated with the toggle virtual object 704b as indicated by the changed state of toggle virtual object 704b shown in FIG. 7J compared to FIG. 7I.

In some embodiments, in response to detecting that recent interactions with computer system 101 include attention-only inputs or non-attention inputs as described in more detail with reference to method 800, the computer system optionally changes (e.g., shortens or lengthens) the threshold requirement for performing an operation associated with a virtual object. For example, instead of waiting for the attention of the user to meet threshold 734d as indicated by timer 740 in FIG. 7I to cause selection of a gaze virtual object 704b', the computer system 101 optionally shortens the threshold for selection to threshold 734c, less than threshold 734d, in accordance with a determination that recent interactions with the computer system 101 include attention-only inputs.

In some embodiments, virtual objects include scrollable content (e.g., continuous content that cannot all be displayed at the same time). For example, in FIG. 7K, the computer system 101 detects an input that includes attention 716 of the user directed towards the gaze virtual object 704e' associated with virtual object 704e and an activation input (e.g., finger of hand 710 touching trackpad 746 or an air pinch gesture from hand 710). From FIG. 7K to FIG. 7L, the input from hand 710 corresponds to an input to scroll the content of user interface (e.g., movement of hand 710 in an upward direction). In response to the input from hand 710, the computer system 101 scrolls the content of virtual object 704 to reveal more content as shown in FIG. 7L. As shown in FIG. 7L, the gaze virtual object 704e' associated with virtual object 704e is no longer displayed in response to the scrolling and/or during scrolling.

In some embodiments, the computer system 101 ceases to display the gaze virtual object when the attention of the user is changed away from the gaze virtual object and/or the virtual object. For example, in FIG. 7M, while the computer system 101 displays the gaze virtual object 704d' for virtual object 704d in response to the attention of the user (e.g., attention input 716) directed towards virtual object 704d and the attention of the user satisfying the one or more criteria as further indicated by meeting threshold 748b in timer 748 as shown in FIG. 7M, the computer system 101 detects that the attention input 716 is changed away from virtual object 704d to being directed to virtual object 708a in FIG. 7N. In response, the computer system 101 displays a container to contain virtual object 708a and concurrently ceases to display the gaze virtual object 704d' for virtual object 704d as shown in FIG. 7O. From FIG. 7N to FIG. 7O, the timer 752 corresponding to the duration of the attention input 716 directed towards the virtual object 708a has increased but does not meet threshold 752b and therefore, computer system 101 does not display the gaze virtual object 708a' for virtual object 708a.

FIGS. 8A-8I is a flowchart illustrating an exemplary method 800 of displaying a gaze virtual object that is selectable, based on attention directed to the gaze virtual object, to perform an operation associated with a selectable virtual object in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, the method 800 is performed at a computer system (e.g., 101) in communication with a display generation component (e.g., 120) and one or more input devices (e.g., a gaze tracking device, a hand tracking device, a remote control, one or more touch-sensitive surfaces, one or more buttons, dials, and/or knobs): For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the computer system is in communication with the gaze tracking device (e.g., eye tracking device 130 in FIG. 5). In some embodiments, the one or more input devices include an electronic device or component capable of receiving a user input (e.g., capturing a user input or detecting a user input) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking or gaze tracking device, and/or a motion sensor (e.g., a hand tracking device, or a hand motion sensor). In some embodiments, the computer system is in communication with a gaze tracking device. In some embodiments, the gaze tracking device is a wearable device, such as a head-mounted device as described in more detail herein. In some embodiments, the gaze tracking device need not be implemented in a head-mounted or otherwise near-eye fashion as has been described herein.

In some embodiments, the computer system displays (802a), via the display generation component, a user interface that includes a first selectable user interface object that is selectable to perform a first operation, such as three-dimensional environment 702 in FIG. 7A that includes. In some embodiments, the user interface is displayed in a three-dimensional environment (e.g., the three-dimensional environment is an extended reality (XR) environment, such as a virtual reality (VR) environment, a mixed reality (MR) environment, or an augmented reality (AR) environment). In some embodiments, the user interface is a user interface of an application accessible by the computer system, such as a word processing application with a plurality of words, an application launch user interface with a plurality of application icons, a photo management application with a plurality of representations of photos, a spreadsheet application with a plurality of data cells, a presentation application with a plurality of slides or other graphical user interface objects, a messaging application with a plurality of messages, a web browsing application with a plurality of links, and/or an email application with a plurality of emails. In some embodiments, the user interface includes a plurality of user interface objects including affordances, buttons, icons, bubbles, platters, or other containers for text (e.g., hyperlink and/or graphics), message (e.g., text and/or graphics), image, or multimedia. which are selectable to display corresponding user interfaces (e.g., pages) and/or perform operations associated with selecting the affordance (e.g., play video or launch an application). In some embodiments, the user interface is a bookmark (e.g., favorites and/or internet shortcuts) management user interface with a plurality of web page representations that have been saved by a user of the computer system. In some embodiments, the first selectable user interface object is a representation of a web page and includes the corresponding URL text displayed within the representation of the web page in the user interface. In some embodiments, the user interface is a menu of operations with a plurality of setting representations that define how the computer system functions, what and/or how user interface objects are displayed. In some embodiments, the first operation associated with the first selectable user interface object includes displaying content, displaying a webpage, displaying another user interface, playing multimedia, launching an application, providing a menu, installing a program, or downloading content. In some embodiments, as described in step(s) 812 and in method 1000 the first selectable user interface object is selected in response to a combination of user attention and receiving an activation input (e.g., user input confirming intent to perform the first operation). In some embodiments, user attention corresponds to user gaze as described in more detail with reference to FIG. 6. In some embodiments, receiving the activation input includes detecting a portion (e.g., a hand, arm, and/or finger) of the user performing an air pinch gesture (e.g., two or more fingers of a user's hand such as the thumb and index finger moving together and touching each other) to form a pinch hand shape while attention of the user is directed to the user interface and/or the first selectable user interface object, followed by movement of the hand in the pinch hand shape upward or downward. In some embodiments, the activation input corresponds to a gesture other than an air pinch gesture, such as a forward pointing gesture (e.g., a forward movement of a user's hand while one or more fingers of the user's hand are extended towards the first selectable user interface object) or a tap gesture with a finger of the user's hand (e.g., a forward movement by a finger of the user's hand such that the finger touches the first selectable user interface object or user interface or approaches within a threshold distance of the first selectable user interface object or user interface region). In some embodiments, a pinch and drag gesture that is an air gesture includes the pinch gesture performed in conjunction with (e.g., followed by) a drag input that changes a position of the user's hand from a first position (e.g., a start position of the drag) to a second position (e.g., an end position of the drag). In some embodiments, the user maintains the pinch hand shape while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, the activation input corresponds to an attention-only input to scroll through the user interface as described in step(s) 834, such as attention directed to a bottom or top portion of the user interface causing the user interface to scroll its content downward or upward, respectively. In some embodiments, the activation input includes trackpad inputs (e.g., finger touching a trackpad) or an input device input (e.g., selection via a handheld input device, such as a stylus or remote control). In some embodiments, the activation input is an attention-only and/or gaze-only input (e.g., not including input from one or more portions of the user other than those portions providing the attention input).

In some embodiments, while displaying the user interface, the computer system detects (802b), via the one or more input devices, that attention of a user of the computer system is directed toward the first selectable user interface object, such as attention 716 in FIGS. 7G and 7G1 directed to object 704b. In some embodiments, when user attention corresponds to gaze, a gaze tracking device optionally captures one or more images of the user's eyes and detects the pupils and glints in the one or more captured images to track the user's gaze, as described in more detail with reference to FIG. 6. In some embodiments, the computer system detects the gaze of the user directed at a location (or region) of the user interface that includes the first selectable user interface object for a first period of time greater than a first time threshold (e.g., 0.02, 0.05, 0.1, 0.2, 0.25, 0.3, 0.5, 1, 2, 3, or 5 seconds). In some embodiments, the first selectable user interface object is initially displayed with a first visual appearance having a first shape, a first location, a first color, and/or a first effect. In some embodiments, when the computer system detects the attention of the user directed at the location of the user interface that includes the first selectable user interface object for greater than the first time threshold, the computer displays the first selectable user interface object with a second visual appearance different from the first visual appearance. The second visual appearance optionally makes the first selectable user interface object more prominent. For example, the second visual appearance of the first selectable user interface object optionally includes a second shape larger than the first shape, a second location closer to the viewpoint of the user (or computer system) than the first location, a second color brighter than the first color, and/or a second effect where the first select- able user interface object appears to lift up from a backplane of the user interface more than the first effect (e.g., the second effect visually indicates the first selectable user interface object emphasized by a depth effect). In some embodiments, the second visual appearance includes pre- senting additional information (e.g., tooltip, info tip, or hint) related to the first selectable user interface object that was not shown with the first visual appearance.

In some embodiments, in response to detecting that the attention of the user is directed toward the first selectable user interface object, the computer system displays (802*c*), in the user interface, a first gaze target that is associated with the first selectable user interface object, such as gaze target 704*b*' in FIG. 7H. In some embodiments, in response to detecting the gaze of the user is directed toward the first selectable user interface object without the gaze of the user being directed toward a location (or a region) of the user interface that does not include the first selectable user interface object, the computer system displays the first gaze target that is associated with the first selectable user interface object. In some embodiments, if the gaze of the user is directed toward a location (or region) of the user interface that does not include the first selectable user interface object, the computer system does not display (or ceases to display) the first gaze target. In some embodiments, the first gaze target is a different and/or separate entity (element/user interface object) from the first selectable user interface object. In some embodiments, the first gaze target is pre- sented at a location different from a location of the first selectable user interface object. In some embodiments, the first gaze target is displayed at a location with a spatial relationship (e.g., distance and/or orientation) to the first selectable user interface object, such as 0.1, 0.3, 0.5, 1, 3, 5, 10, 30 or 50 cm above, below, to the left side, or to the right side of the first selectable user interface object. The location of the first gaze target will be described in more detail later with reference to step(s) 810, 840, and 842. In some embodi- ments, the first gaze target is initially displayed with a first visual appearance and/or a first sound effect, which is described in more detail with reference to method 800. In some embodiments, the first gaze target indicates a duration of gaze directed to the first gaze target and once the duration of gaze is greater than a second time threshold (e.g., 0.1, 0.5, 1, 2, 3, 5, 7, 10, 20, 30, or 60 seconds), the computer system initiates the first operation associated with the first selectable user interface object, as will be described later with refer- ence to method 1000.

In some embodiments, while displaying the first gaze target, the computer system detects (802*d*) that the attention (e.g., based on gaze) of the user is directed toward the first gaze target, such as attention 716 in FIG. 7H. In some embodiments, the computer system detects the gaze of the user directed toward a location (or region) of the user interface that includes the first gaze target for a first period of time greater than the first time threshold. In some embodi- ments, the gaze of the user changes from the location of the user interface that includes the first selectable user interface object to the location of the user interface that includes the first gaze target. The respective locations of the first select- able user interface object and the first gaze target will be described in more detail with reference to step(s) 810, 840, and 842. In some embodiments, the computer system updates one or more visual properties (e.g., size, fill, color, or opacity) of the first gaze target in response to detecting the gaze of the user directed toward the first gaze target. For example, when the computer system detects the gaze of the user directed at the location (or region) of the user interface that includes the gaze target for a second period of time (e.g., 0.2, 0.25, 0.3, 0.5, 1, 2, 3, 5, 7, or 10 seconds) greater than the first period of time (e.g., 0.02, 0.05, 0.1, 0.2, 0.25, 0.3, 0.5, 1, 2, 3, or 5 seconds), the computer system optionally displays the first gaze target with a second visual appear- ance, different from the first visual appearance (e.g., second visual appearance includes a larger filled portion than the first visual appearance). For example, the gaze target is optionally a circle having a filled portion and an unfilled portion. The filled portion optionally expands (grows) out- wardly (toward the outside edge of the circle) in response to continued gaze towards the gaze target. In some embodi- ments, the gaze target is similar to a pie chart where a filled portion includes one or more wedges, the angles of which grow as gaze continues to be directed towards the gaze target. For example, the wedges optionally expand clock- wise (or counter-clockwise). In some embodiments, the gaze target is a progress bar with a rectangular shape that includes a filled portion and an unfilled portion, wherein the filled portion represents duration of the gaze directed to the gaze target. Additional visual properties as well as sounds effects associated with the gaze target will be described in more detail with reference to step(s) 818, 844-848, and method 900.

In some embodiments, in response to detecting that the attention of the user is directed toward the first gaze target (802*e*), in accordance with a determination that the attention of the user (directed toward the first gaze target) satisfies one or more criteria, the computer system initiates the first operation associated with the first selectable user interface object (802*O*, such as toggling element 704*b* in response to attention 716 directed to gaze target 704*b*' in FIGS. 71 and 7J. In some embodiments, the one or more criteria include a criterion that is satisfied when a duration of the user's gaze is directed toward the first gaze target for a third period of time greater than the second time threshold (e.g., 0.1, 0.5, 1, 2, 3, 5, 7, 10, 20, 30, or 60 seconds). In some embodiments, initiating the first operation is confirmed at the first gaze target in accordance with the user's gaze directed toward the first gaze target for a period of time greater than the second time threshold (e.g., duration of gaze in the direction of the first gaze target is beyond the second time threshold).

In some embodiments, in accordance with a determina- tion that the attention of the user does not satisfy the one or more criteria, the computer system forgoes (802*g*) initiating the first operation associated with the first selectable user interface object, such as shown with respect to attention 716 moving away from gaze target 704*a*' in FIG. 7C. For example, if the computer system determines that the gaze duration is less than the second time threshold due, at least in part, to the gaze moving to a location (or a region) of the user interface that does not include the first gaze target, the computer system optionally forgoes initiating the first operation associated with the first selectable user interface object. In some embodiments, the computer system changes the visual appearance of the first gaze target in response to a determination that the gaze is no longer directed to the first gaze target, as will be described in detail later with reference to step(s) 850, 852, and method 900. Displaying the gaze target in response to determining that the user's gaze is directed to the selectable user interface object provides confirmation that the user intends to interact with the selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, determining that the attention of the user is directed toward the first selectable user interface object includes determining that gaze of the user has been directed toward the first selectable user interface object for more than a first threshold period of time (804), such as threshold 712*b* in FIG. 7C (e.g., 0.02, 0.05, 0.1, 0.2, 0.25, 0.3, 0.5, 0.6, 0.7, 0.8, 0.9, 1, 1.2, 1.5, 2, 2.5, 3, 5, 10, or 30 seconds). In some embodiments, attention of the user is determined to be directed toward the first selectable user interface object based on detection of gaze directed to the first selectable user interface object without requiring any conditions. In some embodiments, attention of the user is determined to be directed toward the first selectable user interface object based on detection of gaze directed to the first selectable user interface object with one or more conditions such as detecting that gaze of the user is directed at a location (or region) of the first selectable user interface object for more than the first threshold period time described herein in order for the computer system to display the first gaze target. For example, the computer system determines that the gaze of the user has been maintained in a region of the first selectable user interface object for at least an amount of time that is greater than the first threshold period of time. In some embodiments, the gaze of the user (or a precise position of the gaze of the user) directed toward the first selectable user interface object changes but is determined, by the computer system to be continuously within the region of the first selectable user interface object during the at least amount of time. In some embodiments the computer system does not display the first gaze target in accordance with a determination that the attention of the user is not directed toward the first selectable user interface object (e.g., in accordance with a determination that the gaze of the user has not been maintained in the region of the first selectable user interface object for at least the first threshold period of time). In some embodiments, one or more additional conditions such as requiring that gaze is directed toward the first selectable user interface object or the first gaze target in order to perform respective operation(s) is discussed in more detail with reference to step(s) 802. Requiring that the attention of the user be directed toward the first selectable user interface object for more than the first threshold period of time before displaying the gaze target provides additional confirmation that the user intends to interact with the selectable user interface object without cluttering the user interface with an additional user interface object (e.g., gaze target) which enhances operability of the computer system and reduces power usage of the computer system.

In some embodiments, displaying the first selectable user interface object includes displaying the first selectable user interface object with a first characteristic having a first value (806*a*), such as object 704*a* in FIG. 7C. In some embodiments, displaying the first gaze target includes displaying the first gaze target with the first characteristic having a second value, different from the first value (806*b*), such as gaze target 704*a*' being smaller than object 704*a* in FIG. 7C. In some embodiments, the first characteristic includes size and/or any visual characteristic having a first respective value such as color, saturation, and/or brightness. In some embodiments, the computer system displays the first gaze target with the first characteristic (e.g., size) having the second value, different from the first value (e.g., smaller size than the first selectable user interface object). More details related to visual characteristics of the gaze target is described in step(s) 810, 818, 840, 842-852 and method 900. Displaying the gaze target smaller than the selectable user interface object minimizes distraction in the user interface, thereby reducing errors in the interaction between the user and the computer system (e.g., avoiding unintentional activation or deactivation of selectable user interface objects due to unintentional gaze) and reducing inputs needed to correct such errors.

In some embodiments, in response to detecting the attention of the user directed to the first selectable user interface object, such as attention 724 on object 704*h* in FIG. 7B, the computer system increases (808) a size of the first selectable user interface object and displays information associated with the first selectable user interface object in the first selectable user interface object, wherein the information was not displayed before the attention of the user was directed to the first selectable user interface object, such as shown with object 704*h* in FIG. 7C. For example, the computer system displays the first selectable user interface object with a larger size in accordance with a determination that the attention of the user is directed to the first selectable user interface object for a first period of time greater than the first time threshold as described with reference to step(s) 802. In some embodiments, the displayed information includes supplemental content and/or provides one or more functions (e.g., link(s) to webpage(s), dictionary definition(s), user interface object (s), widget(s), or thumbnail preview(s))) not displayed before the attention of the user was directed to the first selectable user interface object. In some embodiments, the increased size (or expanded) version of the first selectable user interface object is displayed in a same location of the first selectable user interface object before the attention of the user was directed to the first selectable user interface object. In some embodiments, the information associated with the first selectable user interface object is displayed as overlaid or overlapping the first selectable user interface object. In some embodiments, while the attention of the user is not directed toward the first selectable user interface object or in a region of the first selectable user interface object, the computer system does not increase the size of the first selectable user interface object and display information associated with the first selectable user interface object. In some embodiments, before the attention of the user was directed to the first selectable user interface object, the first selectable user interface object included a first portion of the information. In some embodiments, the increased size of the first selectable user interface object accommodates a second portion of the information larger than the first portion of the information. Increasing the size of the selectable user interface object to display information associated with the selectable user interface object provides improved feedback to the user without cluttering the user interface (e.g., by not always displaying the supplemental information associated with the selectable user interface object), which enhances operability of the computer system and reduces power usage of the computer system.

In some embodiments, before displaying the first gaze target, the first selectable user interface object is included in a first region of the user interface and not a second region of the user interface (810*a*), such as the location of object 706*b* in FIG. 7B. In some embodiments, displaying the first gaze target includes displaying, in the second region of the user interface, different from the first region, the first gaze target that is associated with the first selectable user interface object (810*b*), such as the location of gaze target 706*b*' in FIG. 7C. In some embodiments, the first gaze target and its associated first selectable user interface object are visually separated or spatially separated in the user interface (e.g., displayed in different regions of the user interface) even though the first gaze target is associated with the first selectable user interface object. For example, the computer system optionally displays the first selectable user interface object in a middle, left most region of a user interface container (e.g., box) and displays the first gaze target in a middle, right most region of the same user interface container. In another example, the computer system optionally displays the first selectable user interface object in a center region of the user interface container and displays the first gaze target in a bottom right most region of the same user interface container. In some embodiments, the computer system requires the attention of the user to be directed to the first gaze target or in the second region of the first gaze target for a period of time greater than the second time threshold in order to initiate the first operation associated with the first selectable user interface object as described with reference to step(s) 802. In some embodiments, the computer system displays the first gaze target in another user interface container, different from the user interface container associated with the first selectable user interface object as will be described with reference to step(s) 840. In some embodiments, the respective regions in which the computer system displays the first gaze target and the first selectable user interface object varies depending on the type and size of the user interface container (e.g., list, table, box, or column) or lack of user interface container associated with the first selectable user interface object as will be described in more detail with reference to step(s) 832, 840, and 842. In some embodiments, the computer system displays the first selectable user interface object in the first region at a first depth and the first gaze target in the second region at a second depth, different from the first depth. For example, the second depth is closer to the computer system (e.g., viewpoint of the user) than the first depth. In some embodiments, although the computer system displays the first selectable user interface object in the first region and the first gaze target in the second region, different from the first region, the second region selected by the computer system to display the first gaze target is within a threshold distance (e.g., 0.05, 0.1, 0.2, 0.3, 0.4, 0.5, 0.8, 1, 1.5, 2, 2.5, 3, 5, 7, or 10 cm) of the first selectable user interface object such that displaying the first gaze target and the first selectable user interface object appear as a visually distinct group (e.g., the first gaze target is associated with the first selectable user interface object and not other user interface objects of the user interface). Displaying the gaze target in a different region from the first selectable user interface object requires that the attention of the user be directed to the gaze target or the region of the gaze target in order to perform an operation associated with the first selectable user interface which provides additional confirmation that the user does indeed intend to interact with the first gaze target and/or the selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, before detecting that the attention of the user is directed toward the first selectable user interface object, the first selectable user interface object is displayed at a first distance from a viewpoint of the user (812*a*) (e.g., a first visual separation from a backplane behind the first selectable object), such as object 704*a* in FIG. 7A. In some embodiments, while the attention of the user is directed toward the first selectable user interface object, the computer system displays the first selectable user interface object at a second distance, different from the first distance, from the viewpoint of the user (812*b*) (e.g., a second, greater, visual separation from the backplane behind the first selectable object), such as if object 704*a* changed distance from the viewpoint of the user in FIG. 7B. In some embodiments, while the attention of the user is not directed toward the first selectable user interface object or in a region of the first selectable user interface object, the computer system displays the first selectable user interface object at the first distance from the viewpoint of the user (e.g., the first selectable user interface object is against a backplane of the user interface or the first selectable user interface object is presented at a first depth and the user interface is presented at the same first depth). In some embodiments, while the attention of the user is directed toward the first selectable user interface object or in a region of the first selectable user interface object, the computer system displays the first selectable user interface object at the second distance closer than the first distance from the viewpoint of the user (e.g., the first selectable user interface object is presented at a second depth closer to the viewpoint of the user of the computer system than the first depth of the user interface). In some embodiments, while the attention of the user is directed toward the first selectable user interface object or in a region of the first selectable user interface object, the computer system displays the first selectable user interface at the second distance with a simulated shadow. In some embodiments, while the attention of the user is not directed toward the first selectable user interface object or in a region of the first selectable user interface object, the computer system displays the first selectable user interface object at the first distance without the simulated shadow. Displaying the first selectable user interface object as closer to the viewpoint of the user when the attention of the user is directed toward the first selectable user interface object allows the computer system to convey to the user that attention of the user is directed toward the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while displaying the first selectable user interface object at the second distance from the viewpoint of the user, the computer system displays (814), in the user interface, a respective user interface object that includes information about the first selectable user interface object in association with the first selectable user interface object, such as the "tooltip" for object 706*a* in FIG. 7C. In some embodiments, the information includes text and/or content associated with the first selectable user interface object such as a tooltip, a definition, a translation, or other snippet of information about the first selectable user interface object (e.g., information about what operation will occur if the first selectable user interface object or its gaze target is selected). In some embodiments, the computer displays the first gaze target that is associated with the first selectable user interface object as described in step(s) 802 within the respective user interface object. For example, the respective user interface object includes information about the first selectable user interface object in a left region and the first gaze target in a right region of the respective user interface object. In some embodiments, the respective user interface object is displayed below, above, to the left, or to the right of the first selectable user interface object. In some embodiments, the computer system displays the information before displaying the first gaze target. In some embodiments, the computer system displays the information and the first gaze target at the same time. In some embodiments, while the attention of the user is not directed toward the first selectable user interface object or in a region of the first selectable user interface object, the computer system does not display the respective user interface object that includes the information about the first selectable user interface object. Displaying the respective user interface object that includes information about the selectable user interface object provides improved feedback to the user without cluttering the user interface (e.g., by not always displaying the information about with the selectable user interface object), which enhances operability of the computer system and reduces power usage of the computer system.

In some embodiments, while the attention of the user is directed toward the first selectable user interface object, the computer system provides (816) a first output indicative of the attention of the user being directed toward the first selectable user interface object, such as described with reference to timer 712 in FIG. 7B. In some embodiments, the first output includes a sound output such as one or more tones (e.g., the sound "ding" or "beep") or a chord in a melody. In some embodiments, tone and/or chord includes one or more sound characteristics such as pitch, volume, timbre, harmonics, rhythm, attach, sustain, decay, and/or speed. In some embodiments, the first output includes a tactile output (e.g., vibration and/or haptics). In some embodiments, the first output includes changing the visual appearance of the first selectable user interface object such as described with reference to step(s) 812. For example, the computer system displays the first selectable user interface object having a luminous effect based on characteristics (e.g., brightness, color, location, size and/or directionality) of one or more simulated light sources located in the three-dimensional environment and/or based on such characteristics of one or more simulated light sources that are not actually located in the three-dimensional environment but based on which the computer system displays the luminous effect as if they were located in the three-dimensional environment. In some embodiments, the first output includes any combination of the sound output, the tactile output, and/or the changed visual appearance described herein. Providing the audio, tactile, and/or visual output in accordance with the determination that the attention of the user is directed toward the first selectable user interface object enhances user interactions with the computer system by providing improved feedback to users and reducing the likelihood of errors in the interaction between the user and the computer system.

In some embodiments, while the attention of the user is directed toward the first gaze target, the computer system provides a second output indicative of the attention of the user being directed toward the first gaze target (818), such as described with reference to timer 714 in FIG. 7C. In some embodiments, the first output includes any combination of the sound output, the tactile output, and/or the changed visual appearance as described in step(s) 816 and method 900. In some embodiments, the second output is different from the first output described in step(s) 816 in order to distinguish the second output associated with the first gaze target from the first output associated with the first selectable user interface object. For example, the second output optionally includes a first sound characteristic higher than a respective sound characteristic of the first output (e.g., higher pitch and/or stronger rhythm). In some embodiments, the computer system provides a third sound output similar to or the same as the second output, wherein the sound output is indicative of the attention of the user being directed toward the first selectable user interface object. Providing the audio, tactile, and/or visual output in accordance with the determination that the attention of the user is directed toward the first gaze target enhances user interactions with the computer system by providing improved feedback to users and reducing the likelihood of errors in the interaction between the user and the computer system.

In some embodiments, while the attention of the user is directed toward the first gaze target, such as attention 716 to target 704a' in FIG. 7F, the computer system detects (820), via the one or more input devices (e.g., described in step(s) 802), a first input directed to the first gaze target, wherein the first input includes input from a first portion of a body of the user of the computer system, such as input from hand 710 in FIG. 7F. In some embodiments, the first portion of the user corresponds to the user's first hand, arm, palm, and/or one or more fingers of the first hand (e.g., the left or right hand) or head. In some embodiments, the first input has one or more of the characteristics of the inputs described with reference to step(s) 802.

In some embodiments, in response to detecting the first input directed to the first gaze target, the computer system initiates (820) the first operation associated with the first selectable user interface object (e.g., without waiting for the attention of the user (directed toward the first gaze target) to satisfy the one or more criteria), such as updating the content of the right side of object 704 in FIGS. 7G and 7G1. In some embodiments, the computer system initiates the first operation when the computer system detects the first portion of the user (e.g., a hand air gesture/input described in step(s) 802) directed to the first gaze target. In some embodiments, the first input includes an air pinch gesture, or a selection input (e.g., a tap, touch, or click) described in step(s) 802. The first input from the user optionally includes other types of inputs, such as trackpad inputs (e.g., finger touching a trackpad) or an input device input (e.g., selection via a handheld input device, such as a stylus or remote control) described in step(s) 802. In some embodiments, the computer system initiates the first operation when the computer system detects the first input while attention of the user is directed toward the first selectable user interface object without satisfying the one or more criteria (e.g., criteria that the attention of the user be directed toward the first gaze target to satisfy the one or more criteria described in step(s) 802). Performing the operation in response to the user input directed to the first gaze target provides efficient interaction with virtual objects.

In some embodiments, determining whether the attention of the user is directed toward the first selectable user interface object includes determining whether or not the first portion of the body of the user is in a first state (822) (e.g., ready state configuration of the user or the first portion of the user as described herein), such as the state of hand 710 in FIG. 7B, and in accordance with a determination that the first portion of the body of the user is in the first state, the computer system foregoes displaying (822) in the user interface, the first gaze target that is associated with the first selectable user interface object, such as not displaying gaze target 704a' in FIG. 7C. In some embodiments, if the computer system detects that the portion of the body of the user is in a second state, different from the first state, and/or in a pose that indicates a state different from the first state, the computer system does not display the first gaze target that is associated with the first selectable user interface object in response to detecting that the attention of the user is directed to the first selectable user interface object as described in step(s) 802. Forgoing displaying the first gaze target while the first portion of the body of the user is in a ready state reduces clutter of the user interface when input from the first portion of the user is more likely than attention-based input.

In some embodiments, the user interface includes a second selectable user interface object that is selectable to perform a second operation (824a), such as object 704c. The second selectable user interface object optionally has one or more of the characteristics of the first selectable user interface object described in step(s) 802. In some embodiments, the second selectable user interface object is a same type of object as the first selectable user interface object, but when selected, performs the second operation, different from the first operation associated with the first selectable user interface object.

In some embodiments, the computer system detects (824b) that attention of the user of the computer system is directed toward the second selectable user interface object, such as attention 720 in FIG. 7B. In some embodiments, in response to detecting that the attention of the user is directed toward the second selectable user interface object, the computer system displays (824c), in the user interface, a second gaze target associated with the second selectable user interface object, wherein the first gaze target and the second gaze target have a same visual appearance (e.g., color, size, shape, animation, visual effect, and/or motion), such as gaze targets 704a' and the gaze target for object 704c in FIG. 7C. In some embodiments, the first gaze target and the second gaze target associated with respective selectable user interface objects are the same even though the respective selectable user interface objects are associated with different applications and when selected, perform respective operations, different from one another. In some embodiments, the first gaze target and the second gaze target have the same visual appearance including the same visual characteristics described in step(s) 806, 810, 818, 840, 842-852 and method 900. Displaying gaze targets with similar visual appearances enhances user interactions with the computer system by providing improved feedback to users (e.g., by consistently displaying gaze targets with the same visual appearance) and reducing the likelihood of errors in the interaction between the user and the computer system.

In some embodiments, displaying the first selectable user interface object while the attention of the user is directed to the first selectable user interface object includes displaying the first selectable user interface object with a first visual appearance (826a), such as the appearance of object 704d in FIG. 7M. For example, when the computer system displays the first selectable user interface object with the first visual appearance, the first selectable user interface object is expanded to a larger size (e.g., consistent, but not limited to the increased size of the first selectable user interface object described in step(s) 808). In some embodiments, when the computer system displays the first selectable user interface object with the first visual appearance, the first selectable user interface object is displayed in the first and the first gaze target in the second region consistent, but not limited to the first region and the second region described in step(s) 810.

In some embodiments, the user interface includes a second selectable user interface object that is selectable to perform a second operation (826b), such as object 708a in FIG. 7M. In some embodiments, the second selectable user interface object is selectable to perform the second operation is consistent, but not limited to the second selectable user interface object described in step(s) 824.

Figure 7M:
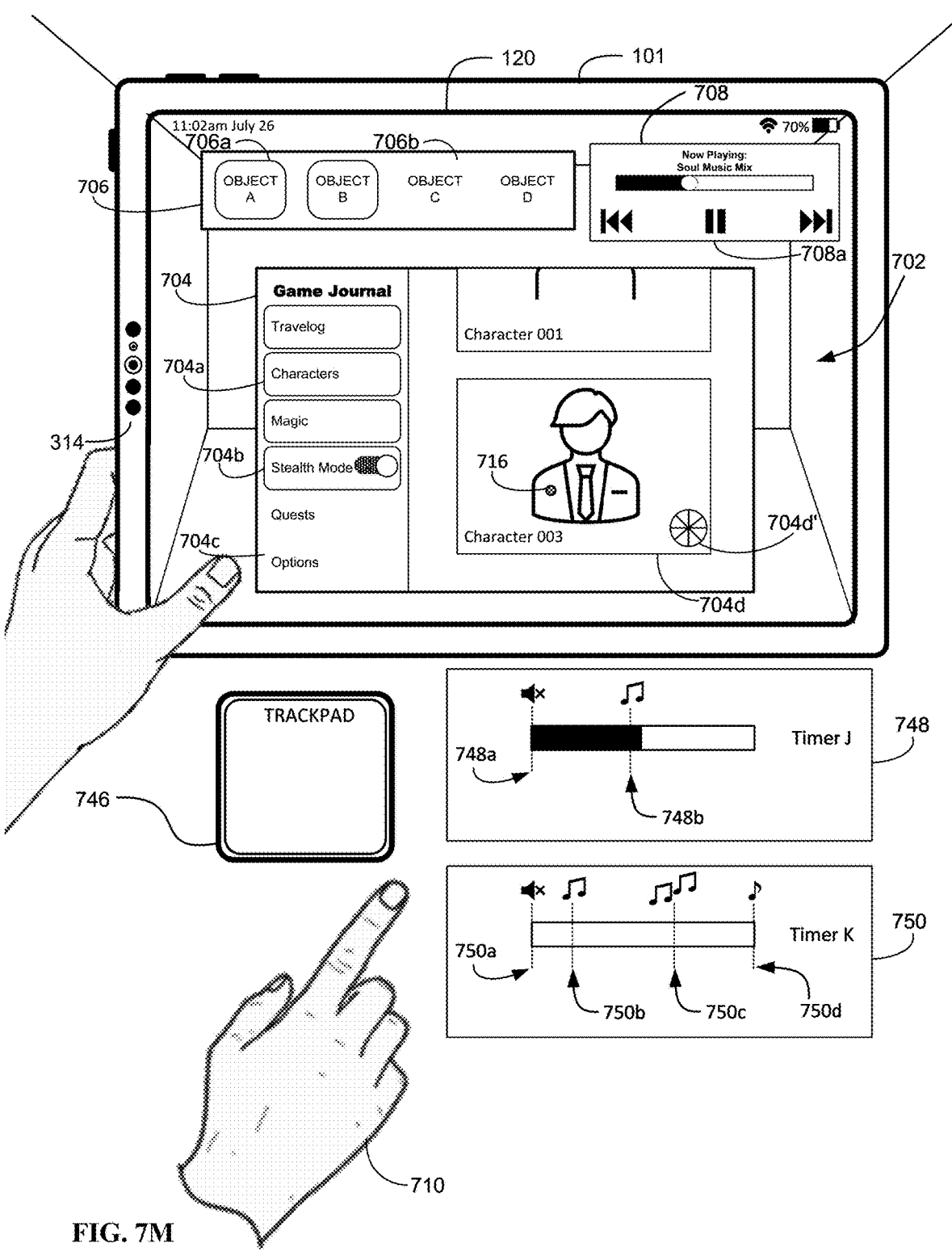
Figure 7N:
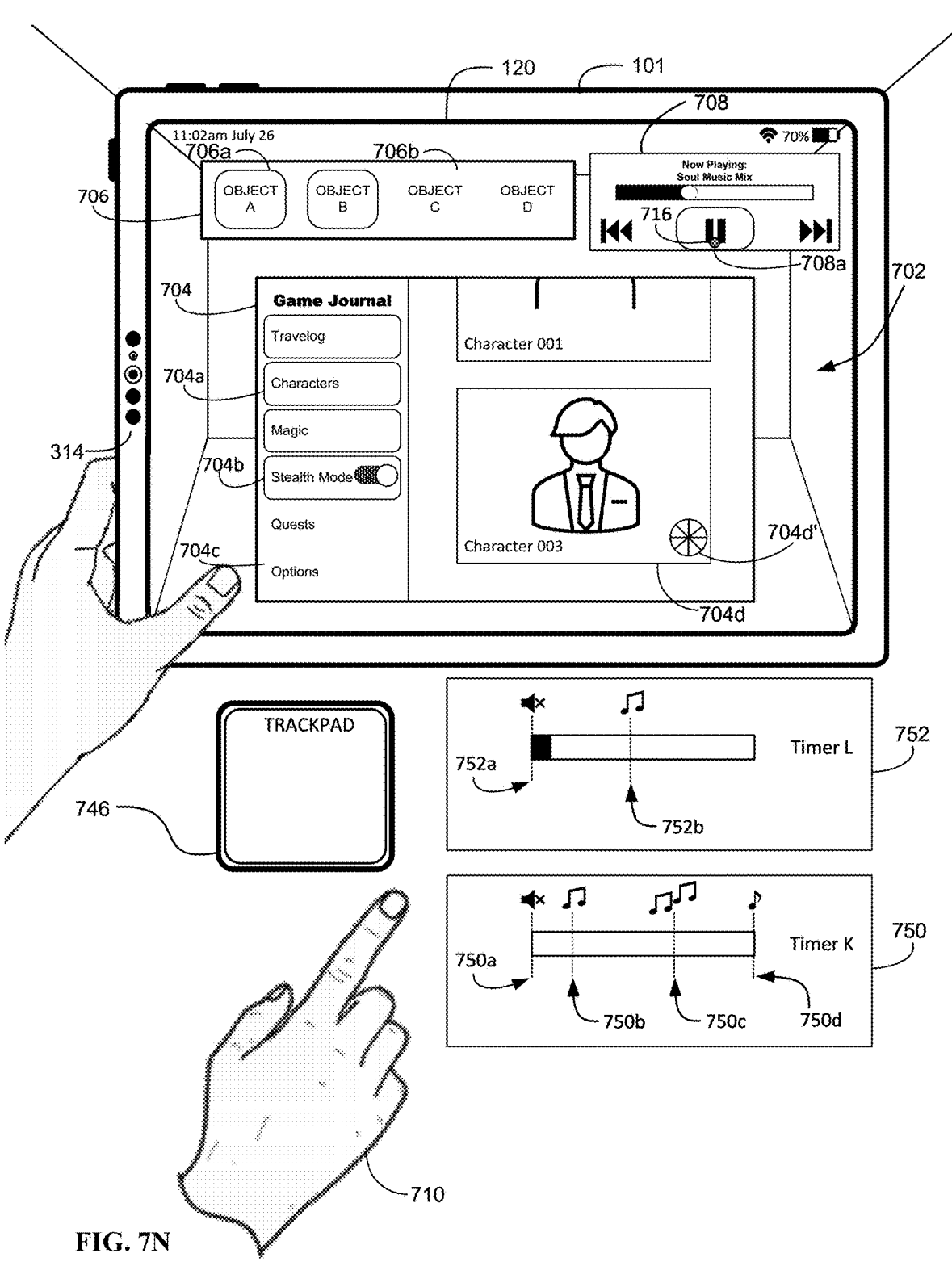
Figure 7O:
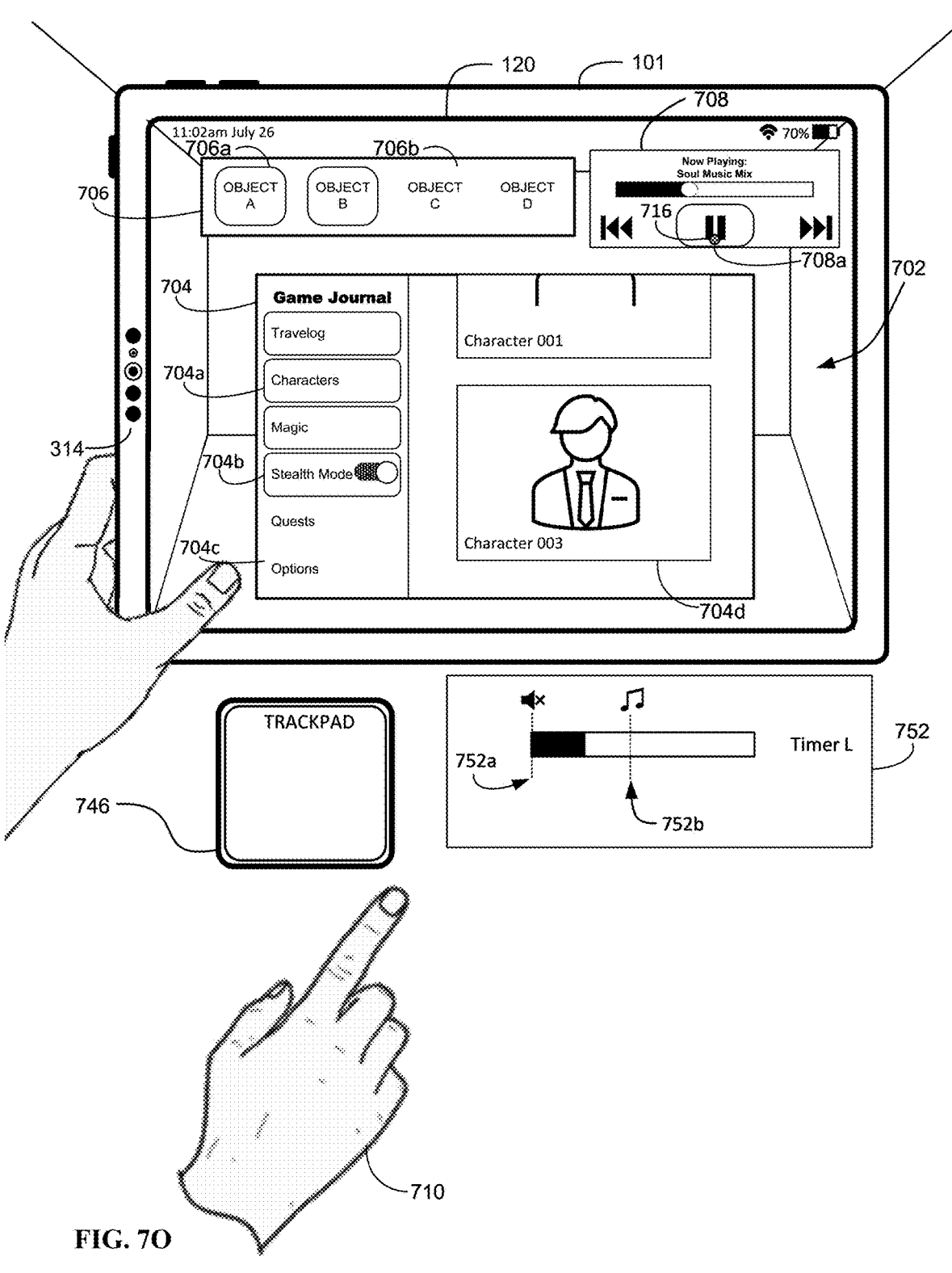
Figure 8E:
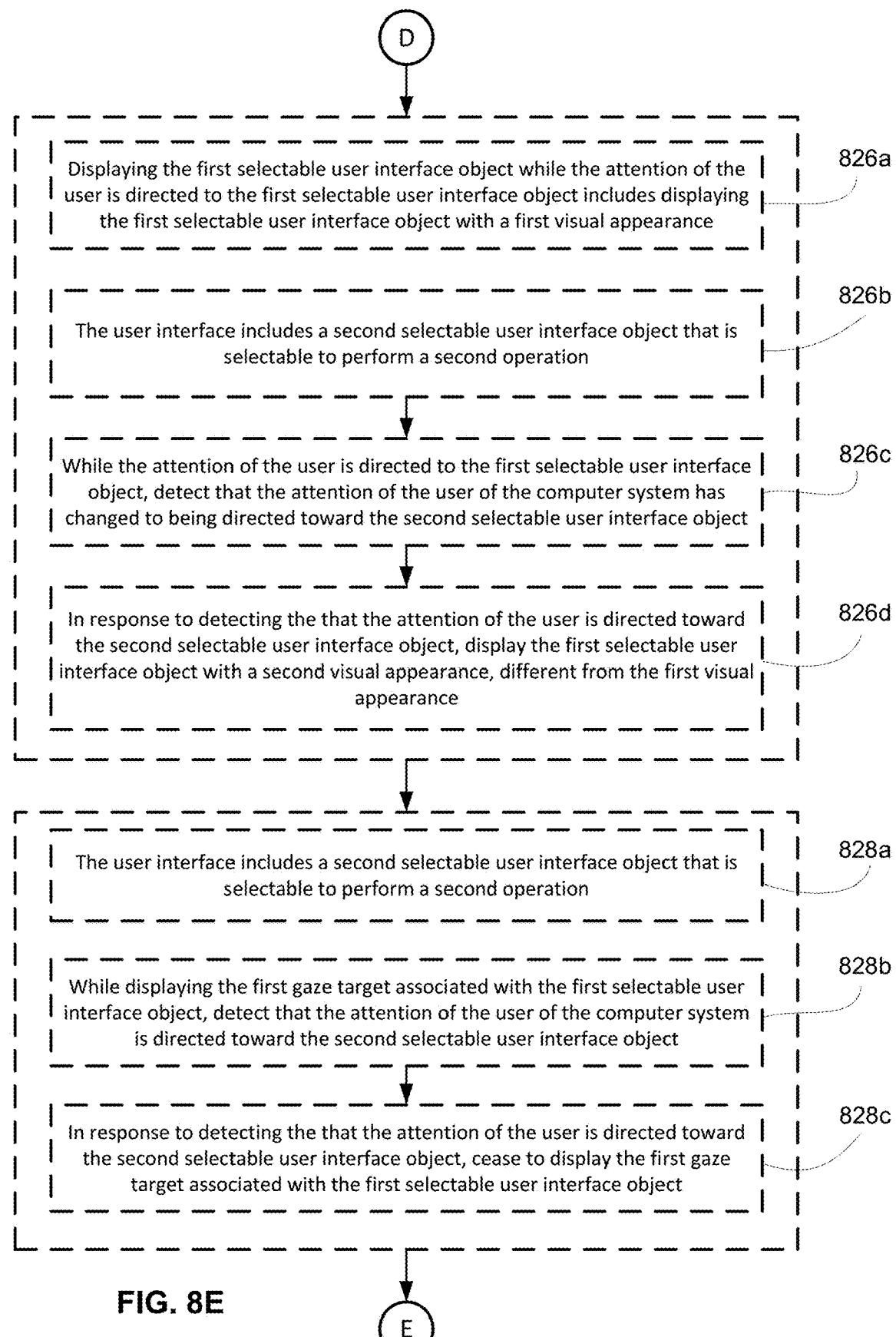
Figure 8I:
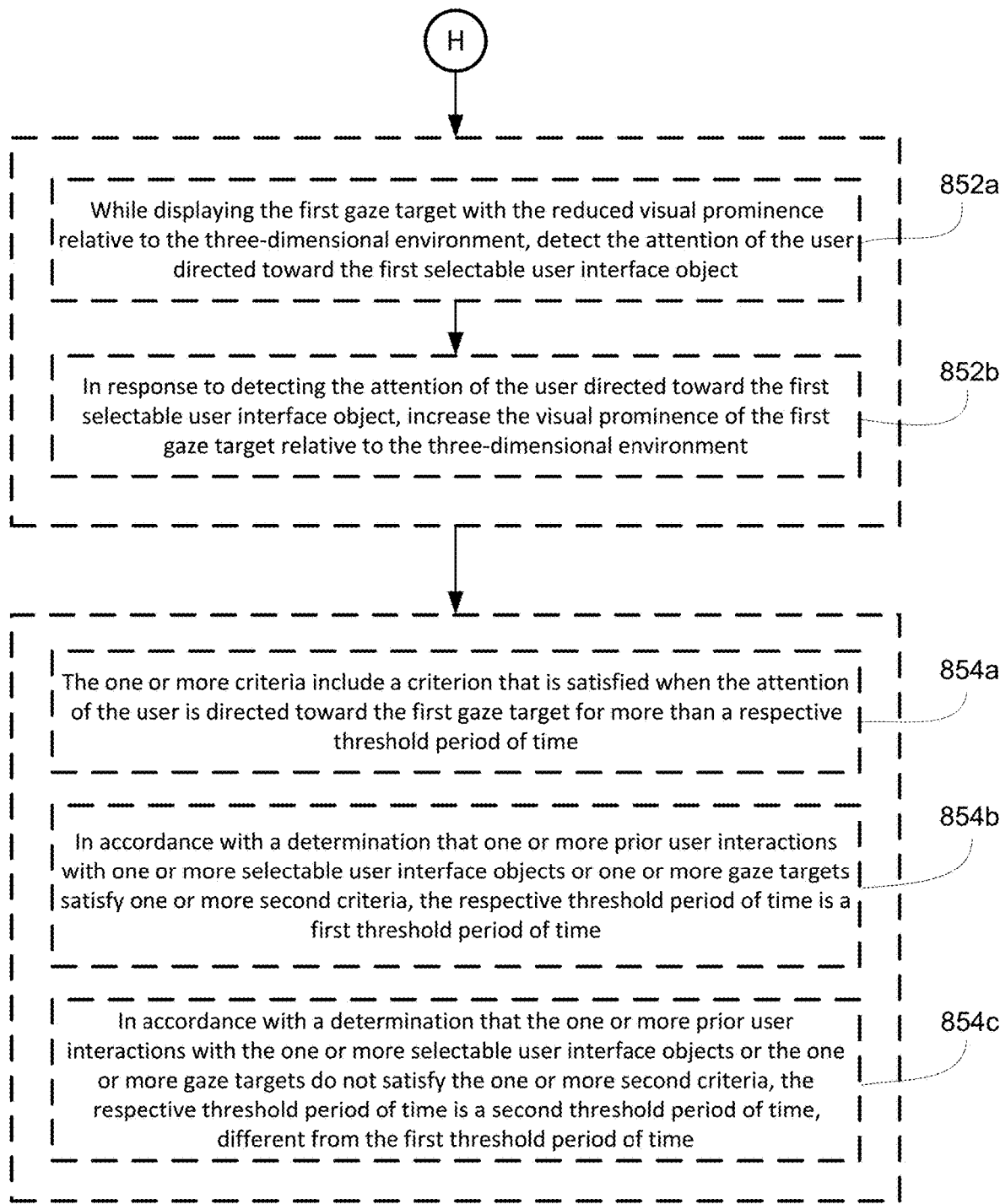
Figure 9D:
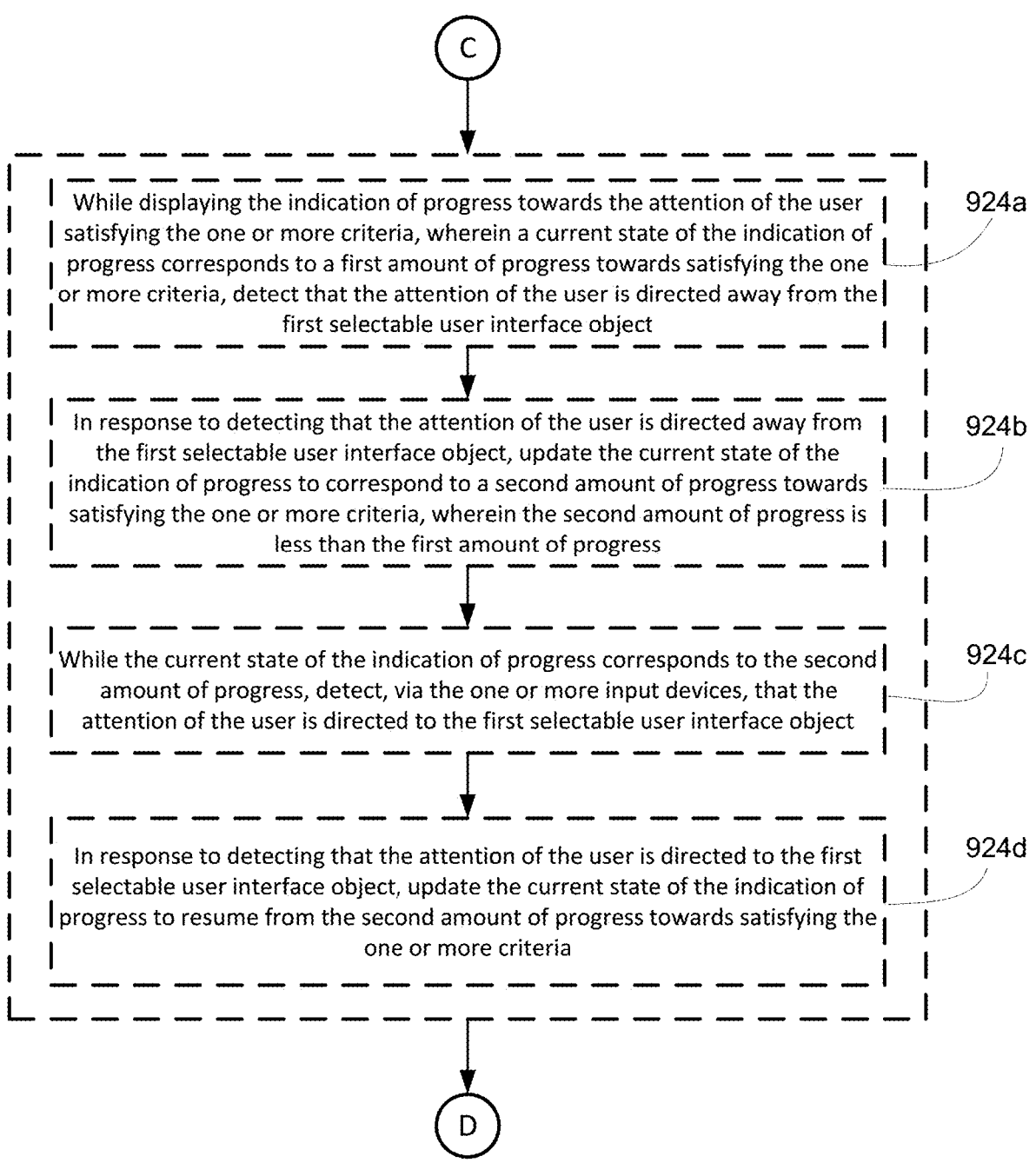
Figure 9E:
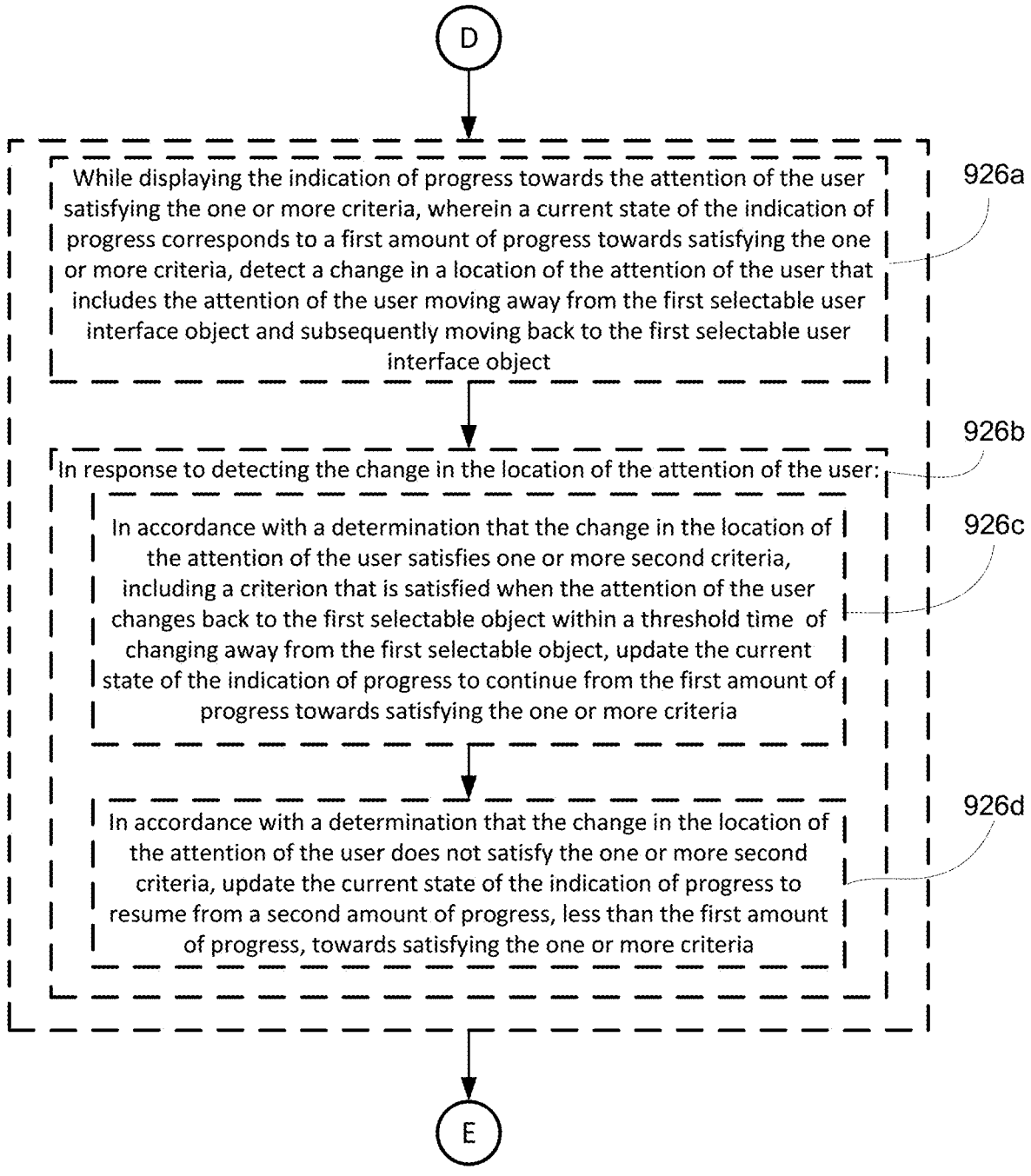
Figure 9G:
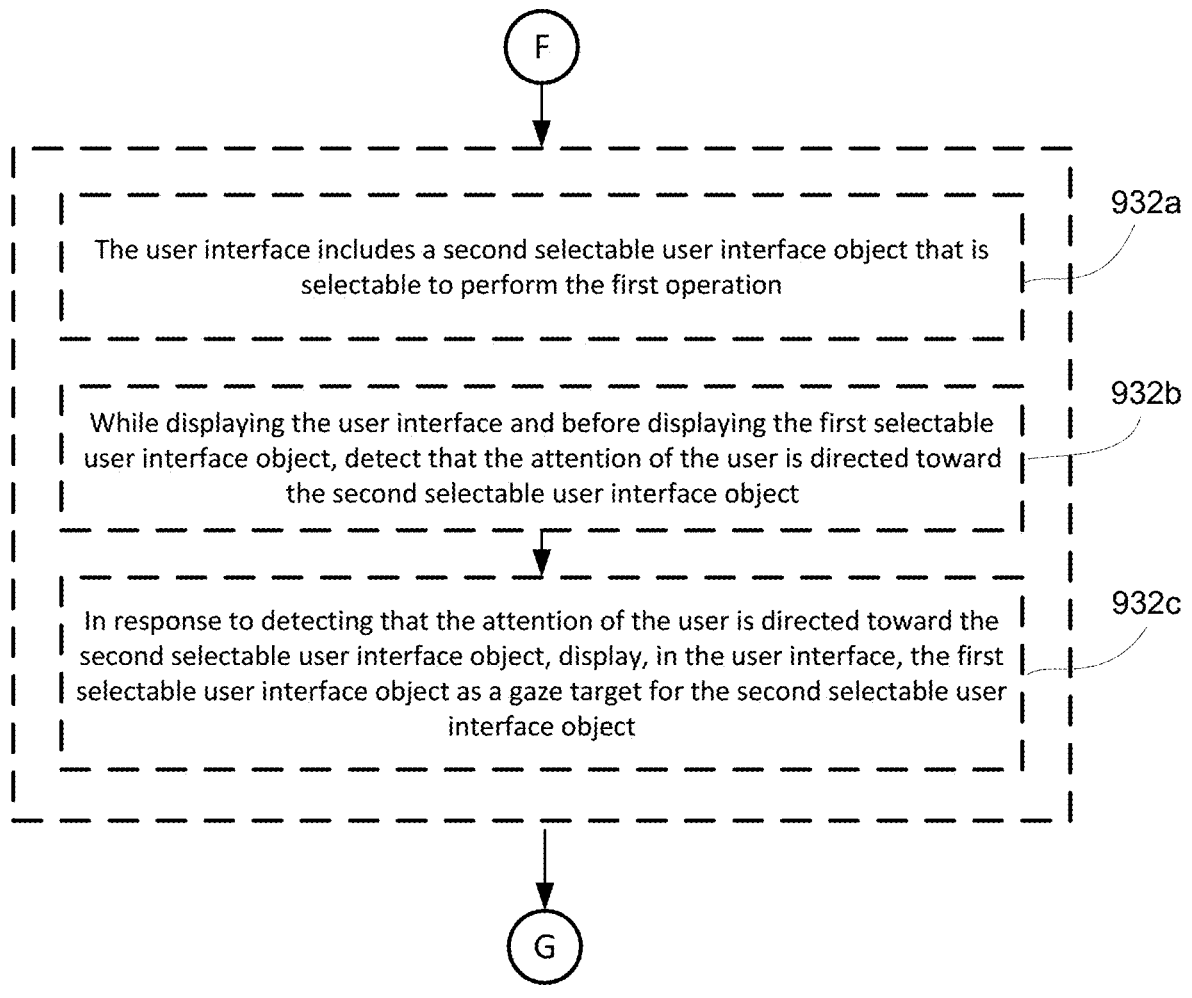
Figure 9I:
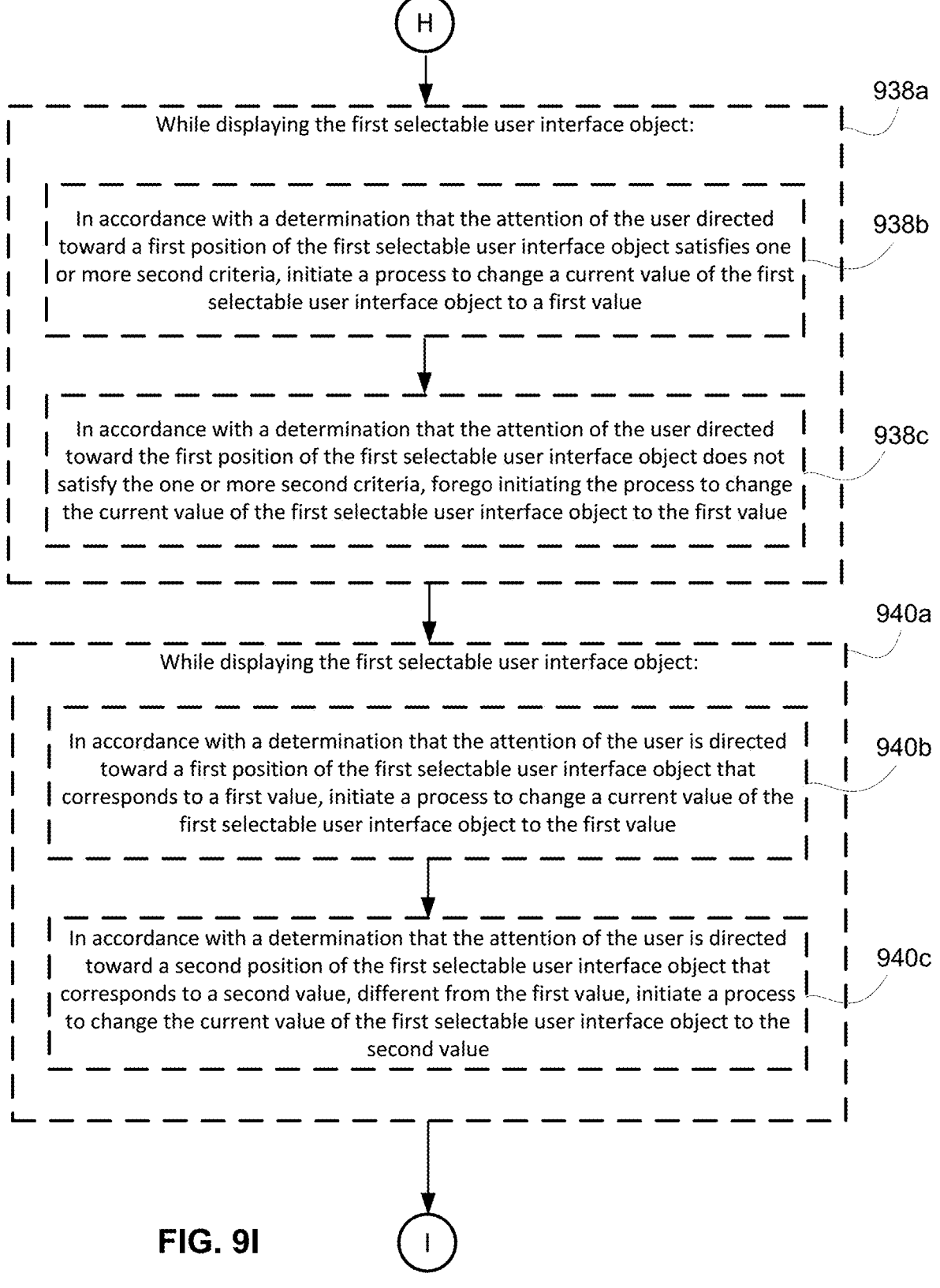
Figure 10E:
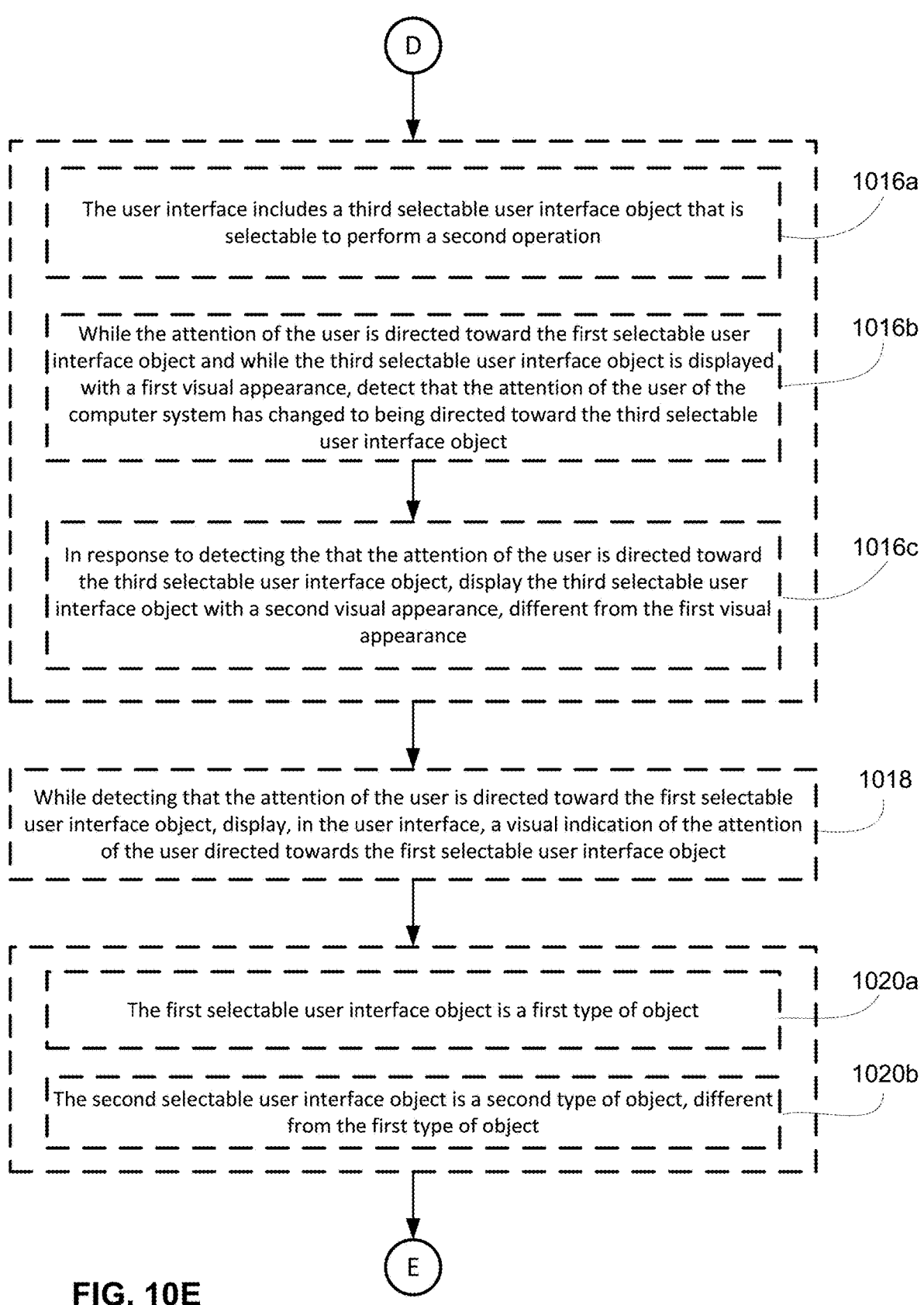
Figure 10F:
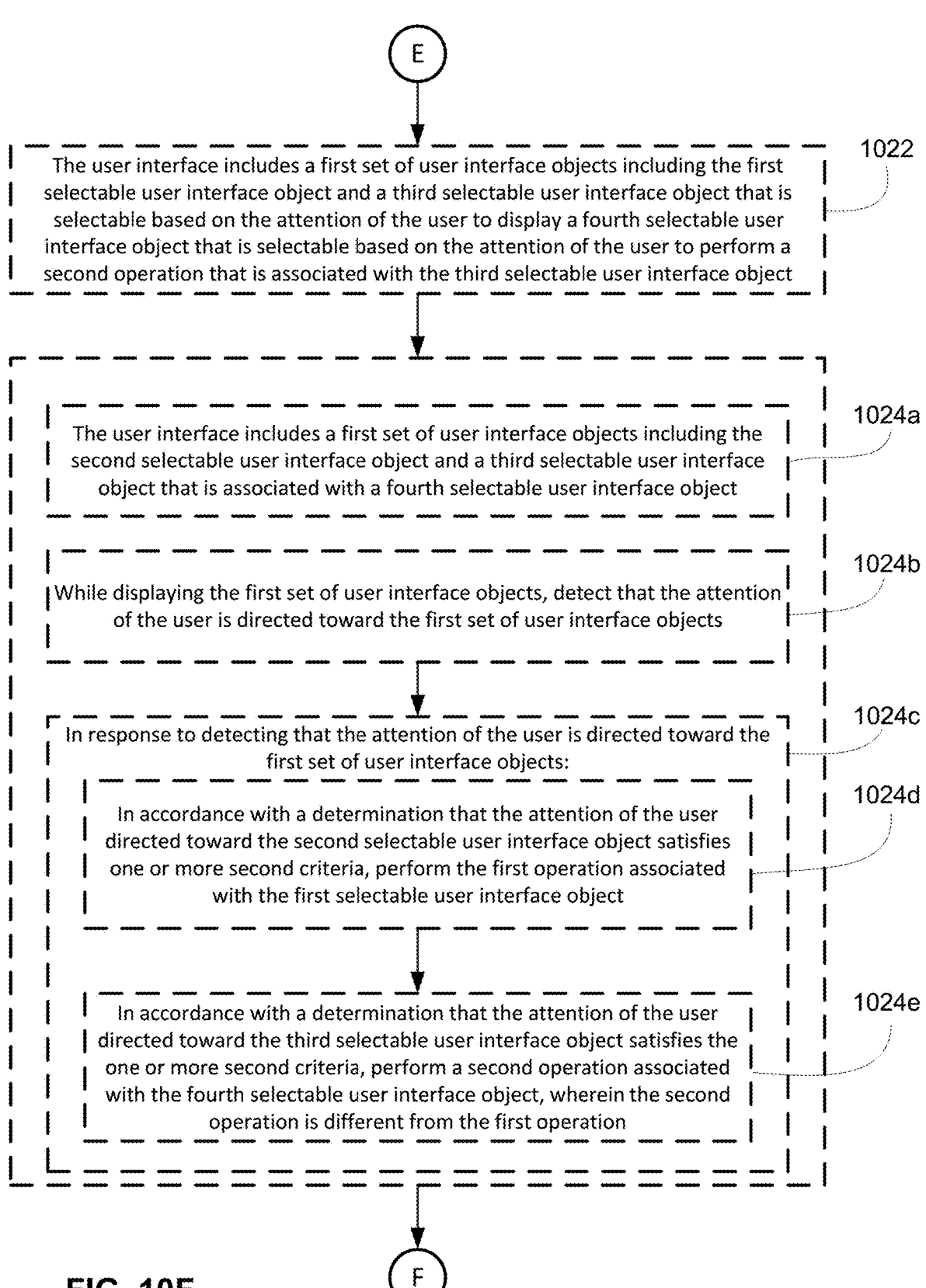

In some embodiments, while the attention of the user is directed to the first selectable user interface object, the computer system detects that the attention of the user of the computer system has changed to being directed toward the second selectable user interface object (826c), such as attention 716 from FIG. 7M to 7N. For example, the attention of the user changes away from the first selectable user interface object for a period of time greater than the first time threshold (e.g., described in step(s) 802), such that the attention of the user is directed to a region of the second selectable user interface (e.g., a region other than the region occupied by the first selectable user interface object) or the attention of the user is directed away from the user interface.

In some embodiments, in response to detecting the that the attention of the user is directed toward the second selectable user interface object, the computer system displays (826d) the first selectable user interface object with a second visual appearance, different from the first visual appearance, such as a changed visual appearance of object 704d from FIG. 7M to FIG. 7O. For example, the second visual appearance optionally includes a second size smaller (compact) than the first size of the first visual appearance. In some embodiments, displaying the first selectable user interface object with the second visual appearance includes collapsing the user interface container (e.g., described in step(s) 810, 832, 840, and 842) in response to detecting the that the attention of the user is directed toward the second selectable user interface object. In some embodiments, displaying the first selectable user interface object with the second visual appearance includes reverting the visual appearance of the first selectable user interface object to the appearance of the first selectable user interface object before the attention of the user was directed to the first selectable user interface object (e.g., the compact size that does not accommodate the information associated with the first selectable user interface object and/or the first gaze target as described with reference to step(s) 808 and 810). Selectively increasing or decreasing (e.g., expanding or collapsing) the size of the selectable user interface object in response to whether or not attention is directed toward the selectable user interface object provides improved feedback to the user without cluttering the user interface (e.g., by not always displaying an expanded selectable user interface object), which enhances operability of the computer system and reduces power usage of the computer system.

In some embodiments, the user interface includes a second selectable user interface object that is selectable to perform a second operation (828a), such as object 708a in FIG. 7M. In some embodiments, while displaying the first gaze target associated with the first selectable user interface object, such as target 704d' in FIG. 7M, the computer system detects (828b) that the attention of the user of the computer system is directed toward the second selectable user interface object, such as in FIG. 7O. For example, the attention of the user changes away from the first selectable user interface object for a period of time greater than the first time threshold (e.g., described in step(s) 802), such that the attention of the user is directed to a different region of the user interface (e.g., a region other than the first region occupied by the first selectable user interface object) or the attention of the user is directed away from the user interface.

In some embodiments, in response to detecting the that the attention of the user is directed toward the second selectable user interface object, the computer system ceases (828*c*) to display the first gaze target associated with the first selectable user interface object, such as ceasing display of 704*d'* in FIG. 7O. For example, the first gaze target is configured by the computer system to be optionally transient in that the computer system displays the first gaze target when the attention of the user is directed to the first gaze target and/or first selectable object, and ceases to display or reduces the visual prominence of the first gaze target when the attention of the user is directed toward the second selectable user interface object (e.g., away from the first selectable user interface object). Details related to changing the visual prominence of the first gaze target is described with reference to step(s) 850 and 852. Displaying or not displaying the first gaze target associated with the first selectable user interface object in response to whether or not attention is directed toward the first selectable user interface object provides improved feedback to the user without cluttering the user interface (e.g., by not always displaying the first gaze target), which enhances operability of the computer system and reduces power usage of the computer system.

In some embodiments, the user interface includes a second selectable user interface object that is selectable to perform a second operation (830*a*), such as the Character 001 object in FIG. 7I. In some embodiments, the computer system detects (830*b*) that the attention of the user of the computer system is directed toward the second selectable user interface object (e.g., described in step(s) 802), such as attention 716 between FIGS. 71 and 7J directed to the Character 001 object. In some embodiments, in response to detecting the that the attention of the user is directed toward the second selectable user interface object, the computer system displays (830*c*), in the user interface, a second gaze target that is associated with the second selectable user interface object, such as gaze target 704*e'* in FIG. 7J. In some embodiments, the computer system displays the second gaze target that is associated with the second selectable user interface object in accordance with a determination that the attention of the user is directed toward the second selectable user interface object for a period of time greater than the first time threshold described with reference to step(s) 802. For example the second gaze target is optionally consistent with, but not limited to the first gaze target described in step(s) 802. In some embodiments, as described with reference to step(s) 824, the first gaze target and the second gaze target have the same visual appearance. Displaying a gaze target for a second selectable user interface object, different from the first selectable user interface object provides confirmation that the user intends to interact with the second selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, the first selectable user interface object is displayed as being composed of a simulated material having a thickness (832) (e.g., a non-zero thickness), such as object 704*e* in FIG. 7J. In some embodiments, the computer system displays the first selectable user interface object having simulated three-dimensional depth or thickness. For example, the first selectable user interface object is optionally displayed on, against, and/or in front of the user interface, projecting into a forward projection. In some embodiments, the thickness of the simulated material optionally corresponds to a forward projection of the first selectable user interface object. In some embodiments, the first selectable user interface object is displayed as if composed of a simulated glass or other material.

In some embodiments, displaying the first gaze target includes displaying the first gaze target inset into a surface of the simulated material of the first selectable user interface object (832), such as target 704*e'* being inset into the surface of object 704*e* in FIG. 7J. For example, the first gaze target optionally appears etched into the (optionally front surface of the) first selectable user interface object (e.g., into a region of the forward projection of the first selectable user interface object). In some embodiments, the simulated material is transparent such that the first gaze target is viewed at different viewing angles. Displaying the first selectable user interface object as being composed of a simulated material having thickness conveys the relative placement and/or orientation of the first selectable user interface object to the user, thereby reducing errors in the interaction between the user and the computer system (e.g., avoiding unintentional activation or deactivation of selectable user interface objects due to unintentional gaze) and reducing inputs needed to correct such errors.

In some embodiments, while displaying the user interface that includes a scrollable region (e.g., a region that can be manipulated/scrolled), wherein the first selectable user interface object is included in the scrollable region, such as the right region of object 704 in FIG. 7J, the computer system detects (834*a*), via the one or more input devices, attention of the user directed to a first edge region of the scrollable region, such as if gaze 716 were directed to the top edge of the right region of object 704 in FIG. 7K. In some embodiments, in response to detecting the attention of the user directed to the first edge region, the computer system scrolls (834*b*) the scrollable region in accordance with the attention of the user being directed to the first edge region, including scrolling the first selectable user interface object from a first location to a second location in the user interface, such as the scrolling show in FIG. 7L. For example, the computer system detects the attention of the user directed to the first edge region (e.g., top, bottom, left, or right) of the scrollable region to scroll the first selectable user interface object within the user interface, and scrolls the first selectable user interface object accordingly. For example, if the computer system detects that the attention of the user is directed toward the top edge of the scrollable region, the first selectable user interface object including any other displayed user interface objects and/or content are moved upwards to optionally reveal user interface object and/or content from appearing from the bottom of the user interface that was not previously displayed before scrolling. In another example, if the computer system detects that the attention of the user is directed toward the bottom edge of the scrollable region, the first selectable user interface object including any other displayed user interface objects and/or content are moved downwards to optionally reveal user interface object and/or content from appearing from the top of the user interface that was not previously displayed before scrolling. In some embodiments, when the attention of the user is not directed to any edge including the first edge of the scrollable region, the computer system does not scroll the first selectable user interface object within the user interface. Scrolling the first selectable user interface object in response to detecting that the attention of the user is directed to an edge region of the scrollable region provides quick access to user interface objects without requiring the user to provide further inputs to navigate within the user interface, thereby reducing the number of inputs and providing more efficient interactions between the user and the computer system.

In some embodiments, the first gaze target associated with the first selectable user interface object is displayed when the attention of the user is detected as being directed to the first edge region of the scrollable region (836*a*), such as displaying target 704*e*' in FIG. 7K. In some embodiments, while scrolling the scrollable region, the computer system ceases to display the first gaze target associated with the first selectable user interface object (836*b*), such as ceasing to display target 704*e*' in FIG. 7L. Optionally independent of whether or not the first gaze target reaches a boundary of the user interface such that continued scrolling causes the first gaze target to be scrolled off the user interface, the computer system ceases to display the first gaze target. In some embodiments, while scrolling, the computer system reduces the visual prominence of the first gaze target before ceasing to display the first gaze target. In some embodiments, if the computer system detects a stop to scrolling the scrollable region, the computer system displays the first gaze target in a manner consistent with, but not limited to the description in step(s) 850 and 852. Details related to changing the visual prominence of the first gaze target is described with reference to step(s) 850 and 852. Ceasing to display the first gaze target associated with the first selectable user interface object in response to scrolling provides improved feedback to the user without cluttering the user interface (e.g., by not always displaying the first gaze target), which enhances operability of the computer system and reduces power usage of the computer system.

In some embodiments, while displaying the user interface that includes a scrollable region, such as the right region of object 704 in FIG. 7K, the computer system detects (838*a*), via the one or more input devices, a first input directed to the scrollable region, wherein the first input includes a respective gesture performed by a respective portion of a body of the user of the computer system corresponding to a request to scroll the scrollable region, such as the input from hand 710 in FIG. 7K. In some embodiments, in response to detecting the first input, the computer system scrolls (838*b*) the scrollable region in accordance with the first input, including scrolling the first selectable user interface object from a first location to a second location, different from the first location, in the user interface, such as the scrolling show in FIG. 7L. In some embodiments, the first input from the user includes an air pinch gesture performed by a hand of the user while the attention of the user is directed to the first edge region of the scrollable region in which the index finger of the user and the thumb of the user come together and touch, followed by movement of the hand in the pinch hand shape in a direction and/or with a magnitude. The computer system optionally scrolls the first selectable user interface object within the user interface with a magnitude and/or direction corresponding to the movement of the hand of the user (e.g., scrolls the first selectable user interface object upward if the hand moves upward, and scrolls the first selectable user interface object downward if the hand moves downward). The first input from the user optionally includes other types of inputs, such as trackpad inputs (e.g., finger touching the trackpad and moving in a direction and/or with a magnitude) or an input device input (e.g., movement of a hand held input device that detects direction and/or magnitude of movement of the input device while it is being held in the hand of the user). Scrolling the first selectable user interface object in response to detecting the first input while the attention of the user is directed to an edge region of the scrollable region provides quick access to user interface objects without requiring the user to provide further inputs to navigate within the user interface, thereby reducing the number of inputs and providing more efficient interactions between the user and the computer system.

In some embodiments, displaying the first selectable user interface object includes displaying the first selectable user interface object as a first element in the user interface (840*a*), such as object 706*b* in FIG. 7C. In some embodiments, displaying the first gaze target includes displaying the first gaze target as a second element, outside of the first element, in the user interface (840*b*), such as shown with target 706*b*' in FIG. 7C. For example, the user interface includes the first selectable user interface object and the first gaze target, also referred to as a first element and a second element, respectively separated by visible or an invisible border. In some embodiments, because the first selectable user interface object is a first type of object (e.g., photo or video) as described in method 1200, the first selectable user interface object fills up the usable area up to the border. Thus, in some embodiments, the first gaze target is displayed outside the first selectable user interface object in an adjacent region to the first selectable user interface object consistent with, but not limited to, the first and second regions described in step(s) 810. Displaying the gaze target outside of the first selectable user interface object provides a more efficient use of display space, thereby reducing errors in the interaction between the user and the computer system (e.g., avoiding unintentional activation or deactivation of selectable user interface objects due to unintentional gaze) and reducing inputs needed to correct such errors.

In some embodiments, displaying the first selectable user interface object includes displaying the first selectable user interface object as a first element in the user interface (842*a*), such as object 704*a* in FIG. 7C. In some embodiments, displaying the first gaze target includes displaying the first gaze target within the first element in the user interface (842*b*), such as target 704*a*' in FIG. 7C. For example, the first gaze target is displayed within the first selectable user interface object, also referred to as a first element. In some embodiments, while displaying the first gaze target within the first element, the user interface includes a user interface container (e.g., box) and is configured to display the first gaze target and the first selectable user interface object within a visible or an invisible border of the user interface container. In some embodiments, the first gaze target is displayed in a first region of the user interface container and the first selectable user interface object is displayed in a second region of the user interface container consistent, but not limited to the first and second regions described in step(s) 810. In some embodiments, the first gaze target is displayed on, over, and/or overlaid on the first selectable user interface object and/or a surface of the first selectable user interface object. Displaying the gaze target within the first selectable user interface object provides a more efficient use of display space, thereby reducing errors in the interaction between the user and the computer system (e.g., avoiding unintentional activation or deactivation of selectable user interface objects due to unintentional gaze) and reducing inputs needed to correct such errors.

In some embodiments, while detecting the attention of the user directed toward the first gaze target, the computer system outputs first feedback that is based on the attention of the user directed to the first gaze target (844), such as described with reference to timer 714 in FIG. 7C. For example, the first feedback includes any combination of the sound output including the sound characteristics as described in step(s) 816, 818, and method 900. Providing the audio output in accordance with the determination that the attention of the user is directed toward the first gaze target enhances user interactions with the computer system by providing improved feedback to users and reducing the likelihood of errors in the interaction between the user and the computer system.

In some embodiments, outputting the first feedback includes outputting feedback that has a respective characteristic that changes based on a progress of the attention of the user towards satisfying the one or more criteria (846), such as the audio characteristics changing as timer 714 in FIG. 7C elapses. In some embodiments, while outputting the first feedback with the respective characteristic, the computer system detects a duration of the attention of the user directed toward the first gaze target changing from a first attention duration to a second attention duration and in response to detecting the attention of the user directed toward the first gaze target changing from a first attention duration to a second attention duration, the computer system outputs the first feedback indicator having a changed respective characteristic corresponding to the duration of the attention of the user directed toward satisfying the one or more criteria described in step(s) 802. For example, the sounds characteristics optionally corresponds to the progress of the attention of the user made towards satisfying the one or more criteria (e.g., volume increases as progress increases, pitch is higher as progress increases, and/or melody/tone increases as progress increases, or alternatively, the volume, pitch, and/or melody/tone decreases when the computer system detects the attention of the user moving away from the first gaze target and thus, ceasing progress of the attention of the user towards satisfying the one or more criteria). Providing changing audio output in accordance with the progress of the attention of the user satisfying the one or more criteria provides improved feedback to users and allows the computer system to convey to users their progress of satisfying the one or more criteria in order to perform the operation associated with first selectable user interface object.

In some embodiments, while outputting the first feedback, in accordance with a determination that the attention of the user directed toward the first gaze target satisfies the one or more criteria, the computer system outputs (848) second feedback that indicates that the one or more criteria are satisfied, such as the audio output when timer 714 reaches threshold 714d or when timer 740 reaches threshold 734d in FIG. 7I. For example, the second feedback includes a sound output such as one or more tones (e.g., the sound "ding" or "beep") or a chord in a melody. In some embodiments, the second feedback is consistent with the first audio feedback described in method 900. In some embodiments, the second feedback is different from the first audio feedback described in step(s) 846 such that second feedback includes one or more distinct sound characteristics (e.g., different pitch or reverberating sound). Providing the second feedback in accordance with the determination that the attention of the user directed toward the first gaze target satisfies the one or more criteria to initiate the first operation associated with the first selectable user interface object enhances user interactions with the computer system by providing improved feedback to users and reducing the likelihood of errors in the interaction between the user and the computer system.

In some embodiments, while displaying the first gaze target, the computer system detects (850a) that the attention of the user is directed away from the first selectable user interface object, such as attention 716 moving away from object 704d from FIG. 7M to FIG. 7O. In some embodiments, in response to detecting that the attention of the user is directed away from the first selectable user interface object, in accordance with a determination that the attention of the user satisfies one or more second criteria, the computer system reduces (850b) a visual prominence of the first gaze target relative to the three-dimensional environment, such as shown with gaze target 704d' from FIG. 7M to FIG. 7O. In some embodiments, the one or more second criteria includes a criterion that is satisfied when the attention of the user is not directed to the first gaze target. In some embodiments, reducing the visual prominence of the first gaze target relative to the three-dimensional environment includes a gradual changing degree of visibility (e.g., reduced opacity, increased transparency, decreased brightness, decreased color saturation, and/or increased blurring) until the appearance of the first gaze target ceases to be displayed in the user interface.

In some embodiments, in accordance with a determination that the attention of the user does not satisfy the one or more second criteria, the computer system forgoes (850b) reducing the visual prominence of the first gaze target relative to the three-dimensional environment. In some embodiments, foregoing reducing the visual prominence of the first gaze target relative to the three-dimensional environment includes maintaining the visual appearance of the first gaze target at the appearance of the first gaze target when the attention of the user was directed away from the first selectable user interface object. Reducing the visual prominence of the first gaze target associated with the first selectable user interface object in response detecting that the attention is directed away from the first selectable user interface object provides confirmation that the user no longer intends to interact with the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while displaying the first gaze target with the reduced visual prominence relative to the three-dimensional environment, the computer system detects (852a) the attention of the user directed toward the first selectable user interface object, such as detecting attention 716 moving back to target 704a' from FIG. 7E to FIG. 7F. In some embodiments, in response to detecting the attention of the user directed toward the first selectable user interface object, the computer system increases (852b) the visual prominence of the first gaze target relative to the three-dimensional environment, such as increasing the prominence of target 704a' in FIG. 7F. In some embodiments, when the computer system detects that the attention of the user has changed away from the first selectable user interface and has returned to the first selectable user interface object less than the first threshold period of time, the computer stops reducing the visual prominence of the first gaze target relative to the three-dimensional environment as described in step(s) 852, and increases the visual prominence of the first gaze target relative to the three-dimensional environment by reversing the changing degree of visibility (e.g., increased opacity, decreased transparency, increased brightness, increased color saturation, and/or decreased blurring) until the appearance of the first gaze is the same appearance of the first gaze target before the attention of the user was directed away from the first selectable user interface object. In this case, the computer system optionally displays the first gaze target in accordance with some embodiments described with reference to step(s) 808, 816, and/or method 900. Stopping the transitioning of the visual appearance of the user interface object in response detecting that the attention has returned to the first selectable user interface object after being directed away from the first selectable user interface object provides confirmation that the user does intend to interact with the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, the one or more criteria include a criterion that is satisfied when the attention of the user is directed toward the first gaze target for more than a respective threshold period of time (854*a*), such as threshold 712*b* in FIG. 7C. In some embodiments, the respective threshold period of time is the second time threshold described in step(s) 802. In some embodiments, the respective time threshold varies based on prior user interactions with one or more selectable user interface objects.

In some embodiments, in accordance with a determination that one or more prior user interactions with one or more selectable user interface objects or one or more gaze targets satisfy one or more second criteria, the respective threshold period of time is a first threshold period of time (854*b*), such as threshold 732*b'* in FIG. 7F. In some embodiments, the one or more second criteria include a criterion that is satisfied when the one or more prior interactions with the one or more selectable user interface objects correspond to attention-only interactions happening recently (e.g., in the past 5, 10, 15, 20, 30, 40, 50, or 60 minutes). Thus, the respective threshold period of time required by the computer system in order to initiate an operation is optionally shortened to the first threshold period of time.

In some embodiments, in accordance with a determination that the one or more prior user interactions with the one or more selectable user interface objects or the one or more gaze targets do not satisfy the one or more second criteria, the respective threshold period of time is a second threshold period of time, different from the first threshold period of time (854*c*), such as threshold 738*b* in FIGS. 7G and 7G1. For example, the respective threshold period of time required by the computer system in order to initiate an operation is optionally lengthened to the second threshold period of time. (e.g., greater than the first threshold period of time) in accordance with a determination that the one or more prior interactions with the one or more selectable user interface object correspond to a combination of user input from a portion of the user (e.g., described in step(s) 802, 812, and 838, such as hand air pinch inputs) and attention input interactions or user input (from the portion of the user)-only interactions happening recently (e.g., in the past 5, 10, 15, 20, 30, 40, 50, or 60 minutes). Adjusting the time required to perform operations in response to the type of user interactions happening facilitates more efficient attention-based interactions more quickly (e.g., the computer system does not require an original, default period of time before performing an operation), thereby providing more efficient interactions between the user and the computer system.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9J is a flowchart illustrating an exemplary method 900 of displaying a gaze virtual object that is selectable, based on attention directed to the gaze virtual object, to perform an operation associated with a selectable virtual object in accordance with some embodiments. In some embodiments, the method 900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, the method 900 is performed at a computer system in communication with a display generation component and one or more input devices. For example, the computer system includes devices described with reference to method 800. In some embodiments, the display generation component includes a display as described with reference to method 800. In some embodiments, the one or more input devices have one or more of the characteristics of the one or more input devices described with reference to method 800.

In some embodiments, the computer system displays (902*a*), via the display generation component, a user interface that includes a first selectable user interface object that is selectable to perform a first operation, such as target 704*a'* in FIG. 7C. In some embodiments, the user interface is displayed in a three-dimensional environment described with reference to method 800. In some embodiments, the user interface is a user interface described with reference to method 800. In some embodiments, the first selectable user interface object corresponds to the first selectable user interface object described in method 800. In some embodiments, the first selectable user interface object corresponds to the first gaze target or other gaze target for a parent selectable object, such as described in method 800. In some embodiments, the first operation is associated with the first selectable user interface object (e.g., the first selectable user interface object is not a gaze target, and the first operation would be performed by the computer system if the computer system were to detect a non-attention-based selection of the first selectable user interface object, such as selection via a pinch air gesture in which attention of the user is directed to the first selectable user interface object while a hand of the user performs a pinch air gesture that includes the tips of the thumb and index fingers of the hand coming together and touching). In some embodiments, the first operation is associated with a user interface object other than the first selectable user interface object. For example, if the first selectable user interface object corresponds to a gaze target described in method 800, the first selectable user interface object is optionally configured to initiate a process to perform a first operation associated with the parent object of the first selectable user interface object (e.g., the parent object of the first selectable user interface object is not a gaze target, and the first operation would be performed by the computer system if the computer system were to detect a non-attention-based selection of the parent object, such as the above-described selection via a pinch air gesture).

In some embodiments, while displaying the user interface, the computer system detects (902b) via the one or more input devices, that attention of a user of the computer system is directed toward the first selectable user interface object, such as attention 716 to target 704a' in FIG. 7C. In some embodiments, the gaze tracking device optionally captures one or more images of the user's eyes and detects the pupils and glints in the one or more captured images to track the user's gaze, as described in more detail with reference to FIG. 6. In some embodiments, the attention of the user changes to a location (or portion) of the user interface that includes the first selectable user interface object. In some embodiments, the user interface includes a visual representation (indication) of the user's gaze as described with reference to methods 1200 and 2000.

In some embodiments, while detecting that the attention of the user is directed toward the first selectable user interface object, the computer system displays (902c), in the user interface, a visual indication of progress towards the attention of the user (directed toward the first selectable user interface object) satisfying one or more criteria for activating the first selectable user interface object to perform the first operation based on attention of the user, such as the visual fill of target 704a' from FIG. 7C to FIG. 7D. In some embodiments, in response to detecting the gaze of the user is directed toward the first selectable user interface object for a first period of time greater than a first time threshold (e.g., 0.02, 0.05, 0.1, 0.2, 0.25, 0.3, 0.5, 1, 2, 3, or 5 seconds), the computer system displays, in the user interface, a gaze target that provides the visual indication of progress towards the gaze of the user directed toward the first selectable user interface object and/or the gaze target. In some embodiments, the gaze target corresponds to the first gaze target described in method 800. In some embodiments, if the gaze of the user is directed toward a location (or portion) of the user interface that does not include the first selectable user interface object, the computer system does not display (or ceases to display) the gaze target and/or the visual indication of the progress towards the gaze of the user satisfying the one or more criteria. In some embodiments, the gaze target has one or more of the details described with reference to method 800. In some embodiments, the computer system displays the gaze target and/or the first selectable user interface object with a first visual appearance and/or a first sound effect that is changed according to the progress towards the gaze of the user satisfying the one or more criteria, as will be described in more detail below. In some embodiments, the one or more criteria include a criterion that is satisfied when a duration of the user's gaze being directed toward the gaze target and/or the first selectable user interface object is greater than a second time threshold (e.g., 0.1, 0.5, 1, 2, 3, 5, 7, 10, 20, 30, or 60 seconds). In some embodiments, the first operation associated with the first selectable user interface object is performed in response to activating the first selectable user interface object, and includes displaying content, a user interface, playing multimedia, launching an application, providing a menu, installing a program, and/or downloading content. Displaying a selectable user interface object that provides an indication of progress towards the attention of the user satisfying one or more criteria for activating the first selectable user interface object to perform the first operation provides feedback about selection status for the selectable user interface object, and is a manner of requiring confirmation that the user intends to interact with the selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while detecting the attention of the user directed to the first selectable user interface object, the computer system displays (904) a visual indication of the attention of the user in an area corresponding to the first selectable user interface object, such as the interior of target 704a' in FIG. 7D, wherein the visual indication of the attention of the user was not displayed in the area corresponding to the first selectable user interface object before the attention of the user was directed toward the first selectable user interface object. In some embodiments, the visual indication of the attention of the user in the area corresponding to the first selectable user interface object is based on a direction of the gaze of the user and/or the area corresponding to the first selectable user interface as described in more detail with reference to method 1200. In some embodiments, when the computer system detects the attention of the user is directed to a top right area of the first selectable user interface object is displayed, the computer system displays the visual indication of the user in the area corresponding to the first selectable user interface object (e.g., top right area of the first selectable user interface object). In some embodiments, before detecting that the attention of the user is directed to the first selectable user interface object, the visual indication of the attention of the user was not displayed in the area corresponding to the first selectable user interface object. Displaying a visual indication of the attention of the user in the area corresponding to the first selectable user interface object in response to detecting the attention of the user directed to the first selectable user interface object provides an efficient way of providing feedback to the user that the user is interacting with the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, the visual indication of the attention of the user includes a virtual lighting effect applied to at least one portion of the first selectable user interface object (906), such as shown in FIG. 11. In some embodiments, the visual indication of the attention of the user optionally has one or more of the characteristics of the visual indication described with reference to method 1200. For example, applying the virtual lighting effect to the at least one portion of the first selectable user interface object includes applying a static or animated visual effect such as applying a glowing, shimmering, or a different texture or tint to the at least one portion of the first selectable user interface object, while another portion of the first selectable user interface object does not have the visual effect applied to it, thereby emphasizing the one portion. In some embodiments, the one or more characteristics of the visual indication is based on movement of the attention of the user within and/or around the first selectable user interface and/or the size of the first selectable user interface object as described with reference to method 1200. Applying virtual lighting effects to visually distinguish portions of the first selectable user interface object from other portions of the first selectable user interface object clearly and precisely indicates where the attention of the user is directed thereby, reducing errors in the interaction with the computer system.

In some embodiments, displaying the visual indication of the attention of the user in the area corresponding to the first selectable user interface object includes displaying the visual indication of the attention of the user with a first visual intensity at a first position in the visual indication of the attention of the user, and displaying the visual indication of the attention of the user with a second visual intensity, different from the first visual intensity, at a second position in the visual indication of the attention of the user, wherein the first position and the second position are different distances from a center of the visual indication of the attention of the user (908), such as shown in FIG. 11. For example, the second position is closer to the center of the visual indication than the first position and the visual indication of the attention of the user having the second visual intensity is displayed with a second degree of coloring (e.g., darker, brighter, and/or more opaque) than the first portion of the visual indication of the attention of the user having the first visual intensity. One or more other visual characteristics of the visual indication of the attention of the user are described with reference to method 1200. Displaying a visual indication of the attention of the user that changes in visual intensity based on the center of gaze clearly and precisely indicates where the center of gaze is directed, thereby reducing errors in the interaction with the computer system.

In some embodiments, displaying the visual indication of progress includes displaying the visual indication of progress in an area surrounding a virtual object (910), such as if the indication of progress of target 704a' were displayed surrounding target 704a' in FIG. 7D (e.g., the first selectable user interface object). For example, the visual indication of progress is optionally a relatively small circular virtual object having a filled portion and an unfilled portion. The filled portion optionally expands (e.g., grows) outwardly (toward the outside edge of the circle) in response to continued gaze towards satisfying the one or more criteria as described with reference to step(s) 902. The visual indication of progress optionally includes a similar appearance to the gaze target described with reference to method 800. In some embodiments, the virtual object refers to the first selectable user interface object and the visual indication of progress appears as a ring surrounding the first selectable user interface object. For example, the ring optionally includes a filled portion and an unfilled portion, wherein the filled portion is representative of the progress of the continued gaze towards satisfying the one or more criteria and the filled portion expands around a perimeter of the ring in a clockwise direction as the progress towards satisfying the one or more criteria continues. Displaying the visual indication as a circular virtual element optionally surrounding the first selectable user interface object provides a more efficient use of display space without having to move other user interface objects to make room for displaying the visual indication, thereby conserves power.

In some embodiments, displaying the visual indication of progress includes displaying a filling of a virtual object corresponding to the progress of the attention of the user towards satisfying the one or more criteria (912) (e.g., as described in step(s) 910), such as shown with target 704a' in FIG. 7D. In some embodiments, displaying the visual indication of progress includes applying colors, hues, textures and/or a text indicator indicative of a current amount of progress towards satisfying the one or more criteria. For example, as described in step(s) 910, the visual indication of progress optionally appears as a relatively small circular virtual object having a filled portion and an unfilled portion. The filled portion optionally displayed in a first color or pattern that expands outwardly (toward the outside edge of the circle) in response to continued gaze towards satisfying the one or more criteria as described with reference to step(s) 902. In some embodiments, the computer system displays other shapes such as bar shape or other graphical element capable of visually conveying the progression of the attention of the user other than the circular virtual object described herein. Providing visually distinct parts such as a filled portion and an unfilled portion allows the computer system to convey to the user progressive measures of the attention of the user satisfying the one or more criteria without occupying additional portions of the user interface.

In some embodiments, while detecting that the attention of the user is directed toward the first selectable user interface object, the computer system outputs (914) a first audio feedback indicative of a progress of the attention of the user towards satisfying the one or more criteria for activating the first selectable user interface object, such as described with reference to timer 734 from FIGS. 7C to 7D. In some embodiments, while detecting that the attention of the user is directed toward the first selectable user interface object, the computer system displays the visual indication of progress and/or outputs first audio feedback (e.g., sound output) with characteristics that change (e.g., volume and/or pitch described with reference to step(s) 916 and 918) with the duration of attention directed to the first selectable user interface object toward satisfying the one or more criteria for activating the first selectable user interface object. In some embodiments, if the attention of the user is not directed toward the first selectable user interface object, the computer system does not output the first audio feedback indicative of the progress of the attention of the user towards satisfying the one or more criteria for activating the first selectable user interface object. In some embodiments, the first audio feedback including the characteristics are based on the type of user interface object. For example, if the user interface object is a music album or a music video as determined by information (e.g., metadata) associated with the user interface object, the computer system outputs audio feedback to correspond to the music album (e.g., bright tone indicating a pop album or a darker tone indicating a metal album) or the computer system outputs audio feedback that includes a snippet of the first selectable user interface object. Providing audio feedback in accordance with the duration of the attention of the user directed toward the first selectable user interface object toward satisfying the one or more criteria for activating the first selectable user interface object enhances user interactions with the computer system by providing improved feedback to users and reducing the likelihood of errors in the interaction between the user and the computer system.

In some embodiments, outputting the first audio feedback includes changing a respective characteristic of the first audio feedback including volume that changes based on the progress of the attention of the user towards satisfying the one or more criteria (916), such as the volume changing as timer 734 in FIGS. 7C to 7D progresses. For example, the volume output optionally corresponds to a duration of the attention of the user directed toward the first selectable user interface object. For example, the volume increases as the duration of the attention of the user directed toward the first selectable user interface object increases (e.g., length of time the attention of the user is directed toward the first selectable user interface object). In some embodiments, the volume corresponds to the displayed filling of the virtual object as described in step(s) 912. For example, the volume increases as the virtual object fills. In some embodiments, while outputting the first audio feedback, the computer system detects that the attention of the user is directed away from the first selectable user interface object and in response, the computer system ceases to output the first audio feedback and/or reduces the volume of the first audio feedback. Adjusting the volume of the audio feedback in accordance with the duration of the attention of the user directed toward the first selectable user interface object toward satisfying the one or more criteria for activating the first selectable user interface object provides the user with enhanced feedback of the progression of their attention towards satisfying the one or more criteria and reduces the likelihood of errors in the interaction between the user and the computer system.

In some embodiments, outputting the first audio feedback includes changing a respective characteristic of the first audio feedback including pitch that changes based on the progress of the attention of the user towards satisfying the one or more criteria (918), such as the pitch changing as timer 734 in FIGS. 7C to 7D progresses. For example, the pitch (or note) of a chord optionally corresponds to a duration of the attention of the user directed toward the first selectable user interface object. For example, the pitch increases as the duration of the attention of the user directed toward the first selectable user interface object increases (e.g., length of time the attention of the user is directed toward the first selectable user interface object). In some embodiments, the pitch corresponds to the displayed filling of the virtual object as described in step(s) 912. For example, the pitch increases as the virtual object fills. In some embodiments, while outputting the first audio feedback, the computer system detects that the attention of the user is directed away from the first selectable user interface object and in response, the computer system ceases to output the first audio feedback and/or lowers the pitch of the first audio feedback. Adjusting the pitch of the audio feedback in accordance with the duration of the attention of the user directed toward the first selectable user interface object toward satisfying the one or more criteria for activating the first selectable user interface object intuitively provides the user with an impression of "increasing" their progress towards satisfying the one or more criteria for activating the first selectable user interface object and reduces the likelihood of errors in the interaction between the user and the computer system.

In some embodiments, while outputting the first feedback, the computer system detects (920a) that the attention of the user directed toward the first selectable user interface object satisfies the one or more criteria (e.g., as described in step(s) 902). In some embodiments, in response to detecting that the attention of the user directed toward the first selectable user interface object satisfies the one or more criteria, the computer system outputs (920b) second audio feedback that indicates activation of the first selectable user interface object to perform the first operation, such as the audio indication generated when timer 740 reaches threshold 734d in FIG. 7I. For example, the second audio feedback optionally includes a tone (e.g., the sound "ding" or "beep" or "boom") or a chord in a melody that indicates activation of the first selectable user interface object to perform the first operation. In some embodiments, the second audio feedback is different from the first audio feedback described in step(s) 918 such that the second audio feedback includes one or more distinct sound characteristics (e.g., different pitch or reverberating sound). Outputting a second audio feedback that indicates activation of the first selectable user interface object provides confirmation of the performance of the first operation and reduces the likelihood of errors in the interaction between the user and the computer system.

In some embodiments, the first selectable user interface object is a first type of object (922a), such as a gaze target like 704a' in FIG. 7E. For example, the first type of object optionally corresponds to the first gaze target described in method 800.

In some embodiments, the user interface includes a second selectable user interface object that is selectable to perform a second operation, wherein the second selectable user interface object is a second type of object, different from the first type of object (922a), such as object 706a in FIG. 7E. For example, the second type of object is optionally a button or toggle switch object. More detailed descriptions of types of objects including the second type of object and their respective operation are described with reference to method 1200.

In some embodiments, the computer system detects (922b) that the attention of the user is directed toward the second selectable user interface object, such as attention 726 in FIG. 7B. In some embodiments, in response to detecting that the attention of the user is directed toward the second selectable user interface object, the computer system displays (922c), in the user interface, a third selectable user interface object (e.g., gaze target), wherein the third selectable user interface target is the first type of object and is selectable to perform the second operation, such as target 706a' in FIG. 7C. In some embodiments, the second selectable user interface object corresponds to the first selectable user interface object described in method 800. In some embodiments, the third selectable user interface object corresponds to the first gaze target described in method 800. In some embodiments, the third selectable user interface object is the same as the first selectable user interface described in step(s) 902. Thus, if the attention of the user directed to the third selectable user interface object satisfies the one or more criteria (e.g., described in step(s) 902), the computer system performs the second operation associated with the second selectable user interface object. In some embodiments, if the attention of the user directed to the third selectable user interface object does not satisfy the one or more criteria (e.g., described in step(s) 902), the computer system does not perform the second operation associated with the second selectable user interface object. In some embodiments, in response to detecting that the attention of the user is directed toward the first selectable user interface object, the computer system does not display a user interface object (e.g., gaze target) associated with the first selectable user interface object. In some embodiments, in response to detecting that the attention of the user is directed toward the first selectable user interface object, the computer system displays the visual indication of progress towards the attention of the user directed toward the first selectable user interface object as described with reference to step(s) 902. Displaying a gaze target in response to the attention of the user directed toward a respective selectable user interface object provides confirmation that the user intends to interact with the respective selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while displaying the indication of progress towards the attention of the user satisfying the one or more criteria, wherein a current state of the indication of progress corresponds to a first amount of progress (e.g., 75%, 30%) towards satisfying the one or more criteria, such as with respect to target 704*a*' in FIG. 7D, the computer system detects (924*a*) that the attention of the user is directed away from the first selectable user interface object, such as attention 716 moving away from object 704*a*' in FIG. 7E. For example, the attention of the user changes away from the first selectable user interface object for a period of time greater than the first time threshold (e.g., described in step(s) 902), such that the attention of the user is directed to a different region of the user interface (e.g., a region other than the region occupied by the first selectable user interface object) or the attention of the user is directed away from the user interface.

In some embodiments, in response to detecting that the attention of the user is directed away from the first selectable user interface object, the computer system updates (924*b*) the current state of the indication of progress to correspond to a second amount of progress towards satisfying the one or more criteria, wherein the second amount of progress is less than the first amount of progress, such as shown with the progress of target 704*a*' in FIG. 7E. For example, if the first amount of progress is 75%, the second amount of progress is optionally less than 75% (e.g., 70, 60, 50, 40, 30, 20, 10, or 5%). In some embodiments, the first amount continues to decrease to 0% while the attention of the user is directed away from the first selectable user interface object.

In some embodiments, while the current state of the indication of progress corresponds to the second amount of progress (e.g., a non-zero amount of progress), the computer system detects (924*c*), via the one or more input devices, that the attention of the user is directed to the first selectable user interface object, such as attention 716 moving back to target 704*a*' in FIG. 7F. For example, after attention of the user changed away from the first selectable user interface object, the attention of the user returns and is directed to the first selectable user interface object. In some embodiments, the amount of time between moving away from the first selectable user interface object and returning attention back to the first selectable user interface object is below the first time threshold (e.g., described in step(s) 902).

In some embodiments, in response to detecting that the attention of the user is directed to the first selectable user interface object, the computer system updates (924*d*) the current state of the indication of progress to resume from the second amount of progress towards satisfying the one or more criteria, such as shown with respect to target 704*a*' in FIG. 7F. For example, the computer system displays the indication of progress starting with a fill amount equal to the second amount of progress (e.g., 70%) and continues increasing the amount of progress corresponding to the progress of the attention of the user towards satisfying the one or more criteria as described in step(s) 912. In some embodiments, updating the current state of the indication of progress to resume from the second amount of progress towards satisfying the one or more criteria is in accordance with a determination that the attention of the user is directed to the first selectable user interface object for a period of time greater than a second time threshold less than the first time threshold described in step(s) 902. For example the second time threshold is optionally 0.01, 0.02, 0.03, 0.04, 0.05, 0.06, 0.07, 0.08, 0.09, 0.1, 0.15, 0.2, 0.25, 0.3, 0.5, 1, 3, 5, 10, 15, 20, or 30 seconds. Continuing the amount of progress albeit at a slightly reduced amount towards satisfying the one or more criteria in response to the attention of the user returning to the selectable user interface object after moving away facilitates more efficient attention-based interactions more quickly (e.g., the computer system does not require the full threshold period of time before performing an operation when the attention of the user changes back to the selectable user interface object), thereby providing more efficient interactions between the user and the computer system.

In some embodiments, while displaying the indication of progress towards the attention of the user satisfying the one or more criteria, wherein a current state of the indication of progress corresponds to a first amount of progress towards satisfying the one or more criteria (e.g., 50%, 30%, or 10%), the computer system detects (926*a*) a change in a location of the attention of the user that includes the attention of the user moving away from the first selectable user interface object and subsequently moving back to the first selectable user interface object, such as attention 716 with respect to target 704*a*' from FIG. 7D to 7F. For example, the attention of the user changes away from the first selectable user interface object for a period of time greater than the first time threshold (e.g., described in step(s) 902), such that the attention of the user is directed to a different region of the user interface (e.g., a region other than the region occupied by the first selectable user interface object) or the attention of the user is directed away from the user interface.

In some embodiments, in response to detecting the change in the location of the attention of the user (926*b*), in accordance with a determination that the change in the location of the attention of the user satisfies one or more second criteria, including a criterion that is satisfied when the attention of the user changes back to the first selectable object within a threshold time (e.g., 0.03, 0.05, 0.07, 0.09, 0.1, 0.15, 0.2, 0.25, 0.3, 0.5, 1, 3, 5, 10, 15, 20, or 30 seconds) of changing away from the first selectable object, the computer system updates (926*c*) the current state of the indication of progress to continue from the first amount of progress towards satisfying the one or more criteria, such as if in FIG. 7F the progress of target 704*a*' continues from where it was FIG. 7D. For example, the computer system displays the indication of progress continued from the first amount (e.g., 50%, 10%, or more generally the amount prior to the attention user moving away) and continues increasing the amount of progress corresponding to the progress of the attention of the user towards satisfying the one or more criteria as described in step(s) 912.

In some embodiments, in accordance with a determination that the change in the location of the attention of the user does not satisfy the one or more second criteria, the computer system updates (926*d*) the current state of the indication of progress to resume from a second amount of progress, less than the first amount of progress, towards satisfying the one or more criteria (e.g., as described with reference to step(s) 924), such as less than the progress of target 704*a*' from FIG. 7D. Resuming the amount of progress towards satisfying the one or more criteria in response to the attention of the user quickly returning to the selectable user interface object albeit moving away facilitates more efficient attention-based interactions more quickly (e.g., the computer system resumes the amount of progress made and does not require progress to be reset when the attention of the user changes back to the selectable user interface object quickly), thereby providing more efficient interactions between the user and the computer system.

In some embodiments, while displaying the user interface that includes a scrollable region (e.g., a region that can be manipulated/scrolled), wherein the first selectable user interface object is included in the scrollable region, such as the right region of object 704 in FIG. 7K, the computer system detects (928*a*), via the one or more input devices, attention of the user directed to a first edge region of the scrollable region, such as if attention 716 in FIG. 7K were directed to the top region of the right region of object 704. In some embodiments, in response to detecting the attention of the user directed to the first edge region, the computer system scrolls (928*b*) the scrollable region in accordance with the attention of the user being directed to the first edge region, including scrolling the first selectable user interface object from a first location to a second location in the user interface, such as the scrolling shown in FIG. 7L. For example, the computer system detects the attention of the user directed to the first edge region (e.g., top, bottom, left, or right) of the scrollable region to scroll the first selectable user interface object from the first location to the second location in the user interface, and scrolls the first selectable user interface object accordingly. For example, if the computer system detects that the attention of the user is directed toward the top edge of the scrollable region, the first selectable user interface object is moved upwards to the second location to optionally reveal other user interface object(s) and/or content appearing from the bottom of the user interface that was not previously displayed before scrolling. In another example, if the computer system detects that the attention of the user is directed toward the bottom edge of the scrollable region, the first selectable user interface object is moved downwards to optionally reveal user interface object(s) and/or content appearing from the top of the user interface that was not previously displayed before scrolling. In some embodiments, when the attention of the user is not directed to any edge including the first edge of the scrollable region, the computer system does not scroll the first selectable user interface object within the user interface. Scrolling the first selectable user interface object in response to detecting that the attention of the user is directed to an edge region of the scrollable region provides quick access to user interface objects without requiring the user to provide further inputs to navigate within the user interface, thereby reducing the number of inputs and providing more efficient interactions between the user and the computer system.

In some embodiments, while displaying the user interface that includes a scrollable region, the computer system detects (930*a*), via the one or more input devices, a first input directed to the scrollable region, wherein the first input includes a respective gesture performed by a respective portion of a body of the user of the computer system corresponding to a request to scroll the scrollable region, such as the input from hand 710 in FIG. 7K. In some embodiments, in response to detecting the first input, the computer system scrolls (930*b*) the scrollable region in accordance with the first input, including scrolling the first selectable user interface object from a first location to a second location, different from the first location, in the user interface, such as the scrolling shown in FIG. 7L. In some embodiments, the first input from the user corresponds to the first input described with reference to methods 800 and 1000. The computer system optionally scrolls the first selectable user interface object from the first location to the second location in the user interface with a magnitude and/or direction corresponding to the movement of the hand of the user (e.g., scrolls the first selectable user interface object upward if the hand moves upward, and scrolls the first selectable user interface object downward if the hand moves downward). In some embodiments, if the computer system detects a stop to scrolling the scrollable region, the computer system displays the first selectable user interface object in a manner consistent with, but not limited to the description in method 800. The first input from the user optionally includes other types of inputs, such as inputs described with reference to methods 800 and 1000. Scrolling the first selectable user interface object in response to detecting the first input while the attention of the user is directed to an edge region of the scrollable region provides quick access to user interface objects without requiring the user to provide further inputs to navigate within the user interface, thereby reducing the number of inputs and providing more efficient interactions between the user and the computer system.

In some embodiments, the user interface includes a second selectable user interface object that is selectable to perform the first operation (932*a*), such as object 704*a* in FIG. 7D. The second selectable user interface object optionally corresponds to the first selectable user interface object described in method 800.

In some embodiments, while displaying the user interface and before displaying the first selectable user interface object, the computer system detects (932*b*) that the attention of the user is directed toward the second selectable user interface object (e.g., as described in method 800), such as attention 716 in FIG. 7B. In some embodiments, in response to detecting that the attention of the user is directed toward the second selectable user interface object, the computer system displays (932*c*), in the user interface, the first selectable user interface object as a gaze target for the second selectable user interface object (e.g., the first selectable user interface object is a gaze target for the second selectable user interface object), such as target 704*a'* in FIG. 7C. In some embodiments, the computer system displays the first selectable user interface object in response to detecting that the attention of the user is directed toward the second selectable user interface for a period of time greater than a first time threshold as described in method 800. In some embodiments, the gaze target corresponds to the first gaze target described with reference to method 800. In some embodiments, the gaze target is selectable to perform the first operation associated with the second selectable user interface object. In some embodiments, the computer system initiates the first operation associated with the second selectable user interface object when the computer system detects input from the first portion of the user (e.g., a hand air gesture/input described in methods 800 and/or 1000) directed to the second selectable user interface object while attention of the user is directed toward the second selectable user interface object (e.g., without waiting for the attention of the user (directed toward the second selectable user interface object) to satisfy the one or more criteria described in step(s) 902). Providing visual indications of progress towards selecting gaze targets reduces errors in the interaction between the user and the computer system (e.g., avoiding unintentional activation or deactivation of selectable user interface objects due to unintentional gaze) and reduces inputs needed to correct such errors.

In some embodiments, the first selectable user interface object is associated with a plurality of values and includes a plurality of positions associated with the plurality of values (934*a*), such as toggling element 704*b* in FIG. 7A. In some embodiments, the plurality of values include a first value corresponding to a first state of the first operation and a second value corresponding to a second state of the first operation, different from the first state. For example, the first state optionally corresponds to activating the first operation (e.g., a function or feature) of the computer system and the second state optionally corresponds to deactivating the first operation of the computer system. For example, activating and deactivating WiFi functionality, activating and deactivating Bluetooth functionality, activating and deactivating an airplane mode, or activating and deactivating cellular data. In another example, and as illustrated in FIG. 7A, toggling element 704*b* is associated with at least two values to activate or deactivate a stealth mode of a gaming application. In this example, toggling element 704*b* includes a toggle affordance with a first position (e.g., left position) corresponding to a first value (e.g., an "OFF" value indicative of deactivating the stealth mode of the gaming application). In some embodiments, and as will be described in more detail with reference to method 900, the first selectable user interface object includes and/or is a toggle affordance that is selectable to change a current value of the first selectable user interface object between a first position associated with the first value and a second position associated with the second value. For example, and as shown in FIG. 7J, toggling element 704*b* is optionally displayed with the toggle affordance in a second position (e.g., right position), different from the first position shown in FIG. 7A. In some embodiments, the second position corresponds to a second value (e.g., an "ON" value indicative of activating the stealth mode of the gaming application), different from the first value described herein with reference to FIGS. 7A-7O.

In some embodiments, while detecting that attention of the user is directed toward a respective position of the plurality of positions associated with a respective value of the plurality of values, such as attention 716 directed to a toggle affordance of toggle element 704*b* in FIGS. 7G and 7G1, the computer system displays (934*b*), in the user interface, a respective visual indication of progress towards switching the first selectable user interface object to the respective value, such as gaze target 704*b*' in FIG. 7H. In some embodiments, the respective visual indication of progress has one or more characteristics of the visual indication of progress towards the attention of the user satisfying one or more criteria for activating a selectable user interface object of method 900. In some embodiments, in response to detecting that the attention of the user is directed toward the respective position associated with the respective value of the plurality of values (e.g., the first position associated with the first value or the second position associated with the second value), the computer system displays a gaze target that provides the respective visual indication of progress of the attention of the user directed toward the respective position as described with reference to method 900. For example, the attention of the user is optionally directed toward a location corresponding to the location of the first selectable user interface object associated with the plurality of values. In some embodiments, the computer system displays the gaze target in response to detecting that the attention of the user is directed towards at least one of the plurality of positions associated with the plurality of values of the first selectable user interface object. For example, from FIGS. 7G and 7G1 to FIG. 7H, the computer system displays gaze target 704*b*' in FIG. 7H in response to attention 716 directed to the toggle affordance of toggle element 704*b* as shown in FIGS. 7G and 7G1. For example, the attention of the user is optionally directed toward the first position associated with the first value or the second position associated with the second value of the plurality of positions of the first selectable user interface object. In some embodiments, if the attention of the user is directed toward a location (or portion) of the user interface that does not include the respective position of the first selectable user interface object, the computer system does not display (or ceases to display) the gaze target that provides the visual indication of progress of the attention of the user directed toward the respective position of the first selectable user interface object. In some embodiments, the gaze target has one or more of the details described with reference to methods 800 and/or 900. In some embodiments, the first operation associated with the first selectable user interface object is performed in response to switching the first selectable user interface object to the respective value, and includes activating or deactivating the function or feature of the computer system as described herein. Displaying a selectable user interface object that provides an indication of progress of the attention of the user satisfying one or more criteria for switching the first selectable user interface object to the respective value provides feedback about selection status for the selectable user interface object, and is a manner of requiring confirmation that the user intends to interact with the selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while displaying the first selectable user interface object (936*a*), in accordance with a determination that the attention of the user is directed toward a first position of the first selectable user interface object that corresponds to a first value, the computer system initiates (936*b*) a process to change a current value of the first selectable user interface object to the first value, such as changing toggling element 704*b* from Stealth Mode "OFF" in FIG. 7I to Stealth Mode "ON" in FIG. 7J and as described herein. In some embodiments, initiating the process to change the current value of the first selectable user interface object to the first value includes receiving confirmation or input from the user (e.g., attention of the user directed towards the first position of the first selectable user interface object that corresponds to the first value for a period of time greater than the second time threshold, and/or attention of the user directed towards the gaze target similar to as described with reference to methods 800, 900, and/or 1000). In some embodiments, initiating the process to change the current value of the first selectable user interface object to the first value includes activating or deactivating the function or feature of the computer system (e.g., activating and deactivating WiFi functionality or the Stealth Mode in a gaming application shown in FIGS. 7I and 7J) without requiring additional user input (e.g., without a separate activation input or without explicit confirmation such as selecting a save user interface object). In some embodiments, activating or deactivating the function or feature of the computer system includes displaying a visual indication of the changed functionality (e.g., replacing cellular bars icon with a WiFi icon indicative of activating WiFi functionality). In some embodiments, initiating the process to change the current value of the first selectable user interface object to the first value includes displaying the toggle affordance actuated between the first position associated with the first value and the second position associated with the second value, such as changing the toggle affordance of toggling element 704*b* from a first position (e.g., left position) in FIG. 7I to a second position (e.g., right position) in FIG. 7J. In some embodiments, the computer system displays a gaze target at a location corresponding to the first position of the first selectable user interface object that corresponds to the first value. For example, in FIG. 7H, the gaze target 704*b'* is displayed at a location corresponding to the second position of the toggling element 704*b*. In some embodiments, the computer system displays the gaze target according to method 900. In some embodiments, the computer system initiates the process to change the current value of the first selectable user interface object to the first value in response to a determination that the attention of the user is directed toward the gaze target located in the first position of the first selectable user interface object, such as attention 716 directed toward gaze target 704*b'* displayed at a location corresponding to the second position of the toggling element 704*b* in FIG. 7H.

In some embodiments, in accordance with a determination that the attention of the user is not directed toward the first position of the first selectable user interface object, such as shown in FIG. 7C to FIG. 7D where attention 718 is changed to being directed from toggling element 704*b* in FIG. 7C to object 704*a* as shown by attention 716, the computer system foregoes (936*c*) initiating the process to change the current value of the first selectable user interface object to the first value. For example, in response to the attention 716 being directed to object 704*a*, the current value corresponding to the first position of the toggling element 704*b* is unchanged. In some embodiments, if the attention of the user is directed toward a location (or portion) of the user interface that does not include the first position of the first selectable user interface object, the computer system does not initiate the process to change the current value of the first selectable user interface object to the first value. In some embodiments, the process to change the current value of the first selectable user interface object to the first value is initiated in response to detecting an activation input (e.g., user input confirming intent to change the current value) being directed to the first position of the first selectable user interface object, such as selection of the first position of the first selectable user interface object or interaction with a hardware peripheral input device or soft keyboard to change the current value of the first selectable user interface object to the first value. In some embodiments, if the computer system determines that the attention of the user (e.g., gaze duration) is less than the second time threshold due, at least in part, to the gaze moving to a location (or a region) of the user interface that does not include the first position of the first selectable user interface object, the computer system optionally forgoes initiating the process to change the current value of the first selectable user interface object to the first value. In some embodiments, the computer system displays the gaze target at the location corresponding to the first position of the first selectable user interface object that corresponds to the first value. In some embodiments, the computer system foregoes initiating the process to change the current value of the first selectable user interface object to the first value in response to a determination that the attention of the user is not directed toward the gaze target located in the first position of the first selectable user interface object. Changing a current value of the first selectable user interface object based on the attention of the user, and doing so only if the attention of the user satisfies certain criteria, reduces the number of inputs needed, enables selection of values, reduces erroneous attention-based control of the first selectable user interface object, and improves respective user-device interactions.

In some embodiments, while displaying the first selectable user interface object (938*a*), in accordance with a determination that the attention of the user directed toward a first position of the first selectable user interface object satisfies one or more second criteria, the computer system initiates (938*b*) a process to change a current value of the first selectable user interface object to a first value, such as changing the value of the toggling element 704*b* from a first value associated with a first position of the toggle affordance shown in FIG. 7I to a second value associated with a second position of the toggle affordance shown in FIG. 7J. In some embodiments, in accordance with a determination that the attention of the user directed toward the first position of the first selectable user interface object does not satisfy the one or more second criteria, the computer system foregoes (938*c*) initiating the process to change the current value of the first selectable user interface object to the first value. For example, from FIG. 7C to 7D, the attention 718 moves away the gaze target associated with the toggling element 704*b* to gaze target 704*a'* associated with object 704*a*. In some embodiments, the one or more second criteria include a criterion that is satisfied when the attention of the user remains directed toward the first position of the first selectable user interface object for more than the second time threshold as described in method 900. In some embodiments, the criterion is not satisfied if the attention of the user is directed toward the first position of the first selectable user interface object for less than the second time threshold as described in method 900. In some embodiments, while detecting that the attention of the user is directed toward the first position of the first selectable user interface object, the computer system determines that the user is interacting with the computer system using inputs that include non-attention activation inputs (e.g., performed by a portion of the user, such as an air pinch gesture performed by a hand of the user, an air tap, a button press, a tap or click on a touchpad, or another activation input) that is different from the attention of the user and is directed to the first position of the first selectable user interface object. In some embodiments, the one or more second criteria include a criterion that is satisfied when the computer system detects a non-attention activation input from the user of the computer system directed to the first position of the first selectable user interface object to change the current value of the first selectable user interface object to the first value before satisfying the attention time duration described herein. In some embodiments, the criterion is not satisfied when the computer system detects a non-attention activation input from the user of the computer system directed to a location (or portion) of the user interface that does not include the first position of the first selectable user interface object. Initiating the process to change the current value of the first selectable user interface object to the first value in response to attention-based interaction with the first position of the first selectable user interface object confirms that the user intends to interact with the first selectable user interface object, thereby reducing errors in the interaction between the user and the computer system and reducing inputs needed to correct such errors.

In some embodiments, while displaying the first selectable user interface object (940*a*), such as toggling element 704*b* in FIGS. 7G and 7G1, in accordance with a determination that the attention of the user is directed toward a first position of the first selectable user interface object that corresponds to a first value, the computer system initiates (940*b*) a process to change a current value of the first selectable user interface object to the first value, such as changing the value of the toggling element 704*b* from a current value shown in FIG. 7I to a first value shown in FIG.

7J (e.g., such as described with reference to step(s) 936a-936c). In some embodiments, initiating the process to change the current value of the first selectable user interface object to the first value is in response to receiving confirmation or input from the user (e.g., attention of the user directed towards the first position of the first selectable user interface object that corresponds to the first value for a period of time greater than the second time threshold, and/or attention of the user directed towards the gaze target similar to as described with reference to methods 800, 900, and/or 1000). In some embodiments, if the computer system determines that the duration of the attention of the user (e.g., gaze duration) is less than the second time threshold due, at least in part, to the gaze moving to a location (or a region) of the user interface that does not include the first position of the first selectable user interface object, the computer system optionally forgoes initiating the process to change the current value of the first selectable user interface object to the first value.

In some embodiments, in accordance with a determination that the attention of the user is directed toward a second position of the first selectable user interface object that corresponds to a second value, different from the first value, the computer system initiates (940c) a process to change the current value of the first selectable user interface object to the second value, such as changing the value of the toggling element 704b from a current value shown in FIG. 7I to a second value shown in FIG. 7J (e.g., analogous to as described with reference to step(s) 936a-936c). In some embodiments, initiating the process to change the current value of the first selectable user interface object to the second value is in response to receiving confirmation or input from the user (e.g., attention of the user directed towards the second position of the first selectable user interface object that corresponds to the second value for a period of time greater than the second time threshold, and/or attention of the user directed towards the gaze target similar to as described with reference to methods 800, 900, and/or 1000). In some embodiments, if the computer system determines that the duration of the attention of the user (e.g., gaze duration) is less than the second time threshold due, at least in part, to the gaze moving to a location (or a region) of the user interface that does not include the second position of the first selectable user interface object, the computer system optionally forgoes initiating the process to change the current value of the first selectable user interface object to the second value. Changing a current value of the first selectable user interface object based on the attention of the user directed toward the first or second position of the first selectable user interface object improves the interaction between the computer system and/or the user interface and reduces inputs needed to change the current value of the first selectable user interface object.

In some embodiments, displaying, in the user interface, the respective visual indication of progress towards switching the first selectable user interface object to the respective value, such as gaze target 704b' in FIG. 7I includes (942a): in accordance with a determination that a current value of the first selectable user interface object is a first value, the computer system displays (942b) the respective visual indication at a second position in the first selectable user interface object, wherein the second position corresponds to a second value, different from the first value, such as displaying gaze target 704b' in a second position (e.g., right position) of the toggling element 704b, wherein the second position corresponds to a second value (e.g., activating stealth mode of the gaming application) that is different from the first value (e.g., deactivating stealth mode of the gaming application) in FIG. 7I. In some embodiments, and as described in method 900, the first selectable user interface object includes a toggle affordance that is configured to receive an activation input for selection of a first value or a second value for the first selectable user interface object. In some embodiments, the toggle affordance includes a track element and a knob element, such as the toggle affordance displayed with the toggling element 704b in FIG. 7J. In some embodiments, the track element is a selectable area where the knob element moves, switches, or slides back and forth from a first position corresponding to the first value (e.g., left position or top position) to a second position corresponding to the second value (e.g., right position, bottom position, or position opposite the first position), such toggling element 704b in FIG. 7J displayed with a selectable area where the toggle affordance moves from a left position to a right position or from a right position to a left position (e.g., sideways, left to right, or right to left). In some embodiments, the computer system changes the position of the knob element, the color of the knob element, and/or the color of the track element depending on whether the current value of the first selectable user interface object is a first value (e.g., on or activated) or a second value (e.g., off or deactivated). For example, in FIG. 7K, toggling element 704b having a value corresponding to activating stealth mode of the gaming application includes a first color and/or shading as compared to when the toggling element 704b included a value corresponding to deactivating stealth mode and was displayed with a second color and/or shading, different from the first color and/or sharing as shown in FIG. 7F. For example, when WiFi functionality is disabled, the knob element is in the first position (e.g., left) in the track element corresponding to the first value and the respective visual indication of progress towards switching the first selectable user interface object to the respective value (e.g., gaze target as described with reference to methods 800 and/or 900) is displayed at the second position (e.g., right) in the first selectable user interface object (e.g. track element). In some embodiments, in accordance with a determination that the current value of the first selectable user interface object is the second value, the computer system displays (942c) the respective visual indication at a first position in the first selectable user interface object, wherein the first position corresponds to the first value, such as displaying gaze target 704b' of FIG. 7H in a first position (e.g., left position) of the toggling element 704b, wherein the first position corresponds to a first value (e.g., deactivating stealth mode of the gaming application) that is different from the second value (e.g., deactivating stealth mode of the gaming application). For example the first position is the position opposite or to the left of the toggle affordance of the toggling element 704b displayed in FIG. 7L. For example, when WiFi functionality is enabled, the knob element is in the second position (e.g., right) in the track element corresponding to the second value and the respective visual indication of progress towards switching the first selectable user interface object to the respective value is displayed at the first position (e.g., left) in the first selectable user interface object (e.g., track element). Displaying the gaze target that provides the respective visual indication at the first position or the second position of the first selectable user interface object serves as visual feedback, indicating that the respective value will be selected which provides confirmation that the user intends to select the respective value, thereby reducing errors in the interaction between the user and the computer system and reducing inputs needed to correct such errors.

In some embodiments, the first selectable user interface object includes (and/or is) a toggle affordance that is selectable to change a current value of the first selectable user interface object between a first value and a second value (944), such as the toggle affordance displayed with toggling element 704*b* in FIG. 7M, wherein the toggle affordance is displayed in a second position associated with a second value indicative of activating stealth mode of the gaming application. In another example, the toggle affordance toggling element 704*b* is optionally displayed in a first position corresponding to a first value indicative of deactivating stealth mode of the gaming application as shown in FIG. 7F. In some embodiments, the toggle affordance includes the track element and the knob element as described in method 900. In some embodiments, the computer system is configured to detect an activation input at the toggle affordance, and in response to detecting the activation input at the toggle affordance, the computer system is configured to change the current value of the first selectable user interface object from the first value to the second value or from the second value to first value. In some embodiments, changing the current value of the first selectable user interface object from the first value to the second value or from the second value to first value includes enabling, ceasing, or changing display of corresponding content or a user interface element indicative of the changed value (e.g., reducing the visual prominence of the Bluetooth icon when the current value of the first selectable user interface object is the first value). Providing a toggle affordance via which the user easily changes the current value of the first selectable user interface object improves the interaction between the user and the computer system and reduces inputs needed to change the current value of the first selectable user interface object.

In some embodiments, displaying, in the user interface, the respective visual indication of progress towards switching the first selectable user interface object to the respective value includes displaying the respective visual indication in an area of the toggle affordance (946), such as displaying gaze target 704*b*' of FIG. 7H in an area of toggling element 704*b*. In some embodiments, the respective visual indication is displayed on, over, overlaid on, or in a same region of the toggle affordance and/or a surface of the toggle affordance. For example, and as illustrated in FIG. 7H, gaze target 704*b*' is displayed overlaid to the right of the toggle affordance of toggling element 704*b*. In some embodiments, the respective visual indication is displayed at a location corresponding to the respective position of the first selectable user interface object that corresponds to the respective value as described in step(s) 936*a*-936*c*. In some embodiments, the computer system displays the respective visual indication according to method 900. In some embodiments, displaying the respective visual indication in the area of the toggle affordance includes displaying the respective visual indication of progress with a fill amount equal and/or corresponding to the amount of progress towards switching the first selectable user interface object to the respective value, and continues increasing the amount of fill corresponding to the progress of the attention of the user towards satisfying the one or more criteria as described in method 900. Displaying the respective visual indication in an area of the toggle affordance provides a more efficient use of display space, thereby reducing errors in the interaction between the user and the computer system (e.g., avoiding unintentional activation or deactivation of selectable user interface objects due to unintentional gaze) and reducing inputs needed to correct such errors.

It should be understood that the particular order in which the operations in method 900 have been described is merely exemplary and is not intended to indicate that the described order is the only order in which the operations could be performed. One of ordinary skill in the art would recognize various ways to reorder the operations described herein.

FIGS. 10A-10G is a flowchart illustrating a method 1000 of displaying a gaze virtual object that is selectable, based on attention directed to the gaze virtual object, to perform an operation associated with a selectable virtual object in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, the method 1000 is performed at a computer system in communication with a display generation component, one or more input devices (e.g., a gaze tracking device, a hand tracking device, a remote control, one or more touch-sensitive surfaces, one or more buttons, dials, and/or knobs). For example, the computer system includes devices described with reference to methods 800 and/or 900. In some embodiments, the display generation component includes a display as described with reference to methods 800 and/or 900. In some embodiments, the gaze tracking device is a device described with reference to methods 800 and/or 900.

In some embodiments, the computer system displays (1002*a*), via the display generation component, a user interface that includes a first selectable user interface object that is selectable to perform a first operation, such as object 704*a* in FIG. 7B. In some embodiments, the user interface is or is displayed in a three-dimensional environment, such as described with reference to methods 800 and/or 900. In some embodiments, the user interface has one or more of the characteristics of the user interfaces described with reference to methods 800 and/or 900. In some embodiments, the first selectable user interface object has one or more of the characteristics of the selectable user interface objects described with reference to methods 800 and/or 900.

In some embodiments, while displaying the user interface, the computer system detects (1002*b*), via the one or more input devices, that attention of a user of the computer system is directed toward the first selectable user interface object, such as attention 716 in FIG. 7B. In some embodiments, the gaze tracking device optionally captures one or more images of the user's eyes and detects the pupils and glints in the one or more captured images to track the user's gaze, as described in more detail with reference to FIG. 6. In some embodiments, the computer system detects that the attention of the user is directed toward the first selectable user interface object in one or more of the ways described with reference to methods 800 and/or 900.

In some embodiments, while detecting that the attention of the user is directed toward the first selectable user interface object (1002*c*), in accordance with a determination that the attention of the user satisfies one or more criteria, including a criterion that is satisfied when the attention of the user remains directed toward the first selectable user interface object for more than a time threshold (e.g., 0.3, 0.5, 1, 1.5, 2, 2.5, 3, 3.5, 5, 7, 9, or 10 seconds; in some embodiments, the criterion is not satisfied if the attention of the user is directed toward the first selectable user interface object for less than the time threshold), the computer system displays (1002*d*), in the user interface, a second selectable user interface object that is selectable based on the attention of the user (e.g., without a separate activation input) to perform the first operation associated with the first selectable user interface object, such as target 704*a*' in FIG. 7C. In some embodiments, the first selectable user interface object is selectable to perform an operation, such as displaying content, displaying a webpage, displaying another user interface, playing multimedia, launching an application, providing a menu, installing a program, or downloading content. In some embodiments, the first selectable user interface object is a first type of object when attention directed to the first selectable user interface object causes display of a second user interface object (e.g., a gaze target, such as described with reference to methods 800 and/or 900). In some embodiments, the first selectable user interface object is a first type of object when it is not a gaze target. In some embodiments, the second selectable user interface object is selectable to perform an operation associated with its parent or primary user interface object (e.g., the first selectable user interface object). In some embodiments, the second selectable user interface object corresponds to or has one or more of the characteristics of the gaze targets described in method 800 and/or 900. In some embodiments, if the attention of the user is directed toward a location (or portion) of the user interface that does not include the first selectable user interface object, the computer system does not display (or ceases to display) the second selectable user interface object. In some embodiments, the first operation associated with the first selectable user interface object (that is optionally performed in response to selection of the second selectable user interface object) includes displaying content, a user interface, playing multimedia, launching an application, providing a menu, installing a program, or downloading content.

In some embodiments, in accordance with a determination that an activation input (e.g., performed by a portion of the user, such as an air pinch gesture performed by a hand of the user, an air tap, a button press, or another activation input) that is different from the attention of the user and is directed to the first selectable user interface object is received prior to the attention of the user satisfying the one or more criteria, the computer system performs (1002*e*) the first operation associated with the first selectable user interface object (e.g., without displaying the second selectable user interface object), such as an input from hand 710 in FIG. 7B while attention 716 is directed to object 704*a*. For example, in some embodiments, the computer system detects a hand air gesture/input from the user of the computer system directed to the first selectable user interface object to select the first selectable user interface object before satisfying the attention time duration described above. In some embodiments, the activation input includes an air pinch gesture while the attention of the user is directed to the first selectable user interface object (e.g., the index finger and thumb of the hand of the user coming together and touching at the tips). In some embodiments, the activation input from the user includes a selection input (e.g., a tap, touch, or click) via the one or more input devices provided by one or more fingers of the hand of the user. The activation input from the user optionally includes other types of inputs, such as trackpad inputs (e.g., finger touching a trackpad) or an input device input (e.g., selection via a handheld input device, such as a stylus or remote control). In some embodiments, the activation input is an attention-only and/or gaze-only input (e.g., not including input from one or more portions of the user other than those portions providing the attention input). Performing the first operation in response to either attention-based interaction with the second selectable user interface object or the activation input directed to the first selectable user interface object avoids a wait time associated with meeting attention criteria when faster interaction is desired, thereby reducing errors in the interaction between the user and the computer system and reducing inputs needed to correct such errors.

In some embodiments, while displaying the second selectable user interface object, the computer system detects (1004*a*) that the attention of the user is directed toward the second selectable user interface object, such as attention 716 directed to target 704*a*' in FIG. 7C. In some embodiments, in response to detecting that the attention of the user is directed toward the second selectable user interface object (1004*b*), in accordance with a determination that the attention of the user directed toward the second selectable user interface object satisfies one or more second criteria, including a criterion that is satisfied when the attention of the user is directed towards the second selectable user interface object for longer than a second time threshold, the computer system performs (1004*c*) the first operation associated with the first selectable user interface object, such as attention 716 directed to target 704*a*' reaching threshold 714*d* in timer 714 in FIG. 7D. For example, the second time threshold (e.g., 0.1, 0.5, 1, 2, 3, 5, 7, 10, 20, 30, or 60 seconds) is greater than, less than or the same as the first time threshold described in step(s) 1002. In some embodiments, performing the first operation is confirmed at the second selectable user interface object in accordance with the attention of the user directed towards the second selectable user interface object or a region of the second selectable user interface object for a period of time greater than the second time threshold (e.g., duration of gaze in the direction of the second selectable user interface object is beyond the second time threshold). In some embodiments, the second selectable user interface object corresponds to the first gaze target described with reference to method 800.

In some embodiments, in accordance with a determination that the attention of the user directed toward the second selectable user interface object does not satisfy the one or more second criteria, the computer system forgoes (1004*d*) performing the first operation associated with the first selectable user interface object, such as attention 716 towards target 704*a*' in FIG. 7D not reaching threshold 734*d*. For example, if the computer system determines that the gaze duration is less than the second time threshold due, at least in part, to the gaze moving to a location (or a region) of the user interface that does not include the second selectable user interface object, the computer system optionally forgoes performing the first operation associated with the first selectable user interface object. In some embodiments, the computer system changes the visual appearance of the second selectable user interface object in response to a determination that the attention has changed away from being directed to the second selectable user interface object as described in with reference to methods 800 and/900. Performing an operation associated with a first selectable user interface object in response to determining that the attention of the user is directed to a second selectable user interface object selectable to perform the operation associated with the first selectable user interface provides confirmation that the user intends to interact with the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, while detecting that the attention of the user is directed toward the second selectable user interface object (1006*a*), in accordance with a determination that an activation input (e.g., performed by a portion of the user, such as an air pinch gesture performed by a hand of the user, an air tap, a button press, a tap or click on a touchpad, or another activation input) that is different from the attention of the user and is directed to the second selectable user interface object is received prior to the attention of the user satisfying the one or more second criteria (e.g., including the criterion that is satisfied when the attention of the user is directed towards the second selectable user interface object for longer than the second time threshold), such as an input from hand 710 directed to target 704*a*' in FIG. 7F, the computer system performs (1006*b*) the first operation associated with the first selectable user interface object, such as shown in FIGS. 7G and 7G1. For example, in some embodiments, the computer system detects a hand air gesture/input from the user of the computer system directed to the second selectable user interface object to select the first selectable user interface object before satisfying the attention time duration described above with reference to step(s) 1004. In some embodiments, the activation input is consistent, but not limited to the description in step(s) 1002. Performing the first operation in response to either attention-based interaction with the second selectable user interface object or the activation input directed to the second selectable user interface object avoids a wait time associated with meeting attention criteria when faster interaction is desired, thereby reducing errors in the interaction between the user and the computer system and reducing inputs needed to correct such errors.

In some embodiments, while detecting that the attention of the user is directed toward the second selectable user interface object, the computer system displays (1008), in the user interface, a visual indication of progress towards the attention of the user directed toward the second selectable user interface object satisfying the one or more second criteria, such as the fill of target 704*a*' in FIG. 7F. In some embodiments, the visual indication of progress is consistent with, but not limited to the description in method 900. In some embodiments, the computer system does not display the visual indication of progress towards the attention of the user directed toward the second selectable user interface object satisfying the one or more second criteria in accordance with a determination that the attention of the user is not directed toward the second selectable user interface object. In some embodiments, the computer system reduces a visual prominence of the second selectable user interface object as described in method 800. In some embodiments, the computer system updates an amount of progress of the visual indication of progress as described in method 900. Displaying a second selectable user interface object that provides a visual indication of progress towards the attention of the user satisfying one or more criteria for activating the first selectable user interface object to perform the first operation provides feedback about selection status for the first selectable user interface object, and is a manner of requiring confirmation that the user intends to interact with the first selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, the first selectable user interface object is a first type of object, and the user interface includes a third selectable user interface object (1010*a*), such as object 706*b* or 706*b*' in FIG. 7C. In some embodiments, the first type of object is selectable to perform a corresponding operation. For example, the first selectable user interface object is optionally a first application icon and the first operation launches a first application corresponding to the first user interface object.

In some embodiments, while displaying the third selectable user interface object, the computer system detects (1010*b*) that the attention of the user is directed to the third selectable user interface object and that the attention of the user directed to the third selectable user interface object satisfies one or more second criteria, such as attention 728 in FIG. 7C being directed to object 706*b* or 706*b*' (e.g., the criteria described with reference to step(s) 1002 or the criteria described with reference to step(s) 1004, depending on the type of object that the third selectable user interface object is, as will be described below).

In some embodiments, in response to detecting that the attention of the user directed to the third selectable user interface object satisfies the one or more second criteria (1010*c*), in accordance with a determination that the third selectable user interface object is the first type of object, the computer system displays (1010*d*), in the user interface, a fourth selectable user interface object that is selectable based on the attention of the user (e.g., without a separate activation input as described in step(s) 1006) to perform a second operation associated with the third selectable user interface object, such as attention 728 in FIG. 7B causing display of target 706*b*' in FIG. 7C. For example, the computer system optionally displays the fourth selectable user interface object as a gaze target for the third selectable user interface object, and in accordance with a determination that the attention of the user directed toward the fourth selectable user interface object satisfies the one or more second criteria as described in step(s) 1002 and 1004, the computer system performs the second operation associated with the third selectable user interface object.

In some embodiments, in accordance with a determination that the third selectable user interface object is a second type of object, different from the first type of object, the computer system performs (1010*e*) the second operation associated with the third selectable user interface object, such as attention 728 on target 706*b*' in FIG. 7C causing performance of the operation associated with object 706*b*. In some embodiments, the second type of object is a gaze target object displayed to confirm the user's intention to interact with a different respective selectable user interface object. For example, the third selectable user interface object is optionally the second type of object and, similarly to the fourth selectable user interface object described herein, is selectable based on the attention of the user to perform the second operation associated with the third selectable user interface object. In some embodiments, in accordance with a determination that the attention of the user directed toward the third selectable user interface object satisfies the one or more second criteria as described in step(s) 1002 and 1004, the computer system performs the second operation associated with the third selectable user interface object. Responding to attention differently for different types of objects reduces errors in the interaction between the user and the computer system (e.g., avoiding unintentional activation or deactivation of selectable user interface objects due to unintentional gaze) and reduces inputs needed to correct such errors.

In some embodiments, while the attention of the user is directed to the third selectable user interface object and before the attention of the user directed to the third selectable user interface object satisfies the one or more second criteria (e.g., as described in step(s) 1002 and 1004), such as attention 728 directed to target 706b' in FIG. 7C, the computer system detects (1012a) an activation input that is different from the attention of the user and is directed to the third selectable user interface object is received (e.g., as described in step(s) 1006), such as an input from hand 710 in FIG. 7C. In some embodiments, in response to detecting the activation input directed to the third selectable user interface object (1012b), in accordance with the determination that the third selectable user interface object is the second type of object (e.g., as described in step(s) 1010), the computer system performs (1012c) the second operation associated with the third selectable user interface object, such as the operation associated with object 706b in FIG. 7C. For example, in some embodiments, the computer system detects a hand air gesture/input from the user of the computer system directed to the third selectable user interface object before satisfying the attention time duration described above with reference to step(s) 1004. Allowing activation input selection of the third selectable user interface object avoids a wait time associated with meeting attention criteria when faster interaction is desired, thereby reducing errors in the interaction between the user and the computer system and reducing inputs needed to correct such errors.

In some embodiments, while the attention of the user is directed to the third selectable user interface object, the computer system displays (1014), in the user interface, a visual indication of progress (e.g., described in step(s) 1008) towards the attention of the user directed toward the third selectable user interface object satisfying the one or more second criteria, such as the fill of object 706b' in FIG. 7C. Displaying a third selectable user interface object that provides a visual indication of progress towards the attention of the user satisfying one or more second criteria for activating a respective selectable user interface object to perform a respective operation provides feedback about selection status for the respective selectable user interface object, and is a manner of requiring confirmation that the user intends to interact with the respective selectable user interface object, thereby reducing errors in the interaction between the user and the computer system (e.g., avoiding unintentional activation or deactivation of selectable user interface objects due to unintentional gaze) and reducing inputs needed to correct such errors.

In some embodiments, the user interface includes a third selectable user interface object that is selectable to perform a second operation (1016a), such as object 704h in FIG. 7A. In some embodiments, the third selectable user interface object is a same type of object as the first selectable user interface object described in step(s) 1002. In some embodiments, the third selectable user interface object is a first type of object as described in step(s) 1010.

In some embodiments, while the attention of the user is directed toward the first selectable user interface object and while the third selectable user interface object is displayed with a first visual appearance, the computer system detects (1016b) that the attention of the user of the computer system has changed to being directed toward the third selectable user interface object, such as attention 724 in FIG. 7B. For example, the attention of the user optionally changes away from the first selectable user interface object for a period of time greater than the time threshold (e.g., described in step(s) 1002), such that the attention of the user is directed to a region of the user interface occupied by the third selectable user interface object.

In some embodiments, in response to detecting the that the attention of the user is directed toward the third selectable user interface object, the computer system displays (1016c) the third selectable user interface object with a second visual appearance, different from the first visual appearance, such as shown with object 704h in FIG. 7C. For example, the second visual appearance optionally includes a second size larger, expanded (e.g., consistent, but not limited to the increased size of the first selectable user interface object described in method 800) than the first size of the first visual appearance. In some embodiments, in accordance with a determination that attention of the user directed toward the first selectable user interface object has changed away (e.g., for the period of time greater than the time threshold described in step(s) 1002) and is now directed toward the third selectable user interface object, the computer system changes the visual appearance of the first selectable user interface object (e.g., from a larger, expanded size to a smaller compact size as described in method 800). In some embodiments, if the attention of the user changed away from being directed to the first selectable user interface object to being directed to a different region of the user interface (e.g., a region other than the first region occupied by neither the first selectable user interface object or the second selectable user interface object) or the attention of the user is directed away from the user interface, the computer system does not display the third selectable user interface object with the second visual appearance, but does change the visual appearance of the first selectable user interface object from the larger, expanded size to the smaller compact size as described in method 800. Selectively increasing or decreasing (e.g., expanding or collapsing) the size of the selectable user interface object in response to whether or not attention is directed toward the selectable user interface object provides improved feedback to the user without cluttering the user interface (e.g., by not always displaying an expanded selectable user interface object), which enhances operability of the computer system and reduces power usage of the computer system.

In some embodiments, while detecting that the attention of the user is directed toward the first selectable user interface object, the computer system displays (1018), in the user interface, a visual indication of the attention of the user directed towards the first selectable user interface object, such as shown in FIG. 11. In some embodiments, the computer system displays a visual representation (indication) of the user's attention as described in methods 900, 1200, and/or 2000. Displaying a visual indication of the attention of the user indicates that the computer system will respond to gaze-based input, thereby reducing errors in usage of the computer system and reducing inputs needed to correct such errors.

In some embodiments, the first selectable user interface object is a first type of object (1020a) (e.g., described in step(s) 1010). In some embodiments, the second selectable user interface object is a second type of object, different from the first type of object (1020*b*) (e.g., described in step(s) 1010). Displaying selectable user interface objects with similar visual appearances and/or behaviors enhances user interactions with the computer system by providing improved feedback to users (e.g., by consistently displaying selectable user interface objects with the same visual appearance and/or behaviors) and reducing the likelihood of errors in the interaction between the user and the computer system.

In some embodiments, the user interface includes a first set of user interface objects including the first selectable user interface object and a third selectable user interface object that is selectable based on the attention of the user to display a fourth selectable user interface object that is selectable based on the attention of the user to perform a second operation that is associated with the third selectable user interface object (1022), such as objects 704*a* and 706*b* in FIG. 7B. For example, the first set of user interface objects including the first selectable user interface object and the third selectable user interface object correspond to a first application. In some embodiments, the first selectable user interface object and the third selectable user interface object are located together in a same container user interface object with the first selectable user interface object being different from the third selectable user interface object in terms of constituent user interface objects (e.g., the first selectable user interface object and the third selectable user interface object optionally do not overlap or intersect each other). In some embodiments, in accordance with a determination that the attention of the user directed to the third selectable user interface object satisfies the one or more criteria as described with reference to step(s) 1002, the computer system displays the fourth selectable user interface object. In some embodiments, in accordance with a determination that the attention of the user directed toward the fourth selectable user interface object satisfies the one or more second criteria as described in step(s) 1002 and 1004, the computer system performs the second operation associated with the third selectable user interface object. Displaying a fourth selectable user interface object that is the same as the second selectable user interface object selectable to perform respective, different operations provides improved visual feedback to the user (e.g., because the user interface displays multiple selectable user interface objects of the same type including the fourth selectable user interface object and the second selectable user interface, the user can easily perform different operations by interacting with multiple selectable user interface objects).

In some embodiments, the user interface includes a first set of user interface objects including the second selectable user interface object and a third selectable user interface object that is associated with a fourth selectable user interface object (1024*a*). In some embodiments, while displaying the first set of user interface objects, the computer system detects that the attention of the user is directed toward the first set of user interface objects (1024*b*), such as attention 728 or 716 in FIG. 7C directed to targets 706*b*' or 704*a*'. In some embodiments, in response to detecting that the attention of the user is directed toward the first set of user interface objects (1024*c*), in accordance with a determination that the attention of the user directed toward the second selectable user interface object satisfies one or more second criteria (e.g., as described in step(s) 1002 and 1004), the computer system performs (1024*d*) the first operation associated with the first selectable user interface object, such as performing operations associated with object 704*a*.

In some embodiments, in accordance with a determination that the attention of the user directed toward the third selectable user interface object satisfies the one or more second criteria, the computer system performs (1024*e*) a second operation associated with the fourth selectable user interface object, wherein the second operation is different from the first operation, such as performing operations associated with object 706*b*. For example, the second selectable user interface object and the fourth selectable user interface object optionally have one or more of the characteristics of the second selectable user interface object described in step(s) 1004 and 1006. In some embodiments, the second selectable user interface object and the fourth selectable user interface object are not concurrently displayed in the user interface because the second selectable user interface object and the fourth selectable user interface object are associated with different selectable user interface objects of the first type, and therefore, are selectable to perform different, respective operations (e.g., the operations of their respective selectable user interface objects of the first type). Providing multiple selectable user interface objects of the second type allows for more diverse attention based interactions and enables the user to interact with selectable user interface objects more quickly and efficiently (e.g., because the computer system allows for multiple different selectable user interface objects of the second type for performing different operations to be displayed).

In some embodiments, the first selectable user interface object is a first type of object (1026*a*). In some embodiments, the first type of object is selectable to perform a corresponding operation as described in step(s) 1010. In some embodiments, the second selectable user interface object is a second type of object, different from the first type of object (1026*b*). In some embodiments, the second type of object is a gaze target object displayed to confirm the user's intention to interact with a different respective selectable user interface object as described in step(s) 1010.

In some embodiments, the user interface includes a first set of user interface objects of the first type (e.g., described in step(s) 1022) and a second set of user interface objects of the second type (e.g., described in step(s) 1024), wherein the first set of user interface objects includes the first selectable user interface object and a third selectable user interface object, and the second set of user interface objects includes the second selectable user interface object and a fourth selectable user interface object (1026*c*), such as three-dimensional environment 702 in FIG. 7C including objects 704*a*, 706*b*, 706*a* and targets 704*a*', 706*b*' and 706*a*'. In some embodiments, the second selectable user interface object and the fourth selectable user interface object are not concurrently displayed as described in step(s) 1024 even though the first selectable user interface object and the third selectable user interface object are concurrently displayed. Providing multiple selectable user interface objects of the first and second type allows for more diverse attention based interactions and enables the user to interact with selectable user interface objects more quickly and efficiently (e.g., because the computer system allows for multiple different selectable user interface objects of the first and second type for performing different operations to be displayed).

In some embodiments, while detecting that the attention of the user is directed toward the first selectable user interface object (1028*a*), in accordance with a determination that the user is primarily interacting with the device using attention-only inputs (e.g., all or most of the recent inputs detected by the device have been attention-only inputs for at least a threshold amount of time (e.g., 1, 2, 3, 5, 7, 10, 13, 15, 17, 20, 21, 23, 25, 27, 30, 45, or 60 minutes) the time threshold is a first time threshold (1028b), such as threshold 732b' in FIG. 7F (e.g., 0.02, 0.05, 0.1, 0.2, 0.25, 0.3, 0.5, 1, 2, 3, or 5 seconds). In some embodiments, the computer system determines that the attention-only inputs satisfy one or more second criteria including a criterion that is satisfied when the attention-only inputs happen recently (e.g., in the past 5, 10, 15, 20, 30, 40, 50, or 60 minutes).

In some embodiments, in accordance with a determination that the user is interacting with the computer system using inputs that include non-attention activation inputs (e.g., in the threshold amount of time at least a threshold amount (e.g., over 70, 75, 80, 85, 95, or 100%) of the recent inputs detected by the computer system have included non-attention activation inputs such as an air tap or air pinch gesture), the time threshold is a second time threshold (1028c) (e.g., 0.2, 0.25, 0.3, 0.5, 1, 2, 3, 5, 7, or 10 seconds), greater than the first time threshold, such as threshold 738b in FIGS. 7G and 7G1. For example, the time threshold required by the computer system in order to initiate an operation based on non-attention activation input (as described herein and/or in step(s) 1002) is optionally lengthened to the second time threshold (e.g., greater than the first time threshold) in accordance with a determination that the user is interacting with the computer system using non-attention activation inputs in the threshold amount at least the threshold amount of the recent inputs detected by the computer system as described herein. In some embodiments, the time threshold required by the computer system in order to initiate an operation is optionally lengthened to the second time threshold (e.g., greater than the first time threshold) in accordance with a determination that the one or more prior user interactions with the one or more selectable user interface objects include an activation input (and optionally an attention input) happening recently in the time described herein. In some embodiments, the time threshold required by the computer system in order to initiate an operation is optionally shortened to the first time threshold (e.g., less than the second time threshold) in accordance with a determination that the one or more prior user interactions with the one or more selectable user interface objects include attention-only inputs in the time described herein. In some embodiments, the user interactions whether attention-only or including non-attention activation inputs are interactions that perform operations associated with respective applications (e.g., and do not include operations for setting the time threshold required by the computer system in order to initiate an operation). In some embodiments, the time threshold required by the computer system in order to initiate an operation is changed (e.g., increased or decreased) based on the user interactions described herein (e.g., attention-only interactions or non-attention interaction inputs). Adjusting the time required to perform operations in response to the amount of recent inputs of a particular type of user interactions (e.g., attention-only or including non-attention inputs) happening facilitates more efficient attention-based interactions more quickly (e.g., the computer system does not require an original, default period of time before performing an operation), thereby providing more efficient interactions between the user and the computer system.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11C illustrate examples of a computer system displaying indication of attention of a user in accordance with some embodiments.

FIG. 11A illustrates a computer system 101 displaying, via a display generation component (e.g., display generation component 120 of FIG. 1), a three-dimensional environment 1104 from a viewpoint of a user. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment 1102 and/or movements of the user's hands (e.g., external sensors facing outwards from the user) such as movements that are interpreted by the computer system as gestures such as air gestures, and/or gaze of the user (e.g., internal sensors facing inwards towards the face of the user), and/or gaze of the user (e.g., internal sensors facing inwards towards the face of the user).

As shown in FIG. 11A, computer system 101 captures one or more images of the physical environment 1102 around computer system 101 (e.g., operating environment 100), including one or more objects in the physical environment 1102 around computer system 101. In some embodiments, computer system 101 displays representations of the physical environment 1102 in three-dimensional environment 1104 or portions of the physical environment are visible via the display generation component 120 of computer system 101. For example, three-dimensional environment 1104 includes portions of the left and back walls, and the floor in the physical environment of the user, and also includes table 1112a.

In FIG. 11A, three-dimensional environment 1104 also includes virtual content, such as virtual content 1126a and 1128a. Virtual content 1126a and 1128a are optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to methods 1200 and/or 2800. In FIG. 11A, virtual content 1126a is a user interface that includes selectable objects 1130a-d, which are optionally selectable to perform corresponding functions, as described in more detail with reference to method 1200. In FIG. 11A, the computer system 101 also displays a non-selectable object (e.g., an image) 1130i, as described in detail with reference to method 2800. In FIG. 11A, virtual content 1128a is a soft keyboard including keys 1130e-1130l that are selectable to perform corresponding functions, such as entering corresponding text into a user interface.

In some embodiments, input to computer system 101 is provided via air gestures from hands 1136a-c and 1136f, and 1136*i*, and/or attention of the user (e.g., as described in more detail with reference to methods 1200 and/or 2800), or via trackpad 746 from hand 1136*d*, and inputs described herein are optionally received via trackpad 746 or via air gestures/attention.

In some embodiments, in response to detecting attention of the user directed to a selectable object in three-dimensional environment 1104, computer system 101 displays a visual indication of such attention in three-dimensional environment 1104. For example, in FIG. 11A, computer system 101 detects several alternative locations of user attention in three-dimensional environment 1104, and displays various indications of attention. Attention is optionally detected based on gaze of the user (e.g., where the gaze of the user is directed) in the case of indirect interaction with the selectable object, and is optionally detected based on where a hand of the user is pointing (e.g., such as determined by a ray extending out from the tip of the extended finger of the hand of the user intersecting with the selectable object). Various aspects of the attention indicators described below apply equally to both gaze-based and hand-based attention, and some aspects of the attention indicators described below apply to gaze-based attention but not hand-based attention, and vice versa; such distinctions will be noted. Additional aspects about the appearance and behavior of the indications of attention are described with reference to methods 1200 and/or 2800.

In FIG. 11A, computer system 101 detects attention 1132*a* directed to object 1130*a*, and displays an attention indicator 1134*a* at the location of attention 1132*a* within object 1130*a*. As shown in FIG. 11A, the attention indicator 1134*a* optionally has a circular shape, and is optionally a visually emphasized portion of object 1130*a* that visually emphasis the location of attention 1132*a* with respect to portions of object 1130*a* that do not have attention. In some embodiments, attention indicator 1134*a* comprises a virtual lighting effect that has a gradient of magnitude (e.g., indicated by arrow 1135) in which the magnitude of the virtual lighting effect decreases as a function of distance from the location of attention 1132*a*. Further, the attention indicator 1134*a* is optionally masked and/or cutoff by the boundaries of object 1130*a* to which attention 1132*a* is directed, such that the attention indicator 1134*a* is not displayed outside of such boundaries. Also, as shown in FIG. 11A, visual effects 1137*a*, 1137*b*, 1137*c* (e.g., specular highlights and/or other visual effects) are respectively applied to the objects 1130*a*, 1130*b*, 1130*c* due to the objects alternative being the subject of the user's attention.

In some embodiments, the size of the attention indicator that is displayed by computer system 101 differs based on the size of the object to which attention is directed, in the case that attention is gaze-based (e.g., for indirect interactions with the object). For example, in FIG. 11A, computer system 101 is detecting attention 1132*c* directed to object 1130*c*. In response, computer system 101 displays attention indicator 1134*c* with the various properties described with reference to attention indicator 1134*a*, except that attention indicator 1134*c* is smaller (e.g., in area) than attention indicator 1134*a*, because object 1130*c* is smaller than object 1130*a*.

Finally, computer system 101 is detecting hand-based attention (e.g., direct interactions with the object) directed to object 1130*b* (e.g., from hand 1136*a*) and object 1130*e* (e.g., from hand 1136*b*). In response, computer system 101 displays attention indicator 1134*b* with the various properties described with reference to attention indicator 1134*a* in object 1130*b* for attention 1132*b*, and displays attention indicator 1134*d* with the various properties described with reference to attention indicator 1134*a* in object 1130*e*, except that the sizes of 1134*b* and 1134*d* are not based on the sizes of objects 1130*b* and 1130*e*, respectively. Rather, the sizes of hand-based attention indicators are optionally based on the distance between the hand and the objects to which they are directing attention (e.g., the smaller the distance, the larger the size, and the larger the distance, the smaller the size), as will be described later. Additional details about how distance affects the visual appearance of an attention indicator is described in more detail with reference to method 1200.

As shown in FIG. 11A, attention indicators 1134*a-d* are masked and/or cut off by the boundaries of their respective objects differently, because attention indicators 1134*a-d* are positioned differently within their respective objects and/or because their respective objects have different sizes and/or shapes. Finally, computer system 101, in addition to displaying attention indicators in objects 1130*a-c* due to attention 1132*a-c* being directed to those objects, is also displaying a second visual effect on those objects that indicates that attention is directed to those objects. For example, computer system 101 is displaying a virtual specular highlight 1137*a* on object 1130*a*, a virtual specular highlight 1137*b* on object 1130*b*, and a virtual specular highlight 1137*c* on object 1130*c*. Additional details about the second visual effect and/or virtual specular highlighting are described with reference to method 1200.

In FIGS. 11A-11C, for a respective object, multiple hands directed to the respective object are illustrated. In some embodiments, each of the multiple hands represent alternatives embodiments associated with a direct input (e.g., hand-based input). In some embodiments, the multiple hands directed to the same respective object correspond to either a hand-based input or a gaze-based input. In some embodiments, a first hand corresponding to direct input is directed to a respective object and a second hand different from the first hand corresponding to a gaze-based input is also directed to the respective object. For example, when attention (gaze-based) is directed to a respective object, a hand of the user is optionally also directed to the respective object (e.g., hand of the user in ready-state).

In some embodiments, when detecting attention (gaze-based only) directed to a non-selectable object, the computer system 101 forgoes displaying a gaze-based attention indicator. However, in some embodiments, when detecting direct input from a hand directed to the non-selectable object, the computer system 101 displays a hand-based attention indicator. In FIG. 11A, the computer system 101 is detecting a direct input from hand 1136*i* and attention 1132*i* (e.g., hand-based) directed towards the non-selectable object 1130*i* such as an image. In some embodiments, the direct input includes the hand 1136*i* being within a threshold distance (e.g., 0.1, 1, 5, 10, or 100 cm) of the non-selectable object 1130*i*. In some embodiments, the direct input includes the hand 1136*i* being in direct interaction with (e.g., air tapping) the non-selectable object 1130*i* as described with respect to method 2800. In response to and/or while detecting the direct input from the hand 1136*i* and the attention 1132*i* (e.g., hand-based), the computer system 101 displays attention indicator 1134*i* (hand-based) corresponding to the hand 1136*i* with respect to non-selectable object 1130*i*. As shown in FIG. 11, the attention indicator 1134*i* (hand-based) can extend beyond or intersect the boundaries of non-selectable object 1130*i*. The attention indicator 1134*i* (hand-based) includes one or more characteristics of the first visual feedback described with reference to method 2800.

In some embodiments, when both hand-based attention and gaze-based attention is directed to virtual object, the computer system 101 displays a hand-based attention indicator rather than a gaze-based attention indicator. In FIG. 11A, the computer system 101 is detecting attention 1132*n* (e.g., gaze-based) directed towards key 1130*h*. Additionally or alternatively in FIG. 11A, the computer system is detecting attention 1132*o* (e.g., hand-based corresponding to hand 1136*b*) directed towards the key 1130*h*. As shown in FIG. 11A, the computer system displays attention indicator 1134*o* (hand-based) rather than a gaze-based attention indicator. The attention indicator 1134*o* (hand-based) includes one or more characteristics of the first visual feedback described with reference to method 2800.

In some embodiments, hand-based attention indicators change in visual appearance (e.g., size) based on distance between a hand of the user (e.g., the hand providing the attention) and a respective object. Further, in FIG. 11A, the computer system 101 is additionally or alternatively detecting attention 1132*f* (e.g., hand-based corresponding to hand 11360 directed towards key 1130*f*. Accordingly, the computer system 101 displays attention indicator 1134*f* (e.g., hand-based). The attention indicator 1134*f* (hand-based) includes one or more characteristics of the first visual feedback described with reference to method 2800. Unlike gaze-based attention indicators, hand-based attention indicators, such as attention indicators 1134*f*, 1134*i*, and 1134*o*, can extend beyond or intersect the boundaries of their respective objects (e.g., key 1130*f*, non-selectable object 1130*i*, or key 1130*h*). For example, as illustrated in FIG. 11A, the attention indicator (hand-based) 1134*i* is larger in size than attention indicator (hand-based) 1134*o* because the hand 1136*i* is closer to the non-selectable object 1130*i* than the hand 1136*b* relative to the key 1130*h*. In some embodiments, attention indicators (hand-based), such as attention indicators 1134*f*, 1134*i*, and 1134*o*, vary in visual appearance with respect to the boundaries of respective objects (e.g., key 1130*f*, non-selectable object 1130*i*, or key 1130*h*). For example, as described with reference to method 2800, an attention indicator (e.g., hand-based), when displayed, is optionally brighter, less transparent, and/or less blurry within an inner area of a respective object, but fades, is more transparent, is blurrier, or changes in other visual characteristics toward the edges of the attention indicator (hand-based) and/or outside the inner area of the respective object. As shown in FIG. 11A, the inner area of the non-selectable object 1130*i* is less transparent compared to the edges of the non-selectable object 1130*i* when attention indicator 1134*i* (hand-based) is displayed.

In some embodiments, as described with reference to methods 1200 and/or 2800, gaze-based attention indicators are displayed only when a hand of the user is in ready-state while attention (e.g., gaze-based) is directed to a respective object. As illustrated in FIG. 11A, although attention 1132*p* (e.g., gaze-based) is directed towards the key 1130*g*, an attention indicator (e.g., gaze-based) is not displayed because a hand of the user is not in ready-state (e.g., hand is raised or an index finger of the hand is raised) and/or directed to the key 1130.

From FIG. 11A to FIG. 11B, computer system 101 detects movement of the alternative gaze-based and hand-based attentions, and updates attention indicators 1134*a-d* accordingly. For example, in FIG. 11B, attention 1132*a* (e.g., gaze-based) has moved downward and leftward in object 1130*a*, as indicated by the arrow 1138*a* of FIG. 11B. As a result, computer system 101 has moved attention indicator 1134*a* downward and leftward correspondingly, and has switched from masking the right side of attention indicator 1134*a* to masking the bottom side of attention indicator 1134*a*, because attention indicator 1134*a* is colliding with the bottom side of object 1130*a* rather than the right side of object 1130*a*. Similarly, attention 1132*c* (e.g., gaze-based) has moved downward and leftward in object 1130*c*, as indicated by the arrow 1138*c* of FIG. 11B. As a result, computer system 101 has moved attention indicator 1134*c* downward and leftward correspondingly, and has switched from masking the top side of attention indicator 1134*c* to masking the left side of attention indicator 1134*c*, because attention indicator 1134*c* is colliding with the left side of object 1130*c* rather than the top side of object 1130*c*.

In FIG. 11B, attention 1132*b* (e.g., hand-based) has also moved. In particular, computer system 101 detects hand 1136*a* move and/or point leftward. As a result, computer system 101 has moved attention indicator 1134*b* leftward correspondingly, and has switched from masking the right and bottom sides of attention indicator 1134*b* to masking just the bottom side of attention indicator 1134*b*, because attention indicator 1134*b* is colliding with the bottom side of object 1130*b* rather than the right and bottom sides of object 1130*b*.

Finally, in FIG. 11B, attention 1132*d* (e.g., hand-based) has also moved. In particular, computer system 101 detects hand 1136*b* move and/or point downward and rightward. As a result, computer system 101 has moved attention indicator 1134*d* to object 1130*l* from object 1130*e*, and has switched from masking the right and bottom sides of attention indicator 1134*d* to masking just the bottom side of attention indicator 1134*d*, because attention indicator 1134*d* is colliding with the bottom side of object 1130*l* rather than the right and bottom sides of object 1130*e*. Further, despite objects 1130*e* and 1130*l* having different sizes (e.g., object 1130*l* being larger than object 1130*e*), computer system 101 displays attention indicator 1134*d* with the same size in FIGS. 11A and 11B, because attention indicator 1134*d* corresponds to attention 1132*d* from hand 1136*b*, rather than corresponding to gaze-based attention.

As mentioned above, for non-selectable objects, gaze-based attention indicators are not displayed within non-selectable objects. From FIG. 11A to 11B, the hand 1136*i* is no longer directed towards (e.g., no longer in direct interaction with) the non-selectable object 1130*i*. Thus, the computer system 101 ceases display of the attention indicator 1134*i* (hand-based) corresponding to the hand 1136*i* in FIG. 11B. Instead, the computer system 101 is detecting attention 1132*j* (e.g., gaze-based) directed towards the non-selectable object 1130*i* in FIG. 11B. Accordingly, despite attention 1132*j* (e.g., gaze-based) being directed towards the non-selectable object 1130*i* in FIG. 11B, no gaze-based attention indicator is displayed.

In some embodiments, as described with reference to method 2800, a respective object appears to collapse (e.g., move away from the viewpoint of the user) when neither hand-based attention nor gaze-based attention is directed to the respective object. In FIG. 11B, the computer system 101 is no longer detecting attention 1132*o* (e.g., hand-based corresponding to hand 1136*b* from FIG. 11A) nor attention 1132*n* (e.g., gaze-based) from FIG. 11A directed towards the key 1130*h*. In FIG. 11B, because the computer system is no longer detecting hand-based nor gaze-based attention towards the key 1130*h*, the key 1130*h* decreases in size, moves farther away from a viewpoint of the user, and/or appears to have collapsed. Further, in FIG. 11B, the computer system 101 is not displaying the attention indicator 1134*o* from FIG. 11A because the attention 1132*o* (e.g., hand-based corresponding to hand 1136*b* from FIG. 11A) is no longer directed to the key 1130*h*.

In some embodiments, as described with reference to method 2800, the computer system 101 increase a visual prominence of hand-based attention indicator as distance between the hand of the user and a respective object decreases (e.g., the hand of the user moves closer to the respective object). From FIG. 11A to FIG. 11B, because the hand 1136*f* has moved closer to the key 1130*f*, the attention indicator 1134*f* corresponding to attention 1132*f* (hand-based) is more visually prominent (e.g., concentrated, brighter, less blurry, and/or less transparent). In some embodiments, as a hand of the user moves closer a respective object, a hand-based attention indicator increases in size. In some embodiments, as a hand of the user moves closer a respective object, a hand-based attention indicator decreases in size, such as attention indicator 1134*f* (e.g., hand-based) being smaller, brighter, less blurry, and/or less transparent in FIG. 11B compared to FIG. 11A. In some embodiments, hand-based attention indicators decrease in visual appearance (e.g., size brightness, blurriness, and/or transparency) based on an increased distance between a hand of the user and a respective object as described with reference to method 2800.

As described with reference to methods 1200 and/or 2800, unlike hand-based attention indicators, gaze-based indicators do not change in visual appearance based on distance between hand of the user and a respective object. As illustrated in FIG. 11B, attention indicator 1134*b* corresponding to attention 1132*b* (gaze-based) remains unchanged (e.g., size, brightness, blurriness, transparency, and/or other visual characteristic of the attention indicator 1134*b* remains unchanged) regardless of whether a hand of the user (e.g., hand 1136*a*) is closer to object 1130*b* or a hand of the user (e.g., hand 1136*m*) is farther away from the object 1130*b*.

In some embodiments, as described with reference to method 2800, a respective object only appears to expand (e.g., virtual key pops-up) based on gaze-based attention (e.g., in a depth dimension relative to a surface of the user interface). In FIG. 11B, additionally or alternatively, after the key 1130*h* has collapsed (e.g., because attention 1132*o* (e.g., hand-based) and attention 1132*n* (gaze-based) is no longer directed to the key 1130*h*)), the computer system 110 is detecting attention 1132*h* directed to the key 1130*h*. In FIG. 11B, even though the computer system 101 is detecting attention 1132*h* (e.g., hand-based corresponding to hand 1136*h*) directed towards key 1130*h*, the key 1130*h* remains collapsed because the key 1130*h* only appears to expand (e.g., increase in size, "pop-up", and/or move towards the viewpoint of the user or away from a surface of the user interface in a depth dimension) based on gaze-based attention and not based on hand-based attention such as attention 1132*h*.

In FIG. 11B, the computer system 101 is detecting attention 1132*e* (e.g., hand-based corresponding to hand 1136*e*) directed towards key 1130*k*. Accordingly, the computer system 101 displays attention indicator 1134*e* (hand-based). The attention indicator 1134*e* (hand-based) includes one or more characteristics of the first visual feedback described with reference to method 2800.

From FIG. 11B to FIG. 11C, computer system 101 detects progression and/or completion of selection inputs directed to various objects, and updates the corresponding attention indicators and/or the appearance of those objects accordingly. For example, in FIG. 11C computer system 101 detects an air gesture selection input (e.g., an air pinching input from hand 1136*c*, described in more detail with reference to method 1200) directed to object 1130*a* (e.g., because attention 1132*a* is directed to object 1130*a*). In the case of object 1130*a* in FIG. 11C, computer system 101 optionally does not change the appearance of attention indicator 1134*a*, but does change the visual appearance of object 1130*a* (e.g., changes the highlighting, color and/or separation of object 1130*a* from user interface 1126*a*—such as decreasing the separation of object 1130*a* from user interface 1126*a*—as described in more detail with reference to method 1200) to indicate the selection of object 1130*a*.

FIG. 11B 1 illustrates similar and/or the same concepts as those shown in FIG. 11B (with many of the same reference numbers). It is understood that unless indicated below, elements shown in FIG. 11B 1 that have the same reference numbers as elements shown in FIGS. 11A-11C have one or more or all of the same characteristics. Further, some elements of FIG. 11B have been removed from FIG. 11B1 for ease of illustration, but it is understood that all elements and features shown in FIG. 11B optionally apply equally to the example of FIG. 11B1. FIG. 11B1 includes computer system 101, which includes (or is the same as) display generation component 120. In some embodiments, computer system 101 and display generation component 120 have one or more of the characteristics of computer system 101 shown in FIGS. 11A-11C and display generation component 120 shown in FIGS. 1 and 3, respectively, and in some embodiments, computer system 101 and display generation component 120 shown in FIGS. 11A-11C have one or more of the characteristics of computer system 101 and display generation component 120 shown in FIG. 11B1.

In FIG. 11B1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 11A-11C.

In FIG. 11B 1, display generation component 120 is illustrated as displaying content that optionally corresponds to the content that is described as being displayed and/or visible via display generation component 120 with reference to FIGS. 11A-11C. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11B1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 11B1. Because display generation component 120 is optionally a head-mounted device, the field of view of display generation component 120 is optionally the same as or similar to the field of view of the user.

In FIG. 11B1, the user is depicted as performing an air pinch gesture (e.g., with hand 1136a) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11C.

In some embodiments, computer system 101 responds to user inputs as described with reference to FIGS. 11A-11C.

In the example of FIG. 11B1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11C and/or described with reference to the corresponding method(s) are optionally implemented on computer system 101 and display generation unit 120 in a manner similar or analogous to that shown in FIG. 11B1.

Similarly, in FIG. 11C computer system 101 detects an air gesture selection input (e.g., an air pinching input from hand 1136c, described in more detail with reference to method 1200) directed to object 1130c (e.g., because attention 1132c is directed to object 1130c). In the case of object 1130c in FIG. 11C, computer system 101 optionally does not change the appearance of attention indicator 1134c, but does change the visual appearance of object 1130c (e.g., changes the highlighting, color and/or separation of object 1130c from user interface 1126a—such as decreasing the separation of object 1130c from user interface 1126a—as described in more detail with reference to method 1200) to indicate the selection of object 1130c. Further, because object 1130c is optionally smaller than a threshold size (e.g., 0.25, 0.5, 1, 3, 5, 10 or 100 cm$^2$), computer system 101 also displays a selection ring 1139 that at least partially surrounds object 1130c to indicate the selection of object 1130c.

Finally, in FIG. 11C, computer system 101 detects hand 1136a move closer to object 1130b during direct interactions with object 1130b. In response, as shown in FIG. 11C, computer system 101 increases the visual prominence of attention indicator 1134b, such as by increasing its size and/or brightness, to indicate progress towards selecting object 1130b via direct interaction (e.g., corresponding to hand 1136a moving to a position that corresponds to touching or pressing object 1130b for selection).

In some embodiments, as described with reference to method 2800, direct interaction between a hand of the user and a respective object causes selection of the respective object. From FIG. 11B to FIG. 11C, attention 1132g (hand-based) is directed to the key 1130f and the hand 1136f is in direct interaction with the key 1130f (e.g., air tapping the key 1130f). As shown in FIG. 11C, the key 1130f is selected due to direct input (e.g., air tapping) directed to the key 1130f. In FIG. 11C, because the key 1130f has been selected via direct input, the computer system 101 displays a visual indication (e.g., outline or highlighting) around a perimeter of the key 1130f and moves the key 1130f away from a viewpoint of the user (e.g., key 1130f appears smaller from FIG. 11B to FIG. 11C). In some embodiments when a respective object is selected based on gaze-based attention, the computer system 101 forgoes displaying a visual indication (e.g., outline or highlighting) around a perimeter the respective object and forgoes moving the key 1130f away from a viewpoint of the user. In FIG. 11C, the computer system 101 is detecting attention 1132m (gaze-based) directed towards key 1130g and displaying attention indicator (gaze-based) 1134m. Attention indicator (gaze-based) 1134m includes one more characteristics of gaze-based attention indicators described with reference to method 1200 and/or second visual feedback described with reference to method 2800. As shown in FIG. 11C, attention indicator (gaze-based) 1134m is clamped by the boundaries of the key 1130g and cannot extend beyond the boundaries of the key 1130g. The key 1130g is selected and/or the attention indicator (gaze-based) 1134m is displayed because the hand 1136b is optionally in ready-state (e.g., hand 1136b is raised or an index finger of the hand is raised). In FIG. 11C, because the key 1130g has been selected via gaze-based input, the key 1130g is not outlined nor highlighted.

In some embodiments, as described with reference to method 2800, a respective object does not change in size or does not appear to collapse if either gaze-based attention or hand-based attention is directed to the object. As illustrated in FIG. 11C, the dashed boxes around attention 1132n (hand-based) and attention 1132o (gaze-based) indicate attention 1132n (hand-based corresponding to hand 1136h) being directed toward the key 1130h or alternatively attention 1132o (gaze-based) directed towards the key 1130h. From FIG. 11A to FIG. 11C, because attention (e.g., either gaze-based or hand-based) is directed to the key 1130h, the key 1130h remains unchanged (e.g., does not appear to collapse, decrease in size, and/or move away from a viewpoint of the user). In some embodiments, even if attention 1132n (hand-based) is no longer directed to the key 1130h, the key 1130h remains unchanged as long as attention 1132o (gaze-based) is directed to the key 1130h. In some embodiments, even if attention 1132o (gaze-based) is no longer directed to the key 1130h, the key 1130h remains unchanged as long as attention 1132n (hand-based) is directed to the key 1130h.

In some embodiments, as described with reference to method 2800, the computer systems 101 forgoes changing a visual appearance of a hand-based attention indicator corresponding to a respective object despite an increase in size of the respective object or despite different objects being the target of the attention having different sizes. From FIG. 11B to 11C, the key 1130k increases in size but the hand 1136e remains in the same location. Despite the key 1130k becoming larger in FIG. 11C, the visual appearance (e.g., size, transparency, brightness, and/or blurriness) of the attention indicator 1134e (hand-based) remains unchanged because the visual appearance of a hand-based attention indicator is not dependent on a size of a respective object. In some embodiments, a hand-based attention indicator is independent of a size of an object. In some embodiments, the computer system 101 displays the same hand-based attention indicator for different objects that have different sizes. For example, the computer system optionally displays a first attention indicator (e.g., hand-based) for a first object with a first size, where a hand of a user is directed to the first object and is a first distance from the first object. The computer system optionally displays the first (e.g., same) attention indicator (e.g., hand-based) for a second object (e.g., different from the first object) with a second size (e.g., different from the first size), where the hand of the user is directed to the second object and is also the first distance from the second object.

FIGS. 12A-12L is a flowchart illustrating a method 1200 of displaying indication of attention of a user in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, the method 1200 is performed at a computer system in communication with a display generation component and one or more input devices. In some embodiments, the computer system has one or more characteristics of the computer system of the methods 800, 900, 1000, 1400, 1600, 1800, 2000, and/or 2200. In some embodiments, the display generation component has one or more characteristics of the display generation component of one or more of the methods 800, 900, 1000, 1400, 1600, 1800, 2000, and/or 2200. In some embodiments, the one or more input devices have one or more of the characteristics of the one or more input devices of the methods 800, 900, 1000, 1400, 1600, 1800, 2000, and/or 2200, such as a gaze tracking device, a hand tracking device, a remote control, one or more touch-sensitive surfaces, one or more buttons, dials, and/or knobs.

In some embodiments, the computer system displays (1202*a*), via the display generation component, a user interface (e.g., the user interfaces of the methods 800, 900, 1000, 1400, 1600, 1800, 2000, and/or 2200) including a selectable object having an area, virtual content 1126*a* of FIG. 11A. The selectable object having the area optionally has one or more of the characteristics of the selectable user interface objects of one or more of the methods 800, 900, 1000, 1400, 1600, 1800, 2000, and/or 2200. For example, the selectable object is optionally a button (e.g., a virtual button) that is selectable to cause performance of an operation associated with the button (e.g., initiate playback of a content item corresponding to the button). In some embodiments, the selectable object has a surface area instead of an area. For example, if the selectable object is three-dimensional, the selectable object optionally has a surface area. The processes performed in method 1200 with reference to the area of the selectable object are optionally likewise performable with regard to the surface area of the selectable object, if the selectable object has a surface area. In some embodiments, the user interface is displayed in or is a three-dimensional environment. In some embodiments, the three-dimensional environment has one or more of the characteristics of the environments of methods 800, 900, 1000, 1400, 1600, 1800, 2000 and/or 2200.

In some embodiments, while displaying the user interface including the selectable object, the computer system detects (1202*b*), via the one or more input devices, an attention of a user of the computer system, such as attention 1132*a* of FIG. 11A. In some embodiments, detecting the attention of the user includes detecting, via a gaze tracking device, an angle and/or direction of a gaze of a user (e.g., a sight of the user) relative to the user interface and/or the selectable object. In some embodiments, the attention of the user is an attention-only and/or gaze-only input (e.g., not including input from one or more portions of the user other than those portions providing the attention input). In some embodiments, the attention of the user is detected via a hand tracking device, a remote control, one or more touch-sensitive surfaces such as a trackpad, one or more buttons, dials, and/or knobs, or another type of input device.

In some embodiments, in response to detecting the attention of the user, in accordance with a determination that the attention of the user is directed to a first position in the area of the selectable object, the computer system displays (12202*c*), via the display generation component, a visual indication in the area of the selectable object that emphasizes the first position in the area of the selectable object, such as attention indicator 1134*a* of FIG. 11A (e.g., over other positions in the area of the selectable object). The visual indication of the attention of the user is optionally a visually emphasized portion of the selectable object at the first position in the area of the selectable object. For example, the visual indication optionally includes a highlighting, lighting, shadow and/or another visual effect applied in a first region (e.g., a first set of positions in the area of the selectable object, including the first position) surrounding and/or on the first position in the area of the selectable object. In some embodiments, the highlighting, lighting, shadow and/or the other visual effect is not applied to a different portion (or different region) of the area of the selectable object outside of the first region. The visual indication optionally is or includes a second virtual object (e.g., a circular virtual object) overlaid on the first region of the selectable object that is optionally centered at the first position, and optionally not overlaid over a different portion of the area of the selectable object outside of the first region. In such cases, the second virtual object optionally includes a visual emphasis (e.g., highlighting, lighting, shadow and/or another other visual effect) that is different from non-overlaid portion of the area of the selectable object outside of the first region.

In some embodiments, while displaying the visual indication in the area of the selectable object, the computer system detects (1202*d*), via the one or more input devices, movement of the attention of the user (e.g., movement corresponding to movement of the attention of the user), such as the movement indicated by the arrow 1138*a* of FIGS. 11B and 11B1. In some embodiments, in response to detecting the movement of the attention of the user, in accordance with a determination that the attention of the user is directed to a second position in the area of the selectable object, the computer system (1202*e*) changes an appearance of the visual indication in the area of the selectable object so as to emphasize the second position in the area of the selectable object, such as illustrated with the change in the appearance of attention indicator 1134*a* between FIG. 11A and FIGS. 11B and 11B1 (e.g., over other positions in the area of the selectable object such as the first position in the area of the selectable object). In some embodiments, the visual indication, changed in appearance so as to emphasize the second position in the area of the selectable object, includes one or more characteristics that are different from one or more characteristics of the visual indication of the attention of the user at the first position in the area of the selectable object, such as described with reference to step(s) 1206 and 1228, with or without regard to whether overlap exists between the first region and a second region of the selectable object (e.g., a second set of positions in the area of the selectable object, including the second position). For example, the first region and the second region optionally overlap when the first region including the first position also includes the second position and/or when the second region including the second position also includes the first position. Also, in some embodiments, the user interface also includes a non-selectable portion (e.g., a background), different from the selectable object; the visual indication is optionally not displayed in the non-selectable portion even when user attention is directed to the non-selectable portion. Moving (e.g., updating) the visual indication of the attention of the user to a second position in the area of the selectable object in response to detecting movement of the attention of the user from the first position to the second position in the area of the selectable object clearly indicates where the attention of the user is directed, reducing errors in interaction with the computer system.

In some embodiments, the visual indication concurrently emphasizes the first position in the area of the selectable object and the second position in the area of the selectable object (1204). For example, the attention indicator 1134*a* of FIG. 11A extends over a first position and a second position in the area of the object 1130*a* of FIG. 11A. In some embodiments, when the visual indication in the area of the selectable object that emphasizes the first position in the area of the selectable object is displayed, the visual indication likewise extends over the second position in the area of the selectable object (e.g., the second position is optionally within the first region discussed above with reference to step(s) 1202). In some embodiments, when or while the visual indication is changed in appearance so as to empha-size the second position, the visual indication likewise extends over the first position in the area of the selectable object (e.g., the first position is optionally within the second region discussed with reference to step(s) 1202). The visual indication extending over the first position and the second position in the area of the selectable object clearly indicates where the attention of the user is directed, reducing errors in interaction with the computer system.

In some embodiments, displaying, via the display gen-eration component, the visual indication in the area of the selectable object that emphasizes the first position in the area of the selectable object includes displaying the visual indi-cation emphasizing the first position in the area of the selectable object without emphasizing the second position in the area of the selectable object (1206*a*). For example, the attention indicator 1134*a* of FIG. 11A optionally extends over a first position in the area of the object 1130*a* of FIG. 11A without extending over a second position in the area of the object 1130*a* of FIG. 11A (e.g., a position that is outside of the area of the attention indicator 1134*a* but inside of area of the object 1130*a* of FIG. 11A), such as a second position lying within the portion of the object 1130*a* of FIGS. 11B and 11B1 that is covered by the attention indicator 1134*a* of FIGS. 11B and 11B1. In some embodiments, changing the appearance of the visual indication in the area of the selectable object so as to emphasize the second position in the area of the selectable object includes displaying the visual indication emphasizing the second position in the area of the selectable object without emphasizing the first posi-tion in the area of the selectable object (1206*b*), such as the display of the attention indicator 1134*a* of FIGS. 11B and 11B1. In some embodiments, no overlap exists between the first and second regions discussed with reference to step(s) 1202; in such cases, the visual indication does not extend over the second position when or while the visual indication in the area of the selectable object that emphasizes the first position in the area of the selectable object is displayed and does not extend over the first position when or while the visual indication is changed in appearance so as to empha-size the second position. The visual indication extending over the first position without extending over the second position in the area of the selectable object (and vice versa) clearly indicates where the attention of the user is directed within the selectable option, reducing errors in interaction with the computer system.

In some embodiments, the attention of the user is based on a finger of the user (1208), such as a finger of the hand 1136*b* of FIGS. 11B and 11B1. For example, the one or more input devices in communication with the computer system option-ally track and/or determine a location of the fingertip (e.g., of the index finger or other extended finger) of the user (e.g., a "portion of the user", such as described in this present disclosure) and correspond the location of the fingertip to a location of attention of the user in the three-dimensional environment. As such, the location of the visual indication is optionally based at least in part on the location of the fingertip of the user relative to the selectable object, alter-natively or additionally to other locations associated with the attention of the user. In some embodiments, the location of the fingertip is optionally as if a ray is extending through the finger and out the tip of the finger, and where the ray hits the selectable object is the finger-based location. Corresponding a location of the visual indication in the three-dimensional environment to a location of a user's finger clearly indicates the location of finger-based interactions with the selectable object, thus reducing errors in interaction with the computer system.

In some embodiments, the attention of the user is based on a gaze of the user (1210), such as attention 1132*a* of FIG. 11A based on a gaze of the user 1120 of FIG. 11A. For example, the one or more input devices in communication with the computer system optionally track the gaze of the user and correspond the location of the gaze of the user to a location of attention of the user in the three-dimensional environment, such as via a process disclosed in this present disclosure. As such, the location of the visual indication is optionally based at least in part on the user's gaze, alterna-tively or additionally to other locations associated with the attention of the user. Corresponding the visual indication to a location of a user's gaze clearly indicates the location of gaze-based interactions with the selectable object, thus reducing errors in interaction with the computer system.

In some embodiments, the attention of the user is at least in part detected via input from a touch-sensitive surface in communication with the computer system (1212), such input detected via trackpad 746 from hand 1136*d* from FIG. 11A to FIG. 11B. For example, the one or more input devices in communication with the computer system optionally track the attention of the user via inputs detected via the touch-sensitive surface, such as the presence and/or movement of a finger on a trackpad and correspond the inputs detected via the trackpad to a location of attention of the user in the three-dimensional environment. As such, the location of the visual indication is optionally based at least in part on direction, location, and/or movement of a user's finger detected via the touch-sensitive surface, alternatively or additionally to other locations associated with the user. Corresponding the visual indication to a location or move-ments detected by a trackpad clearly indicates the location of trackpad-based locations/movements with the selectable object, thus reducing errors in interaction with the computer system.

In some embodiments, the visual indication in the area of the selectable object has a shape resulting from masking a first shape (e.g., an oval, a circle, a rectangle, a three-dimensional shape, or another type of shape) corresponding to the attention of the user and a second shape of the selectable object (1214), such as the masking of the right side of attention indicator 1134a of FIG. 11A by the shape of the object 1130a of FIG. 11A. The second shape of the selectable object is optionally a similar or different shape than the shape of the visual indication and is of a similar or different size than the size of the shape of the visual indication, such as discussed with reference to step(s) 1222. For example, the visual indication optionally has the first shape when it is displayed in an inner area of the selectable object where the boundaries of the first shape do not intersect with the boundaries of the selectable object, optionally in addition to having a variable visual appearance (e.g., a visual appearance that varies (e.g., fades or changes in other visual characteristics) toward the edges of the visual indication, such as described with reference to step(s) 1202); however, if the visual indication is displayed closer to the boundaries of the selectable object, the visual indication has the first shape except that the portions of the first shape that extend past or intersect with the boundaries of the selectable object are masked and/or not displayed, optionally in addition to having a variable visual appearance (e.g., a visual appearance that varies (e.g., fades or changes in other visual characteristics) toward the edges of the visual indication, such as described with reference to step(s) 1202). Masking a shape of the visual indication by a shape of the selectable object clearly indicates that the selectable object is the focus of attention, and reduces an involvement of correction inputs for correcting erroneous interaction with the selectable object.

In some embodiments, displaying, via the display generation component, the visual indication in the area of the selectable object that emphasizes the first position in the area of the selectable object includes (1216a), in accordance with a determination that a size of the selectable object is a first size (e.g., has a first length, width, and/or height), the visual indication has a second size (e.g., has a second length, width, and/or height) based on the first size (e.g., as a function of or based on the first size) (1216b), such as the size of the attention indicator 1134a in object 1130a in FIGS. 11B and 11B1. In some embodiments, in accordance with a determination that the size of the selectable object is a third size (e.g., has a third length, width, and/or height), different from the first size, the visual indication has a fourth size based on the third size (e.g., as a function of or based on the third size), wherein the fourth size is different from the second size (1216c), such as the size of the attention indicator 1134c in object 1130c in FIGS. 11B and 11B1. For example, when the third size is larger than the first size (optionally from the viewpoint of the user, and optionally independent of the viewpoint of the user), the fourth size is larger than the second size, and when the third size is smaller than the first size (optionally from the viewpoint of the user, and optionally independent of the viewpoint of the user), the fourth size is smaller than the second size. Basing the size of the visual indication on a size of the selectable object ensures that the utility of the attention indicator is maintained for objects of different sizes, reducing errors in interaction with the computer system.

In some embodiments, displaying, via the display generation component, the visual indication in the area of the selectable object that emphasizes the first position in the area of the selectable object includes (1218a), in accordance with a determination that the size of the selectable object is greater than a threshold size (e.g., 2 cm², 5 cm², 10 cm², 50 cm², 1 m², or another threshold size), wherein the first size and the third size are less than the threshold size, the visual indication has a maximum size (e.g., a maximum length, width, and/or height and/or area—in some embodiments, the maximum size is the same as the threshold size, and in some embodiments, the maximum size is different from the threshold size (e.g., larger or smaller)) that is not based on the size of the selectable object (1218b). For example, if the threshold size was less than a size of object 1130a of FIGS. 11B and 11B1 and greater than a size of object 1130b of FIGS. 11B and 11B1, the attention indicator 1134a of FIGS. 11B and 11B1 is configured to have the maximum threshold size. For example, if two selectable objects are of different sizes that are above the threshold size, then the visual indication of attention displayed for those two objects is optionally the same size (e.g., the maximum threshold size). As another example, both a first visual indication that emphasizes a position in the area of a first selectable object having a first size that is greater than the threshold size and second visual indication that emphasizes a position in the area of a second selectable object having a second size that is greater than the threshold size optionally have the same size (e.g., the same size corresponding to an unmasked shape of the first and second visual indications, which is optionally the maximum size). Maximizing a size of the visual indication in response to the size of the selectable object surpassing a threshold size provides more precise feedback of the location of the attention of the user, reducing errors in interaction with the computer system.

In some embodiments, displaying, via the display generation component, the visual indication in the area of the selectable object that emphasizes the first position in the area of the selectable object includes (1220a), in accordance with a determination that the size of the selectable object is less than a threshold size (e.g., 0.5 cm², 2 cm², 10 cm², 40 cm², 1 m², or another threshold size), wherein the first size and the third size are greater than the threshold size, the visual indication has a minimum size (e.g., a minimum length, width, and/or height and/or area—in some embodiments, the minimum size is the same as the threshold size, and in some embodiments, the minimum size is different from the threshold size (e.g., larger or smaller) that is not based on the size of the selectable object (1220b). For example, if the threshold size was less than a size of object 1130a of FIGS. 11B and 11B1 and greater than a size of object 1130b of FIGS. 11B and 11B1, the attention indicator 1134a of FIGS. 11B and 11B1 is configured to have the maximum threshold size. For example, if two selectable objects are of different sizes that are below the threshold size, then the visual indication of attention displayed for those two objects is optionally the same size (e.g., the minimum threshold size). As another example, both a first visual indication that emphasizes a position in the area of a first selectable object having a first size that is less than the threshold size and second visual indication that emphasizes a position in the area of a second selectable object having a second size that is less than the threshold size optionally have the same size (e.g., the same size corresponding to an unmasked shape of the first and second visual indications, which is optionally the minimum size). Minimizing a size of the visual indication in response to the size of the selectable object being below a threshold size ensures that the visual indication remains visible even for small selectable objects, reducing errors in interaction with the computer system.

In some embodiments, a size (e.g., a length, width, height, and/or another dimension) of the visual indication is greater than a size of a smallest dimension (e.g., a dimension corresponding to a length, width, height, and/or another dimension, whichever is or are smallest) of the selectable object (1222). For example, a width of the attention indicator 1134*d* in FIG. 11A is greater than a width of the object 1130*e* of FIG. 11A. Sizing the visual indication to be greater than a size of a smallest dimension of the selectable object ensures clear visibility of the visual indication, and therefore clearly indicates selection of the selectable object and reduces correction inputs involved with selecting the selectable object.

In some embodiments, the visual indication is partially transparent (1224), such as illustrated with the partial transparency of attention indicator 1134*d* of FIG. 11A that partially shows "9" in the object 1134 of FIG. 11A. For example, one or more objects (real or virtual) obscured by the visual indication are optionally seen in part through the visual indication, as the one or more objects are optionally partially obscured (e.g., by 0.8, 2, 5, 10, 30 percent, or another percentage) by the visual indication. For example, the content of the selectable object obscured by the visual indication is optionally also visible. A partially transparent visual indication increases user safety and user cognition of orientation and perspective in the three-dimensional environment (optionally relative to the real-world environment) during interaction with the computer system, and ensures that the content of the selectable object remains visible, reducing errors in interaction with the computer system.

In some embodiments, in response to detecting the movement of the attention of the user, in accordance with the determination that the attention of the user is directed to the second position in the area of the selectable object, changing the appearance of the visual indication in the area of the selectable object so as to emphasize the second position in the area of the selectable object includes smoothly moving the visual indication from the first position in the area of the selectable object to the second position in the area of the selectable object, wherein one or more characteristics of the movement of the visual indication from the first position in the area of the selectable object to the second position in the area of the selectable object are different from one or more characteristics of the movement of the attention of the user from the first position to the second position (1226), such as smoothly moving the attention indicator 1138*a* in the direction indicated by the arrow 1138*a* of FIG. 11A to the position of the attention indicator 1138*a* in FIGS. 11B and 11B1. For example, the visual indication is optionally based at least in part on a user's attention, and the user's attention can be directed to the first position and then moved to the second position that is, for example, an angular distance of 5 degrees from the user's attention directed to the first position, without, for example, the user's attention being directed to a third position that is in between the first position and the second position, such as at an angular distance of 2.5 degrees from the user's attention directed to the first position. Instead of the visual indication instantly transitioning to the second position, the computer system optionally smooths the motion of the visual indication to the second position by, for example, displaying the visual indication translating through the third position (optionally in addition to other angular positions from the viewpoint of the user between the first position and the second position). Further, the smoothed motion of the movement of the visual indication is optionally a continuous movement relative to a human eye, such that the user observes a smooth motion of the visual indication (e.g., a frame rate corresponding to a display of the motion of the visual indication is such that the user observes a continuous motion of the visual indication from the first position to the second position). In some embodiments, one or more characteristics of the movement of the visual indication from the first position in the area of the selectable object to the second position in the area of the selectable object are similar to or the same as one or more characteristics of the movement of the attention of the user from the first position to the second position. For example, the visual indication is optionally based at least in part on a user's finger and/or inputs detected via a touch-sensitive surface such as a trackpad, and such inputs can be directed to the first position and then to the second position by, for example, a continuous motion of the user's finger and/or the inputs detected via the touch-sensitive surface; in such cases, one or more characteristics of the movement of the visual indication (e.g., a speed and direction) from the first position in the area of the selectable object to the second position in the area of the selectable object are optionally similar to or the same as one or more characteristics of the movement of the attention of the user (e.g., a speed and direction) from the first position to the second position. A smoothed motion of the visual indication ensures continued utility of the visual indication in providing feedback of selection, and reduces sudden changes in the user interface, reducing errors in interaction with the computer system.

In some embodiments, displaying the visual indication in the area of the selectable object that emphasizes the first position in the area of the selectable object includes displaying the visual indication with a first portion of the visual indication masked by the selectable object (1228*a*) (e.g., a shape of the visual indication is masked by a shape of the selectable object, such as described with reference to step(s) 1214), such as the masking of the right side of attention indicator 1134*a* of FIG. 11A by the shape of the object 1130*a* of FIG. 11A. As such, the visual indication in the area of the selectable object that emphasizes the first position in the area of the selectable object is optionally displayed without the first portion of the visual indication, such as described with reference to step(s) 1214.

In some embodiments, changing an appearance of the visual indication in the area of the selectable object so as to emphasize the second position in the area of the selectable object includes displaying the visual indication with a second portion of the visual indication masked by the selectable object, different from the first portion of the visual indication (1228*b*), such as the masking of the bottom side of attention indicator 1134*a* of FIG. 11A by the shape of the object 1130*a* of FIGS. 11B and 11B1. As such, the visual indication in the area of the selectable object that emphasizes the second position in the area of the selectable object is optionally displayed with the first portion of the visual indication and without the second portion of the visual indication. Masking different portions of the visual indication clearly indicates the boundaries of the selectable object, thereby reducing errors in interaction with the selectable object.

In some embodiments, in response to detecting the movement of the attention of the user, and in accordance with a determination that the attention of the user is directed to a third position in a second area of a second selectable object in the user interface, different from the selectable object (1230*a*), the computer system ceases display (1230*b*) of the visual indication in the selectable object, such as ceasing display of the attention indicator 1134*d* in object 113*e* of FIG. 11A. In some embodiments, the computer system displays (1230*c*), via the display generation component, the visual indication at the third position in the second area of the second selectable object that emphasizes the third position in the second area of the second selectable object (e.g., in one or more of the ways described with reference to step(s) 1202), such as displaying the attention 1132*d* in object 1130*l* of FIG. 11B. Ceasing display of the visual indication in the selectable object and displaying the visual indication in the second selectable object clearly indicates selection of the second selectable object and reduces correction inputs involved with selecting the second selectable object when the attention of the user moves from the selectable object to the second selectable object.

In some embodiments, the selectable object is a first selectable object (1232*a*). In some embodiments, displaying the visual indication in the area of the first selectable object that emphasizes the first position in the area of the first selectable object includes displaying the visual indication with a first portion of the visual indication masked by the first selectable object (1232*b*) (e.g., a shape of the visual indication is masked by a shape of the first selectable object, such as described with reference to step(s) 1214 and/or 1228), such as illustrated with the masking of attention indicator 1134*d* in object 1130*e* in FIG. 11A. The visual indication in the area of the first selectable object that emphasizes the first position in the area of the first selectable object is optionally displayed without the first portion of the visual indication, such as described with reference to step(s) 1214 and/or 1228.

In some embodiments, displaying the visual indication at the third position in the second area of the second selectable object that emphasizes the third position in the second area of the second selectable object includes displaying the visual indication with a second portion of the visual indication, different from the first portion of the visual indication, masked by the second selectable object (1232*c*), such as illustrated with the masking of attention indicator 1134*d* in object 1130*l* in FIGS. 11B and 11B1. The second selectable object optionally has a similar or different shape as the first selectable object. The visual indication in the second area of the second selectable object that emphasizes the third position in the second area of the second selectable object is optionally displayed without the second portion of the visual indication, such as described with reference to step(s) 1214 and/or 1228. Masking different portions of the visual indication in response to movement of the visual indication from the selectable object to the second selectable object clearly indicates the boundaries of the second selectable object, thereby reducing errors in interaction with the second selectable object.

In some embodiments, the selectable object is a key on a keyboard in the user interface (1234) (e.g., a soft keyboard displayed by the computer system), such as object 1130*e* of the virtual content 1128*a* of FIG. 11A. In some embodiments, selection of the key causes a corresponding character to be entered into the user interface, such as into a text entry field in the user interface. Including keys of a keyboard as the selectable object assists with selection of keys on the keyboard and reduces correction inputs involved with selecting keys on the keyboard.

In some embodiments, the selectable object is a button in the user interface (1236), such as object 1130*a* of the virtual content 1126*a* of FIG. 11A. In some embodiments, selection of the button causes a corresponding action to be performed in the user interface, such as playing content in the user interface or displaying a new object (e.g., a user interface of a different application) in the user interface. Including a button as the selectable object assists with selection of the button and reduces correction inputs involved with selecting the button.

In some embodiments, the selectable object is a selectable platter (e.g., such as described with reference to method 1600) in the user interface (1238) (e.g., a system user interface or a control center user interface), such as the virtual content 1126*a* of FIG. 11A. For example, the selectable platter is optionally a region of the user interface that includes four selectable buttons corresponding to different controls for a computer system, and a selectable background portion, which may or may not include text content. In response to selection of the selectable background portion, the region of the user optionally includes additional or alternative selectable buttons corresponding to different controls for the computer system. In some embodiments, the selectable platter includes a first set of selectable objects, and in response to user input directed to the selectable platter, the selectable platter expands to display of a second set of selectable objects, optionally different from the first set of selectable objects or optionally including the first set of selectable objects in addition to the second set of selectable objects. Including a selectable platter as the selectable object assists with selection of the selectable platter and reduces correction inputs involved with selecting the selectable platter.

In some embodiments, in response to detecting the attention of the user, and in accordance with the determination that the attention of the user is directed to the first position in the area of the selectable object, the computer system changes (1240) a visual appearance of the selectable object outside of the area in the selectable object in which the visual indication is displayed, such as the visual effect 1137*a* in the object 1130*a* in FIG. 11A. In some embodiments, such as embodiments in which the visual indication is partially transparent such as discussed above with reference to step(s) 1226, the method 1200 additionally or alternatively includes: in response to detecting the attention of the user, and in accordance with the determination that the attention of the user is directed to the first position in the area of the selectable object, changing a visual appearance of the selectable object inside and outside of the area in the selectable object. The area in the selectable object in which the visual indication is displayed is optionally smaller than a total area of the selectable option. In some embodiments, the changes to the visual appearance of the selectable object outside of the area of the visual indication are one or more of those changes described with reference to step(s) 1241-1252. Displaying visual changes to the selectable object other than the visual changes resulting from the presence of the visual indication in the selectable object further clearly indicates that the selectable option is the subject of attention of the user, thereby reducing errors in interaction with the computer system.

In some embodiments, changing the appearance of the selectable object outside of the area in which the visual indication is displayed includes displaying a simulated specular highlight (e.g., a highlight tint or a simulated reflection and/or refraction of light from an edge of the selectable object (e.g., as though the selectable object were made of glass)) around or on at least one edge of the selectable object (1242), such as the visual effect 1137*c* in FIG. 11A being a simulated highlight around or on at least one edge of the object 1130*c* of FIG. 11A. Displaying a simulated specular highlight around an edge of the selectable object assists with indicating the boundaries of the selectable object, thereby clearly indicating the extent of intractability with the selectable object.

In some embodiments, displaying the simulated specular highlight around or on the at least one edge of the selectable object is performed based on or in accordance with a physical lighting of a physical environment of the user of the computer system (1244), such as the visual effect 1137*b* in FIG. 11A being based on a physical lighting of the real world environment 1102. For example, the computer system optionally simulates a specular highlight on the selectable object, as if the selectable object was being highlighted or illuminated by a light source of the physical environment of the user. For example, the operations optionally include the specular highlight on the selectable object simulating the light source of the physical environment being incident on the selectable object, including being based on one or more characteristics of the light source such as a location of the light source and/or an intensity of the light source at a location of the physical environment that corresponds to a location of the display of the selectable object in the three-dimensional environment. Details with reference to the correspondence between locations of the three-dimensional environment and locations of the physical environment are provided in this present disclosure. Displaying the simulated specular highlight around the edge of the selectable object based on actual lighting of the physical environment of the user increases user immersion, assists with indicating the boundaries of the selectable object in a manner that is consistent with other objects that might be visible via the display generation component, thereby clearly indicating the extent of intractability with the selectable object, and reduces correction inputs involved with selecting the selectable object.

In some embodiments, displaying the simulated specular highlight around the at least one edge of the selectable object is performed based on simulated lighting of a three-dimensional environment (e.g., an augmented reality, mixed reality, and/or a virtual reality environment, or another type of three-dimensional environment discussed in this present disclosure) displayed by the computer system (1246), such as the visual effect 1137*a* in FIG. 11A being based on simulated lighting of the three-dimensional environment 1104 of FIG. 11A. For example, the simulated lighting is optionally a lighting of an environment that is simulated by the computer system, and the method 1200 optionally includes the computer simulating the specular highlight on the selectable object via applying the simulated lighting of the three-dimensional environment on the selectable object (e.g., causing the simulated lighting to appear to be incident on the selectable object at the location of the selectable object in the three-dimensional environment). Displaying the simulated specular highlight around the edge of the selectable object based on simulated lighting of a three-dimensional environment of the user increases user immersion, assists with indicating the boundaries of the selectable object in a manner that is consistent with other objects that might be visible via the display generation component, thereby clearly indicating the extent of intractability with the selectable object, and reduces correction inputs involved with selecting the selectable object.

In some embodiments, the computer system detects (1248*a*), via the one or more input devices, the attention of the user directed to a respective user interface that includes the selectable object and to a portion of the respective user interface that is different from the selectable object, such as attention 1132*a* of FIG. 11A. The portion does not include a simulated specular highlight when the attention of the user directed to the respective user interface is received. In some embodiments, the respective user interface does not include the selectable object, and is a different object in the user interface than the selectable object.

In some embodiments, in response to detecting the attention of the user directed to the respective user interface, in accordance with a determination that the attention of the user is directed to the portion of the respective user interface, the computer system displays (1248*b*) the simulated specular highlight on the portion of the respective user interface, wherein one or more of the characteristics of the simulated specular highlight on the portion of the respective user interface are the same as one or more characteristics (e.g., color, relative placement, brightness, diffusivity at the location of the simulated specular highlight, size, and/or other characteristics) of the simulated specular highlight on the selectable option and additionally or alternatively, causing the portion of the respective user interface to come to focus, such as when the portion of the respective user interface is an application window. For example, if object 1130*b* of FIG. 11A was the portion and object 1130*a* of FIG. 11A was the selectable object, then the visual effect 1137*b* in the object 1130*b* is optionally similar to the visual effect 1137*a* in the object 1130*a*. As such, the simulated specular highlight applied to the selectable object is optionally the same or similar to the simulated specular highlight applied to an application window that is displayed when the application window is in focus. Displaying a same or similar type of simulated specular highlight around the edge of the selectable object as a type of simulated specular highlight displayed on an application window when the application window is in focus ensures consistent display of feedback relating to which objects have the attention of the user, and reduces correction inputs involved with selecting objects.

In some embodiments, changing the appearance of the selectable object outside of the area in which the visual indication is displayed includes highlighting the selectable object (1250) (e.g., the whole selectable object is optionally highlighted as distinct from a simulated specular highlight applied to a portion of the selectable object), such as illustrated with the pattern of objects 1130*a*-1130*c* in FIGS. 11B and 11B1. Highlighting the selectable object optionally includes one or both of highlighting the area of the selectable object in which the visual indication is displayed and highlighting the area of the selectable object that is outside of the area of the selectable object in which the visual indication is displayed. Highlighting the selectable object assists with confirmation of selection of the selectable object, and reduces correction inputs involved with selecting the selectable object.

In some embodiments, in response to detecting the attention of the user, and in accordance with the determination that the attention of the user is directed to the first position in the area of the selectable object, the computer system changes (1252) a visual separation of the selectable object from a respective portion of the user interface. For example, the object 1130*a* optionally moves closer to the user 1120 in response to attention 1132*a* directed to the object 1130*a* in FIG. 11A, while maintaining a distance between the viewpoint of the user 1120 and other parts of the virtual content 1126*a* of FIG. 11A. For example, changing the visual separation of the selectable object from the respective portion of the user interface optionally includes visually separating (and/or further visually separating) the selectable object from a background portion of the user interface over which the selectable option is displayed, such as moving the selectable object towards the viewpoint of the user, and/or visually separating layers of the selectable object, such that a first layer of the selectable object is closer to a viewpoint of the user than a second layer of the selectable object. Moving one or more portions of the selectable object relative to the respective portion of the user interface assists with confirmation of selection of the selectable object and reduces correction inputs involved with selecting the selectable object.

In some embodiments, a visual appearance of the visual indication in the area of the selectable object changes based on distance from a (optionally center) location of the attention of the user (1254), such as the gradient of magnitude of the virtual lighting effect of the attention indicator 1134*a* of FIG. 11A as indicated by arrow 1135 of FIG. 11A. For example, at a first distance from the location of the attention of the user, the visual appearance of the visual indication has a first characteristic value, such as a first value of a brightness metric or of another type of metric, and at a second distance from the location of the attention of the user, the visual appearance of the visual indication has a second characteristic value, such as a second value of the brightness metric or of another type of metric. In some embodiments, the location of the attention of the user is or is approximated to be a central location of the visual indication. In some embodiments, the visual indication has a gradual fall-off near one or more edges of the visual indication to, for example, indicate a distance from a center point of the attention of the user. Displaying the visual indication with a visual appearance that changes based on a distance from a location of the attention of the user clearly indicates the center or central portion of the attention of the user, and reduces correction inputs involved with selecting the selectable object.

In some embodiments, detecting, via the one or more input devices, the attention of the user of the computer system includes detecting a gaze of the user (1256*a*), such as attention 1132 of FIG. 11A. In some embodiments, in response to detecting the attention of the user and in accordance with a determination that one or more criteria are satisfied, including a criterion that is satisfied when the attention of the user is directed to the selectable object for a predetermined time period (e.g., 0.1, 0.3, 0.5, 1, 2, 3, 5, 10, 20 or 30 seconds, or another predetermined time period), the computer system changes (1256*b*) a visual separation of the selectable object from a respective portion of the user interface, such as moving the object 1130*a* closer to the viewpoint of the user 1120 in response to attention 1132*a* directed to the object 1130*a* in FIG. 11A, while maintaining a distance between the viewpoint of the user 1120 and other parts of the virtual content 1126*a* of FIG. 11A. For example, changing the visual separation of the selectable object from the respective portion of the user interface optionally includes visually separating (and/or further visually separating) the selectable object from a background portion of the user interface over which the selectable option is displayed, such as moving the selectable object towards the viewpoint of the user, and/or visually separating layers of the selectable object, such that a first layer of the selectable object is closer to a viewpoint of the user than a second layer of the selectable object. Moving one or more portions of the selectable object relative to the respective portion of the user interface in response to detecting the user's gaze assists with confirmation of selection of the selectable object and reduces correction inputs involved with selecting the selectable object.

In some embodiments, in response to detecting the attention of the user and in accordance with the determination that the one or more criteria are satisfied (e.g., as described with reference to methods 800, 900 and/or 1000), the computer system displays (1258), via the display generation component, a gaze target associated with the selectable object, such as described with reference to the methods 800, 900, and/or 1000, such as displaying a gaze target in response to attention 1132*a* of the user 1120 being directed to the object 1130*a* in FIG. 11A for a threshold time (e.g., 0.1, 0.3, 0.5, 1, 2, 3, 5, 10, 20 or 30 seconds, or another predetermined time period). Displaying the gaze target in response to detecting the attention of the user and in accordance with satisfaction of the one or more criteria assists with confirmation of selection of the selectable object and reduces correction inputs involved with selecting the selectable object.

In some embodiments, the user interface includes at least the selectable object and a second selectable object (1260*a*), such as the object 1130*a* and object 1130*b* of FIG. 11A. In some embodiments, in response to detecting the attention of the user and in accordance with a determination that the attention of the user is directed to the selectable object (1260*b*), such as attention 1132*a* of FIG. 11A, in accordance with a determination that interaction with the user interface is in accordance with a first mode, such as a mode described with reference to step(s) 1264 and/or a direct input mode, in which user input does not include a gaze of the user, or in which user input includes a portion of the user, such as a hand, finger or fingertip of the user (optionally detected via the one or more input devices) within a threshold distance from the user interface and in which the portion of the user directly interacts with the selectable object), the computer system displays (1260*c*) the selectable object with a first visual characteristic having a first value (optionally including a display of the selectable object at a first distance from a background portion of the user interface and/or including a display of the selectable object such that a distance from the viewpoint of the user and the selectable object of the interface is shorter than a distance from the viewpoint of the user and the background portion of the user interface, optionally showing the selectable object lifted up from the background portion of the user interface) and the second selectable object with the first visual characteristic having the first value (optionally including a display of the second selectable object at the first distance from the background portion of the user interface and/or including a display of the second selectable object such that a distance from the viewpoint of the user and the second selectable object of the interface is shorter than a distance from the viewpoint of the user and the background portion of the user interface, optionally showing the second selectable object lifted up from the background portion of the user interface). Also, in the first mode, the operations optionally include the selectable object and the second selectable object optionally changing in appearance additionally or alternatively by changing in size (e.g., increasing in size) optionally from the viewpoint of the user optionally by way of the visual separation of the selectable object and the second selectable object from the background portion discussed above. For example, the object 1130*a* and object 1130*b* of FIG. 11A are displayed at a same distance from the viewpoint of the user 1120 and/or a same distance from a background portion of the virtual content 1126*a* of FIG. 11A.

In some embodiments, in accordance with a determination that interaction with the user interface is in accordance with a second mode, such as a mode described with reference to step(s) 1256 and/or an indirect input mode, in which user input includes at least a gaze of the user, optionally in combination with other types of input such as air pinching inputs from a hand of the user), different from the first mode, the computer system displays (1260*d*) the selectable object with the first visual characteristic having the first value and the second selectable object with the first visual characteristic having a second value (optionally including a display of the second selectable object at a second distance from the background portion of the user interface, different from the first distance, and/or including a display of the second selectable object such that a distance from the viewpoint of the user and the second selectable object of the interface is longer than a distance from the viewpoint of the user and the selectable object), different from the first value. For example, the object 1130a and object 1130b of FIG. 11A are displayed at different distances from the viewpoint of the user 1120 and/or a different distance from a background portion of the virtual content 1126a of FIG. 11A, such that, for example, the object 1130a, in response to attention 1132a, is closer to the viewpoint of the user 1120 than object 1130b. Also, in the second mode, the operations optionally include the selectable object and the second selectable object optionally changing in appearance additionally or alternatively by changing in size (e.g., the selectable object increases in size) by way of the relative difference in visual separation of the selectable object and the second selectable object from the background portion discussed above. Displaying the selectable object and the second selectable object in different manners based on a mode of interaction with the user interface clearly conveys the current input mode and reduces correction inputs involved with selecting either object in the respective mode.

In some embodiments, in response to detecting the attention of the user (1262a), in accordance with a determination that the attention of the user is directed to the selectable object, such as attention 1132a directed to object 1130a in FIG. 11A, the computer system displays the selectable object with the first visual characteristic having the first value and a second visual characteristic having a third value (optionally including displaying the visual indication, such as described with reference to step(s) 1202, in/on the selectable object and/or highlighting one or more portions of the selectable object with a selection highlight, such as described with reference to step(s) 1242, 1248, and 1250), such as displaying the attention indicator 1134a of FIG. 11A in response to attention 1132a directed to object 1130a, and displays the second selectable object with the second visual characteristic having a fourth value, different from the third value (1262b), such as displaying object 1130b in FIG. 11A without the attention indicator 1134b when attention is not directed to object 1130b (optionally including the second selectable object without a visual indication in/on the second selectable object or without highlighting one or more portions of the second selectable object with a highlight that is applied for selection).

In some embodiments, in accordance with a determination that the attention of the user is directed to the second selectable object, such as attention 1132b directed to object 1130b in FIG. 11A, the computer system displays the second selectable object with the first visual characteristic having the first value, such as displaying the attention indicator 1134b of FIG. 11A in response to attention 1132b directed to object 1130b, and the second visual characteristic having the third value, and displays the selectable object with the second visual characteristic having the fourth value (1262c), such as displaying object 1130a in FIG. 11A without the attention indicator 1134a when attention is not directed to object 1130a. As such, independent of mode of interaction with the user interface, the selectable object that is the subject of the attention of the user is optionally additionally displayed with visual characteristics that are based on the selectable object being the subject of the attention of the user, such as visual characteristics as described with reference to step(s) 1202, 1242, 1248, and 1250. Displaying a selectable object with features that are based on the selectable object being the subject of the attention of the user assists clearly conveys which object has the attention of the user independent of the current input mode, and reduces correction inputs involved with selecting the selectable object.

In some embodiments, displaying the visual indication in the area of the selectable object such as the attention indicator 1134b in FIGS. 11B and 11B1, includes (1264a), while interaction with the user interface is in accordance with a first mode (e.g., direct input or interaction mode, such as described with reference to step(s) 1260 and 1262), in which detecting, via the one or more input devices, the attention of the user of the computer system includes detecting spatial interaction (e.g., simulated contact) between a portion of the user and the selectable object (1264b) (optionally within a threshold distance of the selectable object (e.g., 0.2 cm, 0.5 cm, 1 cm, 2 cm, 3 cm, 5 cm, 10 cm, 20 cm, 40 cm, 100 cm, 200 cm, 500 cm or another threshold distance)), such as a distance between the hand 1136a and the object 1130b in FIGS. 11B and 11B1 in the three-dimensional environment 1104, in accordance with a determination that the portion of the user is a first distance from the selectable object, displaying the visual indication with a first visual appearance (1264c) (optionally including a first brightness value or a first range of brightness values, a first amount of blur, and/or a first size), such as the attention indicator 1134b in FIGS. 11B and 11B1.

In some embodiments, in accordance with a determination that the portion of the user is a second distance from the selectable object, such as a distance of between the hand 1136a and the object 1130b in FIG. 11C, different from the first distance, the computer system displays the visual indication with a second visual appearance (optionally including a second brightness value or a second range of brightness values, a second amount of blur, and/or a second size), different from the first visual appearance (1264d), as the attention indicator 1134b in FIG. 11C, which is larger than the attention indicator 1134b in FIGS. 11B and 11B1. For example, when the first distance is shorter than the second distance, the visual indication optionally is smaller in size compared with a size of the visual indication at the second distance. Also, as a distance between the portion of the user and the selectable object decreases, the brightness value optionally increases, the blur of the visual indication optionally decreases, and the size of the visual indication optionally decreases. Further, as a distance between the portion of the user and the selectable object increases, the brightness value optionally decreases, the blur of the visual indication optionally increases, and the size of the visual indication optionally increases. Displaying the visual indication in different manners based on a mode of interaction with the user interface and on a distance between the portion of the user and selectable object to which the visual indication is applied clearly indicates distance between the portion of the user and the selectable object, which assists with correctly selecting the selectable object and reduces correction inputs involved with selecting the selectable object.

In some embodiments, while interaction with the user interface is in accordance with a second mode (e.g., indirect input or interaction mode, such as described with reference to step(s) 1256, 1260 and 1262), different than the first mode, in which detecting, via the one or more input devices, the attention of the user of the computer system includes detecting a gaze of the user (1266a), such as the attention indicator 1134a in FIG. 11A, in accordance with a determination that the portion of the user is a third distance (optionally the same or different than the first distance discussed with reference to step(s) 1264) from the selectable object, such as a distance between the user 1120 and the object 1130a in the three-dimensional environment 1104 in FIG. 11A, the computer system displays the visual indication with a third visual appearance (1266b) (optionally including a third brightness value or a third range of brightness values, a third amount of blur, and/or a third size), such as the attention indicator 1134a in FIG. 11A.

In some embodiments, in accordance with a determination that the portion of the user is a fourth distance (optionally the same or different than the second distance discussed with reference to step(s) 1264) from the selectable object, such as a different distance between the user 1120 and the object 1130a in the three-dimensional environment 1104 in FIG. 11A different from the third distance, the computer system displays the visual indication with the third visual appearance (1266c), such as the attention indicator 1134a in FIG. 11A. As such, while interaction with the user interface is in accordance with the second mode, characteristics of the visual indication (optionally other than the potential of masking of the visual indication by a shape of the selectable object), optionally do not change based on a distance between the portion of the user and the selectable object. Forgoing changing the third visual appearance of the visual indication based on a distance between the portion of the user and the selectable object when interaction with the user interface is in accordance with the second mode clearly indicates that the distance of the portion of the selectable object from the selectable object does not affect selection of the selectable object, and reduces correction inputs involved with selecting the selectable object in the second mode.

In some embodiments, displaying the visual indication in the area of the selectable object includes (1268a), in accordance with a determination that movement of the attention of the user is above a threshold speed (e.g., 1 cm/s, 9 cm/s, 0.2 m/s, 0.5 m/s, 1 m/s, 3 m/s, or another threshold speed), reducing a visual prominence of the visual indication, optionally including reducing a brightness, size, and/or increasing a blurriness of the visual indication, during the movement of the attention of the user (1268b), such as reducing the visual prominence of the attention indicator 1134a during the movement of attention of the user (and corresponding movement of the attention indicator 1134a as indicated by the arrow 1138a) from FIG. 11A to FIGS. 11B and 11B1. Also, in some embodiments, when the movement of the attention of user is above the threshold speed, the visual prominence is maintained. Decreasing a visual prominence of the visual indication when movement of the attention of the user is above a threshold speed avoids disruption of the display of content in the user interface when selection is unlikely, thereby reducing errors in interaction with the user interface.

In some embodiments, displaying the visual indication in the area of the selectable object includes (1270a), in accordance with a determination that movement of the attention of the user is below a threshold speed (e.g., 1 cm/s, 9 cm/s, 0.2 m/s, 0.5 m/s, 1 m/s, 3 m/s, or another threshold speed), increasing a visual prominence of the visual indication, optionally including increasing a brightness, size, and/or reducing a blurriness of the visual indication, during the movement of the attention of the user (1270b), such as increasing the visual prominence of the attention indicator 1134a during the movement of attention of the user (and corresponding movement of the attention indicator 1134a as indicated by the arrow 1138a) from FIG. 11A to 11B. Also, in some embodiments, when the movement of the attention of user is above the threshold speed, the visual prominence is maintained. Increasing a visual prominence of the visual indication when movement of the attention of the user is below a threshold speed ensures visibility of the attention indicator when selection is likely, and reduces correction inputs involved with selecting the selectable object.

In some embodiments, while displaying the visual indication in the area of the selectable object, the computer system detects (1272a), via the one or more input devices, a selection input corresponding to a request to select the selectable object, such as detecting an air gesture performed by the hand 1136b of the user toward the object 1130l of FIG. 11C, such as detecting one or more clicks on a touch-sensitive surface such as a trackpad corresponding to selection of the selectable object, detecting attention of a user, and/or detecting an air gesture described within this disclosure (e.g., air pinch inputs (e.g., an air gesture that includes movement of two or more fingers of a hand to make contact with one another, that is, optionally, followed by an immediate (e.g., within 0-1 seconds) break in contact from each other) directed to the selectable object, or another type of air pinch, tap inputs ((e.g., directed to the selectable object) performed as an air gesture that includes movement of a user's finger(s) toward the selectable object, movement of the user's hand toward the selectable object optionally with the user's finger(s) extended toward the selectable object, a motion of a user's finger (e.g., mimicking a tap on a screen), or another predefined movement of the user's hand), air pinch and drag gestures (e.g., an air gesture includes an air pinch gesture (e.g., an air pinch gesture or a long air pinch gesture) performed in conjunction with (e.g., followed by) a drag input that changes a position of the user's hand from a first position (e.g., a start position of the drag) to a second position (e.g., an end position of the drag)), or another type of air gesture).

In some embodiments, in response to detecting the selection input corresponding to the request to select the selectable object, the computer system performs (1272b) an operation associated with the selectable object, such as performing the "return" function of the soft keyboard associated with the object 1130l in FIG. 11C such as displaying a second user interface associated with the selectable object, performing a search based on a search query, inserting a key into a text field, or another type of operation associated with the selectable object. Performing an operation in response to detecting a selection input selecting the selectable object reduces inputs involved with performing the operation.

In some embodiments, the selection input corresponding to the request to select the selectable object (e.g., the air gesture performed by the hand 1136a of the user toward the object 1130b of FIGS. 11B and 11B1) includes a first part and a second part (1274a), such as an air pinch input (e.g., the index and thumb of the user coming together and touching) and a subsequent drag input (e.g., the hand of the user moving while in the pinch hand shape), in which optionally there is a first part of the air pinch input including a first part of the movement of the fingers towards each other to a middle distance between them and a second part of the air pinch input including the continued movement of the fingers from the middle distance and to the touching of the fingers or a first part of the drag input including a first part of the movement of the change in position of the hand from a first position to a second position and a second part of the drag input including a second part of the movement of the change in position of the hand from the second position to a third position, or another combination of the parts of the air pinch input and the drag input, a gaze input dwelling on the selectable object for a threshold time period including a first time period and a second time period, or any combination thereof. Further, additionally or alternatively, the first part and the second part optionally include one or more parts of air gestures, gaze detection, inputs detected via a touch-sensitive surface, direct inputs, indirect inputs, distances between the selectable object and a portion of the user being a first distance at a first time and a second distance at a second time described in this present disclosure, or any combination thereof.

In some embodiments, in response to detecting the first part of the selection input and/or before detecting the second part of the selection input, the computer system increases (1274b) a visual prominence of the visual indication, optionally including increasing a brightness, size, and/or reducing a blurriness of the visual indication, such as increasing the visual prominence of the attention indicator such as illustrated with the difference in visual pattern between the attention indicator 1134b in FIG. 11A and FIG. 11C. Increasing a visual prominence of the visual indication in response to detecting a first part of the selection input clearly indicates that further input will be registered by the computer system as the selection input, thereby providing indication for corrective user action if requested, and reduces correction inputs involved with selecting the selectable object.

In some embodiments, the selection input corresponding to the request to select the selectable object (e.g., the air gesture performed by the hand 1136a of the user toward the object 1130b of FIGS. 11B and 11B1) includes a first part and a second part (1276a), such as described with reference to step(s) 1274. In some embodiments, in response to detecting the first part of the selection input and/or before detecting the second part of the selection input, the computer system changes (1276b) a visual appearance of the selectable object, such as illustrated by the difference in visual pattern of the object 1130b between FIGS. 11A and 11B, optionally including tinting the selectable object to be darker or lighter than the tint of the selectable object when the first part of the input is detected (e.g., modifying a shade of the selectable object), increasing a brightness, size, and/or reducing a blurriness of the selectable object. Increasing a visual prominence of the visual indication in response to detecting a first part of the selection input clearly indicates that further input will be registered by the computer system as the selection input, thereby providing an indication for corrective user action if, for example, selection of the selectable object is not desired, and reduces correction inputs involved with selecting the selectable object.

In some embodiments, in response to detecting the selection input corresponding to the request to select the selectable object (1278a) (e.g., the air gesture performed by the hand 1136c of the user toward the object 1130c of FIGS. 11B and 11B1), in accordance with a determination that the selectable object has a size that is less than a threshold size (e.g., an area of 0.2 cm², 0.5 cm², 1 cm², 5 cm², 10 cm², 20 cm², or another threshold size), the computer system displays (1278b), via the display generation component, a visual selection indication corresponding to selection of the selectable object, such as the selection ring 1139 of FIG. 11C. As such, when the selectable object has a size that is less than the threshold size, the visual appearance of the selectable object is optionally changed in such manner discussed with reference to step(s) 1276, in addition to display of the visual selection indication, such that the changed visual appearance of the selectable object is concurrently displayed with the visual selection indication. Also, in some embodiments, when the size of the selectable object is greater than the threshold size, the method 1200 optionally includes forgoing displaying the visual selection indication. Displaying a changed visual appearance of the selectable object and an additional selection indication in response to detecting the selection input and the selectable object being less than the threshold size clearly conveys selection even when selectable objects are small.

In some embodiments, the visual selection indication corresponding to selection of the selectable object at least partially (or completely) surrounds the selectable object (1280), such as the selection ring 1139 of FIG. 11C. For example, the visual indication surrounding the selectable object is optionally a selection ring or another type of visual indication surrounding the selectable object. Displaying a selection ring in response to detecting the selection input and the selectable object being less than the threshold size clearly indicates selection of even small selectable objects and provides a confirmation of selection to the user, which alert the user of the selection of the selectable object and allows the user to perform corrective action if selection of the selectable object is not desired.

In some embodiments, the selection input corresponding to the request to select the selectable object includes a first part and a second part (1282a), such as described with reference to step(s) 1272. In some embodiments, in response to detecting the first part of the selection input and/or before detecting the second part of the selection input, the computer system displays (1282b), at a first size, the selection indication corresponding to selection of the selectable object that is surrounding the selectable object. In some embodiments, in response to detecting the second part of the selection input, the computer system displays (1282c) the selection indication corresponding to selection of the selectable object that is surrounding the selectable object at a second size different from the second size, such as the selection ring 1139 of FIG. 11C expanding from the edges of the object 1130c as in FIGS. 11B and 11B1 to the location of the selection ring 1139 in FIG. 11C. For example, the first size is optionally smaller than the third second. As such, the selection indication optionally expands out from edges of the selectable object as detection of the selection input is performed (e.g., as the selection input proceeds to completion). Expanding the selection indication out from edges of the selectable object as detection of the selection input is performed conveys progress towards the selection, providing feedback for corrective action if desired, and reduces correction inputs involved with selecting the selectable object.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

FIGS. 13A-13C illustrate examples of a computer system displaying an enlarged view of a region of a user interface in accordance with some embodiments.

FIG. 13A illustrates a computer system 101 displaying, via a display generation component (e.g., display generation component 120 of FIG. 1), a three-dimensional environment 1304 from a viewpoint of a user 1320, as shown in the overhead view. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user), and/or gaze of the user (e.g., internal sensors facing inwards towards the face of the user).

As shown in FIG. 13A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1104 or portions of the physical environment are visible via the display generation component 120 of computer system 101. For example, three-dimensional environment 1304 includes portions of the left and back walls, and the floor in the physical environment of the user, and also includes table 1312a.

In FIG. 13A, three-dimensional environment 1304 also includes virtual content, such as virtual content 1326a. Virtual content 1326a is optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to method 1400. In FIG. 13A, virtual content 1326a is a user interface that includes different regions 1328a-d that include various selectable objects 1330a-m, as described in more detail with reference to method 1400. For example, region 1328a includes selectable objects 1330a-1330e in a particular spatial arrangement that are selectable to perform corresponding operations, region 1328b includes selectable objects 1330f-1330i in a particular spatial arrangement that are selectable to perform corresponding operations, region 1328c includes selectable objects 1330j-1330l in a particular spatial arrangement that are selectable to perform corresponding operations, and region 1328d includes a single selectable object 1330m that is selectable to perform a corresponding operation.

In some embodiments, input to computer system 101 is provided via air gestures from hand 1334a and/or attention of the user (e.g., as described in more detail with reference to method 1400), or via trackpad 746 from hand 1334b, and inputs described herein are optionally received via trackpad 746 or via air gestures/attention.

In some embodiments, in response to detecting a selection input directed to a selectable object and/or a region of content 1326a, computer system 101 either selects a selectable object within the region or displays an enlarged view of the region depending on one or more criteria, such as whether the selectable objects in the region are sufficiently spaced apart from one another, as described in more detail with reference to method 1400. For example, in FIG. 13A, computer system 101 detects alternative selection inputs directed to region 1328a (e.g., via an air pinch gesture from hand 1334a while attention 1332a is directed to region 1328a), region 1328b (e.g., via an air pinch gesture from hand 1334a while attention 1332b is directed to region 1328b), region 1328c (e.g., via an air pinch gesture from hand 1334a while attention 1332c is directed to region 1328c), and region 1328d (e.g., via an air pinch gesture from hand 1334a while attention 1332d is directed to region 1328d).

In response to the selection input directed to region 1328d in which attention 1332d is directed to object 1330m, computer system 101 optionally performs an operation associated with object 1330m (e.g., selects object 1330m), because region 1328d only includes a single selectable object. Further, in response to the selection input directed to region 1330b, computer system 101 optionally performs an operation associated with object 1330c (e.g., selects object 1330c), because attention 1332a was directed to object 1330c when the selection input was detected, and because the spatial arrangement of objects 1330a-e is sufficiently spread out that displaying an enlarged view of region 1330b is not warranted. Whether the spatial arrangement of objects in a given region warrants displaying an enlarged view of that region optionally depends on the distance (e.g., linear or angular) between the objects in that region. For example, whether the distance between the objects is greater than a threshold distance (e.g., linear or angular distance), as described in more detail with reference to method 1400. In FIG. 13A, the distance between objects 1330a-e is optionally greater than the threshold distance, and therefore an enlarged view of region 1328a is not displayed by computer system 101, and instead an operation is performed corresponding to the object that had the attention when the selection input was detected (e.g., object 1330c).

FIG. 13A1 illustrates similar and/or the same concepts as those shown in FIG. 13A (with many of the same reference numbers). It is understood that unless indicated below, elements shown in FIG. 13A1 that have the same reference numbers as elements shown in FIGS. 13A-13C have one or more or all of the same characteristics. FIG. 13A1 includes computer system 101, which includes (or is the same as) display generation component 120. In some embodiments, computer system 101 and display generation component 120 have one or more of the characteristics of computer system 101 shown in FIGS. 13A-13C and display generation component 120 shown in FIGS. 1 and 3, respectively, and in some embodiments, computer system 101 and display generation component 120 shown in FIGS. 13A-13C have one or more of the characteristics of computer system 101 and display generation component 120 shown in FIG. 13A1.

In FIG. 13A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 13A-13C.

In FIG. 13A1, display generation component 120 is illustrated as displaying content that optionally corresponds to the content that is described as being displayed and/or visible via display generation component 120 with reference to FIGS. 13A-13C. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 13A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 13A1. Because display generation component 120 is optionally a head-mounted device, the field of view of display generation component 120 is optionally the same as or similar to the field of view of the user.

In FIG. 13A1, the user is depicted as performing an air pinch gesture (e.g., with hand 1334*a* and/or 1334*b*) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 13A-13C.

In some embodiments, computer system 101 responds to user inputs as described with reference to FIGS. 13A-13C.

In the example of FIG. 13A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 13A-13C and/or described with reference to the corresponding method(s) are optionally implemented on computer system 101 and display generation unit 120 in a manner similar or analogous to that shown in FIG. 13A1.

In contrast, in response to the selection input directed to region 1328*b* in FIG. 13A, computer system 101 displays an enlarged view 1327*a* of region 1328*b*, as shown in FIG. 13B (e.g., without performing an operation associated with one of objects 1330*f-i*, even if attention 1332*b* was directed to one of those objects when the selection input was detected). Instead, because the distance between objects 1330*f-i* is optionally less than the threshold distance, computer system 101 displays the enlarged view 1327*a* of region 1328*b*. Enlarged view 1327*a* is optionally an in-line enlarged view of region 1328*b* (e.g., as if displaying region 1328*b* through a magnifying glass, without displaying a new user interface object in three-dimensional environment 1304) or is a separate user interface object displayed overlaid on region 1328*b*. As shown in FIG. 13B, enlarged view 1327*a* optionally includes a larger view of the content (e.g., objects) in region 1328*b*, such as objects 1330*f*, 1330*g'*, 1330*h'* and 1330*i'*. Objects 1330*f*, 1330*g'*, 1330*h'* and 1330*i'* are optionally the same as objects 1330*f*, 1330*g*, 1330*h* and 1330*i*, except they are displayed larger than in FIG. 13A in enlarged view 1327*a*. Enlarged view 1327*a* helps facilitate accurate selection of the object within region 1328*b* that should be selected. While displaying enlarged view 1327*a* in FIG. 13B, if computer system 101 detects selection of object 1330*h'* (e.g., via attention 1332*h* and an air pinch gesture from hand 1334*a*), computer system 101 optionally performs an operation associated with object 1330*h*. Similarly, while displaying enlarged view 1327*a* in FIG. 13B, if computer system 101 detects selection of object 1330*g'* (e.g., via attention 1332*g* and an air pinch gesture from hand 1334*a*), computer system 101 optionally performs an operation associated with object 1330*g*. In either case, computer system 101 optionally ceases display of enlarged view 1327*a*, and returns to the display shown in FIG. 13A.

In FIG. 13B, while displaying enlarged view 1327*a*, if computer system 101 detects a selection input directed to region 1328*a* (e.g., via attention 1332*a* and an air pinch gesture from hand 1334*a*), region 1328*d* (e.g., via attention 1332*e* and an air pinch gesture from hand 1334*a*), or region 1328*c* (e.g., via attention 1332*c* and an air pinch gesture from hand 1334*a*), computer system 101 optionally ceases display of enlarged view 1327*a*, and returns to the display shown in FIG. 13A. Input directed to region 1328*a* in FIG. 13B would optionally additionally cause computer system 101 to respond in one or more of the ways described with reference to region 1328*a* in FIG. 13A, and input directed to region 1328*d* in FIG. 13B would optionally additionally cause computer system 101 to respond in one or more of the ways described with reference to region 1328*d* in FIG. 13A. Input directed to region 1328*c* would optionally additionally cause computer system 101 to response similarly to selection of region 1328*b* in FIG. 13A, as will be described with reference to FIG. 13C. Input directed outside of any of regions 1330*a-d* (e.g., via attention directed outside of any of regions 1330*a-d*, optionally within or outside of content 1326*a*, and an air pinch gesture from hand 1334*a*) would optionally cause computer system 101 to cease displaying enlarged view 1327*a* and return to the display shown in FIG. 13A.

FIG. 13C illustrates the result of input directed to region 1328*c* in FIG. 13B and/or 1328*c* in FIG. 13A. In particular, in response to either of the above inputs, computer system 101 displays an enlarged view 1327*a* of region 1328*c*, as shown in FIG. 13C (e.g., without performing an operation associated with one of objects 1330*j-1*, even if attention 1332*c* was directed to one of those objects when the selection input was detected). Instead, because the distance between objects 1330*j-1* is optionally less than the previously described threshold distance, computer system 101 displays the enlarged view 1327*a* of region 1328*c* (e.g., similar to as described with reference to the enlarged view 1327*a* of region 1328*b*). Enlarged view 1327*a* is optionally an in-line enlarged view of region 1328*c* (e.g., as if displaying region 1328*c* through a magnifying glass, without displaying a new user interface object in three-dimensional environment 1304) or is a separate user interface object displayed overlaid on region 1328*c*. As shown in FIG. 13C, enlarged view 1327*a* optionally includes a larger view of the content (e.g., objects) in region 1328*c*, such as objects 1330*j'*, 1330*k'*, and 1330*l'*. Objects 1330*j'*, 1330*k'*, and 1330*l'* are optionally the same as objects 1330*j*, 1330*k*, and 1330*l*, except they are displayed larger than in FIG. 13A or 13B in enlarged view 1327*a* in FIG. 13C. Enlarged view 1327*a* helps facilitate accurate selection of the object within region 1328*c* that should be selected. While displaying enlarged view 1327*a* in FIG. 13C, if computer system 101 detects selection of object 1330*j'* (e.g., via attention 1332*i* and an air pinch gesture from hand 1334*a*), computer system 101 optionally performs an operation associated with object 1330*j*. Similarly, while displaying enlarged view 1327*a* in FIG. 13C, if computer system 101 detects selection of object 1330*l* (e.g., via attention 1332*j* and an air pinch gesture from hand 1334*a*), computer system 101 optionally performs an operation associated with object 1330*l*. In either case, computer system 101 optionally ceases display of enlarged view 1327*a*, and returns to the display shown in FIG. 13A.

In FIG. 13C, while displaying enlarged view 1327*a*, if computer system 101 detects a selection input directed to region 1328*a* (e.g., via attention 1332*a* and an air pinch gesture from hand 1334*a*), or region 1328*d* (e.g., via attention 1332*d* and an air pinch gesture from hand 1334*a*), computer system 101 optionally ceases display of enlarged view 1327*a*, and returns to the display shown in FIG. 13A. In FIG. 13C, while displaying enlarged view 1327*a*, if computer system 101*a* detects a selection input directed to region 1328*b* (e.g., via attention 1332*b* and an air pinch gesture from hand 1334*a*), computer system 101 optionally ceases display of enlarged view 1327*a*, and returns to the display shown in FIG. 13B. Input directed to region 1328*a* in FIG. 13C would optionally additionally cause computer system 101 to respond in one or more of the ways described with reference to region 1328*a* in FIG. 13A, and input directed to region 1328*d* in FIG. 13C would optionally additionally cause computer system 101 to respond in one or more of the ways described with reference to region 1328*d* in FIG. 13A. Input directed to region 1328*b* would optionally additionally cause computer system 101 to response similarly to selection of region 1328*b* in FIG. 13A. Input directed outside of any of regions 1330*a-d* (e.g., via attention directed outside of any of regions 1330*a-d*, optionally within or outside of content 1326*a*, and an air pinch gesture from hand 1334*a*) would optionally cause computer system 101 to cease displaying enlarged view 1327*a* and return to the display shown in FIG. 13A.

FIGS. 14A-14E is a flowchart illustrating a method of displaying an enlarged view of a region of a user interface in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, the method 1400 is performed at a computer system in communication with a display generation component and one or more input devices. In some embodiments, the computer system has one or more characteristics of the computer system of the methods 800, 900, 1000, 1200, 1600, 1800, 2000, and/or 2200. In some embodiments, the display generation component has one or more characteristics of the display generation component of the methods 800, 900, 1000, 1200, 1600, 1800, 2000, and/or 2200. In some embodiments, the one or more input devices have one or more of the characteristics of the one or more input devices and/or of the gaze tracking device of the methods 800, 900, 1000, 1200, 1600, 1800, 2000, and/or 2200.

In some embodiments, the computer system displays (1402*a*), via the display generation component, a user interface, such as the virtual content 1326*a* of FIGS. 13A and 13A1 (e.g., the user interface optionally includes one or more characteristics of the user interfaces discussed with reference to the methods 800, 900, 1000, 1200, 1600, 1800, 2000, and/or 2200). The first region of the user interface is optionally displayed in a first view (e.g., the first region occupying a first portion of a field of view of the user of the computer system and/or a first portion of a display area displayed by the display generation component) having a first set of dimensions such as a first length in the three-dimensional environment, width in the three-dimensional environment, height in the three-dimensional environment, depth or distance from the viewpoint of the user in the three-dimensional environment, and/or curvature in the three-dimensional environment. In some embodiments, the user interface is displayed in or is a three-dimensional environment. In some embodiments, the three-dimensional environment has one or more of the characteristics of the environments of methods 800, 900, 1000, 1200, 1600, 1800, 2000, and/or 2200.

In some embodiments, while displaying the user interface, the computer system detects (1402*b*), via the one or more input devices, an input directed to a first region of the user interface, such as attention 1332*b* of FIGS. 13A and 13A1. In some embodiments, the input directed to the first region of the user interface includes user attention directed to the first region of the user interface (e.g., sight or gaze directed to the first region of the user interface), a hand of a user in a particular pose (e.g., raised at a position in front of the user, and/or in a pre-pinch hand shape) at greater than a threshold hand distance (e.g., 0.2 cm, 0.5 cm, 1 cm, 2 cm, 3 cm, 5 cm, 10 cm, 20 cm, 40 cm, 100 cm, 200 cm 500 cm, or another threshold hand distance) from the first region of the user interface, the hand of the user performing a pinch air gesture in which the tip of the index finger and the tip of the thumb of the hand of the user come together and touch, or any combination of the user attention, the hand of the user in the particular pose, the hand of the user at the threshold hand distance and/or the hand of the user performing the pinch air gesture. In some embodiments, the input is an attention-only and/or gaze-only input (e.g., not including input from one or more portions of the user other than those portions providing the attention input).

In some embodiments, in response to detecting the input directed to the first region of the user interface (1402*c*), in accordance with a determination that the first region of the user interface includes at least two selectable objects that meet first criteria, such as the region 1328*b* including objects 1330*f-i* in FIGS. 13A and 13A1, (such as a distance criterion that is satisfied when a distance between the at least two selectable objects displayed in the first region of the user interface is below a threshold distance (e.g., 0.5 cm, 1 cm, 1.5 cm, 2 cm, 5 cm, 20 cm, 80 cm, 1 m, 3 m, or another threshold distance) and/or a criterion that is satisfied when input is directed to the first region of the user interface and the first region includes multiple selectable objects that could be selected based on the input directed to the first region of the user interface), the computer system displays (1402*d*), via the display generation component, an enlarged view of the first region of the user interface (including an enlarged view of the at least two selectable objects that meet the first criteria), such as the enlarged view 1327*a* of the region 1328*b* in FIG. 13B. In some embodiments, the enlarged view of the first region is displayed concurrent with or in place of the first view of the first region. In some embodiments, display of the enlarged view corresponds to display of a simulated magnifier and/or magnified view of the first region. In some embodiments, the display of the at least two selectable objects is enlarged while the size of the first region including a size of the at least two selectable objects in the three-dimensional environment does not enlarge (e.g., the simulated magnifier magnifies the first region to the enlarged view of the first region, while the size of the first region including a size of the at least two selectable objects in the three-dimensional environment remains the same). In some embodiments, the enlarged view of the first region is displayed at a same or similar distance (e.g., overlaps a portion of the display of the user interface from the viewpoint of the user in the three-dimensional environment) from the viewpoint of the user in three-dimensional environment as a distance of the first region from the viewpoint of the user in the three-dimensional environment before the enlarged view of the first region is displayed. In some embodiments, the enlarged view of the first region optionally includes a second set of dimensions such as a second length in the three-dimensional environment, width in the three-dimensional environment, height in the three-dimensional environment, depth or distance from the viewpoint of the user in the three-dimensional environment, and/or curvature in the three-dimensional environment that is different from the first view of the first region and the first set of dimensions discussed above. For example, the distance from the viewpoint of the user and an object of the at least two selectable objects in the enlarged view of the first region is optionally shorter than a distance from the viewpoint of the user and the object of the at least two selectable objects in the first view of the first region. Also, the view of the first region of the user interface optionally changes from the first view having the first set of dimensions (discussed above) to the enlarged view having the second set of dimensions. One or more dimensions in the second set of dimensions of the enlarged view of the first region of the user interface are optionally larger in magnitude than the one of more dimensions of the first set of dimensions of the first view of the first region of the user interface in the three-dimensional environment. As such, in some embodiments, the enlarged view of the region occupies a second, larger portion of the field of view of the user of the computer system and/or a second, larger portion of the display area displayed by the display generation component than the first view of the region. In some embodiments, the computer system, via the display generation component, displays an animation of the first view of the first region of the user interface transforming and/or scaling into the enlarged view of the first region of the user interface. For example, the computer system optionally displays the first view of the first region of the user interface growing (e.g., extending) to become the enlarged view of the first region of the user interface. In some embodiments, none of the at least two selectable objects in the first region are selected in response to the input; as such, the enlarged view of the region is optionally displayed without selection of one of the at least two selectable objects in the first region.

In some embodiments, in accordance with a determination that the first region of the user interface does not include the at least two selectable objects that meet the first criteria, such as the region 1328*a* of FIGS. 13A and 13A1 (maintaining display of the first region of the user interface in the first view having the first set of dimensions discussed above and/or) the computer system forgoes displaying (1402*e*), via the display generation component, the enlarged view of the first region of the user interface, such as forgoing displaying an enlarged view of the region 1328*a* of FIGS. 13A and 13A1 (optionally including foregoing enlarging and/or changing other regions of the user interface, when the user interface includes multiple regions). One of the at least two selectable objects in the first region is optionally selected in response to the input, without displaying the enlarged view of the first region. In some embodiments, the computer system detects an input corresponding to selection of any of the at least two selectable objects displayed in the first view of the first region and/or detects interaction with the first region displayed in the first view in response to the input directed to the first region of the user interface. The selection input optionally includes one or more aspects of the inputs discussed above with reference to the methods 800, 900, 1000, 1200, 1600, 1800, 2000, and/or 2200 and is discussed in more detail below with reference to step(s) 1404. Displaying an enlarged view of the first region of the user interface in response to detecting that the first region includes at least two selectable object that meet first criteria allows for fine selection of a selectable object in the first region of the user interface, thus reducing errors in interaction with the computer system.

In some embodiments, in response to detecting the input directed to the first region of the user interface (1404*a*), such as attention 1332*d* of FIGS. 13A and 13A1, in accordance with a determination that the first region of the user interface includes no more than one selectable object that meets the first criteria, the computer system performs (1404*b*) (e.g., automatically performing, without user intervention) an operation associated with the one selectable object, such as performing an operation associated with object 1330*m* of FIGS. 13A and 13A1. As such, as searching a search query, displaying a website corresponding to a link of a hyperlink in a website, or another type of operation, optionally without displaying the enlarged view of the first region of the user interface. Performing an operation associated with a single selectable object of a region in response to detecting input directed to the region reduces inputs involved with performing the operation.

In some embodiments, in response to detecting the input directed to the first region of the user interface (1406*a*), such as attention 1332*b* of FIGS. 13A and 13A1, in accordance with the determination that the first region of the user interface includes the at least two selectable objects that meet the first criteria, the computer system forgoes performing (1406*b*) one or more operations associated with the at least two selectable objects in the first region of the user interface, such as forgoing performing operations associated with objects 1330*f-i* of FIGS. 13A and 13A1. In some embodiments, the operations include, in response to detecting the input directed to the first region of the user interface and in accordance with a determination that the first region of the user interface includes more than one selectable object, forgoing performing the one or more operations associated with the selectable objects, even if the selectable objects do not meet the first criteria and/or without regard to whether the selectable objects meet the first criteria. Forgoing performing one or more operations associated with multiple candidate selection targets of the region when the region includes the multiple selectable objects provides for accuracy of selection and reduces inputs involved with correcting inaccurately selected objects.

In some embodiments, while displaying the enlarged view of the first region of the user interface, such as the enlarged view of the region 1328*b* in FIG. 13B, the computer system detects (1408*a*), via the one or more input devices, a selection input directed to content of the enlarged view of the first region of the user interface, such as attention 1332*g* of FIG. 13B, such as detecting one or more clicks on a touch-sensitive surface such as a trackpad corresponding to selection of the content, detecting attention of a user, and/or detecting an air gesture discussed in this present disclosure (e.g., air pinch inputs (e.g., an air gesture that includes movement of two or more fingers of a hand to make contact with one another, that is, optionally, followed by an immediate (e.g., within 0-1 seconds) break in contact from each other), or another type of air pinch directed to content of the enlarged view, tap inputs ((e.g., directed to the enlarged view) performed as an air gesture that includes movement of a user's finger(s) toward the enlarged view, movement of the user's hand toward the enlarged view optionally with the user's finger(s) extended toward the enlarged view, a motion of a user's finger (e.g., mimicking a tap on a screen), or another predefined movement of the user's hand), air pinch and drag gestures (e.g., an air gesture includes an air pinch gesture (e.g., an air pinch gesture or a long air pinch gesture) performed in conjunction with (e.g., followed by) a drag input that changes a position of the user's hand from a first position (e.g., a start position of the drag) to a second position (e.g., an end position of the drag)), or another type of air gesture).

In some embodiments, in response to detecting the selection input directed to the content of the enlarged view of the first region of the user interface (1408*b*), in accordance with a determination that attention of a user of the computer system is directed to a first selectable object in the at least two selectable objects in the enlarged view of the first region, such as directed to object 1330*g'* of FIG. 13B, the computer system performs (1408*c*) an operation associated with the first selectable object, such as performing an operation associated with objects 1330*g'* of FIG. 13B, such as searching a search query, displaying a website corresponding to a link of a hyperlink in a website, or another type of operation associated with the first selectable object.

In some embodiments, in accordance with a determination that the attention of the user of the computer system is directed to a second selectable object in the at least two selectable objects in the enlarged view of the first region, different from the first selectable object, such as attention 1332*h* of FIG. 13B directed to object 1330*h'* of FIG. 13B, the computer system performs (1408*d*) an operation associated with the second selectable object, such as performing an operation associated with objects 1330*h'* of FIG. 13B, such as searching a search query, displaying a website corresponding to a link of a hyperlink in a website, or another type of operation associated with the second selectable object. Performing a respective operation associated with a respective selectable object based on which selectable object of the representation of the at least two selectable objects in the enlarged view of the first region is selected allows for fine selection of the respective selectable object, reduces inputs involved with performing the respective operation, and reduces correction errors involved with selecting the respective selectable object.

In some embodiments, while displaying the enlarged view of the first region of the user interface (e.g., enlarged view 1327*a* of region 1328*b* of FIG. 13B, the computer system detects (1410*a*), via the one or more input devices, an attention of a user of the computer system, such as attention 1332*e* of FIG. 13B. In some embodiments, in response to detecting the attention of the user (1410*b*), in accordance with a determination that the attention of the user is not directed to the enlarged view of the first region (e.g., the attention of the user is directed to a different region of the user interface), the computer system ceases displaying (1410*c*) the enlarged view of the first region, such as ceasing display of the enlarged view 1327*a* of region 1328*b* of FIG. 13*b*, as shown between FIGS. 13B and 13C. For example, the first region of the user interface is optionally displayed at a first size when the input directed to the first region the user interface is detected, and after, in response to, or concurrent with ceasing display of the enlarged view of the first region, the operations optionally include redisplaying the first region of the user interface at the first size. Ceasing displaying the enlarged view of the first region in response to determination that the attention of the user is not directed to the enlarged view of the first region reduces the number of inputs involved with ceasing display of the enlarged view of the first region.

In some embodiments, displaying the enlarged view of the first region of the user interface (1412*a*) includes concurrently displaying (1412*b*) the enlarged view of the first region of the user interface (1412*c*), such as the enlarged view 1327*a* of the region 1328*b* in FIG. 13B, and at least one region of the user interface that was displayed when the input directed to the first region of the user interface was detected (1412*d*), such as the region 1328*a* in FIG. 13B. As such, the enlarged view of the first region of the user interface is optionally displayed alongside one or more other portions (e.g., other regions) of the user interface that are not enlarged (e.g., the computer system optionally does not modify display of the other portions of the user interface and/or the three-dimensional environment in response to detecting the input directed to the first region of the user interface). Concurrently displaying the enlarged view of the first region with at least one region of the user interface that was displayed when the input directed to the first region of the user interface was detected increases accessibility to selectable objects of other regions of the user interface, thereby reducing inputs involved with accessing such other regions.

In some embodiments, while displaying the user interface, the computer system detects (1414*a*), via the one or more input devices, a second input directed to a second region of the user interface, such as attention 1332*c* directed to object 1328*c* of FIG. 13B (optionally including characteristics of the input directed to the first region of the user interface described in reference to step(s) 1402, but directed to the second region of the user interface). In some embodiments, in response to detecting the second input directed to the second region of the user interface (1414*b*), in accordance with a determination that the second region includes a set of two or more selectable objects that meet the first criteria (e.g., such as described with reference to step(s) 1402), such as attention 1332*c* directed to object 1328*c* of FIG. 13B, the computer system displays (1414*c*), via the display generation component, an enlarged view of the second region of the user interface (optionally including characteristics of display of the enlarged view of the first region of the user interface described in reference to step(s) 1402, but applied to the enlarged view of the second region of the user interface) without displaying the enlarged view of the first region of the user interface, such as illustrated with the display of the enlarged view 1327*a* of region 1328*c* of FIG. 13C. As such, the enlarged view of the first region of the user interface and the enlarged view of the second region of the user interface are optionally not concurrently displayed. Further, additionally or alternatively, the method 1400 optionally includes while displaying the enlarged view of the first region, detecting the second input directed to the second region of the user interface (optionally including a threshold time period (e.g., a dwell time period of 0.1, 0.3, 0.5, 1, 2, 3, 5, 10, 20 or 30 seconds, or another dwell time period) during which the second input is directed to the second region of the user interface), and in response to detecting the second input directed to the second region of the user interface, in accordance with the determination that the second region includes the set of two or more selectable objects that meet the first criteria, displaying the enlarged view of the user region of the user interface and ceasing displaying the enlarged view of the first region of the user interface. Displaying an enlarged view of the second region without displaying an enlarged view of the first region in response to detecting user attention is directed to a second region and the second region including multiple candidate selection targets assists with selection and reduces clutter in the three-dimensional environment and may reduce correction inputs involved with correcting selection of selectable objects of the three-dimensional environment.

In some embodiments, while displaying the user interface, the computer system detects (1416a), via the one or more input devices, a second input directed to a second region of the user interface (optionally including characteristics of the input directed to the first region of the user interface described in reference to step(s) 1402 and 1417, but directed to the second region of the user interface), such as attention 1332a of FIGS. 13A and 13A1 directed to object 1328a. In some embodiments, in response to detecting the second input directed to the second region of the user interface (1416b), in accordance with a determination the second region of the user interface does not include a set of two or more selectable objects that meet the first criteria, such as the region 1328a of FIG. 13C, and/or such as described with reference to step(s) 1402 and 1417, the computer system forgoes displaying (1416c), via the display generation component, an enlarged view of the second region of the user interface (e.g., not displaying an enlarged view of the region 1328a of FIG. 13C) (and optionally additionally or alternatively, performing an operation associated with a selectable object that is selected in the second region of the user interface (e.g., selected via the second input directed to the second region of the user interface, or via a third input after the second input is detected)). As such, the enlarged view of the second region is optionally not displayed when input is directed to the second region of the user interface and the second region of the user interface does not includes the set of two or more selectable objects that meet the first criteria. Further, additionally or alternatively, the operations option- ally include while displaying the enlarged view of the first region, detecting the second input directed to the second region of the user interface (optionally including a threshold time period during which the second input is directed to the second region of the user interface, such as a dwell time period of 0.1, 0.3, 0.5, 1, 2, 3, 5, 10, 20 or 30 seconds, or another dwell time period), and in response to detecting the second input directed to the second region of the user interface, in accordance with the determination that the second region includes the set of two or more selectable objects that does not meet the first criteria, forgoing dis- playing the enlarged view of the second region of the user interface. Forgoing displaying an enlarged view of the second region when the second region does not include multiple candidate selection targets that meet the first crite- ria assists with selection facilitates faster interaction with the second region, reduces error in interaction with the computer system, and may reduce processing power associated with the computer system when the second input is directed to the second region.

In some embodiments, the input directed to the first region of the user interface includes attention of a user of the computer system directed to the first region and respective portion of the user performing a respective air gesture (1418), such as attention 1332b of FIGS. 13A and 13A1 and the hand 1334a of the user 1320 performing the respective air gesture, (e.g., a gaze of the user and an air pinch (e.g., an air gesture that includes movement of two or more fingers of a hand to make contact with one another, that is, optionally, followed by an immediate (e.g., within 0-1 seconds) break in contact from each other, or another type of air pinch described in this present disclosure). As such, the input directed to the first region of the user interface optionally is a selection input selecting the first region. Further, a selec- tion input, such as a gaze of the user and an air pinch such as described in this present disclosure is optionally involved in selecting a selectable object of the first region of the user interface, of the enlarged view of the first region of the user interface, and/or of another region of the user interface. Allowing for selection inputs to include attention of a user and pinch of the user increases accessibility for selection and reduces inputs involved with selecting a target selectable object.

In some embodiments, the input directed to the first region of the user interface includes attention of a user of the computer system directed to the first region of the user interface for at least a threshold period of time (1420), such as attention 1332b of FIGS. 13A and 13A1 directed to the region 1328b for the threshold period of time, (e.g., attention and/or gaze of the user such described in this present disclosure for a threshold duration such as 0.01 s, 0.1 s, 0.5 s, 1 s, 5 s, 10 s, 30 s, 2 min, or another dwell duration). As such, the input directed to the first region of the user interface optionally is a selection input including a dwell of the user's gaze for the threshold duration. Further, a selec- tion input, such as a gaze of the user for the threshold duration such as described in this present disclosure is optionally involved in selecting a selectable object of the first region of the user interface, of the enlarged view of the first region of the user interface, and/or of another region of the user interface. The input directed to the first region of the user interface is optionally only gaze-based (e.g., without input from another portion of the user such as a hand of the user). Allowing for selection inputs to include attention of a user and a dwell thereof increases accessibility for selection and reduces inputs involved with selecting a target select- able object.

In some embodiments, the user interface (e.g., virtual content 1326a) comprises a website and the at least two selectable objects, such as objects 1330f-i in FIGS. 13A and 13A1, are links in the website (1422) (e.g., URLs, and/or hyperlinks that link to a different webpage or a different portion of a currently displayed webpage). Allowing for fine selection of links of a website in the manner discussed in this method herein increases accessibility for selection of links of the website, thus reducing navigation errors and reducing inputs involved with selecting a target link.

In some embodiments, the first criteria include a criterion that is satisfied when an angular distance between two selectable objects of the at least two selectable objects in the first region of the user interface, from a viewpoint of a user in the three-dimensional environment, is below a threshold angular distance. The threshold angular distance (e.g., 0.1 degrees, 0.2 degrees, 0.9 degrees, 4 degrees, 20 degrees or 45 degrees) is optionally the angle between a (hypothetical) line extending from the viewpoint of the user to the first selectable object of the at least two selectable objects and a (hypothetical) line extending from the viewpoint of the user to the second selectable object of the at least two selectable objects in the three-dimensional environment. The viewpoint of the user is optionally a position in the three-dimensional from which the computer system displays the three-dimensional environment and/or the user interface including the first region of the user interface. Thus, in response to the angular distance between the viewpoint of the user and the first selectable object of the at least two selectable objects and the second selectable object of the at least two selectable objects being less than the threshold angular distance, the computer system optionally displays, via the display generation component, an enlarged view of the first region of the user interface. For example, the first region of the user interface is optionally displayed at the first view having the first set of dimensions. In response to detecting that the angular distance between the first selectable object of the at least two selectable objects and the second selectable object of the at least two selectable objects in the first region of the user interface, from the viewpoint of the user, is greater than the threshold angular distance, the computer system optionally continues to display, via the display generation component, the first region of the user interface at the first view having the first set of dimensions.

In some embodiments, the first criteria include a criterion that is satisfied when the at least two selectable objects are within a threshold angular distance (e.g., 0.1 degrees, 0.2 degrees, 0.9 degrees, 4 degrees, 20 degrees or 45 degrees, or another angular distance) of each other relative to a viewpoint of a user of the computer system (1424), such as objects 1330*f-i* in FIGS. 13A and 13A1 being within the threshold angular distance of each other relative to the viewpoint of the user 1320 in FIGS. 13A and 13A1. The threshold angular distance is optionally the angle or degrees of arc between a (hypothetical) line extending from the viewpoint of the user to a first selectable object of the at least two selectable objects and a (hypothetical) line extending from the viewpoint of the user to a second selectable object of the at least two selectable objects in the three-dimensional environment. The viewpoint of the user is optionally a position in the three-dimensional from which the computer system displays the three-dimensional environment and/or the user interface including the first region of the user interface. Thus, in response to the angular distance between the viewpoint of the user and the first selectable object of the at least two selectable objects and the second selectable object of the at least two selectable objects being less than the threshold angular distance, the computer system optionally displays, via the display generation component, an enlarged view of the first region of the user interface. For example, the first region of the user interface is optionally displayed at the first view having the first set of dimensions. In response to detecting that the angular distance between the first selectable object of the at least two selectable objects and the second selectable object of the at least two selectable objects in the first region of the user interface, from the viewpoint of the user, is greater than the threshold angular distance, the computer system optionally continues to display, via the display generation component, the first region of the user interface at the first view having the first set of dimensions in response to detecting the input directed to the first region of the user interface. As such, the same set of objects, at different distances from the viewpoint of the user, may or may not satisfy the first criteria, optionally because at the different distances from the viewpoint of the user, the same set of objects, maintaining relative distance between the objects of the set of objects, would have different angular distances between each other relative to the viewpoint of the user of the computer system. When the same set of objects are relatively close to the viewpoint of the user (e.g., in the three-dimensional environment), the same set of objects may not satisfy the first criteria (optionally because at the relatively close distance to the viewpoint of the user, the same set of objects are beyond the threshold angular distance relative to each other from the viewpoint of the user). When the same set of objects are relatively far from the viewpoint of the user (e.g., in the three-dimensional environment), the same set of objects may satisfy the first criteria (optionally because at the relatively far distance from the viewpoint of the user, the same set of objects are within the threshold angular distance relative to each other from the viewpoint of the user). Displaying an enlarged view of the first region of the user interface in response to detecting that the first region includes at least two selectable object that meet first criteria, including a criterion that is satisfied when the at least two selectable objects are within a threshold angular distance of each other relative to a viewpoint of a user of the computer system, ensures that the criteria for displaying the enlarged view corresponds to the difficulty in selecting the objects from the viewpoint of the user, thereby reducing errors in selection of objects.

In some embodiments, a content of the user interface included in the enlarged view of the first region, such as enlarged view 1327*a* of the region 1328*b* of FIGS. 13A and 13A1, is based on a location of attention of a user of the computer system in the user interface when the input directed to the first region of the user interface is detected (1426). For example, the region 1328*b* of FIGS. 13A and 13A1 is optionally identified by the computer system as a region, in response to detecting of attention 1332*b* of FIGS. 13A and 13A1, and then, in response to determining that the region includes at least two selectable objects that meet first criteria, such as the region 1328*b* including objects 1330*f-i* in FIGS. 13A and 13A1, the content of the region is included in the enlarged view 1327*a* of the region 1328*b* of FIGS. 13A and 13A1. For example, the enlarged view of the first region is like a snapshot of the first region of the user interface that is based on a location of user attention when the input directed to the first region of the user interface is detected. As another example, the enlarged view of the first region is optionally centered on the location of the attention of the user when the input directed to the first region of the user interface is detected. Additionally or alternatively, the method 1400 optionally includes: in accordance with a determination that the attention of the user is directed to a first location in the user interface when input directed to the user interface is detected (e.g., when the input directed to the first region of the user interface is detected), the location of the first region in the user interface is or corresponds to the first location (e.g., is centered on the first location), and in accordance with a determination that the attention of the user is directed to a second location, different from the second location, the location of the first region is or corresponds to the second location (e.g., is centered on the second location). In some embodiments, the first region of the user interface is identified by the computer system based on where the attention of the user is directed in the user interface when the input directed to the user interface is received, and is thus, selected by the computer system for inclusion in the enlarged view of the first region based on the location of the attention of the user when the input directed to the user interface is received. Defining the content of the enlarged view based on user attention ensures consistency of presentation of information and ensures that content that is likely relevant is included in the enlarged view, thereby reducing the number of inputs involved with interacting with the content in the enlarged view.

It should be understood that the particular order in which the operations in method 1400 have been described is merely exemplary and is not intended to indicate that the described order is the only order in which the operations could be performed. One of ordinary skill in the art would recognize various ways to reorder the operations described herein.

FIGS. 15A-15F illustrate examples of a computer system adjusting a value of a slider element based on attention of a user in accordance with some embodiments.

Figure 15A:
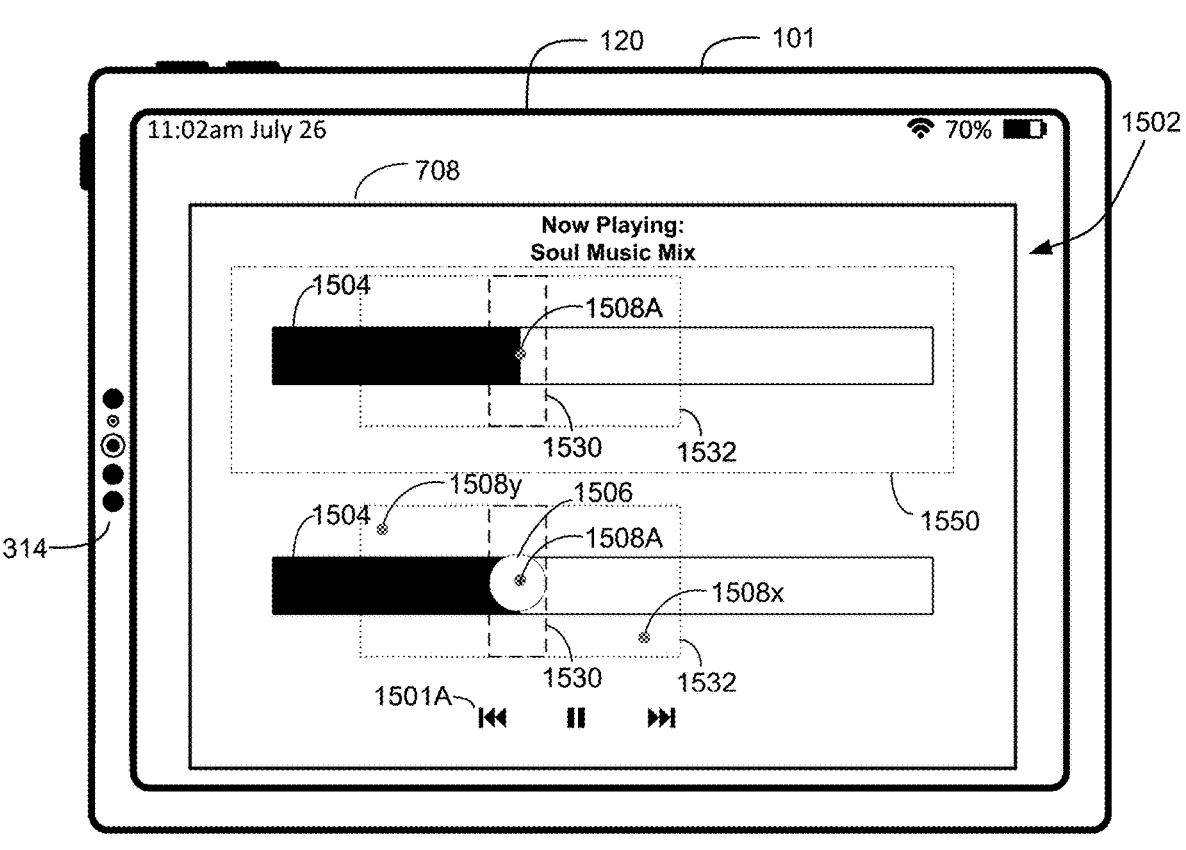
FIGS. 15A-15F illustrate examples of a computer system adjusting a value of a slider element based on attention of a user in accordance with some embodiments.
Figure 15A:
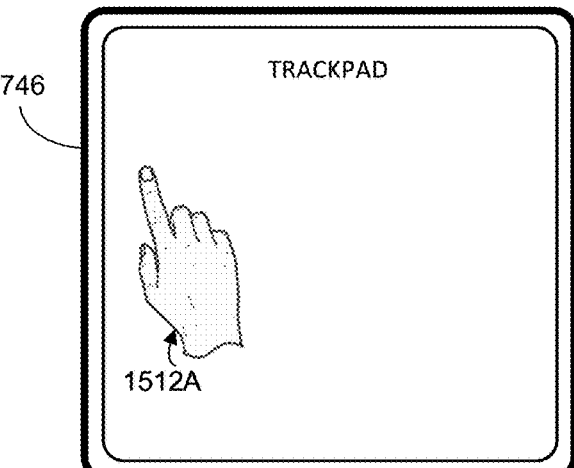

FIG. 15A illustrates a computer system 101 displaying, via a display generation component (e.g., display generation component 120 of FIG. 1), a three-dimensional environment 1502. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

In some embodiments, input to the computer system 101 is provided via air gestures from hand 1512*b* and/or attention 1508*a*, 1508*b*, and 1508*c* of the user (e.g., as described in more detail with reference to method 1600), or via trackpad 746 from hand 1512*a*, and inputs described herein are optionally received via trackpad 746 or via air gestures/attention.

In FIG. 15A, three-dimensional environment 1502 includes a virtual object 708 such as a music player that includes one or more selectable virtual objects 1501A to initiate playback, pause playback, skip to a previous playback portion, and/or skip ahead to a next playback portion of a first media item ("Soul Music Mix"). The virtual object 708 includes a slider element 1504 (e.g., as described with respect to method 1600) corresponding to the first media item. The slider element includes a scrubber bar associated with the first media content. A first visual indication 1506 (e.g., thumb or circle) as described with respect to method 1600 is optionally displayed in the slider element 1504, though it is understood that the features of the embodiments described here can be similarly implemented in a slider element 1504 that does not include indication 1506. A location of the first visual indication 1506 in the slider element 1504 corresponds to a current playback position and/or current time of playback with respect to the length of the first media item (e.g., amount of time that has elapsed since playback of the first media item has begun). Thus, in some embodiments, indication 1506 indicates the current value of the slider element 1504. As illustrated in FIG. 15A, the first visual indication 1506 is in a first location (e.g., in which 40% of the first media item has elapsed) to which attention of the user 1508*a* is directed in the slider element 1504. As illustrated in FIG. 15A, a first area of the slider element 1504 that corresponds to a size (e.g., length, width and/or area) of the first visual indication 1506 is referred to as a dead zone 1530 (illustrated with a dashed boundary and described in detail with respect to method 1800). If slider element 1504 does not include visual indication 1506, the dead zone 1530 is optionally still positioned within the slider element at the location corresponding to the current value of the slider element (e.g., optionally where visual indication 1506 would be displayed if slider element 1504 included it). When the attention of the user 1508*a* is within the dead zone 1530, the first visual indication 1506 optionally does not move from its current location, as will be described in more detail with reference to method 1800. FIG. 15A also illustrates a dynamic zone 1532 that extends beyond dead zone 1530, and which controls movement of element 1506 in slider element 1504 with a dynamic rate, as will be described in more detail with reference to method 1800. As illustrated in FIG. 15A, the dead zone 1530 and dynamic zone 1532 extend vertically past the area (e.g., height) of the slider element 1504. Expanded dead zone 1530 and dynamic zone 1532 relative to the area of the slider element 1504 allow for adjusting a value of the slider element 1504 based on the attention of the user 1508A directed to the left or right of the indication of the current value even if the attention of the user 1508A is outside of the slider element 1504 (e.g., such as attention 1508*y* to move element 1506 to the left, or attention 1508*x* to move element 1506 to the right).

Alternatively, in some embodiments, the slider element 1504, including corresponding dead zone 1530 and dynamic zone 1532, are displayed without the first visual indication 1506, as mentioned previously. In FIG. 15A, the slider element 1504 illustrated within the dashed box 1550 is an alternative example in which the slider element 1504 does not include the first visual indication 1506. However, one or more or all of the other features described herein with reference to slider element 1504 optionally apply analogously to a slider such as illustrated in dashed box 1550.

Figure 15B:
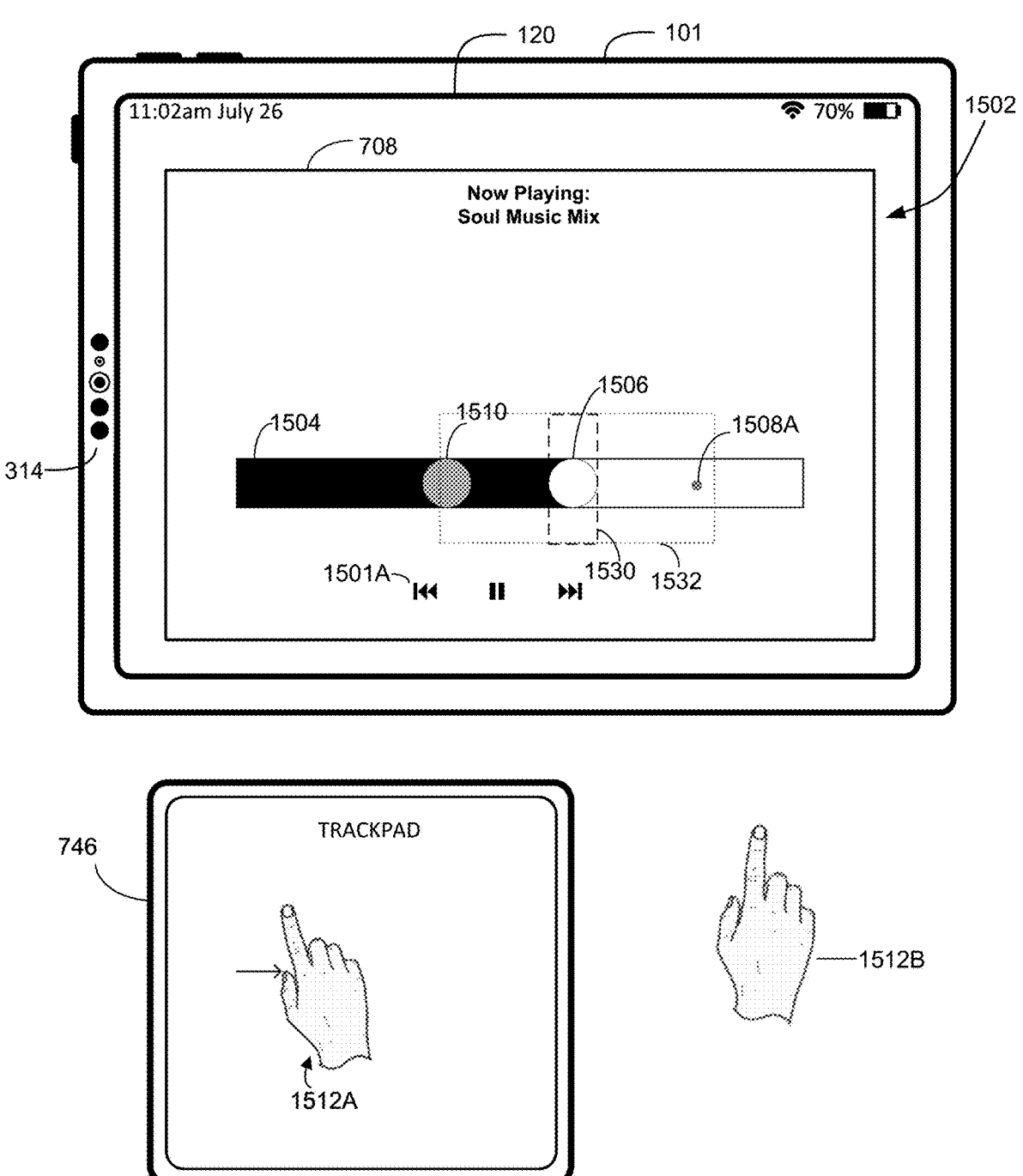

From FIG. 15A to FIG. 15B, the attention of the user 1508A has moved from the first location of the slider element 1504 (e.g., corresponding to a 40% position in the first media item) to a second location of the slider element 1504 (e.g., corresponding to a 60% position in the first media item). Based on the attention of the user 1508*a* having moved to the second location in the slider element 1504, the computer system 101 optionally moves the first visual indication 1506 towards the second location of the first media item (e.g., given that the attention of the user 1508*a* towards the first visual indication 1506 at the first location satisfied a first set of criteria prior to detecting the attention of the user 1508*a* move towards the second location, as described with respect to method 1600). FIG. 15B illustrates the first visual indication 1506 having moved halfway between the first location and the second location to which the attention of the user 1508*a* is directed. As the first visual indication 1506 moves along the slider element 1504, the dead zone 1530 moves together with the first visual indication 1506. Further, as described with respect to method 1800, a second area of the slider element 1504 (e.g., illustrated with the dotted boundary) corresponds to a dynamic zone 1532. As the first visual indication 1506 moves along the slider element 1504, the dynamic zone 1532 also moves together with the first visual indication 1506. The dynamic zone 1532 will also be described in more detail with reference to method 1800.

In FIG. 15B, the second location to which the attention of the user 1508a is directed is within the dynamic zone 1532. The computer system 101 optionally moves the first visual indication 1506 at a rate that changes when the visual indication 1506 is in the dynamic zone 1532 until the first visual indication 1506 reaches the second location, as will be described in more detail with reference to method 1800. In some embodiments, the computer system 101 displays a second visual indication 1510 at the first location of the first visual indication 1506. In some embodiments, the second visual indication 1510 is the same as the first visual indication 1506. In some embodiments, the second visual indication 1510 is a shadow or a ghost of the first visual indication 1506 at the first location. In some embodiments, the second visual indication 1510 is dimmer and/or a different color than the first visual indication 1506 as illustrated and described with respect to method 1600.

In some embodiments, the computer system 101 optionally adjusts a respective value of the slider element 1504 to a value corresponding to the second location based on receiving input from the hand 1512b of the user while attention of the user 1508b is directed to the second location, even before element 1506 reaches the second location. In some embodiments, the input from the hand 1512b includes an air pinching gesture in which a thumb and index finger of the hand 1512b move toward each other and touch while the attention 1508A of the user is directed to the second location.

Figure 15C:
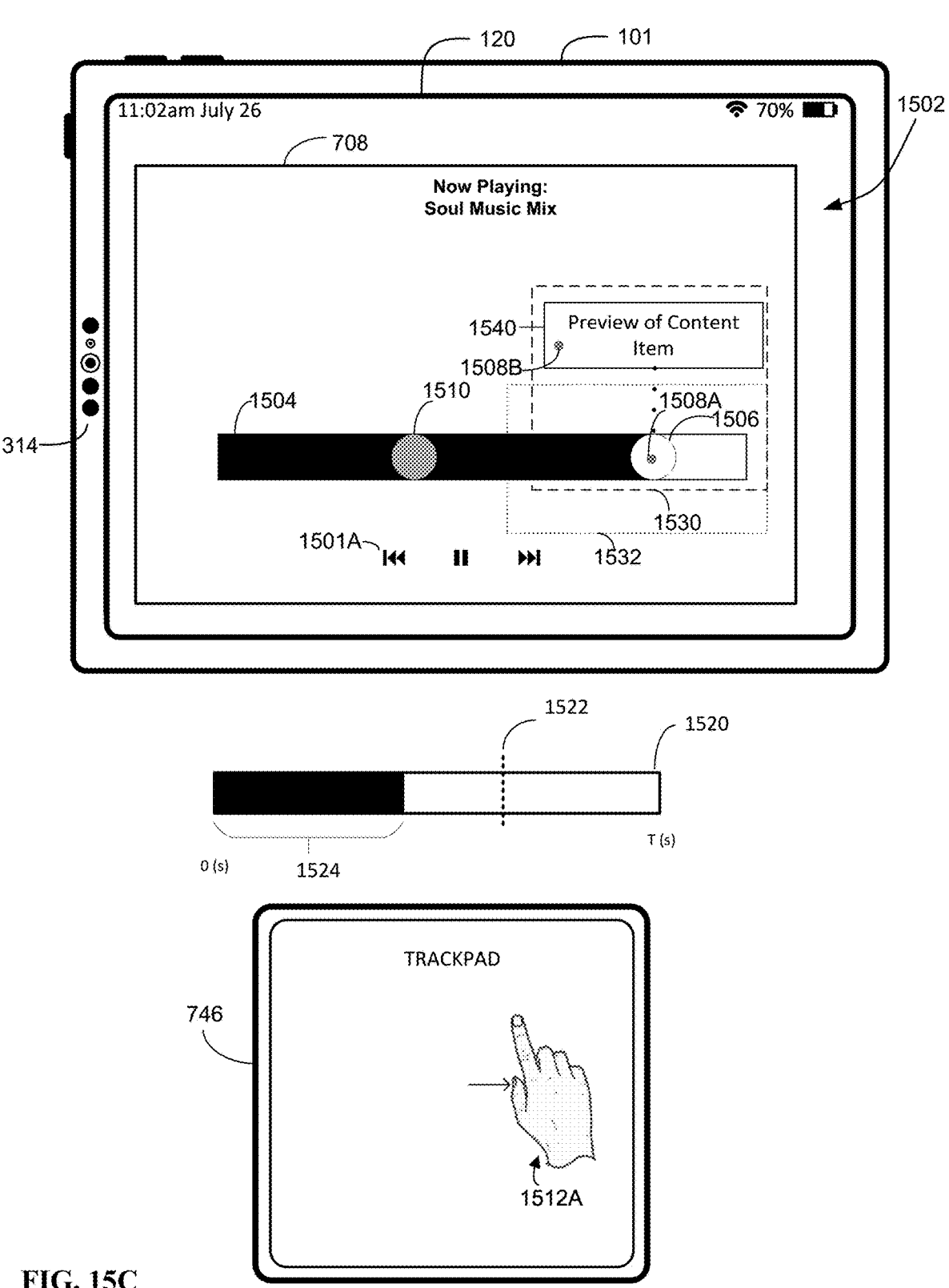

FIG. 15C illustrates the first visual indication 1506 having reached the second location to which the attention of the user 1508a is directed. In some embodiments, based on the first visual indication having reached the second location, the computer system 101 displays a preview 1540 of the first media item at the second location. As illustrated in FIG. 15C, in some embodiments, computer system 101 expands dead zone 1530 to include preview 1540 so that despite the attention of the user 1508b moving to the preview 1540 of the first media item, the computer system 101 does not move the first visual indication 1506 in the slider element 1504, even though attention 1508B is at a distance away from visual indication 1506 (e.g., horizontally and/or vertically) that would have optionally caused visual indication 1506 to move in FIG. 15A or 15B. In some embodiments, computer system 101 expands dead zone 1530 symmetrically horizontally and/or vertically, or asymmetrically horizontally and/or vertically, such that dead zone 1530 encompasses preview 1540. For example, as shown in FIG. 15C, dead zone 1530 includes preview 1540. This allows the user to look at the preview 1540 without changing the value of the slider element 1504 and/or the position of element 1506.

Further, FIG. 15C includes a time scale 1520 with a threshold indicator 1522. In some embodiments, the time scale 1520 including the threshold indicator 1522 is not displayed in the three-dimensional environment 1502. Because the amount of time 1524 that has elapsed since the computer system 101 has detected attention of the user 1508a towards element 1506 at the second location has not exceeded the amount of time indicated by the threshold indicator 1522, a gaze target (e.g., confirmation affordance) is not displayed in the virtual object 708. Gaze targets are described in more detail with reference to methods 800, 900 and/or 1000.

Figure 15D:
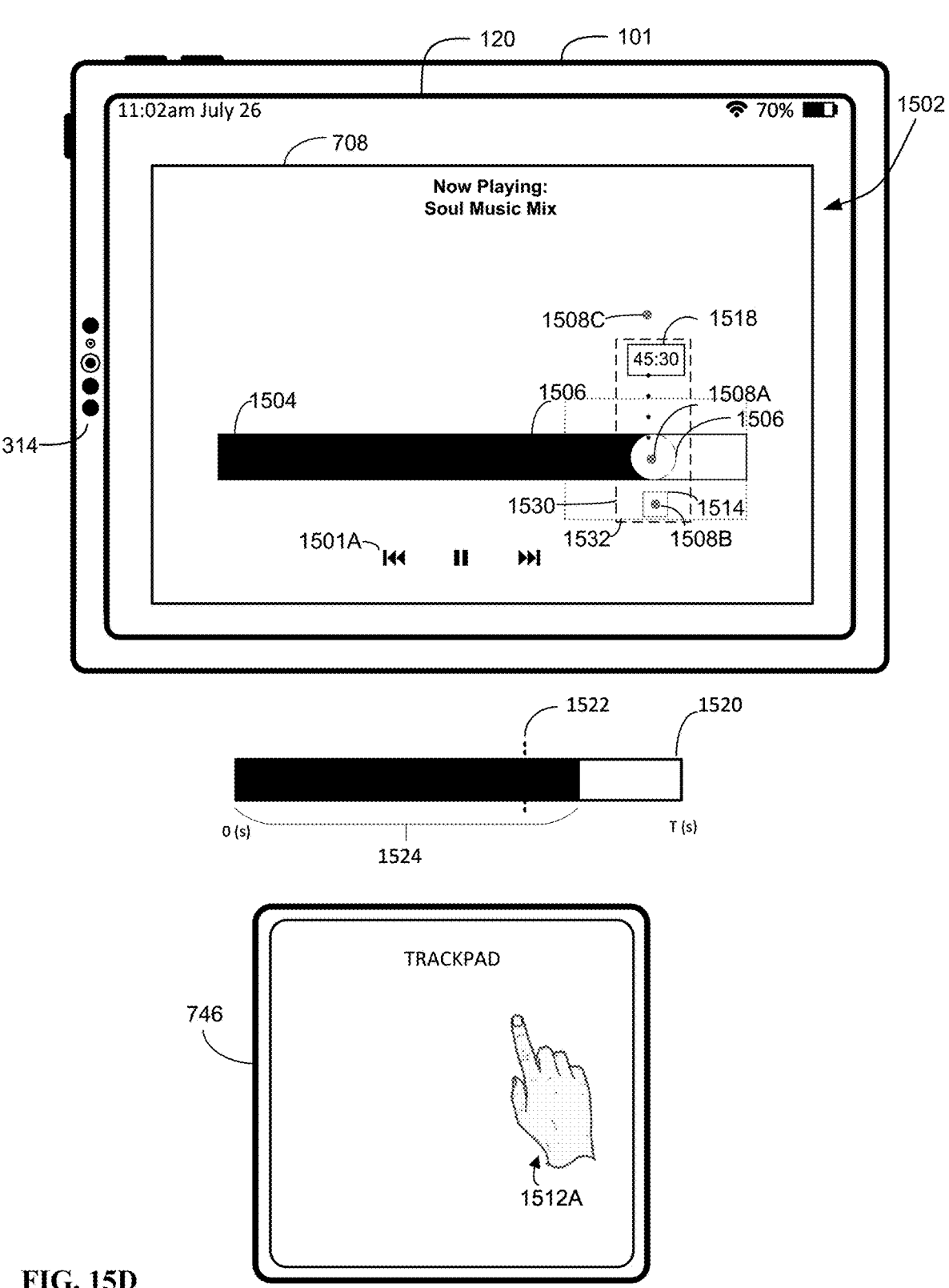

FIG. 15C1 illustrates similar and/or the same concepts as those shown in FIG. 15D (with many of the same reference numbers). It is understood that unless indicated below, elements shown in FIG. 15C1 that have the same reference numbers as elements shown in FIGS. 15A-15E have one or more or all of the same characteristics. FIG. 15C1 includes computer system 101, which includes (or is the same as) display generation component 120. In some embodiments, computer system 101 and display generation component 120 have one or more of the characteristics of computer system 101 shown in FIGS. 15A-15E and display generation component 120 shown in FIGS. 1 and 3, respectively, and in some embodiments, computer system 101 and display generation component 120 shown in FIGS. 15A-15E have one or more of the characteristics of computer system 101 and display generation component 120 shown in FIG. 15C1.

In FIG. 15C1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 15A-15E.

In FIG. 15C1, display generation component 120 is illustrated as displaying content that optionally corresponds to the content that is described as being displayed and/or visible via display generation component 120 with reference to FIGS. 15A-15E. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 15C1.

Display generation component 120 has a field of view (e.g., a field of view captured by external image sensors 314b and 314c and/or visible to the user via display generation component 120, indicated by dashed lines in the overhead view) that corresponds to the content shown in FIG. 15C1. Because display generation component 120 is optionally a head-mounted device, the field of view of display generation component 120 is optionally the same as or similar to the field of view of the user.

In FIG. 15C1, the user is depicted as performing an air pinch gesture (e.g., with hand 1534) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 15A-15E.

In some embodiments, computer system 101 responds to user inputs as described with reference to FIGS. 15A-15E.

In the example of FIG. 15C1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 15A-15E and/or described with reference to the corresponding method(s) are optionally implemented on computer system 101 and display generation unit 120 in a manner similar or analogous to that shown in FIG. 15C1.

From FIG. 15C to FIG. 15D, the amount of time 1524 that has elapsed since computer system 101 detected attention of the user 1508a towards the element 1506 at the second location has exceeded the amount of time indicated by the threshold indicator 1522, as illustrated by the time scale 1520. Accordingly, in FIG. 15D, a gaze target 1514 (e.g., confirmation affordance) is displayed below the slider element 1504, at the horizontal location of element 1506, in the virtual object 708. In response to detecting that the attention of the user 1508B is directed to the gaze target 1514, and in accordance with a determination that attention 1508B satisfies gaze target selection criteria (e.g., being directed at gaze target 1514 for longer than a time threshold such as 0.1, 0.3, 0.5, 1, 3, 5, 10 or 20 seconds, as described in more detail with reference to methods 800, 900 and/or 1000), the computer system 101 optionally adjusts a respective value of the slider element 1504 to a value corresponding to the second location of element 1506 in the slider element 1504. In the case that the slider element 1504 is a scrubber bar, the computer system 101 optionally displays in the virtual object 708, a representation 1518 of time elapsed corresponding to the second location.

As illustrated in FIG. 15D, in some embodiments, computer system 101 expands dead zone 1530 to include the representation 1518 so that despite the attention of the user 1508b moving to the representation 1518, the computer system 101 does not move the first visual indication 1506 in the slider element 1504, even though attention 1508B is at a distance away from visual indication 1506 (e.g., horizontally and/or vertically) that would have optionally caused visual indication 1506 to move in FIG. 15A or 15B. In some embodiments, computer system 101 expands dead zone 1530 symmetrically horizontally and/or vertically, or asymmetrically horizontally and/or vertically, such that dead zone 1530 encompasses representation 1518. For example, as shown in FIG. 15D, dead zone 1530 includes the representation 1518. This allows the user to look at the representation 1518 without changing the value of the slider element 1504 and/or the position of element 1506.

Figure 15E:
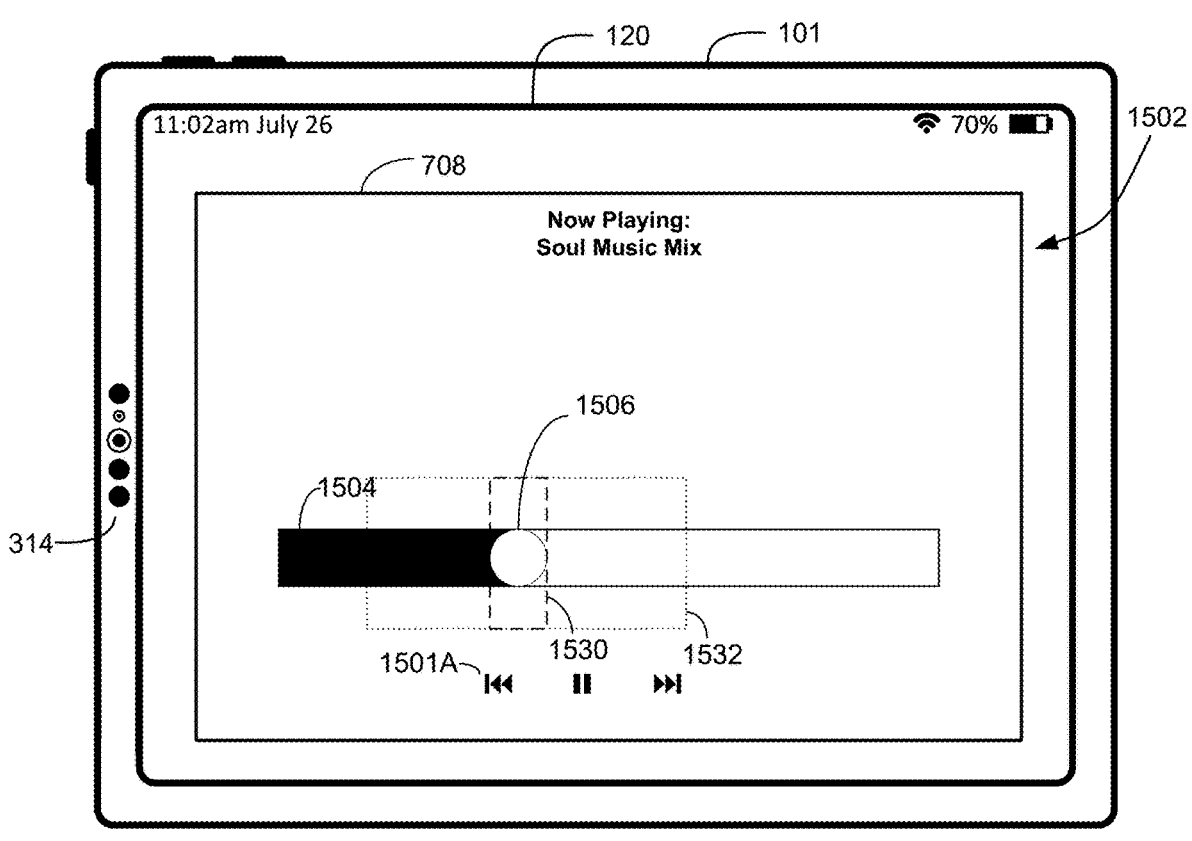
Figure 15E:
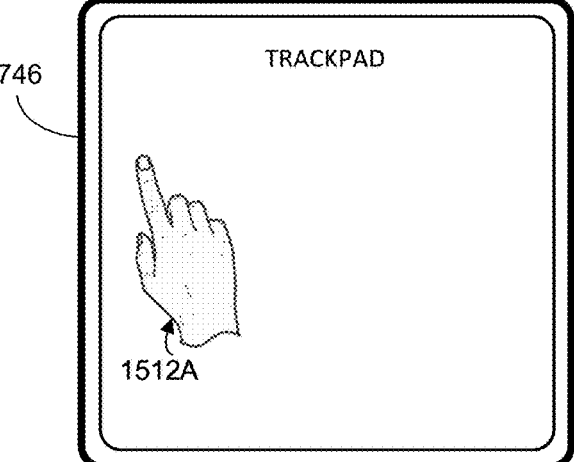

In some embodiments, if the attention 1508c of the user moves away from the gaze target 1514 before satisfying a threshold amount of time as described with respect to methods 800, 900, 1000 and/or 1600, such as attention 1508C in FIG. 15D, the gaze target 1514 gradually disappears as shown in FIG. 15E without changing the value of the slider element 1504. Further, the computer system 101 optionally moves the first visual indication 1506 back to the first location, as shown in FIG. 15E.

Figure 15F:
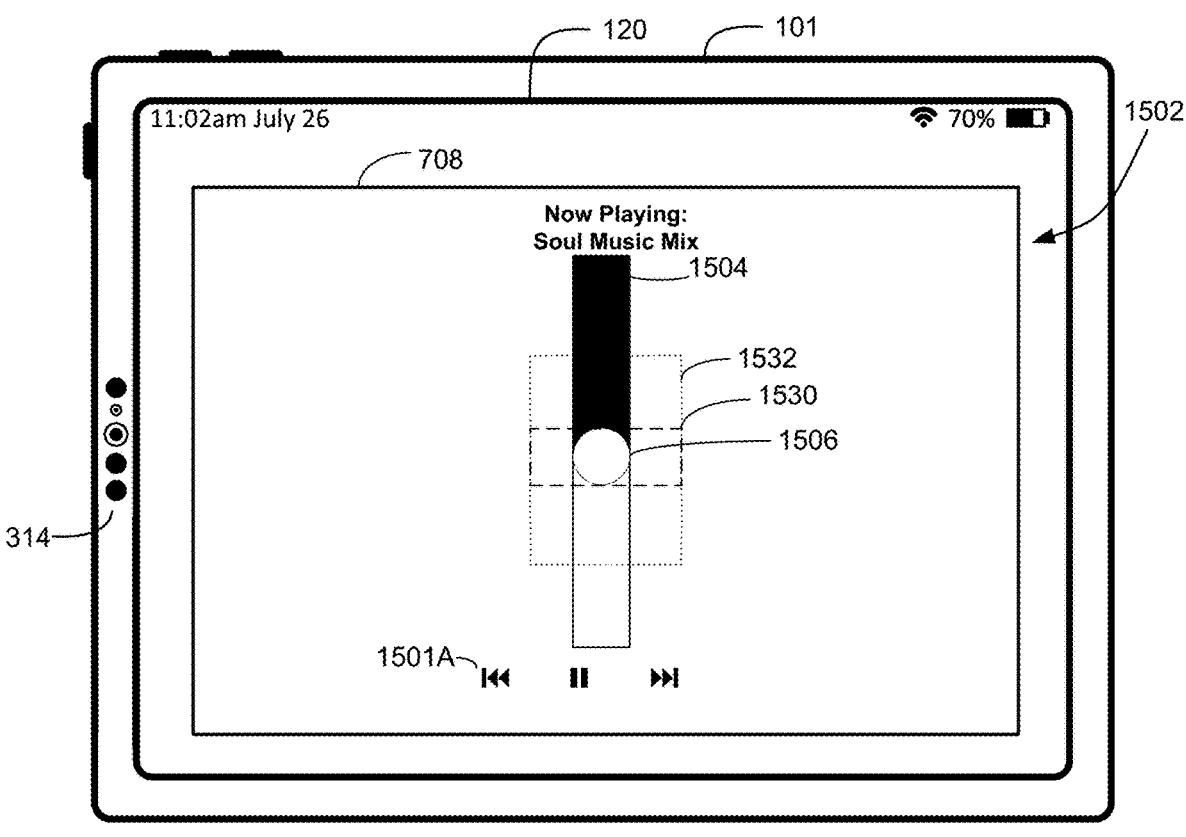
Figure 15F:
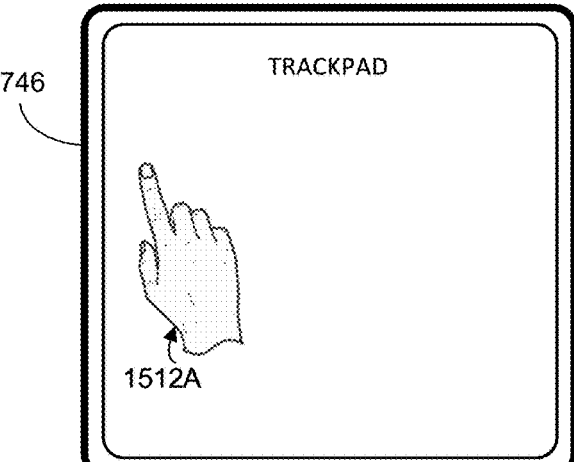
Figure 16A:
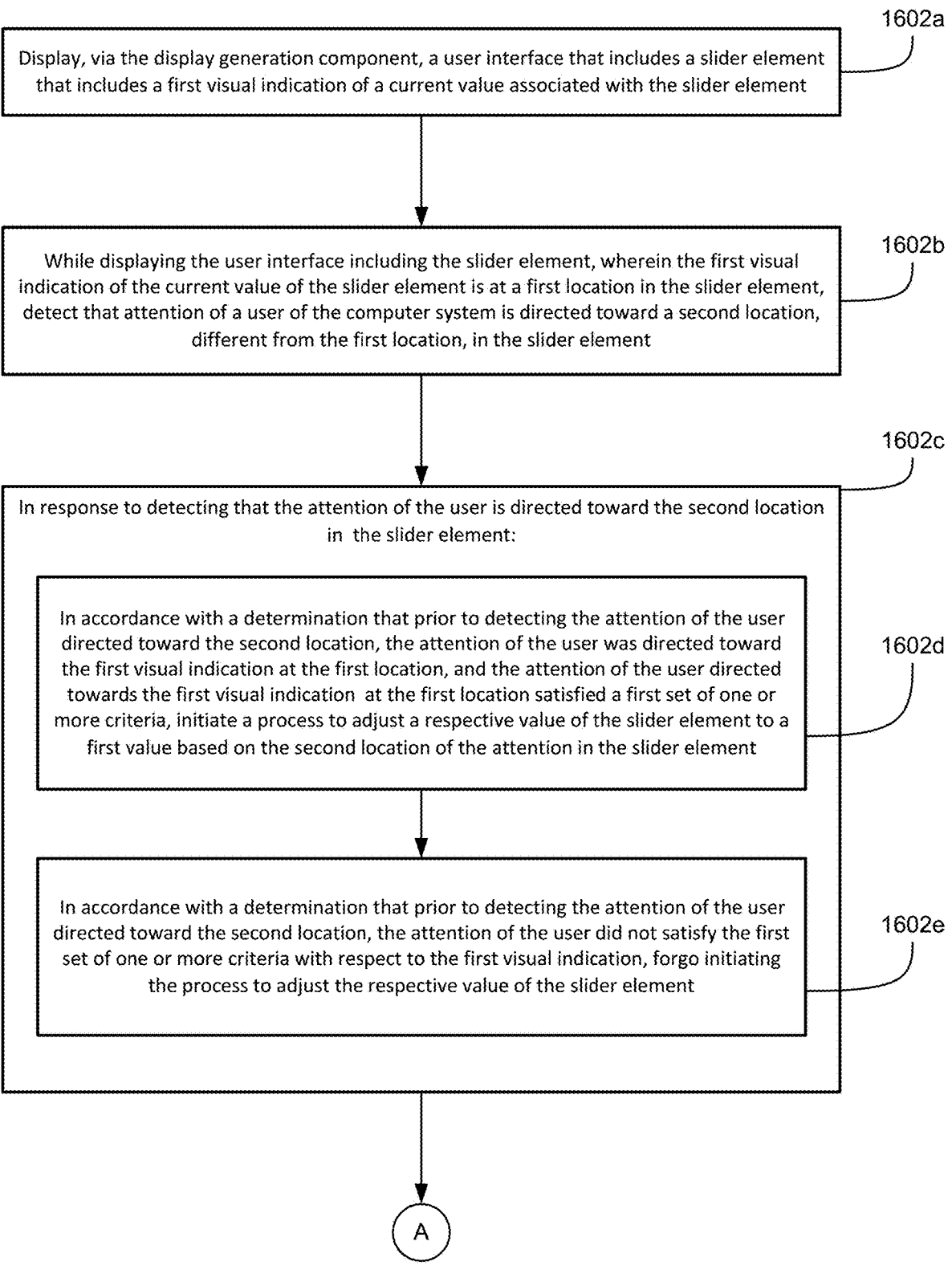
Figure 16B:
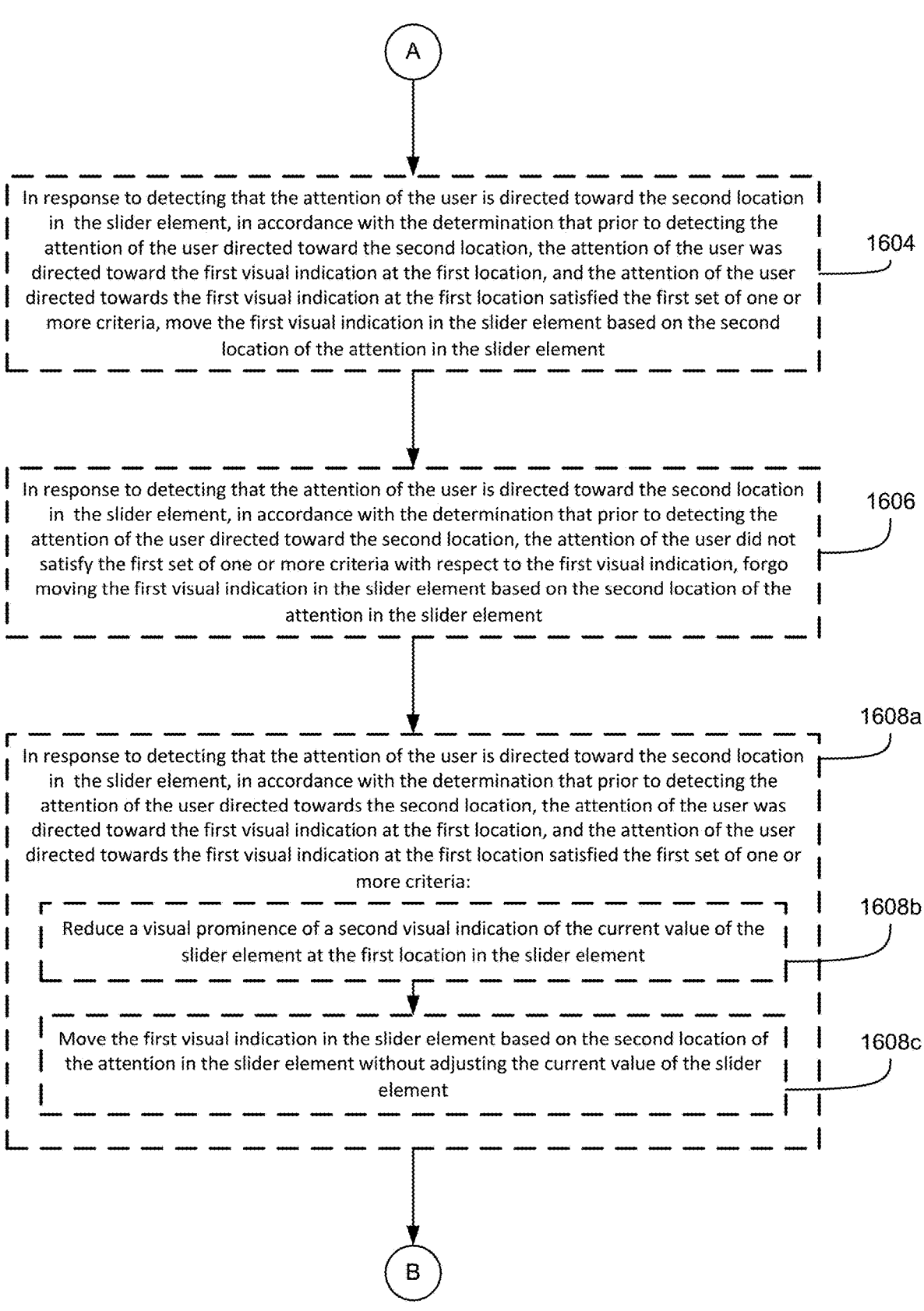
Figure 16D:
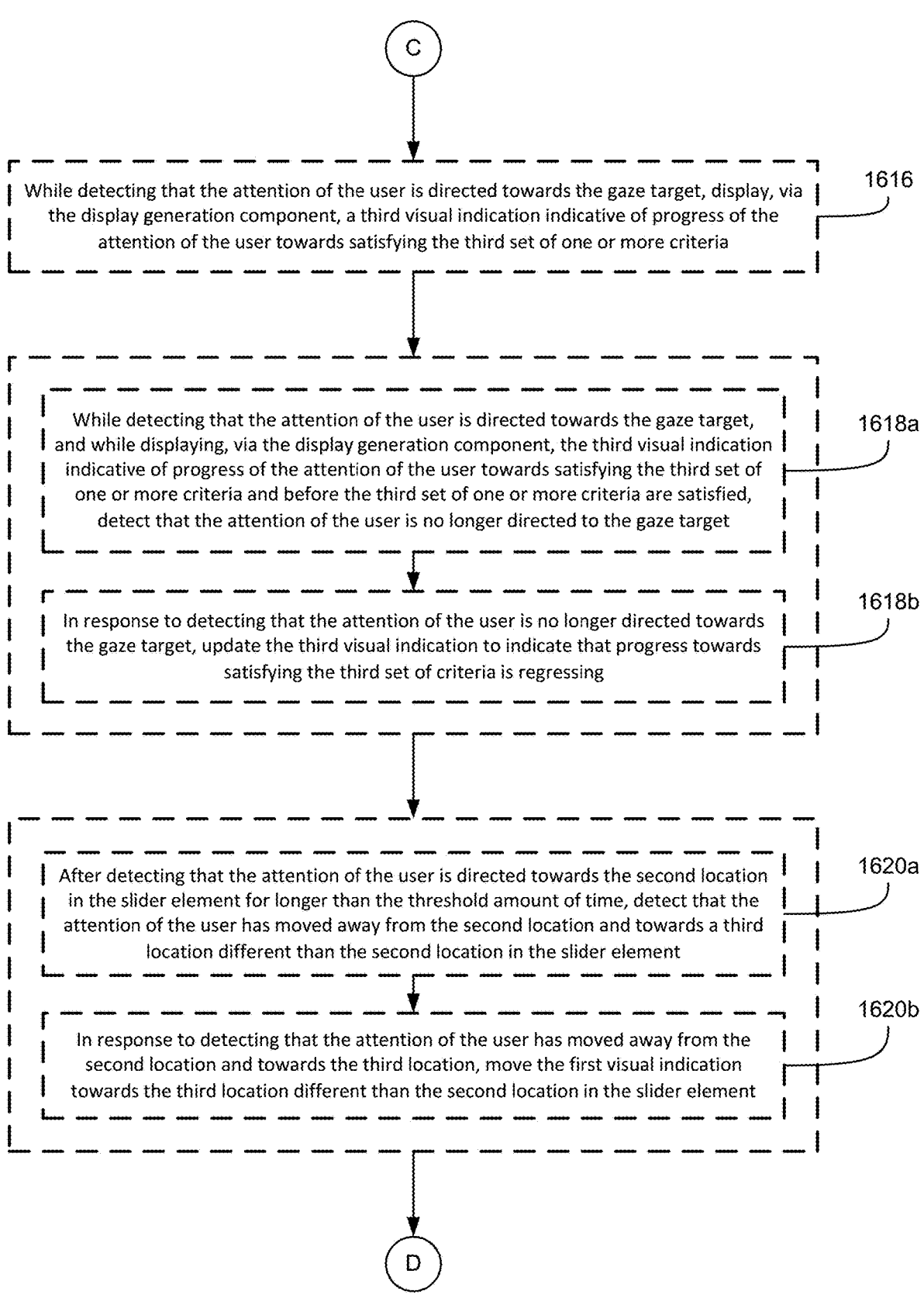
Figure 16E:
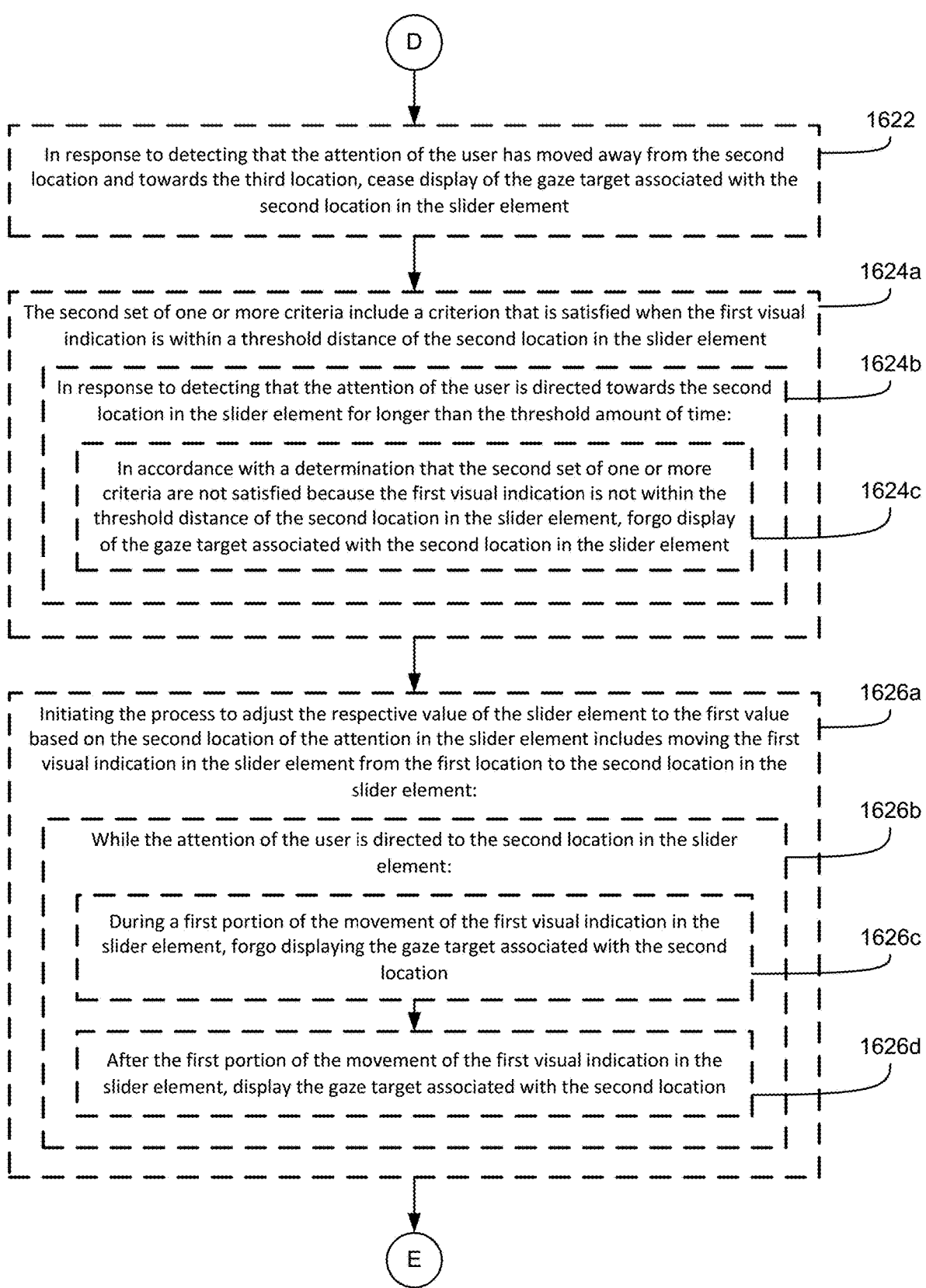
Figure 16G:
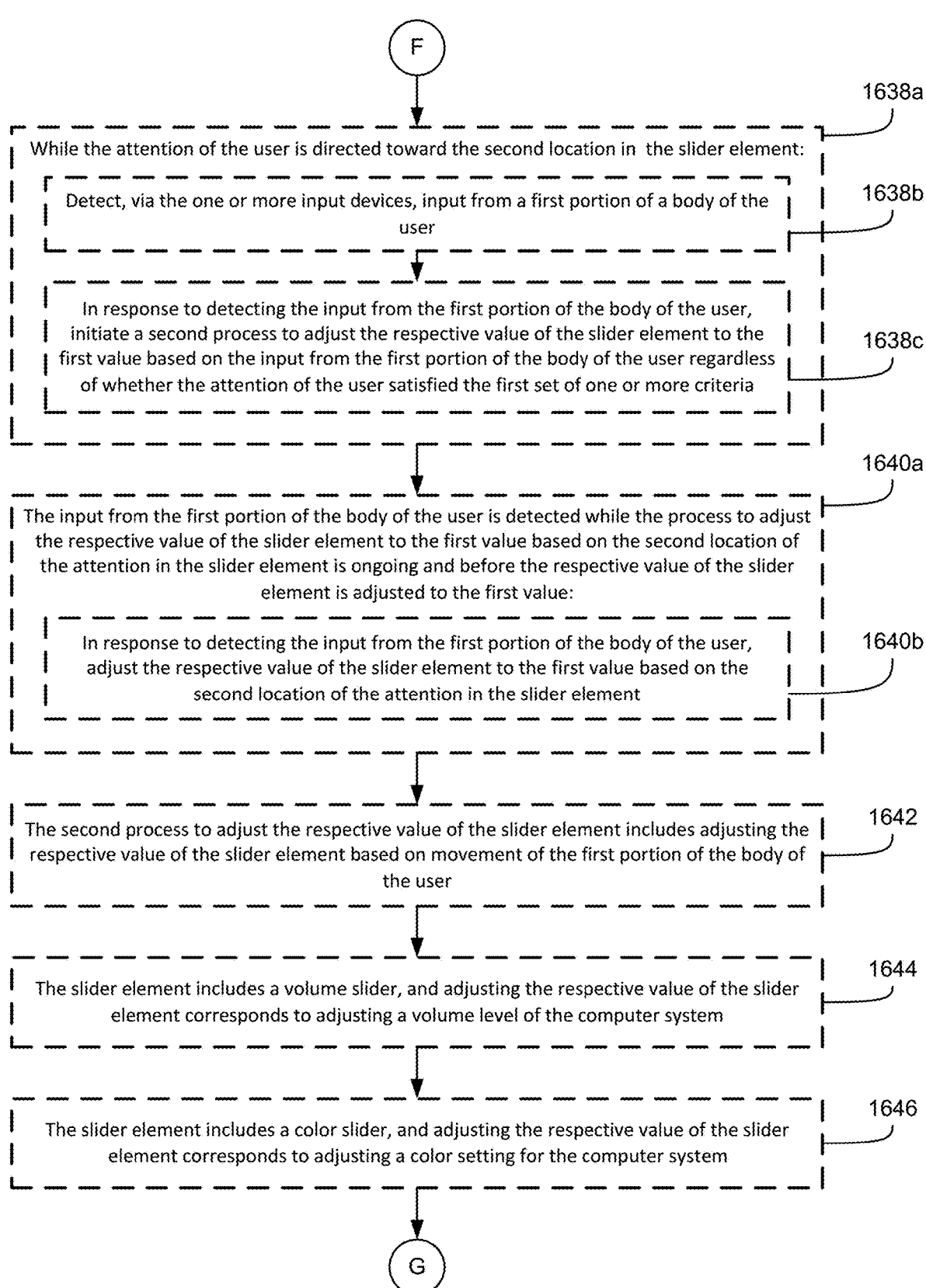

FIGS. 15A-15E illustrate a horizontal slider element 1504. However, in some embodiments, the slider element 1504 is a vertical slider. Accordingly, FIG. 15F illustrates a vertical slider element 1504 (e.g., for controlling volume of computer system 101, for scrolling content (e.g., text, images or videos) in a corresponding user interface displayed by computer system 101, or for changing a level of brightness of computer system 101). The first visual indication 1506 optionally moves from top to bottom of the vertical slider element 1504 in FIG. 15F, analogously to the leftward and rightward movement of indication 1506 in FIGS. 15A-15E. In some embodiments, a respective value of the slider vertical element 1504 increases in a positive or negative direction from top to bottom of the vertical slider element 1504. The various features of slider 1504 described with reference to FIGS. 15A-15E in the context of a horizontal slider element optionally apply analogously to slider 1504 in FIG. 15F, including placement of dead zone 1530 and dynamic zone 1532 relative to indication 1506 and/or relative to the position along the slider corresponding to the current value of the slider. In the case of a vertical slider, the vertical dimensions of dead zone 1530 and dynamic zone 1532 optionally correspond to the horizontal dimensions of dead zone 1530 and dynamic zone 1532 for a horizontal slider, and the horizontal dimensions of dead zone 1530 and dynamic zone 1532 for the vertical slider optionally correspond to the vertical dimensions of dead zone 1530 and dynamic zone 1532 for the horizontal slider.

FIGS. 16A-16E is a flowchart illustrating a method 1600 of adjusting a value of a slider element based on attention of a user in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, the method 1600 is performed at a computer system, such as computer system 101 in FIG. 1, in communication with a display generation component and one or more input devices. In some embodiments, the computer system has one or more of the characteristics of the computer systems of methods 800, 900, 1000, 1200, 1400, 1800, 2000, and/or 2200. In some embodiments, the display generation component has one or more of the characteristics of the display generation component of methods 800, 900, 1000, 1200, 1400, 1800, 2000, and/or 2200. In some embodiments, the one or more input devices have one or more of the characteristics of the one or more input devices of methods 800, 900, 1000, 1200, 1400, 1800, 2000, and/or 2200.

In some embodiments, the computer system displays (1602a), via the display generation component, a user interface that includes a slider element (e.g., a scrubber bar, a timeline bar, a volume slider, or a color slider), such as slider element 1504 in FIG. 15A, that includes a first visual indication, such as a first visual indication 1506 in FIG. 15A, of a current value associated with the slider element (e.g., a thumb, an end of a moveable bar, or other visual indication of the current value associated with the slider element); In some embodiments, the user interface has one or more of the characteristics of the user interfaces and/or three-dimensional environments of methods 800, 900, 1000, 1200, 1400, 1800, 2000, and/or 2200. In some embodiments, given the slider element is a scrubber bar or a timeline bar associated with media content (e.g., image or photograph, video, and/or audio content such as movies, TV shows, or advertisements), the location of the first visual indication corresponds to a current playback position and/or current time of playback with respect to the length of the media content (e.g., amount of time that has elapsed since playback of the media content has begun). In some embodiments, the length of the scrubber bar or the timeline bar corresponds to the length of the media content. In some embodiments, given the slider element is a volume slider associated with media content, the location of the first visual indication corresponds to a level of volume associated with playback of the media content. In some embodiments, given the slider element is a color slider, the location of the first visual indication corresponds to a respective color or shade of the color slider. In some embodiments, movement of the first visual indication along the length of the slider element is bidirectional or in only one direction (e.g., a positive direction from left to right, a clockwise direction, a negative direction from right to left, or a counterclockwise direction). In some embodiments, as the first visual indication moves in a positive direction (e.g., from a left portion to a right portion of the slider element) or in a clockwise direction, the respective value of the slider element increases, such as increases in volume, increases in the amount of time of the media content that has elapsed, or increases in brightness of color (e.g., darker shade). In some embodiments, as the first visual indication moves in a negative direction from a right portion to a left portion of the slider element or in a counterclockwise direction, the respective value of the slider element decreases, such as decreases in volume, decreases in the amount of time of the media content that has elapsed, or decreases in brightness of a color (e.g., lighter shade). On the other hand, in some embodiments, as the first visual indication moves in a negative direction from a right portion to a left portion of the slider element or in a counterclockwise direction, the respective value of the slider element increases, such as increases in volume, increases in the amount of time of the media content that has elapsed, or increases in brightness of color (e.g., darker shade). As the first visual indication moves in a positive direction from a left portion to a right portion of the slider element or in a clockwise direction, the respective value of the slider element optionally decreases, such as decreases in volume, decreases in the amount of time of the media content that has elapsed, or decreases in brightness of a color (e.g., lighter shade).

In some embodiments, while displaying the user interface including the slider element, wherein the first visual indication of the current value of the slider element is at a first location, such as a location of first visual indication 1506 in FIG. 15B, in the slider element, the computer system detects (1602b) that attention of a user, such as attention of a user 1508A in FIG. 15B, of the computer system is directed toward a second location, different from the first location, in the slider element. In some embodiments, the attention of the user started at the first location and moved to the second location; in some embodiments, even though the attention of the user moves from the first location to the second location, the first visual indication remains at the first location. In some embodiments, while the attention of the user moves from the first location to the second location, movement of the first visual indication from the first location to the second location is initiated as described below.

In some embodiments, in response to detecting that the attention of the user is directed toward the second location in (or near) the slider element (1602c), in accordance with a determination that prior to detecting the attention of the user directed toward the second location, the attention of the user was directed toward the first visual indication at the first location, such as attention of user 1508A directed towards first visual indication 1506 in FIG. 15A, and the attention of the user directed towards the first visual indication at the first location satisfied a first set of one or more criteria, the computer system initiates (1602d) a process to adjust a respective value of the slider element to a first value based on the second location of the attention in the slider element, such as value based on a location of attention of user 1508A in FIG. 15D. In some embodiments, the first set of one or more criteria include a criterion that is satisfied when the attention of the user is directed towards the first visual indication at the first location for at least a threshold amount of time such as 0.5, 1, 2, 3, 4, 5, 10, 30, or 100 s prior to being directed towards (e.g., moving towards) the second location. In some embodiments, prior to the attention of the user being directed towards the second location, the first set of one or more criteria include a criterion that is satisfied when the attention of the user is directed only towards the first visual indication at the first location (e.g., without attention of the user directed towards any other location of the slider element for the threshold amount of time). In some embodiments, initiating the process to adjust the respective value of the slider element to the first value includes receiving confirmation or input from the user (e.g., attention of the user directed towards the second location for a second threshold amount of time such as 0.5, 1, 2, 3, 4, 5, 10, 30, or 100 s, and/or attention of the user directed towards a gaze target (e.g., confirmation affordance) associated with the second location, similar to as described with reference to method 800, 900, and/or 1000). In some embodiments, adjusting the respective value includes increasing or decreasing the value of the slider element (e.g., increasing or decreasing time of a timeline bar or volume of a volume slider). In some embodiments, adjusting the respective value includes updating a value of a color slider from a first color associated with the first location to a second color associated with the second location. The second location is optionally in a position right of the first location or left of the first location on the slider element. In some embodiments, given a respective value of the slider element increases in a positive direction (e.g., from left to right) of the slider element, a value corresponding to the second location is greater than a value corresponding to the first location when the second location is in a position right of the first location. For example, the value corresponding to second location optionally includes an increased time interval of a media content, an increased volume level, or an increased brightness of a color. In some embodiments, given a respective value of the slider element increases in a positive direction (e.g., from left to right) of the slider element, a value corresponding to the second location is less than a value corresponding to the first location when the second location is in a position left of the first location. For example, the value corresponding to second location optionally includes a decreased time interval of a media content, a decreased volume level, or a decreased brightness of a color. In some embodiments, given a respective value of the slider element increases in a negative direction (e.g., from right to left) of the slider element, a value corresponding to the second location is greater than a value corresponding to the first location when the second location is in a position left of the first location. In some embodiments, given a respective value of the slider element increases in a negative direction (e.g., from right to left) of the slider element, a value corresponding to the second location is less than a value corresponding to the first location when the second location is in a position right of the first location. In some embodiments, the second location is positioned at a start point (e.g., left most point or right most point) of the slider element, and thus corresponds to a minimum value with respect to the slider element. In some embodiments, the second location is positioned at an endpoint (e.g., left most point or right most point), and thus corresponds to a maximum value with respect the slider element.

In some embodiments, in accordance with a determination that prior to detecting the attention of the user directed toward the second location, the attention of the user did not satisfy the first set of one or more criteria with respect to the first visual indication (e.g., because the attention of the user was not directed toward the first visual indication at the first location or because the attention of the user directed towards the first visual indication at the first location did not satisfy the first set of one or more criteria) (e.g., including a criterion that is satisfied when attention of the user moves from the first visual indication at the first location to a location away from the first visual indication and/or the slider element prior to reaching the prior-described time threshold), the computer system forgoes (1600*e*) initiating the process to adjust the respective value of the slider element, such as forgoing initiating the process to adjust a respective value of slider element 1504 in FIG. 15E. In some embodiments, the process to adjust the respective value of the slider element to the first value based on the second location of the attention in the slider element is not initiated. Changing a value of a slider element based on the attention of the user, and doing so only if the attention of the user satisfies certain criteria, reduces the number of inputs needed, enables selection of more precise values rather than discrete values, reduces erroneous attention-based control of the slider element, and improves respective user-device interactions.

In some embodiments, in response to detecting that the attention of the user is directed toward the second location in (or near) the slider element, in accordance with the determination that prior to detecting the attention of the user directed toward the second location, the attention of the user was directed toward the first visual indication at the first location, and the attention of the user directed towards the first visual indication at the first location satisfied the first set of one or more criteria, the computer system moves (1604) the first visual indication in the slider element based on the second location of the attention in the slider element, such as moving first visual indication 1506 towards location of attention of user 1508A in FIG. 15B. In some embodiments, movement of the first visual indication from the first location to the second location includes movement of the first visual indication at the same rate or a slower rate than the movement of the attention of the user from the first location to the second location. Displaying movement of a visual indication when attention of a user satisfies certain criteria serves to verify initiation of a process to change to a respective value of the slider element, thereby reducing erroneous attention-based control of the slider element and improving respective user-device interactions.

In some embodiments, in response to detecting that the attention of the user is directed toward the second location in (or near) the slider element, in accordance with the determination that prior to detecting the attention of the user directed toward the second location, the attention of the user did not satisfy the first set of one or more criteria with respect to the first visual indication, the computer system forgoes (1606) moving the first visual indication in the slider element based on the second location of the attention in the slider element, such as forgoing moving first visual indication 1506 if attention of user 1508A did not satisfy first set of one or more criteria in FIG. 15B. In some embodiments, the first visual indication remains at the first location in the slider. Ceasing display of movement of a visual indication when attention of a user does not satisfy certain criteria serves to verify forgoing initiation of the process to change to a respective value of the slider element, thus giving feedback to the user that additional action is required to initiate the process, and frees up space for display in the slider element, and reduces clutter.

In some embodiments, in response to detecting that the attention of the user is directed toward the second location in (or near) the slider element, in accordance with the determination that prior to detecting the attention of the user directed towards the second location, the attention of the user was directed toward the first visual indication at the first location, and the attention of the user directed towards the first visual indication at the first location satisfied the first set of one or more criteria (1608*a*), the computer system reduces (1608*b*) a visual prominence of a second visual indication, such as second visual indication 1510 in FIG. 15B, of the current value of the slider element at the first location in the slider element. In some embodiments, the second visual indication at the first location in the slider element is less bright, less opaque, smaller, and/or a different color than the first visual indication at a respective location in the slider element such that the second visual indication (e.g., thumb) serves as a shadow of the first visual indication at an original location (e.g., the first location), indicating the original (e.g., unchanged) value of the slider element.

In some embodiments, the computer system moves (1608*c*) the first visual indication in the slider element based on the second location of the attention in the slider element, such as moving first visual indication 1506 towards location of attention of user 1508A in FIG. 15B, without adjusting the current value of the slider element. In some embodiments, while the first visual indication is moving in the slider element towards the second location, the second visual indication, which is less bright, less opaque, smaller, and/or a different color than the first visual indication, remains displayed at the first location in the slider element. In some embodiments, while the first visual indication is moving in the slider element towards the second location, the second visual indication is not displayed in the slider element. In some embodiments, while the first visual indication is moving in the slider element, a visual appearance of the first visual indication is reduced (e.g., less bright, less opaque, smaller, and/or a different color than the first visual indication the first location). In some embodiments, the second visual indication is the first visual indication. Reducing a visual prominence of the visual indication of the current value of the slider and moving a visual indication from a first location associated with the current value towards a second location in the slider element serves as visual feedback, indicating the start of the process to change the current value of the slider element, thereby reducing errors in interaction with the slider element.

In some embodiments, initiating the process to adjust the respective value of the slider element to the first value based on the second location of the attention in the slider element includes increasing the visual prominence of the first visual indication, such as visual prominence of first visual indication 1506 in FIG. 15D, of the first value of the slider element at the second location in the slider element (e.g., such that the first visual indication is brighter, more opaque, larger, and/or a different color) based on the current value of the slider value corresponding to the first value (1610). In some embodiments, the second visual indication, which is less bright, less opaque, smaller, and/or a different color than the first visual indication, is displayed at the first location in the slider element. In some embodiments, the second visual indication (e.g., shadow of the first visual indication at the first location) is not displayed in the slider element. Increasing a visual prominence of the visual indication of the first value serves as visual feedback, indicating selection of the first value, thereby reducing errors in interaction with the slider element.

In some embodiments, while the process to adjust the respective value of the slider element to the first value is ongoing, the computer system detects (1612a) that the attention of the user is directed towards the second location in (or near) the slider element for longer than a threshold amount of time (e.g., 0.1, 0.5, 1, 2, 3, 4, 5, 10, or 100 s), such as threshold indicator 1522 in FIG. 15D. In some embodiments, in response detecting that the attention of the user is directed towards the second location in the slider element for longer than the threshold amount of time (e.g., 0.1, 0.5, 1, 2, 3, 4, 5, 10, or 100 s) and that a second set of one or more criteria are satisfied, the computer system displays (1612b), via the display generation component, a gaze target (e.g., a confirmation affordance), such as gaze target 1514 in FIG. 15D, for updating the current value of the slider element to the first value. In some embodiments, the gaze target includes one or more characteristics of the gaze target of methods 800, 900, and/or 1000. In some embodiments, the gaze target is displayed outside the slider element. In some embodiments, the gaze target is displayed slightly below, above, to the left of, or to the right of the second location. In some embodiments, the second set of one or more criteria includes one or more characteristics of the first set of one or more criteria of step(s) 1602. In some embodiments, the second set of one or more criteria include one or more characteristics of the criteria for displaying gaze targets described in methods 800, 900 and/or 1000. In some embodiments, the second visual indication of step(s) 1608-1610, which is less bright, less opaque, smaller, and/or a different color than the first visual indication, is not displayed at (e.g., disappears from) the first location in the slider element when the gaze target is displayed. Displaying a gaze target near the attention of the user serves as a verification to update the current value, and avoids accidental changing of the current value, thereby reducing erroneous inputs with respect to the slider element.

In some embodiments, while displaying the gaze target for updating the current value (e.g., associated with a prior location of the first visual indication prior to the first visual indication moving towards the second location) of the slider element to the first value, the computer system detects (1614a) that the attention of the user, such as attention of user 1508B in FIG. 15D, is directed towards the gaze target. In some embodiments, in response to detecting that the attention of the user is directed to the gaze target, in accordance with a determination that the attention of the user satisfies a third set of one or more criteria, the computer system adjusts (1614b) the respective value of the slider element to the first value, such a time value 1518 in FIG. 15D, based on the second location of the attention in the slider element (e.g., such as the process to adjust the respective value of the slider element described with respect to step(s) 1602). In some embodiments, the third set of one or more criteria includes a criterion that is satisfied when the attention of the user is directed towards the gaze target for at least a threshold amount of time such as 0.1, 0.5, 1, 2, 3, 4, 5, 10, 30, or 100 s. In some embodiments, the third set of one or more criteria include a criterion that is satisfied when the attention of the user is directed only towards the gaze target (e.g., without attention of the user directed towards any other location for the threshold amount of time). In some embodiments, the third set of one or more criteria has one or more of the characteristics of selecting a gaze target described with reference to methods 800, 900 and/or 1000. Adjusting a respective value of the slider element based on the attention of the user directed at the gaze target meeting certain criteria serves as a verification to adjust the respective value of the slider element, and provides an efficient method for adjusting the current value by using attention, thereby reducing erroneous inputs with respect to the slider element.

In some embodiments, while detecting that the attention of the user is directed towards the gaze target, the computer system displays (1616), via the display generation component, a third visual indication, such as time scale 1520 in FIGS. 15C-15D, indicative of progress of the attention of the user towards satisfying the third set of one or more criteria (of step(s) 1614). In some embodiments, the third visual indication includes a timer bar. The timer bar optionally includes a position indicator that indicates a current time with respect to the threshold amount of time corresponding to the third set of one or more criteria (e.g., amount of time that has elapsed since attention of the user was directed towards the gaze target). In some embodiments, the third visual indication includes a progress ring, indicating a progression of the amount of time that the attention of the user has been directed towards the gaze target with respect to the threshold amount of time. A filled in portion of the progress ring optionally indicates the amount of time that has elapsed since attention of the user has been directed towards the gaze target. The third visualization is optionally displayed outside the slider element. In some embodiments, the third visualization is displayed slightly below, above, to the left of, and/or to the right of the gaze target. In some embodiments, the third visual indication has one or more of the indications of progress of selection of gaze targets described with reference to methods 800, 900 and/or 1000. Displaying a progress element serves to provide a current status of the attention of the user at the gaze target meeting certain criteria for changing the value of the slider element, thus providing opportunity for the user to adjust inputs if necessary.

In some embodiments, while detecting that the attention of the user is directed towards the gaze target, and while displaying, via the display generation component, the third visual indication indicative of progress of the attention of the user towards satisfying the third set of one or more criteria and before the third set of one or more criteria are satisfied, the computer system detects (1618a) that the attention of the user, such as attention of user 1508C in FIG. 15D, is no longer directed to the gaze target (e.g., attention of the user moves away from the gaze target before the amount of time that has elapsed since attention of the user was directed towards the gaze target has met the threshold amount of time).

In some embodiments, in response to detecting that the attention of the user is no longer directed towards the gaze target, the computer system updates (1618b) the third visual indication to indicate that progress towards satisfying the third set of criteria is regressing, such as time scale 1520 regressing in progress if attention of user 1508C is no longer directed to gaze target 1514 in FIG. 15D. The position indicator, which indicates a current time with respect to the threshold amount of time, optionally begins moving towards a starting position based on the attention of the user having moved away from the gaze target. In some embodiments, as the position indicator moves towards a starting position (e.g., 0s) on the timer bar, the timer bar gradually begins disappearing (e.g., fading away) until the timer is no longer displayed. A filled in portion of the progress ring, indicating the amount of time that has elapsed since attention of the user has been directed towards the gaze target, optionally decreases in size based on the attention of the user having moved away from the gaze target. In some embodiments, as the filled-in portion decreases in size, the progress ring gradually begins disappearing (e.g., fading away) until the progress ring is no longer displayed. In some embodiments, as the third visual indication gradually disappears, the gaze target gradually disappears. In some embodiments, the visual indication of progress towards selecting a gaze target gradually regressing or decaying has one or more of the characteristics of such indications described with reference to methods 800, 900 and/or 1000. Gradually ceasing display of a progress element serves as visual feedback, indicating that the attention of the user failed to satisfy certain criteria for changing the value of the slider element as well as frees up space for display in a user interface, thereby reducing clutter.

In some embodiments, after detecting that the attention of the user is directed towards the second location in the slider element for longer than the threshold amount of time (e.g., 0.5, 1, 2, 3, 4, 5, 10, or 100 s), the computer system detects (1620*a*) that the attention of the user has moved away from the second location and towards a third location different than the second location in the slider element (e.g., where the third location is optionally to the left or right of the second location), such as a third location to the left of a location of first visual indication 1506 in FIG. 15D.

In some embodiments, in response to detecting that the attention of the user has moved away from the second location and towards the third location, the computer system moves (1620*b*) the first visual indication (e.g., from the second location) towards the third location different than the second location in the slider element, such as moving first visual indication 1506 to a third location in FIG. 15E, (e.g., with one or more of the characteristics described with reference to step(s) 1602). In some embodiments, movement of the first visual indication from the second location to the third location includes movement of the first visual indication at the same rate or a slower rate than the movement of the attention of the user from the second location to the third location. Displaying movement of a visual indication towards a third location serves as visual feedback, indicating that attention of the user has moved towards the third location, and that the process to change the current value of the slider element is ongoing.

In some embodiments, in response to detecting that the attention of the user has moved away from the second location and towards the third location, the computer system ceases (1622) display of the gaze target, such as ceasing display of gaze target in FIG. 15E, associated with the second location in the slider element. Ceasing display of the gaze target when not needed (e.g., when attention of the user has moved away from the second location) frees up space for display in a user interface, and reduces clutter.

In some embodiments, the second set of one or more criteria include a criterion that is satisfied when the first visual indication is (e.g., near or) within a threshold distance (e.g., 0.01, 0.1, 1, or 10 cm) of the second location in the slider element (1624*a*). In some embodiments, in response to detecting that the attention of the user is directed towards the second location in (or near) the slider element for longer than the threshold amount of time (e.g., 0.1, 0.5, 1, 2, 3, 4, 5, 10, or 100 s) (1624*b*), in accordance with a determination that the second set of one or more criteria are not satisfied because the first visual indication is not within the threshold distance (e.g., 0.01, 0.1, 1, or 10 cm) of the second location in the slider element, the computer system forgoes (1624*c*) display of the gaze target associated with the second location in the slider element, such as forgoing display of gaze target since first visual indication 1506 is not near location of attention of user 1508A in FIG. 15B. In some embodiments, the gaze target is not displayed nor is audio feedback provided when the first visual indication is not within the threshold distance of the second location. In some embodiments, the gaze target is displayed and/or audio feedback is provided when the first visual indication is within the threshold distance of the second location. In some embodiments, additional or different audio feedback is provided when selection of the gaze target using attention is detected. The audio feedback has one or more of the characteristics of the audio feedback described with reference to methods 800, 900 and/or 1000. Displaying the gaze target only when the first visual indication is near the location of the attention of the user frees up space for display in a user interface, and reduces clutter.

In some embodiments, initiating the process to adjust the respective value of the slider element to the first value based on the second location of the attention in the slider element includes moving the first visual indication, such as moving first visual indication 1506 in FIG. 15B, in the slider element from the first location to the second location in the slider element (e.g., as described with reference to step 1604) (1626*a*). In some embodiments, while the attention of the user is directed to the second location in the slider element (1626*b*), during a first portion of the movement of the first visual indication in the slider element, the computer system forgoes (1626*c*) displaying the gaze target associated with the second location, such as forgoing display of gaze target in FIGS. 15C and 15C1. In some embodiments, after the first portion of the movement of the first visual indication in the slider element, the computer system displays (1626*d*) the gaze target, such as gaze target 1514 in FIG. 15D, associated with the second location. In some embodiment, during the first portion of the movement, the first visual indication is far or more a first threshold distance (e.g., 0.1, 1, 2, 3, 4, 5, 10, or 100 cm) away from the second location. In some embodiment, after the first portion of the movement, the first visual indication is closer than a second threshold distance (e.g., 0.01, 0.1, 1, 2, 3, 4, 5, or 10 cm) away from the second location. In some embodiment, during the first portion of the movement, the first visual indication has been moving towards the second location for less than a threshold amount of time (e.g., 0.1, 1, 2, 3, 4, 5, 10, or 100 s). In some embodiment, after the first portion of the movement, the first visual indication has been moving towards the second location for greater than the threshold amount of time (e.g., 0.1, 1, 2, 3, 4, 5, 10, or 100 s). Displaying the gaze target for updating a respective value of the slider element once a visual indication is near the second location prevents a system from adjusting a respective value of the slider element prematurely, and reduces clutter in the user interface.

In some embodiments, while the process to adjust the respective value of the slider element to the first value based on the second location of the attention in the slider element is ongoing (1628*a*), the computer system detects (1628*b*) that the attention of the user, such as attention of user 1508C in FIG. 15D, moves away from the slider element (e.g., attention of the user is not at any location within the slider element, at an edge of the slider element, or near the slider element). In some embodiments, in response to detecting that the attention of the user moves away from the slider element, the computer system ceases (1628c) the process to adjust the respective value of the slider element, such as ceasing process to adjust respective value of slider element 1504 in FIG. 15E (e.g., the respective value remains as the first value). Canceling the process to adjust the respective value of the slider element saves processing power associated with adjusting the respective value when not needed.

In some embodiments, ceasing the process to adjust the respective value of the slider element includes ceasing display of the first visual indication, such as ceasing display of first visual indication 1506 in FIG. 15E if ceasing process to adjust respective value (1630). In some embodiments, the first visual indication reduces in visual prominence (e.g., less bright, dimmer, a different color, and/or smaller) before gradually disappearing based on ceasing the process to change the value of the slider element. Ceasing display of a visual indication when not needed (e.g., canceling the process to adjust the respective value of the slider element) frees up space for display in a user interface, and reduces clutter.

In some embodiments, ceasing the process to adjust the respective value of the slider element includes moving the first visual indication (from the location of the first visual indication in the slider element when the attention was detected as being directed away from the slider element) to the first location (e.g., to which the attention was directed prior to being directed towards the second location), such as moving first visual indication 1506 to initial location in FIG. 15E, in the slider element (1632). In some embodiments, while the first visual indication moves towards the first location, the first visual indication reduces in visual prominence (e.g., less bright, dimmer, a different color, and/or smaller). In some embodiments, once the first visual indication returns to the first location, the first visual indication increases in visual prominence (e.g., brighter, less dim, a different color, and/or larger). Moving a visual indication to an original location in the slider element serves as visual feedback, indicating canceling of the process to adjust the respective value of the slider element.

In some embodiments, ceasing the process to adjust the respective value of the slider element includes (1634a), in accordance with a determination that a gaze target that is associated with the second location is displayed, the computer system ceases (1634b) display of the gaze target, such as ceasing display of gaze target in FIG. 15E. In some embodiments, the gaze target reduces in visual prominence (e.g., less bright, dimmer, a different color, and/or smaller) before gradually disappearing away based on ceasing the process to change the value of the slider element. Ceasing display of the gaze target when not needed (e.g., canceling the process to adjust the respective value of the slider element) frees up space for display in a user interface, and reduces clutter.

In some embodiments, in response to detecting that the attention of the user is directed toward the second location, the computer system displays (1636) a fourth visual indication, such as gaze glow at attention of user 1508A in FIG. 15B, indicative of the attention of the user at the second location in the slider element. In some embodiments, the fourth visual indication includes one or more characteristics of the attention indicator of methods 1200 and/or 2000. In some embodiments, the fourth visual indication is displayed having a first visual appearance (e.g., first degree of coloring, first shape, first size, or first degree of transparency) at the second location in the user interface. In some embodiments, the fourth visual indication is initially displayed as a circle. Displaying an attention indicator serves as visual feedback (e.g., indicating a position of the user's attention), which enhances the operability of the slider element, which additionally reduces errors in usage of the slider element.

In some embodiments, while the attention of the user is directed toward the second location in (or near) the slider element (1638a), the computer system detects (1638b), via the one or more input devices, input from a first portion (e.g., hand), such as hand 1512B in FIG. 15B, of a body of the user. In some embodiments, in response to detecting the input from the first portion (e.g., hand) of the body of the user, the computer system initiates (1638c) a second process to adjust the respective value of the slider element to the first value, such as adjusting respective value of slider element 1504 in FIG. 15D, based on the input from the first portion of the body of the user regardless of whether the attention of the user satisfied the first set of one or more criteria (e.g., as described with respect to step(s) 1602). In some embodiments, the input from the first portion of the body of the user is an air gesture input provided by the hand of the user and is directed to the second location in the slider element. In some embodiments, the air gesture input provided by the hand of the user includes a pinching gesture in which a thumb and index finger of the hand move toward each other and touch while the attention of the user is directed to the second location. In some embodiments, the input includes the hand of the user pointed towards the second location (e.g., from a threshold distance such as 0.1, 1, or 10 cm away from the second location) while the attention of the user is directed to the second location. In some embodiments, in response to the first input, the current value of the slider element is changed immediately without waiting for the first visual indication to move to the second location and/or without waiting for attention-based confirmation of the updated value of the slider element corresponding to the second location. Input from a hand of the user as another way to adjust a respective value of the slider element increases flexibility of interacting with the slider element and optionally saves time and processing power for adjusting the current value of the slider element.

In some embodiments, the input from the first portion (e.g., hand) of the body of the user is detected while the process to adjust the respective value of the slider element to the first value based on the second location of the attention in the slider element is ongoing and before the respective value of the slider element is adjusted to the first value (1640a). In some embodiments, in response to detecting the input from the first portion (e.g., hand), such as hand 1512B in a pinching gesture in FIG. 15B, of the body of the user, the computer system adjusts (1640b) the respective value of the slider element to the first value based on the second location of the attention in the slider element. In some embodiments, in response to the hand of the user in the pinching gesture in indirect interaction (e.g., pinch down) with the second location, the respective value of the slider element is adjusted to the first value when the thumb and index finger making the pinching gesture come together and touch (and subsequent move apart from one another within a time threshold, such as 0.05, 0.1, 0.5, 1, 3, 5, or 10 seconds, of coming together and touching). In some embodiments, in response to the hand of the user in direct interaction with (e.g., tapping) the second location, the respective value of the slider element is adjusted to the first value. Confirming the value change for the slider element in response to the first input, without waiting for attention-based confirmation, reduces the time needed to update the value of the slider element.

In some embodiments, the second process to adjust the respective value of the slider element includes adjusting the respective value of the slider element (e.g., continuously) based on movement of the first portion (e.g., hand), such as movement of hand 1512B in FIG. 15B, of the body of the user (1642) (e.g., while in the pinch hand shape, such as while holding the tip of the thumb and index finger in contact with one another). In some embodiments, the respective value of the slider element is adjusted according to a location the hand of the user relative to the slider element. In some embodiments, if the hand of the user moves towards a left portion of the slider element (e.g., while in the pinch hand shape), the respective value of the slider element is decreased, given a value of the slider element increases from left to right. In some embodiments, if the hand of the user moves towards a right portion of the slider element (e.g., while in the pinch hand shape), the respective value of the slider element is increased, given a value of the slider element increases from left to right. In some embodiments, if the hand of the user moves towards a left portion of the slider element (e.g., while in the pinch hand shape), the respective value of the slider element is increased, given a value of the slider element decreases from left to right. In some embodiments, if the hand of the user moves towards a right portion of the slider element (e.g., while in the pinch hand shape), the respective value of the slider element is decreased, given a value of the slider element decreases from left to right. Adjusting a respective value of the slider based on movement of the hand of the user provides efficient control of the slider element and reduces the lag in adjusting the respective value generally associated with a visual indication corresponding to the attention of the user moving towards a location of the respective value in the slider element.

In some embodiments, the slider element includes a volume slider, such as slider element 1504 including a volume slider in FIG. 15A, and adjusting the respective value of the slider element corresponds to adjusting (e.g., increasing or decreasing) a volume level of the computer system (1644) (e.g., based on movement of the first visual indication from left to right, right to left, clockwise, or counterclockwise as described with respect to step(s) 1602). In some embodiments, given the slider element is a volume slider associated with media content, a location of the first visual indication corresponds to a level of volume associated with playback of the media content. Changing a value of a volume slider based on the attention of the user based on the attention of the user satisfying certain criteria reduces erroneous attention-based control of the volume slider.

In some embodiments, the slider element includes a color slider, such as slider element 1504 including a color slider in FIG. 15A, and adjusting the respective value of the slider element corresponds to adjusting (e.g., increasing or decreasing) a color setting for the computer system (1646) (e.g., based on movement of the first visual indication from left to right, right to left, clockwise, or counterclockwise as described with respect to step(s) 1602). In some embodiments, given the slider element is a color slider for a virtual input device such as a virtual pen, virtual marking tool, or a virtual brush (e.g., the color of the marks that would be made in the user interface in response to marking inputs from the virtual input device), the location of the first visual indication corresponds to a respective color or shade of the color slider. Changing a value of a color slider based on the attention of the user based on the attention of the user satisfying certain criteria reduces erroneous attention-based control of the color slider.

In some embodiments, the slider element includes a content playback control slider, such as slider element 1504 for a virtual object (e.g., media item) 708 in FIG. 15A, adjusting the respective value of the slider element corresponds to adjusting (e.g., increasing or decreasing) a current playback position within a content item (e.g., based on movement of the first visual indication from left to right, right to left, clockwise, or counterclockwise as described with respect to step(s) 1602), and initiating the process to adjust the respective value of the slider element to the first value based on the second location of the attention in the slider element includes displaying, via the display generation component, a preview of a respective playback position, such as preview 1518 in FIG. 15D, corresponding to a current position of the first visual indication in the slider element (1648). In some embodiments, when the slider element is the content playback control slider, it includes a scrubber bar or a timeline bar associated with media content (e.g., image or photograph, video, and/or audio content such as movies, TV shows, or advertisements), and the location of the first visual indication corresponds to a current playback position and/or current time of playback with respect to the length of the media content (e.g., amount of time that has elapsed since playback of the media content has begun). In some embodiments, the length of the scrubber bar or the timeline bar corresponds to the length of the media content. In some embodiments, the preview is an image or video of the respective playback position of the media content (e.g., corresponding to the current position of the first visual indication in the slider element). In some embodiments, the preview is smaller than the size of the media content. In some embodiments, the preview is displayed outside the content playback control slider. In some embodiments, the preview is displayed above, below, or near the first visual indication in the content playback control slider. In some embodiments, until verifying a change to the respective value (e.g., by detecting that the attention of the user directed to the gaze target satisfies the third set of one or more criteria as described with respect to step(s) 1614), the preview includes a different portion of the media content than the portion of the media content displayed with the slider element within the media playback user interface. Changing a value of a content playback control slider based on the attention of the user based on the attention of the user satisfying certain criteria reduces erroneous attention-based control of the content playback control slider, and displaying a preview of the respective playback position serves as visual feedback for a current position in the content playback control slider.

In some embodiments, in response to detecting that the attention of the user is directed toward the second location, the computer system displays (1650a) a fourth visual indication (e.g., such as described with respect to step 1636), such as gaze glow at attention of user 1508A in FIG. 15B, indicative of the attention of the user at the second location in the slider element. In some embodiments, while displaying the fourth visual indication indicative of the attention of the user at the second location in the slider element, the computer system detects (1650b) movement of the attention of the user relative to the slider element. In some embodiments, in response to detecting the movement of the attention of the user relative to the slider element, the computer system moves (1650c) the fourth visual indication, such as gaze glow at attention of user 1508C in FIG. 15D, indicative of the attention of the user in the slider element based on the movement of the attention of the user relative to the slider element. In some embodiments, the fourth visual indication is moved to be displayed at a current location of the attention of the user in the sider element. In some embodiments, movement of the fourth visual indication to a respective location of the attention of the user includes movement of the fourth visual indication at the same rate or a slower rate than the movement of the attention of the user towards the respective location. In some embodiments, the movement of the attention indicator has one or more of the characteristics of the movement of the attention indicator described with reference to methods 1200 and/or 2000. Moving an attention indicator as the position of the user's attention moves serves as visual feedback, which enhances the operability of the slider element, which additionally reduces errors in usage of the slider element.

It should be understood that the particular order in which the operations in method 1600 have been described is merely exemplary and is not intended to indicate that the described order is the only order in which the operations could be performed. One of ordinary skill in the art would recognize various ways to reorder the operations described herein.

FIGS. 17A-17G illustrate examples of a computer system moving a user interface element (e.g., thumb) in a user interface (e.g., slider element) at a respective rate based on attention of a user in accordance with some embodiments.

Figure 17A:
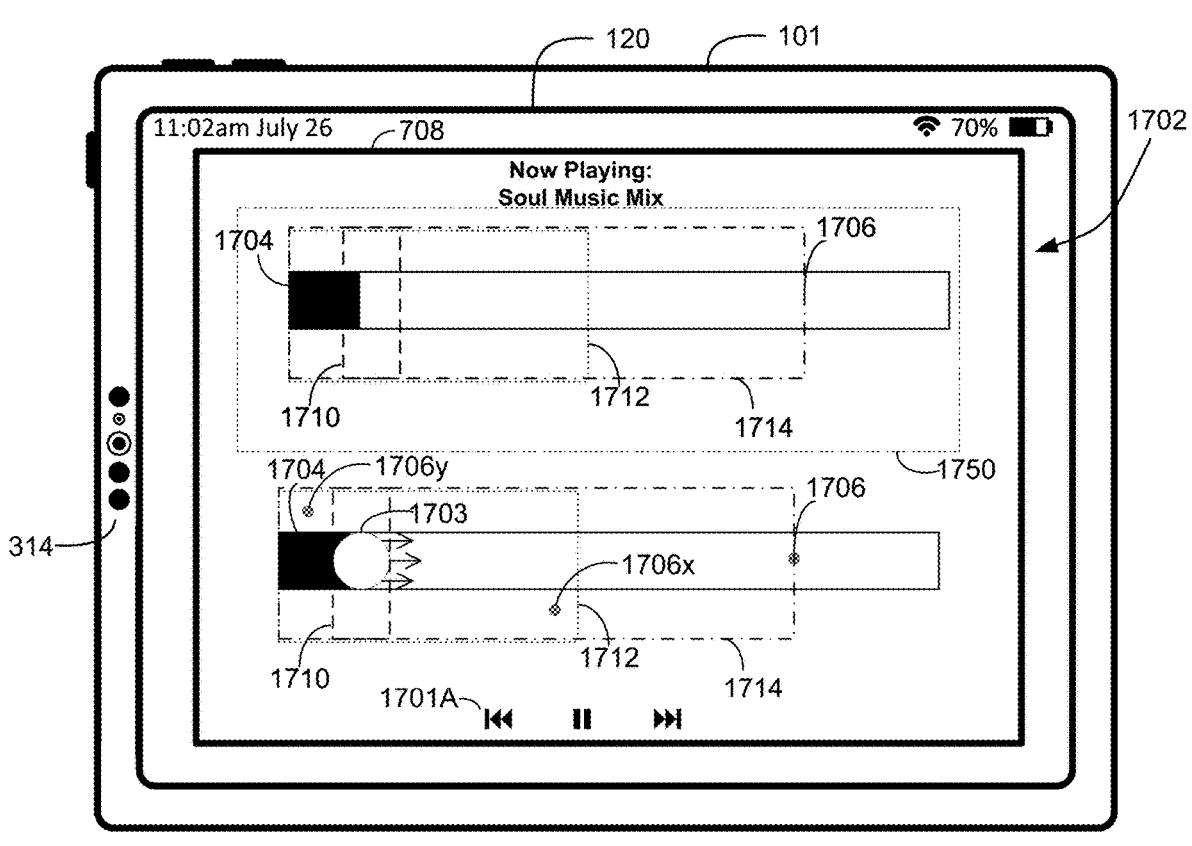
FIGS. 17A-17G illustrate examples of a computer system moving a user interface element (e.g., thumb) in a user interface (e.g., slider element) at a respective rate based on attention of a user in accordance with some embodiments.
Figure 17A:
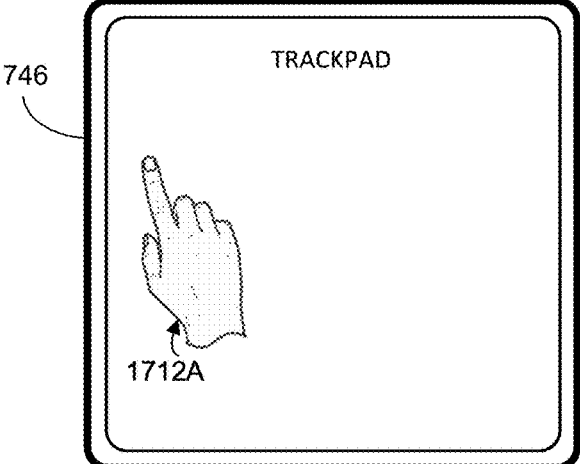

FIG. 17A illustrates a computer system 101 displaying, via a display generation component (e.g., display generation component 120 of FIG. 1), a three-dimensional environment 1702. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

In some embodiments, input to the computer system 101 is provided via attention 1706 of the user (e.g., as described in more detail with reference to method 1800), or via trackpad 746 from hand 1712a, and inputs described herein are optionally received via trackpad 746 or via attention.

In FIG. 17A, three-dimensional environment 1702 includes a virtual object 708 such as a music player that includes one or more selectable virtual objects 1701A to initiate playback, pause playback, skip to a previous playback portion, and/or skip ahead to a next playback portion of a first media item ("Soul Music Mix"). The virtual object 708 includes a slider element 1704 (e.g., user interface as described with respect to methods 1600 and/or 1800) corresponding to the first media item. The slider element 1704 includes a scrubber bar associated with the first media content. A first user interface element 1703 (e.g., thumb or circle) as described with respect to methods 1600 and/or 1800 is optionally displayed in the slider element 1704, though it is understood that the features of the embodiments described here can be similarly implemented in a slider element 1704 that does not include the first user interface element 1703. A location of the first user interface element 1703 in the slider element 1704 corresponds to a current playback position and/or current time of playback with respect to the length of the first media item (e.g., amount of time that has elapsed since playback of the first media item has begun). As illustrated in FIG. 17A, the first user interface element 1703 is in a first location (e.g., corresponding to a playback position at which about 10% of the first media item has elapsed) while the attention of the user 1706 is directed to a second location (e.g., corresponding to a playback position at which about 80% of the first media item has elapsed) in the slider element 1704.

As illustrated in FIG. 17A, a first area of the slider element 1704 that corresponds to a size (e.g., length, width and/or area) of the first user interface element 1703 is referred to as a dead zone 1710 (illustrated with a dashed boundary and described in detail with respect to method 1800). As described with respect to method 1800, a second area of the slider element 1704 (e.g., illustrated with the dotted boundary) corresponds to a dynamic zone 1712. Further, as described with respect to method 1800, a third area of the slider element 1704 (e.g., illustrated with the dashed and dotted boundary) corresponds to a constant zone 1714. In FIG. 17A, because the attention of the user 1706 is outside a rightmost boundary of the dynamic zone 1712, and in the constant zone 1714, the computer system 101 optionally moves the user interface element 1703 with a (e.g., fixed) rate corresponding to the constant zone 1714 towards the second location (e.g., as indicated by the three arrows in FIG. 17A). If slider element 1704 does not include the first user interface element 1703, the dead zone 1710 is optionally still positioned within the slider element at the location corresponding to the current value of the slider element (e.g., optionally where first user interface element 1703 would be displayed if slider element 1704 included it).

FIG. 17A also illustrates a dynamic zone 1710 that extends beyond dead zone 1710, and which controls movement of the first user interface element 1703 in slider element 1704 with a dynamic rate, as will be described in more detail below and with reference to method 1800. As illustrated in FIG. 17A, the dead zone 1710, dynamic zone 1712, and constant zone 1714 extend vertically past the area (e.g., height) of the slider element 1704. Expanded dead zone 1710, dynamic zone 1712, and constant zone 1714 relative to the area of the slider element 1704 allow for adjusting a value of the slider element 1704 based on the attention of the user 1706 directed to the left or right of the indication of the current value even if the attention of the user 1706 is outside of the slider element 1704.

Alternatively, in some embodiments, the slider element 1704 and corresponding dead zone 1710, dynamic zone 1712, and constant zone 1714 are displayed without the first user interface element 1703, as mentioned previously. In FIG. 17A, the slider element 1704 within the dashed box 1750 is an alternative example in which the user interface 1704 does not include the user interface element 1703. However, one or more or all of the other features described herein with reference to slider element 1704 optionally apply analogously to a slider such as illustrated in dashed box 1750.

Figure 17B:
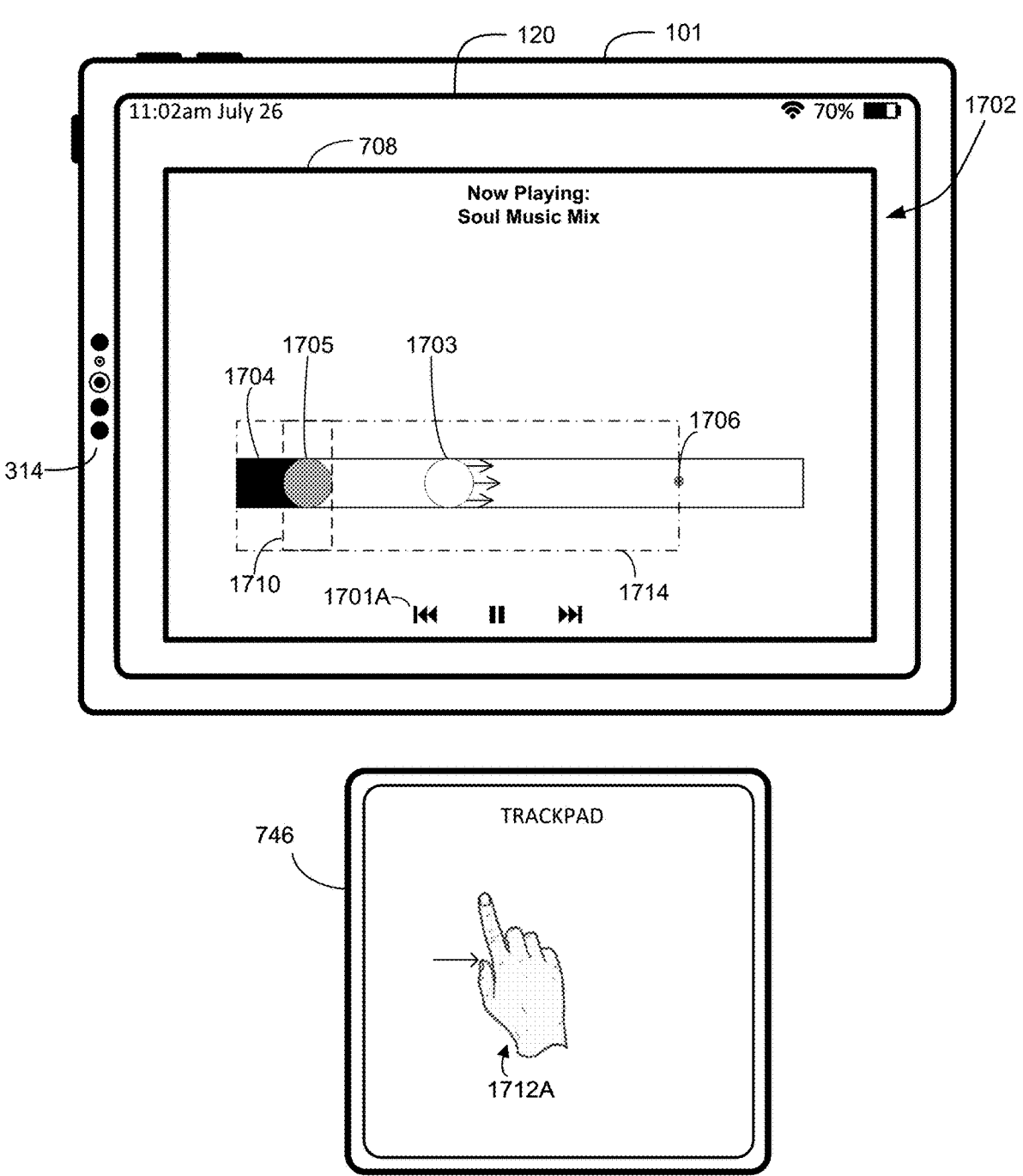

From FIG. 17A to FIG. 17B, the computer system 101 has moved the user interface element 1703 to a point halfway between the first location and the second location. As mentioned above, the computer system 101 is moving the user interface element 1703 with a (e.g., fixed) rate towards the second location corresponding to the constant zone (e.g., as indicated by the three arrows in FIG. 17B). From FIG. 17A to FIG. 17B, the rate at which the user interface element 1703 is moving has remained the same and corresponds to the constant zone 1714 (e.g., thus the dynamic zone 1712 is not illustrated).

In some embodiments, the computer system 101 displays a second user interface element 1705 at the first location of the slider element 1704 while the first user interface element 1703 is moving, as shown in FIG. 17B. In some embodiments, the second user interface element 1705 is the same as the first user interface element 1703. In some embodiments, the second user interface element 1705 is a shadow or a ghost of the first user interface element 1703 at the first location. In some embodiments, the second user interface element 1705 is dimmer and/or different color than the first user interface element 1703 as illustrated and described with respect to method 1800.

Figure 17C:
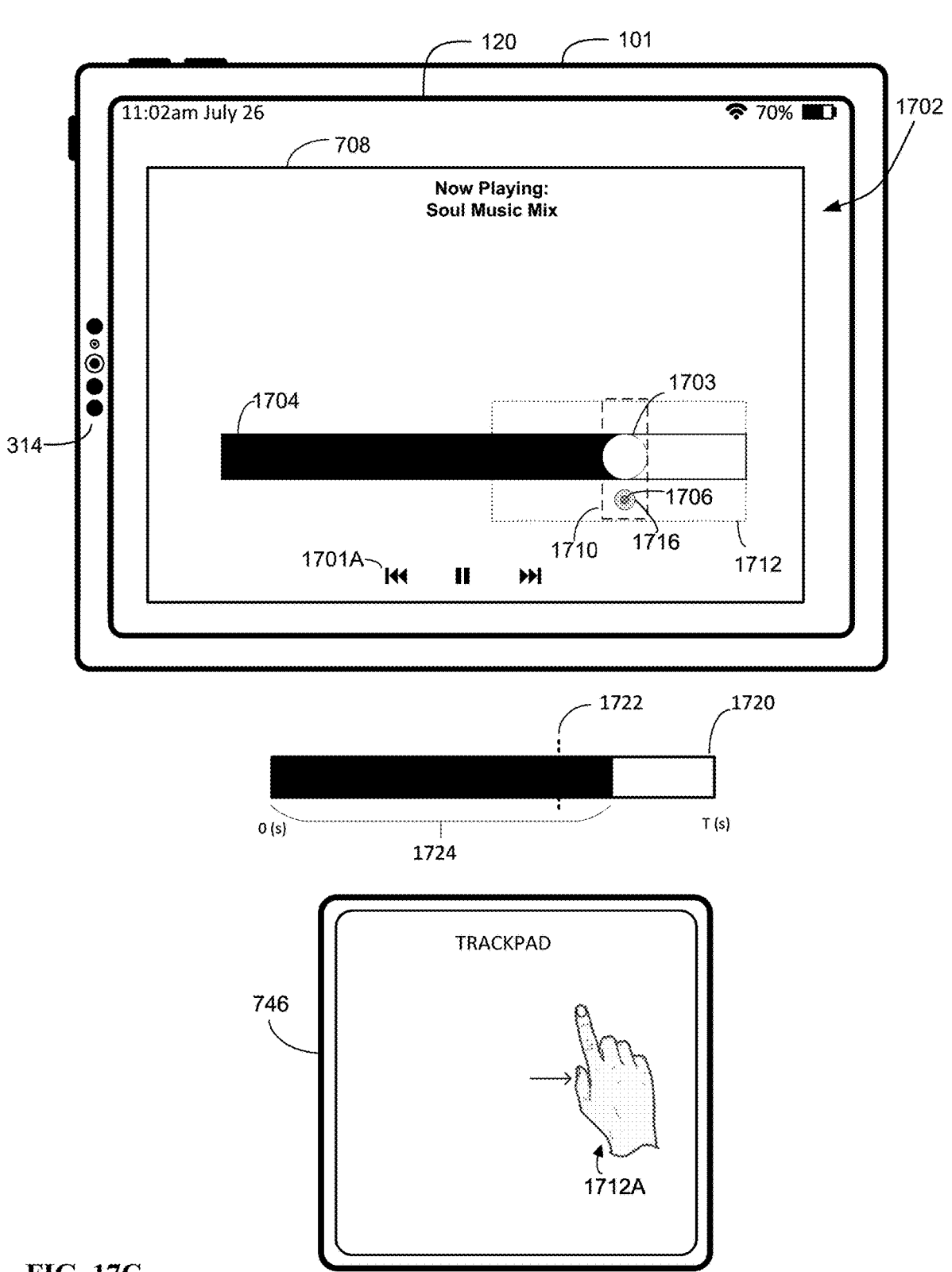

From FIG. 17B to FIG. 17C, the first user interface element 1703 has continued moving at the fixed rate and has reached the second location to which the attention of the user 1706 is directed. FIG. 17C includes a time scale 1720 with a threshold indicator 1722. In some embodiments, the time scale 1720 including the threshold indicator 1722 is not displayed in the three-dimensional environment 1702. Because the amount of time 1724 that has elapsed since the computer system 101 has detected attention of the user 1706 towards the element 1703 at the second location has exceeded the amount of time indicated by the threshold indicator 1722, a gaze target 1716 (e.g., confirmation affordance) is displayed below the slider element 1704 near the second location (e.g., described with reference to method 1600). In response to detecting that the attention of the user 1706 is directed to the gaze target 1716 for longer than a time threshold (e.g., 0.1, 0.3, 0.5, 1, 3, 5, 10, 30 or 60 seconds), the computer system 101 optionally adjusts a respective value of the slider element 1704 to a value based on the second location of the element 1703 in the slider element 1704. In some embodiments, when the gaze target 1716 is displayed and/or the attention of the user 1706 is directed to the gaze target 1716, the computer system 101 ceases display of the second user interface element 1705 at the first location. Further, as the first user interface element 1703 moved to the second location, the dead zone 1710 moved together with the first user interface element 1703. As shown in FIG. 17C, now with the first user interface element 1703 at the second location in the slider element 1704, the dynamic zone 1712 has moved to be symmetric about the current location of element 1703.

FIG. 17C1 illustrates similar and/or the same concepts as those shown in FIG. 17C (with many of the same reference numbers). It is understood that unless indicated below, elements shown in FIG. 17C1 that have the same reference numbers as elements shown in FIGS. 17A-17G have one or more or all of the same characteristics. FIG. 17C1 includes computer system 101, which includes (or is the same as) display generation component 120. In some embodiments, computer system 101 and display generation component 120 have one or more of the characteristics of computer system 101 shown in FIGS. 17A-17G and display generation component 120 shown in FIGS. 1 and 3, respectively, and in some embodiments, computer system 101 and display generation component 120 shown in FIGS. 17A-17G have one or more of the characteristics of computer system 101 and display generation component 120 shown in FIG. 17C1.

In FIG. 17C1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 17A-17G.

In FIG. 17C1, display generation component 120 is illustrated as displaying content that optionally corresponds to the content that is described as being displayed and/or visible via display generation component 120 with reference to FIGS. 17A-17G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 17C1.

Display generation component 120 has a field of view (e.g., a field of view captured by external image sensors 314b and 314c and/or visible to the user via display generation component 120, indicated by dashed lines in the overhead view) that corresponds to the content shown in FIG. 17C1. Because display generation component 120 is optionally a head-mounted device, the field of view of display generation component 120 is optionally the same as or similar to the field of view of the user.

In FIG. 17C1, the user is depicted as performing an air pinch gesture (e.g., with hand 1712A) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 17A-17G.

In some embodiments, computer system 101 responds to user inputs as described with reference to FIGS. 17A-17G.

In the example of FIG. 17C1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 17A-17G and/or described with reference to the corresponding method(s) are optionally implemented on computer system 101 and display generation unit 120 in a manner similar or analogous to that shown in FIG. 17C1.

Figure 17D:
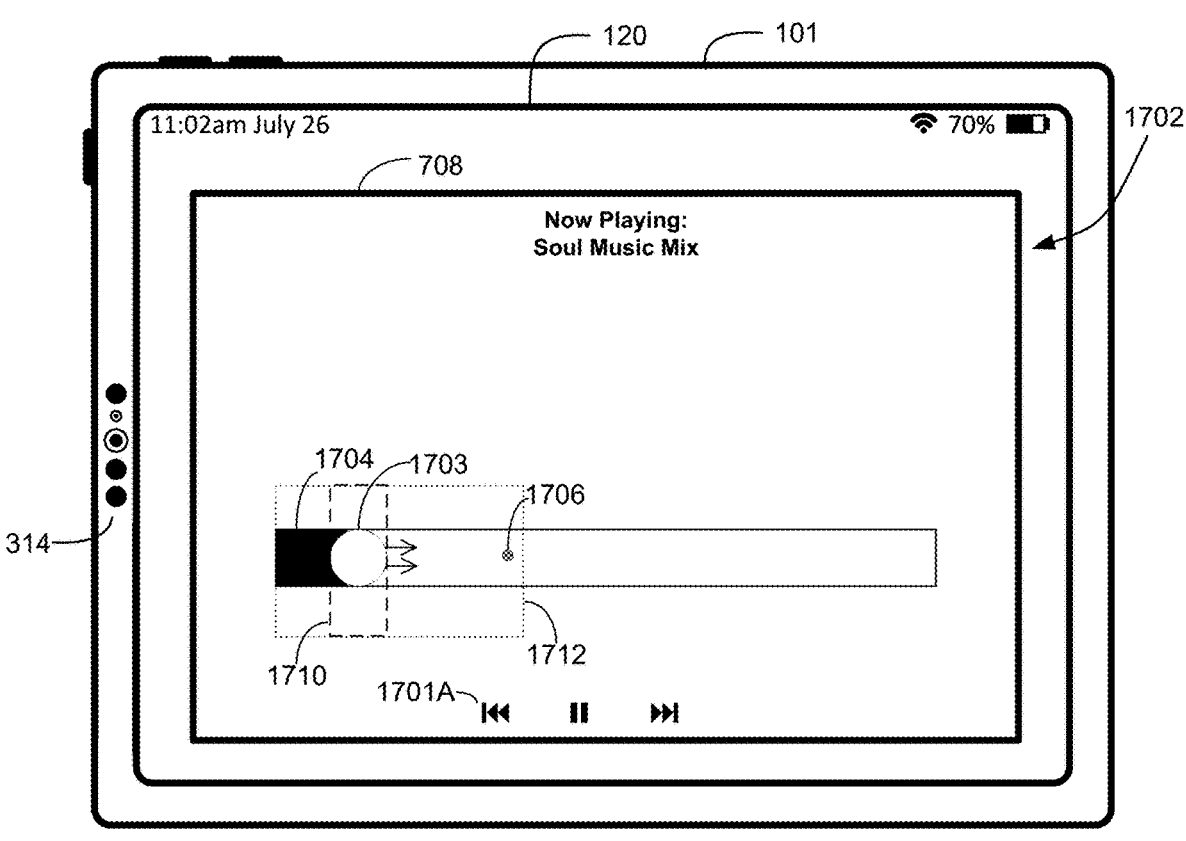
Figure 17D:
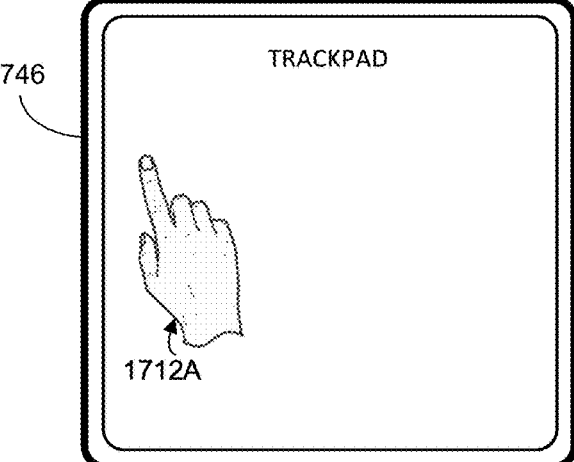

FIG. 17D illustrates the first user interface element 1703 at the first location in the slider element while the attention of the user 1706 is directed to a second location (e.g., corresponding to a playback position at which about 40% of the first media item has elapsed) in the slider element 1704. Because the attention of the user 1706 is within the dynamic zone 1712, the computer system 101 optionally moves the user interface element 1703 with a first rate corresponding to the dynamic zone 1712 towards the second location (e.g., as indicated by the two arrows in FIG. 17A). Because the user interface element 1703 is closer to the second location in FIG. 17D than in FIGS. 17A-17B, the computer system optionally moves the user interface element 1703 towards the second location at a rate slower (e.g., as indicated by the two arrows) than the rate corresponding to the constant zone in FIGS. 17A-17B.

Figure 17E:
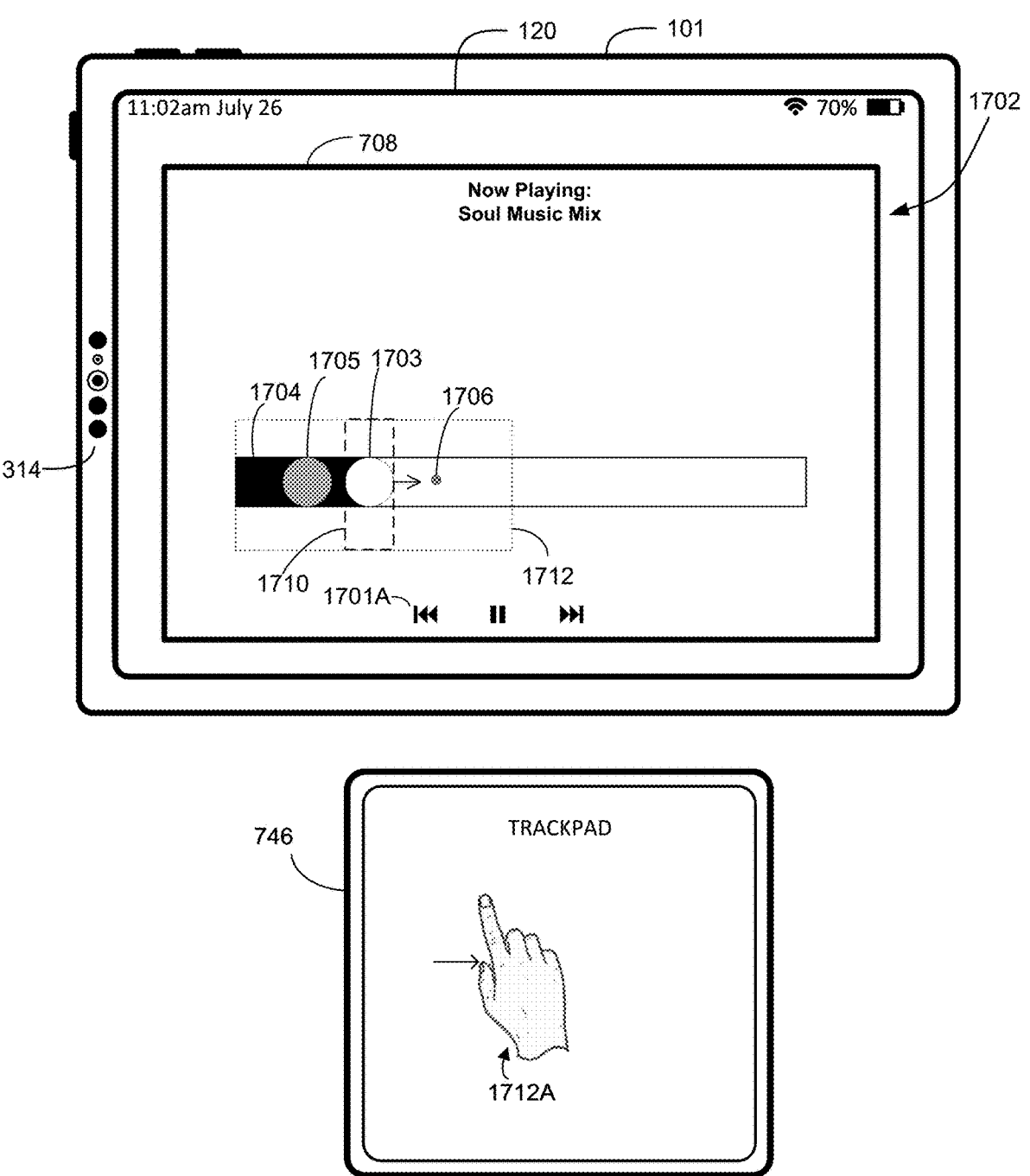

From FIG. 17D to 17E, the computer system 101 has moved the user interface element 1703 halfway between the first location and the second location. From FIG. 17D to 17E, the rate at which the user interface element 1703 is moving has changed. Because the user interface element 1703 is closer to the second location in FIG. 17E than in FIG. 17D, the computer system optionally moves the user interface element 1703 towards the second location at a rate slower (e.g., as indicated by one arrow) than the rate corresponding to the dynamic zone 1712 in FIG. 17D. In some embodiments, the rate at which the computer system 101 moves element 1703 within the dynamic zone 1712 decreases as the distance between the element 1703 and the location to which attention 1706 of the user is directed decreases.

In FIG. 17E, the computer system displays the second user interface element 1705 at the first location of the first user interface element 1703. In some embodiments, the second user interface element 1705 is the same as the first user interface element 1703. In some embodiments, the second user interface element 1705 is a shadow or a ghost of the first user interface element 1703 at the first location. In some embodiments, the second user interface element 1705 is dimmer and/or different color than the first user interface element 1703 as illustrated and described with respect to method 1800.

Figure 17F:
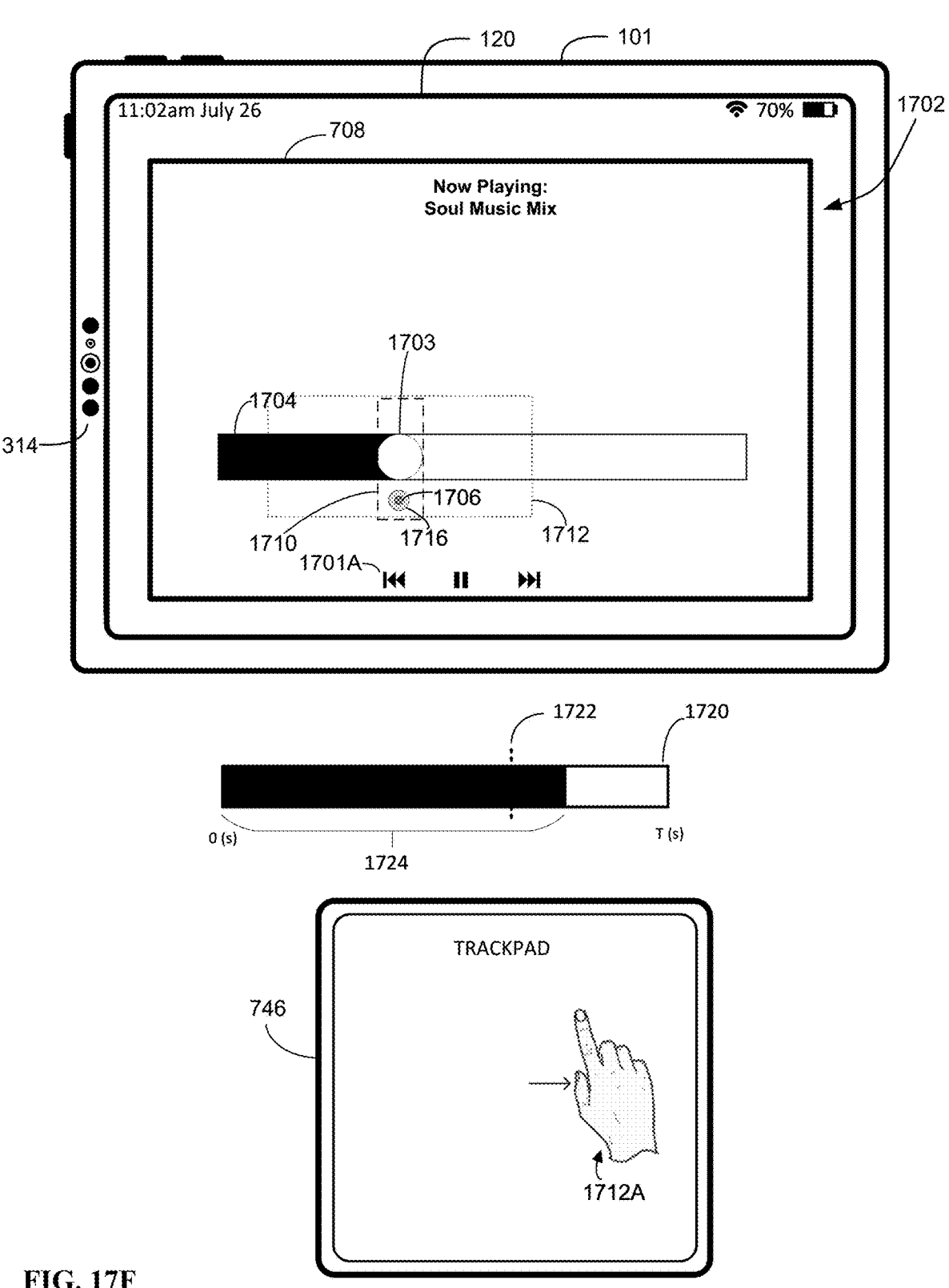

From FIG. 17E to FIG. 17F, the first user interface element 1703 has reached the second location to which the attention of the user 1706 is directed. FIG. 17F includes a time scale 1720 with a threshold indicator 1722. In some embodiments, the time scale 1720 including the threshold indicator 1722 is not displayed in the three-dimensional environment 1702. Because the amount of time 1724 that has elapsed since the computer system 101 has detected attention of the user 1706 directed towards element 1703 at the second location has exceeded the amount of time indicated by the threshold indicator 1722, a gaze target 1716 (e.g., confirmation affordance) is displayed below the slider element 1704 near the second location. In response to detecting that the attention of the user 1706 is directed to the gaze target 1716 for longer than a time threshold (e.g., 0.1, 0.3, 0.5, 1, 3, 5, 10, 30 or 60 seconds), the computer system 101 optionally adjusts a respective value of the slider element 1704 to a value based on the second location of the element 1703 in the slider element 1704. In some embodiments, when the gaze target 1716 is displayed and/or the attention of the user 1706 is directed to the gaze target 1716, the computer system 101 ceases display of the second user interface element 1705 at the first location. Further, as the first user interface element 1703 moved to the second location, the dead zone 1710 moved together with the first user interface element 1703. As shown in FIG. 17F, now with the first user interface element 1703 at the second location in the slider element 1704, the dynamic zone 1712 has moved to be symmetric about the current location of element 1703. As illustrated in FIGS. 17A-17F, the dead zone 1710, dynamic zone 712, and constant zone 1714 extend vertically past the area (e.g., height) of the slider element 1704. Expanded dead zone 1710, dynamic zone 1712, and constant zone 1714 relative to the area of the slider element 1704 allow for adjusting a value of the slider element 1704 based on the attention of the user 1706 directed to the left or right of the indication of the current value even if the attention of the user 1706 is outside of the slider element 1704 (e.g., such as movement element 1703 to the left via attention 1706$y$ in FIG. 17A, or moving element 1703 to the right via attention 1706$x$ in FIG. 17A).

Figure 17G:
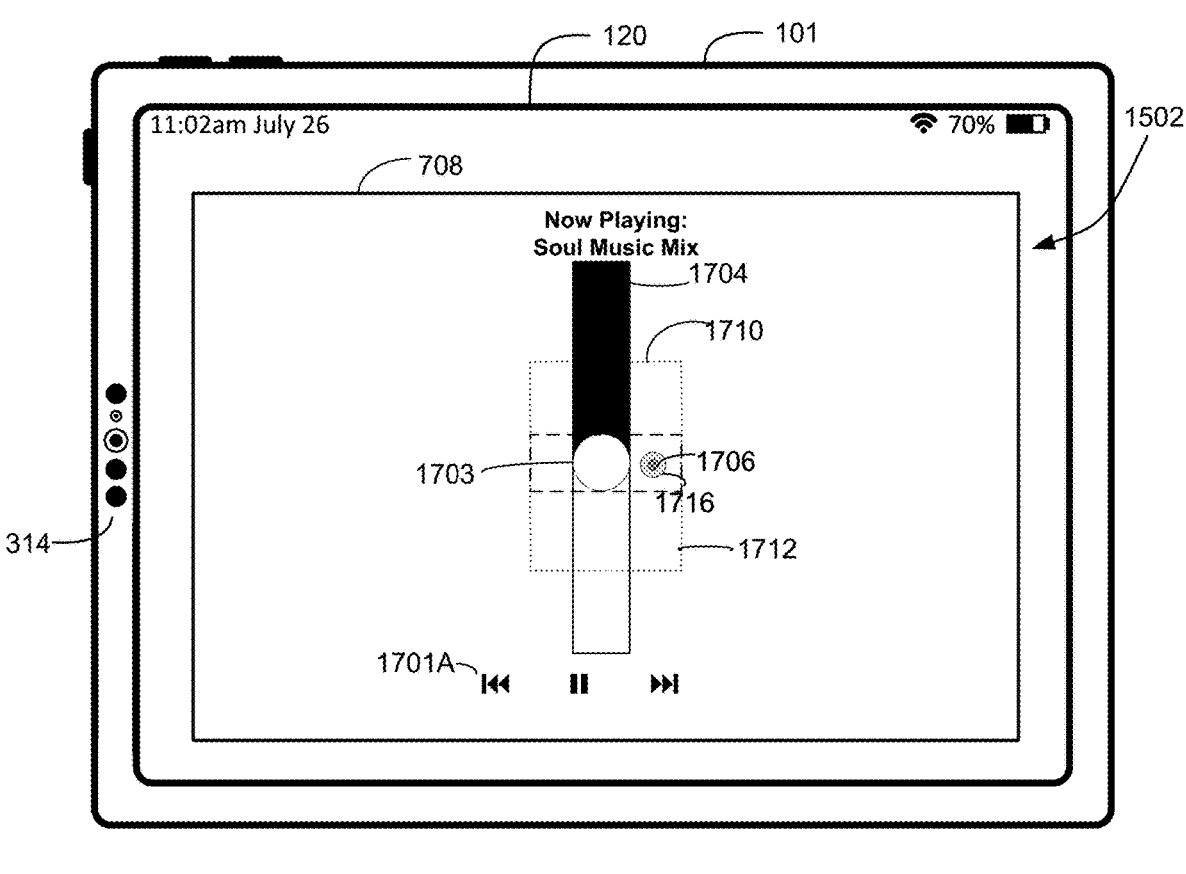
Figure 17G:
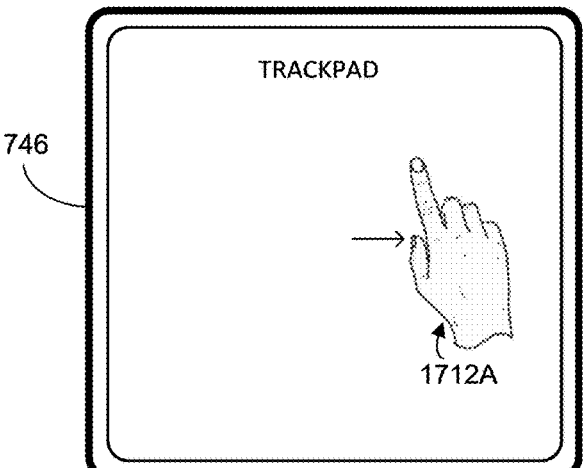
Figure 18A:
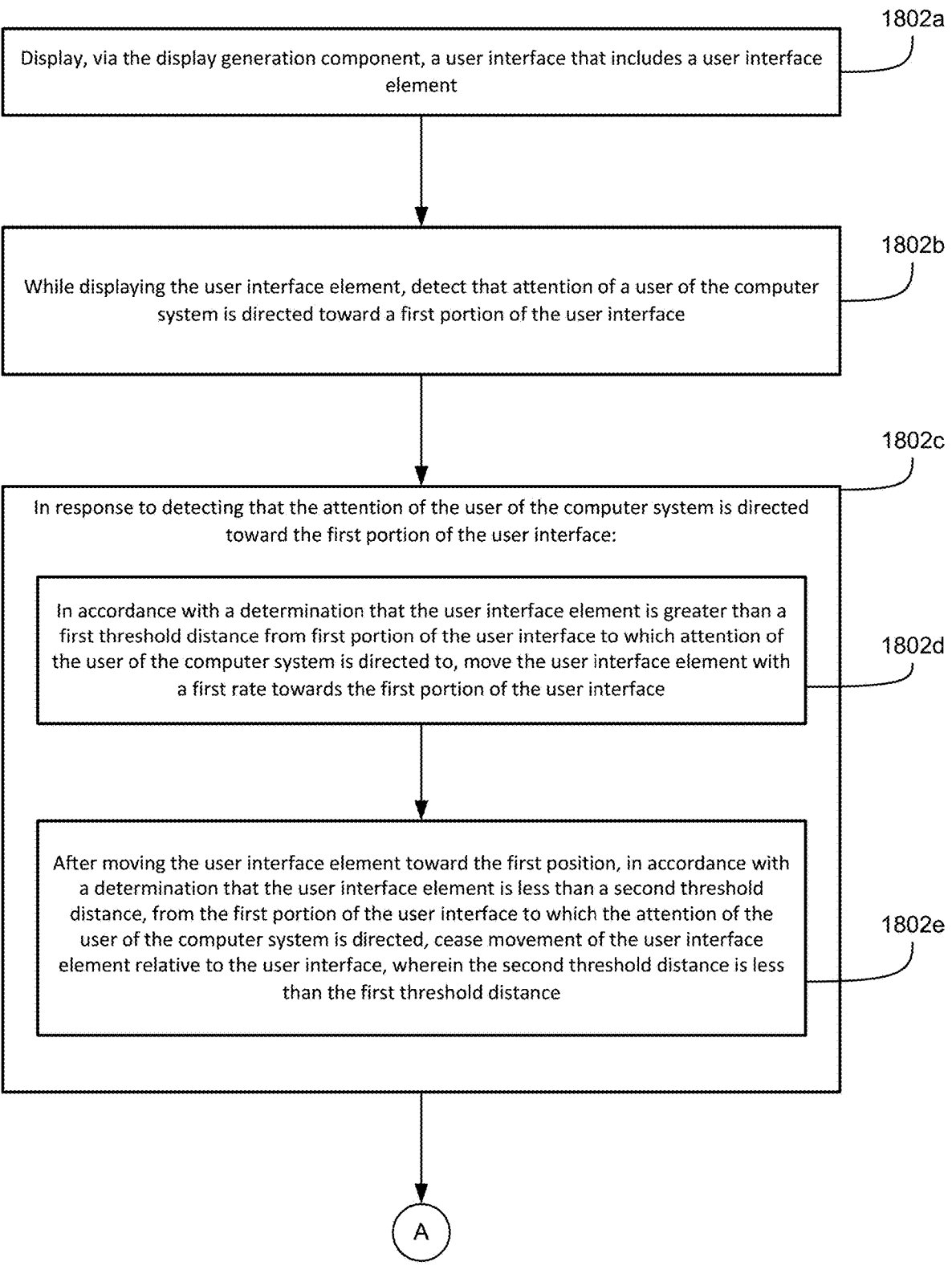
Figure 18B:
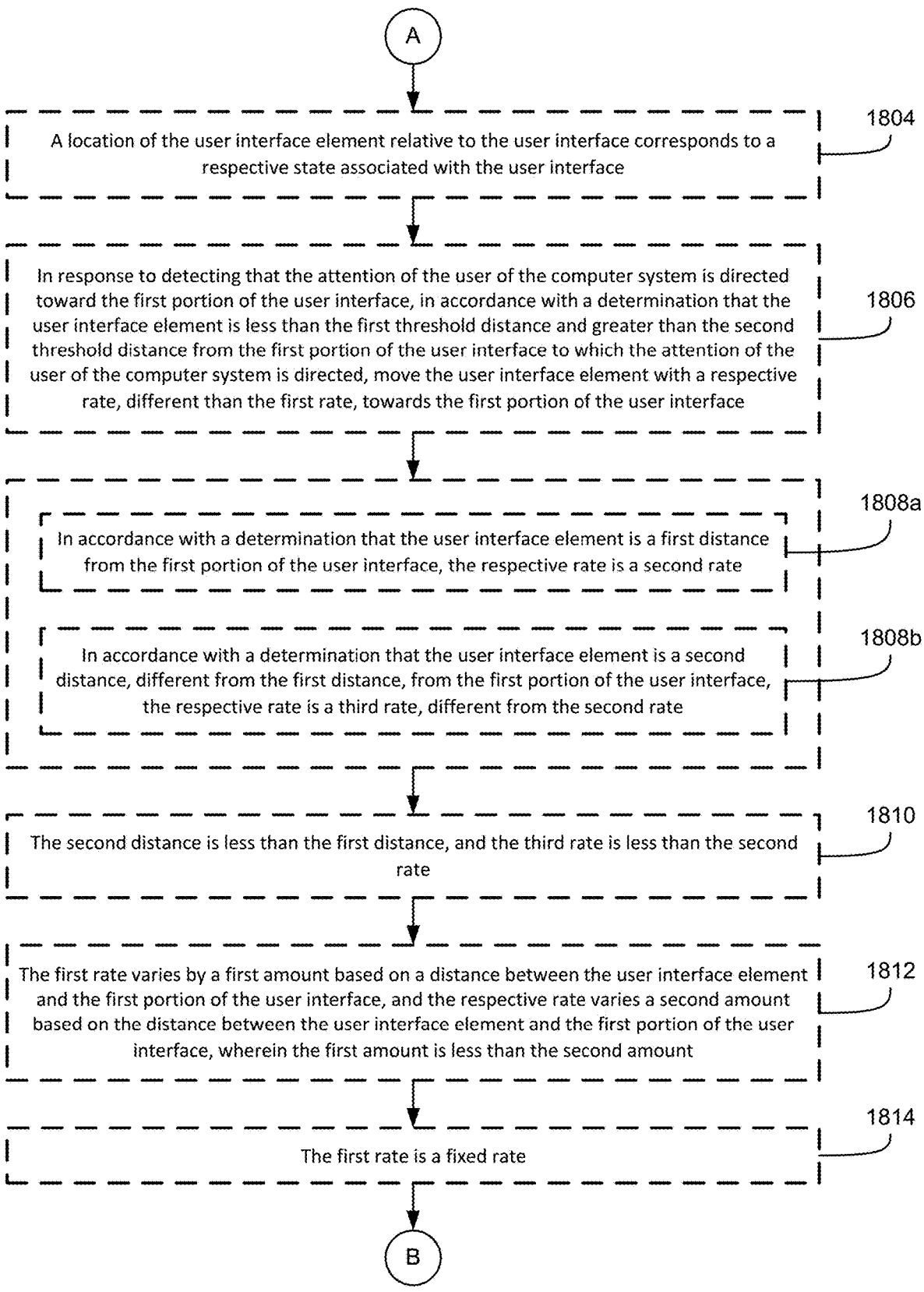
Figure 18D:
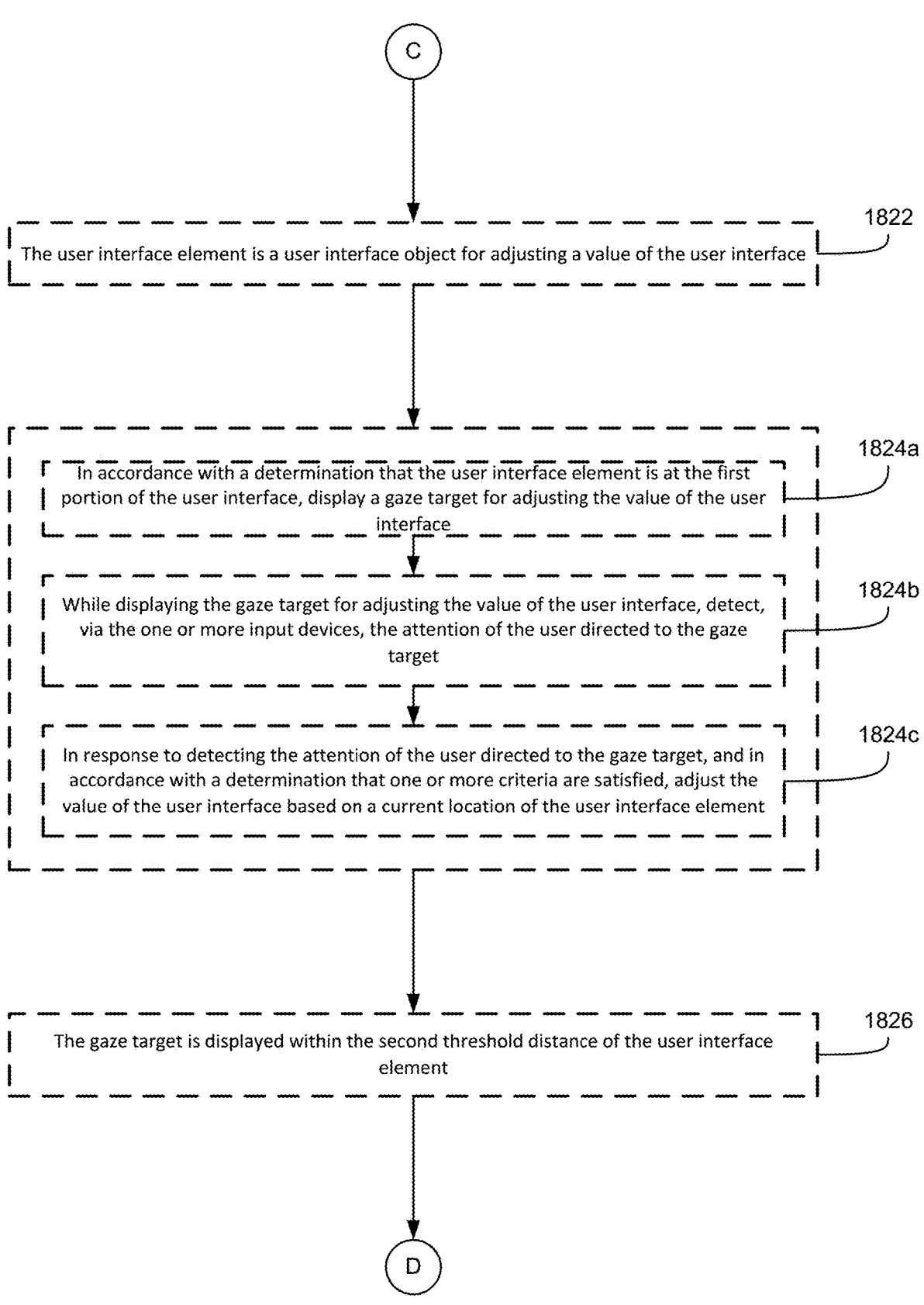
Figure 18E:
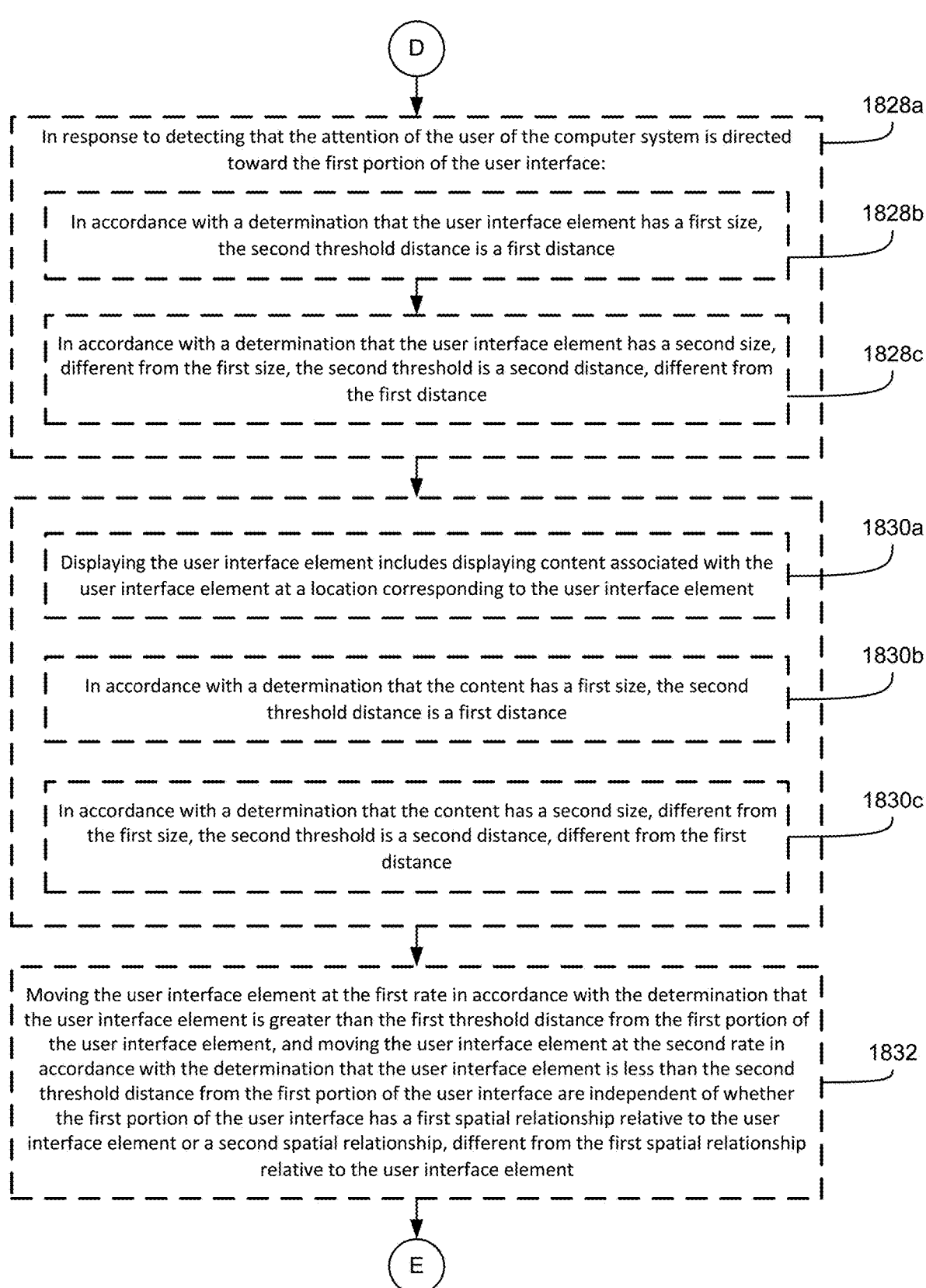

FIGS. 17A-17F illustrate a horizontal slider element 1704. However, in some embodiments, the slider element 1704 is a vertical slider. Accordingly, FIG. 17G illustrates a vertical slider element 1704 (e.g., for controlling volume of computer system 101, for scrolling content (e.g., text, images or videos) in a corresponding user interface displayed by computer system 101, or for changing a level of brightness of computer system 101). The first user interface element 1703 optionally moves from top to bottom of the vertical slider element 1704 in FIG. 17F, analogously to the leftward and rightward movement of the first user interface element 1703 in FIGS. 17A-17F. In some embodiments, a respective value of the vertical slider element 1704 increases in a positive or negative direction from top to bottom of the vertical slider element 1704. The various features of slider 1704 described with reference to FIGS. 17A-17F in the context of a horizontal slider element optionally apply analogously to slider 1704 in FIG. 17G, including placement of dead zone 1710, dynamic zone 1712, and constant zone 1714 relative to the first user interface element 1703 and/or relative to the position along the slider corresponding to the current value of the slider. In the case of a vertical slider, the vertical dimensions of dead zone 1710, dynamic zone 1712, and constant zone 1714 optionally correspond to the horizontal dimensions of dead zone 1710, dynamic zone 1712, and constant zone 1714 for a horizontal slider, and the horizontal dimensions of dead zone 1710, dynamic zone 1712, and constant zone 1714 for the vertical slider optionally correspond to the vertical dimensions of dead zone 1710, dynamic zone 1712, and constant zone 1714 for the horizontal slider.

FIGS. 18A-18F is a flowchart illustrating a method 1800 of moving a user interface element (e.g., thumb) in a user interface (e.g., slider element) at a respective rate based on attention of a user in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In some embodiments, the method 1800 is performed at a first computer system, such as computer system 101 in FIG. 1, in communication with a display generation component and one or more input devices. In some embodiments, the computer system has one or more of the characteristics of the computer systems of methods 800, 900, 1000, 1200, 1400, 1600, 2000, and/or 2200. In some embodiments, the display generation component has one or more of the characteristics of the display generation component of methods 800, 900, 1000, 1200, 1400, 1600, 2000, and/or 2200. In some embodiments, the one or more input devices have one or more of the characteristics of the one or more input devices of methods 800, 900, 1000, 1200, 1400, 1600, 2000, and/or 2200.

In some embodiments, the computer system displays (1802*a*), via the display generation component, a user interface, such as user interface 1704 in FIG. 17A, that includes a user interface element, such as user interface element 1703 in FIG. 17A (e.g., a user interface object or another visual indication of a value corresponding to a user interface object). In some embodiments, the user interface and/or the user interface element have one or more of the characteristics of the slider element and/or user interface element of method 1600. In some embodiments, the user interface includes a picker element and/or a rotatable knob element. In some embodiments, the picker element includes a scrollable list corresponding to selectable respective states displayed in a vertical or horizontal manner. In some embodiments, the rotatable knob element being rotated to different rotational positions corresponds to respective states or value for the user interface. In some embodiments, the user interface is or includes a three-dimensional environment, such as the three-dimensional environments of methods 800, 900, 1000, 1200, 1400, 1600, 2000 and/or 2200.

In some embodiments, while displaying the user interface element, the computer system detects (1802*b*) that attention of a user, such as attention of user 1706 in FIG. 17A, of the computer system is directed toward a first portion of the user interface. In some embodiments, the first portion of the user interface has one or more characteristics of the first location or the second location of the slider element of the method 1600. In some embodiments, given the user interface includes the slider element of the method 1600, the first portion corresponds to a first state or first value of the user interface such as a first amount of time elapsed, a first level of volume, or a first color. Given the user interface includes a picker element, the first portion optionally includes a selectable respective state of the scrollable list, an up or a down affordance (e.g., arrow) for a vertical scrollable list, and/or a left or right affordance (e.g., arrow) for a horizontal scrollable list. In some embodiments, the first portion includes an up or a down affordance or a left or right affordance until a selectable respective state is displayed in the vertical or horizontal scrollable list. Accordingly, in some embodiments, the first portion transitions from the up or a down affordance or the left or right affordance to a selectable respective state. In some embodiments, the user interface element is not located at the first portion of the user interface when the attention of the user is directed toward the first portion.

In some embodiments, in response to detecting that the attention of the user of the computer system is directed toward the first portion of the user interface (1802*c*), in accordance with a determination that the user interface element is greater than a first threshold distance (e.g., greater than 1, 5, 6, 7, 8, 9, 10, or 100 cm and/or greater than 1%, 3%, 5%, 10%, 20%, 40%, 60% or 75% of an interactable dimension (e.g., length or radial length) of the user interface) from first portion of the user interface to which attention of the user of the computer system is directed to, such as shown by constant zone 1714 in FIG. 17A or dynamic zone 1712 in FIG. 17D, the computer system moves (1802*d*) the user interface element with a first rate (e.g., a fixed or variable rate such as 0.5 cm/s, 1 cm/s, 10 cm/s, or 100 cm/s) towards the first portion of the user interface. In some embodiments, the user interface element moves at a slower rate from a second portion to the first portion than from a third portion to the first portion when the second portion is farther from the first portion than the third portion is from the first portion, despite the user interface element at either the second portion or the third portion still being a first threshold distance from the first portion. In some embodiments, the user interface element moves at a faster rate from a second portion to the first portion than from a third portion to the first portion when the second portion is farther from the first portion that the third portion is from the first portion, despite the user interface element at either the second portion or the third portion still being a first threshold distance from the first portion. In some embodiments, the user interface element moves from a second portion to the first portion at the same rate as from a third portion to the first portion when the second portion is farther from the first portion than the third portion is from the first portion, despite the user interface element at either the second portion or the third portion still being a first threshold distance from the first portion. In some embodiments, a rate of change of a position of the user interface element relative to the user interface, such as the first rate, corresponds to a rate of change of a respective value of the user interface.

In some embodiments, after moving the user interface element toward the first position, in accordance with a determination that the user interface element is less than a second threshold distance (e.g., less than 0.01, 0.1, 1, 2, 3, 4, 5, or 10 cm and/or less than 0.5%, 1%, 3%, 5%, 10%, 20%, 40%, or 60% of an interactable dimension of the user interface), from the first portion of the user interface to which the attention of the user of the computer system is directed, such as shown by dead zone 1703 in FIGS. 17C and 17C1 and FIG. 17F, the computer system ceases (1802*e*) movement of the user interface element relative to the user interface, wherein the second threshold distance is less than the first threshold distance (e.g., ceasing the change of a respective value of the user interface). In some embodiments, when the user interface element is less than the second threshold distance from the first portion, the user interface element moves at a slower rate than the first rate until the user interface element reaches the first portion of the user interface. Adjusting movement of a user interface element corresponding to a respective state or value of a user interface t according to its current distance from the attention of the user reduces the time needed to change the respective state or value based on attention (e.g., for larger changes in state or value) while still allowing for more precise changes in state or value (e.g., for smaller changes in state or value), and improves respective user-device interactions in selecting or controlling a particular state or value of the user interface.

In some embodiments, a location of the user interface element (e.g., a user interface object or another visual indication of a value corresponding to a user interface object) relative to the user interface corresponds to a respective state associated with the user interface (1804) (e.g., slider element of method 1600), such as location of user interface element 1703 corresponding to a respective state of user interface 1704 in FIG. 17A. In some embodiments, the respective state corresponds to a first value of the user interface such as a first amount of time elapsed, a first level of volume, or a first color. In some embodiments, movement of the user interface element along the length of the user interface is bidirectional or in only one direction (e.g., a positive direction from left to right, a clockwise direction, a negative direction from right to left, or a counterclockwise direction). In some embodiments, as the user interface element moves in a positive direction (e.g., from a left portion to a right portion of the user interface) or in a clockwise direction, the respective value of the user interface increases, such as increases in volume, increases in the amount of time of the media content that has elapsed, or increases in brightness of color (e.g., darker shade). In some embodiments, as the user interface element moves in a negative direction from a right portion to a left portion of the user interface or in a counterclockwise direction, the respective value of the user interface decreases, such as decreases in volume, decreases in the amount of time of the media content that has elapsed, or decreases in brightness of a color (e.g., lighter shade). Selecting respective states (e.g., values) of the user interface based on a respective location of the user interface element enables selection of more precise values rather than discrete values, thereby improving respective user-device interactions.

In some embodiments, in response to detecting that the attention of the user of the computer system is directed toward the first portion of the user interface, in accordance with a determination that the user interface element is less than the first threshold distance (e.g., less than 1, 5, 6, 7, 8, 9, 10, or 100 cm and/or less than 1%, 3%, 5%, 10%, 20%, 40%, 60% or 75% of an interactable dimension (e.g., length or radial length) of the user interface) and greater than the second threshold distance (e.g., greater than 0.01, 0.1, 1, 2, 3, 4, 5, or 10 cm and/or greater than 0.5%, 1%, 3%, 5%, 10%, 20%, 40%, or 60% of an interactable dimension of the user interface) from the first portion of the user interface to which the attention of the user of the computer system is directed, such as shown by dynamic zone 1712 in FIG. 17D, the computer system moves (1806) the user interface element with a respective rate, different than the first rate, such as two arrows associated with user interface element 1703 in FIG. 17D, towards the first portion of the user interface. In some embodiments, a portion of the user interface between a starting pointing (e.g., leftmost point) of the user interface and the first threshold distance includes a constant zone of the user interface. In some embodiments, at least a portion of the user interface between the first portion of the user interface and the second threshold distance includes a dead zone of the user interface, as further described with respect to step 1826 and step(s) 1828. In some embodiments, as the user interface element moves in the user interface, the dead zone moves with the user interface element in user interface. In some embodiments, at least a portion of the user interface between the first threshold distance and the second threshold distance includes a dynamic zone of the user interface, where the respective rate is slower than the first rate. In some embodiments, as the user interface element moves in the user interface, the dynamic zone moves with the user interface element in the user interface. In some embodiments, along with displaying the user interface element moving towards the first portion of the user interface, a second user interface element is displayed at an initial location away from the first portion of the user interface prior to the movement. The second user interface element optionally serves as a shadow of the first user element prior to the movement of the user element. In some embodiments, a visual prominence of the user element is different than a visual prominence of the second user element. In some embodiments, the second user interface element is dimmer, less bright, a different color, and/or smaller than the first user interface element. In some embodiments, the user interface element is the same as the second user interface element. Moving the user interface element with the second rate between the first threshold distance and the second threshold distance indicates how close the user interface element is relative to the first portion of the user interface, and facilitates more precise control of the user interface element.

In some embodiments, in accordance with a determination that the user interface element is a first distance from the first portion of the user interface (e.g., to which attention of the user is directed), the respective rate is a second rate (1808a) (0.5 cm/s, 1 cm/s, 10 cm/s, or 100 cm/s), such as shown by two arrows associated with user interface element 1703 in in FIG. 17D. In some embodiments, in accordance with a determination that the user interface element is a second distance, different from the first distance, from the first portion of the user interface, the respective rate is a third rate (0.5 cm/s, 1 cm/s, 10 cm/s, or 100 cm/s), such as shown by one arrow associated with user interface element 1703 in in FIG. 17E, different from the second rate (1808b). In some embodiments, if the first distance is greater than the second distance, and the first distance and the second distance are within the dynamic zone described in step 1806, then the user interface element moves at a faster rate from the first distance than the second distance towards the first portion of the user interface. In some embodiments, if the first distance is less than the second distance, and the first distance and the second distance are within the dynamic zone, then the user interface element moves at a faster rate from the second distance than the first distance towards the first portion of the user interface. Varying a rate of the user interface element between the first threshold distance and the second threshold distance based on the distance between user interface element and the first portion of the user interface ensures that the user interface element is moving at an appropriate rate according to the distance between the user interface element and the first portion of the user interface, and facilitates more precise control of the user interface element.

In some embodiments, the second distance, such as second distance between user interface element 1703 and location of attention of user 1706 in slider element 1704 in FIG. 17E, is less than the first distance, such as first distance between user interface element 1703 and location of attention of user 1706 in slider element 1704 in FIG. 17D, and the third rate is less (e.g., slower) than the second rate (1810). Therefore, in some embodiments, as the user interface element approaches the first portion of the user interface in the dynamic zone, the rate of movement of the user interface element is reduced. In some embodiments, as the distance between the user interface element and the first portion of the user interface decreases, a respective rate of the user interface element gradually changes from the second rate to the third rate. For example, the respective rate optionally corresponds to an intermediate rate between the second rate and the third rate when the user interface element is between the first distance and the second distance. In some embodiments, the respective rate gradually changes through multiple values as the distance between the user interface element and the first portion of the user interface changes (e.g., starting at a first respective rate, which gradually decreases to a second respective rate as the distance between the user interface element and the first portion of the user interface gets smaller and smaller). Moving the user interface element with the third rate (e.g., optionally slower than the second rate) when distance between the user interface element and the first portion of the user interface decreases facilitates more precise movement of the user interface element for smaller distance movements, thereby reducing errors in interaction with the user interface element.

In some embodiments, the first rate varies by a first amount based on a distance between the user interface element and the first portion of the user interface, such as shown by three arrows associated with user interface element 1703 in FIGS. 17A-17B, and the respective rate varies a second amount based on the distance between the user interface element and the first portion of the user interface, such as shown by two arrows associated with user interface element 1703 in FIG. 17D and one arrow associated with user interface element 1703 in FIG. 17E, wherein the first amount is less than the second amount (1812). In some embodiments, if the first distance is greater than the second distance (e.g., and the first distance is within the constant zone and the second distance is within the dynamic zone). In some embodiments, the respective rate (e.g., dynamic rate) reduces from a higher rate to a lower rate as the user element moves closer to the first portion of the user interface. In some embodiments, a variance in the respective rate (e.g., the second amount) as a function of the distance of the user interface element from the first portion is greater than a variance (e.g., first amount) in the first rate as a function of the distance of the user interface element from the first portion associated with the user element moving within the constant zone described with respect to step 1806. The second rate at which the user interface element is moving when moving closer to the first portion of the user interface varying more than the first rate at which the user interface element moves within the constant zone ensures that the user interface element is moving at an appropriate rate according to the distance between the user interface element and the first portion of the user interface, and facilitates more precise control of the user interface element.

In some embodiments, the first rate is a fixed rate, such as shown by three arrows associated with user interface element 1703 in in FIGS. 17A-17B (e.g., the first amount by which the first rate varies is zero) (1814). Moving the user interface element with a fixed rate saves processing power associated with varying the rate when not needed (e.g., the user interface element moving through the constant zone), and facilitates faster movement of the user interface element when appropriate.

In some embodiments, moving the user interface element with the first rate towards the first portion of the user interface includes (1816a) moving the user interface element with the first rate (e.g., fixed rate) (e.g., when the attention of the user is outside the first threshold distance from the user interface element, moving the user interface element from a location within the constant zone as described with respect to step 1806) towards the first portion of the user interface, such as shown by three arrows associated with moving user interface element 1703 in in FIGS. 17A-17B until the user interface element is the second threshold distance from the first portion of the user interface (e.g., within the dead zone described with respect to step 1806) (1816b). In some embodiments, in response to the user interface element reaching the second threshold distance from the first portion of the user interface, (e.g., gradually) the computer system ceases (1816c) the movement of the user interface element, such as ceasing movement of user interface element 1703 in in FIGS. 17C and 17C1. Thus, in some embodiments, the user interface element is not moved with the respective rate when moving to the first portion of the user interface if, to start, the user interface element is greater than the first threshold distance from the first portion. Moving the user interface element with the first rate (e.g., fixed rate) until reaching the first portion of the user interface saves processing power associated with varying the rate when the attention of the user is outside the first threshold distance from the user interface element, and facilitates faster movement of the user interface element when appropriate.

In some embodiments, moving the user interface element with the respective rate towards the first portion of the user interface includes (1818a) moving the user interface element with the respective rate (e.g., variable rate) (e.g., when the attention of the user is within the first threshold distance from the user interface element, moving the user interface element from a location within the dynamic zone as described with respect to step 1806) towards the first portion of the user interface, such as shown by moving user interface element 1703 in in FIGS. 17D-17E until the user interface element is the second threshold distance from the first portion of the user interface (1818b). In some embodiments, in response to the user interface element reaching the second threshold distance from the first portion of the user interface (e.g., within the dead zone described with respect to step 1806), the computer system (e.g., gradually) ceases (1818c) the movement of the user interface element, such as ceasing movement of user interface element 1703 in in FIG. 17E. Moving the user interface element with the second rate (e.g., optionally varying rate but slower rate than the first rate) until reaching the first portion of the user interface facilitates more precise movement of the user interface element for smaller distance movements, thereby reducing errors in interaction with the user interface element.

In some embodiments, while moving the user interface element, the computer system detects that the attention of the user interface is directed to the user interface element, such as moving attention of user 1706 to location of user interface element 1703 in FIG. 17B, (e.g., attention of the user moves away from the first portion of the user interface) (1820a). In some embodiments, in response to detecting that the attention of the user is directed to the user interface element, the computer system (e.g., gradually) ceases (1820b) movement of the user interface element, such as ceasing movement of user interface element 1703 FIG. 17B (e.g., and maintaining display of the user interface element at its location in the user interface when the attention moved to be directed to it). Ceasing movement of the user interface element when not needed (attention of the user directed to the user interface element) saves processing power associated with moving the user interface element.

In some embodiments, the user interface element is a user interface object (e.g., thumb), such as user interface element 1703 including a thumb in FIG. 17A, for adjusting (e.g., selecting) a value of the user interface (e.g., such as described with reference to the first visual indication of method 1600) (1822). Selecting respective values of the user interface based on a respective location of the user interface element enables selection of more precise values rather than discrete values, thereby improving respective user-device interactions.

In some embodiments, in accordance with a determination that the user interface element is at the first portion of the user interface, the computer system displays (1824a) a gaze target, such as gaze target 1716 in FIGS. 17C and 17F (e.g., confirmation affordance) for adjusting the value of the user interface (e.g., such as described with reference to method 1600).

In some embodiments, while displaying the gaze target for adjusting the value of the user interface, the computer system detects (1824b), via the one or more input devices, the attention of the user directed to the gaze target, such as attention of user 1706 at gaze target 1716 in FIGS. 17C and 17F (e.g., such as described with reference to method 1600). In some embodiments, in response to detecting the attention of the user directed to the gaze target, and in accordance with a determination that one or more criteria are satisfied, the computer system adjusts (1824c) the value of the user interface based on a current location (e.g., within the first portion) of the user interface element, such as adjusting value of user interface 1704 in FIGS. 17C and 17F. In some embodiments, the gaze target includes one or more characteristics of the gaze target of methods 800, 900, 1000, and/or 1600. In some embodiments, the gaze target is displayed outside the user interface. In some embodiments, the gaze target is displayed slightly below, above, to the left of, or to the right of the first portion of the user interface. In some embodiments, the one or more criteria includes a criterion that is satisfied when the attention of the user is directed towards the gaze target for at least a threshold amount of time such as 0.1, 0.5, 1, 2, 3, 4, 5, 10, 30, or 100 s. In some embodiments, the one or more criteria include a criterion that is satisfied when the attention of the user is directed only towards the gaze target (e.g., without attention of the user directed towards any other location for the threshold amount of time). In some embodiments, the one or more criteria has one or more of the characteristics of displaying and/or selecting a gaze target described with reference to methods 800, 900, 1000, and/or 1600. In some embodiments, the second user interface of step(s) 1806, which is less bright, less opaque, smaller, and/or a different color than the user interface, is not displayed at (e.g., disappears from) a respective location in the user interface when the gaze target is displayed. Adjusting a respective value of the user interface based on the attention of the user directed at the gaze target meeting certain criteria serves as a verification to adjust the respective value of the user interface, and provides an efficient method for adjusting the current value by using attention, thereby reducing erroneous inputs with respect to the user interface.

In some embodiments, the gaze target is displayed within the second threshold distance (e.g., dead zone as described with respect to step 1806) of the user interface element, such as gaze target 1716 displayed below user interface element 1703 in FIGS. 17C and 17F (1826). In some embodiments, while the attention of the user is directed to the gaze target, the user interface element does not move (e.g., within the dead zone). In some embodiments, a size (e.g., length, width and/or area) of the dead zone corresponds to a size (e.g., length, width and/or area) of the user interface. Displaying the gaze target within the second threshold distance of the user interface element ensures that attention of the user can be directed at the gaze target without accidentally adjusting a value of the user interface since the user interface element does not move when attention is within the second threshold distance of the user interface element.

In some embodiments, in response to detecting that the attention of the user of the computer system is directed toward the first portion of the user interface (1828a), in accordance with a determination that the user interface element has a first size (e.g., length, width and/or area), such as dead zone 1710 corresponding to a first distance based on a first size of user interface element 1703 in FIG. 17A, the second threshold distance is a first distance (1828b). In some embodiments, in accordance with a determination that the user interface element has a second size, different from the first size, the second threshold is a second distance, different from the first distance, such as dead zone 1710 corresponding to a second distance based on user interface element 1703 having a second size than a first size in FIG. 17A. In some embodiments, the second threshold distance is determined based on the size of the user interface element. For example, if the user interface element is smaller, then the second threshold distance is smaller, and if the user interface element is larger, then the second threshold distance is larger. Determining the second threshold distance based on the size of the user interface element ensures that attention of the user can be directed within the dead zone without accidentally adjusting a value of the user interface since the user interface element does not move within the dead zone.

In some embodiments, displaying the user interface element includes displaying content associated with the user interface element at a location corresponding to the user interface element (1830a). In some embodiments, in accordance with a determination that the content has a first size (e.g., length, width and/or area), the second threshold distance is a first distance, such as dead zone 1710 corresponding to a first distance based on first size of content associated with user interface element 1703 in FIG. 17A (1830b). In some embodiments, in accordance with a determination that the content has a second size, different from the first size, the second threshold is a second distance, different from the first distance, such as dead zone 1710 corresponding to a second distance based on second size of content associated with user interface element 1703 in FIG. 17A (1830c). In some embodiments, the second threshold distance is determined based on the size of content (e.g., text within or outside (e.g., slightly above or below) the user interface) corresponding to the user interface element. For example, if the content is smaller, then the second threshold distance is smaller, and if the content is larger, then the second threshold distance is larger. Determining the second threshold distance based on the size of the content corresponding to the user interface element ensures that attention of the user can be directed to the content without accidentally adjusting a value of the user interface since the user interface element does not move within the second threshold distance.

In some embodiments, moving the user interface element at the first rate in accordance with the determination that the user interface element is greater than the first threshold distance from the first portion of the user interface element, such as shown by constant zone 1714 in FIGS. 17A-17B, and moving the user interface element at the second rate in accordance with the determination that the user interface element is less than the second threshold distance from the first portion of the user interface, such as shown by dynamic zone 1712 in FIGS. 17D-17E (e.g., as described with respect to step(s) 1802) are independent of whether the first portion of the user interface has a first spatial relationship relative to the user interface element (e.g., first portion is to the left of the user interface element in the user interface) or a second spatial relationship (e.g., first portion is to the right of the user interface element in the user interface), different from the first spatial relationship relative to the user interface element (1832). In some embodiments, despite varying locations of the first portion in the user interface to which the attention of the user directed, the user interface element moves at a first rate when the user interface element is within the constant zone described with respect to step 1806, and moves with a second rate when the user interface element is within the dead zone as described with respect to step 1806. Therefore, the threshold distances are optionally symmetric about the location of the user interface element on multiple sides of the user interface element. Moving the user interface element based on a distance between the user interface element and the first threshold distance or the second threshold distance irrespective of a position of the first portion relative to the user interface ensures consistency in the movement of the user interface element, thereby reducing errors in interaction with the slider element.

In some embodiments, displaying the user interface element includes displaying a representation (e.g., preview) of a portion of a content item, such as preview of virtual object (e.g., media item) 708 in FIG. 17A (e.g., outside the user interface element such as above or below the user interface element) at a location different from the user interface element, wherein the representation of the portion of the content item corresponds to a current location of the user interface element, such as location of user interface element 1703 in FIG. 17A, in the user interface (e.g., a content playback scrubber as further described in step 1836) (1834a). In some embodiments, while concurrently displaying the user interface element and the representation of the portion of the content item at the location (e.g., of the preview of the content item displayed above, below, to the left of, or to the right of the user interface) different from the user interface element, the computer system detects (1834b), via the one or more input devices, that the attention of the user is directed toward a second portion (e.g., similar to or different than the first portion of step(s) 1802) of the user interface. In some embodiments, in response to detecting that the attention of the user is directed toward the second portion of the user interface (e.g., the second portion is optionally greater than the second threshold distance from the user interface element) (1834c), in accordance with a determination that the second portion of the user interface does not correspond to the representation of the content item, the computer system moves (1834d) the user interface element in accordance with a distance between the second portion of the user interface and the user interface element, such as moving user interface element 1703 if attention of user 1706 is not directed to preview of virtual object (e.g., media item) 708 in FIG. 17A (e.g., such as described with reference to step(s) 1802, for example the second portion is greater than the second threshold distance from the user interface element, and the computer system moves the user interface element in accordance with the rates and distances described with reference to step(s) 1802 and step 1806).

In some embodiments, in accordance with a determination that the second portion of the user interface corresponds to the representation of the content item (e.g., the attention of the user, while being greater than the second threshold distance from the user interface element, is directed to the representation of the content item displayed along with the user interface element), the computer system forgoes (1834e) moving the user interface element independent of the distance between the second portion of the user interface and the user interface element, such as forgoing moving user interface element 1703 if attention of user 1706 is directed to preview of virtual object (e.g., media item) 708 in FIG. 17A (e.g., because the attention of the user is directed to the representation of the content item, the computer system does not move the user interface element, even though it would otherwise move the user interface element based on the distance from the second portion if the second portion did not correspond to the representation of the content item). Forgoing movement of the user interface element when the attention of the user is directed to a content preview corresponding to the user interface element avoids accidental changing of a current value of the user interface, thereby reducing erroneous inputs with respect to the user interface.

In some embodiments, the user interface includes a content playback scrubber element, such as user interface 1704 including a content playback scrubber element in FIG. 17A, and the representation of the content item corresponds to a preview of the content item, such as a preview of as virtual object (e.g., media item) 708 if user interface 1704 includes a content playback scrubber element in FIG. 17A, at a playback position corresponding to the current location of the user interface element in the content playback scrubber element (1836). In some embodiments, the content playback scrubber element includes one or more characteristics of the content playback control slider of method 1600. A location of the user interface element in the content playback scrubber element optionally corresponds to a current playback position and/or current time of playback with respect to the length of the content item (e.g., amount of time that has elapsed since playback of the media content has begun). In some embodiments, the length of the content playback scrubber element corresponds to the length of the content item. In some embodiments, the preview is an image or video of the respective playback position of the media content (e.g., corresponding to the current position of the first visual indication in the slider element). In some embodiments, the preview is smaller than the size of the content item. In some embodiments, the preview is displayed outside the content playback scrubber element. In some embodiments, the preview is displayed above, below, or near the first visual indication in the content playback scrubber element. Displaying a preview of the content item at a respective playback position serves as visual feedback for a current position in the content playback scrubber element, reducing errors in interaction with the scrubber bar element.

In some embodiments, a size (e.g., length, width, and/or area) of the user interface element is less than a size (e.g., length, width, and/or area) of the representation of the content item, such as virtual object (e.g., media item) 708 (1838). In some embodiments, the user interface element is less wide than a preview of a movie, television show, or photo provided by the scrubber bar element. A preview of the content item being wider than the user interface element ensures that the preview is not obscured by portions of the user interface such as the user interface element and clearly visible to the user, reducing errors in interaction with the scrubber bar element.

It should be understood that the particular order in which the operations in method 1800 have been described is merely exemplary and is not intended to indicate that the described order is the only order in which the operations could be performed. One of ordinary skill in the art would recognize various ways to reorder the operations described herein.

FIGS. 19A-19J illustrate examples of a computer system displaying indication of attention of a user in accordance with some embodiments.

Figure 19A:
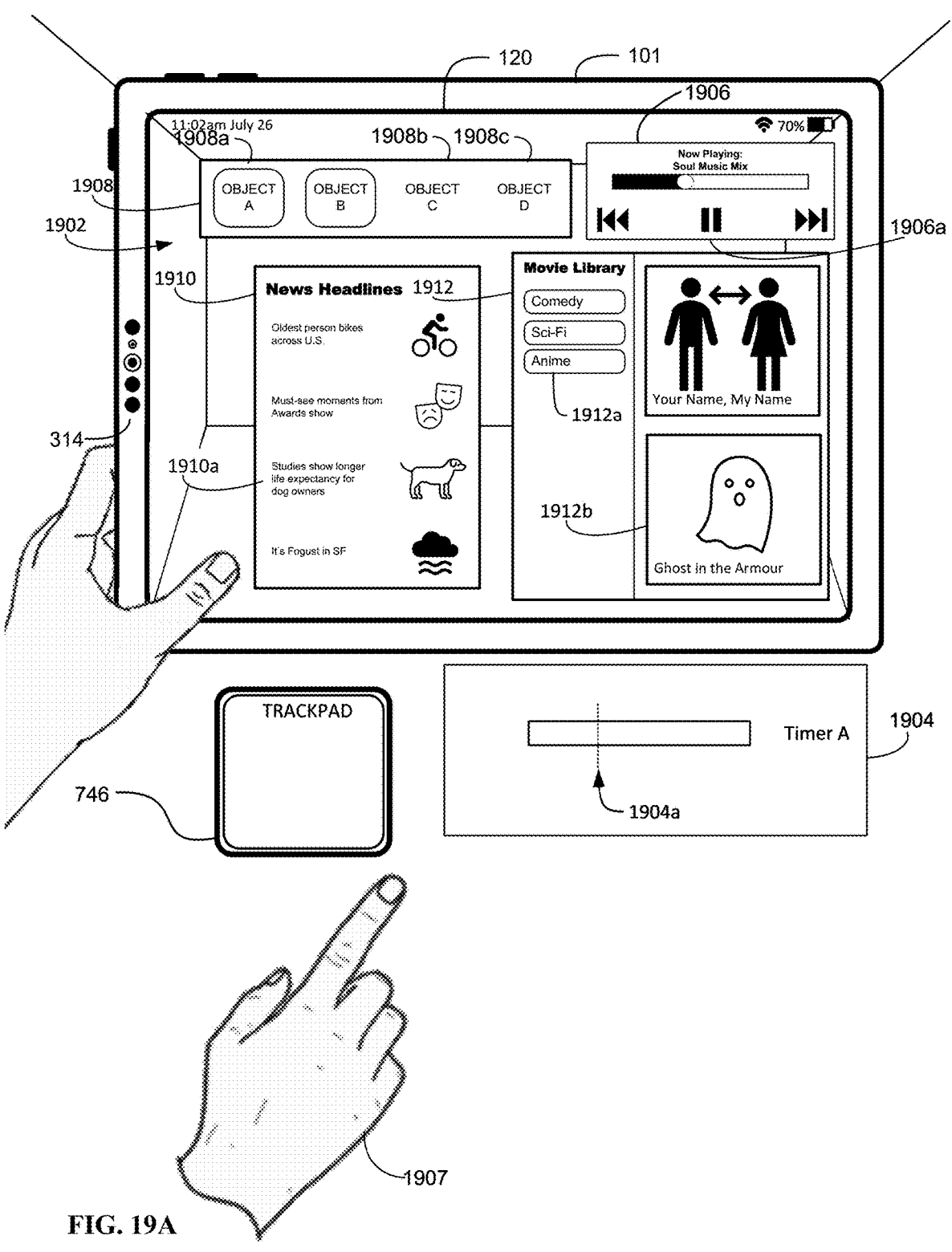
FIGS. 19A-19J illustrate examples of a computer system displaying indication of attention of a user in accordance with some embodiments.

FIG. 19A illustrates a computer system 101 displaying, via a display generation component (e.g., display generation component 120 of FIG. 1), a three-dimensional environment 1902 from a viewpoint of a user. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 19A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1902 or portions of the physical environment are visible via the display generation component 120 of computer system 101. For example, three-dimensional environment 1902 includes portions of the left and back walls, and the floor in the physical environment of the user.

In FIG. 1902, three-dimensional environment 1902 also includes virtual content, such as virtual content 1906, 1908, 1910 and 1912. Virtual content 1906, 1908, 1910 and 1912 are optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to method 2000. In FIG. 19A, virtual content 1906 is a content playback user interface that includes one or more controls for controlling playback of content (e.g., music, movies, videos and/or podcasts) at computer system 101, including playback control 1906a that is selectable to pause the playback of the content. Virtual content 1908 is an object that includes selectable objects A, B, C and D that are selectable to perform respective operations. Virtual content 1910 is a news interface that includes selectable objects—including selectable object 1910a—to cause display of corresponding news articles. Virtual content 1912 is a movie library interface that includes selectable objects—including selectable object 1912a and 1912b—to cause performance of one or more operations related to the movie library at computer system 101.

In some embodiments, input to computer system 101 is provided via air gestures from hand 1907 and/or attention of the user (e.g., as described in more detail with reference to method 2000), or via trackpad 746 from hand 1907, and inputs described herein are optionally received via trackpad 746 or via air gestures/attention.

In some embodiments, in response to detecting attention of the user directed to a selectable object in three-dimensional environment 1902, computer system 101 displays a visual indication of such attention in three-dimensional environment 1902, as described in more detail with reference to method 1200. For example, in FIG. 19B, computer system 101 detects several alternative locations of user attention in three-dimensional environment 1902, and displays various indications of attention. Details about the appearance and behavior of the indications of attention are described with reference to method 1200.

For example, in FIG. 19B, computer system 101 detects attention 1914 directed to selectable object 1908a, and displays an attention indicator at the location of attention 1914 as described with reference to method 1200. Computer system 101 also detects attention 1916 directed to selectable object 1908b in FIG. 19B. Selectable object 1908b did not include a displayed border or boundary before attention 1916 was directed to it. However, in FIG. 19B, in response to detecting attention 1916 directed to object 1908b, computer system 101 updates display of object 1908b to include a visible border or boundary, and displays an attention indicator at the location of attention 1916 as described with reference to method 1200. Computer system 101 responds similarly with respect to selectable object 1910a. Selectable object 1910a— which in FIG. 19A includes textual content and graphic content (e.g., an image of a dog)— did not include a displayed border or boundary before attention 1918 was directed to it. However, in FIG. 19B, in response to detecting attention 1918 directed to object 1910a, computer system 101 updates display of object 1910a to include a visible border or boundary around the textual and graphical portions of object 1910a—as if causing display of the platter that is the selectable object and that includes the textual and graphical portions of object 1910a—and displays an attention indicator at the location of attention 1918 as described with reference to method 1200.

Figure 19B:
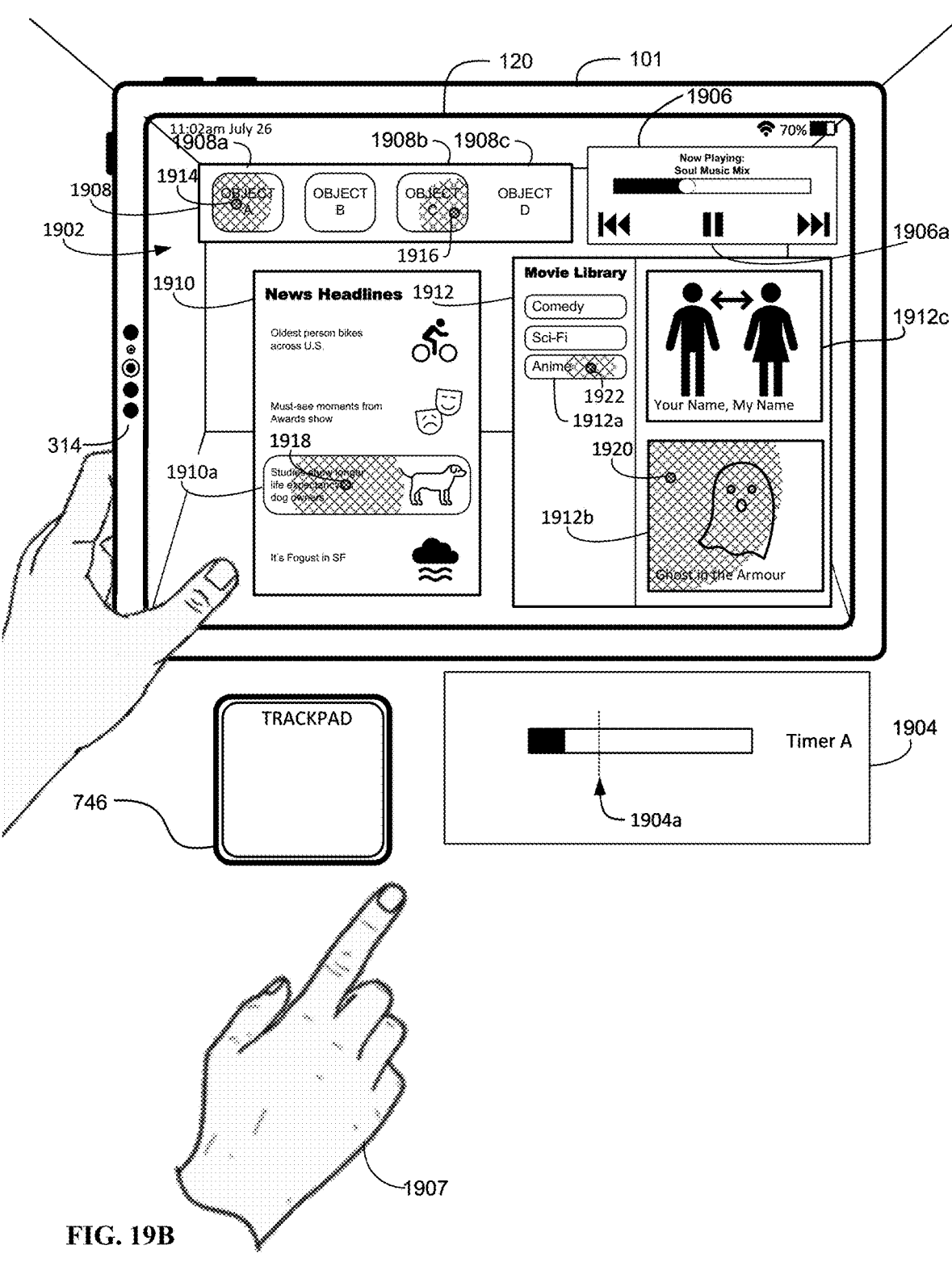

In FIG. 19B, computer system 101 also detects attention 1922 directed to selectable object 1912a, and attention 1920 directed to selectable object 1912b, and correspondingly displays attention indicators at the locations of attention 1922 and 1920 in objects 1912a and 1912b, respectively, as described with reference to method 1200. Timer 1904 indicates the length of time attention 1920 has been directed to selectable object 1912b, and will be referenced in more detail later.

Figure 19C:
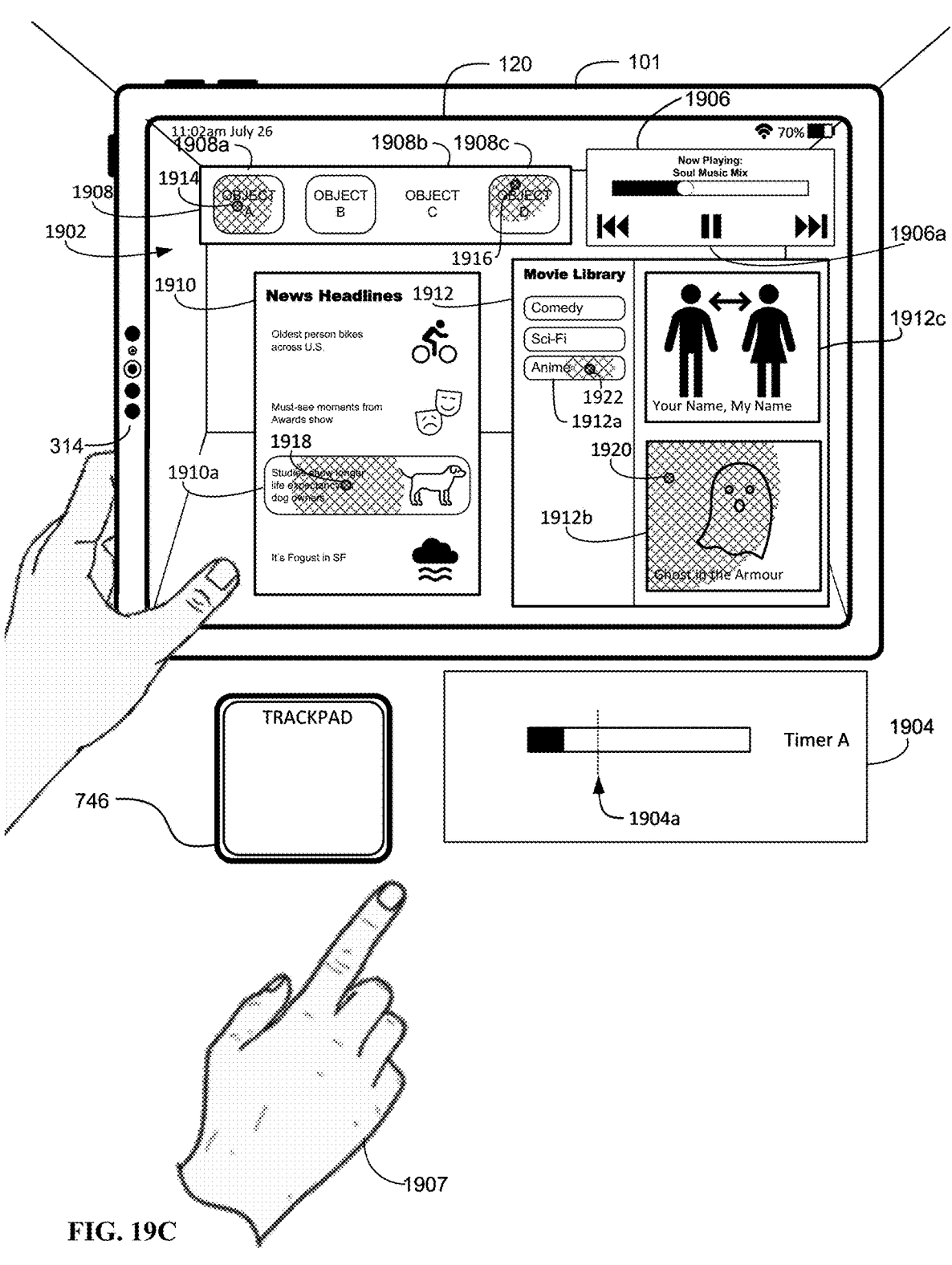

From FIG. 19B to FIG. 19C, computer system 101 detects attention 1916 shift from selectable object 1908b to selectable object 1908c. In response, as shown in FIG. 19C, computer system 101 ceases display of the attention indicator in object 1908b and also ceases display of the border of object 1908b, and displays the border or boundary for object 1908c (e.g., similar to as described for object 1908b) and displays an attention indicator at the location in object 1908c at the location of attention 1916.

Figure 19D:
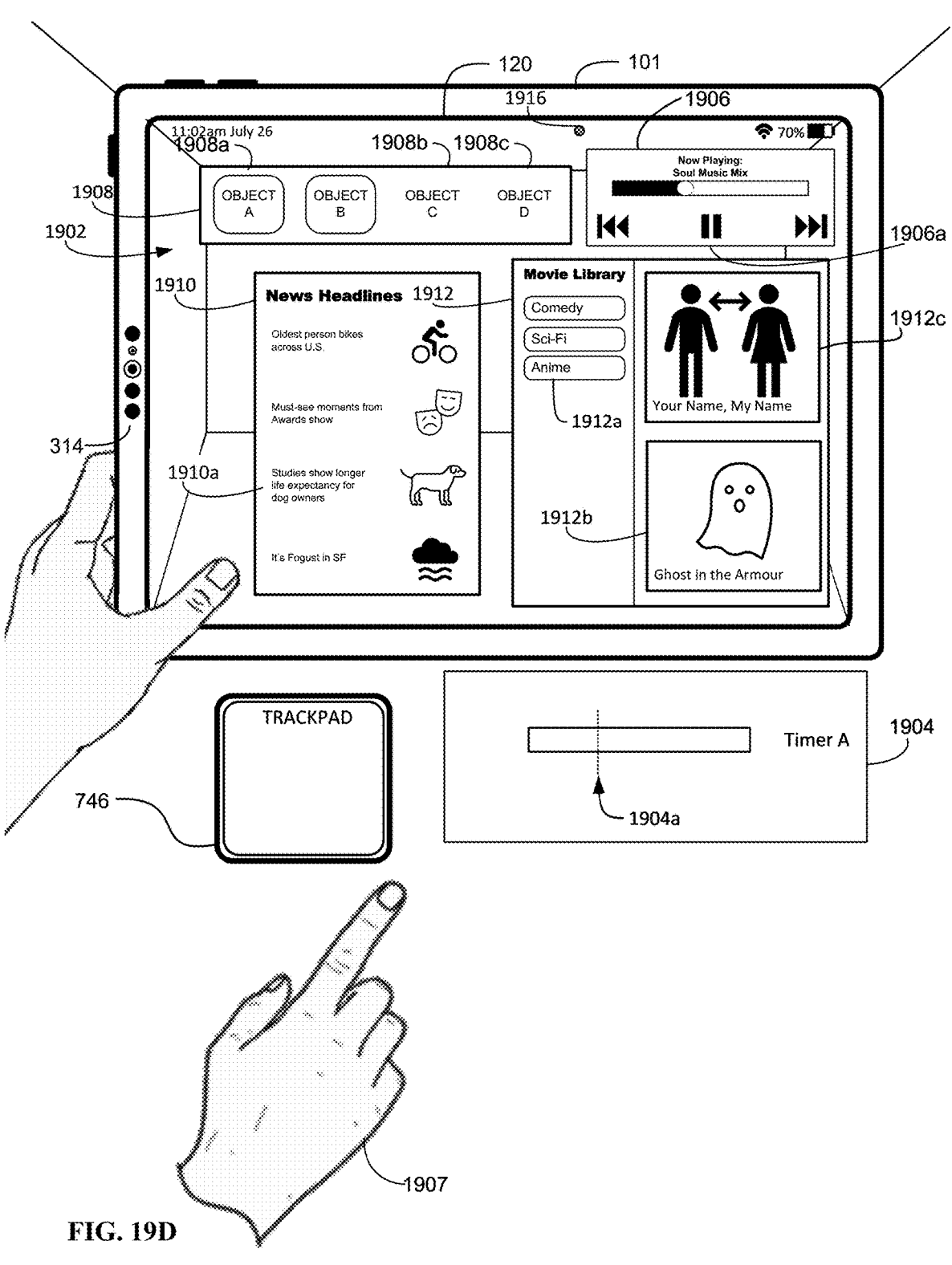

From FIG. 19C to FIG. 19D, computer system 101 detects attention 1916 directed to an empty portion of three-dimensional environment 1902 (e.g., a portion that does not include a selectable object), and does not detect any alternative attentions either. In response, as shown in FIG. 19D, computer system 101 ceases display of the attention indicators described above, and also ceases display of the borders and/or platters that had been displayed for objects 1908c and 1910a.

FIG. 19C1 illustrates similar and/or the same concepts as those shown in FIG. 19C (with many of the same reference numbers). It is understood that unless indicated below, elements shown in FIG. 19C1 that have the same reference numbers as elements shown in FIGS. 19A-19J have one or more or all of the same characteristics. FIG. 19C1 includes computer system 101, which includes (or is the same as) display generation component 120. In some embodiments, computer system 101 and display generation component 120 have one or more of the characteristics of computer system 101 shown in FIGS. 19A-19J and display generation component 120 shown in FIGS. 1 and 3, respectively, and in some embodiments, computer system 101 and display generation component 120 shown in FIGS. 19A-19J have one or more of the characteristics of computer system 101 and display generation component 120 shown in FIG. 19C1.

In FIG. 19C1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 19A-19J.

In FIG. 19C1, display generation component 120 is illustrated as displaying content that optionally corresponds to the content that is described as being displayed and/or visible via display generation component 120 with reference to FIGS. 19A-19J. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 19C1.

Display generation component 120 has a field of view (e.g., a field of view captured by external image sensors 314b and 314c and/or visible to the user via display generation component 120, indicated by dashed lines in the overhead view) that corresponds to the content shown in FIG. 19C1. Because display generation component 120 is optionally a head-mounted device, the field of view of display generation component 120 is optionally the same as or similar to the field of view of the user.

In FIG. 19C1, the user is depicted as performing an air pinch gesture (e.g., with hand 1907) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 19A-19J.

In some embodiments, computer system 101 responds to user inputs as described with reference to FIGS. 19A-19J.

In the example of FIG. 19C1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 19A-19J and/or described with reference to the corresponding method(s) are optionally implemented on computer system 101 and display generation unit 120 in a manner similar or analogous to that shown in FIG. 19C1.

Figure 19E:
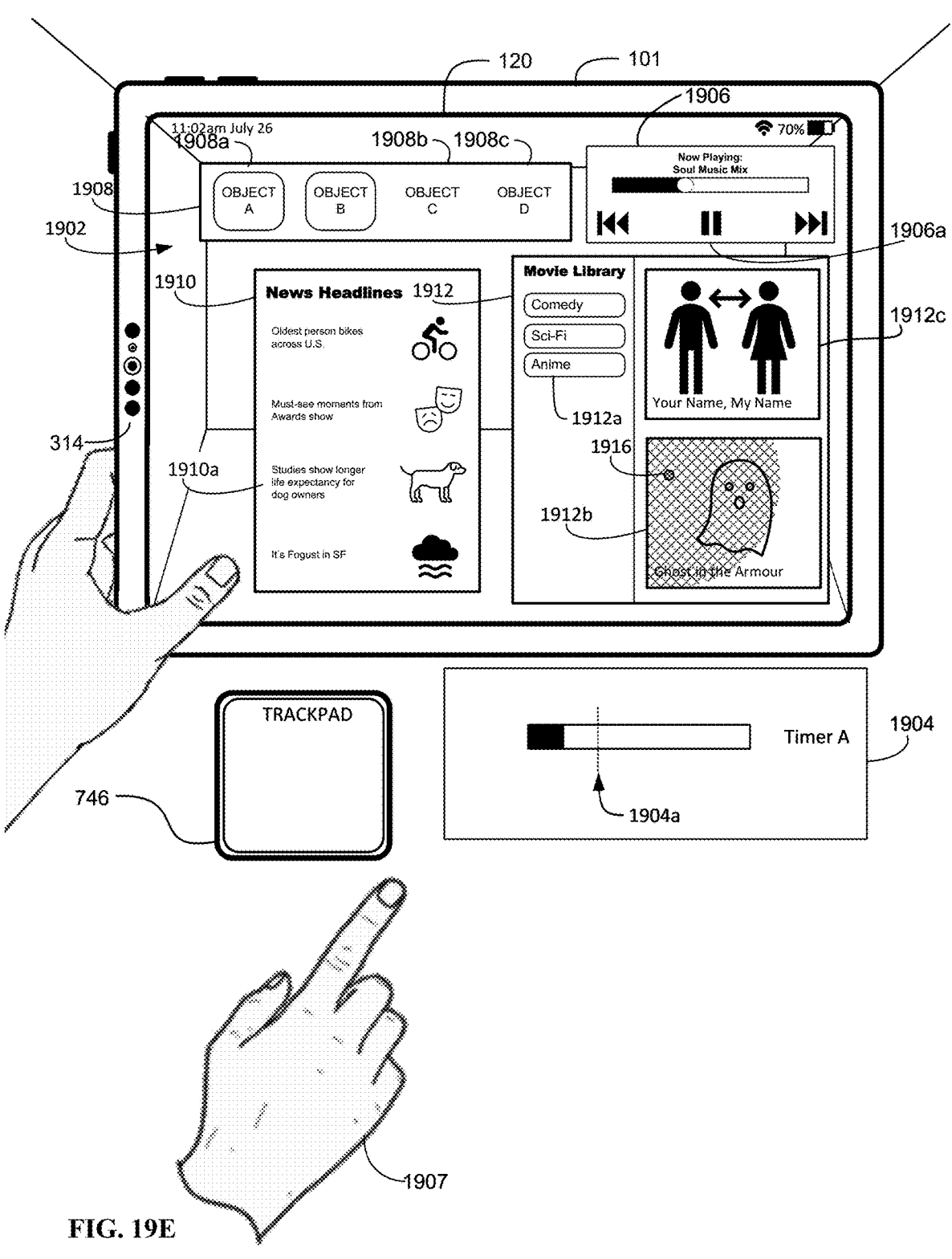

In FIG. 19E, computer system 101 detects attention 1916 directed to selectable object 1912b. In response, computer system 101 displays an attention indicator in object 1912b at the location of attention 1916, as described with reference to method 1200. In some embodiments, computer system 101 ceases display of an attention indicator in a selectable object based on how long the corresponding attention has been directed to that selectable object. For example, in FIG. 19E, attention 1916 has been directed to object 1912b for less than a time threshold 1904a, as shown by timer 1904. From FIG. 19E to FIG. 19F, computer system 101 detects attention 1916 move to a new location within object 1912b, and updates the display of the attention indicator in object 1912b accordingly, as described with reference to method 1200. The duration of attention 1916 towards selectable object 1912b has increased from FIG. 19E to FIG. 19F, but still has not reached threshold 1904a.

Figure 19F:
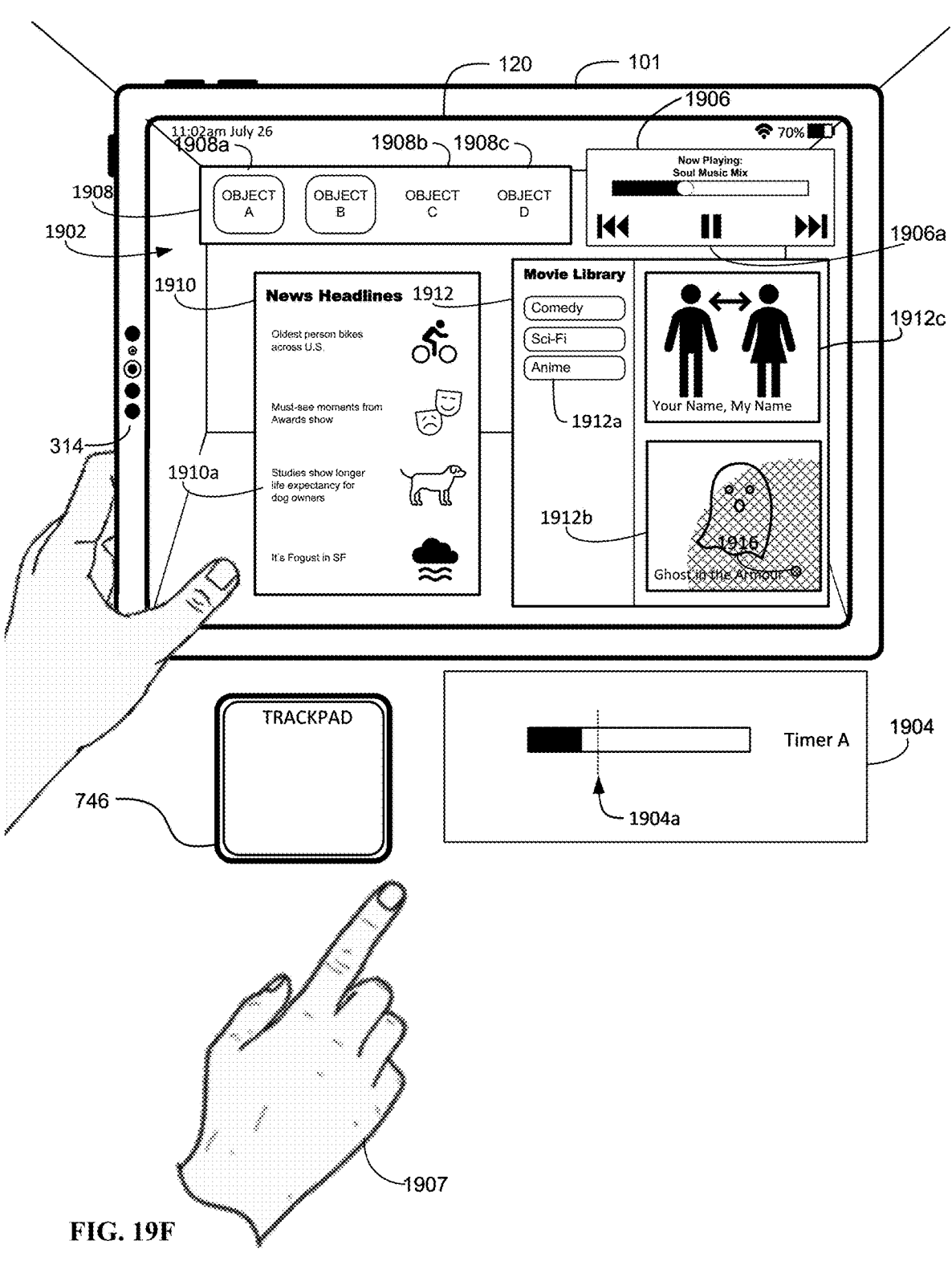
Figure 19G:
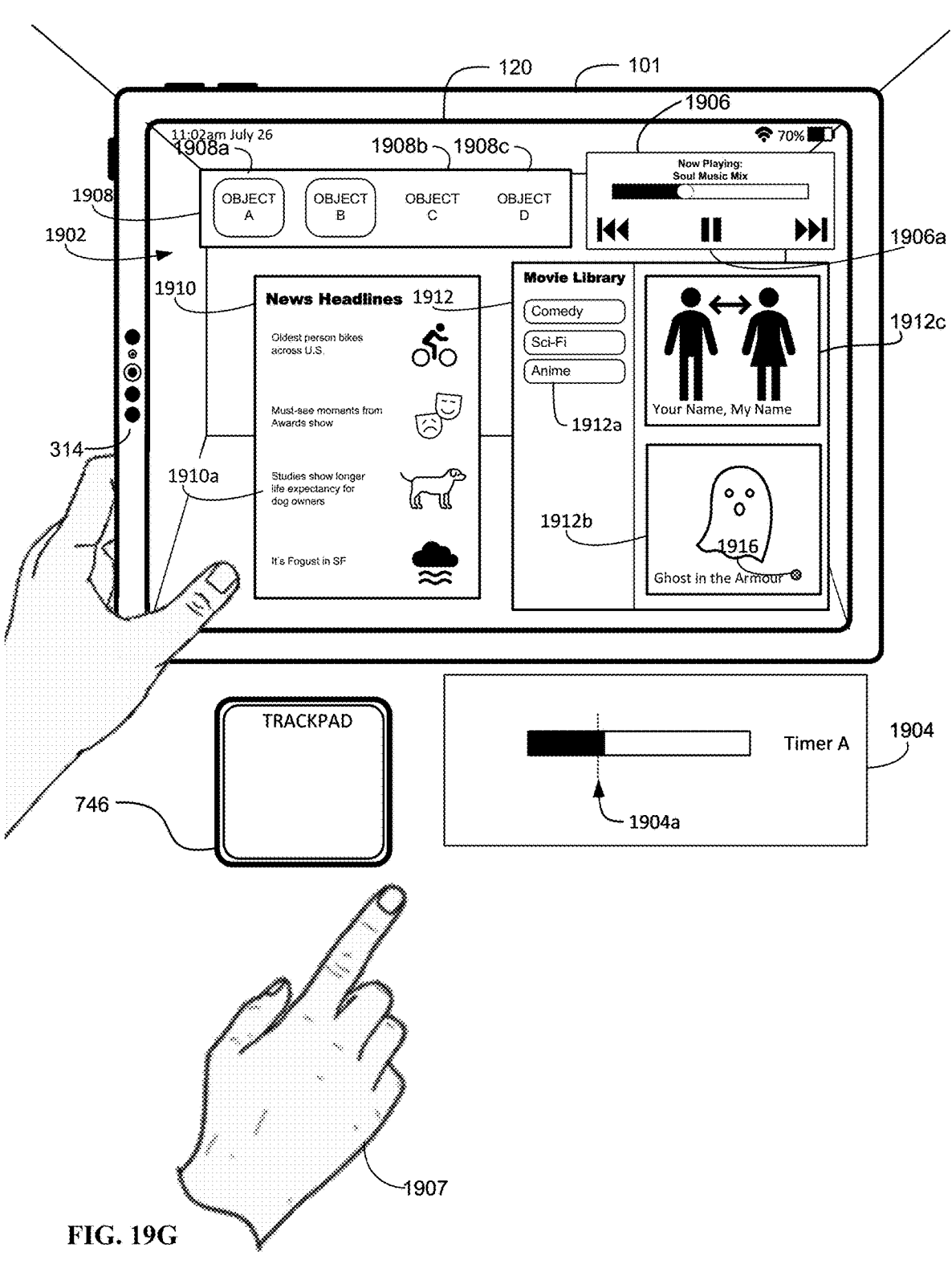

From FIG. 19F to FIG. 19G, the duration of attention 1916 towards selectable object 1912b has increased again, and has exceeded threshold 1904a. As a result, even though attention 1916 is still directed to object 1912b, computer system 101 has ceased display of the attention indicator for attention 1916 in object 1912b. In this way, the content included in object 1912b (e.g., an image and/or text) may be more easily visible in three-dimensional environment 1902.

Figure 19H:
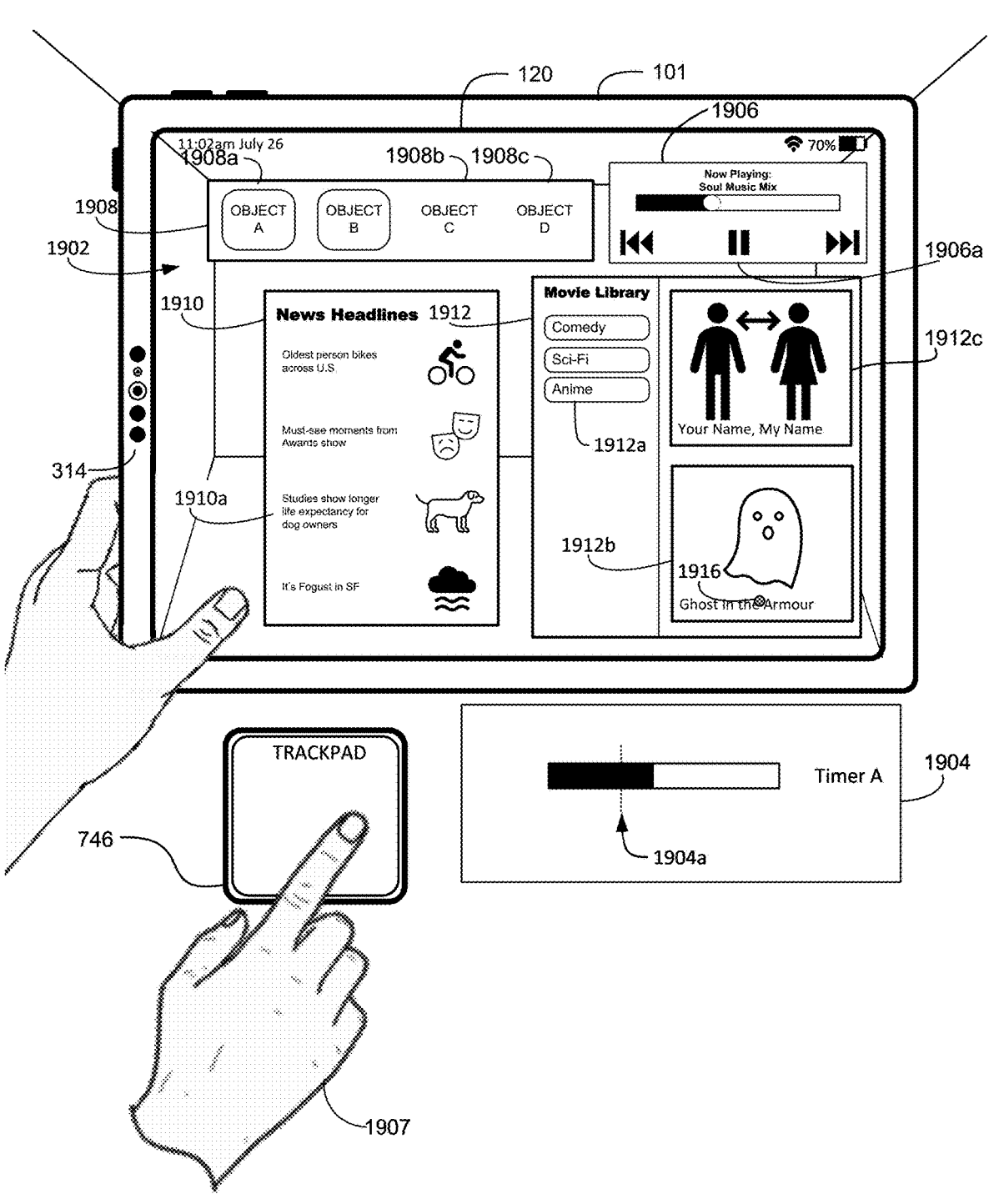
Figure 19I:
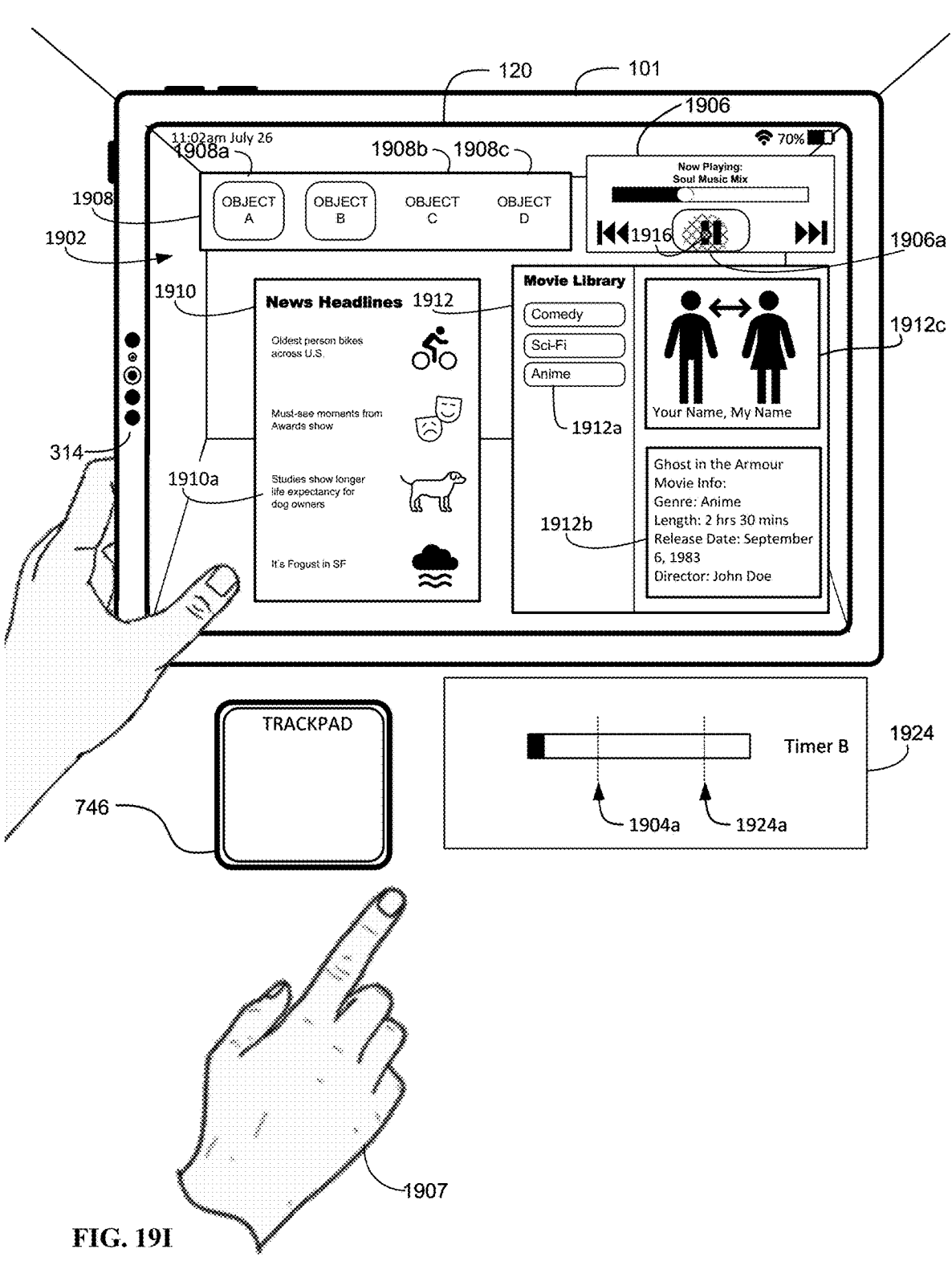

In some embodiments, computer system 101 continues to not display the attention indicator for attention 1916 even if attention 1916 moves within object 1912b. For example, from FIG. 19G to FIG. 19H, computer system 101 detects attention 1916 move within object 1912b, but continues to not display the attention indicator for attention 1916, as shown in FIG. 19H. In some embodiments, even though the attention indicator is not displayed for attention 1916, computer system 101 still utilizes attention 1916 for selecting object 1912b. For example, in FIG. 19H, computer system 101 detects a selection input from hand 1907 (e.g., an air pinching gesture as described in more detail with reference to method 2000, or a click or tap input on trackpad 746) while attention 1916 is directed to object 1912b, but while not displaying the attention indicator for attention 1916. In response, as shown in FIG. 19I, computer system 101 selects object 1912b and performs the operation corresponding to object 1912b (e.g., displaying additional information such as title, genre, length, director, and release date for the movie corresponding to object 1912b).

Figure 19J:
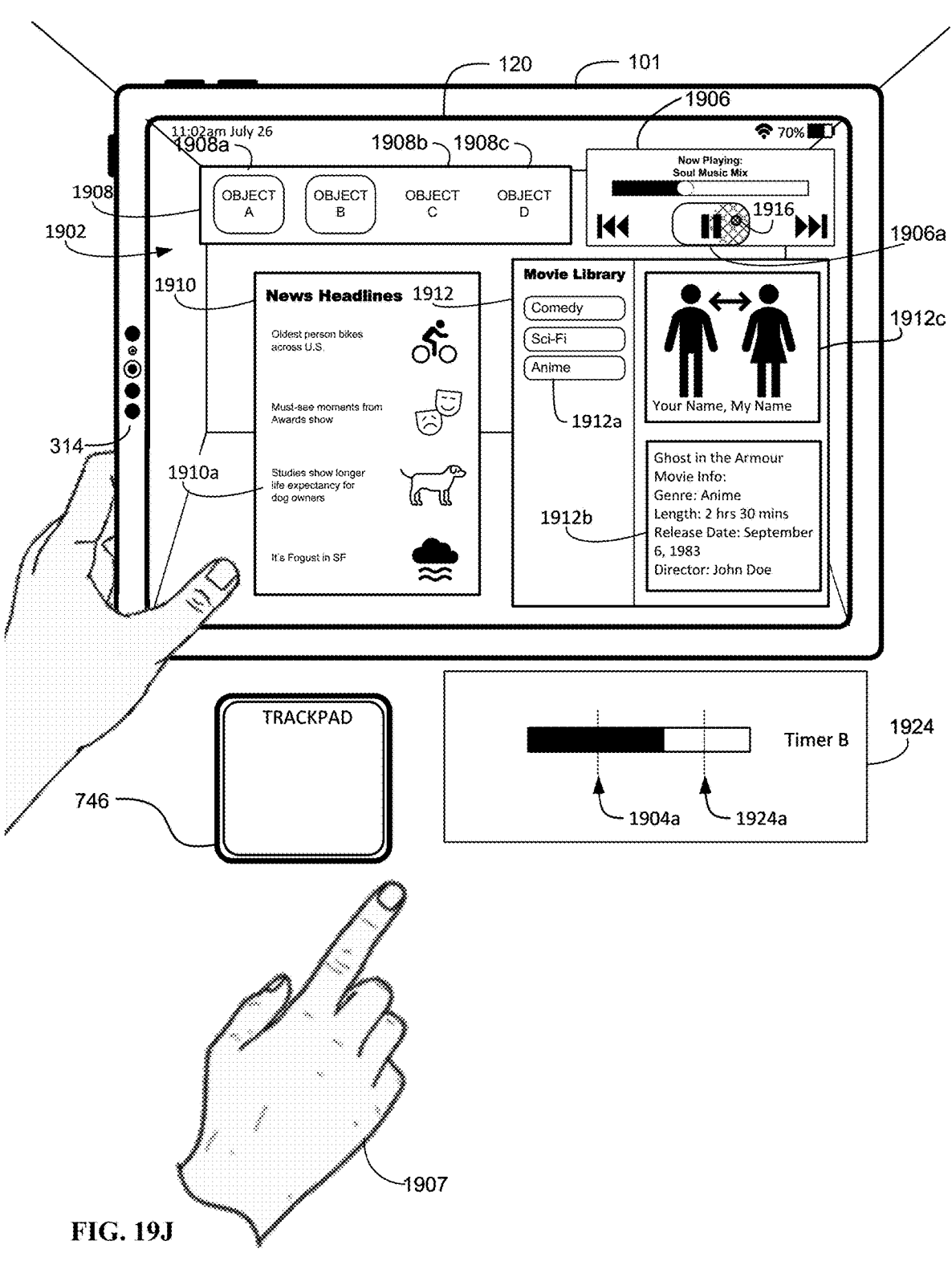
Figure 20B:
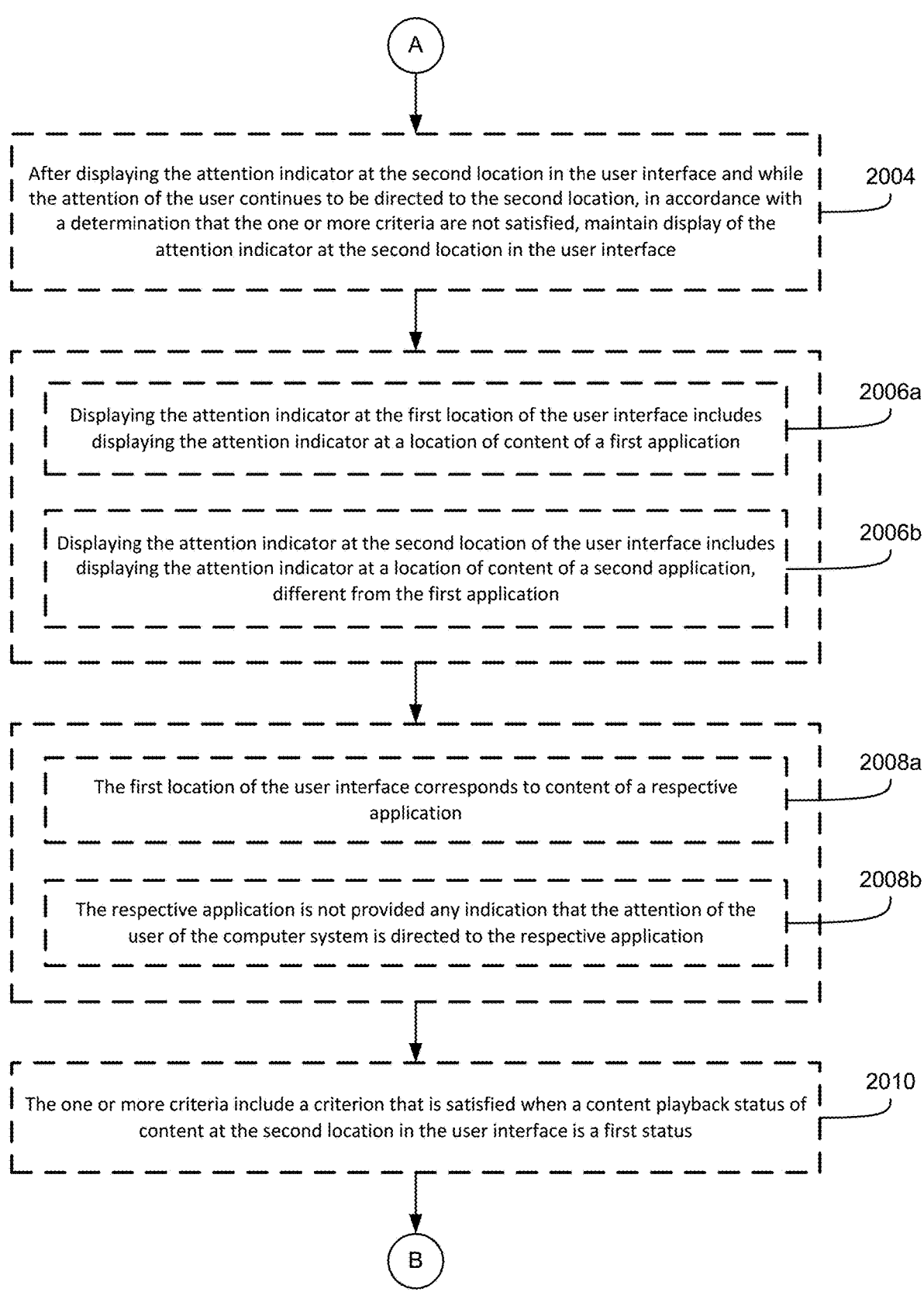
Figure 20C:
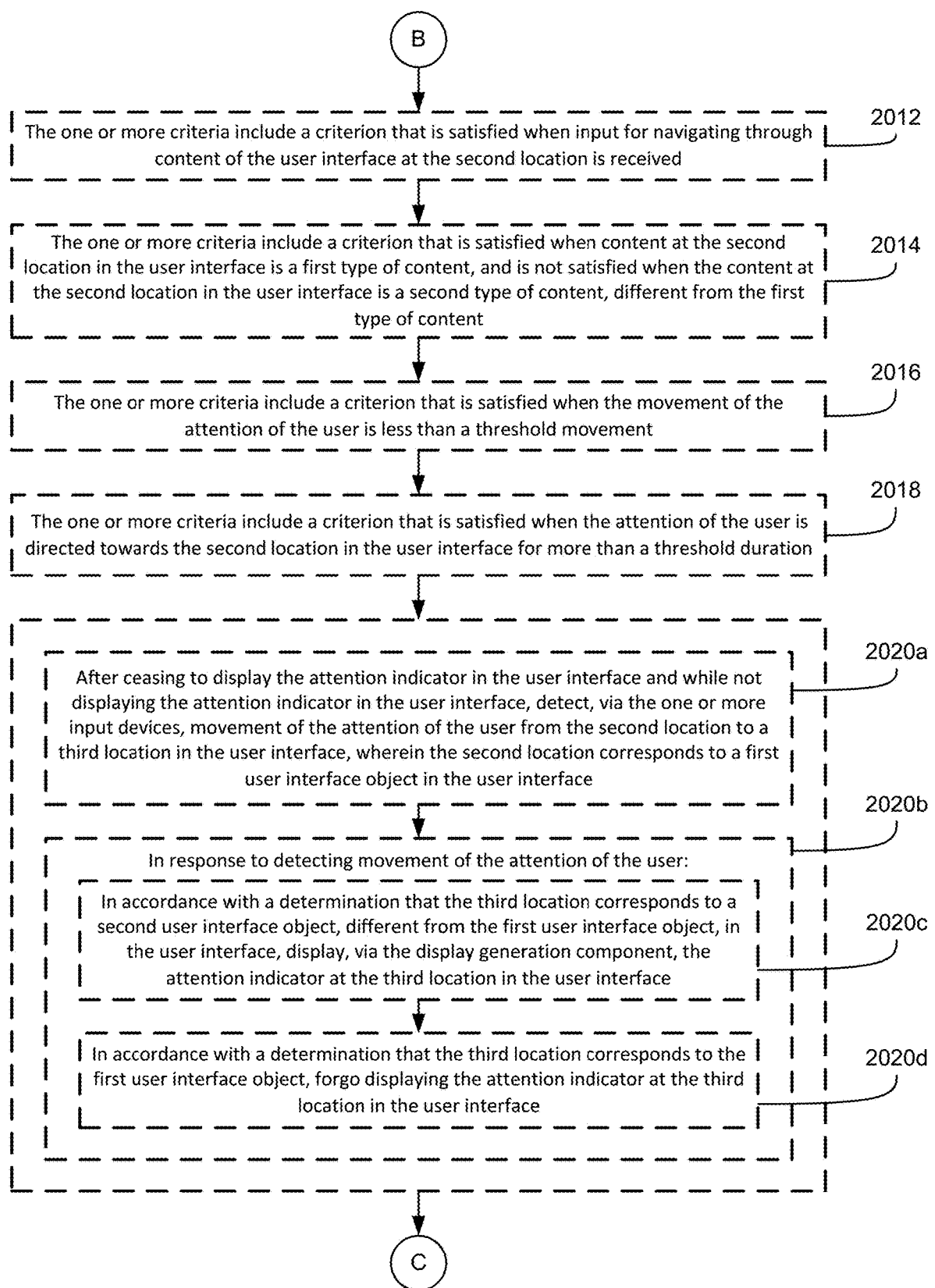
Figure 20D:
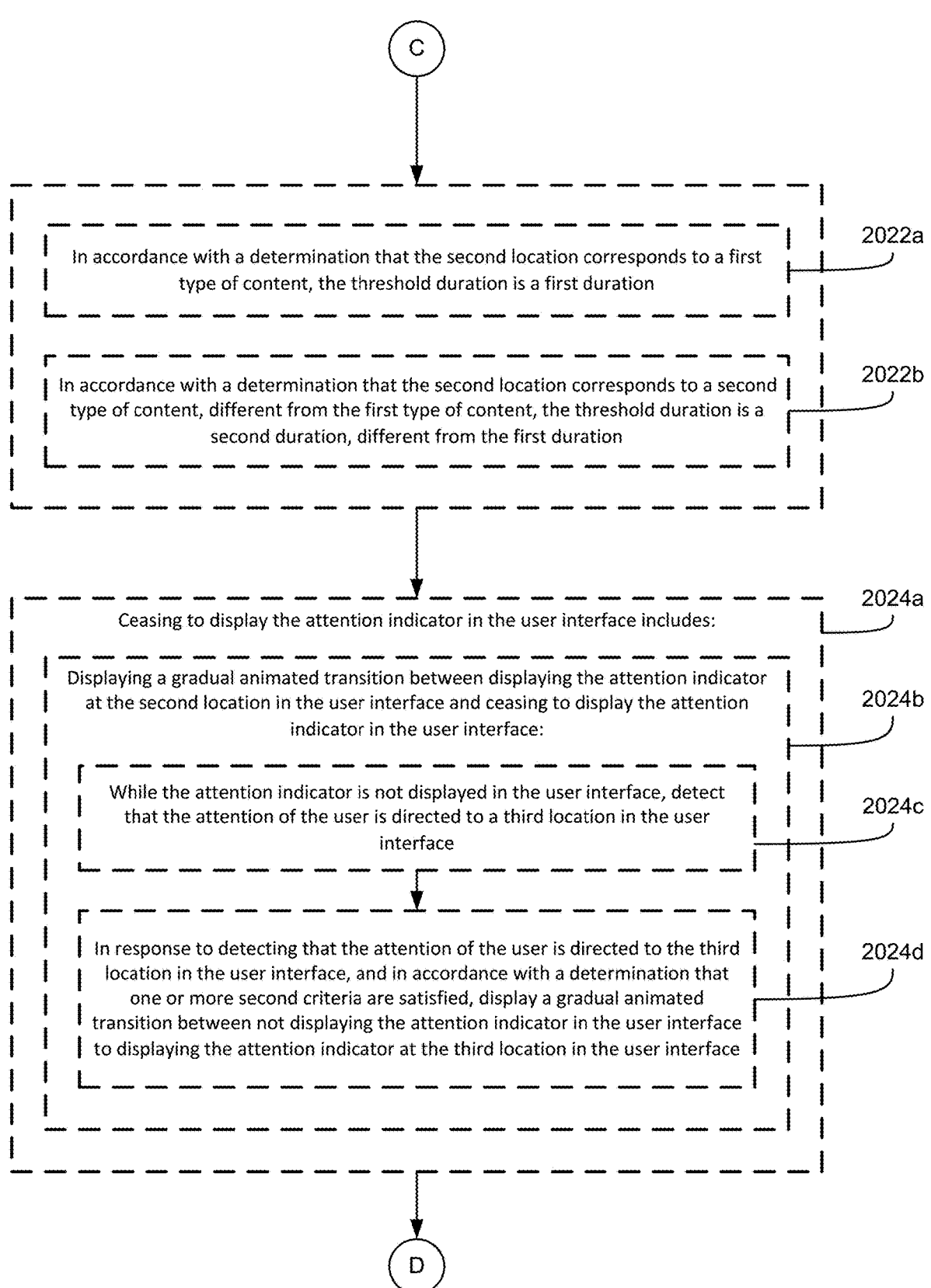

In some embodiments, different selectable objects have different conditions for ceasing display of attention indicators displays in those objects based on attention, as described in more detail with reference to method 2000. For example, in some embodiments, larger selectable objects (e.g., object 1912b) have a shorter threshold duration that causes the attention indicator to cease being displayed, whereas smaller objects (e.g., 1906a) have a longer threshold duration that causes the attention indicator to cease being displayed. For example, in FIG. 19I, computer system 101 detects attention 1916 directed to object 1906a, which is smaller than object 1912b and is a playback control element for the content playback user interface 1906. In response to attention 1916 being directed to object 1906a, computer system 101 updates display of object 1906a to include a visible border or boundary—which it did not include prior to attention 1916 being directed to it—and displays an attention indicator at the location of attention 1916 as described with reference to method 1200. Further, computer system 101 optionally tracks the duration that attention 1916 is directed to object 1906a, as indicated by timer 1924. As shown in timer 1924, object 1906a is associated with a threshold duration 1924a that is longer than duration 1904a associated with object 1912b. Therefore, as shown in FIG. 19J, where attention 1916 has moved within object 1906a (causing the corresponding attention indicator to update accordingly), attention 1916 has been directed to object 1906a for longer than duration 1904a but less than threshold 1924a. In FIG. 19J, computer system 101 continues to display the attention indicator for attention 1916 in object 1906*a* until the duration of attention 1916 towards object 1906*a* reaches threshold 1924*a*.

FIGS. 20A-20E is a flowchart illustrating a method 2000 of displaying indication of attention of a user in accordance with some embodiments. In some embodiments, the method 2000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 2000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2000 are, optionally, combined and/or the order of some operations is, optionally, changed.

In some embodiments, the method 2000 is performed at a computer system in communication with a display generation component and one or more input devices (e.g., a gaze tracking device, a hand tracking device, a remote control, one or more touch-sensitive surfaces, one or more buttons, dials, and/or knobs). For example, the computer system includes devices described with reference to methods 800, 900, 1000, 1200, 1400, 1600, 1800, and/or 2200. In some embodiments, the display generation component includes a display as described with reference to methods 800, 900, 1000, 1200, 1400, 1600, 1800, and/or 2200. In some embodiments, the gaze tracking device is a device described with reference to methods 800, 900, 1000, 1200, 1400, 1600, 1800, and/or 2200.

In some embodiments, the computer system displays (2002*a*), via the display generation component, a user interface that includes an attention indicator at a first location in the user interface, wherein the first location corresponds to a location of an attention of a user of the computer system directed toward the user interface, such as the attention indicator for attention 1916 in FIG. 19E. In some embodiments, the user interface is displayed in a three-dimensional environment described with reference to methods 800, 900, 1000, 1200, 1400, 1600, 1800, and/or 2200. In some embodiments, the user interface is a user interface described with reference to method 800. In some embodiments, the attention indicator is a user interface object or element or visual indication that indicates the first location (or portion) of the user interface to which the attention of the user is directed. For example, the attention indicator is optionally displayed having a first visual appearance (e.g., first degree of coloring, first shape, first size, or first degree of transparency) at the first location in the user interface. For example, the attention indicator is initially displayed as a circle. In some embodiments, the attention indicator is displayed as other shapes, cursor elements, or movable indicators instead of the circle. In some embodiments, the attention indicator provides feedback as to the location and/or area of the user's attention. In some embodiments, the computer system displays the attention indicator based on an attention (or gaze) responsive property of the user interface and/or one or more attention responsive user interface objects or elements (e.g., selectable user interface objects). For example, when the user interface and/or a user interface object is attention responsive, the computer system optionally changes the appearance of the attention indicator to be displayed with a second visual appearance different from the first visual appearance to indicate that a gaze action (e.g., action to perform an operation associated with the user interface and/or user interface object) is optionally performed as described with reference to methods 800, 900, 1000, 1200, 1400, 1600, 1800, and/or 2200. For example, when the computer system detects attention directed to an attention responsive user interface object such as a selectable user interface object, the computer system displays the attention indicator having a second visual appearance different from the first visual appearance. For example, the attention indicator changes from the circle to the second visual appearance having a shimmering, glowing, or different textual effect applied to a portion of the attention responsive user interface object having gaze. More detailed descriptions of the attention indicator are provided with reference to method 1200.

In some embodiments, while displaying the user interface including the attention indicator, the computer system detects (2002*b*), via the one or more input devices, movement of the attention of the user (e.g., from the first location to a second location or within a first region of the first location), such as the movement of attention 1916 from FIG. 19E to 19F. In some embodiments, in response to detecting the movement of the attention of the user, the computer system moves (2002*c*) the attention indicator from the first location to a second location, different from the first location, in the user interface corresponding to the movement of the attention of the user, such as the movement of the attention indicator for attention 1916 from FIG. 19E to 19F. In some embodiments, the first location or second location of the attention indicator is a centroid of a respective region of the user interface. In some embodiments, the first location or second location is not the centroid of the respective region of the user interface. In some embodiments, the movement of the attention indicator and/or the appearance of the attention indicator during such movement has one or more of the characteristics of the attention indicators described with reference to method 1200.

In some embodiments, after displaying the attention indicator at the second location in the user interface and while the attention of the user continues to be directed to the second location (e.g., as detected by the one or more input devices of the computer system), in accordance with a determination that one or more criteria are satisfied, the computer system ceases (2002*d*) to display the attention indicator in the user interface, such as shown with the attention indicator for attention 1916 in FIG. 19G. In some embodiments, the one or more criteria include a criterion that is satisfied when the user's gaze is not directed to the user interface for at least a first time threshold (e.g., 0.02, 0.05, 0.1, 0.2, 0.25, 0.3, 0.5, 1, 2, 3, or 5 seconds). For example, the user's gaze is optionally directed to a location outside of the user interface. In some embodiments, if the user's gaze is not directed toward the user interface for a first period of time greater than the first time threshold, the user interface does not include the attention indicator. Displaying an attention indicator that ceases to be displayed when appropriate indicates that the computer system will not respond to gaze-based input, thereby reducing errors in usage of the computer system and reducing inputs needed to correct such errors.

In some embodiments, after displaying the attention indicator at the second location in the user interface and while the attention of the user continues to be directed to the second location, in accordance with a determination that the one or more criteria are not satisfied, the computer system maintains (2004) display of the attention indicator at the second location in the user interface, such as maintaining the indicator for attention 1916 in FIG. 19F. In some embodiments, the one or more criteria include the criterion described in step(s) 2002. For example, the computer system detects that the attention of the user is maintained at the second location and has not moved away from the second location. Thus, the computer system continues to display the attention indicator at the second location in the user interface. In some embodiments, the attention of the user (or a precise position of the attention of the user) directed toward to the second location changes but is determined, by the computer system, to be continuously within a region of the second location and has not moved away from the region of the second location to satisfy the one or more criteria. In some embodiments, the computer system reduces a visual prominence of the attention indicator as described in step(s) 2016-2024 and method 1200 while the attention of the user continues to be directed to the second location. Displaying an attention indicator that continues to be displayed when appropriate indicates that the computer system will respond to gaze-based input, thereby providing improved visual feedback to the user (e.g., indicating a position of the user's gaze), which enhances the operability of the computer system, which additionally reduces errors in usage of the computer system and reduces inputs needed to correct such errors.

In some embodiments, displaying the attention indicator at the first location of the user interface includes displaying the attention indicator at a location of content of a first application (2006a), such as the indicator for attention 1916 for user interface 1912 in FIG. 19F. In some embodiments, displaying the attention indicator at the second location of the user interface includes displaying the attention indicator at a location of content of a second application, different from the first application (2006b), such as the indicator for attention 1918 in FIGS. 19C and 19C1 for user interface 1910. In some embodiments, the first application is a word processing application, a photo management application, a spreadsheet application, a presentation application, a messaging application, an email application, a browser application, a calendar application, a widget application, a video application, a music application, or a mapping application. In some embodiments, the second application corresponds to an application other than the first application. For example, the first application is optionally a video application, and the second application is a photo management application. Displaying an attention indicator on a variety of applications when appropriate indicates that the computer system will respond to gaze-based input for that particular application and ensures consistent presentation of the attention indicator, thereby providing improved visual feedback to the user (e.g., indicating a particular application with which the user is interacting), which enhances the operability of the computer system, which additionally reduces errors in usage of the computer system and reduces inputs needed to correct such errors.

In some embodiments, the first location of the user interface corresponds to content of a respective application (2008a) (e.g., one of the applications described with reference to step(s) 2006). In some embodiments, the respective application is not provided any indication that the attention of the user of the computer system is directed to the respective application (2008b), such as the application associated with user interface 1912 in FIGS. 19C and 19C1 not receiving information about the location of attention 1916. Thus, in some embodiments, the computer system does not provide any information to an application towards which the attention of the user is directed that the attention of the user is directed to that application. In some embodiments, the application only receives information indicating the location of the attention of the user when the computer system detects an input, such as an air gesture-based or attention-based selection input, such as described with reference to methods 800, 900, 1000, 1200 and/or 1400, to be able to interact with the application. Not providing attention location information to an application improves privacy of the user.

In some embodiments, the one or more criteria (e.g., the one or more criteria that are used to determine whether or not to cease to display the attention indicator in the user interface) include a criterion that is satisfied when a content playback status of content (e.g., video content, such as a movie or television show) at the second location in the user interface is a first status (2010) (e.g., the content is playing), such as whether object 1912b is playing content in FIG. 19F or 19G. For example, if the content at the second location is playing, the criterion is optionally satisfied. Thus, the computer system optionally ceases to display the attention indictor in the user interface. However, if the content at the second location is not playing or is paused, the criterion is optionally not satisfied. Thus, the computer system optionally continues to display the attention indictor in the user interface. Controlling display of the attention indicator based on content playback status reduces interference with content when it is likely that such interference will cause errors in interaction with the user interface, thereby reducing inputs needed to correct for such interference.

In some embodiments, the one or more criteria (e.g., the one or more criteria that are used to determine whether or not to cease to display the attention indicator in the user interface) include a criterion that is satisfied when input for navigating through content of the user interface at the second location is received (2012), such as input for scrolling object 1912b in FIG. 19F. For example, the criterion is optionally satisfied while input for scrolling through the content and/or navigating through a hierarchy of the content at the second location is being received. Thus, the computer system optionally ceases to display the attention indictor in the user interface. In some embodiments, the criterion is not satisfied when the input for scrolling through the content is no longer being received. Thus, the computer system optionally continues to display the attention indictor in the user interface. In some embodiments, the input for scrolling includes attention of the user directed to the second location while a hand of the user is performing an air pinching gesture followed by movement of the hand while in the pinch hand shape. In some embodiments, the input for navigating through the hierarchy of the content includes a selection input as described with reference to step(s) 2008. Controlling display of the attention indicator based on navigation through the content reduces interference with content when it is likely that such interference will cause errors in interaction with the user interface, thereby reducing inputs needed to correct for such interference.

In some embodiments, the one or more criteria (e.g., the one or more criteria that are used to determine whether or not to cease to display the attention indicator in the user interface) include a criterion that is satisfied when content at the second location in the user interface is a first type of content (e.g., a content object, such as an object that displays a representation of an image or video), such as object 1912b in FIG. 19F, and is not satisfied when the content at the second location in the user interface is a second type of content, different from the first type of content (2014) (e.g., a control element object, such as a button, a dial or a slider), such as object 1906a in FIG. 19I. In some embodiments, the first type of content has a size greater than a size threshold (e.g., 0.1, 0.25, 0.5, 1, 3, 5, 10, 100 or 1000 cm$^2$), and the second type of content has a size less than the size threshold. For example, the computer system optionally ceases to display the attention indictor in the user interface when the content is the first type of content. In another example, the computer system optionally continues to display the attention indictor in the user interface when the content is the second type of content. Controlling display of the attention indicator based on type of content reduces interference with content that likely includes content that should not be obscured while maintaining clear feedback that other kinds of content are the focus of attention, thereby reducing inputs needed to correct for such interference and reducing errors in selection of other content.

In some embodiments, the one or more criteria (e.g., the one or more criteria that are used to determine whether or not to cease to display the attention indicator in the user interface) include a criterion that is satisfied when the movement of the attention of the user is less than a threshold movement (2016) (e.g., the attention of the user has moved less than 0.1, 0.3, 0.5, 1, 3, 5, 10, or 100 cm in the last 0.01, 0.05, 0.1, 0.3, 0.5, 1, 3, 5, 10, 30 or 60 seconds), such as the movement of attention 1916 within object 1912b from FIGS. 19E-19H. In some embodiments, the criterion is not satisfied when the movement of the attention of the user is greater than the threshold movement. For example, the computer system optionally ceases to display the attention indictor in the user interface when the movement of the attention of the user is less than the threshold amount. In another example, the computer system optionally continues to display the attention indictor in the user interface the movement of the attention of the user is greater than (or equal to) the threshold amount. Controlling display of the attention indicator based on movement of the attention of the user reduces interference with the user interface when it is less likely that selection interaction will occur (and/or while it is more likely that the location of attention has already been sufficiently conveyed) while maintaining feedback of attention location when it is more likely that selection interaction will occur, thereby reducing inputs needed to correct for such interference and reducing errors in selection of content.

In some embodiments, the one or more criteria (e.g., the one or more criteria that are used to determine whether or not to cease to display the attention indicator in the user interface) include a criterion that is satisfied when the attention of the user is directed towards the second location in the user interface for more than a threshold duration (2018) (e.g., 0.01, 0.05, 0.1, 0.3, 0.5, 1, 3, 5, 10, 30, 60, 120 or 240 seconds), such as the duration of attention towards object 1912b in FIG. 19G. In some embodiments, the criterion is not satisfied when the attention of the user is directed towards the second location in the user interface for less than the threshold duration. For example, the computer system optionally ceases to display the attention indictor in the user interface when the attention of the user is directed toward the second location in the user interface for more than the threshold duration. In another example, the computer system optionally continues to display the attention indictor in the user interface when the attention of the user is directed toward the second location in the user interface for less than the threshold duration. Controlling display of the attention indicator based on the duration that the attention has been directed to the second location reduces interference with the user interface when it is less likely that selection interaction will occur (and/or while it is more likely that the location of attention has already been sufficiently conveyed) while maintaining feedback of attention location when it is more likely that selection interaction will occur, thereby reducing inputs needed to correct for such interference and reducing errors in selection of content.

In some embodiments, after ceasing to display the attention indicator in the user interface and while not displaying the attention indicator in the user interface, the computer system detects (2020a), via the one or more input devices, movement of the attention of the user from the second location to a third location in the user interface (e.g., similar to as described with reference to step(s) 2002), wherein the second location corresponds to a first user interface object in the user interface, such as movement of attention 1916 away from its location in FIG. 19G. For example, the attention moved from being directed to a portion of the first user interface object to the third location in the user interface.

In some embodiments, in response to detecting movement of the attention of the user (2020b), in accordance with a determination that the third location corresponds to a second user interface object, different from the first user interface object, in the user interface (e.g., the attention of the user is directed to the second user interface object), the computer system displays (2020c), via the display generation component, the attention indicator at the third location in the user interface (e.g., similar to as described with reference to step(s) 2002, except at the third location rather than at the first or second location), such as shown with object 1906a in FIG. 19I.

In some embodiments, in accordance with a determination that the third location corresponds to the first user interface object (e.g., the attention of the user is still directed to the first user interface object, but just a different portion of the first user interface object), the computer system forgoes (2020d) displaying the attention indicator at the third location in the user interface (e.g., the attention indicator remains not displayed in the user interface), such as not displaying the indicator for attention 1916 in FIG. 19H. Controlling display of the attention indicator based on whether the attention moves to another user interface object reduces interference with the user interface when it is less likely that selection interaction will occur (and/or while it is more likely that the location of attention has already been sufficiently conveyed) while providing feedback of attention location when a new selectable object becomes the target of input, thereby reducing inputs needed to correct for such interference and reducing errors in selection of content.

In some embodiments, in accordance with a determination that the second location corresponds to a first type of content (e.g., such as described with reference to step(s) 2014), the threshold duration is a first duration (2022a), such as threshold 1904a in timer 1904 in FIG. 19G. In some embodiments, in accordance with a determination that the second location corresponds to a second type of content (e.g., such as described with reference to step(s) 2014), different from the first type of content, the threshold duration is a second duration, different from the first duration (2022b) (e.g., shorter than the first duration), such as threshold 1924a in timer 1924 in FIG. 19I. Controlling display of the attention indicator with different time thresholds based on type of content reduces interference with content that likely includes content that should not be obscured while maintaining clear feedback that other kinds of content are the focus of attention, thereby reducing inputs needed to correct for such interference and reducing errors in selection of content.

In some embodiments, ceasing to display the attention indicator in the user interface includes (2024a) displaying a gradual animated transition between displaying the attention indicator at the second location in the user interface and ceasing to display the attention indicator in the user interface (2024b), such as gradually ceasing to display the indicator for attention 1916 from FIG. 19F to 19G (e.g., the attention indicator is gradually reduced in visual prominence—for example, reduced in opacity, size, brightness and/or clarity—over a time period, such as 0.1, 0.3, 0.5, 1, 3, 5, 10, 30 or 60 seconds). In some embodiments, while the attention indicator is not displayed in the user interface, the computer system detects (2024c) that the attention of the user is directed to a third location in the user interface (e.g., similar to as described with reference to step(s) 2002), such as movement of attention 1916 from its location in FIG. 19H.

In some embodiments, in response to detecting that the attention of the user is directed to the third location in the user interface, and in accordance with a determination that one or more second criteria are satisfied (e.g., criteria for displaying an attention indicator, such as described with reference to step(s) 2002-2020), the computer system displays (2024d) a gradual animated transition between not displaying the attention indicator in the user interface to displaying the attention indicator at the third location in the user interface, such as gradually displaying the indicator for attention 1916 in FIG. 19I (e.g., the attention indicator is gradually increased in visual prominence—for example, increased in opacity, size, brightness and/or clarity—over a time period, such as 0.1, 0.3, 0.5, 1, 3, 5, 10, 30 or 60 seconds). Gradually ceasing to display and/or displaying the attention indicator reduces the likelihood that content that is obscured by the attention indicator is not seen by the user, thereby reducing inputs needed to correct for such obscuring and reducing errors in selection of content.

In some embodiments, while displaying the attention indicator at the second location in the user interface, wherein the second location corresponds to a selectable user interface object (e.g., the attention of the user is directed to a button, a toggle, a control, or other element that is selectable to perform an operation), such as the indicator for attention 1916 in FIG. 19F, the computer system detects (2026a), via the one or more input devices, a selection input (e.g., such as described with reference to step(s) 2008), such as an input from hand 1907 in FIG. 19F. In some embodiments, in response to detecting the selection input, the computer system initiates (2026b) an operation associated with the selectable user interface object, such as the result shown in object 1912b in FIG. 19I. For example, if the selectable user interface object is a search button, the computer system optionally performs a search. If the selectable user interface object is an application icon, the computer system optionally displays a user interface of the application. If the selectable user interface object is a button to send a message to a messaging conversation, the computer system optionally sends the message to the messaging conversation. Maintaining intractability with the selectable object while displaying the attention indicator facilitates efficient interaction with the user interface.

In some embodiments, the second location corresponds to a user interface object (e.g., as described in method 1200), and the attention indicator at the second location comprises a visual indication displayed in an area of the object that emphasizes the second location in the area of the object (2028) (e.g., as described in method 1200), such as shown in FIG. 11. For example, the attention indicator optionally has one or more of the characteristics of the visual indication described with reference to method 1200. In some embodiments, if the attention of the user is directed to a different location in the object, the computer system emphasizes that other location in the area of the object instead (e.g., as described in method 1200). Emphasizing different portions of the object to indicate attention within the object clearly indicates where the attention of the user is directed without consuming portions of the user interface outside of the object, reducing errors in interaction with the computer system.

It should be understood that the particular order in which the operations in method 2000 have been described is merely exemplary and is not intended to indicate that the described order is the only order in which the operations could be performed. One of ordinary skill in the art would recognize various ways to reorder the operations described herein.

FIGS. 21A-21I illustrate examples of the computer system 101 entering text into a text entry field 2104 in response to speech inputs in accordance with some embodiments.

Figure 21A:
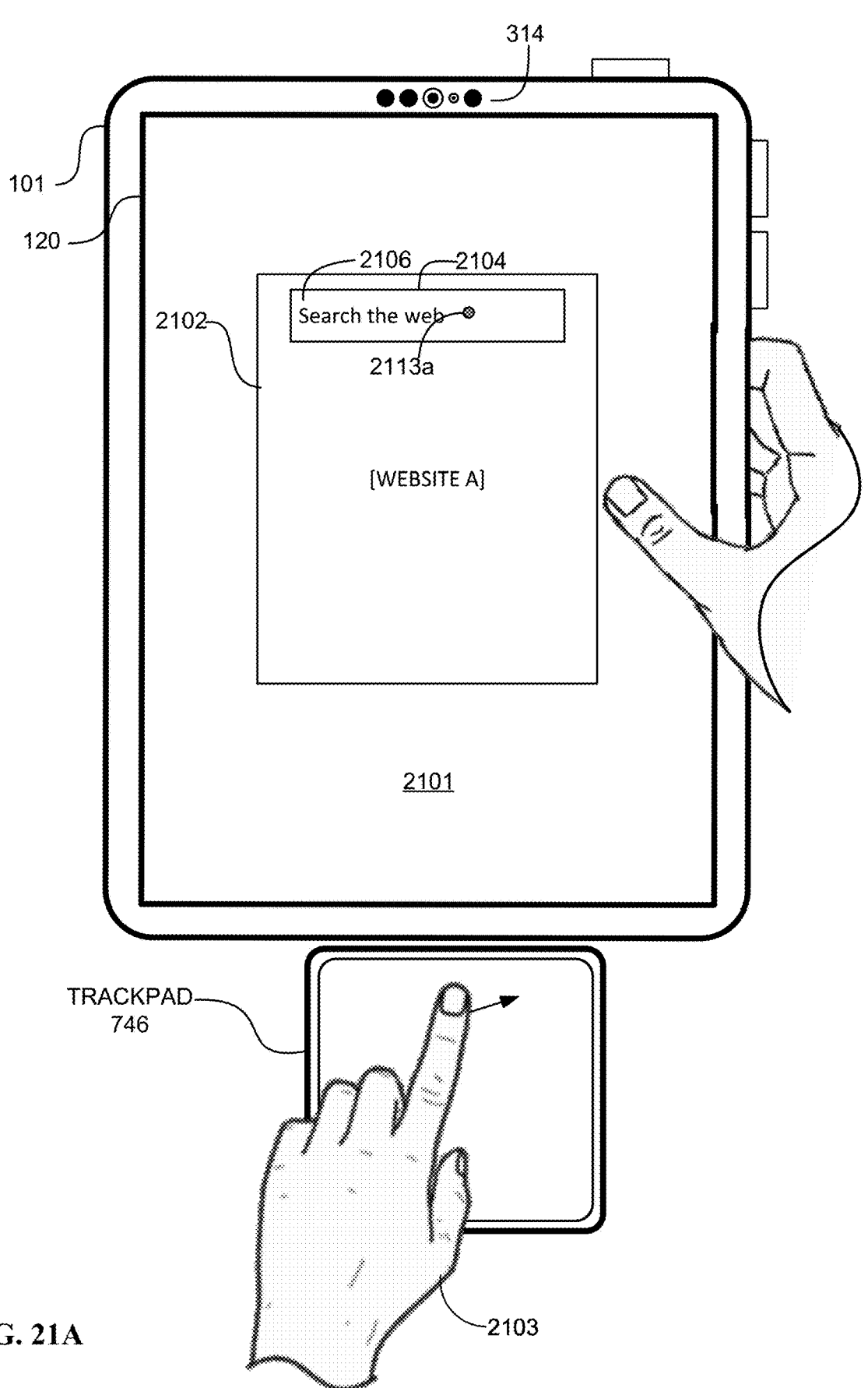
FIGS. 21A-21I illustrate examples of the computer system entering text into a text entry field in response to speech inputs in accordance with some embodiments.

FIG. 21A illustrates a computer system 101 displaying, via a display generation component (e.g., display generation component 120 of FIG. 1), a three-dimensional environment 2101 from a viewpoint of a user. As described above with reference to FIGS. 1-6, the computer system 101 optionally includes a display generation component 120 (e.g., a touch screen) and a plurality of image sensors (e.g., image sensors 314 of FIG. 3). The image sensors 314 optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user) such as movements that are interpreted by the computer system as gestures such as air gestures. Additionally, in some embodiments, input to computer system 101 is provided via air gestures from hand 2103 and/or attention of the user (e.g., as described in more detail with reference to method 800), or via trackpad 746 from hand 2103, and inputs described herein are optionally received via trackpad 746 or via air gestures/attention.

In FIG. 21A, the computer system 101 displays an internet browsing user interface 2102 that includes a text entry field 2104. In some embodiments, the text entry field 2104 is a navigation and/or search field. For example, the computer system 101 enters text into the text entry field 2104 in response to text entry inputs, such as examples described below with reference to FIGS. 21A-21I, and, in response to an input corresponding to a request to search and/or navigate based on the text entered into the text entry field 2104, the computer system 101 displays search results corresponding to the text and/or navigates to a website corresponding to the text. In some embodiments, the computer system 101 uses examples of text entry techniques described herein with reference to text entry field 2104 to enter text into text entry fields other than internet search and/or navigation fields, such as message composition fields and/or system search fields. In some embodiments, the text entry field 2104 includes placeholder text 2106 prior to detecting one or more inputs corresponding to a request to add text to the text entry field.

Figure 21B:
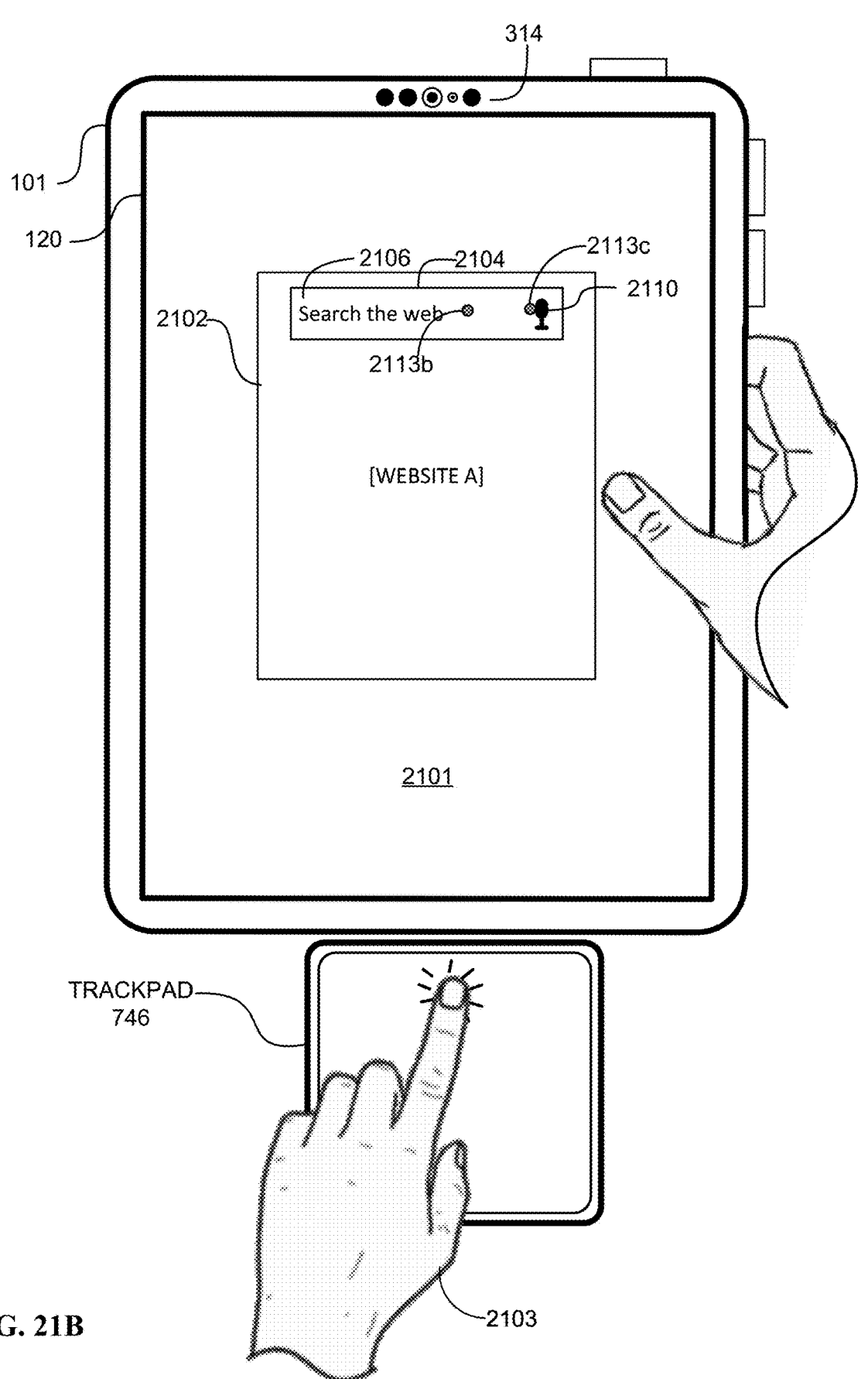

As shown in FIG. 21A, the computer system 101 detects the attention 2113a of the user directed to the text entry field 2104. In some embodiments, in response to detecting the attention 2113a of the user directed to the text entry field 2104, the computer system 101 updates the text entry field 2104 as shown in FIG. 21B. In some embodiments, the computer system 101 displays a glowing or highlighted effect around a location in the environment 2101 to which the attention of the user is directed according to one or more steps of method(s) 1200 and/or 2000, described above.

FIG. 21A1 illustrates similar and/or the same concepts as those shown in FIG. 21A (with many of the same reference numbers). It is understood that unless indicated below, elements shown in FIG. 21A1 that have the same reference numbers as elements shown in FIGS. 21A-21I have one or more or all of the same characteristics. FIG. 21A1 includes computer system 101, which includes (or is the same as) display generation component 120. In some embodiments, computer system 101 and display generation component 120 have one or more of the characteristics of computer system 101 shown in FIGS. 21A-21I and display generation component 120 shown in FIGS. 1 and 3, respectively, and in some embodiments, computer system 101 and display generation component 120 shown in FIGS. 21A-21I have one or more of the characteristics of computer system 101 and display generation component 120 shown in FIG. 21A1.

In FIG. 21A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 21A-21I.

In FIG. 21A1, display generation component 120 is illustrated as displaying content that optionally corresponds to the content that is described as being displayed and/or visible via display generation component 120 with reference to FIGS. 21A-21I. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 21A1.

Display generation component 120 has a field of view (e.g., a field of view captured by external image sensors 314b and 314c and/or visible to the user via display generation component 120, indicated by dashed lines in the overhead view) that corresponds to the content shown in FIG. 21A1. Because display generation component 120 is optionally a head-mounted device, the field of view of display generation component 120 is optionally the same as or similar to the field of view of the user.

In FIG. 21A1, the user is depicted as performing an air pinch gesture (e.g., with hand 2103) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 21A-21I.

In some embodiments, computer system 101 responds to user inputs as described with reference to FIGS. 21A-21I.

In the example of FIG. 21A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 21A-21I and/or described with reference to the corresponding method(s) are optionally implemented on computer system 101 and display generation unit 120 in a manner similar or analogous to that shown in FIG. 21A1.

FIG. 21B illustrates the computer system 101 displaying the text entry field 2104 updated to include attention target 2110. In some embodiments, attention target 2110 corresponds to dictating text to be entered into text entry field 2104. For example, as described below with reference to FIGS. 21B-21D, in response to detecting the attention 2113c of the user directed to the attention target 2110 with one or more criteria being met, the computer system 101 enters text corresponding to speech inputs into the text entry field 2104. In some embodiments, the computer system 101 continues to display placeholder text 2106 in the text entry field 2104 while displaying attention target 2110. In some embodiments, the attention target 2110 is an image corresponding to dictation, such as a microphone, as shown in FIG. 21B. In some embodiments, the attention target is a geometric shape or other image that does not necessarily correspond to dictation.

Figure 21C:
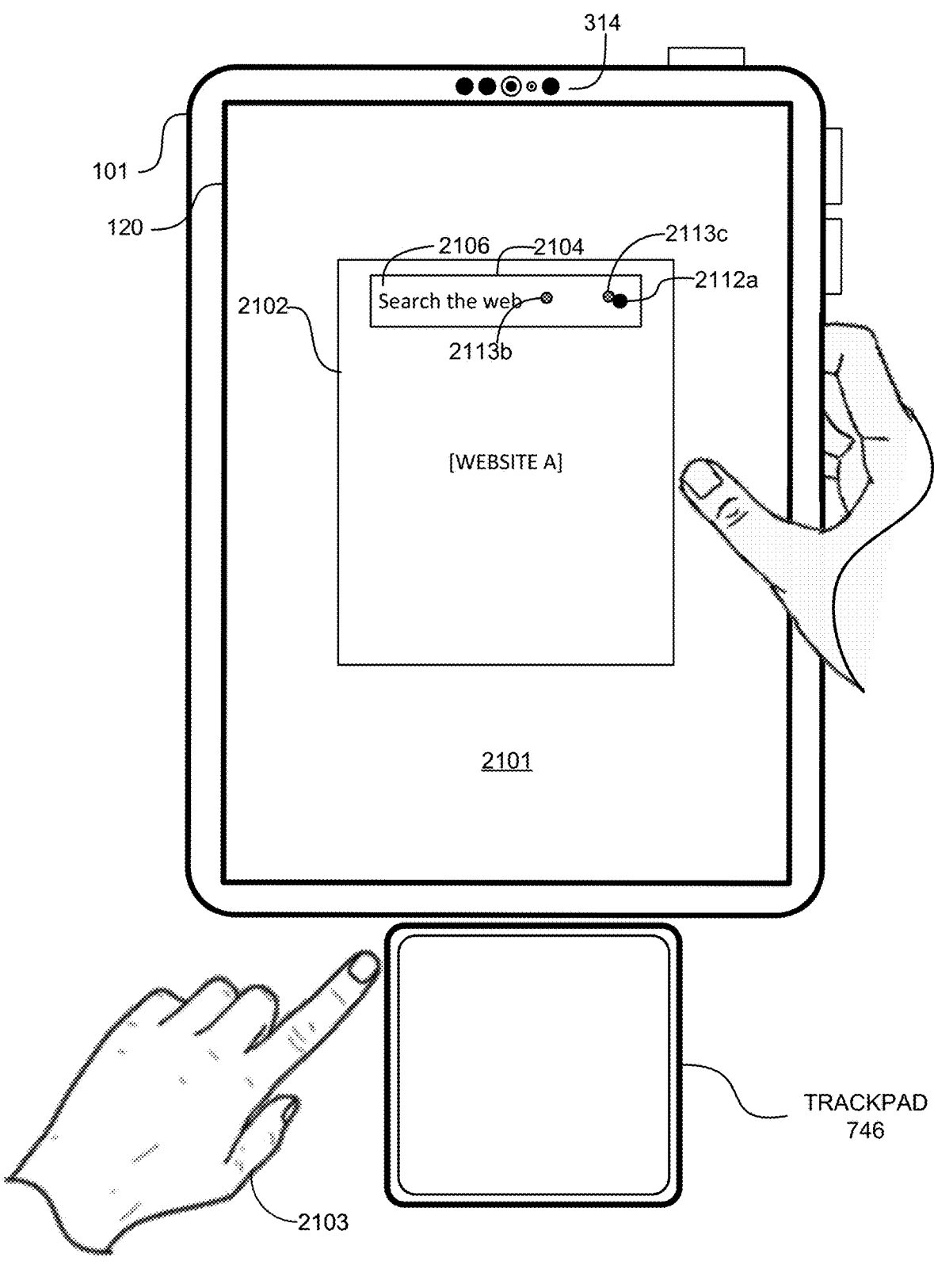

In some embodiments, as shown in FIG. 21B, the computer system 101 detects the attention 2113c of the user directed to the attention target 2110. In some embodiments, in response to detecting the attention 2113c of the user directed to the attention target 2110, the computer system 101 updates the attention target 2110 as shown in FIG. 21C. In some embodiments, in response to detecting the attention 2113b of the user directed away from the attention target 2113b, the computer system 101 forgoes updating the attention target 2110 as shown in FIG. 21C.

Figure 21D:
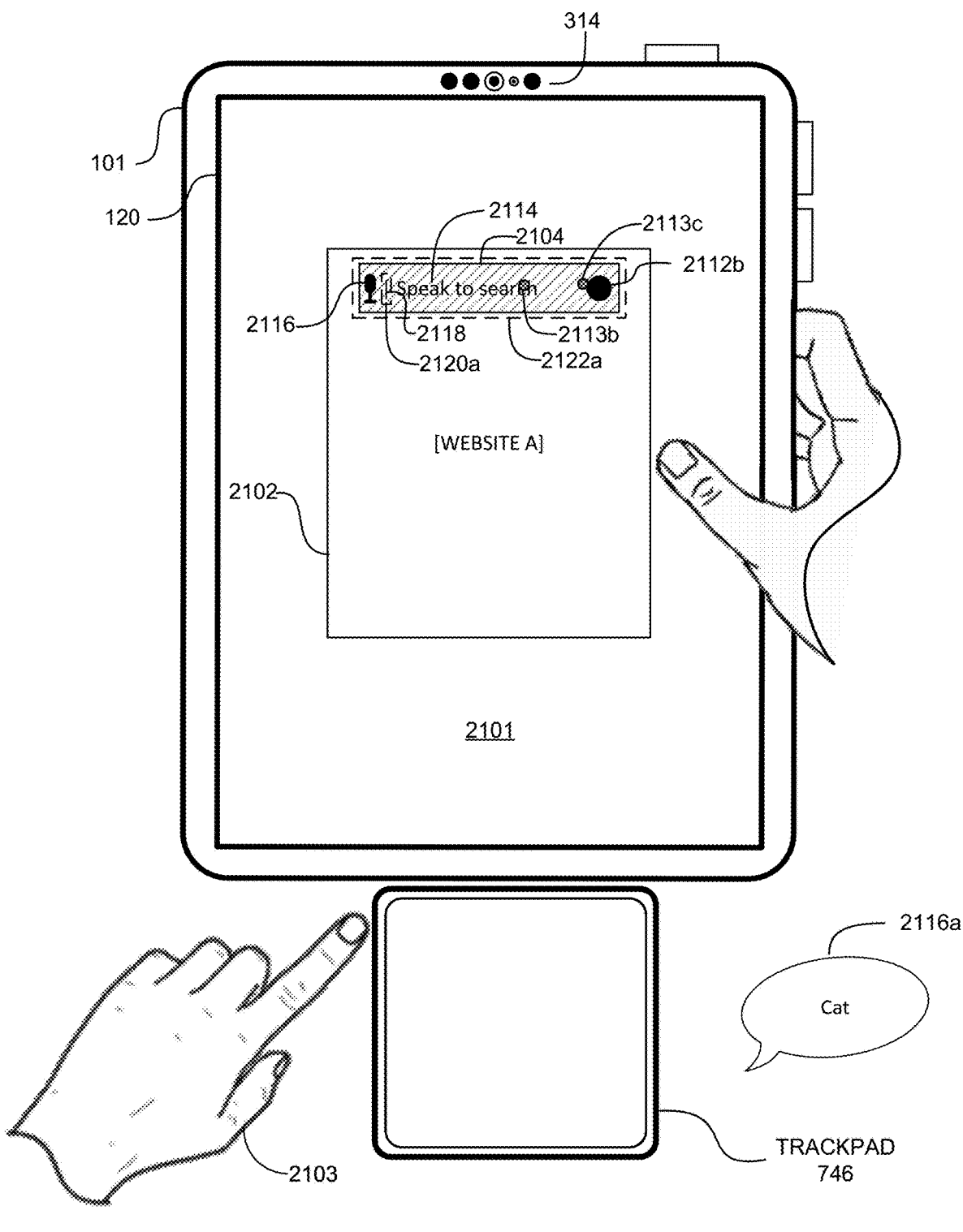
Figure 21E:
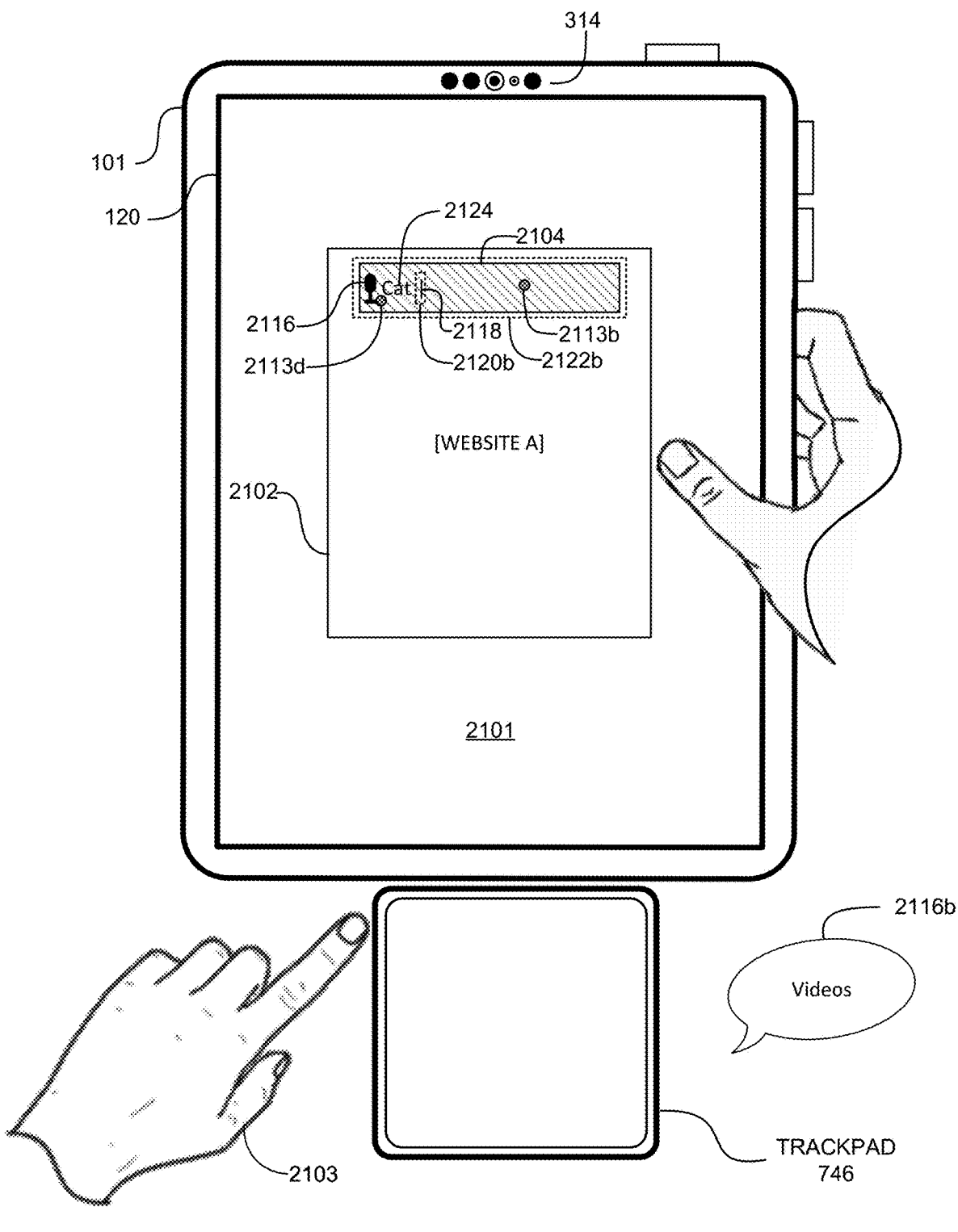

FIG. 21C illustrates the computer system 101 updating the attention target 2112a in response to detecting the attention 2113c of the user directed to the attention target 2110 in FIG. 21B. In some embodiments, updating the attention target 2112a includes displaying an animation of the attention target 2110 illustrated in FIG. 21B shrinking to become the attention target 2112a in FIG. 21C. In some embodiments, the animation continues as shown in FIGS. 21D-21E. In some embodiments, the computer system 101 displays the attention target as a geometric shape or other shape not corresponding to dictation in response to detecting the attention 2113a of the user directed to the text entry field 2104 in FIG. 21A and displays an animation of the geometric shape changing into an image corresponding to dictation, such as the microphone image included in attention target 2110 in FIG. 21B. In some embodiments, in response to detecting continuation of the attention 2113c of the user being directed to attention target 2112a in FIG. 21C, the computer system 101 continues the animation, as shown in FIG. 21D.

FIG. 21D illustrates a continuation of the animation of the attention target 2112b in response to detecting the attention 2113c of the user continuing to be directed to the attention target 2112a as shown in FIG. 21C. In some embodiments, the continuation of the animation includes the attention target 2112b, which is now a circle or other geometric shape, expanding to the size illustrated in FIG. 21D while the attention 2113c of the user is held on the attention target 2112b. In some embodiments, in response to detecting the attention 2113b of the user directed away from the attention target 2112b before the animation concludes, the computer system 101 ceases displaying the animation. In some embodiments, if the attention 2113b of the user is directed to a portion of the text entry field 2104 other than the attention target 2112b, the computer system 101 displays the attention target 2110 illustrated in FIG. 21B. In some embodiments, if the attention of the user is directed away from the text entry field 2104, the computer system 101 ceases display of the attention target 2110.

In some embodiments, once the animation of the attention target 2112b concludes, the computer system 101 updates the appearance of the text entry field 2104 as shown in FIG. 21D. In some embodiments, the text entry field 2104 is displayed with a background that changes colors in response to detected audio, such as speech input 2116a, a glow effect 2122a that changes color, intensity, and/or size in accordance with detected audio, an insertion marker 2118 with a glow effect 2120a that changes color, intensity, and/or size in accordance with detected audio, a dictation indication 2116, and/or updated placeholder text 2114 corresponding to dictation. As shown in FIGS. 21A-21C, prior to detecting the attention of the user directed to the attention target 2110, 2112a, and/or 2112b for the duration of the animation, the computer system 101 displays the text entry field 2104 with a background that does not change color, no glow effect 2122a, no insertion marker 2118, no dictation indication 2116 at the location shown in FIG. 21D, and/or placeholder text 2106 not specific to dictation. In some embodiments, in response to detecting the attention 2113b of the user directed away from the attention target 2112b before the animation concludes, the computer system 101 forgoes updating the text entry field appearance to the appearance illustrated in FIG. 21D and maintains the appearance illustrated in FIGS. 21A-21C.

In some embodiments, as shown in FIG. 21D, the computer system 101 detects a speech input 2116a provided by the user of the computer system 101 while attention 2113b or 2113c of the user is directed to the text entry field 2104 after the animation of the attention target 2112b concludes. In some embodiments, in response to detecting the speech input 2116a and attention 2113b or 2113c of the user after the animation of the attention target 2112b concludes, the computer system 101 enters text into the text entry field 2104 corresponding to the speech input 2116a and maintains the appearance of the text entry field 2104 in FIG. 21D, as shown in FIG. 21E. In some embodiments, in response to detecting the speech input 2116a prior to the animation concluding and/or while the attention of the user is directed away from the text entry field 2104, the computer system 101 forgoes entering the text into the text entry field and/or displays the text entry field 2104 with the appearance shown in FIGS. 21A-21C.

FIG. 21E illustrates an example of the computer system 101 entering text 2124 corresponding to the speech input in FIG. 21D in response to the input described above with reference to FIG. 21D. In some embodiments, as shown in FIG. 21E, the computer system 101 detects a second speech input 2116b while the attention 2113d of the user is directed to the dictation indication 2116 or while the attention 2113b is directed to a portion of the text entry field 2104 other than the dictation indication 2116. In some embodiments, the computer system 101 updates appearance of the text entry field 2104 in response to the audio levels of the second speech input 2116b, including updating the background color of the text entry field 2104, the glow effect 2122b around the text entry field 2104, and/or the glow effect 2120 around the insertion marker 2118. In some embodiments, these aspects of the appearance of the text entry field 2104 change colors in a coordinated manner in accordance with the changes in audio levels of the second speech input 2116b.

Figure 21F:
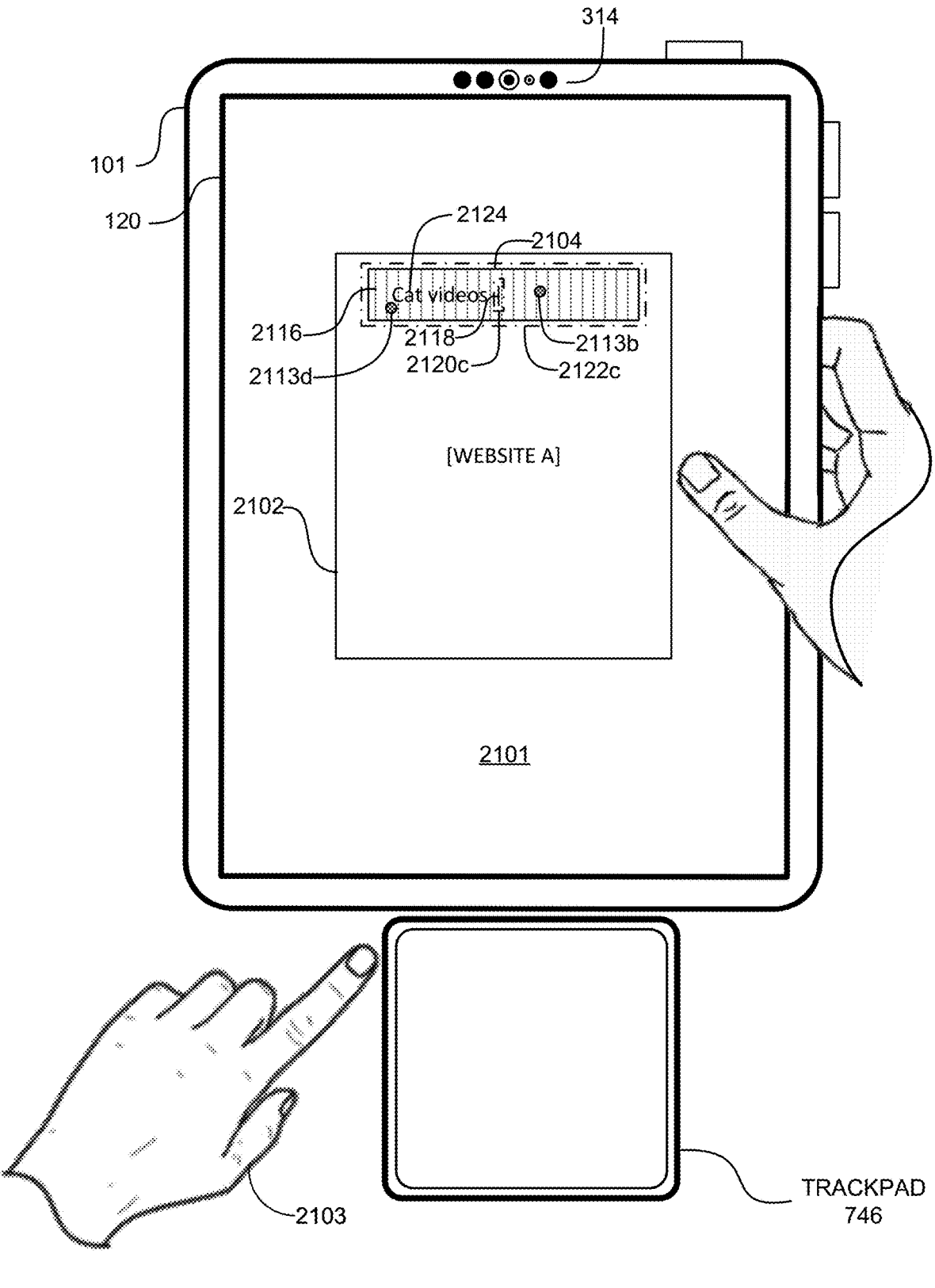

In some embodiments, in response to detecting the second speech input 2116b in FIG. 21E while the attention 2113d of the user is directed to the dictation indication 2116 or while the attention 2113b is directed to a portion of the text entry field 2104 other than the dictation indication 2116, the computer system 101 enters additional text into the text entry field 2104 that corresponds to the second speech input 2116b, as shown in FIG. 21F. In some embodiments, in response to detecting the second speech input 2116b while the attention of the user is not directed to the text entry field 2104, the computer system 101 forgoes entering the text corresponding to the second speech input 2116b into the text entry field 2104. Additionally or alternatively in some embodiments, the computer system 101 ceases displaying the text entry field 2104 with the appearance illustrated in FIGS. 21D-21E and displays the text entry field 2104 with the appearance illustrated in FIGS. 21A-21C. Additionally or alternatively, in some embodiments, the computer system 101 removes text 2124 from the text entry field 2104. In some embodiments, the computer system 101 maintains display of text 2124 in the text entry field 2104 in response to detecting the attention of the user directed away from the text entry field 2104.

FIG. 21F illustrates the computer system 101 updating the text 2124 in the text entry field 2104 in response to the speech input illustrated in FIG. 21E. In some embodiments, the computer system 101 maintains the appearance of the text entry field 2104 that changes in accordance with detected audio in FIG. 21F in a manner similar to the manner described above with reference to FIG. 21E. In some embodiments, while displaying the text 2124 in text entry field 2104, the computer system 101 receives an input corresponding to a request to conduct an internet search corresponding to the text 2124. For example, the computer system 101 detects selection of a user interface element, a gesture performed with hand 2103, an input received using trackpad 746, and/or a verbal command. In some embodiments, in response to the input, the computer system 101 displays search results corresponding to text 2124. In some embodiments, the computer system 101 displays the text entry field 2104 in FIG. 21F with a background color that changes over time irrespective of whether or not a voice input or other audio is currently being detected. In some embodiments, displaying the text entry field 2104 in FIG. 21F in this way indicates to the user that the computer system 101 will enter text into the text entry field 2104 in response to receiving a (e.g., further) voice input.

Thus, as described above with reference to FIGS. 21A-21F, in some embodiments, the computer system 101 enters text into text entry field 2104 in response to detecting a speech input while the attention of the user is directed to the text entry field 2104 after the attention of the user was directed to the attention target for a predetermined time (e.g., the duration of the animation of the attention target). In some embodiments, the computer system 101 enters the text corresponding to the speech input into the text entry field without detecting inputs provided by hand 2103, trackpad 746 and/or mechanisms other than attention and speech. In some embodiments, the computer system 101 displays other text entry fields into which the computer system 101 does not enter text in response to attention- and speech-only inputs. In some embodiments, the computer system 101 displays these text entry fields differently from the appearance of text entry field 2104, as will be described below with reference to FIGS. 21G-21I.

Figure 21G:
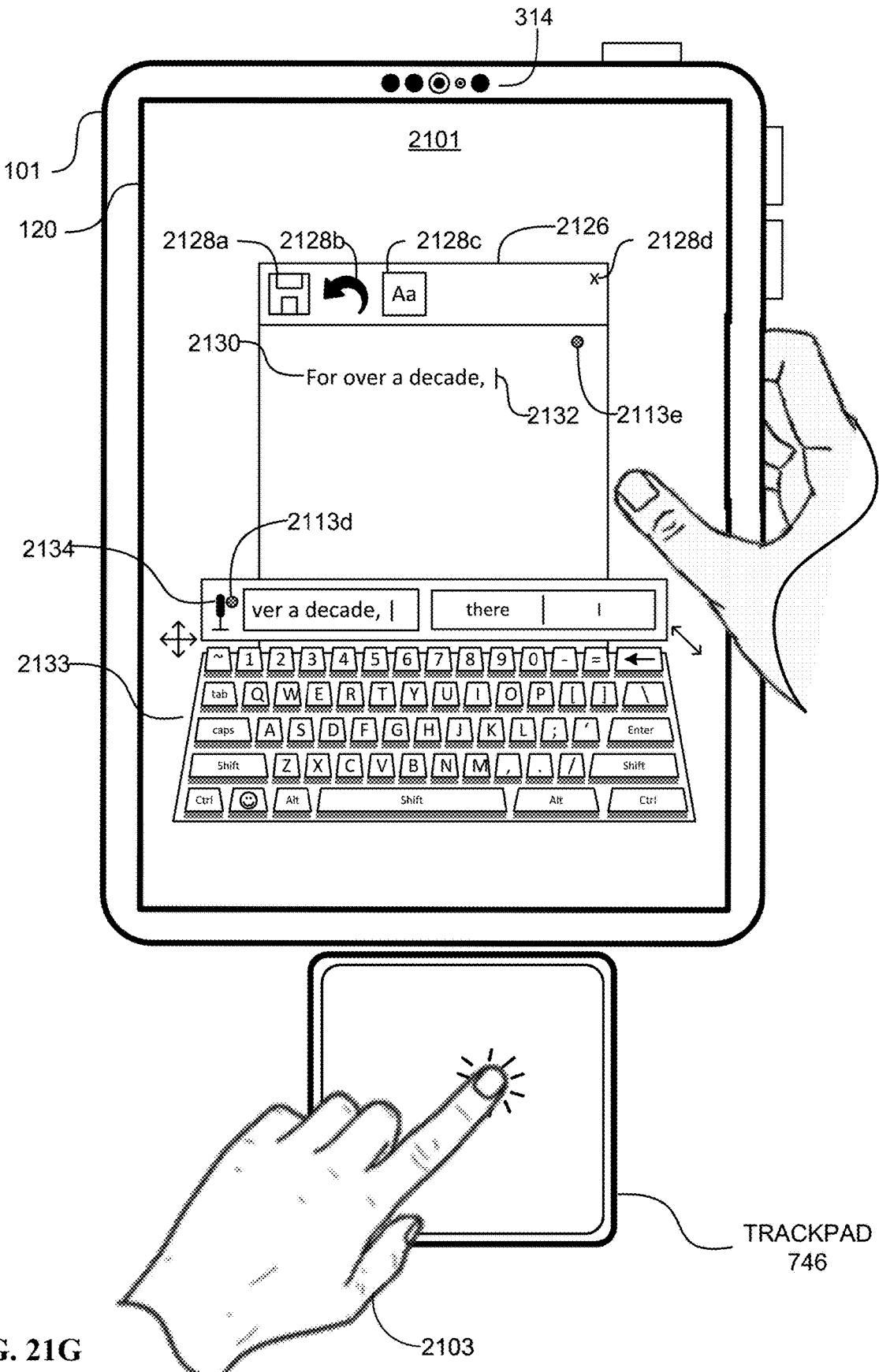

FIG. 21G illustrates an example of the computer system 101 displaying a word processing user interface 2126 and a soft keyboard 2133 in the three-dimensional environment 2101. In some embodiments, the word processing user interface 2126 includes a selectable option 2128a to save the text 2130 included in the word processing user interface 2126, a selectable option 2128b to undo the last change made to the text 2130, a selectable option 2128c to change the appearance of the text 2130, a selectable option 2128d to cease display of the word processing user interface 2126, text 2130, and insertion marker 2132. In some embodiments, the soft keyboard 2133 is displayed with a dictation option 2134 that, when selected, causes the computer system 101 to enter additional text at the location of insertion marker 2132 that corresponds to a speech input.

Figure 21H:
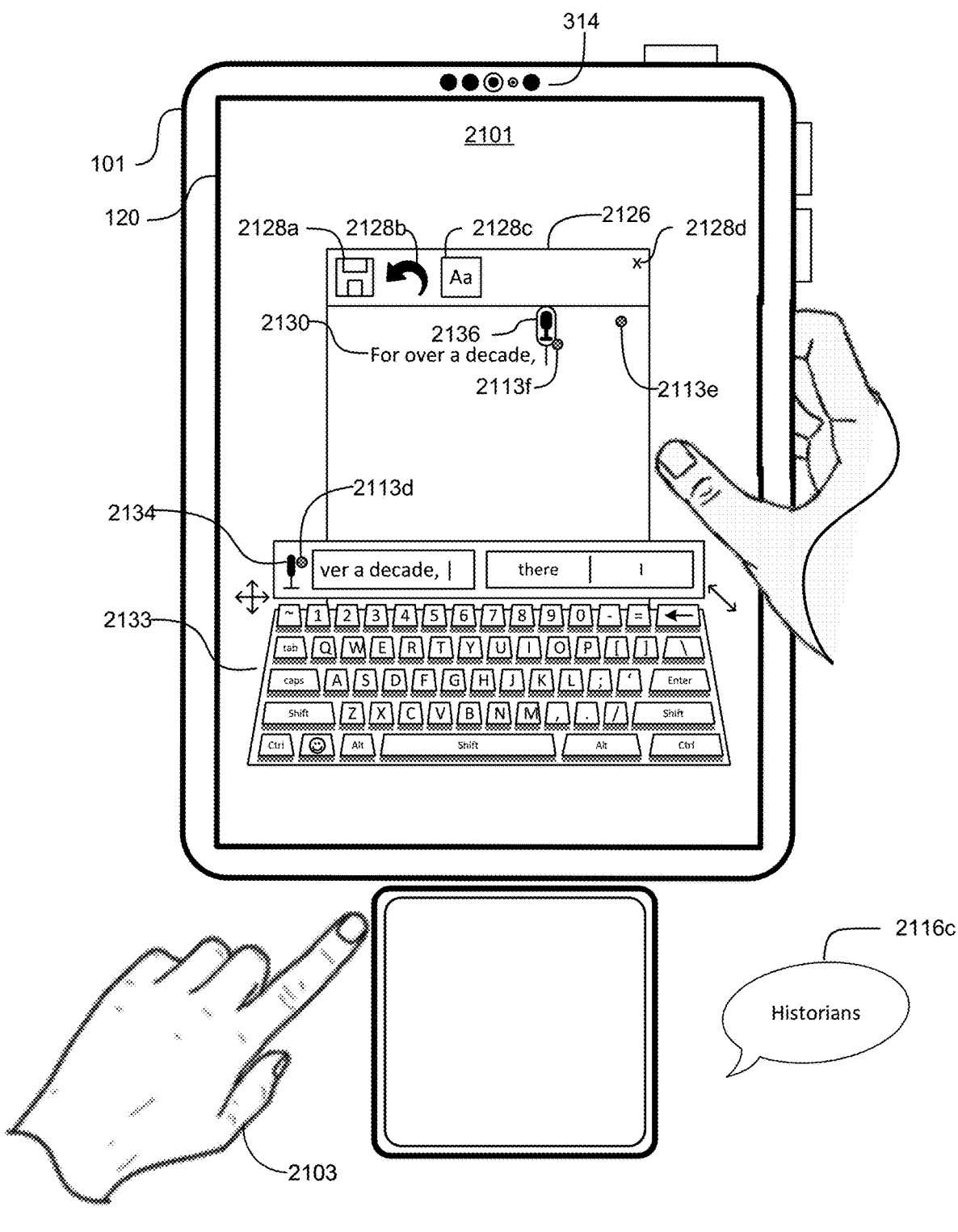
Figure 21I:
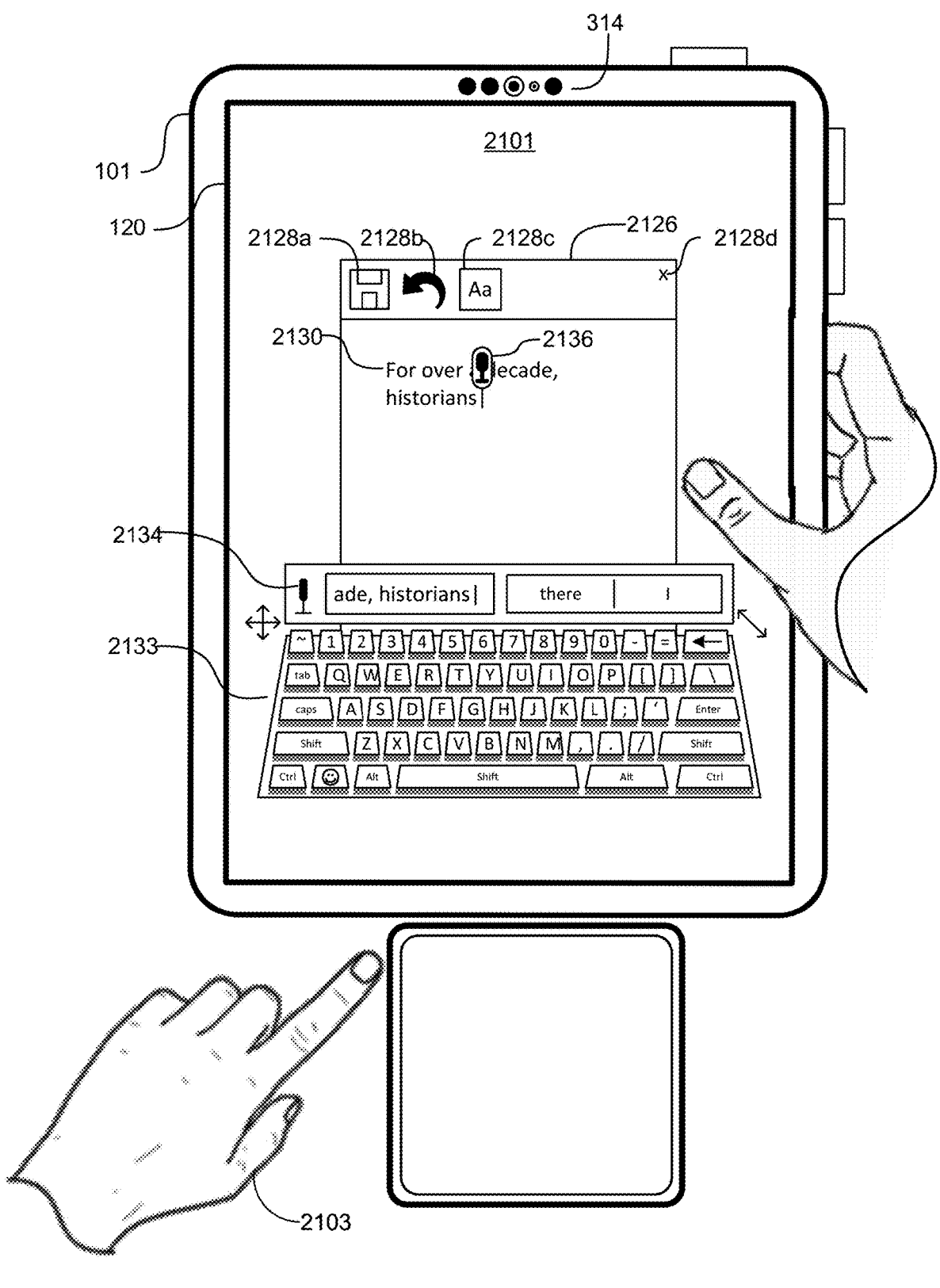
Figure 22C:
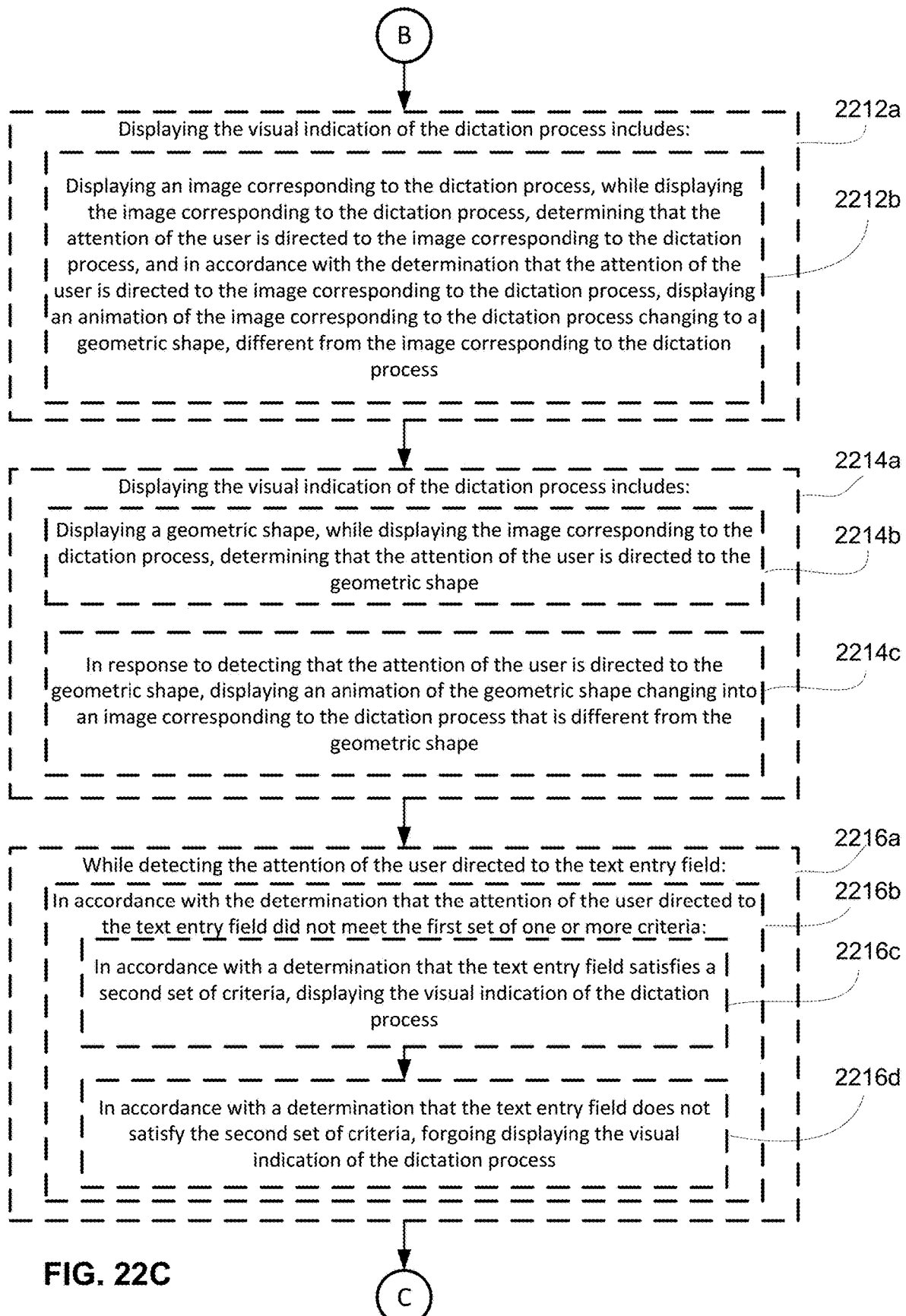
Figure 22D:
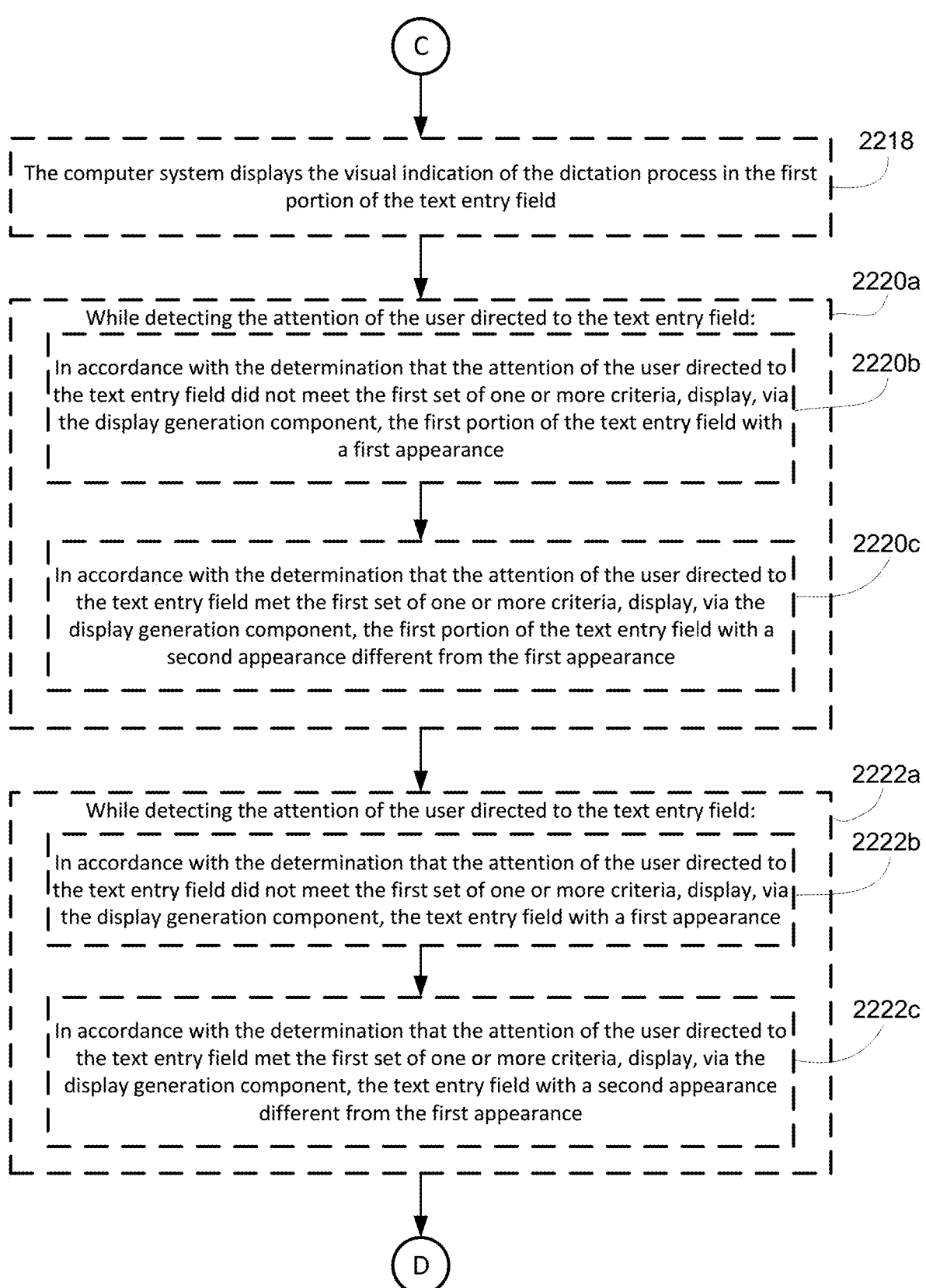
Figure 22G:
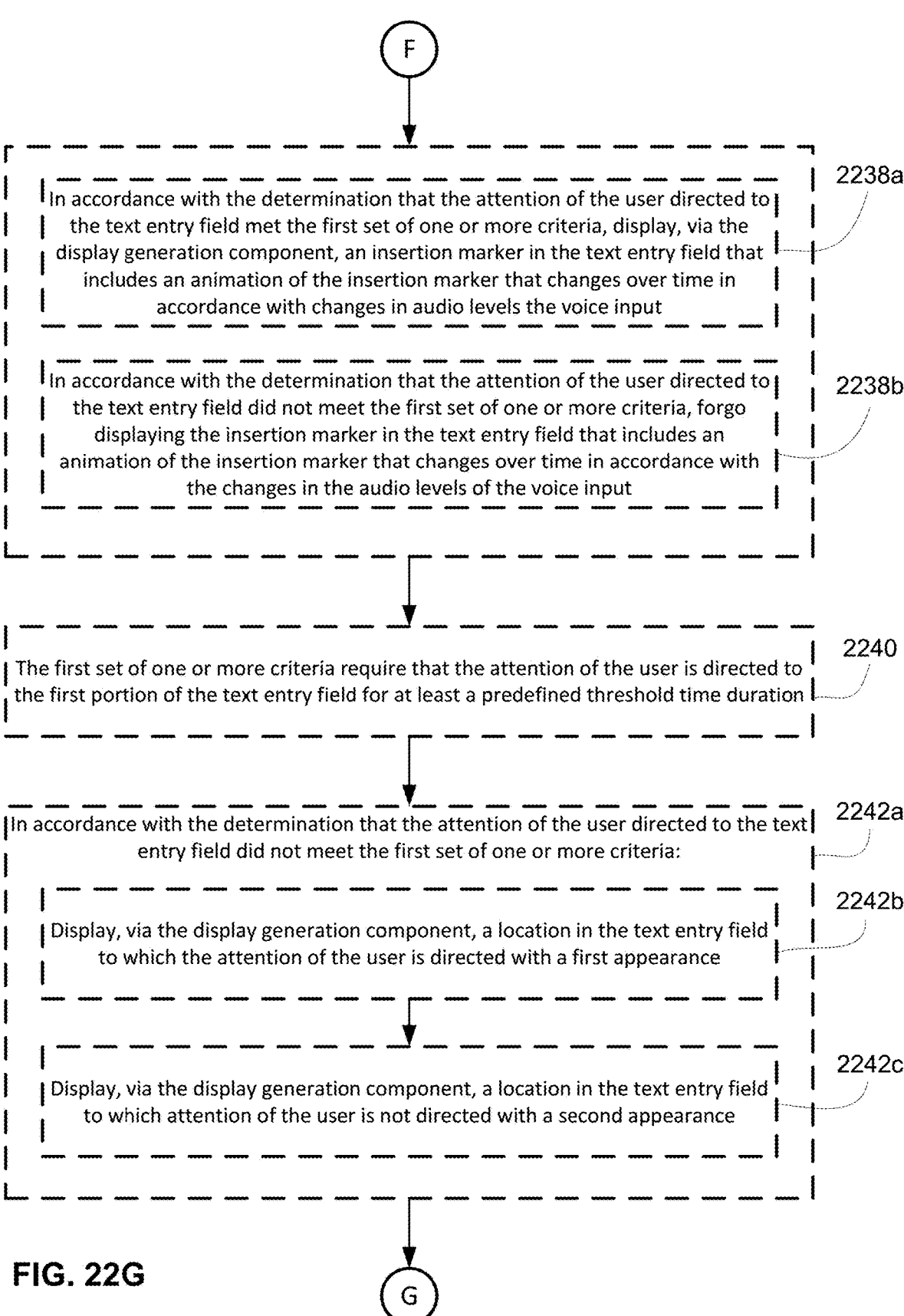
Figure 22H:
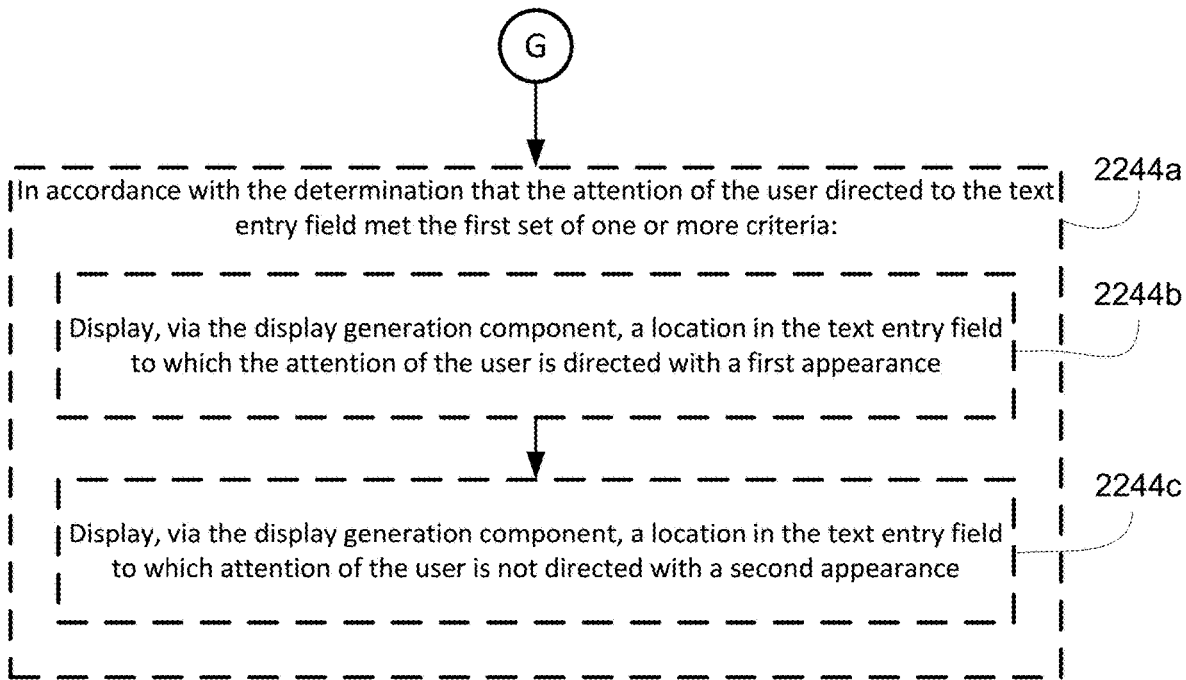

In some embodiments, the computer system 101 forgoes entering text in response to speech inputs in response to detecting the attention 2113e of the user directed to the region of the word processing user interface 2126 including the text 2130, unlike the examples described above with reference to FIGS. 21A-21F. In some embodiments, the computer system 101 forgoes entering text in response to speech inputs in response to detecting the attention 2113d of the user directed to the dictation option 2134 without detecting further input provided by hand 2103. In some embodiments, in response to detecting an input provided by hand 2103 while the attention 2113d of the user is directed to the dictation option 2134, the computer system 101 adds to text 2130 in response to a speech input, as shown in FIGS. 21H-21I. In some embodiments, the input provided by hand 2103 is an input provided using trackpad 746. In some embodiments, the input provided by hand 2103 is an indirect air gesture. In some embodiments, the input provided by hand 2103 is a direct air gesture which is received with or, in some embodiments, without detecting the attention 2113d of the user directed to the dictation option 2134.

FIG. 21H illustrates an example of the computer system 101 receiving a speech input 2116c after receiving the input directed to the dictation option 2134 described above with reference to FIG. 21G. In some embodiments, in response to the input directed to the dictation option 2134, the computer system 101 updates display of the insertion marker 2136, as shown in FIG. 21H, to include a dictation indication. In some embodiments, in response to the input directed to the dictation option 2134, the computer system 101 forgoes updating the background color of the region of the word processing user interface 2126 including text 2130, adding a glow effect to the region of the word processing user interface 2126 including text 2130, and/or adding a glow effect to the insertion marker 2136. In some embodiments, in response to detecting the input directed to the dictation option 2134, the computer system 101 forgoes changing visual characteristics of the region of the word processing user interface 2126 including text 2130 in accordance with changes in detected audio.

In some embodiments, after receiving the input directed to the dictation option 2134, the computer system 101 receives speech input 2116c. In some embodiments, in response to receiving the speech input 2116c after receiving the input directed to the dictation option 2134, the computer system 101 updates the text 2130 to include text corresponding to the speech input 2116c, as shown in FIG. 21I. In some embodiments, the computer system 101 updates the text 2130 in response to the speech input 2116c in accordance with a determination that the attention 2113f of the user is directed to the insertion marker 2136 and forgoes updating the text if the attention 2113e or 2113d is directed away from the insertion marker 2136. In some embodiments, the computer system 101 updates the text 2130 in response to the speech input 2116c in accordance with a determination that the attention 2113f or 2113e of the user is directed to the word processing user interface 2126 and forgoes updating the text if the attention 2113d is directed away from the word processing user interface 2126. In some embodiments, the computer system 101 updates the text 2130 irrespective of where the attention of the user is directed in the three-dimensional environment 2101.

FIG. 21I illustrates an example of the computer system 101 updating the text 2130 in response to the speech input illustrated in FIG. 21I. In some embodiments, the computer system 101 continues to display the insertion marker 2136 with the dictation indication after entering the text.

FIGS. 22A-22H is a flowchart illustrating a method 2200 of entering text into a text entry field in response to speech inputs in accordance with some embodiments. In some embodiments, the method 2200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 2200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2200 are, optionally, combined and/or the order of some operations is, optionally, changed.

In some embodiments, method 2200 is performed at a computer system (e.g., 101) in communication with a display generation component and one or more input devices. In some embodiments, the computer system is the computer system described above with reference to one or more of methods 800, 900, 1000, 1200, 1400, 1600, 1800, and/or 2000. In some embodiments, the display generation component is the display generation component described above with reference to one or more of methods 800, 900, 1000, 1200, 1400, 1600, 1800, and/or 2000. In some embodiments, the one or more input devices are the one or more input devices described above with reference to one or more of methods 800, 900, 1000, 1200, 1400, 1600, 1800, and/or 2000.

In some embodiments, such as in FIGS. 21A and 21A1, the computer system (e.g., 101) displays (2202a), via the display generation component, a user interface (e.g., 2102) that includes a text entry field (e.g., 2104). In some embodiments, in response to one or more text entry inputs corresponding to a request to add user-specified text to the text entry field, the computer system displays the user-specified text in the text entry field. In some embodiments, the one or more text entry inputs are received using a hardware keyboard, a soft keyboard, and/or dictation. In some embodiments, the hardware keyboard is included in the one or more input devices in communication with the computer system. In some embodiments, the soft keyboard is displayed via the display generation component. In some embodiments, the computer system detects dictation by detecting speech via a microphone included in the one or more input devices. In some embodiments, the user interface further includes one or more selectable options that, when selected, cause the computer system to perform an action with respect to the text in the text entry field. For example, the text entry field is a search field and the user interface further includes a selectable option that, when selected, causes the computer system to conduct a search using the text entered into the text entry field as search parameters. As another example, the text entry field is a message composition field and the user interface further includes a selectable option that, when selected, causes the computer system to send the contents entered into the text entry field to another user account in a message. In some embodiments, the user interface and/or text entry field are displayed within a three-dimensional environment having one or more of the characteristics of the three-dimensional environments of methods 800, 900, 1000, 1200, 1400, 1600, 1800, and/or 2000.

In some embodiments, while displaying the user interface (e.g., 2102) that includes the text entry field (e.g., 2104), the computer system (e.g., 101) detects (2202b), via the one or more input devices, attention (e.g., 2113a) of the user directed to the text entry field (e.g., 2104), such as in FIGS. 21A and 21A1. In some embodiments, detecting the attention of the user includes detecting the gaze of the user directed to a respective location in the user interface and that one or more additional criteria are satisfied, as described in more detail above.

In some embodiments, such as in FIG. 21D, after (and/or while) detecting the attention (e.g., 2113a) of the user directed to the text entry field (e.g., 2104), the computer system (e.g., 101) detects (2202c) a voice input (e.g., 2116a). In some embodiments, the voice input includes spoken words.

In some embodiments, in response to detecting the voice input (e.g., 2116a) (2202d), in accordance with a determination that the attention (e.g., 2113c) of the user directed to the text entry field (e.g., 2104) met a first set of one or more criteria, such as in FIG. 21D, wherein the first set of one or more criteria require that the attention (e.g., 2113c) of the user was directed to a first portion of the text entry field (e.g., 2104) in order for the first set of one or more criteria to be met, the computer system (e.g., 101) enters (2202e) text (e.g., 2124) into the text entry field based on the voice input (e.g., 2116a), such as in FIG. 21E. In some embodiments, determining that the attention of the user was directed to the first portion of the text entry field includes detecting the gaze of the user directed to the first portion of the text entry field and that the one or more criteria described with reference to step 2202b are satisfied. In some embodiments, the first portion of the text entry field includes a visual indication of dictation, as described in more detail below with reference to steps 2206b. In some embodiments, the text based on the voice input includes a text representation of words spoken in the voice input.

In some embodiments, in response to detecting the voice input (e.g., 2116a) (2202d), in accordance with a determination that the attention (e.g., 2113b) of the user directed to the text entry field (e.g., 2104) did not meet the first set of one or more criteria (e.g., because the attention of the user was directed to a second portion of the text entry field that is different from the first text entry field prior to detecting the voice input), such as in FIG. 21D, the computer system (e.g., 101) forgoes (22021) entering the text into the text entry field (e.g., 2104) based on the voice input (e.g., 2116a). In some embodiments, the second portion of the text entry field includes a portion of the text entry field that does not include the visual indication of dictation described above with reference to step 2202e and described in more detail below with reference to steps 2206b. Selectively entering text to the text entry field based on the voice input depending on which portion of the text entry field to which the attention of the user is directed enhances user privacy and reduces the likelihood of erroneous dictation input provided to the text entry field.

In some embodiments, in response to detecting the voice input (2204a), in accordance with the determination that the attention (e.g., 2113c) of the user directed to the text entry field (e.g., 2104) met the first set of one or more criteria, such as in FIG. 21C, the computer system (e.g., 101) provides (2204b) an output indicating that subsequent voice inputs will be entered as text in the text entry field (e.g., 2104), such as in FIG. 21D. In some embodiments, the output includes an audio indication (e.g., a ding, chime, tone, or beep). In some embodiments, the output includes a tactile output (e.g., vibration and/or haptics). In some embodiments, the output includes changing the appearance of the text entry field as described below with reference to steps 2220a, 22020b, 2222a, 2222b, 2224a, 2224b, 2226a, 2226b, 2228a, 2228b, 2230a, 2230b, 2232a, 2232b, 2234a, 2234b, 2236a, and/or 2238a-2238b.

In some embodiments, in response to detecting the voice input (2204a), in accordance with the determination that the attention (e.g., 2113b) of the user directed to the text entry field (e.g., 2104) did not meet the first set of one or more criteria, such as in FIG. 21C, the computer system (e.g., 101) forgoes (2204c) providing the output indicating that the subsequent voice inputs will be entered as text in the text entry field (e.g., 2104). Providing the output in accordance with the determination that the attention of the user directed to the text entry field met the first set of one or more criteria enhances user interactions with the computer system by providing improved visual feedback to users, improving user privacy, and reducing the likelihood of erroneous dictation input provided to the text entry field.

In some embodiments, while detecting the attention (e.g., 2113a) of the user directed to the text entry field (e.g., 2104) (2206a), such as in FIGS. 21A and 21A1, in accordance with the determination that the attention (e.g., 2113a) of the user directed to the text entry field (e.g., 2104) did not meet the first set of one or more criteria (e.g., the attention is directed to the second portion of the text entry field), the computer system (e.g., 101) displays (2206b), via the display generation component (e.g., 120), a visual indication (e.g., 2110) of a dictation process to enter text in the text entry field (e.g., 2104) based on subsequent voice inputs. In some embodiments, the visual indication (e.g., 2110) is an icon corresponding to dictation, such as a microphone, megaphone, speech bubble, or other image corresponding to speaking, such as in FIG. 21B. In some embodiments, the visual indication is a geometric shape that, in response to the computer system detecting the attention of the user directed to the geometric shape, animates to change to an image corresponding to dictation, as described in more detail below with reference to steps 2214b through 2214d. In some embodiments, as described in more detail below with reference to step 2218a, the computer system displays the visual indication in the first portion of the text entry field. Displaying the visual indication of the dictation process enhances user interactions with the computer system by providing improved visual feedback to the user for initiating dictation.

In some embodiments, such as in FIGS. 21B-21D, the visual indication (e.g., 2110, 2112a, and/or 2112b) of the dictation process includes an indication of progress towards satisfying the first set of one or more criteria (2208a). In some embodiments, the first set of one or more criteria are satisfied when the gaze of the user is directed to the first portion of the text entry field for a threshold amount of time, such as the threshold amount of time for determining that the attention of the user is directed to the first portion of the text entry field, as described in more detail above. In some embodiments, in response to detecting the gaze of the user directed to the first portion of the text entry field, the visual indication changes in accordance with the amount of time the gaze of the user is directed to the first portion of the text entry field. In some embodiments, in accordance with a determination that the gaze of the user has been directed to the first portion of the text entry field for the threshold amount of time, the visual indication changes to indicate that the first set of one or more criteria are satisfied. For example, the indication of progress is an animation according to steps 2212a through 2212d and/or 2214a through 2214d that has a duration that is the predefined time threshold. Displaying the visual indication of progress towards satisfying the first set of one or more criteria enhances user interactions with the computer system by providing improved visual feedback for initiating dictation.

In some embodiments, such as in FIG. 21D, while displaying the visual indication (e.g., 2112b) of the dictation process, the computer system (e.g., 101) determines (2210a) that the attention (e.g., 2113c) of the user directed to the text entry field (e.g., 2104) meets the first set of one or more criteria. In some embodiments, the computer system initiates display of the visual indication while the first set of one or more criteria are not satisfied.

In some embodiments, such as in FIG. 21E, in accordance with the determination that the attention (e.g., 2113b) of the user directed to the text entry field (e.g., 2104) met the first set of one or more criteria, the computer system (e.g., 101) ceases (2210b) display of the visual indication of the dictation process. In some embodiments, the computer system updates the text entry field in additional or alternative ways in response to the first set of one or more criteria being met as described below with reference to steps 2220a, 2220b, 2222a, 2222b, 2224a, 2224b, 2226a, 2226b, 2228a, 2228b, 2230a, 2230b, 2232a, 2232b, 2234a, 2234b, 2236a, 2238a, and/or 2238b. In some embodiments, the computer system ceases display of the visual indication in the first portion of the text entry field and displays the visual indication at a different location in the text entry field in response to the first set of one or more criteria being met, as described in more detail below with reference to steps 2232a and 2232b. Ceasing display of the visual indication of the dictation process in response to the first set of one or more criteria being met enhances user interactions with the computer system by providing improved visual feedback to the user when initiating dictation.

In some embodiments, such as in FIG. 21B, displaying the visual indication of the dictation process includes (2212a) displaying an image (e.g., 2110) corresponding to the dictation process (2212b). In some embodiments, the image corresponding to the dictation process is described above with reference to step 2206a. In some embodiments, the computer system displays the image corresponding to the dictation process in response to the attention of the user directed to the second portion of the text entry field.

In some embodiments, displaying the visual indication of the dictation process includes (2212a), while displaying the image (e.g., 2110) corresponding to the dictation process, such as in FIG. 21B, determining that the attention (e.g., 2113c) of the user is directed to the image (e.g., 2110) corresponding to the dictation process (2212c). In some embodiments, as described with reference to step 2218a, the image corresponding to the diction process is displayed in the first portion of the text entry field and the attention of the user is directed to the first portion of text entry field.

In some embodiments, displaying the visual indication of the dictation process includes (2212a), in accordance with the determination that the attention (e.g., 2113c) of the user is directed to the image (e.g., 2110) corresponding to the dictation process, such as in FIG. 21B, displaying an animation of the image (e.g., 2110) corresponding to the dictation process changing to a geometric shape (e.g., 2112a), such as in FIG. 21C, different from the image (e.g., 2110) corresponding to the dictation process (2212d). In some embodiments, the animation has a duration corresponding to the time threshold for determining the attention of the user is directed to the first portion of the text entry field, as described in more detail below with reference to step 2240a. In some embodiments, the image corresponding to the dictation process is described above with reference to step 2206a. Displaying the animation of the image corresponding to the dictating process changing to a geometric shape enhances user interactions with the computer system by providing improved visual feedback to the user.

In some embodiments, displaying the visual indication of the dictation process includes (2214a) displaying a geometric shape (e.g., 2112a) (2214b), such as in FIG. 21C. In some embodiments, the geometric shape is a polygon, oval, or circle. In some embodiments, the computer system displays the geometric shape in response to the attention of the user directed to the second portion of the text entry field.

In some embodiments, displaying the visual indication of the dictation process includes (2214a) while displaying the image corresponding to the dictation process, determining that the attention (e.g., 2113c) of the user is directed to the geometric shape (e.g., 2112a) (2214c), such as in FIG. 21C. In some embodiments, as described with reference to step 2218a, the geometric shape is displayed in the first portion of the text entry field and the attention of the user is directed to the first portion of text entry field.

In some embodiments, displaying the visual indication of the dictation process includes (2214a) in response to detecting that the attention (e.g., 2113c) of the user is directed to the geometric shape (e.g., 2112a), such as in FIG. 21C, displaying an animation of the geometric shape changing into an image (e.g., 2110) corresponding to the dictation process that is different from the geometric shape (2214d), such as in FIG. 21B. In some embodiments, the animation has a duration corresponding to the time threshold for determining the attention of the user is directed to the first portion of the text entry field, as described in more detail below with reference to step 2240*a*. In some embodiments, the geometric shape is a polygon, oval, or circle. In some embodiments, in response to detecting that the attention of the use is not directed to the geometric shape, the computer system forgoes displaying the animation. Displaying the animation of the geometric shape changing to the image corresponding to the dictation process enhances user interactions with the computer system by providing improved visual feedback to the user.

In some embodiments, while detecting the attention (e.g., 2113*a*) of the user directed to the text entry field (e.g., 2104) (2216*a*), such as in FIGS. 21A and 21A1, in accordance with the determination that the attention (e.g., 2113*a*) of the user directed to the text entry field (e.g., 2104) did not meet the first set of one or more criteria (e.g., because the attention of the user is directed to the second portion of the text entry field) (2216*b*), in accordance with a determination that the text entry field (e.g., 2104) satisfies a second set of criteria, the computer system (e.g., 101) displays (2216*c*) the visual indication (e.g., 2110) of the dictation process, such as in FIG. 21B. In some embodiments, the second set of criteria are satisfied when the text entry field is compatible with the dictation process described herein that includes initiating dictation in response to the attention of the user directed to the text entry field satisfying the first set of one or more criteria. In some embodiments, predefined ones of a plurality of text entry fields are compatible with the dictation process described herein. In some embodiments, the text entry fields that are compatible with the dictation process are configured by the software developers of the applications that include the text entry fields to be compatible with the dictation process. In some embodiments, one or more text entry fields compatible with the dictation process are included in system-level user interfaces.

In some embodiments, while detecting the attention (e.g., 2113*e*) of the user directed to the text entry field (e.g., 2130) (2216*a*), such as in FIG. 21G, in accordance with the determination that the attention (e.g., 2113*e*) of the user directed to the text entry field (e.g., 2104) did not meet the first set of one or more criteria (e.g., because the attention of the user is directed to the second portion of the text entry field) (2216*b*), in accordance with a determination that the text entry field (e.g., 2130) does not satisfy the second set of criteria, the computer system (e.g., 101) forgoes (2216*d*) displaying the visual indication of the dictation process, such as in FIG. 21H. In some embodiments, some text entry fields are not compatible with the dictation process described herein that includes initiating dictation in response to the attention of the user directed to the text entry field satisfying the first set of one or more criteria. In some embodiments, the computer system enters text corresponding to speech inputs to these text entry fields using a different dictation process, such as a dictation process initiated in response to detecting selection of a dictation option displayed by the computer system. Forgoing displaying the visual indication of the dictation process in text entry fields that do not satisfy the second set of criteria enhances user interactions with the computer system by providing improved visual feedback indicating which text entry fields satisfy the second set of criteria.

In some embodiments, the computer system (e.g., 101) displays the visual indication (e.g., 2110) of the dictation process in the first portion of the text entry field (e.g., 2104) (2218*a*). In some embodiments, the first set of one or more criteria includes a criterion that is satisfied when the attention of the user is directed to the visual indication of the dictation process for at least the threshold duration described below with reference to step 2240*a*. In some embodiments, the first set of one or more criteria are satisfied in accordance with the attention of the user being directed to the first portion of the text entry field irrespective of whether or not the computer system displays the visual indication of the dictation process. Displaying the visual indication of the dictation process in the first portion of the text entry field enhances user interactions with the computer system by providing improved visual feedback for initiating dictation.

In some embodiments, while detecting the attention of the user directed to the text entry field (e.g., 2104) (2220*a*), in accordance with the determination that the attention (e.g., 2113*a*) of the user directed to the text entry field (e.g., 2104) did not meet the first set of one or more criteria, such as in FIGS. 21A and 21A1, the computer system (e.g., 101) displays (2220*b*), via the display generation component (e.g., 120), the first portion of the text entry field (e.g., 2104) with a first appearance, such as in FIG. 21B. In some embodiments, displaying the first portion of the text entry field with the first appearance includes displaying a first image in the first portion of the text entry field, as described above with reference to steps 2212*b* and 2214*b*.

In some embodiments, while detecting the attention of the user directed to the text entry field (e.g., 2104) (2220*a*), in accordance with the determination that the attention (e.g., 2113*c*) of the user directed to the text entry field (e.g., 2104) met the first set of one or more criteria, such as in FIG. 21C, the computer system (e.g., 101) displays (2220*c*), via the display generation component (e.g., 120), the first portion of the text entry field (e.g., 2104) with a second appearance different from the first appearance, such as in FIG. 21D. In some embodiments, displaying the first portion of the text entry field with the second appearance includes displaying a second image in the first portion of the text entry field, as described above with reference to steps 2212*d* and 2214*d*. In some embodiments, displaying the first portion of the text entry field with the second appearance includes ceasing to display an image in the first portion of the text entry field, such as described above with reference to step 2210*b*. In some embodiments, displaying the first portion of the text entry field with a different appearance depending on whether or not the first set of one or more criteria are satisfied enhances user interactions with the computer system by providing improved visual feedback to the user for when dictation is initiated and preserving user privacy.

In some embodiments, while detecting the attention of the user directed to the text entry field (e.g., 2104) (2222*a*), in accordance with the determination that the attention (e.g., 2113*a*) of the user directed to the text entry field (e.g., 2104) did not meet the first set of one or more criteria, such as in FIGS. 21A and 21A1, the computer system (e.g., 101) displays (2222*b*), via the display generation component (e.g., 120), the text entry field (e.g., 2104) with a first appearance, such as in FIG. 21B. In some embodiments, displaying the first portion of the text entry field with the first appearance includes one or more implementations described below in steps 2224*a*, 2230*a*, 2232*a*, and/or 2234*a*. In some embodiments, displaying the text entry field with the first appearance indicates that the computer system will not enter text corresponding to speech input into the text entry field in response to speech input received while displaying the text entry field with the first appearance.

In some embodiments, while detecting the attention of the user directed to the text entry field (e.g., 2104) (2222*a*), in accordance with the determination that the attention (e.g., 2113*c*) of the user directed to the text entry field (e.g., 2104)

met the first set of one or more criteria, such as in FIG. 21C, the computer system (e.g., 101) displays (2222c), via the display generation component (e.g., 120), the text entry field (e.g., 2104) with a second appearance different from the first appearance. In some embodiments, displaying the first portion of the text entry field with the first appearance includes one or more implementations described below in steps 2224b, 2230b, 2232b, and/or 2234b. In some embodiments, displaying the text entry field with the second appearance indicates that the computer system will enter text corresponding to speech input into the text entry field in response to speech input received while displaying the text entry field with the second appearance. In some embodiments, displaying the text entry field with a different appearance depending on whether or not the first set of one or more criteria are satisfied enhances user interactions with the computer system by providing improved visual feedback to the user for when dictation is initiated and preserving user privacy.

In some embodiments, such as in FIG. 21C, displaying the text entry field (e.g., 2104) with the first appearance includes displaying the text entry field (e.g., 2104) with a first background (2224a). In some embodiments, the first background has a first color, first type of animation (or no animation), and/or first translucency. In some embodiments, displaying the text entry field with the first background indicates that the computer system will not enter text representations of voice input into the text entry field in response to voice input received while displaying the text entry field with the first background.

In some embodiments, such as in FIGS. 21D, displaying the text entry field (e.g., 2104) with the second appearance includes displaying the text entry field (e.g., 2104) with a second background different from the first background (2224b). In some embodiments, the second background has a second color different from the first color, second type of animation (or no animation) different from the first animation (or no animation), and/or second translucency different from the first translucency. In some embodiments, displaying the text entry field with the second background indicates that the computer system will not enter text representations of voice input into the text entry field in response to voice input received while displaying the text entry field with the second background. In some embodiments, displaying the text entry field with a different background depending on whether or not the first set of one or more criteria are satisfied enhances user interactions with the computer system by providing improved visual feedback to the user for when dictation is initiated, improves user privacy, and improves the accuracy of user inputs.

In some embodiments, such as in FIG. 21C, displaying the text entry field (e.g., 2104) with the first background includes displaying the background in a color (and/or other visual characteristic) that does not change in accordance with audio levels (e.g., volume, pitch, and/or timbre) of the voice input (e.g., 2116a) (2226a). In some embodiments, the first background does not change color. In some embodiments, the first background changes color irrespective of the voice input, such as changing color in a predetermined manner over time. In some embodiments, displaying the first background that doesn't change in response to the voice input indicates that the computer system will not enter text representations of voice input into the text entry field in response to voice input received while displaying the text entry field with the first background.

In some embodiments, such as in FIG. 21D, displaying the text entry field (e.g., 2104) with the second background includes displaying the background in a color (and/or other visual characteristic) that changes in accordance with the audio (e.g., volume, pitch, and/or timbre) levels of the voice input (e.g., 2116a) (2226b). In some embodiments, the second background includes multiple colors at once that change color and/or size in accordance with the audio levels of the voice input. In some embodiments, displaying the second background that changes in response to the voice input indicates that the computer system will enter text representations of voice input into the text entry field in response to voice input received while displaying the text entry field with the second background. Displaying the text entry field with the background that changes color in response to the voice input when the first set of one or more criteria are satisfied enhances user interactions with the computer system by providing improved visual feedback that dictation is active, improves user privacy, and improves user input accuracy.

In some embodiments, such as in FIG. 21C, displaying the text entry field (e.g., 2104) with the first background includes displaying the background without animating the background irrespective of whether or not the voice input (e.g., 2116a) is being detected (2228a). In some embodiments, the first background is not animated. In some embodiments, displaying the first background without animation indicates that the computer system will not enter text representations of voice input into the text entry field in response to voice input received while displaying the text entry field with the first background.

In some embodiments, such as in FIG. 21F, displaying the text entry field (e.g., 21040 with the second background includes displaying the background with an animation irrespective of whether or not the voice input (e.g., 2116a) is being detected (2228b). In some embodiments, while voice input is not detected, the second background is animated in a predefined manner that includes one or more of changing colors and/or changing the size and/or colors of patches of multiple colors displayed at once. In some embodiments, while the voice input is detected, the second background is animated in accordance with the voice input, as described above with reference to step 2226b. In some embodiments, the second background is animated in a predefined manner independent from detected audio levels irrespective of whether or not a voice input is being received. In some embodiments, displaying the second background including animation irrespective of the voice input indicates that the computer system will enter text representations of voice input into the text entry field in response to voice input received while displaying the text entry field with the second background. Displaying the text entry field with the animated background when the first set of one or more criteria are satisfied enhances user interactions with the computer system by providing improved visual feedback that dictation is active, improves user privacy, and improves user input accuracy.

In some embodiments, such as in FIG. 21B, displaying the text entry field (e.g., 2104) with the first appearance includes displaying an image associated with the text entry field (e.g., 2104) in the text entry field (2230a), such as a magnifying glass icon in the text entry field 2104 for conducting text searches. In some embodiments, the image is concurrently displayed with placeholder text in the text entry field that indicates the function of the text entry field. For example, the image is associated with a search field as described below with reference to step 2232a.

In some embodiments, such as in FIG. 21D, displaying the text entry field with the second appearance includes displaying the text entry field (e.g., 2104) without the image associated with the text entry field (e.g., 2104) (2230*b*). In some embodiments, displaying the text entry field with the second appearance includes displaying the text entry field without the placeholder text. Displaying the text entry field with the image associated with the text entry field while the first set of one or more criteria are not satisfied and displaying the text entry field without the image associated with the text entry field while the first set of one or more criteria are satisfied enhances user interactions with the computer system by providing improved visual feedback that dictation is active, improves user privacy, and improves user input accuracy.

In some embodiments, displaying the text entry field (e.g., 2104) with the first appearance includes displaying an image associated with the text entry field (e.g., 2104) at a respective location in the text entry field (e.g., 2104), such as displaying a magnifying glass icon in FIGS. 21A and 21A1 at the location at which image 2116 is displayed in FIG. 21D, without displaying an image (e.g., 2116) associated with a dictation process to enter text in the text entry field (e.g., 2104) based on subsequent voice inputs at the respective location in the text entry field (e.g., 2104) (2232*a*). For example, the image associated with the text entry field is a search icon, such as a magnifying glass, displayed in a search text entry field. In some embodiments, the image associated with the dictation process is described above with reference to step 2210*b*. In some embodiments, the respective location in the text entry field is in the second portion of the text entry field. In some embodiments, the computer system concurrently displays the image associated with the text entry field at the respective location while displaying the image associated with the dictation process at the first portion of the text entry field in response to attention of the user directed to the text entry field that does not meet the first set of one or more criteria.

In some embodiments, such as in FIG. 21D, displaying the text entry field (e.g., 2104) with the second appearance includes displaying the text entry field (e.g., 2104) with the image (e.g., 2116) associated with the dictation process at the respective location in the text entry field without displaying the image associated with the text entry field at the respective location in the text entry field (2232*b*). In some embodiments, the computer system does not display the image associated with the text entry field while displaying the image associated with the dictation process at the respective location in the text entry field. In some embodiments, in response to detecting the first set of one or more criteria are satisfied, the computer system replaces the image associated with the text entry field with the image associated with the dictation process. Displaying the text entry field with the image associated with the text entry field while the first set of one or more criteria are not satisfied and displaying the text entry field with the image associated with the dictation process while the first set of one or more criteria are satisfied enhances user interactions with the computer system by providing improved visual feedback that dictation is active, improves user privacy, and improves user input accuracy.

In some embodiments, displaying the text entry field (e.g., 2104) with the first appearance includes displaying first text (e.g., 2106) associated with the text entry field (e.g., 2104), such as in FIG. 21C, without displaying second text (e.g., 2114) associated with a dictation process to enter text in the text entry field (e.g., 2104) based on subsequent voice inputs in the text entry field (e.g., 2104) (2234*a*), such as in FIG. 21D. In some embodiments, the first text is placeholder text related to the function of the text entry field, as described above with reference to step 2230*a*. In some embodiments, the second text instructs the user to speak to enter text to the text entry field and informs the user that the computer system is configured to enter text corresponding to voice inputs into the text entry field.

In some embodiments, displaying (2234*b*) the text entry field (e.g., 2104) with the second appearance includes displaying the second text (e.g., 2114) in the text entry field (e.g., 2104), such as in FIG. 21D, without displaying the first text (e.g., 2106) in the text entry field (e.g., 2104), such as in FIG. 21C. Displaying the text entry field with the first text while the first set of one or more criteria are not satisfied and displaying the text entry field with the second text while the first set of one or more criteria are satisfied enhances user interactions with the computer system by providing improved visual feedback that dictation is active, improves user privacy, and improves user input accuracy.

In some embodiments, such as in FIG. 21E, entering the text (e.g., 2124) into the text entry field (e.g., 2104) based on the voice input (e.g., 2116*a*) includes displaying an animation of a portion of the text (e.g., after the text has been entered in the text entry field) that changes over time in accordance with changes in audio (e.g., volume, pitch, and/or timbre) levels of the voice input (e.g., 2116*a*) (2236*a*). In some embodiments, the animation is animation of the color of the text changing over time in accordance with the audio levels of the voice input. In some embodiments, in response to entering text into the text entry field in response to a different text input, such as a typed text input, the computer system enters the text without displaying the animation. Animating the text in accordance with audio levels of the voice input while entering the text in the text entry field in response to the voice input enhances user interactions with the computer system by providing improved visual feedback to the user, improving user privacy, and reducing errors.

In some embodiments, in accordance with the determination that the attention (e.g., 2113*c*) of the user directed to the text entry field (e.g., 2104) met the first set of one or more criteria, such as in FIG. 21C, the computer system (e.g., 101) displays (2238*a*), via the display generation component (e.g., 120), an insertion marker (e.g., 2118) in the text entry field (e.g., 2104) that includes an animation of the insertion marker (e.g., 2118) that changes over time in accordance with changes in audio (e.g., pitch, volume, and/or timbre) levels the voice input (e.g., 2116*a*), such as in FIG. 21D. In some embodiments, animation of the background of the text entry field, the text being entered, and the insertion cursor is coordinated. For example, the computer system applies the same color changes to these elements in response to the changes in the audio levels of the voice input. In some embodiments, the cursor is displayed with a glow effect and the color and/or intensity of the glow changes over time in accordance with the audio levels of the voice input. In some embodiments, the insertion marker indicates a location in the text entry field (e.g., within text already entered into the text entry field) at which subsequent text will be entered in response to a text entry input (e.g., the voice input).

In some embodiments, in accordance with the determination that the attention (e.g., 2113*b*) of the user directed to the text entry field (e.g., 2104) did not meet the first set of one or more criteria, such as in FIG. 21C, the computer system (e.g., 101) forgoes (2238*b*) displaying the insertion marker (e.g., 2118) in the text entry field (e.g., 2104) that includes an animation of the insertion marker that changes over time in accordance with the changes in the audio (e.g., pitch, volume, and/or timbre) levels of the voice input (e.g., 2116*a*), such as in FIG. 21C. In some embodiments, the insertion marker is displayed in response to detecting an input corresponding to the input focus of the computer system being directed to the text entry field, such as selection of the text entry field or interaction with a hardware or soft keyboard to enter text to the text entry field. In some embodiments, in response to receiving a text entry input other than a voice input (e.g., a text entry input received using a keyboard), the computer system forgoes displaying the animation of the text. In some embodiments, the computer system forgoes displaying the cursor while the attention of the user directed to the text entry field does not satisfy the first set of one or more criteria. Forgoing display of the cursor that includes the animation in accordance with the voice input while the first set of one or more criteria are not satisfied and displaying the cursor that includes the animation in accordance with the voice input while the first set of one or more criteria are satisfied enhances user interactions with the computer system by providing improved visual feedback that dictation is active, improves user privacy, and improves user input accuracy.

In some embodiments, such as in FIG. 21C, the first set of one or more criteria require that the attention (e.g., 2113*c*) of the user is directed to the first portion of the text entry field (e.g., 2104) for at least a predefined threshold time duration (2240*a*). In some embodiments, the first set of one or more criteria require the gaze of the user directed to the first portion of the text entry field for the predefined threshold time duration. In some embodiments, the predefined threshold time duration is 0.01, 0.05, 0.1, 0.2, 0.3, 0.5, 1, 2, or 5 seconds. Requiring the attention of the user directed to the first portion of the text entry field for the predefined threshold time duration for the first set of one or more criteria to be satisfied enhances user interactions with the computer system by preventing the user from accidentally causing the computer system to enter text corresponding to voice input into the text entry field, which avoids errors and improves user privacy.

In some embodiments, in accordance with the determination that the attention (e.g., 2113*b*) of the user directed to the text entry field (e.g., 2104) did not meet the first set of one or more criteria (2242*a*), such as in FIG. 21C, the computer system (e.g., 101) displays (2242*a*), via the display generation component (e.g., 120), a location in the text entry field (e.g., 2104) to which the attention (e.g., or gaze) of the user is directed with a first appearance. In some embodiments, the first appearance is a highlighted, glowing, glittering, or brightened appearance. In some embodiments, the first appearance includes first color saturation, first color lightness, first color tone, and/or first translucency. In some embodiments, the computer system displays the location with the first appearance in response to the attention of the user being directed to the location for a threshold time described above with reference to step 2240*a*. In some embodiments, the computer system displays the location with the first appearance in response to the attention of the user being directed to the location for any amount of time. In some embodiments, the computer system displays the location with the first appearance in response to the gaze of the user being directed to the location for any amount of time. In some embodiments, displaying the location in the text entry field to which the attention of the use is directed with the first appearance includes one or more techniques described above with reference to method(s) 1200 and/or 2000.

In some embodiments, in accordance with the determination that the attention (e.g., 2113*b*) of the user directed to the text entry field (e.g., 2104) did not meet the first set of one or more criteria (2242*a*), such as in FIG. 21C, the computer system (e.g., 101) displays (2242*a*), via the display generation component (e.g., 120), a location in the text entry field (e.g., 2104) to which attention (e.g., or gaze) of the user is not directed with a second appearance. In some embodiments, the computer system displays the text entry field with the second appearance while the attention of the user is not directed to the text entry field. In some embodiments, the second appearance includes second color saturation different from the first color saturation, second color lightness different from the first color lightness, second color tone different form the first color tone, and/or second translucency different from the first translucency. In some embodiments, the computer system displays the portion of the text entry field (and/or the user interface, including a portion of the text entry field) to which the attention of the user is directed visually distinguished from portions of the text entry field and/or user interface to which the attention of the user is not directed. Displaying the location in the text entry field to which the attention of the user is directed with a different appearance than the location(s) in the text entry field to which the attention of the user is not directed enhances user interactions with the computer system by providing improved visual feedback to the user.

In some embodiments, in accordance with the determination that the attention (e.g., 2113*c*) of the user directed to the text entry field (e.g., 2104) met the first set of one or more criteria (2244*a*), such as in FIG. 21C, the computer system (e.g., 101) displays (2244*b*), via the display generation component (e.g., 120), a location in the text entry field (e.g., 2104) to which the attention (e.g., 2113*b*) (e.g., or gaze) of the user is directed with a first appearance (e.g., as described with reference to step 2242*a*), such as in FIG. 21D. In some embodiments, displaying the location in the text entry field to which attention of the user is directed with the first appearance is as described above with reference to step 2242*b*.

In some embodiments, in accordance with the determination that the attention (e.g., 2113*c*) of the user directed to the text entry field (e.g., 2104) met the first set of one or more criteria (2244*a*), such as in FIG. 21C, the computer system (e.g., 101) displays (2244*c*), via the display generation component (e.g., 120), a location in the text entry field (e.g., 2104) to which attention (e.g., 2113*b*) of the user is not directed with a second appearance (e.g., as described with reference to step 2242*b*), such as in FIG. 21D. In some embodiments, displaying the location in the text entry field to which attention of the user is not directed with the second appearance is as described above with reference to step 2242*c*. Displaying the location in the text entry field to which the attention of the user is directed with a different appearance than the location(s) in the text entry field to which the attention of the user is not directed enhances user interactions with the computer system by providing improved visual feedback to the user.

It should be understood that the particular order in which the operations in method 2200 have been described is merely exemplary and is not intended to indicate that the described order is the only order in which the operations could be performed. One of ordinary skill in the art would recognize various ways to reorder the operations described herein.

FIGS. 23A-23M illustrate examples of a computer system updating a value for a value selection user interface object based on the attention of a user in accordance with some embodiments.

Figure 23A:
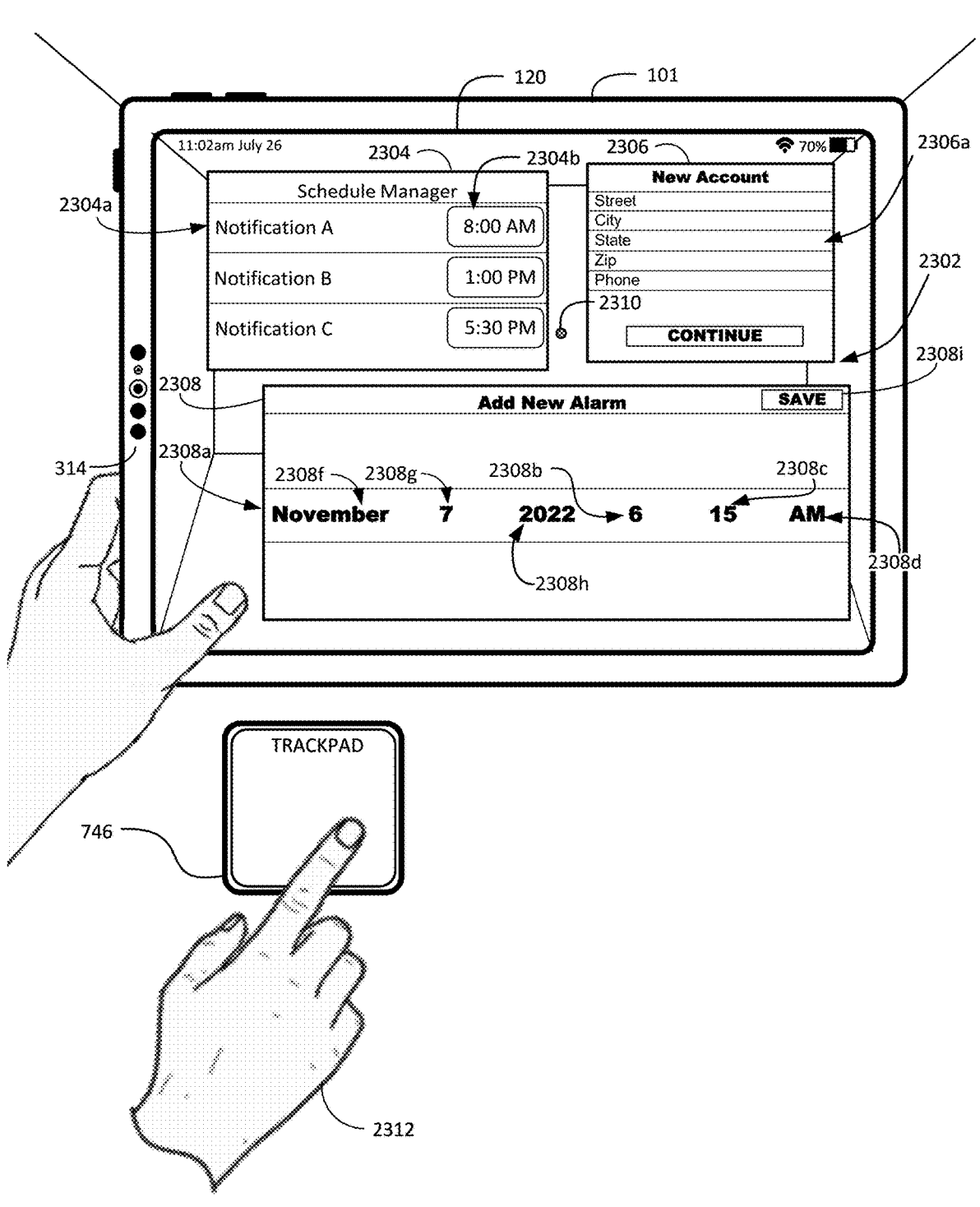
FIGS. 23A-23M illustrate examples of a computer system updating a value for a value selection user interface object based on the attention of a user in accordance with some embodiments.

FIGS. 23A and 23A1 illustrates a computer system 101 displaying, via a display generation component (e.g., display generation component 120 of FIG. 1), a three-dimensional environment 2302 from a viewpoint of a user. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIGS. 23A and 23A1, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2302 or portions of the physical environment are visible via the display generation component 120 of computer system 101. For example, three-dimensional environment 2302 includes portions of the left and back walls, and the floor in the physical environment of the user.

In FIG. 23A, three-dimensional environment 2302 also includes virtual objects, such as virtual objects 2304, 2306, and 2308. Virtual objects 2304, 2306, and 2308 are optionally one or more of a user interface of an application (e.g., scheduling user interface, browser user interface, or alarm user interface), a three-dimensional object (e.g., virtual clock, virtual ball, or virtual car), or any other element displayed by computer system 101 that is not included in the physical environment of computer system 101. In FIG. 23A, virtual object 2304 is a scheduling user interface that includes virtual content 2304a and selectable user interface objects—including selectable object 2304b—to schedule application notifications at a specific time of day using value selection user interface object 2304c in FIG. 23B. Virtual object 2304 optionally includes other virtual content and their respective value selection user interface objects, which are analogous to value selection user interface object 2304c and selectable to schedule other notifications, such as "Notification A" and "Notification B" in FIG. 23A. Returning to FIG. 23A, three-dimensional environment 2302 also includes virtual object 2306 which is optionally a browser user interface that includes selectable object 2306a that is selectable to identify a state value for an address associated with a new account using value selection user interface object 2306c shown in FIG. 23B. Virtual object 2306 optionally includes other value selection user interface objects, which are analogous to value selection user interface object 2306c and selectable to specify the other parts of the address, such as the street, city, zip code, and phone. In FIG. 23A, three-dimensional environment 2302 also includes virtual object 2308 which is optionally an alarm user interface that includes selectable user interface objects including value selection user interface object 2308a and selectable object 2308i for setting up an alarm.

FIG. 23A1 illustrates similar and/or the same concepts as those shown in FIG. 23A (with many of the same reference numbers). It is understood that unless indicated below, elements shown in FIG. 23A1 that have the same reference numbers as elements shown in FIGS. 23A-23M have one or more or all of the same characteristics. FIG. 23A1 includes computer system 101, which includes (or is the same as) display generation component 120. In some embodiments, computer system 101 and display generation component 120 have one or more of the characteristics of computer system 101 shown in FIGS. 23A-23M and display generation component 120 shown in FIGS. 1 and 3, respectively, and in some embodiments, computer system 101 and display generation component 120 shown in FIGS. 23A-23M have one or more of the characteristics of computer system 101 and display generation component 120 shown in FIG. 23A1.

In FIG. 23A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 23A-23M.

In FIG. 23A1, display generation component 120 is illustrated as displaying content that optionally corresponds to the content that is described as being displayed and/or visible via display generation component 120 with reference to FIGS. 23A-23M. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 23A1.

Display generation component 120 has a field of view (e.g., a field of view captured by external image sensors 314b and 314c and/or visible to the user via display generation component 120, indicated by dashed lines in the overhead view) that corresponds to the content shown in FIG. 23A1. Because display generation component 120 is optionally a head-mounted device, the field of view of display generation component 120 is optionally the same as or similar to the field of view of the user.

In FIG. 23A1, the user is depicted as performing an air pinch gesture (e.g., with hand 2312) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 23A-23M.

In some embodiments, computer system 101 responds to user inputs as described with reference to FIGS. 23A-23M.

In the example of FIG. 23A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 23A-23M and/or described with reference to the corresponding method(s) are optionally implemented on computer system 101 and display generation unit 120 in a manner similar or analogous to that shown in FIG. 23A1.

In some embodiments, input to computer system 101 is provided via air gestures from hand 2312 and/or attention of the user (e.g., as described in more detail with reference to method 2400), or via trackpad 746 from hand 2312, or via a rotatable input device (e.g., a crown) and inputs described herein are optionally received via trackpad 746, via air gestures/attention, or via other input devices such as a rotatable input device in communication with computer system 101.

In some embodiments, in response to detecting attention of the user directed to a selectable object in three-dimensional environment 2302, computer system 101 displays a value selection user interface object in three-dimensional environment 2302, as described in more detail with reference to method 2400. For example, in FIG. 23B, computer system 101 detects several alternative locations of user attention in three-dimensional environment 2302, and displays various value selection user interface objects. Further, while FIG. 23B (and other figures) illustrate multiple concurrent attention inputs directed to objects in three-dimensional environment 2302, it is understood that such attention inputs are optionally alternative inputs, and not concurrent inputs and computer system 101 is optionally configured to respond to the alternative inputs one at a time, as described herein. Details about the appearance and behavior of the value selection user interface object are described with reference to method 2400.

Figure 23B:
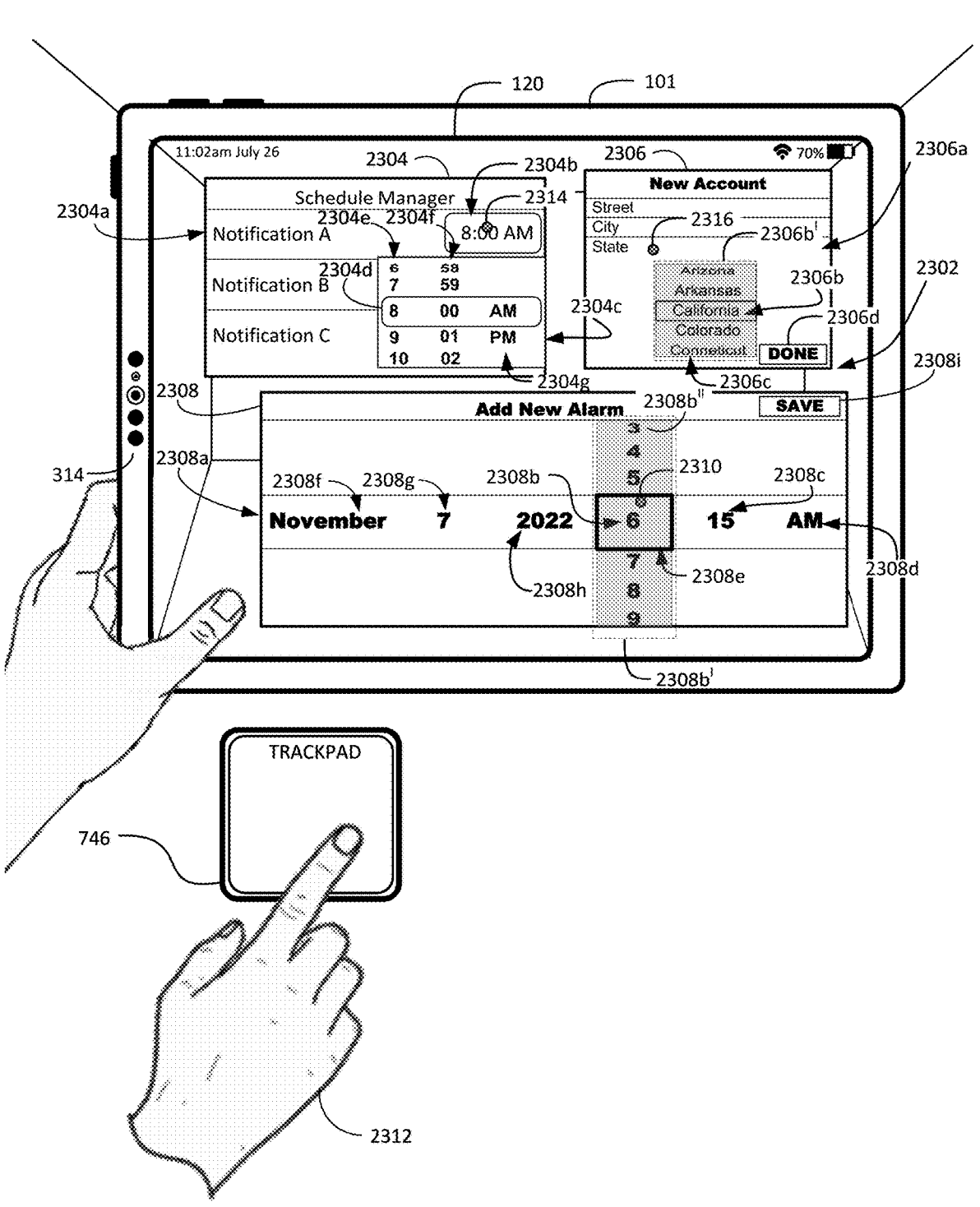

For example, in FIG. 23B, computer system 101 detects attention 2314 directed to selectable object 2304b, and displays value selection user interface object 2304c optionally within a modal user interface element and/or at the location of virtual object 2304 (e.g., scheduling user interface). Alternatively, computer system 101 detects attention 2316 directed to selectable object 2306a in FIG. 23B. In FIG. 23B, in response to detecting attention 2316 directed to selectable object 2306a, computer system 101 updates or expands virtual object 2306 (e.g., browser user interface) to include value selection user interface object 2306c. Value selection user interface objects 2304c and 2306c were not included in virtual objects 2304 and 2306, respectively, before attention was directed to respective selectable objects 2304b and 2306a. In some embodiments, and as shown from FIG. 23A to FIG. 23B, value selection user interface object 2308a is included within virtual object 2308.

In some embodiments, value selection user interface objects include one or more selectable component elements for selecting a respective value associated with the value selection user interface object. For example, in FIG. 23B value selection user interface object 2304c optionally includes a first selectable component element 2304e, a second selectable component element 2304f, and a third selectable component element 2304g. In some embodiments, first selectable component element 2304e corresponds to the hour unit of time associated with scheduling application "Notification A" represented by virtual content 2304a to display at a specific time of day. The second selectable component element 2304f optionally corresponds to the minutes unit of time associated with scheduling application "Notification A" and the third selectable component element 2304g optionally corresponds to the AM/PM unit of time associated with scheduling application "Notification A". In another example, value selection user interface object 2306c optionally includes one selectable component element corresponding to the state value for the address. Similar to value selection user interface object 2304c, value selection user interface object 2308a optionally includes more than one selectable component element. The selectable component elements associated with value selection user interface object 2308a as will be described below optionally correspond to respective sets of value options for setting up an alarm.

In some embodiments, computer system 101 displays a set of value options for a value selection user interface object when the attention of the user is directed to a selectable object as described with reference to method 2400. For example, in FIG. 23B, computer system 101 detects attention 2316 at selectable object 2306a. In response, the computer system 101 displays value selection user interface object 2306c including a first set of value options 2306b^I comprising state identifiers for value selection user interface object 2306c. In some embodiments, value selection user interface object 2306c includes characteristics similar to a selectable component element as described with reference to method 2400. In some embodiments, all sets of value options for a value selection user interface object are displayed in response to the attention of the user being directed to a selectable object. For example, respective sets of value options for the first selectable component element 2304e, the second selectable component element 2304f, and the third selectable component element 2304g are displayed in response to the attention of the user (e.g., attention 2314) being directed to selectable object 2304b as shown in FIG. 23B. In some embodiments, the computer system 101 displays a set of value options for a value selection user interface object when the attention of the user is directed to a location corresponding to a selectable component element of the value selection user interface object. For example, in FIG. 23B, computer system 101 detects attention 2310 at a location corresponding to selectable component element 2308b^I (or virtual content 2308b). In response, the computer system 101 displays value selection user interface object 2308a including a first set of value options 2308b^II comprising hour numbers for selectable component element 2308b^I. The respective sets of value options for other selectable component elements such as selectable component element corresponding to virtual content 2308c are not displayed because the attention of the user is not directed to a location corresponding to virtual content 2308c and/or a location corresponding to selectable component element 2308c'.

Figure 23C:
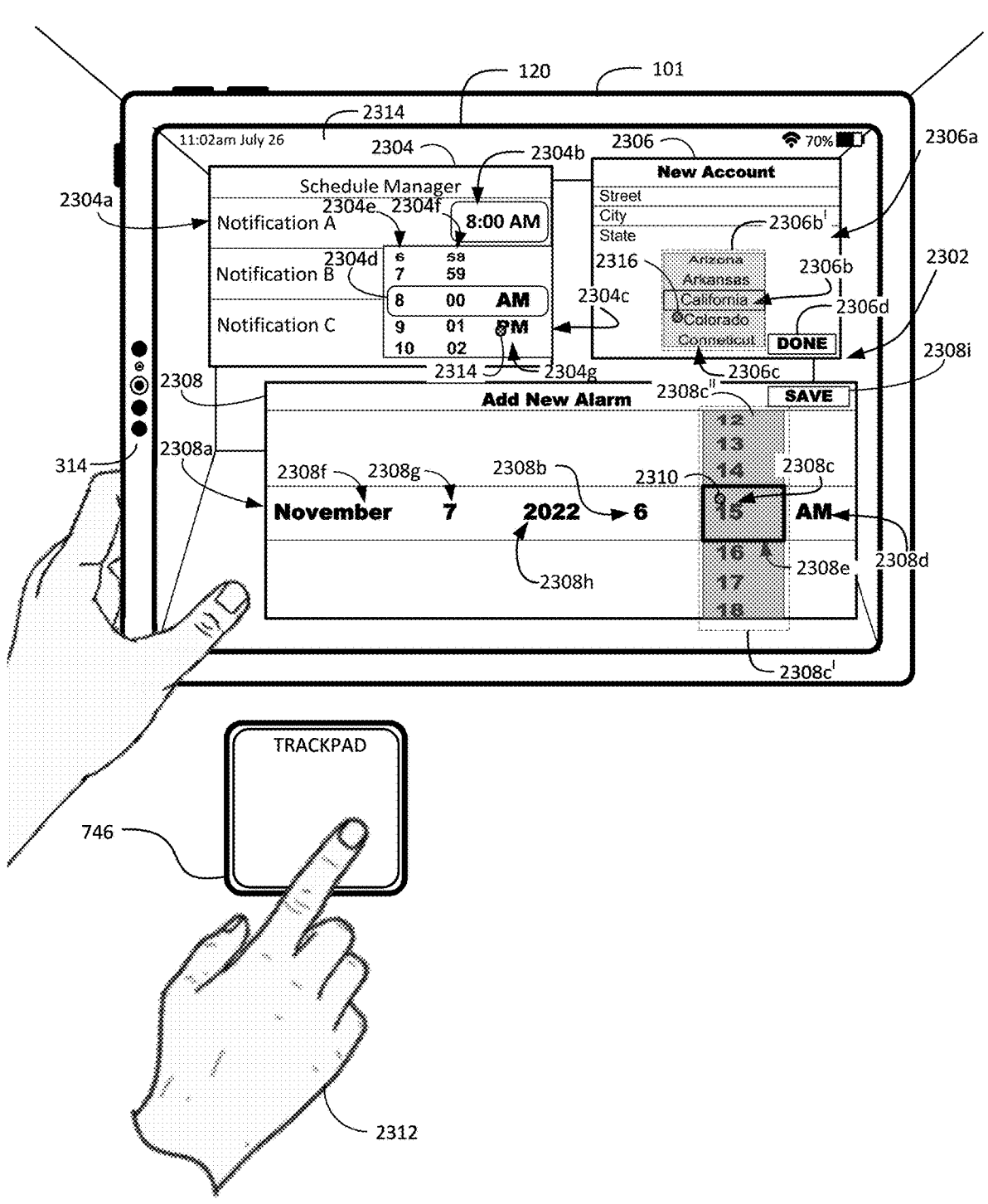
Figure 23D:
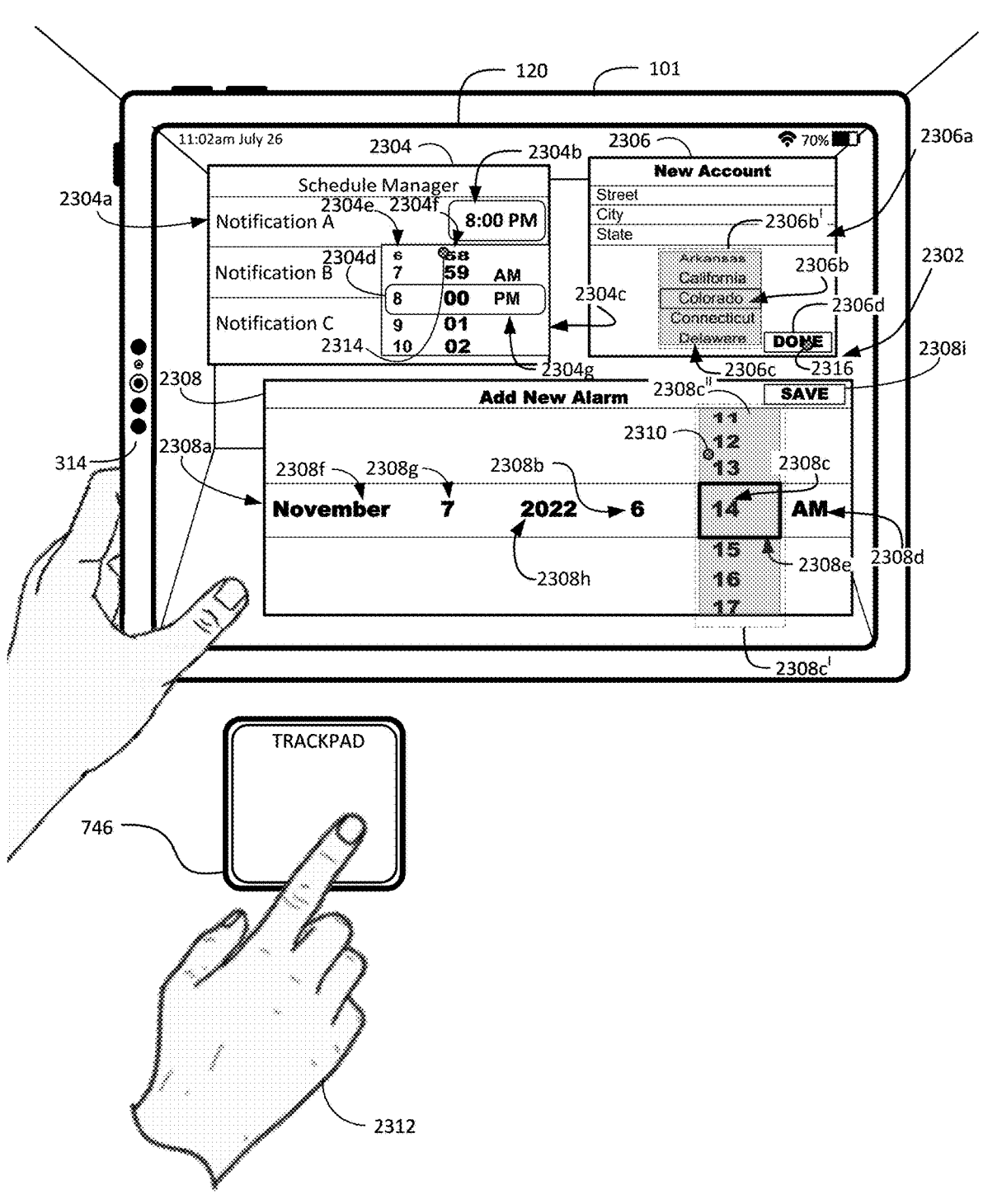

In the figures and examples that follow, the computer system 101 displays and navigates through the set of value options for the value selection user interface object in response to one or more characteristics (e.g., movement, direction, and/or duration) of the attention of the user. For example, from FIG. 23B to FIG. 23C, computer system 101 detects attention 2314 shift from selectable object 2304b to selectable component element 2304g of value selection user interface object 2304c. In response, as shown in FIG. 23C, computer system 101 displays selectable component element 2304g at a size and/or font style to emphasize the selectable component element 2304g relative to other selectable component elements of the value selection user interface object 2304c, such as selectable component element 2304f and 2304e. In some embodiments, computer system 101 navigates or scrolls a set of value options for a selectable component element through a selection region of that component element when the attention of the user is directed to the selectable component element as described with reference to method 2400. For example, from FIG. 23C to FIG. 23D, while the computer system 101 detects attention 2314 directed to selectable component element 2304g, computer system 101 navigates through the set of value options for selectable component element 2304g such that selection region 2304d includes the "PM" value option as shown in FIG. 23D instead of "AM" value option as shown in FIG. 23C. In some embodiments, computer system 101 detects that attention 2314 is directed to a location corresponding to the "PM" value option, and in response, the computer system navigates the selectable component element 2304g to include the "AM" value option in selection region 2304d as shown in FIG. 23D. In some embodiments, the value option included in the selection region 2304d is the value option selected for the selectable component element 2304g and selectable object 2304b as described with reference to method 2400. For example, in FIG. 23D, selectable object 2304b has been updated to reflect the "PM" value for the time being set in object 2304.

Figure 23E:
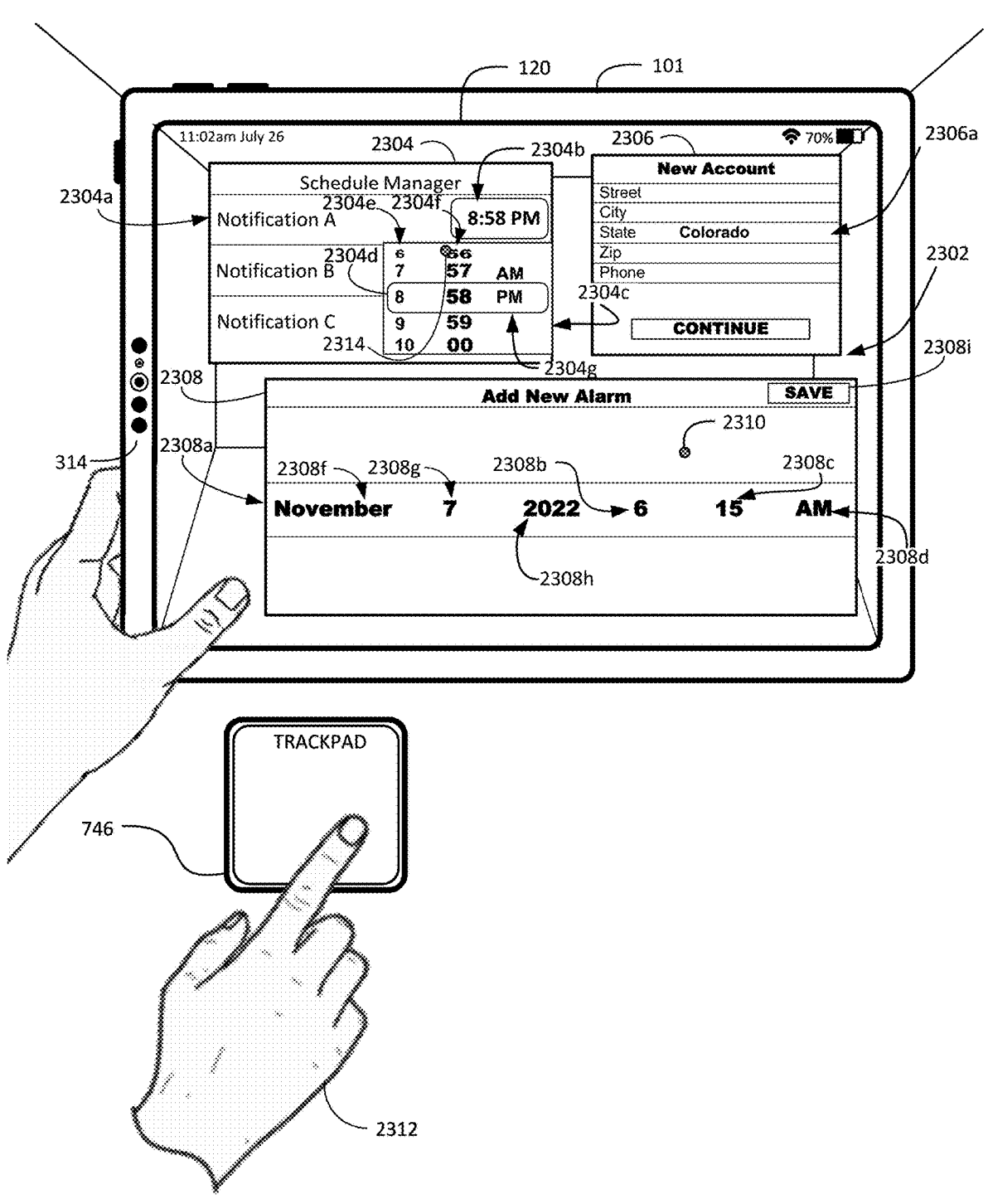

From FIG. 23C to FIG. 23D, computer system 101 detects attention 2314 shift from selectable component element 2304g to selectable component element 2304f. In response, as shown in FIG. 23D, computer system 101 displays selectable component element 2304f at a size and/or font style to emphasize the selectable component element 2304f relative to other selectable component elements of the value selection user interface object 2304c, such as selectable component elements 2304e and 2304g. In some embodiments, in response to detecting that the attention 2314 is directed away from selectable component element 2304g, computer system 101 ceases to display selectable component element 2304g at the size and/or font style to emphasize selectable component element 2304g as shown in FIG. 23D. In some embodiments, while the computer system 101 detects attention 2314 directed to selectable component element 2304f (e.g., a location within selectable component element 2304f corresponding to the "58" value option), as shown in FIG. 23D, the computer system 101 navigates through the set of value options for selectable component element 2304f such that selection region 2304d includes the "58" value option as shown in FIG. 23E instead of the "00" value option as shown in FIG. 23D. In this way, computer system 101 navigates through the set of value options for selectable component element 2304f such that selection region 2304d includes the "58" value option as shown in FIG. 23E in response to detecting that the attention of the user was directed to a location corresponding to the "58" value option as shown in the previous figure, FIG. 23D. In some embodiments, the computer system 101 optionally navigates or scrolls through the set of value options for selectable component element 2304f in a downwards direction to reveal value options from the top region of selectable component element 2304f that were not previously displayed (e.g., "57" and "56" value options) as shown in FIG. 23E. In some embodiments, the computer system 101 updates selectable object 2304b to reflect the value in the selection region 2304d. For example, the minutes value of selectable object 2304b is set to "58".

Figure 23F:
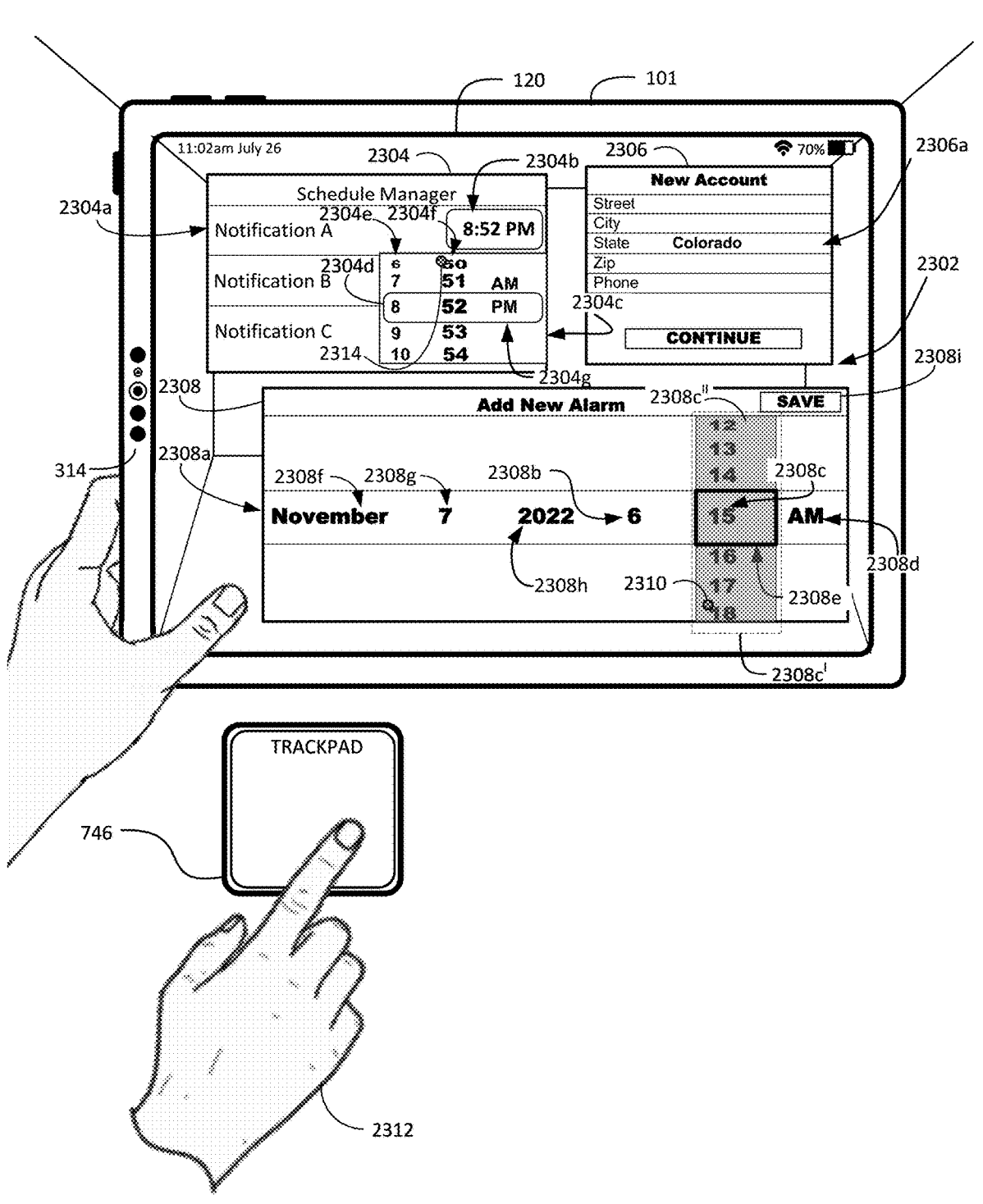

In some embodiments, computer system 101 continues to navigate through the set of value options in response to continued attention directed toward the selectable component element as described with reference to method 2400. In some embodiments, the manner (e.g., speed and/or direction) in which the computer system 101 navigates through the set of value options is based on the attention directed towards the selectable component element as described with reference to method 2400. For example, from FIG. 23D to FIG. 23E, attention 2314 is directed toward a top region of selectable component element 2304f, and from FIG. 23E to FIG. 23F, a duration of attention 2314 directed toward the top region of selectable component element 2304f has increased. In response, computer system 101 navigates through the set of value options for selectable component element 2304f at an increased speed to reveal value options: "54", "53", "52", "51", and "50" as shown in FIG. 23F. Value options "54", "53", "52", "51", and "50" were not previously included for display in selectable component element 2304f as shown in the previous FIG. 23E.

Figure 23G:
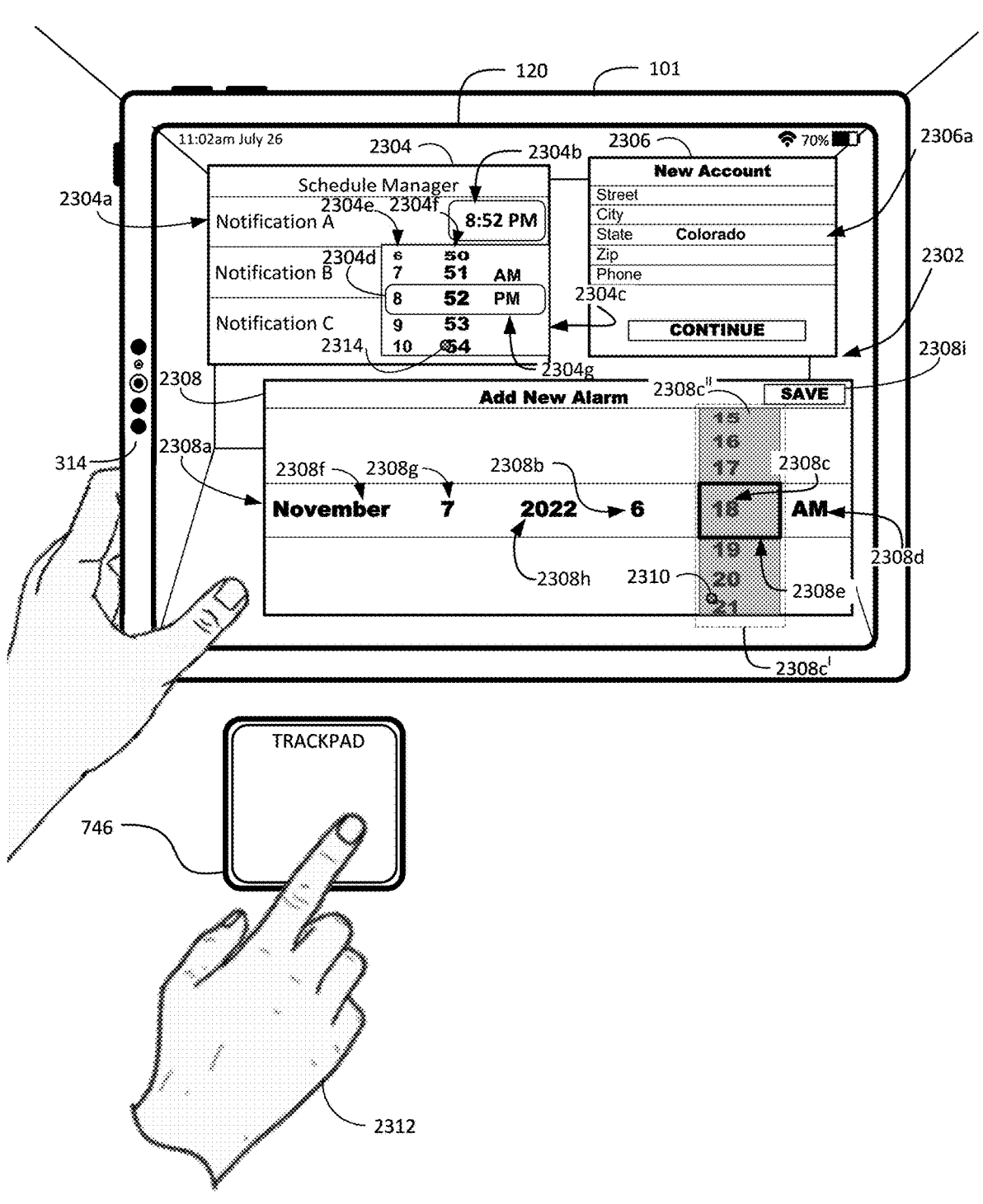
Figure 23H:
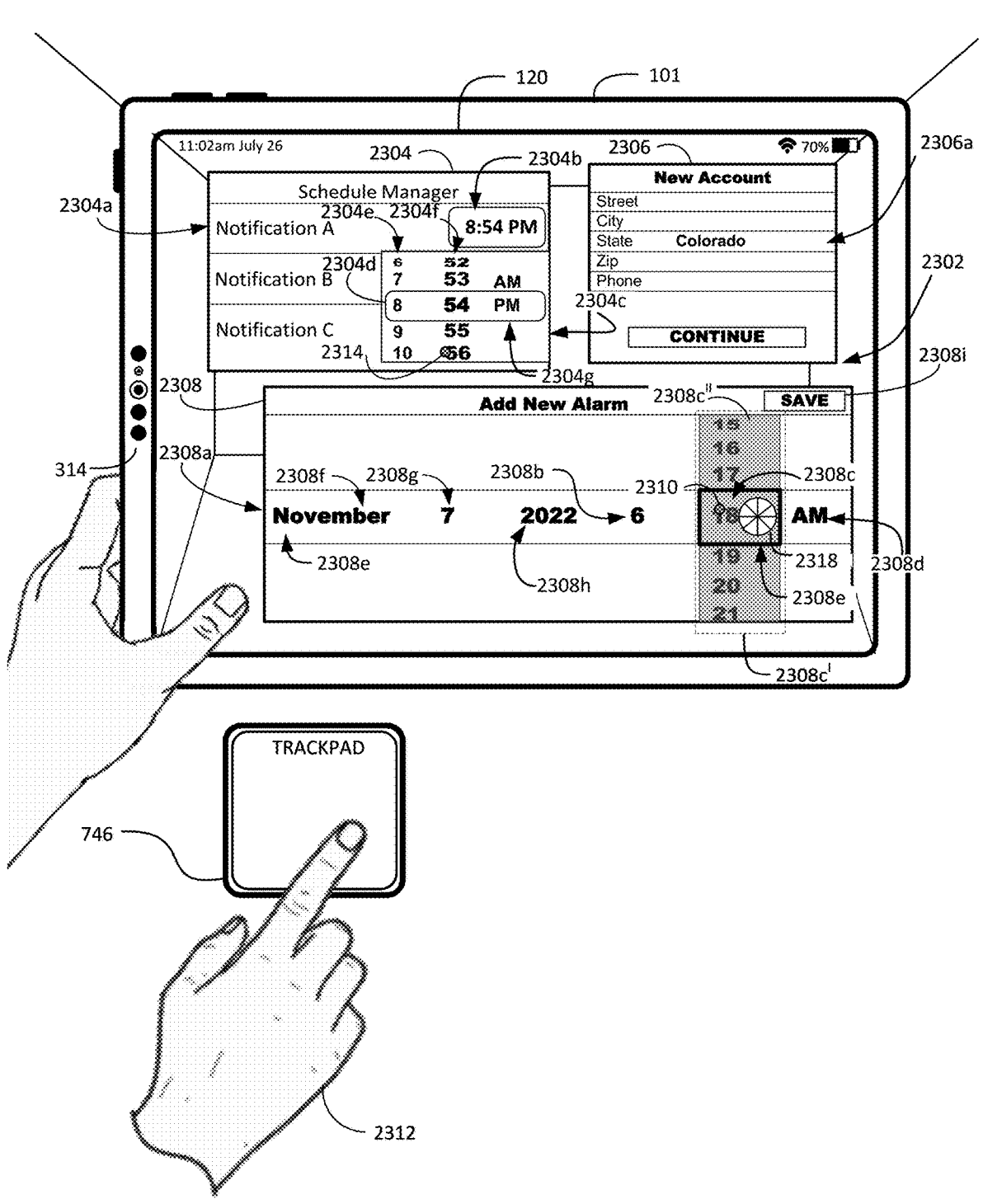

In some embodiments, the manner (e.g., speed and/or direction) in which the computer system 101 navigates through the set of value options is based on a direction of the attention directed towards the selectable component element as described with reference to method 2400. For example, from FIG. 23F to FIG. 23G, computer system 101 detects attention 2314 shift in a different direction, from the top region of selectable component element 2304f to the bottom or different region of selectable component element 2304f. In response, as shown in FIG. 23H, computer system 101 navigates through the set of value options for selectable component element 2304f in an upwards direction to reveal value options from the bottom region of selectable component element 2304f that were not previously displayed (e.g., "55" and "56" value options). In this example, selection region 2304d includes the "54" value option as shown in FIG. 23H instead of the "52" value option as shown in FIG. 23G. In some embodiments, the computer system 101 detects that attention 2314 is directed toward a region of selectable component element 2304f corresponding to value option "54", as shown in FIG. 23G, and in response the computer system 101 optionally navigates or scrolls through the set of value options for selectable component element 2304f accordingly such that selection region 2304d includes the "54" value option as shown in FIG. 23H instead of the "52" value option as shown in FIG. 23G. In some embodiments, the computer system 101 updates selectable object 2304b to reflect the value in the selection region 2304d. For example, the minutes value of selectable object 2304b is changed from "52" to "54" from FIG. 23G to FIG. 23H.

Figure 23I:
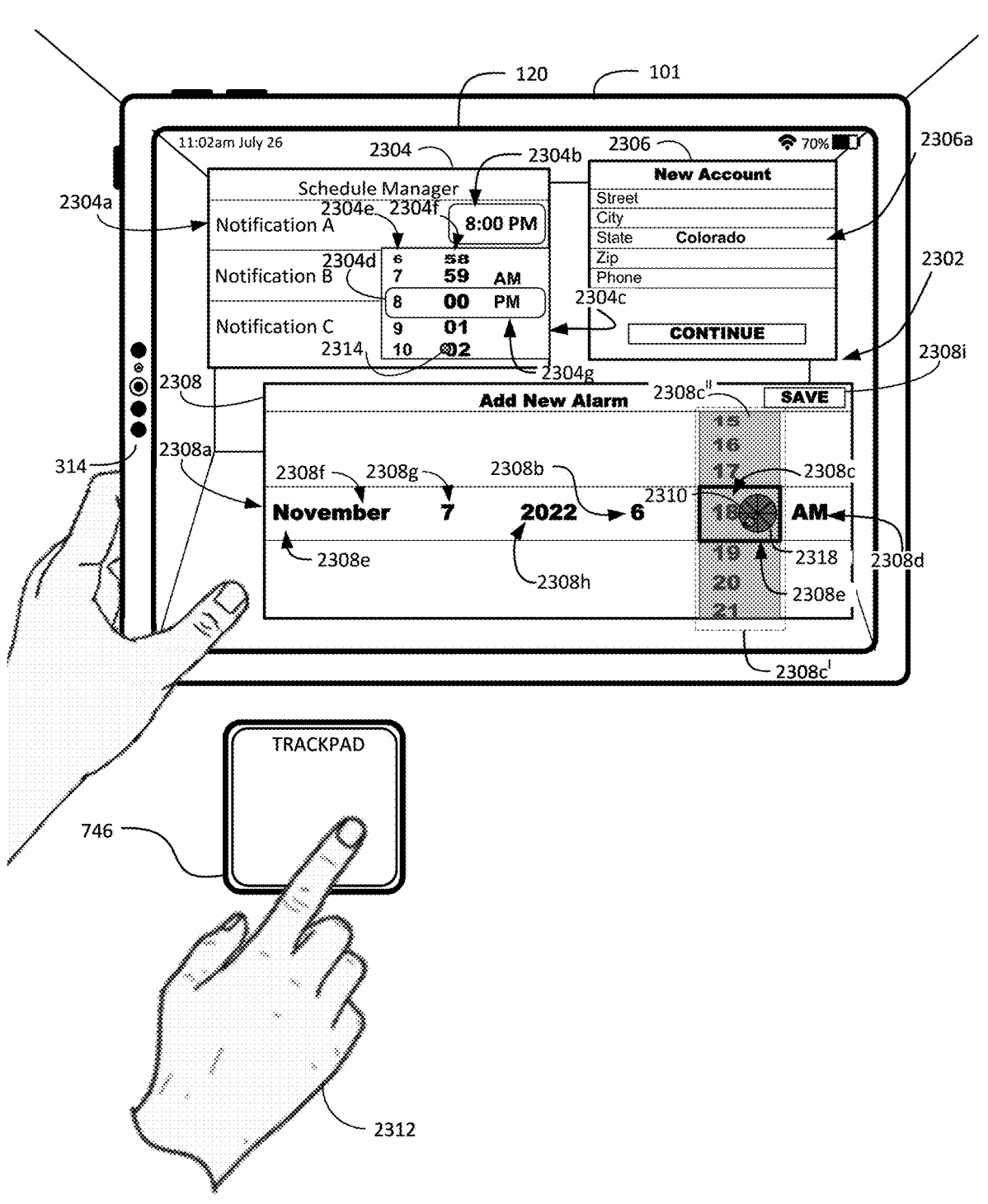

In some embodiments, computer system 101 continues to navigate through the set of value options in response to continued attention directed toward selectable component element 2304f, as shown in FIG. 23I such that selection region 2304d includes the "00" value option as shown in FIG. 23I instead of the "54" value option as shown in FIG. 23H. In some embodiments, in response to the computer system 101 detecting that the attention 2314 is directed toward selectable component element 2304f for a longer duration, the computer system 101 navigates through a greater number of value options as shown in the transition from FIG. 23H to FIG. 23I compared to the transition from FIG. 23G to FIG. 23H.

Figure 23J:
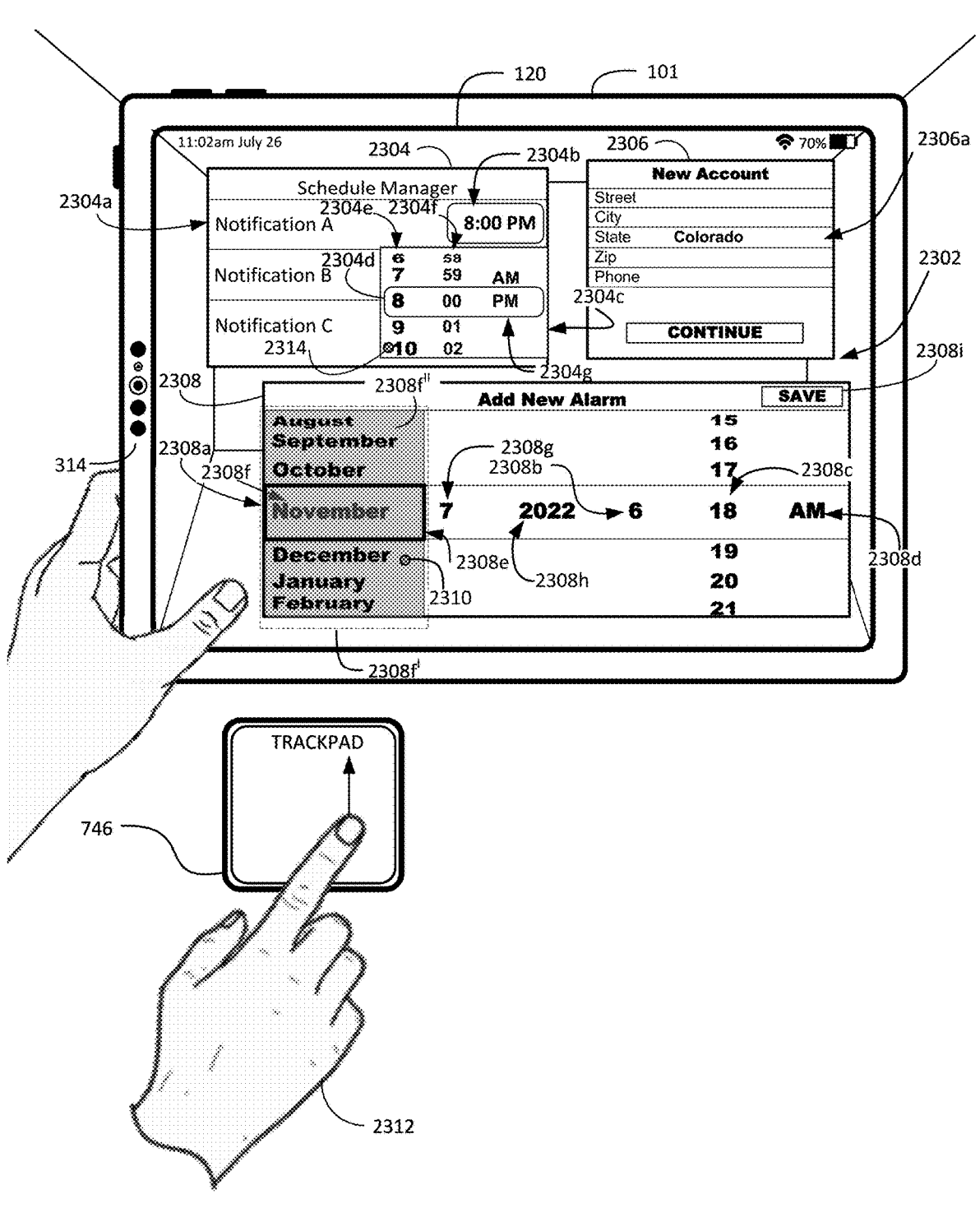
Figure 23K:
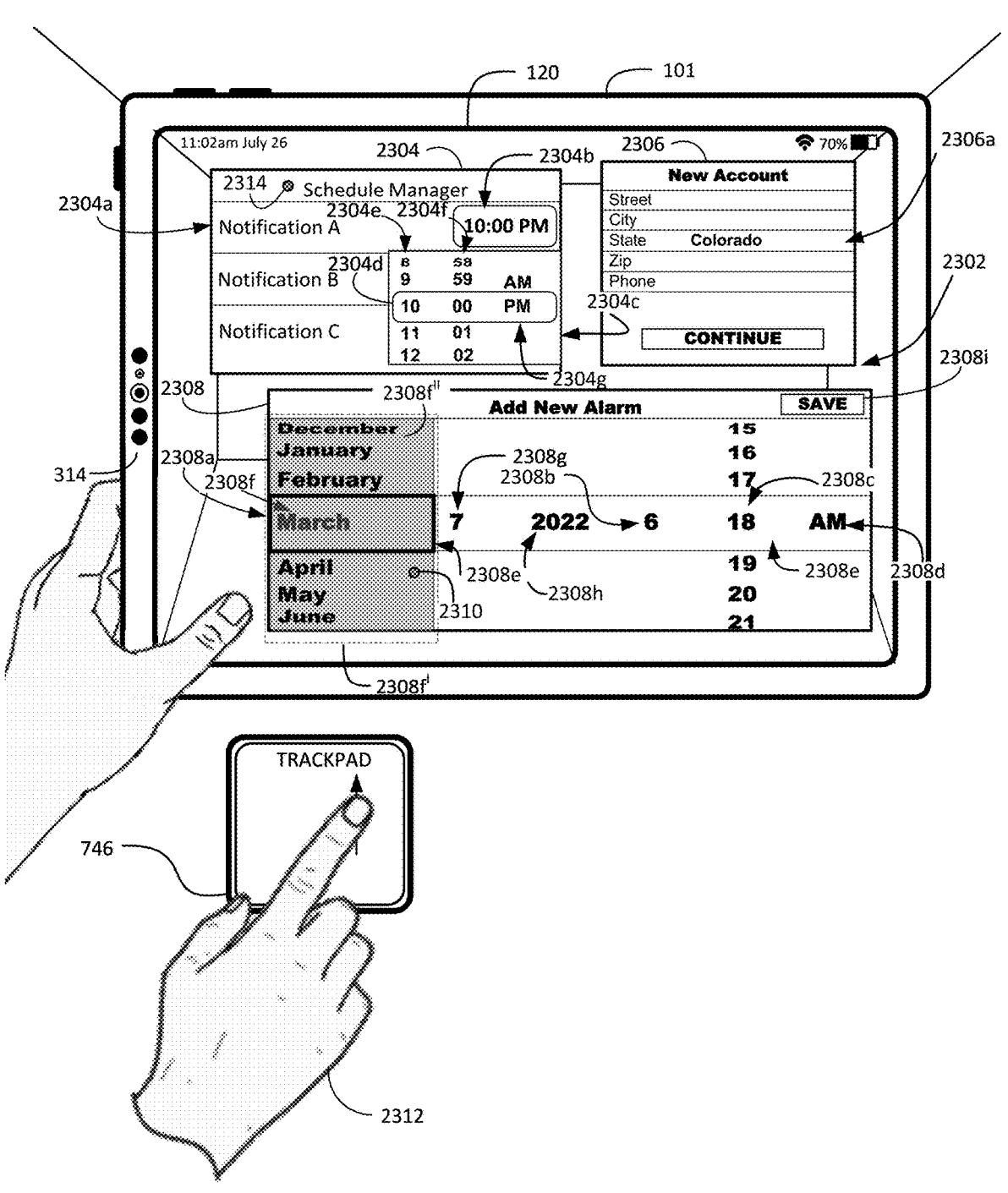

From FIG. 23I to FIG. 23J, attention 2314 is directed away from selectable component element 2304f and is directed toward selectable component element 2304e. In response, as shown in FIG. 23J, computer system 101 displays selectable component element 2304e at a size and/or font style to emphasize the selectable component element 2304e relative to other selectable component elements of the value selection user interface object 2304c, such as selectable component element 2304f and 2304g. In some embodiments, in response to detecting that the attention 2314 is directed away from selectable component element 2304f, computer system 101 ceases to display selectable component element 2304f at the size and/or font style to emphasize selectable component element 2304f as shown in FIG. 23I. In some embodiments, while the computer system 101 detects attention 2314 directed to selectable component element 2304e, as shown in FIG. 23J, the computer system 101 navigates through the set of value options for selectable component element 2304e such that selection region 2304d includes the "10" value option as shown in FIG. 23K instead of the "8" value option as shown in FIG. 23J. In this example, the computer system 101 detects that attention 2314 is directed toward a region of selectable component element 2304e corresponding to value option "10", and in response the computer system 101 optionally navigates or scrolls through the set of value options for selectable component element 2304e accordingly such that selection region 2304d includes the "10" value option as shown in FIG. 23K instead of the "8" value option as shown in FIG. 23J. In some embodiments, the computer system 101 optionally navigates or scrolls through the set of value options for selectable component element 2304e in an upwards direction to reveal value options from the bottom region of selectable component element 2304e that were not previously displayed (e.g., "11" and "12" value options).

Figure 23L:
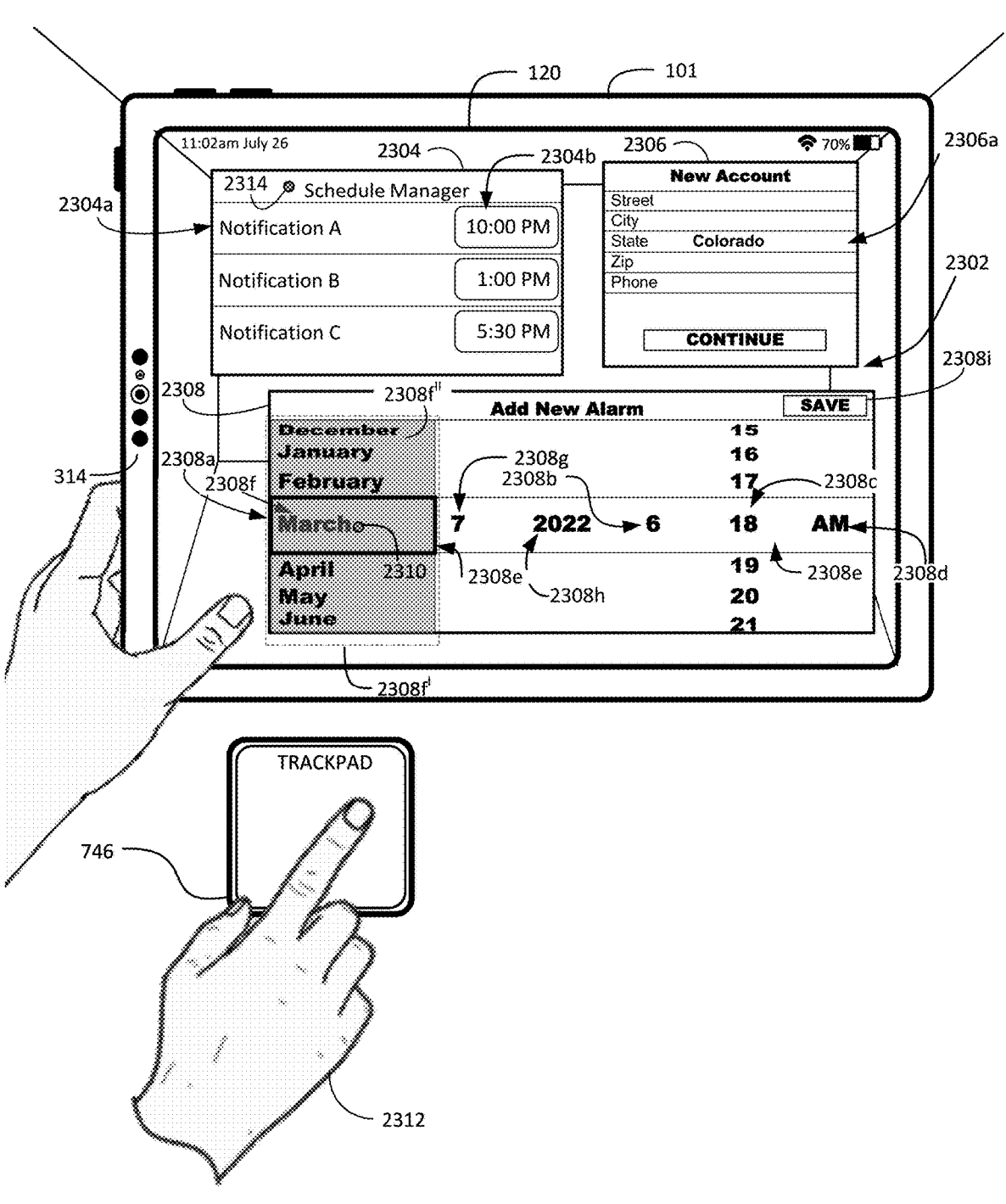

In some embodiments, the computer system 101 initiates a process to update the value of the component associated with the value selection user interface object as described with reference to method 2400. For example, in FIG. 23K, the computer system 101 detects that attention 2314 is directed away from value selection user interface object 2304c. In response, the computer system 101 updates the value of selectable object 2304b such that "Notification A" is scheduled to operate at 10:00 PM because selection region 2304d includes values "10:00 PM" before attention 2314 moved from being directed away from selectable component element 2304e. In some embodiments, the computer system 101 updates the value of selectable object 2304b and ceases to display value selection user interface object 2304c in response to detecting that attention 2314 is directed away from value selection user interface object 2304c as shown in FIG. 23L.

As shown by value selection user interface object 2304c, selectable component elements 2304e, 2304f, and 2304g are displayed in response to detecting that attention 2314 is directed to selectable object 2304b or directed to value selection user interface object 2304c. In contrast and in some embodiments, the computer system 101 displays a particular selectable component element (but not other selectable component elements) in response to detecting that attention is directed to a location corresponding to the particular selectable component element. For example, from FIG. 23A to FIG. 23B, the computer system detects that attention 2310 moves from a location in three-dimensional environment 2302 to a location corresponding to virtual content 2308b for selectable component element 2308b$^I$. In response to the attention 2310 directed to the location corresponding to virtual content 2308b$^{II}$ for selectable component element 2308b$^I$, the computer system 101 displays selectable component element 2308b$^{II}$, as shown in FIG. 23B. In some embodiments, displaying the selectable component element 2308b$^I$ includes displaying a subset of value options 2308b$^{II}$ for selectable component element 2308b$^I$ (e.g., virtual content/numeric values 3-9). In some embodiments, computer system 101 displays selectable component element 2308b$^I$ including the subset of value options 2308b$^{II}$ as highlighted (e.g., visually emphasized relative to other respective selectable component elements corresponding to virtual content 2308c, 2308d and 2308h) to emphasize that selectable component element 2308b' has been selected for interaction. In some embodiments, when selectable component element 2308b$^I$ is selected for interaction, the computer system 101 navigates or scrolls value options 2308b$^{II}$ for a selectable component element 2308b$^I$ through a selection region of that component element (e.g., selection region 2308e) when the attention of the user is directed to selectable component element 2308b$^I$ as described with reference to method 2400. In some embodiments, the value option included in the selection region is the value option selected for selectable component element 2308b$^I$ as described with reference to method 2400. For example, in FIG. 23B, selectable object 2308b has been updated to reflect the "16" value option for the alarm being via virtual object 2308. In some embodiments, the computer system 101 updates the value of selectable object 2308b to select the "16" value option within selection region 2308e in response to detecting that attention 2310 of the user satisfies the one or more criteria for selecting and/or updating the respective value for the selectable component element (e.g., as described in more detail with reference to method 2400).

In some embodiments, the computer system 101 detects that attention 2310 moves from the location corresponding to virtual content 2308b for selectable component element 2308b$^I$ to virtual content 2308c for selectable component element 2308c$^I$, as shown in FIG. 23B to FIG. 23C. In some embodiments, in response to detecting that attention 2310 moved from the location corresponding to virtual content 2308b for selectable component element 2308b$^I$ to virtual content 2308c for selectable component element 2308c$^I$, the computer system 101 no longer displays the subset of value options 2308b$^{II}$ for selectable component element 2308b$^I$ and selectable component element 2308b$^I$ with the degree of highlighting/coloring and instead, displays selectable component element 2308c$^I$ with a subset of value options 2308c$^{II}$ for selectable component element 2308c$^I$ (e.g., virtual content/numeric values 12-18) and with visual emphasis relative to other virtual content, such as virtual content 2308f, 2308g, 2308h, 2308b, and 2308d.

In some embodiments, as shown in FIG. 23C, virtual content 2308f, 2308g, 2308h, 2308b, 2308c, and 2308d are located within a selection region 2308e. In some embodiments, a respective value positioned within the selection region of the respective selectable component element is the value that will be selected for the respective selectable component element. For example, in FIG. 23C, the "15" value option of the subset of value options 2308c$^{II}$ is within the selection region of the selectable component element 2308c$^I$ and is the value that will be selected for selectable component element 2308c$^I$ when computer system 101 detects that attention 2310 of the user satisfies the one or more criteria for selecting and/or updating the respective value for the selectable component element 2308c$^I$ (e.g., as described in more detail with reference to method 2400). In some embodiments, the value that will be selected for selectable component element 2308c$^I$ changes to a value option other than "15". For example, from FIG. 23C to FIG. 23D, when the computer system detects that the attention 2310 of the user is moved away from selection region 2308*e* the location corresponding to virtual content 2308*c* for selectable component element 2308*c^I* to a location above the selection region of the selectable component element 2308*c^I*, the computer system 101 navigates through the value options 2308*c^II* such that the "14" value option is within the selection region of the selectable component element 2308*c^I* and is the value that will be selected for selectable component element 2308*c^I* when computer system 101 detects that attention 2310 of the user satisfies the one or more criteria for selecting and/or updating the respective value for the selectable component element 2308*c^I* (e.g., as described in more detail with reference to method 2400). However, in contrast to value selection user interface object 2304*c*, where the computer system 101 updates the value of selectable object 2304*b* to select values within the selection region 2304*d* in response to detecting that attention 2314 is directed away from value selection user interface object 2304*c* as shown in FIG. 23K and FIG. 23L, computer system 101 determines that one or more criteria are satisfied before updating, saving, and/or committing the value of the respective selectable component element. In this case, when the computer system 101 detects that the attention 2310 is directed away from the selectable component element 2308*c^I*, the computer system 101 optionally resets the value that is selected for selectable component element 2308*c^I* to value option "15" instead of value option "14" as shown in FIG. 23E with virtual content 2308*c*.

In some embodiments, navigating through the first set of value options (e.g., value options 2308*c^II* of FIG. 23F) is based on a location of the gaze of the user directed toward the first user interface object of the first component element, as described in method 2400. In some embodiments, the greater the distance of the location of the attention of the user from the selection region (e.g., current navigation position of the respective selectable component element), the greater the speed of navigating through the value options. For example, in FIG. 23F, the computer system 101 determines a first distance of the location of attention 2310 from selection region 2308*e* of selectable component element 2308*c^I*. The first distance is greater than the second distance in FIG. 23D, the second distance being a distance of the location of attention 2310 from selection region 2308*e* of selectable component element 2308*c^I* in FIG. 23D. In some embodiments, in response to the first distance being detected, the computer system navigates through the value options 2308*c^II* at a speed greater than the speed with which computer system 101 would navigate through the value options 2308*c^II* when the distance between attention 2310 and region 2308*e* is the second distance, as shown in FIG. 23G where value option "18" is within selection region 2308*e* of selectable component element 2308*c^I*. In this case, the computer system navigates through three value options: "16", "17", and "18" to include value option "18" in selection region 2308*e* of selectable component element 2308*c^I*. In contrast, in response to the second distance in FIG. 23D, the computer system navigates through one value option from "15" to include value option "14" in selection region 2308*e* of selectable component element 2308*c^I*, as shown in FIG. 23D.

In some embodiments, the computer system 101 displays a selectable component element as including a visual indication of progress towards the attention of the user towards satisfying one or more criteria (described with reference to methods 800, 900, 1000, 1200, and 2400) for selecting a respective value for the selectable component element using attention, and thereby for performing an operation associated with the value selection user interface object. For example, when the computer system 101 determines that attention 2310 of the user satisfies the one or more criteria for displaying a visual indication of progress towards the attention of the user towards satisfying one or more criteria (described with reference to methods 800, 900, 1000, 1200, and 2400), the computer system displays selectable component element 2308*c^I* including gaze virtual object 2318. In some embodiments, the computer system 101 optionally indicates the visual indication of progress by filling an unfilled portion of gaze virtual object 2318 in FIG. 23H. As shown in FIG. 23H to FIG. 23I, attention 2310 of the user is changed from being directed to selectable component element 2308*c^I* to being directed to the gaze virtual object 2318 associated with selectable component element 2308*c^I*. In response, as shown in FIG. 23I, the computer system 101 displays the gaze virtual object 2318 filled corresponding to the amount of time the attention 2310 of the user is directed towards the gaze virtual object 2318 associated with selectable component element 2308*c^I*. In some embodiments, the computer system 101 optionally analogously displays visual indications of such progress in other selectable component elements of FIG. 23I (e.g., selectable component elements corresponding to virtual content 2308*f*, 2308*g*, 2308*h*, 2308*b*, and 2308*d*).

In some embodiments, if the attention of the user satisfies the one or more criteria for selecting and/or updating the respective value for the selectable component element (e.g., as described in more detail with reference to method 2400), the computer system 101 selects and/or updates the respective value for the selectable component element. For example, from FIG. 23H to FIG. 23I, the computer system 101 displays the gaze virtual object 2318 as being filled in accordance with the attention 2310 of the user satisfying the one or more criteria for selecting and/or updating the respective value for the selectable component element 2308*c^I*. In FIG. 23I, the computer system detects that the attention 2310 of the user directed towards gaze virtual object 2318 has satisfied the criteria for selecting and/or updating the respective value (e.g., value option "18") for selectable component element 2308*c^I*, and in response the computer system 101 selects the respective value. In some embodiments, the computer system 101 then displays virtual content 2308*c* with the value "18", as shown in FIG. 23J.

In some embodiments, if the attention input of the user includes an activation input (e.g., as described in more detail with reference to methods 800, 900, 1000, and 2400), the computer system 101 performs the operation of navigating through respective value options for the selectable component element. In some embodiments, the computer system 101 displays selectable component element 2308*f* including value options 2308*f^II* (as shown in FIG. 23J) n response to the computer system 101 detecting that attention 2310 of the user directed towards selectable component element 2308*f*. In FIG. 23J, the attention 2310 of the user is directed away from the selection region 2308*e* of selectable component element 2308*f^II* and the computer system 101 detects an activation input (e.g., finger of hand 2312 touching trackpad 746 and/or an air pinch gesture from hand 2312). In some embodiments, as shown in FIG. 23J to FIG. 23K, the activation input includes input from hand 2312 corresponding to an input to navigate or scroll through (e.g., movement of hand 2312 in an upward direction) value options 2308*f^III* for selectable component element 2308*f*. In some embodiments, the activation input includes a drag input that changes a position of the hand 2312 from a first position (e.g., a start position of the drag) to a second position (e.g., an end position of the drag) while in the pinch hand shape. In some embodiments, in response to detecting the activation input while attention 2310 is directed toward selectable component element 2308f^I, the computer system 101 optionally navigates through value options 2308f^{II} for selectable component element 2308f^I such as updating the selection region 2308e of selectable component element 2308f^I to change from value option "November" to value option "March", as shown in FIG. 23J to FIG. 23K. In some embodiments, the amount of scrolling or navigating through value options 2308f^{II} for selectable component element 2308f^I corresponds to the amount and/or direction of movement by hand 2310 as described with reference to method 2400.

In some embodiments, if the activation input satisfies one or more criteria for selecting and/or updating the respective value for the selectable component element (e.g., as described in more detail with reference to method 2400), the computer system 101 selects and/or updates the respective value for the selectable component element. For example, in FIG. 23L, the computer system detects that the attention 2310 of the user is directed towards the selection region 2308e of selectable component element 2308f^I and while attention 2310 is directed toward the selection region 2308e of selectable component element 2308f^I which includes the "March" value option the computer system 101 detects an activation input (e.g., finger of hand 2312 touching or tapping trackpad 746 and/or an air pinch gesture from hand 2312). In some embodiments, the activation input includes input from hand 2312 corresponding to an input to select value option "March" (e.g., finger of hand 2312 touching the trackpad 746). In some embodiments, the activation input that was initially detected in FIG. 23L includes a release of the pinch air gesture (e.g., the user opens their two or more fingers, so they are no longer touching as described in method 2400). In some embodiments, in response to detecting the activation input while attention 2310 is directed toward the selection region 2308e of selectable component element 2308f^I, the computer system 101 optionally selects value option "March" for selectable component element 2308f^I. In some embodiments, the computer system selects value option "March" for selectable component element 2308f^I when the computer system 101 detects the activation input while attention 2310 is directed toward selectable component element 2308f^I. In some embodiments, the computer system 101 then displays virtual content 2308f with the value "March", as shown in FIG. 23M.

In some embodiments, the computer system 101 determines that one or more criteria are satisfied before updating, saving, and/or committing the value of the respective selectable component element. For example, in FIG. 23M, the computer system 101 detects that the attention 2310 is directed to selectable object 2308i, and in response, the computer system 101 determines that attention 2310 directed to selectable object 2308i satisfies one or more criteria for performing an operation associated with selectable object 2308i for setting up an alarm. If the computer system 101 determines that attention 2310 directed to selectable object 2308i satisfies the one or more criteria as described with reference to methods 800, 900, 1000, and 2400, the computer system commits the following values "Mar. 7, 2022, 6:18 AM" included in the selection region 2308e in FIG. 23M as part of setting up an alarm. In some embodiments, when the computer system 101 detects an activation input (e.g., finger of hand 2312 touching trackpad 746, an air pinch gesture from hand 2312 while attention 2310 is directed to selectable object 2308i, and/or air tap button while attention 2310 is directed to selectable object

Figure 23M:
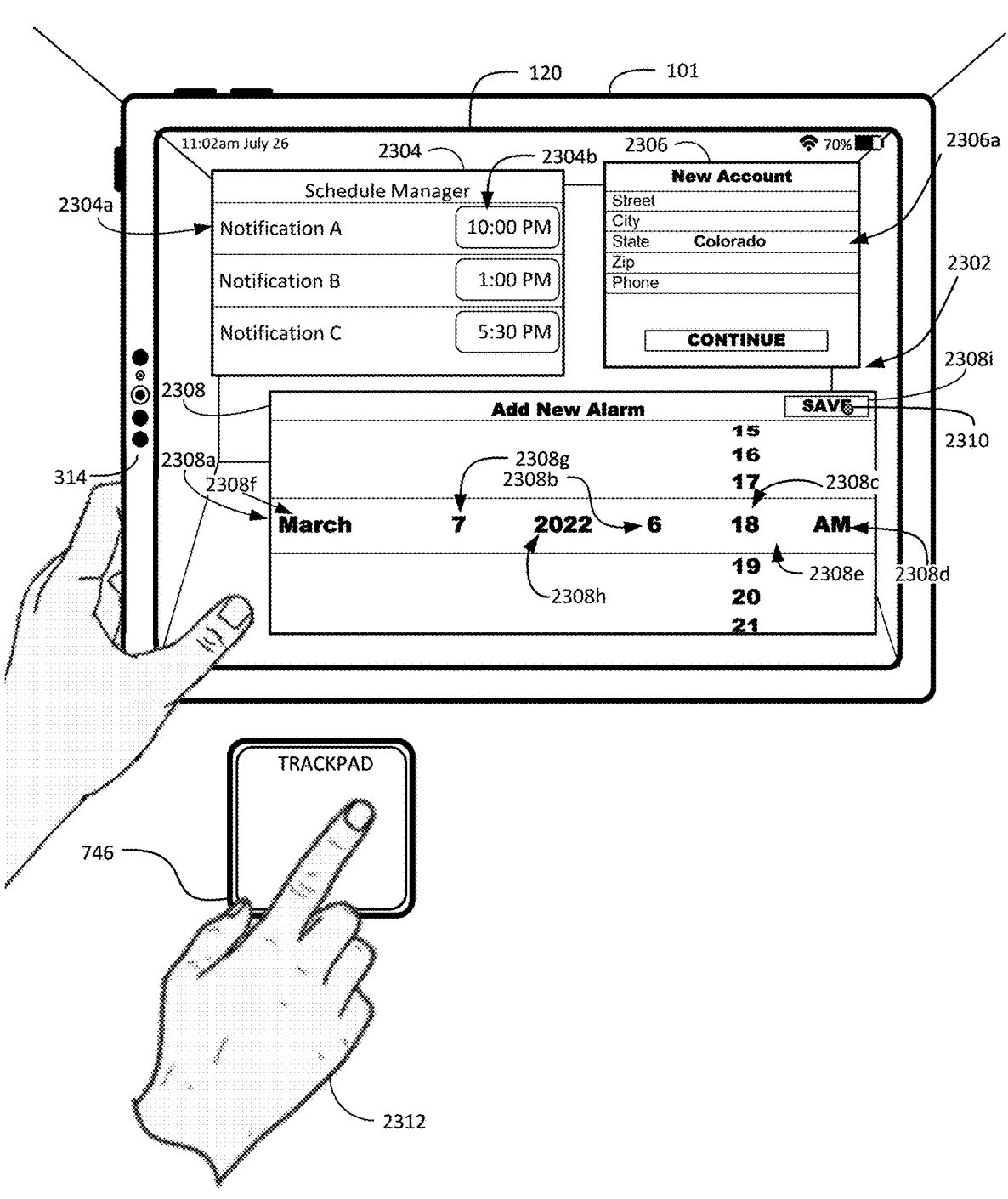
Figure 24F:
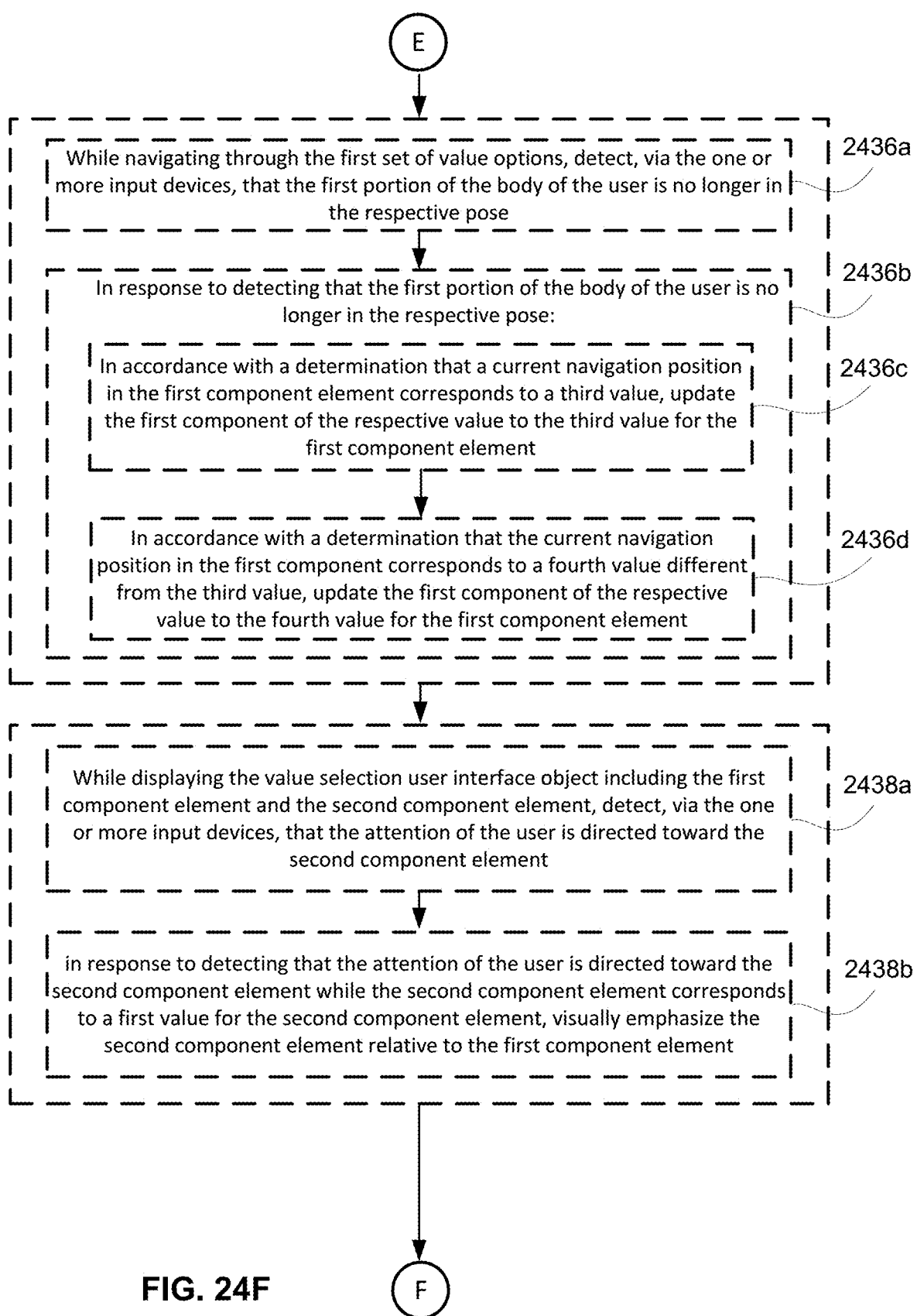

2308i), the computer system commits the values set in the selection region 2308e in FIG. 23M as part of setting up an alarm.

In some embodiments, the computer system 101 expands a virtual object to include a value selection user interface object in response to attention of the user being directed to the virtual object and/or a portion of the virtual object. For example, from FIG. 23A to FIG. 23B, the computer system 101 detects that attention (indicated as 2310 in FIGS. 23A and 2316 in FIG. 23B) moves from a location in three-dimensional environment 2302 in FIG. 23A to a location corresponding to selectable object 2306a that is selectable to identify a state value for an address associated with a new account using value selection user interface object 2306c shown in FIG. 23B. In response to detecting that attention 2316 is directed to the location corresponding to selectable object 2306a, the computer system 101 displays virtual object 2306 as expanded to include value selection user interface object 2306c shown in FIG. 23B. In some embodiments, the computer system 101 displays value selection user interface object 2306c having a first set of value options 2306b^I comprising state identifiers for value selection user interface object 2306c. In some embodiments, computer system 101 displays value selection user interface object 2306c including the first set of value options 2306b^I as visually emphasized (e.g., highlighted) to emphasize that value selection user interface object 2306c has been selected for interaction relative to other value selection user interface objects that may be present but not currently shown in FIG. 23B. In some embodiments, value selection user interface object 2306c includes one or more of the characteristics of other value selection user interface objects such as selectable component elements of virtual object 2308 described herein.

In some embodiments, the computer system 101 navigates through the first set of value options 2306b^I in response to detecting the attention 2316 of the user directed toward the value selection user interface object 2306c. For example, in FIG. 23C, the computer system detects that the attention 2316 of the user is directed toward a location corresponding to one of the value options (e.g., value option "Colorado") of the first set of value options 2306b^I and in response to detecting that the attention 2316 of the user is directed toward a location corresponding to value option "Colorado", the computer system displays value option "Colorado" in the selection region 2306b (e.g., current navigation position of the respective selectable component element), as shown in FIG. 23D. In some embodiments, navigating through the first set of value options 2306b^I includes one or more of the characteristics of navigating through a set of value options as previously described with respect to selectable component elements of virtual object 2308 described herein.

Similarly, to value selection user interface object 2308a, the computer system 101 determines that one or more criteria are satisfied before updating, saving, and/or committing the value option "Colorado" to value selection user interface object 2306c. For example, in FIG. 23D, the computer system 101 detects that the attention 2316 is directed to selectable object 2306d for saving the value option within selection region 2306b and that the attention directed to selectable object 2306d for saving the value option within selection region 2306b satisfies one or more criteria for saving the value option within selection region 2306b. If the computer system 101 determines that attention 2316 directed to selectable object 2306d satisfies the one or more criteria as described with reference to methods 800, 900, 1000, and 2400, the computer system commits value "Colorado" as the state identifier. In some embodiments, the computer system 101 then displays selectable object 2306*a* including value "Colorado" as the state value for an address associated with a new account, as shown in FIG. 23E. In some embodiments, when the computer system 101 detects an activation input (e.g., finger of hand 2312 touching trackpad 746, an air pinch gesture from hand 2312 while attention 2310 is directed to selectable object 2306*d*, and/or air tap button while attention 2310 is directed to selectable object 2306*d*), the computer system commits the value set in the selection region 2308*b* in FIG. 23D as part of the state value for the address.

FIGS. 24A-24H is a flowchart illustrating a method 2400 of displaying a value selection user interface object that is selectable, based on attention directed to the value selection user interface object, to navigate through options for the value selection user interface object and select a value from the options in accordance with some embodiments. In some embodiments, the method 2400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2400 are, optionally, combined and/or the order of some operations is, optionally, changed.

In some embodiments, method 2400 is performed at a computer system (e.g., 101) in communication with a display generation component and one or more input devices. For example, the computer system optionally has one or more of the characteristics of the computer systems of methods 800, 900, 1000, 1200, 1400, 1600, 1800, 2000, and/or 2200. In some embodiments, the display generation component has one or more of the characteristics of the display generation components of methods 800, 900, 1000, 1200, 1400, 1600, 1800, 2000, and/or 2200. In some embodiments, the one or more input devices have one or more of the characteristics of the one or more input devices described with reference to methods 800, 900, 1000, 1200, 1400, 1600, 1800, 2000, and/or 2200.

In some embodiments, the computer system displays (2402*a*), via the display generation component, a user interface that includes a value selection user interface object for selecting a respective value having a plurality of components associated with the value selection user interface object, such as value selection user interface object 2308*a* in FIGS. 23A and 23A1, wherein the value selection user interface object includes: a first component element corresponding to a first set of value options for a first component of the respective value associated with the value selection user interface object (2402*b*), such as selectable component element 2308*b*I including a subset of value options 2308*b*II in FIG. 23B; and a second component element corresponding to a second set of value options for a second component of the respective value associated with the value selection user interface object, wherein the second component element is different from the first component element and the second component element is displayed concurrently with the first component element (2402*c*), such as selectable component element 2308*c*I including a subset of value options 2308*c*II in FIG. 23C. In some embodiments, the user interface is displayed in or is a three-dimensional environment as described with reference to methods 800, 900, 1000, 1200, 1400, 1600, 1800, 2000, and/or 2200. In some embodiments, the user interface is a user interface as described with reference to methods 800, 900, 1000, 1200, 1400, 1600, 1800, 2000, and/or 2200. In some embodiments, the computer system displays the value selection user interface object for selecting multicomponent values of the respective value (e.g., a date value and/or a time value) in an application (e.g., an alarm application, a calendar application, a timer application, or a data entry application). For example, when selecting a time value, the time value optionally includes an hours component, a minutes component, and an AM/PM designation component. In this example, the value selection user interface object optionally includes the first component element corresponding to the first set of value options comprising hour numbers for the hours component of the time value. The value selection user interface object optionally includes a second component element corresponding to a second set of value options comprising minute numbers for the minutes component of the time value. The value selection user interface object optionally includes a third component element corresponding to a third set of value options comprising an AM identifier and a PM identifier for the AM/PM designation component of the time value. In another example, for a calendar date value with a months component, a days component, and a years component, the value selection user interface object optionally includes a first component element corresponding to a first set of value options comprising month identifiers for the months component of the calendar date value. The value selection user interface object optionally includes a second component element corresponding to a second set of value options comprising day identifiers for the days component of the calendar date value. The value selection user interface object optionally includes a third component element corresponding to a third set of value options comprising year numbers for the years component of the calendar date value. In some embodiments, the respective value optionally includes calendar date and time values. In this example, the value selection user interface object optionally includes the components described herein with respect to the time value and the components described herein with respect to the calendar date value. In some embodiments, the value selection user interface object corresponds to a timer value with an hours component, a minutes component, and a seconds component. For example, the value selection user interface object optionally includes a first component element corresponding a first set of value options comprising hour numbers for the hours component of the timer value. The value selection user interface object optionally includes a second component element corresponding to a second set of value options comprising minute numbers for the minutes component of the timer value. The value selection user interface object optionally includes a third component element corresponding to a third set of value options comprising seconds numbers for the seconds component of the timer value. In some embodiments, the computer system displays the value selection user interface object for a single value. For example, the value selection user interface object optionally includes a single component element corresponding to an enumeration of U.S. states for a state of residence component of a state of residence value. In some embodiments, the first component element is a moveable and/or rotatable user interface element such as a virtual scroll wheel, a virtual dial, a virtual slider, a virtual picker, or a virtual carousel configured to allow for presenting and navigating within a continuum or sequence of values.

In some embodiments, while displaying the value selection user interface object including the first component element and the second component element, the computer system detects (2402d), via the one or more input devices, attention of a user of the computer system directed toward the first component element, such as attention 2310 directed toward selectable component element 2308bI in FIG. 23B. In some embodiments, the computer system detects that the attention of the user is directed toward the first component element in one or more of the ways described with reference to methods 800 and/or 900. In some embodiments, the attention of the user was previously not directed to the first component element, and the computer system detects that the attention changes to being directed to a location (or portion) of the value selection user interface object that includes and/or corresponds to the first component element. In some embodiments, while the attention of the user is directed to the value selection user interface object and/or the first component element, the computer system displays the value selection user interface object with a visual representation (e.g., indication) of the user's attention as described with reference to methods 1200 and/or 2000.

In some embodiments, in response to detecting the attention of the user directed toward the first component element while the first component element corresponds to a first value for the first component element, the computer system visually emphasizes (2402e) the first component element relative to the second component element (and, optionally, relative to one or more other component elements and/or other portions of the value selection user interface object). For example and as illustrated in FIG. 23B, selectable component element 2308bI is visually emphasized relative to other selectable component elements including selectable component elements associated with virtual content 2308f, 2308g, 2308h, 2308c, and 2308d. In some embodiments, the computer system visually emphasizes the first component element relative to its surrounding component elements (e.g., other component elements for controlling different components of the respective value associated with the value selection user interface object) that are not detected as having the attention of the user directed towards them, such as by changing relative sizes, colors, transparency levels, opacity, highlighting, lighting, shadow and/or another display property. Visually emphasizing the first component element will be described in more detail with reference to step(s) 2408 and 2410.

In some embodiments, while the attention of the user is directed toward the first component element and while the first component element is visually emphasized relative to the second component element (24020, the computer system navigates (2402g) through the first set of value options for the first component of the respective value based on the attention (e.g., based on a location, duration, and/or movement as will be described with reference to step(s) 2416; 2418a-c; 2420a-c; 2422; 2424a-d; 2442a; 2442b; 2448a; and 2448b) of the user directed toward the first component element from the first value for the first component element to a second value for the first component element (e.g., without navigating through the second value options for the second component of the respective value), such as navigating from the first value for selectable component element 2308cI in FIG. 23C to the second value in FIG. 23D based on attention 2310. In some embodiments, the computer system navigates or scrolls through the first set of value options vertically. In some embodiments, the first component element includes a current navigation position containing a current value option (e.g., "October"). As will be described herein, while the attention of the user is directed toward the first component element and while the first component element is visually emphasized, the computer system optionally navigates through the first set of value options so as to change the current value option corresponding to the current navigation position. In some embodiments, the computer system detects that the attention of the user is directed toward a region (e.g., top, bottom, left, or right) of the current navigation position region of the first component element, and navigates or scrolls the first component element accordingly. For example, if the computer system detects that the attention of the user is directed toward the top region of the current navigation position region, the computer system navigates through the first set of value options for the first component of the respective value in an downwards direction to reveal value options from the top of first component element that were not previously displayed before navigating, and continues to do so while the attention of the user is directed toward the top region. In another example, if the computer system detects that the attention of the user is directed toward the bottom region of the current navigation position region, the computer system navigates through the first set of value options for the first component of the respective value in an upwards direction to reveal value options from the bottom of first component element that were not previously displayed before navigating, and continues to do so while the attention of the user is directed toward the bottom region. In another example, the computer system optionally navigates to a value option (e.g., "November") in the first set of value options (e.g., month identifiers for the months component of the calendar date value) based on the attention of the user directed toward the first component element (e.g., based on which edge region of the current navigation position region of the first component element the computer system detects as having the attention of the user). For example, when the computer system detects that the attention of the user is directed toward a bottom region of the current navigation position region of the first component element, the computer system navigates to the value option (e.g., "November") positioned below the current value option (e.g., "October"). In some embodiments, when the computer system detects that the attention of the user is directed toward a top region of the current navigation position region of the first component element, the computer system navigates to the value option (e.g., "September") positioned above the current value option (e.g., "October"). In some embodiments, the computer system displays the month identifiers for the months component of the calendar date value as a continuous wheel in the first component element. For example, the computer system optionally navigates to "January" when scrolling past "December." As will be described in more detail with reference to step(s) 2416; 2418a-c; 2420a-c; 2422; 2424a-d; 2442a; 2442b; 2448a; and 2448b, navigating through the first set of value options for the first component of the respective value is optionally based on a sequence or combination of user inputs including the attention of the user directed toward the first component element. In some embodiments, the computer system ceases to navigate through the first set of value options when the computer system detects that the attention of the user is directed away from the first component element. For example, the computer system optionally switches to navigating through a second set of value options of a second component element as described later with reference to step(s) 2440*a-c*; 2442*a*; and 2442*b*; when the computer system detects that the attention of the user is directed towards the second component element (e.g., away from the first component element). In some embodiments, the computer system ceases to display the first component element as visually emphasized or reduces the visual emphasis of the first component element when the attention of the user is directed away from the first component element. In some embodiments, the first component element is configured to navigate in another direction other than vertically (e.g., horizontally, diagonally, or any orientation that assists in navigating through the first set of value options), and attention directed to different corresponding distal positions along such a direction analogously causes scrolling in different directions through the values. In some embodiments, while navigating through the first set of value options for the first component, the computer system does not navigate through the second set of value options for the second component. In some embodiments, if the computer is navigating through the second set of value options for the second component, the computer system does not navigate through the first set of value options for the first component.

In some embodiments, after navigating through the first set of value options for the first component of the respective value based on the attention of the user directed toward the first component element, the computer system initiates (2402*h*) a process to update the respective value based on selection of the second value for the first component element (e.g., by attention of the user), such as after navigating through a subset of value options 2308*c*II for selectable component element 2308*c*I in FIG. 23D to FIG. 23E, the virtual content 2308*c* is updated. In some embodiments, initiating the process to update the respective value based on selection of the second value for the first component includes changing the first component of the respective value for the value selection user interface object and/or in an application (e.g., an alarm application, a calendar application, a timer application, or a data entry application) from the first value to the second value. In some embodiments, the second value is different from the first value. In some embodiments, and as will be described with reference to step(s) 2404*a* and 2404*b*, the computer system initiates the process to update the respective value in response to determining that the attention of the user directed towards the first component element satisfies one or more first criteria while a current navigation position in the first component element corresponds to the second value for the first component element. It is understood that although the embodiments described herein are directed to the first component element, such functions and/or characteristics, optionally apply to other component elements including the second component element. Updating a value for a value selection user interface object based on the attention of the user reduces the number of inputs needed to update the value, enables selection of a value while viewing a range of selectable values, and reduces errors in the interaction between the user and the computer system (e.g., by avoiding unintentional selection of selectable values), thereby reducing inputs needed to correct such errors.

In some embodiments, while navigating through the first set of value options based on the attention of the user directed toward the first component element, the computer system detects (2404*a*), via the one or more input devices, that the attention of the user directed towards the first component element satisfies one or more first criteria while a current navigation position in the first component element corresponds to the second value for the first component element that is different from the first value for the first component element, such as attention 2310 directed towards gaze virtual object 2318 in FIG. 23I. In some embodiments, the one or more first criteria include a criterion that is satisfied when the attention of the user is directed towards the first component element for a first period of time greater than a first threshold amount of time (e.g., 0.1, 0.5, 1, 2, 3, 5, 7, 10, 20, 30, or 60 seconds) and/or the attention of the user is directed towards a gaze target associated with the current navigation position, similar to as described with reference to methods 800, 900, and/or 1000. In some embodiments, the one or more first criteria include a criterion that is satisfied when the current navigation position in the first component element corresponds to the first value for a second period of time greater than a second threshold amount of time (e.g., 0.02, 0.05, 0.1, 0.2, 0.25, 0.3, 0.5, 1, 2, 3, 5, 10, 15, 20, or 30 seconds). In some embodiments, the one or more first criteria include a criterion that is satisfied when the attention of the user is directed towards the current navigation position in the first component element corresponding to the first value for a third period of time greater than the first threshold amount of time.

In some embodiments, initiating the process to update the first component of the respective value to the second value for the first component element is in response to detecting that the attention of the user directed towards the first component element satisfies the one or more first criteria while the current navigation position in the first component element corresponds to the second value (2404*b*), such as attention 2310 in FIG. 23F directed towards selectable component element 2308*c*I initiates the process to update virtual content 2308*c* as shown in FIG. 23G. In some embodiments, initiating the process to update the first component of the respective value to the second value includes setting the first component of the respective value for the value selection user interface object and/or in an application (e.g., an alarm application, a calendar application, a timer application, or a data entry application) to the second value. In some embodiments, the computer system initiates the process to update the first component of the respective value to the second value when the attention of the user directed towards the first component element satisfies the one or more first criteria while the current navigation position in the first component element corresponds to the first value. In some embodiments, the computer system disregards the attention of the user and/or one or more user inputs directed towards the first component element while the current navigation position in the first component element does not correspond to the second value or any of the first set of value options. In this embodiment, the computer system is optionally navigating or in a process of cycling through the first set of value options such that the current navigation position in the first component element does not correspond to the second value for a first period of time greater than the second threshold amount of time. In some embodiments, the computer system does not initiate the process to update the first component of the respective value to the second value until the computer system detects the attention of the user directed towards the first component element satisfies the one or more first criteria while the current navigation position in the first component element corresponds to the second value (or any value of the first set of value options). In some embodiments, in response to detecting that the attention of the user directed towards the first component element does not satisfy the one or more first criteria while the current navigation position in the first component element corresponds to the second value, the computer system forgoes initiating the process to update the first component of the respective value to the second value and optionally, and/or continues navigating through the first set of value options for the first component of the respective value based on the attention of the user directed toward the first component element as described herein and in more detail with reference to step(s) 2406; 2416; 2418*a-c*; 2420*a-c*; 2422; and 2424*a-d*. In some embodiments, if the computer system detects that the attention of the user directed towards the current navigation position in the first component element satisfies the one or more first criteria while the current navigation position in the first component element corresponds to the second value different from the first value, the computer system initiates a process to update the first component of the respective value to the second value, having one or more of the characteristics of the process to update the first component of the respective value to the second value. Updating a value for a value selection user interface object based on the attention of the user, and doing so when the attention of the user satisfies one or more first criteria, reduces the number of inputs needed to update the value, enables selection of a value while viewing a range of selectable values, and reduces errors in the interaction between the user and the computer system (e.g., by avoiding unintentional selection of selectable values), thereby reducing inputs needed to correct such errors.

In some embodiments, the attention of the user is based on a gaze of the user (2406) (e.g., attention being directed toward a particular element corresponds to the gaze of the user being directed to that particular element), such as attention 2314 in FIG. 23B. In some embodiments, when user attention corresponds to gaze, a gaze tracking device optionally captures one or more images of the user's eyes and detects the pupils and glints in the one or more captured images to track the user's gaze, as described in more detail with reference to FIG. 6. In some embodiments, the attention of the user is optionally an attention-only and/or gaze-only input (e.g., not including input from one or more portions of the user other than those portions providing the attention input). Allowing for interaction inputs to include attention of a user increases accessibility for interaction and reduces inputs involved with interacting with a value selection user interface object.

In some embodiments, visually emphasizing the first component element relative to the second component element includes displaying a first user interface object for selecting a value for the first component of the respective value, wherein the first user interface object was not displayed before the attention of the user was directed to the first component element (2408), such as value selection user interface object 2304*c* in FIG. 23B. In some embodiments, the first user interface object for selecting the value for the first component of the respective value is a container (e.g., box) and is configured to display the first component element including the first set of value options for the first component of the respective value within a visible or an invisible border of the container. In some embodiments, and as described with reference to step(s) 2408 and 2410, the container is displayed with a second color different (e.g., brighter and/or highlighted) from a first color when the attention of the user is directed away the first component element and not displayed as emphasized relative to the second component element. In some embodiments, the first user interface object for selecting the value for the first component of the respective value includes a selection region of the first component element as described with reference to step(s) 2426*a* and 2426*b*. In some embodiments, the first user interface object for selecting the value for the first component of the respective value corresponds to a moveable and/or rotatable user interface element such as a virtual scroll wheel, a virtual dial, a virtual slider, a virtual picker, or a virtual carousel configured to allow for presenting and navigating through the first set of value options. In some embodiments, the first user interface object for selecting the value for the first component of the respective value is not displayed when the attention of the user is directed away the first component element. It is understood that although the embodiments described herein are directed to the first component element, such functions and/or characteristics, optionally apply to other component elements including the second component element. Displaying the first user interface object for selecting the value for the first component of the respective value only when the attention of the user is directed toward the first component element frees up space for display in a user interface, and reduces clutter.

In some embodiments, visually emphasizing the first component element relative to the second component element includes increasing a visual prominence of the first component element relative to the second component element (2410), such as selectable component element 2304*g* in FIG. 23B displayed with an increased visual prominence relative to selectable component elements 2304*f* and 2304*e*. In some embodiments, the first component element is initially displayed with a first visual appearance having a first shape, a first location, a first size, a first color, and/or a first effect. In some embodiments, when the computer system detects the attention of the user directed at the location of the value selection user interface object that includes the first component element for greater than the first threshold amount of time as described with reference to step(s) 2404*a* and 2404*b*, the computer system displays the first component element with a second visual appearance different from the first visual appearance and/or a first visual appearance (e.g., having a first shape, a first location, a first size, a first color, and/or a first effect) of the second component element. In some embodiments, the computer system visually emphasizes the first component element in response to detecting that the attention of the user is directed to a location of the first component element. The second visual appearance optionally makes the first component element more prominent. For example, the second visual appearance of the first component element optionally includes a second shape larger than the first shape, a second location closer to the viewpoint of the user than the first location, a second color brighter (e.g., more saturated and/or greater contrast) than the first color, a second degree of opacity greater the first degree of opacity, a second degree of brightness greater than the first degree of brightness, a second degree of clarity greater than the first degree of clarity (e.g., less blurry), a second size larger than the first size, and/or a second effect where the first component element appears to lift up from a backplane of the user interface more than the first effect (e.g., the second effect visually indicates the first component element emphasized by a depth effect). In some embodiments, the second visual appearance includes presenting additional graphics or increasing a prominence of the graphics (e.g., displaying a container border and/or displaying a container border with increased thickness) associated with the first component element that was not shown with the first visual appearance. In some embodiments, the second visual appearance includes displaying the first set of value options with an increased brightness, size, text weight, and/or visual appearance as described with reference to the first component element herein. In some embodiments, the first component element is not displayed with an increased visual prominence when the attention of the user is directed away the first component element. It is understood that although the embodiments described herein are directed to the first component element, such functions and/or characteristics, optionally apply to other component elements including the second component element. Increasing a visual prominence of the first component element relative to the second component element when the attention of the user is directed toward the first component element ensures visibility of the first component element when selection is likely, and reduces correction inputs involved with selecting the first component element.

In some embodiments, the first set of value options for the first component of the respective value corresponds to a date (2412) (e.g., calendar date, time value, or both), such as value options 2308/II for selectable component element 2308/I in FIG. 23J. For example, the first set of value options optionally includes months, days of the months, years, hours, minutes, and/or or AM/PM identifiers. In some embodiments, the first set of value options for the first component of the respective value defaults to a current date and is optionally based on the computer system's locale. For example, certain locales present days before months, or present a 24-hour clock instead of a 12-hour clock. In some embodiments, the user of the computer system can set the default value with a specific date and/or change the computer system's locale. Navigating through the first set of value options for the first component of the respective value corresponding to a date provides an efficient way of presenting date options without requiring the user to provide further inputs to navigate within the user interface, thereby reducing the number of inputs and providing more efficient interactions between the user and the computer system.

In some embodiments, the first set of value options for the first component of the respective value corresponds to time (2414) (e.g., point in time or time interval for a timer), such as value options for selectable component element 2304g in FIG. 23C. For example, the first set of value options optionally includes hours, minutes, seconds, and/or AM/PM identifiers. In some embodiments, the first set of value options for the first component of the respective value defaults to a zero value and is optionally based on the computer system's locale. For example, certain locales present a 24-hour clock instead of a 12-hour clock. In some embodiments, the user of the computer system can set the default value with a specific value or specific time and/or change the computer system's locale. Navigating through the first set of value options for the first component of the respective value corresponding to a time provides an efficient way of presenting time options without requiring the user to provide further inputs to navigate within the user interface, thereby reducing the number of inputs and providing more efficient interactions between the user and the computer system.

In some embodiments, navigating through the first set of value options based on the attention of the user directed toward the first component element includes navigating through the first set of value options based on gaze of the user directed toward the first component element (2416), such as attention 2314 directed toward selectable component element 2304f in FIG. 23D. In some embodiments, navigating through the first set of value options is based on a location of the gaze of the user directed toward the first component element. For example, the computer system optionally detects that the location of the gaze of the user corresponds to a region (e.g., top, bottom, left, or right) of the current navigation position region of the first component element as described with reference to step(s) 2422; 2426a and 2426b; and 2424a-d. In some embodiments, navigating through the first set of value options is based on a location of the gaze of the user directed toward the first user interface object of the first component element described in step(s) 2406; 2420a-c, and 2422. In some embodiments, the computer system determines a distance of the location of the gaze of the user from the current navigation position region of the first component element. In some embodiments, the greater the distance of the location of the gaze of the user from the current navigation position, the greater the speed of navigating through the first set of value options as will be described in step(s) 2420a-c; and 2422; 2424a-d. In some embodiments, in accordance with a determination that the location of the gaze of the user corresponds to the current navigation position region for a period of time greater than the second threshold amount of time, the computer system displays a first user interface element associated with the value selection user interface object (e.g., numeric keyboard user interface element). In some embodiments, the first user interface element associated with the value selection user interface object is configured to provide numeric data (e.g., alphanumeric keyboard). In some embodiments, the computer system detects that the location of the gaze of the user is directed toward a region corresponding to a first value option and an activation input (e.g., user input confirming intent to select the first value). In some embodiments, in response to detecting the location of the gaze of the user directed toward the region corresponding to the first value option and the activation input, the computer system navigates through the first set of value options so as to change the current value option to the first value option corresponding to the current navigation position as will be described with reference to step(s) 2402a-h; 2404a; 2404b; 2426a and 2426b. In some embodiments, navigating through the first set of value options is based on a duration of the gaze of the user directed toward the first component element. In some embodiments, while navigating through the first set of value options, the computer system detects a duration of the gaze of the user directed toward the first component element changing from a first gaze duration to a second gaze duration and in response to detecting the gaze of the user directed toward the first component changing from the first gaze duration to the second gaze attention duration, the computer system navigates through the first set of value options with a changed respective characteristic or manner corresponding to the duration of the gaze of the user as described with reference to step(s) 2424a-d. In some embodiments, navigating through the first set of value options is based on movement (e.g., speed and/or direction) of the gaze of the user directed toward the first component element. In some embodiments, the computer system determines there is movement of the gaze of the user, tracks the movement of the gaze of the user, and navigates through the first set of value options accordingly until the computer system detects lack of movement of the gaze of the user. In some embodiments, a speed and/or direction of the gaze of the user may indicate the user's navigation speed and/or direction. For example, the computer system increases the speed of navigating through the first set of value options in response to a large or sudden speed and/or direction of the user's gaze, while small or slow movements of the user's gaze decreases the speed of navigating through the first set of value options. In some embodiments, in response to detecting lack of movement of the gaze of the user, the computer system ceases navigating through the first set of value options. In some embodiments, and as described with reference to step(s) 2412 and 2414, the computer system resets and/or updates the first component of the respective value to a default value of the first component element in response to detecting that the attention of the user is moved away from the first component element (e.g., at a location that does not include the first component element). Navigating through the first set of value options in response to gaze-based interaction with the first component element provides quick access to the first set of value options without requiring the user to provide further inputs to navigate within the value selection user interface object, thereby reducing the number of inputs and providing more efficient interactions between the user and the computer system.

In some embodiments, navigating through the first set of value options based on the gaze of the user directed toward the first component element includes (2418*a*): in accordance with a determination that a location of the gaze of the user in the first component element is a first location, the computer system navigates (2418*b*) through the first set of value options in a first manner and in accordance with a determination that the location of the gaze of the user in the first component element is a second location, different from the first location, the computer system navigates (2418*c*) through the first set of value options in a second manner, different from the first manner, such as navigating through value options for selectable component element 2304*f* in FIG. 23E to 23F in a first direction based on the location of attention 2314 compared to navigating through the value options in a second direction, different from the first direction, based on the location of attention 2314 in FIG. 23G to 23H. For example, the first location is optionally a first distance from the first component element (e.g., the current navigation position) and the second location is optionally a second distance from the first component element. In some embodiments, the second distance is greater than the first distance (e.g., farther from the current navigation position). In some embodiments, the computer system navigates through the first set of value options in the first manner (e.g., first speed). In some embodiments, the computer system navigates through the first set of value options in the second manner greater than the first manner (e.g., speed is increased). In some embodiments, the first location corresponds to a first position above the current navigation position and the second location corresponds to a second position below the current navigation position. In some embodiments, in response to a determination that the location of the gaze of the user is in the first position above the current navigation position, the computer system navigates through the first set of value options in a downwards direction to reveal value options from the top of first component element that were not previously displayed before navigating. In some embodiments, in response to a determination that the location of the gaze of the user is in the second position below the current navigation position, the computer system navigates through the first set of value options in an upwards direction to reveal value options from the bottom of first component element that were not previously displayed before navigating. Increasing or decreasing the speed and/or the direction at with the computer system navigates through the first set of value options in response to a location of the user's gaze in the first component element provides quick access to the first set of value options without requiring the user to provide further inputs to navigate within the value selection user interface object, thereby reducing the number of inputs and providing more efficient interactions between the user and the computer system.

In some embodiments, navigating through the first set of value options based on the gaze of the user directed toward the first component element includes (2420*a*): in accordance with a determination that a duration of the gaze of the user in the first component element is a first duration, the computer system navigates (2420*b*) through the first set of value options in a first manner and in accordance with a determination that the duration of the gaze of the user in the first component element is a second duration, different from the second duration, the computer system navigates (2420*c*) through the first set of value options in a second manner, different from the first manner, such as navigating through value options for selectable component element 2304*f* in FIG. 23D to 23E in a first speed based on the duration of attention 2314 compared to navigating through the value options in a second speed, different from the first speed, based on the duration of attention 2314 in FIG. 23E to 23F. For example, the computer system navigates through the first set of value options in a manner that optionally corresponds to the duration of gaze directed toward the first component element (e.g., increasing or decreasing the speed at with the computer system navigates through the first set of value options). For example, the second duration is optionally greater than the first duration. In some embodiments, the computer system navigates through the first set of value options in the first manner (e.g., first speed). In some embodiments, the computer system navigates through the first set of value options in the second manner greater than the first manner (e.g., speed is increased). Increasing or decreasing the speed at with the computer system navigates through the first set of value options in response to the duration of the user's gaze in the first component element provides quick access to the first set of value options without requiring the user to provide further inputs to navigate within the value selection user interface object, thereby reducing the number of inputs and providing more efficient interactions between the user and the computer system.

In some embodiments, navigating through the first set of value options for the first component includes scrolling the first set of value options through a selection region of the first component element, wherein a respective value of the first set of value options is selected for the first component based on being positioned within the selection region of the first component element (2422), such as selection region 2306*b* in FIG. 23C. In some embodiments, the selection region of the first component element includes the current navigation position containing a current value option as described with reference to step(s) 2426*a* and 2426*b*. In some embodiments, the computer system selects the respective value of the first set of value options for the first component in accordance with a determination that the attention of the user is directed toward the selection region of the first component element. In some embodiments, the value option included in the current navigation position is positioned to be selected as the respective value for the first component when the computer system determines that the attention of the user directed towards the first component element satisfies the one or more first criteria as described with reference to step(s) 2404*a*; 2404*b*; 2426*a*; and 2426*b*. In some embodiments, the value option included in the current navigation position is positioned to be selected as the respective value for the first component when the computer system determines that the attention of the user is directed towards a gaze target associated with the current navigation position as described with reference to step(s) 2428*a*; 2428*b*;

2430a; and 2430b. In some embodiments, the value option included in the current navigation position is positioned to be selected as the respective value for the first component when the computer system detects input from a first portion of a body of the user as described with reference to step(s) 2434a; 2434b; and 2436a-d. In some embodiments, the computer system does not select the respective value of the first set of value options for the first component element in accordance with a determination that the attention of the user is directed away from the selection region of the first component element. Scrolling the first set of value options through a selection region of the first component element provides improved feedback of what value will be selected for the first component element to the user and reduces the likelihood of errors in the interaction between the user and the computer system, which enhances operability of the computer system and reduces power usage of the computer system.

In some embodiments, while navigating through the first set of value options based on the gaze of the user directed toward the first component element and while the first component element is navigated to a third value for the first set of value options that is different from the first value, such as value selection user interface object 2306c navigated to state value "Colorado" in FIG. 23D, the computer system detects (2424a), via the one or more input devices, that the gaze of the user is directed away from the first component element, such as attention 2316 directed away from value selection user interface object 2306c in FIG. 23D. In some embodiments, in response to detecting that the gaze of the user is directed away from the first component element, in accordance with a determination that the gaze of the user directed to the first component element before being directed away from the first component element did not satisfy one or more criteria (2424b) (e.g., the attention of the user directed towards the first component element did not satisfy the one or more first criteria described in step(s) 2404a and 2404b), the computer system ceases navigating (2424c) through the first set of value options for the first component of the respective value, such as value selection user interface object 2306c stays on state value "Colorado" in FIG. 23D. In some embodiments, if a respective value of the first set of value options is navigated to for the first component when the gaze of the user is detected to be being directed away from the first component (e.g., based on being positioned within the selection region of the first component element as described above), the computer system forgoes maintaining the respective value for the first component in response to ceasing navigating through the first set of value options for the first component of the respective value (e.g., reverts the navigated to value to be the first value), or in some embodiments the computer system maintains the respective value for the first component in response to ceasing navigating through the first set of value options. In some embodiments, the computer system reduces the visual emphasis of the first component element relative to the second component element. In some embodiments, the computer system reduces the visual emphasis of the first component element relative to the second component element before gradually causing the first set of value options for the first component element to disappear based on ceasing navigating through the first set of value options. In some embodiments, the computer system does not display the first component element as visually emphasized relative to the second component element. In some embodiments, the computer system navigates to the previous value included in the current navigation position of the first component prior to navigating through the first set of value options. In some embodiments, the computer system maintains (2424d) the first value for the first component of the respective value (or optionally selecting the navigated to respective value, as described above), such in FIGS. 23C to 23E where selectable component element 2308cI includes a first value "15" in FIG. 23C. In FIG. 23D, the selectable component element 2308cI navigates to a second value "14" and in FIG. 23E, attention moves away from selectable component element 2308cI such that the first value "15" is maintained in FIG. 23E. (e.g., the respective value remains as the first value). Canceling the process to navigate through the first set of value options and adjust the respective value of the first component avoids accidental changing of the respective value of the first component element, thereby reducing erroneous inputs with respect to the user interface.

In some embodiments, initiating the process to update the respective value based on selection of the second value for the first component element is performed in response to (2426a): detecting, via the one or more input devices, that the attention of the user directed towards the first component element satisfies one or more first criteria while a current navigation position in the first component element corresponds to the second value for the first component element that is different from the first value for the first component element (2426b), such as selectable component element 2308cI including value "18" in FIG. 23G and the attention 2310 is directed to selectable component element 2308cI in FIG. 23G. In some embodiments, the one or more first criteria include a criterion that is satisfied when the current navigation position in the first component element corresponds to the second value for a second period of time greater than the second threshold amount of time described in step(s) 2404a and 2404b. In some embodiments, the one or more first criteria include a criterion that is satisfied when the attention of the user is directed towards the current navigation position in the first component element corresponding to the second value for a third period of time greater than the first threshold amount of time described in step(s) 2404a and 2404b. In some embodiments, in response to detecting that the location of the gaze of the user is directed toward the region of the container corresponding to the second value option, the computer system navigates through the first set of value options so as to change the current value option to the second value option corresponding to the current navigation position. For example, the second value option is optionally located in the same region as the current navigation position. In some embodiments, the computer system navigates through the first set of value options so as to change the current value option to and/or select the second value option corresponding to the current navigation position in response to detecting attention-only and/or gaze-only input (e.g., not including input from one or more portions of the user other than those portions providing the attention and/or gaze input). Updating a value for a value selection user interface object based on the attention of the user, and doing so when the attention of the user satisfies one or more first criteria, reduces the number of inputs needed to update the value, enables selection of a value while viewing a range of selectable values, and reduces errors in the interaction between the user and the computer system (e.g., by avoiding unintentional selection of selectable values), thereby reducing inputs needed to correct such errors.

In some embodiments, the process to update the respective value based on selection of the second value for the first component element includes (2428a): in response to detecting that the attention of the user directed toward the first component element satisfies the one or more first criteria, the computer system displays (2428*b*), in the user interface, a gaze target that is selectable with the attention to update the first component of the respective value to the second value for the first component element, such as gaze target 2318 in FIG. 23H. In some embodiments, the one or more first criteria include a criterion that is satisfied when the attention of the user is directed towards a gaze target associated with the current navigation position, similar to as described with reference to methods 800, 900, and/or 1000. Displaying a gaze target selectable to update a value for a value selection user interface object based on the attention of the user, and doing so when the attention of the user satisfies one or more first criteria, provides confirmation that the user intends to interact with the first component element, thereby reducing errors in the interaction between the user and the computer system (e.g., avoiding unintentional activation or deactivation of component elements due to unintentional gaze) and reducing inputs needed to correct such errors.

In some embodiments, while displaying the gaze target that is selectable to update the first component of the respective value to the second value for the first component element, the computer system detects (2430*a*) that the attention of the user is directed to the gaze target, such as attention 2310 directed to gaze target 2318 in FIG. 23I. In some embodiments, in response to detecting that the attention of the user is directed to the gaze target, in accordance with a determination that the attention of the user directed to the gaze target satisfies one or more second criteria, wherein the one or more second criteria include a criterion that is satisfied when the attention of the user is directed toward the gaze target for more than a threshold period of time (e.g., 0.02, 0.05, 0.1, 0.2, 0.25, 0.3, 0.5, 0.6, 0.7, 0.8, 0.9, 1, 1.2, 1.5, 2, 2.5, 3, 5, 10, or 30 seconds or a threshold period of time described with reference to methods 800, 900 and/or 1000), the computer system updates (2430*b*) the first component of the respective value to the second value for the first component element, such as updating selectable component element 2308*c*I to include value "18" in FIGS. 23I and 23J. In some embodiments, the computer system determines that the attention of the user has been maintained on the gaze target for at least an amount of time that is greater than the threshold period of time. In some embodiments, the attention of the user (or a precise position of the gaze of the user) directed toward the gaze target changes but is determined, by the computer system, to be continuously within the region of the gaze target and/or the selection region during the at least the amount of time. In some embodiments the computer system does not update the first component of the respective value to the second value for the first component element (e.g., maintains the current value) in accordance with a determination that the attention of the user is not directed toward the gaze target (e.g., in accordance with a determination that the gaze of the user has not been maintained on the gaze target or in the region of the gaze target for at least the threshold period of time). Requiring that the attention of the user be directed toward the gaze target for more than the threshold period of time before updating the first component of the respective value to the second value for the first component element reduces the number of inputs needed to update the value and reduces errors in the interaction between the user and the computer system (e.g., by avoiding unintentional selection of selectable values), thereby reducing inputs needed to correct such errors.

In some embodiments, navigating through the first set of value options for the first component of the respective value based on the attention of the user is performed while not displaying the gaze target (2432), such as navigating through value options for selectable component element 2304*f* in FIGS. 23D-23I. In some embodiments, if the computer system is navigating through the first set of value options for the first component of the respective value, the computer system does not display the gaze target that is associated with the first component element in response to detecting that the attention of the user is directed to the first component element as described in method 2406. In some embodiments, while displaying the gaze target, the computer system detects that the attention of the user is directed away from the gaze target and is directed to a location of the first component element that does not include the gaze target. In response to detecting that the attention of the user is directed away from the gaze target and is directed to the location of the first component element that does not include the gaze target, the computer system navigates through the first set of value options as described with reference to step(s) 2416; 2418*a*-*c*; 2420*a*-*c*; 2422; 2424*a*-*d*. In some embodiments, the computer system ceases to display the gaze target while navigating through the first set of value options as described with reference to method 2432. Forgoing displaying the gaze target while the computer system navigates through the first set of value options reduces clutter of the user interface and reduces errors in navigating through the first set of value options because values are less likely to be obscured.

In some embodiments, while the attention of the user is directed toward the first component element, the computer system detects (2434*a*), via the one or more input devices, a first input directed to the first component element, wherein the first input includes input from a first portion of a body of the user of the computer system performing a respective air gesture followed by movement of the first portion of the body of the user while in a respective pose, such as finger of hand 2312 touching trackpad 746 and/or an air pinch gesture from hand 2312 in FIG. 23J. In some embodiments, the first input includes detecting the first portion (e.g., a hand, arm, and/or finger) of the user performing an air pinch gesture (e.g., two or more fingers of a user's hand such as the thumb and index finger moving together and touching each other) to form a pinch hand shape while attention of the user is directed to the user interface and/or the first component element, followed by movement of the hand in the pinch hand shape upward or downward. In some embodiments, in response to detecting the first input directed to the first component element, the computer system navigates (2434*b*) through the first set of value options for the first component of the respective value in accordance with the movement of the first portion of the body of the user, such as navigating through value options 2308*f*II for selectable component element 2308*f*I in FIGS. 23J and 23K. In some embodiments, the first input from the user includes the air pinch gesture described herein and with respect to method 800 performed by the hand of the user while the attention of the user is directed to the first component element in which the index finger of the user and the thumb of the user come together and touch, followed by movement of the hand in the pinch hand shape in a direction and/or with a magnitude. The computer system optionally scrolls through the first set of value options within the user interface with a magnitude and/or direction corresponding to the movement of the hand of the user (e.g., scrolls the first set of value options upward if the hand moves upward, and scrolls the first set of value options downward if the hand moves downward). In some embodiments, in response to detecting that the location of the gaze of the user is directed toward a region of the first component element corresponding to the first value option, the computer system navigates through the first set of value options so as to change the current value option to the first value option corresponding to the current navigation position. For example, the first value option is optionally located in the same region as the current navigation position. In some embodiments, the computer system navigates through one or a plurality of value options in response to detecting the location of the gaze of the user directed toward the region of the first component element corresponding to the first value option in response to the computer system navigating through the first set of value options for the first component of the respective value in accordance with the movement of the first portion of the body of the user. The first input from the user optionally includes other types of inputs, such as trackpad inputs (e.g., finger touching the trackpad and moving in a direction and/or with a magnitude) or an input device input (e.g., movement of a hand held input device that detects direction and/or magnitude of movement of the input device while it is being held in the hand of the user) or a rotatable input device (e.g., rotation of smartwatch crown). Scrolling the first set of value options in response to detecting the first input while the attention of the user is directed to the first component element provides quick access to the first set of value options without requiring the user to provide further inputs to navigate within the user interface, thereby reducing the number of inputs and providing more efficient interactions between the user and the computer system.

In some embodiments, while navigating through the first set of value options, the computer system detects (2436*a*), via the one or more input devices, that the first portion of the body of the user is no longer in the respective pose, such as finger of hand 2312 in FIG. 23L. In some embodiments, the pinch and drag air gesture that is the air gesture includes the pinch air gesture performed in conjunction with (e.g., followed by) a drag input that changes a position of the user's hand from a first position (e.g., a start position of the drag) to a second position (e.g., an end position of the drag) while in the pinch hand shape. In some embodiments, the user maintains the pinch hand shape while performing the drag air gesture, and releases the pinch air gesture (e.g., opens their two or more fingers so they are no longer touching) to end the drag gesture (e.g., at the second position) such that the first portion of the body of the user is no longer in the respective pose (e.g., the pinch hand shape). In some embodiments, in response to detecting that the first portion of the body of the user is no longer in the respective pose (2436*b*), in accordance with a determination that a current navigation position in the first component element corresponds to a third value, the computer system updates (2436*c*) the first component of the respective value to the third value for the first component element, such as selectable component element 2308*f*1 including value "March" in FIG. 23M. In some embodiments, in accordance with a determination that the current navigation position in the first component corresponds to a fourth value different from the third value, the computer system updates (2436*d*) the first component of the respective value to the fourth value for the first component element, such as selectable component element 2308*f*1 including value "November" in FIG. 23J. For example, the third value option was optionally in a region above (and/or, optionally, below, to the left, and/or to the right) the current navigation position and did not occupy the same region as the region corresponding to the current navigation position prior to the computer system navigating through the first set of value options so as to change the current value option to the third value option corresponding to the current navigation position. In some embodiments, the fourth value option was in a region above (and/or, optionally, below, to the left, and/or to the right) the current navigation position and did not occupy the same region as the region corresponding to the current navigation position prior to the computer system navigating through the first set of value options so as to change the current value option to the fourth value option corresponding to the current navigation position. In some embodiments, the computer system updates the first component of the respective value to the respective value for the first component element in response to detecting non-attention activation inputs (e.g., movement of the first portion of the body of the user that includes the pinch hand shape while performing the navigating input, and releasing the pinch gesture (e.g., opens their two or more fingers) to end the navigating input). Updating a value for a value selection user interface in response to detecting that the first portion of the body of the user is no longer in the respective pose avoids a wait time associated with meeting attention criteria when faster interaction is desired, thereby reducing errors in the interaction between the user and the computer system and reducing inputs needed to correct such errors.

In some embodiments, while displaying the value selection user interface object including the first component element and the second component element, the computer system detects (2438*a*), via the one or more input devices, that the attention of the user is directed toward the second component element, such as from FIG. 23C to 23D, attention 2314 is directed from selectable component element 2304*g* to selectable component element 2304*f*. In some embodiments, the computer system detects that the attention of the user is directed toward a location (or portion) of the value selection user interface object that includes and/or corresponds to the second component element as described herein. In some embodiments, the attention of the user was previously not directed to the second component element (e.g., was directed to the first component element), and the computer system detects that the attention changes to being directed to the location (or portion) of the value selection user interface object that includes and/or corresponds to the second component element. In some embodiments, while the attention of the user is directed to the value selection user interface object and/or the second component element, the computer system displays the value selection user interface object with a visual representation (e.g., indication) of the user's attention as described with reference to methods 1200 and/or 2000. In some embodiments, in response to detecting that the attention of the user is directed toward the second component element while the second component element corresponds to a first value for the second component element, the computer system visually emphasizes (2438*b*) the second component element relative to the first component element, such as selectable component element 2304*f* is displayed with a first coloring and/or shading relative to selectable component element 2304*g* and 2304*e* in FIG. 23D. In some embodiments, the computer system visually emphasizes the second component element relative to its surrounding component elements (e.g., other component elements for controlling different components of the respective value associated with the value selection user interface object) that are not detected as having the attention of the user directed towards them, such as by changing relative sizes, colors, transparency levels, opacity, highlighting, lighting, shadow and/or another display property. Visually emphasizing the second component element optionally has one or more of the characteristics of visually emphasizing the first component element. Increasing a visual prominence of the second component element relative to the first component element when the attention of the user is directed toward the second component element ensures visibility of the second component element when selection is likely, and reduces correction inputs involved with selecting the second component element.

In some embodiments, while the attention of the user is directed toward the second component element and while the second component element is visually emphasized relative to the first component element (2440a), the computer system navigates (2440b) through the second set of value options for the second component of the respective value based on the attention of the user directed toward the second component element from the first value for the second component element to a respective value for the second component element that is different from the first value for the second component element, such as navigating through value options for selectable component element 2304f in FIG. 23D to FIG. 23I. In some embodiments, navigating through the second set of value options has one or more of the characteristics of navigating through the first set of value options of the first component element. In some embodiments, after navigating through the second set of value options for the second component of the respective value based on the attention of the user directed toward the second component element, the computer system initiates (2440c) a process to update the respective value for the second component element based on selection of the respective value for the second component element, such as updating selectable component element 2304f to include value "00" in FIG. 23J. In some embodiments, initiating the process to update the respective value for the second component element based on selection of the respective value for the second component element includes one or more characteristics of changing the respective value for the first component element based on selection of the first respective value for the first component element. In some embodiments, the respective value for the second component element is different from the first value. In some embodiments, initiating the process to update the respective value has one or more characteristics of initiating the process to update the first respective value of the first component element. Updating a value for a value selection user interface object based on the attention of the user reduces the number of inputs needed to update the value, enables selection of a value while viewing a range of selectable values, and reduces errors in the interaction between the user and the computer system (e.g., by avoiding unintentional selection of selectable values), thereby reducing inputs needed to correct such errors.

In some embodiments, in accordance with a determination that a parameter of the attention directed to the second component element has a first value, the respective value for the second component element is a second value for the second component element (2442a), such as attention 2310 a first distance from a selection region 2308e of selectable component element 2308cI in FIG. 23D. In some embodiments, navigating through the second set of value options is based on a parameter of the attention directed toward the second component element (e.g., based on a magnitude, direction, duration, location, and/or movement as described with reference to step(s) 2416; 2418a-c; 2420a-c; 2422; 2424a-d; 2426a; and 2426b). In some embodiments, in accordance with a determination that the parameter of the attention directed to the second component element has a second value, different from the first value for the parameter of the attention directed to the second component element, the respective value for the second component element is a third value for the second component element, different from the second value for the second component element (2442b), such as attention 2310 a second distance (e.g., further than the first distance) from selection region 2308e of selectable component element 2308cI in FIG. 23F. For example, the computer system navigates through the second set of value options in a manner that optionally corresponds to the parameter of the gaze of the user made towards the second component element (e.g., increasing or decreasing the speed at with the computer system navigates through the second set of value options) as described with reference to step(s) 2416; 2418a-c; 2420a-c; 2422; 2424a-d; 2426a; and 2426b. For example, the first value for the parameter of the attention directed to the second component element is optionally less than the second value for the parameter of the attention directed to the second component element. In some embodiments, before the navigation, the second value for the second component element is a shorter navigational distance from the current navigation position compared to the third value for the second component element that is a greater navigational distance from the current navigation position. Updating a value for a value selection user interface object based on a particular type of user interactions (e.g., attention-only) and one or more parameters of the attention of the user facilitates more precise control of the second component element and facilitates more efficient attention-based interactions more quickly (e.g., computer system does not require non-attention inputs), thereby providing more efficient interactions between the user and computer system.

In some embodiments, while displaying the value selection user interface object including the first component element, the second component element and a third component element, the computer system detects (2444a), via the one or more input devices, that the attention of the user is directed toward the third component element, such as selectable component element 2308fI in FIG. 23J. In some embodiments, the computer system detects that the attention of the user is directed toward a location (or portion) of the value selection user interface object that includes and/or corresponds to the third component element. In some embodiments, the attention of the user was previously not directed to the third component element (e.g., was directed to the first component element), and the computer system detects that the attention changes to being directed to the location (or portion) of the value selection user interface object that includes and/or corresponds to the third component element. In some embodiments, while the attention of the user is directed to the value selection user interface object and/or the third component element, the computer system displays the value selection user interface object with a visual representation (e.g., indication) of the user's attention as described with reference to methods 1200 and/or 2000. In some embodiments, in response to detecting that the attention of the user is directed toward the third component element while the third component element corresponds to a first value for the third component element, the computer system visually emphasizes (2444b) the third component element relative to the first component element and the second component element, such as selectable component element 2308fI in FIG. 23J displayed with a first coloring and/or shading different from other selectable component elements associated with virtual content 2308b, 2308g, 2308h, 2308c, and 2308d. In some embodiments, the computer system visually emphasizes the third component element relative to its surrounding component elements (e.g., other component elements for controlling different components of the respective value associated with the value selection user interface object) that are not detected as having the attention of the user directed towards them, such as by changing relative sizes, colors, transparency levels, opacity, highlighting, lighting, shadow and/or another display property. Visually emphasizing the third component element optionally has one or more of the characteristics of visually emphasizing the first component element. Increasing a visual prominence of the third component element relative to the first component element when the attention of the user is directed toward the third component element ensures visibility of the third component element when selection is likely, and reduces correction inputs involved with selecting the third component element.

In some embodiments, while the attention of the user is directed toward the third component element and while the third component element is visually emphasized relative to the first component element and the second component element (2446*a*), the computer system navigates (2446*b*) through the third set of value options for the third component of the respective value based on the attention of the user directed toward the third component element from the first value for the third component element to a respective value for the third component element that is different from the first value for the third component element, such as navigating through value options 2308*f*/II for selectable component element 2308*f*/I in FIG. 23J to FIG. 23L. In some embodiments, navigating through the third set of value options has one or more of the characteristics of navigating through the first set of value options of the first component. In some embodiments, after navigating through the third set of value options for the third component of the respective value based on the attention of the user directed toward the third component element, the computer system initiates (2446*c*) a process to update the respective value based on selection of the respective value for the third component element, such as updating selectable component element 2308I1 in FIG. 23M to include value "March". In some embodiments, initiating the process to update the respective value based on selection of the respective value for the third component element includes one or more characteristics of changing the respective value for the first component element based on selection of the first respective value for the first component element. In some embodiments, the respective value is different from the first value. In some embodiments, initiating the process to update the respective value has one or more characteristics of initiating the process to update the first respective value of the first component element. Updating a value for a value selection user interface object based on the attention of the user reduces the number of inputs needed to update the value, enables selection of a value while viewing a range of selectable values, and reduces errors in the interaction between the user and the computer system (e.g., by avoiding unintentional selection of selectable values), thereby reducing inputs needed to correct such errors. In some embodiments, in accordance with a determination that a parameter of the attention directed to the third component element has a first value, the respective value for the third component element is a second value for the third component element (2448*a*), such as attention 2314 directed to a first location of selectable component element 2304*f* in FIG. 23D. In some embodiments, navigating through the third set of value options is based on a parameter of the attention directed toward the third component element (e.g., based on a magnitude, direction, duration, location, and/or movement as described with reference to step(s) 2416; 2418*a*-*c*; 2420*a*-*c*; 2422; 2424*a*-*d*; 2426*a*; and 2426*b*).

In some embodiments, in accordance with a determination that the parameter of the attention directed to the third component element has a second value, different from the first value for the parameter of the attention directed to the second component element, the respective value for the third component element is a third value for the third component element, different from the second value for the third component element (2448*b*), such as attention 2314 in FIG. 23G directed to a second location, different from the first location shown in FIG. 23D of selectable component element 2304*f*. For example, the computer system navigates through the third set of value options in a manner that optionally corresponds to the parameter of the gaze of the user made towards the third component element (e.g., increasing or decreasing the speed at with the computer system navigates through the third set of value options) as described with reference to step(s) 2416; 2418*a*-*c*; 2420*a*-*c*; 2422; 2424*a*-*d*; 2426*a*; and 2426*b*. For example, the first value for the parameter of the attention directed to the second component element is optionally less than the second value for the parameter of the attention directed to the second component element. In some embodiments, before the navigation, the second value for the third component element is a shorter navigational distance from the current navigation position compared to the third value for the third component element that is a greater navigational distance from the current navigation position. Updating a value for a value selection user interface object based on a particular type of user interactions (e.g., attention-only) and one or more parameters of the attention of the user facilitates more precise control of the third component element and facilitates more efficient attention-based interactions more quickly (e.g., computer system does not require non-attention inputs), thereby providing more efficient interactions between the user and computer system.

It should be understood that the particular order in which the operations in method 2400 have been described is merely exemplary and is not intended to indicate that the described order is the only order in which the operations could be performed. One of ordinary skill in the art would recognize various ways to reorder the operations described herein.

FIGS. 25A-25J illustrate examples of a computer system facilitating direct touch interactions with one or more virtual objects in a three-dimensional environment in accordance with some embodiments.

Figure 25A:
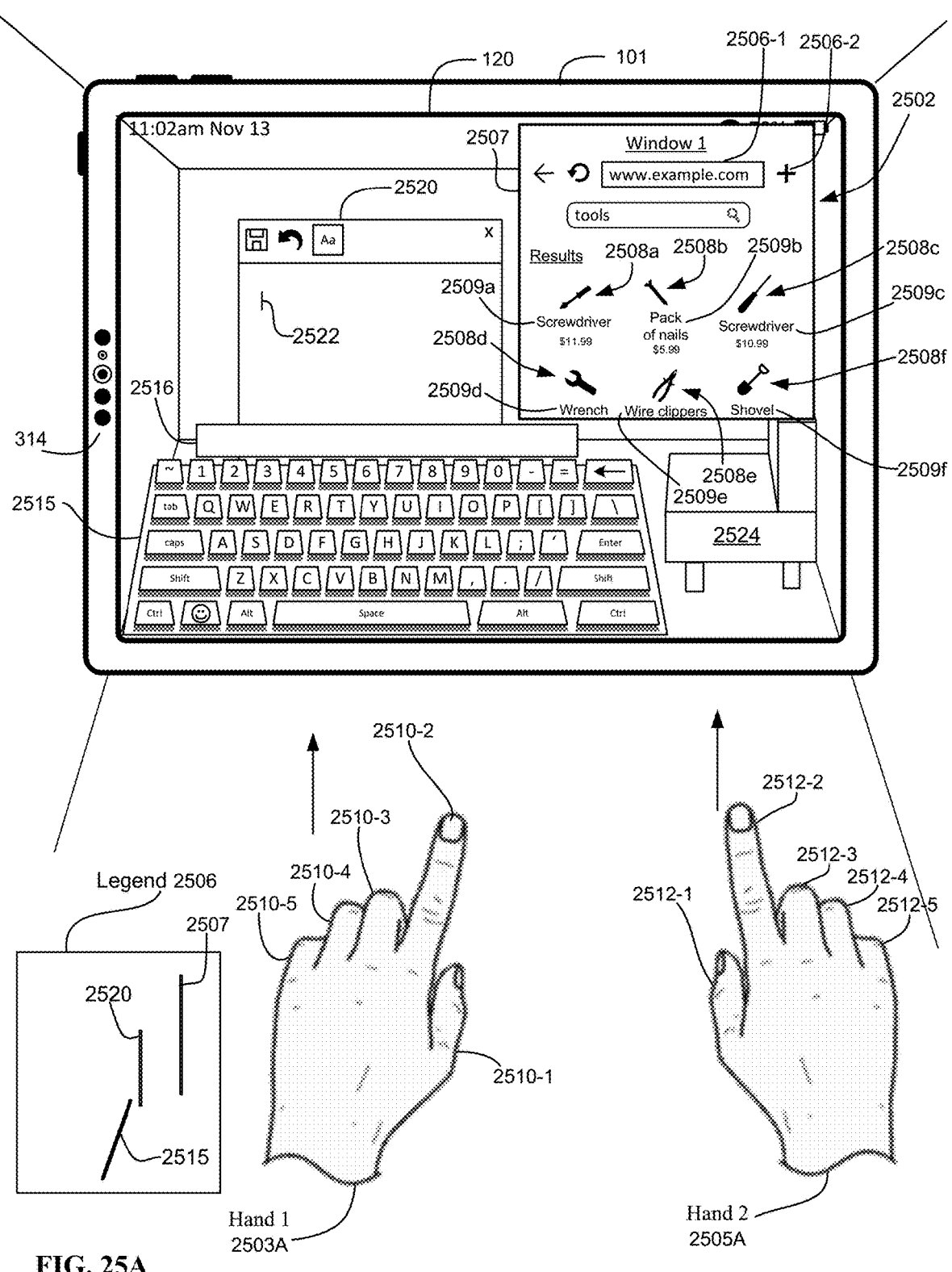
FIGS. 25A-25J illustrate examples of a computer system facilitating direct touch interactions with one or more virtual objects in a three-dimensional environment in accordance with some embodiments.

FIG. 25A illustrates a computer system (e.g., an electronic device) 101 displaying, via a display generation component (e.g., display generation component 120 of FIG. 1), a three-dimensional environment 2502 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user).

As shown in FIG. 25A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2502 and/or portions of the physical environment are visible via the display generation component 120. For example, three-dimensional environment 2502 includes a representation 2504 of a sofa, which is optionally a representation of a physical sofa in the physical environment. Additionally, as shown in FIG. 25A, the three-dimensional environment 2502 includes representations of the floor, ceiling, and walls of the physical environment (e.g., the room) surrounding the computer system 101.

In FIG. 25A, three-dimensional environment 2502 also includes a plurality of objects, such as user interface object 2507 ("Window 1") and virtual keyboard 2515. In some embodiments, the user interface object 2507 is an application window that is associated with a respective application operating on the computer system 101. For example, as shown in FIG. 25A, the user interface object 2507 is displaying a user interface of a web-browsing application, particularly a user interface associated with website "www.example.com". In some embodiments, as shown in FIG. 25A, the user interface object 2507 includes input field 2506-1 that is selectable to initiate a process for inputting text into the input field 2506-1 for navigating to another website. Additionally, as shown in FIG. 25A, the user interface object 2506-1 includes a selectable option 2506-2 that is selectable to cause the web-browsing application to display a home page of the web-browsing application in another tab in the user interface object 2506-1.

As shown in FIG. 25A, the user interface object 2507 is displaying a plurality of search results for the query "tools" from the website www.example.com. In some embodiments, as shown in FIG. 25A, each search result of the plurality of search results includes an image and information corresponding to the search result. For example, in FIG. 25A, a first search result includes image 2508a of a screwdriver and information 2509a that identifies a name/title of the first search result ("Screwdriver") and a price of the first search result ("$11.99"). Additionally, as shown in FIG. 25A, the plurality of search results in the user interface object 2507 optionally includes "Pack of nails" costing $5.99 (2509b), represented by image 2508b, "Screwdriver" costing $10.99 (2509c), represented by image 2508c, "Wrench" (2509d), represented by image 2508d, "Wire clippers" (2509e), represented by image 2508e, and/or "Shovel" (2509f), represented by image 2508f. In some embodiments, as described in more detail below, the search results are selectable to display additional information corresponding to the search results, such as availability, shipping information, quantity, user reviews, and/or seller/distributor, in the user interface object 2507.

In some embodiments, as shown in FIG. 25A, the virtual keyboard 2515 includes a plurality of virtual keys that are selectable to input content (e.g., letters, numbers, punctuation marks, and/or images) corresponding to the virtual keys in text-entry region 2520 (e.g., a word processing or note taking application with which the virtual keyboard 2515 is associated). For example, selection of one or more virtual keys of the virtual keyboard 2515 causes the computer system 101 to display a character (or image) corresponding to the selected keys at a location of cursor 2522 in the text-entry region 2520. Additionally, as shown in FIG. 25A, the virtual keyboard 2515 includes user interface element 2516 that, when one or more virtual keys of the virtual keyboard 2515 are selected, displays placeholder text (e.g., suggested text) that is selectable by the user for display in the text-entry region 2520. As shown in FIG. 25A, a side view of the relative placements of the user interface object 2507, the virtual keyboard 2515, and the text-entry region 2520 in the three-dimensional environment 2502 are provided in legend 2506.

In some embodiments, as discussed herein, the computer system 101 provides for enhanced and precise interaction with objects in the three-dimensional environment 2502. As discussed above, in FIG. 25A, the user interface object 2507 and the virtual keyboard 2515 optionally include a plurality of selectable options (e.g., selectable buttons, keys, links, text-entry fields, and/or text). In some embodiments, the computer system 101 displays a visual indication of an interaction between a portion of the user (e.g., a finger of a hand of the user) and a respective option in the three-dimensional environment if the portion of the user is a threshold distance (e.g., 0.1, 0.25, 0.5, 0.75, 0.9, 1, 1.5, 2, 3, 5, or 10 cm) from the respective option. In some embodiments, the computer system 101 adjusts a visual appearance of the visual indication based on object type (e.g., whether the respective option is selectable or not). Additionally, in some embodiments, as described below, the computer system 101 selectively displays the visual indication based on which finger is within the threshold distance above of the respective option. Additional details of the above and below with respect to displaying visual indications are provided with reference to methods 2600 and/or 2700.

In FIG. 25A, the computer system 101 detects movement of hand 2503a ("Hand 1") and/or movement of hand 2505a ("Hand 2"). For example, as shown in FIG. 25A, the computer system 101 detects hand 2503a move toward the virtual keyboard 2515 in the three-dimensional environment 2502 and hand 2505a move toward the user interface object 2507 in the three-dimensional environment 2502. Additionally, in FIG. 25A, the computer system detects a second air gesture provided by hand 2505a ("Hand 2"). In some embodiments, the computer system 101 detects the movements of the hands 2503a and 2505a irrespective of a location of the attention of the user in the three-dimensional environment 2502. It should be understood that while multiple hands and corresponding inputs are illustrated in FIGS. 25A-25J, such hands and inputs need not be detected by computer system 101 concurrently; rather, in some embodiments, computer system 101 independently responds to the hands and/or inputs illustrated and described in response to detecting such hands and/or inputs independently. As discussed herein, FIGS. 25A-25J include legend 2506 illustrating a side view of a relative distance between physical objects (e.g., fingers of the user) and virtual objects (e.g., virtual keyboard 2515 and virtual object 2507) in the three-dimensional environment 2502.

As mentioned above, in some embodiments, the computer system 101 displays a visual indication of an interaction between a portion of the user and a respective option in the three-dimensional environment 2502 that helps facilitate precise direct interaction with (e.g., direct selection of) the respective option in response to detecting the portion of the user is within the threshold distance (e.g., 0.1, 0.25, 0.5, 0.75, 0.9, 1, 1.5, 2, 3, 5, or 10 cm) of the respective option. Additionally in some embodiments, the computer system 101 displays the visual indication with the respective option if the portion of the user is a first finger (e.g., an index finger) of the hand of the user. From FIGS. 25A-25B, the computer system 101 detects index finger 2510-2 of the hand 2503*a* move toward the virtual keyboard 2515 in the three-dimensional environment 2502 and come within the threshold distance above of a surface of the virtual keyboard 2515 (or a virtual key of the virtual keyboard 2515). For example, the computer system 101 detects the index finger 2510-2 of the hand 2503*a* move to within the threshold distance of the surface of the virtual keyboard 2515 without detecting other fingers (e.g., thumb 2510-1, middle finger 2510-3, ring finger 2510-4, and/or pinky finger 2510-2) of the hand 2503*a* within the threshold distance of the surface of the virtual keyboard 2515. In some such embodiments, the computer system 101 detects the hand 2503*a* move toward the virtual keyboard 2515 in the three-dimensional environment 2502 while the index finger 2510-2 is in a pointed/ elongated state while the other fingers (e.g., the thumb 2510-1, middle finger 2510-3, ring finger 2510-4, and/or pinky finger 2510-2) are in a collapsed/curled state (e.g., such that the fingers are contacting/resting on the palm of the hand 2503*a*), as similarly shown in FIG. 25A.

Figure 25B:
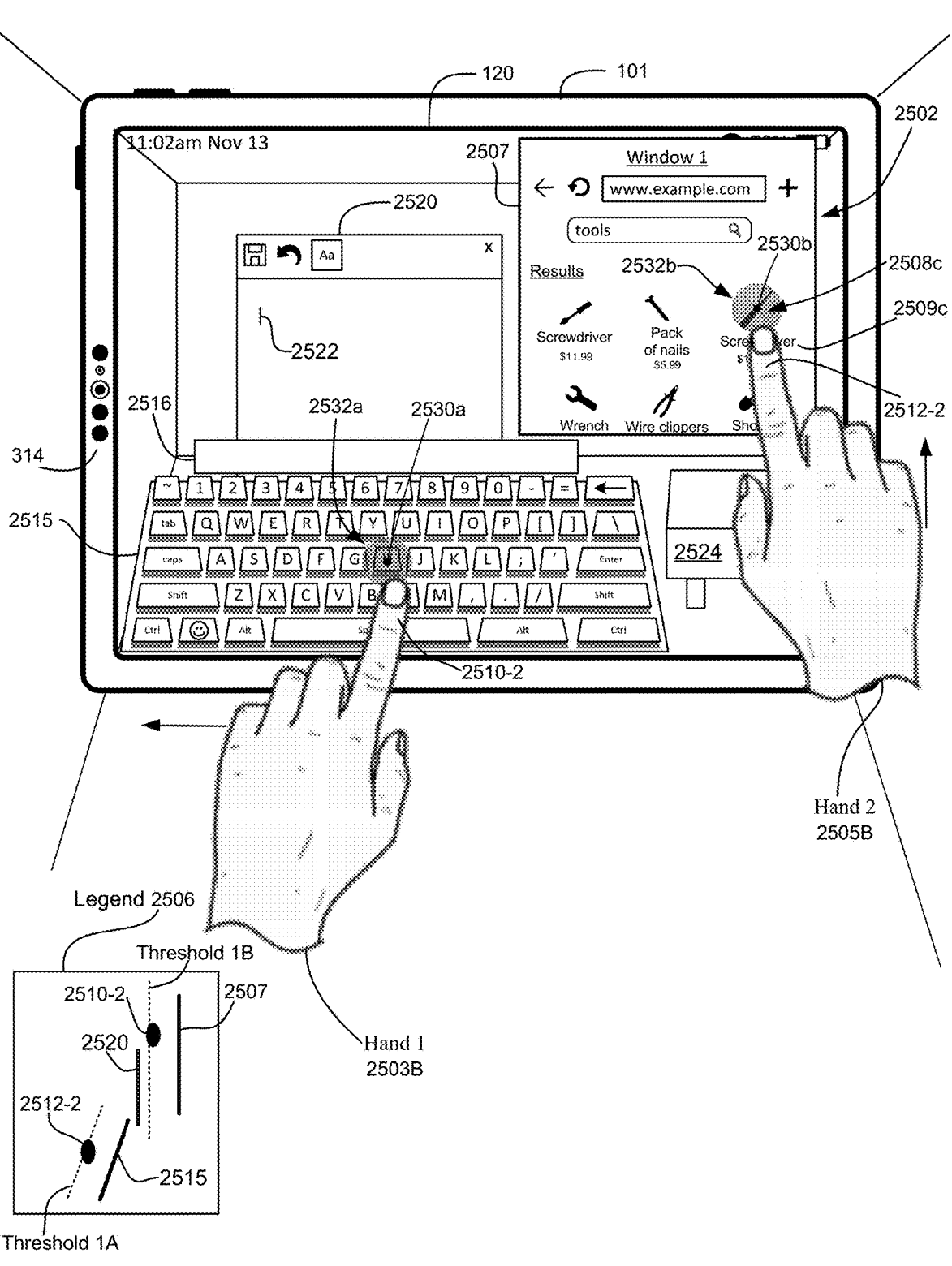

Additionally, from FIGS. 25A-25B, the computer system 101 detects index finger 2512-2 of the hand 2505*a* move toward the user interface object 2507 in the three-dimensional environment 2502 and come within the threshold distance above of a surface of the user interface object 2507 (or a respective option of the user interface object 2507). For example, the computer system 101 detects the index finger 2512-2 of the hand 2505*a* move to within the threshold distance of the surface of the user interface object 2507 without detecting other fingers (e.g., thumb 2512-1, middle finger 2512-3, ring finger 2512-4, and/or pinky finger 2512-2) of the hand 2505*a* within the threshold distance of the surface of the user interface object 2507. In some such embodiments, the computer system 101 detects the hand 2505*a* move toward the user interface object 2507 in the three-dimensional environment 2502 while the index finger 2512-2 is in a pointed/elongated state while the other fingers (e.g., the thumb 2512-1, middle finger 2512-3, ring finger 2512-4, and/or pinky finger 2512-2) are in a collapsed/ curled state (e.g., such that the fingers are contacting/resting on the palm of the hand 2505*a*), as similarly shown in FIG. 25A.

In some embodiments, as shown in FIG. 25B, in response to detecting the movement of the portion of the user within the threshold distance discussed above of a respective option in the three-dimensional environment 2502, the computer system 101 displays a visual indication of the interaction between the portion of the user and the respective option with the respective option in the three-dimensional environment. In some embodiments, displaying the visual indication includes displaying a glow effect in the three-dimensional environment 2502. For example, as shown in FIG. 25B, in response to detecting the index finger 2510-2 of the hand 2503*b* within the threshold distance ("Threshold 1A") of the surface of the virtual keyboard 2515, as shown in the legend 2506, the computer system 101 displays a first glow effect 2532*a* with (e.g., over) the virtual keyboard 2515. Additionally, as shown in FIG. 25B, in response to detecting the index finger 2512-2 of the hand 2505*b* within the threshold distance ("Threshold 1B") of the surface of the user interface object 2507, as shown in the legend 2506, the computer system 101 displays a second glow effect 2532*b* with (e.g., over) the user interface object 2507.

In some embodiments, the visual indication of the interaction between the portion of the user and the respective option in the three-dimensional environment 2502 is displayed based on a location of the portion of the user relative to a location corresponding to the respective option in the three-dimensional environment 2502. For example, in FIG. 25B, the index finger 2510-2 of the hand 2503*b* is associated with an interaction point 2530*a* that is determined based on the location of the index finger 2510-2 relative to the virtual keyboard 2515. Similarly, as shown in FIG. 25B, the index finger 2512-2 of the hand 2505*b* is associated with interaction point 2530*b* that is determined based on the location of the index finger 2512-2 relative to the user interface object 2507. Accordingly, as shown in FIG. 25B, the first glow effect 2532*a* is displayed over the virtual keyboard 2515 based on (e.g., centered around) the interaction point 2530*a* and the second glow effect 2532*b* is displayed over the user interface object 2507 based on (e.g., centered around) the interaction point 2530*b* in the three-dimensional environment 2502. Particularly, as shown in FIG. 25B, the first glow effect 2532*a* is displayed over "H" key of the plurality of virtual keys of the virtual keyboard 2515 and the second glow effect 2532*b* is displayed over the image 2508*c* corresponding to the Screwdriver in the user interface object 2507.

In some embodiments, as mentioned above, the computer system 101 determines a visual appearance of the visual indication in the three-dimensional environment 2502 based on object type. In some embodiments, user interface elements (e.g., options, buttons, keys, input fields, images, and/or text) are generally categorized into selectable objects (e.g., first type of objects) and non-selectable elements (e.g., second type of objects). In FIG. 25B, as discussed above, the virtual keyboard 2515 includes a plurality of selectable virtual keys, including the H key, in the three-dimensional environment 2502. Accordingly, the H key is optionally a first type of object, and the first glow effect 2532*a* is displayed over the H key with a first visual appearance in the three-dimensional environment. To the contrary, in FIG. 25B, the images that are associated with the plurality of search results in the user interface object 2507 are non-selectable, including the image 2508*c*. Accordingly, the image 2508*c* is optionally a second type of object, different from the first type of object, and the second glow effect 2532*b* is displayed over the image 2508*c* with a second visual appearance, different from the first visual appearance, as shown in FIG. 25B. In some embodiments, displaying the second glow effect 2532*b* with the second visual appearance that is different from the first visual appearance includes displaying the second glow effect 2532*b* with a smaller amount of brightness than the first glow effect 2532*a*. In some embodiments, displaying the second glow effect 2532*b* with the second visual appearance that is different from the first visual appearance includes displaying the second glow effect 2532*b* with a different color than the first glow effect 2532*a*. In some embodiments, displaying the second glow effect 2532*b* with the second visual appearance that is different from the first visual appearance includes displaying the second glow effect 2532*b* with a smaller amount of opacity than the first glow effect 2532*a*.

Figure 25C:
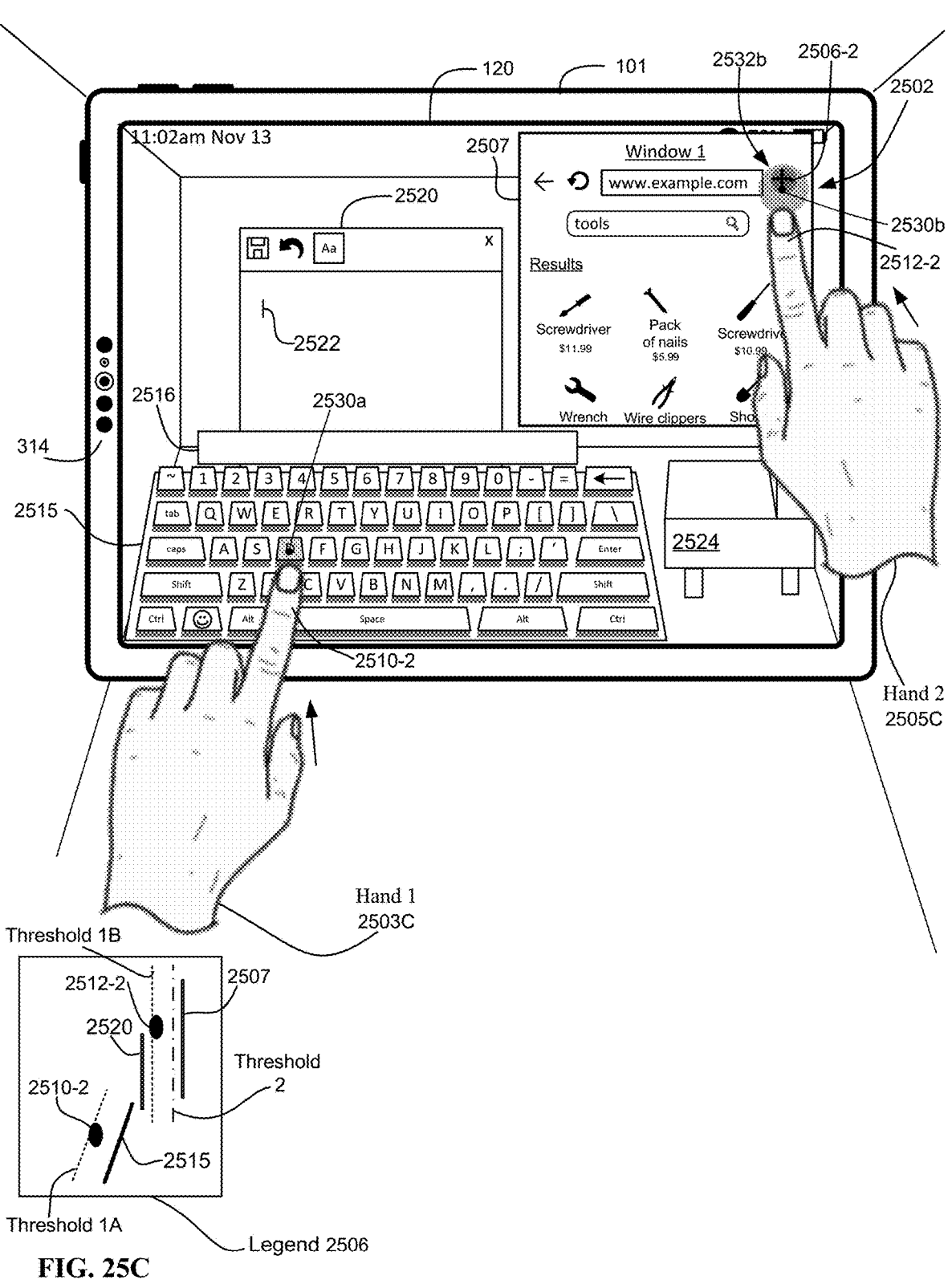

In FIG. 25B, the computer system 101 detects movement of the hands 2503*b* and 2505*b*. For example, as shown in FIG. 25B, while the index finger 2510-2 of the hand 2503*b* is within the threshold distance described above of the virtual keyboard 2515, the computer system 101 detects lateral movement of the hand 2503*b* (e.g., leftward) relative to the virtual keyboard 2515. Additionally, as shown in FIG. 25B, the computer system 101 detects longitudinal movement of the hand 2505*a* (e.g., upward) relative to the user interface object 2507. In some embodiments, as shown in FIG. 25C, in response to detecting the lateral movement of the hand 2503*b* in FIG. 25B, the computer system 101 moves the visual indication in the three-dimensional environment 2502 in accordance with the movement of the hand 2503*b*. For example, as shown in FIG. 25C, the hand 2503*c* has moved leftward over the virtual keyboard 2515 while the index finger 2510-2 remains within the threshold distance of the virtual keyboard 2515, as shown in the legend 2506, which accordingly moves the interaction point 2530*a* leftward over the virtual keyboard 2515 to a location corresponding to "D" key of the virtual keyboard 2515. In some embodiments, as shown in FIG. 25C, the visual indication moves with the interaction point 2530*a*. In some embodiments, displaying the visual indication alternatively includes highlighting the respective option to which the portion of the user is proximate (e.g., within the threshold distance). For example, as shown in FIG. 25C, the D key is shown with highlighting within the virtual keyboard 2515 indicating that the index finger 2510-2 of the hand 2503*c* is within the threshold distance of the D key in the three-dimensional environment 2502.

Additionally, in FIG. 25C, the computer system 101 detects the index finger 2512-2 of the hand 2505*c* within the threshold distance, as shown in the legend 2506, of the selectable option 2506-2 in the user interface object 2507. For example, as shown in FIG. 25C, the interaction point 2530*b* has moved over the selectable option 2506-2. Accordingly, as shown in FIG. 25C, the computer system optionally displays the selectable option 2506-2 with the second glow effect 2532*b* in the three-dimensional environment 2502. As described previously above, in some embodiments, the computer system 101 determines the visual appearance of the visual indication based on the object type. As shown in FIG. 25C, because the selectable option 2506-2 is a selectable element in the user interface object 2507 (e.g., as opposed to the image 2508*c* in FIG. 25B), the computer system displays the selectable option 2506-2 with the first visual appearance described above (e.g., as represented by the shading patterns of the second glow effect 2532*b* in FIG. 25C and the first glow effect 2532*a* in FIG. 25B).

In some embodiments, while the second glow effect 2532*b* is displayed over the selectable option 2506-2, the computer system 101 displays the portion of the second glow effect 2532*b* that is over the selectable option 2506-2 with greater visual emphasis than the portions of the second glow effect 2532*b* that are over surrounding portions of the user interface object 2507. For example, as shown in FIG. 25C, the portion of the second glow effect 2532*b* that is located over the selectable option 2506-2 is displayed with a greater amount of brightness, a different coloration, and/or a greater amount of opacity, than the portions of the second glow effect 2532*b* that are located over the portions of the user interface object 2507 that surround the selectable option 2506-2. Additionally, in some embodiments, as shown in FIG. 25C, the computer system 101 causes the selectable option 2506-2 to appear to "pop up" from the surface of the user interface object 2507 in the three-dimensional environment 2502. For example, in FIG. 25C, the computer system 101 increases a distance between the surface of the user interface object 2507 and the selectable option 2506-2 and/or increases a size of the selectable option 2506-2 in the three-dimensional environment 2502.

In some embodiments, the computer system 101 causes certain types of selectable elements to appear to pop up in the three-dimensional environment 2502 when the portion of the user is within the three. For example, as similarly discussed above, the computer system 101 causes selectable buttons, such as selectable option 2506-2 in the user interface object 2507, to pop up in the three-dimensional environment 2502. However, in FIG. 25C, the computer system 101 forgoes causing the D key of the virtual keyboard 2515 (e.g., that the index finger 2510-2 of the hand 2503*c* is within the threshold distance of) to pop up (e.g., because the plurality of keys of the virtual keyboard 2515 are already displayed as being popped up in the three-dimensional environment 2502). Further examples of selectively popping up selectable elements in the three-dimensional environment 2502 are discussed below with reference to FIG. 25F.

In FIG. 25C, the computer system 101 detects movement of the hands 2503*c* and the hand 2505*c* relative to the virtual keyboard 2515 and the user interface object 2507, respectively. For example, as shown in FIG. 25C, while the index finger 2510-2 of the hand 2503*c* is within the threshold distance of the D key of the virtual keyboard 2515, the computer system 101 detects the hand 2503*c* move toward the D key in the three-dimensional environment 2502. Additionally, in FIG. 25C, while the index finger 2512-2 of the hand 2505*c* is within the threshold distance of the selectable option 2506-2, the computer system 101 detects the hand 2505*c* move toward the selectable option 2506-2.

In some embodiments, the computer system 101 performs an operation associated with a respective option in the three-dimensional environment 2502 if a location corresponding to the portion of the user is within a second threshold distance (e.g., 0.01, 0.05, 0.075, 0.1, 0.25, 0.5, 0.75, 1, 1.5, 2, 3, or 5 cm), different from (e.g., smaller than) the threshold distance described above, of the respective option. For example, as shown in the legend 2506 in FIG. 25C, the index finger 2512-2 is within the first threshold distance ("Threshold 1B") of the user interface object 2507 when the movement of the hand 2505*c* is detected, and the movement of the hand 2505*c* is toward the user interface object 2507, optionally approaching the second threshold distance ("Threshold 2") of the user interface object 2507.

Figure 25D:
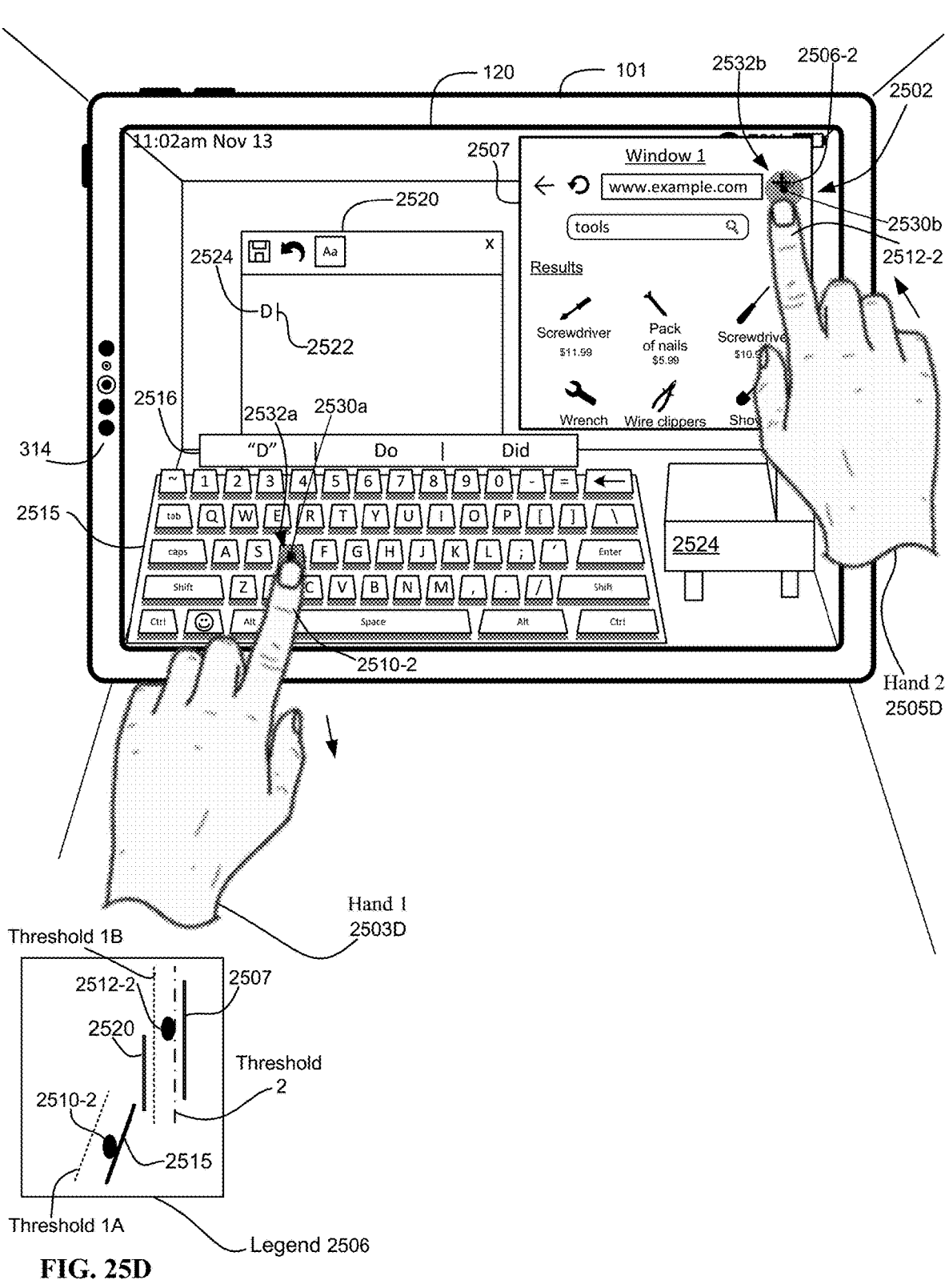

In some embodiments, in FIG. 25D, when the hand 2503*d* moves toward the D key of the virtual keyboard 2515, the computer system 101 detects the index finger 2510-2 of the hand 2503*d* provide a direct touch directed to the D key of the virtual keyboard 2515. For example, as shown in the legend 2506 of FIG. 25D, the computer system 101 detects the index finger 2510-2 of the hand 2503*d* contact the surface of the virtual keyboard 2515 at a location corresponding to the D key in the three-dimensional environment 2502. In some embodiments, in response to detecting the direct touch directed to the D key, the computer system 101 activates/selects the D key in the virtual keyboard 2515. For example, as shown in FIG. 25D, the computer system 101 displays text 2524 (e.g., the letter "D") in the text-entry region 2520 at the location of the cursor 2522 in accordance with the selection of the D key. Additionally, as shown in FIG. 25D, the computer system 101 updates the user interface element 2516 of the virtual keyboard 2515 to include suggested text ("D," "Do," "Did") that is selectable to enter the suggested text into the text-entry region 2520.

In some embodiments, when the computer system 101 activates a respective option in the three-dimensional environment 2502, the computer system 101 updates display of the visual indication in the three-dimensional environment 2502 to indicate that the respective option has been activated. For example, as shown in FIG. 25D, the computer system 101 increases a brightness of the first glow effect 2532*a* that is displayed over the D key in the virtual keyboard 2515. In some embodiments, the brightness level of the first glow effect 2532*a* that indicates the selection of the D key is greater than the brightness level of any other glow effects (e.g., brightness that changes based on changes in distance between the finger of the user and a selectable option, as discussed below). Additionally, in some embodiments, the computer system 101 collapses the D key of the virtual keyboard 2515. For example, as shown in FIG. 25D, the distance between the D key and the surface of the virtual keyboard 2515 is decreased and/or a size of the D key is decreased to cause the D key to appear to be "pressed down" in the three-dimensional environment 2502.

Additionally, in FIG. 25D, in some embodiments, when the hand 2505*d* moves toward the selectable option 2506-2 in the user interface object 2507, the computer system 101 detects the index finger 2512-2 of the hand 2505*d* approach the second threshold distance (Threshold 2), as shown in the legend 2506. In some embodiments, as the index finger 2512-2 approaches the second threshold distance (and while within the first threshold distance (Threshold 1B in the legend 2506)) from the selectable option 2506-2, the computer system 101 changes the visual appearance of the visual indication (e.g., the glow effect 2532*b*). For example, in FIG. 25D, the computer system 101 increases the brightness of the glow effect 2532*b* and/or decreases the size of the glow effect 2532*b* as the index finger 2512-2 approaches the second threshold distance from the selectable option 2506-2 in the user interface object 2507. In some embodiments, the amount of increase in the brightness of the glow effect 2532*b* and/or the amount of decrease of the size of the glow effect 2532*b* is based on (e.g., equivalent to or proportional to) the decrease in distance between the index finger 2512-2 and the selectable object 2506-2 (and/or the second threshold distance). As shown in FIG. 25D, in some embodiments, the selectable option 2506-2 remains visually popped up in the user interface object 2507 during the movement of the index finger 2512-2.

Figure 25E:
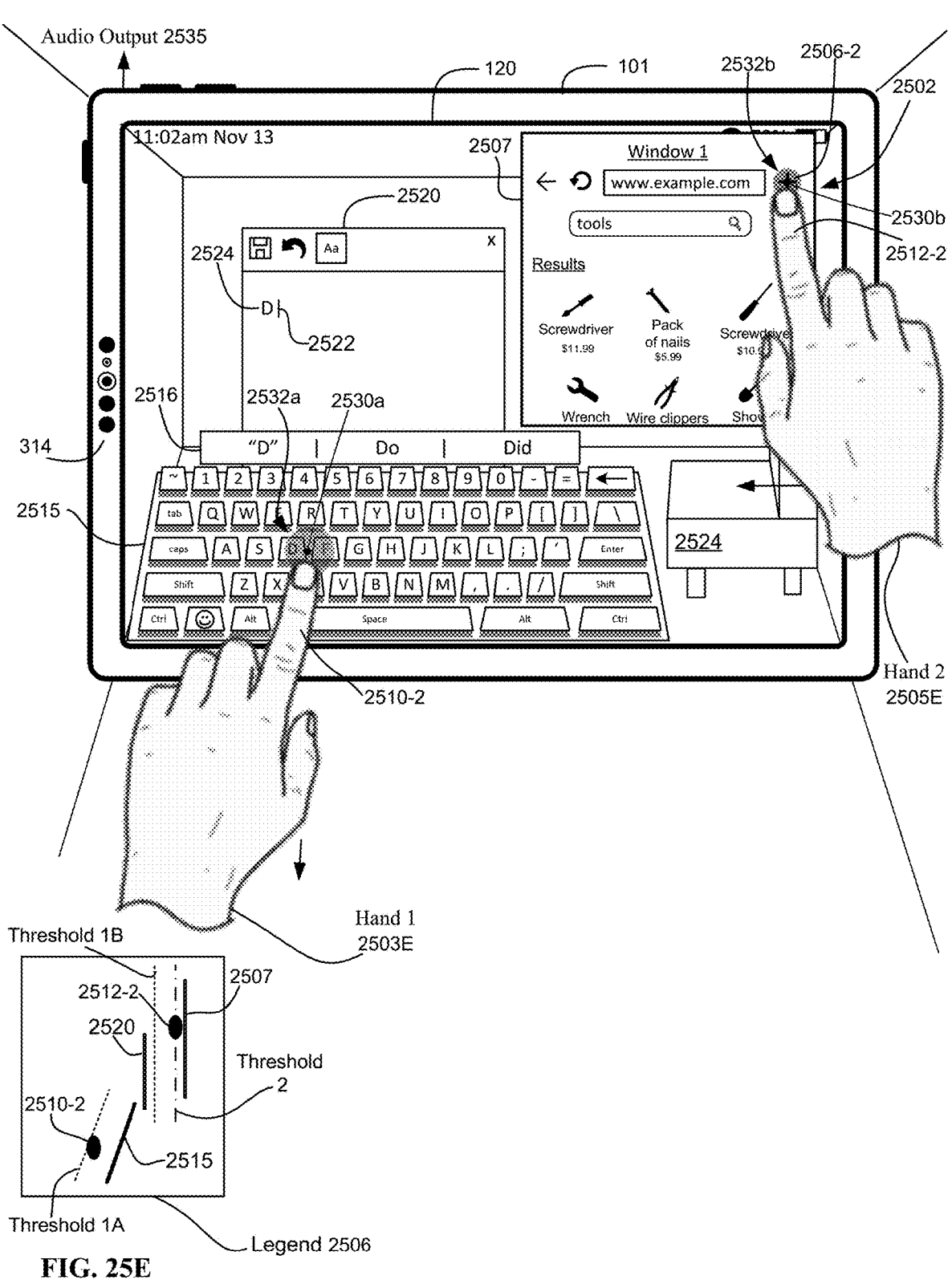

In FIG. 25D, the computer system 101 detects the hand 2503*d* move away from the virtual keyboard 2515 in the three-dimensional environment 2502. Additionally, in FIG. 25D, the computer system 101 detects the hand 2505*d* move toward the selectable option 2506-2 in the user interface object 2507. In some embodiments, as shown in FIG. 25E, in response to detecting the hand 2503*d* move away from the virtual keyboard 2515 in FIG. 25D, the computer system updates display of the first glow effect 2532*a*. For example, as shown in FIG. 25E, the index finger 2510-2 remains within the threshold distance (Threshold 1A) of the surface of the virtual keyboard 2515, as shown in the legend 2506, after the movement of the hand 2503*e*. Accordingly, as shown in FIG. 25E, the first glow effect 2532*a* remains displayed over the virtual keyboard 2515 in the three-dimensional environment 2502. Additionally, as shown in FIG. 25E, the computer system 101 optionally changes the visual appearance of the first glow effect 2532*a* based on the movement of the hand 2503*e* (e.g., compared to the visual appearance of the glow effect 2532*a* in FIG. 25D). For example, in FIG. 25E, the computer system 101 decreases the brightness of the first glow effect 2532*a* and/or increases the size of the first glow effect 2532*a* when the hand 2503*e* is moved away from the virtual keyboard 2515. In some embodiments, in FIG. 25E, because the index finger 2510-2 is no longer providing the direct touch input to the D key of the virtual keyboard 2515 (e.g., the index finger 2510-2 is no longer contacting the D key) after the movement of the hand 2503*e*, the D key is redisplayed in a popped-up state in the three-dimensional environment 2502.

In some embodiments, as shown in FIG. 25E, in response to the movement of the hand 2505*d* in FIG. 25D, the computer system 101 detects the index finger 2512-2 within the second threshold distance (Threshold 2) of the selectable option 2506-2, as shown in the legend 2506. In some embodiments, as mentioned above, when the index finger 2512-2 of the hand 2505*e* comes within the second threshold distance of the selectable option 2506-2, the computer system 101 activates (e.g., selects) the selectable option 2506-2. Additionally, as shown in FIG. 25E, as similarly described above, the computer system 101 changes the visual appearance of the second glow effect 2532*b* when the index finger 2512-2 selects the selectable option 2506-2 (e.g., is within the second threshold distance of the second selectable option 2506-2). For example, as shown in FIG. 25E, the computer system 101 increases the brightness of the second glow effect 2532*b* and/or decreases the size of the second glow effect 2532*b* (e.g., compared to the second glow effect 2532*b* in FIG. 25D). In some embodiments, in FIG. 25E, as similarly described above, the computer system 101 also changes the visual appearance of the selectable option 2506-2 such that the selectable option 2506-2 appears to be pushed down onto the surface of the user interface object 2507, indicating that the selectable option 2507 has been selected.

In some embodiments, when the computer system 101 activates the selectable option 2506-2, the computer system 101 outputs audio 2535 that indicates the selectable option 2506-2 has been activated (e.g., selected). For example, the computer system 101 outputs, via a speaker device of the computer system 101, a chime, a ring, a tune, or other sound. In some embodiments, one or more characteristics of the audio 2535 are based on the particular object selected in the three-dimensional environment 2502. For example, in FIG. 25E, as discussed above, the computer system 101 selects the selectable option 2506-2, which is a selectable button in the web-browsing user interface of the user interface object 2507. Accordingly, the audio 2535 is optionally output with a first level of volume, a first type of sound, and/or a first duration. In some embodiments, if a selection operation is performed with respect to a non-button element, such as a scroll element of a scrolling region in the user interface object 2507, the computer system 101 outputs audio that has a second level of volume (e.g., less than the first level of volume), a second type of sound (e.g., a different chime or ring than the first type of sound), and/or a second duration (e.g., less than the first duration).

Figure 25F:
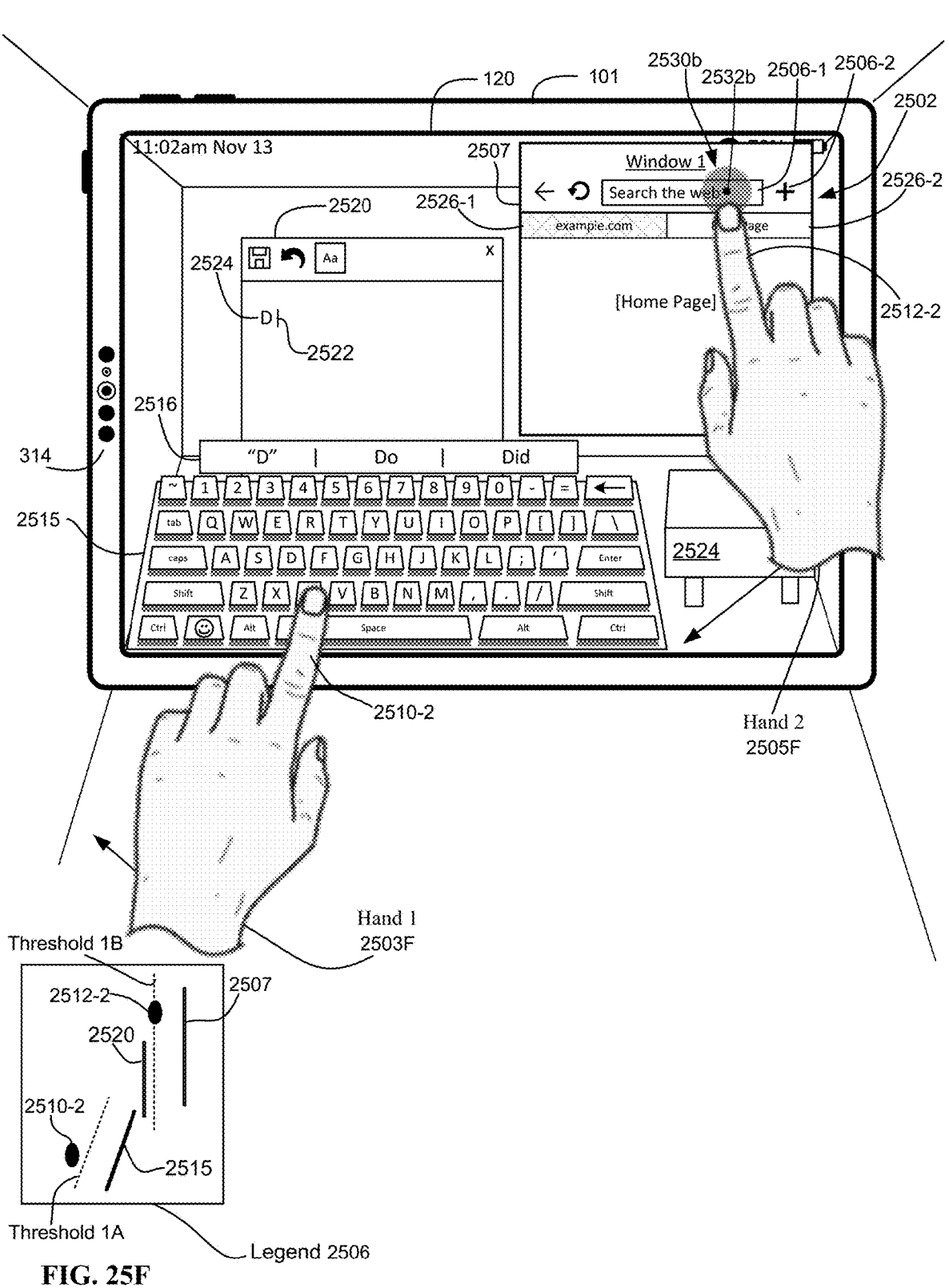

In FIG. 25E, the computer system 101 detects movement of the hand 2503*e* away from the virtual keyboard 2515 in the three-dimensional environment 2502. Additionally, in FIG. 25E, the computer system 101 detects movement of the hand 2505*e*, including lateral (e.g., leftward) movement of the hand 2505*e*, relative to the selectable object 2506-2 in the user interface object 2507. In some embodiments, as shown in FIG. 25F, in response to detecting the movement of the hand 2503*e* away from the virtual keyboard 2515 in FIG. 25E, the computer system 101 detects the index finger 2510-2 of the hand 2503*f* is no longer within the threshold distance (Threshold 1A) of the virtual keyboard 2515, as shown in the legend 2506. Accordingly, in some embodiments, the computer system 101 ceases display of the visual indication (e.g., the first glow effect 2532*a*) of the index finger 2510-2 in the three-dimensional environment 2502, as shown in FIG. 25F.

In some embodiments, as shown in FIG. 25F, after the computer system 101 activates (e.g., selects) the selectable option 2506-2 in FIG. 25E, the computer system 101 performs an operation associated with the selectable option 2506-2. For example, in FIG. 25F, the computer system 101 has navigated (e.g., within the web-browsing application) to a home page (e.g., a default starting page) in a new tab 2526-2 in the web-browsing user interface of the user interface object 2507, while the page corresponding to www.example.com described above is now displayed in a first tab 2526-1 in the web-browsing user interface. Additionally, in FIG. 25F, in response to detecting the movement of the hand 2505e in FIG. 25E, in accordance with a determination that the index finger 2512-2 is within the threshold distance (Threshold 1B) of the user interface object 2507, as shown in the legend 2506, the computer system 101 moves the second glow effect 2532b in accordance with the movement of the hand 2505f. For example, as shown in FIG. 25F, the computer system 101 moves the second glow effect 2532b leftward in the user interface object 2507 in accordance with the leftward movement of the hand 2505f.

As mentioned above, in some embodiments, the computer system 101 selectively changes a visual appearance of a respective option of which the index finger 2512-2 of the user is within the threshold distance. For example, in FIGS. 25C-25D, while the second glow effect 2532b is displayed over the selectable option 2506-2, the computer system 101 altered the visual appearance of the selectable option 2506-2 such that the selectable option 2506-2 appeared to be popped up from the surface of the user interface object 2507. In FIG. 25F, the second glow effect 2532b has moved over a location corresponding to the input field 2506-1 of the user interface object 2507. However, as shown in FIG. 25F, the computer system 101 forgoes altering a visual appearance of the input field 2506-1 while the second glow effect 2532b is displayed over the input field 2506-1. In some embodiments, the computer system 101 alters the visual appearance of selectable options and buttons but does not alter the visual appearance of selectable input fields or scroll regions (e.g., which controls the scrolling functionality within a user interface).

Figure 25G:
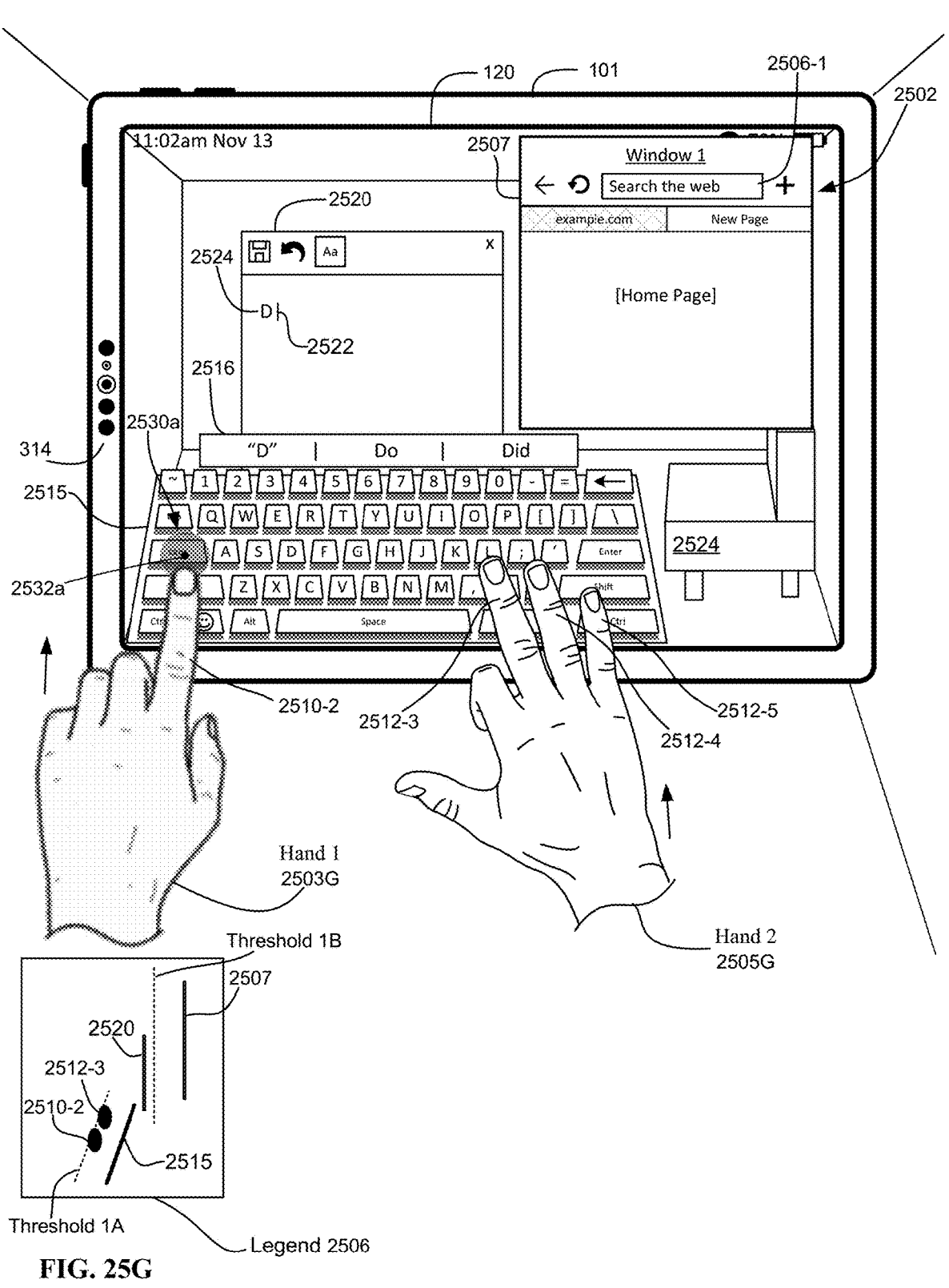

In FIG. 25F, the computer system 101 detects movement of the hands 2503f and 2505f. For example, as shown in FIG. 25F, the computer system 101 detects the hand 2503f move relative to the virtual keyboard 2515 and the hand 2505f move relative to the user interface object 2507. In some embodiments, as shown in FIG. 25G, in response to detecting the movement of the hand 2503f in FIG. 25F, the computer system 101 detects the index finger 2510-2 within the threshold distance (Threshold 1A) of the virtual keyboard 2515, as shown in the legend 2506. Accordingly, as similarly described herein, the computer system 101 displays the first glow effect 2532a over the virtual keyboard 2515 based on a location of the index finger 2510-2 relative to the virtual keyboard 2515 (e.g., based on the interaction point 2530a of the index finger 2510-2). For example, as shown in FIG. 25G, the first glow effect 2532a is displayed over "caps lock" key of the virtual keyboard 2515 in the three-dimensional environment 2502.

Additionally, in FIG. 25G, in response to detecting the movement of the hand 2505f in FIG. 25F, the computer system 101 detects a second finger, other than the index finger 2512-2, within the threshold distance (Threshold 1A) of the virtual keyboard 2515, as shown in the legend 2506. For example, as shown in FIG. 25G, the computer system 101 detects the middle finger 2512-3, the ring finger 2512-4, and/or the pinky finger 2512-5 within the threshold distance of the virtual keyboard 2515, without detecting the index finger 2512-2 within the threshold distance of the virtual keyboard 2515. In some embodiments, as previously discussed herein, the computer system 101 displays the visual indication (e.g., the glow effect 2532a/2532b) of the interaction between a portion (e.g., a finger) of the user and a respective option based on whether the portion is a first finger or a second finger. For example, in FIG. 25G, the computer system 101 optionally displays the first glow effect 2532a on the virtual keyboard 2515 in response to detecting the index finger 2510-2 within the threshold distance of the virtual keyboard 2515 but forgoes displaying the second glow effect 2532b on the virtual keyboard 2515 in response to detecting the finger other than the index finger 2512-2 within the threshold distance of the virtual keyboard 2515.

In some embodiments, the size of the visual indication of the interaction between the portion of the user and a respective option is independent of the size of the respective option in the three-dimensional environment 2502. For example, as shown previously in FIG. 25B, the computer system 101 displays the first glow effect 2532a over the H key of the virtual keyboard 2515 at a respective size in the three-dimensional environment 2502. As shown in FIG. 25G, the caps lock key of the virtual keyboard 2515 is larger (e.g., wider) than the H key in FIG. 25B, yet the first glow effect 2532a is displayed at the respective size in the three-dimensional environment 2502. Rather, as discussed herein, the size of the visual indication (e.g., the glow effects 2532a/2532b) is displayed based on the distance between the portion of the user (e.g., the index finger of the hand) and the respective option.

In FIG. 25G, the computer system 101 detects movement of the hands 2503g and 2505g toward the virtual keyboard 2515 in the three-dimensional environment 2505. For example, as shown in FIG. 25G, the computer system 101 detects the index finger 2510-2 of the hand 2503g move toward the caps lock key of the virtual keyboard 2515 and the middle finger 2512-3 of the hand 2505g move toward "L" key of the virtual keyboard 2515. In some embodiments, as described below, the computer system 101 selectively accepts direct inputs from a portion (e.g., a finger) of the user that is directed to a respective option based on whether the portion is a first finger of a second finger of a hand of the user.

Figure 25H:
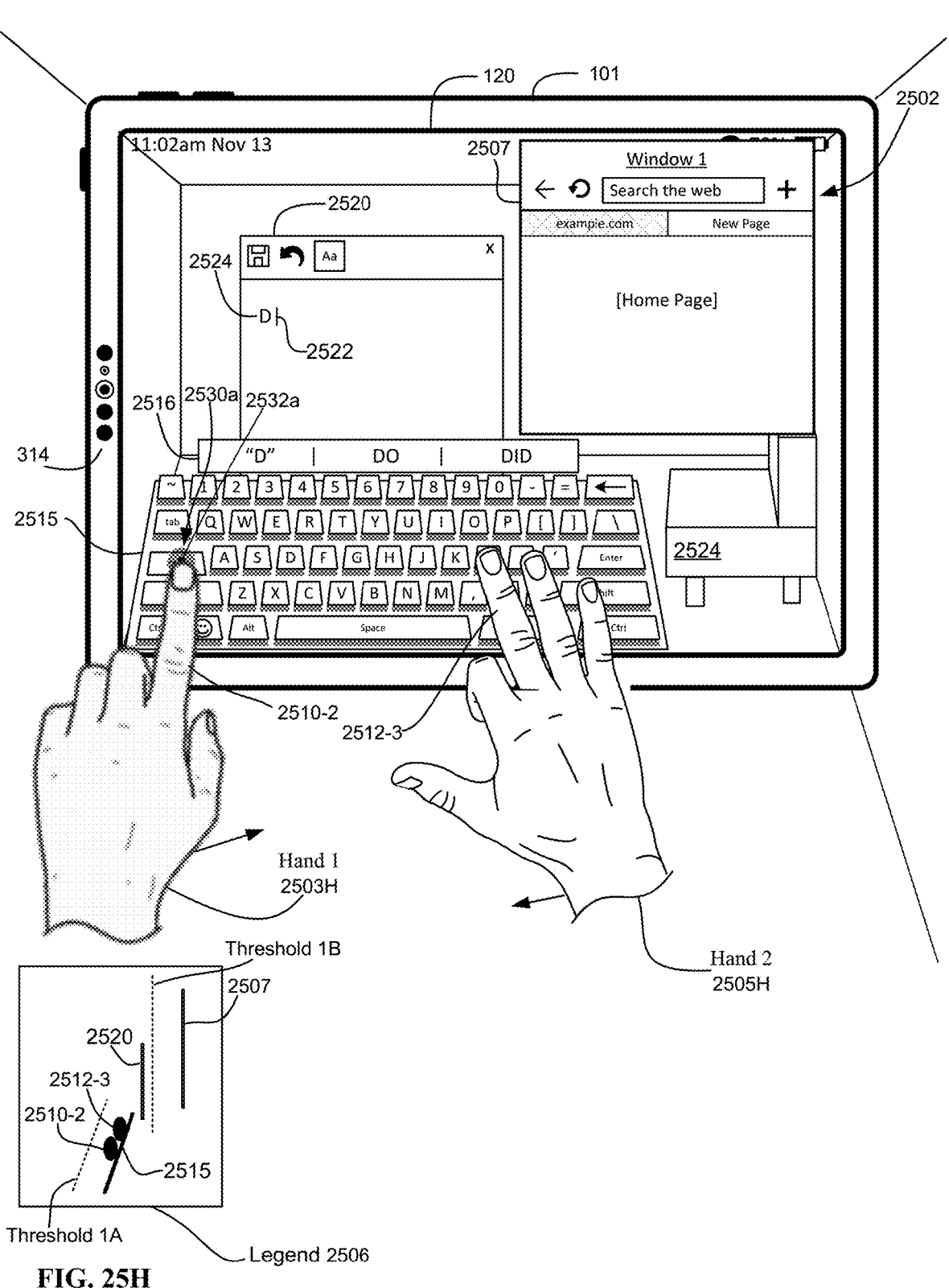

In some embodiments, as shown in FIG. 25H, in response to detecting the movement of the hand 2503g toward the virtual keyboard 2515 in FIG. 25G, the computer system 101 detects the index finger 2510-2 provide direct touch input (e.g., a tap) directed to the caps lock key of the virtual keyboard 2515. In some embodiments, because the direct touch input is provided by the index finger 2510-2 of the hand 2503h, the computer system 101 activates (e.g., selects) the caps lock key of the virtual keyboard 2515. As shown in FIG. 25H, when the computer system 101 activates the caps lock key, the computer system 101 optionally changes the visual appearance of the caps lock key such that the caps lock key appears to be pushed down onto the surface of the virtual keyboard 2515, as similarly described herein, to indicate that the key has been selected. In some embodiments, in FIG. 25H, when the caps lock key is activated, the computer system 101 activates caps lock mode for the virtual keyboard 2515. For example, text entered into the text entry region 2520 will be capitalized irrespective of the location of the cursor 2522 within a word or group of words, as indicated by the capitalization of each of the letters in the suggested text of the user interface element 2516.

Additionally, as shown in FIG. 25H, the computer system changes the visual appearance of the first glow effect 2532a in a similar manner as described above.

Additionally, as shown in FIG. 25H, in response to detecting the movement of the hand 2505g toward the virtual keyboard 2515 in FIG. 25G, the computer system 101 detects the middle finger 2512-3 (and/or another finger other than the index finger 2512-2) of the hand 2505h provide direct touch input (e.g., a tap) directed to the L key of the virtual keyboard 2515. In some embodiments, because the direct touch input is provided by the middle finger 2512-3 of the hand 2505h, the computer system 101 forgoes activating the L key of the virtual keyboard 2515. For example, in FIG. 25H, the computer system 101 does not display the letter "L" at the location of the cursor 2522 in the text-entry region 2520. Additionally, as shown in FIG. 25H, the computer system 101 forgoes changing the visual appearance of the L key in the three-dimensional environment 2502 (e.g., forgoes causing the L key to appear to be pushed down to the surface of the virtual keyboard 2515), indicating that the L key is not selected. Accordingly, as described above, in some embodiments, the computer system 101 actively responds to direct touch input provided by an index finger of a hand of the user that is directed to a selectable option but forgoes responding to direct touch input provided by a finger other than the index finger (e.g., the middle finger, ring finger, pinky finger, and/or thumb) of the hand that is directed to the selectable option.

Alternatively, in some embodiments, in response to detecting the input (e.g., direct touch input, such as a tap) provided by the middle finger 2512-3 (or one of the other fingers discussed above, excluding the index finger 2512-2) of the hand 2505h, the computer system 101 activates the L key of the virtual keyboard 2515. For example, the computer system 101 selects the L key and updates the text 2524 to include the letter "L" at the location of the cursor 2522 in the text entry region 2520. However, as shown in FIG. 25H and as similarly described above, the computer system 101 performs the selection without displaying the second glow effect 2532b over the virtual keyboard 2515 in the three-dimensional environment 2502. In some embodiments, the computer system 101 responds to the input provided by the finger(s) other than the index finger 2512-2 of the hand 2505h in FIG. 25H if the input includes an air pinch gesture. For example, the computer system 101 performs the selection operation, despite the second glow effect 2532b not being displayed, if the middle finger 2512-3, ring finger 2512-4, or pinky finger 2512-5 contacts the thumb 2512-1 of the hand 2505h (e.g., forming a pinch hand shape sometimes referred to as an air pinch), optionally while attention (e.g., including gaze) of the user is directed to the L key of the virtual keyboard 2515.

Figure 25I:
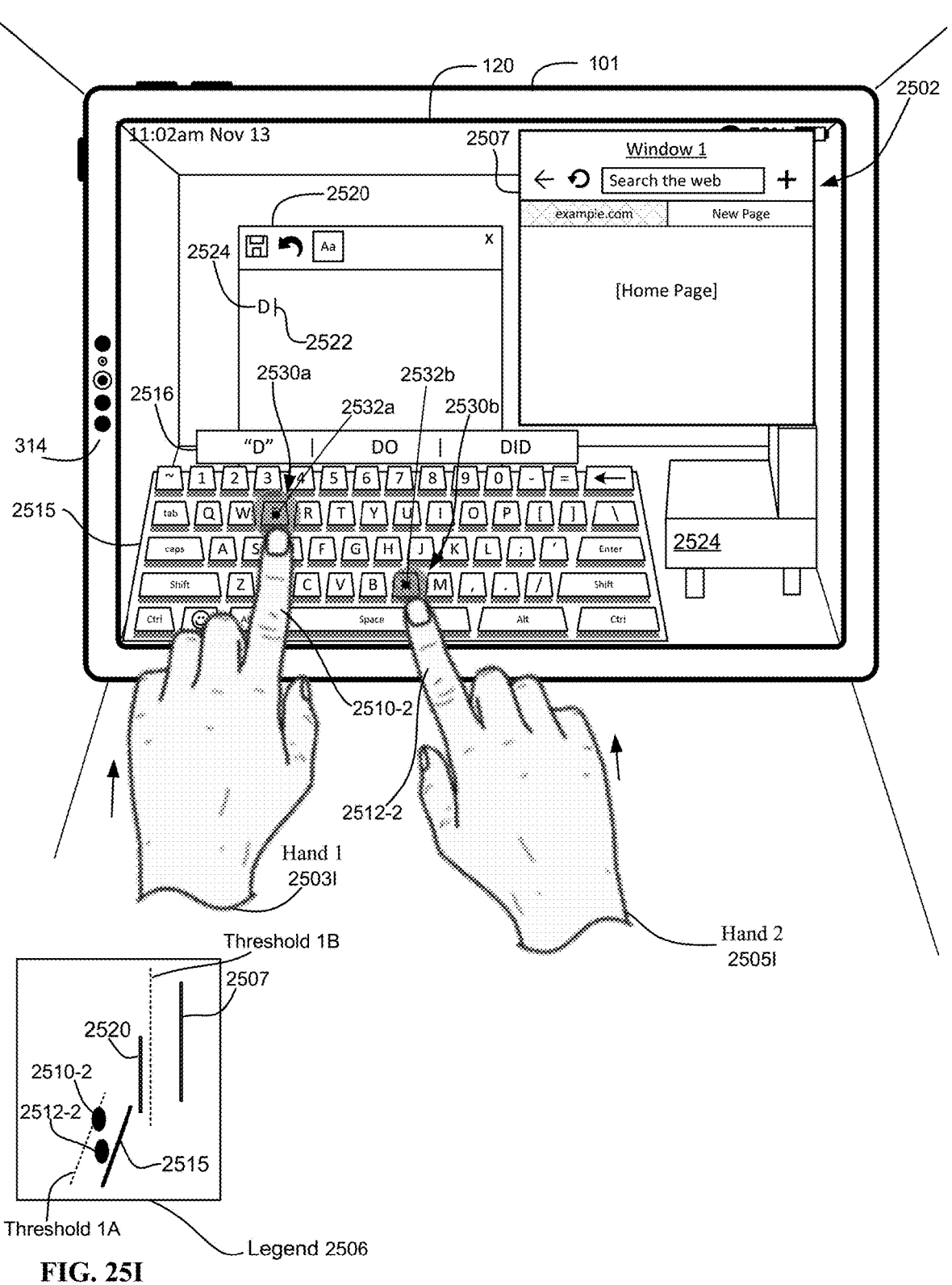

In FIG. 25H, the computer system 101 detects movement of the hands 2503h and 2505h relative to the virtual keyboard 2515 in the three-dimensional environment 2502. For example, as shown in FIG. 25H, the computer system 101 detects the hand 2503h move rightward over the virtual keyboard 2515 and the hand 2505h move leftward over the virtual keyboard 2515 in the three-dimensional environment 2502. In some embodiments, as shown in FIG. 25I, in response to detecting the movement of the hand 2503h in FIG. 25H, the computer system 101 detects the index finger 2510-2 within the threshold distance (Threshold 1A) of the virtual keyboard 2515, as shown in the legend 2506. Accordingly, as shown in FIG. 25I, the computer system 101 optionally moves the first glow effect 2532a in accordance with the movement of the index finger 2510-2. For example, in FIG. 25I, the computer system 101 moves the first glow effect 2532a (e.g., diagonally) rightward over the virtual keyboard 2515 to be positioned over "E" key of the virtual keyboard 2515. Additionally, as shown in FIG. 25I, because the index finger 2510-2 of the hand 2503i has moved away from the location corresponding to the caps lock key (e.g., the index finger 2510-2 is no longer contacting the caps lock key) of the virtual keyboard 2515, the computer system 101 updates the visual appearance of the caps lock key such that the caps lock key appears to be popped back up from the surface of the virtual keyboard 2515.

In some embodiments, as shown in FIG. 25I, in response to detecting the movement of the hand 2505h in FIG. 25H, the computer system 101 detects the index finger 2512-2 within the threshold distance (Threshold 1A) of the virtual keyboard 2515, as shown in FIG. 25I. Accordingly, in some embodiments, as shown in FIG. 25I, the computer system 101 redisplays the second glow effect 2532b over the virtual keyboard 2515 in the three-dimensional environment 2502. For example, as similarly described herein, the computer system 101 displays the second glow effect 2532b based on the location of the index finger 2512-2 relative to the virtual keyboard 2515 (e.g., based on the interaction point 2530b of the index finger 2512-2), such that the second glow effect 2532b is displayed over "N" key of the virtual keyboard 2515 in the three-dimensional environment 2502.

In FIG. 25I, the index finger 2510-2 of the hand 2503i and the index finger 2512-2 of the hand 2505i are optionally positioned different distances away from the surface of the virtual keyboard 2515. For example, as shown in the legend 2506, the index finger 2512-2 is positioned closer to the surface of the virtual keyboard 2515 than the index finger 2510-2. Accordingly, as similarly described herein, the computer system 101 optionally displays the first glow effect 2532a and the second glow effect 2532b with different visual appearances. For example, as shown in FIG. 25I, the second glow effect 2532b is displayed with a greater brightness and at a smaller size than the first glow effect 2532a because the index finger 2512-2 with which the second glow effect 2532b is associated is closer to the surface of the virtual keyboard 2515 than the index finger 2510-2 with which the first glow effect 2532a is associated.

Figure 25J:
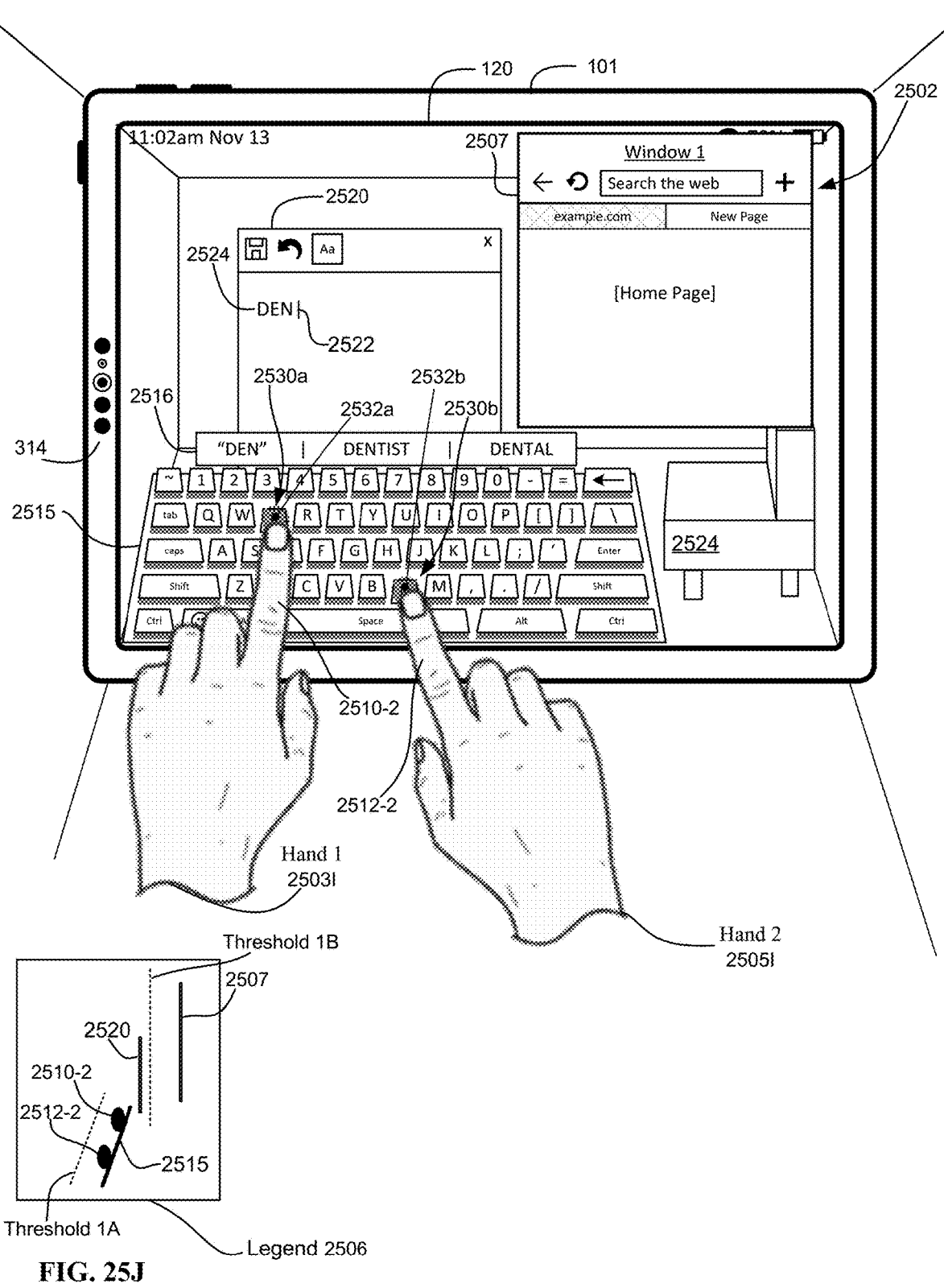
Figure 26B:
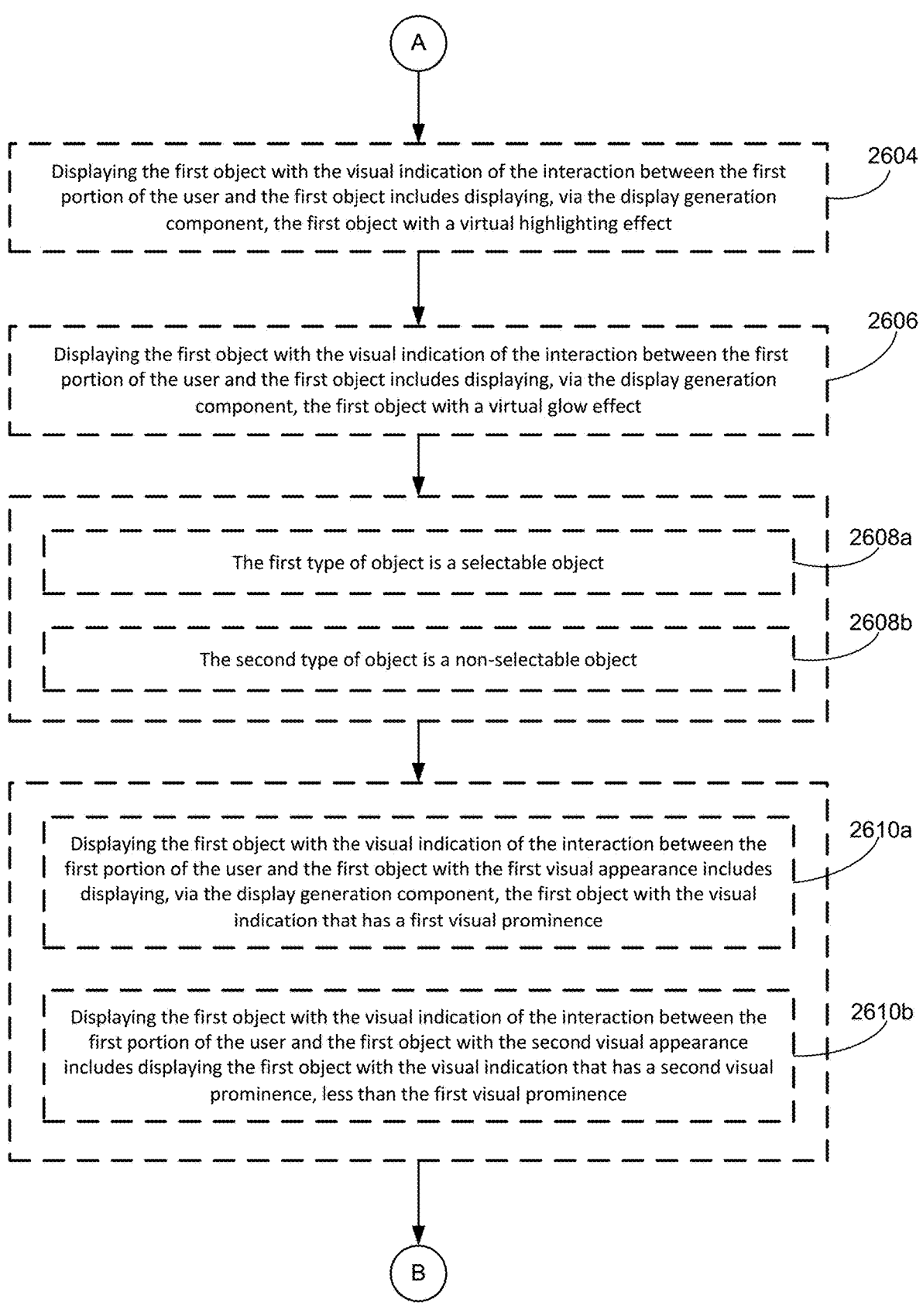
Figure 26F:
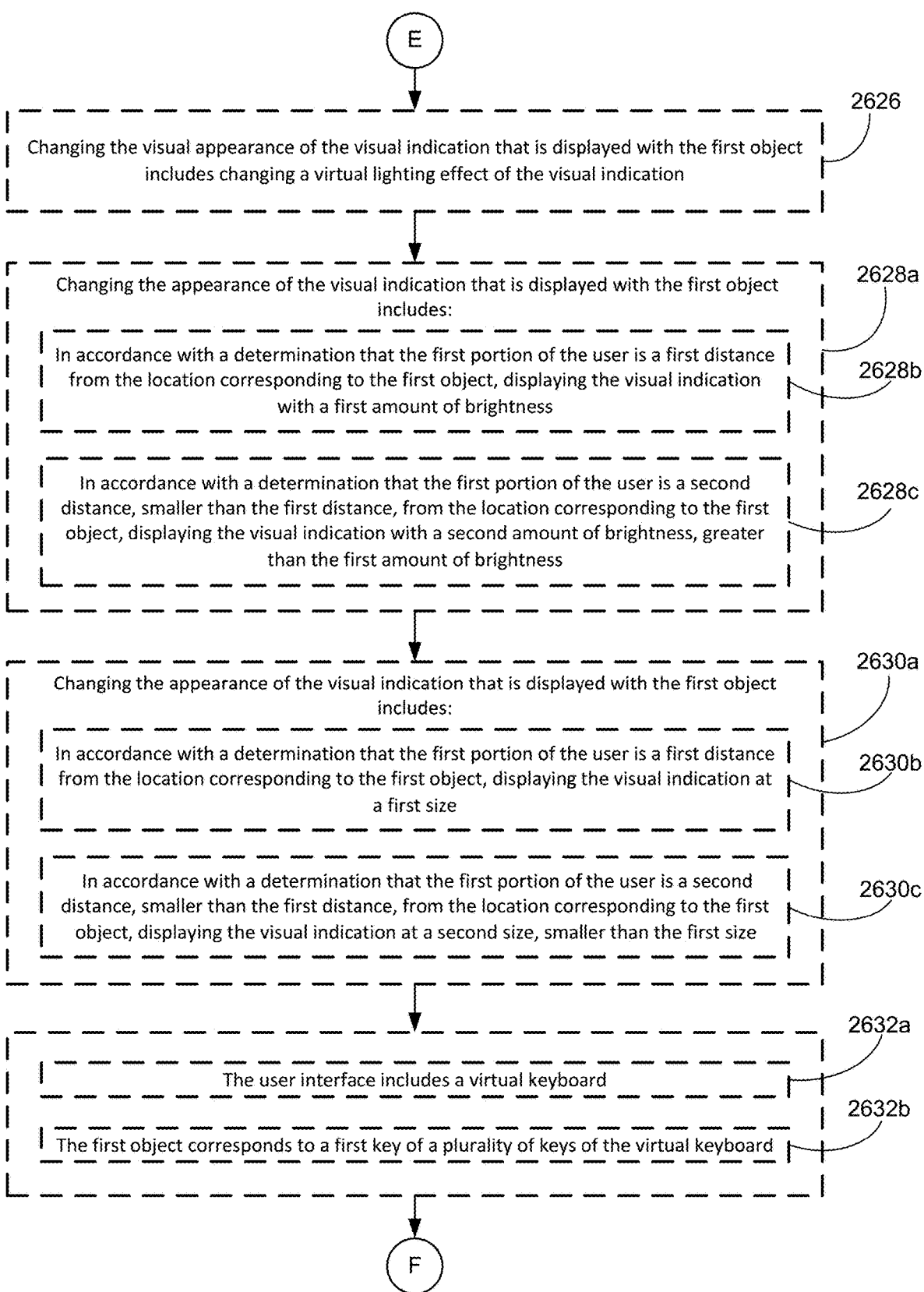
Figure 26H:
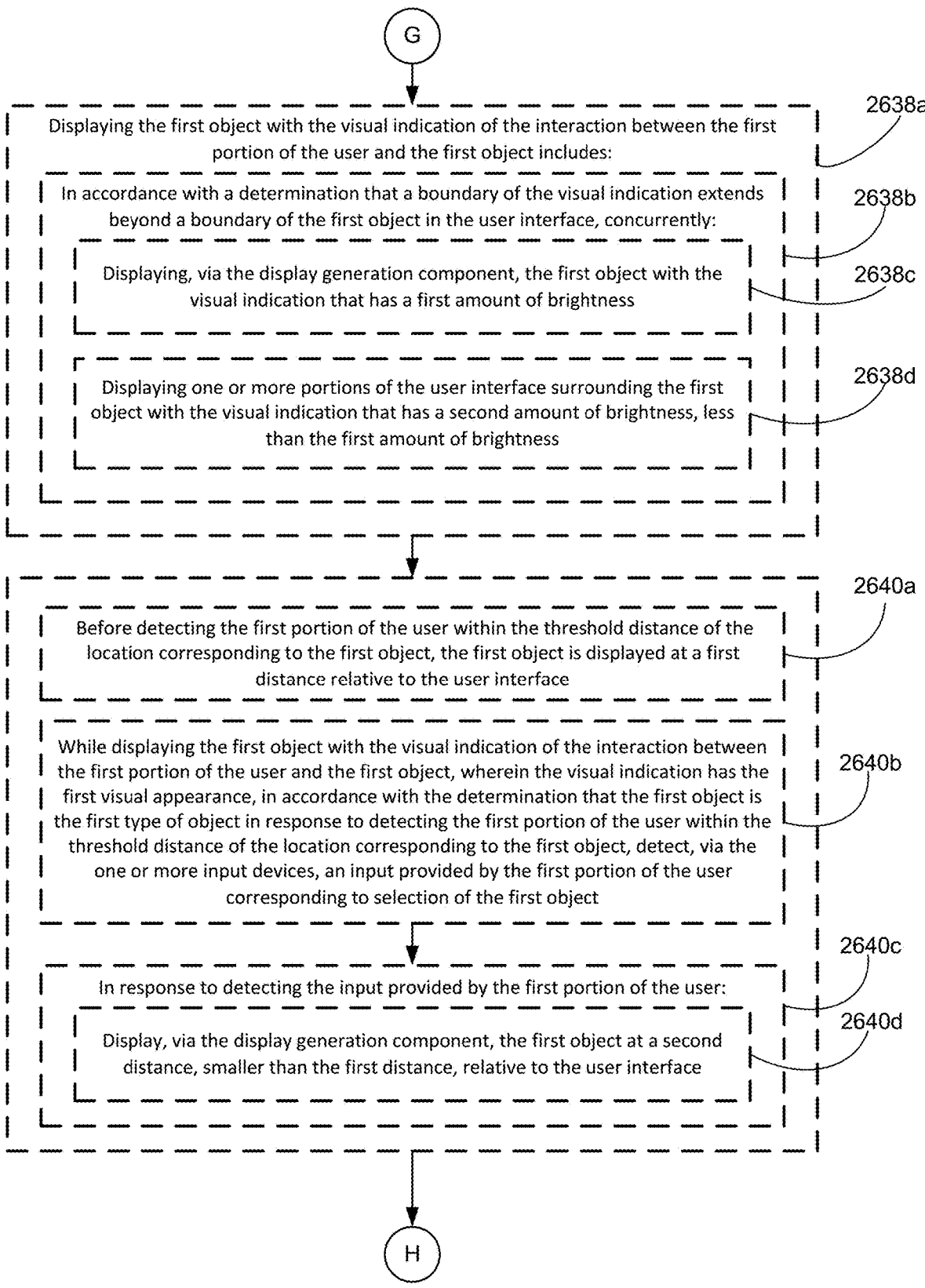
Figure 26I:
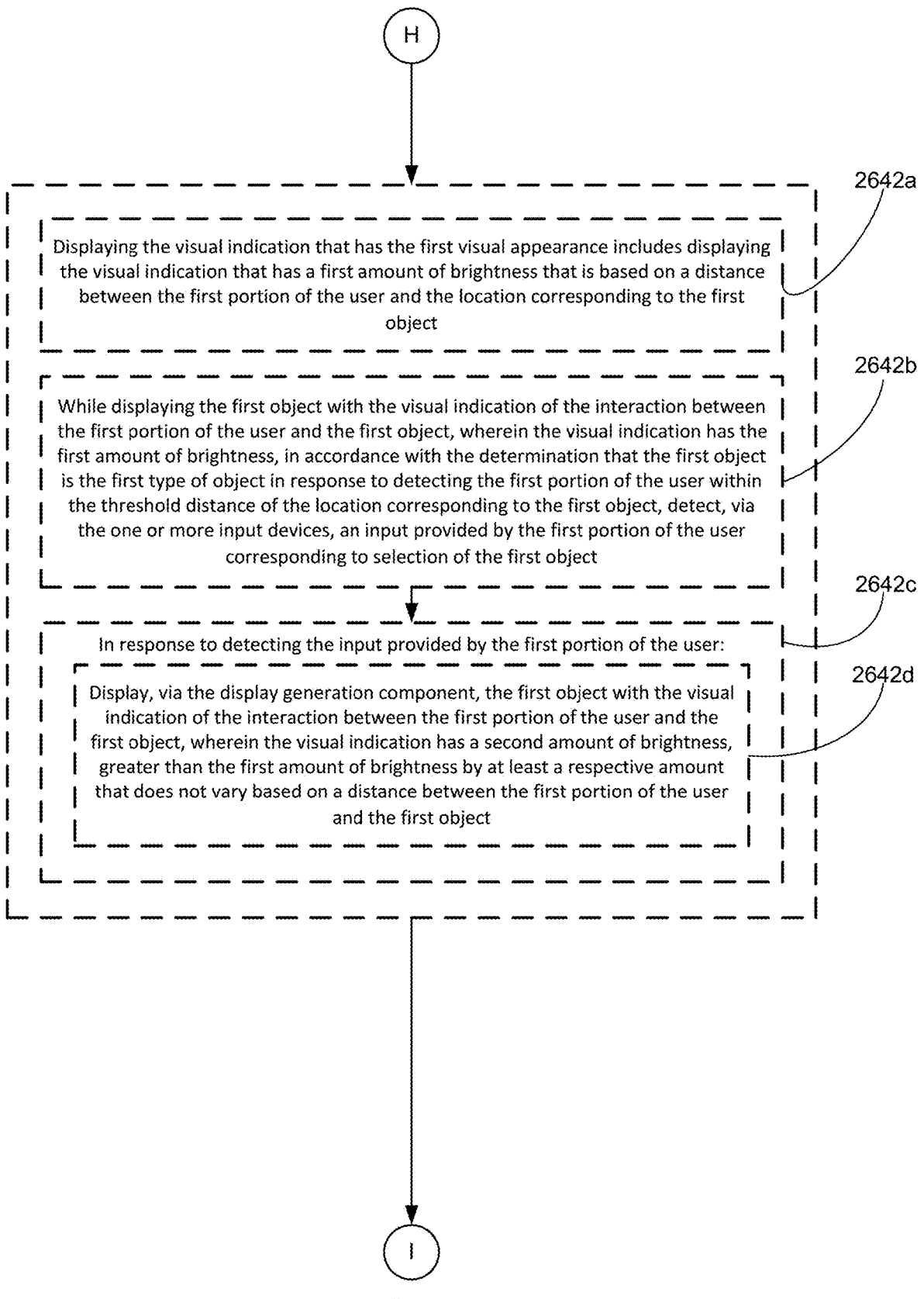
Figure 27A:
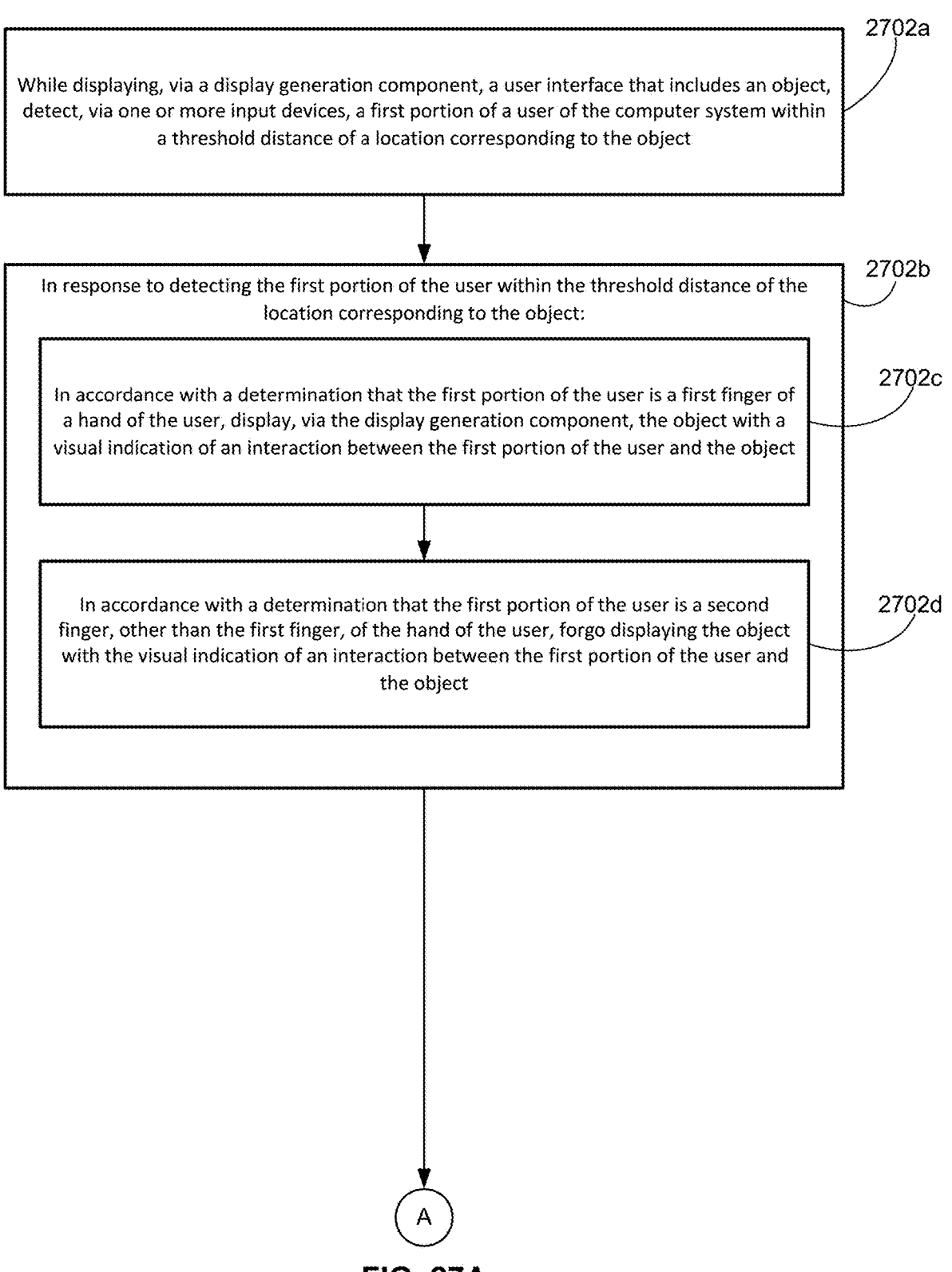
Figure 27F:
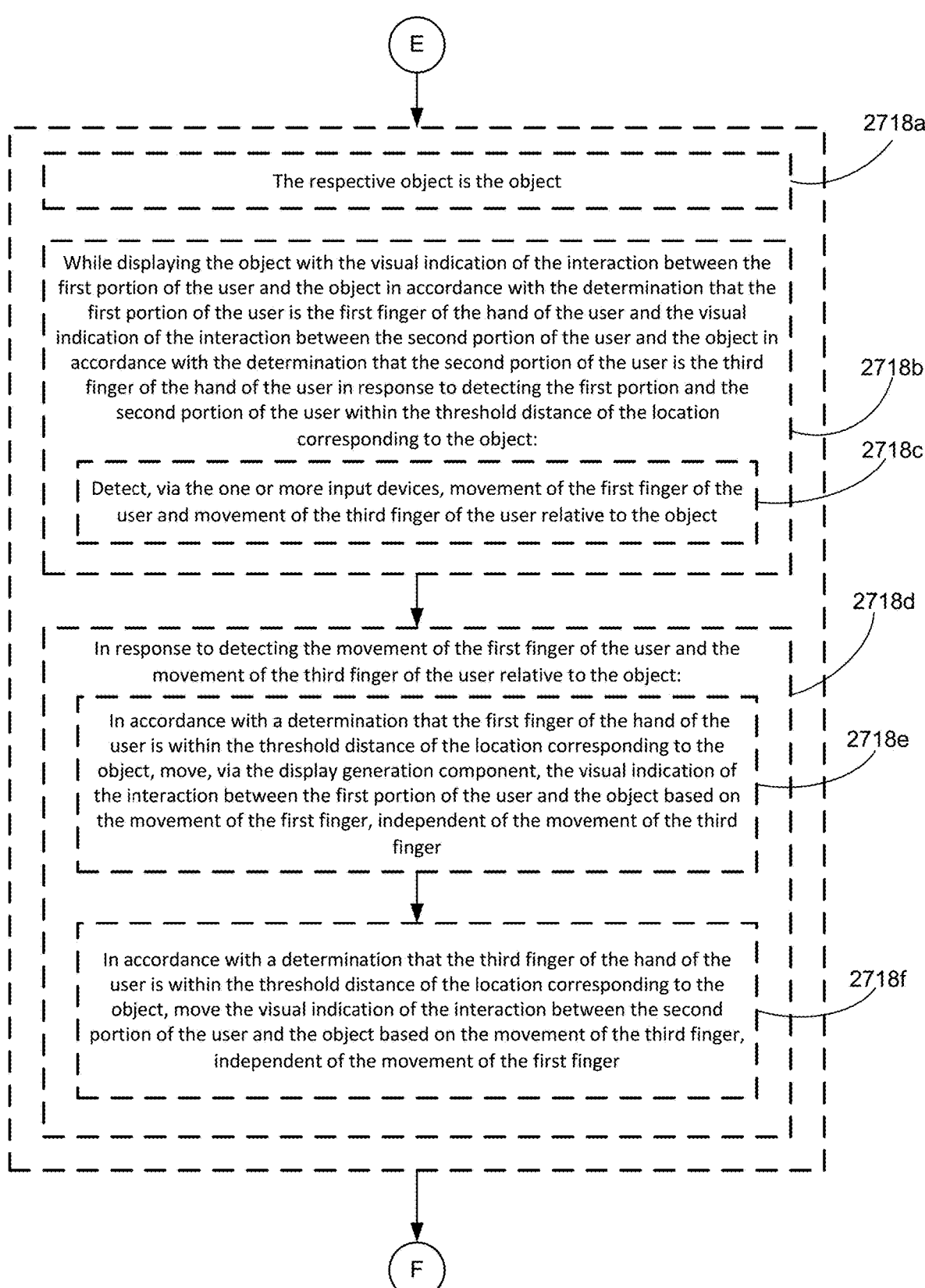
Figure 28F:
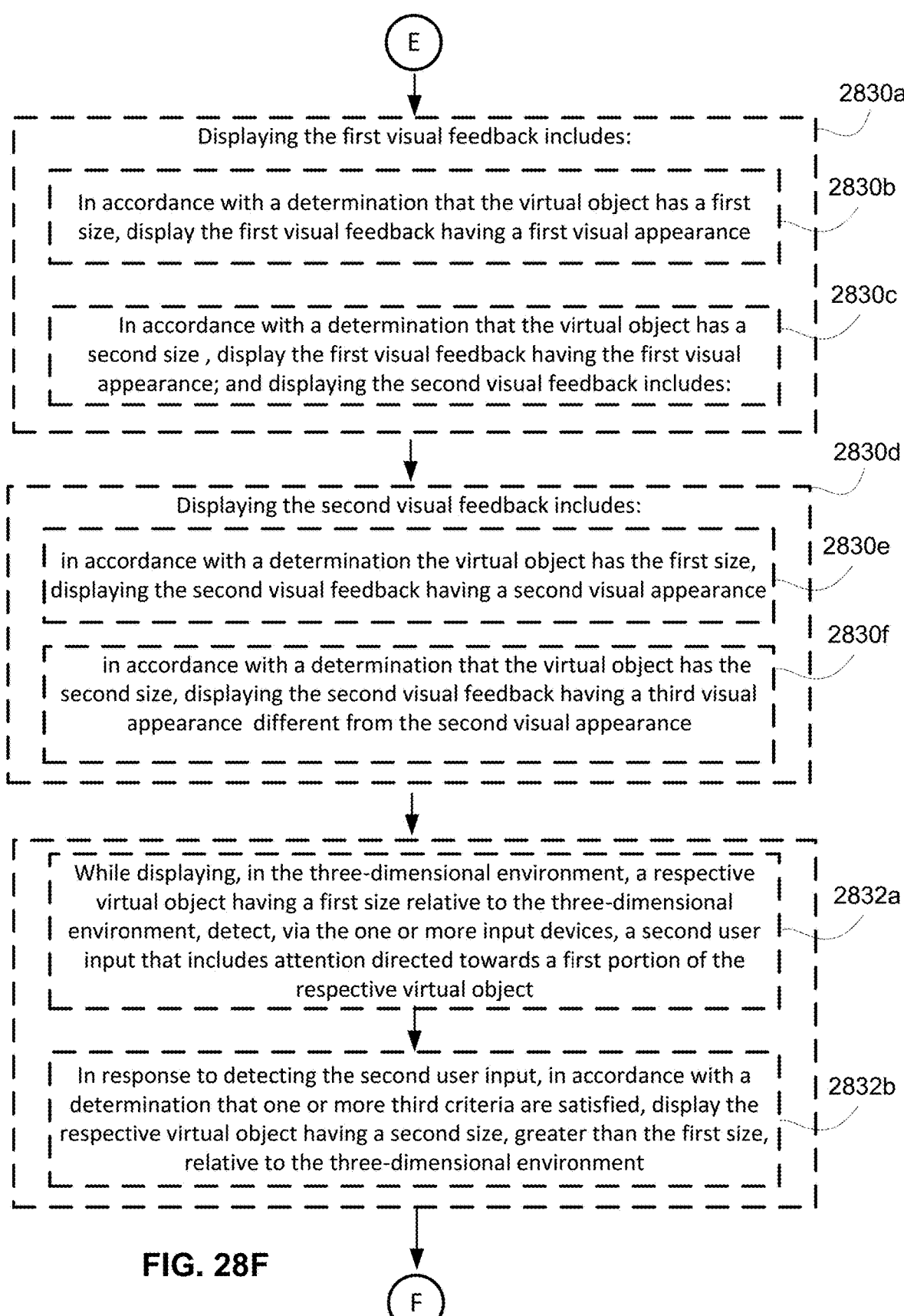

In FIG. 25I, the computer system 101 detects the hands 2503i and 2505i move relative to the virtual keyboard 2515 in the three-dimensional environment 2502. For example, as shown in FIG. 25I, the computer system 101 detects the hands 2503i and 2505i move toward the surface of the virtual keyboard 2515 (e.g., optionally with different magnitudes (e.g., of speed and/or distance)). In some embodiments, as shown in FIG. 25J, in response to detecting the movement of the hand 2503i toward the virtual keyboard 2515, the computer system 101 detects a direct touch input (e.g., a tap) directed to the E key of the virtual keyboard 2515 provided by the index finger 2510-2, as similarly shown in the legend 2506. As shown in FIG. 25J, in response to detecting the direct touch input provided by the index finger 2510-2, the computer system 101 optionally activates the E key of the virtual keyboard 2515. In some embodiments, when the computer system 101 activates the E key, the computer system 101 updates the text 2524 to include the letter "E" at the location of the cursor 2522 in the text entry region 2520. As similarly described above, in some embodiments, when the computer system 101 activates the E key, the computer system 101 changes the visual appearance of the E key such that the E key appears to be pushed down onto the surface of the virtual keyboard 2515. Additionally, as shown in FIG. 25J, the computer system 101 updates the visual appearance of the first glow effect 2532*a*, such that the brightness of the first glow effect 2532*a* is increased and/or the size of the first glow effect 2532*a* is decreased, indicating that the E key has been selected.

FIG. 25I1 illustrates similar and/or the same concepts as those shown in FIG. 25I (with many of the same reference numbers). It is understood that unless indicated below, elements shown in FIG. 25I1 that have the same reference numbers as elements shown in FIGS. 25A-25J have one or more or all of the same characteristics. FIG. 25I1 includes computer system 101, which includes (or is the same as) display generation component 120. In some embodiments, computer system 101 and display generation component 120 have one or more of the characteristics of computer system 101 shown in FIGS. 25A-25J and display generation component 120 shown in FIGS. 1 and 3, respectively, and in some embodiments, computer system 101 and display generation component 120 shown in FIGS. 25A-25J have one or more of the characteristics of computer system 101 and display generation component 120 shown in FIG. 25I1.

In FIG. 25I1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 25A-25J.

In FIG. 25I1, display generation component 120 is illustrated as displaying content that optionally corresponds to the content that is described as being displayed and/or visible via display generation component 120 with reference to FIGS. 25A-25J. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 25I1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 25I1. Because display generation component 120 is optionally a head-mounted device, the field of view of display generation component 120 is optionally the same as or similar to the field of view of the user.

In FIG. 25I1, the user is depicted as performing an air pinch gesture (e.g., with hand 2503I) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 25A-25J.

In some embodiments, computer system 101 responds to user inputs as described with reference to FIGS. 25A-25J.

In the example of FIG. 25I1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 25A-25J and/or described with reference to the corresponding method(s) are optionally implemented on computer system 101 and display generation unit 120 in a manner similar or analogous to that shown in FIG. 25I1.

Additionally, in FIG. 25J, in response to detecting the movement of the hand 2505*i* toward the virtual keyboard 2515, the computer system 101 optionally detects a direct touch input (e.g., a tap) directed to the N key of the virtual keyboard 2515 provided by the index finger 2512-2, as similarly shown in the legend 2506. As shown in FIG. 25J, in response to detecting the direct touch input provided by the index finger 2512-2, the computer system 101 optionally activates the N key of the virtual keyboard 2515. In some embodiments, when the computer system 101 activates the N key, the computer system 101 updates the text 2524 to include the letter "N" at the location of the cursor 2522 in the text entry region 2520 (e.g., after the letter E in the text 2524). As similarly described above, in some embodiments, when the computer system 101 activates the N key, the computer system 101 changes the visual appearance of the N key such that the N key appears to be pushed down onto the surface of the virtual keyboard 2515. Additionally, as shown in FIG. 25J, the computer system 101 optionally updates the visual appearance of the second glow effect 2532*b*, such that the brightness of the second glow effect 2532*b* is increased and/or the size of the second glow effect 2532*b* is decreased, indicating that the N key has been selected. Accordingly, as described above, in some embodiments, the computer system 101 independently responds to input provided by the index fingers 2510-2 and 2512-2 of the hands 2503*i* and 2505*i* while the index fingers 2510-2 and 2512-2 are within the threshold distance of the virtual keyboard 2515.

FIGS. 26A-26J is a flowchart illustrating a method 2600 of facilitating direct touch interactions with content in a three-dimensional environment. In some embodiments, the method 2600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2600 are, optionally, combined and/or the order of some operations is, optionally, changed.

In some embodiments, method 2600 is performed at a computer system (e.g., 101) in communication with a display generation component and one or more input devices. For example, the computer system optionally has one or more of the characteristics of the computer systems of methods 800, 900, 1000, 1200, 1400, 1600, 1800, 2000, 2200, 2400, 2700, 2800, and/or 3000. In some embodiments, the display generation component has one or more of the characteristics of the display generation components of methods 800, 900, 1000, 1200, 1400, 1600, 1800, 2000, 2200, 2400, 2700, 2800, and/or 3000. In some embodiments, the one or more input devices have one or more of the characteristics of the one or more input devices described with reference to methods 800, 900, 1000, 1200, 1400, 1600, 1800, 2000, 2200, 2400, 2700, 2800, and/or 3000.

In some embodiments, while displaying, via the display generation component, a user interface that includes a first object (e.g., virtual object 2507 including a plurality of selectable options or virtual keyboard 2515 as shown in FIG. 25A), the computer system detects (2602a), via the one or more input devices, a first portion (e.g., a finger of a hand) of a user of the computer system within a threshold distance (e.g., 0.1, 0.25, 0.5, 0.75, 0.9, 1, 1.5, 2, 3, 5, or 10 cm), such as Threshold 1A/1B in legend 2506 in FIG. 25B, of a location corresponding to the first object (e.g., in the user interface), such as movement of hand 2503a and/or hand 2505a as shown in FIG. 25A. In some embodiments, the user interface is displayed in or is a three-dimensional environment as described with reference to methods 800, 900, 1000, 1200, 1400, 1600, 1800, 2000, 2200, 2400, 2700, 2800, and/or 3000. In some embodiments, the user interface is a user interface as described with reference to methods 800, 900, 1000, 1200, 1400, 1600, 1800, 2000, 2200, 2400, 2700, 2800, and/or 3000. In some embodiments, the user interface is a virtual keyboard that includes a plurality of selectable keys, including the first object. For example, the first object is a first key of the virtual keyboard. In some embodiments, the user interface is an application window associated with an application running on the computer system that is displaying the first object. For example, the first object is a user interface element or object that is associated with or corresponds to content displayed in the application window, such as a selectable option or button, a text-input field, a scroll bar, an image, a hyperlink, and/or a video clip. In some embodiments, the first object is a three-dimensional object, such as a three-dimensional model (e.g., a three-dimensional rendering of a real-world object, a three-dimensional object created in a content creation application, and/or a three-dimensional character associated with a gaming application). In some embodiments, as discussed in more detail below, the first object is categorized as either a first type of object or a second type of object (e.g., different from the first type of object). In some embodiments, while the first object is displayed in the user interface, the computer system detects that a first finger (e.g., an index finger) of a hand of the user is within the threshold distance discussed above of a location of the first object in the user interface. In some embodiments, the computer system detects the first finger of the hand of the user move from a first location in space (e.g., at the user's side or in front of the user's torso) to a second location in space that is within the threshold distance discussed above of the location corresponding to the first object. In some embodiments, the computer system detects the first finger of the hand of the user within the threshold distance discussed above of the location corresponding to the first object without detecting other fingers of the hand within the threshold distance. For example, the computer system detects the index finger of the hand in a pointed/outstretched state while the other fingers of the hand (e.g., the thumb, middle, ring, and/or pinky fingers) are in a curled state (e.g., point toward and/or contacting the palm of the hand). In some embodiments, the computer system detects the first portion of the user is within the threshold distance discussed above of the location corresponding to the first object irrespective of a location of attention (e.g., including gaze) of the user.

In some embodiments, in response to detecting the first portion of the user of the computer system within the threshold distance of the location corresponding to the first object (2602b), in accordance with a determination that the first object is a first type of object, such as selectable key "H" of the virtual keyboard 2515 in FIG. 25B, the computer system displays (2602c), via the display generation component, the first object with a visual indication of an interaction between the first portion of the user and the first object, such as visual indication 2532a as shown in FIG. 25B, wherein the visual indication of the interaction between the first portion of the user and the first object has a first visual appearance. As mentioned above, in some embodiments, the first object is a first type of object. In some embodiments, the first type of object corresponds to an object that is selectable in the user interface. For example, user input corresponding to a request to select the object that is the first type of object causes the computer system to activate the object. Accordingly, in some embodiments, user input corresponding to a request to select the first object in the user interface causes the computer system to activate the first object (e.g., perform a respective operation associated with the first object) when the first object is the first type of object. In some embodiments, if the computer system determines that the first object is the first type of object, the computer system displays the first object with a visual indication of the interaction between the first portion of the user and the first object. For example, the computer system displays a visual indication of the finger (e.g., index finger) of the user that is within the threshold distance discussed above of the location corresponding to the first object. In some embodiments, displaying the visual indication includes displaying the first object with a visual highlighting effect (e.g., highlighting the first object in the user interface without highlighting other objects in the user interface). In some embodiments, displaying the visual indication includes displaying the first object with a glow effect that appears to visually originate from the first portion of the user. For example, displaying the glow effect includes casting virtual light onto the first object that originates from the fingertip of the index finger of the hand of the user (e.g., similar in appearance and/or function to a flashlight or spotlight). In some embodiments, the glow effect of the visual indication has one or more visual characteristics, such as brightness (e.g., intensity), color, size (e.g., diameter), and/or saturation. In some embodiments, the glow effect of the visual indication has one or more characteristics of direct input attention indicators (e.g., glows) described with reference to methods 800, 900, 1000, 1200, 1600, 2000, and/or 2200. In some embodiments, as discussed in more detail below, the one or more visual characteristics are configured to dynamically change based on changes in the location of the first portion of the user relative to the first object in the user interface (e.g., movement of the index finger of the hand closer to or farther from the location corresponding to the first object). In some embodiments, the visual indication provides feedback regarding a location of the first portion of the user relative to the first object for selection. For example, displaying the first object with the visual indication indicates that the first object will be selected in response to further input (e.g., a direct tap/touch of the first object, as discussed in more detail below). In some embodiments, when the first object is the first type of object, the visual indication has a first visual appearance in the user interface. In some embodiments, the first visual appearance of the visual indication corresponds to the brightness of the visual indication (e.g., a brightness of the highlighting effect or the glow effect described above). For example, when the first object is the first type of object, the computer system displays the first object with a first brightness level (e.g., a first amount of intensity). In some embodiments, the first visual appearance of the visual indication additionally or alternatively corresponds to the color of the visual indication (e.g., a color of the highlighting effect or the glow effect described above). For example, when the first object is the first type of object, the computer system displays the first object with a first color (e.g., yellow, orange, off white, and/or red).

In some embodiments, in accordance with a determination that the first object is a second type of object, different from the first type of object, such as image 2508c in FIG. 25B, the computer system displays (2602d) the first object with the visual indication of an interaction between the first portion of the user and the first object, such as visual indication 2532b as shown in FIG. 25B, wherein the visual indication of the interaction between the first portion of the user and the first object has a second visual appearance, different from the first visual appearance. As mentioned above, in some embodiments, the first object is a second type of object, different from the first type of object. In some embodiments, the second type of object corresponds to an object that is non-selectable in the user interface. For example, user input corresponding to a request to select the object that is the second type of object does not cause the computer system to activate the object. Accordingly, in some embodiments, user input corresponding to a request to select the first object in the user interface does not cause the computer system to activate the first object (e.g., perform a respective operation associated with the first object) when the first object is the second type of object. In some embodiments, if the computer system determines that the first object is the second type of object, the computer system displays the first object with the visual indication described above but displays the visual indication with a second visual appearance, different from the first visual appearance. As discussed above, one characteristic of the visual indication (e.g., the highlighting effect or the glow effect) is optionally brightness (e.g., intensity). In some embodiments, when the first object is the second type of object, the computer system displays the first object with a second brightness level (e.g., a second amount of intensity) that is smaller than the first brightness level discussed above. In some embodiments, when the first object is the second type of object the computer system displays the first object with a second color (e.g., blue, green, black, and/or brown) that is different from the first color discussed above. In some embodiments, displaying the visual indication with the second visual appearance includes forgoing displaying the visual indication with the first object. For example, the computer system does not display the first object with the highlighting effect or the glow effect in the user interface (e.g., because the first object is non-selectable).

In some embodiments, the visual indication changes in appearance based on a change in position of the first portion of the user relative to a location corresponding to the first object (2602e), as similarly described with reference to FIG. 25C. For example, the visual indication is displayed with the first object in the user interface because the first portion (e.g., finger) of the user is located within the threshold distance discussed above of the location corresponding to the first object. In some embodiments, a size of the visual indication corresponds to a distance between the first portion of the user and the first object in the user interface. For example, as discussed in more detail below, if the finger of the hand of the user is a first distance from the first object in the user interface, the computer system displays the visual indication at a first size (e.g., at a first diameter, length, area, and/or volume) with the first object, and if the finger of the hand of the user is a second distance, smaller than the first distance, from the first object in the user interface, the computer system displays the visual indication at a second size (e.g., at a second diameter, length, area, and/or volume), smaller than the first size, with the first object in the user interface. In some embodiments, a location at which the visual indication is displayed in the user interface corresponds to a location of the first portion of the user relative to the first object in the user interface. For example, if the computer system detects movement of the first portion of the user relative to the user interface, and if the first portion of the user is within the threshold distance discussed above of a second object in the user interface, the computer system displays the second object with the visual indication described above based on the new location of the first portion of the user relative to the user interface. Displaying a visual indication that has a first visual appearance to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, displaying the first object with the visual indication of the interaction between the first portion of the user and the first object includes displaying, via the display generation component, the first object with a virtual highlighting effect (2604) (e.g., as similarly described above with reference to step 2602), such as virtual highlighting of selectable key "D" of the virtual keyboard 2515 as shown in FIG. 25C. In some embodiments, the virtual highlighting effect has one or more characteristics of visual effects described in method 1200. Displaying a highlighting effect that has a first visual appearance to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, displaying the first object with the visual indication of the interaction between the first portion of the user and the first object includes displaying, via the display generation component, the first object with a virtual glow effect (2606) (e.g., as similarly described above with reference to step 2602), such as virtual glow of the visual indication 2532a as shown in FIG. 25B. In some embodiments, the virtual glow effect has one or more characteristics of visual effects described in method 1200. Displaying a glow effect that has a first visual appearance to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, the first type of object is a selectable object (2608a), such as selectable key H of the virtual keyboard 2515 in FIG. 25B, and the second type of object is a non-selectable object (2608b) (e.g., as similarly described above with reference to step 2602), such as the image 2508c of the virtual object 2507 in FIG. 25B. Displaying a visual indication that has a first visual appearance to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, displaying the first object with the visual indication of the interaction between the first portion of the user and the first object with the first visual appearance includes displaying, via the display generation component, the first object with the visual indication that has a first visual prominence (2610a), such as the visual prominence of the visual indication 2532a as shown in FIG. 25B. For example, as similarly described above with reference to step 2602, if the first object is a selectable object, the computer system displays the visual indication with a first amount of brightness, a first color, a first size, and/or a first saturation on the first object in the user interface.

In some embodiments, the computer system displays the first object with the visual indication of the interaction between the first portion of the user and the first object with the second visual appearance includes displaying the first object with the visual indication that has a second visual prominence, less than the first visual prominence (2610b), such as the visual prominence of the visual indication 2532b as shown in FIG. 25B. For example, as similarly described above with reference to step 2602, if the first object is a non-selectable object, the computer system displays the visual indication with a second amount of brightness, less than the first amount of brightness, a second color, different from the first color, a second size, different from the first size, and/or a second saturation, less than the first saturation, on the first object in the user interface. Displaying a visual indication that has a first visual prominence to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, the first portion of the user is a first finger (e.g., index finger) of a hand of the user, such as index finger 2510-2 of hand 2503b in FIG. 25B, and displaying the first object with the visual indication of the interaction between the first portion of the user and the first object in response to detecting the first portion of the user within the threshold distance of the location corresponding to the first object is in accordance with a determination that the first portion of the user is the first finger of the hand of the user (2612a) (e.g., as similarly described with respect to method 2700), as similarly shown in legend 2506 in FIG. 25B. In some embodiments, while displaying the first object with the visual indication of the interaction between the first portion of the user and the first object in response to detecting the first portion of the user within the threshold distance of the location corresponding to the first object, the computer system detects (2612b), via the one or more input devices, a second portion of the user within the threshold distance (e.g., 0.1, 0.25, 0.5, 0.75, 0.9, 1, 1.5, 2, 3, 5, or 10 cm) of the location corresponding to the first object, such as movement of hand 2505g toward the virtual keyboard 2515 as shown in FIG. 25G. For example, the computer system no longer detects the index finger of the hand of the user within the threshold distance of the location corresponding to the first object and detects movement of a second finger, other than the index finger, of the hand to within the threshold distance of the location corresponding to the first object, as discussed below. In some embodiments, detecting the second portion of the user within the threshold distance of the location corresponding to the first object has one or more characteristics of detecting the first portion of the user within threshold distance of the location corresponding to the first object as described above with reference to step 2602. In some embodiments, the computer system detects the second portion of the user within the threshold distance of the location corresponding to the first object while the first portion of the user is within the threshold distance of the location corresponding to the first object. For example, the computer system concurrently detects the first finger and the second finger of the hand (or separate hands) of the user within the threshold distance of the location corresponding to the first object.

In some embodiments, in response to detecting the second portion of the user within the threshold distance of the location corresponding to the first object (2612c), in accordance with the determination that the second portion of the user is a second finger, other than the first finger, such as one of fingers 2512-3, 2512-4, and 2512-5 in FIG. 25H, of a hand of the user, the computer system forgoes (2612d) displaying a visual indication of an interaction between the second portion of the user and the first object, such as forgoing displaying a visual indication as shown in FIG. 25H. For example, if the computer system detects a finger other than the index finger of the user, such as a middle finger, ring finger, pinky finger, or thumb of the user, within the threshold distance of the location corresponding to the first object, the computer system does not display the first object with the visual indication for that second finger. In some embodiments, forgoing displaying the visual indication of the interaction between the second portion of the user and the first object has one or more characteristics of forgoing displaying the visual indication as described in method 2700. In some embodiments, in response to detecting the second portion of the user within the threshold distance of the location corresponding to the first object, in accordance with a determination that the second portion of the user is the first finger of a second hand of the user, the computer system displays a visual indication of the interaction between the second portion of the user and the first object, as similarly described with reference to method 2700. Displaying a visual indication that indicates an object with respect to which a selection operation will be performed in response to further input in response to detecting a first finger of a hand of a user within a threshold distance of a location corresponding to the object, without displaying a visual indication of a second finger of the hand of the user, improves accuracy for performing the selection operation and/or facilitates discovery that the further input provided by the first finger will select the object and that further input provided by the second finger will not select the object, thereby improving user-device interaction.

In some embodiments, before detecting the first portion of the user within the threshold distance of the location corresponding to the first object, the first object is displayed at a first distance relative to the user interface, such as a distance of selectable option 2506-2 from a surface of the virtual object 2507 in FIG. 25A, and the threshold distance is a first threshold distance (2614a) (e.g., 0.1, 0.25, 0.5, 0.75, 0.9, 1, 1.5, 2, 3, 5, or 10 cm). For example, the first object is the first distance from a backplane, background, and/or reference plane, such as the surface of, the user interface in which the first object is displayed (e.g., in front of the user interface).

In some embodiments, the first distance corresponds to a distance between the viewpoint of the user and the first object.

In some embodiments, in response to detecting the first portion of the user within the first threshold distance of the location corresponding to the first object (2614b), in accordance with the determination that the first object is the first type of object (e.g., a selectable object), the computer system displays (2614c), via the display generation component, the first object at a second distance, greater than the first distance, relative to the user interface, such as displaying the selectable option 2506-2 at a greater distance from the surface of the virtual object 2507 as shown in FIG. 25C, while concurrently displaying the first object with the visual indication of the interaction between the first portion of the user and the first object (e.g., wherein the visual indication has the first visual appearance). For example, in response to detecting the index finger of the user within the threshold distance of the location corresponding to the first object, the computer system causes the first object to visually appear to "pop up" away from the surface of the user interface (e.g., and toward the tip of the index finger and/or the viewpoint of the user) from the viewpoint of the user. In some embodiments, in accordance with the determination that the first object is the second type of object (e.g., a non-selectable object), the computer system maintains display of the first object at the first distance relative to the user interface while concurrently displaying the first object with the visual indication of the interaction between the first portion of the user and the first object, wherein the visual indication has the second visual appearance. Increasing a distance between a selectable object and a user interface including the selectable object in response to detecting a portion of a user within a threshold distance of a location corresponding to the selectable object improves accuracy for performing a selection operation directed to the selectable object and/or facilitates discovery that the object is a selectable object, thereby improving user-device interaction.

In some embodiments, while displaying the first object at the second distance relative to the user interface (e.g., and/or relative to the viewpoint of the user) in accordance with the determination that the first object is the first type of object in response to detecting the first portion of the user within the first threshold distance (e.g., 0.1, 0.25, 0.5, 0.75, 0.9, 1, 1.5, 2, 3, 5, or 10 cm) of the location corresponding to the first object, the computer system detects (2616a), via the one or more input devices, the first portion of the user within a second threshold distance (e.g., 0.01, 0.03, 0.05, 0.08, 0.10, 0.25, 0.50, 0.75, 1, or 2 cm), less than the first threshold distance, of the location corresponding to the first object, such as movement of index finger 2512-2 of hand 2505c toward the selectable option 2506-2 as shown in FIG. 25C. For example, the computer system detects movement of the index finger of the hand of the user closer toward the first object to within the second threshold distance of the location corresponding to the first object. In some embodiments, the computer system detects the first portion of the user within the second threshold distance of the location corresponding to the first object without detecting contact between the first portion of the user (e.g., the index finger) and the first object in the three-dimensional environment. In some embodiments, the computer system detects the first portion of the user contact the first object in the three-dimensional environment.

In some embodiments, in response to detecting the first portion of the user within the second threshold distance of the location corresponding to the first object (2616b), such as within "Threshold 2" as shown in the legend 2506 in FIG. 25E, the computer system displays (2616c), via the display generation component, the first object at a third distance, less than the second distance (e.g., and equal to the first distance above), relative to the user interface while concurrently displaying the first object with the visual indication of the interaction between the first portion of the user and the first object, such as displaying the selectable option 2506-2 at a decreased distance from the surface of the virtual object 2507 as shown in FIG. 25E. For example, the computer system causes the first object to visually appear to "snap" or "push" down onto the surface of the user interface in the three-dimensional environment from the viewpoint of the user. In some embodiments, detecting the first portion of the user within the second threshold distance corresponds to detecting an input for selecting the first object in the user interface. In some embodiments, displaying the first object at the second distance relative to the user interface is independent of a distance that the first portion of the user moved when providing the input. For example, the first object snaps or pushes down onto the surface of the user interface by a distance that is more (or less) than the distance the first finger of the hand of the user moved when providing the selection directed to the first object. In some embodiments, as discussed below with reference to step 2618, when the computer system displays the first object at the third distance relative to the user interface, the computer system activates the first object in the three-dimensional environment. Decreasing a distance between a selectable object and a user interface including the selectable object in response to detecting a portion of a user within a respective threshold distance of a location corresponding to the selectable object provides visual feedback that the selectable object has been selected, thereby improving user-device interaction.

In some embodiments, in response to detecting the first portion of the user within the second threshold distance (e.g., 0.01, 0.03, 0.05, 0.08, 0.10, 0.25, 0.50, 0.75, 1, or 2 cm) of the location corresponding to the first object (2618a), the computer system performs (2618b) an operation corresponding to selection of the first object in the user interface, such as displaying a home page in the virtual object 2507 as shown in FIG. 25F. For example, the computer system performs an operation associated with the first object in the user interface. In some embodiments, performing the operation corresponding to selection of the first object in the user interface includes displaying (e.g., additional) content in the user interface that is associated with the first object, such as an image, video, and/or text, outputting audio, such as audio corresponding to music, podcast, and/or video, and/or displaying another user interface in the three-dimensional environment, such as displaying another application window or displaying a virtual keyboard (e.g., for entering text in an input field of the user interface in which the first object is displayed). Decreasing a distance between a selectable object and a user interface including the selectable object in response to detecting a selection of the selectable object provides visual feedback that the selectable object has been selected/activated, thereby improving user-device interaction.

In some embodiments, in response to detecting the first portion of the user within the first threshold distance (e.g., 0.1, 0.25, 0.5, 0.75, 0.9, 1, 1.5, 2, 3, 5, or 10 cm) of the location corresponding to the first object (2620a), in accordance with the determination that the first object is a third type of object, different from the first type of object, such as selectable key H of the virtual keyboard 2532a, the computer system maintains (2620b) display, via the display generation component, of the first object at the first distance relative to the user interface while concurrently displaying the first object with the visual indication of the interaction between the first portion of the user and the first object (e.g., wherein the visual indication has the first visual appearance), such as maintaining a distance of the selectable key H relative to the surface of the virtual keyboard 2515 as shown in FIG. 25B. For example, the third type of object is a subset of the first type of object. In some embodiments, the third type of object is a selectable object that is not a selectable option or button. For example, the third type of object includes selectable input field (e.g., text input fields), selectable text (e.g., hyperlinks), virtual keyboard keys (e.g., because virtual keyboard keys are already displayed at the second distance above relative to the virtual keyboard), and/or scroll regions (e.g., along an edge) of the user interface. In some embodiments, if the first object is the third type of object, the computer system forgoes causing the first object to visually appear to "pop up" away from the surface of the user interface (e.g., and toward the tip of the index finger) from the viewpoint of the user as similarly described above with reference to step 2614. Forgoing increasing a distance between a selectable object of a respective type and a user interface including the selectable object in response to detecting a portion of a user within a threshold distance of a location corresponding to the selectable object helps prevent the selectable object from obscuring portions of the user interface surrounding the selectable object if the distance between the selectable object of the respective type and the user interface were increased, thereby improving user-device interaction and reducing resource consumption.

In some embodiments, after displaying the first object with the visual indication of the interaction between the first portion of the user and the first object in response to detecting the first portion of the user within the threshold distance (e.g., 0.1, 0.25, 0.5, 0.75, 0.9, 1, 1.5, 2, 3, 5, or 10 cm) of the location corresponding to the first object, the computer system detects (2622a), via the one or more input devices, an input (e.g., movement of the attention of the user) that includes gaze of the user directed towards the first object in the user interface while the first portion of the user is more than the threshold distance from the location corresponding to the first object, as similarly described with reference to the FIGS. 11A-11C. For example, the computer system detects movement of the index finger of the hand of the user away from the first object to outside the threshold distance of the location corresponding to the first object. In some embodiments, in response to detecting the first portion of the user more than the threshold distance from the location corresponding to the first object, the computer system ceases display of the visual indication of the interaction between the first portion of the user and the first object in the user interface. In some embodiments, while the visual indication is no longer displayed with the first object, the computer system detects the input that includes the gaze directed to the first object in the user interface.

In some embodiments, while (e.g., in response to) detecting the input, in accordance with a determination that one or more first criteria are satisfied, including a criterion that is satisfied when the input includes a respective type of input from the first portion of the user, the computer system displays (2622b), via the display generation component, a visual feedback indicating a location of the gaze of the user relative to the first object, as similarly described with reference to FIGS. 11A-11C, wherein the visual feedback has a third visual appearance, different from the first visual appearance and the second visual appearance (e.g., as described with reference to method 2800). For example, the one or more first criteria are satisfied if, while the gaze of the user is directed to the first object in the user interface, the computer system detects an air pinch gesture (e.g., performed by an index finger and thumb of the user), an air swipe gesture, and/or an input detected via a hardware input device (e.g., a controller) in communication with the computer system. Additionally or alternatively, in some embodiments, the one or more first criteria are satisfied if, while the computer system is detecting the input, the first portion of the user (e.g., including the hand of the user) is raised/visible in the field of view of the user and/or is in the ready state (e.g., as defined herein). In some embodiments, displaying the visual feedback that has the third visual appearance in the user interface has one or more characteristics of displaying visual feedback as described in method 2800. In some embodiments, in accordance with a determination that the one or more first criteria are not satisfied, the computer system forgoes displaying the visual feedback indication the location of the gaze of the user relative to the first object in the three-dimensional environment. Applying a visual feedback that has a first visual appearance to a portion of an object when an input of a first type is detected and applying the visual feedback that has a second visual appearance to a portion of the object when an input of a second type is detected precisely indicates which virtual object and/or a location in the object that a portion of the user (e.g., index finger) will interact with and/or provides visual feedback of the type of input via which the object will be interacted, thereby reducing errors in the interaction with the computer system, and reducing computing resources consumed by the computer system.

In some embodiments, while displaying the first object with the visual indication of the interaction between the first portion of the user and the first object in response to detecting the first portion of the user within the threshold distance (e.g., 0.1, 0.25, 0.5, 0.75, 0.9, 1, 1.5, 2, 3, 5, or 10 cm) of the location corresponding to the first object, the computer system detects (2624a), via the one or more input devices, movement of the first portion of the user relative to the first object, such as movement of the index finger 2512-2 of the hand 2505c toward the selectable option 2506-2 of the virtual object 2507 as shown in FIG. 25C. For example, the computer system detects the index finger of the hand of the user move closer toward or away from the first object while the index finger is within the threshold distance of the location corresponding to the first object. In some embodiments, the movement of the first portion of the user relative to the first object has one or more characteristics of the movement of the first portion of the user as described above with reference to step 2602.

In some embodiments, in response to detecting the movement of the first portion of the user relative to the first object (2624b), the computer system changes (2624c), via the display generation component, a visual appearance of the visual indication that is displayed with the first object in accordance with the movement of the first portion of the user relative to the first object, such as changing a visual appearance of the visual indication 2532b as shown in FIG. 25D. For example, the computer system changes the visual appearance of the visual indication of the interaction between the first portion of the user and the first object as the first portion of the user moves toward or away from the first object in the user interface. In some embodiments, the computer system changes the visual appearance of the visual indication as long as the first portion of the user remains within the threshold distance of the location corresponding to the first object (e.g., as long as the visual indication is displayed with the first object). Additional details regarding the change in the visual appearance of the visual indication are provided below with reference to steps 2626-2630. Changing a visual appearance of a visual indication that is displayed with an object in response to detecting movement of a portion of a user relative to the object improves accuracy for performing the selection operation and/or provides a visual indicator for a progress toward selecting the object, thereby improving user-device interaction.

In some embodiments, changing the visual appearance of the visual indication that is displayed with the first object includes changing a virtual lighting effect of the visual indication (2626), such as darkening the virtual lighting of the visual indication 2532*b* as shown in FIG. 25D. For example, as described previously above with reference to step 2602, the visual indication includes a glow effect that visually appears to originate from the first portion of the user (e.g., a tip of the index finger of the hand of the user). In some embodiments, changing the virtual lighting effect of the visual indication includes changing an amount of light that is included in the glow effect (e.g., changing a brightness and/or size of the glow effect). In some embodiments, changing the virtual lighting effect of the visual indication includes changing a color of the light that is included in the glow effect. In some embodiments, an amount of change in the virtual lighting effect of the visual indication is based on (e.g., equivalent or proportional to) an amount of change in distance between the first portion of the user and the first object in the user interface. Changing a virtual lighting effect of a visual indication that is displayed with an object in response to detecting movement of a portion of a user relative to the object improves accuracy for performing the selection operation and/or provides a visual indicator for a progress toward selecting the object, thereby improving user-device interaction.

In some embodiments, changing the appearance of the visual indication that is displayed with the first object includes (2628*a*), in accordance with a determination that the first portion of the user is a first distance from the location corresponding to the first object, displaying the visual indication (e.g., the glow effect or highlighting effect, as similarly described above with reference to step 2602) with a first amount of brightness (2628*b*), such as a brightness of the visual indication 2532*b* as shown in FIG. 25C, and in accordance with a determination that the first portion of the user is a second distance, smaller than the first distance, from the location corresponding to the first object, displaying the visual indication with a second amount of brightness, greater than the first amount of brightness (2628*c*), such as a brightness of the visual indication 2532*b* as shown in FIG. 25D. For example, the computer system increases the brightness of the visual indication as the first portion of the user is moved closer to the first object in the user interface. Similarly, the computer system optionally decreases the brightness of the visual indication as the first portion of the user is moved farther from the first object in the user interface (while remaining within the threshold distance (e.g., 0.1, 0.25, 0.5, 0.75, 0.9, 1, 1.5, 2, 3, 5, or 10 cm) of the location corresponding to the first object). In some embodiments, an amount of change in the brightness of the visual indication is based on (e.g., equivalent or proportional to) an amount of change in distance between the first portion of the user and the first object in the user interface. In some embodiments, changing the appearance of the visual indication that is displayed with the first object includes, in accordance with a determination that the first portion of the user is a third distance, smaller than the first distance and the second distance, from the location corresponding to the first object, displaying the visual indication with a third amount of brightness, greater than the first amount and the second amount of brightness. In some embodiments, in accordance with a determination that the first portion of the user is a fourth distance, greater than the first distance, from the location corresponding to the first object, the computer system displays the visual indication with a fourth amount of brightness, less than the first amount of brightness. Thus, in some embodiments, the amount of brightness increases or decreases as the first portion of the user moves closer to or further from the location corresponding to the first object in accordance with the above. Changing a brightness of a visual indication that is displayed with an object in response to detecting movement of a portion of a user relative to the object improves accuracy for performing the selection operation and/or provides a visual indicator for a progress toward selecting the object, thereby improving user-device interaction.

In some embodiments, changing the appearance of the visual indication that is displayed with the first object includes (2630*a*), in accordance with a determination that the first portion of the user is a first distance from the location corresponding to the first object, displaying the visual indication (e.g., the glow effect or highlighting effect, as similarly described above with reference to step 2602) at a first size (2630*b*), such as a size of the visual indication 2532*b* as shown in FIG. 25C, and in accordance with a determination that the first portion of the user is a second distance, smaller than the first distance, from the location corresponding to the first object, displaying the visual indication at a second size, smaller than the first size (2630*c*), such as the size of the visual indication 2532*b* as shown in FIG. 25D. For example, the computer system decreases the size of the visual indication as the first portion of the user is moved closer to the first object in the user interface. Similarly, the computer system optionally increases the size of the visual indication as the first portion of the user is moved farther from the first object in the user interface (while remaining within the threshold distance (e.g., 0.1, 0.25, 0.5, 0.75, 0.9, 1, 1.5, 2, 3, 5, or 10 cm) of the location corresponding to the first object). In some embodiments, an amount of change in the size of the visual indication is based on (e.g., equivalent or proportional to) an amount of change in distance between the first portion of the user and the first object in the user interface. In some embodiments, changing the appearance of the visual indication that is displayed with the first object includes, in accordance with a determination that the first portion of the user is a third distance, smaller than the first distance and the second distance, from the location corresponding to the first object, displaying the visual indication at a third size, smaller than the first size and the second size. In some embodiments, in accordance with a determination that the first portion of the user is a fourth distance, greater than the first distance, from the location corresponding to the first object, the computer system displays the visual indication at a fourth size, greater than the first size. Thus, in some embodiments, the amount of brightness increases or decreases as the first portion of the user moves closer to or further from the location corresponding to the first object in accordance with the above. Changing a size of a visual indication that is displayed with an object in response to detecting movement of a portion of a user relative to the object improves accuracy for performing the selection operation and/or provides a visual indicator for a progress toward selecting the object, thereby improving user-device interaction.

In some embodiments, the user interface includes a virtual keyboard (2632a), such as the virtual keyboard 2515 in FIG. 25A, and the first object corresponds to a first key of a plurality of keys of the virtual keyboard (2632b) (e.g., as similarly described above with reference to step 2602). In some embodiments, the first object corresponds to a second key, different from the first key, of the plurality of keys of the virtual keyboard. Displaying a visual indication that has a first visual appearance to indicate a key of a virtual keyboard is selectable in response to further input in response to detecting a portion of a user within a threshold distance of a location corresponding to the key improves accuracy for performing the selection operation and/or facilitates discovery that the key is a selectable object, thereby improving user-device interaction.

In some embodiments, while displaying the first object with the visual indication of the interaction between the first portion of the user and the first object, wherein the visual indication has the first visual appearance (e.g., because the first object is a selectable object in the user interface), in accordance with the determination that the first object is the first type of object in response to detecting the first portion of the user within the threshold distance (e.g., 0.1, 0.25, 0.5, 0.75, 0.9, 1, 1.5, 2, 3, 5, or 10 cm) of the location corresponding to the first object, the computer system detects (2634a), via the one or more input devices, an input provided by the first portion of the user corresponding to selection of the first object, such as movement of the index finger 2512-2 of the hand 2505d toward the selectable option 2506-2 of the virtual object 2507 as shown in FIG. 25D. For example, the computer system detects a direct touch input (e.g., a tap) directed to the first object in the user interface. In some embodiments, detecting the input includes detecting the first portion of the user move to within a second threshold distance (e.g., 0.01, 0.03, 0.05, 0.08, 0.10, 0.25, 0.50, 0.75, 1, or 2 cm) of the first object, less than the threshold distance of the first object, as similarly described above with reference to step 2616.

In some embodiments, in response to detecting the input provided by the first portion of the user (2634b), the computer system performs (2634c) an operation corresponding to selection of the first object in accordance with the input, such as displaying a home page in the virtual object 2507 as shown in FIG. 25F. For example, the computer system performs an operation associated with the first object in the user interface, as similarly described above with reference to step 2618. In some embodiments, the computer system outputs (2634d) audio (e.g., audio output 2535 in FIG. 25E) indicating selection of the first object. For example, the computer system outputs, via a speaker device in communication with the computer system, audio that confirms activation of the first object in the user interface. In some embodiments, outputting the audio indicating the selection of the first object includes outputting a ring, a chime, a voice message (e.g., by a virtual assistant associated with an operating system of the computer system), and/or other tune that indicates that the input provided by the first portion of the user has been detected and the first object has been selected/activated. Outputting audio in response to detecting a selection of a selectable object of a user interface provides auditory feedback that the selectable object has been selected, thereby improving user-device interaction.

In some embodiments, outputting the audio indicating the selection of the first object includes outputting the audio with a respective audio characteristic having a first value (2636a) (e.g., the audio is output with a first level of volume, a first audio type (e.g., stereo audio versus atmospheric audio), a first frequency, and/or a first sound (e.g., a first ring, chime, and/or tune)), as similarly described with reference to FIG. 25E. In some embodiments, while displaying the first object with the visual indication of the interaction between the first portion of the user and the first object, wherein the visual indication has the second visual appearance (e.g., because the first object is a non-selectable object), in accordance with the determination that the first object is the second type of object in response to detecting the first portion of the user within the threshold distance (e.g., 0.1, 0.25, 0.5, 0.75, 0.9, 1, 1.5, 2, 3, 5, or 10 cm) of the location corresponding to the first object, the computer system detects (2636b), via the one or more input devices, an input provided by the first portion of the user corresponding to selection of the first object, such as movement of the hand 2505a toward the virtual object 2507 as shown in FIG. 25A. For example, the computer system detects a direct touch input (e.g., a tap) directed to the first object in the user interface. In some embodiments, detecting the input includes detecting the first portion of the user move to within a second threshold distance (e.g., 0.01, 0.03, 0.05, 0.08, 0.10, 0.25, 0.50, 0.75, 1, or 2 cm) of the first object, less than the threshold distance of the first object, as similarly described above with reference to step 2616.

In some embodiments, in response to detecting the input provided by the first portion of the user (2636c), the computer system outputs (2636d) audio indicating contact with the first object with the respective audio characteristic having a second value, different from the first value, as similarly described with reference to FIG. 25E. For example, the computer system outputs, via a speaker device in communication with the computer system, audio that confirms contact with the first object in the user interface. In some embodiments, outputting the audio indicating the contact of the first object includes outputting a ring, a chime, a voice message (e.g., by a virtual assistant associated with an operating system of the computer system), and/or other tune that indicates that the input provided by the first portion of the user has been detected but the first object has not been selected/activated (e.g., because the first object is a non-selectable object). In some embodiments, because the first object is the second type of object, the audio is outputted with the respective audio characteristic having the second value. For example, the audio is output with a second level of volume (e.g., lower than the first level of volume), a second audio type (e.g., stereo audio versus atmospheric audio), a second frequency (e.g., lower than the first frequency), and/or a second sound (e.g., a second ring, chime, and/or tune). Outputting audio with a respective audio characteristic having a first value in response to detecting a selection of a selectable object of a user interface and outputting audio with the respective audio characteristic having a second value, different from the first value, in response to detecting a selection of a non-selectable object provides auditory feedback that the selectable object has been selected and/or facilitates discovery that the object is a non-selectable object, thereby improving user-device interaction.

In some embodiments, displaying the first object with the visual indication of the interaction between the first portion of the user and the first object includes (2638a), in accordance with a determination that a boundary of the visual indication extends beyond a boundary of the first object in the user interface (e.g., portions of the visual indication are also displayed on portions of the user interface that surround the first object), such as a boundary of the visual indication 2532b as shown in FIG. 25C, concurrently (2638b) displaying, via the display generation component, the first object with the visual indication that has a first amount of brightness (2638c) (e.g., as similarly described above with reference to step 2602), and displaying one or more portions of the user interface surrounding the first object with the visual indication that has a second amount of brightness, less than the first amount of brightness (2638d), such as the varying degrees of brightness of the visual indication 2532b over the selectable option 2506-2 and the surface of the virtual object 2507 surrounding the selectable option 2506-2 as shown in FIG. 25C. For example, the brightness of the portions of the visual indication on the portions of the user interface that surround the first object is lower than the brightness of the visual indication on the first object, which provides visual emphasis on the first object relative to the user interface. In some embodiments, providing the first object with visual emphasis relative to the user interface draws focus (e.g., attention) of the user toward the first object for facilitating interaction with the first object despite the visual indication being larger than and/or extending outside the first object. In some embodiments, while concurrently displaying the first object with the visual indication that has the first amount of brightness and displaying the one or more portions of the user interface surrounding the first object with the visual indication that has the second amount of brightness, if the computer system detects movement of the first portion (e.g., index finger) of the user closer toward the first object in the user interface, the computer system increases the brightness of the visual indication on the first object and/or the one or more portions of the user interface surrounding the first object. In some embodiments, if the computer system detects movement of the first portion of the user away from the first object in the user interface (e.g., while remaining within the threshold distance (e.g., 0.1, 0.25, 0.5, 0.75, 0.9, 1, 1.5, 2, 3, 5, or 10 cm) of the location corresponding to the first object), the computer system decreases the brightness of the visual indication on the first object and/or the one or more portions of the user interface surrounding the first object. Thus, in some embodiments, the amount of brightness increases or decreases as the first portion of the user moves closer to or further from the location corresponding to the first object in accordance with the above. Displaying a visual indication with a first amount of brightness on an object that is selectable and the visual indication with a second amount of brightness on portions of a user interface surrounding the object if the visual indication is larger than the object improves accuracy for performing the selection operation and/or facilitates input for selecting the selectable object versus the portions of the user interface surrounding the object, thereby improving user-device interaction.

In some embodiments, before detecting the first portion of the user within the threshold distance of the location corresponding to the first object, the first object is displayed at a first distance (e.g., a predefined distance) relative to the user interface (2640a) (e.g., as similarly described above with reference to step 2614), such as a distance of selectable key D from the surface of the virtual keyboard 2515 in FIG. 25C. In some embodiments, while displaying the first object with the visual indication of the interaction between the first portion of the user and the first object, wherein the visual indication has the first visual appearance, in accordance with the determination that the first object is the first type of object in response to detecting the first portion of the user within the threshold distance of the location corresponding to the first object, the computer system detects (2640b), via the one or more input devices, an input provided by the first portion of the user corresponding to selection of the first object, such as movement of index finger 2510-2 of hand 2503c toward the selectable key D as shown in FIG. 25C. For example, the computer system detects a direct touch input (e.g., a tap) directed to the first object in the user interface. In some embodiments, detecting the input includes detecting the first portion of the user move to within a second threshold distance (e.g., 0.01, 0.03, 0.05, 0.08, 0.10, 0.25, 0.50, 0.75, 1, or 2 cm) of the first object, less than the threshold distance of the first object, as similarly described above with reference to step 2616.

In some embodiments, in response to detecting the input provided by the first portion of the user (2640c), the computer system displays (2640d), via the display generation component, the first object at a second distance, smaller than the first distance, relative to the user interface, such as display of the selectable key D at a reduced distance from the surface of the virtual keyboard 2515 as shown in FIG. 25D. For example, the computer system decreases the distance between the first object and the user interface in the three-dimensional environment. In some embodiments, displaying the first object at the second distance relative to the user interface causes the first object to visually appear to "snap" or "push" down onto the surface of the user interface in the three-dimensional environment, indicating that the input provided by the first portion of the user has been detected and the first object has been selected/activated. In some embodiments, displaying the first object at the second distance relative to the user interface includes moving the first object further from the first portion (e.g., index finger) of the user in the user interface (e.g., because the first object appears to visually snap or push down onto the surface of the user interface with a respective speed that is faster than a speed with which the first portion of the user is moving when providing the input). In some embodiments, displaying the first object at the second distance relative to the user interface is independent of a distance that the first portion of the user moved when providing the input, as similarly described above with reference to step 2616. In some embodiments, as similarly described above with reference to step 2602, the computer system performs an operation associated with the first object when the first object is displayed at the second distance relative to the user interface. Thus, in some embodiments, the amount of brightness increases or decreases as the first portion of the user moves closer to or further from the location corresponding to the first object in accordance with the above. Decreasing a distance between a selectable object and a user interface including the selectable object in response to detecting a selection of the selectable object provides visual feedback that the selectable object has been selected, thereby improving user-device interaction.

In some embodiments, displaying the visual indication that has the first visual appearance includes displaying the visual indication that has a first amount of brightness that is based on a distance between the first portion of the user and the location corresponding to the first object (2642a) (e.g., as similarly described above with reference to step 2628), such as a brightness of the visual indication 2532a as shown in FIG. 25B. In some embodiments, while displaying the first object with the visual indication of the interaction between the first portion of the user and the first object, wherein the visual indication has the first amount of brightness, in accordance with the determination that the first object is the first type of object in response to detecting the first portion of the user within the threshold distance (e.g., 0.1, 0.25, 0.5, 0.75, 0.9, 1, 1.5, 2, 3, 5, or 10 cm) of the location corresponding to the first object, the computer system detects (2642b), via the one or more input devices, an input provided by the first portion of the user corresponding to selection of the first object, such as movement of the index finger 2510-2 of the hand 2503c toward the selectable key D of the virtual keyboard 2515 as shown in FIG. 25C. For example, the computer system detects a direct touch input (e.g., a tap) directed to the first object in the user interface. In some embodiments, detecting the input includes detecting the first portion of the user move to within a second threshold distance (e.g., 0.01, 0.03, 0.05, 0.08, 0.10, 0.25, 0.50, 0.75, 1, or 2 cm) of the first object, less than the threshold distance, as similarly described above with reference to step 2616.

In some embodiments, in response to detecting the input provided by the first portion of the user (2642c), the computer system displays (2642d), via the display generation component, the first object with the visual indication of the interaction between the first portion of the user and the first object, wherein the visual indication has a second amount of brightness, greater than the first amount of brightness by at least a respective amount that does not vary based on a distance between the first portion of the user and the first object, such as the brightness of the visual indication 2532a as shown in FIG. 25D. For example, the second amount of brightness is not based on the distance between the first portion of the user and the location corresponding to the first object (e.g., the second amount of brightness indicates the first object has been selected/activated in the user interface), and is greater than any amount of brightness that is based on the distance between the first portion of the user and location corresponding to the first object. For example, the computer system displays the visual indication with a brightness level that is greater than any other level of brightness that the visual indication is displayed at in the three-dimensional environment. As similarly described above with reference to step 2618, the computer system optionally gradually increases the brightness of the visual indication as the index finger of the user moves closer to the first object in the user interface. Accordingly, in some embodiments, the computer system displays the first object with the visual indication having the second amount of brightness in addition to displaying the first object with the visual indication having a brightness that is based on the distance between the first portion of the user and the location corresponding to the first object (e.g., the additional brightness is additive with the distance-based brightness). In some embodiments, the computer system ceases increasing the brightness of the visual indication before the first portion of the user provides the input selecting the first object. For example, the computer system ceases increasing the brightness when the index finger approaches (e.g., is 0.05, 0.1, 0.25, 0.4, 0.5, 0.75, 1, 2, 5, or 10 cm of) the second threshold distance discussed above, and when the computer system detects the input, the computer system significantly increases the brightness of the visual indication in the manner discussed above. In some embodiments, the computer system maintains display of the visual indication with the second amount of brightness while the first portion of the user remains "in contact" with the first object (e.g., remains within the second threshold discussed above of the first object). In some embodiments, if the computer system detects the first portion of the user move relative to the first object such that the first portion of the user is no longer in contact with and/or is no longer within the second threshold distance of the first object, the computer system redisplays the first object with the first amount of brightness that is based on the distance between the first portion of the user and the location corresponding to the first object. Significantly changing a brightness of a visual indication that is displayed with a selectable object in response to detecting a selection of the selectable object provides visual feedback that the selectable object has been selected, thereby improving user-device interaction.

In some embodiments, the first object has a first size in the user interface (e.g., the first object has a first width, a first height, a first diameter, and/or a first length), such as a size of selectable key H of the virtual keyboard 2515, and the visual indication of the interaction between the first portion of the user and the first object has a second size (2644a) (e.g., a second width, a second height, a second diameter, and/or a second length, wherein the second size is equal to or different from the first size), such as a size of the visual indication 2532a as shown in FIG. 25B. In some embodiments, while displaying the first object with the visual indication of the interaction between the first portion of the user and the first object, wherein the visual indication has the second size, in accordance with the determination that the first object is the first type of object in response to detecting the first portion of the user within the threshold distance of the location corresponding to the first object, the computer system detects (2644b), via the one or more input devices, movement of the first portion of the user relative to the user interface, such as movement of the index finger 2510-2 of the hand 2503g over the virtual keyboard 2515 as similarly shown in FIG. 25B. For example, the computer system detects movement of the hand of the user away from the first object in the user interface. In some embodiments, the movement of the first portion of the user relative to the user interface has one or more characteristics of the movement of the first portion of the user as described above with reference to step 2602.

In some embodiments, in response to detecting the movement of the first portion of the user, in accordance with a determination that the first portion (e.g., index finger) of the user of the computer system is within the threshold distance (e.g., 0.1, 0.25, 0.5, 0.75, 0.9, 1, 1.5, 2, 3, 5, or 10 cm) of a location corresponding to a second object (e.g., a second option, button, key, image, and/or input field), different from the first object, wherein the second object has a third size in the user interface, different from the first size (2644c) (e.g., the second object is larger or smaller than the first object in the user interface), such as a size of selectable key "Caps" of the virtual keyboard 2515 as shown in FIG. 25G, the computer system displays (2644d), via the display generation component, the second object with a visual indication of an interaction between the first portion of the user and the second object, wherein the visual indication of the interaction between the first portion of the user and the second object has the second size, such as the size of the visual indication 2532a as shown in FIG. 25G. For example, as similarly described above with reference to step 2602, the computer system displays the second object with a glow effect or highlighting effect that is based on the index finger of the user. In some embodiments, the visual indication is displayed with the second size discussed above. For example, the computer system displays the visual indication with a size that is independent of the size of the object of which the index finger of the hand is within the threshold distance. Rather, as described above with reference to step 2630, in some embodiments, the size of the visual indication is based on the distance between the first portion of the user and the object in the user interface (e.g., independent of the size of the object). In some embodiments (optionally after or instead of displaying the second object with the visual indication of the interaction between the first portion of the user and the second object in response to detecting the first portion of the user within the threshold distance of the location corresponding to the second object) the computer system detects, via the one or more input devices, an input (e.g., movement of the attention of the user) that includes gaze of the user directed towards the second object in the user interface while the first portion of the user is more than the threshold distance from the location corresponding to the first object (e.g., as similarly described above with reference to step 2622). In some embodiments, while (e.g., in response to) detecting the input, in accordance with a determination that one or more first criteria are satisfied, including a criterion that is satisfied when the input includes a respective type of input from the first portion of the user, and that a location of the gaze corresponds to the location corresponding to the first object, the computer system displays, via the display generation component, a visual feedback indicating the location of the gaze of the user relative to the first object (e.g., as similarly described above with reference to step 2622), wherein the visual feedback has a third size. In some embodiments, in accordance with a determination that the one or more first criteria are satisfied and that the location of the gaze corresponds to the location corresponding to the second object, the computer system displays a visual feedback indicating the location of the gaze of the user relative to the second object, wherein the visual feedback has a fourth size, different from the third size. Accordingly, in some embodiments, in response to a given attention or gaze input directed to a respective object, a size of a visual indication of an interaction between the first portion of the user and a respective object is independent of the size of the respective object, while a size of a visual feedback indicating a location of a gaze of the user relative to the respective object is based on the size of the respective object. Displaying a visual indication that has a size that is independent of a size of an object that is selectable in response to further input in response to detecting a portion of a user within a threshold distance of a location corresponding to the object improves accuracy for performing the selection operation and/or provides feedback of a progress toward performing the selection operation, thereby improving user-device interaction.

It should be understood that the particular order in which the operations in method 2600 have been described is merely exemplary and is not intended to indicate that the described order is the only order in which the operations could be performed. One of ordinary skill in the art would recognize various ways to reorder the operations described herein.

FIGS. 27A-27H is a flowchart illustrating a method 2700 of facilitating direct touch interactions with content in a three-dimensional environment. In some embodiments, the method 2700 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or projector) and one or more cameras (e.g., a camera (e.g., color sensors, infrared sensors, and other depth-sensing cameras) that points downward at a user's hand or a camera that points forward from the user's head). In some embodiments, the method 2700 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2700 are, optionally, combined and/or the order of some operations is, optionally, changed.

In some embodiments, method 2700 is performed at a computer system (e.g., 101) in communication with a display generation component and one or more input devices. For example, the computer system optionally has one or more of the characteristics of the computer systems of methods 800, 900, 1000, 1200, 1400, 1600, 1800, 2000, 2200, 2400, 2600, 2800, and/or 3000. In some embodiments, the display generation component has one or more of the characteristics of the display generation components of methods 800, 900, 1000, 1200, 1400, 1600, 1800, 2000, 2200, 2400, 2600, 2800, and/or 3000. In some embodiments, the one or more input devices have one or more of the characteristics of the one or more input devices described with reference to methods 800, 900, 1000, 1200, 1400, 1600, 1800, 2000, 2200, 2400, 2600, 2800, and/or 3000.

In some embodiment, while displaying, via the display generation component, a user interface that includes an object, such as a virtual keyboard 2515 including a plurality of selectable keys in FIG. 25A, the computer system detects (2702a), via the one or more input devices, a first portion (e.g., a finger of a hand) of a user of the computer system within a threshold distance (e.g., 0.1, 0.25, 0.5, 0.75, 0.9, 1, 1.5, 2, 3, 5, or 10 cm) of a location corresponding to the object (e.g., in the user interface), such as movement of hand 2503a toward the virtual keyboard 2515 as shown in FIG. 25A. In some embodiments, the user interface is displayed in or is a three-dimensional environment as described with reference to methods 800, 900, 1000, 1200, 1400, 1600, 1800, 2000, 2200, 2400, 2600, 2800, and/or 3000. In some embodiments, the user interface is a user interface as described with reference to methods 800, 900, 1000, 1200, 1400, 1600, 1800, 2000, 2200, 2400, 2600, 2800, and/or 3000. In some embodiments, the user interface is a virtual keyboard that includes a plurality of selectable keys, including the object. For example, the object is a first key of the virtual keyboard. In some embodiments, the user interface is an application window associated with an application running on the computer system that is displaying the object. For example, the object is a user interface element or object that is associated with or corresponds to content displayed in the application window, such as a selectable option or button, a text-input field, a scroll bar, an image, a hyperlink, and/or a video clip. In some embodiments, the object is a container (e.g., a region) of the user interface that includes a plurality of user interface elements or objects. In some embodiments, the object has one or more characteristics of the first object described with reference to methods 1200, 2600, 2800, and/or 3000. In some embodiments, the computer system detects the first finger of the hand of the user move from a first location in space (e.g., at the user's side or in front of the user's torso) to a second location in space that is within the threshold distance discussed above of the location corresponding to the object. In some embodiments, the computer system detects the first finger of the hand of the user within the threshold distance discussed above of the location corresponding to the object without detecting other fingers of the hand within the threshold distance. For example, the computer system detects the index finger of the hand in a pointed/outstretched state while the other fingers of the hand (e.g., the thumb, middle, ring, and/or pinky fingers) are in a curled state (e.g., point toward and/or contacting the palm of the hand). In some embodiments, the computer system detects the first portion of the user is within the threshold distance discussed above of the location corresponding to the object irrespective of a location of attention (e.g., including gaze) of the user. In some embodiments, detecting the first portion of the user within the threshold distance of the location corresponding to the object has one or more characteristics of the same described with reference to methods 1200, 2600, 2800, and/or 3000.

In some embodiments, in response to detecting the first portion of the user within the threshold distance of the location corresponding to the object (2702b), such as within Threshold 1A in legend 2506 as shown in FIG. 25B, in accordance with a determination that the first portion of the user is a first finger (e.g., an index finger) of a hand of the user, such as index finger 2510-2 as shown in FIG. 25B, the computer system displays (2702c), via the display generation component, the object with a visual indication of an interaction between the first portion of the user and the object, such as visual indication 2532a as shown in FIG. 25B. In some embodiments, if the computer system determines that the first portion of the user is an index finger of a hand of the user, the computer system displays the object with a visual indication of the index finger of the hand of the user. In some embodiments, displaying the visual indication includes displaying first object with a visual highlighting effect (e.g., highlighting the object in the user interface without highlighting other objects in the user interface). In some embodiments, displaying the visual indication includes displaying the object with a glow effect that appears to visually originate from the first finger of the user. In some embodiments, the glow effect of the visual indication has one or more characteristics of visual indicators described with reference to methods 1200 and/or 2800. In some embodiments, as similarly described with reference to method 2600, the one or more visual characteristics are configured to dynamically change based on changes in the location of the first portion of the user relative to the object in the user interface (e.g., movement of the index finger of the hand closer to or farther from the location corresponding to the object). In some embodiments, the visual indication provides feedback regarding a location of the first finger of the user relative to the object for selection. For example, displaying the object with the visual indication indicates that the object will be selected (e.g., activated) in response to further input provided by the index finger (e.g., a direct tap/touch of the object, as discussed in more detail below). Accordingly, in some embodiments, user input corresponding to a request to select the object in the user interface causes the computer system to activate the first object (e.g., perform a respective operation associated with the object). In some embodiments, the visual indication of the first portion of the user has one or more characteristics of the visual indication described with reference to method 2600.

In some embodiments, in accordance with a determination that the first portion of the user is a second finger, other than the first finger (e.g., middle, ring, pinky, and/or thumb fingers), of the hand of the user, such as one of fingers 2512-3, 2512-4, and 2512-5 of hand 2505g as shown in FIG. 25G, the computer system forgoes (2702d) displaying object with the visual indication of an interaction between the first portion of the user and the object, such as forgoing displaying a visual indication from the hand 2505h over the virtual keyboard 2515 as shown in FIG. 25G. For example, the computer system does not display the object with a visual highlighting effect or glow effect (e.g., described above) in the user interface. In some embodiments, forgoing displaying the object with the visual indication of the first portion of the user indicates that the computer system will not select (e.g., activate) the object in the user interface in response to detecting further input provided by the second finger (e.g., a direct tap/touch of the object provided by a finger other than the index finger of the hand). Displaying a visual indication that indicates an object with respect to which a selection operation will be performed in response to further input in response to detecting a first finger of a hand of a user within a threshold distance of a location corresponding to the object, without displaying a visual indication of a second finger of the hand of the user, improves accuracy for performing the selection operation and/or facilitates discovery that the further input provided by the first finger will select the object and that further input provided by the second finger will not select the object, thereby improving user-device interaction.

In some embodiments, the visual indication of the first portion of the user changes based on a change in position of the first finger of the hand of the user relative to the location corresponding to the object (2704), as similarly described with reference to FIGS. 25B-25C. For example, the visual indication is displayed with the object in the user interface because the first finger (e.g., the index finger) of the user is located within the threshold distance discussed above of the location corresponding to the object. In some embodiments, a size of the visual indication corresponds to a distance between the first portion of the user and the first object in the user interface, as similarly described with reference to method 2600. In some embodiments, a location at which the visual indication is displayed in the user interface corresponds to a location of the first portion of the user relative to the first object in the user interface, as similarly described with reference to methods 1200, 2600, and/or 2800. In some embodiments, if the computer system detects movement of the first finger of the user relative to the user interface, and if the first finger of the user is within the threshold distance discussed above of a second object in the user interface, the computer system displays the second object with the visual indication described above based on the new location of the first finger of the user relative to the user interface. Displaying a visual indication that indicates an object with respect to which a selection operation will be performed in response to further input in response to detecting a first finger of a hand of a user within a threshold distance of a location corresponding to the object, without displaying a visual indication of a second finger of the hand of the user, improves accuracy for performing the selection operation and/or facilitates discovery that the further input provided by the first finger will select the object and that further input provided by the second finger will not select the object, thereby improving user-device interaction.

In some embodiments, while forgoing displaying the object with the visual indication of the interaction between the first portion of the user and the object in accordance with the determination that the first portion of the user is the second finger, other than the first finger (e.g., middle, ring, pinky, and/or thumb fingers), of the hand of the user in response to detecting the first portion of the user within the threshold distance (e.g., 0.1, 0.25, 0.5, 0.75, 0.9, 1, 1.5, 2, 3, 5, or 10 cm) of the location corresponding to the object, the computer system detects (2706a), via the one or more input devices, a respective input directed to the object (e.g., a selection of the object) provided by the second finger of the hand of the user, such as movement of one of the fingers 2512-3, 2512-4, and 2512-5 of the hand 2505g toward the virtual keyboard 2515 as shown in FIG. 25G. For example, while not displaying the visual indication, the computer system detects a direct touch (e.g., tap) by the second finger directed to the object in the user interface. In some embodiments, the direct touch by the second finger directed to the object corresponds to contact between the second finger and the object or movement of the second finger to within a second threshold distance (e.g., 0.05, 0.075, 0.09, 0.1, 0.25, 0.5, 0.75, 1, or 1.5 cm), smaller than the threshold distance above, of the object. In some embodiments, the computer system detects the respective input via a hardware input device (e.g., a controller) in communication with the computer system. For example, the computer system detects selection of a button of the hardware input device corresponding to a selection of the object in the user interface. In some embodiments, detecting the respective input includes detecting an air gesture that includes the second finger, such as an air pinch gesture in which the second finger (e.g., middle finger, ring finger, and/or pinky finger) and the thumb of the hand of the user come together to make contact, while the attention (e.g., including gaze) of the user is directed to the object in the user interface.

In some embodiments, in response to detecting the respective input, the computer system forgoes (2706*b*) performing an operation associated with the object in the user interface, such as forgoing selection of a selectable key of the virtual keyboard 2515 as shown in FIG. 25H. For example, if the object is a selectable object, such as a selectable option, selectable text, an input field, and/or a selectable image, the computer system forgoes activating the object in the user interface. In some embodiments, the computer system forgoes performing any operation in the three-dimensional environment in response to detecting the respective input directed to the object provided by the second finger. In some embodiments, if the visual indication of the interaction between the first portion of the user and the object is displayed in accordance with the determination that the first portion of the user is the first finger of the hand in response to detecting the first portion of the user within threshold distance of the location corresponding to the object, the computer system accepts inputs from the first finger. For example, if the computer system detects a respective input (e.g., a direct touch input, such as a tap) provided by the first finger while the visual indication is displayed, the computer system performs the operation associated with the object in the user interface (e.g., activates a selectable object in the user interface). In some embodiments, performing the operation associated with the object in the user interface includes displaying (e.g., additional) content in the user interface that is associated with the object, such as an image, video, and/or text, outputting audio, such as audio corresponding to music, podcast, and/or video, and/or displaying another user interface in the three-dimensional environment, such as displaying another application window or displaying a virtual keyboard (e.g., for entering text in an input field of the user interface in which the object is displayed). Forgoing performing an operation associated with an object in response to detecting input directed to the object provided by a second finger of the hand of the user helps avoid unintentional performance of the operation associated with the object, thereby improving user-device interaction.

In some embodiments, while forgoing displaying the object with the visual indication of the interaction between the first portion of the user and the object in accordance with the determination that the first portion of the user is the second finger, other than the first finger (e.g., middle, ring, pinky, and/or thumb fingers), of the hand of the user in response to detecting the first portion of the user within the threshold distance (e.g., 0.1, 0.25, 0.5, 0.75, 0.9, 1, 1.5, 2, 3, 5, or 10 cm) of the location corresponding to the object, the computer system detects (2708*a*), via the one or more input devices, a respective input directed to the object provided by the second finger of the hand of the user (e.g., as similarly described above with reference to step 2706), such as movement of one of the fingers 2512-3, 2512-4, and 2512-5 of the hand 2505*g* toward the virtual keyboard 2515 as shown in FIG. 25G. In some embodiments, in response to detecting the respective input, the computer system performs (2708*b*) an operation associated with the object in the user interface, as similarly described with reference to FIG. 25H. For example, the computer system activates the object (e.g., selects the object) and performs one of the operations as similarly described above with reference to step 2706. Additionally, as similarly described above with reference to step 2706, if the computer system detects the respective input (e.g., a direct touch input, such as an air tap at the location of the object) provided by the first finger while the visual indication is displayed, the computer system also performs the operation associated with the object in the user interface (e.g., activates the selectable object in the user interface). Performing an operation associated with an object in response to detecting an input directed to the object provided by a second finger of the hand of the user, while not displaying a visual indication that indicates the object with respect to which the operation will be performed that is displayed, reduces the number of inputs needed to select the object and thus perform the operation associated with the object, thereby improving user-device interaction.

In some embodiments, the visual indication of the interaction between the first portion of the user and the object is displayed at a first location relative to the object (2710*a*) (e.g., the visual indication is displayed at a first location on the object in response to detecting the first finger of the hand within the threshold distance (e.g., 0.1, 0.25, 0.5, 0.75, 0.9, 1, 1.5, 2, 3, 5, or 10 cm) of the location corresponding to the object), such as display of the visual indication 2532*a* over selectable key "H" of the virtual keyboard 2515 as shown in FIG. 25B. In some embodiments, while displaying the visual indication of the interaction between the first portion of the user and the object at the first location relative to the object in accordance with the determination that the first portion of the user is the first finger (e.g., an index finger) of the hand of the user in response to detecting the first portion of the user within the threshold distance of the location corresponding to the object, the computer system detects (2710*b*), via the one or more input devices, movement of the first finger of the hand of the user relative to the object, such as movement of index finger 2510-2 of the hand 2503*b* leftward over the virtual keyboard 2515 as shown in FIG. 25B, wherein the movement of the first finger of the hand includes lateral movement of the first finger of the hand relative to the object (e.g., movement that is defined according to a spherical or cylindrical coordinate system and that is perpendicular to an axis (e.g., z axis) representing depth in the spherical or cylindrical coordination system). For example, the computer system detects the hand of the user move horizontally (e.g., rightward or leftward in the x-direction) in space relative to the object in the user interface. In some embodiments, the first finger remains within the threshold distance of the location corresponding to the object during the movement of the hand. In some embodiments, the movement of the hand includes vertical (e.g., upward or downward in the y-direction) movement relative to the object in addition to lateral movement. For example, the computer system detects the hand of the user move vertically and horizontally (or vice versa) successively or detects the hand of the user move diagonally in space. Additionally, in some embodiments, the computer system detects the hand of the user move with a respective magnitude (e.g., of speed and/or distance) relative to the object in the user interface.

In some embodiments, in response to detecting the movement of the first finger (2710c), in accordance with a determination that the first finger of the hand of the user is within the threshold distance of the location corresponding to the object, the computer system moves (2710d), via the display generation component, the visual indication of the interaction between the first portion of the user and the object to a second location, different from the first location, relative to the object in accordance with the movement of the first finger, such as movement of the visual indication (e.g., highlighting of selectable key "D") over the virtual keyboard 2515 as shown in FIG. 25C. For example, the computer system moves the visual indication over the object in accordance with the movement of the hand. In some embodiments, if the object is a single object, the computer system moves the visual indication from the first location to the second location on the object. In some embodiments, if the object is a container that includes a plurality of elements (e.g., options, buttons, images, and/or text), the computer system moves the visual indication from the first location that is over a first element to the second location that is over a second element, different from the first element. In some embodiments, the computer system moves the visual indication based on the direction and/or magnitude of the movement of the hand of the user (e.g., over keys of a virtual keyboard, as similarly described above with reference to step 2702). For example, the computer system moves the visual indication to the second location relative to the object in a respective direction and/or with a respective magnitude (e.g., of speed and/or distance) based on the direction and/or magnitude of movement of the hand. In some embodiments, in accordance with a determination that the first finger of the hand of the user is not within the threshold distance of the location corresponding to the object, the computer system ceases display of the visual indication of the interaction between the first portion of the user and the object. For example, the computer system does not display the visual indication at the second location on the object in the user interface. Moving a visual indication that indicates an object with respect to which a selection operation will be performed in response to further input in response to detecting movement of a first finger of a hand of the user that is within a threshold distance of a location corresponding to the object improves accuracy for performing the selection operation after the first finger has moved and/or facilitates discovery that the further input provided by the first finger will perform the selection operation based on the new location of the first finger and provides feedback regarding the relative location of the first finger relative to the object, thereby improving user-device interaction.

In some embodiments, while displaying the object with the visual indication of the interaction between the first portion of the user and the object in accordance with the determination that the first portion of the user is the first finger (e.g., an index finger) of the hand of the user in response to detecting the first portion of the user within the threshold distance (e.g., 0.1, 0.25, 0.5, 0.75, 0.9, 1, 1.5, 2, 3, 5, or 10 cm) of the location corresponding to the object, such as display of the visual indication 2532b over selectable option 2506-2 of virtual object 2507 as shown in FIG. 25C, wherein the visual indication of the interaction has a first visual appearance (e.g., the visual indication is displayed with a first amount of brightness, a first color, and/or a first size), the computer system detects (2712a), via the one or more input devices, movement of the first finger of the hand of the user relative to the object in the user interface, such as movement of index finger 2512-2 of hand 2505c toward the selectable option 2506-2 as shown in FIG. 25C. For example, the computer system detects the hand of the user move toward or away from (e.g., in the z-direction) in space relative to the object in the user interface. In some embodiments, the first finger remains within the threshold distance of the location corresponding to the object during the movement of the hand. In some embodiments, the computer system detects the movement of the hand in a similar manner as described above with reference to step 2702.

In some embodiments, in response to detecting the movement of the first finger (2712b), in accordance with a determination that the movement of the first finger decreases a distance between the first finger and the location corresponding to the object while the first finger is within the threshold distance of the location corresponding to the object, the computer system displays (2712c), via the display generation component, the object with the visual indication of the interaction between the first finger and the object, such as changing a visual appearance of the visual indication 2532b as shown in FIG. 25D, wherein the visual indication has a second visual appearance, different from the first visual appearance. For example, if the movement of the first finger of the hand is toward the object while the first finger is within the threshold distance of the location corresponding to the object, the computer system dynamically changes the visual appearance of the visual indication in a first manner. For example, the computer system decreases the size of the visual indication and/or increases the brightness of the visual indication when the first finger moves closer to the location corresponding to the object. For example, changing the visual appearance of the visual indication indicates a progress of the first finger toward providing input directed to (e.g., selecting) the object in the user interface.

In some embodiments, in accordance with a determination that the movement of the first finger increases a distance between the first finger and the location corresponding to the object while the first finger is within the threshold distance of the location corresponding to the object, such as movement of the index finger 2510-2 of hand 2503e away from the virtual keyboard 2515, the computer system displays (2712d), via the display generation component, the object with the visual indication of the interaction between the first finger and the object, wherein the visual indication has a third visual appearance, different from the first visual appearance and the second visual appearance, such as ceasing display of the visual indication 2532a as shown in FIG. 25F. For example, if the movement of the first finger of the hand is away from the object while the first finger is within the threshold distance of the location corresponding to the object, the computer system dynamically changes the visual appearance of the visual indication in a second manner, different from the first manner. For example, the computer system increases the size of the visual indication and/or decreases the brightness of the visual indication when the first finger moves farther from the location corresponding to the object. In some embodiments, changing the visual appearance of the visual indication based on the distance between the first finger of the hand and the location corresponding to the object has one or more characteristics of changing the visual appearance of the visual indication as described in method 2600. Changing a visual appearance of a visual indication that indicates an object with respect to which a selection operation will be performed in response to further input in response to detecting movement of a first finger of a hand of the user that is within a threshold distance of a location corresponding to the object improves accuracy for performing the selection operation as the first finger is moving and/or provides visual feedback of a progress of the first finger toward providing the further input, thereby improving user-device interaction.

In some embodiments, while displaying the object with the visual indication of the interaction between the first portion of the user and the object in accordance with the determination that the first portion of the user is the first finger (e.g., an index finger) of the hand of the user in response to detecting the first portion of the user within the threshold distance of the location corresponding to the object (2714a), the computer system detects (2714b), via the one or more input devices, a second portion (e.g., a second finger of a hand) of the user of the computer system within the threshold distance (e.g., 0.1, 0.25, 0.5, 0.75, 0.9, 1, 1.5, 2, 3, 5, or 10 cm) of a location corresponding to a respective object (e.g., the object described above or a different object) in the user interface, such as movement of hand 2505f toward the virtual keyboard 2515 as shown in FIG. 25F. For example, while the first finger of the hand of the user is within the threshold distance of the location corresponding to the object and while displaying the visual indication, the computer system detects another finger of the same hand or a different hand of the user move to within the threshold distance of the location corresponding to the respective object in the user interface. In some embodiments, the computer system detects the same type of finger (e.g., an index finger) as the first finger from a second hand of the same user move within the threshold distance of the location corresponding to the respective object.

In some embodiments, in response to detecting the second portion of the user within the threshold distance of the location corresponding to the respective object, and in accordance with a determination that the second portion of the user is a third finger (e.g., an index finger) of a hand of the user, such as index finger 2512-2 of hand 2505i as shown in FIGS. 25I and 25I1, the computer system displays (2714c), via the display generation component, the respective object with a visual indication of an interaction between the second portion of the user and the respective object, such as display of visual indication 2512-2 over the virtual keyboard 2515 as shown in FIGS. 25I and 25I1. For example, in response to detecting the index finger of the other hand of the user is within the threshold distance from the location corresponding to the object in the user interface, the computer system displays a second visual indication of an interaction between the index finger of the other hand of the user and the respective object. In some embodiments, the computer system concurrently displays the visual indications of the two fingers in the user interface. In some embodiments, if the respective object is the object described above, the computer system concurrently displays the visual indications of the two fingers with the object in the user interface. In some embodiments, if the respective object is a second object that is different from (e.g., separate from) the object described above, the computer system concurrently displays the object with the visual indication of the interaction between the first finger of the hand of the user and the second object with the visual indication of the interaction between the other finger of the (e.g., other) hand of the user in the user interface. In some embodiments, in response to detecting the second portion of the user within the threshold distance of the location corresponding to the respective object, and in accordance with a determination that the second portion of the user is a fourth finger (e.g., a finger other than the index finger, such as a middle finger, ring finger, pinky finger, or thumb) of the hand of the user (or optionally a second hand of the user), the computer system forgoes displaying the respective object with the visual indication of the interaction between the second portion of the user and the respective object. Concurrently displaying a first visual indication that indicates a respective object with respect to which a selection operation will be performed in response to further input and a second visual indication that indicates a respective object with respect to which a selection operation will be performed in response to further input in response to concurrently detecting two fingers of a hand of a user within a threshold distance of a location corresponding to the respective object improves accuracy for performing the selection operation and/or facilitates discovery that the further input provided by either or both of the two fingers will select the respective object, thereby improving user-device interaction.

In some embodiments, the first portion of the user is a finger (e.g., index finger) from a first hand of the user (2716a), such as index finger 2510-2 of hand 2503i in FIGS. 25I and 25I1, and the second portion of the user is a finger (e.g., index finger) from a second hand of the user, different from the first hand (2716b) (e.g., as similarly described above with reference to step 2714), such as index finger 2512-2 of hand 2505i in FIGS. 25I and 25I1. In some embodiments, the interaction rules discussed above with reference to steps 2702-2712 for the finger from the first hand of the user apply for the finger from the second hand of the user. Concurrently displaying a first visual indication that indicates a respective object with respect to which a selection operation will be performed in response to further input and a second visual indication that indicates a respective object with respect to which a selectin operation will be performed in response to further input in response to concurrently detecting a finger of a first hand and a finger of a second hand of the user within a threshold distance of a location corresponding to the respective object improves accuracy for performing the selection operation and/or facilitates discovery that the further inputs provided by either or both of the two fingers will select the respective object, thereby improving user-device interaction.

In some embodiments, the respective object is the object (2718a) (e.g., the object described above with reference to step 2702). In some embodiments, while displaying the object with the visual indication of the interaction between the first portion of the user and the object in accordance with the determination that the first portion of the user is the first finger of the hand of the user and the visual indication of the interaction between the second portion of the user and the object in accordance with the determination that the second portion of the user is the third finger of the hand of the user in response to detecting the first portion and the second portion of the user within the threshold distance of the location corresponding to the object (2718b) (e.g., the conditions for displaying the visual indications for the two portions of the user are concurrently satisfied), the computer system detects (2718c), via the one or more input devices, movement of the first finger of the user and movement of the third finger of the user relative to the object, such as movement of the index finger 2510-2 of the hand 2503h and movement of a finger of the hand 2505h as shown in FIG. 25H. For example, the computer system concurrently detects the first finger and the third finger move relative to the same object in the user interface. In some embodiments, the computer system detects the first finger and the third finger each independently move in a respective direction and/or with a respective magnitude (e.g., of speed and/or distance) relative to the object. In some embodiments, the computer system detects the first finger and the third finger move while the first finger and/or the third finger remain within the threshold distance of the location corresponding to the object. In some embodiments, the computer system detects the movement of the first finger and the third finger in a similar manner as described above with reference to steps 2702, 2710, and/or 2712.

In some embodiments, in response to detecting the movement of the first finger of the user and the movement of the third finger of the user relative to the object (2718d), in accordance with a determination that the first finger of the hand of the user is within the threshold distance of the location corresponding to the object, the computer system moves (2718e), via the display generation component, the visual indication of the interaction between the first portion of the user and the object based on the movement of the first finger, independent of the movement of the third finger, such as movement of the visual indication 2532a over the virtual keyboard 2515 as shown in FIGS. 25I and 25I1. For example, the computer system moves the visual indication of the first finger over the object in accordance with the movement of the hand. In some embodiments, if the object is a single object, the computer system moves the visual indication of the first finger from a first location to a second location on the object. In some embodiments, if the object is a container that includes a plurality of elements (e.g., options, buttons, images, and/or text), the computer system moves the visual indication of the first finger from the first location that is over a first element to the second location that is over a second element, different from the first element. In some embodiments, the computer system moves the visual indication based on the direction and/or magnitude of the movement of the hand of the user. In some embodiments, the computer system moves the visual indication in a similar manner as described above with reference to steps 2710 and/or 2712. In some embodiments, in accordance with a determination that the first finger of the hand of the user is not within the threshold distance of the location corresponding to the object, the computer system forgoes moving the visual indication of the interaction between the first portion of the user and the object. For example, the computer system ceases display of the visual indication in the user interface.

In some embodiments, in accordance with a determination that the third finger of the hand of the user is within the threshold distance of the location corresponding to the object, the computer system moves (2718f) the visual indication of the interaction between the second portion of the user and the object based on the movement of the third finger, independent of the movement of the first finger, such as movement of the visual indication 2532b over the virtual keyboard 2515 as shown in FIGS. 25I and 25I1. For example, the computer system moves the visual indication of the third finger over the object in accordance with the movement of the hand while, before, or after moving the visual indication of the first finger over the object as described above. In some embodiments, if the object is a single object, the computer system moves the visual indication of the third finger from a third location to a fourth location on the object. In some embodiments, if the object is a container that includes a plurality of elements (e.g., options, buttons, images, and/or text), the computer system moves the visual indication of the third finger from the third location that is over a third element to the fourth location that is over a fourth element, different from the third element. In some embodiments, the computer system moves the visual indication based on the direction and/or magnitude of the movement of the hand of the user. In some embodiments, the computer system moves the visual indication in a similar manner as described above with reference to steps 2710 and/or 2712. In some embodiments, the computer system concurrently moves the visual indication of the interaction between the first portion of the user and the object and the visual indication of the interaction between the second portion of the user and the object based on the concurrent movements of the first finger and the third finger discussed above. In some embodiments, in accordance with a determination that the third finger of the hand of the user is not within the threshold distance of the location corresponding to the object or the third finger is not an index finger, the computer system forgoes moving the visual indication of the interaction between the second portion of the user and the object. For example, the computer system ceases display of the visual indication in the user interface and only moves the visual indication of the interaction between the first portion of the user and the object as discussed above. Independently moving a first visual indication that indicates a respective object with respect to which a selection operation will be performed in response to further input from a first finger of a user and a second visual indication that indicates a respective object with respect to which a selection operation will be performed in response to further input from another finger of the user in response to concurrently detecting movement of the first finger of a hand of the user and the other finger of the hand of the user that is within a threshold distance of a location corresponding to the respective object improves accuracy for performing the selection operation after the first finger and the other finger have moved and/or facilitates discovery that the further input provided by the first finger and/or the other finger will perform the selection operation based on the new location of the first finger and/or the other finger, thereby improving user-device interaction.

In some embodiments, displaying the object with the visual indication of the interaction between the first portion of the user and the object in accordance with the determination that the first portion of the user is the first finger (e.g., an index finger) of the hand of the user in response to detecting the first portion of the user within the threshold distance of the location corresponding to the object includes (2720a), in accordance with a determination that the object is a first type of object (e.g., a selectable object or element, such as a selectable option, selectable text, a selectable image, a selectable input field, and/or a selectable button), such as a selectable key of the virtual keyboard 2515, displaying, via the display generation component, the visual indication of the interaction between the first portion of the user and the first object with a first visual appearance (2720b), such as a visual appearance of the visual indication 2532a as shown in FIG. 25B. For example, the computer system displays the visual indication of the interaction between the first portion of the user and the first object with a first amount of brightness, a first color, a first amount of opacity, and/or a first amount of saturation. In some embodiments, displaying the visual indication with the first visual appearance has one or more characteristics of displaying visual indications with the first visual appearance as described in method 2600.

In some embodiments, in accordance with a determination that the object is a second type of object (e.g., a non-selectable object or element, such as a non-selectable image, non-selectable text, and/or a non-selectable option), such as image 2508c of virtual object 2507 in FIG. 25B, different from the first type of object, the computer system displays the visual indication of the interaction between the first portion of the user and the first object with a second visual appearance, different from the first visual appearance (2720c), such as a visual appearance of the visual indication 2532b as shown in FIG. 25B. For example, the computer system displays the visual indication of the interaction between the first portion of the user and the first object with a second amount of brightness (e.g., less than the first amount of brightness), a second color (e.g., different from the first color), a second amount of opacity (e.g., less than the first amount of opacity), and/or a second amount of saturation (e.g., less than the first amount of saturation). In some embodiments, displaying the visual indication with the second visual appearance has one or more characteristics of displaying visual indications with the second visual appearance as described in method 2600. Displaying a visual indication that has a first visual appearance to indicate an object is selectable in response to further input in response to detecting a portion of a user within a threshold distance of a location corresponding to the object improves accuracy for performing the selection operation and/or facilitates discovery that the object is a selectable object, thereby improving user-device interaction.

In some embodiments, the user interface includes a virtual keyboard (2722a), such as the virtual keyboard 2515 in FIG. 25A, and the object corresponds to a first key of a plurality of keys of the virtual keyboard (2722b) (e.g., as similarly described above with reference to step 2702). In some embodiments, the virtual keyboard has one or more characteristics of the virtual keyboard described in methods 2600 and/or 3100. In some embodiments, the object corresponds to a second key, different from the first key, of the plurality of keys of the virtual keyboard. Displaying a visual indication that indicates a key of a virtual keyboard with respect to which a selection operation will be performed in response to further input in response to detecting a first finger of a hand of a user within a threshold distance of a location corresponding to the key, without displaying a visual indication of a second finger of the hand of the user, improves accuracy for performing the selection operation and/or facilitates discovery that the further input provided by the first finger will select the key and that further input provided by the second finger will not select the key, thereby improving user-device interaction.

In some embodiments, while displaying the first key with the visual indication of the interaction between the first portion of the user and the first key in accordance with the determination that the first portion of the user is the first finger (e.g., an index finger) of the hand of the user in response to detecting the first portion of the user within the threshold distance of the location corresponding to the object (2724a), such as display of the visual indication 2532a over selectable key "E" of the virtual keyboard 2515 as shown in FIGS. 25I and 25I1, the computer system detects (2724b), via the one or more input devices, a second portion (e.g., a second finger of a second hand) of the user of the computer system within the threshold distance (e.g., 0.1, 0.25, 0.5, 0.75, 0.9, 1, 1.5, 2, 3, 5, or 10 cm) of a location corresponding to a second key of the virtual keyboard, such as movement of a finger of the hand 2505h toward the virtual keyboard 2515 as shown in FIG. 25H. For example, while the first finger of the hand of the user is within the threshold distance of the location corresponding to the first key and while displaying the visual indication, the computer system detects another finger of a different hand of the user move to within the threshold distance of the location corresponding to the second key of the virtual keyboard. In some embodiments, the computer system detects the same type of finger (e.g., an index finger) as the first finger from the second hand of the same user move within the threshold distance of the location corresponding to second key.

In some embodiments, in response to detecting the second portion of the user within the threshold distance of the location corresponding to the second key, and in accordance with a determination that the second portion of the user is a third finger (e.g., an index finger) of a hand of the user, such as the index finger 2512-2 of the hand 2505i in FIGS. 25I and 25I1, the computer system displays (2724c), via the display generation component, the second key with a visual indication of an interaction between the second portion of the user and the second key, such as display of the visual indication 2532b over the selectable key "N" of the virtual keyboard as shown in FIGS. 25I and 25I1. For example, in response to detecting the index finger of the other hand of the user is within the threshold distance from the location corresponding to the second key of the virtual keyboard, the computer system displays a second visual indication of an interaction between the index finger of the other hand of the user and the second key. In some embodiments, the computer system concurrently displays the visual indications of the two fingers in the user interface. In some embodiments, in response to detecting the second portion of the user within the threshold distance of the location corresponding to the second key, and in accordance with a determination that the second portion of the user is a fourth finger (e.g., a finger other than the index finger, such as a middle finger, ring finger, pinky finger, or thumb) of the hand of the user (or optionally a second hand of the user), the computer system forgoes displaying the second key with the visual indication of the interaction between the second portion of the user and the second key.

In some embodiments, while concurrently displaying the first key with the visual indication of the interaction between the first portion of the user and the first key and the second key with the visual indication of the interaction between the second portion of the user and the second key in accordance with the determination that the second portion of the user is the third finger of the hand of the user in response to detecting the second portion of the user within the threshold distance of the location corresponding to the second key (2724d), the computer system detects (2724e), via the one or more input devices, a first input directed to the first key provided by the first finger of the hand of the user and a second input directed to the second key provided by the third finger of the hand of the user (e.g., as similarly described above with reference to step 2706), such as movement of the index finger 2510-2 of the hand 2503i and movement of the index finger 2512-2 of the hand 2505i toward the selectable keys E and N, respectively, as shown in FIGS. 25I and 25I1. In some embodiments, in response to detecting the first input and the second input, the computer system performs (2724f) operations associated with the first key and the second key of the virtual keyboard, such as entering letters "E" and "N" into text 2524 of text-entry field 2520 as shown in FIG. 25J. For example, the computer system activates the first key and the second key (e.g., selects the keys) and performs one or more of the operations as similarly described above with reference to step 2706. Concurrently selecting a first key and a second key of a virtual keyboard in response to further input in response to concurrently detecting two fingers of a hand of a user contact a location corresponding to the first key and the second key improves accuracy for performing the concurrent selection operation and/or enables the user to increase and/or improve a rate at which input selecting multiple keys of the virtual keyboard is provided, thereby improving user-device interaction.

It should be understood that the particular order in which the operations in method 2700 have been described is merely exemplary and is not intended to indicate that the described order is the only order in which the operations could be performed. One of ordinary skill in the art would recognize various ways to reorder the operations described herein.

FIGS. 28A-28H is a flowchart illustrating a method 2800 of displaying indication of attention of a user in accordance with some embodiments. In some embodiments, the method 2800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 2800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2800 are, optionally, combined and/or the order of some operations is, optionally, changed.

In some embodiments, the method 2800 is performed at a computer system, such as computer system 101 in FIG. 1, in communication with a display generation component and one or more input devices. In some embodiments, the computer system has one or more of the characteristics of the computer systems of methods 800, 900, 1000, 1200, 1400, 1600, 1800, 2000, 2200, 2400, 2600, 2700, and/or 3000. In some embodiments, the display generation component has one or more of the characteristics of the display generation component of methods 800, 900, 1000, 1200, 1400, 1600, 1800, 2000, 2200, 2400, 2600, 2700, and/or 3000. In some embodiments, the one or more input devices have one or more of the characteristics of the one or more input devices of methods 800, 900, 1000, 1200, 1400, 1600, 1800, 2000, 2200, 2400, 2600, 2700, and/or 3000.

In some embodiments, the computer system displays (2802a), via the display generation component, a user interface including a virtual object, such as virtual content 1128a in FIGS. 11B and 11B1, (e.g., a user interface or representation of an application, a representation of a content item (e.g., image and/or video), and/or a three-dimensional representation of an object that does not exist in a physical environment of the computer system, the display generation component and/or user). In some embodiments, the virtual object is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800, 900, 1000, 1200, 1400, 1600, 1800, 2000, 2200, 2400, 2600, 2700, and/or 3000. In some embodiments, the virtual object has one or more of the characteristics of the virtual objects of methods 800, 900, 1000, 1200, 1400, 1600, 1800, 2000, 2200, 2400, 2600, 2700, and/or 3000.

In some embodiments, while displaying the user interface, the computer system detects (2802b), via the one or more input devices, a first user input that includes attention, such as attention 1132e (e.g., hand-based) in FIG. 11B, directed towards a first portion, such as key 1130k in FIG. 11B, of the virtual object. In some embodiments, the first portion of the virtual object includes a key of a keyboard. In some embodiments, the first portion of the virtual object includes a face, an edge, or a point of a three-dimensional object. In some embodiments, the first portion of the virtual object includes a user interface element, such as slider element of user interface described in method 1600. In some embodiments, the first user input includes only the attention of the user (e.g., without including input from a portion of the user, such as a finger or hand of the user). In some embodiments, the first user input includes attention of the user and a direct or indirect input from a first portion (e.g., a finger or hand) of a user, such as described with reference to methods 2600 and/or 2700.

In some embodiments, while detecting the first user input (2802c), in accordance with a determination that one or more first criteria are satisfied, including a criterion that is satisfied when the first user input includes a respective type of input from a first portion (e.g., one or more hands, an index finger, a thumb, and/or any number of fingers) of the user, such as hand 1136e in FIG. 11B, at a location that corresponds to the virtual object (e.g., the first user input is a direct input), the computer system displays (2802d), via the display generation component, a first visual feedback, such as attention indicator 1134e (e.g., hand-based) in FIG. 11B, indicating a location of the attention of the user in the first portion of the virtual object. In some embodiments, the first user input includes direct input from the first portion of the user directed towards the first portion of the virtual object while attention of the user is directed towards the first portion of the virtual object. In some embodiments, the direct input includes one or more characteristics of the direct input described with respect to methods 2600 and/or 2700. In some embodiments, the direct input includes the first portion of the user being within a threshold distance (e.g., 0.1, 1, 5, 10, or 100 cm) of the first portion of the virtual object. In some embodiments, the direct input includes a touch input, such as an air tap or air swipe input, from a hand (e.g., index finger, thumb, or pinky finger) of the user. In some embodiments, the direct input includes the index finger in direct interaction with the first portion of the virtual object (e.g., air tapping or air touching). In some embodiments, the direct input includes two or more fingers in direct interaction with the first portion of the virtual object (e.g., air tapping or air touching). In some embodiments, the computer system displays the first visual feedback based on the first portion of the user being in direct interaction with the first portion of the virtual object for greater than a threshold amount of time (e.g., 0.01, 0.1, 1, 5, or 10s). In some embodiments, the first visual feedback includes one or more characteristics of the visual indication described in methods 1200, 2600 and/or 2700. In some embodiments, the first visual feedback includes applying a virtual lighting effect to the first portion of the virtual object. The virtual lighting effect optionally includes a static or animated visual effect such as a glow, a shimmering, a different texture, or a different tint applied to the first portion of the virtual object. In some embodiments, the first visual feedback (e.g., glow or shimmering) is virtually projected from a first portion (e.g., index finger) of the user as the first portion of the user approaches the first portion of the virtual object (e.g., first portion of the user is within a threshold distance such as 0.1, 1, 5, 10, or 100 cm of the first portion of the virtual object).

In some embodiments, while detecting the first user input (2802c), in accordance with a determination that one or more second criteria are satisfied, including a criterion that is satisfied when the first user input includes the attention of the user, such as attention 1132m (e.g., gaze-based) in FIG. 11C (e.g., directed towards the first portion of the virtual object for at least a threshold amount of time such as 0.5, 1, 2, 3, 4, 5, 10, 30, or 100s), without the respective type of input from the user (e.g., the first user input is gaze input or another input that does not involve an input at a location corresponding to the virtual object) (e.g., the first portion of the user is further than the above-described threshold distance of the first portion of the virtual object), the computer system displays (2802d) second visual feedback, such as attention indicator 1134m (e.g., gaze-based) in FIG. 11C, that is different from the first visual feedback without displaying the first visual feedback in the first portion, such as key 1130g in FIG. 11C, of the virtual object. In some embodiments, the second visual feedback is optionally a visually emphasized portion of the virtual object to which attention of the user is directed. For example, the second visual feedback optionally includes a highlighting, lighting, shadow and/or another visual effect applied in a first region surrounding the virtual object and/or on a first position in the area of the virtual object. In some embodiments, the highlighting, lighting, shadow and/or the other visual effect is not applied to a different portion (or different region) of the area of the virtual object outside of the first region. The visual indication optionally is or includes a second virtual object (e.g., a circular virtual object) overlaid on the first region of the selectable object that is optionally centered at the first position, and optionally not overlaid over a different portion of the area of the selectable object outside of the first region. In such cases, the second virtual object optionally includes a visual emphasis (e.g., highlighting, lighting, shadow and/or another other visual effect) that is different from a non-overlaid portion of the area of the selectable object outside of the first region. In some embodiments, the second visual feedback includes one or more characteristics of the visual indication described with respect to method 1200 and/or the attention indicator described with respect to method 2000. Applying a first visual feedback to a portion of a virtual object when a direct input is detected precisely indicates which virtual object and/or a location in the virtual object that a portion of the user (e.g., index finger) will interact with, thereby reducing errors in the interaction with the computer system, and applying a second visual feedback when the direct input is not detected indicates which virtual object and/or a location in the virtual object to which attention of the user is directed.

In some embodiments, displaying, via the display generation component, the second visual feedback includes displaying the second visual feedback having a shape, such as shape of attention indicator 1134a in FIG. 11A, resulting from masking a first shape (e.g., an oval, a circle, a rectangle, a three-dimensional shape, or another type of shape) corresponding to the attention of the user with a second shape of the virtual object, such as shape of object 1130b in FIG. 11A, and displaying, via the display generation component, the first visual feedback includes displaying the first visual feedback having a shape, such as shape of attention indicator 1134o in FIG. 11A, that does not result from masking the first shape with the second shape (2804). The second shape of the virtual object is optionally a similar or different shape than the shape of the second visual feedback and/or the first visual feedback and is of a similar or different size than the size of the shape of the second visual feedback and/or the first visual feedback. For example, the second visual feedback optionally has the first shape when it is displayed in an inner area of the virtual object where the boundaries of the first shape do not intersect with the boundaries of the virtual object, optionally in addition to having a variable visual appearance (e.g., a visual appearance that varies (e.g., fades or changes in other visual characteristics) toward the edges of the second visual feedback); however, if the second visual feedback is displayed closer to the boundaries of the virtual object, then the second visual feedback has the first shape except that the portions of the first shape that extend past or intersect with the boundaries of the virtual object are masked and/or not displayed, optionally in addition to having a variable visual appearance (e.g., a visual appearance that varies (e.g., fades or changes in other visual characteristics) toward the edges of the second visual feedback). In some embodiments, the second visual feedback having a shape resulting from masking the first shape with the second of the virtual object includes one or more characteristics of the visual indication having a shape resulting from masking a first shape with a second shape of the selectable object described with respect to method 1200. In some embodiments, the first visual feedback has the first shape when the first visual feedback is displayed in an inner area of the virtual object where the boundaries of the first shape do not intersect with the boundaries of the virtual object. In some embodiments, if the first visual feedback is displayed closer to the boundaries of the virtual object, then the first visual feedback has a shape that does not result from masking the first shape with the second shape (e.g., a shape independent of the shape of the virtual object). For example, the shape of the first visual feedback can optionally extend past or intersect with the boundaries of the virtual object. Masking a shape of the second visual feedback by a shape of the virtual object clearly indicates that the virtual object is the focus of attention and reduces inputs for correcting erroneous interaction with the virtual object, thus improving user-device interactions.

In some embodiments, while the one or more first criteria or the one or more second criteria are satisfied, the computer system detects (2806a), via the one or more input devices, a change in position of the first portion of the user relative to the virtual objector. In some embodiments, the first portion (e.g., fingertip or hand) of the user moves closer to the virtual object. In some embodiments, the first portion of the user moves farther away from virtual object.

In some embodiments, in response to detecting the change in position of the first portion of the user relative to the virtual object, such as hand 1136f moving closer to key 1130f from FIG. 11A to FIG. 11B, in accordance with a determination that the one or more first criteria were satisfied, the computer system changes (2806b) a visual appearance (e.g., brightness, size, blurriness, transparency, and/or visual prominence), of the first visual feedback by a first amount, such as changing visual appearance of attention indicator 1134f (e.g., hand-based) from FIG. 11A to FIG. 11B.

In some embodiments, in response to detecting the change in position of the first portion of the user relative to the virtual object, in accordance with a determination that the one or more second criteria were satisfied, the computer system forgoes (2806c) changing a visual appearance (e.g., brightness, size, blurriness, transparency, and/or visual prominence) of the second visual feedback by the first amount, such as forgoing changing a visual appearance of a gaze-based indicator if it were displayed for key 1130f in FIG. 11B (2806c). In some embodiments, as the first portion of the user moves closer to the virtual object, the first visual feedback and/or the second visual feedback becomes more visually prominent (e.g., brighter, larger, less blurry, and/or less transparent). In some embodiments, as the first portion of the user moves farther away from the virtual object, the first visual feedback and/or the second visual feedback becomes less visually prominent (e.g., less bright, smaller, more blurry, and/or more transparent). In some embodiments, the visual prominence of the first visual feedback changes more than the visual prominence of the second visual feedback when the first portion of the user moves closer to the virtual object or farther away from the virtual object. For example, the visual prominence of the first visual feedback optionally changes by the second amount, such as 1, 10, 50, 75 or 100%. while the visual prominence of the second visual feedback optionally changes less than the first visual feedback (and optionally does not change). The second visual feedback optionally changes by a second amount, such as 0.1, 1, 10, or 30%. In some embodiments, if the first portion of the user does not move relative to the virtual object, then the visual prominence of the first visual feedback and/or the second visual feedback does not change. Changing the visual appearance of the first visual feedback more than the second visual feedback provides feedback about interaction with the respective type of input when needed and without consuming resources when not needed (e.g., because the first visual feedback is affected by the distance of the first portion of the user relative to the virtual object while the second visual feedback is not affected by the distance of the first portion of the user relative to the virtual object).

In some embodiments, in response to detecting the change in position of the first portion of the user relative to the virtual object, and in accordance with the determination that the one or more second criteria were satisfied, the computer system forgoes (2808) changing the visual appearance of the second visual feedback, such as visual appearance of attention indicator 134b (e.g., gaze-based) remaining unchanged in FIG. 11A, based on a change in position of the first portion of the user relative to the virtual object, such as hand 1136a being closer to object 1130b than hand 1136m in FIG. 11A. In some embodiments, as the first portion of the user moves closer to the virtual object or farther away from the virtual object, the visual appearance (e.g., brightness, size, blurriness, transparency, and/or visual prominence) of the second visual feedback does not change as long as the respective type of input from the first portion of the user at a location that corresponds to the virtual object is not detected. Forgoing changing the visual appearance of the second visual feedback when the first portion of the user changes in position relative to the virtual object reduces resource usage associated with changing the visual appearance (since the second visual feedback is not dependent on position of the first portion of the user and thus changing the changing the visual appearance of the second visual feedback is not needed).

In some embodiments, changing the visual appearance of the first visual feedback includes changing (e.g., increasing or decreasing) a level of brightness of the first visual feedback, such as changing brightness of attention indicator 1134f (e.g., hand-based) from FIG. 11A to FIG. 11B (e.g., as described with respect to step(s) 2806) (2810). In some embodiments, in accordance with a determination that the one or more second criteria are satisfied and as the first portion of the user moves relative to virtual object, the visual appearance of the second visual feedback changes, such as a level of brightness of the second visual feedback changes. Changing a brightness of the of the first visual feedback more than the second visual feedback based on changes in position of the first portion of the user relative to the virtual object (e.g., the first visual feedback is brighter as the hand of the user moves closer to the virtual object) clearly indicates that the virtual object is the focus of attention and reduces inputs for correcting erroneous interaction with the virtual object.

In some embodiments, changing the visual appearance of the first visual feedback includes changing (e.g., increasing or decreasing) a size of the first visual feedback, such as changing size of attention indicator 1134f (e.g., hand-based) from FIG. 11A to FIG. 11B (e.g., as described with respect to step(s) 2806) (2812). In some embodiments, in accordance with a determination that the one or more second criteria are satisfied and as the first portion of the user moves relative to virtual object, the visual appearance of the second visual feedback changes, such as a size of the second visual feedback changes. Changing a size of the of the first visual feedback more than the second visual feedback based on changes in position of the first portion of the user relative to the virtual object (e.g., the first visual feedback is larger as the hand of the user moves closer to the virtual object) clearly indicates that the virtual object is the focus of attention and reduces inputs for correcting erroneous interaction with the virtual object.

In some embodiments, changing the visual appearance of the first visual feedback includes changing (e.g., increasing or decreasing) an amount (e.g., an intensity, magnitude and/or blur radius) of blur of the first visual feedback, such as changing amount of blur of attention indicator 1134f (e.g., hand-based) from FIG. 11A to FIG. 11B (e.g., as described with respect to step(s) 2806) (2814). In some embodiments, in accordance with a determination that the one or more second criteria are satisfied and as the first portion of the user moves relative to virtual object, the visual appearance of the second visual feedback changes, such as an amount of blur of the second visual feedback changes. Changing an amount of blur of the of the first visual feedback more than the second visual feedback based on changes in position of the first portion of the user relative to the virtual object (e.g., the first visual feedback is less blurry as the hand of the user moves closer to the virtual object) clearly indicates that the virtual object is the focus of attention and reduces inputs for correcting erroneous interaction with the virtual object.

In some embodiments, the one or more second criteria include a criterion that is satisfied when the virtual object is a selectable object, such as object 1130b in FIGS. 11B and 11B1 (e.g., button, icon, widget, affordance, playback control element, or any other selectable object), and is not satisfied when the virtual object is not a selectable object, such as non-selectable object 1130i in FIG. 11B (e.g., an image, a three-dimensional model, or any other non-selectable object) (2816). In some embodiments, when the virtual object is a selectable object that is selected, the computer system performs an operation associated with the virtual object. In some embodiments, performing the operation associated with the virtual object includes displaying (e.g., additional) content in the user interface that is associated with the virtual object, such as an image, video, and/or text, outputting audio, such as audio corresponding to music, podcast, and/or video, and/or displaying another user interface in the three-dimensional environment, such as displaying another application window or displaying a virtual keyboard (e.g., for entering text in an input field of the user interface in which the virtual object is displayed). In some embodiments, performing the operation associated with the virtual object includes adjusting a brightness, a volume, or other property of content associated with the virtual object and controlled by the virtual object. In some embodiments, when the virtual object is non-selectable, the virtual object is not associated with any operation that the computer system can perform—and therefore, in response to a selection input directed to the non-selectable object, the computer system optionally does not perform an operation. In some embodiments, when the virtual object is not selectable, the first visual feedback is displayed (e.g., the one or more first criteria can be satisfied whether or not the virtual object is selectable) but the second visual feedback is not displayed. In some embodiments, when the virtual object is selectable, the first visual feedback or the second visual feedback is displayed. Displaying the second visual feedback when the virtual object is selectable clearly indicates that the virtual object is the focus of attention and reduces inputs for correcting erroneous interaction with the virtual object, but not displaying the second visual feedback when the virtual object is not selectable reduces resource usage associated with displaying the second visual feedback when the second visual feedback is not needed (e.g., when selection of the virtual object is not possible).

In some embodiments, the one or more second criteria include a criterion that is satisfied when the first portion of the user is in a ready state, such as hand 1136b being in ready-state in FIG. 11C (2818) (e.g., hand is raised or an index finger of the hand is raised). In some embodiments, when a gaze of the user is directed to the virtual object but the first portion of the user is not in the ready state, the second visual feedback is not displayed. In some embodiments, the one or more first criteria are satisfied whether or not the first portion of the user is in the ready state. Displaying the second visual feedback when the first portion of the user is in a ready state clearly indicates that a selection input (e.g., a pinching gesture in which a thumb and index finger of the hand move toward each other and touch) will cause selection the virtual object (e.g., because the virtual object is in a state for selection due to the first portion of the user in the ready state).

In some embodiments, while displaying the second visual feedback in the first portion of the virtual object in response to detecting the first user input (2820a), the computer system detects (2820b), via the one or more input devices, a second user input (e.g., different from the first user input and/or includes one or more characteristics of the first user input) corresponding to an indirect input from the first portion of the user, such as input from hand 1136f in FIG. 11C. In some embodiments, the second user input includes attention of the user and indirect input from the first portion (e.g., a finger or hand) of a user, such as described with reference to methods 2600 and/or 2700. In some embodiments, the indirect input is an air gesture input provided by the first portion (e.g., hand) of the user and is directed to the virtual object (e.g., because it is detected while attention and/or gaze of the user is directed to the virtual object). The air gesture input provided by the hand of the user optionally includes a pinching gesture in which a thumb and index finger of the hand move toward each other and touch and move apart. The air gesture input provided by the hand of the user optionally includes a pinching gesture in which a thumb and index finger of the hand move toward each other and touch, followed by movement of the hand in the pinch hand shape (e.g., with the index finger and the thumb remaining in contact with one another). In some embodiments, the first input includes attention of the user directed to the virtual object when the pinching gesture is detected. The air gesture input provided by the hand of the user optionally includes a raised index finger pointed toward the virtual object, followed by movement of the index finger moving towards the virtual object without directly interacting with the virtual object. In some embodiments, the first input includes attention of the user directed to the virtual object when the raised index finger is detected.

In some embodiments, in response to detecting the second user input, the computer system interacts (2820c) with the virtual object (e.g., scaling, translating, and/or rotating the virtual object), such as selecting key 1130f in FIG. 11C, based on the second user input. In some embodiments, when the attention of the user is directed to the virtual object and the first portion of the hand is in the pinching gesture, the virtual object (e.g., virtual button) is selected. In some embodiments, when the virtual button is selected, the computer system performs an operation associated with the virtual button, such as the above-described operation with respect to step 2816. Interacting with a virtual object in accordance with indirect interaction provides interaction with the virtual object while simplifying the number of movements needed from the hand of the user to interact the virtual object.

In some embodiments, while displaying the first visual feedback in the first portion of the virtual object in response to detecting the first user input (2822a), the computer system detects (2822b), via the one or more input devices, a second user input (e.g., different from the first user input and/or includes one or more characteristics of the first user input) corresponding to a direct input from the first portion of the user, such as direct input from hand 1136f in FIG. 11C. In some embodiments, the second user input includes direct input from the first portion (e.g., a finger or hand) of a user, such as described with reference to methods 2600 and/or 2700 and optionally includes attention of the user directed to the virtual object. In some embodiments, the second user input includes direct input where the hand of the user is in direct interaction with the virtual object. For example, the direct input provided by the hand of the user optionally includes a fingertip air tapping and releasing the virtual object (e.g., that can result in selection of the virtual object). For example, the direct input provided by the hand of the user optionally includes a fingertip air tapping the virtual object, followed by movement of the fingertip to drag, rotate, and/or scale the virtual object while the fingertip is in direct interaction with the virtual object. In some embodiments, the direct input does not require attention and/or gaze directed to the virtual object.

In some embodiments, in response to detecting the second user input, the computer system interacts (2822c) (e.g., activating, adjusting, scaling, translating, and/or rotating the virtual object) with the virtual object based on the second user input such as selecting key 1130f in FIG. 11C (and, optionally, performing an operation corresponding to the virtual object, such as typing on a keyboard, selecting a button, and/or adjusting a parameter such as volume or brightness). In some embodiments, interacting with the virtual object includes air tapping and/or pushing a virtual key of a virtual keyboard down based on direct input from a user's fingertip (e.g., without attention or gaze directed to the virtual object). In some embodiments, based on a direct input (e.g., air tapping), the virtual object (e.g., virtual button) is selected. In some embodiments, when the virtual button is selected, the computer system performs an operation associated with the virtual button, such as the above-described operation with respect to step 2816. For example, air tapping and/or pushing the virtual key optionally causes selection of the virtual key. As a result, a letter corresponding to the virtual key is optionally entered into an input field associated with the virtual keyboard when the virtual key is selected. Interacting with a virtual object in accordance with direct interaction provides more precise control of the interaction with the virtual object, thereby improving user experience, and reducing the number of inputs needed to interact with the virtual object.

In some embodiments, while the one or more first criteria or the one or more second criteria are satisfied, the computer system detects (2824*a*), via the one or more input devices, a second input, such as input from hand 1136*f* in FIG. 11C or input associated with attention 1132*m* (e.g., gaze-based) in FIG. 11C (e.g., different from the first user input or includes one or more characteristics of the first user input) corresponding to selection of the virtual object, wherein the virtual object is a selectable button, such as key 1130*f* or key 1130*g* in FIG. 11C (e.g., a virtual playback control element or virtual key of a virtual keyboard). In some embodiments, the second user input includes attention of the user and direct or indirect input from the first portion (e.g., a finger or hand) of the user, such as described with reference to methods 2600 and 2700. In some embodiments, the direct input from the first portion of the user includes a fingertip air tapping the selectable button. In some embodiments, while attention of the user is directed to the selectable button, the indirect input from the first portion of the user includes an air pinching gesture in which a thumb and index finger of the hand move toward each other and touch.

In some embodiments, in response to detecting the second input, the computer system selects (2824*b*) the selectable button. In some embodiments, when the fingertip air taps the selectable button, the selectable button is selected. In some embodiments, when the hand of the user forms a pinching gesture while the attention of the user is directed to the selectable button, the selectable button is selected.

In some embodiments, selecting the selectable button includes in accordance with a determination that the one or more first criteria were satisfied when the second input was detected, moving the virtual object away from a viewpoint of the user in accordance with the second input, such as moving key 1130*f* away from a viewpoint of a user in FIG. 11C (e.g., and concurrently displaying the first visual feedback in the first portion of the selectable button). (2824*c*). In some embodiments, the selectable button is pressed down and/or appears smaller to the user when moved away from the viewpoint of the user. In some embodiments, moving the virtual object away from the viewpoint of the user includes one or more characteristics of displaying a first object at a second distance relative to a user interface such that the first object visually appears to "snap" or "push" down onto the surface of the user interface as described with respect to method 2600.

In some embodiments, selecting the selectable button includes in accordance with a determination that the one or more second criteria were satisfied when the second input was detected (e.g., and concurrently displaying the second visual feedback in the first portion of the selectable button), forgoing moving the virtual object away from the viewpoint of the user, such as forgoing moving key 1130*g* away from a viewpoint of a user in FIG. 11C (2824*d*). In some embodiments, the selectable button remains raised, at the same distance from the viewpoint and/or appears to have remained the same size to the user. In some embodiments, forgoing moving the virtual object away from the viewpoint of the user includes one or more characteristics of maintaining display of a first object at a first distance relative to the user interface such that the first object visually appear to "pop up" away from the surface of the user interface as described with respect to method 2600. Moving a virtual object away from the user's viewpoint (e.g., pressing selectable button down) when selecting the virtual object via direct interaction clearly indicates that the virtual object has been selected and reduces inputs for correcting erroneous interaction with the virtual object; however, not moving the virtual object away from the user's viewpoint when selecting the virtual object via indirect interaction helps visually distinguish indirect interaction from direct interaction when selecting the virtual object, and thus improving user-device interactions.

In some embodiments, while the one or more first criteria or the one or more second criteria are satisfied, the computer system detects (2826*a*), via the one or more input devices, a second input (e.g., as described with respect to step(s) 2824) corresponding to selection of the virtual object, wherein the virtual object is a selectable button (e.g., as described with respect to step(s) 2824).

In some embodiments, in response to detecting the second input (2826*b*), the computer system selects (2826*c*) the selectable button, such as selecting key 1130*f* in FIG. 11C (e.g., as described with respect to step(s) 2824).

In some embodiments, in accordance with a determination that the one or more first criteria were satisfied, the computer system displays (2826*c*) a visual indication around a at least a portion of a perimeter (e.g., around some or all of the perimeter) of the virtual object, such as highlighting around key 1130*f* in FIG. 11C, indicating that the virtual object has been selected (e.g., and concurrently displaying the first visual feedback in the first portion of the selectable button). In some embodiments, displaying a visual indication around a perimeter of the virtual object includes highlighting the virtual object and/or displaying an outline around the perimeter of the virtual object. In some embodiments, the visual indication is displayed across the entire area of the virtual object, including the perimeter of the virtual object. In some embodiments, the visual indication is not displayed before detecting the second input corresponding to the selection of the virtual object.

In some embodiments, in accordance with a determination that the one or more second criteria were satisfied, the computer system forgoes (2826*d*) displaying the visual indication around the portion of the perimeter of the virtual object, such as lack of highlighting around key 1130*g* in FIG. 11C (e.g., forgoing displaying the visual indication around some or all of the perimeter) (e.g., and concurrently displaying the second visual feedback in the first portion of the selectable button). In some embodiments, a visual appearance of the selectable button remains unchanged. Displaying the visual indication around the perimeter of the virtual object when selected via direct interaction clearly indicates that the virtual object has been selected and reduces inputs for correcting erroneous interaction with the virtual object; however, not displaying the visual indication around the perimeter of the virtual object when selected via indirect interaction helps visually distinguish indirect interaction from direct interaction when selecting the virtual object, and thus improving user-device interactions.

In some embodiments, while displaying the second visual feedback, such as attention indicator 1134*b* in FIG. 11A, at the first portion of the virtual object, the computer system detects (2828*a*) second user input (e.g., different from the first user input and/or includes one or more characteristics of the first user input) that corresponds to movement of the first portion of the user toward the virtual object. In some embodiments, the second user input includes direct input from the first portion (e.g., a finger or hand) of a user, such as described with reference to methods 2600 and/or 2700 and optionally includes attention of the user directed to the virtual object. For example, the second user input optionally includes an index finger of the user's hand extended towards the virtual object. The second user input optionally includes the first portion (e.g., a finger or hand) of the user moving closer to the virtual object, such as a virtual button.

In some embodiments, in response to detecting the second user input, and in accordance with a determination that first portion of the user has moved within a threshold distance (e.g., 0.01, 0.1, 1, 2, 3, 5, or 10 cm) of the virtual object, the computer system ceases (2828*b*) display of the second visual feedback and (optionally in accordance with a determination that the one or more first criteria are satisfied) displays the first visual feedback in a respective portion of the virtual object, such as displaying a hand-based attention indicator instead of the attention indicator (e.g., gaze-based) 1134*b* if hand 1136*a* moved within a threshold distance of object 1130*b* in FIG. 11A. In some embodiments, if the one or more first criteria are not satisfied, the first visual feedback is not displayed despite ceasing display of the second visual feedback. In some embodiments, if the first visual feedback is displayed rather than the second visual feedback, and the first portion of the user has moved outside the threshold distance, then display of the first visual feedback is ceased, and the second visual feedback is redisplayed in a respective portion of the virtual object (optionally only if the one or more second criteria are satisfied). In some embodiments, ceasing display of the second visual feedback and displaying the first visual feedback in the respective portion of the virtual object is a gradual process, where the second visual feedback gradually fades out and the first visual feedback gradually fades in. This gradual process is optionally controlled by movement of the first portion of the user (e.g., index finger) towards the virtual object (e.g., switching to the first visual feedback) or away from the virtual object (e.g., switching to the second visual feedback). Displaying the first visual feedback instead of the second visual feedback when the user's hand had moved within the threshold distance of the virtual object clearly indicates that the virtual object can be manipulated via direct interaction, thereby improving user-device interactions.

In some embodiments, displaying the first visual feedback includes (2830*a*) in accordance with a determination that the virtual object has a first size, such as key 1130*k* having a first size in FIG. 11C (e.g., a first width, first length, first height, and/or first diameter), displaying the first visual feedback having a first visual appearance, such as attention indicator 1134*e* (e.g., hand-based) having a first visual appearance in FIG. 11B (e.g., a first brightness, a first color, a first transparency, a first blurriness, a first size, and/or a first visual prominence) (2830*b*).

In some embodiments, displaying the first visual feedback includes (2830*a*) in accordance with a determination that the virtual object has a second size, such as key 1130*k* having a second size in FIG. 11C (e.g., different from the first size such as a second width, second length, second height, and/or second diameter), displaying the first visual feedback having the first visual appearance, such as attention indicator 1134*e* (e.g., hand-based) having the first visual appearance in FIG.

11C (2830*c*). In some embodiments, the first visual feedback is independent of the size of the virtual object. Even though the virtual object increases or decreases in size, the first visual feedback optionally does not change.

In some embodiments, displaying the second visual feedback includes (2830*d*) in accordance with a determination the virtual object has the first size, such as size of object 1130*a* in FIG. 11A, displaying the second visual feedback having a second visual appearance, such as a visual appearance of attention indicator 1134*a* (e.g., gaze-based) in FIG. 11A (e.g., different from or the same as the first visual appearance) (2830*e*).

In some embodiments, displaying the second visual feedback includes (2830*e*) in accordance with a determination that the virtual object has the second size, displaying the second visual feedback having a third visual appearance, such as changing visual appearance of attention indicator 1134*a* (e.g., gaze-based) if object 1130*a* changes in size in FIG. 11A (e.g., a second brightness, a second color, a second transparency, a second blurriness, a second size, and/or a second visual prominence) different from the second visual appearance (2830*e*). While displaying the first visual feedback and/or the second visual feedback, the first portion of the user optionally maintains the same relative distance (e.g., position) from the virtual object. In some embodiments, as the virtual object increases or decreased in size, the second visual feedback changes in visual appearance. For example, if the virtual object is small, then the second visual feedback is optionally less bright, more transparent, a different color, more blurry, smaller, and/or less visually prominent compared to the second visual feedback of a larger virtual object. If the virtual object is small, then the second visual feedback is optionally more bright, less transparent, a different color, less blurry, larger, and/or more visually prominent compared to the second visual feedback of a larger virtual object. Maintaining a visual appearance of the first visual feedback when the virtual object changes in size is an indication that the location of the hand is operative for a direct input; whereas, changing a visual appearance of the second visual feedback when the virtual object changes in size is an indication that the location of the hand is not operative for an indirect input.

In some embodiments, while displaying, in the three-dimensional environment, a respective virtual object (e.g., a virtual button or a virtual keyboard) having a first size, such as size of key 1130*h* in FIGS. 11B and 11B1 (e.g., a first width, first length, first height, and/or first diameter) relative to the three-dimensional environment, the computer system detects (2832*a*), via the one or more input devices, a second user input (e.g., different from the first user input and/or or includes one or more characteristics of the first user input) that includes attention, such as attention 1132*n* (e.g., hand-based) and/or attention 1132*o* (e.g., gaze-based) in FIG. 11C, directed towards a first portion of the respective virtual object. In some embodiments, the second user input includes only the attention of the user (e.g., without including input from a portion of the user, such as a finger or hand of the user). In some embodiments, the second user input includes attention of the user and direct or indirect input from the first portion (e.g., a finger or hand) of a user, such as described with reference to methods 2600 and/or 2700.

In some embodiments, in response to detecting the second user input, in accordance with a determination that one or more third criteria are satisfied, the computer system displays (2832*b*) the respective virtual object having a second size (e.g., a second width, second length, second height, and/or second diameter), greater than the first size, such as key 1130h increasing in size from FIGS. 11B and 11B1 to 11C, relative to the three-dimensional environment. In some embodiments, the one or more third criteria are satisfied when the second user input includes a respective type of input from the first portion of the user at a location that corresponds to the virtual object (e.g., the second user input is a direct input). In some embodiments, the one or more third criteria are satisfied when the second user input includes the attention of the user without the respective type of input from the user (e.g., the second user input is gaze input). In some embodiments, the one or more third criteria are satisfied when the second user input includes the direct input and the gaze input. In some embodiments, the one or more third criteria are satisfied based on a type of virtual object. For example, virtual object such as buttons, virtual keys of a virtual keyboard, or selectable objects optionally satisfy the one or more third criteria, and thereby expand. Virtual objects such as a scroll region of a user interface, an image, a three-dimensional model, or a non-selectable object optionally do not satisfy the one or more third criteria, and thereby do not expand. In some embodiments, if the one or more third criteria are not satisfied, then the computer system forgoes increasing the size of the virtual object (e.g., to the second size). In some embodiments, when attention of the user (e.g., corresponding to direct input and/or gaze input) is directed toward the virtual object, the virtual object appears to have expanded (e.g., increases in size and/or moves towards the viewpoint of the user such as button or a virtual key appearing to "pop up"). Increasing the size of the virtual object when attention of the user is directed to the virtual object clearly indicates that the virtual object is the focus of attention and reduces inputs for correcting erroneous interaction with the virtual object, thus improving user-device interactions.

In some embodiments, the second user input includes gaze of the user directed to the respective virtual object without input from the user other than the gaze of the user, and the one or more third criteria include a criterion that is satisfied when the second user input includes gaze of the user directed toward the respective virtual object without input other than the gaze from the user, such as key 1130h increasing in size from FIGS. 11B and 11B1 to 11C based on attention 1132o (e.g., gaze-based) and not attention 1132n (e.g., hand-based) (2834). In some embodiments, the one or more third criteria are satisfied based on a type of virtual object as described with respect to step(s) 2832. In some embodiments, if the one or more third criteria are not satisfied, then the computer system forgoes increasing the size of the virtual object (e.g., to the second size). In some embodiments, when attention of the user (e.g., corresponding to gaze input) is directed to the virtual object, the virtual object appears to have expanded (e.g., increases in size and/or moves towards the viewpoint of the user such as button or a virtual key appearing to "pop up"). Increasing the size of the virtual object when attention of the user is directed to the virtual object clearly indicates that the virtual object is the focus of attention and reduces inputs for correcting erroneous interaction with the virtual object, thus improving user-device interactions.

In some embodiments, the one or more third criteria include a criterion that is satisfied when gaze of the user is directed toward the respective virtual object, such as attention 1132o directed toward key 1130h, (e.g., corresponding to gaze input), and a criterion that is satisfied when the second user input includes the respective type of input from the first portion of the user at a location that corresponds to the respective virtual object, such as input from hand 1136h directed toward key 1130h (e.g., corresponding to direct input) (2836a).

In some embodiments, while displaying the respective virtual object having the second size relative to the three-dimensional environment, the computer system detects (2836b), via the one or more input devices, that the gaze of the user is no longer directed toward the respective virtual object, such as attention 1132o no longer directed toward key 1130h in FIG. 11C, and that the first portion of the user is no longer providing the respective type of input at the location corresponding to the respective virtual object, such as if hand 1136h was no longer directed towards key 1130h in FIG. 11C. In some embodiments, the computer system detects that the gaze of the user is no longer directed toward the virtual object and the hand of the user is not within a threshold distance (e.g., 0.01, 0.1, 1, 2, 3, 5, or 10 cm) of the virtual object (as described with respect to step(s) 2828).

In some embodiments, in response to detecting that the gaze of the user is no longer directed toward the respective virtual object and that the first portion of the user is no longer providing the respective type of input at the location corresponding to the respective virtual object, the computer system displays (2836c), in the three-dimensional environment, the respective virtual object having the first size relative to the three-dimensional environment, such key 1130h having a size from FIGS. 11B and 11B1 (e.g., the virtual object has decreased in size, moved farther away from the viewpoint of the user, and/or appears to have collapsed). Decrease the size of the virtual object when attention of the user is no longer directed toward the virtual object and the first portion of the user is no longer providing the respective type of input at a location of the virtual object clearly indicates that the virtual object is no longer the focus of attention and prevents accidental inputs for interacting with the virtual object, thus improving user-device interactions.

In some embodiments, while displaying the respective virtual object having the second size relative to the three-dimensional environment, the computer system 101 detects (2838a), via the one or more input devices, that the first portion of the user is no longer providing the respective type of input at the location corresponding to the respective virtual object but that the gaze of the user is directed toward the respective virtual object (e.g., corresponding to gaze input but no direct input).

In some embodiments, in response to detecting that the first portion of the user is no longer providing the respective type of input at the location corresponding to the respective virtual object but that the gaze of the user is directed toward the respective virtual object, such as detecting attention 1132o (e.g., gaze-based) but not attention 1132n (e.g., hand-based) in FIG. 11C, the computer system 101 maintains (2838b), in the three-dimensional environment, display of the respective virtual object having the second size relative to the three-dimensional environment, such as maintaining display of size of key 1130k in FIG. 11C. In some embodiments, the computer system detects that the gaze of the user is still directed to the virtual object, but the hand of the user is outside a threshold distance (e.g., 0.01, 0.1, 1, 2, 3, 5, or 10 cm) of the virtual object (as described with respect to step(s) 2828). Even though the hand of the user is no longer providing the respective type of input at the location corresponding to the virtual object, the virtual object does not change in size or does not appear to collapse because the gaze of the user is still directed to the virtual object. In some embodiments, when the computer system detects an indirect input directed to the virtual object, the virtual object is selected as described with respect to step(s) 2820. Maintaining the size of the virtual object despite the hand of the user no longer providing input at the location corresponding to the virtual object clearly indicates that the virtual object is the still the focus of attention because the gaze of the user is still directed to the virtual object.

In some embodiments, while displaying the respective virtual object having the second size relative to the three-dimensional environment, the computer system detects (2840a), via the one or more input devices, that the gaze of the user is no longer directed toward the respective virtual object but that the first portion of the user is providing the respective type of input at the location corresponding to the respective virtual object (e.g., corresponding to direct input but no gaze input).

In some embodiments, in response to detecting that that the gaze of the user is no longer directed toward the respective virtual object but that the first portion of the user is providing the respective type of input at the location corresponding to the respective virtual object, such as detecting attention 1132n (e.g., hand-based) but not attention 1132o (e.g., gaze-based) in FIG. 11C, the computer system maintains (2840b), in the three-dimensional environment, display of the respective virtual object having the second size relative to the three-dimensional environment, maintaining display of size of key 1130k in FIG. 11C. In some embodiments, the computer system detects that the hand of the user is within a threshold distance (e.g., 0.01, 0.1, 1, 2, 3, 5, or 10 cm) of the virtual object (as described with respect to step(s) 2828), but the gaze of the user is no longer directed toward the virtual object. Even though the gaze of the user is no longer directed to the virtual object, the virtual object does not change in size or does not appear to collapse because the hand of the user is still providing the respective type of input at the location corresponding to the virtual object. In some embodiments, when the computer system detects a direct input directed to the virtual object, the virtual object is selected as described with respect to step 2822. Maintaining the size of the virtual object despite the gaze of the user having moved away from the virtual object clearly indicates that the virtual object is the still the focus of user input because the hand of the user is still providing input at the location corresponding to the virtual object.

It should be understood that the particular order in which the operations in method 2800 have been described is merely exemplary and is not intended to indicate that the described order is the only order in which the operations could be performed. One of ordinary skill in the art would recognize various ways to reorder the operations described herein.

FIGS. 29A-29G illustrate examples of a computer system facilitating movement of a virtual object relative to a viewpoint of user in accordance with direct touch interactions in a three-dimensional environment in accordance with some embodiments.

Figure 29A:
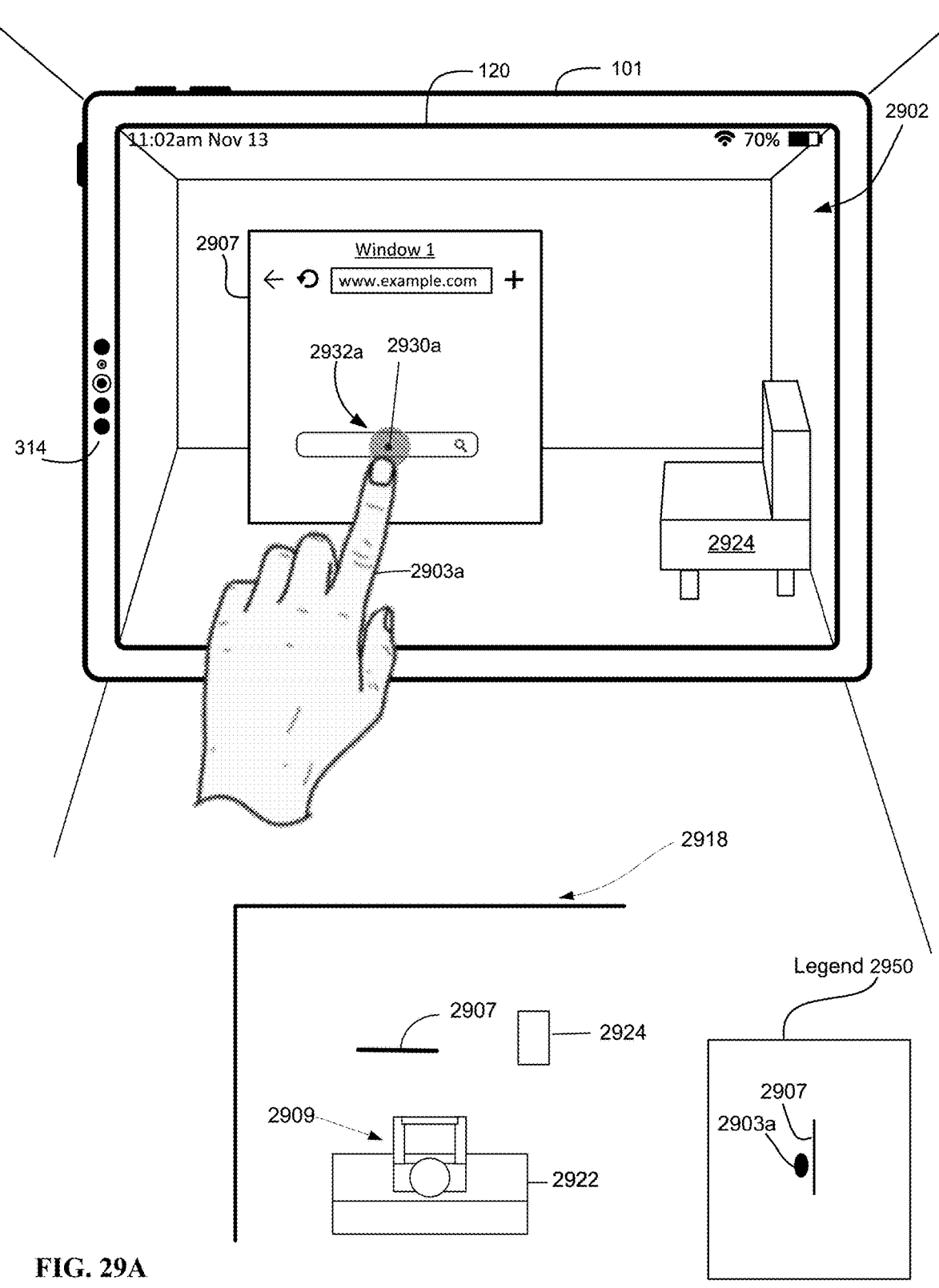
FIGS. 29A-29G illustrate examples of a computer system facilitating movement of a virtual object relative to a viewpoint of user in accordance with direct touch interactions in a three-dimensional environment in accordance with some embodiments.

FIG. 29A illustrates a computer system (e.g., an electronic device) 101 displaying, via a display generation component (e.g., display generation component 120 of FIG. 1), a three-dimensional environment 2902 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user). The figures herein illustrate a three-dimensional environment that is presented to the user by computer system 101 (e.g., and displayed by the display generation component of computer system 101) and an overhead view of the three-dimensional environment associated with computer system 101 (e.g., such as overhead view 2918 in FIG. 29A) to illustrate the relative locations of real-world elements from the physical environment and virtual elements (e.g., virtual content, virtual objects, and/or virtual environment) in the three-dimensional environment.

As shown in FIG. 29A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2902 and/or portions of the physical environment are visible via the display generation component 120. For example, three-dimensional environment 2902 includes a sofa 2924 and the floor, ceiling, and walls of the physical environment (e.g., the room) surrounding the computer system 101. As illustrated in the overhead view 2918 in FIG. 29A, the user 2906 is seated on a couch 2922 in the physical environment while interacting with the computer system 101. In the overhead view 2918, sofa 2924 is a real-world object in the physical environment, which has been captured by the one or more sensors of computer system 101, and representation of the sofa 2924 is included in the three-dimensional environment 2902 (e.g., photorealistic representation, simplified representation, cartoon, or caricature), or sofa 2924 is visible via passive passthrough via display generation component 120.

In FIG. 29A, three-dimensional environment 2902 also includes a plurality of objects, such as user interface object 2907 ("Window 1"). In some embodiments, the user interface object 2907 is an application window that is associated with a respective application operating on the computer system 101. For example, as shown in FIG. 29A, the user interface object 2907 is displaying a user interface of a web-browsing application, particularly a user interface associated with website "www.example.com". In some embodiments, as shown in FIG. 29A, the user interface object 2907 includes virtual input field 2916, in which text can be inputted.

In some embodiments, as discussed herein, the computer system 101 provides for enhanced and precise interaction with objects in the three-dimensional environment 2902. In some embodiments, the computer system 101 displays visual feedback of an interaction between a portion of the user (e.g., a finger of a hand of the user) and a respective option in the three-dimensional environment 2902 if the portion of the user 2909 is a threshold distance (e.g., 0.1, 0.05, 0.1, 0.3, 1, 3, 5, 10, or 20 cm) from the respective option. In some embodiments, the computer system 101 adjusts a visual appearance of the visual indication based on object type (e.g., whether the respective option is selectable or not). Additionally, in some embodiments, the computer system 101 selectively displays the visual indication based on which finger is within the threshold distance above of the respective option. Additional details of the above and below with respect to displaying visual feedback (e.g., hand based) are provided with reference to methods 2600, 2700, 2800 and/or 3000.

As shown in FIG. 29A, the computer system 101 detects attention 2930a of the user 2909 and finger 2903a of the user 2909 directed toward the virtual input field 2916 in the three-dimensional environment 2902. In FIG. 29A. the computer system 101 displays a visual feedback (hand-based) 2932a in response to detecting direct interaction between the finger 2903a of the user 2909 and the virtual input field 2916 in the three-dimensional environment 2902. In some embodiments, direct interaction includes the finger 2903a air tapping the virtual input field 2916. In some embodiments, direct interaction includes attention 2930a of the user 2909 directed to the virtual input field 2916 while the finger 2903a is within the threshold distance (e.g., 0.1, 0.05, 0.1, 0.3, 1, 3, 5, 10, or 20 cm) of the virtual input field 2916. In some embodiments, direct interaction includes the finger 2903a being within the threshold distance (e.g., 0.1, 0.05, 0.1, 0.3, 1, 3, 5, 10, or 20 cm) of the virtual input field 2916 without attention 2930a of the user 2909 directed to the virtual input field 2916.

Figure 29B:
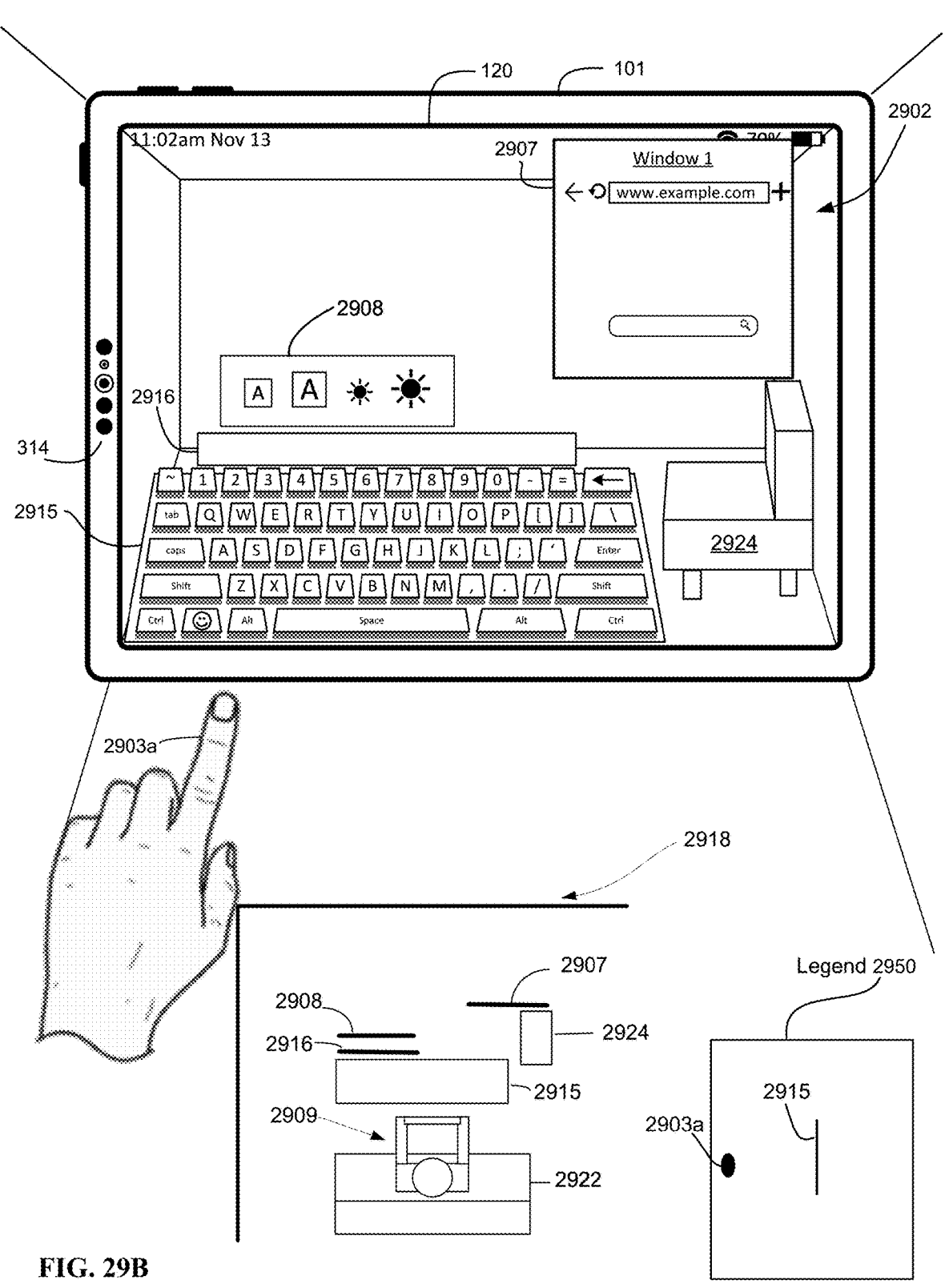

As discussed herein, FIGS. 29A-29G include legend 2950 illustrating a side view of a relative distance between physical objects (e.g., finger 2903a of the user) and virtual objects (e.g., user interface object 2907 and virtual keyboard 2915, virtual display and text control object 2908, and virtual input field 2916 as shown in FIG. 29B) in the three-dimensional environment 2902. In FIG. 29A, the legend 2950 depicts the relative distance between the finger 2903a and the user interface object 2907.

In response to detecting input from the user 2909 directed to the virtual input field 2916 in FIG. 29A, the computer system 101 displays the virtual keyboard 2915 and corresponding virtual objects in FIG. 29B. In FIG. 29B, when invoking the virtual keyboard 2915, the computer system 101 moves the user interface object 2907 farther away from the viewpoint of the user 2909 compared to FIG. 29A because the user interface object 2907 is no longer the target of interaction (e.g., instead the virtual keyboard 2915 is the target of interaction) and/or to clear space in the three-dimensional environment 2902 at which to display the virtual keyboard 2915. The corresponding virtual objects (e.g., virtual display and text control object 2908 and virtual input field 2916) are described in more detail with referent to method 3000. The virtual display and text control object 2908 includes selectable option to change font size of text and/or brightness of user interfaces displayed by the display generation component 120. In some embodiments and as described in detail below, as the location of the virtual keyboard 2915 changes, the location of the virtual display and text control object 2908 and virtual input field 2916 change in the same respective direction as the location of the virtual keyboard 2915, but based on a simulated spring relationship with the location of the virtual keyboard 2915.

In some embodiments, as shown in FIG. 29A, the virtual keyboard 2915 includes a plurality of virtual keys that are selectable to input content (e.g., letters, numbers, punctuation marks, and/or images) corresponding to the virtual keys in virtual input field (e.g., text-entry field) 2916 (e.g., a word processing or note taking application with which the virtual keyboard 2915 is associated). For example, selection of one or more virtual keys of the virtual keyboard 2915 causes the computer system 101 to display a character (or image) corresponding to the selected keys at a location of a cursor in the virtual input field 2916. As shown in FIG. 29B, the finger 2903a is not in direct interaction with the virtual keyboard 2915 or any virtual object in the three-dimensional environment 2902; therefore, the computer system 101 does not display any visual indication 2932 (e.g., hand-based). As shown in FIG. 29B, a side view of the relative placements of the virtual keyboard 2915 and the finger 2903a in the three-dimensional environment 2902 are provided in legend 2950.

FIG. 29A1 illustrates similar and/or the same concepts as those shown in FIG. 29A (with many of the same reference numbers). It is understood that unless indicated below, elements shown in FIG. 29A1 that have the same reference numbers as elements shown in FIGS. 29A-29G have one or more or all of the same characteristics. FIG. 29A1 includes computer system 101, which includes (or is the same as) display generation component 120. In some embodiments, computer system 101 and display generation component 120 have one or more of the characteristics of computer system 101 shown in FIGS. 29A-29G and display generation component 120 shown in FIGS. 1 and 3, respectively, and in some embodiments, computer system 101 and display generation component 120 shown in FIGS. 29A-29G have one or more of the characteristics of computer system 101 and display generation component 120 shown in FIG. 29A1.

In FIG. 29A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 29A-29G.

In FIG. 29A1, display generation component 120 is illustrated as displaying content that optionally corresponds to the content that is described as being displayed and/or visible via display generation component 120 with reference to FIGS. 29A-29G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 29A1.

Display generation component 120 has a field of view (e.g., a field of view captured by external image sensors 314b and 314c and/or visible to the user via display generation component 120, indicated by dashed lines in the overhead view) that corresponds to the content shown in FIG. 29A1. Because display generation component 120 is optionally a head-mounted device, the field of view of display generation component 120 is optionally the same as or similar to the field of view of the user.

In FIG. 29A1, the user is depicted as performing an air pinch gesture (e.g., with hand 2903a) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 29A-29G.

In some embodiments, computer system 101 responds to user inputs as described with reference to FIGS. 29A-29G.

In the example of FIG. 29A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 29A-29G and/or described with reference to the corresponding method(s) are optionally implemented on computer system 101 and display generation unit 120 in a manner similar or analogous to that shown in FIG. 29A1.

Figure 29C:
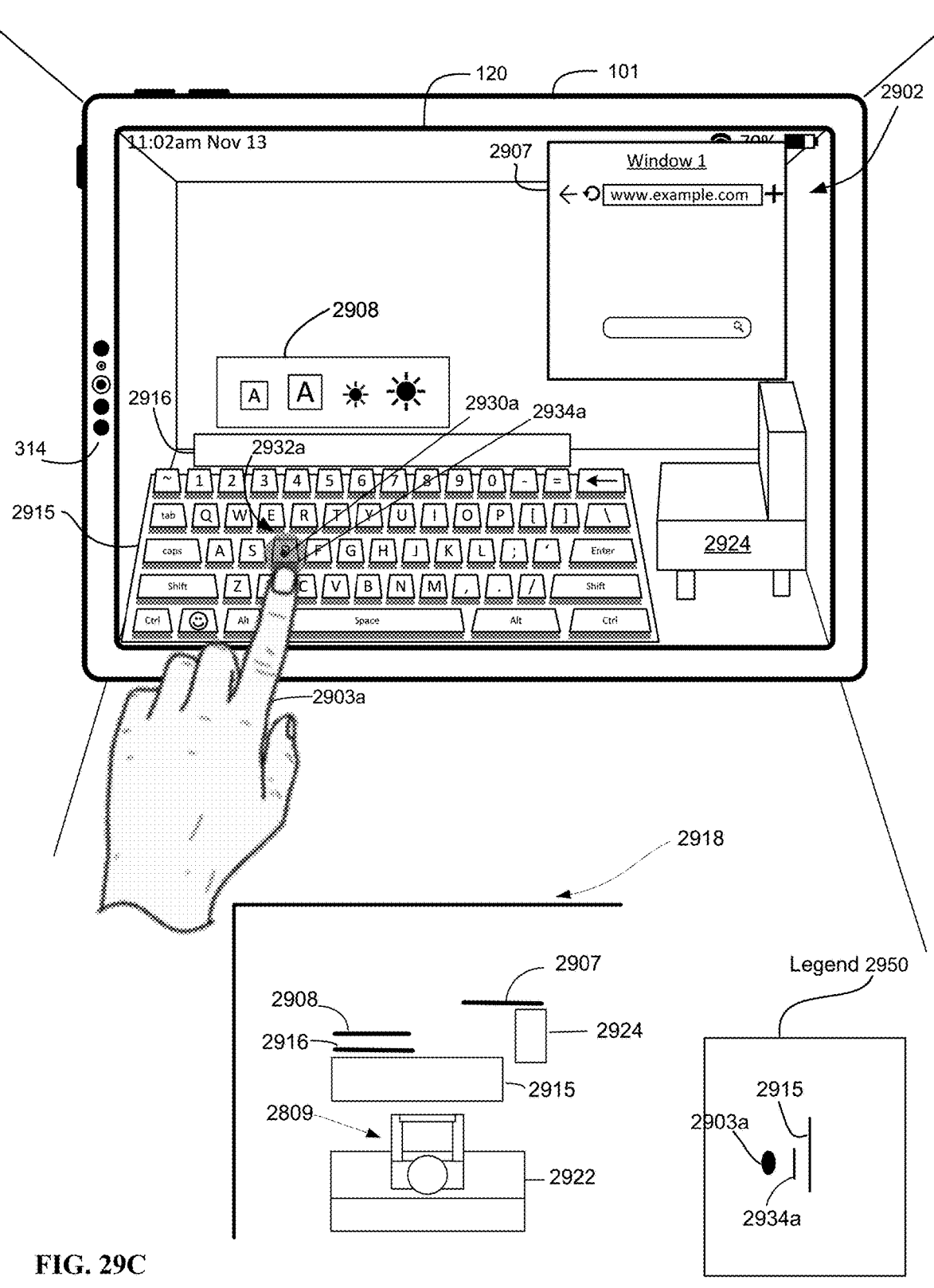

From FIG. 29B to FIG. 29C, the computer system 101 detects movement of the hand of the user 2909 towards the virtual keyboard 2915. As shown in FIG. 29C, attention 2930a of the user 2909 is directed to the virtual key 2934a while the finger 2903a is within the threshold distance (e.g., 0.1, 0.05, 0.1, 0.3, 1, 3, 5, 10, or 20 cm) of the virtual key 2934a. In FIG. 29C, because the computer system 101 is detecting direct interaction between the finger 2903a of the user 2909 and the virtual key 2934a, the computer system 101 displays a visual feedback (hand-based) 2932a on the virtual key 2934a. In some embodiments, the visual feedback (hand-based) 2932a includes a glow effect. As shown in FIG. 29C, a side view of the relative placements of the virtual keyboard 2915 (e.g., including the virtual key 2934a) and the finger 2903a in the three-dimensional environment 2902 are provided in legend 2950. In the legend 2950 in FIG. 29C, the finger 2903a is closer to the virtual keyboard 2915 (e.g., including the virtual key 2934a compared to FIG. 29B.

Figure 29D:
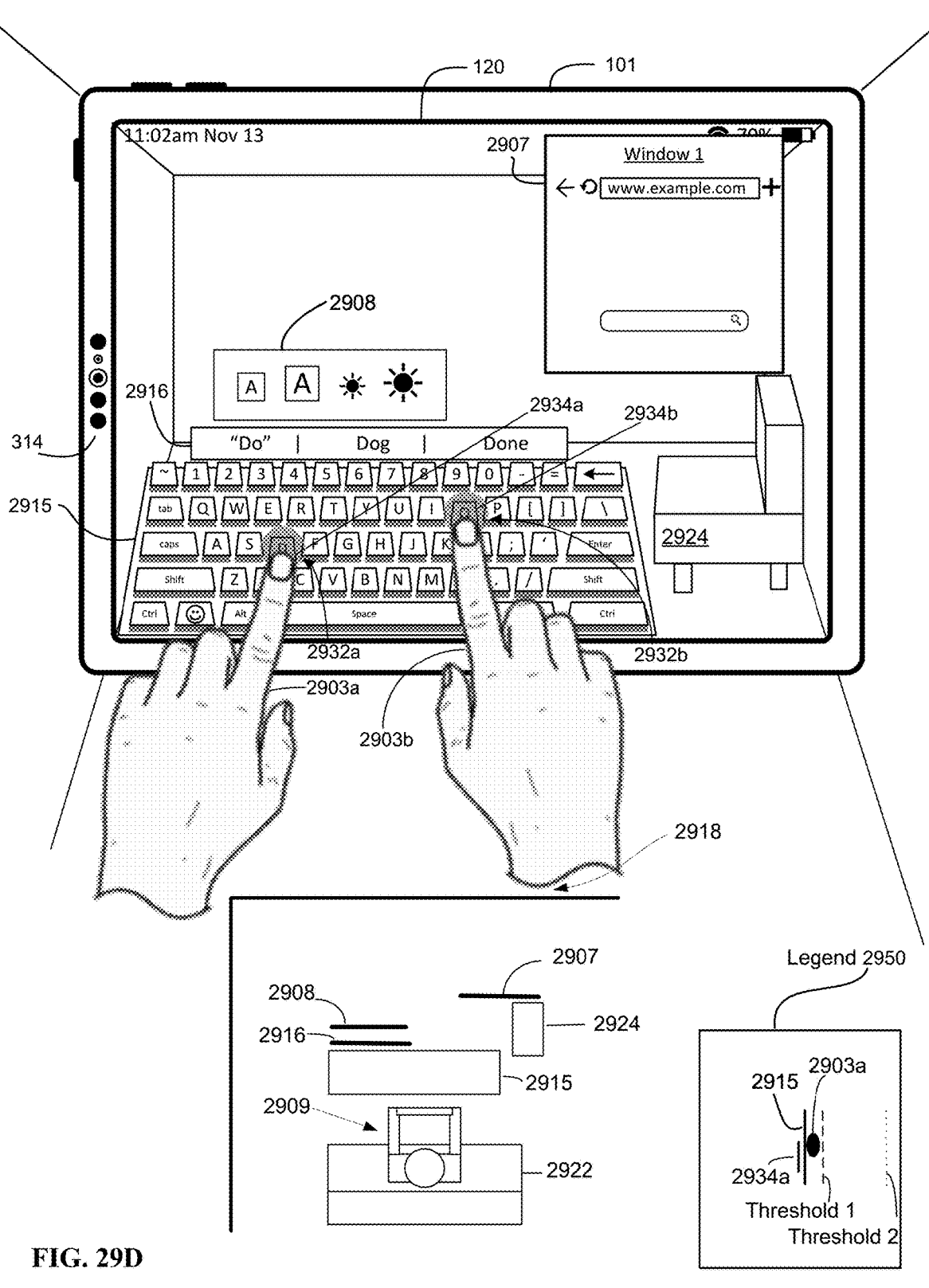

From FIG. 29C to FIG. 29D, the computer system 101 detects direct interaction of the finger 2903a with the virtual key 2934a of the virtual keyboard 2915, and thus maintains the visual feedback (hand-based) 2932a on the virtual key 2934a. In FIG. 29D, when the hand of the user 2909 moves toward virtual key 2934a of the virtual keyboard 2915, the computer system 101 detects the finger 2903a providing a direct touch directed to the virtual key 2934a of the virtual keyboard 2915. In some embodiments, as described with reference to method 3000, when detecting direct touch from the finger 2903a, the computer system 101 outputs audio indicating direct interaction between the finger 2903a and the virtual keyboard 2915. For example, as shown in the legend 2950 of FIG. 29D, the computer system 101 detects the finger 2903a contacting the surface of the virtual keyboard 2915 at a location corresponding to the virtual key 2934a in the three-dimensional environment 2902. In some embodiments, in response to detecting the direct touch directed to the virtual key 2934a, the computer system 101 activates/selects the virtual key 2934a in the virtual keyboard 2915 as shown in FIG. 29E.

For example, as shown in FIG. 29D, the computer system 101 displays placeholder or suggested text in the virtual input field 2916 in accordance with detecting the direct touch directed towards the virtual key 2934a. As shown in FIG. 29D, since virtual key 2934a of the virtual keyboard 2915 is "pushed down", the computer system 101 displays placeholder text (e.g., "Do", "Dog", and "Done") that is selectable by the user for display in the virtual input field 2916. Additionally, in response to detecting the finger 2903a providing direct touch to the virtual key 2934a, the computer system 101 collapses the virtual key 2934a of the virtual keyboard 2915. For example, from FIG. 29C to FIG. 29D, the distance between the virtual key 2934a and the surface of the virtual keyboard 2915 is decreased (as shown in the legend 2950) and/or a size of the virtual key 2934a is decreased to cause the virtual key 2934a to appear to be "pressed down" in the three-dimensional environment 2902. As shown in the legend 2950 in FIG. 29D, when "pressing down" the virtual key 2934a, the finger 2903a has moved past the surface of the virtual keyboard 2915 but is still within Threshold 1. As discussed below and with reference to method 3000, when the finger 2903a of the user 2909 has moved past a surface of a virtual object and exceeded Threshold 1, the computer system 101 optionally moves the virtual object away from the viewpoint of the user 2909 in accordance with the movement of the finger 2903a away from the viewpoint of the user 2909. In FIG. 29D, because movement of finger 2903a has not exceeded a threshold amount of distance (as indicated by Threshold 1), the computer system 101 forgoes moving the virtual keyboard 2915 in the three-dimensional environment 2902. In some embodiments, Threshold 1 is 0.1, 0.5, 1, 2, 3, or 5 cm behind the virtual keyboard 2915 relative to the viewpoint of the user 2909. While the finger 2903a is within Threshold 1, the computer system 101 does not move the virtual keyboard away from the viewpoint of the user 2909 despite the finger 2903a having pushed through the virtual key 2934b.

Additionally or alternatively, in FIG. 29D, attention of the user 2909 is directed to the virtual key 2934b while the finger 2903a is within the threshold distance (e.g., 0.1, 0.05, 0.1, 0.3, 1, 3, 5, 10, or 20 cm) of the virtual key 2934b. In FIG. 29D, because the computer system 101 is detecting direct interaction between the finger 2903a of the user 2909 and the virtual key 2934b, the computer system 101 displays a visual feedback (hand-based) 2932b on the virtual key 2934b. In some embodiments, the visual feedback (hand-based) 2932b includes a glow effect.

Figure 29E:
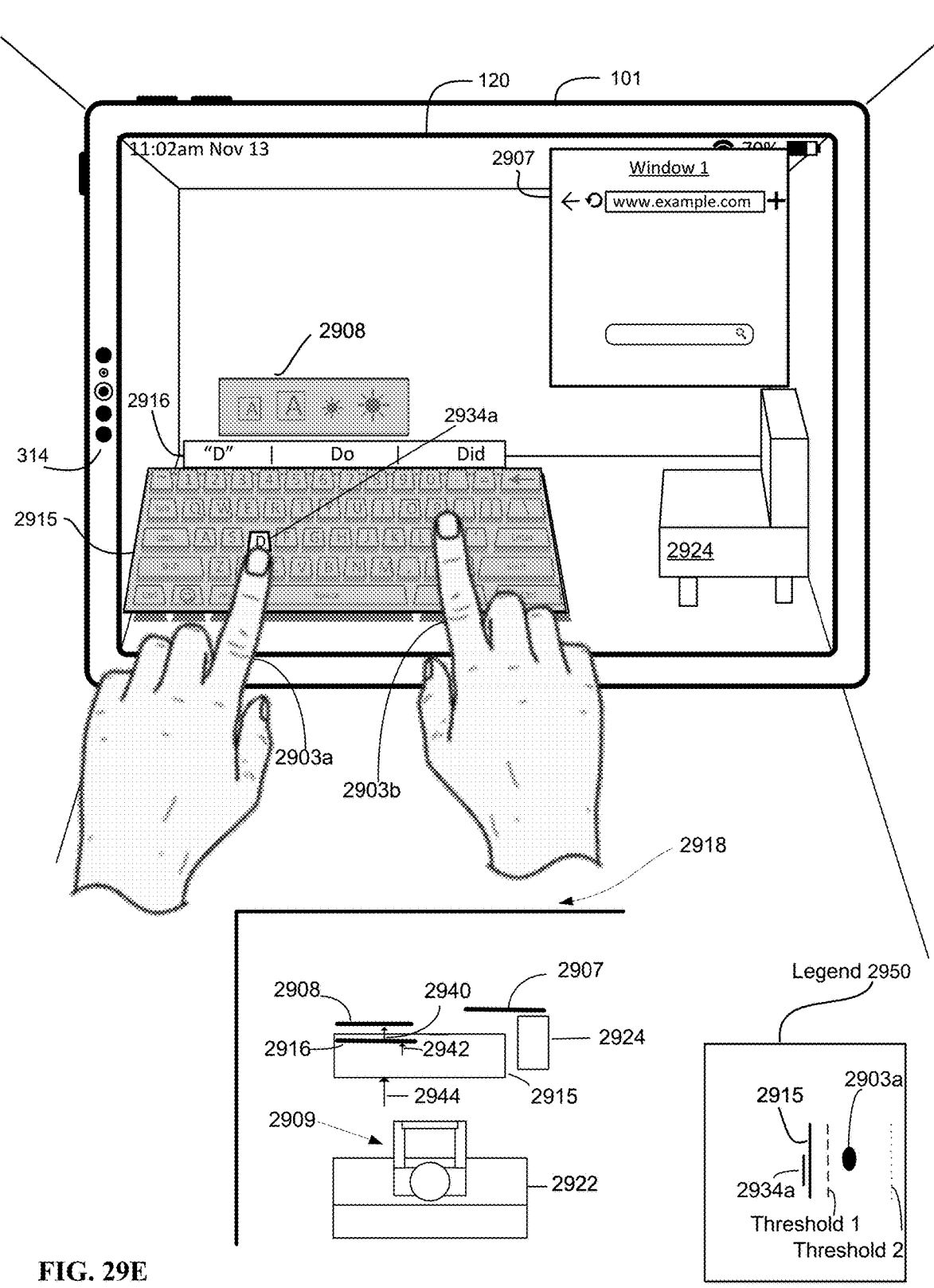

From FIG. 29D to FIG. 29E, the computer system 101 detects that the finger 2903a has pushed past the virtual key 2934a towards the backplane of the virtual keyboard 2915 by exceeding the threshold amount of distance (Threshold 1) but without exceeding a second threshold amount of distance (Threshold 2). In FIG. 29E, the finger 2903a pushing the virtual key 2934a (e.g., by exceeding Threshold 1 but not exceeding Threshold 2) causes the computer system 101 to select the virtual key 2934a. In some embodiments, as described with reference to method 3000, when selecting the virtual key 2934a, the computer system 101 outputs audio indicating that the virtual key 2934a has been selected. In some embodiments, as described with reference to method 3000, when selecting the virtual key 2934a, the computer system 101 displays the virtual key 2934a with a greater amount of brightness in FIG. 29E compared to FIG. 29D. In some embodiments, Threshold 2 is 1, 0.5, 1, 5, 8, 10, 14, 18, 20, or 100 cm behind the virtual keyboard relative to the viewpoint of the user 2909. Because movement of the finger 2903a has exceeded the threshold amount of distance (Threshold 1) without exceeding the second threshold amount of distance (Threshold 2) as shown in the legend 2950 in FIG. 29E, the computer system 101 moves the virtual keyboard 2915 away from the viewpoint of the user 2909. The virtual keyboard 2915 optionally moves away from the viewpoint of the user 2909 as the finger 2903*a* pushes past the virtual key 2934*a* and towards the backplane of the virtual keyboard 2915.

As shown in FIG. 29E, along with moving the virtual keyboard 2915 away from the viewpoint of the user, the computer system 101 moves corresponding virtual objects (e.g., virtual display and text control object 2908 and the virtual input field 2916) away from the viewpoint of the user. In some embodiments, the virtual display and text control object 2908 and the virtual input field 2916 include one or more characteristics of the second virtual object described with reference to method 3000. In some embodiments, movement of the corresponding virtual objects away from the viewpoint of the user 2909 is based on a simulated physical relationship with the movement of the virtual keyboard 2915. In some embodiments, the corresponding virtual objects move less than a distance moved by the virtual keyboard 2915 away from the viewpoint of the user 2909 based on the simulated spring relationship between the virtual keyboard 2915 and the corresponding virtual objects. As shown in the overhead view 2918, the virtual keyboard 2915 moves a greater distance (e.g., as indicated by arrow 2944) away from the viewpoint of the user 2909 compared to the virtual display and text control object 2908 and the virtual input field 2916 moving away from the viewpoint of the user 2909 (e.g., as indicated by arrows 2940 and 2942). In some embodiments, movement of the corresponding virtual objects is proportional to the movement of the virtual keyboard 2915 away from the viewpoint of the user 2909 based on the simulated spring relationship between the virtual keyboard 2915 and the corresponding virtual objects.

As described with reference to method 3000, while moving the virtual keyboard 2915 and corresponding virtual objects (e.g., virtual display and text control object 2908 and the virtual input field 2916) away from the viewpoint of the user 2909, the computer system 101 reduces a visual prominence of the virtual keyboard 2915 and corresponding virtual objects (e.g., virtual display and text control object 2908 and the virtual input field 2916). As shown in FIG. 29E, the virtual keyboard 2915 and corresponding virtual objects (e.g., virtual display and text control object 2908 and the virtual input field 2916) appear less bright and/or smaller compared to FIG. 29D.

Further, in FIG. 29E, while the virtual keyboard 2915, the virtual display and text control object 2908 and the virtual input field 2916 have moved away from the viewpoint of the user 2909, the computer system detects finger 2903*b* directed to the virtual keyboard 2915. As shown in FIG. 29E, the finger 2903*b* is in a direct interaction state with the virtual key "P" of the virtual keyboard 2916 (e.g., direct input from finger 2903*b* directed to the virtual key "P"). Direct interaction optionally includes the finger 2903*b* being within a threshold distance (e.g., 0.1, 0.05, 0.1, 0.3, 1, 3, 5, 10, or 20 cm) of the virtual key "P" of the virtual keyboard. However, in FIG. 29E, the computer system 101 does not accept any inputs from the finger 2903*b* because the virtual keyboard 2915 has moved away from the viewpoint of the user 2909 and has been reduced to a sufficient level of visual prominence, as described in more detail with reference to method 3000. Further, in FIG. 29E, the computer system 101 does not display an attention indicator (e.g., hand-based) corresponding to the direct interaction from the finger 2903*b*, because the virtual keyboard 2915 has moved away from the viewpoint of the user 2909 and has been reduced to a sufficient level of visual prominence.

Figure 29F:
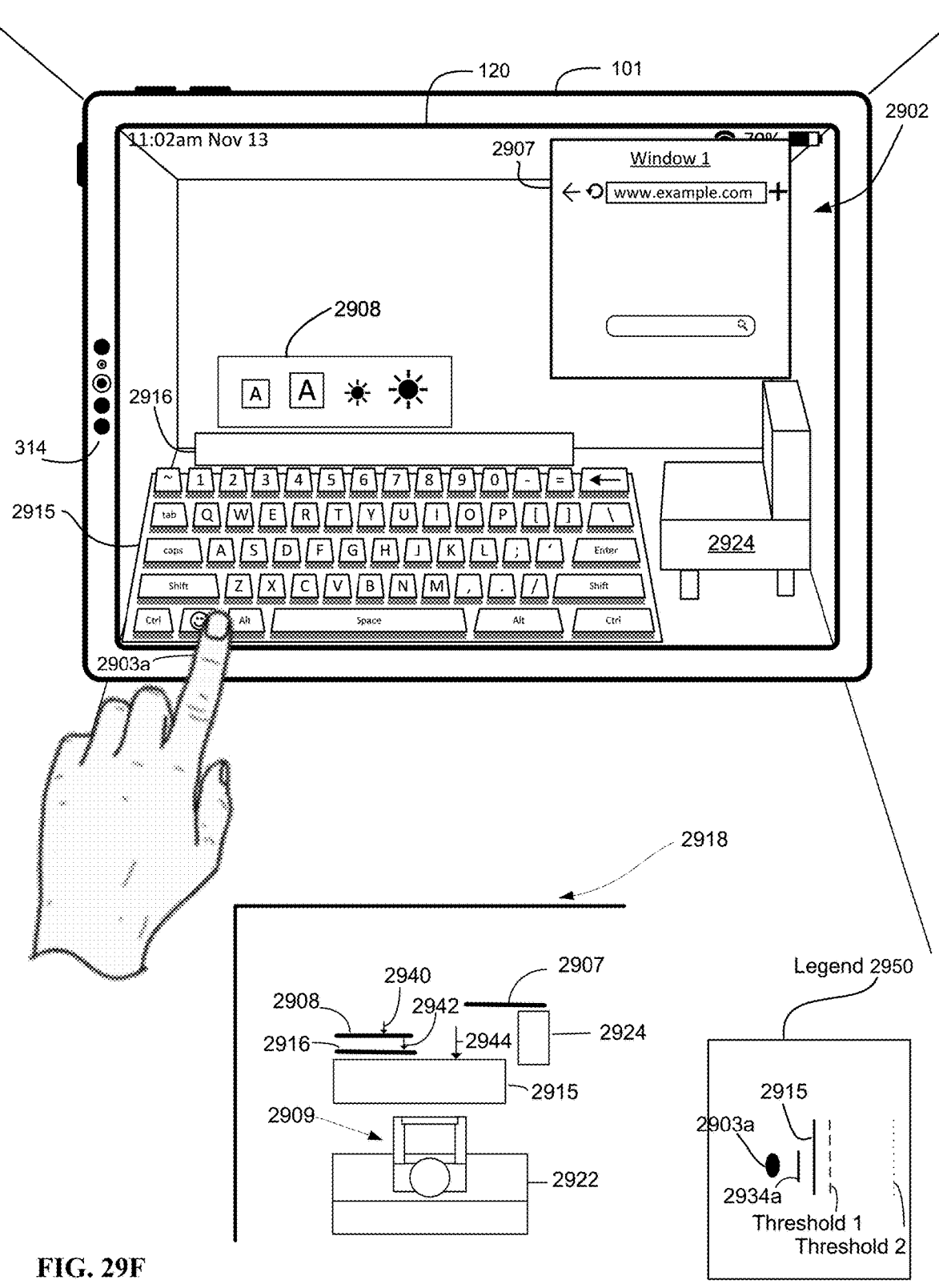

From FIG. 29E to 29F, the hand (e.g., finger 2903*a*) the user 2909 has moved back towards the viewpoint of the user

2909 as shown in the legend 2950 (e.g., within Threshold 1). In FIG. 29F, the finger 2903*a* is no longer in direct interaction with the virtual keyboard 2915. For example, in FIG. 29F, the finger 2903*a* has lifted off the virtual keyboard 2915, such that the pressed down virtual key 2934*a* from FIG. 29E is raised again (e.g., thus closer to the viewpoint of the user). The virtual key 2934*a* from FIG. 29E is raised and closer to the viewpoint of the user because movement of the virtual key follows the movement of the finger 2903*a* (e.g., moving towards the viewpoint of the user 2909). In some embodiments, in accordance with the finger 2903*a* moving towards the viewpoint of the user 2909, the computer system 101 moves the virtual keyboard 2915 and corresponding virtual objects (e.g., virtual display and text control object 2908 and the virtual input field 2916) towards the viewpoint of the user. In some embodiments, movement of the virtual keyboard 2915 and corresponding virtual objects (e.g., virtual display and text control object 2908 and the virtual input field 2916) is proportional to the movement of the finger 2903*a* towards the viewpoint of the user 2909. As shown in FIG. 29F, while and/or in response to moving the virtual keyboard 2915 and corresponding virtual objects (e.g., virtual display and text control object 2908 and the virtual input field 2916) towards the viewpoint of the user 2909, the computer system 101 increases a visual prominence of the virtual keyboard 2915 and corresponding virtual objects (e.g., virtual display and text control object 2908 and the virtual input field 2916). That is, the virtual keyboard 2915 and corresponding virtual objects (e.g., virtual display and text control object 2908 and the virtual input field 2916) appear brighter and/or larger compared to FIG. 29E.

Figure 29G:
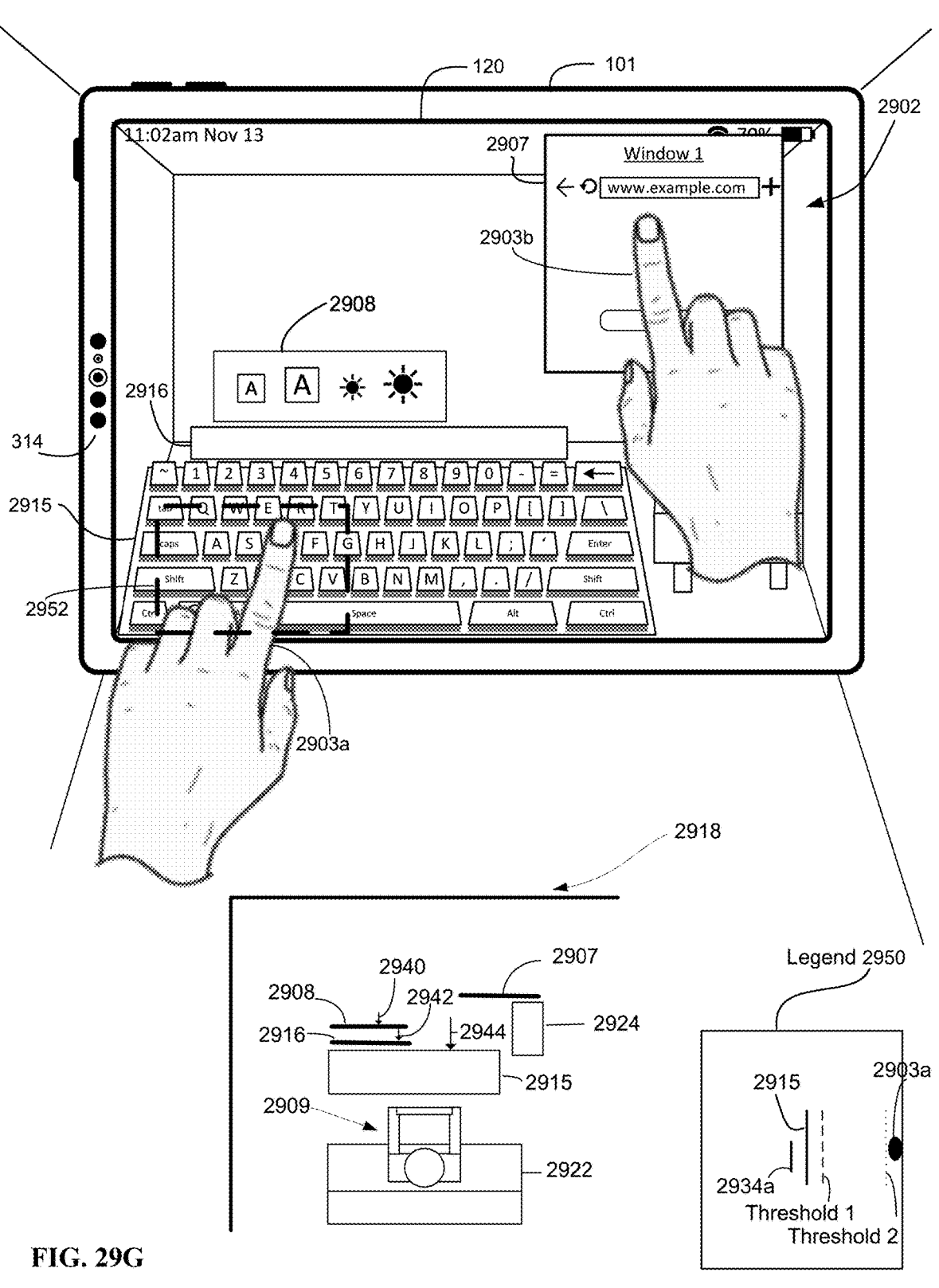
Figure 30F:
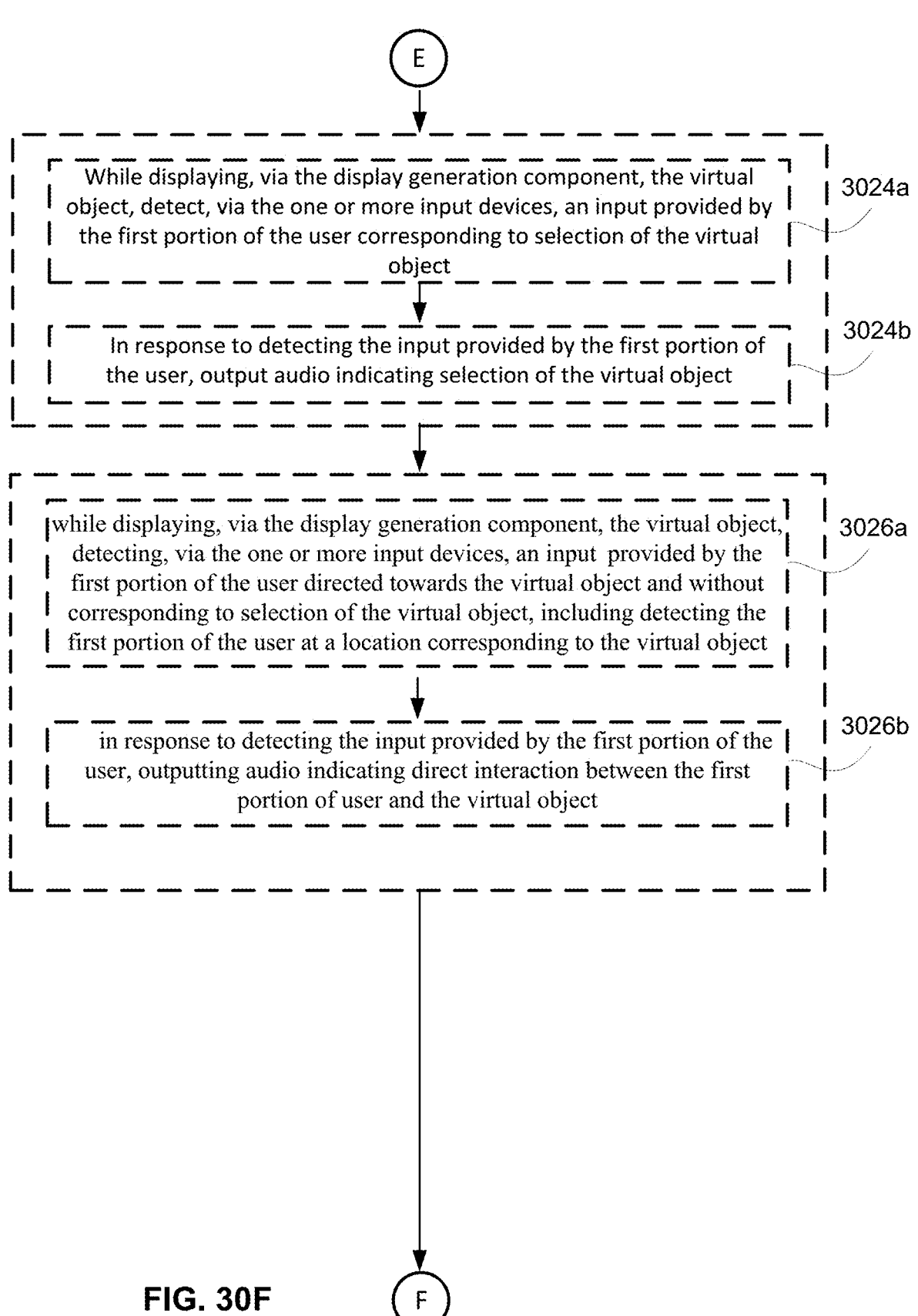
Figure 30G:
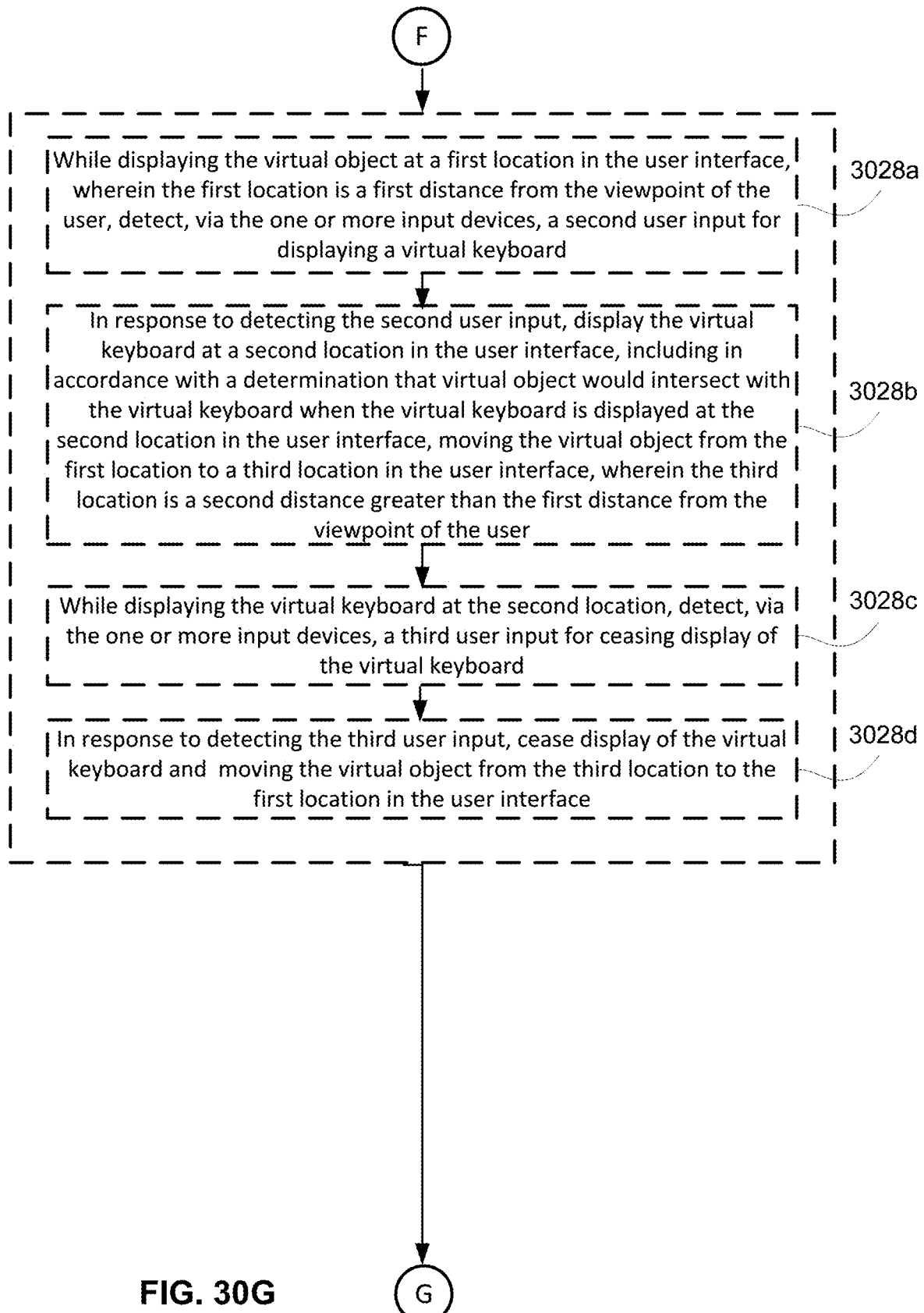
Figure 30H:
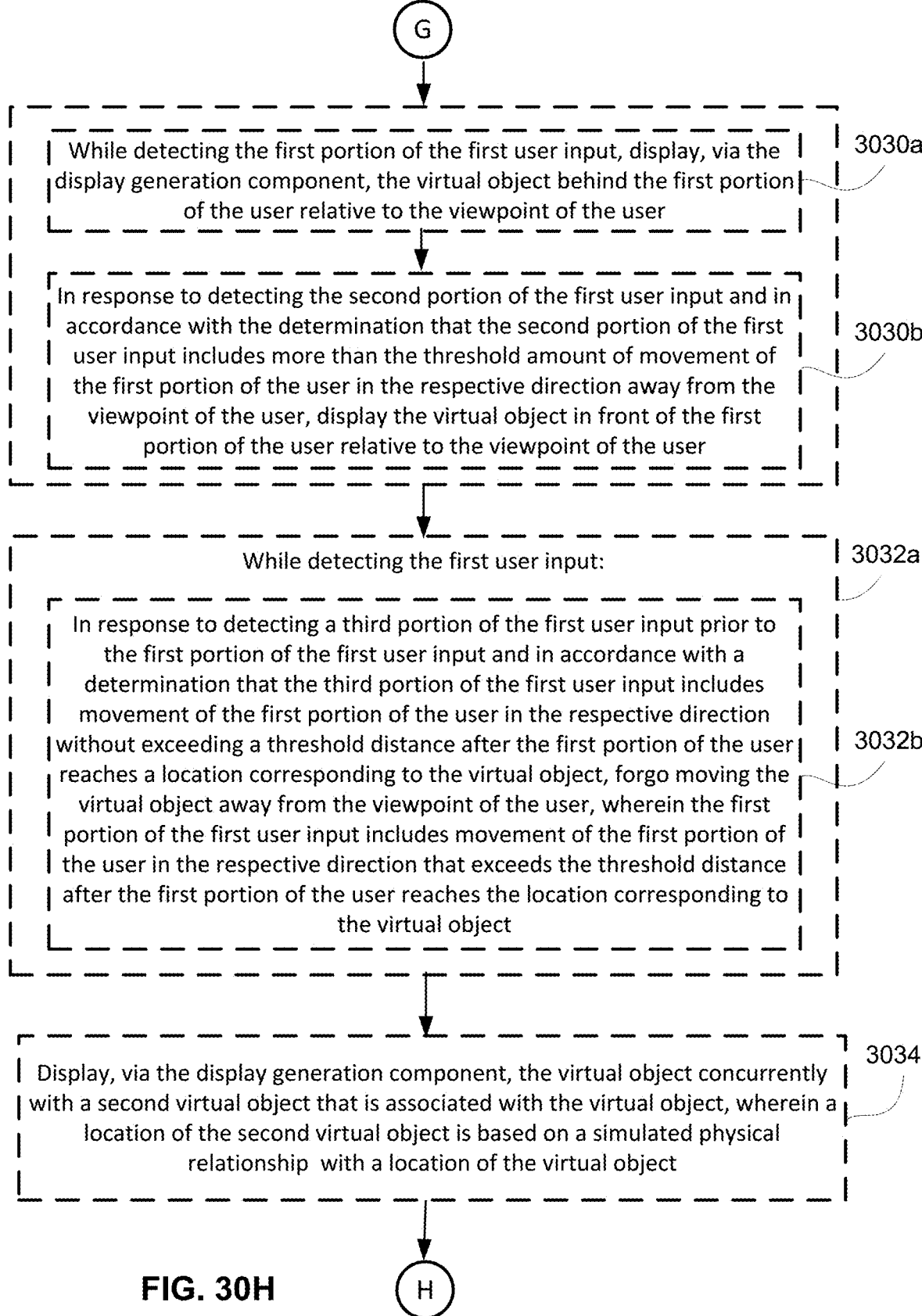

FIG. 29G is an alternative outcome based on movement of the finger 2903*a* after FIG. 29E. From FIG. 29E to FIG. 29G, the finger 2903*a* has pushed past the virtual key 2934*a* of FIG. 29E and continues moving past the backplane of the virtual keyboard 2915 by exceeding Threshold 2. As shown in FIG. 29G, despite the finger 2903*a* continuing to move away from the viewpoint of the user 2909, the computer system 101 moves the virtual keyboard 2915 and corresponding virtual objects (e.g., virtual display and text control object 2908 and the virtual input field 2916) towards the viewpoint of the user 2909 because movement of the finger 2903*a* has exceeded Threshold 2. As shown in FIG. 29G, in some embodiments, while the virtual keyboard 2915 and corresponding virtual objects are moved towards the viewpoint of the user 2909 in response to the finger 2903*a* past the backplane of the virtual keyboard 2915 by exceeding Threshold 2, the computer system displays the virtual keyboard 2915 in front of the hand (e.g., 2903*a*) of the user 2909, such that the virtual keyboard 2915 at least partially obscures visibility of the hand (e.g., 2903*a*) of the user 2909 (as illustrated by the dashed lines in FIG. 29G, corresponding to the portion of hand 2903*a* that is optionally obscured by the virtual keyboard 2915). As shown in FIG. 29G, while and/or in response to moving the virtual keyboard 2915 and corresponding virtual objects (e.g., virtual display and text control object 2908 and the virtual input field 2916) towards the viewpoint of the user 2909, the computer system 101 increases a visual prominence of the virtual keyboard 2915 and corresponding virtual objects (e.g., virtual display and text control object 2908 and the virtual input field 2916). That is, the virtual keyboard 2915 and corresponding virtual objects (e.g., virtual display and text control object 2908 and the virtual input field 2916) appear brighter and/or larger compared to FIG. 29E. In some embodiments, movement of the virtual keyboard 2915 and corresponding virtual objects towards the viewpoint of the user 2909 due to the finger 2903*a* moving past the backplane of the virtual keyboard 2915 by exceeding Threshold 2 as in FIG. 29G. FIG. 29G is different from the movement of the virtual keyboard 2915 and corresponding virtual objects towards the viewpoint of the user 2909 due to the finger 2903*a* also moving towards the viewpoint of the user 2909 as in FIG. 29F. In FIG. 29F, the movement of the virtual keyboard 2915 and corresponding virtual objects towards the viewpoint of the user 2909 is optionally based on movement of the finger 2903*a* towards the viewpoint of the user 2909. Meanwhile, in FIG. 29G, the movement of the virtual keyboard 2915 and corresponding virtual objects towards the viewpoint of the user 2909 is optionally not based on the movement of the finger 2903*a*, whether away from the viewpoint of the user 2909 or towards the viewpoint of the user 2909.

Further, in FIG. 29G, the computer system 101 receives input from finger 2903*b* directed towards the user interface object 2907 ("Window 1"). In some embodiments, direct interaction (e.g., air tapping) outside of the input field or the application user interface associated with the virtual keyboard 2915 causes the computer system 101 to dismiss the virtual keyboard 2915. Accordingly, in FIG. 29G, the input from the finger 2903*b* corresponds to a request to dismiss the virtual keyboard 2915. In response to the input from the finger 2903*b*, the computer system 101 ceases display of the virtual keyboard 2915 moves the user interface object 2907 closer to the viewpoint of the user 2909 (e.g., such as to the position of user interface object 2907 as shown in FIG. 29A).

FIGS. 30A-30I is a flowchart illustrating a method 3000 of facilitating movement of a virtual object relative to a viewpoint of user in accordance with direct touch interactions in a three-dimensional environment in accordance with some embodiments. In some embodiments, the method 3000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 3000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 3000 are, optionally, combined and/or the order of some operations is, optionally, changed.

In some embodiments, method 3000 is performed at a computer system, such as computer system 101 in FIG. 11A, in communication with a display generation component and one or more input devices. In some embodiments, the computer system has one or more of the characteristics of the computer systems of methods 800, 900, 1000, 1200, 1400, 1600, 1800, 2000, 2200, 2400, 2600, 2700, and/or 2800. In some embodiments, the display generation component has one or more of the characteristics of the display generation component of methods 800, 900, 1000, 1200, 1400, 1600, 1800, 2000, 2200, 2400, 2600, 2700, and/or 2800. In some embodiments, the one or more input devices have one or more of the characteristics of the one or more input devices of methods 800, 900, 1000, 1200, 1400, 1600, 1800, 2000, 2200, 2400, 2600, 2700, and/or 2800.

In some embodiments, the computer system displays (3002*a*), via the display generation component, a user interface including a virtual object, such as virtual keyboard 2915 in FIG. 29B (e.g., a user interface or representation of an application, a representation of a content item (e.g., image and/or video), and/or a three-dimensional representation of an object that does not exist in a physical environment of the computer system, the display generation component and/or user). In some embodiments, the virtual object is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800, 900, 1000, 1200, 1400, 1600, 1800, 2000, 2200, 2400, 2600, 2700, and/or 2800. In some embodiments, the virtual object has one or more of the characteristics of the virtual objects of methods 800, 900, 1000, 1200, 1400, 1600, 1800, 2000, 2200, 2400, 2600, 2700, and/or 2800. In some embodiments, the user interface has one or more of the characteristics of the user interfaces of methods 800, 900, 1000, 1200, 1400, 1600, 1800, 2000, 2200, 2400, 2600, 2700, and/or 2800.

In some embodiments, while displaying the user interface, the computer system detects (3002*b*), via the one or more input devices, a first user input directed towards the virtual object and that includes movement of a first portion (e.g., one or more hands, an index finger, a thumb, and/or any number of fingers) of a user of the computer system in a respective direction towards the virtual object relative to a viewpoint of the user, such as movement of finger 2903*a* towards the virtual keyboard 2915 in FIG. 29E or 29G. In some embodiments, the first user input includes direct or indirect input from a first portion (e.g., a finger or hand) of a user, such as described with reference to methods 2600, 2700, and/or 2800, while attention of the user is directed towards the virtual object. In some embodiments, the first user input includes direct or indirect input from a first portion (e.g., a finger or hand) of a user, such as described with reference to methods 2600, 2700, and/or 2800 without attention of the user directed towards the virtual object. In some embodiments, the first user input includes moving the first portion of the user in an upward direction when the virtual object is upward relative to the viewpoint of the user. In some embodiments, the first user input includes moving the first portion of the user in a downward direction when the virtual object is downward relative to the viewpoint of the user. In some embodiments, the first user input includes moving the first portion of the user in a leftward direction when the virtual object is leftward relative the viewpoint of the user. In some embodiments, the first user input includes moving the first portion of the user in a rightward direction when the virtual object is rightward relative to the viewpoint of the user. In some embodiments, the first user input includes moving the first portion of the user in a positive depth direction (e.g., away from the viewpoint of the user) towards the virtual object when the virtual object is in front of the viewpoint of the user. For example, the first user input optionally includes input from an extended index finger of a hand of the user, where the hand with the extended index finger moves towards the virtual object when the virtual object is in front of the viewpoint of the user.

In some embodiments, while detecting the first user input (3002*c*), in response to detecting a first portion of the first user input, the computer system moves (3002*d*) the virtual object away from the viewpoint of the user in accordance with the movement of the first portion of the user, such as moving the virtual keyboard 2915 away from the viewpoint of the user 2909 in FIG. 29E. In some embodiments, the first portion of the first user input includes movement of the first portion of the user in the respective direction towards the virtual object without exceeding a first threshold distance, such as 0.1, 0.5, 1, 5, 8, 10, 14, 18, 20, or 100 cm, once the first portion of the user is in direct interaction with and/or within a second threshold distance of the virtual object such as 0.1, 0.05, 0.1, 0.3, 1, 3, 5, 10, or 20 cm. In some embodiments, the first portion of the first user input includes movement of the first portion of the user towards the virtual object after the first portion of the user (e.g., the extended index finger of the hand of the user) is in direct interaction (e.g., air tapping or air touching) with and/or within the above-described second threshold distance of the virtual object (e.g., a virtual keyboard). In some embodiments, as the first portion of the user is moving towards the virtual object without exceeding the first threshold distance once in direct interaction with the virtual object, the first portion of the user is virtually pushing the virtual object away from the viewpoint of the user. In some embodiments, the virtual object is moved away from the viewpoint of the user as the first portion of the user moves through and/or towards the virtual object without exceeding the first threshold distance. In some embodiments, after the index finger is in direct interaction (e.g., air touching) with a virtual key of a virtual keyboard, the first portion of the first user input includes movement of the index finger towards the virtual key without exceeding the first threshold distance such that the virtual key is pressed down (e.g., the pressed down virtual key is farther away from the viewpoint of the user compared to a raised virtual key). In some embodiments, after the index finger is in direct interaction with the virtual key of a virtual keyboard, the first portion of the first user input includes movement of the index finger past the virtual key and towards the backplane of the virtual keyboard without exceeding the first threshold distance such that the virtual keyboard moves away from the viewpoint of the user as the index finger pushes past the virtual key and towards the backplane of the virtual keyboard. In some embodiments, movement of the virtual object away from the viewpoint of the user is the same or proportional to the movement of the first portion of the user towards the virtual object. For example, if the first portion of the user is moved by a first distance (e.g., 5 cm) towards the virtual object, then the virtual object is moved away from the viewpoint of the user by a second distance (e.g., 5 or 10 cm), optionally the same as or proportional to the first distance. In some embodiments, movement of the virtual object away from the viewpoint of the user is different or not proportional to the movement of the first portion of the user towards the virtual object.

In some embodiments, in response to detecting a second portion of the first user input after the first portion of the first user input and in accordance with a determination that the second portion of the first user input includes more than a threshold amount of movement of the first portion of the user in the respective direction away from the viewpoint of the user, the computer system moves (3002e) the virtual object towards the viewpoint of the user, such as moving the virtual keyboard 2915 towards the viewpoint of the user 2909 in FIG. 29G (e.g., despite the first portion of the user having moved more than the threshold amount of movement (e.g., continued movement) in the respective direction away from the viewpoint of the user). In some embodiments, the second portion of the first user input includes more than the threshold amount of movement of the first portion of the user in the respective direction away from the viewpoint of the user such that the first portion of the user moves through the virtual object and exceeds the first threshold distance and/or the second threshold distance (e.g., index finger of the user pushes through the virtual key and past the backplane of the virtual keyboard). For example, when the movement of the first portion of the user exceeds the first threshold distance after having started moving the virtual object away from the viewpoint of the user, the virtual object optionally moves closer to the viewpoint of the user. In some embodiments, moving the virtual object towards the viewpoint of the user includes moving the virtual object to its initial location prior to detecting the first portion of the first user input. Automatically moving the virtual object towards the viewpoint of the user despite continued movement of the first portion of the user in the respective direction provides visual feedback that the virtual object is no longer the target of interaction with the first portion of the user, thereby reducing errors in interaction between the user and the computer system, and avoiding unnecessary inputs provided to the computer system.

In some embodiments, in response to detecting the second portion (e.g., different than the first portion) of the first user input after the first portion of the first user input and in accordance with a determination that the second portion of the first user input includes less than the threshold amount of movement (e.g., as described with respect to step(s) 3002) of the first portion of the user in the respective direction away from the viewpoint of the user, such as finger 2903a having moved away from the viewpoint of the user 2909 less than Threshold 2 in FIG. 29E, the computer system moves (3004) the virtual object away from the viewpoint of the user in accordance with the second portion of the first user input, such as moving the virtual keyboard 2915 away from the viewpoint of the user 2909 in FIG. 29E. In some embodiments, the second portion of the first user input is a continuation of the first portion of the first user input in the same respective direction. In some embodiments, the second portion of the first user input includes continued movement of the first portion of the user away from the viewpoint of the user without exceeding the first threshold distance (e.g., 0.1, 0.5, 1, 5, 8, 10, 14, 18, 20, or 100 cm) once the first portion of the user is in direct interaction with and/or within the second threshold distance of the virtual object such as 0.1, 0.05, 0.1, 0.3, 1, 3, 5, 10, or 20 cm. In some embodiments, the virtual object is moved away from the viewpoint of the user as the first portion of the user moves towards the virtual object without exceeding the first threshold distance based on the second portion of the first user input. For example, after the index finger is in direct interaction (e.g., air tapping) with a virtual key of a virtual keyboard, the second portion of the first user input includes continued movement of the index finger towards the virtual key without exceeding the first threshold distance such that the virtual key is pressed down (e.g., the pressed down virtual key is farther away from the viewpoint of the user compared to a raised virtual key). In some embodiments, after the index finger is in direct interaction with the virtual key of a virtual keyboard, the second portion of the first user input includes movement of the index finger past the virtual key and towards the backplane of the virtual keyboard without exceeding the first threshold distance such that the virtual keyboard moves away from the viewpoint of the user as the index finger pushes past the virtual key and towards the backplane of the virtual keyboard. Automatically moving the virtual object away the viewpoint of the user based on continued movement of the first portion of the in the respective direction away from the viewpoint of the user provides visual feedback that the virtual object is still the target of interaction with the first portion of the user, thereby improving user-device interactions.

In some embodiments, in response to detecting the second portion (e.g., different than the first portion) of the first user input after the first portion of the first user input and in accordance with a determination that the second portion of the first user input includes movement of the first portion of the user in a second respective direction (e.g., different than the first respective direction or opposite of the first respective direction) towards the viewpoint of the user relative to the virtual object, such as the finger 2903a having moved towards the viewpoint of the user 2909 in FIG. 29F, computer system moves (3006) the virtual object towards the viewpoint of the user in accordance with the second portion of the first user input, such as moving the virtual keyboard 2915 towards the viewpoint of the user 2909 in FIG. 29F. In some embodiments, unlike the first portion of the first user input, the second portion of the first user input includes movement of the first portion of the user in the second respective direction away from the virtual object. In some embodiments, after the first portion of the first user input (e.g., the virtual key is pressed down and farther away from the viewpoint of the user because the index finger had air tapped the virtual key and/or pushed past the virtual key towards the backplane of the virtual keyboard without exceeding the first threshold distance), the second portion of the first user input includes the index finger moving away from the pressed down virtual key (e.g., index finger lifting off the virtual key), such that the pressed down virtual key is raised again (e.g., thus closer to the viewpoint of the user). The virtual key is raised and closer to the viewpoint of the user because movement of the virtual key follows the movement of the first portion of the user (e.g., moving towards the viewpoint of the user). Movement of the virtual object towards the viewpoint of the user (e.g., raised virtual key) based on movement of the first portion of the user moving towards the viewpoint (e.g., index finger lifting off the virtual key) is optionally different from the movement of the virtual object towards the viewpoint of the user (e.g., raised virtual key) due to the more than the threshold amount of movement of the first portion of the user away from the viewpoint of the user (e.g., index finger pushing past the virtual key and the backplane of the virtual keyboard) as described with respect to step(s) 3002. Automatically moving the virtual object towards the viewpoint of the user based on subsequent movement of the first portion of the user in a direction towards the viewpoint of the user provides visual feedback that the virtual object is the target of interaction with the first portion of the user, thereby improving user-device interactions.

In some embodiments, in response to detecting the second portion (e.g., different than the first portion) of the first user input after the first portion of the first user input and in accordance with the determination that the second portion of the first user input includes more than the threshold amount of movement (e.g., as described with respect to step(s) 3002) of the first portion of the user in the respective direction away from the viewpoint of the user, such as finger 2903a having moved away from the viewpoint of the user 2909 by exceeding Threshold 2 in FIG. 29G, the computer system moves (3008) the virtual object towards the viewpoint of the user independent of the movement of the first portion of the user, such as moving the virtual keyboard 2915 towards the viewpoint of the user 2909 in FIG. 29G (e.g., in the respective direction away from the viewpoint of the user in the second portion of the first user input). In some embodiments, despite the first portion of the user having moved more than the threshold amount of movement in the respective direction away from the viewpoint of the user based on the second portion of the first user input, the virtual object is moved towards the viewpoint of the user. In some embodiments, characteristics of movement of the virtual object, such as speed, acceleration, and/or direction, do not correspond to the characteristics of the movement of the first portion of the user (e.g., virtual object is springing back towards the viewpoint of the user without regard to the motion of the first portion of the user associated with the second portion of the first user input). Automatically moving the virtual object towards the viewpoint of the user independent of the movement of the first portion of the user in the respective direction away from the viewpoint of the user provides visual feedback that the virtual object is no longer the target of interaction with the first portion of the user, thereby reducing errors in interaction between the user and the computer system, and avoiding unnecessary inputs provided to the computer system.

In some embodiments, in response to detecting the first portion of the first user input, the computer system reduces (3010) a visual prominence (e.g., less bright, more transparent, blurrier, a different color, and/or smaller) of the virtual object relative to the user interface, such as reducing brightness and size of the virtual keyboard in FIG. 29E (e.g., and after or concurrently moving the virtual object away from the viewpoint of the user). Reducing the visual prominence of the virtual object based on movement of the first portion of the user in the respective direction away from the viewpoint of the user provides visual feedback that the virtual object is no longer the target of interaction with the first portion of the user, thereby reducing errors in interaction between the user and the computer system, and avoiding unnecessary inputs provided to the computer system.

In some embodiments, reducing the visual prominence of the virtual object includes gradually reducing the visual prominence of the virtual object based on the movement of the first portion of the user in the first portion of the first user input, such as gradually reducing visual prominence of the virtual keyboard in FIG. 29E (3012). In some embodiments, the gradual process for reducing the visual prominence of the virtual object depends on the distance of the first portion of the user relative to the viewpoint of the user in the first portion of the first user input. For example, when the visual prominence of the virtual object optionally is gradually reduced as the first portion of the user moves away from the viewpoint of the user relative to the virtual object without exceeding the first threshold distance as described with respect to step(s) 3002. In some embodiments, as the first portion of the user pushes (e.g., through or past) the virtual object by a greater amount, the visual prominence of the virtual object is reduced more. In some embodiments, as the first portion of the user pushes (e.g., through or past) the virtual object by a lower amount, the visual prominence of the virtual object is reduced less. Gradually reducing the visual prominence of the virtual object based on movement of the first portion of the user in the first user input provides visual feedback that the virtual object is no longer the target of interaction with the first portion of the user, thereby reducing errors in interaction between the user and the computer system, and avoiding unnecessary inputs provided to the computer system.

In some embodiments, while displaying the virtual object, the computer system detects (3014a), via the one or more input device, a first portion of a second user input (e.g., different than the first portion of the first user input and/or or includes one or more characteristics of the first portion of the first user input as described with respect to step(s) 3002) directed to the virtual object, such as detecting finger 2903*a* and finger 2903*b* in FIG. 29E. In some embodiments, the computer system detects the second user input from the same hand as the first user input. In some embodiments, the computer system detects the second user input from a different hand compared to the first user input.

In some embodiments, in response to detecting the first portion of the second user input directed to the virtual object in accordance with a determination that the user input directed to the virtual object is detected while the virtual object is displayed with a first reduced level of visual prominence, the computer system performs (3014*b*) an operation corresponding to the second user input directed to the virtual object, such as selecting virtual key 2934*a* in FIG. 29E (e.g., because the virtual object has not been reduced to a sufficient level of visual prominence when the first portion moves away from the viewpoint of the user relative to the virtual object). In some embodiments, the operations are performed because the first portion of the user has moved in the respective direction away from the viewpoint of the user without exceeding the threshold distance described below with respect to step(s) 3030 after the first portion of the user reaches a location corresponding to the virtual object (e.g., and without exceeding the first threshold distance as described with respect to step(s) 3002). In some embodiments, operations directed to the virtual object include displaying (e.g., additional) content in the user interface that is associated with the virtual object, such as an image, video, and/or text, outputting audio, such as audio corresponding to music, podcast, and/or video, and/or displaying another user interface in the three-dimensional environment, such as displaying another application window. In some embodiments, the virtual object is a virtual key and/or virtual keyboard, and the operations associated with the virtual key and/or virtual keyboard include entering text that corresponds to the virtual key in an input field of the user interface in which the virtual keyboard is displayed.

In some embodiments, in response to detecting the first portion of the second user input directed to the virtual object in accordance with a determination that the user input directed to the virtual object is detected while the virtual object is displayed with a second reduced level of visual prominence (e.g., such that the virtual object is less bright, more transparent, blurrier, a different color, and/or smaller compared to the first reduced level of visual prominence), the computer system forgoes (3014*c*) performing the operation corresponding to the second user input directed to the virtual object, such as forgoing an operation corresponding to an input from finger 2903*b* in FIG. 29E (e.g., because the virtual object has been reduced to a sufficient level of visual prominence when the first portion moves away from the viewpoint of the user relative to the virtual object). In some embodiments, the operations are not performed because the first portion of the user has moved in the respective direction away from the viewpoint of the user by exceeding the threshold distance described below with respect to step(s) 3030 after the first portion of the user reaches a location corresponding to the virtual object (e.g., but without exceeding the first threshold distance as described with respect to step(s) 3002). Forging performing operations corresponding to inputs directed to the virtual object when the virtual object has been sufficiently reduced in visual prominence saves processing power when such inputs that cannot be processed (e.g., because the virtual object is no longer the target of interaction with the first portion of the user) are provided to the computer system.

In some embodiments, while displaying the virtual object with a first reduced level of visual prominence (e.g., and moving the virtual object away from the viewpoint of the user) in response to detecting the first portion of the first user input, the computer system detects (3016*a*), via the one or more input devices, the second portion of the first user input (e.g., as described with respect to step(s) 3002) after the first portion of the first user input, such as input corresponding to finger 2903*a* in FIG. 29F.

In some embodiments, in response to detecting the second portion of the first user input (3016*b*), in accordance with a determination that the second portion of the first user input includes movement of the first portion of the user in a direction towards the viewpoint of the user relative to the virtual object, such as movement of the finger 2903*a* towards the viewpoint of the user 2909 in FIG. 29E (e.g., in response or concurrently moving the virtual object towards the viewpoint of the user), the computer system increases (3016*c*) the visual prominence of the virtual object, such as increasing brightness and size of virtual keyboard 2915 in FIG. 29F (e.g., such that the virtual object is brighter, less transparent, less blurry, a different color, and/or larger compared to the first reduced level of visual prominence and/or the second reduced level of visual prominence).

In some embodiments, in response to detecting the second portion of the first user input (3016*b*), in accordance with the determination that the second portion of the first user input includes more than the threshold amount of movement of the first portion of the user in the respective direction away from the viewpoint of the user, such as movement of the finger 2903*a* away from the viewpoint of the user 2909 in FIG. 29G (e.g., as described with respect to step(s) 3002), the computer system increases (3016*d*) the visual prominence of the virtual object, such as increasing brightness and size of virtual keyboard 2915 in FIG. 29G. In some embodiments, increasing the visual prominence of the virtual object is a gradual process. In some embodiments, the gradual process for increasing the visual prominence of the virtual object depends on the distance of the first portion of the user relative to the viewpoint of the user in the second portion of the second user input. In some embodiments, the visual prominence of the virtual object is gradually increased when the virtual object springs back towards the viewpoint of the user based on the more than the threshold amount of movement of the first portion of the user away from the viewpoint of the user, as described with respect to step(s) 3002. In some embodiments, the visual prominence of the virtual object is gradually increased as the first portion of the user moves towards the viewpoint of the user relative to the virtual object as described with respect to step 3006. Increasing the visual prominence of the virtual object based on movement of the first portion of the user moving back towards the viewpoint of the user provides visual feedback that the virtual object is still the target of interaction with the first portion of the user, thereby improving user-device interactions.

In some embodiments, before detecting the first portion of the first user input, the computer system displays (3018), via the display generation component, visual feedback, such as visual feedback (hand-based) 2932*a* in FIG. 29D, at a respective portion of the virtual object that indicates a location of interaction between the first portion of the user and the virtual object. In some embodiments, the visual feedback includes one or more characteristics of the visual indication as described with respect to methods 1200, 2600, 2700 and/or 2800. In some embodiments, the visual feedback is more prominent (e.g., brighter, less transparent, bigger, less blurry, and/or a different color) when the first portion of the user is closer to the virtual object. In some embodiments, the visual feedback is less prominent (e.g., less bright, more transparent, smaller, more blurry, and/or a different color) when the first portion of the user is farther from the virtual object. In some embodiments, a change in prominence of the visual feedback is proportional to a change in location of the first portion of the user relative to the virtual object. Displaying visual feedback with a virtual object in response to detecting movement of a portion of a user relative to the virtual object improves accuracy when interacting with the virtual object and/or provides a visual indicator for a progress toward selecting the virtual object, thereby improving user-device interaction.

In some embodiments, the threshold amount of movement corresponds to a first threshold location, such as Threshold 1 and/or Threshold 2 in legend 2950 in FIG. 29E, that is behind the virtual object relative to the viewpoint of the user before the first user input is detected (3020*a*) (e.g., the first threshold location corresponds to the first portion of the user having moved in the respective direction away from the viewpoint of the user by exceeding the first threshold distance (e.g., past the original location of the virtual object) as described with respect to step(s) 3002 and such that the virtual object has moved towards the viewpoint of the user and is in front of the first portion of the user that is at the first threshold location).

In some embodiments, while detecting the first user input (3020*b*) in accordance with a determination that the first user input includes movement of the first portion of the user in the respective direction such that the first portion of the user moves past a second threshold location that is behind the virtual object (e.g., the second threshold location is closer to the virtual object and/or the viewpoint of the user than the first threshold location) relative to the viewpoint of the user before the first user input is detected, such as finger 2903*a* moving past Threshold 1 in FIG. 29E, the computer system moves (3020*c*) the virtual object away from the viewpoint of the user and reducing a visual prominence of the virtual object, such as moving virtual keyboard 2915 and reducing brightness and size of the virtual keyboard 2915 in FIG. 29E (e.g., such that the virtual object is less bright, more transparent, smaller, more blurry, and/or a different color as described with respect to step 3010 to step(s) 3014). The second threshold location corresponds to the first portion of the user having moved in the respective direction away from the viewpoint of the user without exceeding the first threshold distance (e.g., past the original location of the virtual object) as described with respect to step(s) 3002 and such that the virtual object is behind the first portion of the user at the second threshold location. The respective threshold locations behind the virtual object serve as triggers for the computer system to begin reducing a visual prominence of the virtual object and/or moving the virtual object back towards the viewpoint of the user once the first portion of the user has reached the respective threshold locations behind the virtual object; moreover, the respective threshold locations being behind the virtual object provides leeway to prevent the virtual object from moving and/or being reduced in visual prominence frequently (e.g., such as when the first portion of the user moves past the virtual object slightly).

In some embodiments, before detecting the first portion of the first user input, the computer system displays (3022*a*) visual feedback of interaction between the first portion of the user and the virtual object (e.g., as described with respect to step 3018) with a first amount of brightness that is based on a distance between the first portion of the user and the location corresponding to the virtual object, such as the visual feedback (hand-based) 2932*a* is optionally based on a distance between the finger 2903*a* and the key 2934*a* in FIG. 29C.

In some embodiments, while displaying, via the display generation component, the virtual object with the first amount of brightness, the computer system detects (3022*b*), via the one or more input devices, an input provided by the first portion of the user corresponding to selection of the virtual object, such as input from finger 2903*a* corresponding to selection of the virtual key 2934*a* in FIG. 29E. For example, the computer system detects a direct touch input (e.g., air tap) directed to the virtual object in the user interface. In some embodiments, the input corresponding to the selection of the virtual object includes one or more characteristics of the input corresponding to the selection of the first object as described with respect to method 2600 and/or the direct input from the first portion of the user as described with respect to method 2800.

In some embodiments, in response to detecting the input provided by the first portion of the user, the computer system displays (3022*c*), via the display generation component, the visual feedback at a respective portion of the virtual object with a second amount of brightness, greater than the first amount of brightness, by at least a respective amount that does not vary based on a distance between the first portion of the user and the first object, such as displaying the virtual key 2934*a* with increased brightness in FIG. 29E. For example, the second amount of brightness is optionally not based on the distance between the first portion of the user and the location corresponding to the virtual object (e.g., the second amount of brightness indicates the virtual object has been selected/activated in the user interface), and the second amount of brightness is optionally greater than any amount of brightness that is based on the distance between the first portion of the user and location corresponding to the virtual object. For example, the computer system displays the visual feedback (e.g., based on the input corresponding to the selection of the virtual object and not based on the distance between the first portion of the user and the location corresponding to the virtual object) with a brightness level that is greater than any other level of brightness that the visual feedback is displayed at in the three-dimensional environment. As similarly described above with reference to step 3018, the computer system optionally gradually increases the brightness of the visual feedback as the index finger of the user moves closer to the virtual object in the user interface. Accordingly, in some embodiments, the computer system displays the virtual object with the visual feedback having the second amount of brightness in addition to displaying the virtual object with the visual feedback having a brightness that is based on the distance between the first portion of the user and the location corresponding to the virtual object (e.g., the two amounts of brightness are additive). In some embodiments, the computer system ceases increasing the brightness of the visual feedback before the first portion of the user provides the input selecting the virtual object. For example, the computer system ceases increasing the brightness when the index finger approaches the virtual object (e.g., index finger is 0.05, 0.1, 0.25, 0.4, 0.5, 0.75, 1, 2, 5, or 10 cm from the virtual object), and when the computer system detects the input, the computer system significantly increases the brightness of the visual indication in the manner discussed above. In some embodiments, the computer system ceases increasing the brightness of the visual feedback to the second amount of brightness before the first portion of the user provides the input selecting the virtual object. In some embodiments, the computer system maintains display of the visual feedback with the second amount of brightness as long as the first portion of the user remains in direct interaction (e.g., air touch or air tap) with the virtual object. In some embodiments, the computer system reduces brightness of the visual feedback to the first amount of brightness in response to the first portion of the user no longer being in direct interaction with the virtual object. In some embodiments, the second amount of brightness includes one or more characteristics of the second amount of brightness described with respect to method 2600. In some embodiments, operations performed in response to selection of the virtual object includes one or more characteristics of the operation associated with the first object as described with respect to method 2600. Significantly changing a brightness of a visual feedback that is displayed with a virtual object in response to detecting a selection of the virtual object provides visual feedback that the virtual object has been selected, thereby improving user-device interaction.

In some embodiments, while displaying, via the display generation component, the virtual object, the computer system detects (3024a), via the one or more input devices, an input provided by the first portion of the user corresponding to selection of the virtual object, such as input from finger 2903a corresponding to selection of the virtual key 2934a in FIG. 29E. For example, the computer system detects a direct touch input (e.g., air tap) directed to the virtual object in the user interface. In some embodiments, the input corresponding to the selection of the virtual object includes one or more characteristics of the input corresponding to the selection of the first object as described with respect to method 2600 and/or the direct input from the first portion of the user as described with respect to method 2800.

In some embodiments, in response to detecting the input provided by the first portion of the user, the computer system outputs (3024b) audio indicating selection of the virtual object, such as optionally outputting audio indicating selection of the virtual key 2934a in FIG. 29E. For example, the computer system outputs, via a speaker device in communication with the computer system, audio that confirms selection of the virtual object in the user interface. In some embodiments, outputting the audio indicating the selection of the virtual object includes outputting a ring, a chime, a voice message (e.g., by a virtual assistant associated with an operating system of the computer system), and/or other tune that indicates that the input provided by the first portion of the user has been detected and the virtual object has been selected/activated. In some embodiments, the computer system does not output the sound effect before the first portion of the user provides the input selecting the virtual object. In some embodiments, the computer system maintains outputting the sound effect as long as the first portion of the user remains in direct interaction (e.g., air touch or air tap) with the virtual object. In some embodiments, the computer system ceases outputting the sound effect in response to the first portion of the user no longer in direct interaction with the virtual object. Outputting audio in response to detecting a selection of a virtual object of a user interface provides auditory feedback that the virtual object has been selected, thereby improving user-device interaction.

In some embodiments, while displaying, via the display generation component, the virtual object, the computer system detects (3026a), via the one or more input devices, an input (e.g., different from the input of) provided by the first portion of the user directed towards the virtual object, such as input from finger 2903a directed to the virtual key 2934a in FIG. 29D, and without corresponding to selection of the virtual object (e.g., without including movement towards the virtual object sufficient to select the virtual object, such as in step(s) 3024), including detecting the first portion of the user at a location corresponding to the virtual object (e.g., at or within a threshold distance, such as 0.1, 0.3, 0.5, 1, 3, 5 or 10 cm of the location corresponding to the virtual object). For example, the computer system detects a direct touch input (e.g., air tap) directed to the virtual object in the user interface.

In some embodiments, in response to detecting the input provided by the first portion of the user, the computer system outputs (3026b) audio indicating direct interaction between the first portion of user and the virtual object, such as optionally outputting audio indicating direct interaction between the finger 2903a and the virtual key 2934a in FIG. 29D. For example, the computer system outputs, via a speaker device in communication with the computer system, audio that confirms first portion of the user in direct interaction (e.g., air tap) with the virtual object (e.g., without selecting the virtual object). In some embodiments, outputting the audio includes outputting a ring, a chime, a voice message (e.g., by a virtual assistant associated with an operating system of the computer system), and/or other tune that indicates that the input provided by the first portion of the user has been detected. In some embodiments, the computer system does not output the sound effect before the first portion of the user provides the input. In some embodiments, the computer system maintains outputting the sound effect as long as the first portion of the user remains in direct interaction (e.g., air touch or air tap) with the virtual object. In some embodiments, the computer system ceases outputting the sound effect in response to the first portion of the user no longer in direct interaction with the virtual object. In some embodiments, the computer system outputs a different sound effect when detecting the input compared to detecting the input of step(s) 3024 (e.g., corresponding to selection of the virtual object). In some embodiments, in response to detecting further movement of the first portion of the user towards the virtual object while or after outputting the audio indicating direct interaction between the first portion of the user and the virtual object, the computer system detects selection of the virtual object and outputs the same or different audio indicating selection of the virtual object. Outputting audio in response to detecting direct interaction with the virtual object of a user interface provides auditory feedback that the first portion of the user is in direct interaction with the virtual object, thereby improving user-device interaction.

In some embodiments, while displaying the virtual object at a first location in the user interface, such as user interface object 2907 in FIG. 29G, wherein the first location is a first distance (e.g., 0.01, 0.1, 1, 5, 10, 20, or 50 m) from the viewpoint of the user, the computer system detects (3028a), via the one or more input devices, a second user input (e.g., different from the first user input and/or includes one or more characteristics of the first user input) for displaying a virtual keyboard, such as input from finger 2903b in FIG. 29G. In some embodiments, the second user input includes air tapping a text input field of a user interface (e.g., application user interface) to invoke display of the virtual keyboard. In some embodiments, the second user input includes air tapping a widget or icon associated with the virtual keyboard to invoke display of the virtual keyboard.

In some embodiments, in response to detecting the second user input, the computer system displays (3028*b*) the virtual keyboard at a second location (e.g., same as or different from the first location) in the user interface, including in accordance with a determination that virtual object would intersect with the virtual keyboard when the virtual keyboard is displayed at the second location in the user interface, moving the virtual object from the first location to a third location in the user interface, wherein the third location is a second distance (e.g., 0.01, 0.1, 1, 5, 10, 20, or 50 m) greater than the first distance from the viewpoint of the user, such as moving user interface object 2907 to a position in FIG. 29G. In some embodiments, the entire area of the virtual object or a portion of the virtual object would intersect (e.g., overlap) with the virtual keyboard when the virtual keyboard is displayed at the second location. When displayed at the third location, no portion of the virtual object optionally would intersect with the virtual keyboard displayed at the second location.

In some embodiments, while displaying the virtual keyboard at the second location, the computer system detects (3028*c*), via the one or more input devices, a third user input (e.g., different from the first user input and/or includes one or more characteristics of the first user input) for ceasing display of the virtual keyboard, such as input from finger 2903*b* in FIG. 29G. In some embodiments, the second user input includes air tapping outside of the text input field or the application user interface associated with the virtual keyboard to dismiss the virtual keyboard. In some embodiments, the second user input includes air tapping again the widget or icon associated with the virtual keyboard to dismiss the virtual keyboard.

In some embodiments, in response to detecting the third user input, the computer system ceases (3028*d*) display of the virtual keyboard and (optionally automatically, without user input to do so) moves the virtual object from the third location to the first location in the user interface, such as ceasing display of the virtual keyboard 2915 and moving user interface object 2907 to a position in FIGS. 29A and 29A1 (e.g., because the virtual object would no longer be intersected at the first location by the virtual keyboard). In some embodiments, a visual prominence of the virtual object is reduced when moved from the first location to the third location. For example, the virtual object is more transparent, more blurry, smaller, a different color, and/or less bright at the third location, where the virtual object is farther away from the viewpoint of the user compared to the first location. The visual prominence of the virtual object optionally increases (e.g., virtual object is less transparent, less blurry, larger, a different color, and/or more bright) when the virtual object is moved back to its original location from the third location to the first location. In some embodiments, the virtual object remains at the third location despite ceasing display of the virtual keyboard. Moving a virtual object away from the viewpoint of the user to prevent it from intersecting with a virtual keyboard when displayed prevents clutter in the user interface and helps ensure user accessibility to both the virtual object and the virtual keyboard, thereby improving user-device interactions.

In some embodiments, while detecting the first portion of the first user input, the computer system displays (3030*a*), via the display generation component, the virtual object behind the first portion of the user relative to the viewpoint of the user, such as displaying the virtual keyboard 2915 behind the hand (e.g., finger 2903*a*) of the user 2909 in FIG. 29E (e.g., concurrently moving the virtual object away from the viewpoint of the user based on the first portion of the first user input as described with respect to step(s) 3002). In some embodiments, while the virtual object is moved away from the viewpoint of the user as the first portion of the user moves towards the virtual object without exceeding the first threshold distance as described with respect to step(s) 3002, the virtual object is displayed behind the first portion of the user relative to the viewpoint of the user, such that the first portion of the user at least partially obscures visibility of the virtual object.

In some embodiments, in response to detecting the second portion of the first user input and in accordance with the determination that the second portion of the first user input includes more than the threshold amount of movement of the first portion of the user in the respective direction away from the viewpoint of the user, the computer system displays (3030*b*) the virtual object in front of the first portion of the user relative to the viewpoint of the user, such as displaying the virtual keyboard 2915 in front of the hand (e.g., finger 2903*a*) of the user 2909 in FIG. 29G. In some embodiments, while the virtual object is moved towards the viewpoint of the user in response to the first portion of the user moving towards the virtual object while exceeding the first threshold distance as described with respect to step(s) 3002, the virtual object is displayed in front of the first portion of the user relative to the viewpoint of the user, such that the virtual object at least partially obscures visibility of the first portion of the user. Displaying the virtual object in front of the first portion of the user based on more than the threshold amount of movement of the first portion of the user in the respective direction away from the viewpoint of the user provides visual feedback that the virtual object is no longer the target of interaction with the first portion of the user, thereby reducing errors in interaction between the user and the computer system, and avoiding unnecessary inputs provided to the computer system.

In some embodiments, while detecting the first user input (3032*a*), in response to detecting a third portion of the first user input (e.g., different than the first portion and the second portion of the first user input) prior to the first portion of the first user input and in accordance with a determination that the third portion of the first user input includes movement of the first portion of the user in the respective direction without exceeding a threshold distance, such as Threshold 1 in FIG. 29D, (e.g., less than the first threshold distance and/or the second threshold distance with respect to step(s) 3002) after the first portion of the user reaches a location corresponding to the virtual object, the computer system forgoes (3032*b*) moving the virtual object away from the viewpoint of the user, such as forgoing moving the virtual keyboard 2915 away from the viewpoint of the user 2909 in FIG. 29D. In some embodiments, the threshold distance is 0.1, 0.5, 1, 2, 3, or 5 cm behind the virtual object relative to the viewpoint of the user before the first user input is detected. In some embodiments, after the index finger is in direct interaction (e.g., air touching) a virtual key of a virtual keyboard, the third portion of the first user input includes movement of the index finger towards the virtual key (e.g., air tapping) without exceeding the threshold distance such that the virtual key is not pressed down (e.g., virtual key is not moved away from the viewpoint of the user despite air tapping or touching the virtual key). In some embodiments, even though the first portion of the user has slightly moved through the location corresponding to the virtual object, the virtual object is not moved away from the viewpoint of the user because the first portion of the user has not exceeded the threshold distance. In some embodiments, the third portion of the first user input causes selection of the virtual object.

For example, when an index finger moves towards the virtual key without exceeding the threshold distance (e.g., air taps and/or pushes a virtual key), the virtual key is selected (e.g., thus resulting in entering text that corresponds to the virtual key in an input field of a virtual keyboard).

In some embodiments, the first portion of the first user input includes movement of the first portion of the user in the respective direction that exceeds the threshold distance after the first portion of the user reaches the location corresponding to the virtual object, such as moving the virtual keyboard 2915 away from the viewpoint of the user 2909 after the finger 2903a exceeds Threshold 1 in FIG. 29E (3032b) (e.g., and in response, moving the virtual object away from the viewpoint of the user in accordance with the movement of the first portion of the user as described with respect to step(s) 3002). Forgoing moving the virtual object away from the viewpoint of the user when the first portion of the user does not exceed the threshold distance prevents the virtual object from unintentionally shifting (e.g., bouncing) while the user is interacting with the virtual object (e.g., so that the virtual keyboard is pushed back only when the first portion of the user pushes through the virtual keyboard to a higher degree), thereby improving user-device interactions.

In some embodiments, the computer system displays (3034), via the display generation component, the virtual object concurrently with a second virtual object, such as virtual display and text control object 2908 and the virtual input field 2916 in FIG. 29E, that is associated with the virtual object, wherein a location of the second virtual object is based on a simulated physical relationship (e.g., a physical relationship with some degree of elasticity such as a simulated spring or rubber band relationship) with a location of the virtual object. In some embodiments, the second virtual object includes a playback control element, a navigation control element, a window management control element, or any ornament related to the virtual object (e.g., that controls the content or other functionality of the virtual object). For example, the virtual object is optionally a virtual keyboard, and the second virtual object is optionally a virtual input field or a virtual display and text control element corresponding to the virtual keyboard (e.g., that includes buttons for controlling aspects of the text entered by the keyboard, such as bolding, italics, and/or font size.). In some embodiments, the virtual object is displayed concurrently with a plurality of second virtual objects. In some embodiments, as the location of the virtual object changes, the location of the second virtual object changes in the same respective direction as the location of the virtual object, but based on the simulated spring relationship with the location of the virtual object. In some embodiments, the second virtual object initially moves slower than the virtual object when the virtual object begins moving, but gradually moves faster compared to the virtual object when the virtual object slows down or stops moving (e.g., such that the second virtual object catches up to the location of the virtual object). In some embodiments, the second virtual object oscillates in distance from the virtual object (e.g., between positive and negative distance from the second virtual object relative to a reference) for a threshold time (e.g., 0.1, 1, 5, 10, or 30 s) when it catches up to the virtual object (e.g., little to no distance, such as 0, 0.01, 01, 1, or 10 cm, remains between the second virtual object and the virtual object). Displaying the virtual object concurrently with the second virtual object such that the location of the second virtual object is based on a simulated spring relationship with the location of the virtual object enhances user accessibility to both the virtual object and the second virtual object (e.g., despite changes in location of the virtual object) and provides visual feedback that the virtual object and the second virtual object are related such that interaction with one can cause interaction with the other, thereby improving user-device interactions.

In some embodiments, the computer system detects (3036a), via the one or more input devices, a movement of the virtual object away from the viewpoint of the user, such as movement of the virtual keyboard 2915 away from the viewpoint of the user 2909 in FIG. 29E (e.g., in response to movement of the first portion of the user away from the viewpoint of the user relative to the virtual object without exceeding the first threshold distance as described with respect to step(s) 3002).

In some embodiments, in response to detecting the movement of the virtual object away from the viewpoint of the user, the computer system moves (3036b) the second virtual object away from the viewpoint of the user, such as moving the virtual display and text control object 2908 and the virtual input field 2916 away from the viewpoint of the user 2909 in FIG. 29E, wherein the movement of the second virtual object away from the viewpoint of the user is based on the simulated physical relationship with the movement of the virtual object. In some embodiments, the second virtual object moves less than a distance moved by the virtual object away from the viewpoint of the user based on the simulated spring relationship between the virtual object and the second virtual object. In some embodiments, the movement of the second virtual object away from the viewpoint of the user is proportional to the movement of the virtual object away from the viewpoint of the user. For example, the second virtual object optionally moves away from the viewpoint of the user by a threshold percentage (e.g., 10, 20, 30, 50, or 80%) of the distance moved by the virtual object away from the viewpoint of the user. In some embodiments, the second virtual object eventually reaches the location (e.g., distance from the viewpoint of the user) of the virtual object if the movement of the virtual object slows down or stops. In some embodiments, if the second virtual object is separated from the virtual object by a larger distance, then the second virtual object moves faster towards the location (e.g., distance from the viewpoint of the user) of the virtual object. In some embodiments, if the second virtual object is separated from the virtual object by a shorter distance, then the second virtual object moves more slowly towards the location (e.g., distance from the viewpoint of the user) of the virtual object. Moving the second virtual object away from the viewpoint of the user based on the simulated spring relationship with the movement of the virtual object away from the viewpoint of the user enhances user accessibility to both the virtual object and the second virtual object (e.g., despite movement of the virtual object), thereby improving user-device interactions.

In some embodiments, the computer system detects (3038a), via the one or more input devices, a movement of the virtual object towards the viewpoint of the user, such as movement of the virtual keyboard 2915 towards the viewpoint of the user 2909 in FIG. 29F or 29G (e.g., in response to movement of the first portion of the user towards the viewpoint of the user relative to the virtual object as described with respect to step 3006 or in response to the more than threshold amount of movement of the first portion of the user away the viewpoint of the user as described with respect to step(s) 3002).

In some embodiments, in response to detecting the movement of the virtual object towards the viewpoint of the user, the computer system moves (3038b) the second virtual object towards the viewpoint of the user, such as moving the virtual display and text control object 2908 and the virtual input field 2916 towards the viewpoint of the user 2909 in FIG. 29F or 29G, wherein the movement of the second virtual object towards the viewpoint of the user is based on the simulated physical relationship with the movement of the virtual object. In some embodiments, the second virtual object moves less than a distance moved by the virtual object towards the viewpoint of the user based on the simulated spring relationship between the virtual object and the second virtual object. In some embodiments, the movement of the second virtual object towards the viewpoint of the user is proportional to the movement of the virtual object towards the viewpoint of the user. For example, the second virtual object optionally moves towards the viewpoint of the user by a threshold percentage (e.g., 10, 20, 30, 50, or 80%) of the distance moved by the virtual object towards the view-point of the user. In some embodiments, the second virtual object eventually reaches the location (e.g., distance from the viewpoint of the user) of the virtual object if the movement of the virtual object slows down or stops. In some embodiments, if the second virtual object is separated from the virtual object by a larger distance, then the second virtual object moves faster towards the location (e.g., distance from the viewpoint of the user) of the virtual object. In some embodiments, if the second virtual object is separated from the virtual object by a shorter distance, then the second virtual object moves more slowly towards the location (e.g., distance from the viewpoint of the user) of the virtual object. Moving the second virtual object towards the viewpoint of the user based on the simulated spring relationship with the movement of the virtual object towards the viewpoint of the user enhances user accessibility to both the virtual object and the second virtual object (e.g., despite movement of the virtual object), thereby improving user-device interactions.

In some embodiments, displaying, via the display gen-eration component, the virtual object concurrently with the second virtual object includes displaying the virtual object at a first distance relative to the viewpoint of the user, and the second virtual object at a second distance different from (e.g., less than or greater than) the first distance relative to the viewpoint of the user (3040), such as displaying the virtual keyboard 2915 relative to the viewpoint of the user 2909 a different distance compared to the virtual display and text control object 2908 and the virtual input field 2916 relative of the viewpoint of the user 2909 in FIG. 29E. In some embodiments, the virtual object is displayed closer to the viewpoint of the user compared to the second virtual object (e.g., second virtual object displayed further than the virtual object). In some embodiments, the virtual object is displayed farther from the viewpoint of the user compared to the second virtual object (e.g., second virtual object dis-played closer than the virtual object). In some embodiments, the virtual object is displayed adjacent to the second virtual object. In some embodiments, the virtual object and the second virtual object are the same distance from the view-point of the user after the movement of the virtual object and the second virtual object has been completed and no addi-tional movement of the first portion of the user and/or the virtual object is detected. In some embodiments, while the virtual object is moving away from the viewpoint of the user, the second virtual object is closer to the viewpoint of the user than the virtual object. In some embodiments, while the virtual object is moving towards the viewpoint of the user, the second virtual object is farther from the viewpoint of the user than the virtual object. Displaying the virtual object and the second virtual object at different distances relative to the viewpoint of the user prevents clutter in the user interface, thereby improving user-device interactions.

It should be understood that the particular order in which the operations in method 3000 have been described is merely exemplary and is not intended to indicate that the described order is the only order in which the operations could be performed. One of ordinary skill in the art would recognize various ways to reorder the operations described herein.

FIGS. 31A-31J illustrate examples of a computer system facilitating user input for displaying a selection refinement user interface object in a three-dimensional environment in accordance with some embodiments.

Figure 31A:
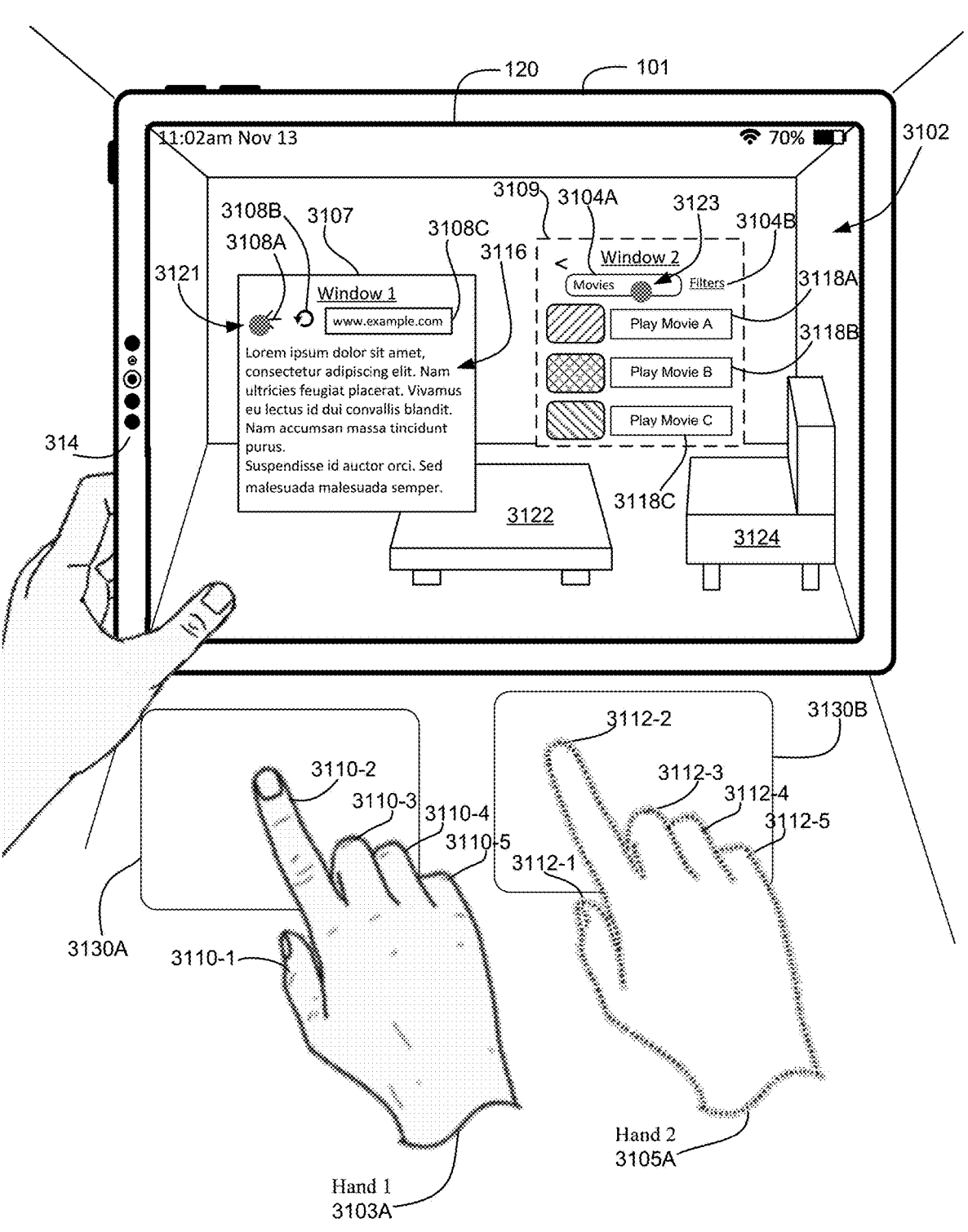
FIGS. 31A-31J illustrate examples of a computer system facilitating user input for displaying a selection refinement user interface object in a three-dimensional environment in accordance with some embodiments.

FIG. 31A illustrates a computer system 101 (e.g., an electronic device) displaying, via a display generation com-ponent (e.g., display generation component 120 of FIG. 1), a three-dimensional environment 3102 from a viewpoint of a user (e.g., facing the back wall of the physical environment in which computer system 101 is located). In some embodi-ments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, computer system 101 is in communication with one or more input devices, such as trackpads 3130A and 3130B. The trackpads 3130A and 3130B are optionally configured to detect touch input provided by a part of the user (e.g., one or more hands of the user). In some embodiments, the user interfaces illustrated and described below could also be implemented on a head-mounted display that includes a display generation component that displays the user inter-face or three-dimensional environment to the user, and sensors to detect the physical environment and/or move-ments of the user's hands (e.g., external sensors facing outwards from the user), and/or attention (e.g., including gaze) of the user (e.g., internal sensors facing inwards towards the face of the user).

As shown in FIG. 31A, computer system 101 captures one or more images of the physical environment around com-puter system 101 (e.g., operating environment 100), includ-ing one or more objects in the physical environment around computer system 101. In some embodiments, computer system 101 displays representations of the physical envi-ronment in three-dimensional environment 3102. For example, three-dimensional environment 702 includes a representation 3122 of a coffee table, which is optionally a representation of a physical coffee table in the physical environment, and three-dimensional environment 3102 includes a representation 3124 of sofa, which is optionally a representation of a physical sofa in the physical environ-ment.

In FIG. 31A, three-dimensional environment 3102 also includes virtual objects 3107 ("Window 1"), and 3109 ("Window 2"). In some embodiments, virtual objects 3107 and 3109 are optionally one or more of user interfaces of applications containing content (e.g., a plurality of select-able options), three-dimensional objects (e.g., virtual clocks, virtual balls, and/or virtual cars) or any other element displayed by computer system 101 that is not included in the physical environment of display generation component 120. In FIG. 31A, virtual object 3107 is optionally a user inter-face of a web-browsing application. For example, as shown in FIG. 31A, virtual object 3107 is a user interface that includes text 3116 from the website "www.example.com", as indicated in text-entry field 3108c (e.g., a URL search box). As shown in FIG. 31A as an example, the virtual object 3107 also includes a first selectable option 3108a that is selectable to cause the computer system 101 to navigate to a previous user interface of the web-browsing application (e.g., display content (e.g., text, images, video, and/or audio) associated with a previous website) and a second selectable option 3108b that is selectable to cause the computer system 101 to refresh the content (e.g., the text 3116) associated with the website www.example.com. Additionally, in FIG. 31A, virtual object 3109 is optionally a user interface of a media browsing application. For example, as shown in FIG. 31A, virtual object 3109 includes a plurality of selectable options corresponding to a plurality of content items (e.g., movies, episodes, podcasts, and/or music). As shown in FIG. 31A as an example, the plurality of content items are displayed in the virtual object 3109 based on a category "Movies" as shown in category element 3104a. For example, the virtual object 3109 includes a first selectable option 3118a that is selectable to cause the computer system 101 to initiate playback of a first content item ("Movie A"), a second selectable option 3118b that is selectable to cause the computer system 101 to initiate playback of a second content item ("Movie B"), and/or a third selectable option 3118c that is selectable to cause the computer system 101 to initiate playback of a third content item ("Movie C"). In some embodiments, the virtual object 3109 further includes filters element 3104b that is selectable to apply one or more search filters for the content items displayed in the virtual object 3109.

In some embodiments, as discussed herein, the computer system 101 provides for enhanced and precise selection of selectable options in three-dimensional environment 3102. As discussed above, in FIG. 31A, the virtual objects 3107 and 3109 optionally include a plurality of selectable options. In some embodiments, the computer system 101 activates a respective selectable option in response to detecting an air gesture (e.g., such as an air pinch gesture or an air tap or touch gesture) provided by the hand of the user while attention (e.g., including gaze) of the user is directed toward the respective selectable option in the three-dimensional environment 3102. In some embodiments, the respective selectable option is proximate to (e.g., 0.5, 1, 2, 3, 4, 5, 6, 8, or 10 cm from) one or more other selectable options, such as selectable options 3108a-3108c and/or 31184a-3118c in FIG. 31A, which could result in an unintentional selection of a selectable option that is different from the respective selectable option to which the air gesture is directed in the three-dimensional environment 3102. Additionally, in some embodiments, certain elements and/or options in the virtual objects 3107 and/or 3109 are not targetable for selection based solely on the attention of the user (e.g., due to a size of the element or option and/or a spatial distribution of a plurality of elements or options, as similarly discussed above). Accordingly, in some embodiments, as discussed below, in response to detecting an air gesture that satisfies a first set of criteria, the computer system 101 displays a selection user interface object (e.g., a cursor) that indicates a location in the three-dimensional environment 3102 at which a selection operation will be performed in response to further input.

In FIG. 31A, the computer system 101 detects a first air gesture provided by hand 3103a ("Hand 1"). For example, as shown in FIG. 31A, the computer system 101 detects hand 3103a provide the first air gesture while a first gaze 3121 of the user is directed to the virtual object 3107 in the three-dimensional environment 3102. Alternatively, in some embodiments, the computer system 101 detects a tap of the hand 3103a on the surface of the trackpad 3130a. Additionally, in FIG. 31A, the computer system detects a second air gesture provided by hand 3105a ("Hand 2"). For example, as shown in FIG. 31A, the computer system 101 detects the hand 3105a provide the second air gesture while a second gaze 3123 of the user is directed to the virtual object 3109 in the three-dimensional environment 3102. Alternatively, in some embodiments, the computer system 101 detects a tap of the hand 3105a on the surface of the trackpad 3130b. It should be understood that while multiple hands and corresponding inputs are illustrated in FIGS. 31A-31J, such hands and inputs need not be detected by computer system 101 concurrently; rather, in some embodiments, computer system 101 independently responds to the hands and/or inputs illustrated and described in response to detecting such hands and/or inputs independently. Additionally, it should be understood that, while multiple gaze points are illustrated in FIGS. 31A-31J, such gaze points need not be detected by computer system 101 concurrently; rather, in some embodiments, computer system 101 independently responds to the gaze points illustrated and described in response to detecting such gaze points independently.

As mentioned above, in some embodiments, the computer system 101 displays a selection user interface object in the three-dimensional environment 3102 that facilitates precise selection of a respective selectable option in the three-dimensional environment 3102 in response to detecting an air gesture that satisfies a first set of criteria. In some embodiments, the first set of criteria includes a criterion that is satisfied when the air gesture corresponds to a first type of gesture, as discussed herein. In some embodiments, if the computer system 101 determines that the air gesture satisfies the first set of criteria, the computer system 101 displays the selection user interface object at a location in the three-dimensional environment 3102 that is based on the location of the attention (e.g., including gaze) of the user when the air gesture is detected, as discussed below. In some embodiments, the computer system 101 forgoes displaying the selection user interface object in the three-dimensional environment 3102 if the air gesture satisfies a second set of criteria (e.g., and thus does not satisfy the first set of criteria). Rather, the computer system 101 optionally performs a selection operation in the three-dimensional environment 3102 at a location that is based on the location of the attention of the user when the air gesture is detected (e.g., if the gaze of the user is directed to a selectable object that is targetable via the gaze, as discussed herein). As discussed in more detail below, in some embodiments, the second set of criteria includes a criterion that is satisfied when the air gesture corresponds to a second type of gesture, different from the first type of gesture, corresponding to a selection input.

Figure 31B:
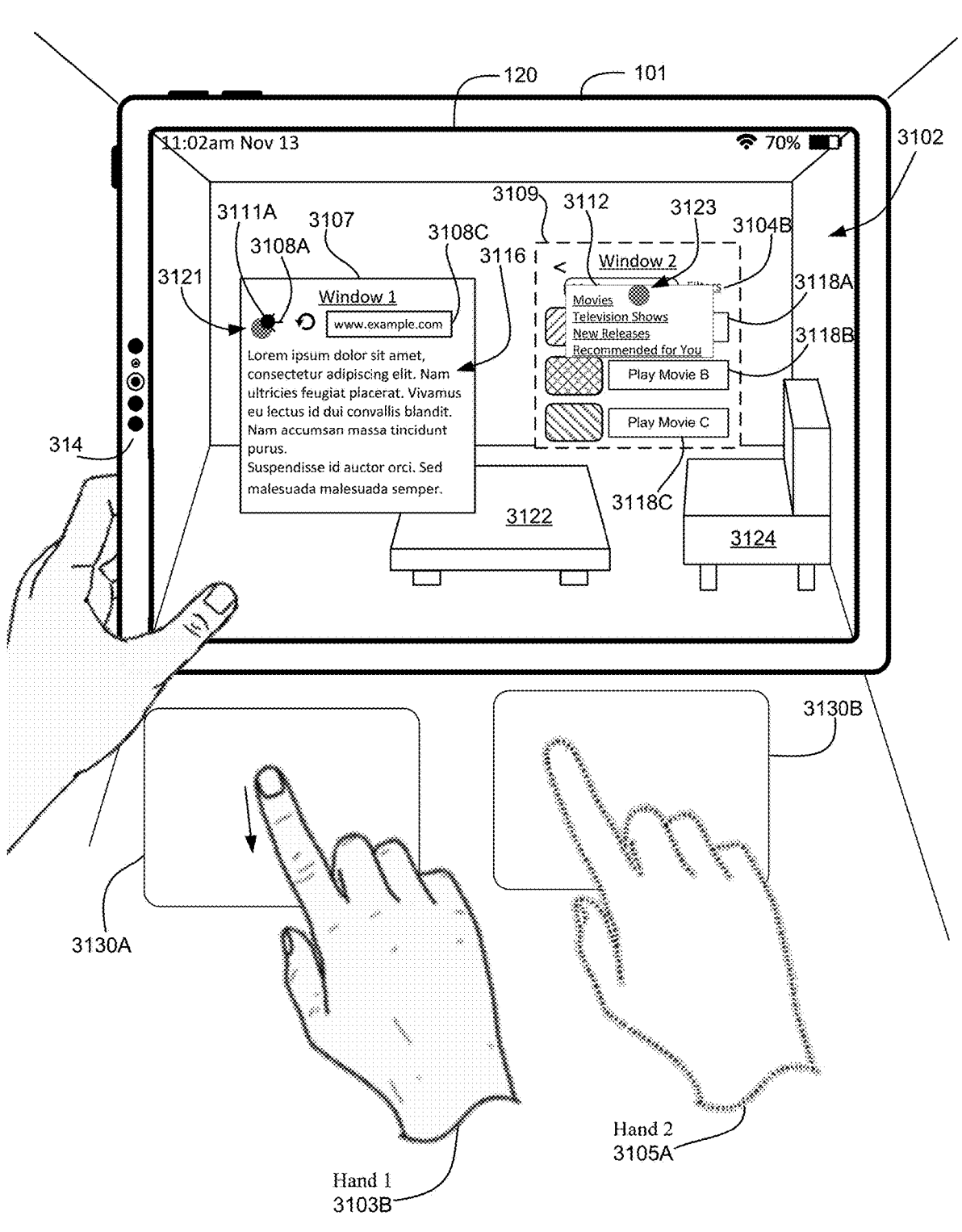

From FIGS. 31A-31B, the computer system 101 determines that the first air gesture provided by the hand 3103a satisfies the first set of criteria because the first air gesture corresponds to the first type of gesture. In some embodiments, the first type of gesture corresponds to an air hand shake gesture performed by the hand of the user. For example, in FIG. 31A, the computer system 101 detects index finger 3110-2, middle finger 3110-3, ring finger 3110-4, pinky finger 3110-5, and/or thumb 3110-1 of the hand 3103a move (e.g., rotate and/or shake) relative to a wrist of the hand 3103A that corresponds to a shaking motion in space. In some embodiments, the first type of gesture corresponds to an air knob turning gesture performed by the hand of the user while one or more fingers of the hand are arranged in a first shape. For example, in FIG. 31A, the computer system 101 detects, while the index finger 3110-2, middle finger 3110-3, ring finger 3110-4, pinky finger 3110-5, and/or thumb 3110-1 of the hand 3103*a* are arranged in a curled (e.g., C-shape), that corresponds to or is similar to a motion that would be used to gripping a door knob in space, movement (e.g., rotation) of the hand 3103*a* relative to the wrist of the hand 3103*a* that corresponds to or is similar to a motion that would be used to turning/twisting a door knob in space. In some embodiments, the first type of gesture corresponds to an air pinch gesture performed using a respective set of fingers of the hand of the user. For example, in FIG. 31A, the computer system 101 detects the middle finger 3110-3 (e.g., or the ring finger 3110-4 or the pinky finger 3110-5) and the thumb 3110-1 come together and make contact. In some embodiments, the air pinch gesture is a double air pinch gesture. For example, in FIG. 31A, the computer system 101 detects the middle finger 3110-3 (e.g., or the ring finger 3110-4 or the pinky finger 3110-5) and the thumb 3110-1 come together and make contact twice in succession (e.g., within a threshold amount of time of one another, such as 0.5, 0.75, 1, 1.5, 2, 3, 4, 5, or 10 seconds). Additional details regarding the first type of air gesture are provided below with reference to method 3200.

Additionally, from FIGS. 31A-31B, the computer system 101 determines that the second air gesture provided by the hand 3105*a* satisfies the second set of criteria (e.g., and thus does not satisfy the first set of criteria) because the second air gesture corresponds to the second type of gesture, different from the first type of gesture, corresponding to a selection input. In some embodiments, the second type of gesture corresponds to an air pinch gesture performed by a first finger (e.g., index finger, middle finger, or ring finger) and a thumb of the hand of the user. For example, in FIG. 31A, the computer system 101 detects a tip of index finger 3112-2, middle finger 3112-3, ring finger 3112-4, or pinky finger 3112-5 and thumb 3112-1 of the hand 3105*a* of the user come together and make contact. In some embodiments, the second type of gesture corresponds to an air tap or touch gesture performed by a first finger (e.g., index finger, middle finger, or ring finger) of the hand of the user. For example, in FIG. 31A, the computer system 101 detects the index finger 3112-2, the middle finger 3112-3, the ring finger 3112-4, or the pinky finger 3112-5 of the hand 3105*a* provide a tap or touch (e.g., on the trackpad 3130*b*). Additional details regarding the second type of gesture are provided below with reference to method 3200.

In some embodiments, as shown in FIG. 31B, when the computer system 101 determines that the first air gesture provided by the hand 3103*a* in FIG. 31A satisfies the first set of criteria as described above, the computer system 101 displays a selection user interface object 3111*a* (e.g., a cursor/pointer) in the three-dimensional environment 3102. In some embodiments, the computer system 101 displays the selection user interface object 3111*a* at a location that is based on the location of the gaze of the user when the first air gesture is detected. For example, as shown in FIG. 31B, the computer system 101 displays the selection user interface object 3111*a* at the location of the gaze 3121 in the virtual object 3107, which corresponds to a location of the first selectable option 3108*a* in the virtual object 3107.

Additionally, in some embodiments, as shown in FIG. 31B, when the computer system 101 determines that the second air gesture provided by hand 3105*a* in FIG. 31A satisfies the second set of criteria described above (e.g., and thus does not satisfy the first set of criteria), the computer system 101 performs a selection operation based on the location of the gaze of the user in the three-dimensional environment 3102. For example, as discussed above with reference to FIG. 31A, the gaze 3123 is directed toward the category element 3104*a* in the virtual object 3109 when the second air gesture provided by the hand 3105*a* is detected. Accordingly, as shown in FIG. 31B, the computer system 101 optionally activates the category element 3104*a* and displays menu element 3112 in the virtual object 3109 (e.g., overlaid on the category element 3104*a*) in the three-dimensional environment 3102. As an example, in FIG. 31B, the menu element 3112 includes a plurality of categories that are each selectable to display content items associated with the particular category in the virtual object 3109, such as Movies, Television Shows, New Releases, and Recommended for You (e.g., content items suggested for the user). Further, as shown in FIG. 31B, the computer system 101 optionally forgoes displaying a selection user interface object in the virtual object 3109 in the three-dimensional environment 3102. For example, as shown in FIG. 31B, the computer system 101 displays the menu element 3112 in the virtual object 3109 in response to detecting the second air gesture provided by the hand 3105*a* without displaying a selection user interface object at the location of the gaze 3123 in the virtual object 3109 (e.g., because the second air gesture satisfies the second set of criteria as discussed above).

Figure 31C:
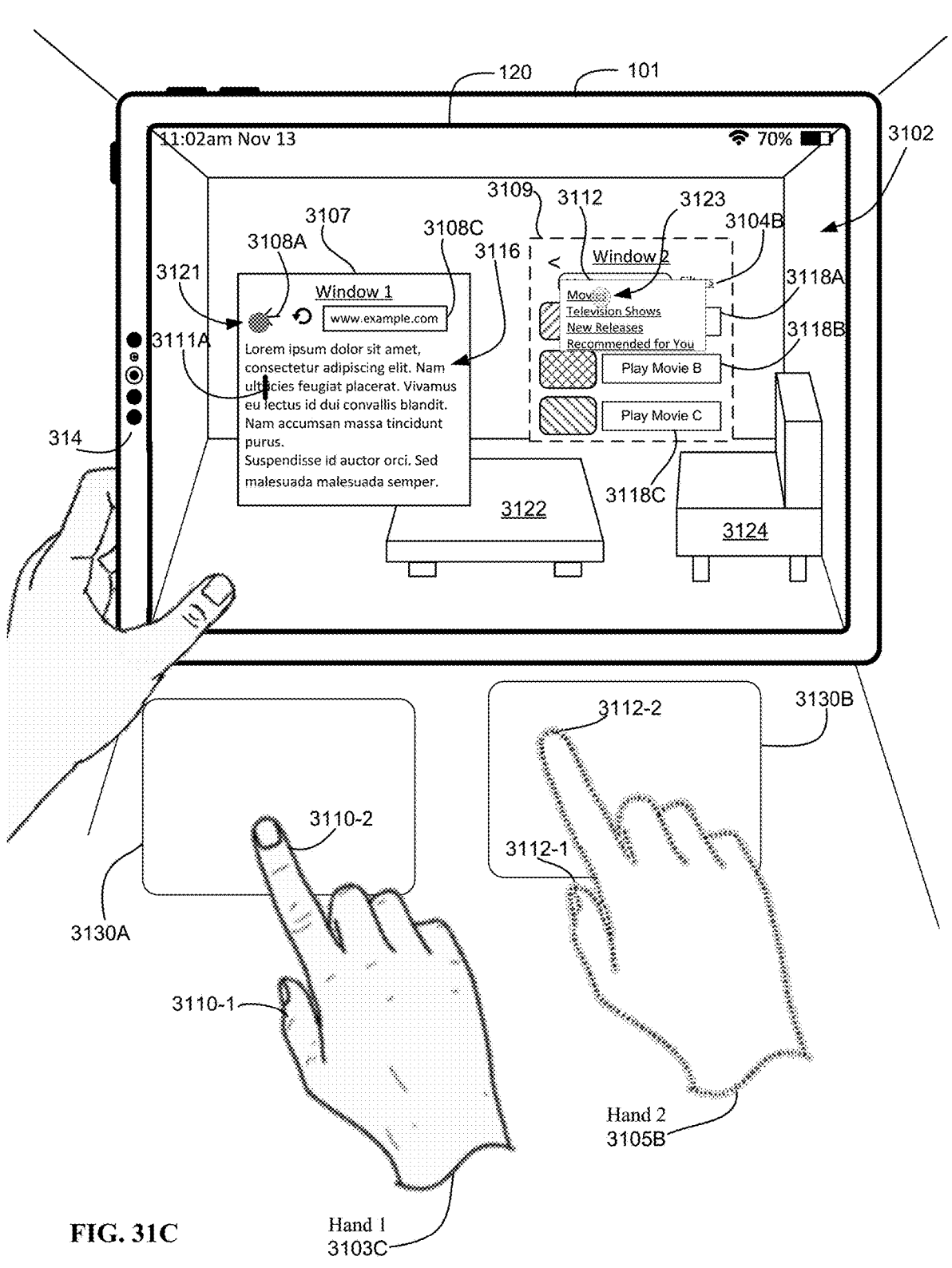

In some embodiments, while the selection user interface object is displayed in the three-dimensional environment 3102, the computer system 101 moves the selection user interface object based on movement of the hand of the user. In FIG. 31B, the computer system 101 detects the hand 3103*b* move in space while the selection user interface object 3111*a* is displayed in the virtual object 3107. For example, as shown in FIG. 31B, the computer system 101 detects, via the trackpad 3130*a*, the hand 3103*b* move in a downward direction with a respective magnitude relative to the three-dimensional environment 3102. In some embodiments, as discussed below, the computer system 101 moves the selection user interface object 3111*a* irrespective of a location of and/or movement of the attention (e.g., gaze 3121) of the user in the virtual object 3107. Additionally, from FIGS. 31B-31C, the computer system 101 detects the gaze 3123 move within the virtual object 3109 in the three-dimensional environment 3102. For example, as shown in FIG. 31C, the computer system 101 detects the gaze 3123 move leftward in the virtual object 3109 and is directed to the Movies option within the menu element 3112 in the virtual object 3109 in the three-dimensional environment 3102.

FIG. 31B1 illustrates similar and/or the same concepts as those shown in FIG. 31B (with many of the same reference numbers). It is understood that unless indicated below, elements shown in FIG. 31B1 that have the same reference numbers as elements shown in FIGS. 31A-31J have one or more or all of the same characteristics. FIG. 31B1 includes computer system 101, which includes (or is the same as) display generation component 120. In some embodiments, computer system 101 and display generation component 120 have one or more of the characteristics of computer system 101 shown in FIGS. 31A-31J and display generation component 120 shown in FIGS. 1 and 3, respectively, and in some embodiments, computer system 101 and display generation component 120 shown in FIGS. 31A-31J have one or more of the characteristics of computer system 101 and display generation component 120 shown in FIG. 31B1.

In FIG. 31B1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 31A-31J.

In FIG. 31B1, display generation component 120 is illustrated as displaying content that optionally corresponds to the content that is described as being displayed and/or visible via display generation component 120 with reference to FIGS. 31A-31J. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 31B1.

Display generation component 120 has a field of view (e.g., a field of view captured by external image sensors 314b and 314c and/or visible to the user via display generation component 120) that corresponds to the content shown in FIG. 31B1. Because display generation component 120 is optionally a head-mounted device, the field of view of display generation component 120 is optionally the same as or similar to the field of view of the user.

In FIG. 31B1, the user is depicted as performing an air pinch gesture (e.g., with hands 3103B and/or 3105A) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 31A-31J.

In some embodiments, computer system 101 responds to user inputs as described with reference to FIGS. 31A-31J.

In the example of FIG. 31B1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 31A-31J and/or described with reference to the corresponding method(s) are optionally implemented on computer system 101 and display generation unit 120 in a manner similar or analogous to that shown in FIG. 31B1.

In some embodiments, as shown in FIG. 31C, in response to detecting the movement of the hand 3103b in FIG. 31B, the computer system 101 moves the selection user interface object 3111a within the virtual object 3107 in accordance with the movement of the hand of the user. For example, as shown in FIG. 31C, the computer system 101 moves the selection user interface object 3111a downward in the virtual object 3107 based on the downward movement of the hand 3103b in FIG. 31B. As mentioned above, in some embodiments, the computer system 101 moves the selection user interface object 3111a based on the movement of the hand of the user irrespective of the location of the gaze of the user in the three-dimensional environment 3102. For example, as shown in FIG. 31C, the computer system 101 moves the selection user interface object 3111a in accordance with the movement of the hand 3103b in FIG. 31B despite the gaze 3121 remaining directed toward the first selectable option 3108a in the virtual object 3107.

Additionally, in some embodiments, the computer system changes a visual appearance of the selection user interface object 3111a based on a type of content that is located at the location of the selection user interface object 3111a. For example, as shown in FIG. 31B, while the selection user interface object 3111a is displayed over the first selectable option 3108a, the selection user interface object 3111a has a first visual appearance in the three-dimensional environment 3102 (e.g., the selection user interface object 3111a is displayed as a pointer cursor and/or has one or more first visual characteristics, such as a first size, a first color, a first amount of translucency, and/or a first amount of brightness). In some embodiments, as shown in FIG. 31C, when the selection user interface object 3111a is displayed over the text 3116 in the virtual object 3107, which is a different type of content than the first selectable option 3108a (e.g., text-based content versus a control user interface element), the computer system changes the visual appearance of the selection user interface object 3111a. For example, as shown in FIG. 31C, the selection user interface object 3111b has a second visual appearance in the three-dimensional environment 3102 (e.g., the selection user interface object 3111a is displayed as a text cursor and/or has one or more second visual characteristics, different from the one or more first visual characteristics, such as a second size, a second color, a second amount of translucency, and/or a second amount of brightness).

In some embodiments, as mentioned above, certain elements in the three-dimensional environment 3102 are not targetable for selection based solely on the attention of the user. For example, certain elements are not targetable for selection based solely on the attention of the user because the elements are small in size relative to a viewpoint of the user and/or are located proximate to other selectable elements in the three-dimensional environment 1302 as previously mentioned above. In the example of FIG. 31C, the category options in the menu element 3112 optionally are selectable elements that cannot be targeted for selection based solely on the attention of the user (e.g., for one or more of the reasons provided above). Accordingly, in FIG. 31C, when the gaze 3123 of the user is moved in the virtual object 3109 and is directed to the Movies option in the menu element 3112, the Movies option is not selectable in response to detecting an input corresponding to a request to select the Movies option, as represented by the altered appearance of the gaze 3123 in FIG. 31C.

In FIG. 31C, while the selection user interface object 3111a is located over the text 3116 in the virtual object 3107, the computer system 101 detects the hand 3103c provide an air gesture that satisfies the second set of criteria discussed above. For example, as shown in FIG. 31C, the computer system 101 detects an air pinch gesture performed by the index finger 3110-2 and thumb 3110-1 of the hand 3103c. In some embodiments, the computer system 101 alternatively detects the hand 3103c perform an air tap or touch gesture (e.g., in which the index finger 3110-2 provides a tap or touch that is detected via the trackpad 3130a). Additionally, in FIG. 31C, while the gaze 3123 is directed to the Movies option in the menu element 3112 in the virtual object 3109, the computer system 101 detects the hand 3105*b* provide an air gesture that satisfies the second set of criteria discussed above. For example, as shown in FIG. 31C, the computer system 101 detects an air pinch gesture performed by the index finger 3112-2 and thumb 3112-1 of the hand 3105*b*. In some embodiments, the computer system 101 alternatively detects the hand 3105*b* perform an air tap or touch gesture (e.g., in which the index finger 3112-2 provides a tap or touch that is detected via the trackpad 3130*b*).

Figure 31D:
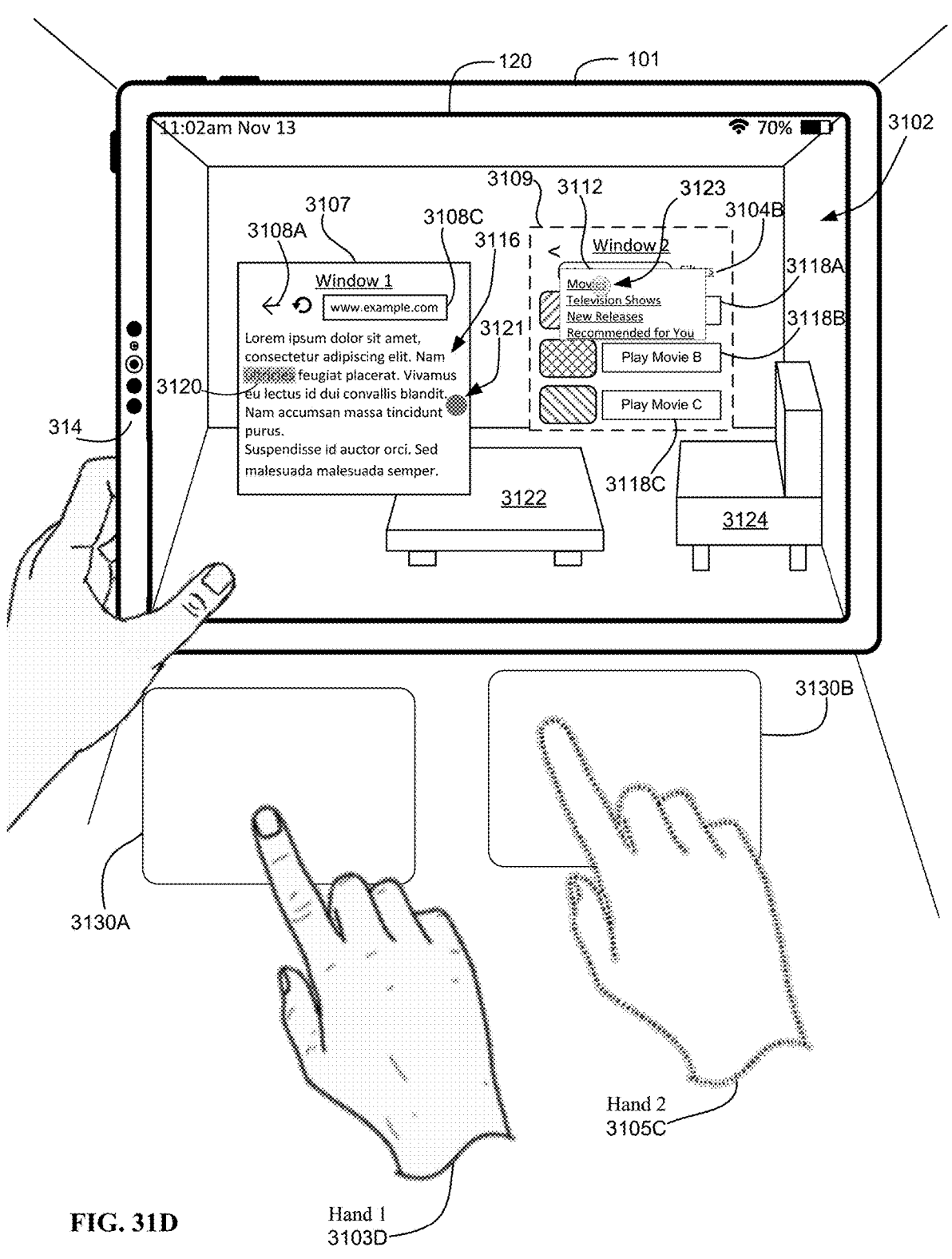

In some embodiments, as shown in FIG. 31D, in response to detecting the air gesture performed by the hand 3103*c* in FIG. 31C, the computer system 101 performs a selection operation based on the location of the selection user interface object 3111*a* in the virtual object 3107. For example, as shown in FIG. 31D, because the selection user interface object 3111*a* is located over the word "ultricies" in the text 3116 in the virtual object 3107 in FIG. 31C when the air gesture is detected, the computer system 101 selects (e.g., highlights) the word, as shown by highlighting 3120, based on the location of the selection user interface object 3111*a* rather than based on the location of the gaze 3121 (e.g., which was located over the first selectable option 3108*a* when the air gesture was detected). Additionally, in some embodiments, the computer system 101 automatically ceases display of the selection user interface object 3111*a* after performing a respective operation using the selection user interface object 3111*a*. For example, when the computer system 101 performs the selection operation in response to detecting the air gesture provided by the hand 3103*c*, the computer system 101 ceases displaying the selection user interface object 3111*a* in the virtual object 3107, as shown in FIG. 31D.

Additionally, in FIG. 31D, in response to detecting the air gesture performed by the hand 3105*b* in FIG. 31C, the computer system 101 forgoes performing a selection operation based on the location of the gaze 3123 in the three-dimensional environment 3102. For example, as previously discussed above, when the computer system 101 detects the air gesture performed by the hand 3105*b* in FIG. 31C, the gaze 3123 of the user is directed to the Movies option in the menu element 3112, which is optionally a selectable element that is not targetable for selection based on gaze. Accordingly, as shown in FIG. 31D, the computer system 101 forgoes selecting the Movies option in the menu element 3112 in response to detecting the air gesture performed by the hand 3105*b*. Additionally, in some embodiments, as shown in FIG. 31D, the computer system 101 forgoes displaying the Movies option with highlighting, bolding, or other visual indication that indicates the Movies option is selectable in the menu element 3112 based on gaze. In some embodiments, if the computer system were to detect movement of the gaze 3123 over other options in the menu element 3112 (e.g., Television Shows or New Releases) that are not targetable for selection based on gaze, in FIG. 31D, the computer system 101 would similarly forgo displaying the other options in the menu element 3112 with highlighting, bolding, or other visual indications that indicate the other options are selectable based on gaze.

In FIG. 31D, the computer system 101 detects the hand 3103*d* perform an air gesture that satisfies the first set of criteria discussed above. For example, as shown in FIG. 31D, the computer system detects the hand 3103*d* perform an air hand shake gesture or an air knob turning gesture as discussed previously herein. Alternatively, in some embodiments, the computer system 101 detects contact of the hand 3103*d* on the surface of the trackpad 3130*a*. Additionally, in FIG. 31D, the computer system 101 detects the hand 3105*c* perform an air gesture that satisfies the first set of criteria discussed above. For example, as shown in FIG. 31D, the computer system detects the hand 3105*c* also perform an air hand shake gesture or an air knob turning gesture. Alternatively, in some embodiments, the computer system 101 detects contact of the hand 3105*c* on the surface of the trackpad 3130*b*.

Figure 31E:
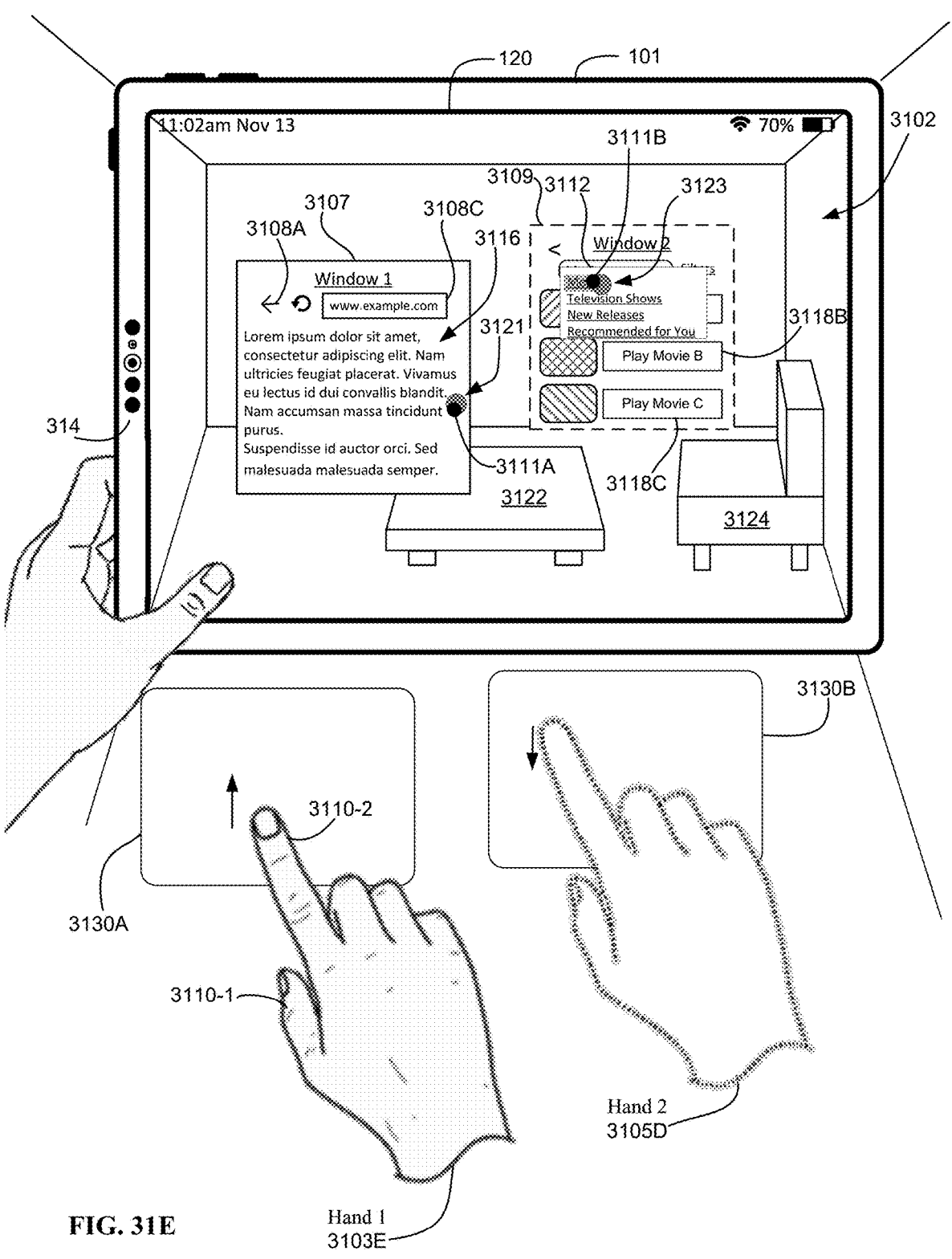

In some embodiments, as shown in FIG. 31E, in response to detecting the air gesture performed by the hand 3103*d* in FIG. 31D, the computer system 101 redisplays the selection user interface object 3111*a* based on the location of the gaze 3121 in the three-dimensional environment 3102. For example, in FIG. 31E, because the air gesture satisfies the first set of criteria, the computer system 101 displays the selection user interface object 3111*a* at the location of the gaze 3121 in the virtual object 3107 in response to detecting the air gesture. Additionally, in some embodiments, as shown in FIG. 31E, in response to detecting the air gesture performed by the hand 3105*c* in FIG. 31D, the computer system 101 displays selection user interface object 3111*b* based on the location of the gaze 3123 in the three-dimensional environment 3102. For example, in FIG. 31E, because the air gesture satisfies the first set of criteria, the computer system 101 displays the selection user interface object 3111*b* at the location of the gaze 3123 in the virtual object 3109 in response to detecting the air gesture.

In some embodiments, the selection user interface object enables elements that are not targetable for selection based on gaze to be selectable based on a location of the selection user interface object in the three-dimensional environment 3102. For example, as discussed above, in FIG. 31E, the Movies option in the menu element 3112 is an element that is not targetable for selection solely based on the location of the gaze 3123 in the three-dimensional environment 3102. In some embodiments, as shown in FIG. 31E, when the selection user interface object 3111*b* is displayed over the Movies option in the menu element 3112, the Movies option is selectable in response to further input while the selection user interface object 3111*b* is located over the Movies option. For example, in FIG. 31E, the computer system 101 highlights (e.g., and/or boldens, underlines, increases a size of) the Movies option in the menu element 3112 in the virtual object 3109 when the selection user interface object 3111*b* is displayed indicating that the Movies option is selectable in response to further input (e.g., a selection input).

In FIG. 31E, while the selection user interface object 3111*a* is located over "white space" in the virtual object 3107 (e.g., a region of the user interface that does not include content, such as the text 3116 or other selectable elements), the computer system 101 detects an air gesture corresponding to a request to scroll the user interface of the virtual object 3107. For example, as shown in FIG. 31E, the computer system 101 detects an air pinch and drag gesture performed by the hand 3103*e* in which the hand 3103*e* moves upward while maintaining a pinch hand shape. Alternatively, in some embodiments, in FIG. 31E, the computer system 101 detects a tap of the hand 3103*e* on the surface of the trackpad 3130*a*, followed by upward movement of the hand 3103*e* on the trackpad 3130*a*. Additionally, in FIG. 31E, while the selection user interface object 3111*b* is displayed in the virtual object 3109, the computer system 101 detects movement of the hand 3105*d*. For example, as shown in FIG. 31E, the computer system 101 detects, via the trackpad 3130*b*, the hand 3105*d* move downward (e.g., on the surface of the trackpad 3130*b*).

Figure 31F:
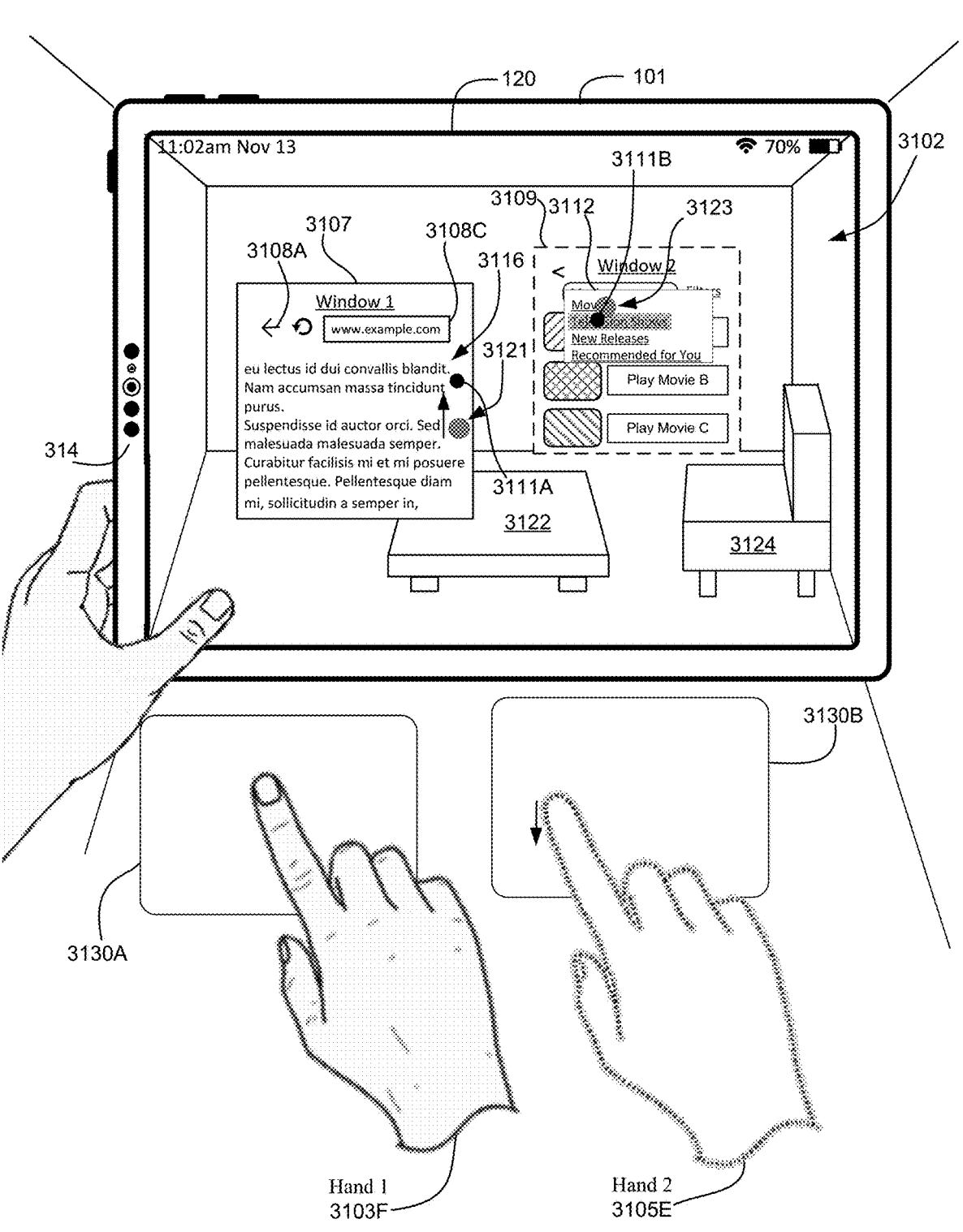

In some embodiments, as shown in FIG. 31F, in response to detecting the input provided by the hand 3103e in FIG. 31E, the computer system 101 scrolls the user interface of the virtual object 3107 in accordance with the input. For example, as shown in FIG. 31F, the computer system 101 scrolls the text 3116 upward in the virtual object 3107 in accordance with the upward movement of the hand 3103e, such that additional portions of the text 3116 are revealed in a bottom region of the virtual object 3107. Additionally, as shown in FIG. 31F, in some embodiments, when the computer system 101 performs the scrolling operation in the virtual object 3107, the computer system 101 maintains display of the selection user interface object 3111a in the virtual object 3107. As shown in FIG. 31F, because the hand 3103e moved upward (e.g., on the surface of the trackpad 3130a) to provide the scrolling input, the computer system 101 optionally also moves the selection user interface object 3111a in the virtual object 3107 in accordance with the movement of the hand 3103e. Alternatively, in some embodiments, as similarly described above, the computer system 101 ceases display of the selection user interface object 3111a in the virtual object 3107 after performing the scrolling operation.

Additionally, as shown in FIG. 31F, in some embodiments, in response to detecting the movement of the hand 3105d in FIG. 31E, the computer system 101 moves the selection user interface object 3111b in accordance with the movement of the hand 3105d. For example, as shown in FIG. 31F, the computer system 101 moves the selection user interface object 3111b downward in the virtual object 3109. Particularly, as shown in FIG. 31F, when the computer system 101 moves the selection user interface object 3111b downward in the virtual object 3109, the selection user interface object 3111b optionally moves from being located over the Movies option in the menu element 3112 to being located over the Television Shows option. Accordingly, in some embodiments, as shown in FIG. 31F, the computer system 101 highlights (e.g., and/or boldens, underlines, increases a size of) the Television Shows option in the menu element 3112 indicating that the Television Shows option is selectable based on the location of the selection user interface object 3111b in response to further input (e.g., a selection input). Additionally, as similarly described above, in some embodiments, the computer system 101 moves the selection user interface object 3111b in accordance with the movement of the hand 3105d irrespective of a location of and/or movement of the gaze 3123. For example, in FIG. 31F, when the selection user interface object 3111b is moved downward in the virtual object 3109 in accordance with the movement of the hand 3105d in FIG. 31E, the gaze 3123 remains directed to the Movies option in the menu element 3112, which does not affect the movement of the selection user interface object 3111b.

In FIG. 31F, while the selection user interface object 3111a is displayed in the virtual object 3107, the computer system 101 detects an input corresponding to a request to cease display of the selection user interface object 3111a in the three-dimensional environment 3102. For example, as shown in FIG. 31F, the computer system 101 detects an air gesture provided by the hand 3103f that corresponds to a request to cease display of the selection user interface object 3111a. In some embodiments, the air gesture corresponds to a selection input, such as an air pinch gesture or an air touch or tap gesture as similarly described above. In some embodiments, the air gesture corresponds to a repeat of the air gesture for causing the selection user interface object 3111a to be displayed in the three-dimensional environment 3102, such as an air hand shake gesture or an air knob turning gesture as similarly discussed above. Additionally, in FIG. 31F, while the selection user interface object 3111b is displayed in the virtual object 3109, the computer system 101 detects movement of the hand 3105e. For example, as shown in FIG. 31F, the computer system 101 detects, via the trackpad 3130b, the hand 3105e move downward (e.g., on the surface of the trackpad 3130b).

Figure 31G:
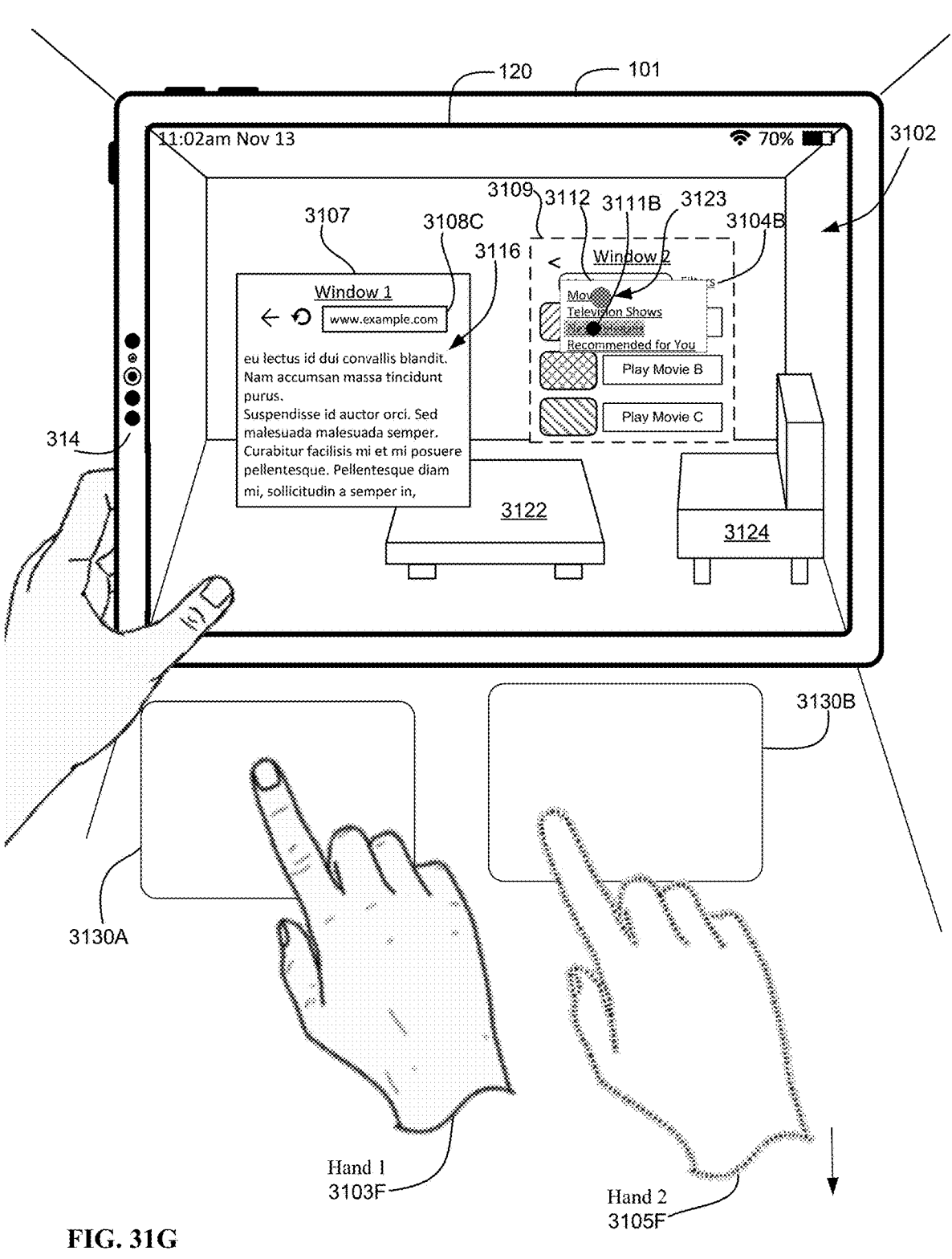

In some embodiments, as shown in FIG. 31G, in response to detecting the input provided by the hand 3103f corresponding to the request to cease displaying the selection user interface object 3111a in the three-dimensional environment 3102, the computer system 101 ceases displaying the selection user interface object 3111a in the virtual object 3107. Additionally, in some embodiments, in response to detecting the movement of the hand 3105e in FIG. 31F, the computer system 101 moves the selection user interface object 3111b within the virtual object 3109 in accordance with the movement of the hand 3105e, as shown in FIG. 31G. For example, as similarly discussed above, in FIG. 31G, the computer system 101 moves the selection user interface object 3111b further downward in the menu element 3112, such that the selection user interface object 3111b is located over the New Releases option in the menu element 3112. Accordingly, in some embodiments, as shown in FIG. 31G, the computer system 101 highlights (e.g., and/or boldens, underlines, increases a size of) the New Releases option in the menu element 3112 indicating that the New Releases option is selectable based on the location of the selection user interface object 3111b in response to further input (e.g., a selection input). Further, as discussed above, the computer system 101 moves the selection user interface object 3111b optionally irrespective of a location of and/or movement of the gaze 3123 in the three-dimensional environment 3102.

In some embodiments, the computer system 101 transitions to ceasing display of the selection user interface object in the three-dimensional environment in response to detecting that a respective event has occurred. In some embodiments, detecting that the respective event has occurred includes detecting movement of the hand of the user controlling the selection user interface object to a resting state. For example, in FIG. 31G, while the selection user interface object 3111b is displayed in the virtual object 3109, the computer system 101 detects the hand 3105f move away from the trackpad 3130b on which inputs are detected. In some embodiments, detecting movement of the hand of the user to the resting state includes detecting movement of the hand 3105f move to a side and/or below a waist of the user. In some embodiments, detecting the movement of the hand of the user to the resting state includes detecting movement of the hand 3105f move outside of a field of view of the user in the three-dimensional environment 3102. In some embodiments, detecting that the respective event has occurred includes detecting movement of the gaze of the user to more than a threshold distance (e.g., 0.5, 1, 1.5, 2, 3, 5, 8, 10, 15, 20, 30, 50, 100, 200, or 500 cm) from the selection user interface object. For example, from FIGS. 31G-31H, the computer system detects the gaze 3123 move more than the threshold distance from the location of the selection user interface object 3111b, as illustrated in legend 3125 in FIG. 31H.

Figure 31H:
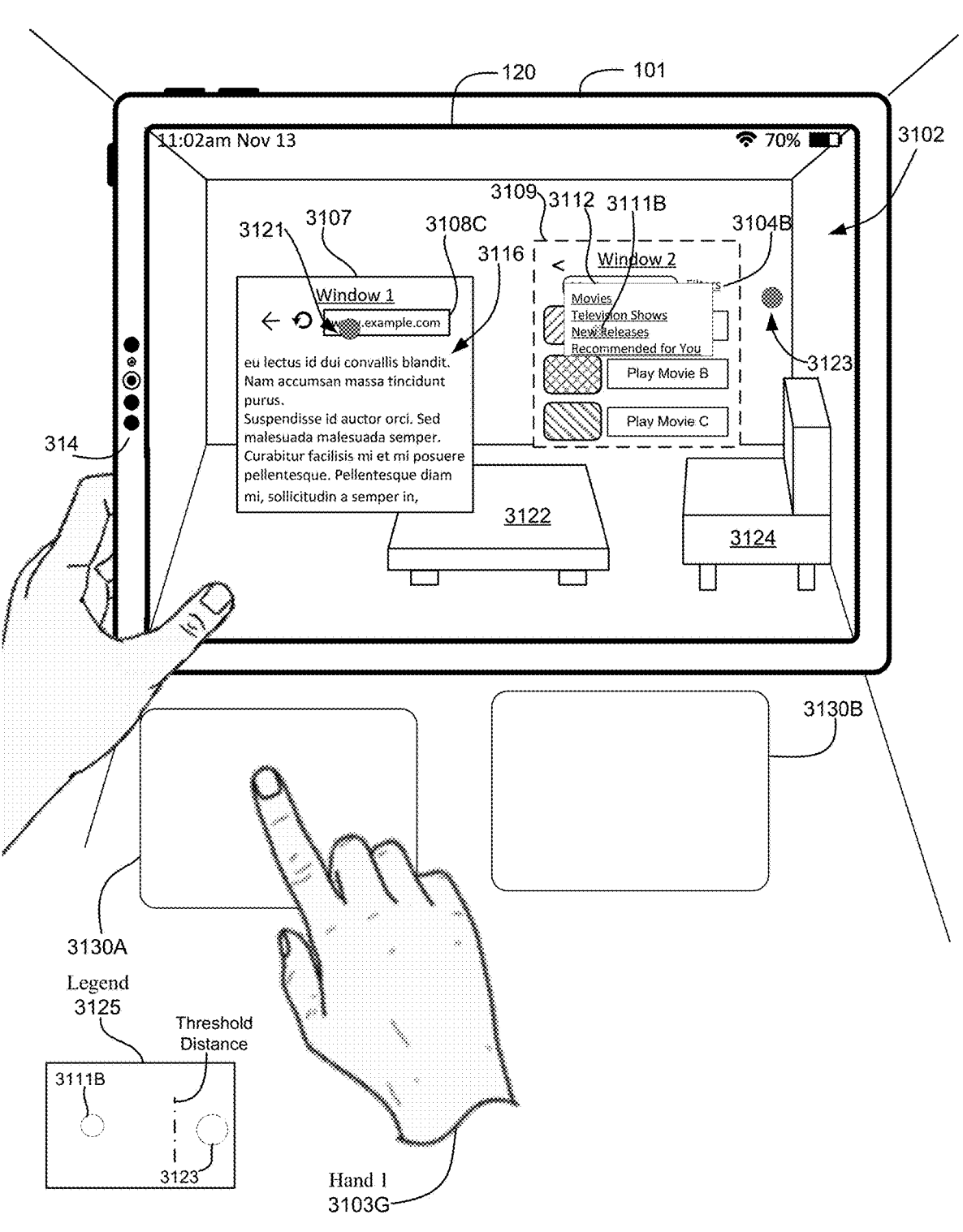

In some embodiments, in response to detecting that the respective event has occurred, the computer system 101 transitions to ceasing display of the selection user interface object 3111b in the virtual object 3109, as shown in FIG. 31H. For example, as shown in FIG. 31H, in response to detecting the hand 3105f move to the resting state as discussed above and/or the gaze 3123 move to more than the threshold distance from the location of the selection user interface object 3111*b*, as indicated in the legend 3125, the computer system 101 gradually ceases displaying the selection user interface object 3111*b*. In some embodiments, as shown in FIG. 31H, gradually ceasing displaying the selection user interface object 3111*b* in the virtual object 3109 includes gradually fading display of the selection user interface object 3111*b*. For example, the computer system 101 gradually increases a translucency of, decreases a brightness of, and/or decreases a size of the selection user interface object 3111*b* in the virtual object 3109 until the selection user interface object 3111*b* ceases to be visible to the user in the three-dimensional environment 3102. In some embodiments, the computer system 101 gradually fades the selection user interface object 3111*b* over a threshold amount of time (e.g., 0.5, 1, 2, 3, 5, 8, 10, 20, or 30 seconds), such that when the threshold amount of time elapses, the selection user interface object 3111*b* is no longer displayed in the three-dimensional environment 3102. In some embodiments, the gradual fading of the selection user interface object 3111*b* visually indicates a progress toward ceasing display of the selection user interface object 3111*b* and thus facilitates user input for reversing the fading of the selection user interface object 3111*b*. For example, as discussed below, the computer system 101 will restore display of the selection user interface object 3111*b* if further input is detected by the computer system 101 before the threshold amount of time elapses.

In FIG. 31H, while the gaze 3121 is directed toward the text-entry field 3108*c* in the virtual object 3107, the computer system 101 detects the hand 3103*g* provide an air gesture that satisfies the first set of criteria discussed previously above. For example, as shown in FIG. 31H, the computer system 101 detects the hand 3103*g* perform an air hand shake gesture or an air knob turning gesture as discussed previously above. Additionally, in FIG. 31H, while fading the selection user interface object 3111*b* and before ceasing display of the selection user interface object 3111*b* in the virtual object 3109, the computer system 101 detects an event for reversing fading the selection user interface object 3111*b* in the three-dimensional environment 3102. For example, from FIGS. 31H-31I, the computer system 101 detects movement of the hand of the user from the resting state back to the ready state (e.g., as defined herein). In some embodiments, the computer system 101 detects movement of the hand of the user back to within the field of view of the user in the three-dimensional environment 3102. In some embodiments, detecting the event includes detecting movement of the gaze back to within the threshold distance described above of the location of the selection user interface object 3111*b* in the three-dimensional environment 3102. For example, from FIGS. 31H-31I, the computer system detects the gaze 3123 move back to within the threshold distance of the selection user interface object 3111*b*, as illustrated in the legend 3125 in FIG. 31I, before the selection user interface object 3111*b* is completely faded out and ceases to be displayed.

Figure 31I:
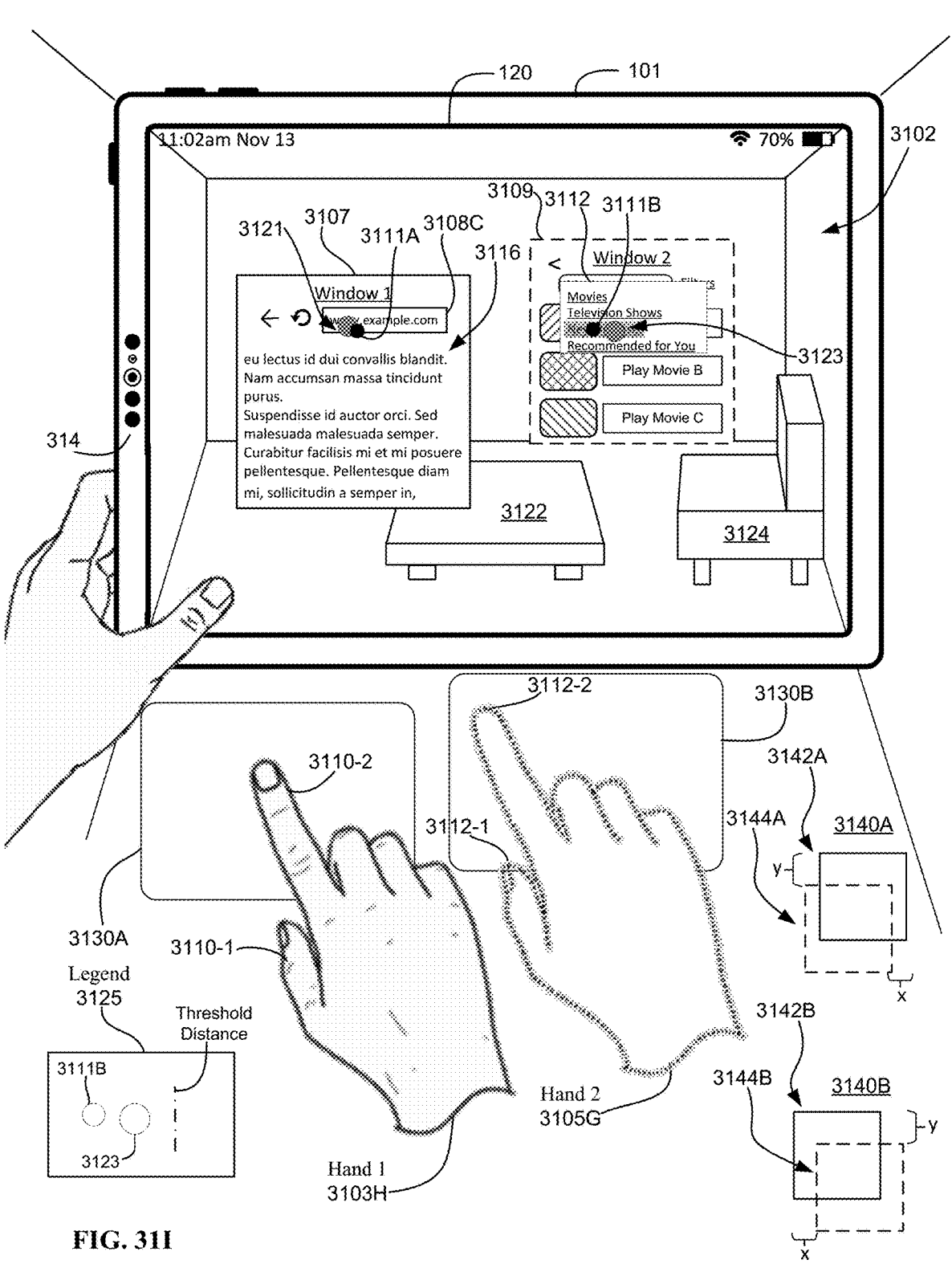

In some embodiments, as shown in FIG. 31I, in response to detecting the air gesture provided by the hand 3103*g* in FIG. 31H that satisfies the first set of criteria, the computer system 101 redisplays the selection user interface object 3111*a* in the three-dimensional environment 3102. For example, as previously discussed herein, the computer system 101 displays the selection user interface object 3111*a* at the location of the gaze 3121 in the virtual object 3107 in response to detecting the air gesture. Additionally, in FIG.

31I, in response to detecting the event for reversing the fading of the selection user interface object 3111*b* in the three-dimensional environment 3102, the computer system 101 restores display of the selection user interface object 3111*b* in the virtual object 3109. For example, in response to detecting the hand 3105*g* move to the ready state pose and/or back in the user's field of view (e.g., such as back on the trackpad 3130*b*) as shown in FIG. 31I, the computer system 101 reverses the fading of the selection user interface object 3111*b*, such that the visual appearance of the selection user interface object 3111*b* is restored to its original visual appearance (e.g., in FIG. 31G). Alternatively, in some embodiments, as mentioned above, the computer system 101 restores display of the selection user interface object 3111*b* in response to detecting the gaze 3123 directed to within the threshold distance discussed above of the location of the selection user interface object 3111*b*, as illustrated in the legend 3125.

In some embodiments, while the gaze of the user is directed toward a selectable element in the three-dimensional environment 1302, the computer system 101 calibrates the location of the gaze of the user relative to a portion of the selectable element using the location of the selection user interface object as a reference point in response to detecting a selection input while the location of the gaze and the location of the selection user interface object both correspond to a location of the selectable element. For example, in FIG. 31I, in the virtual object 3107, the selection user interface object 3111*a* and the gaze 3121 are both located over the text-entry field 3108*c*, and in the virtual object 3109, the selection user interface object 3111*b* and the gaze 3123 are both located over the New Releases option in the menu element 3112 in the three-dimensional environment 3102. As shown in FIG. 31I, a (e.g., geometric) center of the location of the gaze 3121, represented by dashed square 3144*a* in legend 3140*a*, in the virtual object 3107 is offset from a center of the text-entry field 3108*c*, represented by solid square 3142*a* in the legend 3140*a*, in the virtual object 3107. Particularly, as shown in the legend 3140*a*, the center of the location of the gaze 3121 is offset from the center of the text-entry field 3108*c* by a first amount in the x direction (e.g., horizontal offset) and a second amount in the y direction (e.g., vertical offset). Similarly, as shown in FIG. 31I, a center of the location of the gaze 3123, represented by dashed square 3144*b* in legend 3140*b*, in the virtual object 3109 is offset from a center of the New Releases option, represented by solid square 3142*b* in the legend 3140*b*, in the virtual object 3109. Particularly, as shown in the legend 3140*b*, the center of the location of the gaze 3123 is offset from the center of the New Releases option by a first amount in the x direction (e.g., horizontal offset) and a second amount in the y direction (e.g., vertical offset).

In FIG. 31I, while the selection user interface object 3111*a* and the gaze 3121 are both located over the text-entry field 3108*c* in the virtual object 3107, the computer system 101 detects a selection input provided by the hand 3103*h*. For example, as shown in FIG. 31I, the computer system 101 detects an air pinch gesture (e.g., performed by the index finger 3110-2 and the thumb 3110-1 of the hand 3103*h*) or an air tap or touch gesture (e.g., performed by the index finger 3110-2). Similarly, in FIG. 31, while the selection user interface object 3111*b* and the gaze 3123 are both located over the New Releases option in the menu element 3112 in the virtual object 3109, the computer system 101 detects a selection input provided by the hand 3105*g*. For example, as shown in FIG. 31I, the computer system 101 detects an air pinch gesture (e.g., performed by the index finger 3112-2 and the thumb 3112-1 of the hand 3105g) or an air tap or touch gesture (e.g., performed by the index finger 3112-2).

Figure 31J:
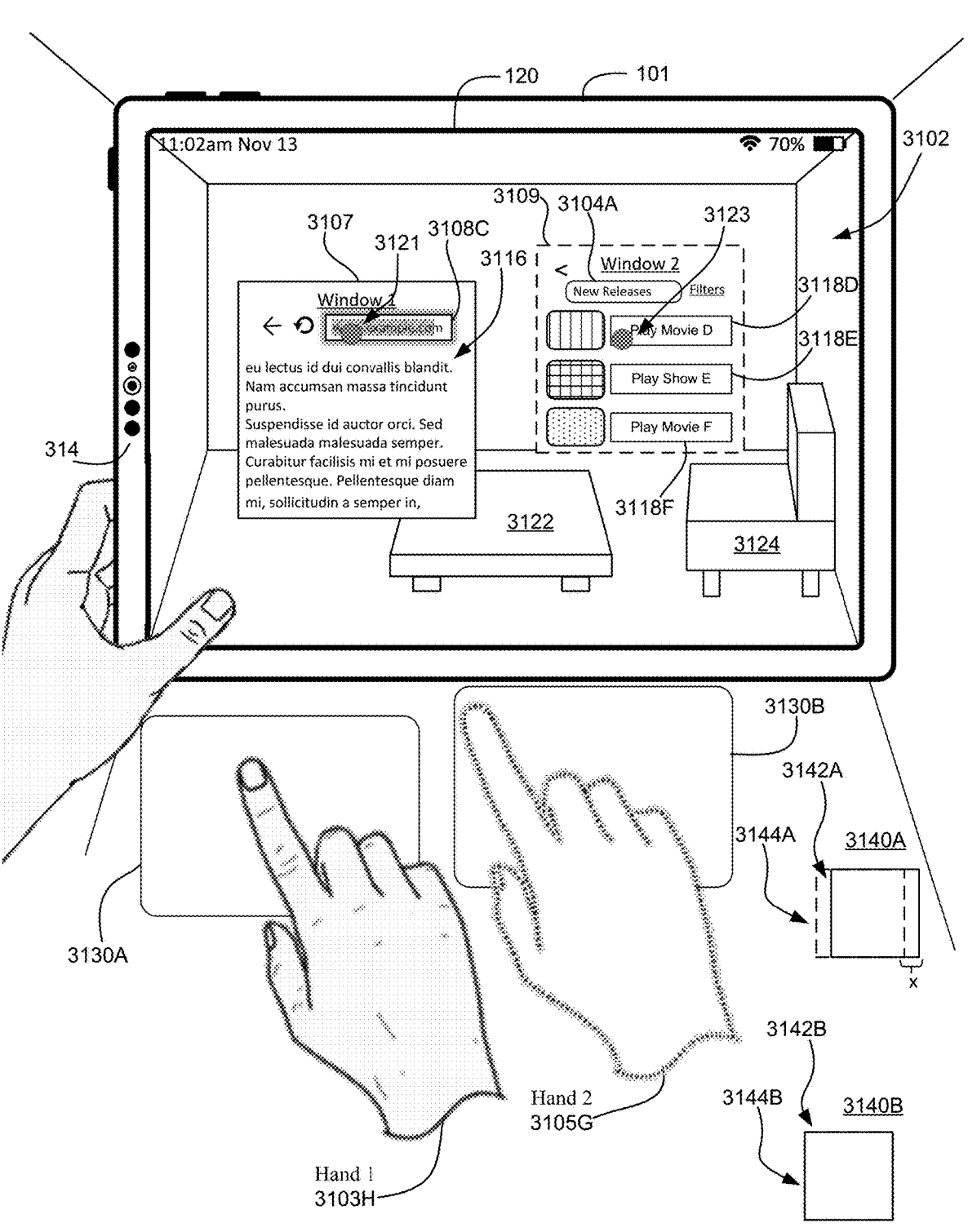
Figure 32D:
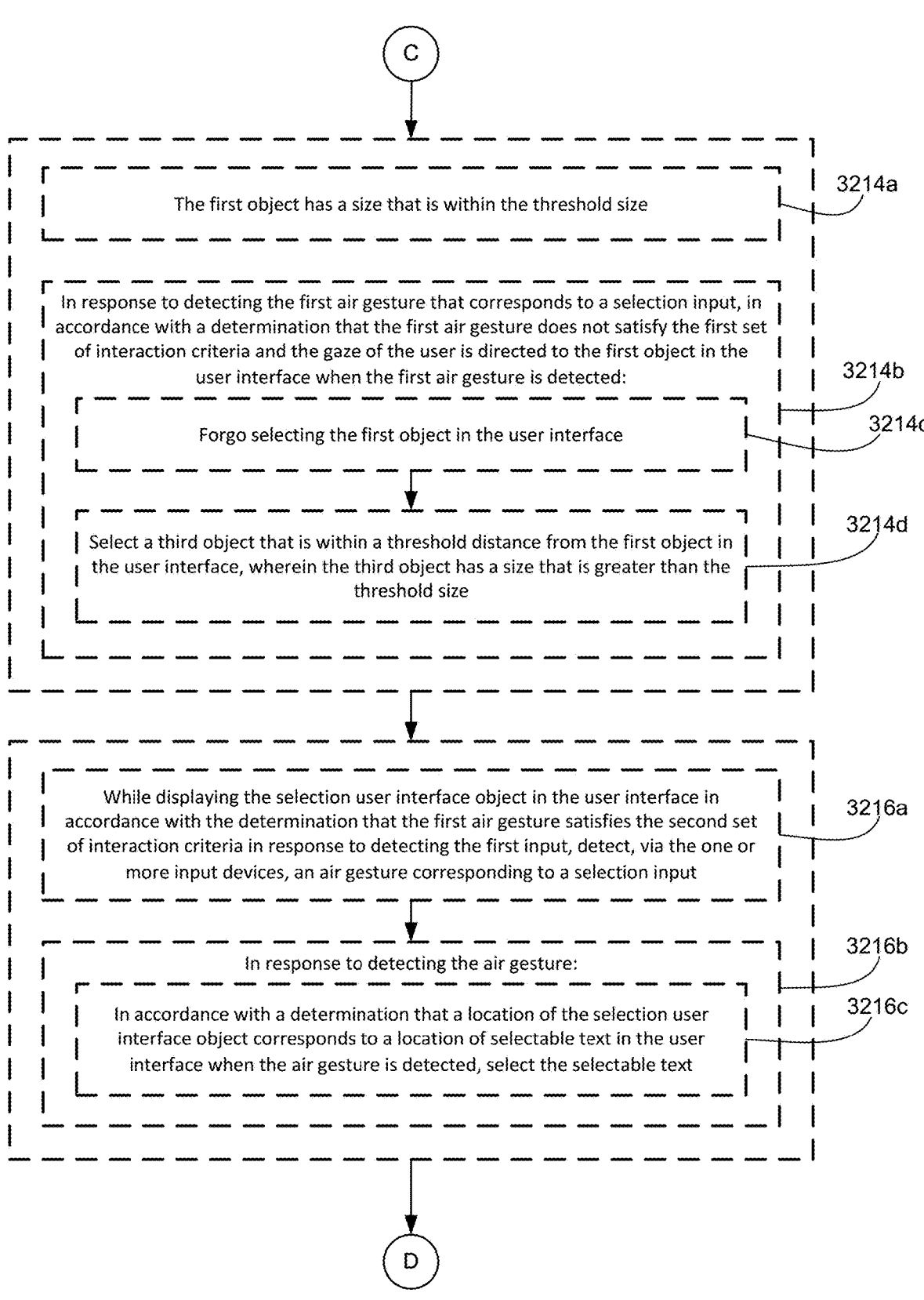
Figure 32E:
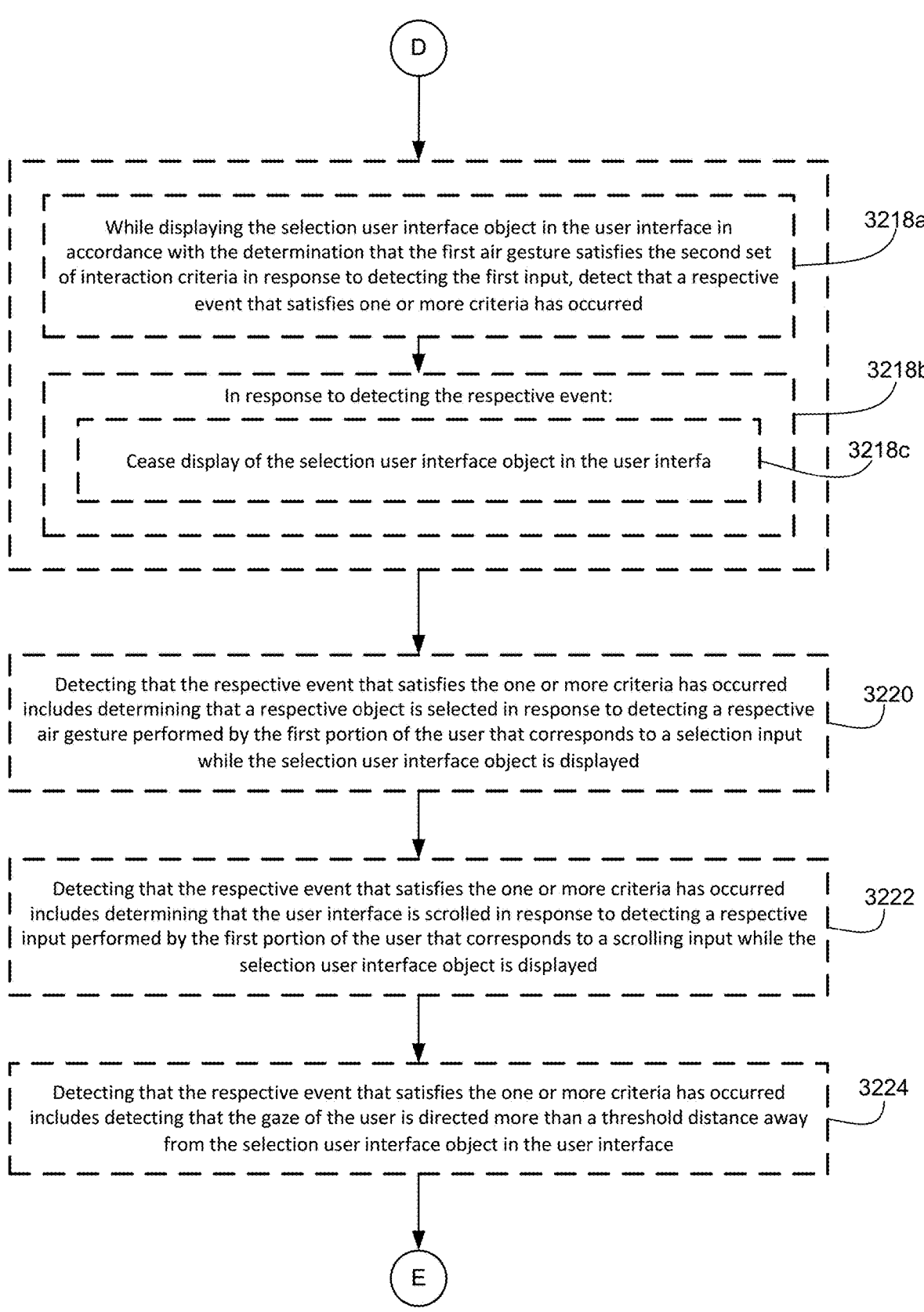

In some embodiments, as shown in FIG. 31J, in response to detecting the selection input provided by the hand 3103h, the computer system 101 selects (e.g., activates) the text-entry field 3108c in the virtual object 3107. For example, as shown in FIG. 31J, the computer system 101 highlights the text www.example.com within the text-entry field 3108c when the text-entry field 3108c is selected. Additionally, as shown in FIG. 31J, the computer system 101 optionally ceases display of the selection user interface object 3111a in the virtual object 3107 after performing the selection. Similarly, in some embodiments, as shown in FIG. 31J, in response to detecting the selection input provided by the hand 3105g, the computer system 101 selects (e.g., activates) the New Releases option in the menu element 3112 in the virtual object 3109. For example, as shown in FIG. 31J, the computer system 101 updates display of the virtual object 3109 to include a plurality of content items that are associated with the New Releases category of content items, such as Movie D (e.g., associated with selectable option 3118d), Show E (e.g., associated with selectable option 3118e), and Movie F (e.g., associated with selectable option 31180. Additionally, as shown in FIG. 31J, the computer system 101 optionally ceases display of the selection user interface object 3111b in the virtual object 3109 after performing the selection.

Additionally, in some embodiments, as mentioned above, in response to detecting the selection input while the selection user interface object and the gaze are both located over a selectable element in the three-dimensional environment 1302, the computer system 101 calibrates the location of the gaze relative to a portion (e.g., a center) of the selectable element using the selection user interface object as a reference point. For example, as shown in the legend 3140b of FIG. 31J, when the computer system 101 selects the New Releases option in response to the selection input provided by the hand 3105g while the selection user interface object 3111b and the gaze 3123 are both located over the New Releases option, the computer system recalibrates the location of the gaze, represented by the dashed square 3144b, relative to the center of the New Releases option, represented by the solid square 3142b. Particularly, in FIG. 31J, the horizontal and vertical offsets of the gaze location are corrected relative to the center of the New Releases option, which causes the dashed square 3144b to overlap the solid square 3142b in the legend 3140b. Additional details regarding the recalibration of the gaze are provided below with reference to method 3200.

In some embodiments, the computer system 101 calibrates the location of the gaze relative to the selectable element based on a size of the selectable element (e.g., from the viewpoint of the user). In some embodiments, when calibrating the location of the gaze relative to the selectable element, if the selectable element is a relatively small element (e.g., a small button or image from the viewpoint of the user) in the three-dimensional environment 3102, the computer system 101 corrects both horizontal (e.g., x) and vertical (e.g., y) offsets of the gaze location relative to the selectable element. For example, in the example of FIG. 31J, the New Releases option is a relatively small option from the viewpoint of the user, and the computer system 101 thus corrects both horizontal and vertical offsets of the gaze 3123 relative to the center of the New Releases option, as previously discussed above and as shown in the legend 3140b. In some embodiments, if the selectable element is a relatively large element (e.g., a large (e.g., wide or long) button or image from the viewpoint of the user) in the three-dimensional environment 3102, the computer system 101 corrects the larger of the horizontal (e.g., x) and vertical (e.g., y) offsets of the gaze location relative to the selectable element. For example, in the example of FIG. 31J, the text-entry field 3108c is a relatively large option (e.g., a wide option) from the viewpoint of the user, and the computer system 101 thus corrects the larger of the horizontal and vertical offsets of the gaze 3121 relative to the center of the text-entry field 3108c. Particularly, as shown in FIG. 31I, the vertical offset of the gaze location is larger than the horizontal offset relative to the center of the text-entry field, as illustrated in the legend 3140a. Accordingly, when the computer system 101 recalibrates the gaze 3121 in FIG. 31J, as illustrated in the legend 3140a, the computer system 101 corrects the vertical (e.g., y) offset of the gaze location relative to the center of the text-entry field 3108c, as represented by the overlapping/aligned portions of the dashed square 3144a and the solid square 3142a, without correcting the horizontal (e.g., x) offset of the gaze location, as represented by the non-overlapping/non-aligned portions of the dashed square 3144a and the solid square 3142a.

FIGS. 32A-32H is a flowchart illustrating a method 3200 of facilitating user input for displaying a selection refinement user interface object in a three-dimensional environment in accordance with some embodiments. In some embodiments, the method 3200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 3200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 3200 are, optionally, combined and/or the order of some operations is, optionally, changed.

In some embodiments, method 3200 is performed at a computer system (e.g., 101) in communication with a display generation component (e.g., display generation component 120) and one or more input devices (e.g., sensors 314 and/or trackpads 3130a and 3130b). For example, the computer system optionally has one or more of the characteristics of the computer systems of methods 800, 900, 1000, 1200, 1400, 1600, 1800, 2000, 2200, 2400, 2600, 2700, 2800, and/or 3000. In some embodiments, the display generation component has one or more of the characteristics of the display generation components of methods 800, 900, 1000, 1200, 1400, 1600, 1800, 2000, 2200, 2400, 2600, 2700, 2800, and/or 3000. In some embodiments, the one or more input devices have one or more of the characteristics of the one or more input devices described with reference to methods 800, 900, 1000, 1200, 1400, 1600, 1800, 2000, 2200, 2400, 2600, 2700, 2800, and/or 3000.

In some embodiments, while displaying, via the display generation component, a user interface, the computer system detects (3202a), via the one or more input devices, a first air gesture performed by a first portion (e.g., a hand) of a user (e.g., a user of the computer system), such as air gestures performed by hands 3103a and/or 3105a in FIG. 31A. In some embodiments, the user interface is displayed in or is a three-dimensional environment as described with reference to methods 800, 900, 1000, 1200, 1400, 1600, 1800, 2000, 2200, 2400, 2600, 2700, 2800, and/or 3000. In some embodiments, the user interface is a user interface as described with reference to methods 800, 900, 1000, 1200, 1400, 1600, 1800, 2000, 2200, 2400, 2600, 2700, 2800, and/or 3000. In some embodiments, while displaying the user interface in the three-dimensional environment, the computer system detects a first air gesture performed by the hand of the user. In some embodiments, the first air gesture includes movement of the hand of the user. For example, the first air gesture is a "hand shake gesture" in which the hand of the user shakes, twitches, and/or rotates (about the wrist of the user), optionally for a threshold amount of time (e.g., 0.05, 0.1, 0.5, 0.75, 0.9, 1, 1.5, 2, 3, or 5 seconds). In some embodiments, the first air gesture is a "knob turning gesture" in which the hand of the user twists and/or rotates (about the wrist of the user), optionally while the fingers of the hand (e.g., index finger, middle finger, ring finger, pinky finger, and/or thumb of the hand) are in a curled state relative to the palm of the hand while the tips of those fingers remain separated from each other (e.g., mimicking gripping and turning a knob of a door). In some embodiments, the first air gesture is an air pinch gesture as described with reference to methods 800, 900, 1000, 1200, 1400, 1600, 1800, 2000, 2200, and/or 2400. In some embodiments, the air pinch gesture is performed using a respective set of fingers, such as a middle finger (e.g., or ring finger or pinky finger) and thumb of the hand of the user. In some embodiments, the air pinch gesture corresponds to a double air pinch gesture in which the respective set of fingers form the pinch hand shape twice in succession (e.g., within a threshold amount of time of one another, such as 0.01, 0.05, 0.1, 0.5, 0.75, 1, 1.5, or 2 seconds). In some embodiments, the first air gesture is a direct touch gesture (e.g., an air tap or touch) as described with reference to methods 2600, 2700, 2800, and/or 3000. In some embodiments, the first air gesture is detected while attention (e.g., including gaze) of the user is directed to the user interface in the three-dimensional environment. For example, the computer system detects the first air gesture while the gaze of the user is directed to an object (e.g., a selectable option or button, an image, a text-entry field, text, and/or a scroll region) in the user interface.

In some embodiments, in response to detecting the first air gesture (3202b), in accordance with a determination that the first air gesture satisfies a first set of interaction criteria and a gaze of the user is directed to a first object in the user interface when the first air gesture is detected, such as gaze 3123 directed to selectable option 3104a in FIG. 31A, the computer system selects (3202c) (e.g., activating) the first object (e.g., a selectable object as similarly described above) in the user interface, such as displaying menu element 3112 associated with the selectable option 3104a as shown in FIGS. 31B and 31B1. In some embodiments, the first object has one or more characteristics of selectable objects described with reference to methods 800, 900, 1000, 1200, 1400, 1600, 1800, 2000, 2200, 2400, 2600, 2700, 2800, and/or 3000. In some embodiments, the first set of interaction criteria is satisfied if the first air gesture is an air pinch gesture (e.g., performed using an index finger and thumb of the hand of the user) or a direct touch gesture as similarly described above. For example, if the computer system determines that the first air gesture is an air pinch gesture (or a direct touch gesture) and the gaze of the user is directed to the first object, the computer system activates the first object in the user interface. In some embodiments, when the computer system selects the first object, the computer system performs an operation associated with the first object. For example, performing the operation associated with the first object includes displaying (e.g., additional) content (e.g., image, video, and/or text) associated with the first object in the user interface, displaying a second user interface associated with the first object in the three-dimensional environment, initiating playback of content (e.g., movie content, episodic content, and/or other video content) in the user interface, and/or outputting audio associated with the first object (e.g., music, podcast, and/or audiobook). In some embodiments, if the computer system determines that the first air gesture satisfies the first set of interaction criteria, but the gaze of the user is directed to a second object, different from the first object, in the user interface, the computer system selects (e.g., activates) the second object in the user interface, without selecting the first object in the user interface. Further, in some embodiments, in accordance with a determination that the first air gesture does not satisfy the first set of interaction criteria (e.g., irrespective of the location of the gaze of the user), the computer system forgoes selecting an object (e.g., the first object or the second object) in the user interface. For example, if the first air gesture satisfies a second set of interaction criteria, different from the first set of interaction criteria, the computer system performs an alternative operation in the three-dimensional environment, as described in more detail below.

In some embodiments, in accordance with a determination that the first air gesture satisfies a second set of interaction criteria, different from the first set of interaction criteria, the computer system displays (3202d), via the display generation component, a selection user interface object (e.g., a cursor) in the user interface without selecting an object (e.g., the first object or the second object discussed above) in the user interface, such as displaying selection user interface object 3111a as shown in FIGS. 31B and 31B1. In some embodiments, the second set of interaction criteria is satisfied if the first air gesture is a hand shake gesture, a knob turning gesture, either a hand shake gesture or a knob turning gesture, an air pinch gesture performed using the respective set of fingers of the hand of the user, or a double air pinch gesture, as similarly described above. For example, if the computer system determines that the first air gesture is a hand shake gesture, the computer system displays a cursor in the user interface without selecting an object in the user interface. In some embodiments, the selection user interface object is displayed at a location of the gaze in the user interface. For example, if the gaze of the user is directed to the first object described above in the user interface, the computer system displays the selection user interface object at a location corresponding to the first object (e.g., over the first object) in the user interface in response to detecting the first air gesture that satisfies the second set of interaction criteria, without selecting the first object in the user interface. In some embodiments, as discussed below, after the selection user interface object is displayed at the location of the gaze (e.g., or within a threshold distance of the location of the gaze, such as 0.1, 0.25, 0.5, 0.75, 1, 1.5, 2, 3, 5, or 8 cm) of the user in the user interface, the selection user interface object is movable based on movement of the hand of the user. In some embodiments, the selection user interface object indicates a location in the user interface at which a selection operation will be performed in response to further input. For example, as described in more detail below, the computer system performs a selection operation at a location of the user interface at which the selection user interface object is located in response to detecting an air pinch gesture as discussed above. In some embodiments, the selection operation includes activation of the selectable option that is located at the location of the refinement cursor in the first object. In some embodiments, in accordance with a determination that the first air gesture does not satisfy the second set of interaction criteria, the computer system forgoes displaying the selection user interface object in the user interface. In some embodiments, in accordance with a determination that the first air gesture does not satisfy the first set of interaction criteria or the second set of interaction criteria, the computer system forgoes performing an operation in the three-dimensional environment.

In some embodiments, while displaying the selection user interface object in the user interface in accordance with the determination that the first air gesture satisfies the second set of interaction criteria in response to detecting the first input, the computer system detects (32023), via the one or more input devices, movement of the first portion of the user, such as movement of hand 3103*b* downward as shown in FIGS. 31B and 31B1. For example, while the cursor is displayed at a respective location in the user interface, the computer system detects movement of the hand of the user in space relative to the user interface in the three-dimensional environment. In some embodiments, the computer system detects the hand of the user move in a respective direction and with a respective magnitude relative to the user interface. In some embodiments, the computer system detects the movement of the first portion of the user irrespective of the location of the gaze of the user in the user interface.

In some embodiments, in response to detecting the movement of the first portion of the user, the computer system moves (32020 the selection user interface object in the user interface in accordance with the movement of the first portion of the user, such as movement of the selection user interface object 3111*a* in accordance with the movement of the hand 3103*b* as shown in FIG. 31C. For example, the computer system moves the selection user interface object in the user interface in accordance with the direction and/or magnitude of the movement of the hand of the user. In some embodiments, if the hand of the user moves in a first direction (e.g., rightward or leftward) in space, the computer system moves the selection user interface object in the first direction in the user interface in accordance with the movement. In some embodiments, if the hand of the user moves in a second direction (e.g., upward or downward) in space, different from the first direction, the computer system moves the selection user interface object in the second direction in the user interface in accordance with the movement. As another example, if the hand of the user moves in a third direction (e.g., away from the viewpoint of the user) in space, the computer system moves the selection user interface object in the third direction in the user interface in accordance with the movement. In some embodiments, if the hand of the user moves in a fourth direction (e.g., toward the viewpoint of the user) in space, the computer system moves the selection user interface object in the fourth direction in the user interface in accordance with the movement. In some embodiments, if the hand of the user moves with a first magnitude (e.g., of speed and/or distance) in space, the computer system moves the selection user interface object a first respective magnitude in the user interface that is based on the first magnitude of the movement of the hand. In some embodiments, if the hand of the user moves with a second magnitude (e.g., of speed and/or distance), different from the first magnitude, the computer system moves the selection user interface object a second respective magnitude, different from the first respective magnitude, in the user interface that is based on the second magnitude of the movement of the hand. In some embodiments, the computer system moves the selection user interface object irrespective of a current location of the gaze of the user while the selection user interface object is displayed. For example, if the computer system detects the movement of the hand of the user while the gaze of the user remains directed toward a first location in the user interface, the computer system still moves the selection user interface object (e.g., to a second location) in the user interface in accordance with the movement of the hand.

In some embodiments, after moving the selection user interface object in the user interface in accordance with the movement of the first portion of the user, the computer system detects (3202*g*), via the one or more input devices, a second air gesture performed by the first portion of the user corresponding to a selection input, such as air gesture performed by hand 3103*c* as shown in FIG. 31C. For example, while the selection user interface object is displayed in the user interface in the three-dimensional environment, the computer system detects the hand of the user perform the second air gesture. In some embodiments, the second air gesture is different from the first air gesture described above. For example, the second air gesture is an air pinch gesture or a direct touch gesture that corresponds to a request to perform a selection at a current location of the selection user interface object in the user interface. In some embodiments, the second air gesture has one or more of the characteristics of the first air gesture that satisfies the first set of interaction criteria (e.g., the second air gesture satisfies the first set of interaction criteria).

In some embodiments, in response to detecting the second air gesture (3202*h*), in accordance with a determination that the selection user interface object is located at a location corresponding to the first object when the second air gesture is detected, the computer system selects (3202*i*) the first object in the user interface (e.g., the computer system activates the first object as similarly described above), such as selecting portion of text 3116 based on the location of the selection user interface object 3111*a* as shown in FIG. 31D. In some embodiments, the selection performed in response to detecting the second air gesture is different from the selection performed in response to the first air gesture discussed above. For example, as described above, in response to detecting the first air gesture that satisfies the first set of interaction criteria (e.g., an air pinch or air touch gesture), the computer system selects the first object based on the location of the gaze of the user (e.g., in response to detecting that the gaze is directed to the first object). On the other hand, while the selection user interface object is displayed in the user interface, in response to detecting the second air gesture that corresponds to a selection input (e.g., an air pinch gesture), the computer system selects the first object based on the location of the selection user interface object (e.g., in accordance with the determination that, after the movement of the hand of the user discussed above, the selection user interface object is located over the first object). In some embodiments, in accordance with a determination that the selection user interface object is located at a location corresponding to a second object, different from the first object, when the second air gesture is detected, the computer system selects (e.g., activates) the second object in the user interface in the three-dimensional environment (and does not select the first object). In some embodiments, after the first object (or the second object) is selected in the user interface, the computer system ceases display of the selection user interface object in the user interface. Displaying a selection user interface object that indicates a location at which a selection operation will be performed in response to further input in response to detecting an air gesture that satisfies a respective set of criteria improves accuracy for performing the selection operation and/or reduces the number of inputs needed to display the selection user interface object, thereby improving user-device interaction.

In some embodiments, the second set of interaction criteria includes a criterion that is satisfied in accordance with a determination that the first air gesture performed by the first portion of the user is a first hand gesture (e.g., a hand shake air gesture or a knob turning air gesture) performed by a hand of the user relative to a respective portion of a body (e.g., a reference portion of the body of the user, such as the wrist, elbow, shoulder, and/or torso) of the user (3204) (e.g., as similarly described above with reference to step(s) 3202), such as the hand 3103*a* in FIG. 31A. Displaying a selection user interface object that indicates a location at which a selection operation will be performed in response to further input in response to detecting a hand shake or knob turning air gesture improves accuracy for performing the selection operation and/or reduces the number of inputs needed to display the selection user interface object, thereby improving user-device interaction.

In some embodiments, the movement of the first portion of the user includes movement of the hand of the user (3206) (e.g., as similarly described above with reference to step(s) 3202), such as movement of the hand 3103*b* as shown in FIGS. 31B and 31B1. In some embodiments, during the movement of the hand of the user, the hand is no longer performing the first hand gesture. For example, the hand of the user is no longer performing the air hand shake gesture or the air knob turning gesture discussed above with reference to step(s) 3202. Moving a selection user interface object that indicates a location at which a selection operation will be performed in response to further input in response to detecting movement of a hand of the user improves accuracy for performing the selection operation and/or reduces the number of inputs needed to move the selection user interface object, thereby improving user-device interaction.

In some embodiments, the second air gesture performed by the first portion of the user is a second hand gesture (e.g., an air pinch gesture or an air tap or touch gesture, as similarly described above with reference to step(s) 3202), different from the first hand gesture, that is performed using at least a first finger (e.g., an index finger and/or a thumb) of the hand of the user (3208), such as index finger 3110-2 and/or thumb 3110-1 of the hand 3103*a* in FIG. 31A. Displaying a selection user interface object that indicates a location at which a selection operation will be performed in response to an air pinch gesture or an air tap gesture improves accuracy for performing the selection operation, avoids or reduces instances of unintentional performance of the selection operation, and/or reduces the number of inputs needed to display the selection user interface object, thereby improving user-device interaction.

In some embodiments, in response to detecting the first air gesture, in accordance with the determination that the first air gesture satisfies the second set of interaction criteria, the selection user interface object is displayed at a location of the user interface corresponding to a location of the gaze of the user (3210) (e.g., as similarly described above with reference to step(s) 3202, when the selection user interface object is first displayed in the three-dimensional environment, the selection user interface object is displayed at the location of the gaze), such as displaying the selection user interface object 3111*a* at the location of the gaze 3121 as shown in FIGS. 31B and 31B1. In some embodiments, when the selection user interface object is displayed in the user interface, the display of the selection user interface object is bound or limited to a perimeter/boundary of the user interface (e.g., an edge of the virtual object displaying the user interface). Displaying a selection user interface object that indicates a location at which a selection operation will be performed in response to further input based on a location of a gaze of the user improves accuracy for performing the selection operation and/or reduces the number of inputs needed to display the selection user interface object at an appropriate location, thereby improving user-device interaction.

In some embodiments, the first set of interaction criteria includes a criterion that is satisfied in accordance with a determination that the gaze of the user is directed to a respective object (e.g., the first object) having a size that is greater than a threshold size (e.g., a width (e.g., for rectangular objects), diameter (e.g., for circular objects) of 0.1, 0.25. 0.5, 0.75, 0.9, 1, 2, 3, or 5 cm relative to the viewpoint of the user and/or an area of the object (e.g., based on the width or diameter of the object discussed above) greater than 0.1, 0.3, 0.5, 1, 3, 5, 10, 100, 1,000 or 10,000 cm$^2$) when an air gesture (e.g., such as one of the air gestures described above with reference to step(s) 3202 with respect to the first air gesture) is detected (3212*a*), as similarly described with reference to selectable option 3104*a* as described with reference to FIGS. 31B and 31B1. In some embodiments, the first set of interaction criteria is therefore not satisfied in accordance with a determination that the gaze of the user is directed to a respective object having a size that is within the threshold size when the air gesture is detected.

In some embodiments, while displaying the selection user interface object in the user interface in accordance with the determination that the first air gesture satisfies the second set of interaction criteria in response to detecting the first input, the computer system detects (3212*b*), via the one or more input devices, a third air gesture performed by the first portion of the user corresponding to a selection input (e.g., an air pinch gesture or an air tap or touch gesture, as similarly described above with reference to step(s) 3202), such as air gesture performed by hand 3103*h* as shown in FIG. 31I. In some embodiments, in response to detecting the third air gesture (3212*c*), in accordance with a determination that the selection user interface object is located at a location corresponding to a second object (e.g., a second virtual object, such as a selectable option, image, text, and/or hyperlink) when the third air gesture is detected, such as text-entry field 3108*c* as shown in FIG. 31I, the computer system selects (3212*d*) (e.g., activating) the second object in the user interface, such as selecting the text-entry field 3108*c* as shown in FIG. 31J, wherein the second object has a size that is within the threshold size (e.g., which does not satisfy the first set of interaction criteria discussed above). For example, the second object is a relatively small object from the viewpoint of the user, and when the third air gesture is detected, the selection user interface object is positioned over the second object, which causes the computer system to select the second object in the user interface. In some embodiments, selecting the second object in the user interface has one or more characteristics of selecting objects as discussed above with reference to step(s) 3202. In some embodiments, because the second object has a size that is within the threshold size discussed above, if the selection user interface object were not displayed in the user interface and if the gaze of the user were directed to the second object when the third air gesture was detected, the computer system would forgo selecting the second object in response to detecting the third air gesture because the first set of interaction criteria would not be satisfied. Accordingly, in some embodiments, the selection user interface object is controllable via hand-based input to select relatively small objects that otherwise would not be targetable solely based on the gaze of the user. In some embodiments, in accordance with a determination that the selection user interface object is located at a location that does not correspond to the second object when the third air gesture is detected, the computer system forgoes selecting the second object in the user interface. Displaying a selection user interface object that indicates a location at which a selection operation will be performed in response to further input in response to detecting an air gesture that satisfies a respective set of criteria improves accuracy for performing the selection operation directed to small objects and/or reduces or avoids instances of unintentional performance of the selection operation based on a gaze of the user, thereby improving user-device interaction.

In some embodiments, the first object has a size that is within the threshold size (3214*a*) (e.g., a width (e.g., for rectangular objects), diameter (e.g., for circular objects) of 0.1, 0.25. 0.5, 0.75, 0.9, 1, 2, 3, or 5 cm relative to the viewpoint of the user, and/or an area of the object (e.g., based on the width or diameter of the object discussed above)). In some embodiments, in response to detecting the first air gesture that corresponds to a selection input (e.g., an air pinch gesture or an air tap or touch gesture as similarly described above with reference to step(s) 3202), in accordance with a determination that the first air gesture does not satisfy the first set of interaction criteria (e.g., because the gaze of the user is directed to an object that has a size less than the threshold size) and the gaze of the user is directed to the first object in the user interface when the first air gesture is detected (3214*b*), such as the gaze 3123 directed to the selectable option 3104*a* in FIG. 31A, the computer system forgoes (3214*c*) selecting (e.g., activating) the first object in the user interface, such as displaying the menu element 3112 that is associated with the selectable option 3104*a* as shown in FIGS. 31B and 31B1. For example, as similarly described above with reference to step(s) 3212, the first air gesture does not satisfy the first set of interaction criteria because the gaze is directed to the first object that is within the threshold size (e.g., the first object is a relatively small object from the viewpoint of the user). Accordingly, in some embodiments, the computer system does not select the first object in the three-dimensional environment in response to detecting the first air gesture.

In some embodiments, the computer system selects (3214*d*) a third object (e.g., a third virtual object, such as a selectable option, image, text, and/or hyperlink) that is within a threshold distance (e.g., 0.1, 0.25, 0.5, 0.75, 1, 1.5, 2, 3, 4, or 5 cm) from the first object in the user interface, wherein the third object has a size that is greater than the threshold size, as similarly described with reference to FIGS. 31B and 31B1. For example, the computer system auto-targets and selects the third object that is within the threshold distance of the first object, even though the gaze of the user is directed to the first object, because the third object is large enough to be targetable via gaze. In some embodiments, as similarly described above with reference to step(s) 3202, the first air gesture corresponds to a selection input (e.g., the first air gesture is an air pinch gesture or an air tap or touch gesture), which causes the computer system to select the third object after the third object auto targeted. In some embodiments, selecting the third object in the user interface has one or more characteristics of selecting objects as described above with reference to step(s) 3202. In some embodiments, if the third object were more than the threshold distance from the first object in the user interface and/or the third object had a size that is greater than the threshold size, the computer system would forgo selecting the third object in the three-dimensional environment. Accordingly, as outlined above, the computer system optionally auto-targets some elements in the three-dimensional environment based on the gaze of the user (e.g., if an object has one or more of the above characteristics) and does not auto-target elements when the selection user interface object is displayed (e.g., the selection user interface object is controllable to select relatively large and small objects in the three-dimensional environment). In some embodiments, in response to detecting the first input, in accordance with a determination that the location of the gaze corresponds to the location of the third object in the user interface and that the first air gesture satisfies the first set of interaction criteria (e.g., because the gaze of the user is directed to an object that has a size greater than the threshold size), the computer system selects (e.g., activates) the third object as similarly discussed above. Selectively performing a selection operation in a user interface based on a size of a selectable object and/or a location of a gaze of the user in the user interface improves accuracy for performing the selection operation directed to small selectable objects and/or reduces or avoids unintentional performance of the selection operation based on the gaze, thereby improving user-device interaction.

In some embodiments, while displaying the selection user interface object in the user interface in accordance with the determination that the first air gesture satisfies the second set of interaction criteria in response to detecting the first input, the computer system detects (3216*a*), via the one or more input devices, an air gesture corresponding to a selection input (e.g., an air pinch gesture or an air tap or touch gesture as similarly described above with reference to step(s) 3202), such as selection input provided by the hand 3105*a* in FIG. 31A. In some embodiments, the first air gesture is an air pinch and drag gesture. For example, the computer system detects the hand of the user perform an air pinch gesture, as similarly described above with reference to step(s) 3202, followed by movement of the hand while the hand is in a pinch hand shape (e.g., while the index finger and thumb of the user remain in contact). In some embodiments, the computer system detects the hand of the user move in the pinch hand shape with a respective magnitude (e.g., of speed and/or distance) and in a respective direction (e.g., upward or downward relative to the user interface).

In some embodiments, in response to detecting the air gesture (3216*b*), in accordance with a determination that a location of the selection user interface object corresponds to a location of selectable text (e.g., the selection user interface object is located over the selectable text, such as text within a sentence or a paragraph and/or a hyperlink, as similarly described above with reference to step(s) 3202, when the air gesture is detected) in the user interface when the air gesture is detected, such as the selection user interface object 3111*a* positioned over a portion of the text 3116 in FIG. 31C, the computer system selects (3216*c*) the selectable text (e.g., activating or highlighting the selectable text, as similarly described above with reference to step(s) 3202), such as displaying the portion of the text 3116 with highlighting 3120 as shown in FIG. 31D. In some embodiments, the computer system selects (e.g., highlights) the text in the user interface based on the movement of the hand in the pinch hand shape. For example, if the computer system detects the hand move in a first direction (e.g., upward) in space with a magnitude, the computer system highlights the text in the user interface, optionally including a second portion of the text, that is above (e.g., and/or adjacent to) the location of the selection user interface object in the user interface. In some embodiments, if the computer system detects the hand move in a second direction (e.g., downward), different from the first direction, in space with a magnitude, the computer system highlights the text in the user interface, optionally including a third portion of the text, that is below (e.g., and/or adjacent to) the location of the selection user interface object in the user interface. Displaying a selection user interface object that indicates a location over text at which a selection operation will be performed in response to further input in response to detecting an air gesture that satisfies a respective set of criteria improves accuracy for performing the selection operation and/or reduces the number of inputs needed to display the selection user interface object, thereby improving user-device interaction.

In some embodiments, while displaying the selection user interface object in the user interface in accordance with the determination that the first air gesture satisfies the second set of interaction criteria in response to detecting the first input, the computer system detects (3218a) that a respective event that satisfies one or more criteria has occurred, such as selection of an object (e.g., text 3116) as shown in FIG. 31D. For example, the computer system detects an input that causes the computer system to perform a respective operation in accordance with the input. In some embodiments, the respective event includes a repeat of the first air gesture that satisfies the second set of interaction criteria discussed above with reference to step(s) 3202. For example, the respective event includes detecting a hand shake air gesture, a knob turning air gesture, an air pinch gesture, and/or a double air pinch gesture as discussed above with reference to step(s) 3202. Additional examples of the respective event that satisfies the one or more criteria are described below with reference to step(s) 3220-3226.

In some embodiments, in response to detecting the respective event (3218b), the computer system ceases (3218c) display of the selection user interface object in the user interface, such as ceasing display of the selection user interface object 3111a as shown in FIG. 31D. For example, interaction with selectable objects in the user interface returns to gaze-based interaction, as similarly described above with reference to step(s) 3202. In some embodiments, the selection user interface object is able to be displayed and controllable in the user interface for an indefinite amount of time. For example, the computer system does not cease display of the selection user interface object until detecting that the respective event has occurred. Ceasing display of a selection user interface object that indicates a location at which a selection operation will be performed in response to further input in response to detecting that a respective event has occurred enables the selection user interface object to cease to be displayed automatically and/or reduces the number of inputs needed to cease display of the selection user interface object, thereby improving user-device interaction.

In some embodiments, detecting that the respective event that satisfies the one or more criteria has occurred includes determining that a respective object (e.g., such as the first object) is selected, such as selection of the portion of the text 3116 as shown in FIG. 31D, in response to detecting a respective air gesture performed by the first portion of the user (e.g., an air pinch gesture and/or an air tap or touch gesture provided by the hand of the user, as similarly described above with reference to step(s) 3202) that corresponds to a selection input while the selection user interface object is displayed (3220) (e.g., the one or more criteria include a criterion that is satisfied when input selecting the respective object is detected), such as air gesture performed by the hand 3103c as shown in FIG. 31C. For example, the computer system ceases display of the selection user interface object after performing a selection of an object in the user interface, such as the selection of the first object as similarly described above with reference to step(s) 3202. In some embodiments, as similarly described above with reference to step(s) 3202, the computer system performs the selection operation directed to the respective object in response to detecting the respective air gesture while a location of the selection user interface object corresponds to a location of the respective object in the user interface. Ceasing display of a selection user interface object that indicates a location at which a selection operation will be performed in response to further input after performing the selection operation enables the selection user interface object to cease to be displayed automatically and/or reduces the number of inputs needed to cease display of the selection user interface object, thereby improving user-device interaction.

In some embodiments, detecting that the respective event that satisfies the one or more criteria has occurred includes determining that the user interface is scrolled, such as scrolling the text 3116 in the virtual object 3107 as shown in FIG. 31F, in response to detecting a respective input performed by the first portion of the user that corresponds to a scrolling input while the selection user interface object is displayed (3222) (e.g., the one or more criteria include a criterion that is satisfied when input scrolling the user interface is detected), such as scrolling input provided by the hand 3103e as shown in FIG. 31E. For example, the computer system ceases display of the selection user interface object after scrolling the user interface (e.g., scrolling the user interface upward or downward) in the three-dimensional environment. In some embodiments, the respective air gesture that corresponding to a scrolling input is an air pinch and drag gesture. For example, the computer system detects the hand of the user perform an air pinch gesture, as similarly described above with reference to step(s) 3202, followed by movement of the hand while the hand is in a pinch hand shape (e.g., while the index finger and thumb of the user remain in contact). In some embodiments, the computer system detects the hand of the user move in the pinch hand shape with a respective magnitude (e.g., of speed and/or distance) and in a respective direction. In some embodiments, the computer system scrolls the user interface based on the movement of the hand in the pinch hand shape. For example, if the computer system detects the hand move in a first direction (e.g., upward) in space with a magnitude, the computer system scrolls the user interface in a first respective direction (e.g., upward), based on the first direction, and with a respective magnitude that is based on the magnitude of the movement of the hand. In some embodiments, if the computer system detects the hand move in a second direction (e.g., downward), different from the first direction, in space with a magnitude, the computer system scrolls the user interface in a second respective direction (e.g., downward), based on the second direction, and with a respective magnitude that is based on the magnitude of the movement of the hand. In some embodiments, the computer system scrolls the user interface in response to detecting the respective input in accordance with a determination that the selection user interface object is located over "white space"

in the user interface (e.g., a region or portion of the user interface that does not contain content and/or selectable objects). In some embodiments, if the selection user interface object is not located over white space in the user interface when the respective input is performed, the computer system forgoes scrolling the user interface (e.g., and performs an alternative operation, such as a highlighting or selection operation at the location of the selection user interface object). Ceasing display of a selection user interface object that indicates a location at which a selection operation will be performed in response to further input after performing a scrolling operation enables the selection user interface object to cease to be displayed automatically and/or reduces the number of inputs needed to cease display of the selection user interface object, thereby improving user-device interaction.

In some embodiments, detecting that the respective event that satisfies the one or more criteria has occurred includes detecting that the gaze of the user is directed more than a threshold distance (e.g., 1, 2, 3, 5, 10, 15, 20, 30, 40, 60, or 100 cm) away from the selection user interface object in the user interface (3224) (e.g., and optionally for more than a threshold amount of time, such as 1, 2, 3, 5, 8, 10, 15, 30, 45, 60, 90, 120, 180, or 200 seconds) (e.g., the one or more criteria include a criterion that is satisfied when gaze more than the threshold distance away from the selection user interface object is detected, optionally for more than the threshold amount of time), as represented in legend 3125 in FIG. 31H. For example, the computer system ceases display of the selection user interface object in the user interface after detecting a location of the gaze of the user is more than the threshold distance from the location of the selection user interface object in the user interface. In some embodiments, the gaze is directed to a second object and/or a second user interface, different from the user interface, which is more than the threshold distance from the location of the selection user interface object in the user interface. In some embodiments, as discussed in more detail below with reference to step(s) 3230, if the computer system detects the gaze of the user directed back to within the threshold distance from the selection user interface object, the computer system redisplays (or does not redisplay) the selection user interface object in the user interface (e.g., at the current location of the gaze). Ceasing display of a selection user interface object that indicates a location at which a selection operation will be performed in response to further input after detecting the gaze of the user is directed more than a threshold distance from the selection user interface object enables the selection user interface object to cease to be displayed automatically, helps avoid unintentional dismissal of the selection user interface object based on quick eye movements, and/or reduces the number of inputs needed to cease display of the selection user interface object, which reduces appearance of clutter or oversaturation of elements in the user interface after the gaze is directed away from the selection user interface, thereby improving user-device interaction.

In some embodiments, detecting that the respective event that satisfies the one or more criteria has occurred includes detecting that the first portion of the user (e.g., the hand of the user providing the inputs discussed above with reference to step(s) 3202) is lowered to below a threshold elevation (e.g., −25, −30, −35, −40, −45, −50, −55, −60, or −70 degrees) relative to a viewpoint of the user (3226) (e.g., a reference ray/vector that extends horizontally from the viewpoint of the user into the three-dimensional environment and that is parallel to a ground/surface on which the user is positioned) (e.g., the one or more criteria include a criterion that is satisfied when lowering of the first portion of the user below the threshold elevation is detected), such as movement of hand 3105f below the threshold elevation as shown in FIG. 31G. For example, the computer system ceases display of the selection user interface object in the user interface after detecting the hand of the user move/lower to below the threshold elevation relative to the viewpoint of the user. In some embodiments, when the first portion of the user is lowered to below the threshold elevation relative to the viewpoint of the user, the first portion of the user is no longer detectable in the field of view of the user. For example, the hand of the user is lowered to a resting position at the user's waist and/or side (e.g., and thus out of the user's field of view). In some embodiments, as discussed in more detail below with reference to step(s) 3230, if the computer system detects the hand of the user move back to within the threshold elevation relative to the viewpoint of the user, the computer system redisplays (or does not redisplay) the selection user interface object in the user interface (e.g., at the current location of the gaze). Ceasing display of a selection user interface object that indicates a location at which a selection operation will be performed in response to further input after detecting the hand of the user lower to below a threshold elevation relative to a viewpoint of the user enables the selection user interface object to cease to be displayed automatically and/or reduces the number of inputs needed to cease display of the selection user interface object, thereby improving user-device interaction.

In some embodiments, ceasing display of the selection user interface object in the user interface includes gradually (e.g. over a predefined period, such as 0.25, 0.5, 0.75, 1, 1.5, 2, 3, 5, or 10 seconds) fading the selection user interface object (3228), such as fading the selection user interface object 3111b as shown in FIG. 31H. For example, gradually fading the selection user interface object in the user interface includes gradually increasing a translucency of the selection user interface object until the selection user interface object is completely transparent (e.g., and thus is no longer displayed/visible). In some embodiments, gradually fading the selection user interface object includes gradually decreasing a size of the selection user interface object until the selection user interface object has an imperceptible size (e.g., and thus is no longer displayed/visible). In some embodiments, gradually fading the selection user interface object in the user interface includes gradually decreasing a brightness of the selection user interface until the selection user interface object is displayed an imperceptible amount of brightness (e.g., and thus is no longer displayed/visible). In some embodiments, gradually fading the selection user interface object is controlled by (e.g., corresponds to) a progress of the respective event. For example, the computer system gradually fades the selection user interface object to indicate a progress of the gaze of the user moving to outside the threshold distance of the location of the selection user interface object, as discussed above with reference to step(s) 3224, and/or a progress of the hand of the user lowering to below the threshold elevation relative to the viewpoint of the user, as discussed above with reference to step(s) 3226. Gradually fading display of a selection user interface object that indicates a location at which a selection operation will be performed in response to further input after detecting a respective event has occurred facilitates discovery that the selection user interface object is going to cease to be displayed and/or reduces the number of inputs needed to cease display of the selection user interface object, thereby improving user-device interaction.

In some embodiments, while gradually fading the selection user interface object and before detecting completion of the respective event, the computer system detects (3230a) a second respective event, such as movement of the gaze 3123 back wo within the threshold distance of the selection user interface object 3111b as shown in the legend 3125 in FIG. 31I. For example, the computer system detects input directed to and/or otherwise involving the selection user interface object in the user interface. In some embodiments, detecting the second respective event includes detecting movement of the gaze of the user in the three-dimensional environment. In some embodiments, detecting the second respective event includes detecting an air gesture, such as an air pinch gesture and/or an air tap or touch gesture as similarly described above with reference to step(s) 3202. In some embodiments, detecting the second respective event includes detecting movement of the first portion of the user (e.g., the hand of the user).

In some embodiments, in response to detecting the second respective event (3230b), in accordance with a determination that the second respective event satisfies one or more second criteria, the computer system restores (3230c) display of (e.g., redisplaying) the selection user interface object in the user interface, such as reversing the fading of the selection user interface object 3111b as shown in FIG. 31I. For example, the computer system reverses the gradual fading of the selection user interface object in the user interface such that the selection user interface has an appearance that corresponds to the appearance of the selection user interface object before the respective event was detected. In some embodiments, the second respective event satisfies the one or more second criteria in accordance with a determination that the selection user interface has not been completely faded (e.g., is no longer displayed) in the user interface when the second respective event is detected. In some embodiments, as similarly described above with reference to step(s) 3224, the computer system gradually fades the selection user interface object in the user interface object in response to detecting the gaze of the user is directed more than a threshold distance (e.g., 1, 2, 3, 5, 10, 15, 20, 30, 40, 60, or 100 cm) away from the selection user interface object in the user interface. In some embodiments, the second respective event satisfies the one or more second criteria if the computer system detects the gaze move and/or is directed to a location in the three-dimensional environment that is within the threshold distance of the location of the selection user interface object. In some embodiments, as similarly described above with reference to step(s) 3226, the computer system gradually fades the selection user interface object in the user interface in response to detecting that the first portion of the user (e.g., the hand of the user) is lowered to below a threshold elevation (e.g., −25, −30, −35, −40, −45, −50, −55, −60, or −70 degrees) relative to the viewpoint of the user. In some embodiments, the second respective event satisfies the one or more second criteria if the computer system detects the first portion of the user move and/or rise to above the threshold elevation relative to the viewpoint of the user. In some embodiments, the second respective event satisfies the one or more second criteria if, before the selection user interface object is completely faded in the user interface, the computer system detects an air gesture, such as an air pinch gesture, and/or an air tap or touch gesture, as similarly described above. Reversing fading display of a selection user interface object that indicates a location at which a selection operation will be performed in response to further input after detecting a respective event has occurred in response to detecting a second respective event that corresponds to a reversal of the respective event reduces the number of inputs needed to redisplay or maintain display of the selection user interface object and/or enables the reversing and/or stopping the ceasing of display of the selection user interface object to be done automatically, thereby improving user-device interaction.

In some embodiments, while displaying the selection user interface object in accordance with the determination that the first air gesture satisfies the second set of interaction criteria in response to detecting the first input, the computer system detects (3232a), via the one or more input devices, a respective input corresponding to a request to cease display of the selection user interface object, such as input provided by the hand 3103f inf FIG. 31F. For example, the computer system detects an air gesture, such as an air pinch gesture and/or an air tap or touch gesture provided by the hand of the user, as similarly described above with reference to step(s) 3202, while a location of the selection user interface object corresponds to a location of an object (e.g., such as the first object discussed above with reference to step(s) 3202) in the user interface. In some embodiments, the respective input corresponds to a selection input, as similarly described above with reference to step(s) 3202. In some embodiments, the respective input is detected while the location of the selection user interface object does not correspond to a location of an object in the user interface. For example, the selection user interface object is located over "white space" in the user interface in the three-dimensional environment.

In some embodiments, in response to detecting the respective input (3232b), the computer system ceases (3232c) display of the selection user interface object in the user interface (e.g., in a similar manner as described above with reference to step(s) 3218-3230), such as ceasing display of the selection user interface object 3111a as shown in FIG. 31G. In some embodiments, if the location of the selection user interface object corresponds to a location of a selectable object (e.g., such as the first object) in the user interface when the respective input is detected, the computer system also selects (e.g., activates) the object in the user interface in a similar manner as described above with reference to step(s) 3202 when the selection user interface object ceases to be displayed. In some embodiments, the computer system forgoes selecting the object in the user interface even if the location of the selection user interface object corresponds to the location at which the selectable object is/was displayed (e.g., because the selection user interface object is no longer being displayed). In some embodiments, if the location of the selection user interface object does not correspond to a location of a selectable object in the user interface when the respective input is detected, the computer system forgoes performing an operation in the user interface when the selection user interface ceases to be displayed. Ceasing display of a selection user interface object that indicates a location at which a selection operation will be performed in response to further input in response to detecting an input for ceasing display of the selection user interface object reduces the number of inputs needed to cease display of the selection user interface object and/or enables the selection user interface object to remain being displayed for a user-desired duration, thereby improving user-device interaction.

In some embodiments, while displaying the selection user interface object after detecting the second air gesture (e.g., and after selecting the first object in the user interface in response to detecting the second air gesture), the computer system detects (3234a), via the one or more input devices, a respective input directed to a second object (e.g., a second virtual object, such as a selectable option, image, text, and/or hyperlink), different from the first object (optionally in a second user interface (e.g., of a second application window), different from the user interface), such as input provided by hand 3103*h* in FIG. 31I. For example, the computer system detects an air gesture, such as an air pinch gesture and/or an air tap or touch gesture provided by the hand of the user, as similarly described above with reference to step(s) 3202, while the gaze of the user is directed to the second object. In some embodiments, a location of the selection user interface object does not correspond to a location of an object in the user interface when the respective input is detected.

In some embodiments, in response to detecting the respective input directed to the second object (3234*b*), the computer system ceases (3234*c*) display of the selection user interface object in the user interface (e.g., in a similar manner as described above with reference to step(s) 3218-3232), such as ceasing display of the selection user interface object 3111*a* as shown in FIG. 31J. For example, because the respective input is directed to the second object that is optionally in a different user interface from the user interface in which the selection user interface object is displayed, the computer system ceases display of the selection user interface object in the user interface. In some embodiments, when the computer system ceases display of the selection user interface object in the user interface in response to detecting the respective input, the computer system also performs an operation directed to the second object in the second user interface in accordance with the respective input. For example, if the respective input corresponds to a selection input, the computer system selects (e.g., activates) the second object in the second user interface in a similar manner as described previously with reference to step(s) 3202. Ceasing display of a selection user interface object that indicates a location in a first user interface at which a selection operation will be performed in response to further input in response to detecting an input directed to a second user interface enables the selection user interface object to cease to be displayed automatically, which reduces the number of inputs needed to cease display of the selection user interface object, and/or provides visual feedback that further interaction/input that is detected will be directed to the second object rather than the first object, thereby improving user-device interaction.

In some embodiments, while the selection user interface object is located at the location corresponding to the first object and before detecting the second air gesture (3236*a*), in accordance with a determination that the first object includes content of a first type (e.g., non-textual content, such as an option, an image, or a hyperlink), such as option 3108*a* in FIGS. 31B and 31B1, the computer system displays (3236*b*), via the display generation component, the selection user interface object with a first visual appearance, such as the display of the selection user interface object 3111*a* as shown in FIGS. 31B and 31B1. For example, while the selection user interface object is located over content of the first type, the computer system displays the selection user interface object with a first shape, a first size, a first color, a first amount of brightness, and/or a first amount of translucency. In some embodiments, the selection user interface object is displayed as a pointer cursor when the first object includes content of the first type.

In some embodiments, in accordance with a determination that the first object includes content of a second type (e.g., text-based content, such as words in a sentence or paragraph), different from the first type, such as text 3116 in FIG. 31C, the computer system displays (3236*c*) the selection user interface object with a second visual appearance, different from the first visual appearance, such as the display of the selection user interface object 3111*a* as shown in FIG. 31C. For example, while the selection user interface object is located over content of the second type, the computer system displays the selection user interface object with a second shape (e.g., different from the first shape), a second size (e.g., different from the first size), a second color (e.g., different from the first color), a second amount of brightness (e.g., different from the first amount of brightness), and/or a second amount of translucency (e.g., different from the first amount of translucency). In some embodiments, the selection user interface object is displayed as a text cursor (e.g., I-beam or T-beam cursor) when the first object includes content of the second type. Changing an appearance of a selection user interface object that indicates a location at which a selection operation will be performed in response to further input based on a type of content at the location provides visual feedback regarding the type of content that will be selected in response to the further input and/or facilitates discovery that a particular object including content is selectable in the user interface, thereby improving user-device interaction.

In some embodiments, in response to detecting the second air gesture (3238*a*) (e.g., an air pinch gesture or air tap or touch gesture as similarly described above with reference to step(s) 3202), in accordance with a determination that the selection user interface object is located at the location corresponding to the first object and the gaze of the user is directed to the first object when the second air gesture is detected (e.g., the selection user interface object and the gaze are both located at a location of the first object in the user interface when the second air gesture is detected), such as the selection user interface object 3111*a* and the gaze 3121 located over the text-entry field 3108*c* as shown in FIG. 31I, the computer system calibrates (3238*b*) a determined location of the gaze relative to the user interface based on a respective portion of the first object, such as calibration of the gaze 3121 as illustrated by legend 3140*a* in FIG. 31J. For example, the computer system recalibrates the determined location of the gaze of the user relative to correspond to a center (or other predefined reference point) of the first object because the location of the selection user interface object is also directed to the first object. In some embodiments, recalibrating the location of the gaze enables the computer system to increase efficiency of and improve accuracy of tracking the location of the gaze in the three-dimensional environment (e.g., for gaze-based interactions). In some embodiments, the determined location of the gaze includes positional characteristics, such as a horizontal component (e.g., along an x direction), a vertical component (e.g., along a y direction), and/or a depth component (e.g., along a z direction). In some embodiments, when the second air gesture is detected above, if any of the components of the position of the gaze deviate from the predefined reference point (e.g., center) of the first object (e.g., in the x, y, and/or z directions), the computer system applies an offset correction to those components based on (e.g., equal to) the deviation such that, post-calibration, a determined location of the gaze utilizes the corrected offset to more accurately track the location of the gaze in the three-dimensional environment. For example, if the determined location of the gaze is a first distance from the predefined reference point of the first object in the x direction, the computer system applies an offset correction to the x direction offset to reduce the offset by the first distance (e.g., or some distance proportional to the first distance). As another example, if the determined location of the gaze is a second distance from the predefined reference point of the first object in the y direction, the computer system applies an offset correction to the y direction offset to reduce the offset by the second distance (e.g., or some distance proportional to the second distance). In some embodiments, the recalibration of the location of the gaze is based on a size of the first object at which the selection user interface object and the gaze of the user are directed, as described in more detail below with reference to step(s) 3240 and 3242. In some embodiments, in addition to calibrating the location of the gaze relative to the user interface in response to detecting the second air gesture, the computer system selects the first object in the user interface, as similarly described above with reference to step(s) 3202. In some embodiments, in accordance with a determination that the selection user interface is located at the location corresponding to the first object, but the gaze is not directed to the first object, when the second air gesture is detected, the computer system selects the first object in the user interface without calibrating the location of the gaze relative to the respective portion of the first object. In some embodiments, after the determined location of the gaze is calibrated relative to the user interface based on the respective portion of the first object in accordance with the determination that the selection user interface object is located at the location corresponding to the first object and the gaze of the user is directed to the first object when the second air gesture is detected, if the computer system detects a third air gesture that corresponds to a selection input, as similarly discussed above with reference to step(s) 3202, and the selection user interface object is no longer displayed in the user interface, the computer system performs a selection based on the calibrated determined location of the gaze (e.g., which is optionally different from the determined location of the gaze prior to the calibration). The response of the computer system to detecting such a third air gesture (e.g., the selection and/or interaction with the user interface based on gaze, post-calibration) is optionally different from the response of the computer system to detecting such a third air gesture if the above-described calibration of the gaze was not performed (e.g., a different element in the user interface would have been selected (e.g., a different button, or a different portion of text), a different action would have been performed in the user interface and/or a different amount of interaction (e.g., scrolling or movement) would have been performed in the user interface). Calibrating a location of the gaze of the user relative to a selectable object in a user interface in response to detecting an air gesture if the location of the gaze and a location of a selection user interface object that indicates a location at which a selection operation will be performed in response to further input correspond to a location of the selectable object improves accuracy for targeting selectable objects that are targetable using the gaze, thereby improving user-device interaction.

In some embodiments, calibrating the determined location of the gaze relative to the user interface based on a respective portion (e.g., a center) of the first object includes (3240a), in accordance with a determination that the first object has a size that is within a threshold size (e.g., a width (e.g., for rectangular objects), diameter (e.g., for circular objects) of 0.1, 0.25. 0.5, 0.75, 0.9, 1, 2, 3, or 5 cm relative to the viewpoint of the user, and/or area (e.g., based on the width or diameter discussed above) less than 0.1, 0.3, 0.5, 1, 3, 5, 10, 100, 1,000 or 10,000 cm2), such as the size of New Releases option in the menu element 3112 in FIG. 31I, and a horizontal component of the location of the gaze (e.g., "x" in the legend 3140b in FIG. 31I) is offset from the respective portion of the first object (e.g., represented by square 3142b in the legend 3140b in FIG. 31I) by a first amount, and a vertical component of the location of the gaze (e.g., "y" in the legend 3140b in FIG. 31I) is offset from the respective portion of the first object by a second amount (3240b) (e.g., different from the first amount), (e.g., the first object is a relatively small object from the viewpoint of the user in the three-dimensional environment), changing an offset of the horizontal component by a third amount, based on the first amount (3240c) (e.g., equal to or proportional to the first amount), such as reducing the x offset as shown in the legend 3140b in FIG. 31J. For example, the computer system corrects a horizontal offset of the detected location of the gaze relative to the horizontal component of a determined position of the gaze (e.g., based on the center of the first object in the user interface).

In some embodiments, the computer system changes an offset of the vertical component by a fourth amount, based on the second amount (3240d) (e.g., equal to or proportional to the second amount), such as reducing the y offset as shown in the legend 3140b in FIG. 31J. For example, the computer system corrects a vertical offset of the detected location of the gaze relative to the vertical component of the determined position of the gaze (e.g., based on the center of the first object in the user interface). In some embodiments, when the computer system changes the offset of the horizontal component by the third amount and changes the offset of the vertical component by the fourth amount, the detected location of the gaze substantially aligns and/or overlaps with the respective portion (e.g., the center) of the first object in the three-dimensional environment (e.g., in accordance with a determination that the location of the gaze has not changed since detecting the second air gesture). Calibrating a location of the gaze of the user relative to a small selectable object in a user interface in response to detecting an air gesture if the location of the gaze and a location of a selection user interface object that indicates a location at which a selection operation will be performed in response to further input correspond to a location of the selectable object improves accuracy for targeting selectable objects that are targetable using the gaze, thereby improving user-device interaction.

In some embodiments, calibrating the determined location of the gaze relative to the user interface based on a respective portion (e.g., a center) of the first object includes (3242a), in accordance with a determination that the first object has a size that is greater than a threshold size (e.g., a width (e.g., for rectangular objects) or diameter (e.g., for circular objects) of 0.1, 0.25. 0.5, 0.75, 0.9, 1, 2, 3, or 5 cm relative to the viewpoint of the user and/or an area greater than 0.1, 0.3, 0.5, 1, 3, 5, 10, 100, 1,000 or 10,000 cm2), such as the size of the text-entry field 3108c as shown in FIG. 31I, and a first (e.g., horizontal) component of the location of the gaze (e.g., "x" in the legend 3140a in FIG. 31I) is offset from the respective portion of the first object (e.g., represented by square 3142a in the legend 3140a in FIG. 31I) by a first amount, and a second (e.g., vertical) component of the location of the gaze (e.g., "y" in the legend 3140a in FIG. 31I) is offset from the respective portion of the first object by a second amount, greater than the first amount (3242b), (e.g., the first object is a relatively large object from the viewpoint of the user in the three-dimensional environment), changing an offset of the first component by a third amount, based on the first amount (e.g., equal to or proportional to the first amount), without changing an offset of the second component (3242*c*) (optionally without changing the offset of the second component by any amount), such as reducing the y offset in the legend 3140*a* without reducing the x offset as shown in FIG. 31J. For example, for relatively large objects, such as the first object as discussed above, when calibrating the location of the gaze, the computer system corrects the larger offset between the horizontal offset and the vertical offset of the detected location of the gaze relative to a determined position of the gaze (e.g., based on the center of the first object in the user interface). In some embodiments, because the first (e.g., horizontal) component of the location of the gaze is offset from the respective portion of the first object by an amount that is greater than that of the second (e.g., vertical) component of the location of the gaze, the computer system changes the offset of the first component by the third amount without changing the offset of the second component by any amount. In some embodiments, if the second (e.g., vertical) component of the location of the gaze is offset from the respective portion of the first object by an amount that is greater than that of the first (e.g., horizontal) component of the location of the gaze, the computer system would change the offset of the second component by a respective amount, based on the first amount, without changing the offset of the first component (optionally by any amount). Calibrating a location of the gaze of the user relative to a large selectable object in a user interface in one dimension in response to detecting an air gesture if the location of the gaze and a location of a selection user interface object that indicates a location at which a selection operation will be performed in response to further input correspond to a location of the selectable object improves accuracy for targeting large selectable objects that are targetable using the gaze and reduces the likelihood of incorrect calibrations along a given axis or component, thereby improving user-device interaction, and/or reduces power consumption required for calibrating the location of the gaze in two dimensions.

It should be understood that the particular order in which the operations in method 3200 have been described is merely exemplary and is not intended to indicate that the described order is the only order in which the operations could be performed. One of ordinary skill in the art would recognize various ways to reorder the operations described herein.

FIGS. 33A-33H illustrate examples of a computer system displaying a visual indicator indicating a progress towards selecting a selectable virtual object when certain criteria are met in accordance with some embodiments.

Figure 33A:
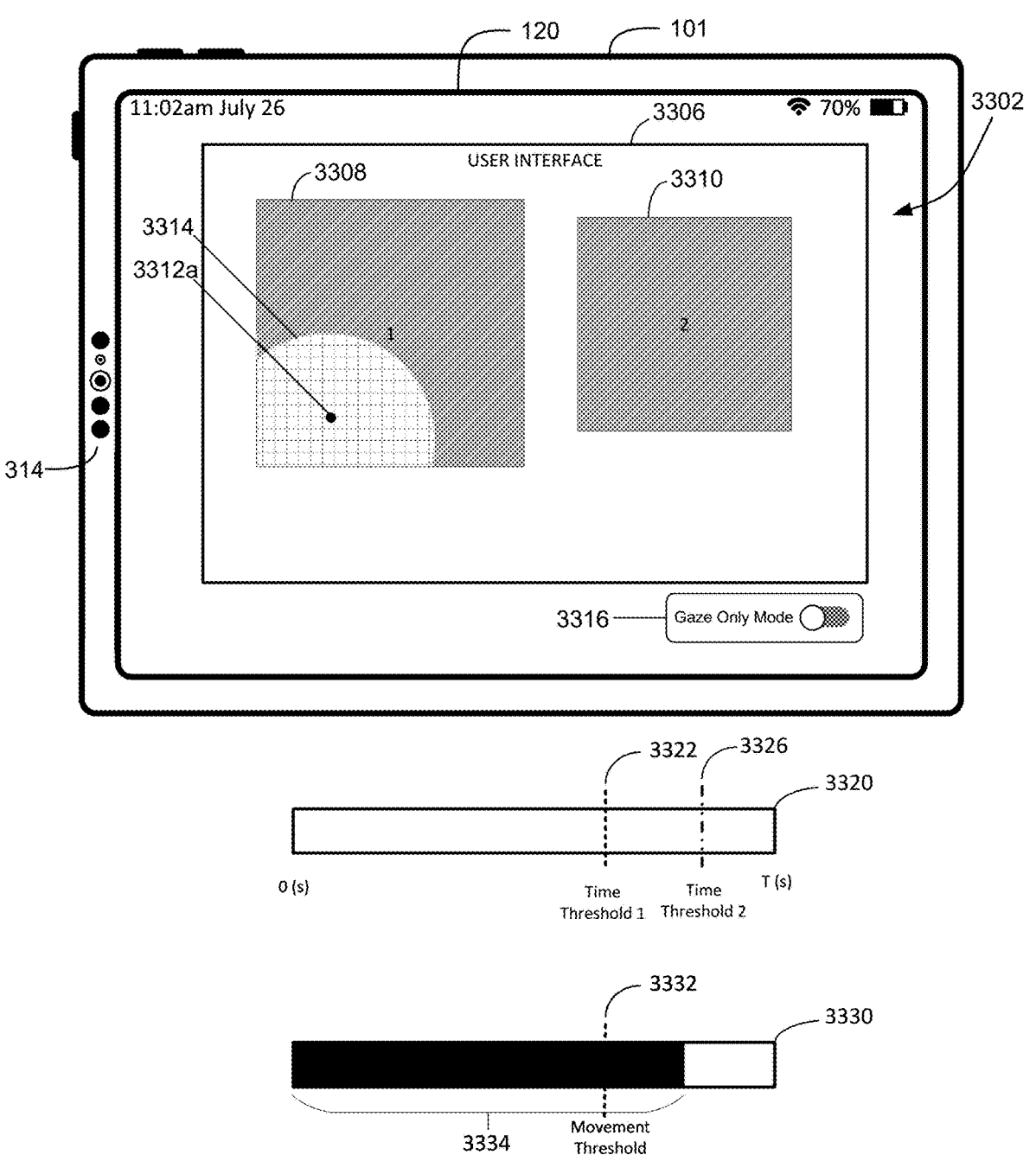
FIGS. 33A-33H illustrate examples of a computer system displaying a visual indicator indicating a progress towards selecting a selectable virtual object when certain criteria are met in accordance with some embodiments.

FIG. 33A illustrates a computer system 101 displaying, via a display generation component (e.g., display generation component 120 of FIG. 1), a three-dimensional environment 3302. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 33A, the computer system 101 captures one or more images of the physical environment around computer system 101 (e.g., operating environment 100), including one or more objects in the physical environment around computer system 101. In some embodiments, the computer system 101 displays representations of the physical environment in three-dimensional environment 3302 or portions of the physical environment are visible via the display generation component 120 of computer system 101. For example, the three-dimensional environment 3302 includes portions of the left and back walls and the floor in the physical environment of the user.

In FIG. 33A, the three-dimensional environment 3302 also includes virtual content, such as virtual content 3306. Virtual content 3306 is optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to methods 1200, 2800, and/or 3400. In FIG. 33A, virtual content 3306 is a user interface that includes selectable virtual objects 3308 and 3310, which are optionally selectable to perform corresponding functions, as described in more detail with reference to methods 1200 and/or 3400. In some embodiments, input to the computer system 101 is provided via attention of the user (e.g., gaze-based inputs) (e.g., as described in more detail with reference to methods 1200, 2800, and/or 3400).

In some embodiments, in response to detecting attention of the user directed to a selectable object in three-dimensional environment 3302, the computer system 101 displays a visual indication of such attention in three-dimensional environment 3302. In FIG. 33A, the computer system 101 detects attention 3312*a* directed to selectable virtual object 3308, and displays an attention indicator 3314 at the location of the attention 3312*a* within the selectable virtual object 3308. As shown in FIG. 33A, the attention indicator 3314 optionally has a circular shape, and is optionally a visually emphasized portion of the selectable virtual object 3308 that visually emphasizes the location of attention 3312*a* with respect to portions of selectable object 3308 that do not have attention. In some embodiments, the attention indicator 3314 comprises a virtual lighting effect that has a gradient of magnitude, in which the magnitude of the virtual lighting effect decreases as a function of distance from the location of the attention 3312*a*. Further, the attention indicator 3314 is optionally masked and/or cutoff by the boundaries of the selectable virtual object 3308 to which attention 3312*a* is directed, such that the attention indicator 3314 is not displayed outside of such boundaries. In some embodiments, attention indicator 3314 includes one more characteristics of gaze-based attention indicators described with reference to method 1200, second visual feedback described with reference to method 2800, and/or visual feedback described with reference to method 3400.

In FIG. 33A, the three-dimensional environment 3302 also includes user interface element 3316 (e.g., toggle) (e.g., as described with reference to method 3400) that controls whether a gaze-only input mode is enabled. In some embodiments, when the user interface element 3316 is "toggled on", the computer system 101 accepts only gaze-based inputs. In some embodiments, when the user interface element 3316 is "toggled off", the computer system 101 optionally accepts gaze-based inputs as well as inputs other than gaze-based inputs (e.g., direct and/or indirect inputs). In some embodiments, when the user interface element 3316 is "toggled off", the computer system 101 optionally does not accept gaze-only inputs. As shown in FIGS. 33A-33H, the user interface element 3316 is "toggled on"; thus, the computer system 101 accepts only gaze-based inputs.

Further, FIGS. 33A-33H illustrate a time bar indicative of the amount of time elapsed since attention of the user is directed a selectable virtual object and meets certain criteria as well as a movement bar indicative of movement of the attention of the user relative to the selectable virtual object. For example, in FIG. 33A, the movement bar 3330 includes a movement threshold indicator 3332. Even though attention 3312a is directed to the selectable virtual object 3308, the computer system 101 does not display a visual indicator indicating a progress towards selecting the selectable virtual object 3308 based on the attention 3312a because the movement of the attention 3312a is above the movement threshold indicator 3332. In some embodiments, the movement threshold indicator 3332 defines a threshold speed, velocity, and/or distance. In FIG. 33A, movement of the attention 3312a optionally does not meet the first set of one or more criteria described with respect to method 3400. For example, the movement of the attention 3312a optionally exceeds a threshold speed and/or velocity (e.g., 0.1, 0.2, 0.3, 0.5, 1 m/s). In some embodiments, the movement of the attention 3312a exceeds a threshold distance (e.g., 0.1, 0.5, 1, 2, or 2.5 cm) relative to the selectable virtual object 3308. In some embodiments, the time bar 3320 and the movement bar 3330 are not displayed in the three-dimensional environment 3302.

From FIG. 33A to FIG. 33B, movement of the attention 3312a optionally meets the first set of one or more criteria described with respect to method 3400 because movement of the attention 3312a is below a threshold amount of movement (e.g., movement 3334 of the attention 3312a of the user is below the movement threshold indicator 3332 as shown by the movement bar 3330). While maintaining display of the attention indicator 3314, the computer system 101 displays visual indicator 3318 indicating the progress towards selecting the selectable virtual object 3308. The visual indicator 3318 includes one or more characteristics of the visual indicator described with reference to method 3400. In some embodiments and as described with reference to method 3400, the computer system 101 displays the visual indicator 3318 at a location corresponding to a location of the attention 3312a relative to the selectable virtual object 3308. In some embodiments, the computer system 101 displays the visual indicator 3318 at a location of the attention 3311a when movement of the attention 3312a is below the threshold amount of movement (e.g., when the first set of one or more criteria are satisfied as described with reference to method 3400).

In some embodiments, the visual indicator is represented by a hollow or empty circle that is filled from a center to a boundary of the hollow or empty circle in accordance with the amount of time that has elapsed since the first set of one or more criteria have been satisfied as described with reference to method 3400. As shown in FIG. 33B, the visual indicator 3318 is filled in from the center to the boundary of the hollow or empty circle (e.g., 20% filling) in accordance with the amount of time 3324 elapsed since the movement of the attention 3312a became below a threshold amount of movement (e.g., as shown by time bar 3320 and movement bar 3330). In some embodiments, the time bar 3320 includes a time threshold, such as time threshold indicator 3322 and time threshold indicator 3326. In some embodiments, when the attention 3312a has been within a threshold distance (e.g., 1, 2.5, 10, or 100 cm) of the visual indicator 3318 for at least a time threshold (e.g., 0.1, 0.5, 1, 5, or 10 s since displaying the visual indicator 3318), the computer system 101 performs a selection operation associated with the selectable virtual object 3308. The threshold distance is illustrated by dashed box 3303 in FIG. 33B. In some embodiments, the attention 3312a being within a threshold distance (e.g., 1, 2.5, 10, or 100 cm) of the visual indicator 3318 includes the attention 3312a of the user being within the boundaries of the selectable virtual object 3308. In some embodiments and as shown by dashed box 3303 in FIG. 33B, the attention 3312a can be outside the boundaries of the selectable virtual object but still within the threshold distance (e.g., 1, 2.5, 10, or 100 cm) of the visual indicator 3318. In some embodiments, the threshold distance (e.g., size of the dashed box 3303) is independent of the type of virtual object and/or the size of the virtual object being selected. For example, as described below in FIG. 33H, even though selectable virtual object 3310 is smaller than selectable virtual object 3308, the threshold distance (e.g., size of the dashed box 3303) is the same for both selectable virtual objects in order for a second set of one or more criteria (e.g., dwell criteria) to be met as described with reference to method 3400. In some embodiments, the second set of one or more criteria are satisfied when the attention 3312a has been within the threshold distance (e.g., as shown by the dashed box 3303) of the visual indicator 3318 for at least the time threshold (e.g., 0.1, 0.5, 1, 5, or 10 s since displaying the visual indicator 3318). In some embodiments, when the second set of one or more criteria (e.g., dwell criteria) are met as described with reference to method 3400, the computer system 101 performs a selection operation associated with the selectable virtual object 3308.

In some embodiments, the computer system 101 displays the dashed box 3303 in the three-dimensional environment 3302 as shown in FIGS. 33B, 33C, 33E, 33F, and 33H. In some embodiments, the computer system 101 does not display the dashed box 3303 in the three-dimensional environment 3302. Instead, the dashed box 3303 illustrated in FIGS. 33B, 33C, 33E, 33F, and 33H is intended to facilitate discussion of examples of the disclosure.

In some embodiments, the computer system 101 receives user input defining the duration of time required for the attention 3312a to remain within the threshold distance (e.g., as shown by the dashed box 3303) of the visual indicator 3318 to satisfy the second set of one or more criteria and perform the selection operation associated with the selectable virtual object 3308. Accordingly, the time bars in FIGS. 33A-33H illustrate two time threshold indicators. In some embodiments, the user input defining the time threshold to satisfy the second set of one or more criteria is an input directed to a settings user interface different from the virtual content 3306 (e.g., and optionally received prior to detecting the attention 3312a). For example, if the user input corresponds to a selection of a first value, then the time bar 3320 optionally operates according to the time threshold indicator 3322. If the user input corresponds to a selection of a second value different from the first value, then the time bar 3320 optionally operates according to the time threshold indicator 3326. As shown in FIG. 33B, because the first value is lower than the second value, the time threshold indicator 3322 required for the attention 3312a to remain within the threshold distance of the visual indicator 3318 to satisfy the second set of one or more criteria and select the selectable virtual object 3308 is a shorter time period compared to the time threshold indicator 3326.

FIG. 33A1 illustrates similar and/or the same concepts as those shown in FIG. 33A (with many of the same reference numbers). It is understood that unless indicated below, elements shown in FIG. 33A1 that have the same reference numbers as elements shown in FIGS. 33A-33H have one or more or all of the same characteristics. FIG. 33A1 includes computer system 101, which includes (or is the same as) display generation component 120. In some embodiments, computer system 101 and display generation component 120 have one or more of the characteristics of computer system 101 shown in FIGS. 33A-33H and display generation component 120 shown in FIGS. 1 and 3, respectively, and in some embodiments, computer system 101 and display generation component 120 shown in FIGS. 33A-33H have one or more of the characteristics of computer system 101 and display generation component 120 shown in FIG. 33A1.

In FIG. 33A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 33A-33H.

In FIG. 33A1, display generation component 120 is illustrated as displaying content that optionally corresponds to the content that is described as being displayed and/or visible via display generation component 120 with reference to FIGS. 33A-33H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 33A1.

Display generation component 120 has a field of view (e.g., a field of view captured by external image sensors 314b and 314c and/or visible to the user via display generation component 120) that corresponds to the content shown in FIG. 33A1. Because display generation component 120 is optionally a head-mounted device, the field of view of display generation component 120 is optionally the same as or similar to the field of view of the user.

In some embodiments, computer system 101 responds to user inputs as described with reference to FIGS. 33A-33H. It is understood than one or more or all aspects of the present disclosure as shown in, or described with reference to FIGS. 33A-33H and/or described with reference to the corresponding method(s) are optionally implemented on computer system 101 and display generation unit 120 in a manner similar or analogous to that shown in FIG. 33A1.

Figure 33B:
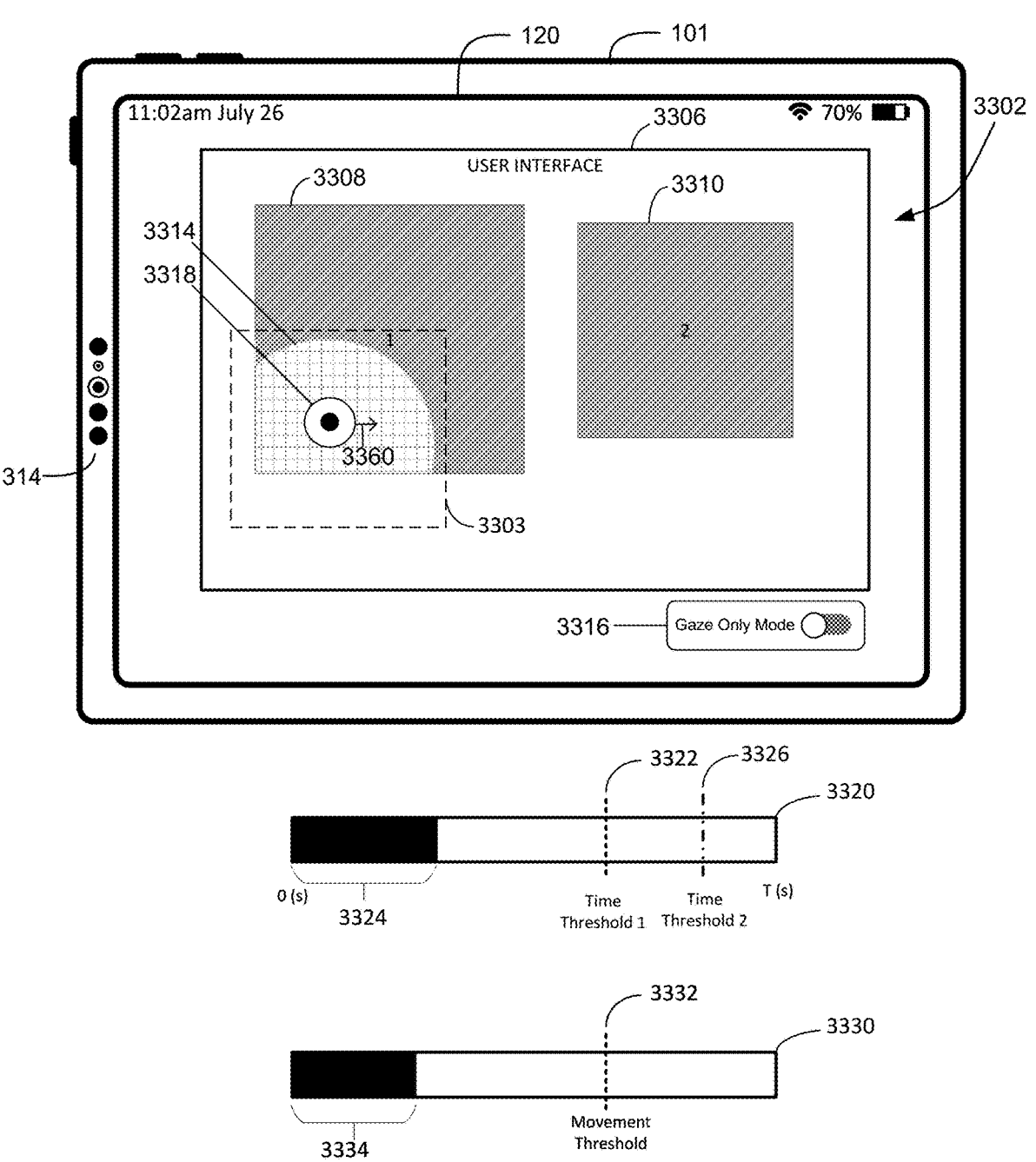
Figure 33C:
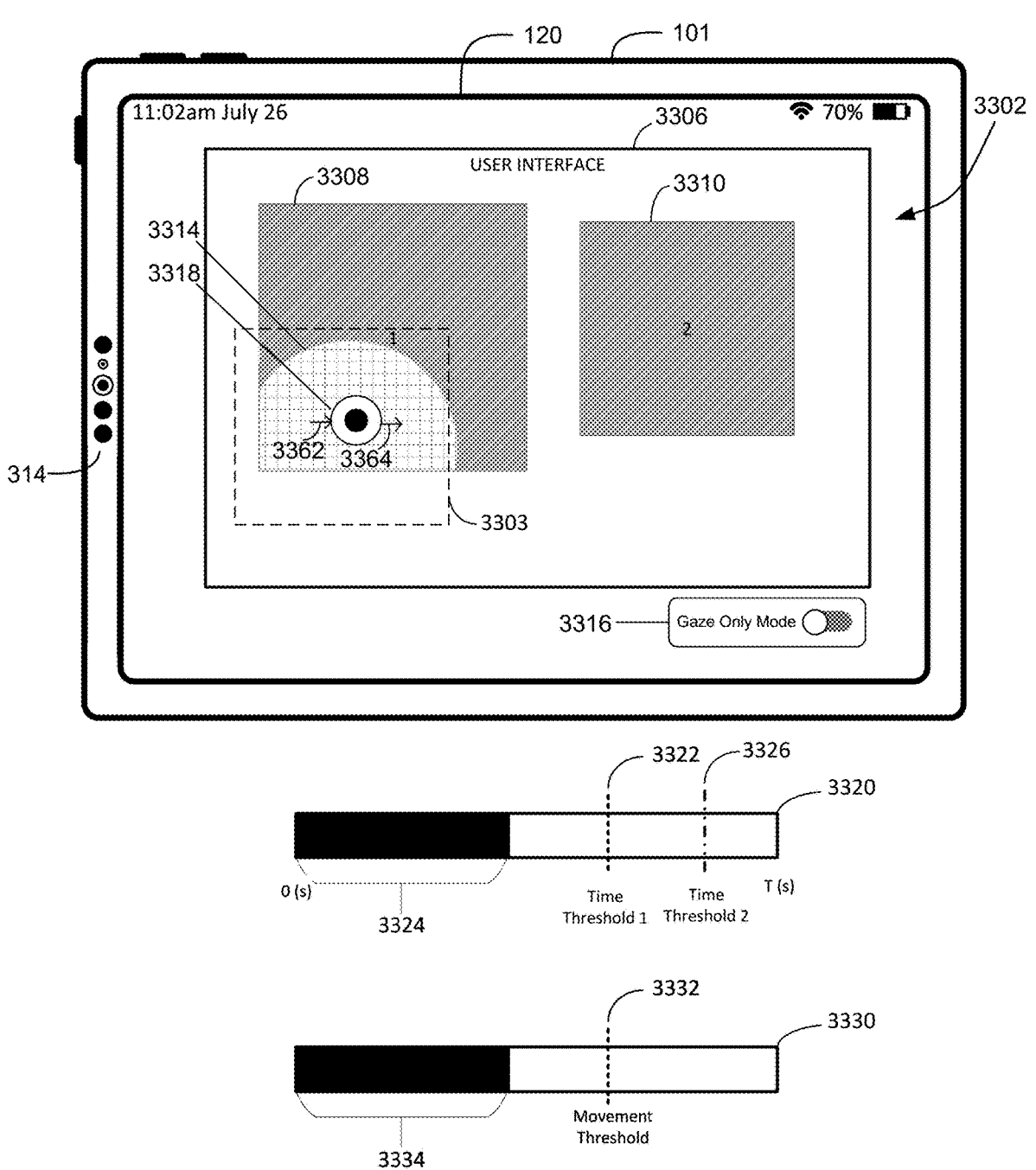

From FIG. 33B to FIG. 33C, the attention 3312a has moved to a different location. This change in location of the attention 3312a of the user is illustrated by arrow 3360 in FIG. 33B and arrow 3362 in FIG. 33C. From FIG. 33B to FIG. 33C, the attention indicator 3314 optionally moves in accordance with the movement of the attention 3312a. Further, from FIG. 33B to FIG. 33C, the movement 3334 of the attention 3312a has increased from as shown by the movement bar 3330. In FIG. 33C, even though the attention 3312a has moved to a different location, the movement 3334 of the attention 3312a remains below the movement threshold indicator 3332 as shown by the movement bar 3330. Moreover, from FIG. 33B to FIG. 33C, the amount of time 3324 elapsed since initially displaying the visual indicator 3318 has also increased. In FIG. 33C, in accordance with the increase in amount of time elapsed (e.g., while the first set of one or more criteria as described with reference to method 3400 remain satisfied), the computer system 101 increases the filling of the visual indicator 3318 compared to FIG. 33B. In FIG. 33B, the computer system 101 optionally continues the progress towards selecting the selectable virtual object 3308 (e.g., increases the filling of the visual indicator 3318) based at least in part on the attention 3312a remaining within the threshold distance as shown by the dashed box 3303. Furthermore, from FIG. 33B to FIG. 33C, the threshold distance as shown by the dashed box 3303 does not change. As shown in FIG. 33C, the visual indicator 3318 has increased in filling (e.g., 45% filling) in accordance with the amount of time 3324 elapsed since the movement 3334 of the attention 3312a has been below a threshold amount of movement (e.g., as shown by time bar 3320 and movement bar 3330).

Figure 33D:
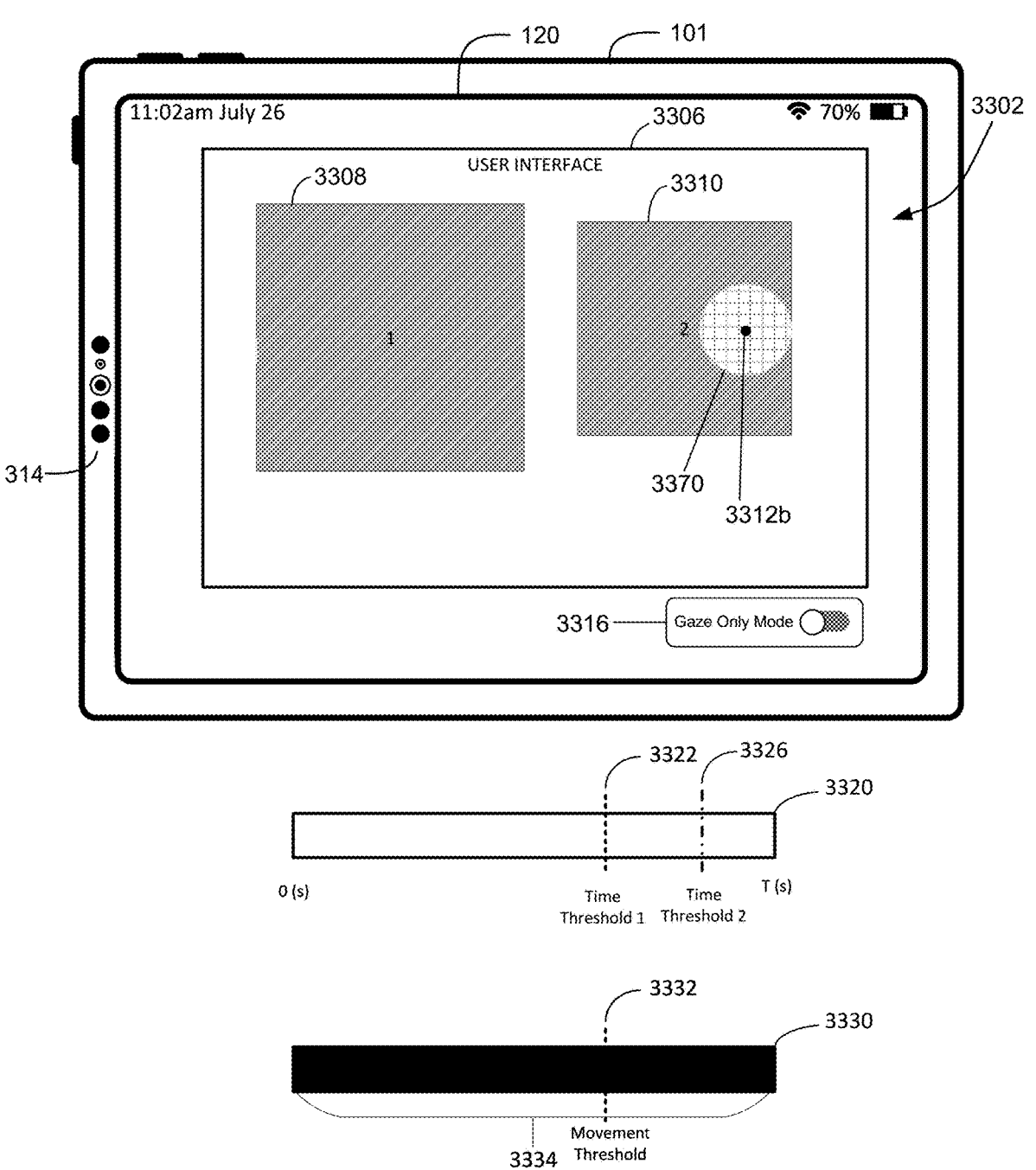

From FIG. 33C to FIG. 33D, the attention has moved from the selectable virtual object 3308 to the selectable virtual object 3310. In FIG. 33D, the attention 3312b is directed to a location within the selectable virtual object 3310. Because the movement 3334 of the attention 3312a of the user is above the movement threshold indicator 3332 as shown by the movement bar 3330 (e.g., the attention 3312b of the user in FIG. 33D is outside the threshold distance of the visual indicator 3318 as defined by the dashed box 3303 in FIG. 33C), the computer system 101 ceases display of the visual indicator 3318 and the attention indicator 3314. In some embodiments and as described with reference to method 3400, when the attention 3312b is outside the threshold distance of the visual indicator 3318, the computer system 101 pauses the progress towards selecting the selectable virtual object 3308. In some embodiments, pausing the progress towards selecting the selectable virtual object 3308 as indicated by the visual indicator 3318 includes ceasing changing (e.g., increasing) the filling of the hollow or empty circle. In FIG. 33D, because the attention 3312b of the user is directed to a location within the selectable virtual object 3310, the computer system displays attention indicator 3370 corresponding to the location of the attention 3312b. The attention indicator 3370 includes one or more characteristics of gaze-based attention indicators described with reference to method 1200, second visual feedback described with reference to method 2800, and/or visual feedback described with reference to method 3400. In some embodiments, even if the computer system 101 displays the dashed box 3303 in the three-dimensional environment 3302, the computer system 101 does not display the dashed box 3303 in FIG. 33D. In some embodiments, the computer system 101 does not display and/or activate the dashed box 3303 unless and until a visual indicator is displayed, such as the visual indicator 3318 in FIGS. 33B, 33C, 33E and 33F.

Figure 33E:
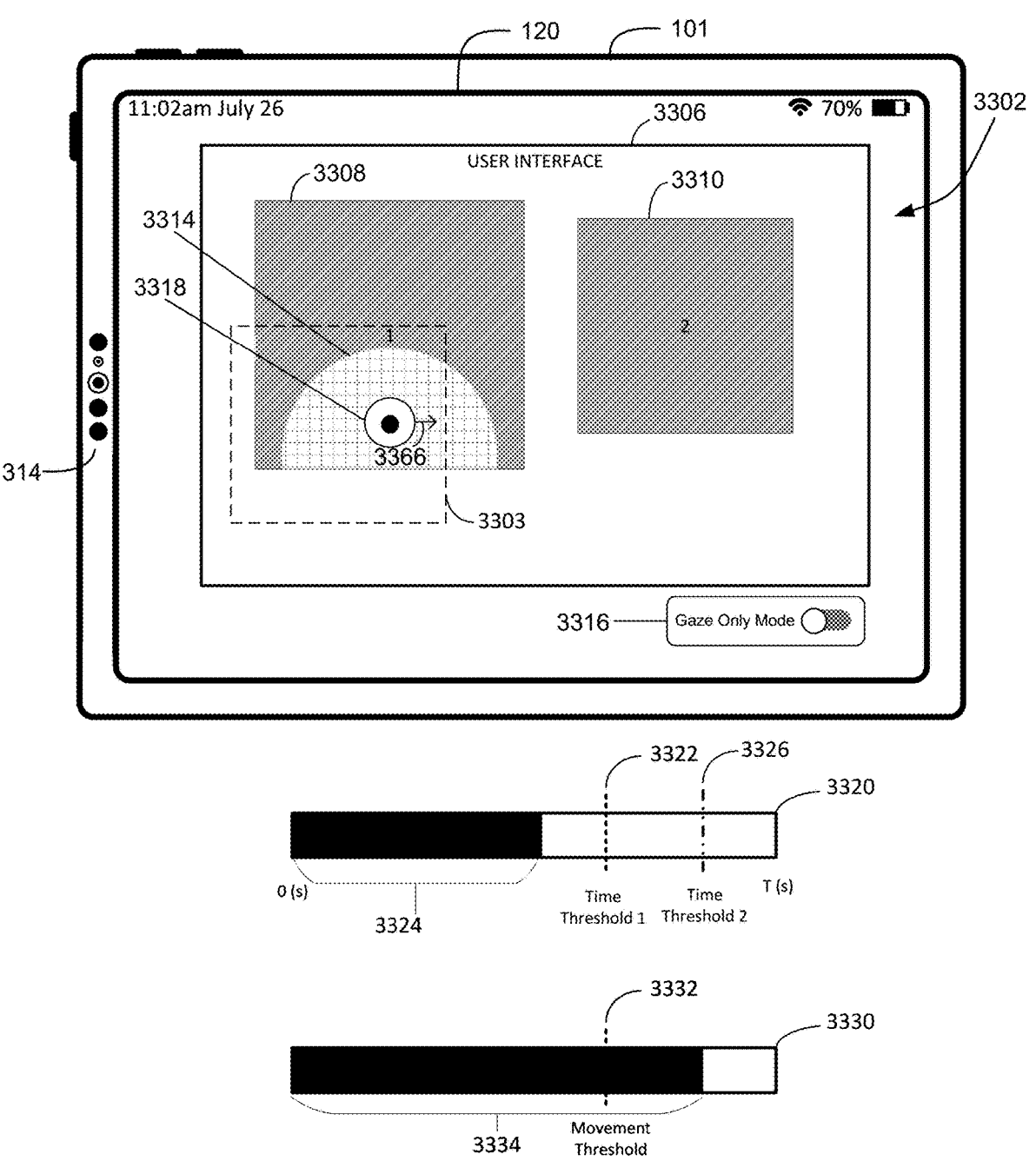

FIG. 33E illustrates an alternative result in response to the movement 3334 of the attention 3312a being above the movement threshold indicator 3332. From FIG. 33C to FIG.

33E, the attention 3312a of the user has moved to a different location (e.g., as indicated by arrow 3364 in FIG. 33C and arrow 3366 in FIG. 33E), but the attention 3312a at the different location is still within the threshold distance (e.g., as shown by the dashed box 3303). From FIG. 33C to FIG. 33E, the threshold distance as shown by the dashed box 3303 does not change. From FIG. 33C to FIG. 33E, the attention indicator 3314 also moves in accordance with movement of the attention 3312a to the different location. However, from FIG. 33C to FIG. 33E, the movement of the attention 3312a exceeds a threshold velocity (e.g., 0.1, 0.2, 0.3, 0.5, 1 m/s) as defined by the movement threshold indicator 3332. Because the movement 3334 of the attention 3312a is above the movement threshold indicator 3332 as shown by the movement bar 3330, the computer system 101 reduces the progress towards selecting the selectable virtual object 3308 as indicated by the visual indicator 3318. For example, the computer system 101 optionally decreases the filling of the hollow or empty circle by 10, 20, 30, 50, 70, or 100%. In some embodiments, if the movement of the attention 3312a of the user is below the movement threshold indicator 3332 for a longer amount of time, then the computer system 101 reduces the progress towards selecting the selectable virtual object 3308 by a greater amount. As shown in FIG. 33E, the computer system 101 has reduced the filling of the visual indicator 3318, such that the level of filling in 33E of the visual indicator 3318 is the same as the level of filling in FIG. 33B despite the increase in amount of time 3324 elapsed between FIG. 33B and FIG. 33E.

Figure 33F:
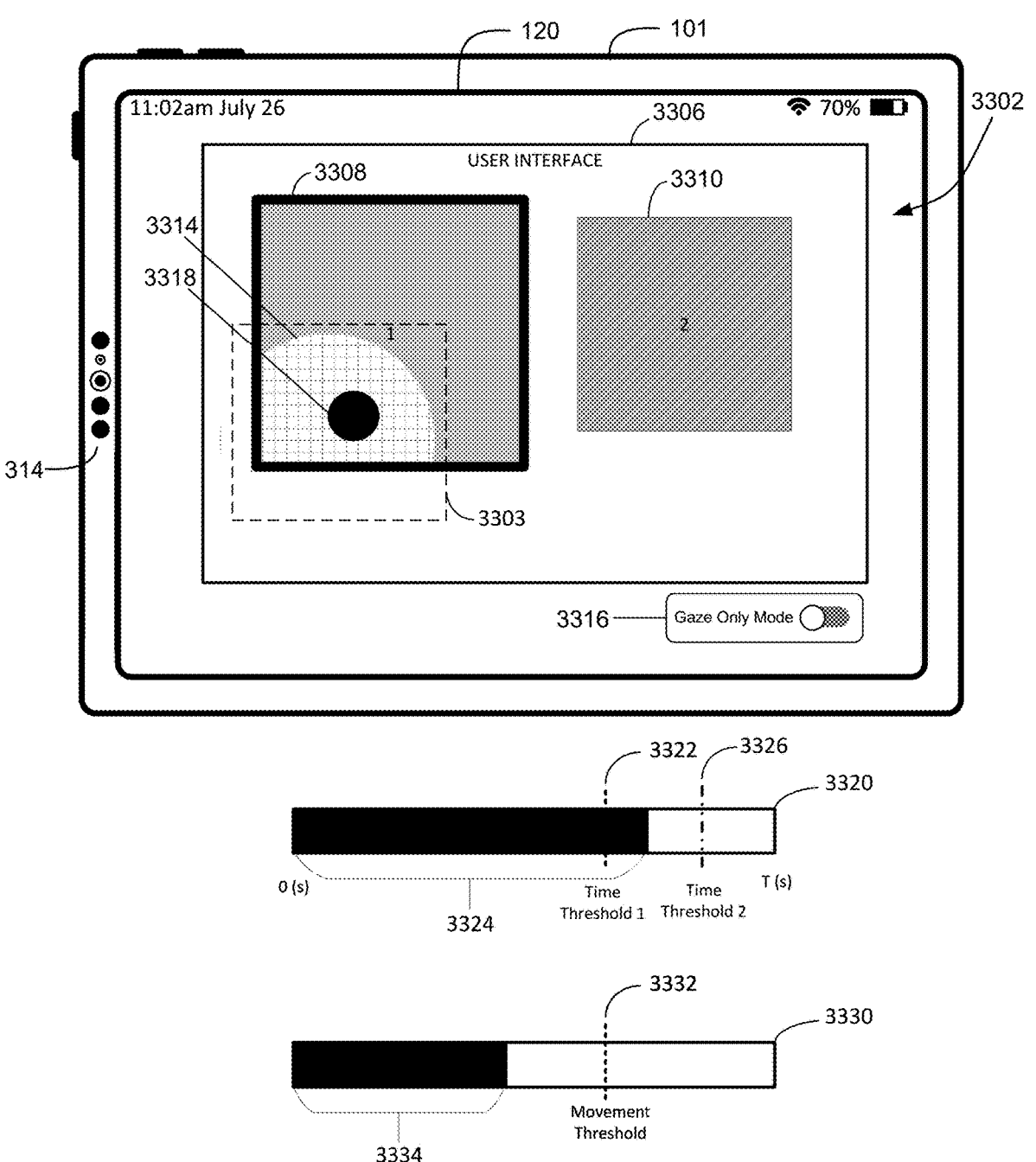

From FIG. 33C to FIG. 33F, the attention 3312a does not move to a different location (e.g., and remains within the threshold distance of the visual indicator 3318), such that the movement 3334 of the attention 3312 of the user is below the movement threshold indicator 3332 as shown by movement bar 3330. From FIG. 33C to FIG. 33F, the threshold distance as shown by the dashed box 3303 does not change. As discussed above, when the attention 3312a has been within the threshold distance of the visual indicator 3318 (e.g., as shown by the dashed box 3303) for at least a time threshold (e.g., time threshold indicator 3322), the computer system 101 performs a selection operation associated with the selectable virtual object 3308. In FIG. 33F, since the amount of time 3324 elapsed since displaying the visual indicator 3318 exceeds the time threshold indicator 3322 (e.g., the second set of one or more criteria are met as described with reference to method 3400), the computer system 101 performs a selection operation associated with the selectable virtual object 3308. In some embodiments, performing the selection operation associated with the selectable virtual object 3308 includes adjusting a brightness, a volume, or other property of content associated with the selectable virtual object 3308 (e.g., as shown by the outline around the selectable virtual object 3308 in FIG. 33F) and controlled by the selectable virtual object 3308. In some embodiments, performing the selection operation includes one or more characteristics of performing operations associated with selecting a selectable option as described with respect to methods 800, 1400, and/or 3400. In some embodiments, as shown in FIG. 33F, when the second set of one or more criteria are met, the computer system 101 increases the filling of the visual indicator 3318 (e.g., hollow or empty circle) to a 100% fill. In FIG. 33F, while selecting the selectable virtual object 3308, the computer system 101 optionally maintains display of the visual indicator 3318 and the attention indicator 3314.

Figure 33G:
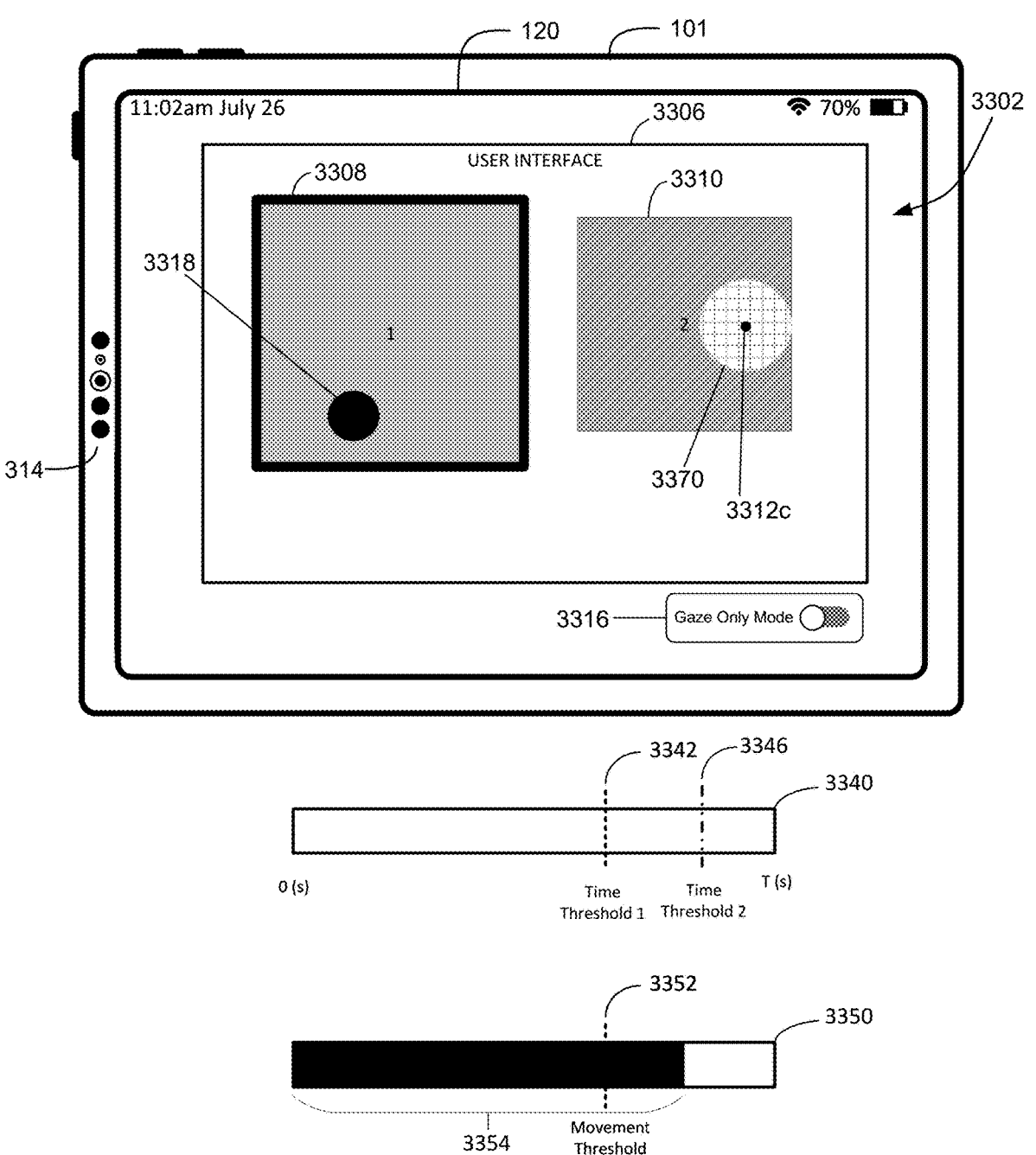

In some embodiments and as described with reference to method 3400, even if the attention is no longer directed to the selectable virtual object 3308, the computer system 101 continues selection of the selectable virtual object 3308 even if the attention has moved away from the selectable virtual object after the process for selecting the selectable virtual object 3308 has begun. As shown in FIG. 33G, even though the attention 3312c is now located within the selectable virtual object 3310, the computer system 101 maintains selection of the selectable virtual object 3308 and display of the visual indicator 3318 with a 100% fill because the attention moved after the process for selecting the selectable virtual object 3308 had been initiated. In FIG. 33G, the attention indicator 3314 is no longer displayed. Instead, in FIG. 33G, the computer system 101 displays attention indicator 3370 that corresponds to the different location of the attention 3312c of within the selectable virtual object 3310. In some embodiments, even if the computer system 101 displays the dashed box 3303 in the three-dimensional environment 3302, the computer system 101 does not display the dashed box 3303 in FIG. 33H. In some embodiments, the computer system 101 does not display and/or activate the dashed box 3303 unless and until a visual indicator is displayed, such as visual indicator 3370 in FIG. 33H.

Figure 33H:
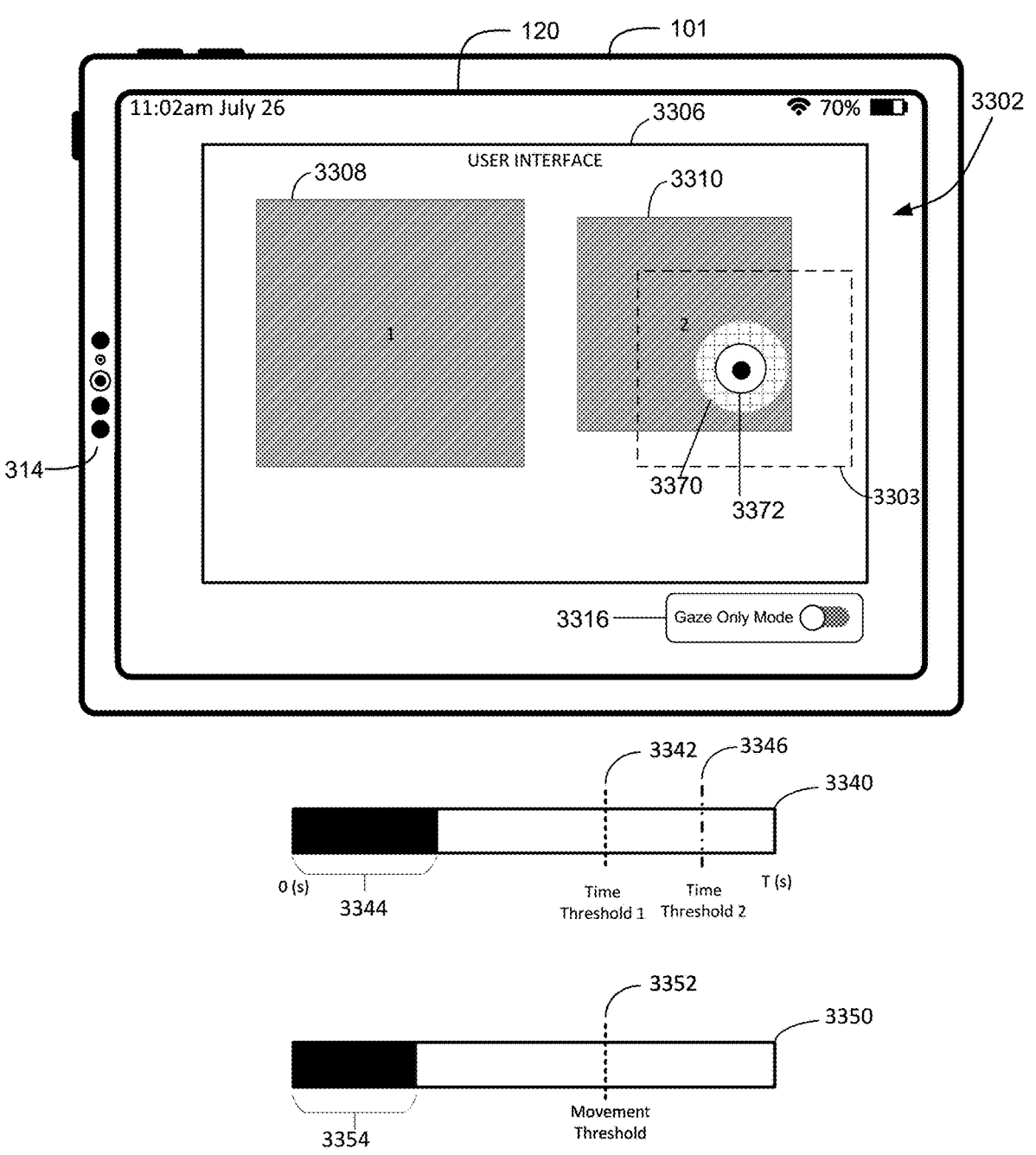

From FIG. 33G to FIG. 33H, the attention moves such that the first set of one or more criteria described with respect to method 3400 are met because movement of the attention is below a threshold amount of movement (e.g., the movement 3354 of the attention is below the movement threshold indicator 3352 as shown by the movement bar 3350). From FIG. 33G to FIG. 33H, the computer system 101 also moves the attention indicator 3370 in accordance with the movement of the attention. While maintaining display of the attention indicator 3370, the computer system 101 displays visual indicator 3372 indicating the progress towards selecting the selectable virtual object 3310. In FIG. 33H, even though selectable virtual object 3310 is smaller than the selectable virtual object 3308, the threshold distance (e.g., size of the dashed box 3303) is the same for both selectable virtual objects in order for the second set of one or more criteria (e.g., dwell criteria) to be met as described with reference to method 3400.

FIG. 34A is a flowchart illustrating a method 3400 of displaying a visual indicator indicating a progress towards selecting a selectable virtual object when certain criteria are met. In some embodiments, the method 3400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 3400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 3400 are, optionally, combined and/or the order of some operations is, optionally, changed.

In some embodiments, method 3400 is performed at a computer system in communication with a display generation component and one or more input devices. In some embodiments, the computer system has one or more of the characteristics of the computer systems of methods 800, 900, 1000, 1200, 1400, 1600, 1800, 2000, 2200, 2400, 2600, 2700, 2800, 3000, and/or 3200. In some embodiments, the display generation component has one or more of the characteristics of the display generation component of methods 800, 900, 1000, 1200, 1400, 1600, 1800, 2000, 2200, 2400, 2600, 2700, 2800, 3000, and/or 3200. In some embodiments, the one or more input devices have one or more of the characteristics of the one or more input devices of methods 800, 900, 1000, 1200, 1400, 1600, 1800, 2000, 2200, 2400, 2600, 2700, 2800, 3000, and/or 3200.

In some embodiments, the computer system, such as computer system 101 in FIGS. 33A and 33A1, displays (3402a), via the display generation component, a user interface including a selectable virtual object, such as user interface 3306 including selectable virtual object 3308 or 3310 in FIGS. 33A and 33A1 (e.g., a user interface or representation of an application, a representation of a content item (e.g., image and/or video), and/or a three-dimensional representation of an object that does not exist in a physical environment of the computer system, the display generation component and/or user). In some embodiments, the selectable virtual object is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800, 900, 1000, 1200, 1400, 1600, 1800, 2000, 2200, 2400, 2600, 2700, 2800, 3000, and/or 3200. In some embodiments, the selectable virtual object is a button, icon, widget, affordance, playback control element, or any other selectable object, selection of which causes the computer system to perform a corresponding function(s). In some embodiments, the selectable virtual object has one or more of the characteristics of the virtual objects of methods 800, 900, 1000, 1200, 1400, 1600, 1800, 2000, 2200, 2400, 2600, 2700, 2800, 3000, and/or 3200.

In some embodiments, while displaying the user interface including the selectable virtual object (3402b), in accordance with a determination that (e.g., in response to detecting that) attention of the user, such as attention 3312a in FIGS. 33A and 33A1, of the computer system directed towards the selectable virtual object, such as selectable virtual object 3308 in FIGS. 33A and 33A1, satisfies a first set of one or more criteria (e.g., attention-pause, attention-dwell, or attention-interaction criteria), wherein the first set of one or more criteria include a requirement that movement of the attention of the user, such as movement 3334 of the attention in FIG. 33B, is below a movement threshold, such as movement threshold indicator 3332 in FIG. 33B (e.g., based on a speed and/or magnitude of movement of the attention), in order for the first set of one or more criteria to be met, the computer system displays (3402c), via the display generation component, a visual indicator, such as visual indicator 3318 in FIG. 33B, indicating a progress towards selecting the selectable virtual object based on the attention of the user. In some embodiments, the determination as to whether or not the attention of the user of the computer system satisfies the first set of one or more criteria is based on an evaluation of the attention of the user without taking into account other inputs such as selection inputs, air gestures, or movement from a portion of the user, such as a finger or hand of the user. For example, the selectable virtual object is optionally selectable as described herein without input from a hand or finger or anything other than attention of the user, as described herein. In some embodiments, the requirement is satisfied when movement of the attention of the user is less than a threshold amount of movement while the attention of the user is directed towards the selectable object. In some embodiments, the threshold amount of movement includes a threshold speed and/or velocity (e.g., 0.1, 0.2, 0.3, 0.5, 1 m/s). In some embodiments, the threshold amount of movement includes a threshold distance (e.g., 0.1, 0.5, 1, 2, or 2.5 cm). In some embodiments, the threshold amount of movement includes a threshold amount of distance (e.g., 0.1, 0.5, 1, 2, or 2.5 cm) between the attention of the user and the selectable virtual object. In some embodiments, the requirement is satisfied when the attention of the user remains stationary (and/or has less than the above threshold amounts of movement) while the attention of the user is directed to the selectable virtual object. In some embodiments, the computer system displays visual feedback corresponding to the attention of the user, such as displaying a highlighting, lighting, shadow and/or another visual effect on an area of the selectable virtual object. In some embodiments, the visual feedback includes one or more characteristics of the visual feedback (e.g., gaze-based attention indicators) described with reference to methods 1200, 2600, 2700, and/or 2800. In some embodiments, if the attention of the user is not directed to the selectable virtual object, the one or more first criteria cannot be satisfied. In some embodiments, the computer system does not display the visual indicator unless and until the attention of the user directed towards the selectable virtual object satisfies the first set of one or more criteria. In some embodiments, the visual indicator is a hollow or empty circle or any suitable hollow or empty shape when the computer system initially displays the visual indicator after the attention of the user satisfies the one or more first criteria. As the amount of time elapsed since the one or more first criteria were satisfied increases, the computer system optionally fills in the hollow or empty circle (e.g., increases filling of the hollow or empty circle by 10, 20, 30, 50, 70, or 100% in accordance with the amount of time elapsed since the one or more first criteria were satisfied, where 100% fill optionally corresponds to the time required for selecting the selectable virtual object) while the attention of the user remains stationary or substantially stationary and remains directed towards (e.g., within a threshold distance of) the selectable virtual object. In some embodiments, an increased filling of the hollow or empty circle indicates greater progress towards selecting the selectable virtual object. In some embodiments, the computer system maintains display of the visual feedback (e.g., gaze-based attention indicators) while displaying the visual indicator.

In some embodiments, after displaying the visual indicator (3402d) in accordance with a determination that (e.g., in response to detecting that) the attention of the user has met a second set of one or more criteria relative to the visual indicator while the visual indicator is displayed, wherein the second set of one or more criteria include a requirement that the attention of the user has been within a threshold distance (e.g., 1, 2.5, 10, or 100 cm) of the visual indicator, such as within dashed box 3303 in FIG. 33F, for at least a first time threshold, such as time threshold indicator 3322 in FIG. 33F, in order for the second set of one or more criteria (e.g., dwell criteria) (e.g., 0.1, 0.5, 1, 5, or 10 s since displaying the visual indicator) to be met, the computer system performs (3402e) a selection operation associated with the selectable virtual object, such as selecting selectable virtual object 3308 in FIG. 33F. In some embodiments, the second set of one or more criteria include a requirement that the attention of the user has been within a threshold degrees of movement (e.g., 0.1, 0.2, 0.5, 1, 2, 5, 8, 10, or 30 degrees of movement) of the visual indicator for at least the first time threshold. In some embodiments, the second set of one or more criteria are met even if the attention of the user within the threshold distance of the visual indicator is non-continuous. For example, if the attention of the user moves outside the threshold distance of the visual indictor for less than a threshold amount of time (e.g., 0.01, 0.1, 0.2, 0.5, 1, 5, or 10 s) and returns to being within the threshold distance of the visual indicator, then the attention of the user can still meet the second set of one or more criteria. In some embodiments, the computer system displays a fully filled progress indicator (e.g., a circle or other hollow shape) when the elapsed time since the one or more first criteria were satisfied reaches the first time threshold. In some embodiments, when the selectable virtual object is selected, the computer system performs an operation associated with the selectable virtual object. In some embodiments, performing the operation associated with the selectable virtual object includes displaying (e.g., additional) content in the user interface that is associated with the selectable virtual object, such as an image, video, and/or text, outputting audio, such as audio corresponding to music, podcast, and/or video, and/or displaying another user interface in the three-dimensional environment, such as displaying another application window or displaying a virtual keyboard (e.g., for entering text in an input field of the user interface in which the selectable virtual object is displayed). In some embodiments, performing the operation associated with the selectable virtual object includes adjusting a brightness, a volume, or other property of content associated with the selectable virtual object and controlled by the selectable virtual object. In some embodiments, the performing the selection operation includes one or more characteristics of performing operations associated with selecting a selectable option as described with respect to methods 800 and/or 1400. In some embodiments, performing the operation associated with the selectable virtual object includes selecting a hyperlink or selecting a content preview (e.g., a list of emails, a list of messages, or a calendar entry) to display additional information corresponding to the hyperlink or the content preview.

In some embodiments, after displaying the visual indicator (3402d), in accordance with a determination that the attention of the user has not met the second set of one or more criteria while the visual indicator is displayed (e.g., because the attention has been directed within the threshold distance of the visual indicator for less than the first time threshold, because the attention has moved more than the threshold distance away from the visual indicator before the first time threshold has elapsed, and/or because the attention has moved more than the threshold distance away from the visual indicator before the first time threshold has elapsed and did not return to the threshold distance away from the visual indicator within a second time threshold (e.g., 0.01, 0.1, 0.2, 0.5, 1, 5, or 10 s)), the computer system forgoes (34020 performing the selection operation associated with the selectable virtual object, such as forgoing selecting the selectable virtual object 3308 in FIGS. 33D and 33E. In some embodiments, while the second set one or more criteria are not met (e.g., the elapsed time since the one or more first criteria were satisfied has not reached the first time threshold), the computer system displays a partially filled circle or a hollow or empty circle without any filling. In some embodiments, the computer system does not select the selectable object unless and until the second set of one or more criteria are met (e.g., the elapsed time since the one or more first criteria were satisfied reaches the first time threshold). Displaying a visual indicator when attention of the user meets certain criteria provides visual feedback of the progress towards selecting a selectable virtual object, and selecting the selectable virtual object only if the elapsed time since the visual indicator was displayed meets a time threshold reduces erroneous attention-based control of the selectable virtual object, thereby improving respective user-device interactions.

In some embodiments, while displaying the user interface including the selectable virtual object, in accordance with a determination that the attention of the user directed towards the selectable virtual object does not satisfy the first set of one or more criteria (e.g., gaze-interaction criteria), the computer system forgoes displaying the visual indicator indicating the progress towards selecting the selectable virtual object based on the attention of the user, such as forgoing displaying a visual indicator for selecting selectable virtual object 3308 in FIG. 33D. Instead, the computer system optionally displays visual feedback corresponding to the attention of the user, such as displaying a highlighting, lighting, shadow and/or another visual effect on an area of the selectable virtual object. In some embodiments, the visual feedback includes one or more characteristics of the visual feedback (e.g., gaze-based attention indicators) described with reference to methods 1200, 2600, 2700, and/or 2800. Forgoing displaying a visual indicator when attention of the user does not meet certain criteria reduces computing resources consumed by the computer system when not needed, thereby improving respective user-device interactions.

In some embodiments, the first set of one or more criteria include a second requirement that movement of the attention of the user, such as movement 3334 of the attention in FIG. 33B, is below the movement threshold for a threshold time, such as time threshold indicator 3322 in FIG. 33B, in order for the first set of one or more criteria to be met. In some embodiments, the second requirement is satisfied when movement of the attention of the user is less than the threshold amount of movement while the attention of the user is directed towards the selectable object for threshold time or longer than a threshold time (e.g., 0.01, 0.1, 0.5, 1, 5, or 10 s). In some embodiments, the second requirement is satisfied when the attention of the user remains stationary or substantially stationary while the attention of the user is directed to the selectable virtual object for the threshold time or longer than the threshold amount of time. In some embodiments, the threshold amount of movement includes a threshold speed and/or velocity (e.g., 0.1, 0.2, 0.3, 0.5, 1 m/s). In some embodiments, the threshold amount of movement includes a threshold distance (e.g., 0.1, 0.5, 1, 2, or 2.5 cm). In some embodiments, the threshold amount of movement includes a threshold amount of distance (e.g., 0.1, 0.5, 1, 2, 2.5, 10, 50, or 100 cm) between the attention of the user and the selectable virtual object. In some embodiments, the second requirement is satisfied when the attention of the user has been within a threshold degrees of movement (e.g., 0.1, 0.2. 0.5, 1, 2, 5, 8, 10, or 30 degrees of movement) of the visual indicator for at least the time threshold or longer than the time threshold. In some embodiments, the first set of one or more criteria are not met until and unless the second requirement is satisfied. Displaying a visual indicator when movement of the attention of the user is below a movement threshold for a threshold time provides visual feedback of the progress towards selecting a selectable virtual object, and displaying the visual indicator after the threshold time (e.g., when movement of the attention of the user is below a movement threshold) prevents prematurely or unnecessarily displaying the visual indicator, thereby improving respective user-device interactions.

In some embodiments, after displaying the visual indicator, in accordance with a determination that the attention of the user is outside the threshold distance (e.g., 1, 2.5, 10, or 100 cm) of the visual indicator, such as attention 3312*b* in FIG. 33D is outside the dashed box 3303 shown in FIG. 33C, the computer system pauses the progress towards selecting the selectable virtual object as indicated by the visual indicator, such as optionally pausing the progress towards selecting the selectable virtual object 3308 if the visual indicator 3318 was displayed in FIG. 33D. In some embodiments, the attention of the user is outside the threshold distance of the visual indicator when the attention of the user has moved from the selectable virtual object to a different virtual object. In some embodiments, when the attention of the user has moved from the selectable virtual object to a different virtual object, the computer system optionally ceases display of the visual feedback corresponding to the attention of the user at the selectable virtual object. In some embodiments, when the attention of the user is outside the visual indicator by one to ten times the width of the visual indicator, such as four times the width of the visual indicator, the computer system pauses the progress towards selecting the selectable virtual object. In some embodiments, pausing the progress towards selecting the selectable virtual object as indicated by the visual indicator includes ceasing changing (e.g., increasing) the filling of the hollow or empty circle. In some embodiments, if the attention of the user is redirected to the selectable virtual object and within the threshold distance of the visual indicator (e.g., and the movement of the attention of the user is below a movement threshold such that the first set of one or more criteria to be met), then the computer system resumes the progress towards selected the selectable virtual object (e.g., increasing the filling of the hollow or empty circle in accordance with the amount of time elapsed since attention of the user satisfies again the first set of one or more criteria). Pausing progress towards selecting the selectable virtual object when the attention of the user is outside the threshold distance of the visual indicator reduces computing resources consumed by the computer system when not needed, thereby improving respective user-device interactions.

In some embodiments, the second set of one or more criteria include a second requirement that the movement of the attention of the user, such as movement 3334 of the attention in FIG. 33E, is below the movement threshold, such as movement threshold indicator 3332 in FIG. 33E, in order for the second set of one or more criteria to be met. In some embodiments, the second requirement of the second set of one or more criteria is satisfied when movement of the attention of the user is less than a threshold amount of movement while the attention of the user is directed towards the selectable object. In some embodiments, the threshold amount of movement includes a threshold speed and/or velocity (e.g., 0.1, 0.2, 0.3, 0.5, 1 m/s). In some embodiments, the threshold amount of movement includes a threshold distance (e.g., 0.1, 0.5, 1, 2, or 2.5 cm). In some embodiments, the threshold amount of movement includes a threshold amount of distance (e.g., 0.1, 0.5, 1, 2, or 2.5 cm) between the attention of the user and the selectable virtual object. In some embodiments, the second requirement of the second set of one or more criteria is satisfied when the attention of the user remains stationary (and/or has less than the above threshold amounts of movement) while the attention of the user is directed to the selectable virtual object.

In some embodiments, after displaying the visual indicator, in accordance with a determination that the attention of the user does not meet the second set of one or more criteria because the movement of attention of the user is not below the movement threshold while the visual indicator is displayed, the computer system pauses the progress towards selecting the selectable virtual object as indicated by the visual indicator, such as optionally pausing the progress towards selecting the selectable virtual object 3308 in FIG. 33E. In some embodiments, pausing the progress towards selecting the selectable virtual object as indicated by the visual indicator includes ceasing changing (e.g., increasing) the filling of the hollow or empty circle. In some embodiments, after pausing progress towards selecting the selectable virtual object, if movement attention of the user is again below the movement threshold (e.g., and attention of the user is within the threshold distance of the visual indicator for at least a first time threshold in order for the second set of one or more criteria to be met), then the computer system resumes the progress towards selecting the selectable virtual object (e.g., increasing the filling of the hollow or empty circle in accordance with the amount of time elapsed since the movement attention of the user is again below the movement threshold). Pausing progress towards selecting the selectable virtual object when movement attention of the user is not below the movement threshold reduces computing resources consumed by the computer system when not needed, thereby improving respective user-device interactions.

In some embodiments, the second set of one or more criteria include a second requirement that the movement of the attention of the user, such as movement 3334 of the attention in FIG. 33E, is below the movement threshold, such as movement threshold indicator 3332 in FIG. 33E, in order for the second set of one or more criteria to be met. In some embodiments, the second requirement of the second set of one or more criteria is satisfied when movement of the attention of the user is less than a threshold amount of movement while the attention of the user is directed towards the selectable object. In some embodiments, the threshold amount of movement includes a threshold speed and/or velocity (e.g., 0.1, 0.2, 0.3, 0.5, 1 m/s). In some embodiments, the threshold amount of movement includes a threshold distance (e.g., 0.1, 0.5, 1, 2, or 2.5 cm). In some embodiments, the threshold amount of movement includes a threshold amount of distance (e.g., 0.1, 0.5, 1, 2, or 2.5 cm) between the attention of the user and the selectable virtual object. In some embodiments, the second requirement of the second set of one or more criteria is satisfied when the attention of the user remains stationary (and/or has less than the above threshold amounts of movement) while the attention of the user is directed to the selectable virtual object.

In some embodiments, after displaying the visual indicator, in accordance with a determination that the attention of the user does not meet the second set of one or more criteria because the movement of attention of the user is not below the movement threshold while the visual indicator is displayed, displaying an indication that the progress towards selecting the selectable virtual object as indicated by the visual indicator has been reduced, such as reducing progress indicated by the visual indicator 3318 in FIG. 33E (e.g., by fading or reversing the indication of progress toward selecting the selectable virtual object). In some embodiments, displaying the indication that the progress towards selecting the selectable virtual object as indicated by the visual indicator has been reduced includes decreasing the filling of the hollow or empty circle by 10, 20, 30, 50, 70, or 100% in accordance with the amount of time elapsed between the first set of one or more criteria initially being satisfied and the movement of the attention of the user not being below the movement threshold, where 0% fill optionally corresponds to time required for ceasing display of the visual indicator. In some embodiments, if the movement of the attention of the user is below the movement threshold for a longer amount of time, then the computer system reduces the progress towards selecting the selectable virtual object by a greater amount. In some embodiments, after displaying the indication that the progress towards selecting the selectable virtual object as indicated by the visual indicator has been reduced, if movement attention of the user is again below the movement threshold (e.g., and attention of the user is within the threshold distance of the visual indicator for at least a first time threshold in order for the second set of one or more criteria to be met), then the computer system increases progress towards selecting the selectable virtual object from the reduced state of progress (e.g., increasing filling of the hollow or empty circle in accordance with the amount of time elapsed since the movement attention of the user is again below the movement threshold from the reduced fill state of the hollow or empty circle). Displaying an indication thar the progress towards selecting the selectable virtual object as indicated by the visual indicator has been reduced when movement attention of the user is not below the movement threshold provides visual feedback that the attention of the user is not meeting certain criteria (e.g., second set of one or more criteria), thereby improving respective user-device interactions.

In some embodiments, displaying, via the display generation component, the visual indicator indicating the progress towards selecting the selectable virtual object based on the attention of the user includes, in accordance with a determination that a location of the attention of the user when the first set of one or more criteria was satisfied is a first location, displaying the visual indicator at a first location for the visual indicator, such as displaying the visual indicator 3318 at a location in FIG. 33B. In some embodiments, if movement of the attention of the user is below a threshold movement (e.g., gaze pauses) at the first location, then the computer system displays the visual indicator at the first location.

In some embodiments, displaying, via the display generation component, the visual indicator indicating the progress towards selecting the selectable virtual object based on the attention of the user includes in accordance with a determination that a location of the attention of the user when the first set of one or more criteria was satisfied is a second location different from the first location, displaying the visual indicator at the second location for the visual indicator, such as displaying the visual indicator 3318 at a different location in FIG. 33C. In some embodiments, if movement of the attention of the user is below a movement threshold (e.g., gaze pauses) at the second location, then the computer system displays the visual indicator at the second location. In some embodiments, location of the visual indicator changes based on a location where the attention of the user satisfying the first set of one more criteria relative to the selectable virtual object. In some embodiments, the first location and the second location are within the selectable virtual object. In some embodiments, after displaying the visual indicator at the first or second location, the computer system does not move the visual indicator, such that the visual indicator remains at the first location or the second location even if attention of the user moves away from the first location or the second location as long as the first set of one or more criteria and/or the second set of one or more criteria are satisfied. In some embodiments, after displaying the visual indicator at the first or second location, the computer system moves the visual indicator from the first or second location in accordance with movement of the attention of the user away from the first or second location. Updating a location of the visual indication based on a location where the attention of the user satisfies the first set of one more criteria relative to the selectable virtual object provides visual feedback of a current location of the attention of the user and progress towards selecting a selectable virtual object, thereby improving user-device interactions.

In some embodiments, displaying, via the display generation component, the visual indicator includes displaying the visual indicator at a location corresponding to a location of the attention of the user relative to the selectable virtual object, such as displaying the visual indicator 3318 in FIG. 33B corresponding to a location of the attention 3312a in FIGS. 33A and 33A1. In some embodiments, the computer system displays the visual indicator at a location of the attention of the user in or near real-time. In some embodiments, the visual indicator is displayed at a spatial arrangement (e.g., position and/or orientation) relative to the location of the attention of the user, such as above, below, left or right of. In some embodiments, the visual indicator is displayed in an inner area of the selectable virtual object. In some embodiments, the visual indicator is displayed partially within an inner area of selectable virtual object and partially outside the inner area of the selectable object. In some embodiments, location of the visual indicator changes based on location of the attention of the user relative to the selectable virtual object. Displaying the visual indication at a location corresponding to a location of the attention of the user relative to the selectable virtual object provides visual feedback of a current location of the attention of the user, thereby improving user-device interactions.

In some embodiments, after displaying the visual indicator, in accordance with a determination that the attention of the user, such as attention 3312b in FIG. 33D, is outside the threshold distance (e.g., 1, 2.5, 10, or 100 cm) of the visual indicator, the computer system ceases display of the visual indicator, such as ceasing display of visual indicator in FIG. 33D. In some embodiments, the computer system ceases display of the indicator as soon as (e.g., without any time delay) the attention of the user has moved outside the threshold distance of the visual indicator. In some embodiments, the computer system ceases display of the indicator a threshold time (e.g., 0.1, 1, 2, 5, or 10 s) after determining that the attention of the user has moved outside the threshold distance of the visual indicator. In some embodiments, the attention of the user is outside the threshold distance of the visual indicator when the attention of the user has moved from the selectable virtual object to a different virtual object. In some embodiments, when the attention of the user has moved from the selectable virtual object to a different virtual object, the computer system optionally ceases display of the visual feedback corresponding to the attention of the user at the selectable virtual object. In some embodiments, even though the attention of user is still directed at a location within the selectable virtual object, the computer system ceases display of the visual indicator because the attention of the user is outside the threshold distance of the visual indicator. In some embodiments, when the attention of the user is no longer directed to the selectable virtual object (e.g., instead directed to an empty space in the user interface), the computer system ceases display of the visual indicator. In some embodiments, when the attention of the user is outside the visual indicator by one to ten times the width of the visual indicator, the computer system ceases display of the visual indicator. Ceasing display of the visual indicator when the attention of the user is outside the threshold distance of the visual indicator reduces computing resources consumed by the computer system when not needed and reduces clutter in a user interface, thereby improving respective user-device interactions.

In some embodiments, while performing the selection operation associated with the selectable virtual object, in accordance with a determination that the attention, such as attention 3312c in FIG. 33G, of the user has moved outside the threshold distance of the visual indicator (e.g., when the attention of the user is outside the visual indicator by one to ten times the width of the visual indicator), the computer system maintains the performance of the selection operation associated with the selectable virtual object, such as maintaining selection of the selectable virtual object 3308 in FIG. 33G. In some embodiments, the attention of the user is outside the threshold distance of the visual indicator when the attention of the user has moved from the selectable virtual object to a different virtual object. In some embodiments, even if attention of the user is no longer directed to the selectable virtual object, the computer system continues selection of the selectable virtual object because the attention of the user has moved away from the selectable virtual object after the process for selecting the selectable virtual object has begun.

In some embodiments, while performing the selection operation associated with the selectable virtual object, in accordance with a determination that the attention of the user has moved outside the threshold distance of the visual indicator, the computer system maintains display of the visual indicator at a first location relative to the selectable virtual object, such as maintaining display of the visual indicator 3318 in FIG. 33G. In some embodiments, while performing the selection operation associated with the selectable virtual object, the hollow shape or empty circle is fully filled, where 100% fill corresponds to the time required for selecting the selectable virtual object.

In some embodiments, while performing the selection operation associated with the selectable virtual object, in accordance with a determination that the attention of the user has moved outside the threshold distance of the visual indicator, the computer system displays a visual feedback in the user interface at a second location of the attention of the user outside of the selectable virtual object in the user interface, such as displaying attention indicator 3370 in FIG. 33G. In some embodiments, while displaying the visual feedback in the user interface at a second location of the attention of the user outside of the selectable virtual object, the computer system ceases display of the visual feedback corresponding to attention of the user directed to the selectable virtual object. In some embodiments, the visual feedback includes one or more characteristics of the visual feedback (e.g., gaze-based attention indicators) described with reference to methods 1200, 2600, 2700, and/or 2800. After initiating the process for selecting the selectable virtual object, maintaining display of the visual indicator relative to the selectable virtual object and also displaying visual feedback at a different location of the attention of the user (e.g., outside the selectable virtual object) provides visual feedback for both the process of selecting the selectable virtual object and the current location of the attention of the user, thereby improving user-device interactions.

In some embodiments, the one or more first criteria include a criterion that is satisfied when a first user-specified option is enabled, such as the first user-specified option being enabled since user interface element 3316 is "toggled on" in FIGS. 33A and 33A1, and is not satisfied when the first user-specific option is disabled. In some embodiments, the computer system does not display the visual indicator unless and until the first user-specified option is enabled. In some embodiments, when the first user-specific option is enabled, the computer system accepts only gaze-based inputs. When the first user-specific option is disabled, the computer system optionally accepts gaze-based inputs as well as inputs from a portion of the user, such as a finger or hand of the user. In some embodiments, the computer system displays a user interface element (e.g., toggle) in the three-dimensional environment. Interacting with the user interface element optionally controls the first user-specified option. In some embodiments, the computer system receives user input directed to the user interface element (e.g., toggle) to control whether the first user-specified option (e.g., only gaze-based inputs) is enabled. In some embodiments, the user input includes attention of the user directed to the user interface element (e.g., for a threshold amount of time) to enable the first user-specified option. In some embodiments, the user input includes an air pinch gesture performed by a hand of the user while attention of the user is directed to the user interface element to enable the first user-specified option. In some embodiments, the user input includes direct input from a hand of the user directed to the user interface element to enable the first user-specified option (e.g., air tapping the user interface element). For example, when the user interface element is "toggled on", the system optionally accepts only gaze-based inputs. When the user interface element is "toggled off", the system optionally accepts gaze-based inputs as well as inputs other than gaze-based inputs (e.g., direct and/or indirect inputs). Displaying a visual indicator only when a first user-specified option is enabled reduces erroneous attention-based control of the selectable virtual object, thereby improving respective user-device interactions.

In some embodiments, before displaying the visual indicator, the computer system displays, via the display generation component, visual feedback, such as attention indicator 3314 in FIGS. 33A and 33A1, indicating a location of the attention of the user relative to the selectable virtual object, wherein the visual feedback indicating the location of the attention of the user relative to the selectable virtual object is different from the visual indicator indicating progress towards selecting the selectable virtual object. In some embodiments, even before displaying the visual indicator, the computer system displays visual feedback corresponding to the attention of the user, such as displaying a highlighting, lighting, shadow and/or another visual effect on an area of the selectable virtual object. In some embodiments, the visual feedback includes one or more characteristics of the visual feedback (e.g., gaze-based attention indicators) described with reference to methods 1200, 2600, 2700, and/or 2800. Displaying the visual feedback provides a visual status of a current location of the attention of the user, thereby improving user-device interactions.

In some embodiments, while displaying the visual indicator, such as visual indicator 3318 in FIG. 33B, the computer system maintains display, via the display generation component, of the visual feedback, such as attention indicator 3314 in FIG. 33B, indicating the location of the attention of the user relative to the selectable virtual object. In some embodiments, while displaying the visual indicator, the computer system maintains displays of the visual feedback corresponding to the attention of the user, such as displaying a highlighting, lighting, shadow and/or another visual effect on an area of the selectable virtual object. In some embodiments, the visual feedback includes one or more characteristics of the visual feedback (e.g., gaze-based attention indicators) described with reference to methods 1200, 2600, 2700, and/or 2800. Maintaining display of the visual feedback while displaying the visual indicator provides a visual status for a gaze-based input as well as the progress towards selecting a selectable virtual object, thereby improving user-device interactions.

In some embodiments, in accordance with a determination that a user-specified option has a first value, the first time threshold is a first respective time threshold, such as time threshold indicator 3322 in FIGS. 33A and 33A1 (e.g., 0.1, 0.5, 1, 5, or 10 s).

In some embodiments, in accordance with a determination that the user-specified option has a second value different from the first value, the first time threshold is a second respective time threshold, such as time threshold indicator 3326 in FIGS. 33A and 33A1 (e.g., 0.1, 0.5, 1, 5, or 10 s), different from the first respective time threshold. In some embodiments, the computer system receives user input defining the duration of time required for the attention of the user to remain within the threshold distance of the visual indicator to satisfy the second set of one or more criteria and select the selectable virtual object. In some embodiments, if the first value is lower than a second value, then the first time threshold required for the attention of the user to remain within the threshold distance of the visual indicator to satisfy the second set of one or more criteria and select the selectable virtual object is a shorter time period compared to a second respective time threshold. In some embodiments, if the first value is higher than the second value, then the first time threshold required for the attention of the user to remain within the threshold distance of the visual indicator to satisfy the second set of one or more criteria and select the selectable virtual object is a longer time period compared to the second respective time threshold. Changing a value of the first time threshold based on user input provides flexibility in meeting certain criteria (e.g., second set of one or more criteria) in order to select the selectable virtual object, thereby improving user-device interactions.

In some embodiments, the visual indicator includes a boundary surrounding an inner area, such as the hollow or empty circle of visual indicator 3318 in FIG. 33B.

In some embodiments, while displaying the visual indicator, before performing the selection operation associated with the selectable virtual object, and while the attention of the user is within the threshold distance of the visual indicator, the computer system changes a visual appearance of the inner area of the visual indicator in accordance with an elapsed time, such as elapsed time 3324 in FIG. 33B, since the attention of the user moved within the threshold distance of the visual indicator, such as increased filling of the hollow or empty circle (e.g., visual indicator 3318) in FIG. 33B. In some embodiments, if the visual indicator is represented by a hollow or empty circle, then the computer system increases filling of the hollow or empty circle from a center to a boundary of the hollow or empty circle by 10, 20, 30, 50, 70, or 100% in accordance with the amount of time elapsed since the one or more first criteria were satisfied and the attention of the user remains within the threshold distance of the visual indicator. In some embodiments, if the visual indicator is represented by a (optionally solid) circle, then the computer system increases opacity of the (optionally solid) circle from a center to a boundary of the (optionally solid) circle by 10, 20, 30, 50, 70, or 100% in accordance with the amount of time elapsed since the one or more first criteria were satisfied and the attention of the user remains within the threshold distance of the visual indicator. In some embodiments, if the visual indicator is represented by a (optionally solid) circle, then the computer system increases brightness of the (optionally solid) circle from a center to a boundary of the (optionally solid) circle by 10, 20, 30, 50, 70, or 100% in accordance with the amount of time elapsed since the one or more first criteria were satisfied and the attention of the user remains within the threshold distance of the visual indicator. In some embodiments, if the visual indicator is represented by a hollow or empty circle, then the computer system increases filling, brightness, and/or opacity of the hollow or empty circle from a center to a boundary of the hollow or empty circle by 10, 20, 30, 50, 70, or 100% in accordance with the amount of time elapsed since the one or more first criteria were satisfied and the attention of the user remains within the threshold distance of the visual indicator. In some embodiments, if the visual indicator is represented by a circle, then the computer system increases the size of the circle from a center to a boundary of the circle by 10, 20, 30, 50, 70, or 100% in accordance with the amount of time elapsed since the one or more first criteria were satisfied and the attention of the user remains within the threshold distance of the visual indicator. In some embodiments, when pausing and/or reducing the progress towards selecting the selectable virtual object, the computer system correspondingly pauses and/or reduces a filling, brightness, opacity, and/or size of an inner area of the visual indicator (e.g., from the boundary to the center of the visual indicator). Changing a visual appearance of the inner area of the visual indicator in accordance with an elapsed time since the attention of the user remains within the threshold distance of the visual indicator provides visual feedback of the progress towards selecting a selectable virtual object, thereby improving respective user-device interactions.

In some embodiments, changing the visual appearance of the inner area of the visual indicator in accordance with the elapsed time since the attention of the user moved within the threshold distance of the visual indicator includes changing the visual appearance from a center to a boundary of the visual indicator, such as increasing filling from a center to a boundary of the hollow or empty circle (e.g., visual indicator 3318) in FIG. 33B. In some embodiments, the computer system fills in a hollow or empty circle from a center outwards to a boundary of the hollow or empty circle. The inner area of visual indicator optionally increases in filling from the center as the amount of time elapsed since the one or more first criteria were satisfied and the attention of the user remains within the threshold distance of the visual indicator increases. The inner area of visual indicator optionally increases in brightness, opacity, and/or size from the center as the amount of time elapsed since the one or more first criteria were satisfied and the attention of the user remains within the threshold distance of the visual indicator increases. Changing (e.g., increasing) a visual appearance from a center to boundary of the visual indicator in accordance with an elapsed time since the attention of the user remains within the threshold distance of the visual indicator provides visual feedback of the progress towards selecting a selectable virtual object, thereby improving respective user-device interactions.

In some embodiments, displaying, via the display generation component, the visual indicator includes gradually increasing a visual prominence of the visual indicator (e.g., such that the visual indicator is becoming brighter, less transparent, less blurry, bigger, and/or a different color and/or shape) while concurrently changing the visual appearance of the inner area of the visual indicator in accordance with the elapsed time that the attention of the user remains within the threshold distance, such as increasing filling of the visual indicator 3318 from FIG. 33B to FIG. 33C. In some embodiments, the computer system gradually fades in the visual indicator after the first set of one or more first criteria are met. In some embodiments, while the computer system gradually increases the visual prominence of the visual indicator, the computer system begins filling in a hollow or empty circle (e.g., increasing filling of the hollow or empty circle by 10, 20, 30, 50, 70, or 100% in accordance with the amount of time elapsed since the one or more first criteria were satisfied). Gradually increasing a visual prominence of the visual indicator and changing a visual appearance of an inner area of the visual indicator in accordance with an elapsed time since the attention of the user remains within the threshold distance of the visual indicator provides visual feedback that certain criteria have been satisfied and that the progress towards selecting a selectable virtual object, thereby improving respective user-device interactions.

In some embodiments, changing the visual appearance of the inner area of the visual indicator includes in accordance with a determination that the elapsed time since the one or more first criteria were satisfied is a first amount of time, changing the visual appearance of the inner area of the visual indicator at a first rate, such as filling the visual indicator 3318 according to a rate in FIG. 33B (e.g., fill rate of 1, 5, 10, 20, 30, 50, 70, or 100%/s).

In some embodiments, changing the visual appearance of the inner area of the visual indicator includes in accordance with a determination that the elapsed time since the one or more first criteria were satisfied is a second amount of time different from the first amount of time, changing the visual appearance of the inner area of the visual indicator at a second rate (e.g., fill rate of 1, 5, 10, 20, 30, 50, 70, or 100%/s) different from the first rate, such as filling the visual indicator 3318 according to a rate in FIG. 33C that is different from the rate in FIG. 33B. In some embodiments, if the first amount of time is greater than the second amount of time, then the computer system increases the filling of the hollow or empty circle at a first rate (e.g., faster than the second rate) until reaching 100% fill corresponding to the time required for selecting the selectable virtual object. In some embodiments, if the first amount of time is less than the second amount of time, then the computer system increases the filling of the hollow or empty circle at a first rate (e.g., slower than the second rate) until reaching 100% fill corresponding to the time required for selecting the selectable virtual object. Changing a visual appearance of the inner area of the visual indicator in accordance with a rate corresponding to elapsed time since the one or more first criteria were satisfied provides visual feedback of current progress for selecting the selectable virtual object, thereby improving user-device interactions.

It should be understood that the particular order in which the operations in method 3400 have been described is merely exemplary and is not intended to indicate that the described order is the only order in which the operations could be performed. One of ordinary skill in the art would recognize various ways to reorder the operations described herein. In some embodiments, aspects/operations of methods 800, 900, 1000, 1200, 1400, 1600, 1800, 2000, 2200, 2400, 2600, 2700, 2800, 3000, 3200, and/or 3400 may be interchanged, substituted, and/or added between these methods. For example, the three-dimensional environments of methods 800, 900, 1000, 1200, 1400, 1600, 1800, 2000, 2200, 2400, 2600, 2700, 2800, 3000, 3200, and/or 3400, the virtual content of methods 800, 900, 1000, 1200, 1400, 1600, 1800, 2000, 2200, 2400, 2600, 2700, 2800, 3000, 3200, and/or 3400, the attention-based interactions of methods 800, 900, 1000, 1200, 1400, 1600, 1800, 2000, 2200, 2400, 2600, 2700, 2800, 3000, 3200 and/or 3400, the selectable objects of methods 800, 900, 1000, 1200, 1400, 1600, 1800, 2000, 2200, 2400, 2600, 2700, 2800, 3000, 3200 and/or 3400, and/or the attention and/or attention indicators of methods 800, 900, 1000, 1200, 1400, 1600, 1800, 2000, 2200, 2400, 2600, 2700, 2800, 3000, 3200 and/or 3400, are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
   at a computer system in communication with a display generation component and one or more input devices:
      displaying, via the display generation component, a user interface including a virtual object;

while displaying the user interface, detecting, via the one or more input devices, a first user input that includes attention directed towards a first portion of the virtual object; and
      while detecting the first user input:
         in accordance with a determination that one or more first criteria are satisfied, including a criterion that is satisfied when the first user input includes a respective type of input from a first portion of a user at a location that corresponds to the first portion of the virtual object, displaying, via the display generation component, a first visual feedback indicating a location of the attention of the user in the first portion of the virtual object; and
         in accordance with a determination that one or more second criteria are satisfied, including a criterion that is satisfied when the first user input includes the attention of the user directed towards the first portion of the virtual object without the respective type of input from the user directed towards the first portion of the virtual object, displaying second visual feedback that is different from the first visual feedback without displaying the first visual feedback in the first portion of the virtual object.

2. The method of claim 1, wherein displaying, via the display generation component, the second visual feedback includes displaying the second visual feedback having a shape resulting from masking a first shape corresponding to the attention of the user with a second shape of the virtual object, and displaying, via the display generation component, the first visual feedback includes displaying the first visual feedback having a shape that does not result from masking the first shape with the second shape.

3. The method of claim 1, further comprising:
   while the one or more first criteria or the one or more second criteria are satisfied, detecting, via the one or more input devices, a change in position of the first portion of the user relative to the virtual object; and
   in response to detecting the change in position of the first portion of the user relative to the virtual object:
      in accordance with a determination that the one or more first criteria were satisfied, changing a visual appearance of the first visual feedback by a first amount; and
   in accordance with a determination that the one or more second criteria were satisfied, forgoing changing a visual appearance of the second visual feedback by the first amount.

4. The method of claim 3, further comprising:
   in response to detecting the change in position of the first portion of the user relative to the virtual object, and in accordance with the determination that the one or more second criteria were satisfied, forgoing changing the visual appearance of the second visual feedback based on a change in position of the first portion of the user relative to the virtual object.

5. The method of claim 3, wherein changing the visual appearance of the first visual feedback includes changing a level of brightness of the first visual feedback.

6. The method of claim 3, wherein changing the visual appearance of the first visual feedback includes changing a size of the first visual feedback.

7. The method of claim 3, wherein changing the visual appearance of the first visual feedback includes changing an amount of blur of the first visual feedback.

8. The method of claim 1, wherein the one or more second criteria include a criterion that is satisfied when the virtual object is a selectable object, and is not satisfied when the virtual object is not a selectable object.

9. The method of claim 1, wherein the one or more second criteria include a criterion that is satisfied when the first portion of the user is in a ready state.

10. The method of claim 1, further comprising:
while displaying the second visual feedback in the first portion of the virtual object in response to detecting the first user input:
detecting, via the one or more input devices, a second user input corresponding to an indirect input from the first portion of the user; and
in response to detecting the second user input, interacting with the virtual object based on the second user input.

11. The method of claim 1, further comprising:
while displaying the first visual feedback in the first portion of the virtual object in response to detecting the first user input:
detecting, via the one or more input devices, a second user input corresponding to a direct input from the first portion of the user; and
in response to detecting the second user input, interacting with the virtual object based on the second user input.

12. The method of claim 1, further comprising:
while the one or more first criteria or the one or more second criteria are satisfied, detecting, via the one or more input devices, a second input corresponding to selection of the virtual object, wherein the virtual object is a selectable button; and
in response to detecting the second input, selecting the selectable button, including: in accordance with a determination that the one or more first criteria were satisfied when the second input was detected, moving the virtual object away from a viewpoint of the user in accordance with the second input; and
in accordance with a determination that the one or more second criteria were satisfied when the second input was detected, forgoing moving the virtual object away from the viewpoint of the user.

13. The method of claim 1, further comprising:
while the one or more first criteria or the one or more second criteria are satisfied, detecting, via the one or more input devices, a second input corresponding to selection of the virtual object, wherein the virtual object is a selectable button; and
in response to detecting the second input:
selecting the selectable button;
in accordance with a determination that the one or more first criteria were satisfied, displaying a visual indication around at least a portion of a perimeter of the virtual object indicating that the virtual object has been selected; and
in accordance with a determination that the one or more second criteria were satisfied, forgoing displaying the visual indication around the portion of the perimeter of the virtual object.

14. The method of claim 1, further comprising:
while displaying the second visual feedback at the first portion of the virtual object, detecting second user input that corresponds to movement of the first portion of the user toward the virtual object; and
in response to detecting the second user input, and in accordance with a determination that first portion of the user has moved within a threshold distance of the virtual object, ceasing display of the second visual feedback and displaying the first visual feedback in a respective portion of the virtual object.

15. The method of claim 1, wherein:
displaying the first visual feedback includes:
in accordance with a determination that the virtual object has a first size, displaying the first visual feedback having a first visual appearance; and
in accordance with a determination that the virtual object has a second size, displaying the first visual feedback having the first visual appearance; and
displaying the second visual feedback includes:
in accordance with a determination the virtual object has the first size, displaying the second visual feedback having a second visual appearance; and
in accordance with a determination that the virtual object has the second size, displaying the second visual feedback having a third visual appearance different from the second visual appearance.

16. The method of claim 1, further comprising:
while displaying, in a three-dimensional environment, a respective virtual object having a first size relative to the three-dimensional environment, detecting, via the one or more input devices, a second user input that includes attention directed towards a first portion of the respective virtual object; and
in response to detecting the second user input, in accordance with a determination that one or more third criteria are satisfied, displaying the respective virtual object having a second size, greater than the first size, relative to the three-dimensional environment.

17. The method of claim 16, wherein the second user input includes gaze of the user directed to the respective virtual object without input from the user other than the gaze of the user, and the one or more third criteria include a criterion that is satisfied when the second user input includes gaze of the user directed toward the respective virtual object without input other than the gaze from the user.

18. The method of claim 17, wherein the one or more third criteria include a criterion that is satisfied when gaze of the user is directed toward the respective virtual object, and a criterion that is satisfied when the second user input includes the respective type of input from the first portion of the user at a location that corresponds to the respective virtual object, the method further comprising:
while displaying the respective virtual object having the second size relative to the three-dimensional environment, detecting, via the one or more input devices, that the gaze of the user is no longer directed toward the respective virtual object and that the first portion of the user is no longer providing the respective type of input at the location corresponding to the respective virtual object; and
in response to detecting that the gaze of the user is no longer directed toward the respective virtual object and that the first portion of the user is no longer providing the respective type of input at the location corresponding to the respective virtual object, displaying, in the three-dimensional environment, the respective virtual object having the first size relative to the three-dimensional environment.

19. The method of claim 18, further comprising:
while displaying the respective virtual object having the second size relative to the three-dimensional environment, detecting, via the one or more input devices, that the first portion of the user is no longer providing the respective type of input at the location corresponding to the respective virtual object but that the gaze of the user is directed toward the respective virtual object; and in response to detecting that the first portion of the user is no longer providing the respective type of input at the location corresponding to the respective virtual object but that the gaze of the user is directed toward the respective virtual object, maintaining, in the three-dimensional environment, display of the respective virtual object having the second size relative to the three-dimensional environment.

20. The method of claim 18, further comprising:

while displaying the respective virtual object having the second size relative to the three-dimensional environment, detecting, via the one or more input devices, that the gaze of the user is no longer directed toward the respective virtual object but that the first portion of the user is providing the respective type of input at the location corresponding to the respective virtual object; and in response to detecting that that the gaze of the user is no longer directed toward the respective virtual object but that the first portion of the user is providing the respective type of input at the location corresponding to the respective virtual object, maintaining, in the three-dimensional environment, display of the respective virtual object having the second size relative to the three-dimensional environment.

21. The method of claim 1, wherein:

the first user input including a respective type of input from a first portion of the user at a location that corresponds to the first portion of the virtual object comprises hand-based attention directed towards the first portion of the virtual object; and the first user input including the attention of the user directed towards the first portion of the virtual object without the respective type of input from the user directed towards the first portion of the virtual object comprises gaze-based attention directed towards the first portion of the virtual object, without hand-based attention directed towards the first portion of the virtual object.

22. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

displaying, via the display generation component, a user interface including a virtual object;

while displaying the user interface, detecting, via the one or more input devices, a first user input that includes attention directed towards a first portion of the virtual object; and while detecting the first user input:

in accordance with a determination that one or more first criteria are satisfied, including a criterion that is satisfied when the first user input includes a respective type of input from a first portion of a user at a location that corresponds to the first portion of the virtual object, displaying, via the display generation component, a first visual feedback indicating a location of the attention of the user in the first portion of the virtual object; and in accordance with a determination that one or more second criteria are satisfied, including a criterion that is satisfied when the first user input includes the attention of the user directed towards the first portion of the virtual object without the respective type of input from the user directed towards the first portion of the virtual object, displaying second visual feedback that is different from the first visual feedback without displaying the first visual feedback in the first portion of the virtual object.

23. The computer system of claim 22, the one or more programs further including instructions for:

while the one or more first criteria or the one or more second criteria are satisfied, detecting, via the one or more input devices, a change in position of the first portion of the user relative to the virtual object; and in response to detecting the change in position of the first portion of the user relative to the virtual object:

in accordance with a determination that the one or more first criteria were satisfied, changing a visual appearance of the first visual feedback by a first amount; and in accordance with a determination that the one or more second criteria were satisfied, forgoing changing a visual appearance of the second visual feedback by the first amount.

24. The computer system of claim 23, the one or more programs further including instructions for:

in response to detecting the change in position of the first portion of the user relative to the virtual object, and in accordance with the determination that the one or more second criteria were satisfied, forgoing changing the visual appearance of the second visual feedback based on a change in position of the first portion of the user relative to the virtual object.

25. The computer system of claim 22, the one or more programs further including instructions for:

while the one or more first criteria or the one or more second criteria are satisfied, detecting, via the one or more input devices, a second input corresponding to selection of the virtual object, wherein the virtual object is a selectable button; and in response to detecting the second input, selecting the selectable button, including:

in accordance with a determination that the one or more first criteria were satisfied when the second input was detected, moving the virtual object away from a viewpoint of the user in accordance with the second input; and in accordance with a determination that the one or more second criteria were satisfied when the second input was detected, forgoing moving the virtual object away from the viewpoint of the user.

26. The computer system of claim 22, the one or more programs further including instructions for:

while the one or more first criteria or the one or more second criteria are satisfied, detecting, via the one or more input devices, a second input corresponding to selection of the virtual object, wherein the virtual object is a selectable button; and in response to detecting the second input:

selecting the selectable button;

in accordance with a determination that the one or more first criteria were satisfied, displaying a visual indication around at least a portion of a perimeter of the virtual object indicating that the virtual object has been selected; and in accordance with a determination that the one or more second criteria were satisfied, forgoing displaying the visual indication around the portion of the perimeter of the virtual object.

27. The computer system of claim 22, the one or more programs further including instructions for:

while displaying the second visual feedback at the first portion of the virtual object, detecting second user input that corresponds to movement of the first portion of the user toward the virtual object; and in response to detecting the second user input, and in accordance with a determination that first portion of the user has moved within a threshold distance of the virtual object, ceasing display of the second visual feedback and displaying the first visual feedback in a respective portion of the virtual object.

28. The computer system of claim 22, wherein:

displaying the first visual feedback includes:

in accordance with a determination that the virtual object has a first size, displaying the first visual feedback having a first visual appearance; and in accordance with a determination that the virtual object has a second size, displaying the first visual feedback having the first visual appearance; and displaying the second visual feedback includes:

in accordance with a determination the virtual object has the first size, displaying the second visual feedback having a second visual appearance; and in accordance with a determination that the virtual object has the second size, displaying the second visual feedback having a third visual appearance different from the second visual appearance.

29. The computer system of claim 22, the one or more programs further including instructions for:

while displaying, in a three-dimensional environment, a respective virtual object having a first size relative to the three-dimensional environment, detecting, via the one or more input devices, a second user input that includes attention directed towards a first portion of the respective virtual object; and in response to detecting the second user input, in accordance with a determination that one or more third criteria are satisfied, displaying the respective virtual object having a second size, greater than the first size, relative to the three-dimensional environment.

30. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, a user interface including a virtual object;

while displaying the user interface, detecting, via the one or more input devices, a first user input that includes attention directed towards a first portion of the virtual object; and while detecting the first user input:

in accordance with a determination that one or more first criteria are satisfied, including a criterion that is satisfied when the first user input includes a respective type of input from a first portion of a user at a location that corresponds to the first portion of the virtual object, displaying, via the display generation component, a first visual feedback indicating a location of the attention of the user in the first portion of the virtual object; and in accordance with a determination that one or more second criteria are satisfied, including a criterion that is satisfied when the first user input includes the attention of the user directed towards the first portion of the virtual object without the respective type of input from the user directed towards the first portion of the virtual object, displaying second visual feedback that is different from the first visual feedback without displaying the first visual feedback in the first portion of the virtual object.

31. The non-transitory computer readable storage medium of claim 22, the method further comprising:

while the one or more first criteria or the one or more second criteria are satisfied, detecting, via the one or more input devices, a change in position of the first portion of the user relative to the virtual object; and in response to detecting the change in position of the first portion of the user relative to the virtual object:

in accordance with a determination that the one or more first criteria were satisfied, changing a visual appearance of the first visual feedback by a first amount; and in accordance with a determination that the one or more second criteria were satisfied, forgoing changing a visual appearance of the second visual feedback by the first amount.

32. The non-transitory computer readable storage medium of claim 31, the method further comprising:

in response to detecting the change in position of the first portion of the user relative to the virtual object, and in accordance with the determination that the one or more second criteria were satisfied, forgoing changing the visual appearance of the second visual feedback based on a change in position of the first portion of the user relative to the virtual object.

33. The non-transitory computer readable storage medium of claim 30, the method further comprising:

while the one or more first criteria or the one or more second criteria are satisfied, detecting, via the one or more input devices, a second input corresponding to selection of the virtual object, wherein the virtual object is a selectable button; and in response to detecting the second input, selecting the selectable button, including:

in accordance with a determination that the one or more first criteria were satisfied when the second input was detected, moving the virtual object away from a viewpoint of the user in accordance with the second input; and in accordance with a determination that the one or more second criteria were satisfied when the second input was detected, forgoing moving the virtual object away from the viewpoint of the user.

34. The non-transitory computer readable storage medium of claim 30, the method further comprising:

while the one or more first criteria or the one or more second criteria are satisfied, detecting, via the one or more input devices, a second input corresponding to selection of the virtual object, wherein the virtual object is a selectable button; and in response to detecting the second input:

selecting the selectable button;

in accordance with a determination that the one or more first criteria were satisfied, displaying a visual indication around at least a portion of a perimeter of the virtual object indicating that the virtual object has been selected; and in accordance with a determination that the one or more second criteria were satisfied, forgoing displaying the visual indication around the portion of the perimeter of the virtual object.

35. The non-transitory computer readable storage medium of claim 30, the method further comprising:

while displaying the second visual feedback at the first portion of the virtual object, detecting second user input that corresponds to movement of the first portion of the user toward the virtual object; and in response to detecting the second user input, and in accordance with a determination that first portion of the user has moved within a threshold distance of the virtual object, ceasing display of the second visual feedback and displaying the first visual feedback in a respective portion of the virtual object.

36. The non-transitory computer readable storage medium of claim 30, wherein:

displaying the first visual feedback includes:

in accordance with a determination that the virtual object has a first size, displaying the first visual feedback having a first visual appearance; and

in accordance with a determination that the virtual object has a second size, displaying the first visual feedback having the first visual appearance; and displaying the second visual feedback includes:

in accordance with a determination the virtual object has the first size, displaying the second visual feedback having a second visual appearance; and in accordance with a determination that the virtual object has the second size, displaying the second visual feedback having a third visual appearance different from the second visual appearance.

37. The non-transitory computer readable storage medium of claim 30, the method further comprising:

while displaying, in a three-dimensional environment, a respective virtual object having a first size relative to the three-dimensional environment, detecting, via the one or more input devices, a second user input that includes attention directed towards a first portion of the respective virtual object; and in response to detecting the second user input, in accordance with a determination that one or more third criteria are satisfied, displaying the respective virtual object having a second size, greater than the first size, relative to the three-dimensional environment.

* * * * *